United States Patent

(12) United States Patent
Walmsley et al.

(10) Patent No.: US 7,374,266 B2
(45) Date of Patent: *May 20, 2008

US007374266B2

(54) METHOD FOR AT LEAST PARTIALLY COMPENSATING FOR ERRORS IN INK DOT PLACEMENT DUE TO ERRONEOUS ROTATIONAL DISPLACEMENT

(75) Inventors: Simon Robert Walmsley, Balmain (AU); John Robert Sheahan, Balmain (AU); Mark Jackson Pulver, Balmain (AU); Michael John Webb, Balmain (AU); Richard Thomas Plunkett, Balmain (AU); Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 466 days.

This patent is subject to a terminal disclaimer.

(21) Appl. No.: 10/854,521

(22) Filed: May 27, 2004

(65) Prior Publication Data

US 2006/0164454 A1 Jul. 27, 2006

(51) Int. Cl.
*B41J 29/38* (2006.01)

(52) U.S. Cl. ........................................... 347/14; 347/19

(58) Field of Classification Search .................. 347/14, 347/19, 78

See application file for complete search history.

(56) References Cited

U.S. PATENT DOCUMENTS

| | | | | |
|---|---|---|---|---|
| 5,534,895 | A * | 7/1996 | Lindenfelser et al. | 347/19 |
| 5,777,638 | A * | 7/1998 | Salter et al. | 347/12 |
| 6,281,908 | B1 | 8/2001 | Gibson et al. | |
| 6,367,903 | B1 | 4/2002 | Gast et al. | |
| 6,412,903 | B1 * | 7/2002 | Lee et al. | 347/19 |
| 6,523,924 | B1 * | 2/2003 | Adkins et al. | 347/16 |
| 6,554,387 | B1 | 4/2003 | Otsuki | |

FOREIGN PATENT DOCUMENTS

| | | | |
|---|---|---|---|
| EP | 0674993 | A2 | 10/1995 |
| EP | 1029673 | A1 | 8/2000 |
| WO | WO 00/06386 | A | 2/2000 |

* cited by examiner

*Primary Examiner*—Thinh Nguyen

(57) ABSTRACT

A method of at least partially compensating for errors in ink dot placement by at least one of a plurality of nozzles due to erroneous rotational displacement of a printhead module relative to a carrier, the nozzles being disposed on the printhead module, the method comprising the steps of determining the rotational displacement; determining at least one correction factor that at least partially compensates for the ink dot displacement; and using the correction factor to alter the output of the ink dots to at least partially compensate for the rotational displacement.

21 Claims, 223 Drawing Sheets

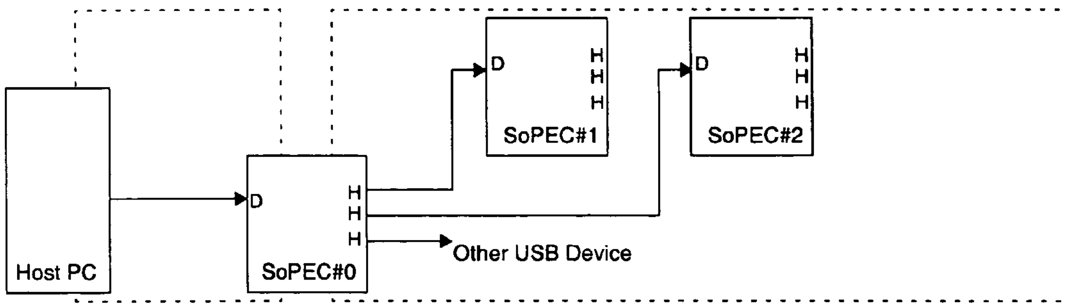
Case 1: One Printer USB Bus with no Hub chips, up to 3 Devices on the bus
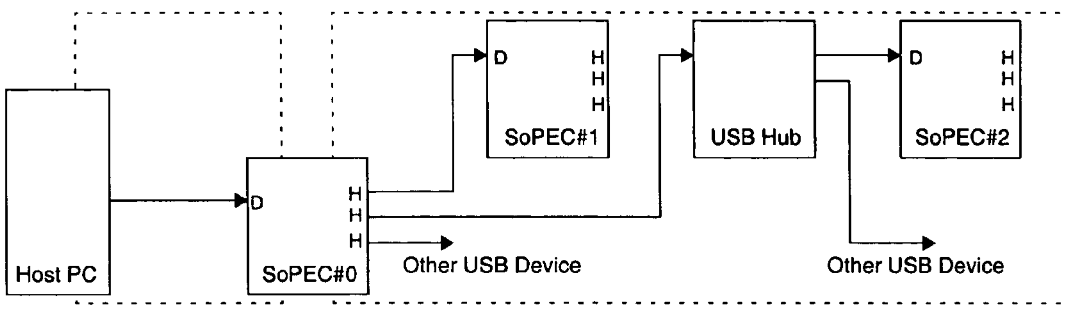
Case 2: One Printer USB Bus including Hub chip, more than 3 Devices on the bus
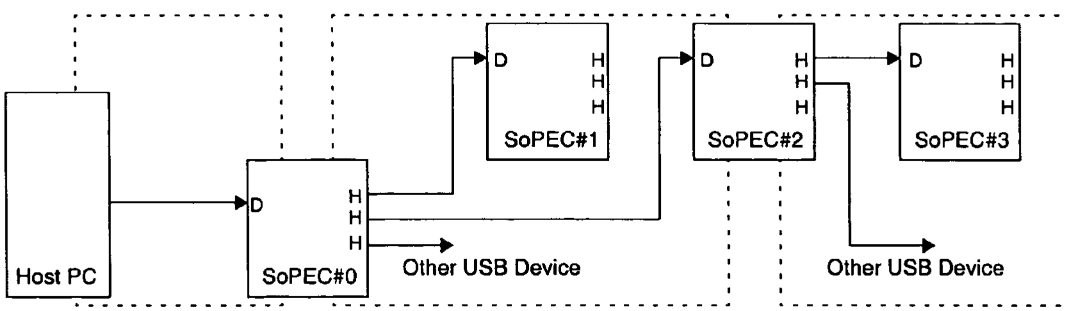
Case 3: Two Printer USB Busses, up to 3 devices on each bus
FIG. 16

| Inst | Values |
|---|---|
| BC | 1 |
| ACNT | 01 |
| LDMULT | 001 |
| CMPNYBBLE | 00011 |
| CMYBYTE | 00010 |
| LDCNT | 00001 |
| BCCMP1 | 000001 |
| LDBIT | 000000001 |
| LDCNT_FIFO | 0000000001 |
| LDBSEL | 000000000001 |
| RX_COMMIT | 00000000000001 |
| RX_DELETE | 00000000000000 |

14 12 11 8 7 4 3 0

| Instructions | | | | |
|---|---|---|---|---|
| BC | B | IN_SEL | PC_OFFSET | |
| ACNT | B | NUM_CYCLES | | |
| LDMULT | MASK | OUT_VALUE | | |
| CMPNYBBLE | B2 | B1 | MASK | VALUE |
| CMPBYTE | B1 | ME | MASK/DATA VALUE | |
| LDCNT | SEL | NUM_COUNT | | |
| BCCMP1 | B | PC_OFFSET | | |
| LDBIT | B | OUT_SEL | | |
| LDCNT_FIFO | B | SEL | NYB | |
| LDBSEL | B | SEL | | |
| RX_COMMIT | | | | |
| RX_DELETE | | | | |

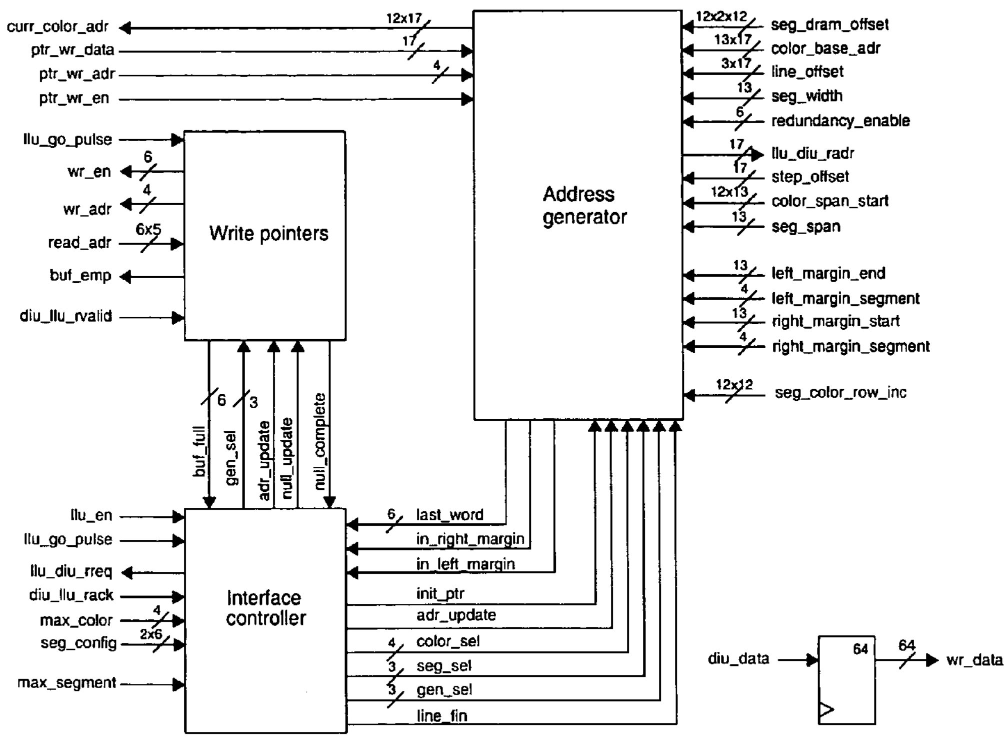

FIG. 284

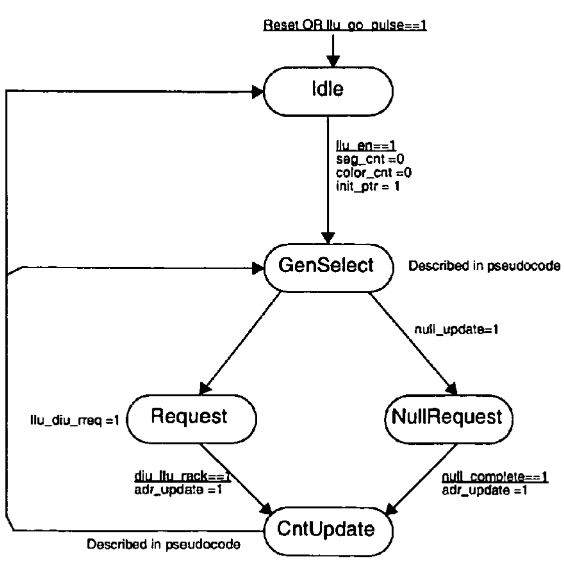

Machine remains in same state by default
All outputs are zero unless otherwise stated State Description:

| | |
|---|---|
| Idle: | Idle state wait for active request |
| GenSelect: | Select the correct generator to update before requesting to DIU |
| Request: | Request issued wait for acknowledge |
| NullRequest | Request that buffer be filled with null data, wait for completion |
| CntUpdate | Update the address pointers |

FIG. 285

Machine remains in same state by default
All outputs are zero unless otherwise stated State Description:

Wait: Wait for line start
NCCmd: Generate NC_A/B (next color) command
NozzleData: Transmit Nozzle Data
Fire: Generate Fire command
IdleInsert: Insert Idle characters Note: All logic clocked on phiclk Existing IBM POR macro Modified IBM POR macro for brown-out detection, on external pin. [Voltage divider disconnected - minimal change].

METHOD FOR AT LEAST PARTIALLY COMPENSATING FOR ERRORS IN INK DOT PLACEMENT DUE TO ERRONEOUS ROTATIONAL DISPLACEMENT

CO-PENDING APPLICATIONS

Various methods, systems and apparatus relating to the present invention are disclosed in the following co-pending applications filed byte applicant or assignee of the present invention simultaneously with the present application:

| | | | | |
|---|---|---|---|---|
| 10/854,522 | 10/854,488 | 10/854,487 | 10/854,503 | 10/854,504 |
| 10/854,509 | 10/854,510 | 10/854,496 | 10/854,497 | 10/854,495 |
| 10/854,498 | 10/854,511 | 10/854,512 | 10/854,525 | 10/854,526 |
| 10/854,516 | 10/854,508 | 10/854,507 | 10/854,515 | 10/854,506 |
| 10/854,505 | 10/854,493 | 10/854,494 | 10/854,489 | 10/854,490 |
| 10/854,492 | 10/854,491 | 10/854,528 | 10/854,523 | 10/854,527 |
| 10/854,524 | 10/854,520 | 10/854,514 | 10/854,519 | 10/854,513 |
| 10/854,499 | 10/854,501 | 10/854,500 | 10/854,502 | 10/854,518 |
| 10/854,517 | | | | |

CROSS-REFERENCES

The disclosures of these co-pending applications are incorporated herein by cross-reference.

Various methods, systems and apparatus relating to the present invention are disclosed in the following co-pending applications filed by the applicant or assignee of the present invention. The disclosures of all of these co-pending applications are incorporated herein by cross-reference.

| | | | | | |
|---|---|---|---|---|---|
| 09/517539 | 6566858 | 6331946 | 6246970 | 6442525 | 09/517384 |
| 09/505951 | 6374354 | 09/517608 | 6816968 | 6757832 | 6334190 |
| 6745331 | 09/517541 | 10/636263 | 10/636283 | 10/407212 | 10/407207 |
| 10/683064 | 10/683041 | 10/727181 | 10/727162 | 10/727163 | 10/727245 |
| 10/727204 | 10/727233 | 10/727280 | 10/727157 | 10/727178 | 7096137 |
| 10/727257 | 10/727238 | 10/727251 | 10/727159 | 10/727180 | 10/727179 |
| 10/727192 | 10/727274 | 10/727164 | 10/727161 | 10/727198 | 10/727158 |
| 10/754536 | 10/754938 | 10/727227 | 10/727160 | 6795215 | 6859289 |
| 6977751 | 6398332 | 6394573 | 6622923 | 6747760 | 6921144 |
| 10/780624 | 10/780622 | 10/791792 | 10/667342 | 7025279 | 6857571 |
| 6817539 | 6830198 | 6992791 | 7038809 | 6980323 | 10/713077 |
| 10/713081 | 6947173 | | | | |

BACKGROUND

When a printhead module is being mounted to a carrier, there is the possibility that the position of the printhead will be rotationally erroneous. Such errors arise due to the tolerances in the assembly process, for example.

FIELD OF THE INVENTION

The present invention relates to a method of compensating for errors in ink dot placement due to erroneous rotational displacement of a printhead or printhead module.

The invention has primarily been developed for use in a pagewidth inkjet printer comprising a printer controller and a printhead having one or more printhead modules, and will be described with reference to this example. However, it will be appreciated that the invention is not limited to any particular type of printing technology, and is not limited to use in, for example, pagewidth and inkjet printing.

In cases where the printhead module is short, and particularly where it is the only module in the printhead, minor rotational errors may be acceptable. However, in the case of relatively long printheads, the amount of error introduced to dot positions due to the erroneous rotational position of the printhead module relative to the carrier may reach noticeable, and therefore unacceptable (or at least undesirable) levels.

The problem is exacerbated when multiple printhead modules are laid end to end to form a printhead, such as a pagewidth printhead, due to the fact that some forms of rotational error will cause discontinuities between rows of dots printed by adjacent modules. In general, these discontinuities are more visible and objectionable than mere consistent skew across a single printhead module.

It would be useful to provide a method and apparatus for at least partially compensating for errors in ink dot placement due to erroneous rotational displacement of a printhead module relative to a carrier.

SUMMARY OF THE INVENTION

In a first aspect the present invention provides a method of at least partially compensating for errors in ink dot placement by at least one of a plurality of nozzles due to erroneous rotational displacement of a printhead module relative to a carrier, the nozzles being disposed on the printhead module, the method comprising the steps of:

(a) determining the rotational displacement;
(b) determining at least one correction factor that at least partially compensates for the ink dot displacement; and
(c) using the correction factor to alter the output of the ink dots to at least partially compensate for the rotational displacement.

Optionally, step (c) includes altering a timing of a fire signal to at least one of the nozzles on the basis of the correction factor, thereby to effect the at least partial compensation.

Optionally, the nozzles are disposed in a plurality of rows, and step (c) includes reallocating at least one of the ink dots from at least one original print line to at least one alternate print line, thereby to effect the at least partial compensation.

Optionally, step (c) further includes the step of altering a timing of fire signals to at least one of the nozzles on the basis of the correction factor, thereby to effect the at least partial compensation.

Optionally, the altered fire signals are supplied to both reallocated ink dots and non-reallocated ink dots.

Optionally, the correction factor is stored in a memory associated with the printhead.

Optionally, the memory is mounted with the printhead, the printhead being mounted on the print engine.

Optionally, the rotational displacement is roll.

Optionally, the rotational displacement is yaw.

Optionally, the printhead module being one of a plurality of printhead modules mounted on a carrier to form a printhead and the error in ink dot placement being an error relative to ink dots output by one or more of the other printhead modules Optionally, the printer is a pagewidth printer.

Optionally, the printer is a pagewidth printer.

Optionally, the present invention provides a printer controller programmed and configured to implement the method of at least partially compensating for errors in ink dot placement by at least one of a plurality of nozzles due to erroneous rotational displacement of a printhead module relative to a carrier, the nozzles being disposed on the printhead module, the method comprising the steps of:

(a) determining the rotational displacement;

(b) determining at least one correction factor that at least partially compensates for the ink dot displacement; and (c) using the correction factor to alter the output of the ink dots to at least partially compensate for the rotational displacement.

Optionally, the method including expelling ink from a printhead module including at least one row that comprises a plurality of adjacent sets of n adjacent nozzles, each of the nozzles being configured to expel ink in response to a fire signal, the method comprising providing, for each set of nozzles, a fire signal in accordance with the sequence: [nozzle position 1, nozzle position n, nozzle position 2, nozzle position (n−1), . . . , nozzle position x], wherein nozzle position x is at or adjacent the center of the set of nozzles.

Optionally, the method including expelling ink from a printhead module including at least one row that comprises a plurality of sets of n adjacent nozzles, each of the nozzles being configured to expel ink in response to a fire signal, the method comprising the steps of:

(a) providing a fire signal to nozzles at a first and nth position in each set of nozzles;

(b) providing a fire signal to the next inward pair of nozzles in each set;

(c) in the event n is an even number, repeating step (b) until all of the nozzles in each set has been fired; and (d) in the event n is an odd number, repeating step (b) until all of the nozzles but a central nozzle in each set have been fired, and then firing the central nozzle.

Optionally, the method including manufacturing a plurality of printhead modules, at least some of which are capable of being combined in pairs to form bilithic pagewidth printheads, the method comprising the step of laying out each of the plurality of printhead modules on a wafer substrate, wherein at least one of the printhead modules is right-handed and at least another is left-handed.

Optionally, the method being performed in conjunction with a printhead module including:

at least one row of print nozzles;

at least two shift registers for shifting in dot data supplied from a data source to each of the at least one rows, wherein each print nozzle obtains dot data to be fired from an element of one of the shift registers.

Optionally, the method being performed in a printer comprising:

a printhead comprising at least a first elongate printhead module, the at least one printhead module including at least one row of print nozzles for expelling ink; and at least first and second printer controllers configured to receive print data and process the print data to output dot data to the printhead, wherein the first and second printer controllers are connected to a common input of the printhead.

Optionally, the method being performed in a printer comprising:

a printhead comprising first and second elongate printhead modules, the printhead modules being parallel to each other and being disposed end to end on either side of a join region;

at least first and second printer controllers configured to receive print data and process the print data to output dot data to the printhead, wherein the first printer controller outputs dot data only to the first printhead module and the second printer controller outputs dot data only to the second printhead module, wherein the printhead modules are configured such that no dot data passes between them.

Optionally, the method being performed in a printer comprising:

a printhead comprising first and second elongate printhead modules, the printhead modules being parallel to each other and being disposed end to end on either side of a join region, wherein the first printhead module is longer than the second printhead module;

at least first and second printer controllers configured to receive print data and process the print data to output dot data to the printhead, wherein: the first printer controller outputs dot data to both the first printhead module and the second printhead module; and the second printer controller outputs dot data only to the second printhead module.

Optionally, the method being performed in a printer comprising:

a printhead comprising first and second elongate printhead modules, the printhead modules being parallel to each other and being disposed end to end on either side of a join region, wherein the first printhead module is longer than the second printhead module;

at least first and second printer controllers configured to receive print data and process the print data to output dot data for the printhead, wherein: the first printer controller outputs dot data to both the first printhead module and the second controller; and the second printer controller outputs dot data to the second printhead module, wherein the dot data output by the second printer controller includes dot data it generates and at least some of the dot data received from the first printer controller.

Optionally, the method being performed in conjunction with a printer controller for supplying dot data to at least one printhead module and at least partially compensating for errors in ink dot placement by at least one of a plurality of nozzles on the printhead module due to erroneous rotational displacement of the printhead module relative to a carrier, the printer being configured to:

access a correction factor associated with the at least one printhead module;

determine an order in which at least some of the dot data is supplied to at least one of the at least one printhead modules, the order being determined at least partly on the basis of the correction factor, thereby to at least partially compensate for the rotational displacement; and supply the dot data to the printhead module.

Optionally, the method being performed in conjunction with a printer controller for supplying dot data to a printhead module having a plurality of nozzles for expelling ink, the printhead module including a plurality of thermal sensors, each of the thermal sensors being configured to respond to a temperature at or adjacent at least one of the nozzles, the printer controller being configured to modify operation of at least some of the nozzles in response to the temperature rising above a first threshold.

Optionally, the method being performed in conjunction with a printer controller for controlling a printhead comprising at least one monolithic printhead module, the at least one printhead module having a plurality of rows of nozzles configured to extend, in use, across at least part of a printable pagewidth of the printhead, the nozzles in each row being grouped into at least first and second fire groups, the printhead module being configured to sequentially fire, for each row, the nozzles of each fire group, such that each nozzle in the sequence from each fire group is fired simultaneously with respective corresponding nozzles in the sequence in the other fire groups, wherein the nozzles are fired row by row such that the nozzles of each row are all fired before the nozzles of each subsequent row, wherein the printer controller is configured to provide one or more control signals that control the order of firing of the nozzles.

Optionally, the method being performed in conjunction with a printer controller for outputting to a printhead module:

dot data to be printed with at least two different inks; and control data for controlling printing of the dot data;

the printer controller including at least one communication output, each or the communication output being configured to output at least some of the control data and at least some of the dot data for the at least two inks.

Optionally, the method being performed in conjunction with a printhead module including at least one row of printhead nozzles, at least one row including at least one displaced row portion, the displacement of the row portion including a component in a direction normal to that of a pagewidth to be printed.

Optionally, the method being performed in conjunction with a printer controller for supplying print data to at least one printhead module capable of printing a maximum of n of channels of print data, the at least one printhead module being configurable into:

a first mode, in which the printhead module is configured to receive data for a first number of the channels; and a second mode, in which the printhead module is configured to receive print data for a second number of the channels, wherein the first number is greater than the second number; wherein the printer controller is selectively configurable to supply dot data for the first and second modes.

Optionally, the method being performed in conjunction with a printer controller for supplying data to a printhead comprising a plurality of printhead modules, the printhead being wider than a reticle step used in forming the modules, the printhead comprising at least two types of the modules, wherein each type is determined by its geometric shape in plan.

Optionally, the method being used in conjunction with a printer controller for supplying one or more control signals to a printhead module, the printhead module including at least one row that comprises a plurality of sets of n adjacent nozzles, each of the nozzles being configured to expel ink in response to a fire signal, such that:

(a) providing a fire signal to nozzles at a first and nth position in each set of nozzles;

(b) providing a fire signal to the next inward pair of nozzles in each set;

(c) in the event n is an even number, repeating step (b) until all of the nozzles in each set has been fired; and (d) in the event n is an odd number, repeating step (b) until all of the nozzles but a central nozzle in each set have been fired, and then firing the central nozzle.

Optionally, the method being used in conjunction with a printer controller for supplying one or more control signals to a printhead module, the printhead module including at least one row that comprises a plurality of adjacent sets of n adjacent nozzles, each of the nozzles being configured to expel ink in response to a fire signal, the method comprising providing, for each set of nozzles, a fire signal in accordance with the sequence: [nozzle position 1, nozzle position n, nozzle position 2, nozzle position (n−1), . . . , nozzle position x], wherein nozzle position x is at or adjacent the center of the set of nozzles.

Optionally, the method being performed in conjunction with a printer controller for supplying dot data to a printhead module comprising at least first and second rows configured to print ink of a similar type or color, at least some nozzles in the first row being aligned with respective corresponding nozzles in the second row in a direction of intended media travel relative to the printhead, the printhead module being configurable such that the nozzles in the first and second pairs of rows are fired such that some dots output to print media are printed to by nozzles from the first pair of rows and at least some other dots output to print media are printed to by nozzles from the second pair of rows, the printer controller being configurable to supply dot data to the printhead module for printing.

Optionally, the method being performed in conjunction with a printer controller for supplying dot data to at least one printhead module, the at least one printhead module comprising a plurality of rows, each of the rows comprising a plurality of nozzles for ejecting ink, wherein the printhead module includes at least first and second rows configured to print ink of a similar type or color, the printer controller being configured to supply the dot data to the at least one printhead module such that, in the event a nozzle in the first row is faulty, a corresponding nozzle in the second row prints an ink dot at a position on print media at or adjacent a position where the faulty nozzle would otherwise have printed it.

Optionally, the method being performed in conjunction with a printer controller for receiving first data and manipulating the first data to produce dot data to be printed, the print controller including at least two serial outputs for supplying the dot data to at least one printhead, wherein each of the serial outputs is configured to supply dot data for at least two channels of the at least one printhead.

Optionally, the method being performed in conjunction with a printhead module including:

at least one row of print nozzles;

at least first and second shift registers for shifting in dot data supplied from a data source, wherein each shift register feeds dot data to a group of nozzles, and wherein each of the groups of the nozzles is interleaved with at least one of the other groups of the nozzles.

Optionally, the method being performed in conjunction with a printhead capable of printing a maximum of n of channels of print data, the printhead being configurable into:

a first mode, in which the printhead is configured to receive print data for a first number of the channels; and a second mode, in which the printhead is configured to receive print data for a second number of the channels, wherein the first number is greater than the second number.

Optionally, the method being performed in conjunction with a printhead comprising a plurality of printhead modules, the printhead being wider than a reticle step used in forming the modules, the printhead comprising at least two types of the modules, wherein each type is determined by its geometric shape in plan.

Optionally, the method being performed in conjunction with a printhead module including at least one row that comprises a plurality of sets of n adjacent nozzles, each of the nozzles being configured to expel ink in response to a fire signal, such that, for each set of nozzles, a fire signal is provided in accordance with the sequence: [nozzle position 1, nozzle position n, nozzle position 2, nozzle position (n−1), . . . , nozzle position x], wherein nozzle position x is at or adjacent the center of the set of nozzles.

Optionally, the method being performed in conjunction with a printhead module including at least one row that comprises a plurality of adjacent sets of n adjacent nozzles, each of the nozzles being configured to expel the ink in response to a fire signal, the printhead being configured to output ink from nozzles at a first and nth position in each set of nozzles, and then each next inward pair of nozzles in each set, until:

in the event n is an even number, all of the nozzles in each set has been fired; and in the event n is an odd number, all of the nozzles but a central nozzle in each set have been fired, and then to fire the central nozzle.

Optionally, the method being performed in conjunction with a printhead module for receiving dot data to be printed using at least two different inks and control data for controlling printing of the dot data, the printhead module including a communication input for receiving the dot data for the at least two colors and the control data.

Optionally, the method being performed in conjunction with a printhead module including at least one row of printhead nozzles, at least one row including at least one displaced row portion, the displacement of the row portion including a component in a direction normal to that of a pagewidth to be printed.

Optionally, the method being performed in conjunction with a printhead module having a plurality of rows of nozzles configured to extend, in use, across at least part of a printable pagewidth, the nozzles in each row being grouped into at least first and second fire groups, the printhead module being configured to sequentially fire, for each row, the nozzles of each fire group, such that each nozzle in the sequence from each fire group is fired simultaneously with respective corresponding nozzles in the sequence in the other fire groups, wherein the nozzles are fired row by row such that the nozzles of each row are all fired before the nozzles of each subsequent row.

Optionally, the method being performed in conjunction with a printhead module comprising at least first and second rows configured to print ink of a similar type or color, at least some nozzles in the first row being aligned with respective corresponding nozzles in the second row in a direction of intended media travel relative to the printhead, the printhead module being configurable such that the nozzles in the first and second pairs of rows are fired such that some dots output to print media are printed to by nozzles from the first pair of rows and at least some other dots output to print media are printed to by nozzles from the second pair of rows.

Optionally, the method being performed in conjunction with a printer controller for providing data to a printhead module that includes:

at least one row of print nozzles;

at least first and second shift registers for shifting in dot data supplied from a data source, wherein each shift register feeds dot data to a group of nozzles, and wherein each of the groups of the nozzles is interleaved with at least one of the other groups of the nozzles.

Optionally, the method being performed in conjunction with a printhead module having a plurality of nozzles for expelling ink, the printhead module including a plurality of thermal sensors, each of the thermal sensors being configured to respond to a temperature at or adjacent at least one of the nozzles, the printhead module being configured to modify operation of the nozzles in response to the temperature rising above a first threshold.

Optionally, the method being performed in conjunction with a printhead module comprising a plurality of rows, each of the rows comprising a plurality of nozzles for ejecting ink, wherein the printhead module includes at least first and second rows configured to print ink of a similar type or color, and being configured such that, in the event a nozzle in the first row is faulty, a corresponding nozzle in the second row prints an ink dot at a position on print media at or adjacent a position where the faulty nozzle would otherwise have printed it.

BRIEF DESCRIPTION OF THE DRAWINGS

FIG. 16. Possible USB Topologies for Multi-SoPEC systems

DETAILED DESCRIPTION OF PREFERRED EMBODIMENT

Figure 1:
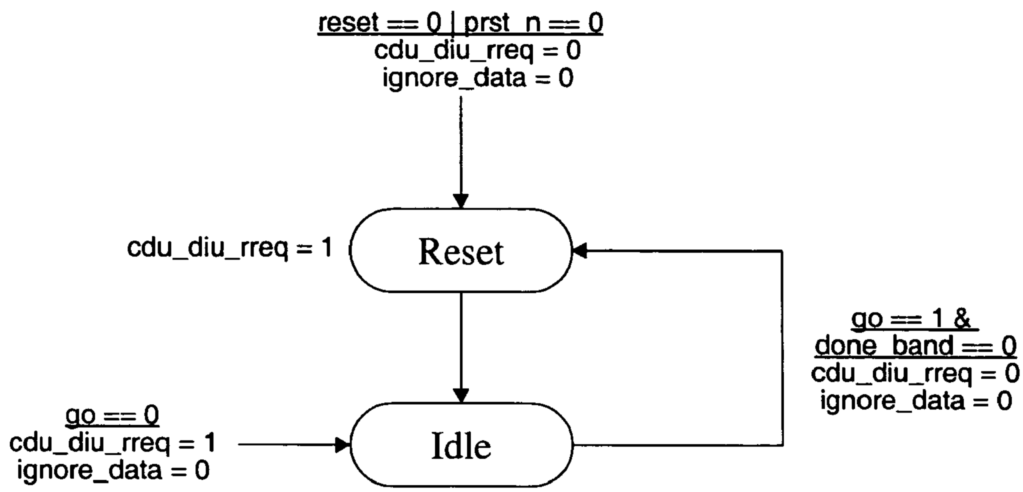
FIG. 1. Example State machine notation

Various aspects of the preferred and other embodiments will now be described.

It will be appreciated that the following description is a highly detailed exposition of the hardware and associated methods that together provide a printing system capable of relatively high resolution, high speed and low cost printing compared to prior art systems.

Much of this description is based on technical design documents, so the use of words like "must", "should" and "will", and all others that suggest limitations or positive attributes of the performance of a particular product, should not be interpreted as applying to the invention in general. These comments, unless clearly referring to the invention in general, should be considered as desirable or intended features in a particular design rather than a requirement of the invention. The intended scope of the invention is defined in the claims.

Also throughout this description, "printhead module" and "printhead" are used somewhat interchangeably. Technically, a "printhead" comprises one or more "printhead modules", but occasionally the former is used to refer to the latter. It should be clear from the context which meaning should be allocated to any use of the word "printhead".

Print System Overview

1 Introduction

This document describes the SoPEC ASIC (Small office home office Print Engine Controller) suitable for use in price sensitive SoHo printer products. The SoPEC ASIC is intended to be a relatively low cost solution for linking printhead control, replacing the multichip solutions in larger more professional systems with a single chip. The increased cost competitiveness is achieved by integrating several systems such as a modified PEC1 printing pipeline, CPU control system, peripherals and memory sub-system onto one SoC ASIC, reducing component count and simplifying board design. SoPEC contains features making it suitable for multifunction or "all-in-one" devices as well as dedicated printing systems.

This section will give a general introduction to Memjet printing systems, introduce the components that make a linking printhead system, describe a number of system architectures and show how several SoPECs can be used to achieve faster, wider and/or duplex printing. The section "SoPEC ASIC" describes the SoC SoPEC ASIC, with subsections describing the CPU, DRAM and Print Engine Pipeline subsystems. Each section gives a detailed description of the blocks used and their operation within the overall print system.

Basic features of the preferred embodiment of SoPEC include:

- Continuous 30 ppm operation for 1600 dpi output at A4/Letter.
- Linearly scalable (multiple SoPECs) for increased print speed and/or page width.
- 192 MHz internal system clock derived from low-speed crystal input
- PEP processing pipeline, supports up to 6 color channels at 1 dot per channel per clock cycle
- Hardware color plane decompression, tag rendering, halftoning and compositing
- Data formatting for Linking Printhead
- Flexible compensation for dead nozzles, printhead misalignment etc.
- Integrated 20 Mbit (2.5 MByte) DRAM for print data and CPU program store
- LEON SPARC v8 32-bit RISC CPU
- Supervisor and user modes to support multi-threaded software and security
- 1 kB each of I-cache and D-cache, both direct mapped, with optimized 256-bit fast cache update.
- 1×USB2.0 device port and 3×USB2.0 host ports (including integrated PHYs)
- Support high speed (480 Mbit/sec) and full speed (12 Mbit/sec) modes of USB2.0
- Provide interface to host PC, other SoPECs, and external devices e.g. digital camera
- Enable alternative host PC interfaces e.g. via external USB/ethernet bridge
- Glueless high-speed serial LVDS interface to multiple Linking Printhead chips
- 64 remappable GPIOs, selectable between combinations of integrated system control components:
- 2×LSS interfaces for QA chip or serial EEPROM
- LED drivers, sensor inputs, switch control outputs
- Motor controllers for stepper and brushless DC motors

- Microprogrammed multi-protocol media interface for scanner, external RAM/Flash, etc.
- 112-bit unique ID plus 112-bit random number on each device, combined for security protocol support
- IBM Cu-11 0.13 micron CMOS process, 1.5V core supply, 3.3V IO.
- 208 pin Plastic Quad Flat Pack

2 Nomenclature

Definitions

The following terms are used throughout this specification:

| | |
|---|---|
| CPU | Refers to CPU core, caching system and MMU. |
| Host | A PC providing control and print data to a Memjet printer. |
| ISCMaster | In a multi-SoPEC system, the ISCMaster (Inter SoPEC Communication Master) is the SoPEC device that initiates communication with other SoPECs in the system. The ISCMaster interfaces with the host. |
| ISCSlave | In a multi-SoPEC system, an ISCSlave is a SoPEC device that responds to communication initiated by the ISCMaster. |
| LEON | Refers to the LEON CPU core. |
| LineSyncMaster | The LineSyncMaster device generates the line synchronisation pulse that all SoPECs in the system must synchronise their line outputs to. |
| Linking Printhead | Refers to a page-width printhead constructed from multiple linking printhead ICs |
| Linking Printhead IC | A MEMS IC. Multiple ICs link together to form a complete printhead. An A4/Letter page width printhead requires 11 printhead ICs. |
| Multi-SoPEC | Refers to SoPEC based print system with multiple SoPEC devices |
| Netpage | Refers to page printed with tags (normally in infrared ink). |
| PEC1 | Refers to Print Engine Controller version 1, precursor to SoPEC used to control printheads constructed from multiple angled printhead segments. |
| PrintMaster | The PrintMaster device is responsible for coordinating all aspects of the print operation. There may only be one PrintMaster in a system. |
| QA Chip | Quality Assurance Chip |
| Storage SoPEC | A SoPEC used as a DRAM store and which does not print. |
| Tag | Refers to pattern which encodes information about its position and orientation which allow it to be optically located and its data contents read. |

Acronym and Abbreviations

The following acronyms and abbreviations are used in this specification

| | |
|---|---|
| CFU | Contone FIFO53 Unit |
| CPU | Central Processing Unit |
| DIU | DRAM Interface Unit |
| DNC | Dead Nozzle Compensator |
| DRAM | Dynamic Random Access Memory |
| DWU | DotLine Writer Unit |
| GPIO | General Purpose Input Output |
| HCU | Halftoner Compositor Unit |
| ICU | Interrupt Controller Unit |
| LDB | Lossless Bi-level Decoder |
| LLU | Line Loader Unit |
| LSS | Low Speed Serial interface |
| MEMS | Micro Electro Mechanical System |
| MMI | Multiple Media Interface |
| MMU | Memory Management Unit |
| PCU | SoPEC Controller Unit |

-continued

| | |
|---|---|
| PHI | PrintHead Interface |
| PHY | USB multi-port Physical Interface |
| PSS | Power Save Storage Unit |
| RDU | Real-time Debug Unit |
| ROM | Read Only Memory |
| SFU | Spot FIFO Unit |
| SMG4 | Silverbrook Modified Group 4. |
| SoPEC | Small office home office Print Engine Controller |
| SRAM | Static Random Access Memory |
| TE | Tag Encoder |
| TFU | Tag FIFO Unit |
| TIM | Timers Unit |
| UDU | USB Device Unit |
| UHU | USB Host Unit |
| USB | Universal Serial Bus |

Pseudocode Notation

In general the pseudocode examples use C like statements with some exceptions.

Symbol and naming convections used for pseudocode.

| | |
|---|---|
| // | Comment |
| = | Assignment |
| ==, !=, <, > | Operator equal, not equal, less than, greater than |
| +, −, *, /, %, | Operator addition, subtraction, multiply, divide, modulus |
| &, \|, ^, <<, >>, ~ | Bitwise AND, bitwise OR, bitwise exclusive OR, left shift, right shift, complement |
| AND, OR, NOT | Logical AND, Logical OR, Logical inversion |
| [XX:YY] | Array/vector specifier |
| {a, b, c} | Concatenation operation |
| ++, −− | Increment and decrement |

3 Register and Signal Naming Conventions

In general register naming uses the C style conventions with capitalization to denote word delimiters. Signals use RTL style notation where underscore denote word delimiters. There is a direct translation between both conventions. For example the CmdSourceFifo register is equivalent to cmd_source_fifo signal.

4 State Machine Notation

State machines are described using the pseudocode notation outlined above. State machine descriptions use the convention of underline to indicate the cause of a transition from one state to another and plain text (no underline) to indicate the effect of the transition i.e. signal transitions which occur when the new state is entered. A sample state machine is shown in FIG. 1.

5 Print Quality Considerations

The preferred embodiment linking printhead produces 1600 dpi bi-level dots. On low-diffusion paper, each ejected drop forms a 22.5 μm diameter dot. Dots are easily produced in isolation, allowing dispersed-dot dithering to be exploited to its fullest. Since the preferred form of the linking printhead is pagewidth and operates with a constant paper velocity, color planes are printed in good registration, allowing dot-on-dot printing. Dot-on-dot printing minimizes 'muddying' of midtones caused by inter-color bleed.

A page layout may contain a mixture of images, graphics and text. Continuous-tone (contone) images and graphics are reproduced using a stochastic dispersed-dot dither. Unlike a clustered-dot (or amplitude-modulated) dither, a dispersed-dot (or frequency-modulated) dither reproduces high spatial frequencies (i.e. image detail) almost to the limits of the dot resolution, while simultaneously reproducing lower spatial frequencies to their full color depth, when spatially integrated by the eye. A stochastic dither matrix is carefully designed to be free of objectionable low-frequency patterns when tiled across the image. As such its size typically exceeds the minimum size required to support a particular number of intensity levels (e.g. 16×16×8 bits for 257 intensity levels).

Human contrast sensitivity peaks at a spatial frequency of about 3 cycles per degree of visual field and then falls off logarithmically, decreasing by a factor of 100 beyond about 40 cycles per degree and becoming immeasurable beyond 60 cycles per degree. At a normal viewing distance of 12 inches (about 300 mm), this translates roughly to 200-300 cycles per inch (cpi) on the printed page, or 400-600 samples per inch according to Nyquist's theorem.

In practice, contone resolution above about 300 ppi is of limited utility outside special applications such as medical imaging. Offset printing of magazines, for example, uses contone resolutions in the range 150 to 300 ppi. Higher resolutions contribute slightly to color error through the dither.

Black text and graphics are reproduced directly using bi-level black dots, and are therefore not anti-aliased (i.e. low-pass filtered) before being printed. Text should therefore be supersampled beyond the perceptual limits discussed above, to produce smoother edges when spatially integrated by the eye. Text resolution up to about 1200 dpi continues to contribute to perceived text sharpness (assuming low-diffusion paper).

A Netpage printer, for example, may use a contone resolution of 267 ppi (i.e. 1600 dpi/6), and a black text and graphics resolution of 800 dpi. A high end office or departmental printer may use a contone resolution of 320 ppi (1600 dpi/5) and a black text and graphics resolution of 1600 dpi. Both formats are capable of exceeding the quality of commercial (offset) printing and photographic reproduction.

6 Memjet Printer Architecture

The SoPEC device can be used in several printer configurations and architectures.

In the general sense, every preferred embodiment SoPEC-based printer architecture will contain:

- One or more SoPEC devices.
- One or more linking printheads.
- Two or more LSS busses.
- Two or more QA chips.
- Connection to host, directly via USB2.0 or indirectly.
- Connections between SoPECs (when multiple SoPECs are used).

Some example printer configurations as outlined in Section 6.2. The various system components are outlined briefly in Section 6.1.

6.1 System Components

6.1.1 SoPEC Print Engine Controller

The SoPEC device contains several system on a chip (SoC) components, as well as the print engine pipeline control application specific logic.

6.1.1.1 Print Engine Pipeline (PEP) Logic

The PEP reads compressed page store data from the embedded memory, optionally decompresses the data and formats it for sending to the printhead. The print engine pipeline functionality includes expanding the page image, dithering the contone layer, compositing the black layer over the contone layer, rendering of Netpage tags, compensation for dead nozzles in the printhead, and sending the resultant image to the linking printhead.

6.1.1.2 Embedded CPU

SoPEC contains an embedded CPU for general-purpose system configuration and management. The CPU performs page and band header processing, motor control and sensor monitoring (via the GPIO) and other system control functions. The CPU can perform buffer management or report buffer status to the host. The CPU can optionally run vendor application specific code for general print control such as paper ready monitoring and LED status update.

6.1.1.3 Embedded Memory Buffer

A 2.5 Mbyte embedded memory buffer is integrated onto the SoPEC device, of which approximately 2 Mbytes are available for compressed page store data. A compressed page is divided into one or more bands, with a number of bands stored in memory. As a band of the page is consumed by the PEP for printing a new band can be downloaded. The new band may be for the current page or the next page.

Using banding it is possible to begin printing a page before the complete compressed page is downloaded, but care must be taken to ensure that data is always available for printing or a buffer underrun may occur.

A Storage SoPEC acting as a memory buffer (Section 6.2.6) could be used to provide guaranteed data delivery.

6.1.1.4 Embedded USB2.0 Device Controller

The embedded single-port USB2.0 device controller can be used either for interface to the host PC, or for communication with another SoPEC as an ISCSlave. It accepts compressed page data and control commands from the host PC or ISCMaster SoPEC, and transfers the data to the embedded memory for printing or downstream distribution.

6.1.1.5 Embedded USB2.0 Host Controller

The embedded three-port USB2.0 host controller enables communication with other SoPEC devices as a ISCMaster, as well as interfacing with external chips (e.g. for Ethernet connection) and external USB devices, such as digital cameras.

6.1.1.6 Embedded Device/Motor Controllers

SoPEC contains embedded controllers for a variety of printer system components such as motors, LEDs etc, which are controlled via SoPEC's GPIOs. This minimizes the need for circuits external to SoPEC to build a complete printer system.

6.1.2 Linking Printhead

The printhead is constructed by abutting a number of printhead ICs together. Each SoPEC can drive up to 12 printhead ICs at data rates up to 30 ppm or 6 printhead ICs at data rates up to 60 ppm. For higher data rates, or wider printheads, multiple SoPECs must be used.

6.1.3 LSS Interface Bus

Each SoPEC device has 2 LSS system buses for communication with QA devices for system authentication and ink usage accounting. The number of QA devices per bus and their position in the system is unrestricted with the exception that PRINTER_QA and INK_QA devices should be on separate LSS busses.

6.1.4 QA Devices

Each SoPEC system can have several QA devices. Normally each printing SoPEC will have an associated PRINTER_QA. Ink cartridges will contain an INK_QA chip. PRINTER_QA and INK_QA devices should be on separate LSS busses. All QA chips in the system are physically identical with flash memory contents defining PRINTER_QA from INK_QA chip.

6.1.5 Connections Between SoPECs

In a multi-SoPEC system, the primary communication channel is from a USB2.0 Host port on one SoPEC (the ISCMaster), to the USB2.0 Device port of each of the other SoPECs (ISCSlaves). If there are more ISCSlave SoPECs than available USB Host ports on the ISCMaster, additional connections could be via a USB Hub chip, or daisy-chained SoPEC chips. Typically one or more of SoPEC's GPIO signals would also be used to communicate specific events between multiple SoPECs.

6.1.6 Non-USB Host PC Communication

The communication between the host PC and the ISCMaster SoPEC may involve an external chip or subsystem, to provide a non-USB host interface, such as ethernet or WiFi. This subsystem may also contain memory to provide an additional buffered band/page store, which could provide guaranteed bandwidth data deliver to SoPEC during complex page prints.

6.2 Possible SoPEC Systems

Several possible SoPEC based system architectures exist. The following sections outline some possible architectures. It is possible to have extra SoPEC devices in the system used for DRAM storage. The QA chip configurations shown are indicative of the flexibility of LSS bus architecture, but not limited to those configurations.

6.2.1 A4 Simplex at 30 ppm with 1 SoPEC Device

Figure 2:
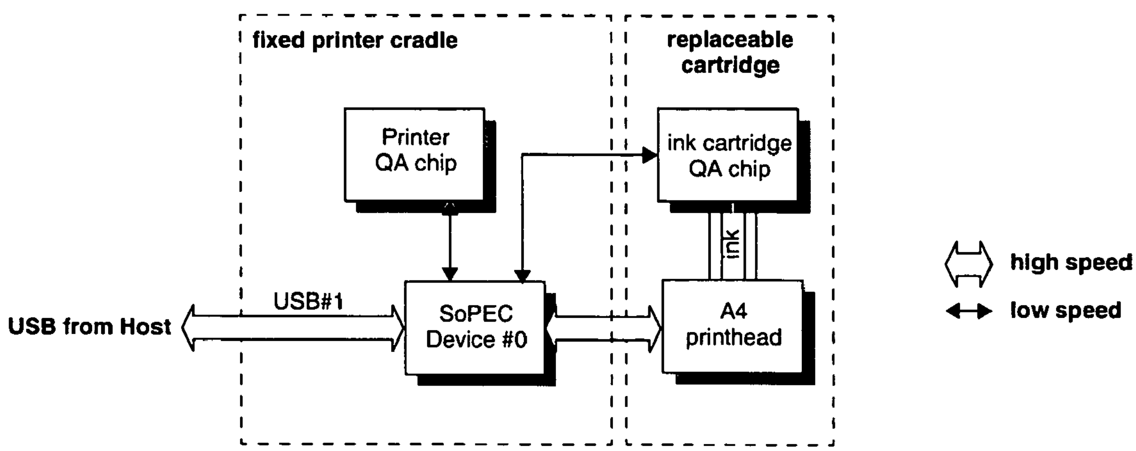
FIG. 2. Single SoPEC A4 Simplex system

In FIG. 2, a single SoPEC device is used to control a linking printhead with 11 printhead ICs. The SoPEC receives compressed data from the host through its USB device port. The compressed data is processed and transferred to the printhead. This arrangement is limited to a speed of 30 ppm. The single SoPEC also controls all printer components such as motors, LEDs, buttons etc, either directly or indirectly.

6.2.2 A4 Simplex at 60 ppm with 2 SoPEC Devices

Figure 3:
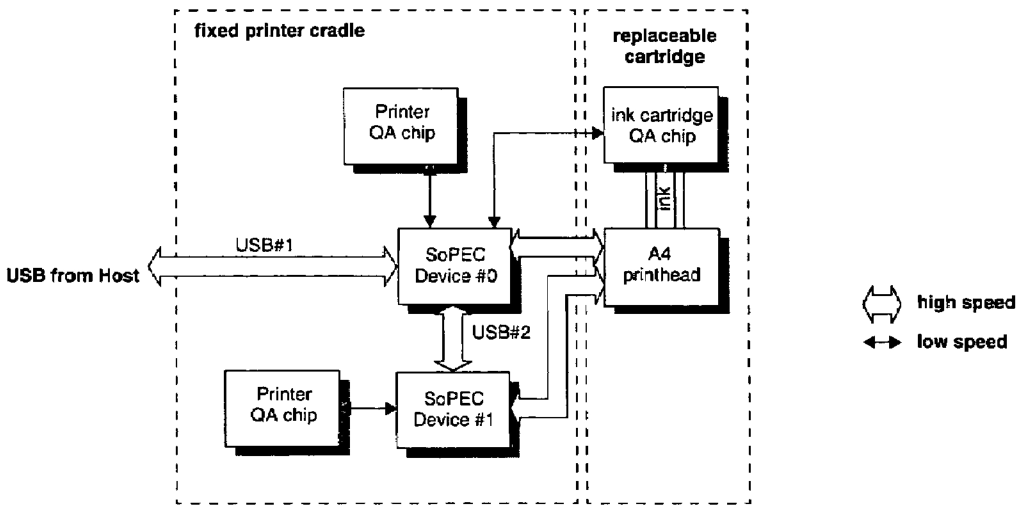
FIG. 3. Dual SoPEC A4 Simplex system

In FIG. 3, two SoPECs control a single linking printhead, to provide 60 ppm A4 printing. Each SoPEC drives 5 or 6 of the printheads ICs that make up the complete printhead. SoPEC #0 is the ISCMaster, SoPEC #1 is an ISCSlave. The ISCMaster receives all the compressed page data for both SoPECs and re-distributes the compressed data for the ISCSlave over a local USB bus. There is a total of 4 MBytes of page store memory available if required. Note that, if each page has 2 MBytes of compressed data, the USB2.0 interface to the host needs to run in high speed (not full speed) mode to sustain 60 ppm printing. (In practice, many compressed pages will be much smaller than 2 MBytes). The control of printer components such as motors, LEDs, buttons etc, is shared between the 2 SoPECs in this configuration.

6.2.3 A4 Duplex with 2 SoPEC Devices

Figure 4:
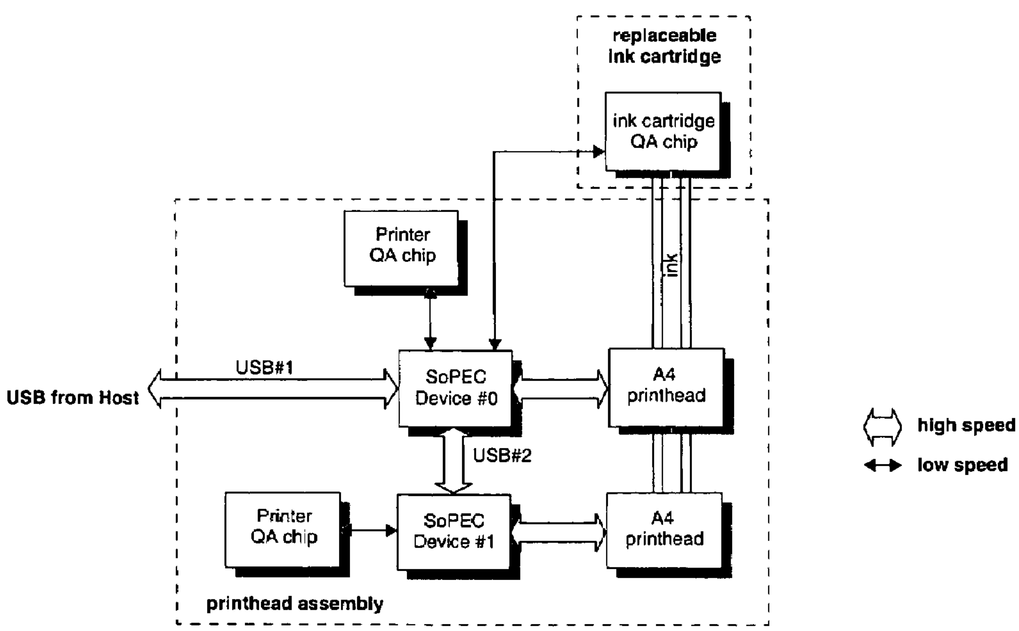
FIG. 4. Dual SoPEC A4 Duplex system

In FIG. 4, two SoPEC devices are used to control two printheads. Each printhead prints to opposite sides of the same page to achieve duplex printing. SoPEC #0 is the ISCMaster, SoPEC #1 is an ISCSlave. The ISCMaster receives all the compressed page data for both SoPECs and re-distributes the compressed data for the ISCSlave over a local USB bus. This configuration could print 30 double-sided pages per minute.

6.2.4 A3 Simplex with 2 SoPEC Devices

Figure 5:
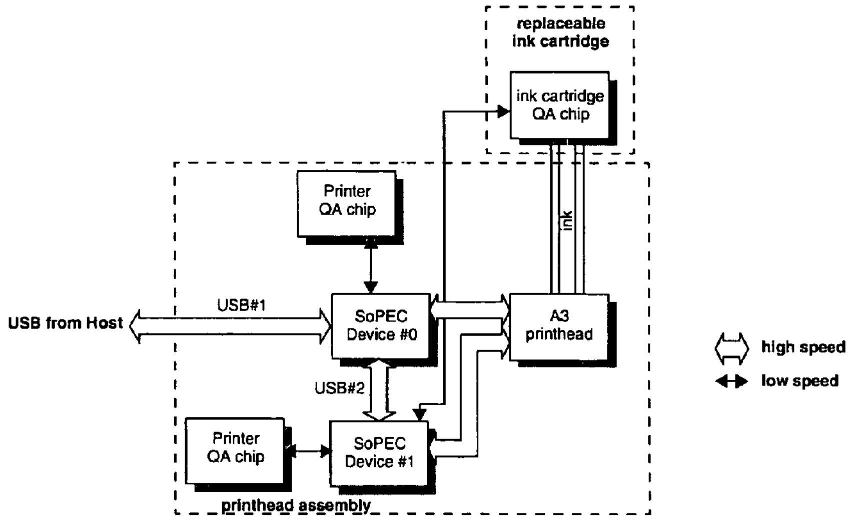
FIG. 5. Dual SoPEC A3 simplex system

In FIG. 5, two SoPEC devices are used to control one A3 linking printhead, constructed from 16 printhead ICs. Each SoPEC controls 8 printhead ICs. This system operates in a similar manner to the 60 ppm A4 system in FIG. 3, although the speed is limited to 30 ppm at A3, since each SoPEC can only drive 6 printhead ICs at 60 ppm speeds. A total of 4 Mbyte of page store is available, this allows the system to use compression rates as in a single SoPEC A4 architecture, but with the increased page size of A3.

Figure 6:
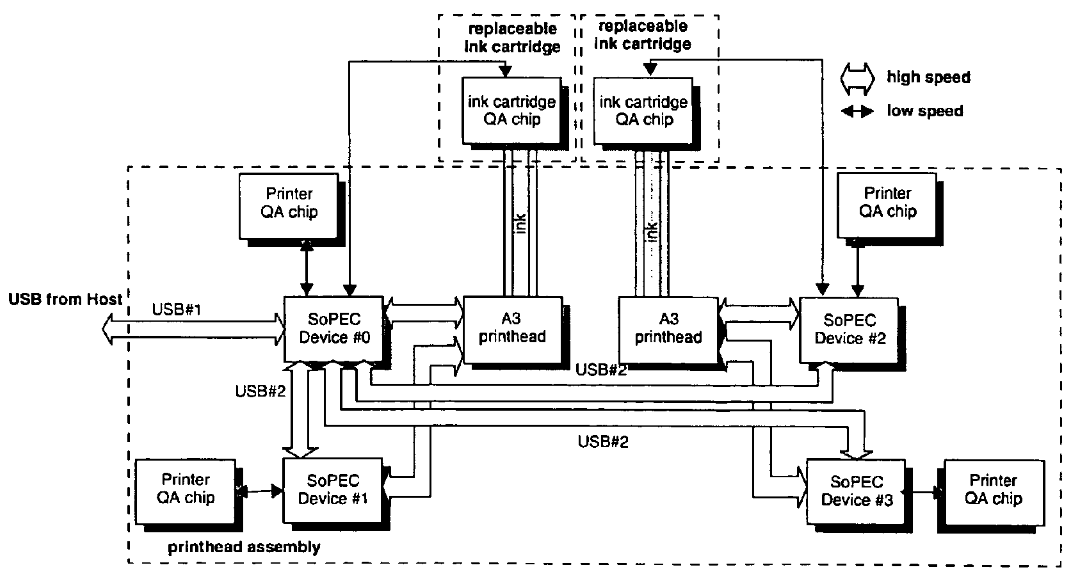
FIG. 6. Quad SoPEC A3 duplex system

6.2.5 A3 Duplex with 4 SoPEC Devices In FIG. 6 a four SoPEC system is shown. It contains 2 A3 linking printheads, one for each side of an A3 page. Each printhead contain 16 printhead ICs, each SoPEC controls 8 printhead ICs. SoPEC #0 is the ISCMaster with the other SoPECs as ISCSlaves. Note that all 3 USB Host ports on SoPEC #0 are used to communicate with the 3 ISCSlave SoPECs. In total, the system contains 8 Mbytes of compressed page store (2 Mbytes per SoPEC), so the increased page size does not degrade the system print quality, from that of an A4 simplex printer. The ISCMaster receives all the compressed page data for all SoPECs and re-distributes the compressed data over the local USB bus to the ISCSlaves. This configuration could print 30 double-sided A3 sheets per minute.

Figure 7:
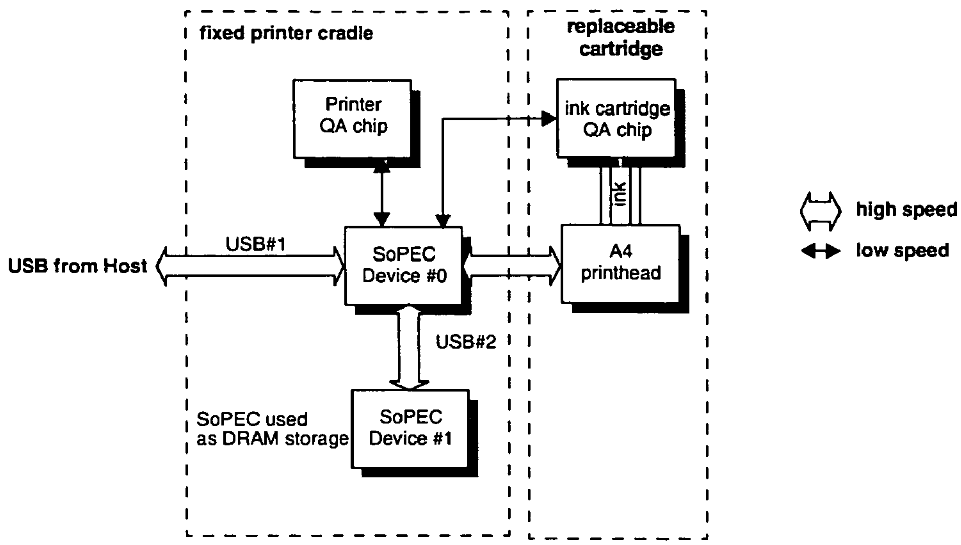
FIG. 7. SoPEC A4 Simplex system with extra SoPEC used as DRAM storage

6.2.6 SoPEC DRAM Storage Solution: A4 Simplex with 1 Printing SoPEC and 1 Memory SoPEC Extra SoPECs can be used for DRAM storage e.g. in FIG. 7 an A4 simplex printer can be built with a single extra SoPEC used for DRAM storage. The DRAM SoPEC can provide guaranteed bandwidth delivery of data to the printing SoPEC. SoPEC configurations can have multiple extra SoPECs used for DRAM storage.

6.2.7 Non-USB Connection to Host PC

Figure 8:
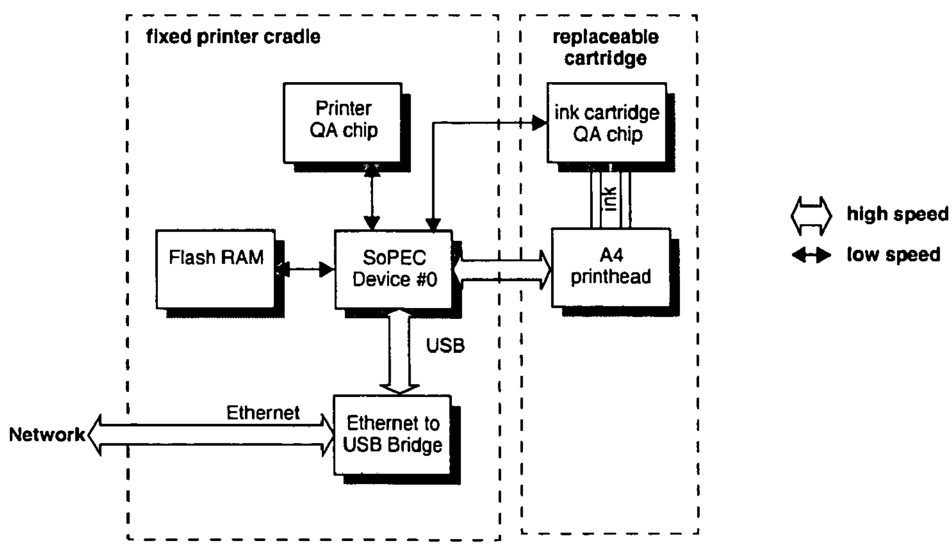
FIG. 8. SoPEC A4 Simplex system with network connection to Host PC

FIG. 8 shows a configuration in which the connection from the host PC to the printer is an ethernet network, rather than USB. In this case, one of the USB Host ports on SoPEC interfaces to a external device that provide ethernet-to-USB bridging. Note that some networking software support in the bridging device might be required in this configuration. A Flash RAM will be required in such a system, to provide SoPEC with driver software for the Ethernet bridging function.

7 Document Data Flow 7.1 Overall Flow for PC-Based Printing

Because of the page-width nature of the linking printhead, each page must be printed at a constant speed to avoid creating visible artifacts. This means that the printing speed can't be varied to match the input data rate. Document rasterization and document printing are therefore decoupled to ensure the printhead has a constant supply of data. A page is never printed until it is fully rasterized. This can be achieved by storing a compressed version of each rasterized page image in memory.

This decoupling also allows the RIP(s) to run ahead of the printer when rasterizing simple pages, buying time to rasterize more complex pages.

Because contone color images are reproduced by stochastic dithering, but black text and line graphics are reproduced directly using dots, the compressed page image format contains a separate foreground bi-level black layer and background contone color layer. The black layer is composited over the contone layer after the contone layer is dithered (although the contone layer has an optional black component). A final layer of Netpage tags (in infrared, yellow or black ink) is optionally added to the page for printout.

Figure 9:
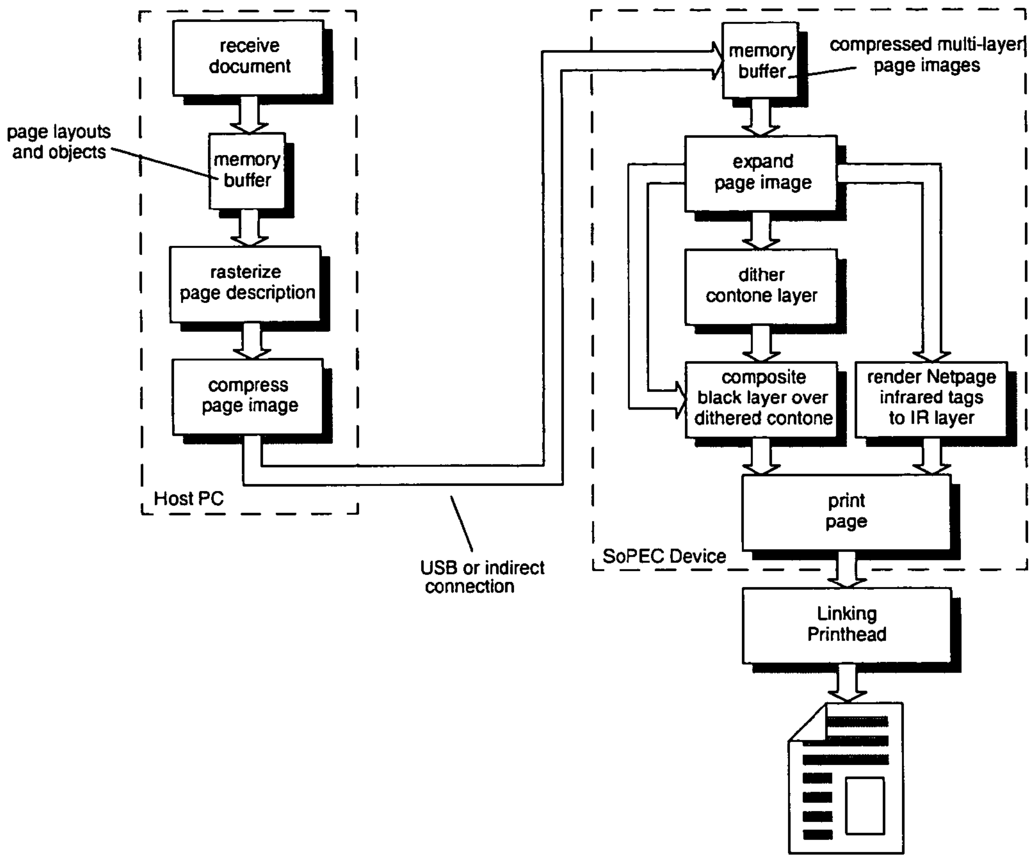
FIG. 9. Document data flow

FIG. 9 shows the flow of a document from computer system to printed page.

7.2 Multi-Layer Compression

At 267 ppi for example, an A4 page (8.26 inches×11.7 inches) of contone CMYK data has a size of 26.3 MB. At 320 ppi, an A4 page of contone data has a size of 37.8 MB. Using lossy contone compression algorithms such as JPEG, contone images compress with a ratio up to 10:1 without noticeable loss of quality, giving compressed page sizes of 2.63 MB at 267 ppi and 3.78 MB at 320 ppi.

At 800 dpi, an A4 page of bi-level data has a size of 7.4 MB. At 1600 dpi, a Letter page of bi-level data has a size of 29.5 MB. Coherent data such as text compresses very well. Using lossless bi-level compression algorithms such as SMG4 fax as discussed in Section 8.1.2.3.1, ten-point plain text compresses with a ratio of about 50:1. Lossless bi-level compression across an average page is about 20:1 with 10:1 possible for pages which compress poorly. The requirement for SoPEC is to be able to print text at 10:1 compression. Assuming 10:1 compression gives compressed page sizes of 0.74 MB at 800 dpi, and 2.95 MB at 1600 dpi.

Once dithered, a page of CMYK contone image data consists of 116 MB of bi-level data. Using lossless bi-level compression algorithms on this data is pointless precisely because the optimal dither is stochastic—i.e. since it introduces hard-to-compress disorder.

Netpage tag data is optionally supplied with the page image. Rather than storing a compressed bi-level data layer for the Netpage tags, the tag data is stored in its raw form. Each tag is supplied up to 120 bits of raw variable data (combined with up to 56 bits of raw fixed data) and covers up to a 6 mm×6 mm area (at 1600 dpi). The absolute maximum number of tags on a A4 page is 15,540 when the tag is only 2 mm×2 mm (each tag is 126 dots×126 dots, for a total coverage of 148 tags×105 tags). 15,540 tags of 128 bits per tag gives a compressed tag page size of 0.24 MB.

The multi-layer compressed page image format therefore exploits the relative strengths of lossy JPEG contone image compression, lossless bi-level text compression, and tag encoding. The format is compact enough to be storage-efficient, and simple enough to allow straightforward real-time expansion during printing.

Since text and images normally don't overlap, the normal worst-case page image size is image only, while the normal best-case page image size is text only. The addition of worst case Netpage tags adds 0.24 MB to the page image size. The worst-case page image size is text over image plus tags. The average page size assumes a quarter of an average page contains images. Table 1 shows data sizes for a compressed A4 page for these different options.

TABLE 1

Data sizes for A4 page (8.26 inches × 11.7 inches)

| | 267 ppi contone 800 dpi bi-level | 320 ppi contone 1600 dpi bi-level |
|---|---|---|
| Image only (contone), 10:1 compression | 2.63 MB | 3.78 MB |
| Text only (bi-level), 10:1 compression | 0.74 MB | 2.95 MB |
| Netpage tags, 1600 dpi | 0.24 MB | 0.24 MB |

TABLE 1-continued

Data sizes for A4 page (8.26 inches × 11.7 inches)

| | 267 ppi contone 800 dpi bi-level | 320 ppi contone 1600 dpi bi-level |
|---|---|---|
| Worst case (text + image + tags) | 3.61 MB | 6.67 MB |
| Average (text + 25% image + tags) | 1.64 MB | 4.25 MB |

7.3 Document Processing Steps

The Host PC rasterizes and compresses the incoming document on a page by page basis. The page is restructured into bands with one or more bands used to construct a page. The compressed data is then transferred to the SoPEC device directly via a USB link, or via an external bridge e.g. from ethernet to USB. A complete band is stored in SoPEC embedded memory. Once the band transfer is complete the SoPEC device reads the compressed data, expands the band, normalizes contone, bi-level and tag data to 1600 dpi and transfers the resultant calculated dots to the linking printhead.

The document data flow is

The RIP software rasterizes each page description and compress the rasterized page image.

The infrared layer of the printed page optionally contains encoded Netpage tags at a programmable density.

The compressed page image is transferred to the SoPEC device via the USB (or ethernet), normally on a band by band basis.

The print engine takes the compressed page image and starts the page expansion.

The first stage page expansion consists of 3 operations performed in parallel expansion of the JPEG-compressed contone layer expansion of the SMG4 fax compressed bi-level layer encoding and rendering of the bi-level tag data.

The second stage dithers the contone layer using a programmable dither matrix, producing up to four bi-level layers at full-resolution.

The third stage then composites the bi-level tag data layer, the bi-level SMG4 fax de-compressed layer and up to four bi-level JPEG de-compressed layers into the full-resolution page image.

A fixative layer is also generated as required.

The last stage formats and prints the bi-level data through the linking printhead via the printhead interface.

The SoPEC device can print a full resolution page with 6 color planes. Each of the color planes can be generated from compressed data through any channel (either JPEG compressed, bi-level SMG4 fax compressed, tag data generated, or fixative channel created) with a maximum number of 6 data channels from page RIP to linking printhead color planes.

The mapping of data channels to color planes is programmable. This allows for multiple color planes in the printhead to map to the same data channel to provide for redundancy in the printhead to assist dead nozzle compensation.

Also a data channel could be used to gate data from another data channel. For example in stencil mode, data from the bilevel data channel at 1600 dpi can be used to filter the contone data channel at 320 dpi, giving the effect of 1600 dpi edged contone images, such as 1600 dpi color text.

7.4 Page Size and Complexity in SoPEC

The SoPEC device typically stores a complete page of document data on chip. The amount of storage available for compressed pages is limited to 2 Mbytes, imposing a fixed maximum on compressed page size. A comparison of the compressed image sizes in Table 1 indicates that SoPEC would not be capable of printing worst case pages unless they are split into bands and printing commences before all the bands for the page have been downloaded. The page sizes in the table are shown for comparison purposes and would be considered reasonable for a professional level printing system. The SoPEC device is aimed at the consumer level and would not be required to print pages of that complexity. Target document types for the SoPEC device are shown Table 2.

TABLE 2

Page content targets for SoPEC

| Page Content Description | Calculation | Size (MByte) |
|---|---|---|
| Best Case picture Image, 267 ppi with 3 colors, A4 size | 8.26 × 11.7 × 267 × 267 × 3 @ 10:1 | 1.97 |
| Full page text, 800 dpi A4 size | 8.26 × 11.7 × 800 × 800 @ 10:1 | 0.74 |
| Mixed Graphics and Text | | |
| Image of 6 inches × 4 inches @ 267 ppi and 3 colors | 6 × 4 × 267 × 267 × 3 @ 5:1 | 1.55 |
| Remaining area text ~73 inches$^2$, 800 dpi | 800 × 800 × 73 @ 10:1 | |
| Best Case Photo, 3 Colors, 6.6 MegaPixel Image | 6.6 Mpixel @ 10:1 | 2.00 |

If a document with more complex pages is required, the page RIP software in the host PC can determine that there is insufficient memory storage in the SoPEC for that document. In such cases the RIP software can take two courses of action:

- It can increase the compression ratio until the compressed page size will fit in the SoPEC device, at the expense of print quality, or
- It can divide the page into bands and allow SoPEC to begin printing a page band before all bands for that page are downloaded.

Once SoPEC starts printing a page it cannot stop; if SoPEC consumes compressed data faster than the bands can be downloaded a buffer underrun error could occur causing the print to fail. A buffer underrun occurs if a line synchronisation pulse is received before a line of data has been transferred to the printhead.

Other options which can be considered if the page does not fit completely into the compressed page store are to slow the printing or to use multiple SoPECs to print parts of the page. Alternatively, a number of methods are available to provide additional local page data storage with guaranteed bandwidth to SoPEC, for example a Storage SoPEC (Section 6.2.6).

7.5 Other Printing Sources

The preceding sections have described the document flow for printing from a host PC in which the RIP on the host PC does much of the management work for SoPEC. SoPEC also supports printing of images directly from other sources, such as a digital camera or scanner, without the intervention of a host PC.

In such cases, SoPEC receives image data (and associated metadata) into its DRAM via a USB host or other local media interface. Software running on SoPEC's CPU determines the image format (e.g. compressed or non-compressed, RGB or CMY, etc.), and optionally applies image processing algorithms such as color space conversion. The CPU then makes the data to be printed available to the PEP pipeline. SoPEC allows various PEP pipeline stages to be bypassed, for example JPEG decompression. Depending on the format of the data to be printed, PEP hardware modules interact directly with the CPU to manage DRAM buffers, to allow streaming of data from an image source (e.g. scanner) to the printhead interface without overflowing the limited on-chip DRAM.

8 Page Format

Figure 10:
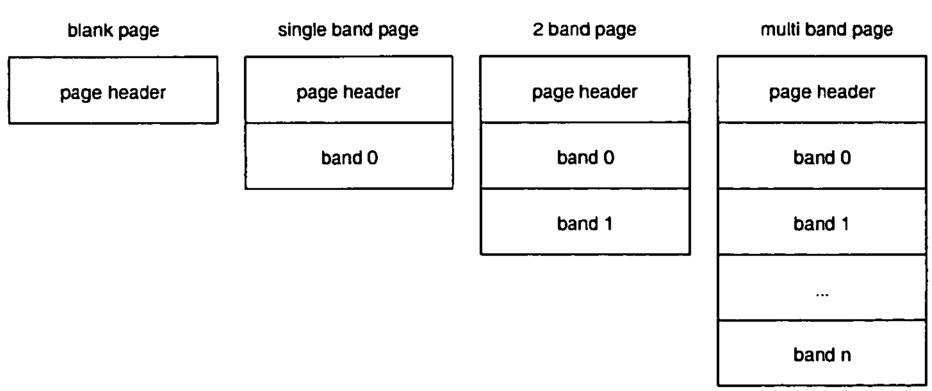
FIG. 10. Pages containing different numbers of bands

When rendering a page, the RIP produces a page header and a number of bands (a non-blank page requires at least one band) for a page. The page header contains high level rendering parameters, and each band contains compressed page data. The size of the band will depend on the memory available to the RIP, the speed of the RIP, and the amount of memory remaining in SoPEC while printing the previous band(s). FIG. 10 shows the high level data structure of a number of pages with different numbers of bands in the page.

Figure 11:
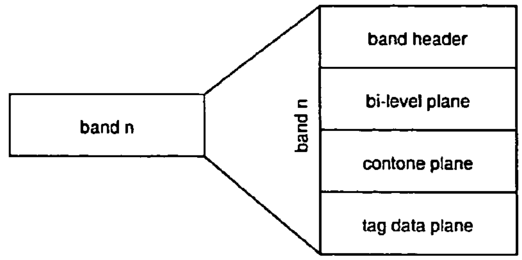
FIG. 11. Contents of a page band

Each compressed band contains a mandatory band header, an optional bi-level plane, optional sets of interleaved contone planes, and an optional tag data plane (for Netpage enabled applications). Since each of these planes is optional, the band header specifies which planes are included with the band. FIG. 11 gives a high-level breakdown of the contents of a page band.

A single SoPEC has maximum rendering restrictions as follows:

- 1 bi-level plane
- 1 contone interleaved plane set containing a maximum of 4 contone planes
- 1 tag data plane
- a linking printhead with a maximum of 12 printhead ICs The requirement for single-sided A4 single SoPEC printing at 30 ppm is

- average contone JPEG compression ratio of 10:1, with a local minimum compression ratio of 5:1 for a single line of interleaved JPEG blocks.
- average bi-level compression ratio of 10:1, with a local minimum compression ratio of 1:1 for a single line.

If the page contains rendering parameters that exceed these specifications, then the RIP or the Host PC must split the page into a format that can be handled by a single SoPEC.

In the general case, the SoPEC CPU must analyze the page and band headers and generate an appropriate set of register write commands to configure the units in SoPEC for that page. The various bands are passed to the destination SoPEC(s) to locations in DRAM determined by the host.

Figure 12:
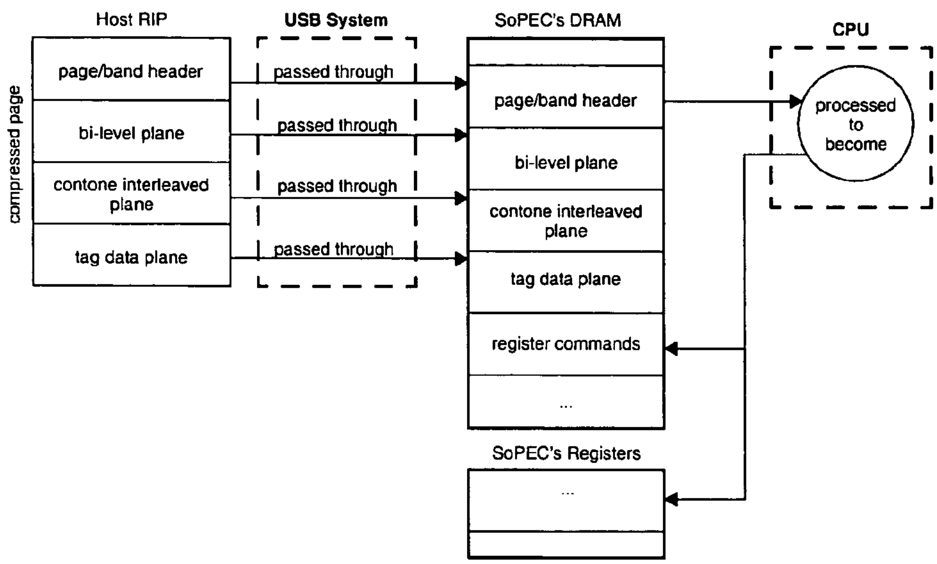
FIG. 12. Page data path from host to SoPEC
Figure 13:
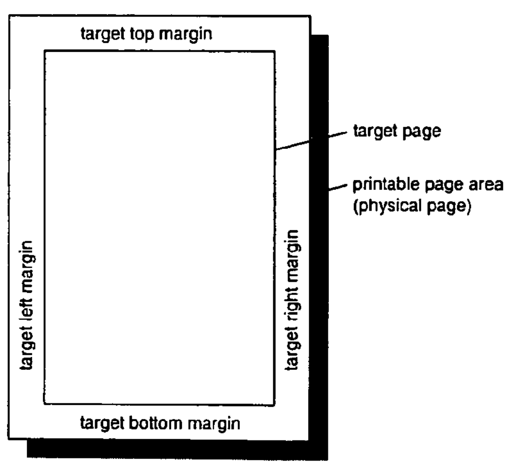
FIG. 13. Page structure

The host keeps a memory map for the DRAM, and ensures that as a band is passed to a SoPEC, it is stored in a suitable free area in DRAM. Each SoPEC receives its band data via its USB device interface. Band usage information from the individual SoPECs is passed back to the host. FIG. 12 shows an example data flow for a page destined to be printed by a single SoPEC.

SoPEC has an addressing mechanism that permits circular band memory allocation, thus facilitating easy memory management. However it is not strictly necessary that all bands be stored together. As long as the appropriate registers in SoPEC are set up for each band, and a given band is contiguous, the memory can be allocated in any way.

8.1 Print Engine Example Page Format

Note: This example is illustrative of the types of data a compressed page format may need to contain. The actual implementation details of page formats are a matter for software design (including embedded software on the SoPEC CPU); the SoPEC hardware does not assume any particular format.

This section describes a possible format of compressed pages expected by the embedded CPU in SoPEC. The format is generated by software in the host PC and interpreted by embedded software in SoPEC. This section indicates the type of information in a page format structure, but implementations need not be limited to this format. The host PC can optionally perform the majority of the header processing.

The compressed format and the print engines are designed to allow real-time page expansion during printing, to ensure that printing is never interrupted in the middle of a page due to data underrun.

The page format described here is for a single black bi-level layer, a contone layer, and a Netpage tag layer. The black bi-level layer is defined to composite over the contone layer.

The black bi-level layer consists of a bitmap containing a 1-bit opacity for each pixel. This black layer matte has a resolution which is an integer or non-integer factor of the printer's dot resolution. The highest supported resolution is 1600 dpi, i.e. the printer's full dot resolution.

The contone layer, optionally passed in as YCrCb, consists of a 24-bit CMY or 32-bit CMYK color for each pixel. This contone image has a resolution which is an integer or non-integer factor of the printer's dot resolution. The requirement for a single SoPEC is to support 1 side per 2 seconds A4/Letter printing at a resolution of 267 ppi, i.e. one-sixth the printer's dot resolution.

Non-integer scaling can be performed on both the contone and bi-level images. Only integer scaling can be performed on the tag data.

The black bi-level layer and the contone layer are both in compressed form for efficient storage in the printer's internal memory.

8.1.1 Page Structure

A single SoPEC is able to print with full edge bleed for A4/Letter paper using the linking printhead. It imposes no margins and so has a printable page area which corresponds to the size of its paper. The target page size is constrained by the printable page area, less the explicit (target) left and top margins specified in the page description. These relationships are illustrated below.

8.1.2 Compressed Page Format

Apart from being implicitly defined in relation to the printable page area, each page description is complete and self-contained. There is no data stored separately from the page description to which the page description refers. The page description consists of a page header which describes the size and resolution of the page, followed by one or more page bands which describe the actual page content.

8.1.2.1 Page Header

Table 3 shows an example format of a page header.

TABLE 3

Page header format

| Field | Format | description |
|---|---|---|
| Signature | 16-bit integer | Page header format signature. |
| Version | 16-bit integer | Page header format version number. |
| structure size | 16-bit integer | Size of page header. |
| band count | 16-bit integer | Number of bands specified for this page. |
| target resolution (dpi) | 16-bit integer | Resolution of target page. This is always 1600 for the Memjet printer. |
| target page width | 16-bit integer | Width of target page, in dots. |
| target page height | 32-bit integer | Height of target page, in dots. |
| target left margin for black and contone | 16-bit integer | Width of target left margin, in dots, for black and contone. |
| target top margin for black and contone | 16-bit integer | Height of target top margin, in dots, for black and contone. |
| target right margin for black and contone | 16-bit integer | Width of target right margin, in dots, for black and contone. |
| target bottom margin for black and contone | 16-bit integer | Height of target bottom margin, in dots, for black and contone. |
| target left margin for tags | 16-bit integer | Width of target left margin, in dots, for tags. |
| target top margin for tags | 16-bit integer | Height of target top margin, in dots, for tags. |
| target right margin for tags | 16-bit integer | Width of target right margin, in dots, for tags. |
| target bottom margin for tags | 16-bit integer | Height of target bottom margin, in dots, for tags. |
| generate tags | 16-bit integer | Specifies whether to generate tags for this page (0 - no, 1 - yes). |
| fixed tag data | 128-bit integer | This is only valid if generate tags is set. |

TABLE 3-continued

Page header format

| Field | Format | description |
| --- | --- | --- |
| tag vertical scale factor | 16-bit integer | Scale factor in vertical direction from tag data resolution to target resolution. Valid range = 1-511. Integer scaling only |
| tag horizontal scale factor | 16-bit integer | Scale factor in horizontal direction from tag data resolution to target resolution. Valid range = 1-511. Integer scaling only. |
| bi-level layer vertical scale factor | 16-bit integer | Scale factor in vertical direction from bi-level resolution to target resolution (must be 1 or greater). May be non-integer.<br>Expressed as a fraction with upper 8-bits the numerator and the lower 8 bits the denominator. |
| bi-level layer horizontal scale factor | 16-bit integer | Scale factor in horizontal direction from bi-level resolution to target resolution (must be 1 or greater). May be non-integer. Expressed as a fraction with upper 8-bits the numerator and the lower 8 bits the denominator. |
| bi-level layer page width | 16-bit integer | Width of bi-level layer page, in pixels. |
| bi-level layer page height | 32-bit integer | Height of bi-level layer page, in pixels. |
| contone flags | 16 bit integer | Defines the color conversion that is required for the JPEG data.<br>Bits 2-0 specify how many contone planes there are (e.g. 3 for CMY and 4 for CMYK).<br>Bit 3 specifies whether the first 3 color planes need to be converted back from YCrCb to CMY. Only valid if b2-0 = 3 or 4.<br>0 - no conversion, leave JPEG colors alone<br>1 - color convert.<br>Bits 7-4 specifies whether the YCrCb was generated directly from CMY, or whether it was converted to RGB first via the step: R = 255-C, G = 255-M, B = 255-Y.<br>Each of the color planes can be individually inverted.<br>Bit 4:<br>0 - do not invert color plane 0<br>1 - invert color plane 0<br>Bit 5:<br>0 - do not invert color plane 1<br>1 - invert color plane 1<br>Bit 6:<br>0 - do not invert color plane 2<br>1 - invert color plane 2<br>Bit 7:<br>0 - do not invert color plane 3<br>1 - invert color plane 3<br>Bit 8 specifies whether the contone data is JPEG compressed or non-compressed:<br>0 - JPEG compressed<br>1 - non-compressed<br>The remaining bits are reserved (0). |
| contone vertical scale factor | 16-bit integer | Scale factor in vertical direction from contone channel resolution to target resolution. Valid range = 1-255. May be non-integer.<br>Expressed as a fraction with upper 8-bits the numerator and the lower 8 bits the denominator. |
| contone horizontal scale factor | 16-bit integer | Scale factor in horizontal direction from contone channel resolution to target resolution. Valid range = 1-255. May be non-integer.<br>Expressed as a fraction with upper 8-bits the numerator and the lower 8 bits the denominator. |
| contone page width | 16-bit integer | Width of contone page, in contone pixels. |
| contone page height | 32-bit integer | Height of contone page, in contone pixels. |
| Reserved | up to 128 bytes | Reserved and 0 pads out page header to multiple of 128 bytes. |

The page header contains a signature and version which allow the CPU to identify the page header format. If the signature and/or version are missing or incompatible with the CPU, then the CPU can reject the page.

The contone flags define how many contone layers are present, which typically is used for defining whether the contone layer is CMY or CMYK. Additionally, if the color planes are CMY, they can be optionally stored as YCrCb, and further optionally color space converted from CMY directly or via RGB. Finally the contone data is specified as being either JPEG compressed or non-compressed.

The page header defines the resolution and size of the target page. The bi-level and contone layers are clipped to the target page if necessary. This happens whenever the bi-level or contone scale factors are not factors of the target page width or height.

The target left, top, right and bottom margins define the positioning of the target page within the printable page area.

The tag parameters specify whether or not Netpage tags should be produced for this page and what orientation the tags should be produced at (landscape or portrait mode). The fixed tag data is also provided.

The contone, bi-level and tag layer parameters define the page size and the scale factors.

8.1.2.2 Band Format

Table 4 shows the format of the page band header.

TABLE 4

Band header format

| field | format | Description |
|---|---|---|
| signature | 16-bit integer | Page band header format signature. |
| Version | 16-bit integer | Page band header format version number. |
| structure size | 16-bit integer | Size of page band header. |
| bi-level layer band height | 16-bit integer | Height of bi-level layer band, in black pixels. |
| bi-level layer band data size | 32-bit integer | Size of bi-level layer band data, in bytes. |
| contone band height | 16-bit integer | Height of contone band, in contone pixels. |
| contone band data size | 32-bit integer | Size of contone plane band data, in bytes. |
| tag band height | 16-bit integer | Height of tag band, in dots. |
| tag band data size | 32-bit integer | Size of unencoded tag data band, in bytes. Can be 0 which indicates that no tag data is provided. |
| reserved | up to 128 bytes | Reserved and 0 pads out band header to multiple of 128 bytes. |

The bi-level layer parameters define the height of the black band, and the size of its compressed band data. The variable-size black data follows the page band header.

The contone layer parameters define the height of the contone band, and the size of its compressed page data. The variable-size contone data follows the black data.

The tag band data is the set of variable tag data half-lines as required by the tag encoder. The format of the tag data is found in Section 28.5.2. The tag band data follows the contone data.

Table 5 shows the format of the variable-size compressed band data which follows the page band header.

TABLE 5

Page band data format

| field | Format | Description |
|---|---|---|
| black data | Modified G4 facsimile bitstream | Compressed bi-level layer. |
| contone data | JPEG bytestream | Compressed contone datalayer. |
| tag data map | Tag data array | Tag data format. See Section 28.5.2. |

The start of each variable-size segment of band data should be aligned to a 256-bit DRAM word boundary.

The following sections describe the format of the compressed bi-level layers and the compressed contone layer. section 28.5.1 on page 546 describes the format of the tag data structures.

8.1.2.3 Bi-Level Data Compression

The (typically 1600 dpi) black bi-level layer is losslessly compressed using Silverbrook Modified Group 4 (SMG4) compression which is a version of Group 4 Facsimile compression without Huffman and with simplified run length encodings. Typically compression ratios exceed 10:1. The encoding are listed in Table 6 and Table 7

TABLE 6

Bi-Level group 4 facsimile style compression encodings

| | Encoding | Description |
|---|---|---|
| Same as Group 4 Facsimile | 1000 | Pass Command: a0 ← b2, skip next two edges |
| | 1 | Vertical(0): a0 ← b1, color = !color |
| | 110 | Vertical(1): a0 ← b1 + 1, color = !color |
| | 010 | Vertical(−1): a0 ← b1 − 1, color = !color |
| | 110000 | Vertical(2): a0 ← b1 + 2, color = !color |
| | 010000 | Vertical(−2): a0 ← b1 − 2, color = !color |
| Unique to this implementation | 100000 | Vertical(3): a0 ← b1 + 3, color = !color |
| | 000000 | Vertical(−3): a0 ← b1 − 3, color = !color |
| | <RL><RL>100 | Horizontal: a0 ← a0 + <RL> + <RL> |

SMG4 has a pass through mode to cope with local negative compression. Pass through mode is activated by a special run-length code. Pass through mode continues to either end of line or for a pre-programmed number of bits, whichever is shorter. The special run-length code is always executed as a run-length code, followed by pass through. The pass through escape code is a medium length run-length with a run of less than or equal to 31.

TABLE 7

Run length (RL) encodings

| | Encoding | Description |
|---|---|---|
| Unique to this implementation | RRRRR1 | Short Black Runlength (5 bits) |
| | RRRRR1 | Short White Runlength (5 bits) |
| | RRRRRRRRRR10 | Medium Black Runlength (10 bits) |
| | RRRRRRRR10 | Medium White Runlength (8 bits) |
| | RRRRRRRRRR10 | Medium Black Runlength with RRRRRRRRRR <= 31, Enter pass through |

TABLE 7-continued

| Run length (RL) encodings | |
|---|---|
| Encoding | Description |
| RRRRRRRR10 | Medium White Runlength with RRRRRRRR <= 31, Enter pass through |
| RRRRRRRRRRRRRRR00 | Long Black Runlength (15 bits) |
| RRRRRRRRRRRRRRR00 | Long White Runlength (15 bits) |

Since the compression is a bitstream, the encodings are read right (least significant bit) to left (most significant bit). The run lengths given as RRRR in Table 7 are read in the same way (least significant bit at the right to most significant bit at the left).

Each band of bi-level data is optionally self contained. The first line of each band therefore is based on a 'previous' blank line or the last line of the previous band.

8.1.2.3.1 Group 3 and 4 Facsimile Compression

The Group 3 Facsimile compression algorithm losslessly compresses bi-level data for transmission over slow and noisy telephone lines. The bi-level data represents scanned black text and graphics on a white background, and the algorithm is tuned for this class of images (it is explicitly not tuned, for example, for halftoned bi-level images). The 1D Group 3 algorithm runlength-encodes each scanline and then Huffman-encodes the resulting runlengths. Runlengths in the range 0 to 63 are coded with terminating codes. Runlengths in the range 64 to 2623 are coded with make-up codes, each representing a multiple of 64, followed by a terminating code. Runlengths exceeding 2623 are coded with multiple make-up codes followed by a terminating code. The Huffman tables are fixed, but are separately tuned for black and white runs (except for make-up codes above 1728, which are common). When possible, the 2D Group 3 algorithm encodes a scanline as a set of short edge deltas (0, +1, +2, +3) with reference to the previous scanline. The delta symbols are entropy-encoded (so that the zero delta symbol is only one bit long etc.) Edges within a 2D-encoded line which can't be delta-encoded are runlength-encoded, and are identified by a prefix. 1D- and 2D-encoded lines are marked differently. 1D-encoded lines are generated at regular intervals, whether actually required or not, to ensure that the decoder can recover from line noise with minimal image degradation. 2D Group 3 achieves compression ratios of up to 6:1.

The Group 4 Facsimile algorithm losslessly compresses bi-level data for transmission over error-free communications lines (i.e. the lines are truly error-free, or error-correction is done at a lower protocol level). The Group 4 algorithm is based on the 2D Group 3 algorithm, with the essential modification that since transmission is assumed to be error-free, 1D-encoded lines are no longer generated at regular intervals as an aid to error-recovery. Group 4 achieves compression ratios ranging from 20:1 to 60:1 for the CCITT set of test images.

The design goals and performance of the Group 4 compression algorithm qualify it as a compression algorithm for the bi-level layers. However, its Huffman tables are tuned to a lower scanning resolution (100-400 dpi), and it encodes runlengths exceeding 2623 awkwardly.

8.1.2.4 Contone Data Compression

The contone layer (CMYK) is either a non-compressed bytestream or is compressed to an interleaved JPEG bytestream. The JPEG bytestream is complete and self-contained. It contains all data required for decompression, including quantization and Huffman tables.

The contone data is optionally converted to YCrCb before being compressed (there is no specific advantage in color-space converting if not compressing). Additionally, the CMY contone pixels are optionally converted (on an individual basis) to RGB before color conversion using R=255−C, G=255−M, B=255−Y. Optional bitwise inversion of the K plane may also be performed. Note that this CMY to RGB conversion is not intended to be accurate for display purposes, but rather for the purposes of later converting to YCrCb. The inverse transform will be applied before printing.

8.1.2.4.1 JPEG Compression

The JPEG compression algorithm lossily compresses a contone image at a specified quality level. It introduces imperceptible image degradation at compression ratios below 5:1, and negligible image degradation at compression ratios below 10:1.

JPEG typically first transforms the image into a color space which separates luminance and chrominance into separate color channels. This allows the chrominance channels to be subsampled without appreciable loss because of the human visual system's relatively greater sensitivity to luminance than chrominance. After this first step, each color channel is compressed separately.

The image is divided into 8×8 pixel blocks. Each block is then transformed into the frequency domain via a discrete cosine transform (DCT). This transformation has the effect of concentrating image energy in relatively lower-frequency coefficients, which allows higher-frequency coefficients to be more crudely quantized. This quantization is the principal source of compression in JPEG. Further compression is achieved by ordering coefficients by frequency to maximize the likelihood of adjacent zero coefficients, and then runlength-encoding runs of zeroes. Finally, the runlengths and non-zero frequency coefficients are entropy coded. Decompression is the inverse process of compression.

8.1.2.4.2 Non-Compressed Format

If the contone data is non-compressed, it must be in a block-based format bytestream with the same pixel order as would be produced by a JPEG decoder. The bytestream therefore consists of a series of 8×8 block of the original image, starting with the top left 8×8 block, and working horizontally across the page (as it will be printed) until the top rightmost 8×8 block, then the next row of 8×8 blocks (left to right) and so on until the lower row of 8×8 blocks (left to right). Each 8×8 block consists of 64 8-bit pixels for color plane 0 (representing 8 rows of 8 pixels in the order top left to bottom right) followed by 64 8-bit pixels for color plane 1 and so on for up to a maximum of 4 color planes.

If the original image is not a multiple of 8 pixels in X or Y, padding must be present (the extra pixel data will be ignored by the setting of margins).

8.1.2.4.3 Compressed Format

If the contone data is compressed the first memory band contains JPEG headers (including tables) plus MCUs (minimum coded units). The ratio of space between the various color planes in the JPEG stream is 1:1:1:1. No subsampling is permitted. Banding can be completely arbitrary i.e there can be multiple JPEG images per band or 1 JPEG image divided over multiple bands. The break between bands is only memory alignment based.

8.1.2.4.4 Conversion of RGB to YCrCb (in RIP)

YCrCb is defined as per CCIR 601-1 except that Y, Cr and Cb are normalized to occupy all 256 levels of an 8-bit binary encoding and take account of the actual hardware implementation of the inverse transform within SoPEC.

The exact color conversion computation is as follows:

$$Y^* = (9805/32768)R + (19235/32768)G + (3728/32768)B$$

$$Cr^* = (16375/32768)R - (13716/32768)G - (2659/32768)B + 128$$

$$Cb^* = -(5529/32768)R - (10846/32768)G + (16375/32768)B + 128$$

Y, Cr and Cb are obtained by rounding to the nearest integer. There is no need for saturation since ranges of Y*, Cr* and Cb* after rounding are [0-255], [1-255] and [1-255] respectively. Note that full accuracy is possible with 24 bits.

SoPEC ASIC

9 Features and Architecture

The Small Office Home Office Print Engine Controller (SoPEC) is a page rendering engine ASIC that takes compressed page images as input, and produces decompressed page images at up to 6 channels of bi-level dot data as output. The bi-level dot data is generated for the Memjet linking printhead. The dot generation process takes account of printhead construction, dead nozzles, and allows for fixative generation.

A single SoPEC can control up to 12 linking printheads and up to 6 color channels at >10,000 lines/sec, equating to 30 pages per minute. A single SoPEC can perform full-bleed printing of A4 and Letter pages. The 6 channels of colored ink are the expected maximum in a consumer SOHO, or office Memjet printing environment:

CMY, for regular color printing.

K, for black text, line graphics and gray-scale printing.

IR (infrared), for Netpage-enabled applications.

F (fixative), to enable printing at high speed. Because the Memjet printer is capable of printing so fast, a fixative may be required on specific media types (such as calendared paper) to enable the ink to dry before the page touches a previously printed page. Otherwise the pages may bleed on each other. In low speed printing environments, and for plain and photo paper, the fixative is not be required.

SoPEC is color space agnostic. Although it can accept contone data as CMYX or RGBX, where X is an optional 4th channel (such as black), it also can accept contone data in any print color space. Additionally, SoPEC provides a mechanism for arbitrary mapping of input channels to output channels, including combining dots for ink optimization, generation of channels based on any number of other channels etc. However, inputs are typically CMYK for contone input, K for the bi-level input, and the optional Netpage tag dots are typically rendered to an infra-red layer. A fixative channel is typically only generated for fast printing applications.

SoPEC is resolution agnostic. It merely provides a mapping between input resolutions and output resolutions by means of scale factors. The expected output resolution is 1600 dpi, but SoPEC actually has no knowledge of the physical resolution of the linking printhead.

SoPEC is page-length agnostic. Successive pages are typically split into bands and downloaded into the page store as each band of information is consumed and becomes free.

SoPEC provides mechanisms for synchronization with other SoPECs. This allows simple multi-SoPEC solutions for simultaneous A3/A4/Letter duplex printing. However, SoPEC is also capable of printing only a portion of a page image. Combining synchronization functionality with partial page rendering allows multiple SoPECs to be readily combined for alternative printing requirements including simultaneous duplex printing and wide format printing.

Table 8 lists some of the features and corresponding benefits of SoPEC.

TABLE 8

Features and Benefits of SoPEC

| Feature | Benefits |
|---|---|
| Optimised print architecture in hardware | 30 ppm full page photographic quality color printing from a desktop PC |
| 0.13 micron CMOS (>36 million transistors) | High speed<br>Low cost<br>High functionality |
| 900 Million dots per second | Extremely fast page generation |
| >10,000 lines per second at 1600 dpi | 0.5 A4/Letter pages per SoPEC chip per second |
| 1 chip drives up to 92, 160 nozzles | Low cost page-width printers |
| 1 chip drives up to 6 color planes | 99% of SoHo printers can use 1 SoPEC device |
| Integrated DRAM | No external memory required, leading to low cost systems |
| Power saving sleep mode | SoPEC can enter a power saving sleep mode to reduce power dissipation between print jobs |
| JPEG expansion | Low bandwidth from PC<br>Low memory requirements in printer |
| Lossless bitplane expansion | High resolution text and line art with low bandwidth from PC. |
| Netpage tag expansion | Generates interactive paper |
| Stochastic dispersed dot dither | Optically smooth image quality<br>No moire effects |
| Hardware compositor for 6 image planes | Pages composited in real-time |

TABLE 8-continued

Features and Benefits of SoPEC

| Feature | Benefits |
|---|---|
| Dead nozzle compensation | Extends printhead life and yield Reduces printhead cost |
| Color space agnostic | Compatible with all inksets and image sources including RGB, CMYK, spot, CIE L*a*b*, hexachrome, YCrCbK, sRGB and other |
| Color space conversion | Higher quality/lower bandwidth |
| USB2.0 device interface | Direct, high speed (480 Mb/s) interface to host PC. |
| USB2.0 host interface | Enables alternative host PC connection types (IEEE1394, Ethernet, WiFi, Bluetooth etc.). Enables direct printing from digital camera or other device. |
| Media Interface | Direct connection to a wide range of external devices e.g. scanner |
| Integrated motor controllers | Saves expensive external hardware. |
| Cascadable in resolution | Printers of any resolution |
| Cascadable in color depth | Special color sets e.g. hexachrome can be used |
| Cascadable in image size | Printers of any width |
| Cascadable in pages | Printers can print both sides simultaneously |
| Cascadable in speed | Higher speeds are possible by having each SoPEC print one vertical strip of the page. |
| Fixative channel data generation | Extremely fast ink drying without wastage |
| Built-in security | Revenue models are protected |
| Undercolor removal on dot-by-dot basis | Reduced ink usage |
| Does not require fonts for high speed operation | No font substitution or missing fonts |
| Flexible printhead configuration | Many configurations of printheads are supported by one chip type |
| Drives linking printheads directly | No print driver chips required, results in lower cost |
| Determines dot accurate ink usage | Removes need for physical ink monitoring system in ink cartridges |

9.1 Printing Rates

The required printing rate for a single SoPEC is 30 sheets per minute with an inter-sheet spacing of 4 cm. To achieve a 30 sheets per minute print rate, this requires:

300 mm×63 (dot/mm)/2 sec=105.8 μseconds per line, with no inter-sheet gap.

340 mm×63 (dot/mm)/2 sec=93.3 μseconds per line, with a 4 cm inter-sheet gap.

A printline for an A4 page consists of 13824 nozzles across the page. At a system clock rate of 192 MHz, 13824 dots of data can be generated in 69.2 μseconds. Therefore data can be generated fast enough to meet the printing speed requirement.

Once generated, the data must be transferred to the printhead. Data is transferred to the printhead ICs using a 288 MHz clock (3/2 times the system clock rate). SoPEC has 6 printhead interface ports running at this clock rate. Data is 8b/10b encoded, so the thoughput per port is 0.8×288=230.4 Mb/sec. For 6 color planes, the total number of dots per printhead IC is 1280×6=7680, which takes 33.3 μseconds to transfer. With 6 ports and 11 printhead ICs, 5 of the ports address 2 ICs sequentially, while one port addresses one IC and is idle otherwise. This means all data is transferred on 66.7 μseconds (plus a slight overhead). Therefore one SoPEC can transfer data to the printhead fast enough for 30 ppm printing.

9.2 SoPEC Basic Architecture

Figure 14:
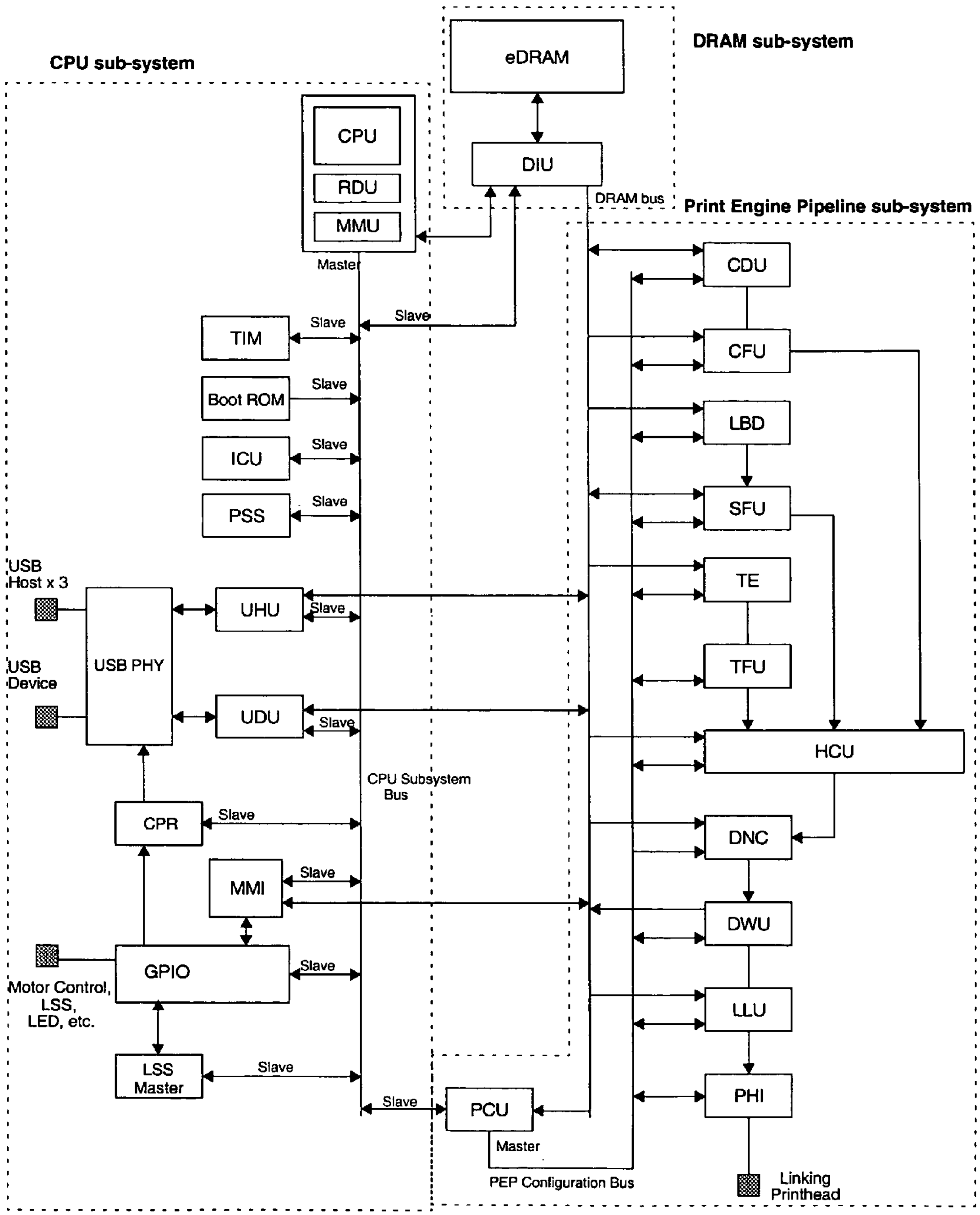
FIG. 14. SoPEC System Top Level partition

From the highest point of view the SoPEC device consists of 3 distinct subsystems CPU Subsystem DRAM Subsystem Print Engine Pipeline (PEP) Subsystem See FIG. 14 for a block level diagram of SoPEC.

9.2.1 CPU Subsystem

The CPU subsystem controls and configures all aspects of the other subsystems. It provides general support for interfacing and synchronising the external printer with the internal print engine. It also controls the low speed communication to the QA chips. The CPU subsystem contains various peripherals to aid the CPU, such as GPIO (includes motor control), interrupt controller, LSS Master, MMI and general timers. The CPR block provides a mechanism for the CPU to powerdown and reset individual sections of SoPEC. The UDU and UHU provide high-speed USB2.0 interfaces to the host, other SoPEC devices, and other external devices. For security, the CPU supports user and supervisor mode operation, while the CPU subsystem contains some dedicated security components.

9.2.2 DRAM Subsystem

The DRAM subsystem accepts requests from the CPU, UHU, UDU, MMI and blocks within the PEP subsystem. The DRAM subsystem (in particular the DIU) arbitrates the various requests and determines which request should win access to the DRAM. The DIU arbitrates based on configured parameters, to allow sufficient access to DRAM for all requesters. The DIU also hides the implementation specifics of the DRAM such as page size, number of banks, refresh rates etc.

9.2.3 Print Engine Pipeline (PEP) Subsystem

The Print Engine Pipeline (PEP) subsystem accepts compressed pages from DRAM and renders them to bi-level dots for a given print line destined for a printhead interface that communicates directly with up to 12 linking printhead ICs.

The first stage of the page expansion pipeline is the CDU, LBD and TE. The CDU expands the JPEG-compressed contone (typically CMYK) layer, the LBD expands the compressed bi-level layer (typically K), and the TE encodes Netpage tags for later rendering (typically in IR, Y or K ink). The output from the first stage is a set of buffers: the CFU, SFU, and TFU. The CFU and SFU buffers are implemented in DRAM.

The second stage is the HCU, which dithers the contone layer, and composites position tags and the bi-level spot0 layer over the resulting bi-level dithered layer. A number of options exist for the way in which compositing occurs. Up to 6 channels of bi-level data are produced from this stage. Note that not all 6 channels may be present on the printhead. For example, the printhead may be CMY only, with K pushed into the CMY channels and IR ignored. Alternatively, the position tags may be printed in K or Y if IR ink is not available (or for testing purposes).

The third stage (DNC) compensates for dead nozzles in the printhead by color redundancy and error diffusing dead nozzle data into surrounding dots.

The resultant bi-level 6 channel dot-data (typically CMYK-IRF) is buffered and written out to a set of line buffers stored in DRAM via the DWU.

Finally, the dot-data is loaded back from DRAM, and passed to the printhead interface via a dot FIFO. The dot FIFO accepts data from the LLU up to 2 dots per system clock cycle, while the PHI removes data from the FIFO and sends it to the printhead at a maximum rate of 1.5 dots per system clock cycle (see Section 9.1).

9.3 SoPEC Block Description

Looking at FIG. 14, the various units are described here in summary form:

TABLE 9

Units within SoPEC

| Subsystem | Unit Acronym | Unit Name | Description |
|---|---|---|---|
| DRAM | DIU | DRAM interface unit | Provides the interface for DRAM read and write access for the various PEP units, CPU, UDU, UHU and MMI. The DIU provides arbitration between competing units controls DRAM access. |
| | DRAM | Embedded DRAM | 20 Mbits of embedded DRAM, |
| CPU | CPU | Central Processing Unit | CPU for system configuration and control |
| | MMU | Memory Management Unit | Limits access to certain memory address areas in CPU user mode |
| | RDU | Real-time Debug Unit | Facilitates the observation of the contents of most of the CPU addressable registers in SoPEC in addition to some pseudo-registers in realtime. |
| | TIM | General Timer | Contains watchdog and general system timers |
| | LSS | Low Speed Serial Interfaces | Low level controller for interfacing with the QA chips |
| | GPIO | General Purpose IOs | General IO controller, with built-in Motor control unit, LED pulse units and de-glitch circuitry |
| | MMI | Multi-Media Interface | Generic Purpose Engine for protocol generation and control with integrated DMA controller. |
| | ROM | Boot ROM | 16 KBytes of System Boot ROM code |
| | ICU | Interrupt Controller Unit | General Purpose interrupt controller with configurable priority, and masking. |
| | CPR | Clock, Power and Reset block | Central Unit for controlling and generating the system clocks and resets and powerdown mechanisms |
| | PSS | Power Save Storage | Storage retained while system is powered down |
| | USB PHY | Universal Serial Bus (USB) Physical | USB multiport (4) physical interface. |
| | UHU | USB Host Unit | USB host controller interface with integrated DIU DMA controller |
| | UDU | USB Device Unit | USB Device controller interface with integrated DIU DMA controller |
| Print Engine Pipeline (PEP) | PCU | PEP controller | Provides external CPU with the means to read and write PEP Unit registers, and read and write DRAM in single 32-bit chunks. |
| | CDU | Contone decoder unit | Expands JPEG compressed contone layer and writes decompressed contone to DRAM |
| | CFU | Contone FIFO Unit | Provides line buffering between CDU and HCU |
| | LBD | Lossless Bi-level Decoder | Expands compressed bi-level layer. |
| | SFU | Spot FIFO Unit | Provides line buffering between LBD and HCU |
| | TE | Tag encoder | Encodes tag data into line of tag dots. |

TABLE 9-continued

Units within SoPEC

| Subsystem | Unit Acronym | Unit Name | Description |
|---|---|---|---|
| | TFU | Tag FIFO Unit | Provides tag data storage between TE and HCU |
| | HCU | Halftoner compositor unit | Dithers contone layer and composites the bi-level spot 0 and position tag dots. |
| | DNC | Dead Nozzle Compensator | Compensates for dead nozzles by color redundancy and error diffusing dead nozzle data into surrounding dots. |
| | DWU | Dotline Writer Unit | Writes out the 6 channels of dot data for a given printline to the line store DRAM |
| | LLU | Line Loader Unit | Reads the expanded page image from line store, formatting the data appropriately for the linking printhead. |
| | PHI | PrintHead Interface | Is responsible for sending dot data to the linking printheads and for providing line synchronization between multiple SoPECs. Also provides test interface to printhead such as temperature monitoring and Dead Nozzle Identification. |

9.4 Addressing Scheme in SoPEC

SoPEC Must Address

20 Mbit DRAM.

PCU addressed registers in PEP.

CPU-subsystem addressed registers.

SoPEC has a unified address space with the CPU capable of addressing all CPU-subsystem and PCU-bus accessible registers (in PEP) and all locations in DRAM. The CPU generates byte-aligned addresses for the whole of SoPEC.

22 bits are sufficient to byte address the whole SoPEC address space.

9.4.1 DRAM Addressing Scheme

The embedded DRAM is composed of 256-bit words. Since the CPU-subsystem may need to write individual bytes of DRAM, the DIU is byte addressable. 22 bits are required to byte address 20 Mbits of DRAM.

Most blocks read or write 256-bit words of DRAM. For these blocks only the top 17 bits i.e. bits 21 to 5 are required to address 256-bit word aligned locations.

The exceptions are

CDU which can write 64-bits so only the top 19 address bits i.e. bits 21-3 are required.

The CPU-subsystem always generates a 22-bit byte-aligned DIU address but it will send flags to the DIU indicating whether it is an 8, 16 or 32-bit write.

The UHU and UDU generate 256-bit aligned addresses, with a byte-wise write mask associated with each data word, to allow effective byte addressing of the DRAM.

Regardless of the size no DIU access is allowed to span a 256-bit aligned DRAM word boundary.

9.4.2 PEP Unit DRAM addressing

PEP Unit configuration registers which specify DRAM locations should specify 256-bit aligned DRAM addresses i.e. using address bits 21:5. Legacy blocks from PEC1 e.g. the LBD and TE may need to specify 64-bit aligned DRAM addresses if these reused blocks DRAM addressing is difficult to modify. These 64-bit aligned addresses require address bits 21:3. However, these 64-bit aligned addresses should be programmed to start at a 256-bit DRAM word boundary.

Unlike PEC1, there are no constraints in SoPEC on data organization in DRAM except that all data structures must start on a 256-bit DRAM boundary. If data stored is not a multiple of 256-bits then the last word should be padded.

9.4.3 CPU Subsystem Bus Addressed Registers

The CPU subsystem bus supports 32-bit word aligned read and write accesses with variable access timings. See section 11.4 for more details of the access protocol used on this bus. The CPU subsystem bus does not currently support byte reads and writes.

9.4.4 PCU Addressed Registers in PEP

The PCU only supports 32-bit register reads and writes for the PEP blocks. As the PEP blocks only occupy a subsection of the overall address map and the PCU is explicitly selected by the MMU when a PEP block is being accessed the PCU does not need to perform a decode of the higher-order address bits. See Table 11 for the PEP subsystem address map.

9.5 SoPEC Memory Map 9.5.1 Main Memory Map

Figure 15:
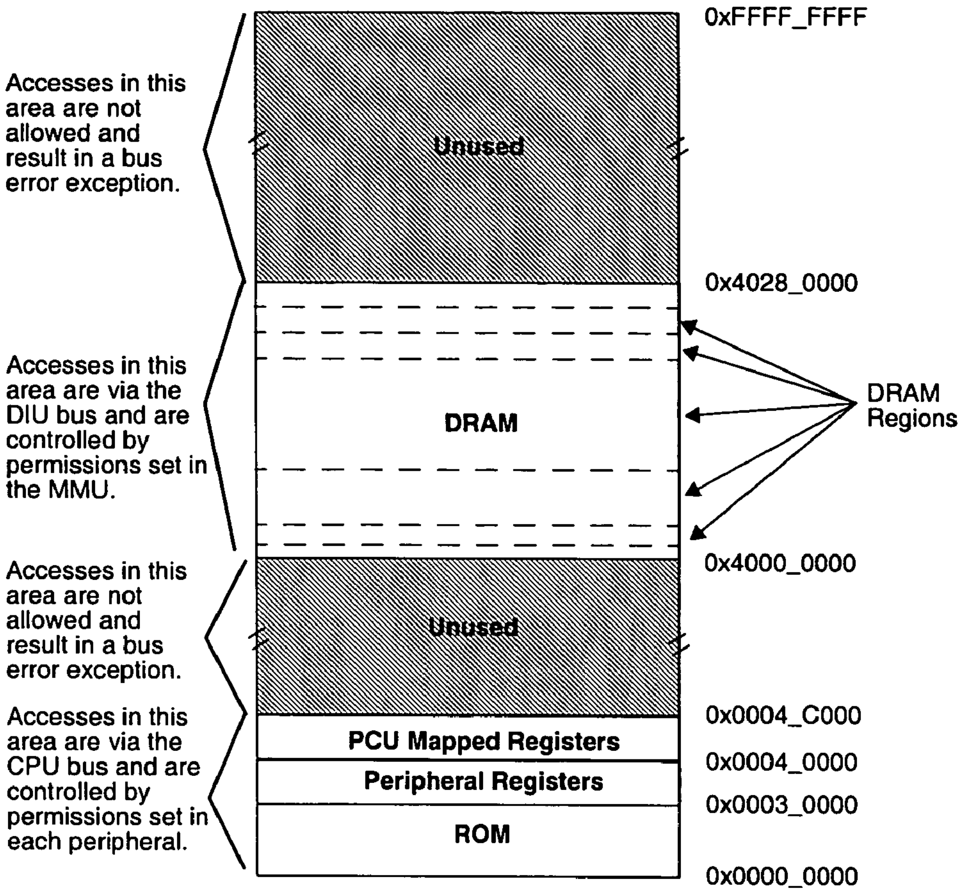
FIG. 15. Proposed SoPEC CPU memory map (not to scale)

The system wide memory map is shown in FIG. 15 below. The memory map is discussed in detail in Section 11 Central Processing Unit (CPU).

9.5.2 CPU-Bus Peripherals Address Map

The address mapping for the peripherals attached to the CPU-bus is shown in Table 10 below. The MMU performs the decode of cpu_adr[21:12] to generate the relevant cpu_block_select signal for each block. The addressed blocks decode however many of the lower order bits of cpu_adr as are required to address all the registers or memory within the block. The effect of decoding fewer bits is to cause the address space within a block to be duplicated many times (i.e. mirrored) depending on how many bits are required.

TABLE 10

CPU-bus peripherals address map

| Block_base | Address |
|---|---|
| ROM_base | 0x0000_0000 |
| MMU_base | 0x0003_0000 |
| TIM_base | 0x0003_1000 |

TABLE 10-continued

CPU-bus peripherals address map

| Block_base | Address |
|---|---|
| LSS_base | 0x0003_2000 |
| GPIO_base | 0x0003_3000 |
| MMI_base | 0x0003_4000 |
| ICU_base | 0x0003_5000 |
| CPR_base | 0x0003_6000 |
| DIU_base | 0x0003_7000 |
| PSS_base | 0x0003_8000 |
| UHU_base | 0x0003_9000 |
| UDU_base | 0x0003_A000 |
| Reserved | 0x0003_B000 to 0x0003_FFFF |
| PCU_base | 0x0004_0000 to 0x0004_BFFF |

A write to a undefined register address within the defined address space for a block can have undefined consequences, a read of an undefined address will return undefined data. Note this is a consequence of only using the low order bits of the CPU address for an address decode (cpu_adr).

9.5.3 PCU Mapped Registers (PEP Blocks) Address Map

The PEP blocks are addressed via the PCU. From FIG. 15, the PCU mapped registers are in the range 0x0004_0000 to 0x0004_BFFF. From Table 11 it can be seen that there are 12 sub-blocks within the PCU address space. Therefore, only four bits are necessary to address each of the sub-blocks within the PEP part of SoPEC. A further 12 bits may be used to address any configurable register within a PEP block. This gives scope for 1024 configurable registers per sub-block (the PCU mapped registers are all 32-bit addressed registers so the upper 10 bits are required to individually address them). This address will come either from the CPU or from a command stored in DRAM. The bus is assembled as follows:

address[15:12]=sub-block address, address[n:2]=register address within sub-block, only the number of bits required to decode the registers within each sub-block are used, address[1:0]=byte address, unused as PCU mapped registers are all 32-bit addressed registers.

So for the case of the HCU, its addresses range from 0x7000 to 0x7FFF within the PEP subsystem or from 0x0004_7000 to 0x0004_7FFF in the overall system.

TABLE 11

PEP blocks address map

| Block_base | Address |
|---|---|
| PCU_base | 0x0004_0000 |
| CDU_base | 0x0004_1000 |
| CFU_base | 0x0004_2000 |
| LBD_base | 0x0004_3000 |
| SFU_base | 0x0004_4000 |
| TE_base | 0x0004_5000 |
| TFU_base | 0x0004_6000 |
| HCU_base | 0x0004_7000 |
| DNC_base | 0x0004_8000 |
| DWU_base | 0x0004_9000 |
| LLU_base | 0x0004_A000 |
| PHI_base | 0x0004_B000 to 0x0004_BFFF |

9.6 Buffer Management in SoPEC

As outlined in Section 9.1, SoPEC has a requirement to print 1 side every 2 seconds i.e. 30 sides per minute.

9.6.1 Page Buffering

Approximately 2 Mbytes of DRAM are reserved for compressed page buffering in SoPEC. If a page is compressed to fit within 2 Mbyte then a complete page can be transferred to DRAM before printing. USB2.0 in high speed mode allows the transfer of 2 Mbyte in less than 40 ms, so data transfer from the host is not a significant factor in print time in this case. For a host PC running in USB1.1 compatible full speed mode, the transfer time for 2 Mbyte approaches 2 seconds, so the cycle time for full page buffering approaches 4 seconds.

9.6.2 Band Buffering

The SoPEC page-expansion blocks support the notion of page banding. The page can be divided into bands and another band can be sent down to SoPEC while the current band is being printed.

Therefore printing can start once at least one band has been downloaded.

The band size granularity should be carefully chosen to allow efficient use of the USB bandwidth and DRAM buffer space. It should be small enough to allow seamless 30 sides per minute printing but not so small as to introduce excessive CPU overhead in orchestrating the data transfer and parsing the band headers. Band-finish interrupts have been provided to notify the CPU of free buffer space. It is likely that the host PC will supervise the band transfer and buffer management instead of the SoPEC CPU.

If SoPEC starts printing before the complete page has been transferred to memory there is a risk of a buffer underrun occurring if subsequent bands are not transferred to SoPEC in time e.g. due to insufficient USB bandwidth caused by another USB peripheral consuming USB bandwidth. A buffer underrun occurs if a line synchronisation pulse is received before a line of data has been transferred to the printhead and causes the print job to fail at that line. If there is no risk of buffer underrun then printing can safely start once at least one band has been downloaded.

If there is a risk of a buffer underrun occurring due to an interruption of compressed page data transfer, then the safest approach is to only start printing once all of the bands have been loaded for a complete page. This means that some latency (dependent on USB speed) will be incurred before printing the first page. Bands for subsequent pages can be downloaded during the printing of the first page as band memory is freed up, so the transfer latency is not incurred for these pages.

A Storage SoPEC (Section 6.2.6), or other memory local to the printer but external to SoPEC, could be added to the system, to provide guaranteed bandwidth data delivery.

The most efficient page banding strategy is likely to be determined on a per page/print job basis and so SoPEC will support the use of bands of any size.

9.6.3 USB Operation in Multi-SoPEC Systems

In a system containing more than one SoPECs, the high bandwidth communication path between SoPECs is via USB. Typically, one SoPEC, the ISCMaster, has a USB connection to the host PC, and is responsible for receiving and distributing page data for itself and all other SoPECs in the system. The ISCMaster acts as a USB Device on the host PC's USB bus, and as the USB Host on a USB bus local to the printer.

Any local USB bus in the printer is logically separate from the host PC's USB bus; a SoPEC device does not act as a USB Hub. Therefore the host PC sees the entire printer system as a single USB function.

The SoPEC UHU supports three ports on the printer's USB bus, allowing the direct connection of up to three additional SoPEC devices (or other USB devices). If more than three USB devices need to be connected, two options are available:

Expand the number of ports on the printer USB bus using a USB Hub chip.

Create one or more additional printer USB busses, using the UHU ports on other SoPEC devices FIG. 16 shows these options.

Since the UDU and UHU for a single SoPEC are on logically different USB busses, data flow between them is via the on-chip DRAM, under the control of the SoPEC CPU. There is no direct communication, either at control or data level, between the UDU and the UHU. For example, when the host PC sends compressed page data to a multi-SoPEC system, all the data for all SoPECs must pass via the DRAM on the ISCMaster SoPEC. Any control or status messages between the host and any SoPEC will also pass via the ISCMaster's DRAM.

Further, while the UDU on SoPEC supports multiple USB interfaces and endpoints within a single USB device function, it typically does not have a mechanism to identify at the USB level which SoPEC is the ultimate destination of a particular USB data or control transfer. Therefore software on the CPU needs to redirect data on a transfer-by-transfer basis, either by parsing a header embedded in the USB data, or based on previously communicated control information from the host PC. The software overhead involved in this management adds to the overall latency of compressed page download for a multi-SoPEC system.

The UDU and UHU contain highly configurable DMA controllers that allow the CPU to direct USB data to and from DRAM buffers in a flexible way, and to monitor the DMA for a variety of conditions. This means that the CPU can manage the DRAM buffers between the UDU and the UHU without ever needing to physically move or copy packet data in the DRAM.

10 SoPEC Use Cases

10.1 Introduction

This chapter is intended to give an overview of a representative set of scenarios or use cases which SoPEC can perform. SoPEC is by no means restricted to the particular use cases described and not every SoPEC system is considered here.

In this chapter, SoPEC use is described under four headings:

1) Normal operation use cases.
2) Security use cases.
3) Miscellaneous use cases.
4) Failure mode use cases.

Use cases for both single and multi-SoPEC systems are outlined.

Some tasks may be composed of a number of sub-tasks.

The realtime requirements for SoPEC software tasks are discussed in "Central Processing Unit (CPU)" under Section 11.3 Realtime requirements.

10.2 Normal Operation in a Single SoPEC System with USB Host Connection

SoPEC operation is broken up into a number of sections which are outlined below. Buffer management in a SoPEC system is normally performed by the host.

10.2.1 Powerup

Powerup describes SoPEC initialisation following an external reset or the watchdog timer system reset.

A typical powerup sequence is:

1) Execute reset sequence for complete SoPEC.
2) CPU boot from ROM.
3) Basic configuration of CPU peripherals, UDU and DIU. DRAM initialisation. USB Wakeup.
4) Download and authentication of program (see Section 10.5.2).
5) Execution of program from DRAM.
6) Retrieve operating parameters from PRINTER_QA and authenticate operating parameters.
7) Download and authenticate any further datasets.

10.2.2 Wakeup

The CPU can put different sections of SoPEC into sleep mode by writing to registers in the CPR block (chapter 18). This can include disabling both the DRAM and the CPU itself, and in some circumstances the UDU as well. Some system state is always stored in the power-safe storage (PSS) block.

Wakeup describes SoPEC recovery from sleep mode with the CPU and DRAM disabled. Wakeup can be initiated by a hardware reset, an event on the device or host USB interfaces, or an event on a GPIO pin.

A typical USB wakeup sequence is:

1) Execute reset sequence for sections of SoPEC in sleep mode.
2) CPU boot from ROM, if CPU-subsystem was in sleep mode.
3) Basic configuration of CPU peripherals and DIU, and DRAM initialisation, if required.
4) Download and authentication of program using results in Power-Safe Storage (PSS) (see Section 10.5.2).
5) Execution of program from DRAM.
6) Retrieve operating parameters from PRINTER_QA and authenticate operating parameters.
7) Download and authenticate using results in PSS of any further datasets (programs).

10.2.3 Print Initialization

This sequence is typically performed at the start of a print job following powerup or wakeup:

1) Check amount of ink remaining via QA chips.
2) Download static data e.g. dither matrices, dead nozzle tables from host to DRAM.
3) Check printhead temperature, if required, and configure printhead with firing pulse profile etc. accordingly.
4) Initiate printhead pre-heat sequence, if required.

10.2.4 First Page Download

Buffer management in a SoPEC system is normally performed by the host.

First page, first band download and processing:

1) The host communicates to the SoPEC CPU over the USB to check that DRAM space remaining is sufficient to download the first band.
2) The host downloads the first band (with the page header) to DRAM.
3) When the complete page header has been downloaded the SoPEC CPU processes the page header, calculates PEP register commands and writes directly to PEP registers or to DRAM.
4) If PEP register commands have been written to DRAM, execute PEP commands from DRAM via PCU.

Remaining bands download and processing:

1) Check DRAM space remaining is sufficient to download the next band.
2) Download the next band with the band header to DRAM.

3) When the complete band header has been downloaded, process the band header according to whichever band-related register updating mechanism is being used.

10.2.5 Start Printing

1) Wait until at least one band of the first page has been downloaded.

2) Start all the PEP Units by writing to their Go registers, via PCU commands executed from DRAM or direct CPU writes. A rapid startup order for the PEP units is outlined in Table 12.

TABLE 12

Typical PEP Unit startup order for printing a page.

| Step# | Unit |
|---|---|
| 1 | DNC |
| 2 | DWU |
| 3 | HCU |
| 4 | PHI |
| 5 | LLU |
| 6 | CFU, SFU, TFU |
| 7 | CDU |
| 8 | TE, LBD |

3) Print ready interrupt occurs (from PHI).

4) Start motor control, if first page, otherwise feed the next page. This step could occur before the print ready interrupt.

5) Drive LEDs, monitor paper status.

6) Wait for page alignment via page sensor(s) GPIO interrupt.

7) CPU instructs PHI to start producing line syncs and hence commence printing, or wait for an external device to produce line syncs.

8) Continue to download bands and process page and band headers for next page.

10.2.6 Next Page(s) Download

As for first page download, performed during printing of current page.

10.2.7 Between Bands

When the finished band flags are asserted band related registers in the CDU, LBD, TE need to be re-programmed before the subsequent band can be printed. The finished band flag interrupts the CPU to tell the CPU that the area of memory associated with the band is now free. Typically only 3-5 commands per decompression unit need to be executed.

These registers can be either:

Reprogrammed directly by the CPU after the band has finished

Update automatically from shadow registers written by the CPU while the previous band was being processed Alternatively, PCU commands can be set up in DRAM to update the registers without direct CPU intervention. The PCU commands can also operate by direct writes between bands, or via the shadow registers.

10.2.8 During Page Print

Typically during page printing ink usage is communicated to the QA chips.

1) Calculate ink printed (from PHI).

2) Decrement ink remaining (via QA chips).

3) Check amount of ink remaining (via QA chips). This operation may be better performed while the page is being printed rather than at the end of the page.

10.2.9 Page Finish

These operations are typically performed when the page is finished:

1) Page finished interrupt occurs from PHI.

2) Shutdown the PEP blocks by de-asserting their Go registers. A typical shutdown order is defined in Table 13. This will set the PEP Unit state-machines to their idle states without resetting their configuration registers.

3) Communicate ink usage to QA chips, if required.

TABLE 13

End of page shutdown order for PEP Units

| Step# | Unit |
|---|---|
| 1 | PHI (will shutdown by itself in the normal case at the end of a page) |
| 2 | DWU (shutting this down stalls the DNC and therefore the HCU and above) |
| 3 | LLU (should already be halted due to PHI at end of last line of page) |
| 4 | TE (this is the only dot supplier likely to be running, halted by the HCU) |
| 5 | CDU (this is likely to already be halted due to end of contone band) |
| 6 | CFU, SFU, TFU, LBD (order unimportant, and should already be halted due to end of band) |
| 7 | HCU, DNC (order unimportant, should already have halted) |

10.2.10 Start of Next Page

These operations are typically performed before printing the next page:

1) Re-program the PEP Units via PCU command processing from DRAM based on page header.

2) Go to Start printing.

10.2.11 End of Document

1) Stop motor control.

10.2.12 Sleep Mode

The CPU can put different sections of SoPEC into sleep mode by writing to registers in the CPR block described in Section 18.

1) Instruct host PC via USB that SoPEC is about to sleep.

2) Store reusable authentication results in Power-Safe Storage (PSS).

3) Put SoPEC into defined sleep mode.

10.3 Normal Operation in a Multi-SoPEC System—ISCMaster SoPEC

In a multi-SoPEC system the host generally manages program and compressed page download to all the SoPECs. Inter-SoPEC communication is over local USB links, which will add a latency. The SoPEC with the USB connection to the host is the ISCMaster.

In a multi-SoPEC system one of the SoPECs will be the PrintMaster. This SoPEC must manage and control sensors and actuators e.g. motor control. These sensors and actuators could be distributed over all the SoPECs in the system. An ISCMaster SoPEC may also be the PrintMaster SoPEC.

In a multi-SoPEC system each printing SoPEC will generally have its own PRINTER_QA chip (or at least access to a PRINTER_QA chip that contains the SoPEC's SOPEC_id_key) to validate operating parameters and ink usage. The results of these operations may be communicated to the PrintMaster SoPEC.

In general the ISCMaster may need to be able to:

Send messages to the ISCSlaves which will cause the ISCSlaves to send their status to the ISCMaster.

Instruct the ISCSlaves to perform certain operations.

As the local USB links represent an insecure interface, commands issued by the ISCMaster are regarded as user mode commands. Supervisor mode code running on the SoPEC CPUs will allow or disallow these commands. The software protocol needs to be constructed with this in mind.

The ISCMaster will initiate all communication with the ISCSlaves.

SoPEC operation is broken up into a number of sections which are outlined below.

10.3.1 Powerup

Powerup describes SoPEC initialisation following an external reset or the watchdog timer system reset.

1) Execute reset sequence for complete SoPEC.
2) CPU boot from ROM.
3) Basic configuration of CPU peripherals, UDU and DIU. DRAM initialisation. USB device wakeup.
4) Download and authentication of program (see Section 10.5.3).
5) Execution of program from DRAM.
6) Retrieve operating parameters from PRINTER_QA and authenticate operating parameters. These parameters (or the program itself) will identify SoPEC as an ISCMaster.
7) Download and authenticate any further datasets (programs).
8) Send datasets (programs) to all attached ISCSlaves.
9) ISCMaster master SoPEC then waits for a short time to allow the authentication to take place on the ISCSlave SoPECs.
10) Each ISCSlave SoPEC is polled for the result of its program code authentication process.

10.3.2 Wakeup

The CPU can put different sections of SoPEC into sleep mode by writing to registers in the CPR block (chapter 18). This can include disabling both the DRAM and the CPU itself, and in some circumstances the UDU as well. Some system state is always stored in the power-safe storage (PSS) block.

Wakeup describes SoPEC recovery from sleep mode with the CPU and DRAM disabled. Wakeup can be initiated by a hardware reset, an event on the device or host USB interfaces, or an event on a GPIO pin.

A typical USB wakeup sequence is:

1) Execute reset sequence for sections of SoPEC in sleep mode.
2) CPU boot from ROM, if CPU-subsystem was in sleep mode.
3) Basic configuration of CPU peripherals and DIU, and DRAM initialisation, if required.
4) SoPEC identification from USB activity whether it is the ISCMaster (unless the SoPEC CPU has explicitly disabled this function).
5) Download and authentication of program using results in Power-Safe Storage (PSS) (see Section 10.5.3).
6) Execution of program from DRAM.
7) Retrieve operating parameters from PRINTER_QA and authenticate operating parameters.
8) Download and authenticate any further datasets (programs) using results in Power-Safe Storage (PSS) (see Section 10.5.3).
9) Following steps as per Powerup.

10.3.3 Print Initialization

This sequence is typically performed at the start of a print job following powerup or wakeup:

1) Check amount of ink remaining via QA chips which may be present on a ISCSlave SoPEC.
2) Download static data e.g. dither matrices, dead nozzle tables from host to DRAM.
3) Check printhead temperature, if required, and configure printhead with firing pulse profile etc. accordingly. Instruct ISCSlaves to also perform this operation.
4) Initiate printhead pre-heat sequence, if required. Instruct ISCSlaves to also perform this operation 10.3.4 First Page Download Buffer management in a SoPEC system is normally performed by the host.

1) The host communicates to the SoPEC CPU over the USB to check that DRAM space remaining is sufficient to download the first band to all SoPECs.
2) The host downloads the first band (with the page header) to each SoPEC, via the DRAM on the ISCMaster.
3) When the complete page header has been downloaded the SoPEC CPU processes the page header, calculates PEP register commands and write directly to PEP registers or to DRAM.
4) If PEP register commands have been written to DRAM, execute PEP commands from DRAM via PCU.

Remaining first page bands download and processing:

1) Check DRAM space remaining is sufficient to download the next band in all SoPECs.
2) Download the next band with the band header to each SoPEC via the DRAM on the ISCMaster.
3) When the complete band header has been downloaded, process the band header according to whichever band-related register updating mechanism is being used.

10.3.5 Start Printing

1) Wait until at least one band of the first page has been downloaded.
2) Start all the PEP Units by writing to their Go registers, via PCU commands executed from DRAM or direct CPU writes, in the suggested order defined in Table 12.
3) Print ready interrupt occurs (from PHI). Poll ISCSlaves until print ready interrupt.
4) Start motor control (which may be on an ISCSlave SoPEC), if first page, otherwise feed the next page. This step could occur before the print ready interrupt.
5) Drive LEDS, monitor paper status (which may be on an ISCSlave SoPEC).
6) Wait for page alignment via page sensor(s) GPIO interrupt (which may be on an ISCSlave SoPEC).
7) If the LineSyncMaster is a SoPEC its CPU instructs PHI to start producing master line syncs. Otherwise wait for an external device to produce line syncs.
8) Continue to download bands and process page and band headers for next page.

10.3.6 Next Page(s) Download

As for first page download, performed during printing of current page.

10.3.7 Between Bands

When the finished band flags are asserted band related registers in the CDU, LBD, TE need to be re-programmed before the subsequent band can be printed. The finished band flag interrupts the CPU to tell the CPU that the area of memory associated with the band is now free. Typically only 3-5 commands per decompression unit need to be executed.

These registers can be either:

Reprogrammed directly by the CPU after the band has finished

Update automatically from shadow registers written by the CPU while the previous band was being processed Alternatively, PCU commands can be set up in DRAM to update the registers without direct CPU intervention. The PCU commands can also operate by direct writes between bands, or via the shadow registers.

10.3.8 During Page Print

Typically during page printing ink usage is communicated to the QA chips.

1) Calculate ink printed (from PHI).
2) Decrement ink remaining (via QA chips).
3) Check amount of ink remaining (via QA chips). This operation may be better performed while the page is being printed rather than at the end of the page.

10.3.9 Page Finish

These operations are typically performed when the page is finished:

1) Page finished interrupt occurs from PHI. Poll ISCSlaves for page finished interrupts.
2) Shutdown the PEP blocks by de-asserting their Go registers in the suggested order in Table 13. This will set the PEP Unit state-machines to their startup states.
3) Communicate ink usage to QA chips, if required.

10.3.10 Start of Next Page

These operations are typically performed before printing the next page:

1) Re-program the PEP Units via PCU command processing from DRAM based on page header.
2) Go to Start printing.

10.3.11 End of Document

1) Stop motor control. This may be on an ISCSlave SoPEC.

10.3.12 Sleep Mode

The CPU can put different sections of SoPEC into sleep mode by writing to registers in the CPR block (see Section 18). This may be as a result of a command from the host or as a result of a timeout.

1) Inform host PC of which parts of SoPEC system are about to sleep.
2) Instruct ISCSlaves to enter sleep mode.
3) Store reusable cryptographic results in Power-Safe Storage (PSS).
4) Put ISCMaster SoPEC into defined sleep mode.

10.4 Normal Operation in a Multi-SoPEC System—ISCSlave SoPEC

This section the outline typical operation of an ISCSlave SoPEC in a multi-SoPEC system. ISCSlave SoPECs communicate with the ISCMaster SoPEC via local USB busses. Buffer management in a SoPEC system is normally performed by the host.

10.4.1 Powerup

Powerup describes SoPEC initialisation following an external reset or the watchdog timer system reset.

A typical powerup sequence is:

1) Execute reset sequence for complete SoPEC.
2) CPU boot from ROM.
3) Basic configuration of CPU peripherals, UDU and DIU. DRAM initialisation.
4) Download and authentication of program (see Section 10.5.3).
5) Execution of program from DRAM.
6) Retrieve operating parameters from PRINTER_QA and authenticate operating parameters.
7) SoPEC identification by sampling GPIO pins to determine ISCId. Communicate ISCId to ISCMaster.
8) Download and authenticate any further datasets.

10.4.2 Wakeup

The CPU can put different sections of SoPEC into sleep mode by writing to registers in the CPR block (chapter 18). This can include disabling both the DRAM and the CPU itself, and in some circumstances the UDU as well. Some system state is always stored in the power-safe storage (PSS) block.

Wakeup describes SoPEC recovery from sleep mode with the CPU and DRAM disabled. Wakeup can be initiated by a hardware reset, an event on the device or host USB interfaces, or an event on a GPIO pin.

A typical USB wakeup sequence is:

1) Execute reset sequence for sections of SoPEC in sleep mode.
2) CPU boot from ROM, if CPU-subsystem was in sleep mode.
3) Basic configuration of CPU peripherals and DIU, and DRAM initialisation, if required.
4) Download and authentication of program using results in Power-Safe Storage (PSS) (see Section 10.5.3).
5) Execution of program from DRAM.
6) Retrieve operating parameters from PRINTER_QA and authenticate operating parameters.
7) SoPEC identification by sampling GPIO pins to determine ISCId. Communicate ISCId to ISCMaster.
8) Download and authenticate any further datasets.

10.4.3 Print Initialization

This sequence is typically performed at the start of a print job following powerup or wakeup:

1) Check amount of ink remaining via QA chips.
2) Download static data e.g. dither matrices, dead nozzle tables via USB to DRAM.
3) Check printhead temperature, if required, and configure printhead with firing pulse profile etc. accordingly.
4) Initiate printhead pre-heat sequence, if required.

10.4.4 First Page Download

Buffer management in a SoPEC system is normally performed by the host via the ISCMaster.

1) Check DRAM space remaining is sufficient to download the first band.
2) The host downloads the first band (with the page header) to DRAM, via USB from the ISCMaster.
3) When the complete page header has been downloaded, process the page header, calculate PEP register commands and write directly to PEP registers or to DRAM.
4) If PEP register commands have been written to DRAM, execute PEP commands from DRAM via PCU.

Remaining first page bands download and processing:

1) Check DRAM space remaining is sufficient to download the next band.
2) The host downloads the first band (with the page header) to DRAM via USB from the ISCMaster.
3) When the complete band header has been downloaded, process the band header according to whichever band-related register updating mechanism is being used.

10.4.5 Start Printing

1) Wait until at least one band of the first page has been downloaded.
2) Start all the PEP Units by writing to their Go registers, via PCU commands executed from DRAM or direct CPU writes, in the order defined in Table 12.
3) Print ready interrupt occurs (from PHI). Communicate to PrintMaster via USB.
4) Start motor control, if attached to this ISCSlave, when requested by PrintMaster, if first page, otherwise feed next page. This step could occur before the print ready interrupt
5) Drive LEDS, monitor paper status, if on this ISCSlave SoPEC, when requested by PrintMaster
6) Wait for page alignment via page sensor(s) GPIO interrupt, if on this ISCSlave SoPEC, and send to PrintMaster.
7) Wait for line sync and commence printing.
8) Continue to download bands and process page and band headers for next page.

10.4.6 Next Page(s) Download

As for first band download, performed during printing of current page.

10.4.7 Between Bands

When the finished band flags are asserted band related registers in the CDU, LBD, TE need to be re-programmed before the subsequent band can be printed. The finished band flag interrupts the CPU to tell the CPU that the area of memory associated with the band is now free. Typically only 3-5 commands per decompression unit need to be executed.

These registers can be either:

Reprogrammed directly by the CPU after the band has finished

Update automatically from shadow registers written by the CPU while the previous band was being processed Alternatively, PCU commands can be set up in DRAM to update the registers without direct CPU intervention. The PCU commands can also operate by direct writes between bands, or via the shadow registers.

10.4.8 During Page Print

Typically during page printing ink usage is communicated to the QA chips.

1) Calculate ink printed (from PHI).
2) Decrement ink remaining (via QA chips).
3) Check amount of ink remaining (via QA chips). This operation may be better performed while the page is being printed rather than at the end of the page.

10.4.9 Page Finish

These operations are typically performed when the page is finished:

1) Page finished interrupt occurs from PHI. Communicate page finished interrupt to PrintMaster.
2) Shutdown the PEP blocks by de-asserting their Go registers in the suggested order in Table 13. This will set the PEP Unit state-machines to their startup states.
3) Communicate ink usage to QA chips, if required.

10.4.10 Start of Next Page

These operations are typically performed before printing the next page:

1) Re-program the PEP Units via PCU command processing from DRAM based on page header.
2) Go to Start printing.

10.4.11 End of Document

Stop motor control, if attached to this ISCSlave, when requested by PrintMaster.

10.4.12 Powerdown

In this mode SoPEC is no longer powered.

1) Powerdown ISCSlave SoPEC when instructed by ISCMaster.

10.4.13 Sleep

The CPU can put different sections of SoPEC into sleep mode by writing to registers in the CPR block (see Section 18). This may be as a result of a command from the host or ISCMaster or as a result of a timeout.

1) Store reusable cryptographic results in Power-Safe Storage (PSS).
2) Put SoPEC into defined sleep mode.

10.5 Security Use Cases

Please see the 'SoPEC Security Overview' document for a more complete description of SoPEC security issues. The SoPEC boot operation is described in the ROM chapter of the SoPEC hardware design specification, Section 19.2.

10.5.1 Communication with the QA Chips

Communication between SoPEC and the QA chips (i.e. INK_QA and PRINTER_QA) will take place on at least a per power cycle and per page basis. Communication with the QA chips has three principal purposes: validating the presence of genuine QA chips (i.e the printer is using approved consumables), validation of the amount of ink remaining in the cartridge and authenticating the operating parameters for the printer. After each page has been printed, SoPEC is expected to communicate the number of dots fired per ink plane to the QA chipset. SoPEC may also initiate decoy communications with the QA chips from time to time.

Process:

When validating ink consumption SoPEC is expected to principally act as a conduit between the PRINTER_QA and INK_QA chips and to take certain actions (basically enable or disable printing and report status to host PC) based on the result. The communication channels are insecure but all traffic is signed to guarantee authenticity.

Known Weaknesses

If the secret keys in the QA chips are exposed or cracked then the system, or parts of it, is compromised.

The SoPEC unique key must be kept safe from JTAG, scan or user code access if possible.

Assumptions:

[1] The QA chips are not involved in the authentication of downloaded SoPEC code

[2] The QA chip in the ink cartridge (INK_QA) does not directly affect the operation of the cartridge in any way i.e. it does not inhibit the flow of ink etc.

10.5.2 Authentication of Downloaded Code in a Single SoPEC System

Process:

1) SoPEC identifies where to download program from (LSS interface, USB or indirectly from Flash).
2) The program is downloaded to the embedded DRAM.
3) The CPU calculates a SHA-1 hash digest of the downloaded program.
4) The ResetSrc register in the CPR block is read to determine whether or not a power-on reset occurred.

5) If a power-on reset occurred the signature of the downloaded code (which needs to be in a known location such as the first or last N bytes of the downloaded code) is decrypted via RSA using the appropriate Silverbrook public boot0key stored in ROM. This decrypted signature is the expected SHA-1 hash of the accompanying program. If a power-on reset did not occur then the expected SHA-1 hash is retrieved from the PSS and the compute intensive decryption is not required.

6) The calculated and expected hash values are compared and if they match then the programs authenticity has been verified.

7) If the hash values do not match then the host PC is notified of the failure and the SoPEC will await a new program download.

8) If the hash values match then the CPU starts executing the downloaded program.

9) If, as is very likely, the downloaded program wishes to download subsequent programs (such as OEM code) it is responsible for ensuring the authenticity of everything it downloads. The downloaded program may contain public keys that are used to authenticate subsequent downloads, thus forming a hierarchy of authentication. The SoPEC ROM does not control these authentications—it is solely concerned with verifying that the first program downloaded has come from a trusted source.

10) At some subsequent point OEM code starts executing. The Silverbrook supervisor code acts as an O/S to the OEM user mode code. The OEM code must access most SoPEC functionality via system calls to the Silverbrook code.

11) The OEM code is expected to perform some simple 'turn on the lights' tasks after which the host PC is informed that the printer is ready to print and the Start Printing use case comes into play.

10.5.3 Authentication of Downloaded Code in a Multi-SoPEC System, USB Download Case 10.5.3.1 ISCMaster SoPEC Process:

1) The program is downloaded from the host to the embedded DRAM.

2) The CPU calculates a SHA-1 hash digest of the downloaded program.

3) The ResetSrc register in the CPR block is read to determine whether or not a power-on reset occurred.

4) If a power-on reset occurred the signature of the downloaded code (which needs to be in a known location such as the first or last N bytes of the downloaded code) is decrypted via RSA using the appropriate Silverbrook public boot0key stored in ROM. This decrypted signature is the expected SHA-1 hash of the accompanying program. If a power-on reset did not occur then the expected SHA-1 hash is retrieved from the PSS and the compute intensive decryption is not required.

5) The calculated and expected hash values are compared and if they match then the programs authenticity has been verified.

6) If the hash values do not match then the host PC is notified of the failure and the SoPEC will await a new program download.

7) If the hash values match then the CPU starts executing the downloaded program.

8) The downloaded program will contain directions on how to send programs to the ISCSlaves attached to the ISCMaster.

9) The ISCMaster downloaded program will poll each ISCSlave SoPEC for the results of its authentication process and to determine their ISCIds if required.

10) If any ISCSlave SoPEC reports a failed authentication then the ISCMaster communicates this to the host PC and the SoPEC will await a new program download.

11) If all ISCSlaves report successful authentication then the downloaded program is responsible for the downloading, authentication and distribution of subsequent programs within the multi-SoPEC system.

12) At some subsequent point OEM code starts executing. The Silverbrook supervisor code acts as an O/S to the OEM user mode code. The OEM code must access most SoPEC functionality via system calls to the Silverbrook code.

13) The OEM code is expected to perform some simple 'turn on the lights' tasks after which the master SoPEC determines that all SoPECs are ready to print. The host PC is informed that the printer is ready to print and the Start Printing use case comes into play.

10.5.3.2 ISCSlave SoPEC Process:

1) When the CPU comes out of reset the UDU is already configured to receive data from the USB.

2) The program is downloaded (via USB) to embedded DRAM.

3) The CPU calculates a SHA-1 hash digest of the downloaded program.

4) The ResetSrc register in the CPR block is read to determine whether or not a power-on reset occurred.

5) If a power-on reset occurred the signature of the downloaded code (which needs to be in a known location such as the first or last N bytes of the downloaded code) is decrypted via RSA using the appropriate Silverbrook public boot0key stored in ROM. This decrypted signature is the expected SHA-1 hash of the accompanying program. The encryption algorithm is likely to be a public key algorithm such as RSA. If a power-on reset did not occur then the expected SHA-1 hash is retrieved from the PSS and the compute intensive decryption is not required.

6) The calculated and expected hash values are compared and if they match then the programs authenticity has been verified.

7) If the hash values do not match, then the ISCSlave device will await a new program again 8) If the hash values match then the CPU starts executing the downloaded program.

9) It is likely that the downloaded program will communicate the result of its authentication process to the ISCMaster. The downloaded program is responsible for determining the SoPECs ISCId, receiving and authenticating any subsequent programs.

10) At some subsequent point OEM code starts executing. The Silverbrook supervisor code acts as an O/S to the OEM user mode code. The OEM code must access most SoPEC functionality via system calls to the Silverbrook code.

11) The OEM code is expected to perform some simple 'turn on the lights' tasks after which the master SoPEC is informed that this slave is ready to print. The Start Printing use case then comes into play.

10.5.4 Authentication and Upgrade of Operating Parameters for a Printer

The SoPEC IC will be used in a range of printers with different capabilities (e.g. A3/A4 printing, printing speed, resolution etc.). It is expected that some printers will also have a software upgrade capability which would allow a user to purchase a license that enables an upgrade in their printer's capabilities (such as print speed). To facilitate this it must be possible to securely store the operating parameters in the PRINTER_QA chip, to securely communicate these parameters to the SoPEC and to securely reprogram the parameters in the event of an upgrade. Note that each printing SoPEC (as opposed to a SoPEC that is only used for the storage of data) will have its own PRINTER_QA chip (or at least access to a PRINTER_QA that contains the SoPEC's SoPEC_id_key). Therefore both ISCMaster and ISCSlave SoPECs will need to authenticate operating parameters.

Process:

1) Program code is downloaded and authenticated as described in sections 10.5.2 and 10.5.3 above.
2) The program code has a function to create the SoPEC_id_key from the unique SoPEC_id that was programmed when the SoPEC was manufactured.
3) The SoPEC retrieves the signed operating parameters from its PRINTER_QA chip. The PRINTER_QA chip uses the SoPEC_id_key (which is stored as part of the pairing process executed during printhead assembly manufacture & test) to sign the operating parameters which are appended with a random number to thwart replay attacks.
4) The SoPEC checks the signature of the operating parameters using its SoPEC_id_key. If this signature authentication process is successful then the operating parameters are considered valid and the overall boot process continues. If not the error is reported to the host PC.

10.6 Miscellaneous Use Cases

There are many miscellaneous use cases such as the following examples. Software running on the SoPEC CPU or host will decide on what actions to take in these scenarios.

10.6.1 Disconnect/Re-Connect of QA Chips.

1) Disconnect of a QA chip between documents or if ink runs out mid-document.
2) Re-connect of a QA chip once authenticated e.g. ink cartridge replacement should allow the system to resume and print the next document 10.6.2 Page Arrives Before Print Ready Interrupt.

1) Engage clutch to stop paper until print ready interrupt occurs.

10.6.3 Dead-Nozzle Table Upgrade

This sequence is typically performed when dead nozzle information needs to be updated by performing a printhead dead nozzle test.

1) Run printhead nozzle test sequence
2) Either host or SoPEC CPU converts dead nozzle information into dead nozzle table.
3) Store dead nozzle table on host.
4) Write dead nozzle table to SoPEC DRAM.

10.7 Failure Mode Use Cases 10.7.1 System Errors and Security Violations

System errors and security violations are reported to the SoPEC CPU and host. Software running on the SoPEC CPU or host will then decide what actions to take.

Silverbrook code authentication failure.

1) Notify host PC of authentication failure.
2) Abort print run.

OEM code authentication failure.

1) Notify host PC of authentication failure.
2) Abort print run.

Invalid QA chip(s).

1) Report to host PC.
2) Abort print run.

MMU security violation interrupt.

1) This is handled by exception handler.
2) Report to host PC
3) Abort print run.

Invalid address interrupt from PCU.

1) This is handled by exception handler.
2) Report to host PC.
3) Abort print run.

Watchdog timer interrupt.

1) This is handled by exception handler.
2) Report to host PC.
3) Abort print run.

Host PC does not acknowledge message that SoPEC is about to power down.

1) Power down anyway.

10.7.2 Printing Errors

Printing errors are reported to the SoPEC CPU and host. Software running on the host or SoPEC CPU will then decide what actions to take.

Insufficient space available in SoPEC compressed band-store to download a band.

1) Report to the host PC.

Insufficient ink to print.

1) Report to host PC.

Page not downloaded in time while printing.

1) Buffer underrun interrupt will occur.
2) Report to host PC and abort print run.

JPEG decoder error interrupt.

1) Report to host PC.CPU Subsystem

11 Central Processing Unit (CPU)

11.1 Overview

The CPU block consists of the CPU core, caches, MMU, RDU and associated logic. The principal tasks for the program running on the CPU to fulfill in the system are:

Communications:

- Control the flow of data to and from the USB interfaces to and from the DRAM
- Communication with the host via USB
- Communication with other USB devices (which may include other SoPECs in the system, digital cameras, additional communication devices such as ethernet-to-USB chips) when SoPEC is functioning as a USB host
- Communication with other devices (utilizing the MMI interface block) via miscellaneous protocols (including but not limited to Parallel Port, Generic 68K/i960 CPU interfaces, serial interfaces Intel SBB, Motorola SPI etc.).
- Running the USB device drivers
- Running additional protocol stacks (such as ethernet)

PEP Subsystem Control:

- Page and band header processing (may possibly be performed on host PC)
- Configure printing options on a per band, per page, per job or per power cycle basis
- Initiate page printing operation in the PEP subsystem

- Retrieve dead nozzle information from the printhead and forward to the host PC or process locally
- Select the appropriate firing pulse profile from a set of predefined profiles based on the printhead characteristics
- Retrieve printhead information (from printhead and associated serial flash)

Figure 17:
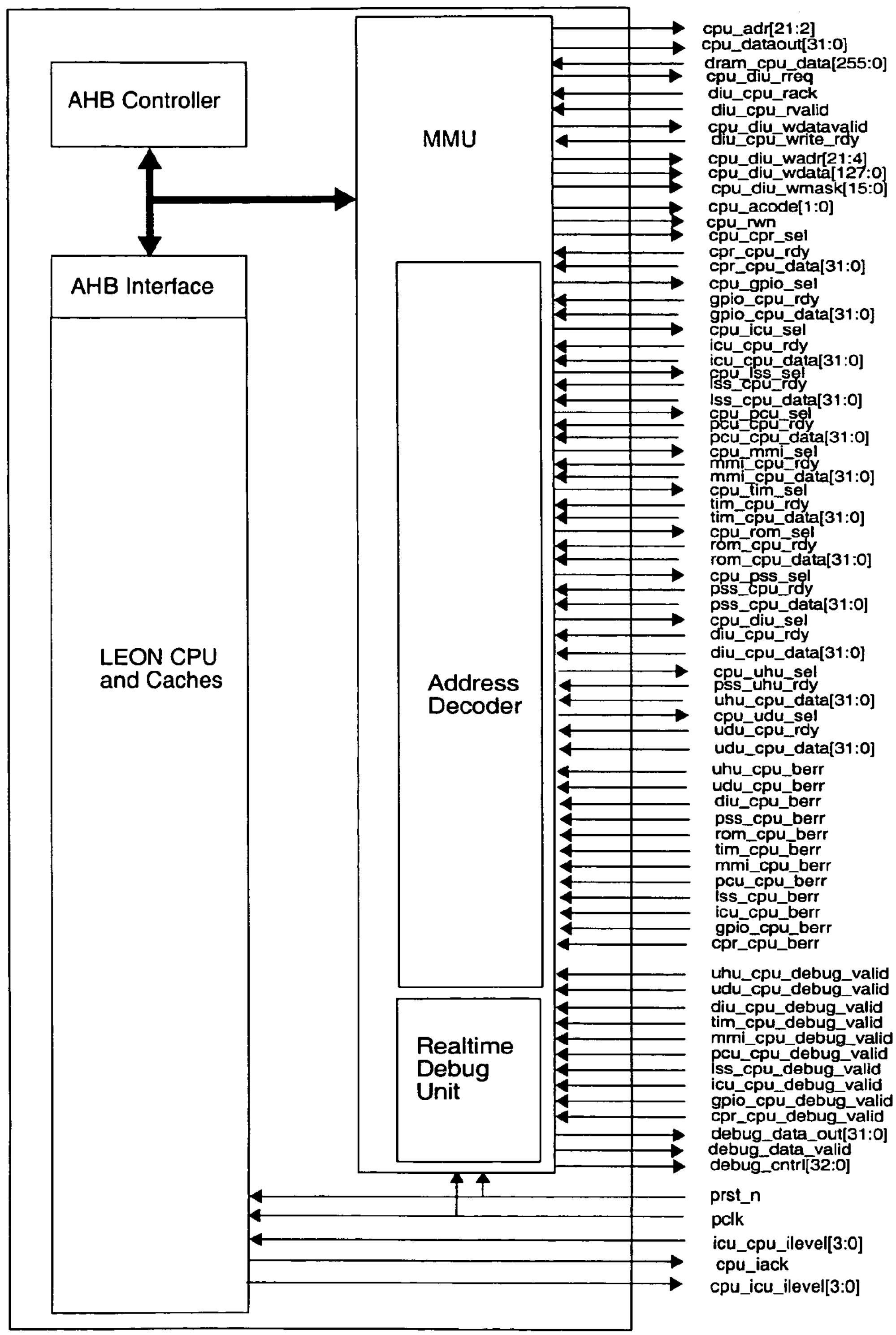
FIG. 17. CPU block diagram

Security:

- Authenticate downloaded program code
- Authenticate printer operating parameters
- Authenticate consumables via the PRINTER_QA and INK_QA chips
- Monitor ink usage
- Isolation of OEM code from direct access to the system resources Other:

- Drive the printer motors using the GPIO pins
- Monitoring the status of the printer (paper jam, tray empty etc.)
- Driving front panel LEDs and/or other display devices
- Perform post-boot initialisation of the SoPEC device
- Memory management (likely to be in conjunction with the host PC)
- Handling higher layer protocols for interfaces implemented with the MMI
- Image processing functions such as image scaling, cropping, rotation, white-balance, color space conversion etc. for printing images directly from digital cameras (e.g. via PictBridge application software)
- Miscellaneous housekeeping tasks To control the Print Engine Pipeline the CPU is required to provide a level of performance at least equivalent to a 16-bit Hitachi H8-3664 microcontroller running at 16 MHz. An as yet undetermined amount of additional CPU performance is needed to perform the other tasks, as well as to provide the potential for such activity as Netpage page assembly and processing, RIPing etc. The extra performance required is dominated by the signature verification task, direct camera printing image processing functions (i.e. color space conversion) and the USB (host and device) management task. A number of CPU cores have been evaluated and the LEON P1754 is considered to be the most appropriate solution. A diagram of the CPU block is shown in FIG. 17 below.

11.2 Definitions of I/Os

TABLE 14

CPU Subsystem I/Os

| Port name | Pins | I/O | Description |
|---|---|---|---|
| | | | Clocks and Resets |
| prst_n | 1 | In | Global reset. Synchronous to pclk, active low. |
| Pclk | 1 | In | Global clock |
| | | | CPU to DIU DRAM interface |
| Cpu_adr[21:2] | 20 | Out | Address bus for both DRAM and peripheral access |
| Dram cpu data[255:0] | 256 | In | Read data from the DRAM |
| Cpu_diu_rreq | 1 | Out | Read request to the DIU DRAM |
| Diu_cpu_rack | 1 | In | Acknowledge from DIU that read request has been accepted. |
| Diu_cpu_rvalid | 1 | In | Signal from DIU telling the CPU that valid read data is on the dram_cpu_data bus |
| Cpu_diu_wdatavalid | 1 | Out | Signal from the CPU to the DIU indicating that the data currently on the cpu_diu_wdata bus is valid and should be committed to the DIU posted write buffer |
| Diu_cpu_write_rdy | 1 | In | Signal from the DIU indicating that the posted write buffer is empty |
| cpu_diu_wdadr[21:4] | 18 | Out | Write address bus to the DIU |
| cpu_diu_wdata[127:0] | 128 | Out | Write data bus to the DIU |
| cpu_diu_wmask[15:0] | 16 | Out | Write mask for the cpu_diu_wdata bus. Each bit corresponds to a byte of the 128-bit cpu_diu_wdata bus. |
| | | | CPU to peripheral blocks |
| Cpu_rwn | 1 | Out | Common read/not-write signal from the CPU |
| Cpu_acode[1:0] | 2 | Out | CPU access code signals.<br>cpu_acode[0] - Program (0)/Data (1) access<br>cpu_acode[1] - User (0)/Supervisor (1) access |
| Cpu_dataout[31:0] | 32 | Out | Data out to the peripheral blocks. This is driven at the same time as the cpu_adr and request signals. |
| Cpu_cpr_sel | 1 | Out | CPR block select. |
| Cpr_cpu_rdy | 1 | In | Ready signal to the CPU. When cpr_cpu_rdy is high it indicates the last cycle of the access. For a write cycle this means cpu_dataout has been registered by the CPR block and for a read cycle this means the data on cpr_cpu_data is valid. |
| Cpr_cpu_berr | 1 | In | CPR bus error signal to the CPU. |
| Cpr_cpu_data[31:0] | 32 | In | Read data bus from the CPR block |
| Cpu_gpio_sel | 1 | Out | GPIO block select. |
| gpio_cpu_rdy | 1 | In | GPIO ready signal to the CPU. |
| gpio_cpu_berr | 1 | In | GPIO bus error signal to the CPU. |
| gpio_cpu_data[31:0] | 32 | In | Read data bus from the GPIO block |
| Cpu_icu_sel | 1 | Out | ICU block select. |

TABLE 14-continued

CPU Subsystem I/Os

| Port name | Pins | I/O | Description |
|---|---|---|---|
| Icu_cpu_rdy | 1 | In | ICU ready signal to the CPU. |
| Icu_cpu_berr | 1 | In | ICU bus error signal to the CPU. |
| Icu_cpu_data[31:0] | 32 | In | Read data bus from the ICU block |
| Cpu_lss_sel | 1 | Out | LSS block select. |
| lss_cpu_rdy | 1 | In | LSS ready signal to the CPU. |
| lss_cpu_berr | 1 | In | LSS bus error signal to the CPU. |
| lss_cpu_data[31:0] | 32 | In | Read data bus from the LSS block |
| Cpu_pcu_sel | 1 | Out | PCU block select. |
| Pcu_cpu_rdy | 1 | In | PCU ready signal to the CPU. |
| Pcu_cpu_berr | 1 | In | PCU bus error signal to the CPU. |
| Pcu_cpu_data[31:0] | 32 | In | Read data bus from the PCU block |
| Cpu_mmi_sel | 1 | Out | MMI block select. |
| mmi_cpu_rdy | 1 | In | MMI ready signal to the CPU. |
| mmi_cpu_berr | 1 | In | MMI bus error signal to the CPU. |
| mmi_cpu_data[31:0] | 32 | In | Read data bus from the MMI block |
| Cpu_tim_sel | 1 | Out | Timers block select. |
| Tim_cpu_rdy | 1 | In | Timers block ready signal to the CPU. |
| Tim_cpu_berr | 1 | In | Timers bus error signal to the CPU. |
| Tim_cpu_data[31:0] | 32 | In | Read data bus from the Timers block |
| Cpu_rom_sel | 1 | Out | ROM block select. |
| Rom_cpu_rdy | 1 | In | ROM block ready signal to the CPU. |
| Rom_cpu_berr | 1 | In | ROM bus error signal to the CPU. |
| Rom_cpu_data[31:0] | 32 | In | Read data bus from the ROM block |
| Cpu_pss_sel | 1 | Out | PSS block select. |
| Pss_cpu_rdy | 1 | In | PSS block ready signal to the CPU. |
| Pss_cpu_berr | 1 | In | PSS bus error signal to the CPU. |
| Pss_cpu_data[31:0] | 32 | In | Read data bus from the PSS block |
| Cpu_diu_sel | 1 | Out | DIU register block select. |
| Diu_cpu_rdy | 1 | In | DIU register block ready signal to the CPU. |
| Diu_cpu_berr | 1 | In | DIU bus error signal to the CPU. |
| Diu_cpu_data[31:0] | 32 | In | Read data bus from the DIU block |
| Cpu_uhu_sel | 1 | Out | UHU register block select. |
| Uhu_cpu_rdy | 1 | In | UHU register block ready signal to the CPU. |
| Uhu_cpu_berr | 1 | In | UHU bus error signal to the CPU. |
| Uhu_cpu_data[31:0] | 32 | In | Read data bus from the UHU block |
| Cpu_udu_sel | 1 | Out | UDU register block select. |
| Udu_cpu_rdy | 1 | In | UDU register block ready signal to the CPU. |
| Udu_cpu_berr | 1 | In | UDU bus error signal to the CPU. |
| Udu_cpu_data[31:0] | 32 | In | Read data bus from the UDU block |
| | | | Interrupt signals |
| Icu_cpu_ilevel[3:0] | 3 | In | An interrupt is asserted by driving the appropriate priority level on icu_cpu_ilevel. These signals must remain asserted until the CPU executes an interrupt acknowledge cycle. |
| Cpu_icu_ilevel[3:0] | 3 | Out | Indicates the level of the interrupt the CPU is acknowledging when cpu_iack is high |
| Cpu_iack | 1 | Out | Interrupt acknowledge signal. The exact timing depends on the CPU core implementation |
| | | | Debug signals |
| diu_cpu_debug_valid | 1 | In | Signal indicating the data on the diu_cpu_data bus is valid debug data. |
| tim_cpu_debug_valid | 1 | In | Signal indicating the data on the tim_cpu_data bus is valid debug data. |
| mmi_cpu_debug_valid | 1 | In | Signal indicating the data on the mmi_cpu_data bus is valid debug data. |
| pcu_cpu_debug_valid | 1 | In | Signal indicating the data on the pcu_cpu_data bus is valid debug data. |
| lss_cpu_debug_valid | 1 | In | Signal indicating the data on the lss_cpu_data bus is valid debug data. |
| icu_cpu_debug_valid | 1 | In | Signal indicating the data on the icu_cpu_data bus is valid debug data. |
| gpio_cpu_debug_valid | 1 | In | Signal indicating the data on the gpio_cpu_data bus is valid debug data. |
| cpr_cpu_debug_valid | 1 | In | Signal indicating the data on the cpr_cpu_data bus is valid debug data. |
| uhu_cpu_debug_valid | 1 | In | Signal indicating the data on the uhu_cpu_data bus is valid debug data. |
| udu_cpu_debug_valid | 1 | In | Signal indicating the data on the udu_cpu_data bus is valid debug data. |
| debug_data_out | 32 | Out | Output debug data to be muxed on to the GPIO pins |
| debug_data_valid | 1 | Out | Debug valid signal indicating the validity of the data on debug_data_out. This signal is used in all debug configurations |

TABLE 14-continued

| CPU Subsystem I/Os | | | |
|---|---|---|---|
| Port name | Pins | I/O | Description |
| debug_cntrl | 33 | Out | Control signal for each debug data line indicating whether or not the debug data should be selected by the pin mux |

11.2

11.3 Realtime Requirements

The SoPEC realtime requirements can be split into three categories: hard, firm and soft 11.3.1 Hard Realtime Requirements Hard requirements are tasks that must be completed before a certain deadline or failure to do so will result in an error perceptible to the user (printing stops or functions incorrectly). There are three hard realtime tasks:

Motor control: The motors which feed the paper through the printer at a constant speed during printing are driven directly by the SoPEC device. The generation of these signals is handled by the GPIO hardware (see section 14 for more details) but the CPU is responsible for enabling these signals (i.e. to start or stop the motors) and coordinating the movement of the paper with the printing operation of the printhead.

Buffer management: Data enters the SoPEC via the USB (device/host) or MMI at an uneven rate and is consumed by the PEP subsystem at a different rate. The CPU is responsible for managing the DRAM buffers to ensure that neither overrun nor underrun occur. In some cases buffer management is performed under the direction of the host.

Band processing: In certain cases PEP registers may need to be updated between bands. As the timing requirements are most likely too stringent to be met by direct CPU writes to the PCU a more likely scenario is that a set of shadow registers will programmed in the compressed page units before the current band is finished, copied to band related registers by the finished band signals and the processing of the next band will continue immediately. An alternative solution is that the CPU will construct a DRAM based set of commands (see section 23.8.5 for more details) that can be executed by the PCU. The task for the CPU here is to parse the band headers stored in DRAM and generate a DRAM based set of commands for the next number of bands. The location of the DRAM based set of commands must then be written to the PCU before the current band has been processed by the PEP subsystem. It is also conceivable (but currently considered unlikely) that the host PC could create the DRAM based commands. In this case the CPU will only be required to point the PCU to the correct location in DRAM to execute commands from.

11.3.2 Firm Requirements

Firm requirements are tasks that should be completed by a certain time or failure to do so will result in a degradation of performance but not an error. The majority of the CPU tasks for SoPEC fall into this category including all interactions with the QA chips, program authentication, page feeding, configuring PEP registers for a page or job, determining the firing pulse profile, communication of printer status to the host over the USB and the monitoring of ink usage. Compute-intensive operations for the CPU include authentication of downloaded programs and messages, and image processing functions such as cropping, rotation, white-balance, color-space conversion etc. for printing images directly from digital cameras (e.g. via PictBridge application software). Initial investigations indicate that the LEON processor, running at 192 MHz, will easily perform three authentications in under a second.

TABLE 15

| Expected firm requirements | |
|---|---|
| Requirement | Duration |
| Power-on to start of printing first page [USB and slave SoPEC enumeration, 3 or more RSA signature verifications, code and compressed page data download and chip initialisation] | ~3 secs |
| Wakeup from sleep mode to start printing [3 or more SHA-1/RSA operations, code and compressed page data download and chip re-initialisation | ~2 secs |
| Authenticate ink usage in the printer | ~0.5 secs |
| Determining firing pulse profile | ~0.1 secs |
| Page feeding, gap between pages | OEM dependent |
| Communication of printer status to host PC | ~10 ms |
| Configuring PEP registers | |

11.3.3 Soft Requirements

Soft requirements are tasks that need to be done but there are only light time constraints on when they need to be done. These tasks are performed by the CPU when there are no pending higher priority tasks. As the SoPEC CPU is expected to be lightly loaded these tasks will mostly be executed soon after they are scheduled.

11.4 Bus Protocols

As can be seen from FIG. 17 above there are different buses in the CPU block and different protocols are used for each bus. There are three buses in operation:

11.4.1 AHB Bus

The LEON CPU core uses an AMBA2.0 AHB bus to communicate with memory and peripherals (usually via an APB bridge). See the AMBA specification, section 5 of the LEON users manual and section 11.6.6.1 of this document for more details.

11.4.2 CPU to DIU Bus

This bus conforms to the DIU bus protocol described in Section 22.14.8. Note that the address bus used for DIU reads (i.e. cpu_adr(21:2)) is also that used for CPU subsystem with bus accesses while the write address bus (cpu_diu_wadr) and the read and write data buses (dram_cpu_data and cpu_diu_wdata) are private buses between the CPU and the DIU. The effective bus width differs between a read (256 bits) and a write (128 bits). As certain CPU instructions may require byte write access this will need to be supported by both the DRAM write buffer (in the AHB bridge) and the DIU. See section 11.6.6.1 for more details.

11.4.3 CPU Subsystem Bus

For access to the on-chip peripherals a simple bus protocol is used. The MMU must first determine which particular block is being addressed (and that the access is a valid one) so that the appropriate block select signal can be generated. During a write access CPU write data is driven out with the address and block select signals in the first cycle of an access. The addressed slave peripheral responds by asserting its ready signal indicating that it has registered the write data and the access can complete. The write data bus (cpu_dataout) is common to all peripherals and is independent of the cpu_diu_wdata bus (which is a private bus between the CPU and DRAM). A read access is initiated by driving the address and select signals during the first cycle of an access. The addressed slave responds by placing the read data on its bus and asserting its ready signal to indicate to the CPU that the read data is valid. Each block has a separate point-to-point data bus for read accesses to avoid the need for a tri-stateable bus.

All peripheral accesses are 32-bit (Programming note: char or short C types should not be used to access peripheral registers). The use of the ready signal allows the accesses to be of variable length. In most cases accesses will complete in two cycles but three or four (or more) cycles accesses are likely for PEP blocks or IP blocks with a different native bus interface. All PEP blocks are accessed via the PCU which acts as a bridge. The PCU bus uses a similar protocol to the CPU subsystem bus but with the PCU as the bus master.

The duration of accesses to the PEP blocks is influenced by whether or not the PCU is executing commands from DRAM. As these commands are essentially register writes the CPU access will need to wait until the PCU bus becomes available when a register access has been completed. This could lead to the CPU being stalled for up to 4 cycles if it attempts to access PEP blocks while the PCU is executing a command. The size and probability of this penalty is sufficiently small to have no significant impact on performance.

In order to support user mode (i.e. OEM code) access to certain peripherals the CPU subsystem bus propagates the CPU function code signals (cpu_acode[1:0]). These signals indicate the type of address space (i.e. User/Supervisor and Program/Data) being accessed by the CPU for each access. Each peripheral must determine whether or not the CPU is in the correct mode to be granted access to its registers and in some cases (e.g. Timers and GPIO blocks) different access permissions can apply to different registers within the block. If the CPU is not in the correct mode then the violation is flagged by asserting the block's bus error signal (block_cpu_berr) with the same timing as its ready signal (block_cpu_rdy) which remains deasserted. When this occurs invalid read accesses should return 0 and write accesses should have no effect.

Figure 18:
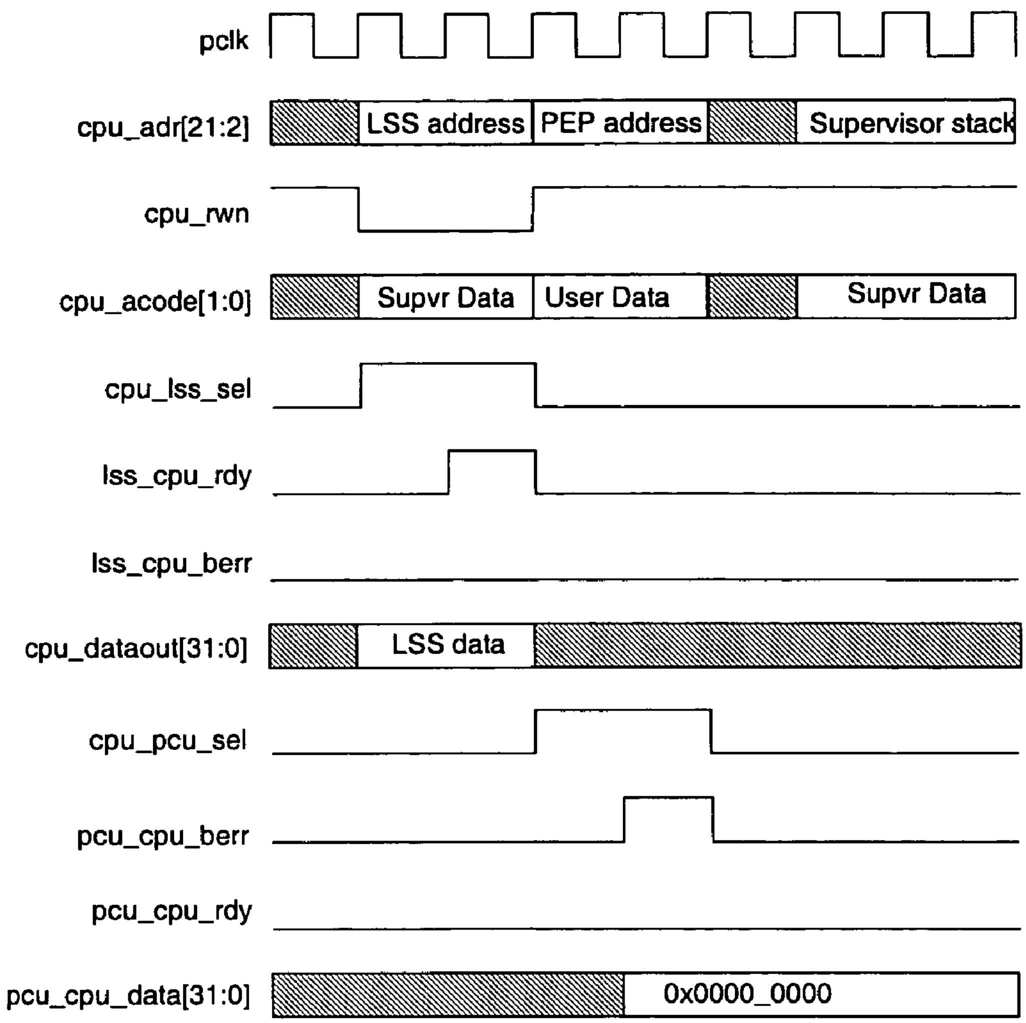
FIG. 18. CPU bus transactions

FIG. 18 shows two examples of the peripheral bus protocol in action. A write to the LSS block from code running in supervisor mode is successfully completed. This is immediately followed by a read from a PEP block via the PCU from code running in user mode. As this type of access is not permitted the access is terminated with a bus error. The bus error exception processing then starts directly after this—no further accesses to the peripheral should be required as the exception handler should be located in the DRAM.

Each peripheral acts as a slave on the CPU subsystem bus and its behavior is described by the state machine in section 11.4.3.1

11.4.3.1 CPU Subsystem Bus Slave State Machine

Figure 19:
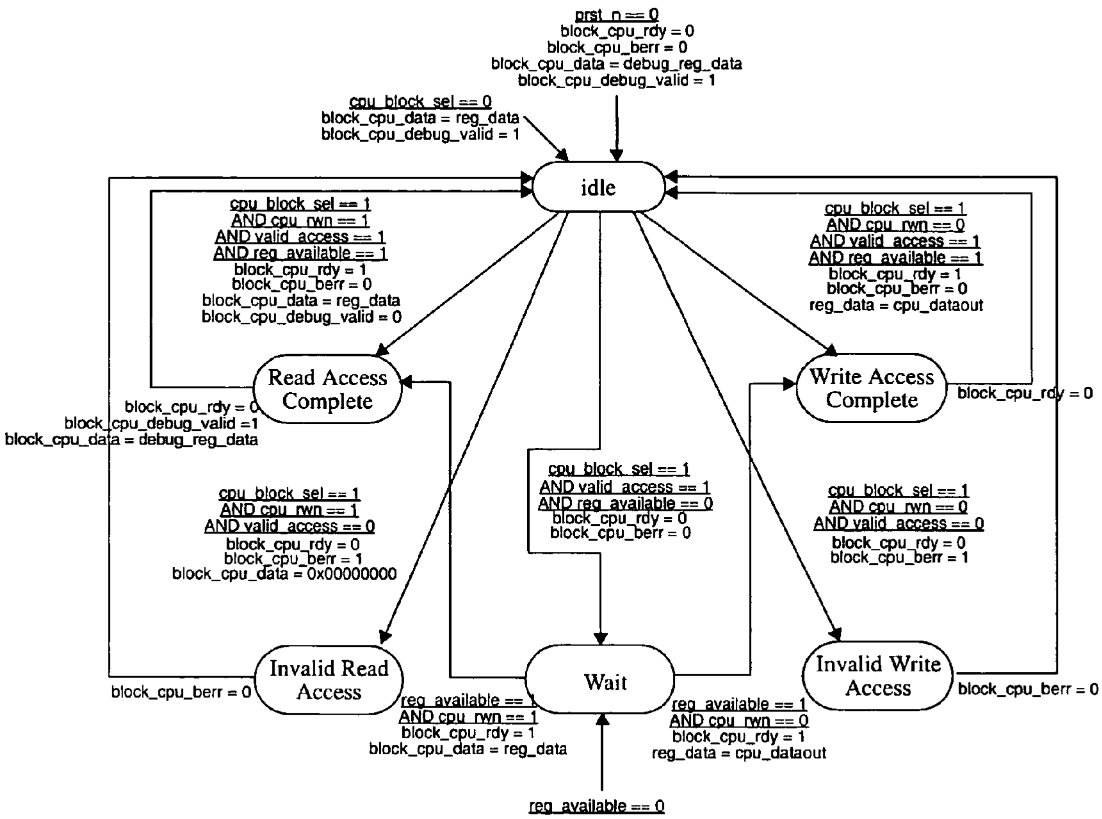
FIG. 19. State machine for a CPU subsystem slave

CPU subsystem bus slave operation is described by the state machine in FIG. 19. This state machine will be implemented in each CPU subsystem bus slave. The only new signals mentioned here are the valid_access and reg_available signals. The valid_access is determined by comparing the cpu_acode value with the block or register (in the case of a block that allow user access on a per register basis such as the GPIO block) access permissions and asserting valid_access if the permissions agree with the CPU mode. The reg_available signal is only required in the PCU or in blocks that are not capable of two-cycle access (e.g. blocks containing imported IP with different bus protocols). In these blocks the reg_available signal is an internal signal used to insert wait states (by delaying the assertion of block_cpu_rdy) until the CPU bus slave interface can gain access to the register.

When reading from a register that is less than 32 bits wide the CPU subsystem's bus slave should return zeroes on the unused upper bits of the block_cpu_data bus.

To support debug mode the contents of the register selected for debug observation, debug_reg, are always output on the block_cpu_data bus whenever a read access is not taking place. See section 11.8 for more details of debug operation.

11.5 LEON CPU

The LEON processor is an open-source implementation of the IEEE-1754 standard (SPARC V8) instruction set. LEON is available from and actively supported by Gaisler Research (www.gaisler.com).

The following features of the LEON-2 processor are utilized on SoPEC:

- IEEE-1754 (SPARC V8) compatible integer unit with 5-stage pipeline
- Separate instruction and data caches (Harvard architecture), each a 1 Kbyte direct mapped cache
- 16×16 hardware multiplier (4-cycle latency) and radix-2 divider to implement the MUL/DIV/MAC instructions in hardware
- Full Implementation of AMBA-2.0 AHB On-Chip Bus The standard release of LEON incorporates a number of peripherals and support blocks which are not included on SoPEC. The LEON core as used on SoPEC consists of: 1) the LEON integer unit, 2) the instruction and data caches (1 Kbyte each), 3) the cache control logic, 4) the AHB interface and 5) possibly the AHB controller (although this functionality may be implemented in the LEON AHB bridge).

The version of the LEON database that the SoPEC LEON components are sourced from is LEON2-1.0.7 although later versions can be used if they offer worthwhile functionality or bug fixes that affect the SoPEC design.

The LEON core is clocked using the system clock, pclk, and reset using the prst_n_section[1] signal. The ICU asserts all the hardware interrupts using the protocol described in section 11.9. The LEON floating-point unit is not required. SoPEC will use the recommended 8 register window configuration.

11.5.1 LEON Registers

Only two of the registers described in the LEON manual are implemented on SoPEC—the LEON configuration register and the Cache Control Register (CCR). The addresses of these registers are shown in Table 19. The configuration register bit fields are described below and the CCR is described in section 11.7.1.1.

11.5.1.1 LEON Configuration Register

The LEON configuration register allows runtime software to determine the settings of LEONs various configuration options. This is a read-only register whose value for the SoPEC ASIC will be 0x1271_8F00.

Further descriptions of many of the bitfields can be found in the LEON manual. The values used for SoPEC are highlighted in bold for clarity.

TABLE 16

LEON Configuration Register

| Field Name | bit(s) | Description |
|---|---|---|
| WriteProtection | 1:0 | Write protection type.<br>**00 - none**<br>01 - standard |
| PCICore | 3:2 | PCI core type<br>**00 - none**<br>01 - InSilicon<br>10 - ESA<br>11 - Other |
| FPUType | 5:4 | FPU type.<br>**00 - none**<br>01 - Meiko |
| MemStatus | 6 | **0 - No memory status and failing address register present**<br>1 - Memory status and failing address register present |
| Watchdog | 7 | **0 - Watchdog timer not present (Note this refers to the LEON watchdog timer in the LEON timer block).**<br>1 - Watchdog timer present |
| UMUL/SMUL | 8 | 0 - UMUL/SMUL instructions are not implemented<br>**1 - UMUL/SMUL instructions are implemented** |
| UDIV/SDIV | 9 | 0 - UDIV/SDIV instructions are not implemented<br>**1 - UDIV/SDIV instructions are implemented** |
| DLSZ | 11:10 | Data cache line size in 32-bit words:<br>00 - 1 word<br>01 - 2 words<br>10 - 4 words<br>**11 - 8 words** |
| DCSZ | 14:12 | Data cache size in kBbytes = $2^{DCSZ}$. **SoPEC DCSZ = 0.** |
| ILSZ | 16:15 | Instruction cache line size in 32-bit words:<br>00 - 1 word<br>01 - 2 words<br>10 - 4 words<br>**11 - 8 words** |
| ICSZ | 19:17 | Instruction cache size in kBbytes = $2^{ICSZ}$. **SoPEC ICSZ = 0.** |
| RegWin | 24:20 | The implemented number of SPARC register windows − 1. **SoPEC value = 7.** |
| UMAC/SMAC | 25 | 0 - UMAC/SMAC instructions are not implemented<br>**1 - UMAC/SMAC instructions are implemented** |
| Watchpoints | 28:26 | The implemented number of hardware watchpoints. **SoPEC value = 4.** |
| SDRAM | 29 | **0 - SDRAM controller not present**<br>1 - SDRAM controller present |
| DSU | 30 | **0 - Debug Support Unit not present**<br>1 - Debug Support Unit present |
| Reserved | 31 | Reserved. **SoPEC value = 0.** |

11.6 Memory Management Unit (MMU)

Memory Management Units are typically used to protect certain regions of memory from invalid accesses, to perform address translation for a virtual memory system and to maintain memory page status (swapped-in, swapped-out or unmapped)

Figure 20:
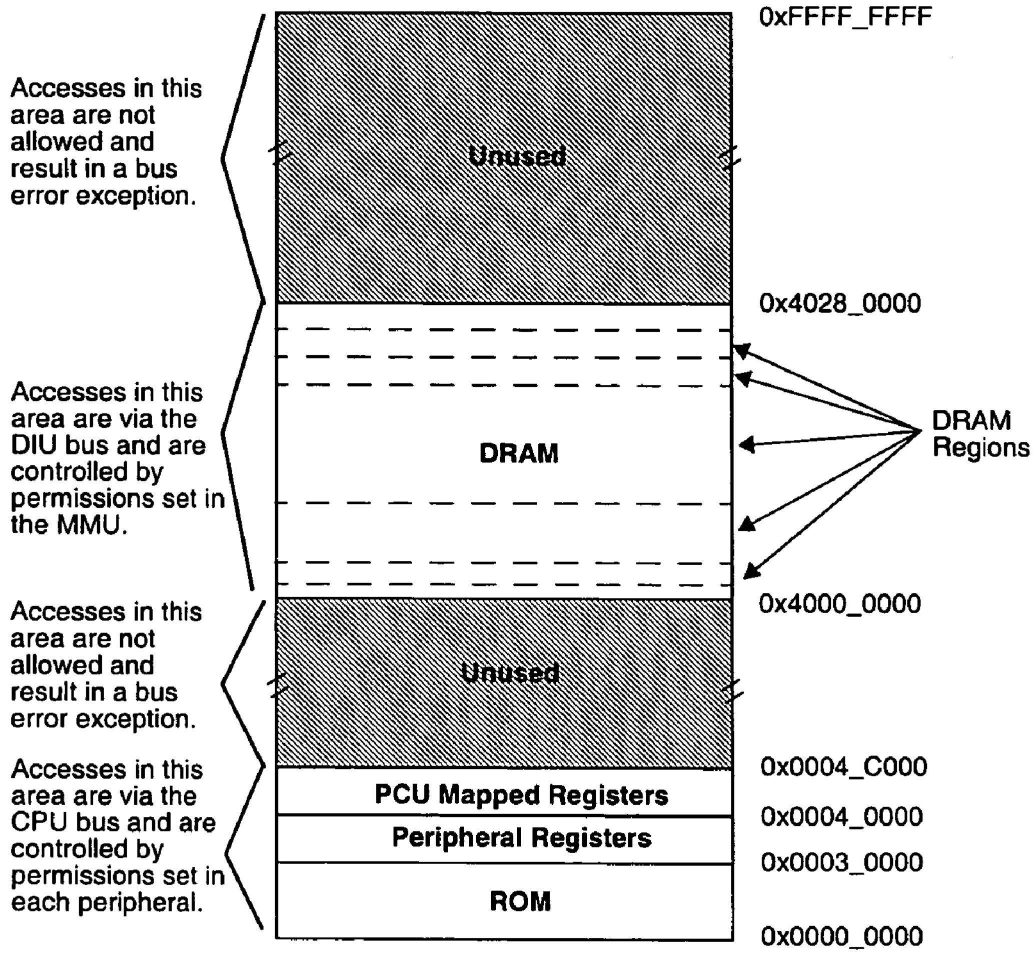
FIG. 20. Proposed SoPEC CPU memory map (not to scale)

The SoPEC MMU is a much simpler affair whose function is to ensure that all regions of the SoPEC memory map are adequately protected. The MMU does not support virtual memory and physical addresses are used at all times. The SoPEC MMU supports a full 32-bit address space. The SoPEC memory map is depicted in FIG. 20 below.

The MMU selects the relevant bus protocol and generates the appropriate control signals depending on the area of memory being accessed. The MMU is responsible for performing the address decode and generation of the appropriate block select signal as well as the selection of the correct block read bus during a read access. The MMU supports all of the AHB bus transactions the CPU can produce.

When an MMU error occurs (such as an attempt to access a supervisor mode only region when in user mode) a bus error is generated. While the LEON can recognise different types of bus error (e.g. data store error, instruction access error) it handles them in the same manner as it handles all traps i.e it will transfer control to a trap handler. No extra state information is stored because of the nature of the trap. The location of the trap handler is contained in the TBR (Trap Base Register). This is the same mechanism as is used to handle interrupts.

11.6.1 CPU-Bus Peripherals Address Map

The address mapping for the peripherals attached to the CPU-bus is shown in Table 17 below. The MMU performs the decode of the high order bits to generate the relevant cpu_block_select signal. Apart from the PCU, which decodes the address space for the PEP blocks, and the ROM (whose final size has yet to be determined), each block only needs to decode as many bits of cpu_adr[11:2] as required to address all the registers within the block. The effect of decoding fewer bits is to cause the address space within a block to be duplicated many times (i.e. mirrored) depending on how many bits are required.

TABLE 17

CPU-bus peripherals address map

| Block_base | Address |
|---|---|
| ROM_base | 0x0000_0000 |
| MMU_base | 0x0003_0000 |
| TIM_base | 0x0003_1000 |
| LSS_base | 0x0003_2000 |
| GPIO_base | 0x0003_3000 |
| MMI_base | 0x0003_4000 |
| ICU_base | 0x0003_5000 |
| CPR_base | 0x0003_6000 |
| DIU_base | 0x0003_7000 |
| PSS_base | 0x0003_8000 |
| UHU_base | 0x0003_9000 |
| UDU_base | 0x0003_A000 |
| Reserved | 0x0003_B000 to 0x0003_FFFF |
| PCU_base | 0x0004_0000 |

11.6.2 DRAM Region Mapping

The embedded DRAM is broken into 8 regions, with each region defined by a lower and upper bound address and with its own access permissions.

The association of an area in the DRAM address space with a MMU region is completely under software control. Table 18 below gives one possible region mapping. Regions should be defined according to their access requirements and position in memory. Regions that share the same access requirements and that are contiguous in memory may be combined into a single region. The example below is purely for indicative purpose—real mappings are likely to differ significantly from this. Note that the RegionBottom and RegionTop fields in this example include the DRAM base address offset (0x4000_0000) which is not required when programming the RegionNTop and RegionNBoltom registers. For more details, see 11.6.5.1 and 11.6.5.2.

TABLE 18

Example region mapping

| Region | RegionBottom | RegionTop | Description |
|---|---|---|---|
| 0 | 0x4000_0000 | 0x4000_0FFF | Silverbrook OS (supervisor) data |
| 1 | 0x4000_1000 | 0x4000_BFFF | Silverbrook OS (supervisor) code |
| 2 | 0x4000_C000 | 0x4000_C3FF | Silverbrook (supervisor/user) data |
| 3 | 0x4000_C400 | 0x4000_CFFF | Silverbrook (supervisor/user) code |
| 4 | 0x4026_D000 | 0x4026_D3FF | OEM (user) data |
| 5 | 0x4026_D400 | 0x4026_DFFF | OEM (user) code |
| 6 | 0x4027_E000 | 0x4027_FFFF | Shared Silverbrook/OEM space |
| 7 | 0x4000_D000 | 0x4026_CFFF | Compressed page store (supervisor data) |

Note that additional DRAM protection due to peripheral access is achieved in the DIU, see section 22.14.12.8

11.6.3 Non-DRAM Regions

As shown in FIG. 20 the DRAM occupies only 2.5 MBytes of the total 4 GB SoPEC address space. The non-DRAM regions of SoPEC are handled by the MMU as follows:

ROM (0x0000_0000 to 0x0002_FFFF): The ROM block controls the access types allowed. The cpu_acode[1:0] signals will indicate the CPU mode and access type and the ROM block asserts rom_cpu_berr if an attempted access is forbidden. The protocol is described in more detail in section 11.4.3. Like the other peripheral blocks the ROM block controls the access types allowed.

MMU Internal Registers (0x0003_0000 to 0x0003_0FFF): The MMU is responsible for controlling the accesses to its own internal registers and only allows data reads and writes (no instruction fetches) from supervisor data space. All other accesses results in the mmu_cpu_berr signal being asserted in accordance with the CPU native bus protocol.

CPU Subsystem Peripheral Registers (0x0003_1000 to 0x0003_FFFF): Each peripheral block controls the access types allowed. Each peripheral allows supervisor data accesses (both read and write) and some blocks (e.g. Timers and GPIO) also allow user data space accesses as outlined in the relevant chapters of this specification. Neither supervisor nor user instruction fetch accesses are allowed to any block as it is not possible to execute code from peripheral registers. The bus protocol is described in section 11.4.3. Note that the address space from 0x0003_B000 to 0x0003_FFFF is reserved and any access to this region is treated as a unused address apace access and will result in a bus error.

PCU Mapped Registers (0x0004_0000 to 0x0004 BFFF): All of the PEP blocks registers which are accessed by the CPU via the PCU inherits the access permissions of the PCU. These access permissions are hard wired to allow supervisor data accesses only and the protocol used is the same as for the CPU peripherals.

Unused address space (0x0004_C000 to 0x3FFF_FFFF and 0x4028_0000 to 0xFFFF_FFFF): All accesses to these unused portions of the address space results in the mmu_cpu_berr signal being asserted in accordance with the CPU native bus protocol. These accesses do not propagate outside of the MMU i.e. no external access is initiated.

11.6.4 Reset Exception Vector and Reference Zero Traps

When a reset occurs the LEON processor starts executing code from address 0x0000_0000.

A common software bug is zero-referencing or null pointer de-referencing (where the program attempts to access the contents of address 0x0000_0000). To assist software debug the MMU asserts a bus error every time the locations 0x0000_0000 to 0x0000_000F (i.e. the first 4 words of the reset trap) are accessed after the reset trap handler has legitimately been retrieved immediately after reset.

11.6.5 MMU Configuration Registers

The MMU configuration registers include the RDU configuration registers and two LEON registers. Note that all the MMU configuration registers may only be accessed when the CPU is running in supervisor mode.

TABLE 19

MMU Configuration Registers

| Address offset from MMU_base | Register | #bits | Reset | Description |
|---|---|---|---|---|
| 0x00 | Region0Bottom[21:5] | 17 | 0x0_0000 | This register contains the physical address that marks the bottom of region 0 |
| 0x04 | Region0Top[21:5] | 17 | 0x1_FFFF | This register contains the physical address that marks the top of region 0. Region 0 covers the entire address space after reset whereas all other regions are zero-sized initially. |
| 0x08 | Region1Bottom[21:5] | 17 | 0x1_FFFF | This register contains the physical address that marks the bottom of region 1 |
| 0x0C | Region1Top[21:5] | 17 | 0x0_0000 | This register contains the physical address that marks the top of region 1 |
| 0x10 | Region2Bottom[21:5] | 17 | 0x1_FFFF | This register contains the physical address that marks the bottom of region 2 |
| 0x14 | Region2Top[21:5] | 17 | 0x0_0000 | This register contains the physical address that marks the top of region 2 |
| 0x18 | Region3Bottom[21:5] | 17 | 0x1_FFFF | This register contains the physical address that marks the bottom of region 3 |
| 0x1C | Region3Top[21:5] | 17 | 0x0_0000 | This register contains the physical address that marks the top of region 3 |
| 0x20 | Region4Bottom[21:5] | 17 | 0x1_FFFF | This register contains the physical address that marks the bottom of region 4 |
| 0x24 | Region4Top[21:5] | 17 | 0x0_0000 | This register contains the physical address that marks the top of region 4 |
| 0x28 | Region5Bottom[21:5] | 17 | 0x1_FFFF | This register contains the physical address that marks the bottom of region 5 |
| 0x2C | Region5Top[21:5] | 17 | 0x0_0000 | This register contains the physical address that marks the top of region 5 |
| 0x30 | Region6Bottom[21:5] | 17 | 0x1_FFFF | This register contains the physical address that marks the bottom of region 6 |
| 0x34 | Region6Top[21:5] | 17 | 0x0_0000 | This register contains the physical address that marks the top of region 6 |
| 0x38 | Region7Bottom[21:5] | 17 | 0x1_FFFF | This register contains the physical address that marks the bottom of region 7 |
| 0x3C | Region7Top[21:5] | 17 | 0x0_0000 | This register contains the physical address that marks the top of region 7 |
| 0x40 | Region0Control | 6 | 0x07 | Control register for region 0 |
| 0x44 | Region1Control | 6 | 0x07 | Control register for region 1 |
| 0x48 | Region2Control | 6 | 0x07 | Control register for region 2 |
| 0x4C | Region3Control | 6 | 0x07 | Control register for region 3 |
| 0x50 | Region4Control | 6 | 0x07 | Control register for region 4 |
| 0x54 | Region5Control | 6 | 0x07 | Control register for region 5 |
| 0x58 | Region6Control | 6 | 0x07 | Control register for region 6 |
| 0x5C | Region7Control | 6 | 0x07 | Control register for region 7 |
| 0x60 | RegionLock | 8 | 0x00 | Writing a 1 to a bit in the RegionLock register locks the value of the corresponding RegionTop, RegionBottom and RegionControl registers. The lock can only be cleared by a reset and any attempt to write to a locked register will result in a bus error. |
| 0x64 | BusTimeout | 8 | 0xFF | This register should be set to the number of pclk cycles to wait after an access has started before aborting the access with a bus error. Writing 0 to this register disables the bus timeout feature. |
| 0x68 | ExceptionSource | 6 | 0x00 | This register identifies the source of the last exception. See Section 11.6.5.3 for details. |
| 0x6C | DebugSelect[8:2] | 7 | 0x00 | Contains address of the register selected for debug observation. It is expected that a number of pseudo-registers will be made available for debug observation and these will be outlined during the implementation phase. |

TABLE 19-continued

MMU Configuration Registers

| Address offset from MMU_base | Register | #bits | Reset | Description |
|---|---|---|---|---|
| 0x80 to 0x108 | RDU Registers | | | See Table 31 for details. |
| 0x140 | LEON Configuration Register | 32 | 0x1271_8F00 | The LEON configuration register is used by software to determine the configuration of this LEON implementation. See section 11.5.1.1 for details. This register is ReadOnly. |
| 0x144 | LEON Cache Control Register | 32 | 0x0000_0000 | The LEON Cache Control Register is used to control the operation of the caches. See section 11.7.1.1 for details. |

11.6.5.1 RegionTop and RegionBottom Registers

The 20 Mbit of embedded DRAM on SoPEC is arranged as 81920 words of 256 bits each. All region boundaries need to align with a 256-bit word. Thus only 17 bits are required for the RegionNTop and RegionNBottom registers. Note that the bottom 5 bits of the RegionNTop and RegionNBottom registers cannot be written to and read as '0' i.e. the RegionNTop and RegionNBottom registers represent 256-bit word aligned DRAM addresses Both the RegionNTop and RegionNBottom registers are inclusive i.e. the addresses in the registers are included in the region. Thus the size of a region is (RegionNTop−RegionNBottom)+1 DRAM words.

If DRAM regions overlap (there is no reason for this to be the case but there is nothing to prohibit it either) then only accesses allowed by all overlapping regions are permitted. That is if a DRAM address appears in both Region1 and Region3 (for example) the cpu_acode of an access is checked against the access permissions of both regions. If both regions permit the access then it proceeds but if either or both regions do not permit the access then it is not be allowed.

The MMU does not support negatively sized regions i.e. the value of the RegionNTop register should always be greater than or equal to the value of the RegionNBottom register. If RegionNTop is lower in the address map than RegionNBottom then the region is considered to be zero-sized and is ignored.

When both the RegionNTop and RegionNBottom registers for a region contain the same value the region is then simply one 256-bit word in length and this corresponds to the smallest possible active region.

11.6.5.2 Region Control Registers

Each memory region has a control register associated with it. The RegionNControl register is used to set the access conditions for the memory region bounded by the RegionNTop and RegionNBottom registers. Table 20 describes the function of each bit field in the RegionNControl registers. All bits in a RegionNControl register are both readable and writable by design. However, like all registers in the MMU, the RegionNControl registers can only be accessed by code running in supervisor mode.

TABLE 20

Region Control Register

| Field Name | bit(s) | Description |
|---|---|---|
| SupervisorAccess | 2:0 | Denotes the type of access allowed when the CPU is running in Supervisor mode. For each access type a 1 indicates the access is permitted and a 0 indicates the access is not permitted.<br>bit0 - Data read access permission<br>bit1 - Data write access permission<br>bit2 - Instruction fetch access permission |
| UserAccess | 5:3 | Denotes the type of access allowed when the CPU is running in User mode. For each access type a 1 indicates the access is permitted and a 0 indicates the access is not permitted.<br>bit3 - Data read access permission<br>bit4 - Data write access permission<br>bit5 - Instruction fetch access permission |

11.6.5.3 ExceptionSource Register

The SPARC V8 architecture allows for a number of types of memory access error to be trapped. However on the LEON processor only data_store_error and data_access_exception trap types result from an external (to LEON) bus error. According to the SPARC architecture manual the processor automatically moves to the next register window (i.e. it decrements the current window pointer) and copies the program counters (PC and nPC) to two local registers in the new window. The supervisor bit in the PSR is also set and the PSR can be saved to another local register by the trap handler (this does not happen automatically in hardware). The ExceptionSource register aids the trap handler by identifying the source of an exception. Each bit in the ExceptionSource register is set when the relevant trap condition and should be cleared by the trap handler by writing a '1' to that bit position.

TABLE 21

| ExceptionSource Register | | |
|---|---|---|
| Field Name | bit(s) | Description |
| DramAccessExcptn | 0 | The permissions of an access did not match those of the DRAM region it was attempting to access. This bit will also be set if an attempt is made to access an undefined DRAM region (i.e. a location that is not within the bounds of any RegionTop/RegionBottom pair) |
| PeriAccessExcptn | 1 | An access violation occurred when accessing a CPU subsystem block. This occurs when the access permissions disagree with those set by the block. |
| UnusedAreaExcptn | 2 | An attempt was made to access an unused part of the memory map |
| LockedWriteExcptn | 3 | An attempt was made to write to a regions registers (RegionTop/Bottom/Control) after they had been locked. Note that because the MMU (which is a CPU subsystem block) terminates a write to a locked register with a bus error it will also cause the PeriAccessExcptn bit to be set. |
| ResetHandlerExcptn | 4 | An attempt was made to access a ROM location between 0x0000_0000 and 0x0000_000F after the reset handler was executed. The most likely cause of such an access is the use of an uninitialised pointer or structure. Note that due to the pipelined nature of the processor any attempt to execute code in user mode from locations 0x4, 0x8 or 0xC will result in the PeriAccessExcptn bit also being set. This is because the processor will request the contents of location 0x10 (and above) before the trap handler is invoked and as the ROM does not permit user mode access it will respond with a bus error which causes PeriAccessExcptn to be set in addition to ResetHandlerExcptn |
| TimeoutExcptn | 5 | A bus timeout condition occurred. |

11.6.6 MMU Sub-Block Partition

Figure 21:
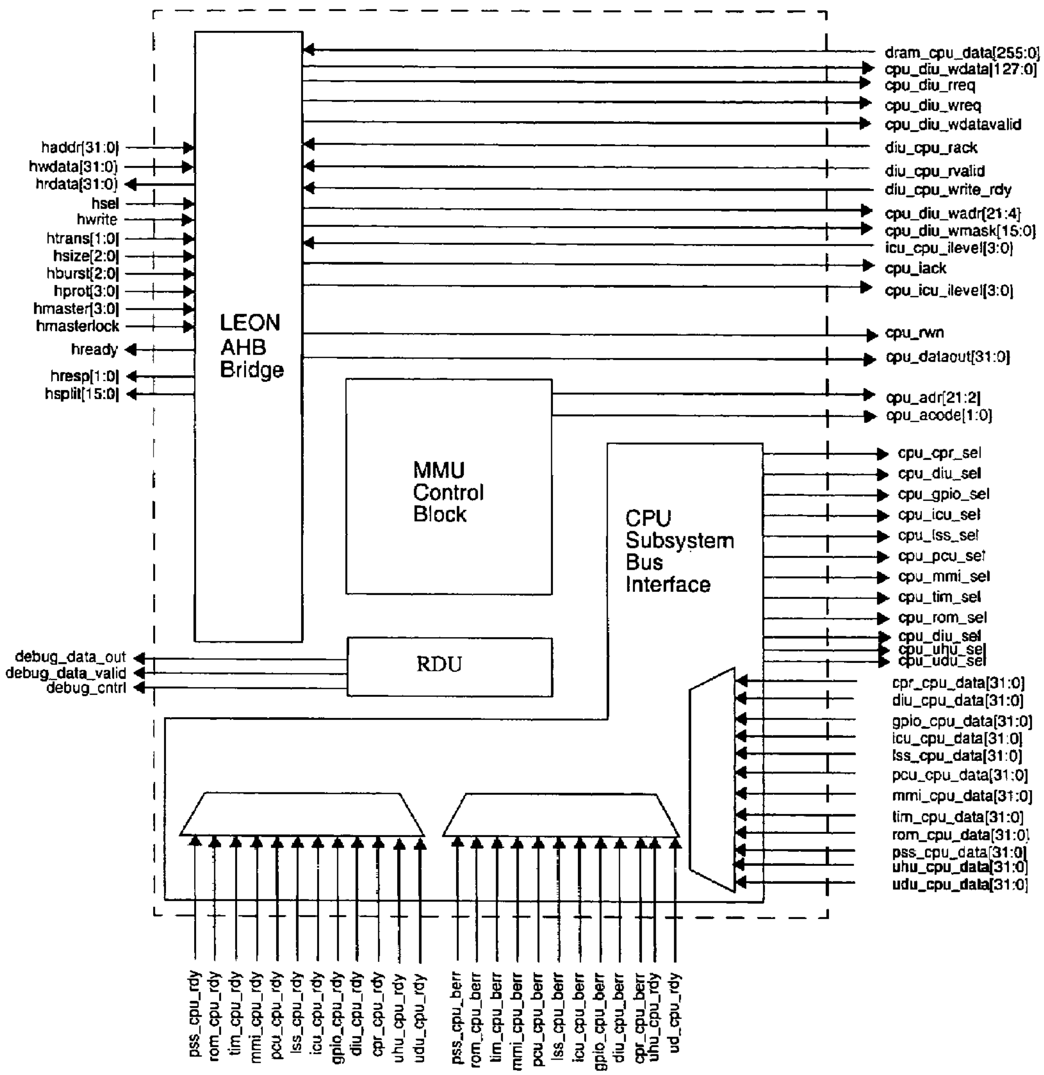
FIG. 21. MMU Sub-block partition, external signal view
Figure 22:
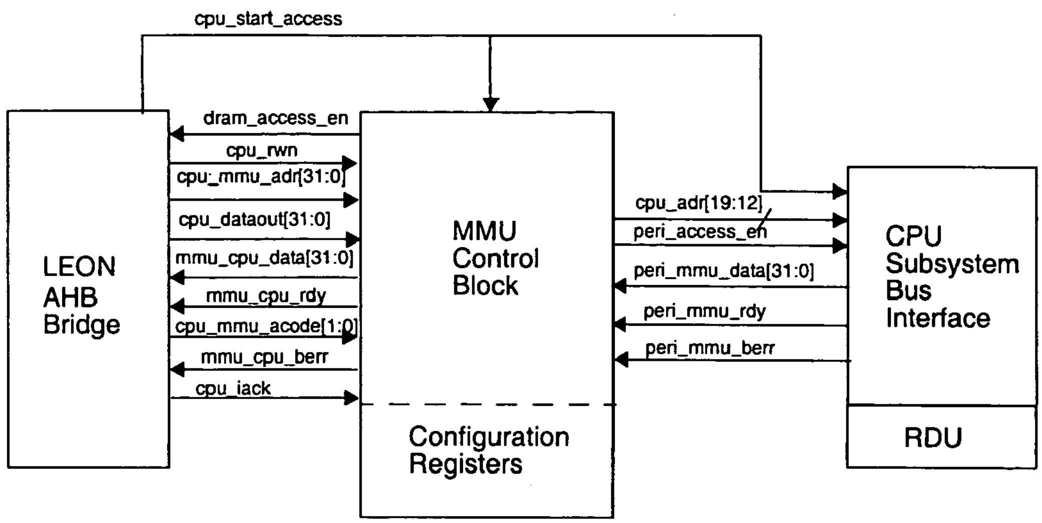
FIG. 22. MMU Sub-block partition, internal signal view

As can be seen from FIG. 21 and FIG. 22 the MMU consists of three principal sub-blocks. For clarity the connections between these sub-blocks and other SoPEC blocks and between each of the sub-blocks are shown in two separate diagrams.

11.6.6.1 LEON AHB Bridge

The LEON AHB bridge consists of an AHB bridge to DIU and an AHB to CPU subsystem bus bridge. The AHB bridge converts between the AHB and the DIU and CPU subsystem bus protocols but the address decoding and enabling of an access happens elsewhere in the MMU. The AHB bridge is always a slave on the AHB. Note that the AMBA signals from the LEON core are contained within the ahbso and ahbsi records. The LEON records are described in more detail in section 11.7. Glue logic may be required to assist with enabling memory accesses, endianness coherency, interrupts and other miscellaneous signalling.

TABLE 22

| LEON AHB bridge I/Os | | | |
|---|---|---|---|
| Port name | Pins | I/O | Description |
| Global SoPEC signals | | | |
| prst_n | 1 | In | Global reset. Synchronous to pclk, active low. |
| Pclk | 1 | In | Global clock |
| LEON core to LEON AHB signals (ahbsi and ahbso records) | | | |
| ahbsi.haddr[31:0] | 32 | In | AHB address bus |
| ahbsi.hwdata[31:0] | 32 | In | AHB write data bus |
| ahbso.hrdata[31:0] | 32 | Out | AHB read data bus |
| ahbsi.hsel | 1 | In | AHB slave select signal |
| ahbsi.hwrite | 1 | In | AHB write signal:<br>1 - Write access<br>0 - Read access |
| ahbsi.htrans | 2 | In | Indicates the type of the current transfer:<br>00 - IDLE<br>01 - BUSY<br>10 - NONSEQ<br>11 - SEQ |
| ahbsi.hsize | 3 | In | Indicates the size of the current transfer:<br>000 - Byte transfer<br>001 - Halfword transfer<br>010 - Word transfer<br>011 - 64-bit transfer (unsupported?) |

TABLE 22-continued

LEON AHB bridge I/Os

| Port name | Pins | I/O | Description |
|---|---|---|---|
| | | | 1xx - Unsupported larger wordsizes |
| ahbsi.hburst | 3 | In | Indicates if the current transfer forms part of a burst and the type of burst:<br>000 - SINGLE<br>001 - INCR<br>010 - WRAP4<br>011 - INCR4<br>100 - WRAP8<br>101 - INCR8<br>110 - WRAP16<br>111 - INCR16 |
| ahbsi.hprot | 4 | In | Protection control signals pertaining to the current access:<br>hprot[0] - Opcode(0)/Data(1) access<br>hprot[1] - User(0)/Supervisor access<br>hprot[2] - Non-bufferable(0)/Bufferable(1) access (unsupported)<br>hprot[3] - Non-cacheable(0)/Cacheable access |
| ahbsi.hmaster | 4 | In | Indicates the identity of the current bus master. This will always be the LEON core. |
| ahbsi.hmastlock | 1 | In | Indicates that the current master is performing a locked sequence of transfers. |
| ahbso.hready | 1 | Out | Active high ready signal indicating the access has completed |
| ahbso.hresp | 2 | Out | Indicates the status of the transfer:<br>00 - OKAY<br>01 - ERROR<br>10 - RETRY<br>11 - SPLIT |
| ahbso.hsplit[15:0] | 16 | Out | This 16-bit split bus is used by a slave to indicate to the arbiter which bus masters should be allowed attempt a split transaction. This feature will be unsupported on the AHB bridge |
| | | Toplevel/Common LEON AHB bridge signals | |
| cpu_dataout[31:0] | 32 | Out | Data out bus to both DRAM and peripheral devices. |
| cpu_rwn | 1 | Out | Read/NotWrite signal. 1 = Current access is a read access, 0 = Current access is a write access |
| icu_cpu_ilevel[3:0] | 4 | In | An interrupt is asserted by driving the appropriate priority level on icu_cpu_ilevel. These signals must remain asserted until the CPU executes an interrupt acknowledge cycle. |
| cpu_icu_ilevel[3:0] | 4 | In | Indicates the level of the interrupt the CPU is acknowledging when cpu_iack is high |
| cpu_iack | 1 | Out | Interrupt acknowledge signal. The exact timing depends on the CPU core implementation |
| cpu_start_access | 1 | Out | Start Access signal indicating the start of a data transfer and that the cpu_adr, cpu_dataout, cpu_rwn and cpu_acode signals are all valid. This signal is only asserted during the first cycle of an access. |
| cpu_ben[1:0] | 2 | Out | Byte enable signals. |
| Dram_cpu_data[255:0] | 256 | In | Read data from the DRAM. |
| diu_cpu_rreq | 1 | Out | Read request to the DIU. |
| diu_cpu_rack | 1 | In | Acknowledge from DIU that read request has been accepted. |
| diu_cpu_rvalid | 1 | In | Signal from DIU indicating that valid read data is on the dram_cpu_data bus |
| cpu_diu_wdatavalid | 1 | Out | Signal from the CPU to the DIU indicating that the data currently on the cpu_diu_wdata bus is valid and should be committed to the DIU posted write buffer |
| diu_cpu_write_rdy | 1 | In | Signal from the DIU indicating that the posted write buffer is empty |
| cpu_diu_wdadr[21:4] | 18 | Out | Write address bus to the DIU |
| cpu_diu_wdata[127:0] | 128 | Out | Write data bus to the DIU |
| cpu_diu_wmask[15:0] | 16 | Out | Write mask for the cpu_diu_wdata bus. Each bit corresponds to a byte of the 128-bit cpu_diu_wdata bus. |
| | | LEON AHB bridge to MMU Control Block signals | |
| cpu_mmu_adr | 32 | Out | CPU Address Bus. |
| Mmu_cpu_data | 32 | In | Data bus from the MMU |
| Mmu_cpu_rdy | 1 | In | Ready signal from the MMU |
| cpu_mmu_acode | 2 | Out | Access code signals to the MMU |
| Mmu_cpu_berr | 1 | In | Bus error signal from the MMU |

TABLE 22-continued

LEON AHB bridge I/Os

| Port name | Pins | I/O | Description |
|---|---|---|---|
| Dram_access_en | 1 | In | DRAM access enable signal. A DRAM access cannot be initiated unless it has been enabled by the MMU control unit |

Description:

The LEON AHB bridge ensures that all CPU bus transactions are functionally correct and that the timing requirements are met. The AHB bridge also implements a 128-bit DRAM write buffer to improve the efficiency of DRAM writes, particularly for multiple successive writes to DRAM. The AHB bridge is also responsible for ensuring endianness coherency i.e. guaranteeing that the correct data appears in the correct position on the data buses (hrdata, cpu_dataout and cpu_mmu_wdata) for every type of access. This is a requirement because the LEON uses big-endian addressing while the rest of SoPEC is little-endian.

The LEON AHB bridge asserts request signals to the DIU if the MMU control block deems the access to be a legal access. The validity (i.e. is the CPU running in the correct mode for the address space being accessed) of an access is determined by the contents of the relevant RegionNControl register. As the SPARC standard requires that all accesses are aligned to their word size (i.e. byte, half-word, word or double-word) and so it is not possible for an access to traverse a 256-bit boundary (thus also matching the DIU behaviour). Invalid DRAM accesses are not propagated to the DIU and will result in an error response (ahbso.hresp='01') on the AHB. The DIU bus protocol is described in more detail in section 22.9. The DIU returns a 256-bit dataword on dram_cpu_data[255:0] for every read access.

The CPU subsystem bus protocol is described in section 11.4.3. While the LEON AHB bridge performs the protocol translation between AHB and the CPU subsystem bus the select signals for each block are generated by address decoding in the CPU subsystem bus interface. The CPU subsystem bus interface also selects the correct read data bus, ready and error signals for the block being addressed and passes these to the LEON AHB bridge which puts them on the AHB bus.

It is expected that some signals (especially those external to the CPU block) will need to be registered here to meet the timing requirements. Careful thought will be required to ensure that overall CPU access times are not excessively degraded by the use of too many register stages.

11.6.6.1.1 DRAM Write Buffer

Figure 23:
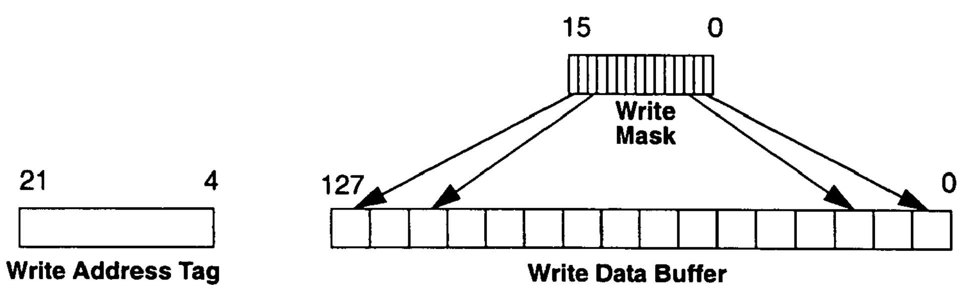
FIG. 23. DRAM Write buffer

The DRAM write buffer improves the efficiency of DRAM writes by aggregating a number of CPU write accesses into a single DIU write access. This is achieved by checking to see if a CPU write is to an address already in the write buffer. If it is the write is immediately acknowledged (i.e. the ahbsi.hready signal is asserted without any wait states) and the DRAM write buffer is updated accordingly. When the CPU write is to a DRAM address other than that in the write buffer then the current contents of the write buffer are sent to the DIU (where they are placed in the posted write buffer) and the DRAM write buffer is updated with the address and data of the CPU write. The DRAM write buffer consists of a 128-bit data buffer, an 18-bit write address tag and a 16-bit write mask. Each bit of the write mask indicates the validity of the corresponding byte of the write buffer as shown in FIG. 23 below.

The operation of the DRAM write buffer is summarised by the following set of rules:

1) The DRAM write buffer only contains DRAM write data i.e. peripheral writes go directly to the addressed peripheral.
2) CPU writes to locations within the DRAM write buffer or to an empty write buffer (i.e. the write mask bits are all 0) complete with zero wait states regardless of the size of the write (byte/half-word/word/double-word).
3) The contents of the DRAM write buffer are flushed to DRAM whenever a CPU write to a location outside the write buffer occurs, whenever a CPU read from a location within the write buffer occurs or whenever a write to a peripheral register occurs.
4) A flush resulting from a peripheral write does not cause any extra wait states to be inserted in the peripheral write access.
5) Flushes resulting from a DRAM access causes wait states to be inserted until the DIU posted write buffer is empty. If the DIU posted write buffer is empty at the time the flush is required then no wait states are inserted for a flush resulting from a CPU write or one wait state will be inserted for a flush resulting from a CPU read (this is to ensure that the DIU sees the write request ahead of the read request). Note that in this case further wait states are additionally inserted as a result of the delay in servicing the read request by the DIU.

11.6.6.1.2 DIU Interface Waveforms

Figure 24:
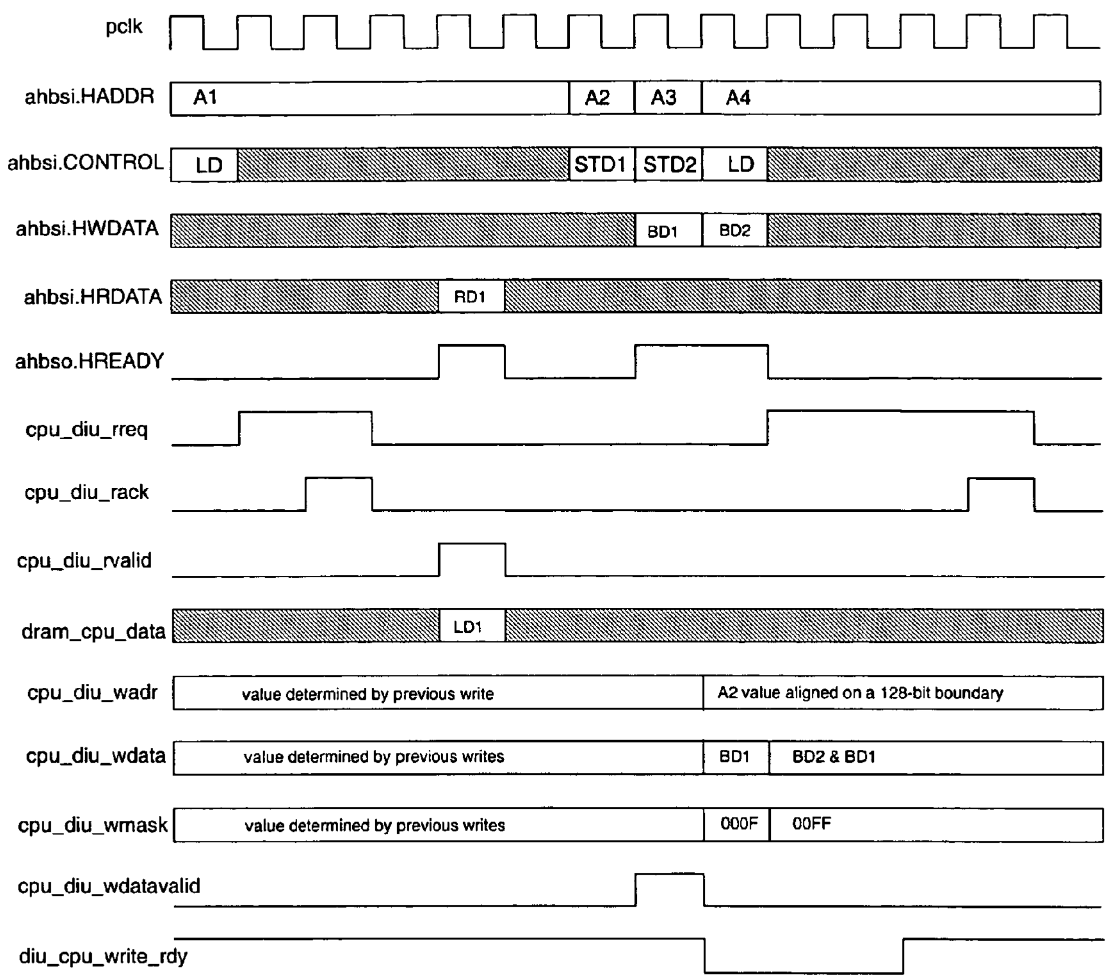
FIG. 24. DIU waveforms for multiple transactions

FIG. 24 below depicts the operation of the AHB bridge over a sample sequence of DRAM transactions consisting of a read into the DCache, a double-word store to an address other than that currently in the DRAM write buffer followed by an ICache line refill. To avoid clutter a number of AHB control signals that are inputs to the MMU have been grouped together as ahbsi.CONTROL and only the ahbso. HREADY is shown of the output AHB control signals.

The first transaction is a single word load ('LD'). The MMU (specifically the MMU control block) uses the first cycle of every access (i.e. the address phase of an AHB transaction) to determine whether or not the access is a legal access. The read request to the DIU is then asserted in the following cycle (assuming the access is a valid one) and is acknowledged by the DIU a cycle later. Note that the time from cpu_diu_rreq being asserted and diu_cpu_rack being asserted is variable as it depends on the DIU configuration and access patterns of DIU requesters. The AHB bridge inserts wait states until it sees the diu_cpu_rvalid signal is high, indicating the data ('LDI') on the dram_cpu_data bus is valid. The AHB bridge terminates the read access in the same cycle by asserting the ahbso.HREADY signal (together with an 'OKAY' HRESP code). The AHB bridge also selects the appropriate 32 bits ('RDI') from the 256-bit DRAM line data ('LDI') returned by the DIU corresponding to the word address given by A1.

The second transaction is an AHB two-beat incrementing burst issued by the LEON acache block in response to the execution of a double-word store instruction. As LEON is a big endian processor the address issued ('A2') during the address phase of the first beat of this transaction is the address of the most significant word of the double-word while the address for the second beat ('A3') is that of the least significant word i.e. A3=A2+4. The presence of the DRAM write buffer allows these writes to complete without the insertion of any wait states. This is true even when, as shown here, the DRAM write buffer needs to be flushed into the DIU posted write buffer, provided the DIU posted write buffer is empty. If the DIU posted write buffer is not empty (as would be signified by diu_cpu_write_rdy being low) then wait states would be inserted until it became empty. The cpu_diu_wdata buffer builds up the data to be written to the DIU over a number of transactions ('BD1' and 'BD2' here) while the cpu_diu_wmask records every byte that has been written to since the last flush—in this case the lowest word and then the second lowest word are written to as a result of the double-word store operation.

The final transaction shown here is a DRAM read caused by an ICache miss. Note that the pipelined nature of the AHB bus allows the address phase of this transaction to overlap with the final data phase of the previous transaction. All ICache misses appear as single word loads ('LD') on the AHB bus. In this case, the DIU is slower to respond to this read request than to the first read request because it is processing the write access caused by the DRAM write buffer flush. The ICache refill will complete just after the window shown in FIG. 24.

11.6.6.2 CPU Subsystem Bus Interface

The CPU Subsystem Interface block handles all valid accesses to the peripheral blocks that comprise the CPU Subsystem.

TABLE 23

CPU Subsystem Bus Interface I/Os

| Port name | Pins | I/O | Description |
|---|---|---|---|
| | | | Global SoPEC signals |
| prst_n | 1 | In | Global reset. Synchronous to pclk, active low. |
| Pclk | 1 | In | Global clock |
| | | | Toplevel/Common CPU Subsystem Bus Interface signals |
| cpu_cpr_sel | 1 | Out | CPR block select. |
| cpu_gpio_sel | 1 | Out | GPIO block select. |
| cpu_icu_sel | 1 | Out | ICU block select. |
| cpu_lss_sel | 1 | Out | LSS block select. |
| cpu_pcu_sel | 1 | Out | PCU block select. |
| cpu_mmi_sel | 1 | Out | MMI block select. |
| cpu_tim_sel | 1 | Out | Timers block select. |
| cpu_rom_sel | 1 | Out | ROM block select. |
| cpu_pss_sel | 1 | Out | PSS block select. |
| cpu_diu_sel | 1 | Out | DIU block select. |
| cpu_uhu_sel | 1 | Out | UHU block select. |
| cpu_udu_sel | 1 | Out | UDU block select. |
| cpr_cpu_data[31:0] | 32 | In | Read data bus from the CPR block |
| gpio_cpu_data[31:0] | 32 | In | Read data bus from the GPIO block |
| icu_cpu_data[31:0] | 32 | In | Read data bus from the ICU block |
| lss_cpu_data[31:0] | 32 | In | Read data bus from the LSS block |
| pcu_cpu_data[31:0] | 32 | In | Read data bus from the PCU block |
| mmi_cpu_data[31:0] | 32 | In | Read data bus from the MMI block |
| tim_cpu_data[31:0] | 32 | In | Read data bus from the Timers block |
| rom_cpu_data[31:0] | 32 | In | Read data bus from the ROM block |
| pss_cpu_data[31:0] | 32 | In | Read data bus from the PSS block |
| diu_cpu_data[31:0] | 32 | In | Read data bus from the DIU block |
| udu_cpu_data[31:0] | 32 | In | Read data bus from the UDU block |
| uhu_cpu_data[31:0] | 32 | In | Read data bus from the UHU block |
| cpr_cpu_rdy | 1 | In | Ready signal to the CPU. When cpr_cpu_rdy is high it indicates the last cycle of the access. For a write cycle this means cpu_dataout has been registered by the CPR block and for a read cycle this means the data on cpr_cpu_data is valid. |
| gpio_cpu_rdy | 1 | In | GPIO ready signal to the CPU. |
| icu_cpu_rdy | 1 | In | ICU ready signal to the CPU. |
| lss_cpu_rdy | 1 | In | LSS ready signal to the CPU. |
| pcu_cpu_rdy | 1 | In | PCU ready signal to the CPU. |
| mmi_cpu_rdy | 1 | In | MMI ready signal to the CPU. |
| tim_cpu_rdy | 1 | In | Timers block ready signal to the CPU. |
| rom_cpu_rdy | 1 | In | ROM block ready signal to the CPU. |
| pss_cpu_rdy | 1 | In | PSS block ready signal to the CPU. |
| diu_cpu_rdy | 1 | In | DIU register block ready signal to the CPU. |
| uhu_cpu_rdy | 1 | In | UHU register block ready signal to the CPU. |
| udu_cpu_rdy | 1 | In | UDU register block ready signal to the CPU. |
| cpr_cpu_berr | 1 | In | Bus Error signal from the CPR block |
| gpio_cpu_berr | 1 | In | Bus Error signal from the GPIO block |
| icu_cpu_berr | 1 | In | Bus Error signal from the ICU block |
| lss_cpu_berr | 1 | In | Bus Error signal from the LSS block |

TABLE 23-continued

| Port name | Pins | I/O | Description |
|---|---|---|---|
| CPU Subsystem Bus Interface I/Os | | | |
| pcu__cpu__berr | 1 | In | Bus Error signal from the PCU block |
| mmi__cpu__berr | 1 | In | Bus Error signal from the MMI block |
| tim__cpu__berr | 1 | In | Bus Error signal from the Timers block |
| rom__cpu__berr | 1 | In | Bus Error signal from the ROM block |
| pss__cpu__berr | 1 | In | Bus Error signal from the PSS block |
| diu__cpu__berr | 1 | In | Bus Error signal from the DIU block |
| uhu__cpu__berr | 1 | In | Bus Error signal from the UHU block |
| udu__cpu__berr | 1 | In | Bus Error signal from the UDU block |
| CPU Subsystem Bus Interface to MMU Control Block signals | | | |
| cpu__adr[19:12] | 8 | In | Toplevel CPU Address bus. Only bits 19-12 are required to decode the peripherals address space |
| peri__access__en | 1 | In | Enable Access signal. A peripheral access cannot be initiated unless it has been enabled by the MMU Control Unit |
| peri__mmu__data[31:0] | 32 | Out | Data bus from the selected peripheral |
| peri__mmu__rdy | 1 | Out | Data Ready signal. Indicates the data on the peri__mmu__data bus is valid for a read cycle or that the data was successfully written to the peripheral for a write cycle. |
| peri__mmu__berr | 1 | Out | Bus Error signal. Indicates a bus error has occurred in accessing the selected peripheral |
| CPU Subsystem Bus Interface to LEON AHB bridge signals | | | |
| cpu__start__access | 1 | In | Start Access signal from the LEON AHB bridge indicating the start of a data transfer and that the cpu__adr, cpu__dataout, cpu__rwn and cpu__acode signals are all valid. This signal is only asserted during the first cycle of an access. |

Description:

The CPU Subsystem Bus Interface block performs simple address decoding to select a peripheral and multiplexing of the returned signals from the various peripheral blocks. The base addresses used for the decode operation are defined in Table 17. Note that access to the MMU configuration registers are handled by the MMU Control Block rather than the CPU Subsystem Bus Interface block. The CPU Subsystem Bus Interface block operation is described by the following pseudocode:

```
masked__cpu__adr = cpu__adr[18:12]
case (masked__cpu__adr)
  when TIM__base[18:12]
    cpu__tim__sel = peri__access__en      // The peri__access__en signal
will have the
    peri__mmu__data = tim__cpu__data   // timing required for block
                                          selects
    peri__mmu__rdy = tim__cpu__rdy
    peri__mmu__berr = tim__cpu__berr
    all__other__selects = 0   // Shorthand to ensure other
cpu__block__sel signals
                              // remain deasserted
  when LSS__base[18:12]
    cpu__lss__sel = peri__access__en
    peri__mmu__data = lss__cpu__data
    peri__mmu__rdy = lss__cpu__rdy
    peri__mmu__berr = lss__cpu__berr
    all__other__selects = 0
  when GPIO__base[18:12]
    cpu__gpio__sel = peri__access__en
    peri__mmu__data = gpio__cpu__data
    peri__mmu__rdy = gpio__cpu__rdy
    peri__mmu__berr = gpio__cpu__berr
    all__other__selects = 0
  when MMI__base[18:12]
    cpu__mmi__sel = peri__access__en
    peri__mmu__data = mmi__cpu__data
```

-continued

```
    peri__mmu__rdy = mmi__cpu__rdy
    peri__mmu__berr = mmi__cpu__berr
    all__other__selects = 0
  when ICU__base[18:12]
    cpu__icu__sel = peri__access__en
    peri__mmu__data = icu__cpu__data
    peri__mmu__rdy = icu__cpu__rdy
    peri__mmu__berr = icu__cpu__berr
    all__other__selects = 0
  when CPR__base[18:12]
    cpu__cpr__sel = peri__access__en
    peri__mmu__data = cpr__cpu__data
    peri__mmu__rdy = cpr__cpu__rdy
    peri__mmu__berr = cpr__cpu__berr
    all__other__selects = 0
  when ROM__base[18:12]
    cpu__rom__sel = peri__access__en
    peri__mmu__data = rom__cpu__data
    peri__mmu__rdy = rom__cpu__rdy
    peri__mmu__berr = rom__cpu__berr
    all__other__selects = 0
  when PSS__base[18:12]
    cpu__pss__sel = peri__access__en
    peri__mmu__data = pss__cpu__data
    peri__mmu__rdy = pss__cpu__rdy
    peri__mmu__berr = pss__cpu__berr
    all__other__selects = 0
  when DIU__base[18:12]
    cpu__diu__sel = peri__access__en
    peri__mmu__data = diu__cpu__data
    peri__mmu__rdy = diu__cpu__rdy
    peri__mmu__berr = diu__cpu__berr
    all__other__selects = 0
  when UHU__base[18:12]
    cpu__uhu__sel = peri__access__en
    peri__mmu__data = uhu__cpu__data
    peri__mmu__rdy = uhu__cpu__rdy
    peri__mmu__berr = uhu__cpu__berr
    all__other__selects = 0
```

-continued

```
when UDU_base[18:12]
   cpu_udu_sel = peri_access_en
   peri_mmu_data = udu_cpu_data
   peri_mmu_rdy = udu_cpu_rdy
   peri_mmu_berr = udu_cpu_berr
   all_other_selects = 0
when PCU_base[18:12]
   cpu_pcu_sel = peri_access_en
   peri_mmu_data = pcu_cpu_data
   peri_mmu_rdy = pcu_cpu_rdy
   peri_mmu_berr = pcu_cpu_berr
   all_other_selects = 0
when others
   all_block_selects = 0
   peri_mmu_data = 0x00000000
   peri_mmu_rdy = 0
```

-continued

```
      peri_mmu_berr = 1
   end case
```

11.6.6.3 MMU Control Block

The MMU Control Block determines whether every CPU access is a valid access. No more than one cycle is consumed in determining the validity of an access and all accesses terminate with the assertion of either mmu_cpu_rdy or mmu_cpu_berr. To safeguard against stalling the CPU a simple bus timeout mechanism is supported.

TABLE 24

MMU Control Block I/Os

| Port name | Pins | I/O | Description |
|---|---|---|---|
| | | | Global SoPEC signals |
| prst_n | 1 | In | Global reset. Synchronous to pclk, active low. |
| Pclk | 1 | In | Global clock |
| | | | Toplevel/Common MMU Control Block signals |
| cpu_adr[21:2] | 22 | Out | Address bus for both DRAM and peripheral access. |
| cpu_acode[1:0] | 2 | Out | CPU access code signals (cpu_mmu_acode) retimed to meet the CPU Subsystem Bus timing requirements |
| dram_access_en | 1 | Out | DRAM Access Enable signal. Indicates that the current CPU access is a valid DRAM access. |
| | | | MMU Control Block to LEON AHB bridge signals |
| cpu_mmu_adr[31:0] | 32 | In | CPU core address bus. |
| cpu_dataout[31:0] | 32 | In | Toplevel CPU data bus |
| mmu_cpu_data[31:0] | 32 | Out | Data bus to the CPU core. Carries the data for all CPU read operations |
| cpu_rwn | 1 | In | Toplevel CPU Read/notWrite signal. |
| cpu_mmu_acode[1:0] | 2 | In | CPU access code signals |
| mmu_cpu_rdy | 1 | Out | Ready signal to the CPU core. Indicates the completion of all valid CPU accesses. |
| mmu_cpu_berr | 1 | Out | Bus Error signal to the CPU core. This signal is asserted to terminate an invalid access. |
| cpu_start_access | 1 | In | Start Access signal from the LEON AHB bridge indicating the start of a data transfer and that the cpu_adr, cpu_dataout, cpu_rwn and cpu_acode signals are all valid. This signal is only asserted during the first cycle of an access. |
| cpu_iack | 1 | In | Interrupt Acknowledge signal from the CPU. This signal is only asserted during an interrupt acknowledge cycle. |
| cpu_ben[1:0] | 2 | In | Byte enable signals indicating which bytes of the 32-bit bus are being accessed. |
| | | | MMU Control Block to CPU Subsystem Bus Interface signals |
| cpu_adr[18:12] | 8 | Out | Toplevel CPU Address bus. Only bits 18-12 are required to decode the peripherals address space |
| peri_access_en | 1 | Out | Enable Access signal. A peripheral access cannot be initiated unless it has been enabled by the MMU Control Unit |
| peri_mmu_data[31:0] | 32 | In | Data bus from the selected peripheral |
| peri_mmu_rdy | 1 | In | Data Ready signal. Indicates the data on the peri_mmu_data bus is valid for a read cycle or that the data was successfully written to the peripheral for a write cycle. |
| peri_mmu_berr | 1 | In | Bus Error signal. Indicates a bus error has occurred in accessing the selected peripheral |

Description:

The MMU Control Block is responsible for the MMU's core functionality, namely determining whether or not an access to any part of the address map is valid. An access is considered valid if it is to a mapped area of the address space and if the CPU is running in the appropriate mode for that address space. Furthermore the MMU control block correctly handles the special cases that are: an interrupt acknowledge cycle, a reset exception vector fetch, an access that crosses a 256-bit DRAM word boundary and a bus timeout condition. The following pseudocode shows the logic required to implement the MMU Control Block functionality. It does not deal with the timing relationships of the various signals—it is the designer's responsibility to ensure that these relationships are correct and comply with the different bus protocols. For simplicity the pseudocode is split up into numbered sections so that the functionality may be seen more easily.

It is important to note that the style used for the pseudocode will differ from the actual coding style used in the RTL implementation. The pseudocode is only intended to capture the required functionality, to clearly show the criteria that need to be tested rather than to describe how the implementation should be performed. In particular the different comparisons of the address used to determine which part of the memory map, which DRAM region (if applicable) and the permission checking should all be performed in parallel (with results ORed together where appropriate) rather than sequentially as the pseudocode implies.

PS0 Description: This first segment of code defines a number of constants and variables that are used elsewhere in this description. Most signals have been defined in the I/O descriptions of the MMU sub-blocks that precede this section of the document. The post_reset_state variable is used later (in section PS4) to determine if a null pointer access should be trapped.

PS0:

```
const CPUBusTop = 0x0004BFFF
const CPUBusGapTop = 0x0003FFFF
const CPUBusGapBottom = 0x0003B000
const DRAMTop = 0x4027FFFF
const DRAMBottom = 0x40000000
const UserDataSpace = b01
const UserProgramSpace = b00
const SupervisorDataSpace = b11
const SupervisorProgramSpace = b10
const ResetExceptionCycles = 0x4
cpu_adr_peri_masked[6:0] = cpu_mmu_adr[18:12]
cpu_adr_dram_masked[16:0] = cpu_mmu_adr & 0x003FFFE0
if (prst_n == 0) then // Initialise everything
   cpu_adr = cpu_mmu_adr[21:2]
   peri_access_en = 0
   dram_access_en = 0
   mmu_cpu_data = peri_mmu_data
   mmu_cpu_rdy = 0
   mmu_cpu_berr = 0
   post_reset_state = TRUE
   access_initiated = FALSE
   cpu_access_cnt = 0
// The following is used to determine if we are coming out of reset for
the purposes of
  // detecting invalid accesses to the reset handler (e.g. null pointer
accesses). There
  // may be a convenient signal in the CPU core that we could use instead
of this.
  if ((cpu_start_access == 1) AND (cpu_access_cnt <=
ResetExceptionCycles) AND
 (clock_tick == TRUE)) then
     cpu_access_cnt = cpu_access_cnt +1
  else
     post_reset_state = FALSE
```

PS1 Description: This section is at the top of the hierarchy that determines the validity of an access. The address is tested to see which macro-region (i.e. Unused, CPU Subsystem or DRAM) it falls into or whether the reset exception vector is being accessed.

PS1:

```
    if (cpu_mmu_adr < 0x00000010) then
       // The reset exception is being accessed. See section PS2
    elsif ((cpu_mmu_adr >= 0x00000010) AND (cpu_mmu_adr < CPUBusGapBottom))
then
       // We are in the CPU Subsystem address space. See section PS3
    elsif ((cpu_mmu_adr > CPUBusGapTop) AND (cpu_mmu_adr <= CPUBusTop)) then
       // We are in the PEP Subsystem address space. See section PS3
    elsif ( ((cpu_mmu_adr >= CPUBusGapBottom) AND (cpu_mmu_adr <=
CPUBusGapTop)) OR
             ((cpu_mmu_adr > CPUBusTop) AND (cpu_mmu_adr < DRAMBottom)) OR
             ((cpu_mmu_adr > DRAMTop) AND (cpu_mmu_adr <= 0xFFFFFFFF)) )then
          // The access is to an invalid area of the address space. See section
PS4
    // Only remaining possibility is an access to DRAM address space
    elsif ((cpu_adr_dram_masked >= Region0Bottom) AND (cpu_adr_dram_masked <=
          Region0Top) ) then
       // We are in Region0. See section PS5
    elsif ((cpu_adr_dram_masked >= RegionNBottom) AND (cpu_adr_dram_masked <=
          RegionNTop) ) then // we are in RegionN
             // Repeat the Region0 (i.e. section PS5) logic for each of
Region1 to Region7
    else   // We could end up here if there were gaps in the DRAM regions
       peri_access_en = 0
       dram_access_en = 0
       mmu_cpu_berr = 1  // we have an unknown access error, most likely due
```

-continued

PS1:

```
to hitting
        mmu__cpu__rdy = 0   // a gap in the DRAM regions
    // Only thing remaining is to implement a bus timeout function. This is
done in PS6
    end
```

PS2 Description: The only correct accesses to the locations beneath 0×00000010 are fetches of the reset trap handling routine and these should be the first accesses after reset. Here all other accesses to these locations are trapped, regardless of the CPU mode. The most likely cause of such an access is the use of a null pointer in the program executing on the CPU.

PS2:

```
    elsif (cpu__mmu__adr < 0x00000010) then
      if (post__reset__state == TRUE)) then
        cpu adr = cpu mmu adr[21:2]
        peri__access__en = 1
        dram__access__en = 0
        mmu__cpu__data = peri__mmu__data
        mmu__cpu__rdy = peri__mmu__rdy
        mmu__cpu__berr = peri__mmu__berr
      else   // we have a problem (almost certainly a null pointer)
        peri__access__en = 0
        dram__access__en = 0
        mmu__cpu__berr = 1
        mmu__cpu__rdy = 0
```

PS3 Description: This section deals with accesses to CPU and PEP subsystem peripherals, including the MMU itself. If the MMU registers are being accessed then no external bus transactions are required. Access to the MMU registers is only permitted if the CPU is making a data access from supervisor mode, otherwise a bus error is asserted and the access terminated. For non-MMU accesses then transactions occur over the CPU Subsystem Bus and each peripheral is responsible for determining whether or not the CPU is in the correct mode (based on the cpu_acode signals) to be permitted access to its registers. Note that all of the PEP registers are accessed via the PCU which is on the CPU Subsystem Bus.

PS3:

```
  elsif ((cpu__mmu__adr >= 0x00000010) AND
(cpu__mmu__adr < CPUBusGapBottom)) then
    // We are in the CPU Subsystem/PEP Subsystem address space
    cpu__adr = cpu__mmu__adr[21:2]
    if (cpu__adr__peri__masked == MMU__base) then   // access is to
local registers
      peri__access__en = 0
      dram__access__en = 0
      if (cpu__acode == SupervisorDataSpace) then
        for (i=0; i<81; i++) {
          if ((i == cpu__mmu__adr[8:2]) then      // selects the addressed
register
            if (cpu__rwn == 1) then
              mmu__cpu__data[31:0] = MMUReg[i]      // MMUReg[i]
is one of the
              mmu__cpu__rdy = 1                     // registers in
```

-continued

PS3:

```
Table 19
              mmu__cpu__berr = 0
            else // write cycle
              MMUReg[i] = cpu__dataout[31:0]
              mmu__cpu__rdy = 1
              mmu__cpu__berr = 0
          else // there is no register mapped to this address
            mmu__cpu__berr = 1       // do we really want a bus__error
here as registers
            mmu__cpu__rdy = 0    // are just mirrored in other blocks
      else // we have an access violation
        mmu__cpu__berr = 1
        mmu__cpu__rdy = 0
    else // access is to something else on the CPU Subsystem Bus
      peri__access__en = 1
      dram__access__en = 0
      mmu__cpu__data = peri__mmu__data
      mmu__cpu__rdy = peri__mmu__rdy
      mmu__cpu__berr = peri__mmu__berr
```

PS4 Description: Accesses to the large unused areas of the address space are trapped by this section. No bus transactions are initiated and the mmu_cpu_berr signal is asserted.

PS4:

```
  elsif ( ((cpu__mmu__adr >= CPUBusGapBottom) AND
(cpu__mmu__adr < CPUBusGapTop)) OR
      ((cpu__mmu__adr > CPUBusTop) AND
      (cpu__mmu__adr < DRAMBottom)) OR
      ((cpu__mmu__adr > DRAMTop) AND
      (cpu__mmu__adr <= 0xFFFFFFFF)) )then
    peri__access__en = 0 // The access is to an invalid area of the address
space
    dram__access__en = 0
    mmu__cpu__berr = 1
    mmu__cpu__rdy = 0
```

PS5 Description: This large section of pseudocode simply checks whether the access is within the bounds of DRAM Region0 and if so whether or not the access is of a type permitted by the Region0Control register. If the access is permitted then a DRAM access is initiated. If the access is not of a type permitted by the Region0Control register then the access is terminated with a bus error.

PS5:

```
  elsif ((cpu__adr__dram__masked >= Region0Bottom) AND
        (cpu__adr__dram__masked <= Region0Top) )
        then // we are in Region0
    cpu__adr = cpu__mmu__adr[21:2]
    if (cpu__rwn == 1) then
      if ((cpu__acode == SupervisorProgramSpace AND
```

-continued

PS5:

```
Region0Control[2] == 1))
        OR (cpu_acode == UserProgramSpace AND
Region0Control[5] == 1)) then
                        // this is a valid instruction fetch from
Region0
                        // The dram_cpu_data bus goes directly to the
LEON
                        // AHB bridge which also handles the hready
generation
        peri_access_en = 0
        dram_access_en = 1
        mmu_cpu_berr = 0
      elsif ((cpu_acode == SupervisorDataSpace AND
      Region0Control[0] == 1)
        OR (cpu_acode == UserDataSpace AND
      Region0Control[3] == 1)) then
                                // this is a valid read access
from Region0
        peri_access_en = 0
        dram_access_en = 1
        mmu_cpu_berr = 0
      else                  // we have an access violation
        peri_access_en = 0
        dram_access_en = 0
        mmu_cpu_berr = 1
        mmu_cpu_rdy = 0
    else                  // it is a write access
      if ((cpu_acode == SupervisorDataSpace AND
      Region0Control[1] == 1) OR (cpu_acode == UserDataSpace
        AND Region0Control[4] == 1)) then
                                // this is a valid write access to
Region0
        peri_access_en = 0
        dram_access_en = 1
        mmu_cpu_berr = 0
      else                  // we have an access violation
        peri_access_en = 0
        dram_access_en = 0
        mmu_cpu_berr = 1
        mmu_cpu_rdy = 0
```

PS6 Description: This final section of pseudocode deals with the special case of a bus timeout. This occurs when an access has been initiated but has not completed before the BusTimeout number of pclk cycles. While access to both DRAM and CPU/PEP Subsystem registers will take a variable number of cycles (due to DRAM traffic, PCU command execution or the different timing required to access registers in imported IP) each access should complete before a timeout occurs. Therefore it should not be possible to stall the CPU by locking either the CPU Subsystem or DIU buses. However given the fatal effect such a stall would have it is considered prudent to implement bus timeout detection.

PS6:

```
// Only thing remaining is to implement a bus timeout function.
if ((cpu_start_access == 1) then
  access_initiated = TRUE
  timeout_countdown = BusTimeout
if ((mmu_cpu_rdy == 1 ) OR (mmu_cpu_berr ==1 )) then
  access_initiated = FALSE
  peri_access_en = 0
  dram_access_en = 0
if ((clock_tick == TRUE) AND (access_initiated == TRUE) AND
(BusTimeout != 0))
  if (timeout_countdown > 0) then
    timeout_countdown--
  else   // timeout has occurred
    peri_access_en = 0      // abort the access
    dram_access_en = 0
    mmu_cpu_berr = 1
    mmu_cpu_rdy = 0
```

11.7 LEON Caches

Figure 25:
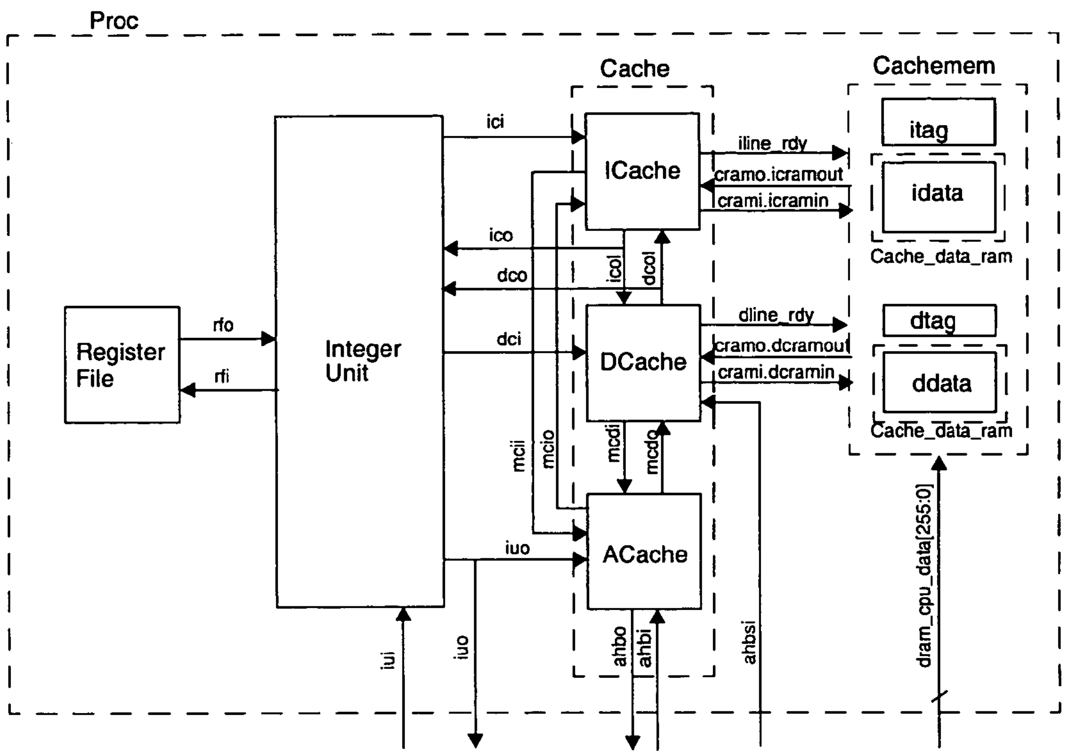
FIG. 25. SoPEC LEON CPU core

The version of LEON implemented on SoPEC features 1 kB of ICache and 1 kB of DCache. Both caches are direct mapped and feature 8 word lines so their data RAMs are arranged as 32×256-bit and their tag RAMs as 32×30-bit (itag) or 32×32-bit (dtag). Like most of the rest of the LEON code used on SoPEC the cache controllers are taken from the leon2-1.0.7 release. The LEON cache controllers and cache RAMs have been modified to ensure that an entire 256-bit line is refilled at a time to make maximum use of the memory bandwidth offered by the embedded DRAM organization (DRAM lines are also 256-bit). The data cache controller has also been modified to ensure that user mode code can only access Dcache contents that represent valid user-mode regions of DRAM as specified by the MMU. A block diagram of the LEON CPU core as implemented on SoPEC is shown in FIG. 25 below.

In this diagram dotted lines are used to indicate hierarchy and red items represent signals or wrappers added as part of the SoPEC modifications. LEON makes heavy use of VHDL records and the records used in the CPU core are described in Table 25. Unless otherwise stated the records are defined in the iface.vhd file (part of the LEON release) and this should be consulted for a complete breakdown of the record elements.

TABLE 25

Relevant LEON records

| Record Name | Description |
|---|---|
| rfi | Register File Input record. Contains address, datain and control signals for the register file. |
| rfo | Register File Output record. Contains the data out of the dual read port register file. |
| ici | Instruction Cache In record. Contains program counters from different stages of the pipeline and various control signals |
| ico | Instruction Cache Out record. Contains the fetched instruction data and various control signals. This record is also sent to the DCache (i.e. icol) so that diagnostic accesses (e.g. lda/sta) can be serviced. |

TABLE 25-continued

Relevant LEON records

| Record Name | Description |
| --- | --- |
| dci | Data Cache In record. Contains address and data buses from different stages of the pipeline (execute & memory) and various control signals |
| dco | Data Cache Out record. Contains the data retrieved from either memory or the caches and various control signals. This record is also sent to the ICache (i.e. dcol) so that diagnostic accesses (e.g. lda/sta) can be serviced. |
| iui | Integer Unit In record. This record contains the interrupt request level and a record for use with LEONs Debug Support Unit (DSU) |
| iuo | Integer Unit Out record. This record contains the acknowledged interrupt request level with control signals and a record for use with LEONs Debug Support Unit (DSU) |
| mcii | Memory to Cache Icache In record. Contains the address of an Icache miss and various control signals |
| mcio | Memory to Cache Icache Out record. Contains the returned data from memory and various control signals |
| mcdi | Memory to Cache Dcache In record. Contains the address and data of a Dcache miss or write and various control signals |
| mcdo | Memory to Cache Dcache Out record. Contains the returned data from memory and various control signals |
| ahbi | AHB In record. This is the input record for an AHB master and contains the data bus and AHB control signals. The destination for the signals in this record is the AHB controller. This record is defined in the amba.vhd file |
| ahbo | AHB Out record. This is the output record for an AHB master and contains the address and data buses and AHB control signals. The AHB controller drives the signals in this record. This record is defined in the amba.vhd file |
| ahbsi | AHB Slave In record. This is the input record for an AHB slave and contains the address and data buses and AHB control signals. It is used by the DCache to facilitate cache snooping (this feature is not enabled in SoPEC). This record is defined in the amba.vhd file |
| crami | Cache RAM In record. This record is composed of records of records which contain the address, data and tag entries with associated control signals for both the ICache RAM and DCache RAM |
| cramo | Cache RAM Out record. This record is composed of records of records which contain the data and tag entries with associated control signals for both the ICache RAM and DCache RAM |
| iline_rdy | Control signal from the ICache controller to the instruction cache memory. This signal is active (high) when a full 256-bit line (on dram_cpu_data) is to be written to cache memory. |
| dline_rdy | Control signal from the DCache controller to the data cache memory. This signal is active (high) when a full 256-bit line (on dram_cpu_data) is to be written to cache memory. |
| dram_cpu_data | 256-bit data bus from the embedded DRAM |

11.7.1 Cache Controllers

The LEON cache module consists of three components: the ICache controller (icache.vhd), the DCache controller (dcache.vhd) and the AHB bridge (acache.vhd) which translates all cache misses into memory requests on the AHB bus.

In order to enable full line refill operation a few changes had to be made to the cache controllers. The ICache controller was modified to ensure that whenever a location in the cache was updated (i.e. the cache was enabled and was being refilled from DRAM) all locations on that cache line had their valid bits set to reflect the fact that the full line was updated. The iline_rdy signal is asserted by the ICache controller when this happens and this informs the cache wrappers to update all locations in the idata RAM for that line.

A similar change was made to the DCache controller except that the entire line was only updated following a read miss and that existing write through operation was preserved. The DCache controller uses the dline_rdy signal to instruct the cache wrapper to update all locations in the ddata RAM for a line. An additional modification was also made to ensure that a double-word load instruction from a non-cached location would only result in one read access to the DIU i.e. the second read would be serviced by the data cache. Note that if the DCache is turned off then a double-word load instruction will cause two DIU read accesses to occur even though they will both be to the same 256-bit DRAM line.

The DCache controller was further modified to ensure that user mode code cannot access cached data to which it does not have permission (as determined by the relevant RegionNControl register settings at the time the cache line was loaded). This required an extra 2 bits of tag information to record the user read and write permissions for each cache line. These user access permissions can be updated in the same manner as the other tag fields (i.e. address and valid bits) namely by line refill, STA instruction or cache flush. The user access permission bits are checked every time user code attempts to access the data cache and if the permissions of the access do not agree with the permissions returned from the tag RAM then a cache miss occurs. As the MMU evaluates the access permissions for every cache miss it will generate the appropriate exception for the forced cache miss caused by the errant user code. In the case of a prohibited read access the trap will be immediate while a prohibited write access will result in a deferred trap. The deferred trap results from the fact that the prohibited write is committed to a write buffer in the DCache controller and program execution continues until the prohibited write is detected by the MMU which may be several cycles later. Because the errant write was treated as a write miss by the DCache controller (as it did not match the stored user access permissions) the cache contents were not updated and so remain coherent with the DRAM contents (which do not get updated because the MMU intercepted the prohibited write). Supervisor mode code is not subject to such checks and so has free access to the contents of the data cache.

In addition to AHB bridging, the ACache component also performs arbitration between ICache and DCache misses when simultaneous misses occur (the DCache always wins) and implements the Cache Control Register (CCR). The leon2-1.0.7 release is inconsistent in how it handles cacheability: For instruction fetches the cacheability (i.e. is the access to an area of memory that is cacheable) is determined by the ICache controller while the ACache determines whether or not a data access is cacheable. To further complicate matters the DCache controller does determine if an access resulting from a cache snoop by another AHB master is cacheable (Note that the SoPEC ASIC does not implement cache snooping as it has no need to do so). This inconsistency has been cleaned up in more recent LEON releases but is preserved here to minimise the number of changes to the LEON RTL. The cache controllers were modified to ensure that only DRAM accesses (as defined by the SoPEC memory map) are cached.

The only functionality removed as a result of the modifications was support for burst fills of the ICache. When enabled burst fills would refill an ICache line from the location where a miss occurred up to the end of the line. As the entire line is now refilled at once (when executing from DRAM) this functionality is no longer required. Furthermore, more substantial modifications to the ICache controller would be needed to preserve this function without adversely affecting full line refills. The CCR was therefore modified to ensure that the instruction burst fetch bit (bit16) was tied low and could not be written to.

11.7.1.1 LEON Cache Control Register

The CCR controls the operation of both the I and D caches. Note that the bitfields used on the SoPEC implementation of this register are based on the LEON v1.0.7 implementation and some bits have their values tied off. See section 4 of the LEON manual for a description of the LEON cache controllers.

TABLE 26

LEON Cache Control Register

| Field Name | bit(s) | Description |
|---|---|---|
| ICS | 1:0 | Instruction cache state:<br>00 - disabled<br>01 - frozen<br>10 - disabled<br>11 - enabled |
| DCS | 3:2 | Data cache state:<br>00 - disabled<br>01 - frozen<br>10 - disabled<br>11 - enabled |
| IF | 4 | ICache freeze on interrupt<br>0 - Do not freeze the ICache contents on taking an interrupt<br>1 - Freeze the ICache contents on taking an interrupt |
| DF | 5 | DCache freeze on interrupt<br>0 - Do not freeze the DCache contents on taking an interrupt<br>1 - Freeze the DCache contents on taking an interrupt |
| Reserved | 13:6 | Reserved. Reads as 0. |
| DP | 14 | Data cache flush pending.<br>0 - No DCache flush in progress<br>1 - DCache flush in progress<br>This bit is ReadOnly. |
| IP | 15 | Instruction cache flush pending.<br>0 - No ICache flush in progress<br>1 - ICache flush in progress<br>This bit is ReadOnly. |
| IB | 16 | Instruction burst fetch enable. This bit is tied low on SoPEC because it would interfere with the operation of the cache wrappers. Burst refill functionality is automatically provided in SoPEC by the cache wrappers. |
| Reserved | 20:17 | Reserved. Reads as 0. |
| FI | 21 | Flush instruction cache. Writing a 1 this bit will flush the ICache. Reads as 0. |
| FD | 22 | Flush data cache. Writing a 1 this bit will flush the DCache. Reads as 0. |

TABLE 26-continued

LEON Cache Control Register

| Field Name | bit(s) | Description |
|---|---|---|
| DS | 23 | Data cache snoop enable. This bit is tied low in SoPEC as there is no requirement to snoop the data cache. |
| Reserved | 31:24 | Reserved. Reads as 0. |

11.7.2 Cache Wrappers

The cache RAMs used in the leon2-1.0.7 release needed to be modified to support full line refills and the correct IBM macros also needed to be instantiated. Although they are described as RAMs throughout this document (for consistency), register arrays are actually used to implement the cache RAMs. This is because IBM SRAMs were not available in suitable configurations (offered configurations were too big) to implement either the tag or data cache RAMs. Both instruction and data tag RAMs are implemented using dual port (1 Read & 1 Write) register arrays and the clocked write-through versions of the register arrays were used as they most closely approximate the single port SRAM LEON expects to see.

11.7.2.1 Cache Tag RAM Wrappers

The itag and dtag RAMs differ only in their width—the itag is a 32×30 array while the dtag is a 32×32 array with the extra 2 bits being used to record the user access permissions for each line. When read using a LDA instruction both tags return 32-bit words. The tag fields are described in Table 27 and Table 28 below. Using the IBM naming conventions the register arrays used for the tag RAMs are called RA032X30D2P2W1R1M3 for the itag and RA032X32D2P2W1R1M3 for the dtag. The ibm_syncram wrapper used for the tag RAMs is a simple affair that just maps the wrapper ports on to the appropriate ports of the IBM register array and ensures the output data has the correct timing by registering it. The tag RAMs do not require any special modifications to handle full line refills. Because an entire line of cache is updated during every refill the 8 valid bits in the tag RAMs are superfluous (i.e. all 8 bit will either be set or clear depending on whether the line is in cache or not despite this only requiring a single bit). Nonetheless they have been retained to minimise changes and to maintain simplistic compatibility with the LEON core.

TABLE 27

LEON Instruction Cache Tag

| Field Name | bit(s) | Description |
|---|---|---|
| Valid | 7:0 | Each valid bit indicates whether or not the corresponding word of the cache line contains valid data |
| Reserved | 9:8 | Reserved - these bits do not exist in the itag RAM. Reads as 0. |
| Address | 31:10 | The tag address of the cache line |

TABLE 28

LEON Data Cache Tag

| Field Name | bit(s) | Description |
|---|---|---|
| Valid | 7:0 | Each valid bit indicates whether or not the corresponding word of the cache line contains valid data |

TABLE 28-continued

LEON Data Cache Tag

| Field Name | bit(s) | Description |
|---|---|---|
| URP | 8 | User read permission.<br>0 - User mode reads will force a refill of this line<br>1 - User mode code can read from this cache line. |
| UWP | 9 | User write permission.<br>0 - User mode writes will not be written to the cache<br>1 - User mode code can write to this cache line. |
| Address | 31:10 | The tag address of the cache line |

11.7.2.2 Cache Data RAM Wrappers

Figure 26:
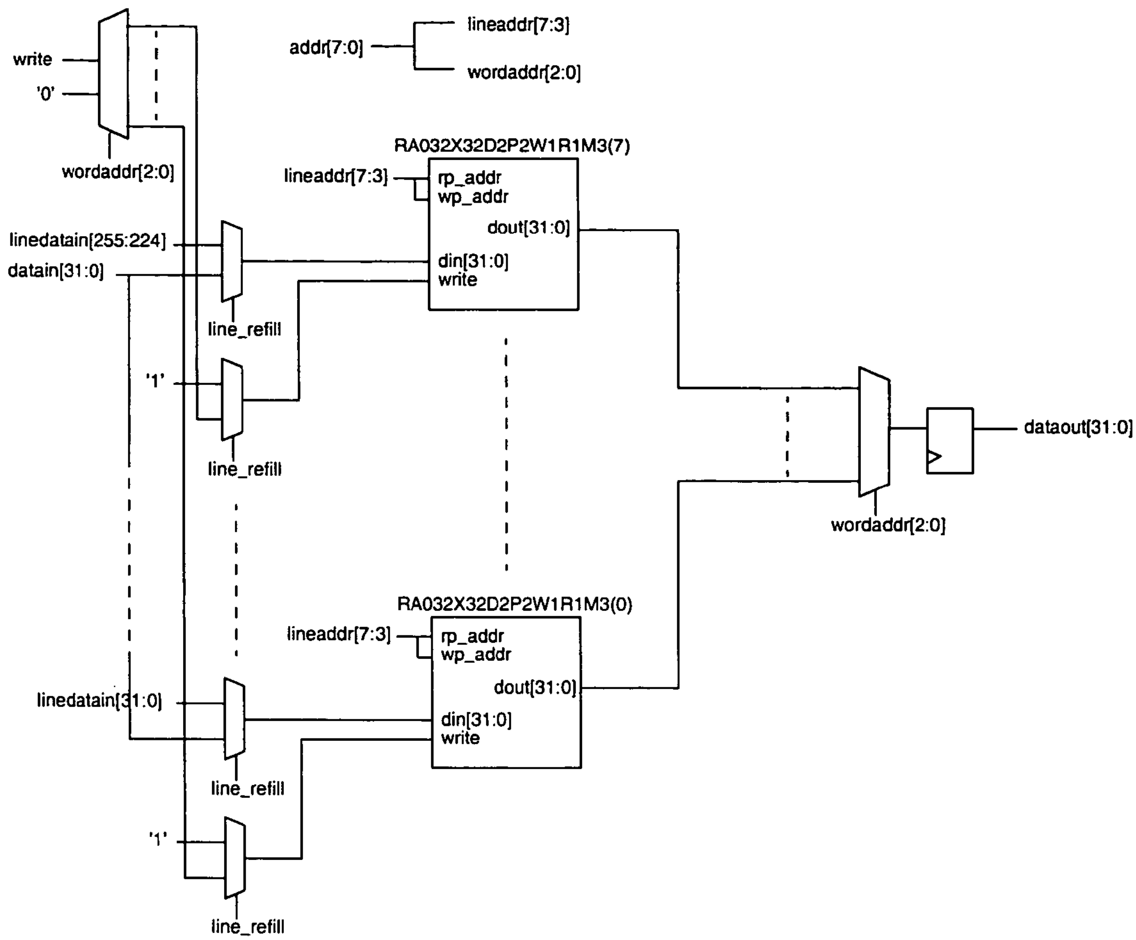
FIG. 26. Cache Data RAM wrapper

The cache data RAM contains the actual cached data and nothing else. Both the instruction and data cache data RAMs are implemented using 8 32×32-bit register arrays and some additional logic to support full line refills. Using the IBM naming conventions the register arrays used for the tag RAMs are called RA032X32D2P2W1R1M3. The ibm_cdram_wrap wrapper used for the tag RAMs is shown in FIG. 26 below.

To the cache controllers the cache data RAM wrapper looks like a 256×32 single port SRAM (which is what they expect to see) with an input to indicate when a full line refill is taking place (the line_rdy signal).

Internally the 8-bit address bus is split into a 5-bit lineaddress, which selects one of the 32 256-bit cache lines, and a 3-bit word address which selects one of the 8 32-bit words on the cache line. Thus each of the 8 32×32 register arrays contains one 32-bit word of each cache line. When a full line is being refilled (indicated by both the line_rdy and write signals being high) every register array is written to with the appropriate 32 bits from the linedatain bus which contains the 256-bit line returned by the DIU after a cache miss. When just one word of the cache line is to be written (indicated by the write signal being high while the line_rdy is low) then the word address is used to enable the write signal to the selected register array only—all other write enable signals are kept low. The data cache controller handles byte and half-word write by means of a read-modify-write operation so writes to the cache data RAM are always 32-bit.

The word address is also used to select the correct 32-bit word from the cache line to return to the LEON integer unit.

11.8 Realtime Debug Unit (RDU)

The RDU facilitates the observation of the contents of most of the CPU addressable registers in the SoPEC device in addition to some pseudo-registers in realtime. The contents of pseudo-registers, i.e. registers that are collections of otherwise unobservable signals and that do not affect the functionality of a circuit, are defined in each block as required. Many blocks do not have pseudo-registers and some blocks (e.g. ROM, PSS) do not make debug information available to the RDU as it would be of little value in realtime debug.

Figure 27:
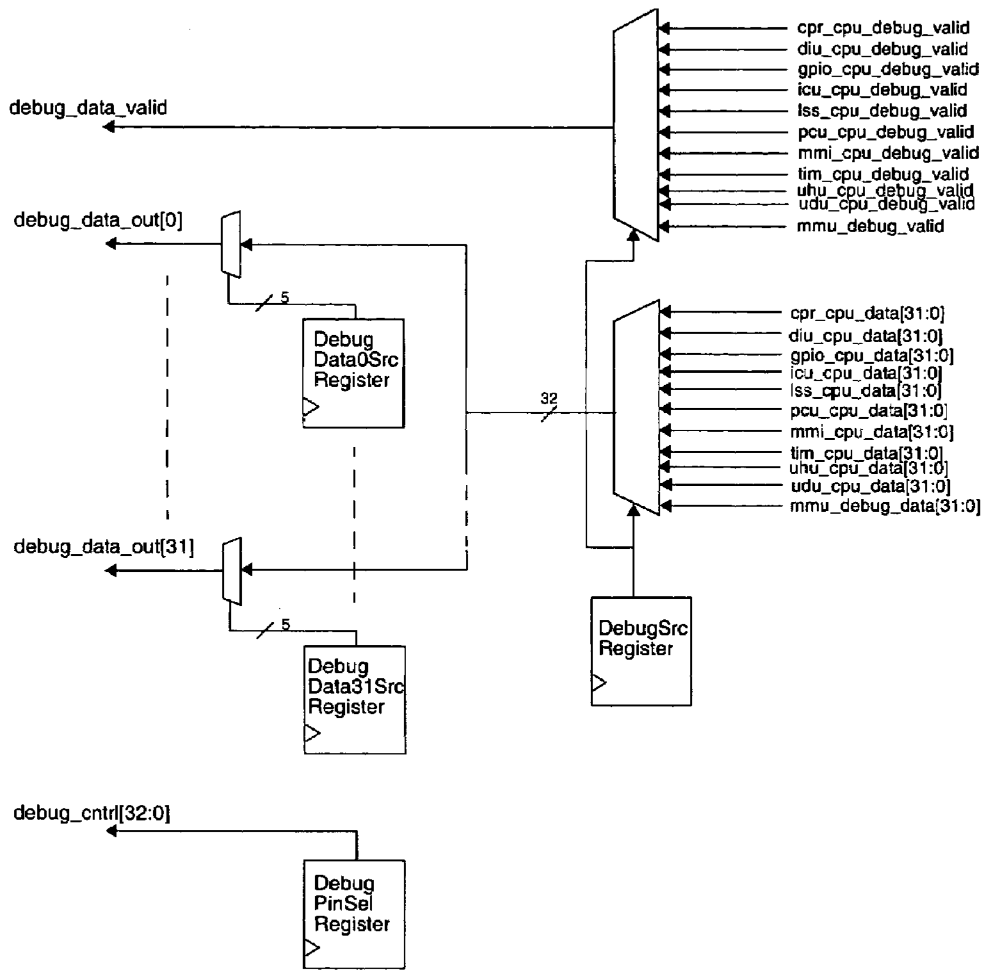
FIG. 27. Realtime Debug Unit block diagram

Each block that supports realtime debug observation features a DebugSelect register that controls a local mux to determine which register is output on the block's data bus (i.e. block_cpu_data). One small drawback with reusing the blocks data bus is that the debug data cannot be present on the same bus during a CPU read from the block. An accompanying active high block_cpu_debug_valid signal is used to indicate when the data bus contains valid debug data and when the bus is being used by the CPU. There is no arbitration for the bus as the CPU will always have access when required. A block diagram of the RDU is shown in FIG. 27.

As it may not always be possible to output a full 32-bit debug word every cycle the RDU supports the outputting of an n-bit sub-word every cycle to the enabled debug pins. Each debug test would then need to be re-run a number of times with a different portion of the debug word being output on the n-bit sub-word each time. The data from each run should then be correlated to create a full 32-bit (or whatever size is needed) debug word for every cycle. The debug_data_valid and pclk_out signals accompanies every sub-word to allow the data to be sampled correctly. The pclk_out signal is sourced close to its output pad rather than in the RDU to minimise the skew between the rising edge of the debug data signals (which should be registered close to their output pads) and the rising edge of pclk_out.

TABLE 29

RDU I/Os

| Port name | Pins | I/O | Description |
|---|---|---|---|
| diu_cpu_data | 32 | In | Read data bus from the DIU block |
| cpr_cpu_data | 32 | In | Read data bus from the CPR block |
| gpio_cpu_data | 32 | In | Read data bus from the GPIO block |
| icu_cpu_data | 32 | In | Read data bus from the ICU block |
| lss_cpu_data | 32 | In | Read data bus from the LSS block |
| pcu_cpu_debug_data | 32 | In | Read data bus from the PCU block |
| mmi_cpu_data | 32 | In | Read data bus from the MMI block |
| tim_cpu_data | 32 | In | Read data bus from the TIM block |
| uhu_cpu_data | 32 | In | Read data bus from the UHU block |
| udu_cpu_data | 32 | In | Read data bus from the UDU block |
| diu_cpu_debug_valid | 1 | In | Signal indicating the data on the diu_cpu_data bus is valid debug data. |
| tim_cpu_debug_valid | 1 | In | Signal indicating the data on the tim_cpu_data bus is valid debug data. |
| mmi_cpu_debug_valid | 1 | In | Signal indicating the data on the mmi_cpu_data bus is valid debug data. |
| pcu_cpu_debug_valid | 1 | In | Signal indicating the data on the pcu_cpu_data bus is valid debug data. |
| lss_cpu_debug_valid | 1 | In | Signal indicating the data on the lss_cpu_data bus is valid debug data. |
| icu_cpu_debug_valid | 1 | In | Signal indicating the data on the icu_cpu_data bus is valid debug data. |
| gpio_cpu_debug_valid | 1 | In | Signal indicating the data on the gpio_cpu_data bus is valid debug data. |
| cpr_cpu_debug_valid | 1 | In | Signal indicating the data on the cpr_cpu_data bus is valid debug data. |
| uhu_cpu_debug_valid | 1 | In | Signal indicating the data on the uhu_cpu_data bus is valid debug data. |
| udu_cpu_debug_valid | 1 | In | Signal indicating the data on the udu_cpu_data bus is valid debug data. |
| debug_data_out | 32 | Out | Output debug data to be muxed on to the GPIO pins |
| debug_data_valid | 1 | Out | Debug valid signal indicating the validity of the data on debug_data_out. This signal is used in all debug configurations |
| debug_cntrl | 33 | Out | Control signal for each debug data line indicating whether or not the debug data should be selected by the pin mux |

As there are no spare pins that can be used to output the debug data to an external capture device some of the existing I/Os have a debug multiplexer placed in front of them to allow them be used as debug pins. Furthermore not every pin that has a debug mux will always be available to carry the debug data as they may be engaged in their primary purpose e.g. as a GPIO pin. The RDU therefore outputs a debug_cntrl signal with each debug data bit to indicate whether the mux associated with each debug pin should select the debug data or the normal data for the pin. The DebugPinSel1 and DebugPinSel2 registers are used to determine which of the 33 potential debug pins are enabled for debug at any particular time.

If multiple debug runs are be needed to obtain a complete set of debug data the n-bit sub-word will need to contain a different bit pattern for each run. For maximum flexibility each debug pin has an associated DebugDataSrc register that allows any of the 32 bits of the debug data word to be output on that particular debug data pin. The debug data pin must be enabled for debug operation by having its corresponding bit in the DebugPinSel registers set for the selected debug data bit to appear on the pin.

The size of the sub-word is determined by the number of enabled debug pins which is controlled by the DebugPinSel registers. Note that the debug_data_valid signal is always output. Furthermore debug_cntrl[0] (which is configured by DebugPinSel1) controls the mux for both the debug_data_valid and pclk_out signals as both of these must be enabled for any debug operation.

The mapping of debug data_out[n] signals onto individual pins takes place outside the RDU. This mapping is described in Table 30 below.

TABLE 30

DebugPinSel mapping

| bit# | Pin |
|---|---|
| DebugPinSel1 | gpio[32]. The debug_data_valid signal will appear on this pin when enabled. Enabling this pin also automatically enables the gpio[33] pin which will output the pclk_out signal |
| DebugPinSel2(0-31) | gpio[0 . . . 31] |

minimum, to place the PSR register in another local register to ensure that the LEON can correctly return to its pre-interrupt state. The 4-bit interrupt level (irl) is also written to the trap type (tt) field of the TBR (Trap Base Register) by hardware. The TBR then contains the vector of the trap handler routine the processor will then jump. The TBA (Trap Base Address) field of the TBR must have a valid value before any interrupt processing can occur so it should be configured at an early stage.

Interrupt pre-emption is supported while ET (Enable Traps) bit of the PSR is set. This bit is cleared during the initial trap processing. In initial simulations the ET bit was observed to be cleared for up to 30 cycles. This causes significant additional interrupt latency in the worst case where a higher priority interrupt arrives just as a lower priority one is taken.

Figure 28:
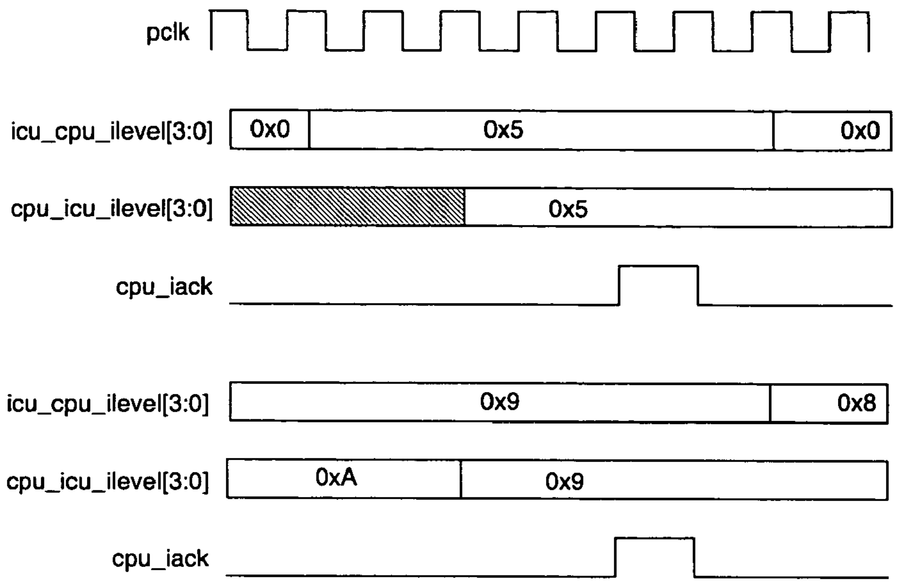
FIG. 28. Interrupt acknowledge cycles for a single and pending interrupts

The interrupt acknowledge cycles shown in FIG. 28 below are derived from simulations of the LEON processor.

TABLE 31

RDU Configuration Registers

| Address offset from MMU_base | Register | #bits | Reset | Description |
|---|---|---|---|---|
| 0x80 | DebugSrc | 4 | 0x00 | Denotes which block is supplying the debug data. The encoding of this block is given below.<br>0 - MMU<br>1 - TIM<br>2 - LSS<br>3 - GPIO<br>4 - MMI<br>5 - ICU<br>6 - CPR<br>7 - DIU<br>8 - UHU<br>9 - UDU<br>10 - PCU |
| 0x84 | DebugPinSel1 | 1 | 0x0 | Determines whether the gpio[33:32] pins are used for debug output.<br>1 - Pin outputs debug data<br>0 - Normal pin function |
| 0x88 | DebugPinSel2 | 32 | 0x0000_0000 | Determines whether a gpio[31:0]pin is used for debug data output.<br>1 - Pin outputs debug data<br>0 - Normal pin function |
| 0x8C to 0x108 | DebugDataSrc[31:0] | 32 × 5 | 0x00 | Selects which bit of the 32-bit debug data word will be output on debug_data_out[N] |

11.9 Interrupt Operation

The interrupt controller unit (see chapter 16) generates an interrupt request by driving interrupt request lines with the appropriate interrupt level. LEON supports 15 levels of interrupt with level 15 as the highest level (the SPARC architecture manual states that level 15 is non-maskable, but it can be masked if desired). The CPU will begin processing an interrupt exception when execution of the current instruction has completed and it will only do so if the interrupt level is higher than the current processor priority. If a second interrupt request arrives with the same level as an executing interrupt service routine then the exception will not be processed until the executing routine has completed.

When an interrupt trap occurs the LEON hardware will place the program counters (PC and nPC) into two local registers. The interrupt handler routine is expected, as a The SoPEC toplevel interrupt signals used in this diagram map directly to the LEON interrupt signals in the iui and iuo records. An interrupt is asserted by driving its (encoded) level on the icu_cpu_ilevel[3:0] signals (which map to iui.irl[3:0]). The LEON core responds to this, with variable timing, by reflecting the level of the taken interrupt on the cpu_icu_ilevel[3:0] signals (mapped to iuo.irl[3:0]) and asserting the acknowledge signal cpu_iack (iuo.intack). The interrupt controller then removes the interrupt level one cycle after it has seen the level been acknowledged by the core. If there is another pending interrupt (of lower priority) then this should be driven on icu_cpu_ilevel[3:0] and the CPU will take that interrupt (the level 9 interrupt in the example below) once it has finished processing the higher priority interrupt. The cpu_icu_ilevel[3:0] signals always reflect the level of the last taken interrupt, even when the CPU has finished processing all interrupts.

12 USB Host Unit (UHU)

12.1 Overview

The UHU sub-block contains a USB2.0 host core and associated buffer/control logic, permitting communication between SoPEC and external USB devices, e.g. digital camera or other SoPEC USB device cores in a multi-SoPEC system. UHU dataflow in a basic multi-SoPEC system is illustrated in the functional block diagram of FIG. 29.

The multi-port PHY provides three downstream USB ports for the UHU.

The host core in the UHU is a USB2.0 compliant 3rd party Verilog IP core from Synopsys, the ehci_ohci. It contains an Enhanced Host Controller Interface (EHCI) controller and an Open Host Controller Interface (OHCI) controller. The EHCI controller is responsible for all High Speed (HS) USB traffic. The OHCI controller is responsible for all Full Speed (FS) and Low Speed (LS) USB traffic.

12.1.1 USB Effective Bandwidth

The USB effective bandwidth is dependent on the bus speed, the transfer type and the data payload size of each USB transaction. The maximum packet size for each transaction data payload is defined in the bMaxPacketSize0 field of the USB device descriptor for the default control endpoint (EP0) and in the wMaxPacketSize field of USB EP descriptors for all other EPs. The payload sizes that a USB host is required to support at the various bus speeds for all transfer types are listed in Table 32. It should be noted that the host is required by USB to support all transfer types and all speeds. The capacity of the packet buffers in the EHCI/OHCI controllers will be influenced by these packet constraints.

TABLE 32

USB Packet Constraints

| Transfer | MaxPacketSize (Bytes) | | |
|---|---|---|---|
| Type | LS | FS | HS |
| Control | 8 | 8, 16, 32, 64 | 64 |
| Isochronous | n/a | 0-1023 | 0-1024 |
| Interrupt | 0-8 | 0-64 | 0-1024 |
| Bulk | n/a | 8, 16, 32, 64 | 512 |

The maximum effective bandwidth using the maximum packet size for the various transfer types is listed in Table 33.

TABLE 33

USB Transaction Limits

| Transfer | Max Bandwidth (Mbits/s) | | | |
|---|---|---|---|---|
| Type | LS | FS | HS | Comments |
| Control | 0.192 | 6.656 | 12.698 | Assuming one data stage and zero-length status stage. |
| Isochronous | Not supported at LS | 8.184 | 393.216 | A maximum transfer size of 3072 bytes per microframe is allowed for high bandwidth HS isochronous EPs, using multiple transactions per microframe. It is unlikely that a host would allocate this much bandwidth on a shared bus. |
| Interrupt | 0.384 | 9.728 | 393.216 | A maximum transfer size of 3072 bytes per microframe is allowed for high bandwidth HS interrupt EPs, using multiple transactions. It is unlikely that a host would allocate this much bandwidth on a shared bus. |
| Bulk | Net supported at LS | 9.728 | 425.984 | Can only be realised during a (micro)frame that has no isochronous or interrupt transactions scheduled, because bulk transfers are only allocated the remaining bandwidth. |

12.1.2 DRAM Effective Bandwidth

The DRAM effective bandwidth available to the UHU is allocated by the DRAM Interface Unit (DIU). The DIU allocates time-slots to UHU, during which it can access the DRAM in fixed bursts of 4×64 bit words.

A single read or write time-slot, based on a DIU rotation period of 256 cycles, provides a read or write transfer rate of 192 Mbits/s, however this is programmable. It is possible to configure the DIU to allocate more than one time-slot, e.g. 2 slots=384 Mbits/s, 3 slots=576 Mbits/s, etc.

The maximum possible USB bandwidth during bulk transfers is 425 M/bits per second, assuming a single bulk EP with complete USB bandwidth allocation. The effective bandwidth will probably be less than this due to latencies in the ehci_ohci core. Therefore 2 DIU time-slots for the UHU will probably be sufficient to ensure acceptable utilization of available USB bandwidth.

12.2 Implementation

12.2.1 UHU I/Os

NOTE: P is a constant used in Table 34 to represent the number of USB downstream ports. P=3.

TABLE 34

UHU top-level I/Os

| Port name | Pins | I/O | Description |
|---|---|---|---|
| | | | Clocks and Resets |
| Pclk | 1 | In | Primary system clock. |
| Prst_n | 1 | In | Reset for pclk domain. Active low. Synchronous to pclk. |
| Uhu_48clk | 1 | In | 48 MHz USB clock. |
| Uhu_12clk | 1 | In | 12 MHz USB clock. Synchronous to uhu_48clk. |
| Phy_clk | 1 | In | 30 MHz PHY clock. |
| Phy_rst_n | 1 | In | Reset for phy_clk domain. Active low. Synchronous to phy_clk. |
| Phy_uhu_port_clk[2:0] | 3 | In | 30 MHz PHY clock, per port. Synchronous to phy_clk. |
| Phy_uhu_rst_n[2:0] | 3 | In | Resets for phy_uhu_port_clk[2:0] domains, per port. Active low. Synchronous to corresponding bit of phy_uhu_port_clk[2:0]. |
| | | | ICU Interface |
| Uhu_icu_irq | 1 | Out | Interrupt signal to the ICU. Active high. |
| | | | CPU Interface |
| Cpu_adr[9:2] | 8 | In | CPU address bus. Only bits 9:2 of the CPU address bus are required to address the UHU register map. |
| Cpu_dataout[31:0] | 32 | In | Shared write data bus from the CPU |
| Cpu_rwn | 1 | In | Common read/not-write signal from the CPU |
| Cpu_acode[1:0] | 2 | In | CPU Access Code signals. These decode as follows:<br>00: User program access<br>01: User data access<br>10: Supervisor program access<br>11: Supervisor data access |
| Cpu_uhu_sel | 1 | In | UHU select from the CPU. When cpu_uhu_sel is high both cpu_adr and cpu_dataout are valid |
| Uhu_cpu_rdy | 1 | Out | Ready signal to the CPU. When uhu_cpu_rdy is high it indicates the last cycle of the access. For a write cycle this means cpu_dataout has been registered by the UHU and for a read cycle this means the data on uhu_cpu_data is valid. |
| Uhu_cpu_data[31:0] | 32 | Out | Read data bus to the CPU |
| Uhu_cpu_berr | 1 | Out | Bus error signal to the CPU indicating an invalid access. |
| Uhu_cpu_debug_valid | 1 | Out | Signal indicating that the data currently on uhu_cpu_data is valid debug data. |
| | | | DIU interface |
| diu_uhu_wack | 1 | In | Acknowledge from the DIU that the write request was accepted. |
| diu_uhu_rack | 1 | In | Acknowledge from the DIU that the read request was accepted. |
| diu_uhu_rvalid | 1 | In | Signal from the DIU to the UHU indicating that the data currently on the diu_data[63:0] bus is valid |
| diu_data[63:0] | 64 | In | Common DIU data bus. |
| Uhu_diu_wadr[21:5] | 17 | Out | Write address bus to the DIU |
| Uhu_diu_data[63:0] | 64 | Out | Data bus to the DIU. |
| Uhu_diu_wreq | 1 | Out | Write request to the DIU |
| Uhu_diu_wvalid | 1 | Out | Signal from the UHU to the DIU indicating that the data currently on the uhu_diu_data[63:0] bus is valid |
| Uhu_diu_wmask[7:0] | 8 | Out | Byte aligned write mask. A '1' in a bit field of uhu_diu_wmask[7:0] means that the corresponding byte will be written to DRAM. |
| Uhu_diu_rreq | 1 | Out | Read request to the DIU. |
| Uhu_diu_radr[21:5] | 17 | Out | Read address bus to the DIU |

TABLE 34-continued

UHU top-level I/Os

| Port name | Pins | I/O | Description |
|---|---|---|---|
| **GPIO Interface Signals** | | | |
| gpio__uhu__over__current[2:0] | 3 | In | Over-current indication, per port.<br>Driven by an external VBUS current monitoring circuit. Each bit of the bus is as follows:<br>0: normal<br>1: over-current condition |
| uhu__gpio__power__switch[2:0] | 3 | Out | Power switching for downstream USB ports.<br>Each bit of the bus is as follows:<br>0: port power off<br>1: port power on |
| **Test Interface Signals** | | | |
| uhu__ohci__scanmode__i__n | 1 | In | OHCI Scan mode select. Active low.<br>Maps to ohci__0__scanmode__i__n ehci__ohci core input signal.<br>0: scan mode, entire OHCI host controller runs on 12 MHz clock input.<br>1: normal clocking mode.<br>NOTE: This signal should be tied high during normal operation. |
| **PHY Interface Signals - UTMI Tx** | | | |
| phy__uhu__txready[P-1:0] | P | In | Tx ready, per port.<br>Acknowledge signal from the PHY to indicate that the Tx data on uhu__phy__txdata[P-1:0][7:0] and uhu__phy__txdatah[P-1:0][7:0] has been registered and the next Tx data can be presented. |
| uhu__phy__txvalid[P-1:0] | P | Out | Tx data low byte valid, per port.<br>Indicates to the PHY that the Tx data on uhu__phy__txdata[P-1:0][7:0] is valid. |
| uhu__phy__txvalidh[P-1:0] | P | Out | Tx data high byte valid, per port.<br>Indicates to the PHY that the Tx data on uhu__phy__txdatah[P-1:0][7:0] is valid. |
| uhu__phy__txdata[P-1:0][7:0] | P x 8 | Out | Tx data low byte, per port.<br>The least significant byte of the 16 bit Tx data word. |
| uhu__phy__txdatah[P-1:0][7:0] | P x 8 | Out | Tx data high byte, per port.<br>The most significant byte of the 16 bit Tx data word. |
| **PHY Interface Signals - UTMI Rx** | | | |
| phy__uhu__rxvalid[P-1:0] | P | In | Rx data low byte valid, per port.<br>Indication from the PHY that the Rx data on phy__uhu__rxdata[P-1:0][7:0] is valid. |
| phy__uhu__rxvalidh[P-1:0] | P | In | Rx data high byte valid, per port.<br>Indication from the PHY that the Rx data on phy__uhu__rxdatah[P-1:0][7:0] is valid. |
| phy__uhu__rxactive[P-1:0] | P | In | Rx active, per port.<br>Indication from the PHY that a SYNC has been detected and the receive state-machine is in an active state. |
| phy__uhu__rxerr[P-1:0] | P | In | Rx error, per port.<br>Indication from the PHY that a receive error has been detected. |
| phy__uhu__rxdata[P-1:0][7:0] | P x 8 | In | Rx data low byte, per port.<br>The least significant byte of the 16 bit Rx data word. |
| phy__uhu__rxdatah[P-1:0][7:0] | P x 8 | In | Rx data high byte, per port.<br>The most significant byte of the 16 bit Rx data word. |
| **PHY Interface Signals - UTMI Control** | | | |
| phy__uhu__line__state[P-1:0][1:0] | P x 2 | In | Line state signal, per port.<br>Line state signal from the PHY. Indicates the state of the single ended receivers D+/D−<br>00: SE0<br>01: J state<br>10: K state<br>11: SE1 |
| phy__uhu__discon__det[P-1:0] | P | In | HS disconnect detect, per port.<br>Indicates that a HS disconnect was detected. |
| uhu__phy__xver__select[P-1:0] | P | Out | Transceiver select, per port.<br>0: HS transceiver selected.<br>1: LS transceiver selected. |

TABLE 34-continued

UHU top-level I/Os

| Port name | Pins | I/O | Description |
|---|---|---|---|
| uhu_phy_term_select[P-1:0][1:0] | P x 2 | Out | Termination select, per port.<br>00: HS termination enabled<br>01: FS termination enabled for HS device<br>10: LS termination enabled for LS serial mode.<br>11: FS termination enabled for FS serial modes |
| uhu_phy_opmode[P-1:0][1:0] | P x 2 | Out | Operational mode, per port.<br>Selects the operational mode of the PHY.<br>00: Normal operation<br>01: Non-driving<br>10: Disable bit-stuffing and NRZI encoding<br>11: Reserved |
| uhu_phy_suspendm[P-1:0] | P | Out | Suspend mode for PHY port logic, per port. Active low.<br>Places the PHY port logic in a low-power state. |
| PHY Interface Signals - Serial. | | | |
| phy_uhu_ls_fs_rcv[P-1:0] | P | In | Rx serial data, per port.<br>FS/LS differential receiver output. |
| phy_uhu_vpi[P-1:0] | P | In | D+ single-ended receiver output, per port. |
| phy_uhu_vmi[P-1:0] | P | In | D− single-ended receiver output, per port. |
| uhu_phy_fs_xver_own[P-1:0] | P | Out | Transceiver ownership, per port.<br>Selects between UTMI and serial interface transceiver control.<br>0: UTMI interface. The data on D+/D− is transmitted/received under the control of the UTMI interface, i.e. uhu_phy_fs_data[P-1:0], uhu_phy_fs_se0[P-1:0], uhu_phy_fs_oe[P-1:0] are inactive.<br>1: Serial interface. The data on D+/D− is transmitted/received under the control of the serial interface, i.e. uhu_phy_fs_data[P-1:0], uhu_phy_fs_se0[P-1:0], uhu_phy_fs_oe[P-1:0] are active. |
| uhu_phy_fs_data[P-1:0] | P | Out | Tx serial data, per port.<br>0: D+/D− are driven to a differential '0'<br>1: D+/D− are driven to a differential '1'<br>Only valid when uhu_phy_fs_xver_own[P-1:0] = 1. |
| uhu_phy_fs_se0[P-1:0] | P | Out | Tx Single-Ended '0' (SE0) assert, per port.<br>0: D+/D− are driven by the value of uhu_phy_fs_data[P-1:0]<br>1: D+/D− are driven to SE0<br>Only valid when uhu_phy_fs_xver_own[P-1:0] = 1. |
| uhu_phy_fs_oe[P-1:0] | P | Out | Tx output enable, per port.<br>0: uhu_phy_fs_data[P-1:0] and uhu_phy_fs_se0[P-1:0] disabled.<br>1: uhu_phy_fs_data[P-1:0] and uhu_phy_fs_se0[P-1:0] enabled.<br>Only valid when uhu_phy_fs_xver_own[P-1:0] = 1. |
| PHY Interface Signals - Vendor Control and Status. These signals are optional and may not be present on a specific PHY implementation. | | | |
| phy_uhu_vstatus[P-1:0][7:0] | P x 8 | In | Vendor status, per port.<br>Optional vendor specific control bus. |
| uhu_phy_vcontrol[P-1:0][3:0] | P x 4 | Out | Vendor control, per port.<br>Optional vendor specific status bus. |
| uhu_phy_vloadm[P-1:0] | P | Out | Vendor control load, per port.<br>Asserting this signal loads the vendor control register. |

12.2.2 Configuration Registers

The UHU register map is listed in Table 35. All registers are 32 bit word aligned.

Supervisor mode access to all UHU configuration registers is permitted at any time.

User mode access to UHU configuration registers is only permitted when UserModeEn=1. A CPU bus error will be signalled on cpu_berr if user mode access is attempted when UserModeEn=0. UserModeEn can only be written in supervisor mode.

TABLE 35

UHU register map

| Address Offset from UHU_base | Register | #Bits | Reset | Description |
|---|---|---|---|---|
| | | | | UHU-Specific Control/Status Registers |
| 0x000 | Reset | 1 | 0x1 | Reset register. Writting a '0' or a '1' to this register resets all UHU logic, including the ehci_ohci host core. Equivalent to a hardware reset. NOTE: This register always reads 0x1. |
| 0x004 | IntStatus | 7 | 0x0 | Interrupt status register. Read only. Refer to section 12.2.2.2 below for IntStatus register description. |
| 0x008 | UhuStatus | 11 | 0x0 | General UHU logic status register. Read only. Refer to section 12.2.2.3 below for UhuStatus register description. |
| 0x00C | IntMask | 7 | 0x0 | Interrupt mask register. Enables/disables the generation of interrupts for individual events detected by the IntStatus register. Refer to section 12.2.2.4 below for IntMask register description. |
| 0x010 | IntClear | 4 | 0x0 | Interrupt clear register. Clears interrupt fields in the IntStatus register. Refer to section 12.2.2.5 below for IntClear register description. NOTE: This register always reads 0x0. |
| 0x014 | EhciOhciCtl | 6 | 0x1000 | EHCI/OHCI general control register. Refer to section 12.2.2.6 below for EhciOhciCtl register description. |
| 0x018 | EhciFladjCtl | 24 | 0x02020202 | EHCI frame length adjustment (FLADJ) controlregister. Refer to section 12.2.2.7 below for EhciFladjCtl register description. |
| 0x01C | AhbArbiterEn | 2 | 0x0 | AHB arbiter enable register. Enable/disable AHB arbitration for EHCI/OHCI controllers. When arbitration is disabled for a controller, the AHB arbiter will not respond to AHB requests from that controller. Refer to section 12.2.3.3.4 below for details of arbitration.<br>[4] EhciEn<br>0: disabled<br>1: enabled<br>[3:1] Reserved<br>[0] OhciEn<br>0: disabled<br>1: enabled |
| 0x020 | DmaEn | 2 | 0x0 | DMA read/write channel enable register. Enables/disables the generation of DMA read/write requests from the UHU to the DIU. When disabled, all UHU to DIU control signals will be de-asserted.<br>[4] ReadEn<br>0: disabled<br>1: enabled<br>[3:1] Reserved<br>[0] WriteEn<br>0: disabled<br>1: enabled |
| 0x024 | DebugSelect[9:2] | 8 | 0x0 | Debug select register. Address of the register selected for debug observation. NOTE: DebugSelect[9:2] can only select UHU specific control/status registers for debug observation, i.e. EHCI/OHCI host controller registers can not be selected for debug observation. |
| 0x028 | UserModeEn | 1 | 0x0 | User mode enable register. Enables CPU user mode access to UHU register map.<br>0: Supervisor mode access only.<br>1: Supervisor and user mode access.<br>NOTE: UserModeEn can only be written in |

TABLE 35-continued

UHU register map

| Address Offset from UHU_base | Register | #Bits | Reset | Description |
|---|---|---|---|---|
| | | | | supervisor mode. |
| 0x02C-0x09F | | | | Reserved |
| OHCI Host Controller Operational Registers. The OHCI register reset values are all given as 32 bit hex numbers because all the register fields are not contained within the least significant bits of the 32 bit registers, i.e. every register uses bit #31, regardless of number of bits used in register. | | | | |
| 0x100 | HcRevision | 32 | 0x00000010 | A BCD representation of the OHCI spec revision. |
| 0x104 | HcControl | 32 | 0x00000000 | Defines operating modes for the host controller. |
| 0x108 | HcCommandStatus | 32 | 0x00000000 | Used by the Host Controller to receive commands issued by the Host Controller Driver, as well as reflecting the current status of the Host Controller. |
| 0x10C | HcInterruptStatus | 32 | 0x00000000 | Provides status on various events that cause hardware interrupts. When an event occurs, Host Controller sets the corresponding bit in this register. |
| 0x110 | HcInterruptEnable | 32 | 0x00000000 | Each enable bit corresponds to an associated interrupt bit in the HcInterruptStatus register. |
| 0x114 | HcInterruptDisable | 32 | 0x00000000 | Each disable bit corresponds to an associated interrupt bit in the HcInterruptStatus register. |
| 0x118 | HcHCCA | 32 | 0x00000000 | Physical address in DRAM of the Host Controller Communication Area. |
| 0x11C | HcPeriodCurrentED | 32 | 0x00000000 | Physical address in DRAM of the current Isochronous or Interrupt Endpoint Descriptor. |
| 0x120 | HcControlHeadED | 32 | 0x00000000 | Physical address in DRAM of the first Endpoint Descriptor of the Control list. |
| 0x124 | HcControlCurrentED | 32 | 0x00000000 | Physical address in DRAM of the current Endpoint Descriptor of the Control list. |
| 0x128 | HcBulkHeadED | 32 | 0x00000000 | Physical address in DRAM of the first Endpoint Descriptor of the Bulk list. |
| 0x12C | HcBulkCurrentED | 32 | 0x00000000 | Physical address in DRAM of the current endpoint of the Bulk list. |
| 0x130 | HcDoneHead | 32 | 0x00000000 | Physical address in DRAM of the last completed Transfer Descriptor that was added to the Done queue |
| 0x134 | HcFmInterval | 32 | 0x00002EDF | Indicates the bit time interval in a Frame and the Full Speed maximum packet size that the Host Controller may transmit or receive without causing scheduling overrun. |
| 0x138 | HcFmRemaining | 32 | 0x00000000 | Contains a down counter showing the bit time remaining in the current Frame. |
| 0x13C | HcFmNumber | 32 | 0x00000000 | Provides a timing reference among events happening in the Host Controller and the Host Controller Driver. |
| 0x140 | HcPeriodicStart | 32 | 0x00000000 | Determines when is the earliest time Host Controller should start processing the periodic list. |
| 0x144 | HcLSThreshold | 32 | 0x00000628 | Used by the Host Controller to determine whether to commit to the transfer of a maximum of 8-byte LS packet before EOF. |
| 0x148 | HcRhDescriptorA | 32 | impl. specific | First of 2 registers describing the characteristics of the Root Hub. Reset values are implementation-specific. |
| 0x14C | HcRhDescriptorB | 32 | impl. specific | Second of 2 registers describing the characteristics of the Root Hub. Reset values are implementation-specific. |
| 0x150 | HcRhStatus | 32 | impl. specific | Represents the Hub Status field and the Hub Status Change field. |
| 0x154 | HcRhPortStatus[0] | 32 | impl. specific | Used to control and report port events on port #0. |
| 0x158 | HcRhPortStatus[1] | 32 | impl. specific | Used to control and report port events on port #1. |
| 0x15C | HcRhPortStatus[2] | 32 | impl. specific | Used to control and report port events on port #2. |
| 0x160-0x19F | | | | Reserved |

TABLE 35-continued

UHU register map

| Address Offset from UHU_base | Register | #Bits | Reset | Description |
|---|---|---|---|---|
| EHCI Host Controller Capability Registers. There are subtle differences between capability register map in the EHCI spec and the register map in the Synopsys databook. The Synopsys core interface to the Capability registers is DWORD in size, whereas the Capability register map in the EHCI spec is byte aligned. Synopsys placed the first 4 bytes of EHCI capability registers into a single 32 bit register, HCCAPBASE, in the same order as they appear in the EHCI spec register map. The HCSP-PORTROUTE register that appears on the EHCI spec register map is optional and not implemented in the Synopsys core. | | | | |
| 0x200 | HCCAPBASE | 32 | 0x00960010 | Capability register.<br>[31:16] HCIVERSION<br>[15:8] reserved<br>[7:0] CAPLENGTH |
| 0x204 | HCSPARAMS | 32 | 0x00001116 | Structural parameter. |
| 0x208 | HCCPARAMS | 32 | 0x0000A014 | Capability parameter. |
| 0x20C-0x20F | | | | Reserved |
| EHCI Host Controller Operational Registers. | | | | |
| 0x210 | USBCMD | 32 | 0x00080900 | USB command |
| 0x214 | USBSTS | 32 | 0x00001000 | USB status. |
| 0x218 | USBINTR | 32 | 0x00000000 | USB interrupt enable. |
| 0x21C | FRINDEX | 32 | 0x00000000 | USB frame index. |
| 0x220 | CTRLDSSEGMENT | 32 | 0x00000000 | 4G segment selector. |
| 0x224 | PERIODICLIST BASE | 32 | 0x00000000 | Periodic frame list base register. |
| 0x228 | ASYNCLISTADDR | 32 | 0x00000000 | Asynchronous list address. |
| 0x22C-0x24F | | | | Reserved |
| 0x250 | CONFIGFLAG | 32 | 0x00000000 | Configured flag register. |
| 0x254 | PORTSC0 | 32 | 0x00002000 | Port #0 Status/Control. |
| 0x258 | PORTSC1 | 32 | 0x00002000 | Port #1 Status/Control. |
| 0x25C | PORTSC2 | 32 | 0x00002000 | Port #2 Status/Control. |
| 0x260-0x28F | | | | Reserved |
| EHCI Host Controller Synopsys-specific Registers. | | | | |
| 0x290 | INSNREG00 | 32 | 0x00000000 | EHCI programmable micro-frame base value.<br>Refer to section 12.2.2.8 below.<br>NOTE: Clear this register during normal operation. |
| 0x294 | INSNREG01 | 32 | 0x01000100 | EHCI internal packet buffer programmable OUT/IN threshold values.<br>Refer to section 12.2.2.9 below. |
| 0x298 | INSNREG02 | 32 | 0x00000100 | EHCI internal packet buffer programmable depth.<br>Refer to section 12.2.2.10 below. |
| 0x29C | INSNREG03 | 32 | 0x00000000 | Break memory transfer.<br>Refer to section 12.2.2.11 below. |
| 0x2A0 | INSNREG04 | 32 | 0x00000000 | EHCI debug register.<br>Refer to section 12.2.2.12 below.<br>NOTE: Clear this register during normal operation. |
| 0x2A4 | INSNREG05 | 32 | 0x00001000 | UTMI PHY control/status registers.<br>Refer to section 12.2.2.13 below.<br>NOTE: Software should read this register to ensure that INSNREG05. VBusy = 0 before writing any fields in INSNREG05.w |
| Debug Registers. | | | | |
| 0x300 | EhciOhciStatus | 26 | 0x0000000 | EHCI/OHCI host controller status signals.<br>Read only.<br>Mapped to EHCI/OHCI status output signals on the ehci_ohci core top-level.<br>[25:23] ehci_prt_pwr_o[2:0]<br>[22] ehci_interrupt_o<br>[21] ehci_pme_status_o<br>[20] ehci_power_state_ack_o<br>[19] ehci_usbsts_o<br>[18] ehci_bufacc_o<br>[17:15] ohci_0_ccs_o[2:0]<br>[14:12] ohci_0_speed_o[2:0]<br>[11:9] ohci_0_suspend_o[2:0]<br>[8] ohci_0_lgcy_irq1_o<br>[7] ohci_0_lgcy_irq12_o |

TABLE 35-continued

UHU register map

| Address Offset from UHU__base | Register | #Bits | Reset | Description |
|---|---|---|---|---|
| | | | | [6] ohci__0__irq__o__n<br>[5] ohci__0__smi__o__n<br>[4] ohci__0__rmtwkp__o<br>[3] ohci__0__sof__o__n<br>[2] ohci__0__globalsuspend__o<br>[1] ohci__0__drwe__o<br>[0] ohci__0__rwe__o |

12.2.2.1 OHCI Legacy System Support

Register fields in the EhciOhciCtl and EhciOhciStatus refer to "OHCI Legacy" signals. These are I/O signals on the ehci_ohci core that are provided by the OHCI controller to support the use of a USB keyboard and USB mouse in an environment that is not USB aware, e.g DOS on a PC. Emulation of PS/2 mouse and keyboard operation is possible with the hardware provided and emulation software drivers. Although this is not relevant in the context of a SoPEC environment, access to these signals is provided via the UHU register map for debug purposes, i.e. they are not used during normal operation.

12.2.2.2 IntStatus Register Description

All IntStatus bits are active high. All interrupt event fields in the IntStatus register are edge detected from the relevant UHU signals, unless otherwise stated. A transition from '0' to '1' on any status field in this register will generate an interrupt to the Interrupt Controller Unit (ICU) on uhu_icu_irq, if the corresponding bit in the IntMask register is set. IntStatus is a read only register. IntStatus bits are cleared by writing a '1' to the corresponding bit in the IntClear register, unless otherwise stated.

TABLE 36

IntStatus

| Field Name | Bit(s) | Reset | Description |
|---|---|---|---|
| EhciIrq | 24 | 0x0 | EHCI interrupt.<br>Generated from ehci__interrupt__o output signal from ehci__ohci core. Used to alert the host controller driver to events such as:<br>Interrupt on Async Advance<br>Host system error (assertion of sys__interrupt__i)<br>Frame list roll-over<br>Port change<br>USB error<br>USB interrupt.<br>NOTE: The UHU EHCI driver software should read the EHCI controller internal operational register USBSTS to determine the nature of the interrupt.<br>NOTE: This interrupt is synchronized with posted writes in the EHCI DIU buffer. See section 12.2.3.3 below.<br>NOTE: This is a level-sensitive field. It reflects the ehci__ohci active high interrupt signal ehci__interrupt__o. There is no corresponding field in the IntClear register for this field because it is cleared when the EHCI host controller driver clears the interrupt condition via the EHCI host controller operational registers, causing ehci__interrupt__o to be de-asserted. |
| | 23:21 | 0x0 | Reserved |
| OhciIrq | 20 | 0x0 | OHCI general interrupt.<br>Generated from ohci__0__irq__o__n output signal from ehci__ohci core. One of 2 interrupts that the host controller uses to inform the host controller driver of interrupt conditions. This interrupt is used when HcControl.IR is cleared.<br>NOTE: The UHU OHCI driver software should read the OHCI controller internal operational register HcInterruptStatus to determine the nature of the interrupt.<br>NOTE: This interrupt is synchronized with posted writes in the OHCI DIU buffer. See section 12.2.3.3 below. |

TABLE 36-continued

| IntStatus | | | |
|---|---|---|---|
| Field Name | Bit(s) | Reset | Description |
| | | | NOTE: This is a level-sensitive field. It reflects the inverse of the ehci_ohci active low interrupt signal ohci_0_irq_o_n. There is no corresponding field in the IntClear register for this field because it is cleared when the OHCI host controller driver clears the interrupt condition via the OHCI host controller operational registers, causing ohci_0_irq_o_n to be de-asserted. |
| | 19:17 | 0x0 | Reserved |
| OhciSmi | 16 | 0x0 | OHCI system management interrupt. Generated from ohci_0_smi_o_n output signal from ehci_ohci core. One of 2 interrupts that the host controller uses to inform the host controller driver of interrupt conditions. This interrupt is used when HcControl.IR is set. NOTE: The UHU OHCI driver software should read the OHCI controller internal operational register HcInterruptStatus to determine the nature of the interrupt. NOTE: This interrupt is synchronized with posted writes in the OHCI DIU buffer. See section 12.2.3.3 belows NOTE: This is a level-sensitive field. It reflects the inverse of the ehci_ohci active low interrupt signal ohci_0_smi_o_n. There is no corresponding field in the IntClear register for this field because it is cleared when the OHCI host controller driver clears the interrupt condition via the OHCI host controller operational registers, causing ohci_0_smi_o_n to be de-asserted. |
| | 15:13 | 0x0 | Reserved |
| EhciAhbHrespErr | 12 | 0x0 | EHCI AHB slave HRESP error. Indicates that the EHCI AHB slave responded to an AHB request with HRESP = 0x1 (ERROR). |
| | 11:9 | 0x0 | Reserved |
| OhciAhbHrespErr | 8 | 0x0 | OHCI AHB slave HRESP error. Indicates that the OHCI AHB slave responded to an AHB request with HRESP = 0x1 (ERROR). |
| | 7:5 | 0x0 | Reserved |
| EhciAhbAdrErr | 4 | 0x0 | EHCI AHB master address error. Indicates that the EHCI AHB master presented an address to the uhu_dma AHB arbiter that was out of range during a valid AHB access. See section 12.2.3.3.4 below. |
| | 3:1 | 0x0 | Reserved |
| OhciAhbAdrErr | 0 | 0x0 | OHCI AHB master address error. Indicates that the OHCI AHB master presented an address to the uhu_dma AHB arbiter that was out of range during a valid AHB access. See section 12.2.3.3.4 below. |

12.2.2.3 UhuStatus Register Description

TABLE 37

| UhuStatus | | | |
|---|---|---|---|
| Field Name | Bit(s) | Reset | Description |
| EhciIrqPending | 24 | 0x0 | EHCI interrupt pending. Indicates that an IntStatus.EhciIrq interrupt condition has been detected, but the interrupt has been delayed due to posted writes in the EHCI DIU buffer. Cleared when IntStatus.EhciIrq is cleared. |
| | 23:21 | 0x0 | Reserved |
| OhciIrqPending | 20 | 0x0 | OHCI general interrupt pending. Indicates that an IntStatus.OhciIrq interrupt condition has been detected, but the interrupt has been delayed |

TABLE 37-continued

UhuStatus

| Field Name | Bit(s) | Reset | Description |
|---|---|---|---|
| | | | due to posted writes in the OHCI DIU buffer. Cleared when IntStatus.OhciIrq is cleared. |
| | 19:17 | 0x0 | Reserved |
| EhciSmiPending | 16 | 0x0 | OHCI system management interrupt pending. Indicates that an IntStatus.OhciSmi interrupt condition has been detected, but the interrupt has been delayed due to posted writes in the OHCI DIU buffer. Cleared when IntStatus.OhciSmi is cleared. |
| | 15:14 | 0x0 | Reserved |
| OhciDiuRdBufCnt | 13:12 | 0x0 | OHCI DIU read buffer count. Indicates the number of 4 × 64 bit buffer locations that contain valid DIU read data for the OHCI controller. Range 0 to 2. |
| | 11:10 | 0x0 | Reserved |
| EhciDiuRdBufCnt | 9:8 | 0x0 | EHCI DIU read buffer count. Indicates the number of 4 × 64 bit buffer locations that contain valid DIU read data for the EHCI controller. Range 0 to 2. |
| | 7:6 | 0x0 | Reserved |
| OhciDiuWrBufCnt | 5:4 | 0x0 | OHCI DIU write buffer count. Indicates the number of 4 × 64 bit buffer locations that contain valid DIU write data from the OHCI controller. Range 0 to 2. |
| | 3:2 | 0x0 | Reserved |
| EhciDiuWrBufCnt | 1:0 | 0x0 | EHCI DIU write buffer count. Indicates the number of 4 × 64 bit buffer locations that contain valid DIU write data from the EHCI controller. Range 0 to 2. |

12.2.2.4 IntMask Register Description

Enable/disable the generation of interrupts for individual events detected by the IntStatus register. All IntMask bits are active low. Writing a ‘1’ to a field in the IntMask register enables interrupt generation for the corresponding field in the IntStatus register. Writing a ‘0’ to a field in the IntMask register disables interrupt generation for the corresponding field in the In/Status register.

TABLE 38

IntMask

| Field Name | Bit(s) | Reset | Description |
|---|---|---|---|
| EhciAhbHrespErr | 12 | 0x0 | EHCI AHB slave HRESP error mask. |
| | 11:9 | 0x0 | Reserved |
| OhciAhbHrespErr | 8 | 0x0 | OHCI AHB slave HRESP error mask. |
| | 7:5 | 0x0 | Reserved |
| EhciAhbAdrErr | 4 | 0x0 | EHCI AHB master address error mask. |
| | 3:1 | 0x0 | Reserved |
| OhciAhbAdrErr | 0 | 0x0 | OHCI AHB master address error mask. |

12.2.2.5 IntClear Register Description

Clears interrupt fields in the IntStatus register. All fields in the IntClear register are active high. Writing a ‘1’ to a field in the IntClear register clears the corresponding field in the IntStatus register. Writing a ‘0’ to a field in the IntClear register has no effect.

TABLE 39

IntClear

| Field Name | Bit(s) | Reset | Description |
|---|---|---|---|
| EhciAhbHrespErr | 12 | 0x0 | EHCI AHB slave HRESP error clear. |
| | 11:9 | 0x0 | Reserved |
| OhciAhbHrespErr | 8 | 0x0 | OHCI AHB slave HRESP error clear. |
| | 7:5 | 0x0 | Reserved |
| EhciAhbAdrErr | 4 | 0x0 | EHCI AHB master address error clear. |
| | 3:1 | 0x0 | Reserved |
| OhciAhbAdrErr | 0 | 0x0 | OHCI AHB master address error clear. |

12.2.2.6 EhciOhciCtl Register Description

The EhciOhciCtl register fields are mapped to the ehci_ohci core top-level control/configuration signals.

TABLE 40

EhciOhciCtl

| Field Name | Bit(s) | Reset | Description |
|---|---|---|---|
| EhciSimMode | 20 | 0x0 | EHCI Simulation mode select. Mapped to ss_simulation_mode_i input signal to ehci_ohci core. When set to 1'b1, this bit sets the PHY in non-driving mode so the host can detect |

TABLE 40-continued

| EhciOhciCtl | | | |
|---|---|---|---|
| Field Name | Bit(s) | Reset | Description |
| | | | device connection.<br>0: Normal operation<br>1: Simulation mode<br>NOTE: Clear this field during normal operation. |
| | 19:17 | 0x0 | Reserved |
| OhciSimClkRstN | 16 | 0x1 | OHCI Simulation clock circuit reset. Active low. Mapped to ohci_0_clkcktrst_i_n input signal to ehci_ohci core. Initial reset signal for rh_pll module. Refer to Section 12.2.4 Clocks and Resets, for reset requirements.<br>0: Reset rh_pll module for simulation<br>1: Normal operation.<br>NOTE: Set this field during normal operation. |
| | 15:13 | 0x0 | Reserved |
| OhciSimCountN | 12 | 0x0 | OHCI Simulation count select. Active low. Mapped to ohci_0_cntsel_i_n input signal to ehci_ohci core. Used to scale down the millisecond counter for simulation purposes. The 1-ms period (12000 clocks of 12 MHz clock) is scaled down to 7 clocks of 12 MHz clock, during PortReset and PortResume.<br>0: Count full 1 ms<br>1: Count simulation time.<br>NOTE: Clear this field during normal operation. |
| | 11:9 | 0x0 | Reserved |
| OhciIoHit | 8 | 0x0 | OHCI Legacy - application I/O hit. Mapped to ohci_0_app_io_hit_i input signal to ehci_ohci core. PCI I/O cycle strobe to access the PCI I/O addresses of 0x60 and 0x64 for legacy support.<br>NOTE: Clear this field during normal operation. CPU access to this signal is only provided for debug purposes. Legacy system support is not relevant in the context of SoPEC. |
| | 7:5 | 0x0 | Reserved |
| OhciLegacyIrq1 | 4 | 0x0 | OHCI Legacy - external interrupt #1 - PS2 keyboard. Mapped to ohci_0_app_irq1_i input signal to ehci_ohci core. External keyboard interrupt #1 from legacy PS2 keyboard/mouse emulation. Causes an emulation interrupt.<br>NOTE: Clear this field during normal operation. CPU access to this signal is only provided for debug purposes. Legacy system support is not relevant in the context of SoPEC. |
| | 3:1 | 0x0 | Reserved |
| OhciLegacyIrq12 | 0 | 0x0 | OHCI Legacy - external interrupt #12 - PS2 mouse. Mapped to ohci_0_app_irq12_i input signal to ehci_ohci core. External keyboard interrupt #12 from legacy PS2 keyboard/mouse emulation. Causes an emulation interrupt.<br>NOTE: Clear this field during normal operation. CPU access to this signal is only provided for debug purposes. Legacy system support is not relevant in the context of SoPEC. |

12.2.2.7 EhciFladjCtl Register Description

Mapped to EHCI Frame Length Adjustment (FLADJ) input signals on the ehci_ohci core top-level. Adjusts any offset from the clock source that drives the SOF microframe counter.

TABLE 41

| EhciFladjCtl | | | |
|---|---|---|---|
| Field Name | Bit(s) | Reset | Description |
| | 31:30 | 0x0 | Reserved |
| FladjPort2 | 29:24 | 0x20 | FLADJ value for port #2. |
| | 23:22 | 0x0 | Reserved |
| FladjPort1 | 21:16 | 0x20 | FLADJ value for port #1. |
| | 15:14 | 0x0 | Reserved |

TABLE 41-continued

| EhciFladjCtl | | | |
|---|---|---|---|
| Field Name | Bit(s) | Reset | Description |
| FladjPort0 | 13:8 | 0x20 | FLADJ value for port #0. |
| | 7:6 | 0x0 | Reserved |
| FladjHost | 5:0 | 0x20 | FLADJ value for host controller. |

NOTE: The FLADJ register setting of 0×20 yields a micro-frame period of 125 us (60000 HS clk cycles), for an ideal clock, provided that INSNREG00.Enable=0. The FLADJ registers should be adjusted according to the clock offset in a specific implementation.

NOTE: All FLADJ register fields should be set to the same value for normal operation, or the host controller will yield undefined results. Port specific FLADJ register fields are only provided for debug purposes.

NOTE: The FLADJ values should only be modified when the USBSTS.HcHalted field of the EHCI host controller operational registers is set, or the host controller will yield undefined results.

Some examples of FLADJ values are given in Table 42.

TABLE 42

FLADJ Examples

| FLADJ value (hex) | SOF cycle (HS bit times) |
|---|---|
| 0x00 | 59488 |
| 0x01 | 59504 |
| 0x02 | 59520 |
| 0x20 | 60000 |
| 0x3F | 60496 |

12.2.2.8 INSNREG00 Register Description

EHCI programmable micro-frame base register. This register is used to set the micro-frame base period for debug purposes.

NOTE: Field names have been added for reference. They do not appear in any Synopsys documentation.

TABLE 43

INSNREG00

| Field Name | Bit(s) | Reset | Description |
|---|---|---|---|
| Reserved | 31:14 | 0x0 | Reserved. |
| MicroFrCnt | 13:1 | 0x0 | Micro-frame base value for the micro-frame counter. Each unit corresponds to a UTMI (30 MHz) clk cycle. |
| Enable | 0 | 0x0 | 0: Use standard micro-frame base count, 0xE86 (3718 decimal). 1: Use programmable micro-frame count, MicroFrCnt. |

INSNREG.MicroFrCnt corresponds to the base period of the micro-frame, i.e. the micro-frame base count value in UTMI (30 MHz) clock cycles. The micro-frame base value is used in conjunction with the FLADJ value to determine the total micro-frame period. An example is given below, using default values which result in the nominal USB micro-frame period.

INSNREG.MicroFrCnt: 3718 (decimal)

FLADJ: 32 (decimal)

UTMI clk period: 33.33 ns

Total micro-frame period=(NSNREG.MicroFrCnt+FLADJ) *UTMI clk period=125 us 12.2.2.9 INSNREG01 Register Description EHCI internal packet buffer programmable threshold value register.

NOTE: Field names have been added for reference. They do not appear in any Synopsys documentation

TABLE 44

INSNREG01

| Field Name | Bit(s) | Reset | Description |
|---|---|---|---|
| OutThreshold | 31:16 | 0x100 | OUT transfer threshold value for the internal packet buffer. Each unit corresponds to a 32 bit word. |
| InThreshold | 15:0 | 0x100 | IN transfer threshold value for the internal packet buffer. Each unit corresponds to a 32 bit word. |

During an IN transfer, the host controller will not begin transferring the USB data from its internal packet buffer to system memory until the buffer fill level has reached the IN transfer threshold value set in INSNREG01.InThreshold.

During an OUT transfer, the host controller will not begin transferring the USB data from its internal packet buffer to the USB until the buffer fill level has reached the OUT transfer threshold value set in INSNREG01.OutThreshold.

NOTE: It is recommended to set INSNREG01.OutThreshold to a value large enough to avoid an under-run condition on the internal packet buffer during an OUT transfer. The INSNREG01.OutThreshold value is therefore dependent on the DIU bandwidth allocated to the UHU. To guarantee that an under-run will not occur, regardless of DIU bandwidth, set INSNREG01.OutThreshold=0x100 (1024 bytes). This will cause the host controller to wait until a complete packet has been transferred to the internal packet buffer before initiating the OUT transaction on the USB. Setting INSNREG01.OutThreshold=0x100 is guaranteed safe but will reduce the overall USB bandwidth.

NOTE: A maximum threshold value of 1024 bytes is possible, i.e. INSNREG01.*Threshold=0x100. The fields are wider than necessary to allow for expansion of the packet buffer in future releases, according to Synopsys.

12.2.2.10 INSNREG02 Register Description

EHCI internal packet buffer programmable depth register.

NOTE: Field names have been added for reference. They do not appear in any Synopsys documentation

TABLE 45

INSNREG02

| Field Name | Bit(s) | Reset | Description |
|---|---|---|---|
| Reserved | 31:12 | 0x0 | Reserved. |
| Depth | 11:0 | 0x100 | Programmable buffer depth. Each unit corresponds to a 32 bit word. |

Can be used to set the depth of the internal packet buffer.

NOTE: It is recommended to set INSNREG.Depth=0x100 (1024 bytes) during normal operation, as this will accommodate the maximum packet size permitted by the USB.

NOTE: A maximum buffer depth of 1024 bytes is possible, i.e. INSNREG02.Depth=0x100. The field is wider than necessary to allow for expansion of the packet buffer in future releases, according to Synopsys.

12.2.2.11 INSNREG03 Register Description

Break memory transfer register. This register controls the host controller AHB access patterns.

NOTE: Field names have been added for reference. They do not appear in any Synopsys documentation

TABLE 46

INSNREG03

| Field Name | Bit(s) | Reset | Description |
|---|---|---|---|
| Reserved | 31:1 | 0x0 | Reserved. |
| MaxBurstEn | 0 | 0x0 | 0: Do not break memory transfers, continuous burst.<br>1: Break memory transfers into burst lengths corresponding to the threshold values in INSNREG01. |

When INSNREG.MaxBurstEn=0 during a USB IN transfer, the host will request a single continuous write burst to the AHB with a maximum burst size equivalent to the contents of the internal packet buffer, i.e. if the DIU bandwidth is higher than the USB bandwidth then the transaction will be broken into smaller bursts as the internal packet buffer drains. When INSNREG.MaxBurstEn=0 during a USB OUT transfer, the host will request a single continuous read burst from the AHB with a maximum burst size equivalent to the depth of the internal packet buffer.

When INSNREG.MaxBurstEn=1, the host will break the transfer to/from the AHB into multiple bursts with a maximum burst size corresponding to the IN/OUT threshold value in INSNREG01.

NOTE: It is recommended to set INSNREG03=0×0 and allow the uhu_dma AHB arbiter to break up the bursts from the EHCI/OHCI AHB masters. If INSNREG03=0×1, the only really useful AHB burst size (as far as the UHU is concerned) is 8×32 bits (a single DIU word). However, if INSNREG01. OutThreshold is set to such a low value, the probability of encountering an under-run during an OUT transaction significantly increases.

12.2.2.12 INSNREG04 Register Description

EHCI debug register.

NOTE: Field names have been added for reference. They do not appear in any Synopsys documentation

TABLE 47

INSNREG04

| Field Name | Bit(s) | Reset | Description |
|---|---|---|---|
| Reserved | 31:3 | 0x0 | Reserved |
| PortEnumScale | 2 | 0x0 | 0: Normal port enumeration time. Normal operation.<br>1: Port enumeration time scaled down. Debug. |
| HccParamsWrEn | 1 | 0x0 | 0: HCCPARAMS register read only. Normal operation.<br>1: HCCPARAMS register read/write. Debug. |
| HcsParamsWrEn | 0 | 0x0 | 0: HCSPARAMS register read only. Normal operation.<br>1: HCSPARAMS register read/write. Debug. |

12.2.2.13 INSNREG05 Register Description

UTMI PHY control/status. UTMI control/status registers are optional and may not be present in some PHY implementations. The functionality of the UTMI control/status registers are PHY implementation specific.

NOTE: Field names have been added for reference. They do not appear in any Synopsys documentation

TABLE 48

INSNREG05

| Field Name | Bit(s) | Reset | Description |
|---|---|---|---|
| Reserved | 31:18 | 0x0 | Reserved |
| VBusy | 17 | 0x0 | Host busy indication. Read Only.<br>0: NOP.<br>1: Host busy.<br>NOTE: No writes to INSNREG05 should be performed when host busy. |
| PortNumber | 16:13 | 0x0 | Port Number. Set by software to indicate which port the control/status fields apply to. |
| Vload | 12 | 0x0 | Vendor control register load.<br>0: Load VControl.<br>1: NOP. |
| Vcontrol | 11:8 | 0x0 | Vendor defined control register. |
| Vstatus | 7:0 | 0x0 | Vendor defined status register. |

12.2.3 UHU Partition

Figure 30:
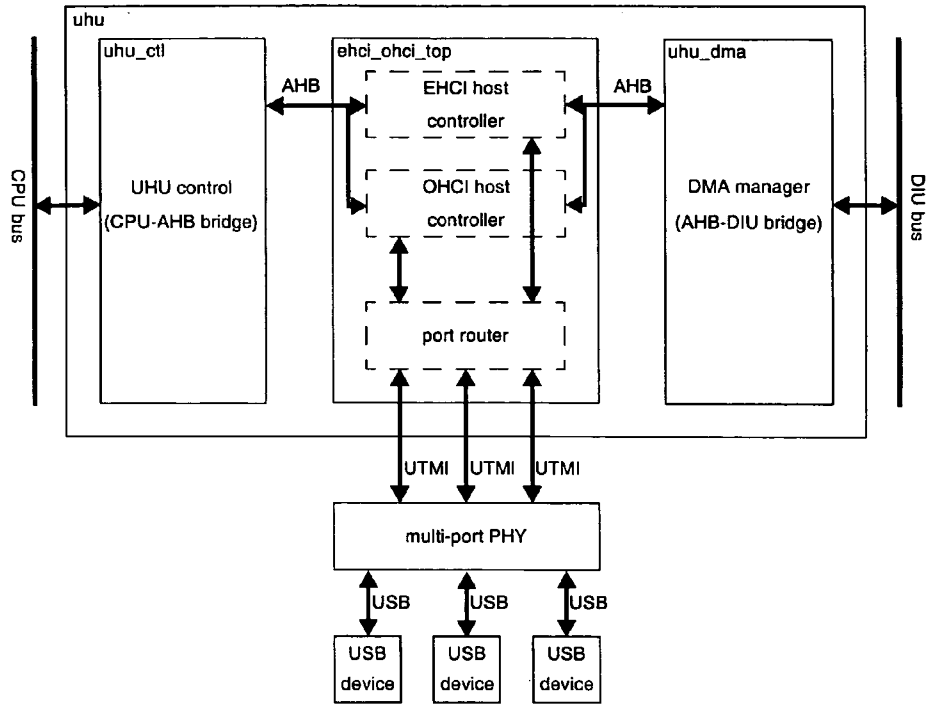
FIG. 30. UHU Basic Block Diagram

The three main components of the UHU are illustrated in the block diagram of FIG. 30. The ehci_ohci_top block is the top-level of the USB2.0 host IP core, referred to as ehci_ohci.

12.2.3.1 ehci_ohci 12.2.3.1.1 ehci_ohci I/Os

The ehci_ohci I/Os are listed in Table 49. A brief description of each I/O is given in the table. NOTE: P is a constant used in Table 49 to represent the number of USB downstream ports. P=3.

NOTE: The I/O convention adopted in the ehci_ohci core for port specific bus signals on the PHY is to have a separate signal defined for each bit of the bus, its width equal to [P−1:0]. The resulting bus for each port is made up of 1 bit from each of these signals. Therefore a 2 bit port specific bus called example_bus_i from each port on the PHY to the core would appear as 2 separate signals example_bus__1_i[P−1:0] and example_bus__0_i[P−1:0]. The bus from PHY port #0 would consist of example_bus__1_i[0] and example_bus__0_i[0], the bus from PHY port #1 would consist of example_bus__1_i[1] and example_bus__0_i[1], the bus from PHY port #2 would consist of example_bus__1_i[2] and example_bus__0_i[2], etc. These buses are combined at the VHDL wrapper around the host verilog IP core to give the UHU top-level I/Os listed in Table 34.

TABLE 49 ehci_ohci I/Os

| Port name | Pins | I/O | Description |
|---|---|---|---|
| | | | Clock & Reset Signals |
| phy_clk_i | 1 | In | 30 MHz local EHCI PHY clock. |
| phy_rst_i_n | 1 | In | Reset for phy_clk_i domain. Active low. Resets all Rx/Tx logic. Synchronous to phy_clk_i. |
| ohci_0_clk48_i | 1 | In | 48 MHz OHCI clock. |
| ohci_0_clk12_i | 1 | In | 12 MHz OHCI clock. |
| hclk_i | 1 | In | AHB clock. System clock for AHB interface (pclk). |
| hreset_i_n | 1 | In | Reset for hclk_i domain. Active low. Synchronous to hclk_i. |
| utmi_phy_clock_i[P-1:0] | P | In | 30 MHz UTMI PHY clocks. PHY clock for each downstream port. Used to clock Rx/Tx port logic. Synchronous to phy_clk_i. |
| utmi_reset_i_n[P-1:0] | P | In | UTMI PHY port resets. Active low. Resets for each utmi_phy_clock_i domain. Synchronous to corresponding bit of utmi_phy_clock_i. |
| ohci_0_clkcktrst_i_n | 1 | In | Simulation - clear clock reset. Active low. |
| | | | EHCI Interface Signals - General |
| sys_interrupt_i | 1 | In | System interrupt. |
| ss_word_if_i | 1 | In | Word interface select. Selects the width of the UTMI Rx/Tx data buses. 0: 8 bit 1: 16 bit NOTE: This signals will be tied high in the RTL, UHU UTMI interface is 16 bits wide. |
| ss_simulation_mode_i | 1 | In | Simulation mode. |
| ss_fladj_val_host_i[5:0] | 6 | In | Frame length adjustment register (FLADJ). |
| ss_fladj_val_5_i[P-1:0] | P | In | Frame length adjustment register per port, bit #5 for each port. |
| ss_fladj_val_4_i[P-1:0] | P | In | Frame length adjustment register per port, bit #4 for each port. |
| ss_fladj_val_3_i[P-1:0] | P | In | Frame length adjustment register per port, bit #3 for each port. |
| ss_fladj_val_2_i[P-1:0] | P | In | Frame length adjustment register per port, bit #2 for each port. |
| ss_fladj_val_1_i[P-1:0] | P | In | Frame length adjustment register per port, bit #1 for each port. |
| ss_fladj_val_0_i[P-1:0] | P | In | Frame length adjustment register per port, bit #0 for each port. |
| ehci_interrupt_o | 1 | Out | USB interrupt. Asserted to indicate a USB interrupt condition. |
| ehci_usbsts_o | 6 | Out | USB status. Reflects EHCI USBSTS[5:0] operational register bits. [5] Interrupt on async advance. [4] Host system error [3] Frame list roll-over [2] Port change detect. [1] USB error interrupt (USBERRINT) [0] USB interrupt (USBINT) |
| ehci_bufacc_o | 1 | Out | Host controller buffer access indication. indicates the EHCI Host controller is accessing the system memory to read/write USB packet payload data. |
| EHCI Interface Signals - PCI Power Management NOTE: This interface is intended for use with the PCI version of the Synopsys Host controller, i.e. it provides hooks for the PCI controller module. The AHB version of the core is used in SoPEC as PCI functionality is not required. The PCI Power Management input signals will be tied to an inactive state. | | | |
| ss_power_state_i[1:0] | 2 | In | PCI Power management state. NOTE: Tied to 0x0. |
| ss_next_power_state_i[1:0] | 2 | In | PCI Next power management state. NOTE: Tied to 0x0. |
| ss_nxt_power_state_valid_l | 1 | In | PCI Next power management state valid. NOTE: Tied to 0x0. |
| ss_pme_enable_i | 1 | In | PCI Power Management Event (PME) Enable. NOTE: Tied to 0x0. |
| ehci_pme_status_o | 1 | Out | PME status. |
| ehci_power_state_ack_o | 1 | Out | Power state ack. |
| | | | OHCI Interface Signals - General |
| ohci_0_scanmode_i_n | 1 | In | Scan mode select. Active low. |
| ohci_0_cntsel_i_n | 1 | In | Count select. Active low. |

TABLE 49-continued

| Port name | Pins | I/O | Description |
|---|---|---|---|
| **ehci_ohci I/Os** | | | |
| ohci_0_irq_o_n | 1 | Out | HCI bus general interrupt. Active low. |
| ohci_0_smi_o_n | 1 | Out | HCI bus system management interrupt (SMI). Active low. |
| ohci_0_rmtwkp_o | 1 | Out | Host controller remote wake-up. Indicates that a remote wake-up event occurred on one of the root hub ports, e.g. resume, connect or disconnect. Asserted for one clock when the controller transitions from Suspend to Resume state. Only enabled when HcControl.RWE is set. |
| ohci_0_sof_o_n | 1 | Out | Host controller Start Of Frame. Active low. Asserted for 1 clock cycle when the internal frame counter (HcFmRemaining) reaches 0x0, while in its operational state. |
| ohci_0_speed_o[P-1:0] | P | Out | Transmit speed.<br>0: Full speed<br>1: Low speed |
| ohci_0_suspend_o[P-1:0] | P | Out | Port suspend signal<br>Indicates the state of the port.<br>0: Active<br>1: Suspend<br>NOTE: This signal is not connected to the PHY because the EHCI/OHCI suspend signals are combined within the core to produce utmi_suspend_o_n[P-1:0], which connects to the PHY. |
| ohci_0_globalsuspend_o | 1 | Out | Host controller global suspend indication. This signal is asserted 5 ms after the host controller enters the Suspend state and remains asserted for the duration of the host controller Suspend state. Not necessary for normal operation but could be used if external clock gating logic implemented. |
| ohci_0_drwe_o | 1 | Out | Device remote wake up enable. Reflects HcRhStatus.DRWE bit. If HcRhStatus.DRWE is set it will cause the controller to exit global suspend state when a connect/disconnect is detected. If HcRhStatus.DRWE is cleared, a connect/disconnect condition will not cause the host controller to exit global suspend. |
| ohci_0_rwe_o | 1 | Out | Remote wake up enable. Reflects HcControl.RWE bit. HcControl.RWE is used to enable/disable remote wake-up upon upstream resume signalling. |
| ohci_0_ccs_o[P-1:0] | P | Out | Current connect status.<br>1: port state-machine is in a connected state.<br>0: port state-machine is in a disconnected or powered-off state. Reflects HcRhPortStatus.CCS. |
| **OHCI Interface Signals - Legacy Support** | | | |
| ohci_0_app_io_hit_i | 1 | In | Legacy - application I/O hit. |
| ohci_0_app_irq1_i | 1 | In | Legacy - external interrupt #1 - PS2 keyboard. |
| ohci_0_app_irq12_i | 1 | In | Legacy - external interrupt #12 - PS2 mouse. |
| ohci_0_lgcy_irq1_o | 1 | Out | Legacy - IRQ1 - keyboard data. |
| ohci_0_lgcy_irq12_o | 1 | Out | Legacy - IRQ12 - mouse data. |
| **External Interface Signals**<br>These signals are used to control the external VBUS port power switching of the downstream USB ports. | | | |
| app_prt_ovrcur_i[P-1:0] | P | In | Port over-current indication from application. These signals are driven externally to the ASIC by a circuit that detects an over-current condition on the downstream USB ports.<br>0: Normal current.<br>1: Over-current condition detected. |
| ehci_prt_pwr_o[P-1:0] | P | Out | Port power.<br>Indicates the port power status of each port. Reflects PORTSC.PP. Used for port power switching control of the external regulator that supplies VBSUS to the downstream USB ports.<br>0: Power off<br>1: Power on |
| **PHY Interface Signals - UTMI** | | | |
| utmi_line_state_0_i[P-1:0] | P | In | Line state DP. |
| utmi_line_state_1_i[P-1:0] | P | In | Line state DM. |
| utmi_txready_i[P-1:0]] | P | In | Transmit data ready handshake. |

TABLE 49-continued ehci_ohci I/Os

| Port name | Pins | I/O | Description |
|---|---|---|---|
| utmi_rxdatah_7_i[P-1:0] | P | In | Rx data high byte, bit #7 |
| utmi_rxdatah_6_i[P-1:0] | P | In | Rx data high byte, bit #6 |
| utmi_rxdatah_5_i[P-1:0] | P | In | Rx data high byte, bit #5 |
| utmi_rxdatah_4_i[P-1:0] | P | In | Rx data high byte, bit #4 |
| utmi_rxdatah_3_i[P-1:0] | P | In | Rx data high byte, bit #3 |
| utmi_rxdatah_2_i[P-1:0] | P | In | Rx data high byte, bit #2 |
| utmi_rxdatah_1_i[P-1:0] | P | In | Rx data high byte, bit #1 |
| utmi_rxdatah_0_i[P-1:0] | P | In | Rx data high byte, bit #0 |
| utmi_rxdata_7_i[P-1:0] | P | In | Rx data low byte, bit #7 |
| utmi_rxdata_6_i[P-1:0] | P | In | Rx data low byte, bit #6 |
| utmi_rxdata_5_i[P-1:0] | P | In | Rx data low byte, bit #5 |
| utmi_rxdata_4_i[P-1:0] | P | In | Rx data low byte, bit #4 |
| utmi_rxdata_3_i[P-1:0] | P | In | Rx data low byte, bit #3 |
| utmi_rxdata_2_i[P-1:0] | P | In | Rx data low byte, bit #2 |
| utmi_rxdata_1_i[P-1:0] | P | In | Rx data low byte, bit #1 |
| utmi_rxdata_0_i[P-1:0] | P | In | Rx data low byte, bit #0 |
| utmi_rxvldh_i[P-1:0] | P | In | Rx data high byte valid. |
| utmi_rxvld_i[P-1:0] | P | In | Rx data low byte valid. |
| utmi_rxactive_i[P-1:0] | P | In | Rx active. |
| utmi_rxerr_i[P-1:0] | P | In | Rx error. |
| utmi_discon_det_i[P-1:0] | P | In | HS disconnect detect. |
| utmi_txdatah_7_o[P-1:0] | P | Out | Tx data high byte, bit #7 |
| utmi_txdatah_6_o[P-1:0] | P | Out | Tx data high byte, bit #6 |
| utmi_txdatah_5_o[P-1:0] | P | Out | Tx data high byte, bit #5 |
| utmi_txdatah_4_o[P-1:0] | P | Out | Tx data high byte, bit #4 |
| utmi_txdatah_3_o[P-1:0] | P | Out | Tx data high byte, bit #3 |
| utmi_txdatah_2_o[P-1:0] | P | Out | Tx data high byte, bit #2 |
| utmi_txdatah_1_o[P-1:0] | P | Out | Tx data high byte, bit #1 |
| utmi_txdatah_0_o[P-1:0] | P | Out | Tx data high byte, bit #0 |
| utmi_txdata_7_o[P-1:0] | P | Out | Tx data low byte, bit #7 |
| utmi_txdata_6_o[P-1:0] | P | Out | Tx data low byte, bit #6 |
| utmi_txdata_5_o[P-1:0] | P | Out | Tx data low byte, bit #5 |
| utmi_txdata_4_o[P-1:0] | P | Out | Tx data low byte, bit #4 |
| utmi_txdata_3_o[P-1:0] | P | Out | Tx data low byte, bit #3 |
| utmi_txdata_2_o[P-1:0] | P | Out | Tx data low byte, bit #2 |
| utmi_txdata_1_o[P-1:0] | P | Out | Tx data low byte, bit #1 |
| utmi_txdata_0_o[P-1:0] | P | Out | Tx data low byte, bit #0 |
| utmi_txvldh_o[P-1:0] | P | Out | Tx data high byte valid. |
| utmi_txvld_o[P-1:0] | P | Out | Tx data low byte valid. |
| utmi_opmode_1_o[P-1:0] | P | Out | Operational mode (M1). |
| utmi_opmode_0_o[P-1:0] | P | Out | Operational mode (M0). |
| utmi_suspend_o_n[P-1:0] | P | Out | Suspend mode. |
| utmi_xver_select_o[P-1:0] | P | Out | Transceiver select. |
| utmi_term_select_1_o[P-1:0] | P | Out | Termination select (T1). |
| utmi_term_select_0_o[P-1:0] | P | Out | Termination select (T0). |
| PHY Interface Signals - Serial. | | | |
| phy_ls_fs_rcv_i[P-1:0] | P | In | Rx differential data from PHY, per port. Reflects the differential voltage on the D+/D− lines. Only valid when utmi_fs_xver_own_o = 1. |
| utmi_vpi_i[P-1:0] | P | In | Data plus, per port. USB D+ line value. |
| utmi_vmi_i[P-1:0] | P | In | Data minus, per port. USB D+ line value. |
| utmi_fs_xver_own_o[P-1:0] | P | Out | UTMI/Serial interface select, per port. 1 = Serial interface enabled. Data is received/transmitted to the PHY via the serial interface. utmi_fs_data_o, utmi_fs_se0_o, utmi_fs_oe_o signals drive Tx data on to the PHY D+ and D− lines. Rx data from the PHY is driven onto the utmi_vpi_i and utmi_vmi_i signals. 0 = UTMI interface enabled. Data is received/transmitted to the PHY via the UTMI interface. |
| utmi_fs_data_o[P-1:0] | P | Out | Tx differential data to PHY, per port. Drives a differential voltage on to the D+/D− lines. Only valid when utmi_fs_xver_own_o = 1. |
| utmi_fs_se0_o[P-1:0] | P | Out | SE0 output to PHY, per port. Drives a single ended zero on to D+/D− lines, independent of utmi_fs_data_o. Only valid when utmi_fs_xver_own_o = 1. |
| utmi_fs_oe_o[P-1:0] | P | Out | Tx enable output to PHY, per port. Output enable signal for utmi_fs_data_o and utmi_fs_se0_o. Only valid when utmi_fs_xver_own_o = 1. |

TABLE 49-continued ehci_ohci I/Os

| Port name | Pins | I/O | Description |
|---|---|---|---|
| PHY Interface Signals - Vendor Control and Status. | | | |
| phy_vstatus_7_i[P-1:0] | P | In | Vendor status, bit #7 |
| phy_vstatus_6_i[P-1:0] | P | In | Vendor status, bit #6 |
| phy_vstatus_5_i[P-1:0] | P | In | Vendor status, bit #5 |
| phy_vstatus_4_i[P-1:0] | P | In | Vendor status, bit #4 |
| phy_vstatus_3_i[P-1:0] | P | In | Vendor status, bit #3 |
| phy_vstatus_2_i[P-1:0] | P | In | Vendor status, bit #2 |
| phy_vstatus_1_i[P-1:0] | P | In | Vendor status, bit #1 |
| phy_vstatus_0_i[P-1:0] | P | In | Vendor status, bit #0 |
| ehci_vcontrol_3_o[P-1:0] | P | Out | Vendor control, bit #3 |
| ehci_vcontrol_2_o[P-1:0] | P | Out | Vendor control, bit #2 |
| ehci_vcontrol_1_o[P-1:0] | P | Out | Vendor control, bit #1 |
| ehci_vcontrol_0_o[P-1:0] | P | Out | Vendor control, bit #0 |
| ehci_vloadm_o[P-1:0] | P | Out | Vendor control load. |
| AHB Master Interface Signals - EHCI. | | | |
| ehci_hgrant_i | 1 | In | AHB grant. |
| ehci_hbusreq_o | 1 | Out | AHB bus request. |
| ehci_hwrite_o | 1 | Out | AHB write. |
| ehci_haddr_o[31:0] | 32 | Out | AHB address. |
| ehci_htrans_o[1:0] | 2 | Out | AHB transfer type. |
| ehci_hsize_o[2:0] | 3 | Out | AHB transfer size. |
| ehci_hburst_o[2:0] | 3 | Out | AHB burst size.<br>NOTE: only the following burst sizes are supported:<br>000: SINGLE<br>001: INCR |
| ehci_hwdata_o[31:0] | 32 | Out | AHB write data. |
| AHB Master Interface Signals - OHCI. | | | |
| ohci_0_hgrant_i | 1 | In | AHB grant. |
| ohci_0_hbusreq_o | 1 | Out | AHB bus request. |
| ohci_0_hwrite_o | 1 | Out | AHB write. |
| ohci_0_haddr_o[31:0] | 32 | Out | AHB address. |
| ohci_0_htrans_o[1:0] | 2 | Out | AHB transfer type. |
| ohci_0_hsize_o[2:0] | 3 | Out | AHB transfer size. |
| ohci_0_hburst_o[2:0] | 3 | Out | AHB burst size.<br>NOTE: only the following burst sizes are supported:<br>000: SINGLE<br>001: INCR |
| ohci_0_hwdata_o[31:0] | 32 | Out | AHB write data. |
| AHB Master Signals - common to EHCI/OHCI. | | | |
| ahb_hrdata_i[31:0] | 32 | In | AHB read data. |
| ahb_hresp_i[1:0] | 2 | In | AHB transfer response.<br>NOTE: The AHB masters treat RETRY and SPLIT responses from AHB slaves the same as automatic RETRY. For ERROR responses, the AHB master cancels the transfer and asserts ehci_interrupt_o. |
| ahb_hready_mbiu_i | 1 | In | AHB ready. |
| AHB Slave Signals - EHCI. | | | |
| ehci_hsel_i | 1 | In | AHB slave select. |
| ehci_hrdata_o[31:0] | 32 | Out | AHB read data. |
| ehci_hresp_o[1:0] | 2 | Out | AHB transfer response.<br>NOTE: The AHB slaves only support the following responses:<br>00: OKAY<br>01: ERROR |
| ehci_hready_o | 1 | Out | AHB ready. |
| AHB Slave Signals - OHCI. | | | |
| ohci_0_hsel_i | 1 | In | AHB slave select. |
| ohci_0_hrdata_o[31:0] | 32 | Out | AHB read data. |
| ohci_0_hresp_o[1:0] | 2 | Out | AHB transfer response.<br>NOTE: The AHB slaves only support the following responses:<br>00: OKAY<br>01: ERROR |
| ohci_0_hready_o | 1 | Out | AHB ready. |
| AHB Slave Signals - common to EHCI/OHCI. | | | |
| ahb_hwrite_i | 1 | In | AHB write data. |
| ahb_haddr_i[31:0] | 32 | In | AHB address. |
| ahb_htrans_i[1:0] | 2 | In | AHB transfer type. |

TABLE 49-continued ehci_ohci I/Os

| Port name | Pins | I/O | Description |
|---|---|---|---|
| | | | NOTE: The AHB slaves only support the following transfer types:<br>00: IDLE<br>01 BUSY<br>10: NONSEQUENTIAL<br>Any other transfer types will result in an ERROR response. |
| ahb_hsize_i[2:0] | 3 | In | AHB transfer size.<br>NOTE: The AHB slaves only support the following transfer sizes:<br>000: BYTE (8 bits)<br>001: HALFWORD (16 bits)<br>010: WORD (32 bits)<br>NOTE: Tied to 0x10 (WORD). The CPU only requires 32 bit access. |
| ahb_hburst_i[2:0] | 3 | In | AHB burst type.<br>NOTE: Tied to 0x0 (SINGLE). The AHB slaves only support SINGLE burst type. Any other burst types will result in an ERROR response. |
| ahb_hwdata_i[31:0] | 32 | In | AHB write data. |
| ahb_hready_tbiu_i | 1 | In | AHB ready. |

12.2.3.1.2 ehci_ohci Partition

Figure 31:
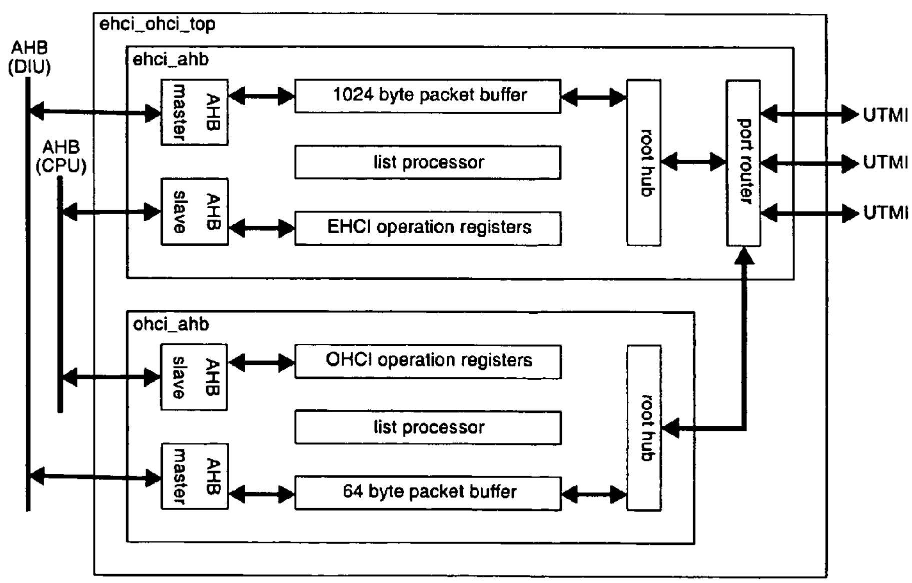
FIG. 31. ehci_ohci Basic Block Diagram.

The main functional components of the ehci_ohci subsystem are shown in FIG. 31.

FIG. 31. ehci_ohci Basic Block Diagram

The EHCI Host Controller (eHC) handles all HS USB traffic and the OHCI Host Controller (oHC) handles all FS/LS USB traffic. When a USB device connects to one of the downstream facing USB ports, it will initially be enumerated by the eHC. During the enumeration reset period the host determines if the device is HS capable. If the device is HS capable, the Port Router routes the port to the eHC and all communications proceed at HS via the eHC. If the device is not HS capable, the Port Router routes the port to the oHC and all communications proceed at FS/LS via the oHC.

The eHC communicates with the EHCI Host Controller Driver (eHCD) via the EHCI shared communications area in DRAM. Pointers to status/control registers and linked lists in this area in DRAM are set up via the operational registers in the eHC. The eHC responds to AHB read/write requests from the CPU-AHB bridge, targeted for the EHCI operational/capability registers located in the eHC via an AHB slave interface on the ehci_ohci core. The eHC initiates AHB read/write requests to the AHB-DIU bridge, via an AHB master interface on the ehci_ohci core.

The oHC communicates with the OHCI Host Controller Driver (oHCD) via the OHCI shared communications area in DRAM. Pointers to status/control registers and linked lists in this area in DRAM are set up via the operational registers in the oHC. The oHC responds to AHB read/write requests from the CPU-AHB bridge, targeted for the OHCI operational registers located in the oHC via an AHB slave interface on the ehci_ohci core. The oHC initiates AHB (DIU) read/write requests to the AHB-DIU bridge, via an AHB master interface on the ehci_ohci core.

The internal packet buffers in the EHCI/OHCI controllers are implemented as flops in the delivered RTL, which will be replaced by single port register arrays or SRAMs to save on area.

12.2.3.2 uhu_ctl

Figure 32:
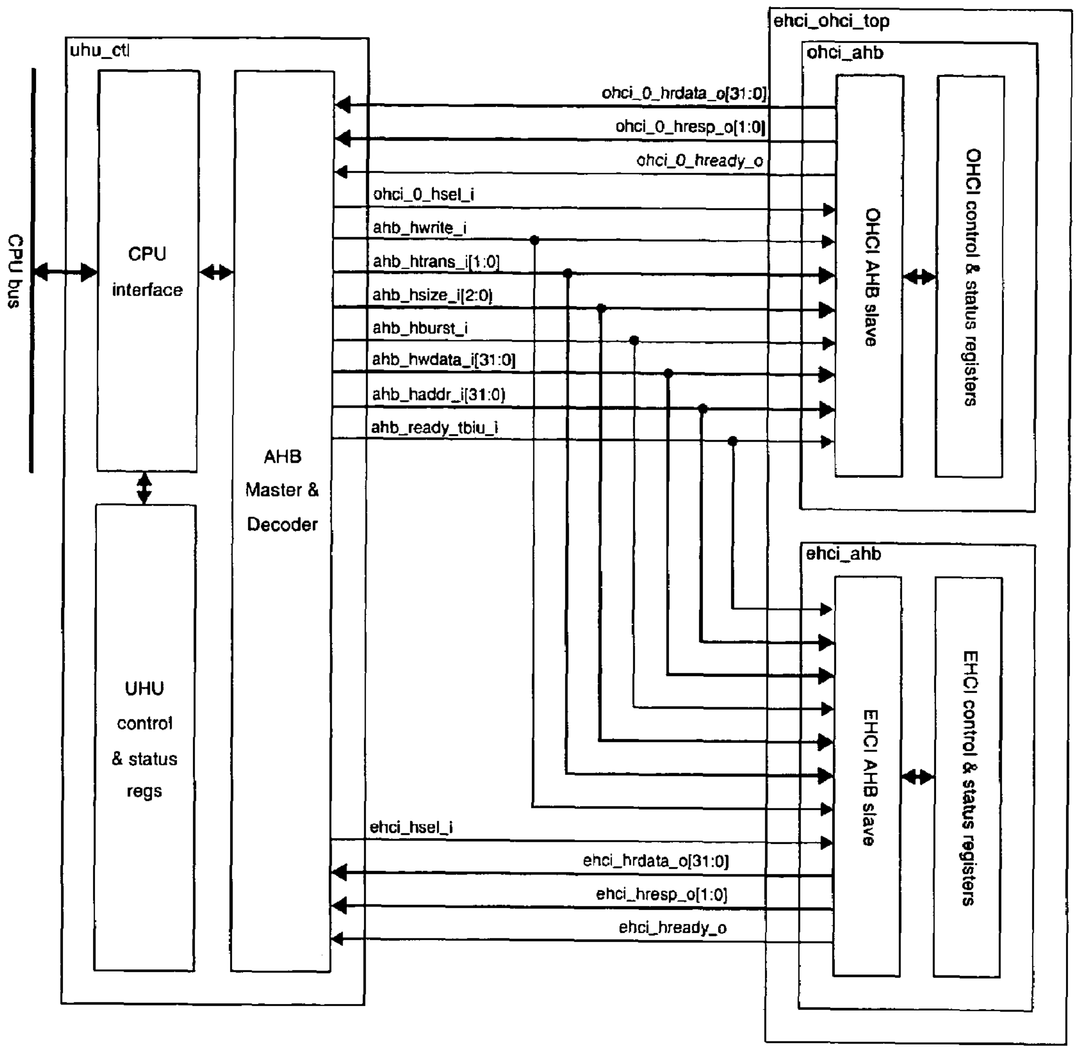
FIG. 32. uhu_ctl

The uhu_ctl is responsible for the control and configuration of the UHU. The main functional components of the uhu_ctl and the uhu_ctl interface to the ehci_ohci core are shown in FIG. 32.

The uhu_ctl provides CPU access to the UHU control/status registers via the CPU interface. CPU access to the EHCI/OHCI controller internal control/status registers is possible via the CPU-AHB bridge functionality of the uhu_ctl.

12.2.3.2.1 AHB Master and Decoder

The uhu_ctl ARB master and decoder logic interfaces to the EHCI/OHCI controller AHB slaves via a shared AHB. The uhu_ctl AHB master initiates all AHB read/write requests to the EHCI/OHCI AHB slaves. The AHB decoder performs all necessary CPU-AHB address mapping for access to the EHCI/OHCI internal control/status registers. The EHCI/OHCI slaves respond to all valid read/write requests with zero wait state OKAY responses, i.e. low latency for CPU access to EHCI/OHCI internal control/status registers.

12.2.3.3 uhu_dma

The uhu_dma is essentially an AHB-DIU bridge. It translates AHB requests from the EHCI/OHCI controller AHB masters into DIU reads/writes from/to DRAM. The uhu_dma performs all necessary AHB-DIU address mapping, i.e. it generates the 256 bit aligned DIU address from the 32 bit aligned AHB address.

Figure 33:
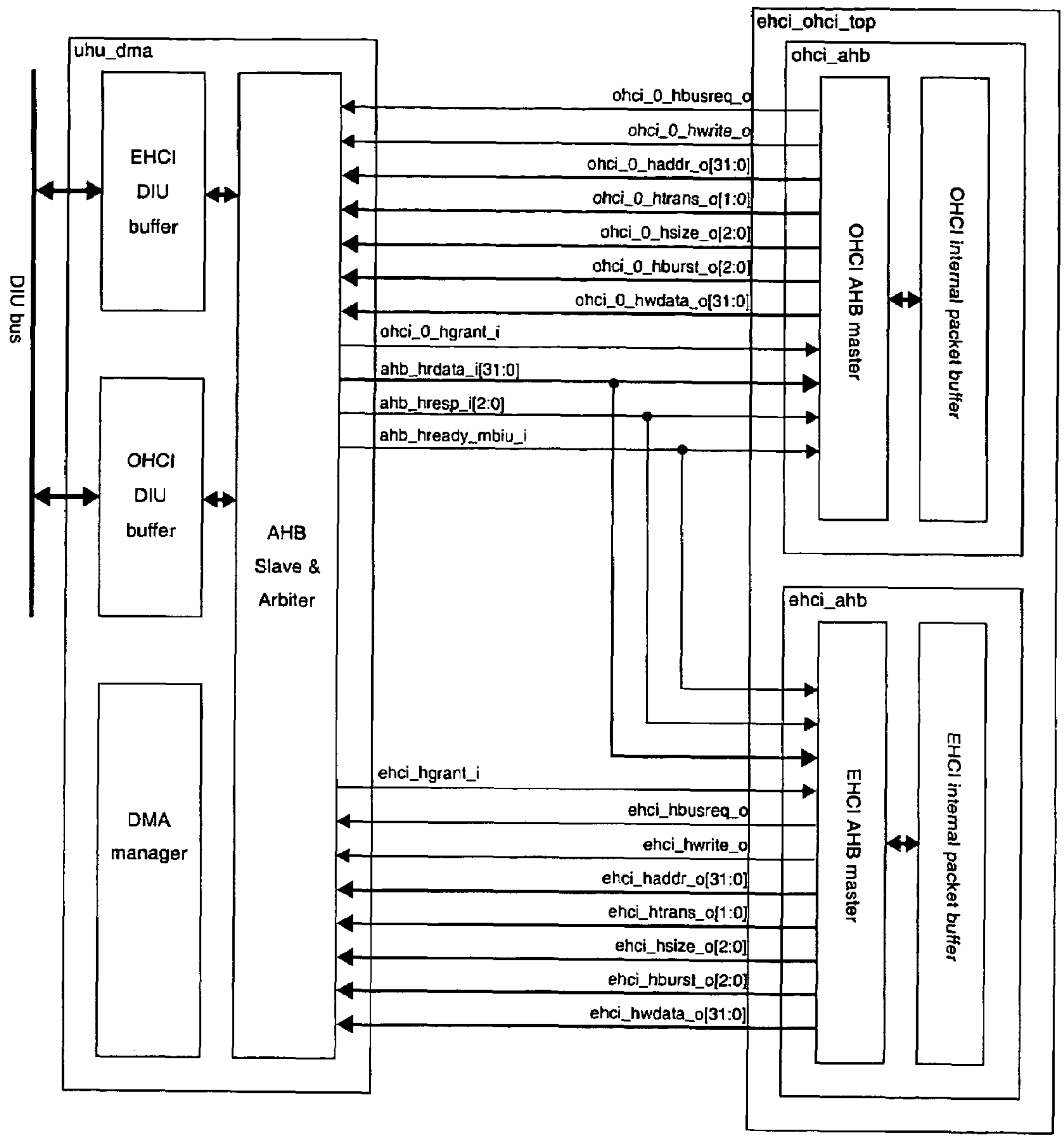
FIG. 33. uhu_dma
Figure 34:
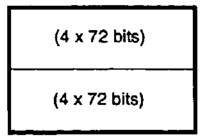
FIG. 34. EHCI DIU Buffer Partition
Figure 35:
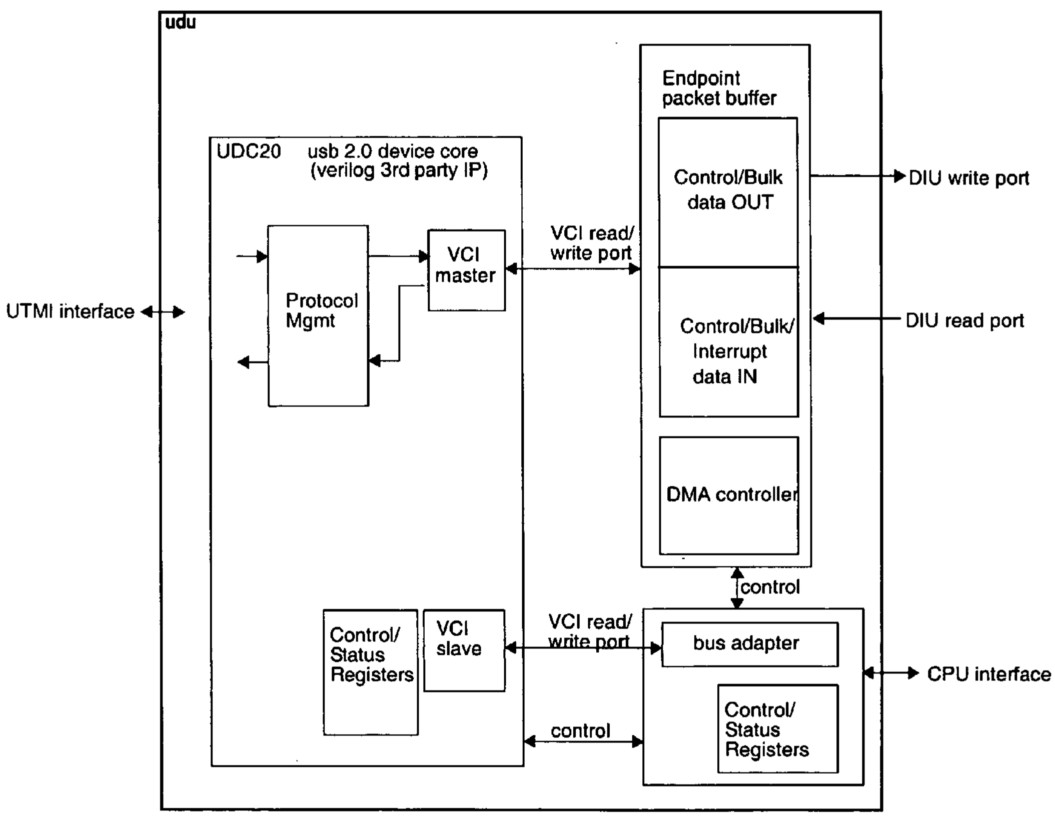
FIG. 35. UDU Sub-block Partition

The main functional components of the uhu_dma and the uhu_dma interface to the ehci_ohci core are shown in FIG. 33.

EHCI/OHCI control/status DIU accesses are interleaved with USB packet data DIU accesses, i.e. a write to DRAM could affect the contents of the next read from DRAM. Therefore it is necessary to preserve the DMA read/write request order for each host controller, i.e. all EHCI posted writes in the EHCI DIU buffer must be completed before an EHCI DIU read is allowed and all OHCI posted writes in the OHCI DIU buffer must be completed before an OHCI DIU read is allowed. As the EHCI DIU buffer and the OHCI DIU buffer are separate buffers, EHCI posted writes do not impede OHCI reads and OHCI posted writes do not impede EHCI reads.

EHCI/OHCI controller interrupts must be synchronized with posted writes in the EHCI/OHCI DIU buffers to avoid interrupt/data incoherence for IN transfers. This is necessary because the EHCI/OHCI controller could write the last data/status of an IN transfer to the EHCI/OHCI DIU buffer and generate an interrupt. However, the data will take a finite amount of time to reach DRAM, during which the CPU may service the interrupt, reading an incomplete transfer buffer from DRAM. The UHU prevents the EHCI/OHCI controller interrupts from setting their respective bits in the IntStatus register while there are any posted writes in the corresponding EHCI/OHCI DIU buffer. This delays the generation of an interrupt on uhu_icu_irq until the posted writes have been transferred to DRAM. However, coherency is not protected in the situation where the SW polls the EHCI/OHCI interrupt status registers HcInterruptStatus and USBSTS directly. The affected interrupt fields in the IntStatus register are IntStatus.EhciIrq, IntStatus.OhciIrq and IntStatus.OhciSmi. The UhuStatus register fields UhuStatus.EhciIrqPending, UhuStatus. OhciIrqPending and UhuStatus.OhciSmiPending indicate that the interrupts are pending, i.e. the interrupt from the core has been detected and the UHU is waiting for DIU writes to complete before generating an interrupt on uhu_icu_irq.

12.2.3.3.1 EHCI DIU Buffer

The EHCI DIU buffer is a bidirectional double buffer. Bidirectional implies that it can be used as either a read or a write buffer, but not both at the same time, as it is necessary to preserve the DMA read/write request order. Double buffer implies that it has the capacity to store 2 DIU reads or 2 DIU writes, including write enables.

When the buffer switches direction from DIU read mode to DIU write mode, any read data contained in the buffer is discarded.

Figure 29:
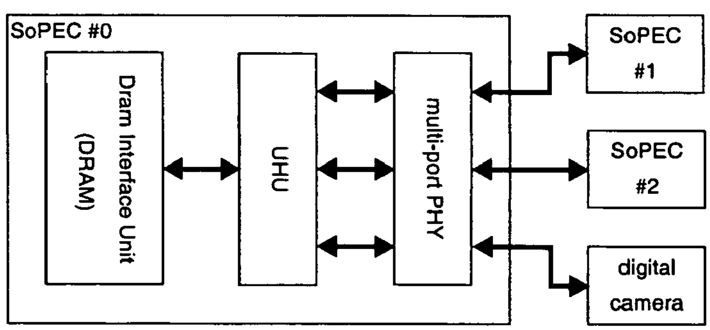
FIG. 29. UHU Dataflow

Each DIU write burst is 4×64 bits of write data (uhu_diu_data) and 4×8 bits byte enable (uhu_diu_wmask). Each DIU read burst is 4×64 bits of read data (diu_data). Therefore each buffer location is partitioned as shown in FIG. 29. Only 4×64 bits of each location is used in read mode.

The EHCI DIU buffer is implemented with an 8×72 bit register array. The 256 bit aligned DRAM address (uhu_diu_wadr) associated with each DIU read/write burst will be stored in flops. Provided that sufficient DIU write time-slots have been allocated to the UHU, the buffer should absorb any latencies associated with the DIU granting a UHU write request. This reduces back-pressure on the downstream USB ports during USB IN transactions. Back-pressure on downstream USB ports during OUT transactions will be influenced by DIU read bandwidth and DIU read request latency.

It should be noted that back-pressure on downstream USB ports refers to inter-packet latency, i.e. delays associated with the transfer of USB payload data between the DIU and the internal packet buffers in each host controller. The internal packet buffers are large enough to accommodate the maximum packet size permitted by the USB protocol. Therefore there will be no bandwidth/latency issues within a packet, provided that the host controllers are correctly configured.

12.2.3.3.2 OHCI DIU Buffer

The OHCI DIU buffer is identical in operation and configuration to the EHCI DIU buffer.

12.2.3.3.3 DMA Manager

The DMA manager is responsible for generating DIU reads/writes. It provides independent DMA read/write channels to the shared address space in DRAM that the EHCI/OHCI controller drivers use to communicate with the EHCI/OHCI host controllers. Read/write access is provided via a 64 bit data DIU read interface and a 64 bit data DIU write interface with byte enables, which operate independently of each other. DIU writes are initiated when there is sufficient valid write data in the EHCI DIU buffer or the OHCI DIU buffer, as detailed in Section 12.2.3.3.4 below. DIU reads are initiated when requested by the uhu_dma AHB slave and arbiter logic. The DmaEn register enables/disables the generation of DIU read/write requests from the DMA manager.

It is necessary to arbitrate access to the DIU read/write interfaces between the OHCI DIU buffer and the EHCI DIU buffer, which will be performed in a round-robin manner. There will be separate arbitration for the read and write interfaces. This arbitration can not be disabled because read/write requests from the EHCI/OHCI controllers can be disabled in the uhu_dma AHB slave and arbiter logic, if required.

12.2.3.3.4 AHB Slave & Arbiter

The uhu_dma AHB slave and arbiter logic interfaces to the EHCI/OHCI controller AHB masters via a shared AHB. The EHCI/OHCI AHB masters initiate all AHB requests to the uhu_dma AHB slave. The AHB slave translates AHB read requests into DIU read requests to the DMA manager. It translates all AHB write requests into EHCI/OHCI DIU buffer writes.

In write mode, the uhu_dma AHB slave packs the 32 bit AHB write data associated with each EHCI/OHCI AHB master write request into 64 bit words in the EHCI/OHCI DIU buffer, with byte enables for each 64 bit word. The buffer is filled until one of the following flush conditions occur:

- the 256 bit boundary of the buffer location is reached
- the next AHB write address is not within the same 256 bit DIU word boundary
- if an EHCI interrupt occurs (ehci_interrupt_o goes high) the EHCI buffer is flushed and the IntStatus register is updated when the DIU write completes.
- if an OHCI interrupt occurs (ohci__0_irq_o_n or ohci__0_smi_o_n goes low) the OHCI buffer is flushed and the IntStatus register is updated when the DIU write completes.

The 256 bit aligned DIU write address is generated from the first AHB write address of the AHB write burst and a DIU write is initiated. Non-contiguous AHB writes within the same 256 bit DIU word boundary result in a single DIU write burst with the byte enables de-asserted for the unused bytes.

In read mode, the uhu_dma AHB slave generates a 256 bit aligned DIU read address from the first EHCI/OHCI AHB master read address of the AHB read burst and initiates a DIU read request. The resulting 4×64 bit DIU read data is stored in the EHCI/OHCI DIU buffer. The uhu_dma AHB slave unpacks the relevant 32 bit data for each read request of the AHB read burst from the EHCI/OHCI DIU buffer, providing that the AHB read address corresponds to a 32 bit slice of the buffered 4×64 bit DIU read data.

DIU reads/writes associated with USB packet data will be from/to a transfer buffer in DRAM with contiguous addressing. However control/status reads/writes may be more random in nature. An AHB read/write request may translate to a DIU read/write request that is not 256 bit aligned. For a write request that is not 256 bit aligned, the AHB slave will mask any invalid bytes with the DIU byte enable signals (uhu_diu_wmask). For a read request that is not 256 bit aligned, the AHB slave will simply discard any read data that is not required.

The uhu_dma Arbiter controls access to the uhu_dma AHB slave. The AhbArbiterEn.EhciEn and AhbArbiterEn.OhciEn registers control the arbitration mode for the EHCI and OHCI AHB masters respectively. The arbitration modes are:

- Disabled. AhbArbiterEn.EhciEn=0 and AhbArbiterEn.OhciEn=0. Arbitration for both EHCI and OHCI AHB masters is disabled. No AHB requests will be granted from either master.
- OHCI enabled only. AhbArbiterEn.EhciEn=0 and AhbArbiterEn.OhciEn=1. The OHCI AHB master requests will have absolute priority over any AHB requests from the EHCI AHB master.
- EHCI enabled only. AhbArbiterEn.EhciEn=1 and AhbArbiterEn.OhciEn=0. The EHCI AHB master requests will have absolute priority over any AHB requests from the OHCI AHB master.
- OHCI and EHCI enabled. AhbArbiterEn.EhciEn=1 and AhbArbiterEn.OhciEn=1. Arbitration will be performed in a round-robin manner between the EHCI/OHCI AHB masters, at each DIU word boundary. If both masters are requesting, the grant changes at the DIU word boundary.

The uhu_dma slave can insert wait states on the AHB by de-asserting the EHCI/OHCI controller AHB HREADY signal ahb_hready_mbiu_i. The uhu_dma AHB slave never issues a SPLIT or RETRY response. The uhu_dma slave issues an AHB ERROR response if the AHB master address is out of range, i.e. bits 31:22 were not zero (DIU read/write addresses have a range of 21:5). The uhu_dma will also assert the ehci_ohci input signal sys_interrupt_i to indicate a fatal error to the host.

13 USB USB Device Unit (UDU)

13.1 Overview

The USB Device Unit (UDU) is used in the transfer of data between the host and SoPEC. The host may be a PC, another SoPEC, or any other USB 2.0 host. The UDU consists of a USB 2.0 device core plus some buffering, control logic and bus adapters to interface to SoPEC's CPU and DIU buses. The UDU interfaces to a USB PHY via a UTMI interface. In accordance with the USB 2.0 specification, the UDU supports both high speed (480 MHz) and full-speed (12 MHz) operation on the USB bus. The UDU provides the default IN and OUT control endpoints as well as four bulk IN, five bulk OUT and two interrupt IN endpoints.

13.2 UDU I/Os

The toplevel I/Os of the UDU are listed in Table 50.

TABLE 50

UDU I/O

| Port name | Pins | I/O | Description |
|---|---|---|---|
| | | | **Clocks and Resets** |
| Pclk | 1 | In | System clock. |
| prst_n | 1 | In | System reset signal. Active low. |
| phy_clk | 1 | In | 30 MHz clock for UTMI interface, generated in PHY. |
| phy_rst_n | 1 | In | Reset in phy_clk domain from CPR block. Active low. |
| | | | **UTMI transmit signals** |
| phy_udu_txready | 1 | In | An acknowledgement from the PHY of data transfer from UDU. |
| udu_phy_txvalid | 1 | Out | Indicates to the PHY that data udu_phy_txdata[7:0] is valid for transfer. |
| udu_phy_txvalidh | 1 | Out | Indicates to the PHY that data udu_phy_txdatah[7:0] is valid for transfer. |
| udu_phy_txdata[7:0] | 8 | Out | Low byte of data to be transmitted to the USB bus. |
| udu_phy_txdatah[7:0] | 8 | Out | High byte of data to be transmitted to the USB bus. |
| | | | **UTMI receive signals** |
| phy_udu_rxvalid | 1 | In | Indicates that there is valid data on the phy_udu_rxdata[7:0] bus. |
| phy_udu_rxvalidh | 1 | In | Indicates that there is valid data on the phy_udu_rxdatah[7:0] bus. |
| phy_udu_rxactive | 1 | In | Indicates that the PHY's receive state machine has detected SYNC and is active. |
| phy_udu_rxerr | 1 | In | Indicates that a receive error has been detected. Active high. |
| phy_udu_rxdata[7:0] | 8 | In | Low byte of data received from the USB bus. |
| phy_udu_rxdatah[7:0] | 8 | In | High byte of data received from the USB bus. |
| | | | **UTMI control signals** |
| udu_phy_xver_sel | 1 | Out | Transceiver select<br>0: HS transceiver enabled<br>1: FS transceiver enabled |
| udu_phy_term_sel | 1 | Out | Termination select<br>0: HS termination enabled<br>1: FS termination enabled |
| udu_phy_opmode[1:0] | 2 | Out | Select between operational modes<br>00: Normal operation |

TABLE 50-continued

| Port name | Pins | I/O | Description |
|---|---|---|---|
| | | | UDU I/O |
| | | | 01: Non-driving<br>10: Disables bit stuffing & NRZI coding<br>11: reserved |
| phy_udu_line_state[1:0] | 2 | In | The current state of the D+ D− receivers<br>00: SE0<br>01: J State<br>10: K State<br>11: SE1 |
| udu_phy_detect_vbus | 1 | Out | Indicates whether the Vbus signal is active. |
| | | | CPU Interface |
| cpu_adr[10:2] | 9 | In | CPU address bus. |
| cpu_dataout[31:0] | 32 | In | Shared write data bus from the CPU. |
| udu_cpu_data[31:0] | 32 | Out | Read data bus to the CPU. |
| cpu_rwn | 1 | In | Common read/not-write signal from the CPU. |
| cpu_acode[1:0] | 2 | In | CPU Access Code signals. These decode as follows:<br>00: User program access<br>01: User data access<br>10: Supervisor program access<br>11: Supervisor data access<br>Supervisor Data is always allowed. User Data access is programmable. |
| cpu_udu_sel | 1 | In | Block select from the CPU. When cpu_udu_sel is high both cpu_adr and cpu_dataout are valid. |
| udu_cpu_rdy | 1 | Out | Ready signal to the CPU. When udu_cpu_rdy is high it indicates the last cycle of the access. For a write cycle this means cpu_dataout has been registered by the UDU and for a read cycle this means the data on udu_cpu_data is valid. |
| udu_cpu_berr | 1 | Out | Bus error signal to the CPU indicating an invalid access. |
| udu_cpu_debug_valid | 1 | Out | Signal indicating that the data currently on udu_cpu_data is valid debug data. |
| | | | GPIO signal |
| gpio_udu_vbus_status | 1 | In | GPIO pin indicating status of Vbus.<br>0: Vbus not present<br>1: Vbus present |
| | | | Suspend signal |
| udu_cpr_suspend | 1 | Out | Indicates a Suspend command from the external USB host.<br>Active high. |
| | | | Interrupt signal |
| udu_icu_irq | 1 | Out | USB device interrupt signal to the ICU (Interrupt Control Unit). |
| | | | DIU write port |
| udu_diu_wadr[21:5] | 17 | Out | Write address bus to the DIU. |
| udu diu data[63:0] | 64 | Out | Data bus to the DIU. |
| udu_diu_wreq | 1 | Out | Write request to the DIU. |
| diu_udu_wack | 1 | In | Acknowledge from the DIU that the write request was accepted. |
| udu_diu_wvalid | 1 | Out | Signal from the UDU to the DIU indicating that the data currently on the udu_diu_data[63:0] bus is valid. |
| udu_diu_wmask[7:0] | 8 | Out | Byte aligned write mask. A 1 in a bit field of udu_diu_wmask[7:0]<br>means that the corresponding byte will be written to DRAM. |
| | | | DIU read port |
| udu_diu_rreq | 1 | Out | Read request to the DIU. |
| udu_diu_radr[21:5] | 17 | Out | Read address bus to the DIU. |
| diu_udu_rack | 1 | In | Acknowledge from the DIU that the read request was accepted. |
| diu_udu_rvalid | 1 | In | Signal from the DIU to the UDU indicating that the data currently on the diu_data[63:0] bus is valid. |
| diu_data[63:0] | 64 | In | Common DIU data bus. |

13.3 UDU Block Architecture Overview

The UDU digital block interfaces to the mixed signal PHY block via the UTMI (USB 2.0 Transceiver Macrocell Interface) industry standard interface. The PHY implements the physical and bus interface level functionality. It provides a clock to send and receive data to/from the UDU.

The UDC20 is a third party IP block which implements most of the protocol level device functions and some command functions.

The UDU contains some configuration registers, which are programmed via SoPEC's CPU interface. They are listed in Table 53.

There are more configuration registers in UDC20 which must be configured via the UDC20's VCI (Virtual Socket Alliance) slave interface. This is an industry standard interface. The registers are programmed using SoPEC's CPU interface, via a bus adapter. They are listed in Table 53 under the section UDC20 control/status registers.

The main data flow through the UDU occurs through endpoint data pipes. The OUT data streams come in to SoPEC (they are out data streams from the USB host controller's point of view). Similarly, the IN data streams go out of SoPEC. There are four bulk IN endpoints, five bulk OUT endpoints, two interrupt IN endpoints, one control IN endpoint and one control OUT endpoint.

The UDC20's VCI master interface initiates reads and writes for endpoint data transfer to/from the local packet buffers. The DMA controller reads and writes endpoint data to/from the local packet buffers to/from endpoint buffers in DRAM.

The external USB host controller controls the UDU device via the default control pipe (endpoint 0). Some low level command requests over this pipe are taken care of by UDC20. All others are passed on to SoPEC's CPU subsystem and are taken care of at a higher level. The list of standard USB commands taken care of by hardware are listed in Table 57. A description of the operation of the UDU when the application takes care of the control commands is given in Section 13.5.5.

13.4 UDU Configurations

The UDU provides one configuration, six interfaces, two of which have one alternate setting, five bulk OUT endpoints, four bulk IN endpoints and two interrupt IN endpoints. An example USB configuration is shown in Table 51 below. However, a subset of this could instead be defined in the descriptors which are supplied by the UDU driver software.

The UDU is required to support two speed modes, high speed and full speed. However, separate configurations are not required for these due to the device_qualifier and other_speed_configuration features of the USB.

TABLE 51

A supported UDU configuration

| Configuration 1 | Endpoint type | Endpoint maxpktsize FS | HS |
|---|---|---|---|
| Interface 0 Alternate setting 0 | EP1 IN Bulk | 64 | 512 |
| | EP1 OUT Bulk | 64 | 512 |
| Interface 1 Alternate setting 0 | EP2 IN Bulk | 64 | 512 |
| | EP2 OUT Bulk | 64 | 512 |
| Interface 2 Alternate setting 0 | EP3 IN Interrupt | 64 | 64 |
| | EP4 IN Bulk | 64 | 512 |
| | EP4 OUT Bulk | 64 | 512 |
| Interface 2 Alternate setting 1 | EP3 IN Interrupt | 64 | 1024 |
| | EP4 IN Bulk | 64 | 512 |
| | EP4 OUT Bulk | 64 | 512 |
| Interface 3 Alternate setting 0 | EP5 IN Bulk | 64 | 512 |
| | EP5 OUT Bulk | 64 | 512 |
| Interface 4 Alternate setting 0 | EP6 IN Interrupt | 64 | 64 |
| Interface 4 Alternate setting 1 | EP6 IN Interrupt | 64 | 1024 |
| Interface 5 Alternate setting 0 | EP7 OUT Bulk | 64 | 512 |

The following table lists what is fixed in HW and what is programmable in SW.

TABLE 52

Programmability of device endpoints

| Fixed in HW | SW programmable |
|---|---|
| Number of Configurations = 1 | At boot up, the SW can set the Configuration Descriptor to be bus-powered/self powered, support remote wakeup or not, set the bMaxPower0 consumption of the device, number of interfaces, etc. |
| Max number of Interfaces = 6 | The SW can set this from 1 to 6. |
| Max number of Alternate Settings in Interface 0 = 1 | Must be set to 1. |
| Max number of Alternate Settings in Interface 1 = 1 | Must be set to 1. |
| Max number of Alternate Settings in Interface 2 = 2 | The SW can set this to 1 or 2. |
| Max number of Alternate Settings in Interface 3 = 1 | Must be set to 1. |
| Max number of Alternate Settings in Interface 4 = 2 | The SW can set this to 1 or 2. |
| Max number of Alternate Settings in Interface 5 = 1 | Must be set to 1. |

TABLE 52-continued

| Programmability of device endpoints | |
|---|---|
| Fixed in HW | SW programmable |
| The logical endpoints are fixed types and directions:<br>EP1 IN bulk<br>EP1 OUT bulk<br>EP2 IN bulk<br>EP2 OUT bulk<br>EP3 IN interrupt<br>EP4 IN bulk<br>EP4 OUT bulk<br>EP5 IN bulk<br>EP5 OUT bulk<br>EP6 IN interrupt<br>EP7 OUT bulk | The SW cannot change the endpoint type and direction. e.g. EP3 IN interrupt cannot be changed to an OUT endpoint or to a bulk endpoint. However, a subset of these may be defined by SW in the descriptors, e.g. SW can decide that EP4 IN does not exist. |
| Max Packet Sizes are not fixed in HW. | The SW can program the endpoints' max packet sizes to any values allowed by the USB spec. But it must program both the UDC20 and the UDU with the same values that are in the device descriptors. |
| The HW does not fix which endpoints belong to different interfaces. | The endpoints can be assigned to any interface supported. E.g. SW could place all endpoints into interface 0. The UDC20 must be programmed consistently with the device descriptors. |

13.5 UDU Operation

13.5.1 Configuration Registers

The configuration registers in the UDU are programmed via the CPU interface. Table 53 below describes the UDU configuration registers. Some of these registers are located within the UDC20 block. These come under the heading "UDC20 control/status registers" in Table 53.

TABLE 53

| UDU Registers | | | | |
|---|---|---|---|---|
| Address (UDU_base+) | Register Name | #bits | Value on Reset | Description |
| | | Control registers | | |
| 0x000 | Reset | 1 | 0x1 | Soft reset.<br>Writing either a '1' or '0' to this register causes a soft reset of the UDU and the UDC20. This register is cleared automatically, therefore it will always be read as '1'. |
| 0x004 | DebugSelect[10:2] | 9 | 0x000 | Debug address select. This indicates the address of the register to report on the udu_cpu_data bus when it is not otherwise being used. |
| 0x008 | UserModeEnable | 1 | 0x0 | Enable User Data mode access. When set to '1', User Data access is allowed in addition to Supervisor Data access. When set to '0' only Supervisor Data access is allowed.<br>NOTE: UserModeEnable can only be written in supervisor mode. |
| 0x00C | Resume | 1 | 0x0 | If remote wakeup is enabled (under the control of the external USB host) then writing a '1' to this register will take the USB bus out of suspend mode. |
| 0x010 | EpStall | 11 | 0x000 | Writing a '1' to the relevant bit position causes the associated endpoint to be stalled. Note that endpoint 0 cannot be stalled.<br>Bits 10-6 correspond to EP OUT 7, 5, 4, 2, 1 |

TABLE 53-continued

UDU Registers

| Address (UDU_base+) | Register Name | #bits | Value on Reset | Description |
|---|---|---|---|---|
| | | | | Bits 5-0 correspond to EP IN 6, 5, 4, 3, 2, 1 |
| 0x014 | CsrsDone | 1 | 0x0 | Writing a '1' to this register in response to a IntSetCsrs interrupt instructs the UDU to respond to a status inquiry for the previous control command SetConfiguration or SetInterface with a zero length data packet (i.e. an ACK). Until this register is set to '1', following the generation of the IntSetCsrsCfg or IntSetCsrsIntf interrupt, the UDU will respond to any status requests with a NAK. This register is cleared automatically once the signal udc20_set_csrs goes low. |
| 0x018 | SOFTimeStamp | 11 | 0x000 | The SOF frame number received from the host. This is updated each (micro)Frame. Read only. |
| 0x01C | EnumSpeed | 1 | 0x1 | The speed of operation after enumeration. Read only.<br>0: High Speed<br>1: Full Speed |
| 0x020 | StatusInResponse | 2 | 0x0 | This register indicates the status of the current Control-Out transaction. This is required for responding to the host during the Status-In stage of the transfer. The Status-In request will be NAK'd until this register has been written to.<br>00: No response yet (issue a NAK)<br>01: Issue an ACK (a zero length data pkt)<br>10: Issue a STALL<br>11: reserved<br>This register is cleared automatically at the end of the Status stage of the transfer. |
| 0x024 | StatusOutResponse | 2 | 0x0 | This register indicates the status of the current Control-In transaction. This is required for responding to the host during the Status-Out stage of the transfer. The Status-Out request will be NAK'd until this register has been written to.<br>00: No response yet (issue a NAK)<br>01: Issue an ACK and accept any data<br>10: Issue a STALL<br>11: Issue an ACK and discard data (if any).<br>This register is cleared automatically at the end of the Status stage of the transfer. |
| 0x028 | CurrentConfiguration | 12 | 0x000 | Indicates the current configuration the UDU is running, and the Interface and Alternate Interface last set by the USB host's SetInterface command. Read only.<br>Bits 11-8: Current Configuration<br>Bits 7-4: Interface Number<br>Bits 3-0: Alternate Interface Number<br>Note that the reset value of 0x000 indicates that the device is not yet configured. The only values that Current Configuration can be set to are 0000 and 0001. When the SetInterface command is issued, the alternate setting being set and the relevant interface number are programmed into this register. |
| 0x02C | VbusStatus | 1 | 0x0 | Indicates the current status of the input pin gpio_udu_vbus_status. Read only. |
| 0x030 | DetectVbus | 1 | 0x1 | This drives the input pin detect_vbus on the PHY. It indicates that Vbus is active. This should be set to '0' when gpio_udu_vbus_status goes low. |

TABLE 53-continued

UDU Registers

| Address (UDU_base+) | Register Name | #bits | Value on Reset | Description |
|---|---|---|---|---|
| 0x034 | DisconnectDevice | 1 | 0x1 | This register drives the UDC20 signal app_dev_discon. Writing a '1' to this register effectively disconnects the D+/D− lines. Once the UDU has been configured and the CPU is ready for USB operation to begin, this register should be set to '0'. Please refer to Section 13.5.22. |
| 0x038 | UDC20Strap | 20 | 0x03071 | UDC20 strap signals. Please refer to Section 13.5.22 for explanation of each signal. Note that it is not recommended to modify the reset value of these registers during normal operation.<br>Bit 19: app_utmi_dir (Read only)<br>Bit 18: app_setdesc_sup (Read only)<br>Bit 17: app_synccmd_sup (Read only)<br>Bit 16: app_ram_if (Read only)<br>Bit 15: app_phyif_8bit (Read only)<br>Bit 14: app_csrprg_sup (Read only)<br>Bits 13-11: fs_timeout_calib[2:0]<br>Bits 10-8: hs_timeout_calib[2:0]<br>Bit 7: app_stall_clr_ep0_halt<br>Bit 6: app_enable_erratic_err<br>Bit 5: app_nz_len_pkt_stall_all<br>Bit 4: app_nz_len_pkt_stall<br>Bits 3-2: app_exp_speed[1:0]<br>Bit 1: app_dev_rmtwkup<br>Bit 0: app_self_pwr |
| 0x03C | InterruptEpSize | 22 | 0x00400040 | Max packet size for the two Interrupt endpoints, from 0 to 1024 bytes.<br>Bits 31-27: reserved<br>Bits 26-16: Ep6 IN<br>Bits 15-11: reserved<br>Bits 10-0: Ep3 IN |
| 0x040 | FsEpSize | 20 | 0xFFFFF | Max pkt size for the control and bulk endpoints in Full Speed.<br>Bits 19-18 Ep7 Out<br>Bits 17-16 Ep5 Out<br>Bits 15-14 Ep5 In<br>Bits 13-12 Ep4 Out<br>Bits 11-10 Ep4 In<br>Bits 9-8 Ep2 Out<br>Bits 7-6 Ep2 In<br>Bits 5-4 Ep1 Out<br>Bits 3-2 Ep1 In<br>Bits 1-0 Ep 0<br>where the bits decode as:<br>00: 8 bytes<br>01: 16 bytes<br>10: 32 bytes<br>11: 64 bytes |
| 0x044 | DmaModes | 2 | 0x3 | Indicates whether the non-control IN and OUT high speed transfers operate in streaming or non-streaming modes. Writing a '0' to a bit position enables streaming mode, and writing a '1' enables non-streaming mode.<br>Bit 1: OUT endpoints<br>Bit 0: IN endpoints |
| | | Endpoint 0 OUT (n = 0) | | |
| 0x050 | DmaOutnDoubleBuf | 1 | 0x0 | Indicates whether the DRAM buffer associated with Epn OUT is a circular buffer or double buffer. A '1' enables double buffer mode, a '0' enables circular buffer mode. |
| 0x054 | DmaOutnStopDesc | 1 | 0x0 | Writing a '1' to this register causes the UDU to clear the HwOwned bits DmaEpnOutDescA and DmaEpnOutDescB if they are set. The UDU first finishes transferring the current packet and then returns ownership of the |

TABLE 53-continued

UDU Registers

| Address (UDU_base+) | Register Name | #bits | Value on Reset | Description |
|---|---|---|---|---|
| | | | | descriptors to SW. This register is cleared automatically when both descriptors become SW owned. |
| 0x058 | DmaOutnTopAdr[21:5] | 17 | 0x000000 | The top address of the EPn OUT buffer in DRAM. This is the highest writable address of the buffer. This is only valid when it is a circular buffer. |
| 0x05C | DmaOutnBottomAdr[21:5] | 17 | 0x000000 | The bottom address of the EPn OUT buffer in DRAM. This is the lowest writable address of the buffer. This is only valid when it is a circular buffer. |
| 0x060 | DmaOutnCurAdrA[21:0] | 22 | 0x000000 | Descriptor A's current write pointer to the EPn OUT buffer in DRAM. This is the next address that will be written to by the UDU. This is a working register. |
| 0x064 | DmaOutnMaxAdrA[21:0] | 22 | 0x000000 | The stop address marker for Epn OUT descriptor A. DmaOutnCurAdrA advances after each write until it reaches this address. This is the last address written. |
| 0x068 | DmaOutnIntAdrA[21:0] | 22 | 0x000000 | The interrupt marker for Epn OUT descriptor A. When DmaOutnCurAdrA reaches or passes this address, an interrupt is generated. |
| 0x06C | DmaEpnOutDescA | 3 | 0x0 | The control register for Epn OUT descriptor A.<br>Bit 2: HWOwned (a working register)<br>Bit 1: DescMRU (read only)<br>Bit 0: StopOnShort<br>Please refer to Section 13.5.3.3 for more detail on HwOwned and DescMru and Section 13.5.4.1 and Section 13.5.4.3 for more detail on StopOnShort. |
| 0x070 | DmaOutnCurAdrB[21:0] | 22 | 0x000000 | Descriptor B's current write pointer to the EPn OUT buffer in DRAM. This is the next address that will be written to by the UDU. This is a working register. |
| 0x074 | DmaOutnMaxAdrB[21:0] | 22 | 0x000000 | The stop address marker for Epn OUT descriptor B. DmaOutnCurAdrB advances after each write until it reaches this address. This is the last address written. |
| 0x078 | DmaOutnIntAdrB[21:0] | 22 | 0x000000 | The interrupt marker for Epn OUT descriptor B. When DmaOutnCurAdrB reaches or passes this address, an interrupt is generated. |
| 0x07C | DmaEpnOutDescB | 3 | 0x2 | The control register for Epn OUT descriptor B.<br>Bit 2: HWOwned (a working register)<br>Bit 1: DescMRU (read only)<br>Bit 0: StopOnShort<br>Please refer to Section 13.5.3.3 for more detail on HwOwned and DescMru and Section 13.5.4.1 and Section 13.5.4.3 for more detail on StopOnShort. |
| | | Endpoint 1 OUT (n = 1) | | |
| 0x080 to 0x0AC | | | | 12 different addressable registers. Identical to Endpoint 0 OUT listing above, with n=1. |
| | | Endpoint 2 OUT (n = 2) | | |
| 0x0B0 to 0x0DC | | | | 12 different addressable registers. Identical to Endpoint 0 OUT listing above, with n = 2. |
| | | Endpoint 4 OUT (n = 4) | | |
| 0x0E0 to 0x10C | | | | 12 different addressable registers. Identical to Endpoint 0 OUT listing above, with n = 4. |

TABLE 53-continued

| UDU Registers | | | | |
|---|---|---|---|---|
| Address (UDU_base+) | Register Name | #bits | Value on Reset | Description |
| | | Endpoint 5 OUT (n = 5) | | |
| 0x110 to 0x13C | | | | 12 different addressable registers. Identical to Endpoint 0 OUT listing above, with n = 5. |
| | | Endpoint 7 OUT (n = 7) | | |
| 0x140 to 0x16C | | | | 12 different addressable registers. Identical to Endpoint 0 OUT listing above, with n = 7. |
| | | Endpoint 0 IN (n = 0) | | |
| 0x170 | DmaInnDoubleBuf | 1 | 0x0 | Indicates whether the DRAM buffer associated with Epn IN is a circular buffer or double buffer. A '1' enables double buffer mode, a '0' enables circular buffer mode. |
| 0x174 | DmaInnStopDesc | 1 | 0x0 | Writing a '1' to this register causes the UDU to clear the HwOwned bits DmaEpnInDescA and DmaEpnInDescB if they are set. The UDU first finishes transferring the current packet and then returns ownership of the descriptors to SW. This register is cleared automatically when both descriptors become SW owned. |
| 0x178 | DmaInnTopAdr[21:5] | 17 | 0x000000 | The top address of the EPn IN buffer in DRAM. This is the highest readable address of the buffer. This is only valid when it is a circular buffer. |
| 0x17C | DmaInnBottomAdr[21:5] | 17 | 0x000000 | The bottom address of the EPn IN buffer in DRAM. This is the lowest readable address of the buffer. This is only valid when it is a circular buffer. |
| 0x180 | DmaInnCurAdrA[21:0] | 22 | 0x000000 | Descriptor A's current read pointer to the EPn IN buffer in DRAM. This is the next address that will be read from by the UDU. This is a working register. |
| 0x184 | DmaInnMaxAdrA[21:0] | 22 | 0x000000 | The stop address marker for Epn IN descriptor A. DmaInnCurAdrA advances after each read until it reaches this address. This is the last address of the buffer which may be read. |
| 0x188 | DmaInnIntAdrA[21:0] | 22 | 0x000000 | The interrupt marker for Epn IN descriptor A. When DmaInnCurAdrA reaches this address, an interrupt is generated. |
| 0x18C | DmaEpnInDescA[2:0] | 3 | 0x0 | The control register for Epn IN descriptor A.<br>Bit 2: HWOwned (a working register)<br>Bit 1: DescMRU (read only)<br>Bit 0: SendZero<br>Please refer to Section 13.5.3.3 for more detail on HwOwned and DescMru and Section 13.5.4.2 and Section 13.5.4.4 for more detail on SendZero. |
| 0x190 | DmaInnCurAdrB[21:0] | 22 | 0x000000 | Descriptor B's current read pointer to the EPn IN buffer in DRAM. This is the next address that will be read from by the UDU. This is a working register. |
| 0x194 | DmaInnMaxAdrB[21:0] | 22 | 0x000000 | The stop address marker for Epn IN descriptor B. DmaInnCurAdrB advances after each read until it reaches this address. This is the last address of the buffer which may be read. |
| 0x198 | DmaInnIntAdrB[21:0] | 22 | 0x000000 | The interrupt marker for Epn IN descriptor B. When DmaInnCurAdrB reaches this address, an interrupt is generated. |
| 0x19C | DmaEpnInDescB[2:0] | 3 | 0x2 | The control register for Epn IN descriptor B.<br>Bit 2: HWOwned (a working register)<br>Bit 1: DescMRU (read only)<br>Bit 0: SendZero |

TABLE 53-continued

| Address (UDU_base+) | Register Name | #bits | Value on Reset | Description |
|---|---|---|---|---|
| | | | | Please refer to Section 13.5.3.3 for more detail on HwOwned and DescMru and Section 13.5.4.2 and Section 13.5.4.4 for more detail on SendZero. |
| | | Endpoint 1 IN (n = 1) | | |
| 0x1A0 to 0x1CC | | | | 12 different addressable registers. Identical to Endpoint 0 IN listing above, with n = 1. |
| | | Endpoint 2 IN (n = 2) | | |
| 0x1D0 to 0x1FC | | | | 12 different addressable registers. Identical to Endpoint 0 IN listing above, with n = 2. |
| | | Endpoint 3 IN (n = 3) | | |
| 0x200 to 0x22C | | | | 12 different addressable registers. Identical to Endpoint 0 IN listing above, with n = 3. |
| | | Endpoint 4 IN (n = 4) | | |
| 0x230 to 0x25C | | | | 12 different addressable registers. Identical to Endpoint 0 IN listing above, with n = 4. |
| | | Endpoint 5 IN (n = 5) | | |
| 0x260 to 0x28C | | | | 12 different addressable registers. Identical to Endpoint 0 IN listing above, with n = 5. |
| | | Endpoint 6 IN (n = 6) | | |
| 0x290 to 0x2BC | | | | 12 different addressable registers. Identical to Endpoint 0 IN listing above, with n = 6. |
| | | Interrupts | | |
| 0x300 | IntStatus | 31 | 0x00000000 | Interrupt Status register. Bit listings are given in Table 54. Read only. |
| 0x304 to 0x318 | IntStatusEpnOut | 6x9 | 0x000 | Interrupt Status register for Epn OUT, where n is 0, 1, 2, 4, 5, 7. Bit listings are given in Table 55. Read only. |
| 0x31C to 0x334 | IntStatusEpnIn | 7x5 | 0x00 | Interrupt Status register for Epn IN, where n is 0 to 6. Bit listings are given in Table 56. Read only. |
| 0x340 | IntMask | 31 | 0x00000000 | Interrupt Mask register. Setting a particular bit to '1' will enable the equivalent bit in the IntStatus interrupt register. |
| 0x344 to 0x358 | IntMaskEpnOut | 6x9 | 0x000 | Interrupt Mask register for Epn OUT, where n is 0, 1, 2, 4, 5, 7. Setting a particular bit to '1' will enable the equivalent bit in the IntStatusEpnOut interrupt register. |
| 0x35C to 0x374 | IntMaskEpnIn | 7x5 | 0x00 | Interrupt Mask register for Epn IN, where n is 0 to 6. Setting a particular bit to '1' will enable the equivalent bit in the IntStatusEpnIn interrupt register. |
| 0x380 | IntClear | 18 | 0x0000 | Interrupt Clear register. Writing a '1' to the relevant bit position will clear the equivalent bit in the IntStatus[17:0] interrupt register. This register is cleared automatically, and will therefore always be read as 0x0000. |
| 0x384 to 0x398 | IntClearEpnOut | 6x9 | 0x000 | Interrupt Clear register for EPn OUT, where n is 0, 1, 2, 4, 5, 7. Writing a '1' to the relevant bit position will clear the equivalent bit in the IntStatusEpnOut interrupt register. This register is cleared automatically, and will therefore always be read as 0x000. |
| 0x39C to 0x3B4 | IntClearEpnIn | 7x5 | 0x00 | Interrupt Clear register for EPn IN, where n is 0 to 6. Writing a '1' to the relevant bit position will clear the equivalent bit in the IntStatusEpnOut interrupt register. This |

TABLE 53-continued

UDU Registers

| Address (UDU_base+) | Register Name | #bits | Value on Reset | Description |
|---|---|---|---|---|
| | | | | register is cleared automatically, and will therefore always be read as 0x00. |
| | Debug registers (read only) | | | |
| 0x3C0 | DmaOutStrmPtr[21:0] | 22 | 0x000000 | The current write pointer to the OUT buffers in DRAM. This is the next address that will be written to by the UDU. Read only. |
| 0x3C4 to 0x3DC | DmaInnStrmPtr[21:0] | 7x22 | 0x000000 | The current read pointer to the EPn IN buffer in DRAM, where n is 0 to 6. This is the next address that will be read from by the UDU, when in streaming mode. Read only. |
| 0x3E0 | ControlStates | 3 | 0x0 | Reflects the current state of the control transfers. Read only.<br>Bits 2-0 Control Transfer State Machine<br>000: Idle<br>001: Setup<br>010: DataIn<br>011: DataOut<br>100: StatusIn<br>101: StatusOut<br>110: reserved<br>111: reserved |
| 0x3E4 | PhyRxState | 20 | N/A | Bit 19: phy_udu_rxactive<br>Bit 18: phy_udu_rxvalid<br>Bit 17: phy_udu_rxvalidh<br>Bits 16-9: phy_udu_rxdata[7:0]<br>Bits 8-1: phy_udu_rxdatah[7:0]<br>Bit 0: phy_udu_rx_err |
| 0x3E8 | PhyTxState | 19 | N/A | Bit 18: udu_phy_txvalid<br>Bit 17: phy_udu_txvalidh<br>Bits 16-9: udu_phy_txdata[7:0]<br>Bits 8-1: udu_phy_txdatah[7:0]<br>Bit 0: udu_phy_txready |
| 0x3EC | PhyCtrlState | 6 | N/A | Bit 5: udu_phy_xver_sel<br>Bits 4-3: udu_phy_opmode[1:0]<br>Bit 2: udu_phy_term_sel<br>Bits 1-0: phy_udu_line_state[1:0] |
| | UDC20 control/status registers (not available in debug mode) | | | |
| 0x400 | SetupCmdAdr | 16 | 0x0555 | Setup/Command Address used by UDC20. This must be programmed to 0x0555. |
| 0x404 to 0x430 | EpnCfg | 12x32 | 0x00000000 | Endpoint configuration register.<br>Bits 31-30: reserved<br>Bits 29-19: Max_pkt_size<br>Bits 18-15 Alternate_setting<br>Bits 14-11 Interface_number<br>Bits 10-7 Configuration_number<br>Bits 6-5 Endpoint_type<br>00: Control<br>01: Isochronous<br>10: Bulk<br>11: Interrupt<br>Bit 4: Endpoint_direction<br>0: Out<br>1: In<br>Bits 3-0 Endpoint_number |

13.5.2 Local Endpoint Packet Buffering

Figure 36:
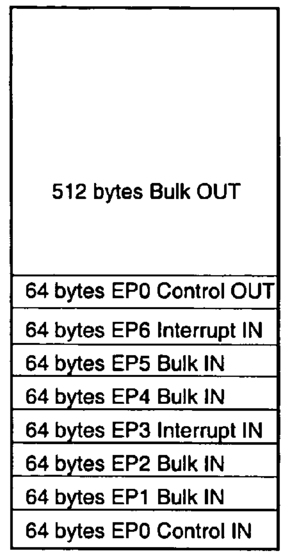
FIG. 36. Local endpoint packet buffer partitioning

The partitioning of the local endpoint buffers is illustrated in FIG. 36.

13.5.3 DMA Controller

There are local endpoint buffers available for temporary storage of endpoint data within the UDU. All OUT data packets are transferred from the UDC20 to the local packet buffer, and from there to the endpoint's buffer in DRAM. Conversely, all IN data packets are transferred from a buffer in DRAM to the local packet buffers, and from there to the UDC20.

The UDU's DMA controller handles all of this data transfer. The DMA controller can be configured to handle the IN and OUT data transfers in streaming mode or non-streaming mode. However, non-streaming mode is only a valid option for non-control endpoints and only when in high speed mode. Section 13.5.3.1 and Section 13.5.3.2 below describe streaming and non-streaming modes respectively.

Each IN or OUT endpoint's buffer in DRAM can be configured to operate as either a circular buffer or a double buffer. Each IN and OUT endpoint has two DMA descriptors, A and B, which are used to set up the DMA pointers and control for endpoint data transfer in and out of DRAM. Only one of the two descriptors is used by the UDU at any given time. While one descriptor is being used by the UDU, the other may be updated by the SW. The HwOwned registers flag whether the HW (UDU) or the SW owns the DMA pointers. Only the owner may modify the DMA descriptors. Section 13.5.3.3 below describes DMA descriptors in more detail.

Both bulk and control OUT local packet buffers share the same DIU write port. Packets are written out to DRAM in the same order they arrive into the local packet buffers. The seven IN packet buffers share the same DIU read port. If more than one IN packet buffer needs to be filled, the highest priority is given to Endpoint 0, lowest to Endpoint 6.

13.5.3.1 Streaming Mode

In streaming mode the packet is read out from one end of the local packet buffer while being written in to the other. The buffer may not necessarily be large enough to hold an entire packet for high speed IN data. The DRAM access rate must be sufficient to keep up with the USB bus to ensure no buffer over/underruns.

If the DRAM arbiter does not provide adequate timeslots to the UDU, the USB packet transmission will be disrupted in streaming mode. For IN data, the UDU will not be able to provide the data fast enough to the UDC20, and the UDC20 inserts a CRC error in the packet. The USB host is expected to retry the IN packet, but unless the DRAM bandwidth allocated to the UDU read port is increased sufficiently, it is likely that the IN packets will continue to fail. For OUT data, the UDU will be unable to empty the local OUT packet buffer quickly enough before the next packet arrives. The UDC20 NAKs the new packet. If the host retries the new OUT packet, it is possible that the local packet buffer will be empty and the OUT packet can be accepted. Therefore, insufficient DRAM bandwidth will not block the OUT data completely, but will slow it down.

13.5.3.2 Non-Streaming Mode

Non-streaming mode is used when there isn't enough DRAM bandwidth available to use streaming mode.

For bulk OUT data, the packet is transferred into the local 512-byte packet buffer, and like streaming mode, is written out to DRAM as soon as the data arrives in. However, the UDU's flow control (i.e. ACK, NAK, NYET) for OUT transfers differs between streaming and non-streaming modes. See Section 13.5.9.2.2 for more detail.

For IN data, the UDU transfers the data if the entire packet is already stored in the local packet buffer. Otherwise the UDU NAKs the request. IN endpoints are only capable of transferring a maximum of 64-byte packets in non-streaming mode. wMaxPktSize in high speed mode is 512 bytes for bulk and may be up to 1024 bytes for interrupt. If a short packet (less than wMaxPktSize) is transferred, then the host assumes it is the end of the transfer. Due to the limited packet size, the data transfers achieved in non-streaming IN mode are a fraction of the theoretical USB bandwidth.

13.5.3.3 DMA Descriptors

Each IN and OUT endpoint has two DMA descriptors, A and B. Each DMA descriptor contains a group of configuration registers which are used to setup and control the transfer of the endpoint data to or from DRAM. Each DMA channel uses just one of the two DMA descriptors at any given time. When the DMA descriptor is finished, the UDU transfers ownership of the DMA descriptor to the SW. This may occur when the buffer space provided by DMA descriptor A has filled, for example. Each descriptor is owned by either the HW or the SW, as indicated by the HwOwned bit in the DmaEpnOutDescA, DmaEpnOutDescB, DmaEpnInDescA, DmaEpnInDescB registers. The HwOwned registers are considered working registers because both the HW and SW can modify the contents. The SW can set the HwOwned registers, and the HW can clear them. The SW can only modify the DMA descriptor when HwOwned is '0'.

The descriptor is used until one of the following conditions occur:

- the OUT buffer space in DRAM provided by the descriptor has filled to within wMaxPktSize, i.e. there is less than wMaxPktSize available
- the IN buffer in DRAM provided by the descriptor has emptied
- the relevant bit in DmaOutnStopDesc or DmaInnStopDesc is set to '1'
- a short or zero length packet is received and transferred to an OUT DRAM buffer and StopOnShort is set to '1' in DmaEpnOutDescA or DmaEpnOutDescB.
- the HwOwned bit in the unused descriptor is set to '1', and the DMA channel is in circular buffer mode.
- on endpoint 0 IN, a transfer has completed (indicated by StatusOut)

A new descriptor is chosen when the current one completes, or when the relevant bit in DmaOutnStopDesc or DmaInnStopDesc is cleared.

The UDU chooses which descriptor to use per DMA channel:

- If neither descriptor A or descriptor B's HwOwned bit is set, then no descriptor is assigned to the DMA channel.
- If just one of the descriptors' HwOwned bit is set, then that descriptor is used for the DMA channel.
- If both descriptors' HwOwned bits are set, then the least recently used descriptor is chosen. The UDU keeps track of the most recently used descriptor and provides this status in the DescMru bit in the DmaEpnOutDescA, DmaEpnOutDescB, DmaEpnInDescA, DmaEpnInDescB registers. If DescMru is set to '1', it implies that this descriptor is the most recently used. The UDU always updates the endpoint's descriptor A and B DescMru bits at the same time and these values are always complements of each other. They are both updated whenever either descriptor's HwOwned bit is cleared by the UDU.

13.5.4 DRAM Buffers

The DMA controller supports the use of circular buffers or double buffers for the endpoint DMA channels. The configuration registers DmaOutnDoubleBuf and DmaInnDoubleBuf are used to set each DMA channels individually into either double or circular buffer mode. The modes differ in the UDU behaviour when a new DMA descriptor is made available by software. In circular buffer mode, a new descriptor contains updates to the parameters of the single buffer area being used for a particular endpoint, to be applied immediately by the hardware. In double buffer mode a new descriptor contains the parameters of a new buffer, to be used only when any current buffer is exhausted.

Section 13.5.4.1 & Section 13.5.4.2 below describe the operation of circular buffer DMA writes and reads respectively. Section 13.5.4.3 and Section 13.5.4.4 below describe double buffer DMA writes and reads.

13.5.4.1 Circular Buffer Write Operation

Figure 37:
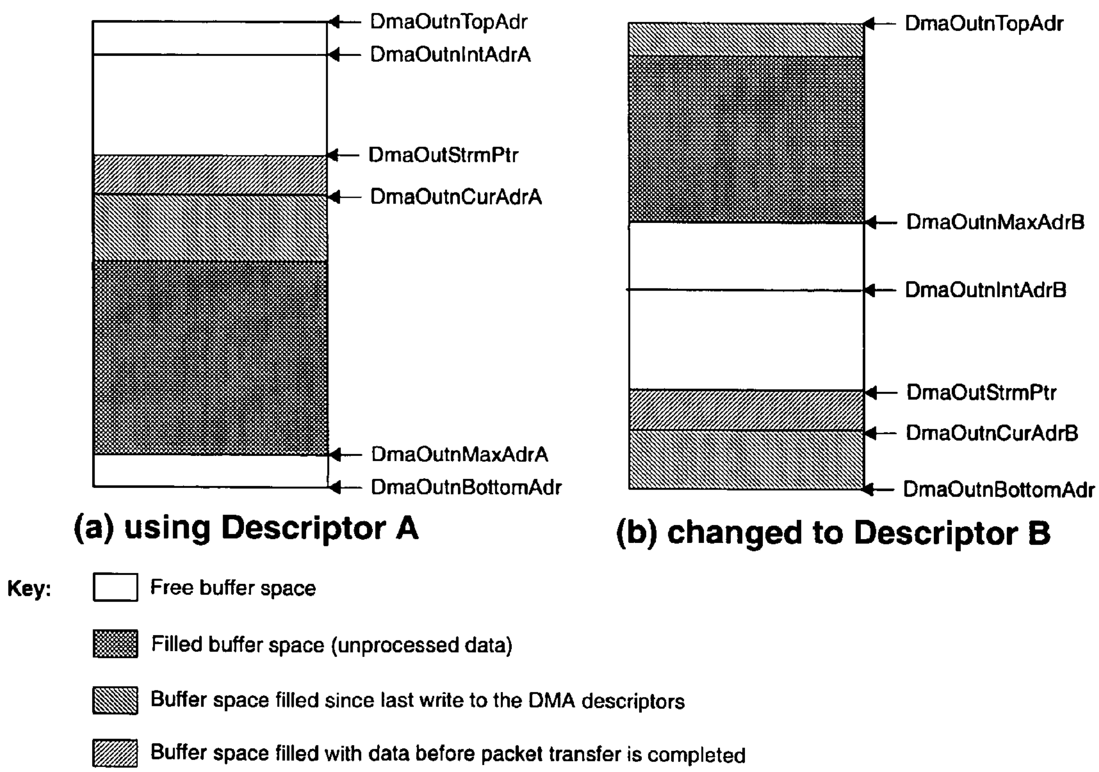
FIG. 37. Circular buffer operation

Each circular buffer is controlled by eight configuration registers: DmaOutnBottomAdr, DmaOutnTopAdr, DmaOutnMaxAdrA, DmaOutnCurAdrA, DmaOutnIntAdrA, DmaOutnMaxAdrB, DmaOutnCurAdrB, DmaOutnIntAdrB and an internal register DmaOutStrmPtr. The operation of the circular buffer is shown in FIG. 37 below.

When an OUT packet is received and begins filling the local endpoint buffer, the DMA controller begins to write out the packet to the endpoint's buffer in DRAM. FIG. 37 shows two snapshots of the status of a circular buffer, starting off using descriptor A, and with (b) occurring sometime after (a) and a changeover from descriptor A to B occurring in between (a) and (b).

DmaOutnTopAdr marks the highest writable address of the buffer. DmaOutnBottomAdr marks the lowest writable address of the buffer. DmaOutnMaxAdrA marks the last address of the buffer which may be written to by the UDU. DmaOutStrmPtr register always points to the next address the DMA manager will write to and is incremented after each memory access. There is only one DmaOutStrmPtr register, which is loaded at the start of each packet from the DmaOutnCurAdrA/B register of the endpoint to which the packet is directed. DmaOutnCurAdrA acts as a shadow register of DmaOutStrmPtr. The DMA manager will continue filling the free buffer space depicted in (a), advancing the DmaOutStrmPtr after each write to the DIU. When a packet has been successfully received, as indicated by a status write, DmaOutnCurAdrA is updated to DmaOutStrmPtr. If a packet has not been received successfully, the corrupt data is removed from DRAM by keeping DmaOutnCurAdrA at its original position. When DmaOutnCurAdrA reaches or passes the address in DmaOutnIntAdrA it generates an interrupt on IntEpnOutAdrA.

The DMA manager continues to fill the free buffer space and when it fills the address in DmaOutnTopAdr it wraps around to the address in DmaOutnBottomAdr and continues from there. DMA transfers will continue indefinitely in this fashion until a stop condition occurs. This occurs if

- there is less than wMaxPktSize amount of space left in the circular buffer at the end of a successful packet write, i.e. DmaOutnCurAdrA comes to within wMaxPktSize of DmaOutnMaxAdrA.
- the relevant bit is set in DmaOutnStopDesc and the UDU is not currently transferring a packet to DRAM.
- a short or zero length packet is received and transferred to an OUT DRAM buffer and StopOnShort is set to '1' in DmaEpnOutDescA
- the HwOwned bit in the DmaEpnOutDescB register is set to '1' and the UDU is not currently transferring a packet to DRAM.

When the descriptor completes, the UDU clears the HwOwned bit in the DmaEpnOutDescA register and generates an interrupt on IntEpnOutHwDoneA. The UDU copies DmaOutnCurAdrA to DmaOutnCurAdrB and chooses another descriptor, as detailed in Section 13.5.3.3. If descriptor B is chosen, the UDU continues writing out data to the circular buffer, but using the new DmaOutnCurAdrB, DmaOutnMaxAdrB and DmaOutnIntAdrB registers.

DmaOutnCurAdrA and DmaOutnCurAdrB are working registers, and can be updated by both HW and SW. However, it is inadvisable to write to these when a circular buffer is up and running.

The DMA addresses DmaOutStrmPtr, DmaOutnCurAdrA, DmaOutnMaxAdrA, DmaOutnIntAdrA, DmaOutnCurAdrB, DmaOutnMaxAdrB and DmaOutnIntAdrB are byte aligned. DmaOutnTopAdr and DmaOutnBottomAdr are 256-bit word aligned. DRAM accesses are 256-bit word aligned and udu_diu_wmask[7:0] is used to mask the bytes. Packets are written out to DRAM without any gaps in the DRAM byte addresses, even if some OUT packets are not multiples of 32 bytes.

13.5.4.2 Circular Buffer Read Operation

DMA reads operate in streaming or non-streaming mode, depending on the configuration register setting in DmaModes. Note that this can only be modified when all descriptors are inactive.

In streaming mode, IN data is transferred from DRAM using DMA reads in a similar manner to the DMA writes described in Section 13.5.4.1 above. There are eight configuration registers used per DMA channel: DmaInnBottomAdr, DmaInnTopAdr, DmaInnMaxAdrA, DmaInnCurAdrA, DmaInnIntAdrA, DmaInnMaxAdrB, DmaInnCurAdrB, DmaInnIntAdrB. An internal register DmaInnStrmPtr is also used per DMA channel. DmaInnTopAdr is the highest buffer address which may be read from. DmaInnBottomAdr is the lowest buffer address which may be read from. DmaInnMaxAdrA/B is the last buffer address which may be read from. DmaInnStrmPtr points to the next address to be read from and is incremented after each memory access.

In streaming mode, data transfer from DRAM to the endpoint's local packet buffer is initiated when the local buffer is empty. The DMA controller fills the local packet buffer with up to 64 bytes. If the packet size is larger than this, the DMA controller waits until it receives an IN token for that endpoint. The data in the local buffer is streamed out to the UDC20. The DMA controller continues to stream in the data as space becomes available in the local buffer until an entire packet has been written. If descriptor A is initially used, DmaInnCurAdrA is updated to DmaInnStrmPtr when a packet has been successfully transferred over USB, as indicated by a status write. If the packet was not received successfully by the USB host, DmaInnStrmPtr is returned to DmaInnCurAdrA and the data is streamed out again if requested by the host.

When DmaInnCurAdrA reaches or passes DmaInnIntAdrA, an interrupt is generated on IntEpnInAdrA. If the amount of data available is less than wMaxPktSize (as indicated by DmaInnMaxAdrA), then the UDU assumes it is a short packet. If DmaInnMaxAdrA was read from, and the last packet was wMaxPktSize and descriptor A's SendZero configuration register is set to '1', then a zero length data packet is sent to the USB host on the next IN request to the endpoint. This indicates to the USB host that there is no more data to send from that endpoint.

A DMA descriptor completes at the end of the current packet transfer if any of the following conditions occur:

- DmaInnCurAdrA reaches DmaInnMaxAdrA and the final packet has been successfully received by the USB host (including a zero length packet, if necessary)
- Descriptor B's HwOwned bit is set to '1'
- The relevant bit in DmaInnStopDesc is set to '1'
- The end of the control transfer is reached, for control endpoint 0

When a DMA descriptor completes the UDU clears descriptor A's HwOwned bit. DmaInnCurAdrA is copied over to DmaInnCurAdrB. The UDU then chooses the next descriptor to use, as detailed in Section 13.5.3.3.

Non-streaming mode operates in a similar manner to streaming mode. In non-streaming mode, the DMA controller begins transfer of data from DRAM to the endpoint's local packet buffer when the local buffer is empty. The data transfer continues until wMaxPktSize is transferred, or the local buffer is full, or until DmaInnMaxAdrA or DmaInnMaxAdrB is read from. DmaInnStrmPtr is not used and DmaInnCurAdrA or DmaInnCurAdrB points to the next address that will be read from. The full packet remains in the local packet buffer until it has transferred successfully to the USB host, as indicated by a status write. The DMA descriptors are started and stopped in the same manner as for streaming mode, as detailed above.

13.5.4.3 Double Buffer Write Operation

A DMA channel can be configured to use a double buffer in DRAM by setting the relevant register DmaOutnDoubleBuf to '1'. A double buffer is used to allow the next data transfer to begin at a totally separate area of memory.

An OUT endpoint's double buffer uses six configurable address pointers: DmaOutnCurAdrA, DmaOutnMaxAdrA, DmaOutnIntAdrA, DmaOutnCurAdrB, DmaOutnMaxAdrB, DmaOutnIntAdrB. Note that DmaOutnTopAdr and DmaOutnBottomAdr are not used. DmaOutnMaxAdrA/B marks the last writable address of the buffer. DmaOutStrmPtr points to the next address to write to and is incremented after each memory access.

If DMA descriptor A is initially used, the data is transferred to the initial address given by DmaOutnCurAdrA. The internal register, DmaOutStrmPtr is used to advance the addresses until a packet has been successfully written out to DRAM, as indicated by a status write. DmaOutnCurAdrA is then updated to the value in DmaOutStrmPtr.

If DmaOutnCurAdrA reaches or passes DmaOutnIntAdrA, an interrupt is generated on IntEpnOutAdr. The UDU finishes with DMA descriptor A at the end of a successful packet transfer under the following conditions:

- if a short or zero length packet is received and descriptor A's StopOnShort is set to '1'
- if there is not enough space left in DRAM for another packet of wMaxPktSize.
- if DmaOutnStopDesc is set to '1'

When descriptor A completes, the HwOwned bit is cleared by the UDU and an interrupt is generated on IntEpnOutHwDoneA. The UDU chooses another descriptor, as detailed in Section 13.5.3.3. If descriptor B is chosen, the UDU begins data transfer to a new buffer given by DmaOutnCurAdrB, DmaOutnMaxAdrB, DmaOutnIntAdrB.

13.5.4.4 Double Buffer Read Operation

IN data is transferred in streaming or non-streaming mode. An IN endpoint's double buffer uses the following six configurable address pointers: DmaInnCurAdrA, DmaInnMaxAdrA, DmaInnIntAdrA, DmaInnCurAdrB, DmaInnMaxAdrB, DmaInnIntAdrB. Note that DmaInnTopAdr and DmaInnBottomAdr are not used. DmaInnMaxAdrA/B marks the last readable address of the buffer. DmaInnStrmPtr points to the next address to read from and is incremented after each memory access.

If DMA descriptor A is initially used, the data is transferred to the initial address given by DmaInnCurAdrA. The internal register, DmaInnStrmPtr, is used in streaming mode to advance the addresses until a packet has been successfully received by the USB host, as indicated by a status write. Then DmaInnCurAdrA is updated to the value in DmaInnStrmPtr. In non-streaming mode, DmaInnStrmPtr is not used.

If DmaInnCurAdrA reaches or passes DmaInnIntAdrA, an interrupt is generated on IntEpnInAdrA. If DmaInnCurAdrA reaches DmaInnMaxAdrA and the last packet is wMaxPktSize, and the SendZero bit in DmaEpnInDescA is set to '1', the UDU sends a zero length data packet at the next IN request to that endpoint. The UDU finishes with DMA descriptor A at the end of a successful packet transfer under the following conditions:

- if DmaInnCurAdrA reaches DmaInnMaxAdrA and the final packet has been successfully received by the USB host (including a zero length packet, if necessary)
- if DmaInnStopDesc is set to '1'
- if the end of the control transfer is reached, for control endpoint 0

When descriptor A completes, the HwOwned bit in DmaEpnInDescA is cleared by the UDU and an interrupt is generated on IntEpnInHwDoneA. The UDU chooses another descriptor, as detailed in Section 13.5.3.3. If descriptor B is chosen, the UDU begins data transfer from a new buffer given by DmaOutnCurAdrB, DmaOutnMaxAdrB, DmaOutnIntAdrB.

13.5.5 Endpoint Data Transfers 13.5.5.1 Endpoint 0 IN Transfers

Control-In transfers consist of 3 stages: setup, data & status.

An EP0 IN transfer starts off with a write of 8 bytes of setup data to the local EP0 OUT packet buffer, and from there to DRAM. The UDU interrupts the CPU with IntSetupWr. In addition, an interrupt may be generated on one of the DMA descriptors, IntEp0OutAdrA/B, if DmaOut0IntAdrA/B address is reached or passed. If the setup data cannot be written out to DRAM because there is no valid DMA descriptor, IntSetupWrErr is asserted instead of IntSetupWr. The setup packet will remain in the local buffer until the CPU sets up a valid DMA descriptor to enable the UDU to transfer the data out to DRAM.

The setup command may be GetDescriptor(configuration), for example. The SW must interpret this setup command and set up a DMA descriptor to point to the location of the USB descriptors in DRAM. The UDU then transfers the data into the local EP0 IN packet buffer.

The Data stage of the control transfer occurs when the USB descriptors are read from the local packet buffer out to the USB bus. There may be more than one data transaction during the Data stage. If the data is unavailable, the UDU issues a NAK to the USB host. The host is expected to retry and continue to send IN tokens to this endpoint. In response, the UDU continues to NAK until the packet is loaded into the local buffer.

The third stage of the transfer is the Status stage, when the device indicates to the host whether the transfer was successful or not. When the host issues a StatusOut request, an interrupt is generated on either IntStatusOut or IntNzStatusOut. Which interrupt is triggered depends on whether a zero or non zero data field is received with the StatusOut. The UDU responds to this with an ACK, NAK or STALL, depending on the value programmed into StatusOutResponse configuration register. If the Status transaction has completed successfully, as indicated by a status write, the StatusOutResponse register is cleared.

13.5.5.2 Endpoint 0 OUT Transfers

An EP0 OUT transfer consists of 2 or 3 stages: Setup, Data (may or may not be present), Status.

The transfer starts with a write of 8 bytes of setup data to the local EP0 OUT packet buffer, and from there to DRAM.

The UDU interrupts the CPU with IntSetupWr. In addition, an interrupt may be generated on one of the DMA descriptors, IntEp0OutAdrA/B, if DmaOut0IntAdrA/B address is reached. If the setup data cannot be written out to DRAM because there is no valid DMA descriptor, IntSetupWrErr is asserted instead of IntSetupWr. The setup packet will remain in the local buffer until the CPU sets up a valid DMA descriptor to enable the UDU to transfer the data out to DRAM.

The setup command may be SetDescriptor, for example.

The next stage of the transfer is the Data stage, which consists of zero or more OUT transactions. The number of bytes transferred is defined in the Setup stage. At the start of the data transaction, the data is written to the local packet buffer, and from there to DRAM. One or more interrupts may be generated on one of the DMA descriptors:

IntEp0OutAdrA/B, if DmaOut0IntAdrA/B address is reached

IntEp0OutPktWrA/B if the packet is successfully written to DRAM

IntEp0OutShortWrA/B, if a short packet is successfully written to DRAM or a zero length packet is received If there is insufficient buffer space available (either local packet buffer or DRAM buffer) the UDU does not accept the OUT packet and responds with a NAK. In some cases the UDU NYETs the packet, as described in Section 13.5.9.1.2.

The next stage of the transfer is the Status stage, when the device reports the status of the control transfer to the host. When a StatusIn request is received, an interrupt is generated on IntStatusIn. The UDU's response to the host depends on the value programmed in the StatusInReponse status register. The response may be a NAK, ACK (a zero length data packet) or STALL. If the Status transaction has completed successfully, as indicated by a status write, the StatusInResponse register is cleared.

13.5.5.3 Bulk OUT Transfers

There are five bulk OUT endpoints in the UDU. At full speed, wMaxPktSize can be 8, 16, 32 or 64 bytes, as programmed in the configuration register FsEpSize. At high speed, wMaxPktSize is 512 bytes.

The endpoint data is transferred into the local packet buffer, and from there it is written out to DRAM. An interrupt is generated on IntEpnOutPktWrA/B when a packet has been written out to DRAM. If the packet is shorter than wMaxPktSize, IntEpnOutShortWrA/B is also asserted. In addition, an interrupt may be generated on IntEpnOutAdrA/B if the address DmaOutnIntAdrA/B is reached or passed.

If there is insufficient buffer space available (either local packet buffer or DRAM buffer) the UDU does not accept the OUT packet and responds with a NAK. In some cases the UDU NYETs the packet, as described in Section 13.5.9.2.2.

If the endpoint is stalled, due to the EpStall bit being set, the UDU does not accept the OUT packet and responds with a STALL.

13.5.5.4 Bulk IN Transfers

There are four bulk IN endpoints available in the UDU. At full speed, wMaxPktSize can be 8, 16, 32 or 64 bytes, as programmed in the configuration register FsEpSize. At high speed, wMaxPktSize is 512 bytes.

Each bulk IN endpoint has a dedicated 64-byte local packet buffer. When data is requested from an endpoint, it is expected that the 64-byte packet buffer has already been filled with data from DRAM. In streaming mode, as this data is read out, more data is written in from DRAM until wMaxPktSize has been retrieved. In non-streaming mode, the entire packet is first written into the local packet buffer, and is then sent out onto the USB bus.

The maximum packet size in non-streaming mode is limited to 64 bytes due to the size of the local packet buffer. However, in non-streaming mode, the UDU is operating at high speed, and wMaxPktSize is 512 bytes. When the host receives a packet shorter than wMaxPktSize, it assumes there is no more data available for that transfer. The host may start a new transfer, and retrieve any remaining data, 64 bytes at a time.

If the data is unavailable (if the local packet buffer does not contain either a full packet or the first 64 bytes of a packet), the UDU issues a NAK to the USB host.

If the endpoint is stalled, due to the EpStall bit being set, the UDU responds with a STALL to the IN token.

13.5.5.5 Interrupt IN Transfers

There are two interrupt IN endpoints available in the UDU. Each endpoint has a configurable wMaxPktSize of 0 to 1024 bytes.

Each interrupt IN endpoint has a dedicated 64-byte local packet buffer. When data is requested from an endpoint, it is expected that the 64-byte packet buffer has already been filled with data from DRAM. In streaming mode, as this data is read out, more data is written in from DRAM until wMaxPktSize has been retrieved. In non-streaming mode, the entire packet is first written into the local packet buffer, and is then sent out onto the USB bus.

The maximum packet size in non-streaming mode is limited to 64 bytes due to the size of the local packet buffer. However, wMaxPktSize may be up to 1024 bytes. If the host receives a packet shorter than wMaxPktSize, it assumes there is no more data available for that transfer. The host may start a new transfer, and retrieve any remaining data, 64 bytes at a time.

If the data is unavailable (if the local packet buffer does not contain either a full packet or the first 64 bytes of a packet), the UDU issues a NAK to the USB host.

If the endpoint is stalled, due to the EpStall bit being set, the UDU responds with a STALL to the IN token.

13.5.6 Interrupts

Table 54, Table 55 and Table 56 below list the interrupts and their bit positions in the IntStatus, IntStatusEpnOut and IntStatusEpnIn configuration registers respectively.

TABLE 54

IntStatus interrupts

| Bit number | Interrupt Name | Description |
|---|---|---|
| 0 | IntSuspend | This interrupt triggers when the USB bus goes into suspend state. |
| 1 | IntResume | This interrupt occurs when bus activity is detected during suspend state. |
| 2 | IntReset | This interrupt occurs when a reset is detected on USB bus. |

TABLE 54-continued

IntStatus interrupts

| Bit number | Interrupt Name | Description |
|---|---|---|
| 3 | IntEnumOn | This is asserted when device starts being enumerated by external host. |
| 4 | IntEnumOff | This is asserted when device finishes being enumerated by external host. |
| 5 | IntSof | This interrupt triggers when Start of (micro)frame packet is received. |
| 6 | IntSetCsrsCfg | This indicates that a control command SetConfiguration was issued and that the CSR registers should be updated accordingly. The UDU responds to Status requests with NAKs until the CsrsDone register is set high. |
| 7 | IntSetCsrsIntf | This indicates that a control command SetInterface was issued and that the CSR registers should be updated accordingly. The UDU responds to Status requests with NAKs until the CsrsDone register is set high. |
| 8 | IntSetupWr | This interrupt occurs when 8 bytes of setup command has been written to EP0 OUT DMA buffer. |
| 9 | IntSetupWrErr | This occurs if the UDU is unable to transfer a setup packet from a local buffer to DRAM, due to the DMA channel being disabled or due to a lack of space. |
| 10 | IntStatusIn | This interrupt is generated when a Status-In request is received at the end of a Control-Out transfer. |
| 11 | IntStatusOut | This interrupt is generated when a Status-Out request is received at the end of a Control-In transfer and a zero length data packet is received. |
| 12 | IntNzStatusOut | This interrupt is generated when a Status-Out request is received at the end of a Control-In transfer and a non zero length data packet is received. |
| 13 | IntErraticErr | This indicates that either of the PHY signals phy__rxvalid and phy__rxactive are asserted for 2 ms due to a PHY error. UDC20 goes into Suspend State. |
| 14 | IntEarlySuspend | This indicates that the USB bus has been idle for 3 ms. |
| 15 | IntVbusTransition | This indicates that the input pin gpio__udu__vbus__status has changed state from ‘0’ to ‘1’ or vice versa. The configuration register VbusStatus contains the present value of this signal. |
| 16 | IntBufOverrun | In streaming mode, an OUT packet was received but the local control or bulk packet buffer was not empty, which caused a NAK on the endpoint. |
| 17 | IntBufUnderrun | In streaming mode, one of the IN local packet buffers has emptied in the middle of a packet, which caused a CRC error to be inserted in the packet. |
| 23-18 | IntEpnOut | An interrupt has occurred on one of the interrupts in IntStatusEpnOut status register. Bits 23 downto 18 correspond to n = 7, 5, 4, 2, 1, 0. |
| 30-24 | IntEpnIn | An interrupt has occurred on one of the interrupts in IntStatusEpnIn status register. Bits 30 downto 24 correspond to n = 6 downto 0. |
| 31 | reserved | |

TABLE 55

IntStatusEpnOut interrupts, where n is 0, 1, 2, 4, 5, 7

| Bit number | Interrupt Name | Description |
|---|---|---|
| 0 | IntEpnOutHwDoneA | This interrupt is triggered when the HW is finished with DMA Descriptor A on Epn OUT. |
| 1 | IntEpnOutAdrA | Triggers when EPn OUT DMA buffer address pointer, DmaOutnCurAdrA, reaches or passes the pre-specified address, DmaOutnIntAdrA. |
| 2 | IntEpnOutPktWrA | This interrupt is generated when an Epn OUT packet has been successfully written out to DRAM, using DMA Descriptor A. |
| 3 | IntEpnOutShortWrA | This interrupt is generated when a short Epn OUT packet is successfully written to DRAM or when a zero length packet has been received for Epn, using DMA Descriptor A. This indicates the end of an OUT IRP transfer. |
| 4 | IntEpnOutHwDoneB | This interrupt is triggered when the HW is finished with DMA Descriptor B on Epn OUT. |
| 5 | IntEpnOutAdrB | Triggers when EPn OUT DMA buffer address pointer, DmaOutnCurAdrB, reaches or passes the pre-specified address, DmaOutnIntAdrB. |
| 6 | IntEpnOutPktWrB | This interrupt is generated when an Epn OUT packet has been successfully written out to DRAM, using DMA Descriptor B. |

TABLE 55-continued

IntStatusEpnOut interrupts, where n is 0, 1, 2, 4, 5, 7

| Bit number | Interrupt Name | Description |
|---|---|---|
| 7 | IntEpnOutShortWrB | This interrupt is generated when a short Epn OUT packet is successfully written to DRAM or when a zero length packet has been received for Epn, using DMA Descriptor B. This indicates the end of an OUT IRP transfer. |
| 8 | IntEpnOutNak | This interrupt indicates that an OUT packet was NAK'd for endpoint n because there was no valid DMA Descriptor. |
| 31-9 | reserved | |

TABLE 56

IntStatusEpnIn interrupts, where n is 0 to 6

| Bit number | Interrupt Name | Description |
|---|---|---|
| 0 | IntEpnInHwDoneA | This interrupt is triggered when the HW is finished with DMA Descriptor A on Epn IN. |
| 1 | IntEpnInAdrA | Triggers when EPn IN DMA buffer address pointer, DmaInnCurAdrA, reaches the pre-specified address, DmaInnIntAdrA. |
| 2 | IntEpnInHwDoneB | This interrupt is triggered when the HW is finished with DMA Descriptor B on Epn IN. |
| 3 | IntEpnInAdrB | Triggers when EPn IN DMA buffer address pointer, DmaInnCurAdrB, reaches the pre-specified address, DmaInnIntAdrB. |
| 4 | IntEpnInNak | This interrupt indicates that an IN packet was NAK'd for endpoint n because there was no valid DMA Descriptor. |
| 31-5 | reserved | |

There are two levels of interrupts in the UDU. IntStatus is at the higher level and IntStatusEpnOut and IntStatusEpnIn are at the lower level. Each interrupt can be individually enabled/disabled by setting/clearing the equivalent bit in the IntMask, IntMaskEpnOut and IntMaskEpnIn configuration registers. Note that the lower level interrupts must be enabled both at the lower level and the higher level. The interrupt may be cleared by writing a '1' to the equivalent bit position in the IntClear, IntClearEpnOut or IntClearEpnIn register. However, a lower level interrupt may not be cleared by writing a '1' to IntClear. IntClear can only be used to clear IntStatus[17:0]. IntClearEpnOut and IntClearEpnIn are used to clear the lower level interrupts. The pseudocode below describes the interrupt operation.

```
// Sequential Section
// Clear the high level interrupt if a '1' is written to equivalent bit in
IntClear
if ConfigWrIntClear == 1 then
   for n in 0 to HighInts−1 loop
      if cpu_data[n] == 1 then
         IntStatus[n] = 0
      end if
   end for
end if
// Clear the low level interrupt if a '1' is written to equivalent bit in
```

-continued

```
// IntClearEpnOut or IntClearEpnIn
for n in 1 to MaxOutEps−1 loop
   if ConfigWrIntClearEpnOut == 1 then
      for i in 0 to LowOutInts−1 loop
         if cpu_data[i] == 1 then
            IntStatusEpnOut[i] = 0
         end if
      end for
   end if
end for
for n in 1 to MaxInEps−1 loop
   if ConfigWrIntClearEpnIn == 1 then
      for i in 0 to LowInInts−1 loop
         if cpu_data[i] == 1 then
            IntStatusEpnIn[i] = 0
         end if
      end for
   end if
end for
// The setting of a new interrupt has priority over clearing the interrupt
for n in 0 to HighInts−1 loop
   if IntHighEvent[n] == 1 then // IntHighEvent may only occur for 1 clk
cycle,
      IntStatus[n] = 1
   end if
end for
for n in 0 to MaxOutEps−1 loop
   for i in 0 to LowOutInts−1 loop
```

-continued

```
      if IntEpnOutEvent[i] == 1 then
         IntEpnOutStatus[i] = 1
      end if
   end for
end for
for n in 0 to MaxInEps-1 loop
   for i in 0 to LowInInts-1 loop
      if IntEpnInEvent[i] == 1 then
         IntEpnInStatus[i] = 1
      end if
   end for
end for
// store the interrupt
irq_d1 = irq
// Combinatorial section
// OR the result of bitwise AND of IntMask/IntStatus,
// IntEpnOutMask/IntEpnInStatus, IntEpnInMask/IntEpnInStatus
for n in 0 to MaxOutEps-1 loop
   IntEpnOut = 0
   for i in 0 to LowOutInts-1 loop
      IntEpnOut = (IntEpnOutMask[i] & IntEpnOutStatus[i]) OR
      IntEpnOut
   end for
end for
for n in 0 to MaxInEps-1 loop
```

-continued

```
   IntEpnIn = 0
   for i in 0 to LowInInts-1 loop
      IntEpnIn = (IntEpnInMask[i] & IntEpnInStatus[i]) OR IntEpnIn
   end for
end for
irq = 0
for n in 0 to HighInts-1 loop
   irq = (IntMask[n] & IntStatus[n]) OR irq
end for
for n in 0 to MaxOutEps-1 loop
   irq = irq OR IntEpnOut
end for
for n in 0 to MaxInEps-1 loop
   irq = irq OR IntEpnIn
end for
// The ICU expects to receive an edge detected interrupt
udu_icu_irq = irq AND !(irq_d1)
```

13.5.7 Standard USB Commands

Table 57 below lists the USB commands supported.

TABLE 57

| Command | Direction | Supported |
|---|---|---|
| | Setup commands supported | |
| | Standard Device Requests | |
| CLEAR_FEATURE | OUT | Taken care of by UDC20, not seen by the application |
| GET_CONFIGURATION | IN | Taken care of by UDC20, not seen by the application |
| GET_DESCRIPTOR | IN | Passed to the application via the Endpoint 0 OUT buffer |
| GET_INTERFACE | IN | Taken care of by UDC20, not seen by the application |
| GET_STATUS | IN | Taken care of by UDC20, not seen by the application |
| SET_ADDRESS | OUT | Taken care of by UDC20, not seen by the application |
| SET_CONFIGURATION | OUT | Passed to the application via an interrupt which must be acknowledged (IntSetCsrsCfg). |
| SET_DESCRIPTOR | OUT | Passed to the application via the Endpoint 0 OUT buffer |
| SET_FEATURE | OUT | Taken care of by UDC20, not seen by the application |
| SET_INTERFACE | OUT | Passed to the application via an interrupt which must be acknowledged (IntSetCsrsIntf). |
| SYNCH_FRAME | OUT | This request is not supported. The UDU will respond to this request with a STALL for each Endpoint, since there are no Isochronous Endpoints. This request will not be seen by the application. |
| | Non standard Device Requests | |
| Class/vendor commands | IN/OUT | Passed to the application via the Endpoint 0 OUT buffer |

When a command is taken care of by UDC20, there is no indication of this request to the rest of the UDU, except USB reset, USB suspend, connection/enumeration as high speed or full speed, SetConfiguration and SetInterface. USB reset and USB suspend are described in Section 13.5.13 and Section 13.5.14 respectively. The bus enumeration is described in Section 13.5.17. The SetConfiguration/SetInterface commands are described in Section 13.5.19.

When a control Setup command is not passed on to the application for processing, then neither are the Data or Status stages.

13.5.8 UDC20 Top Level I/O

Table 58 below lists the top level pinout of the UDC20

TABLE 58

UDC20 I/O

| Port name | Pins | I/O | Description |
|---|---|---|---|
| | | | Clocks and Resets |
| app_clk | 1 | In | Application clock. Must be >=48 MHz to operate at high speed. Connected to pclk, 192 MHz. |
| rst_appclk | 1 | In | Application reset signal. Synchronous to app_clk. Active high. |
| phy_clk | 1 | In | 30 MHz clock for UTMI interface, generated in PHY. This is asynchronous to app_clk (pclk). |
| rst_phyclk | 1 | In | Reset in phy_clk domain from CPR block. Synchronous to phy_clk. Active high. |
| | | | UTMI transmit signals |
| phy_txready | 1 | In | An acknowledgement from the PHY of data transfer from UDU. |
| udc20_txvalid | 1 | Out | Indicates to the PHY that data data_io[7:0] is valid for transfer. |
| udc20_txvalidh | 1 | Out | Indicates to the PHY that data data_io[15:8] is valid for transfer. |
| data_io[15:0] | 16 | Out | Data to be transmitted to the USB bus. |
| | | | UTMI receive signals |
| phy_rxvalid | 1 | In | Indicates that there is valid data on the data_i[7:0] bus. |
| phy_rxvalidh | 1 | In | Indicates that there is valid data on the data_i[15:8] bus. |
| phy_rxactive | 1 | In | Indicates that the PHY's receive state machine has detected SYNC and is active. |
| phy_rxerr | 1 | In | Indicates that a receive error has been detected. Active high. |
| data_i [15:0] | 16 | In | Data received from the USB bus. |
| | | | UTMI control signals |
| udc20_xver_sel | 1 | Out | Transceiver select<br>0: HS transceiver enabled<br>1: FS transceiver enabled |
| udc20_phymode[1:0] | 2 | Out | Select between operational modes<br>00: Normal operation<br>01: Non-driving<br>10: Disables bit stuffing & NRZI coding<br>11: reserved |
| phy_line_state[1:0] | 2 | In | The current state of the D+ D− receivers<br>00: SE0<br>01: J State<br>10: K State<br>11: SE1 |
| udc20_opmode[1:0] | 2 | Out | Select between LS, FS & HS termination.<br>00: HS termination enabled<br>01: FS termination enabled<br>10: FS termination enabled<br>11: LS termination enabled |
| | | | VCI Master Interface |
| udc20_cmdvalid | 1 | Out | This indicates that the VCI command is valid. |
| udc20_addr[15:0] | 16 | Out | The address pointer for the current data transfer. |
| udc20_data[31:0] | 32 | Out | The write data for the transaction. |
| udc20_ben[3:0] | 4 | Out | The byte enable for udc20_data[31:0]. |
| udc20_rnw | 1 | Out | Indicates whether the current transaction is a read or write. If the signal is high, the transaction is a read. If the signal is low, the transaction is a write. |
| udc20_burst | 1 | Out | Indicates that the current transaction is a burst transaction. |
| app_ack | 1 | In | Acknowledge from the application. |
| app_err | 1 | In | Issued by the application instead of app_ack to indicate various responses depending on the transaction, e.g. to indicate that the data cannot be accepted yet. |

TABLE 58-continued

| Port name | Pins | I/O | Description |
|---|---|---|---|
| | | | UDC20 I/O |
| app_abort | 1 | In | Issued by the application instead of app_ack to abort the transfer. |
| app_data[31:0] | 1 | In | Read data for the transaction. |
| app_databen[3:0] | 1 | In | The byte enable for app_data[31:0]. |
| | | | VCI Slave Interface |
| app_csrcmdvalid | 1 | In | This indicates that the VCI command is valid. |
| app_csraddr[15:0] | 16 | In | The address pointer for the current data transfer. |
| app_csrdata[31:0] | 32 | In | The write data for the transaction. |
| app_csrrnw | 1 | In | Indicates whether the current transaction is a read or write. If the signal is high, the transaction is a read. If the signal is low, the transaction is a write. |
| app_csrburst | 1 | In | Indicates that the current transaction is a burst transaction. This must always be kept low. |
| udc20_csrack | 1 | Out | Acknowledge from the udc20. |
| udc20_csrerr | 1 | Out | This indicates an error due to app_csrburst being set high. |
| udc20_csrabort | 1 | Out | This is never asserted. |
| udc20_csrdata[31:0] | 32 | Out | Read data for the transaction. |
| | | | EEPROM Interface (not used) |
| udc20_eepdi | 1 | Out | The data signal input to the EEPROM. |
| udc20_eepsk | 1 | Out | Low speed clock to EEPROM. |
| udc20_eepcs | 1 | Out | Chip select to enable the EEPROM. |
| eep_do | 1 | In | The data from EEPROM. |
| | | | Strap signals |
| app_phy_8bit | 1 | In | The data width of the UTMI interface. |
| app_ram_if | 1 | In | Incremental address support. |
| app_setdesc_sup | 1 | In | Set Descriptor command support. |
| app_synccmd_sup | 1 | In | Synch Frame command support. |
| app_csrprg_sup | 1 | In | Dynamic CSR update support. |
| app_dev_rmtwkup | 1 | In | Device Remote Wakeup capable. |
| app_self_pwr | 1 | In | Self-power capable device. |
| app_exp_speed[1:0] | 2 | In | Expected USB speed. |
| app_utmi_dir | 1 | In | Selects either unidirectional or bidirectional UTMI data bus interface. |
| app_nz_len_pkt_stall | 1 | In | Response of application to non zero length packet during StatusOut phase of control transfer. |
| app_nz_len_pkt_stall_all | 1 | In | Response of application to non zero length packet during StatusOut phase of control transfer. |
| app_stall_clr_ep0_halt | 1 | In | Respond to a ClearFeature(Halt, EP0) with a STALL. |
| hs_timeout_calib[2:0] | 3 | In | High speed timeout calibration |
| fs_timeout_calib[2:0] | 3 | In | Full speed timeout calibration |
| app_enable_erratic_err | 1 | In | Enable erratic error. |
| app_dev_discon | 1 | In | Device disconnect. |
| | | | Sideband signals |
| udc20_cfg[3:0] | 4 | Out | Current Configuration the UDC20 is running. |
| udc20_intf[3:0] | 4 | Out | The current interface that is being switched to an alternate setting. |
| udc20_altintf[3:0] | 4 | Out | The current alternate interface number to change to. |
| udc20_hst_setcfg | 1 | Out | Signal for sampling udc20_cfg. |
| udc20_hst_setintf | 1 | Out | Signal for sampling udc20_intf and udc20_altintf. |
| udc20_setup | 1 | Out | Indicates that the current VCI master transaction is a setup write. |
| udc20_set_csrs | 1 | Out | Indicates that the SetConfiguration/SetInterface command was issued. |
| | | | Programmable Control signals |
| app_resume | 1 | In | Resume signal from the application. |
| app_stall | 1 | In | Signal from application to stall the current endpoint. |
| app_done_csrs | 1 | In | Signal from application to ACK the current SetConfiguration/SetInterface command. |
| | | | Event Notification signals |
| udc20_early_suspend | 1 | Out | Indicates that the USB bus has been idle for 3 ms. |
| udc20_suspend | 1 | Out | Indicates that the host has issued a Suspend command. |
| udc20_usbreset | 1 | Out | Indicates that the host has issued a Reset command. |
| udc20_sof | 1 | Out | Start of Frame. |
| udc20_timestamp[10:0] | 11 | Out | The SOF frame number. |
| udc20_enumon | 1 | Out | Device is being enumerated. |
| udc20_enum_speed[1:0] | 2 | Out | Indicates the speed the device is running at. |

TABLE 58-continued

| UDC20 I/O | | | |
|---|---|---|---|
| Port name | Pins | I/O | Description |
| udc20__erratic__err | 1 | Out | Indicates that phy__rxactive and phy__rxvalid are continuously asserted for 2 ms due to a PHY error. |

13.5.9 VCI Master Interface

All of the endpoint data flow through the UDU occurs over the UDC20 VCI master interface. The OUT & SETUP endpoint packet transfers occur as writes, followed later by a status write. The IN endpoint packet transfers occur as reads, followed later by a status write.

Table 59 below describes how the VCI addresses are decoded.

TABLE 59

| VCI master port addresses | | |
|---|---|---|
| Command | Direction | Description |
| | Control type transactions | |
| 0x0000 | write | Status |
| 0x0004 | write | Ping |
| 0x0555 | read/write | Setup/Cmd (i.e. endpoint 0) |
| | Endpoint data transactions | |
| 0xnnnn | read/write | Bits 15-12: Configuration[3:0]<br>Bits 11-8: Interface[3:0]<br>Bits 7-4: Alternate Interface[3:0]<br>Bits 3-0: Endpoint[3:0] (except EP0) |

A status write indicates whether the SETUP, IN or OUT packet was transmitted and received successfully. It indicates the response received from the host after sending an IN packet (an ACK or timeout). It indicates whether a SETUP/OUT packet was received without CRC, bitstuff, protocol errors etc. Table 60 describes how the data bits of the status write is decoded.

TABLE 60

| Status write data | |
|---|---|
| Field | Description |
| 3:0 | Endpoint number which the status is addressing |
| 7:4 | Data PID received in the previous out data packet. This is not relevant to this device, as it is only useful for isochronous transfers. |
| 29:8 | Reserved |
| 30 | Setup transfer bit. If this bit is set to ‘1’, it indicates the current data transfer is a Setup transfer. |
| 31 | Successful transfer status bit. If this bit is set to ‘1’, it indicates a successful transaction. If set to ‘0’, it indicates an unsuccessful transaction, which may be due to a NAK, STALL, timeout, CRC error, etc. |

13.5.9.1 Control Transfers

Control transfers consist of Setup, Data and Status stages. These stages are tracked by the Control Transfer State Machine with states: Idle, Setup, DataIn, DataOut, StatusIn, StatusOut. The output signal from the UDC20 udc20_setup indicates that the current transaction on the VCI bus is a Setup transaction. The next transaction (Data) is either a read or write, depending on whether the transaction is Control-In or a Control-Out. The final transaction (Status) always involves a change of direction of data flow from the Data stage. If a new control transfer is started before the current one has completed, i.e. a new Setup command is received, the current transfer is aborted. But new transfers to other endpoints may occur before the control transfer has completed.

Table 61 below describes the formats of control transfers.

TABLE 61

| Stages of Control Transfers | | | |
|---|---|---|---|
| Transactions | | | State |
| Token | Data | Handshake | Machine |
| | A Control in transfer | | |
| Host SETUP | Host 8 bytes of setup data | Device ACK/None | Setup |
| Host IN | Device Control-In data/NAK/STALL/none | Host ACK/None | DataIn |
| Host OUT | Host Zero length data/Variable length data | Device ACK/STALL/NAK/none | StatusOut |
| | A Control Out transfer | | |
| Host SETUP | Host 8 bytes of setup data | Device ACK/None | Setup |
| Host OUT | Host Control-Out data | Device ACK/STALL/NAK/none | DataOut |
| Host IN | Device Zero length data/NAK/STALL/none | Host ACK/none | StatusIn |

Figure 38:
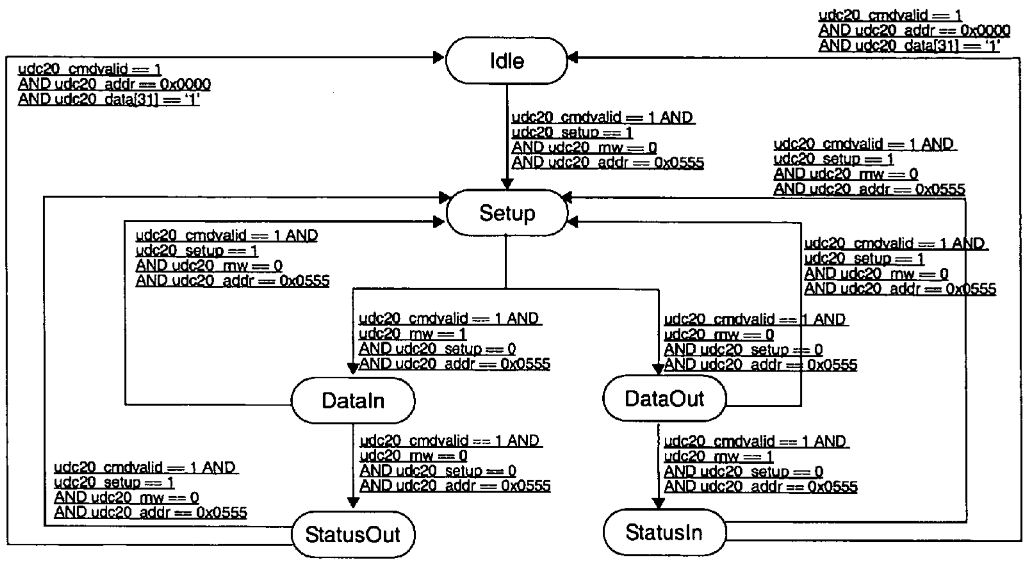
FIG. 38. Overview of Control Transfer State Machine

FIG. 38 below gives an overview of the control transfer state machine. The current state is given in the configuration register ControlState.

13.5.9.1.1 Control IN Transfers

A control IN transfer is initiated when 8 bytes of Setup data are written out to the SetupCmd address 0×0555 on the VCI master port. An exception to this is when the command is taken care of by the UDC20, as described in Table 57. These 8 bytes of Setup data are written into the local packet buffer designated for EP0 OUT packets. Note that the Setup data must be accepted by the UDU, and a NAK or STALL is not a legal response.

The setup data is written out to the EP0 OUT circular buffer in DRAM.

The next transaction on the VCI port is a status write. If udc20_data[31]=‘1’ this indicates a successful transaction and the DMA pointers are updated and IntEp0OutAdrA/B interrupt may be generated. If udc20_data[30]=‘1’, this indicates that the current data transaction is 8 bytes of setup data, as opposed to Control-Out data.

An interrupt is generated on IntSetupWr once the 8 bytes of setup data have been written out to DRAM. If there isn't a valid DMA descriptor, the setup data cannot be written out to DRAM, and an interrupt is generated on IntSetupWrErr. The setup data remains in the local packet buffer until a valid DMA descriptor is provided.

Figure 39:
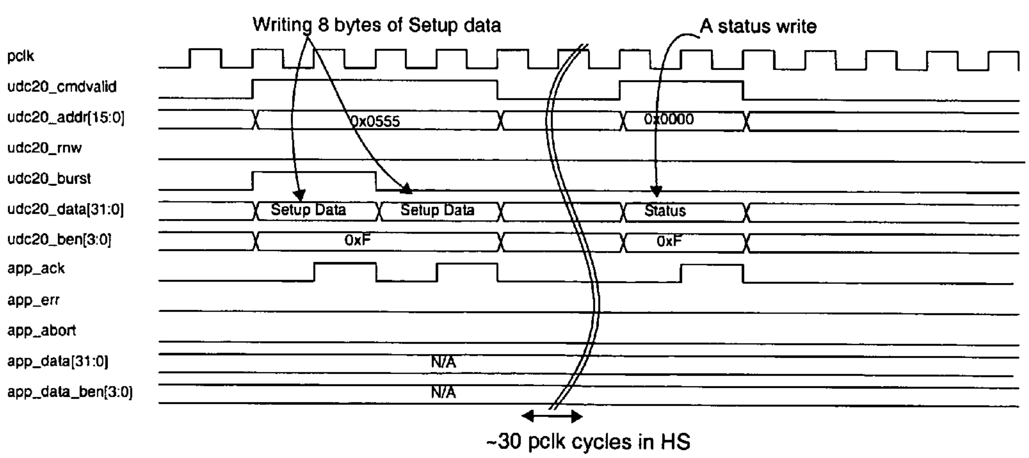
FIG. 39. Writing a Setup packet at the start of a Control-In transfer

FIG. 39 below shows a Setup write.

The next stage of a Control-In transfer is the Data stage, where data is transferred out to the USB host. The data should already have been loaded into the local EP0 IN packet buffer. The transfer is initiated when the VCI master port starts a read transfer on SetupCmd address 0×0555.

If the local packet buffer contains a full packet of bMaxPktSize0, the data is read out on to the VCI bus and app_ack is asserted as each word is read.

If there is a short packet, the UDU completes the transfer by asserting app_err on the last read. Or if the last read contains less than 4 bytes, the relevant byte enables are kept low, and app_ack is asserted as usual. The UDU assumes there is a short packet if there is no more data available in DRAM, i.e. DmaIn0MaxAdrA/B has been reached.

If the local packet buffer is empty and there is no data available in DRAM, and the last packet sent from the endpoint was bMaxPktSize0, and the current DMA descriptor's SendZero register is set to '1', then a zero length data packet is sent by asserting app_err instead of app_ack. This indicates to the USB host the end of the transfer.

If the local packet buffer is empty and there is no valid DMA descriptor available, then the UDU issues a NAK and generates an interrupt on IntEp0InNak.

If the endpoint's packet buffer does not contain a complete packet but there is data available in DRAM, the UDU responds with a NAK by delaying app_ack by one cycle during the first read. An interrupt is generated on IntEp0InNak.

Figure 40:
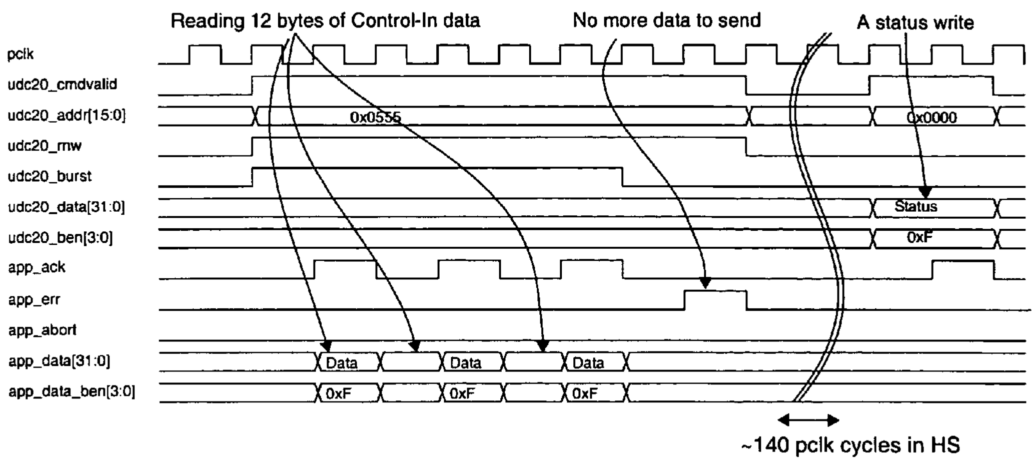
FIG. 40. Reading Control-In data

FIG. 40 below shows the VCI transactions during this stage.

At the end of the Data stage, a status write will be issued by the UDC20 to indicate whether the transaction was successful. If the transaction was not successful, the IN data is kept in the local buffer and the USB host is expected to retry the transaction. If the transaction was successful, the IN data is flushed from the local buffer.

There may be more than one data transaction in the Data stage, if the amount of data to be sent is greater than bMaxPktSize0. Any extra data packets are transferred in a similar manner to the one described above.

The third stage is the Status stage, when the USB host sends an OUT token to the device. The UDC20 does a VCI write cycle on SetupCmd address 0x0555. If the host sends a zero length data packet, the byte enables will all be zero and an interrupt is generated on IntStatusOut. The UDU's response to this status request depends on the configuration register StatusOutResponse. If "01" has been written to this register, the UDU will ACK the status transfer, by asserting app_ack. If "10" has been written to this register, the UDU respond to the Status request with a STALL, by asserting app_stall. If the configuration register StatusOutResponse has not yet been written to, its contents will contain "00", and the UDU will respond to the Status request with a NAK, by delaying the app_ack response to the write cycle.

If the host sends a non zero length data packet, the interrupt IntNzStatusOut will be generated. The UDU's response to this depends on how the configuration register StatusOutResponse is programmed, which is described in Table 53. There are four options:

a. the response is a NAK and the data (if present) is discarded
b. the response is an ACK and the data (if present) is discarded
c. the response is an ACK and the data (if present) is transferred to local packet buffer
d. the response is a STALL and the data (if present) is discarded If non zero length StatusOut data has been received into the local packet buffer, this data is transferred to EP0's OUT buffer in DRAM.

At the end of the Status stage, a status write is issued by the UDC20 to indicate whether the transfer was successful. If the transfer was successful, the configuration register StatusOutResponse is cleared by the UDU. If data was received during the StatusOut stage, it is transferred to EP0 OUT's buffer in DRAM. One or more interrupt may be generated on IntEp0OutPktWrA/B, IntEp0OutShortWrA/B, IntEp0OutAdrA/B.

Figure 41:
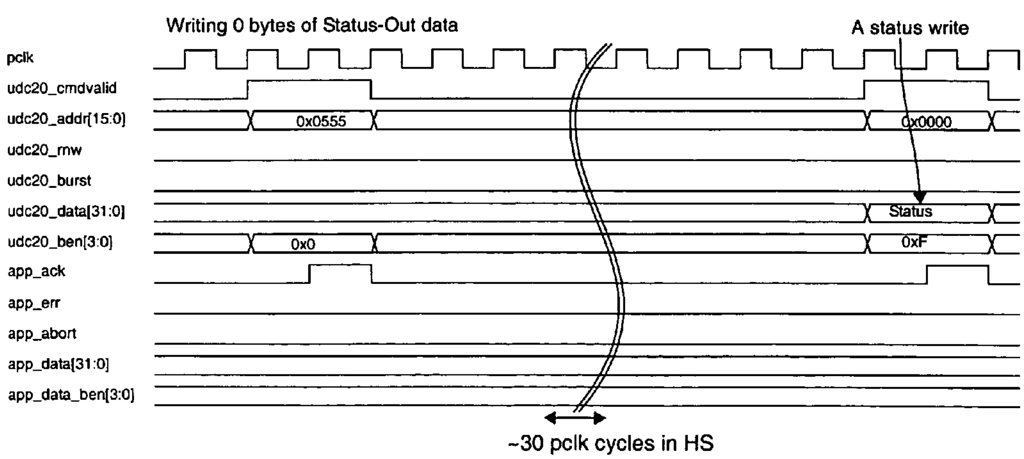
FIG. 41. Status stage of Control-In transfer

FIG. 41 below shows the normal operation of the Status stage.

13.5.9.1.2 Control OUT Transfers

A Control-Out transfer begins when 8 bytes of Setup data are written out to the SetupCmd address 0x0555. The behaviour at the Setup stage is exactly the same for Control-Out transactions as for Control-In, described in Section 13.5.9.1.1 above.

During the Data stage, writes are initiated on the VCI master port to the SetupCmd address 0×0555. The PING protocol must be adhered to in high speed. The following describes the different scenarios:

Full speed (streaming mode only)

If the local packet buffer is empty and there is at least enough space in DRAM for a bMaxPktSize0 packet, then the UDU accepts the data. The UDU ACKs the transfer by asserting app_ack.

If there is no valid DMA descriptor for the endpoint, the UDU responds with a NAK by asserting app_err. An interrupt is generated on IntEp0OutNak.

If the local packet buffer is not empty, the UDU responds with a NAK by asserting app_err instead of app_ack for the first write. An interrupt is generated on IntBufOverrun.

High speed (streaming and non-streaming modes)

If the local packet buffer is empty and there is at least enough space in DRAM for two bMaxPktSize0 packets, then the UDU accepts the data. The UDU ACKs the transfer by asserting app_ack.

If the local packet buffer is empty and there is at least enough space in DRAM for one bMaxPktSize0 packet, then the UDU accepts the data and NYETs the transfer by delaying app_ack by one cycle on the first write.

If there is no valid DMA descriptor, the UDU responds with a NAK by asserting app_err. An interrupt is generated on IntEp0OutNak.

In streaming mode, if the local packet buffer is not empty, and there is a valid DMA descriptor, the UDU responds with a NAK by asserting app_err instead of app_ack for the next write. An interrupt is generated on IntBufOverrun.

In non-streaming mode, if the local packet buffer is not empty, and there is a valid DMA descriptor, the UDU responds with a NAK by asserting app_err instead of app_ack for the first write. An interrupt is generated on IntEp0OutNak.

PING tokens (high speed only, streaming and non-streaming modes)

If the local packet buffer is empty and there is at least enough space in DRAM for one bMaxPktSize0 packet, the UDU responds with an ACK by asserting app_ack.

If there is no valid DMA descriptor for the endpoint, the UDU responds with a NAK by asserting app_err. An interrupt is generated on IntEp0OutNak.

In streaming mode, if the local packet buffer is not empty, the UDU responds with a NAK by asserting app_err. An interrupt is generated on IntBufOverrun.

In non-streaming mode, if the local packet buffer is not empty, the UDU responds with a NAK by asserting app_err. An interrupt is generated on IntEp0OutNak.

A status write indicates whether the transfer was successful or not. If the transfer was successful, an interrupt is generated on IntEp0OutPktWrA/B. If it was a short or zero length packet, an interrupt is also generated on IntEp0OutShortWrA/B. The DMA controller updates its address pointer, DmaOutOCurAdrA/B, and may generate an interrupt on IntEp0OutAdrA/B. If the transfer was unsuccessful, the DMA controller rewinds DmaOutStrmPtr and discards any remaining data in the local packet buffer.

Figure 42:
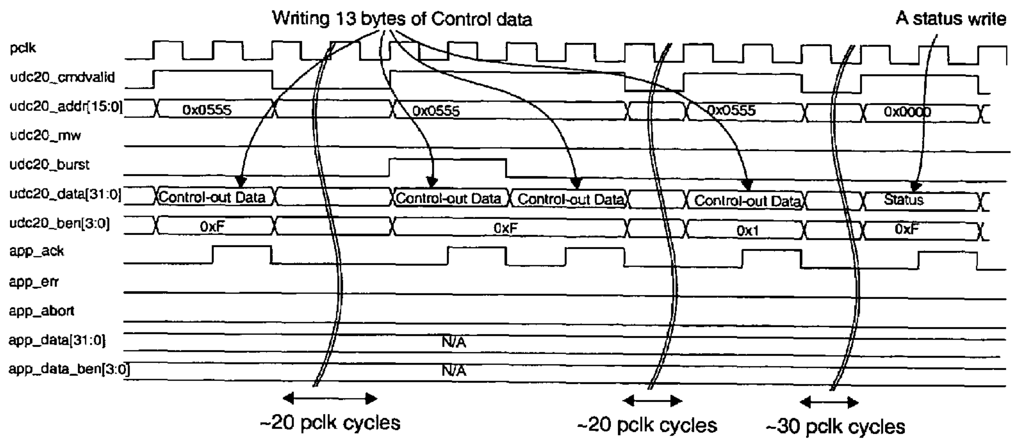
FIG. 42. Writing Control-Out data

There may be zero or more data transactions during the Data stage of a Control-Out transfer. FIG. 42 below shows a typical Data stage of a Control-Out transfer in high speed.

The Status stage of a Control-Out transfer occurs when the USB host sends an IN token to the device. The UDC20 initiates a read transaction from SetupCmd address 0×0555 and an interrupt is generated on IntStatusIn. The value programmed in the configuration register StatusInResponse is used to issue the response to the status request.

If "01" is written to this register, this indicates that the Control-Out data has been processed. The VCI port's app_err signal is asserted, which causes the UDC20 to send a zero-length data packet to the host, to indicate an ACK.

If this register contains "00", this indicates that the Control-Out data has not yet been processed. The VCI handshake signal app_ack is delayed by one cycle, which has the effect of NAKing the StatusIn token. Typically, the USB host will keep trying to receive StatusIn until it receives a non NAK handshake.

If the StatusInResponse register contains "10", this indicates that the application is unable to process the control request. The VCI port's app_stall signal is asserted which causes a STALL handshake to be returned to the USB host.

Figure 43:
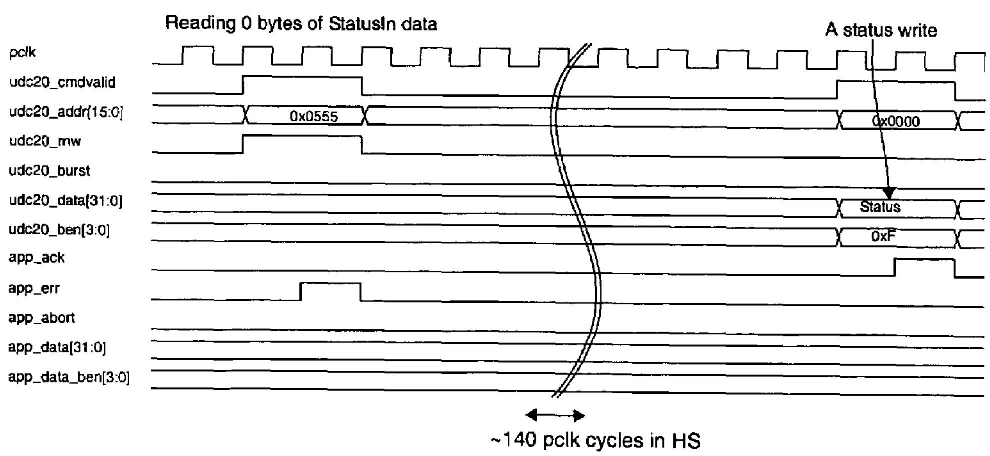
FIG. 43. Reading Status In data during a Control-Out transfer
Figure 44:
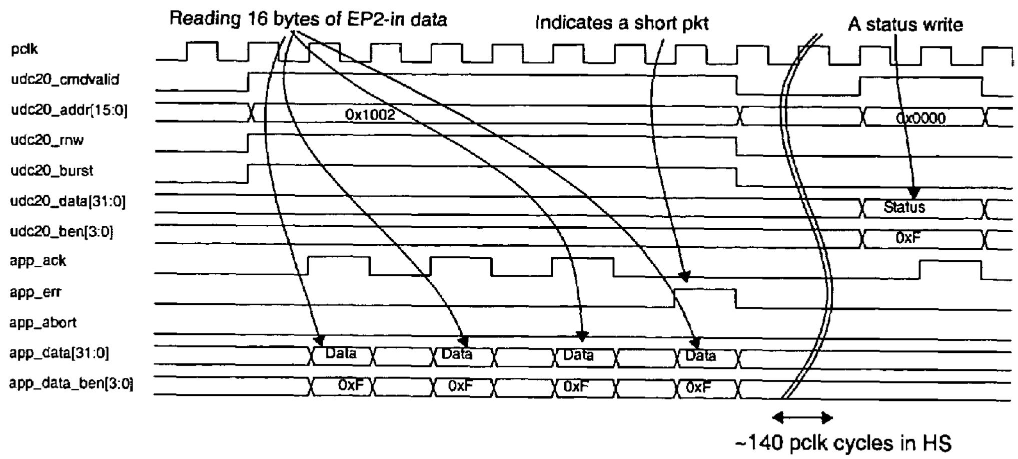
FIG. 44. Reading bulk/interrupt IN data

The UDC20 then initiates a status write to address 0x0000 to indicate if the packet has been transferred correctly. If the transfer was successful, the StatusInResponse register is cleared. If the transfer was unsuccessful, the Status transfer will be retried by the USB host. FIG. 43 below illustrates a normal StatusIn stage.

13.5.9.2 Non Control Transfers 13.5.9.2.1 Bulk/Interrupt IN Transfers

A bulk/interrupt IN transfer is initiated with a read from an endpoint address on the VCI master port. The UDU can respond to the IN request with an ACK, NAK or STALL. Data must be pre-fetched from DRAM into the local packet buffer. The local packet buffer is flagged as full if it contains 64 bytes or if it contains less than 64 bytes but there is no more endpoint data available in DRAM or it contains less than 64 bytes but it's a full packet. The options are listed below.

Streaming mode

If the endpoint's local packet buffer is flagged as full, the data is read out on to the VCI bus and app_ack is asserted as each word is read.

If the endpoint's local packet buffer is not flagged as full, and there is some data available in DRAM, the IN request is NAK'd by delaying app_ack by one cycle during the first read. An interrupt is generated on IntEpnInNak.

If the packet buffer empties in the middle of reading out a packet, then the UDU responds to the next read request with app_abort instead of app_ack. The UDC20 generates a CRC 16 and bit stuffing error. The host is expected to retry reading the packet later. An interrupt is generated on IntBufUnderrun.

If there is a short packet, the UDU completes the transfer by asserting app_err on the last read. Or if the last read contains less than 4 bytes, the relevant byte enables are kept low, and app_ack is asserted as usual. The UDU assumes there is a short packet if there is no more data available in DRAM, i.e. DmaInnMaxAdrA/B has been reached.

If the local packet buffer is empty and there is no data available in DRAM, and the last packet sent from the endpoint was wMaxPktSize, and the current DMA descriptor's SendZero register is set to '1', then a zero length data packet is sent by asserting app_err instead of app_ack. This indicates to the USB host the end of the transfer.

If the local packet buffer is empty and there is no valid DMA descriptor available, then the UDU issues a NAK and generates an interrupt on IntEpnInNak.

Non-streaming mode

If the local packet buffer is full, the data is read out on to the VCI bus and app_ack is asserted as each word is read.

If the local packet buffer is empty and there is no data available in DRAM, and the last packet sent from the endpoint was wMaxPktSize, and the current DMA descriptor's SendZero register is set to '1', then a zero length data packet is sent by asserting app_err instead of app_ack. This indicates to the USB host the end of the transfer.

If the local packet buffer is empty and there is no valid DMA descriptor available, then the UDU issues a NAK and generates an interrupt on IntEpnInNak.

If the endpoint's packet buffer is not full but there is data available in DRAM, the UDU responds with a NAK by delaying app_ack by one cycle during the first read. An interrupt is generated on IntEpnInNak.

All modes

If the endpoint is stalled, due to the relevant bit in EpStall being set, the UDU responds with a STALL by asserting app_abort instead of app_ack during the first read.

After the IN packet has been transferred, the host acknowledges with an ACK or timeout (no response). This response is presented to the UDU as a status write, as detailed in Section 13.5.9 above. The options are listed below.

Non-streaming mode

If the packet was transferred successfully the packet is flushed from the local buffer.

If the packet was not transferred successfully, the packet remains in the local buffer.

Streaming mode

If the packet was transferred successfully, the DmaInnCurAdrA/B register is updated to DmaInnStrmPtr. If the DmaInnIntAdrA/B address has been reached or overtaken, an interrupt is generated on IntEpnInAdrA/B.

If the packet was not transferred successfully, DmaInnStrmPtr is returned to the value in DmaInnCurAdrA/B.

13.5.9.2.2 Bulk OUT Transfers

A bulk OUT transfer begins with a write to an endpoint address on the VCI master port. The data is accepted and written into the local packet buffer if there is sufficient space available in both the local buffer and the endpoint's buffer in DRAM. The UDU can respond to an OUT packet with an ACK, NAK, NYET or STALL. In high speed mode, the UDU can respond to a PING with an ACK or NAK. The following list describes the different options.

Streaming mode, full speed

If the local packet buffer is empty and there is at least enough space in DRAM for a wMaxPktSize packet, then the UDU accepts the data. The UDU ACKs the transfer by asserting app_ack.

If there is no valid DMA descriptor for the endpoint, the UDU responds with a NAK by asserting app_err. An interrupt is generated on IntEpnOutNak.

If the local packet buffer is not empty, and there is a valid DMA descriptor, the UDU responds with a NAK by asserting app_err instead of app_ack for the next write. An interrupt is generated on IntBufOverrun.

Streaming mode, high speed

If the local packet buffer is empty and there is at least enough space in DRAM for two wMaxPktSize packets, then the UDU accepts the data. The UDU ACKs the transfer by asserting app_ack.

If the local packet buffer is empty and there is at least enough space in DRAM for one wMaxPktSize packet, then the UDU accepts the data and NYETs the transfer by delaying app_ack by one cycle on the first write.

If there is no valid DMA descriptor, the UDU responds with a NAK by asserting app_err. An interrupt is generated on IntEpnOutNak.

If the local packet buffer is not empty, and there is a valid DMA descriptor, the UDU responds with a NAK by asserting app_err instead of app_ack for the next write. An interrupt is generated on IntBufOverrun.

Non-streaming mode (high speed only)

If the local packet buffer is empty, and there is at least enough space in DRAM for one wMaxPktSize packet, the UDU accepts the data and responds with a NYET by delaying app_ack by one cycle on the first write.

If there is no valid DMA descriptor, the UDU responds with a NAK by asserting app_err. An interrupt is generated on IntEpnOutNak.

If the local packet buffer is not empty, and there is a valid DMA descriptor, the UDU responds with a NAK by asserting app_err instead of app_ack for the next write. An interrupt is generated on IntEpnOutNak.

The UDU never ACKs an OUT packet in non-streaming mode.

All modes

If the endpoint is stalled, due to the relevant bit in EpStall being set, the UDU responds to an OUT with a STALL by asserting app_abort instead of app_ack.

PING tokens, streaming and non-streaming modes (high speed only)

If the local packet buffer is empty and there is at least enough space in DRAM for one wMaxPktSize packet, the UDU responds with an ACK by asserting app_ack.

If there is no valid DMA descriptor for the endpoint, the UDU responds with a NAK by asserting app_err. An interrupt is generated on IntEpnOutNak.

In streaming mode, if the local packet buffer is not empty, the UDU responds with a NAK by asserting app_err. An interrupt is generated on IntBufOverrun.

In non-streaming mode, if the local packet buffer is not empty, the UDU responds with a NAK by asserting app_err. An interrupt is generated on IntEpnOutNak.

If the endpoint is stalled, due to the relevant bit in EpStall being set, the UDU responds with a NAK by asserting app_err instead of app_ack.

When the packet has been written, the UDC20 issues a status write to indicate whether there were any protocol errors in the packet received. The UDU ensures that only good data ends up in the circular buffer in DRAM. The following lists the different scenarios.

All modes

If the packet was received successfully, any remaining data is written out to DRAM and an interrupt is triggered on IntEpnOutPktWrA/B. If it was a short or zero length packet, an interrupt also occurs on IntEpnOutShortWrA/B. DmaOutnCurAdrA/B is updated to DmaOutStrmPtr. If DmaOutnIntAdrA/B has been reached or passed, an interrupt occurs on IntEpnOutAdrA/B.

If the packet was not received successfully, any remaining data in the packet buffer is discarded. DmaOutStrmPtr is returned to DmaOutnCurAdrA/B.

Figure 45:
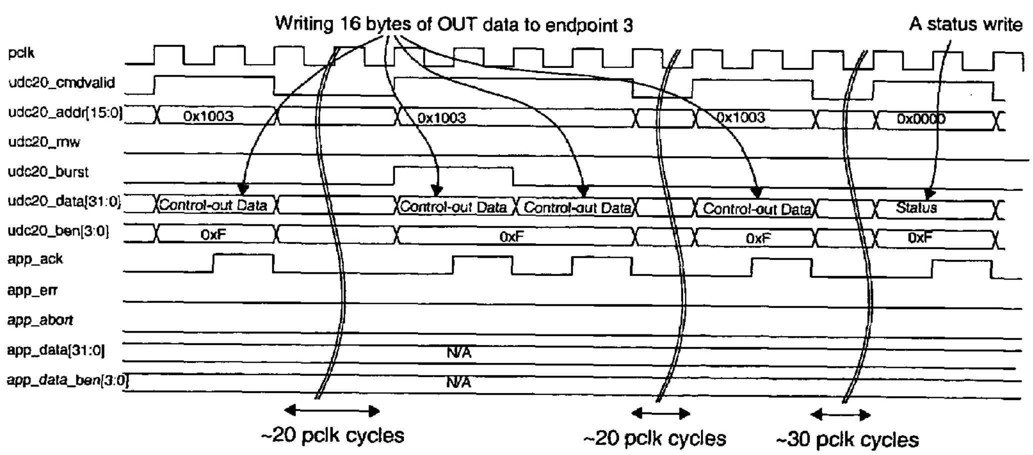
FIG. 45. A bulk OUT transfer
FIG. 46. VCI slave port bus adapter
FIG. 47. Duty Cycle Select
FIG. 48. Low Pass filter structure
FIG. 49. GPIO partition
FIG. 50. GPIO Partition (continued)
FIG. 51. LEON UART block diagram
FIG. 52. Input de-glitch RTL diagram
FIG. 53. Motor control RTL diagram
FIG. 54. BLDC controllers RTL diagram
FIG. 55. Period Measure RTL diagram
FIG. 56. Frequency Modifier sub-block partition
FIG. 57. Fixed point bit allocation
FIG. 58. Frequency Modifier structure
FIG. 59. Line sync generator diagram
FIG. 60. HSI timing diagram
FIG. 61. Centronic interface timing diagram
FIG. 62. Parallel Port EPP read and write transfers
FIG. 63. ECP forward Data and command cycles
FIG. 64. ECP Reverse Data and command cycles
FIG. 65. 68K example read and write access
FIG. 66. Non burst, non pipelined read and write accesses with wait states
FIG. 67. Generic Flash Read and Write operation
FIG. 68. Serial flash example 1 byte read and write protocol
FIG. 69. MMI sub-block partition
FIG. 70. MMI Engine sub-block diagram
FIG. 71. Instruction field bit allocation
FIG. 72. Circular buffer operation
FIG. 73. ICU partition
FIG. 74. Interrupt clear state diagram
FIG. 75. Timers sub-block partition diagram
FIG. 76. Watchdog timer RTL diagram
FIG. 77. Generic timer RTL diagram
FIG. 78. Pulse generator RTL diagram
FIG. 79. SoPEC clock relationship
FIG. 80. CPR block partition
FIG. 81. Reset Macro block structure
FIG. 82. Reset control logic state machine
FIG. 83. PLL and Clock divider logic
FIG. 84. PLL control state machine diagram
FIG. 85. Clock gate logic diagram
FIG. 86. SoPEC clock distribution diagram
FIG. 87. Sub-block partition of the ROM block
FIG. 88. LSS master system-level interface
FIG. 89. START and STOP conditions
FIG. 90. LSS transfer of 2 data bytes
FIG. 91. Example of LSS write to a QA Chip
FIG. 92. Example of LSS read from QA Chip
FIG. 93. LSS block diagram
FIG. 94. Example LSS multi-command transaction
FIG. 95. Start and stop generation based on previous bus state
FIG. 96. S master state machine
FIG. 97. LSS Master timing
FIG. 98. SoPEC System Top Level partition
FIG. 99. Shared read bus with 3 cycle random DRAM read accesses
FIG. 100. Interleaving CPU and non-CPU read accesses
FIG. 101. Interleaving read and write accesses with 3 cycle random DRAM accesses
FIG. 102. Interleaving write accesses with 3 cycle random DRAM accesses
FIG. 103. Read protocol for a SoPEC Unit making a single 256-bit access
FIG. 104. Read protocol for a CPU making a single 256-bit access
FIG. 105. Write Protocol shown for a SoPEC Unit making a single 256-bit access
FIG. 106. Protocol for a posted, masked, 128-bit write by the CPU.
Figure 46:
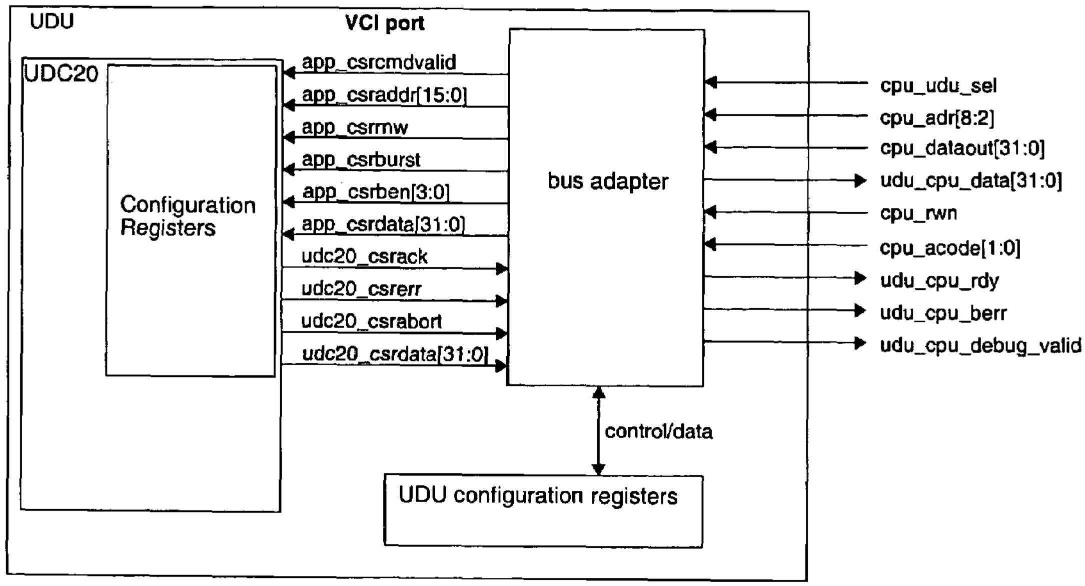

FIG. 45 below illustrates a normal bulk OUT transfer operating at high speed.

13.5.10 Data Transfer Rates

Table 62 below summarizes the data transfer points of the USB device.

TABLE 62

Data transfers

| Interface | Clock frequency | Clock name | Bit width | Description |
|---|---|---|---|---|
| USB bus | 480 MHz | Internal to PHY | 1 | High speed data on the USB bus, to/from USB host to/from USB device |
| | 12 MHz | Internal to PHY | 1 | Full Speed data on the USB bus, to/from USB host to/from USB device |

TABLE 62-continued

Data transfers

| Interface | Clock frequency | Clock name | Bit width | Description |
|---|---|---|---|---|
| UTMI interface | 30 MHz | phy_clk | 16 | Data transfer across the UTMI interface, to/from PHY to/from UDC20 |
| VCI master port | 192 MHz | pclk | 32 | Data transfer across the VCI master port, to/from UDC20 to/from UDU |
| DIU bus | 192 MHz | pclk | 64 | Data transfer across the DIU bus, to/from UDU to/from DRAM |

13.5.11 VCI Slave Interface

The VCI slave interface is used to read and write to configuration registers in the UDC20. The CPU initiates all the transactions on the CPU bus. The UDU bus adapter decodes any addresses destined for the UDC20 and converts the transaction from a CPU bus protocol to a VCI protocol.

By default, the UDU only allows Supervisor Data access from the CPU, all other CPU access codes are disallowed. If the configuration register UserModeEnable is set to '1', then User Data mode accesses are also allowed for all registers except UserModeEnable itself. The UDU responds with udu_cpu_berr instead of udu_cpu_rdy if a disallowed access is attempted. Either signal occurs two cycles after cpu_udu_sel goes high. Note that posted writes are not supported by the bus adapter, meaning that the UDU will not assert its udu_cpu_rdy signal in response to a CPU bus write until the data has actually been written to the configuration register in the UDC20, when the signal udc20_csrack is asserted. Therefore, bus latency will be a couple of cycles higher for all writes to the UDC20 registers, but this is not a problem because the expected access rate is very low.

13.5.12 Reset

TABLE 63

Resets

| Reset | Clock Domain | Active level | Source | Destination |
|---|---|---|---|---|
| prst_n | Pclk | Low | CPR block | Resets all pclk logic in UDU and UDC20 |
| Reset (soft reset) | Pclk | High | CPU write to the Reset configuration register | Resets all pclk logic in UDU and UDC20 |
| UDC20Reset (soft reset) | Pclk | High | CPU write to the UDC20Reset configuration register | Resets all pclk logic in UDC20 |
| rst_phyclk | phy_clock | High | CPR block | Resets all phy_clock logic in UDC20 |
| udc20_usbreset | Pclk | High | UDC20, generated when USB host sends a reset command | Generates IntReset, which interrupts the CPU. |

Table 63 below lists the resets associated with the UDU.

13.5.13 USB Reset

The UDU goes into the Default state when the USB host issues a reset command. The UDC20 asserts the signal udc20_reset and an interrupt is generated on IntReset. This does not cause any configuration registers or logic to be reset in the UDU, but the application may decide to do a soft reset on the UDU. The USB host must re-enumerate and re-configure the UDU before it can communicate with it again.

13.5.14 Suspend/Resume

The UDU goes into the Suspend state when the USB bus has been idle for more than 3 ms. If the device is operating in high speed mode, it first reverts to full speed and if suspend signalling is observed (as opposed to reset signalling) then the device enters the Suspend state. The UDC20 then asserts the signal udc20_suspend and an interrupt is generated on IntSuspend. The CPR block receives the udc20_suspend signal via the output pin udu_cpr suspend. The CPR block then drives suspendm low to the PHY and the PHY port may only draw suspend current from Vbus, as specified by the USB specification. The amount of suspend current allowed depends on whether the UDU is configured as self-powered/bus powered low-power/high-power, remote wakeup enabled, etc. The PHY keeps a pullup attached to D+during suspend mode, so during suspend mode the PHY always draws at least some current from Vbus.

There are two ways for the device to come out of the Suspend state.

a. The first is if any USB bus activity is detected, the device will interpret this as resume signalling and will come out of Suspend state. The UDC20 then deassserts the udc20_suspend signal and an interrupt is generated on IntResume. The CPR block recognises a change of logic levels on the line_state signals from the PHY and drives suspendm high to the PHY to allow it to come out of suspend. The UDC20 remembers whether the device was operating in high speed or full speed and transitions to FS/HS Idle state.

b. The second is if the device supports Remote Wakeup. It can receive the Remote Wakeup command via a write to its Resume configuration register. The UDU will then assert the app_resume signal to UDC20. The device then initiates the resume signalling on the USB bus. The UDC20 then deasserts the udc20_suspend signal and an interrupt is generated on IntResume. Note that the USB host may enable/disable the Remote Wakeup feature of the device with the commands SetFeature/ClearFeature. The CPR block drives suspendm low to the PHY.

The UDU and PHY do not require pclk and phy_clk to be running whilst in Suspend mode. The SW is in control of whether the UDU, PHY, CPU, DRAM etc are powered down. It is recommended that the SW power down the UDU in a controlled manner before disabling pclk to the UDU in the CPR block. It does this by disabling all DMA descriptors and enabling the interrupt masks required for a wakeup.

If resume signalling is received from an external host, the CPR block recognises this (by monitoring line_state) and must quickly enable pclk to the UDU (if it was disabled) and deassert suspendm to the PHY port. There is 10 ms recovery time available before the USB host transmits any packets, which is enough time to enable the PHY's PLL (if it was switched off).

13.5.15 Ping

The ping protocol is used for control and bulk OUT transfers in high speed mode. The PING token is issued by the host to an endpoint, and the endpoint responds to it with either an ACK or NAK. The device responds with an ACK if it has enough room available to receive an OUT data packet of wMaxPktSize for that endpoint. If there isn't room available, the device responds with a NAK.

If an ACK is issued, the host controller will later send an OUT data packet to that endpoint. Note that there may be transactions to other endpoints in between the ping and data transfer to the pinged endpoint.

A ping transaction is initiated on the VCI master port with a write to address 0×0004. The data on the VCI bus contains the endpoint to which the ping is addressed. The data field encoding is described in Table 64 below. In order to respond to the ping with an ACK, the UDU drives the app_ack signal high. To respond to the ping with a NAK, the UDU drives the app_err signal high.

TABLE 64

Data field of Ping Write

| udc20_data[31:0] | Description |
|---|---|
| Bits 3-0 | Endpoint number |
| Bits 7-4 | Alternate setting |
| Bits 11-8 | Interface number |
| Bits 15-12 | Configuration number |

13.5.16 SOF

The USB host transmits Start Of Frame packets to the device every (micro)Frame. A frame is every 1 ms in full speed mode. A microframe is every 125 μs in high speed mode. A SOF token is transmitted, along with the 11 bit frame number.

The UDC20 provides the signals udc20_sof and udc20_timestamp[10:0] to indicate a SOF packet has received. udc20_sof is used as an enable signal to sample udc20_timestamp[10:0]. When the frame number has been captured by the UDU, an interrupt is generated on IntSof. The frame number is available in the configuration register SOFTimeStamp.

13.5.17 Enumeration

After the host resets the device, which occurs when the device connects to the USB bus or at any other time decided by the host, the device enumerates as either full speed or high speed. The UDC20 provides the signals udc20_enumon and udc20_enum_speed[1:0] to provide enumeration status to the UDU. udc20_enumon indicates when enumeration is occurring. A negative edge trigger on this signal is used to sample udc20_enum_speed[1:0], which indicates whether the device is operating at full speed or high speed. The UDU generates interrupts IntEnumOn and IntEnumOff to indicate when the UDU's enumeration phase begin and end, respectively. The configuration register EnumSpeed indicates whether the device has been enumerated to operate at high speed or full speed. The CPU may respond to the IntEnumOff by reading the EnumSpeed register and setting the appropriate device descriptor, device_qualifier, other_speed descriptor etc. The EpnCfg and other UDU registers must also be set up to reflect the required endpoint characteristics. At a minimum, Endpoint 0 must be configured with an appropriate max packet size for the current enumerated speed and the DMA descriptors must be set up for Endpoint 0 IN and OUT. At this stage, the number of endpoints, interfaces, endpoint types, directions, max packet sizes, DMA descriptors etc may also be configured, though this may also be done when the device is configured (see Section 13.5.19). The next host command to the device will normally be SetAddress, followed by GetDescriptor and SetConfiguration.

The UDU can force the USB host to re-enumerate the device by effectively disconnecting and re-connecting. The SW can control this by writing a '1' to DisconnectDevice. This will cause the PHY to remove any termination resistors and/or pullups on the D+/D− lines. The USB host will recognise that the device has been removed. While the device is disconnected the SW could reprogram the UDU and/or device descriptors to describe a new configuration. The SW can re-connect the device by writing a '1' to DisconnectDevice. The PHY will re-connect the pullup on D+ to indicate that it is a full speed device. The USB host will reset the device and the device may come out of reset in high speed or full speed mode, depending on the host's capabilities, ant the value programmed in the UDC20Strap signal app_exp_speed.

13.5.18 Vbus

The UDU needs an external monitoring circuit to detect a drop in voltage level on Vbus. This circuit is connected to a GPIO pin, which is input to the UDU as gpio_udu_vbus_status. When this signal changes state from '0' to '1' or vice versa, an interrupt is generated on IntVbusStatus. The SW can read the logic level of the gpio_udu_vbus_status signal in the configuration register VbusStatus. If Vbus voltage has dropped, the SW is expected to disconnect the USB device from Vbus within 10 seconds by writing a '1' to DisconnectDevice and/or Detect Vbus.

13.5.19 SetConfiguration and SetInterface Commands

When the host issues a SetConfiguration or SetInterface command, the UDC20 asserts the signal udc20_set_csrs to indicate that the EpnCfg registers may need to be updated. Note that the UDC20 responds to the host with a stall if the configuration/interface/alternate interface number is greater than the maximum allowed in the HW in the UDC20, as detailed in Table 52. Therefore, the only valid configuration number is 0 or 1, the interface number may be 0 to 5, etc.

In the case of SetInterface, the USB host commands the device to change the selected interface's alternate setting. The UDC20 supplies the signals udc20_intf[3:0] and udc20_altintf[3:0] along with a signal for sampling these values, udc20_hst_setintf. The signals udc20_intf[3:0] and udc20_altintf[3:0] are captured into the configuration register CurrentConfiguration. An interrupt is generated on IntSetCsrsIntf when both udc20_set_csrs and udc20_hst_setintf are asserted. The CPU is expected to respond to this interrupt by reading the relevant fields in the CurrentConfiguration register and update the selected interface to the new alternate setting. This will involve updating the EpnCfg registers to update the Alternate_setting fields of the affected endpoints. The Max_pkt_size fields of these registers may also be changed. If they are, the CPU must also update the UDU's InterruptEpSize and/or FsEpSize registers with the new max pkt sizes. When the CPU has finished, it must write a '1' to the CsrsDone register. This causes the UDU to assert the signal app_csrs_done to the UDC20. Only then does the UDC20 complete the Status stage of the control command, because until it receives app done_csrs the Status-In request is NAK'd. The UDU automatically clears the CsrsDone register once udc20_set_csrs goes low.

When the device receives a SetConfiguration command from the host, the signal udc20_set_csrs is asserted. The configuration number is output on udc20_cfg[3:0] and captured into the configuration register CurrentConfiguration using the signal udc20_hst_setcfg. An interrupt is generated on IntSetCsrsCfg. The CPU may respond to this interrupt by setting up all of the UDU's device descriptors and configuration registers for the enumerated speed. The speed of operation is available in the EnumSpeed register. This may already have been set up by the CPU after the IntEnumOff interrupt occurred, see Section 13.5.17. The CPU must acknowledge the SetConfiguration command by writing a '1' to the CsrsDone register. This causes the UDU to assert the app_done_csrs signal, which allows the UDC20 to complete the Status-In command. When the signal udc20_set_csrs goes low, the CsrsDone register is cleared by the UDU.

13.5.20 Endpoint Stalling

Section 13.5.20.1 and Section 13.5.20.2 below summarize the different occurrences of endpoint stalling for control and non-control data pipes respectively.

13.5.20.1 Stalling Control Endpoints

A functional stall is not supported for the control endpoint in the UDU. Therefore, if the USB host attempts to set/clear the halt feature for endpoint 0 (using SET_FEATURE/CLEAR_FEATURE), a STALL handshake will be issued. In addition, the application may not halt the UDU's control endpoint through the use of EpStall configuration register, as is the case for the other endpoints.

A protocol stall is supported for the control endpoint. If a control command is not supported, or for some reason the command cannot be completed, or if during a Data stage of a control transfer, the control pipe is sent more data or is requested to return more data than was indicated in the Setup stage the application must write a "10" to the StatusOutResponse or StatusInResponse configuration register. The UDU returns a STALL to the host in the Status stage of the transfer. For control-writes, the STALL occurs in the Data phase of the Status In stage. For control-reads, the STALL occurs in the Handshake phase of the Status Out stage. The STALL is generated by setting the UDC20's input signal app_stall high instead of app_ack or app_err during a Status-Out or Status-In transfer, respectively. The stall condition persists for all IN/OUT transactions (not just for endpoint 0) and terminates at the beginning of the next Setup received. The StatusInResponse/StatusOutResponse register is cleared by the UDU after a status write.

13.5.20.2 Stalling Non-Control Endpoints

A non-control endpoint may be stalled/unstalled by the USB host by setting/clearing the halt feature on that endpoint. This command is taken care of by the UDC20 and is not passed on to the application. In this case, both IN/OUT endpoint directions are stalled.

A non-control endpoint may be stalled by setting the relevant bit in the EpStall configuration register to '1'. Each IN/OUT direction may be stalled/unstalled independently.

If an endpoint is stalled, its response to an IN/OUT/PING token will be a STALL handshake. If a buffer is full or there is no data to send, this does not constitute a stall condition.

The UDU stalls an endpoint transfer by asserting app_abort instead of app_ack during the VCI read/write cycle.

13.5.21 UDC20 EpnCfg Registers

The UDC20 EpnCfg registers are listed in Table 53 under the heading "UDC20 control/status registers". These must be programmed to set up the endpoints to match the device descriptor provided to the USB host.

Default endpoint 0 must be programmed in one of the 12 EpnCfg registers. There is just one register used for endpoint 0, and the Endpoint direction, Configuration_number, Interface_number, Alternate_setting fields can be programmed to any values, as these fields are ignored.

The non control endpoints are programmed into the rest of the EpnCfg registers, in any address order. There is a separate register for each endpoint direction, i.e. Ep1 IN and Ep1 OUT each have their own EpnCfg registers. The Max_pkt_size field must be consistent with what is programmed into the InterruptEpSize and FsEpSize registers.

If the UDU is to provide a subset of the maximum endpoints, the unused EpnCfg registers can be left at their reset values of 0×00000000.

If the host issues a SetConfiguration command, to configure the device, the CPU must ensure the EpnCfg registers are up to date with the device descriptors.

Whenever the SetInterface command is received from the host, the affected endpoints' EpnCfg register must be updated to reflect the new alternate setting and possibly a changed max pkt size. InterruptEpSize and FsEpSize registers must also be updated if the max pkt size is changed.

Whenever the device is enumerated to either FS or HS, the max pkt sizes of some endpoints may change. Also, the alternate settings must all reset to the default setting for each interface. The CPU must update the EpnCfg registers to reflect this, when the IntEnumOff interrupt occurs.

13.5.22 UDC20 Strap Signals

Table 65 below lists the UDC20 strap signals. These may be programmed by the CPU, but it is only allowed to do so when app_dev_discon is asserted. The UDC20 drives the udc20_phymode[1:0]=10 when app_dev_discon is asserted, which instructs the PHY to go into non-driving mode. The USB device is effectively disconnected from the host when the D+/D− lines are non-driving.

TABLE 65

UDC20 Strap Signals

| Input | Reset Value | Description |
|---|---|---|
| Dynamic strap signals | | |
| app__dev__discon | 1 | This signal generates a "soft disconnect" signal to the UDC20, which will then set udc20__phymode = 01. This instructs the PHY to set the D+/D− signal levels to "disconnect" levels. This signal should be set high until the CPU has booted up and set up the UDU configuration registers and circular buffers in DRAM. Then this signal should be set low, so that the UDU can be detected by an external USB host. |
| Read only strap signals | | |
| app__utmi__dir | 0 | Data bus interface of the PHY's UTMI interface. 0: unidirectional 1: bidirectional This is set to '0'. Read only. |
| app__setdesc__sup | 1 | SET__DESCRIPTOR command support. When set to '0' the UDC20 responds to this command with a STALL handshake. This is set to '1'. Read only. |
| app__synccmd__sup | 0 | Synch Frame command support. When set to '0', the UDC20 responds to a SYNCH__FRAME command with a STALL handshake. The SYNCH__FRAME command is only relevant for isochronous transfers. This is set to '0'. Read only. |
| app__ram__if | 0 | Sets incremental read addressing on the internal VCI master port. This is set to '0'. Read only. |
| app__phyif__8bit | 0 | Select either an 8-bit or 16-bit data interface to the PHY. 0: 16-bit interface 1: 8-bit interface This is set to '0'. Read only. |
| app__csrprgsup | 1 | The UDC20 supports dynamic Control/Status Register programming. This is set to '1'. Read only. |
| Static strap signals | | |
| app__self__pwr | 1 | The power status signal, which is passed to the host in response to a GET__STATUS command. 0: The device draws power from the USB bus 1: The device supplies its own power |
| app__dev__rmtwkup | 1 | Device Remote Wakeup capability 0: The device does not support Remote Wakeup 1: The device supports Remote Wakeup |
| app__exp__speed[1:0] | 00 | The expected application speed. 00: HS 01: FS 10: LS (not allowed) 11: FS |
| app__nz__len__pkt__stall | 0 | This signal, together with app__nz__len__pkt__stall__all, provides an option for the UDC20 to respond with a STALL or ACK handshake if the USB host has issued a non-zero length data packet during the Status-Out phase of a control transfer. Setting this to '0' ensures that the UDC20 will pass on the data packet to the UDU and return a handshake to the host based on the app__ack/app__stall received from the UDU. |
| app__nz__len__pkt__stall__all | 0 | This signal, together with app__nz__len__pkt__stall, provides an option for the UDC20 to respond with a STALL or ACK handshake if the USB host has issued a non-zero length data packet during the Status-Out phase of a control transfer. Setting this to '0' ensures that the UDC20 will pass on the data packet to the UDU and return a handshake to the host based on the app__ack/app__stall received from the UDU. |
| app__stall__clr__ep0__halt | 1 | This signal provides an option for the UDC20 to respond with a STALL or an ACK handshake to the USB host if the USB host issues a |

TABLE 65-continued

UDC20 Strap Signals

| Input | Reset Value | Description |
|---|---|---|
| | | CLEAR_FEATURE(HALT) command to endpoint 0.<br>0: ACK<br>1: STALL |
| hs_timeout_calib[2:0] | 000 | This value is used to increase the high speed timeout value in terms of number of PHY clocks. This can be done in order to account for the delay of the PHY in generating the line_state signal.<br>The timeout value can be increased from 736 to 848 bit times as a result of adding 0 to 7 PHY clock periods. |
| fs_timeout_calib[2:0] | 000 | This value is used to increase the full speed timeout value in terms of number of PHY clocks. This can be done in order to account for the delay of the PHY in generating the line_state signal.<br>The timeout value can be increased from 16 to 18 bit times as a result of adding 0 to 7 PHY clock periods. |
| app_enable_erratic_err | 1 | Enable monitoring of the phy_rxactive and phy_rxvalid signals for the error condition. If either of these signals is high for more than 2 ms, then the UDC20 will assert the signal udc20_erratic_err and will switch into the Suspend state. |

14 General Purpose IO (GPIO)

14.1 Overview

The General Purpose IO block (GPIO) is responsible for control and interfacing of GPIO pins to the rest of the SoPEC system. It provides easily programmable control logic to simplify control of GPIO functions. In all there are 64 GPIO pins of which any pin can assume any output or input function.

Possible output functions are

- 6 Stepper Motor control outputs
- 18 Brushless DC Motor control output (total of 3 different controllers each with 6 outputs)
- 4 General purpose LED pulsed outputs.
- 4 LSS interface control and data
- 24 Multiple Media Interface general control outputs
- 3 USB over current protect
- 2 UART Control and data Each of the pins can be configured in either input or output mode, and each pin is independently controlled. A programmable de-glitching circuit exists for a fixed number of input pins. Each input is a schmidt trigger to increase noise immunity should the input be used without the de-glitch circuit.

After reset (and during reset) all GPIO pads are set to input mode to prevent any external conflicts while the reset is in progress.

All GPIO pads have an integrated pull-up resistor.

Note, ideally all GPIO pads will be highest drive and fastest pads available in the library, but package and power limitations may place restrictions on the exact pads selection and use.

14.2 Stepper Motor Control

Pins used for motor control can be directly controlled by the CPU, or the motor control logic can be used to generate the phase pulses for the stepper motors. The controller consists of 3 central counters from which the control pins are derived. The central counters have several registers (see Table 68) used to configure the cycle period, the phase, the duty cycle, and counter granularity.

There are 3 motor master counters (0, 1 and 2) with identical features. The periods of the master counters are defined by the MCMasClkPeriod[2:0] and MCMasClkSrc [2:0] registers. The MCMasClkSrc defines the timing pulses used by the master counters to determine the timing period. The MCMasClkSrc can select clock sources of 1 μs, 100 μs, 10 ms and pclk timing pulses (note the exact period of the pulses is configurable in the TIM block).

The MCMasClkPeriod[2:0] registers are set to the number of timing pulses required before the timing period re-starts. Each master counter is set to the relevant MCMasClkPeriod value and counts down a unit each time a timing pulse is received.

The master counters reset to MCMasClkPeriod value and count down. Once the value hits zero a new value is reloaded from the MCMasClkPeriod[2:0] registers. This ensures that no master clock glitch is generated when changing the clock period.

Each of the IO pins for the motor controller is derived from the master counters. Each pin has independent configuration registers. The MCMasClkSelect[5:0] registers define which of the 3 master counters to use as the source for each motor control pin. The master counter value is compared with the configured MCLow and MCHigh registers (bit fields of the MCConfig register). If the count is equal to MCHigh value the motor control is set to 1, if the count is equal to MCLow value the motor control pin is set to 0, if the count is not equal to either the motor control doesn't change.

This allows the phase and duty cycle of the motor control pins to be varied at pclk granularity.

Each phase generator has a cut-out facility that can be enabled or disabled by the MCCutOutEn register. If enabled the phase generator will set its motor control output to zero when the cut_out input is high. If the cut_out signal is then subsequently removed the motor control will not return high until the next configured high transition point. The cut_out signal does not effect any of the counters, only the output motor control.

There is a fixed mapping of deglitch circuit to the cut_out inputs of the phase generator, deglitch circuit 13 is connected to phase generator 0 and 1, deglitch circuit 14 to phase generator 2 and 3, and deglitch circuit 15 to phase generator 4 and 5.

The motor control generators keep a working copy of the MCLow, MCHigh values and update the configured value to the working copy when it is safe to do so. This allows the phase or duty cycle of a motor control pin to be safely adjusted by the CPU without causing a glitch on the output pin.

Note that when reprogramming the MCLow, MCHigh register fields to reorder the sequence of the transition points (e.g changing from low point less than high point to low point greater than high point and vice versa) care must still taken to avoid introducing glitching on the output pin.

14.3 LED Control

LED lifetime and brightness can be improved and power consumption reduced by driving the LEDs with a pulsed rather than a DC signal. The source clock for each of the LED pins is a 7.8 kHz (128 μs period) clock generated from the 1 μs clock pulse from the Timers block. The LEDDutySelect registers are used to create a signal with the desired waveform. Unpulsed operation of the LED pins can be achieved by using CPU IO direct control, or setting LEDDutySelect to 0.

14.4 LSS Interface Via GPIO

GPIO pins can be connected to either of the two LSS-controlled buses if desired (by configuring the IOModeSelect registers). When the IOmodeSelect[6:0] register for a particular GPIO pin is set to 31, 30, 29 and 28 the GPIO pin is connected to LSS clock control 1 to 0, and the LSS data control 1 and 0 respectively. Note that IOmodeSelect[12:7] must be configured to enable output mode control by the LSS also.

Although the LSS block within SoPEC only provides 2 simultaneous buses, more than 2 LSS buses can be accessed over time by changing the allocation of pins to the LSS buses. Additionally, there is no need to allocate pins specifically to LSS buses for the life of a SoPEC application, except that the boot ROM makes particular use of certain pins during the boot sequence and any hardware attached to those pins must be compatible with the boot usage (for more information see section 21.2)

Several LSS slave devices can be connected to one LSS master. In order to simplify board layout (or reduce pad fanout) it is possible to combine several LSS slave GPIO pin connections internally in the GPIO for connection to one LSS master. For example if the IOmodeSelect[6:0] of pins 0 to 7 are all programmed to 30 (LSS data 0), each of the pins will be driven by the LSS Master 0. The corresponding data in (gpio_lss_din[0]) to the LSS master 0 will be driven by pins 0-7 combined (pins will be ANDed together). Since only one LSS slave can be sending data back to the LSS master at a time (and all other LSS slaves must be tri-stating the bus) LSS slaves will not interfere with each other.

14.5 CPU GPIO Control

The CPU can assume direct control of any (or all) of the IO pins individually. On a per pin basis the CPU can turn on direct access to the pin by configuring the IOModeSelect register to CPU direct mode. Once set the IO pin assumes the direction specified by the CpuIODirection register. When in output mode the value in register CpuIOOut will be directly reflected to the output driver. At any time the status of the input pins can be read by reading CpuIOIn register (regardless of the mode the pin in). When writing to the CpuIOOut (or the CpuIODirection) register the value being written is XORed with the current value in CpuIOOut (or the CpuIODirection) to produce the new value for the register. The CPU can also read the status of the 24 selected de-glitched inputs by reading the CpuIOInDeGlitch register.

14.6 Programmable De-Glitching Logic

Each IO pin can be filtered through a de-glitching logic circuit. There are 24 de-glitching circuits, so a maximum of 24 input pins can be de-glitched at any time. The connections between pins and de-glitching logic is configured by means of the DeGlitchPinSelect registers.

Each de-glitch circuit can be configured to sample the IO pin for a predetermined time before concluding that a pin is in a particular state. The exact sampling length is configurable, but each de-glitch circuit must use one of 4 possible configured values (selected by DeGlitchSelect). The sampling length is the same for both high and low states. The DeGlitchCount is programmed to the number of system time units that a state must be valid for before the state is passed on. The time units are selected by DeGlitchClkSrc and are nominally one of 1 μs, 100 μs, 10 ms and pclk pulses (note that exact timer pulse duration can be re-programmed to different values in the TIM block).

The DeGlitchFormSelect can be used to bypass the deglitch function in the deglitch circuits if required. It selects between a raw input or a deglitched input.

For example if DeGlitchCount is set to 10 and DeGlitchClkSrc set to 3, then the selected input pin must consistently retain its value for 10 system clock cycles (pclk) before the input state will be propagated from CpuIOIn to CpuIOInDeglitch.

14.6.1 Pulse Divider

There are 4 pulse divider circuits. Each pulse divider is connected to the output of one of the deglitch circuits (fixed mapping). Each pulse divider circuit is configured to divide the number of input pulses before generating an output pulse, effectively lowering the period frequency. The input to output pulse frequency is configured by the PulseDiv configuration register. Setting the register to 0 allows a direct straight through connection with no delay from input to output allowing the deglitch circuit to behave exactly the same as other deglitch circuits without pulse dividers. Deglitch circuits 0, 1, 2 and 3 are all filtered through pulse dividers.

14.7 Interrupt Generation

There are 16 possible interrupts from the GPIO to the ICU block. Each interrupt can be generated from a number of sources selected by the InterruptSrcSelect register. The interrupt source register can select the output of any of the deglitch circuits (24 possible sources), the interrupt output of either of the Period measures (2 sources), or the outputs of any of the MMI control sub-block (24 sources), 2 MMI interrupt sources, 1 UART interrupt and 6 Motor Control outputs, giving a total of 59 possible sources.

The interrupt type, masking and priority can be programmed in the interrupt controller (ICU).

14.8 CPR Wakeup

The GPIO can detect and generate a wakeup signal to the CPR block. The GPIO wakeup monitors the GPIO to ICU interrupts (gpio_icu_irq[15:0]) for a wakeup condition to determine when to set a WakeUpDetected bit. The WakeUpDetected bits are ORed together to generate a wakeup condition to the CPR. The WakeUpCondition register defines the type of condition (e.g. positive/negative edge or level) to monitor for on the gpio_icu_irq interrupts before setting a bit in the WakeUpDetected register. The WakeUpInputMask controls if a met wakeup condition sets a WakeUpDetected bit or is masked. Set WakeUpDetected bits can be cleared by writing a 1 to the corresponding bit in the WakeUpDetectedClr register.

14.9 SoPEC Mode Select

Each SoPEC die has 3 pads that are not bonded out to package pins. By default (when left unbonded) the 3 pads are pulled high and are read as 1s. These die pads can be bonded out to GND to select possible modes of operation for SoPEC. The status of these pads can be read by accessing the SoPECSel register. They have no direct effect on the operation of SoPEC but are available for software to read and use.

The initial package for SoPEC has these pads unbonded, so the SoPECSel register is read as 7. The boot ROM uses SoPECSel during the boot process (further described in Section 19.2).

14.10 Brushless DC (BLDC) Motor Controllers

The GPIO contains 3 brushless DC (BLDC) motor controllers. Each controller consists of 3 hall inputs, a direction input, a brake input (software configured), and six possible outputs. The outputs are derived from the input state and a pulse width modulated (PWM) input from the Stepper Motor controller, and is given by the truth table in Table 66.

TABLE 66

Truth Table for BLDC Motor Controllers

| Brake | direction | hc | hb | ha | q6 | q5 | q4 | q3 | q2 | q1 |
|---|---|---|---|---|---|---|---|---|---|---|
| 0 | 0 | 0 | 0 | 1 | 0 | 0 | 0 | 1 | PWM | 0 |
| 0 | 0 | 0 | 1 | 1 | PWM | 0 | 0 | 1 | 0 | 0 |
| 0 | 0 | 0 | 1 | 0 | PWM | 0 | 0 | 0 | 0 | 1 |
| 0 | 0 | 1 | 1 | 0 | 0 | 0 | PWM | 0 | 0 | 1 |
| 0 | 0 | 1 | 0 | 0 | 0 | 1 | PWM | 0 | 0 | 0 |
| 0 | 0 | 1 | 0 | 1 | 0 | 1 | 0 | 0 | PWM | 0 |
| 0 | 0 | 0 | 0 | 0 | 0 | 0 | 0 | 0 | 0 | 0 |
| 0 | 0 | 1 | 1 | 1 | 0 | 0 | 0 | 0 | 0 | 0 |
| 0 | 1 | 0 | 0 | 1 | 0 | 0 | PWM | 0 | 0 | 1 |
| 0 | 1 | 0 | 1 | 1 | PWM | 0 | 0 | 0 | 0 | 1 |
| 0 | 1 | 0 | 1 | 0 | PWM | 0 | 0 | 1 | 0 | 0 |
| 0 | 1 | 1 | 1 | 0 | 0 | 0 | 0 | 1 | PWM | 0 |
| 0 | 1 | 1 | 0 | 0 | 0 | 1 | 0 | 0 | PWM | 0 |
| 0 | 1 | 1 | 0 | 1 | 0 | 1 | PWM | 0 | 0 | 0 |
| 0 | 1 | 0 | 0 | 0 | 0 | 0 | 0 | 0 | 0 | 0 |
| 0 | 1 | 1 | 1 | 1 | 0 | 0 | 0 | 0 | 0 | 0 |
| 1 | X | X | X | X | 1 | 0 | 1 | 0 | 1 | 0 |

All inputs to a BLDC controller must be de-glitched. Each controller has its inputs hardwired to de-glitch circuits. See Table 76 for fixed mapping details.

Each controller also requires a PWM input. The stepper motor controller outputs are reused, output 0 is connected to BLDC controller 1, and output 1 to BLDC controller 2 and output 2 to BLDC controller 3.

The controllers have two modes of operation, internal and external direction control (configured by BLDCMode). If a controller is in external direction mode the direction input is taken from a de-glitched circuit, if it is in internal direction mode the direction input is configured by the BLDCDirection register.

Each BLDC controller has a brake control input which is configured by accessing the BLDCBrake register. If the brake bit is activated then the BLDC controller outputs are set to fixed state regardless of the state of the other inputs.

When writing to the BLDCDirection (or the BLDCBrake) registers the value being written is XORed with the current value in BLDCDirection (or the BLDCBrake) to produce the new value for the register.

The BLDC controller outputs are connected to the GPIO output pins by configuring the IOModeSelect register for each pin, e.g setting the mode register to 0x208 will connect q1 Controller 1 to drive the pin.

14.11 Period Measure

There are 2 period measure circuits. The period measure circuit counts the duration (PMCount) between successive positive edges of 1 or 2 input pins (through the deglitch and pulse divider circuit) and reports the last period measured (PMLastPeriod). The period measure can count either the number of pclk cycles between successive positive edges on an input (or both inputs if selected) or count the number of positive edges on the input (or both inputs if selected). The count mode is selected by PMCntSrcSelect register.

The period measure can have 1 input or 2 inputs XORed together as an input counter logic, selected by the PMInputModeSel.

Both the PMCount and PMLastPeriod can be programmed directly by the CPU, but the PMLastPeriod register can be made read only by clearing the PMLastPeriodWrEn register.

There is a direct mapping between deglitch circuits and period measure circuits. Period measure 0 inputs 0 and 1 are connected to deglitch circuits 0 and 1. Period measure 1 inputs 0 and 1 are connected to deglitch circuits 2 and 3.

Both deglitch circuits have a pulse divider fixed on their output, which can be used to divide the input pulse frequency if needed.

14.12 Frequency Modifier

The frequency modifier circuit accepts as input the period measure value and converts it to an output line sync signal. Period measure circuit 0 is always used as the input to the frequency modifier. The incoming frequency from the encoder input (the input to the period measure circuit is an encoder input) is of the range 0.5 KHz to 10 KHz. The modifier converts this to a line sync frequency with a granularity of <0.2% accuracy. The output frequency is of the range of 0.1 to 6 times the input frequency.

The output of the frequency modifier is connected to the PHI block via the gpio_phi_line_sync signal. The generated line sync can also optionally be redirected out any of the GPIO outputs for syncing with other SoPEC devices (via the fm_line_sync signal). The line sync input in other SoPECs will be deglitched, so the sync generating SoPEC must make sure that line sync pulse is longer than the deglitch duration (to prevent the line sync getting removed by the de-glitch circuit). The line sync pulse duration can be stretched to a configurable number of pclk cycles, configured by FMLsyncHigh. Only the fm_line_sync signal is stretched, the gpio_phi_line_sync signal remains a single pulse.

The line sync is generated from the frequency modifier and shaped for output to another SoPEC. But since the other SoPEC may deglitch the line, it will take some time to arrive at the PHI in that SoPEC. To assist in synchronizing multiple SoPECs in printing sections of the same page it would be desirable if the line syncs arrive at the separate PHI blocks around the same time. To facilitate this the frequency modifier delays the internal line sync (gpio_phi_line_sync) by a programmable amount (FMLsyncDelay). This register should be programmed to an estimate of the delay caused by transmission and deglitching at any recipient SoPEC. Note the FMLsyncDelay register only delays the internal line sync (gpio_phi_line_sync) to the PHI and not the line sync generated for output (fm_line_sync) to the GPIOs.

Figure 48:
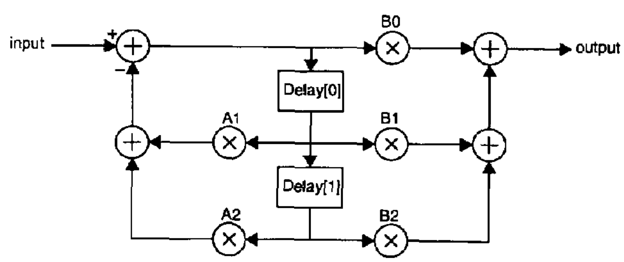
Figure 49:
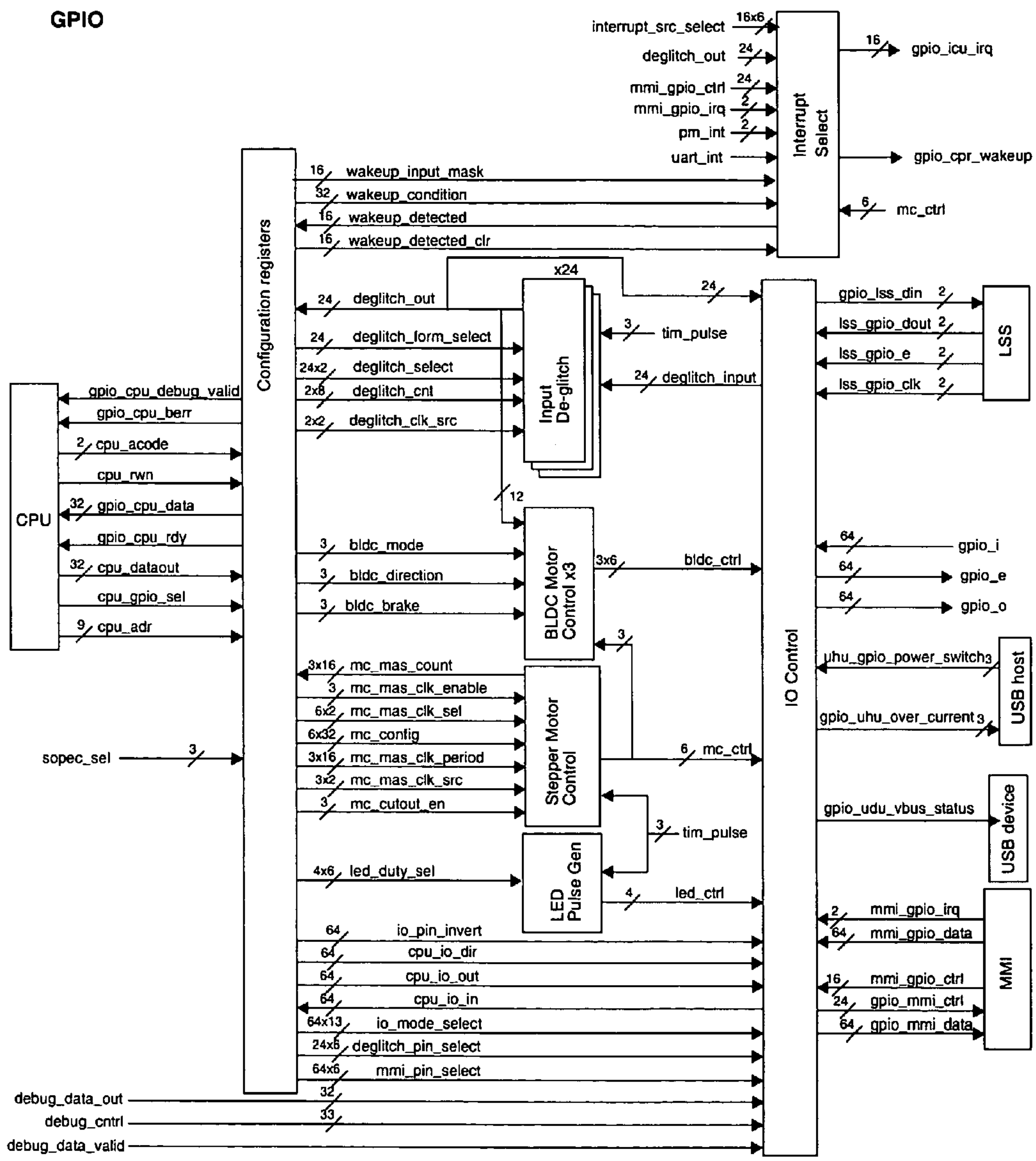
Figure 50:
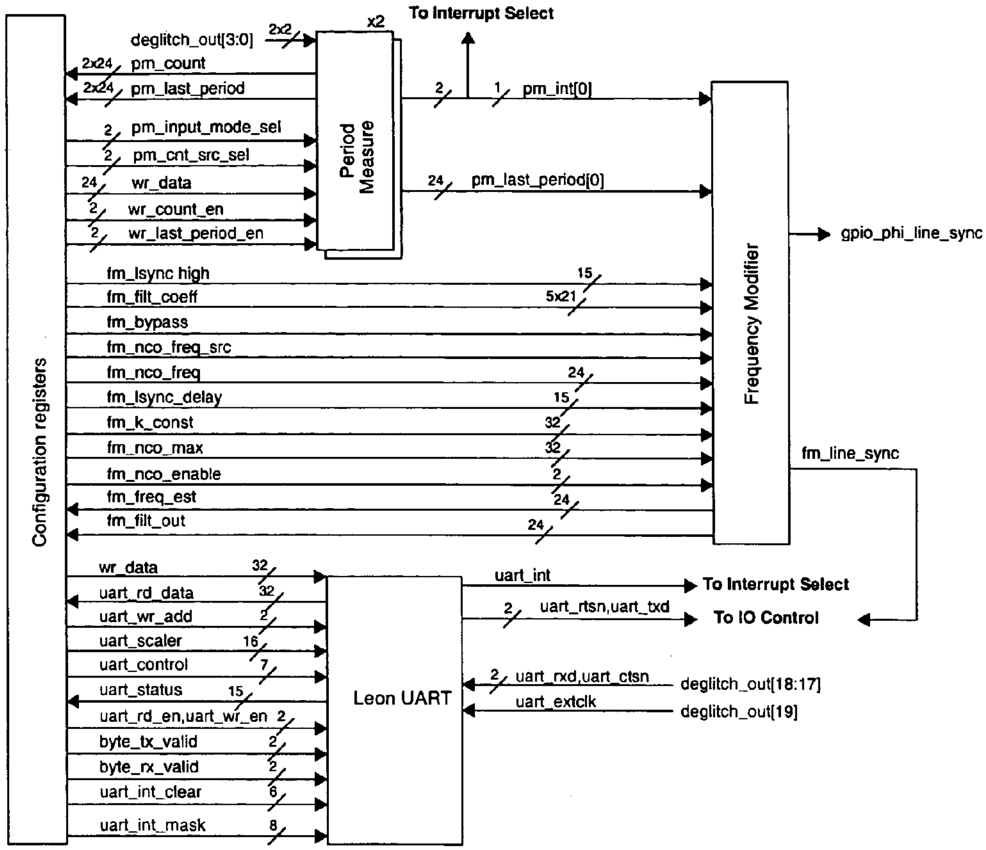

The frequency modifier block contains a low pass filter for removal of high frequency jitter components in the input measured frequency. The filter structure used is a direct form II IIR filter as shown in FIG. 48. The filter co-efficients are programmed via the FMFiltCoeff registers. Care should be taken to ensure that the co-efficients chosen ensure the filter is stable for all input values.

The internal delay elements of the filter can be accessed by reading or writing to the FMIIRDelay registers. Any CPU writes to these registers will take priority over internal block updates and could cause the filter to become unstable.

The frequency modifier circuit is connected directly to the period measure circuit 0, which is connected directly to input deglitch circuits 0 and 1.

The frequency modifier calculation can be bypassed by setting the FMBypass register. This bypasses the frequency modifier calculation stage and connects the pm_int output of the period measure 0 block to the line sync stretch circuit.

14.13 General UART

The GPIO contains an asynchronous UART which can be connected to any of the GPIO pins. The UART implements 8-bit data frame with one stop bit. The programmable options are Parity bit (on/off)
Parity polarity (odd/even)
Baud-rate (16-bit programmable divider)
Hardware flow-control (CTS/RTS)
Loop-back test mode The error-detection in the receiver detects parity, framing break and overrun errors. The RX and TX buffers are accessed by reading the RX buffer registers, and writing to the TX buffer registers. Both buffers are 32 bits wide.

There is a fixed mapping of deglitch circuits to the UART inputs. See Table 76 for mapping details.

14.14 USB Connectivity

The GPIO block provides external pin connectivity for optional control/monitor functions of the USB host and device.

The USB host (UHU) needs to control the Vbus power supply of each individual host port. The UHU indicates to the GPIO whether Vbus should be applied or not via the uhu_gpio_power_switch[2:0] signals. The GPIO redirects the signals to selected output pins to control external power switching logic. The uhu_gpio_power_switch[2:0] signals can be selected as outputs by configuring the IOModeSelect [6:0] register to 58-56, and the pin is in output mode.

The UHU can optionally be required to monitor the Vbus supply current and take appropriate action if the supply current threshold is exceeded. An external circuit monitors the Vbus supply current, and if the current exceeds the threshold it signals the event via GPIO pin. The GPIO pin input is deglitched (deglitch circuits 23, 22, 21) and is passed to the USB host via the gpio_uhu_over_current[2:0] signals, one per port connection.

The USB device (UDU) is required to monitor the Vbus to determine the presence or absence of the Vbus supply. An external Vbus monitoring circuit detects the condition and signals an event to a GPIO pin. The GPIO pin input is deglitched (deglitch circuit 3) and is passed to the UDU via the gpio_udu_vbus_status signal.

14.15 MMI Connectivity

The GPIO block provides external pin connectivity for the MMI block.

GPIO output pins can be connected to any of the MMI outputs, control (mmi_gpio_ctrl[23:0]) or data (mmi_gpio_data[63:0]) by configuring the IOModeSelect registers. When the IOmodeSelect[6:0] register for a particular GPIO pin is set to 127-64 the GPIO pin is connected to the MMI data outputs 63 to 0 respectively. When IOmodeSelect[6:0] is set to 55-32 the GPIO pin is connected to the MMI control outputs 23 to 0 respectively. In all cases IOmodeSelect[12:7] must configure the GPIO pins as outputs.

GPIO input pins can be connected to any of the MMI inputs, control (gpio_mmi_ctrl[15:0]) or data (gpio_mmi_data[63:0]). The MMI control inputs are all deglitched and have a fixed mapping to deglitch circuits (see Table 76 for details). The data inputs are not deglitched. The MMIPinSelect[63:0] registers configure the mapping of GPIO input pins to MMI data inputs. For example setting MMIPinSelect [0] to 32 will connect GPIO pin 32 to gpio_mmi_data[0]. In all cases IOmodeSelect[12:7] must configure the GPIO pins as inputs.

14.16 Implementation 14.16.1 Definitions of I/O

TABLE 67

I/O definition

| Port name | Pins | I/O | Description |
|---|---|---|---|
| | | | Clocks and Resets |
| Pclk | 1 | In | System Clock |
| prst_n | 1 | In | System reset, synchronous active low |
| tim_pulse[2:0] | 3 | In | Timers block generated timing pulses.<br>0 - 1 μs pulse<br>1 - 100 μs pulse<br>2 - 10 ms pulse |
| | | | CPU Interface |
| cpu_adr[10:2] | 9 | In | CPU address bus. Only 9 bits are required to decode the address space for this block |
| cpu_dataout[31:0] | 32 | In | Shared write data bus from the CPU |
| gpio_cpu_data[31:0] | 32 | Out | Read data bus to the CPU |
| cpu_rwn | 1 | In | Common read/not-write signal from the CPU |
| cpu_gpio_sel | 1 | In | Block select from the CPU. When cpu_gpio_sel is high both cpu_adr and cpu_dataout are valid |
| gpio_cpu_rdy | 1 | Out | Ready signal to the CPU. When gpio_cpu_rdy is high it indicates the last cycle of the access. For a write cycle this means cpu_dataout has been registered by the GPIO block and for a read cycle this means the data on gpio_cpu_data is valid. |

TABLE 67-continued

I/O definition

| Port name | Pins | I/O | Description |
|---|---|---|---|
| gpio_cpu_berr | 1 | Out | Bus error signal to the CPU indicating an invalid access. |
| gpio_cpu_debug_valid | 1 | Out | Debug Data valid on gpio_cpu_data bus. Active high |
| cpu_acode[1:0] | 2 | In | CPU Access Code signals. These decode as follows:<br>00 - User program access<br>01 - User data access<br>10 - Supervisor program access<br>11 - Supervisor data access |
| | | | IO Pins |
| gpio_o[63:0] | 64 | Out | General purpose IO output to IO driver |
| gpio_i[63:0] | 64 | In | General purpose IO input from IO receiver |
| gpio_e[63:0] | 64 | Out | General purpose IO output control. Active high driving |
| | | | GPIO to LSS |
| lss_gpio_dout[1:0] | 2 | In | LSS bus data output<br>Bit 0 - LSS bus 0<br>Bit 1 - LSS bus 1 |
| gpio_lss_din[1:0] | 2 | Out | LSS bus data input<br>Bit 0 - LSS bus 0<br>Bit 1 - LSS bus 1 |
| lss_gpio_e[1:0] | 2 | In | LSS bus data output enable, active high<br>Bit 0 - LSS bus 0<br>Bit 1 - LSS bus 1 |
| lss_gpio_clk[1:0] | 2 | In | LSS bus clock output<br>Bit 0 - LSS bus 0<br>Bit 1 - LSS bus 1 |
| | | | GPIO to USB |
| uhu_gpio_power_switch[2:0] | 3 | In | Port Power enable from the USB host core, one per port, active high |
| gpio_uhu_over_current[2:0] | 3 | Out | Over current detect to the USB host core, active high |
| gpio_udu_vbus_status | 1 | Out | Indicates the USB device Vbus status to the UDU. Active high |
| | | | GPIO to MMI |
| mmi_gpio_data[63:0] | 64 | In | MMI to GPIO data, for muxing to GPIO pins |
| gpio_mmi_data[63:0] | 64 | Out | GPIO to MMI data, extracted from selected GPIO pins |
| mmi_gpio_ctrl[23:0] | 24 | In | MMI to GPIO control inputs, for muxing to GPIO pins All bits can be connected to data out pins in the GPIO, bits 23:16 can also be configured as data out enables (i.e. tri-state enables) on configured output pins. |
| gpio_mmi_ctrl[15:0] | 16 | Out | GPIO to MMI control outputs, extracted from selected GPIO pins |
| mmi_gpio_irq | 2 | In | MMI interrupts for muxing out through the GPIO interrupts<br>0 - TX buffer interrupt<br>1 - RX buffer interrupt |
| | | | Miscellaneous |
| gpio_icu_irq[15:0] | 16 | Out | GPIO pin interrupts |
| gpio_cpr_wakeup | 1 | Out | SoPEC wakeup to the CPR block active high. |
| gpio_phi_line_sync | 1 | Out | GPIO to PHI line sync pulse to synchronise the dot generation output to the printhead with the motor controllers and paper sensors |
| sopec_sel[2:0] | 3 | In | Indicates the SoPEC mode selected by bondout options over 3 pads. When the 3 pads are unbonded as in the current package, the value is 111. |
| | | | Debug |
| debug_data_out[31:0] | 32 | In | Output debug data to be muxed on to the GPIO pins |
| debug_cntrl[32:0] | 33 | In | Control signal for each GPIO bound debug data line indicating whether or not the debug data should be selected by the pin mux |
| debug_data_valid | 1 | In | Debug valid signal indicating the validity of the data on debug_data_out. This signal is used in all debug configurations.<br>It is selected by debug_cntrl[32] |

14.16.1

14.16.2 Configuration Registers

The configuration registers in the GPIO are programmed via the CPU interface. Refer to section 11.4.3 on page 77 for a description of the protocol and timing diagrams for reading and writing registers in the GPIO. Note that since addresses in SoPEC are byte aligned and the CPU only supports 32-bit register reads and writes, the lower 2 bits of the CPU address bus are not required to decode the address space for the GPIO. When reading a register that is less than 32 bits wide zeros are returned on the upper unused bit(s) of gpio_cpu_data. Table 68 lists the configuration registers in the GPIO block

TABLE 68

GPIO Register Definition

| Address GPIO_base+ | Register | #bits | Reset | Description |
|---|---|---|---|---|
| 0x000-0x0FC | IOModeSelect[63:0] | 64x13 | 0x0000 | Specifies the mode of operation for each GPIO pin.<br>One 13 bit register per gpio pin.<br>Bits 6:0 - Data Out, selects what controls the data out<br>Bits 8:7 - Selects how output mode is applied<br>Bits 12:9 - Selects what controls the pads input or output mode<br>See Table 72, Table 73 and Table 74 for description of mode selections. |
| 0x100-0x1FC | MMIPinSelect[63:0] | 64x6 | 0x00 | MMI input data pin select.1 register per gpio_mmi_data output. Specifies the input pin used to drive gpio_mmi_data output to the MMI block. |
| 0x200-0x25C | DeGlitchPinSelect[23:0] | 24x6 | 0x00 | Specifies which pins should be selected as inputs. Used to select the pin source to the DeGlitch Circuits. |
| 0x280-0x284 | IOPinInvert[1:0] | 2x32 | 0x0000_0000 | Specifies if the GPIO pins should be inverted or not. Active High.<br>If a pin is in input mode and the invert bit is set then pin polarity will be inverted.<br>If the pin is in output mode and the inverted bit is set then the output will be inverted. |
| 0x288 | Reset | 3 | 0x7 | Active low synchronous reset, self de-activating. Writing a 0 to the relevant bit position in this register causes a soft reset of the corresponding unit<br>0 - Full GPIO block reset (same as hardware reset)<br>1 - UART block reset<br>2 - Frequency Modifier reset<br>Self resetting register. |
| | | CPU IO Control | | |
| 0x300-0x304 | CpuIOUserModeMask[1:0] | 2x32 | 0x0000_0000 | User Mode access mask to CPU GPIO control register. When 1 user access is enabled. One bit per gpio pin. Enables access to CpuIODirection, CpuIOOut and CpuIOIn in user mode. |
| 0x310-0x314 | CpuIOSuperModeMask[1:0] | 2x32 | 0xFFFF_FFFF | Supervisor Mode access mask to CPU GPIO control register. When 1 supervisor access is enabled. One bit per gpio pin. Enables access to CpuIODirection, CpuIOOut and CpuIOIn in supervisor mode. |
| 0x320-0x324 | CpuIODirection[1:0] | 2x32 | 0x0000_0000 | Indicates the direction of each IO pin, when controlled by the CPU<br>When written to the register assumes the new value XORed with the current value<br>0 - Indicates Input Mode<br>1 - Indicates Output Mode |
| 0x330-0x334 | CpuIOOut[1:0] | 2x32 | 0x0000_0000 | CPU direct mode GPIO access.<br>When written to the register assumes the new value XORed with the current value, and value is reflected out the GPIO pins.<br>Bus 0 - GPIO pins 31:0<br>Bus 1 - GPIO pins 63:32 |
| 0x340-0x344 | CpuIOIn[1:0] | 2x32 | External pin value | Value received on each input pin regardless of mode.<br>Bus 0 - GPIO pins 31:0<br>Bus 1 - GPIO pins 63:32<br>Read Only register. |

TABLE 68-continued

GPIO Register Definition

| Address GPIO_base+ | Register | #bits | Reset | Description |
|---|---|---|---|---|
| 0x350 | CpuDeGlitchUserModeMask | 24 | 0x00_000 | User Mode Access Mask to CpuIOInDeglitch control register. When 1 user access is enabled, otherwise bit reads as zero. |
| 0x360 | CpuIOInDeglitch | 24 | 0x00_0000 | Deglitched version of selected input pins. The input pins are selected by the DeGlitchPinSelect register. Note that after reset this register will reflect the external pin values 256 pclk cycles after they have stabilized. Read Only register. |
| | | Deglitch control | | |
| 0x400-0x45c | DeGlitchSelect[23:0] | 24x2 | 0x0 | Specifies which deglitch count (DeGlitchCount) and unit select (DeGlitchClkSrc) should be used with each de-glitch circuit.<br>0 - Specifies DeGlitchCount[0] and DeGlitchClkSrc[0]<br>1 - Specifies DeGlitchCount[1] and DeGlitchClkSrc[1]<br>2 - Specifies DeGlitchCount[2] and DeGlitchClkSrc[2]<br>3 - Specifies DeGlitchCount[3] and DeGlitchClkSrc[3]<br>One bus per deglitch circuit |
| 0x480-0x48C | DeGlitchCount[3:0] | 4x8 | 0xFF | Deglitch circuit sample count in DeGlitchClkSrc selected units. |
| 0x490-0x49C | DeGlitchClkSrc[3:0] | 4x2 | 0x3 | Specifies the unit use of the GPIO deglitch circuits:<br>0 - 1 μs pulse<br>1 - 100 μs pulse<br>2 - 10 ms pulse<br>3 - pclk |
| 0x4A0 | DeGlitchFormSelect | 24 | 0x00_0000 | Selects which form of selected input is output to the remaining logic, raw or deglitched.<br>0 - Raw mode (direct from GPIO)<br>1 - Deglitched mode |
| 0x4B0-0x4BC | PulseDiv[3:0] | 4x4 | 0x0 | Pulse Divider circuit. One register per pulse divider circuit. Indicates the number of input pulses before an output pulse is generated.<br>0 - Direct straight through connection (no delay)<br>N - Divides the number of pulses by N |
| | | Motor Control | | |
| 0x500 | MCUserModeEnable | 1 | 0x0 | User Mode Access enable to motor control configuration registers. When 1 user access is enabled.<br>Enables user access to MCMasClockEn, MCCutoutEn, MCMasClkPeriod, MCMasClkSrc, MCConfig, MCMasClkSelect, BLDCMode, BLDCBrake and BLDCDirection registers |
| 0x504 | MCMasClockEnable | 3 | 0x0 | Enable the motor master clock counter. When 1 count is enabled<br>Bit 0 - Enable motor master clock 0<br>Bit 1 - Enable motor master clock 1<br>Bit 2 - Enable motor master clock 2 |
| 0x508 | MCCutoutEn | 6 | 0x00 | Motor controller cut-out enable, active high, 1 bit per phase generator.<br>0 - Cut-out disabled<br>1 - Cut-out enabled |
| 0x510-0x518 | MCMasClkPeriod[2:0] | 3x16 | 0x0000 | Specifies the motor controller master clock periods in MCMasClkSrc selected units |
| 0x520-0x528 | MCMasClkSrc[2:0] | 3x2 | 0x0 | Specifies the unit use by the motor controller master clock generators. One bus per master clock generator<br>0 - 1 μs pulse<br>1 - 100 μs pulse<br>2 - 10 ms pulse<br>3 - pclk |
| 0x530-0x544 | MCConfig[5:0] | 6x32 | 0x0000_0000 | Specifies the transition points in the clock period for each motor control pin. One register per pin |

TABLE 68-continued

GPIO Register Definition

Figure 47:
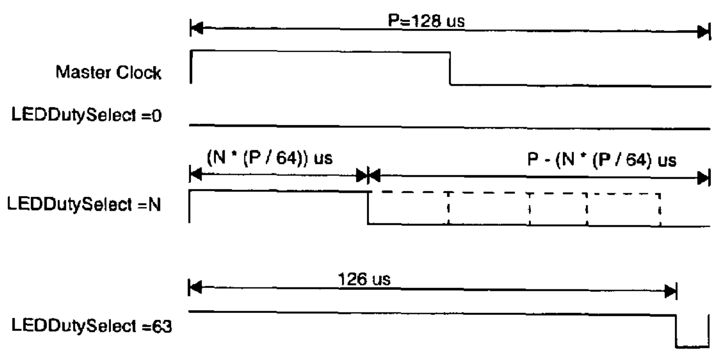

| Address GPIO_base+ | Register | #bits | Reset | Description |
|---|---|---|---|---|
| | | | | bits 15:0 - MCLow, high to low transition point<br>bits 31:16 - MCHigh, low to high transition point |
| 0x550-0x564 | MCMasClkSelect[5:0] | 6x2 | 0x0 | Specifies which motor master clock should be used as a pin generator source, one bus per pin generator<br>0 - Clock derived from MCMasClockPeriod[0]<br>1 -Clock derived from MCMasClockPeriod[1]<br>2 -Clock derived from MCMasClockPeriod[2]<br>3 - Reserved |
| | | | | **BLDC Motor Controllers** |
| 0x580 | BLDCMode | 3 | 0x0 | Specifies the mode of operation of the BLDC controller. One bit per controller.<br>0 - Internal direction control<br>1 - External direction control |
| 0x584 | BLDCDirection | 3 | 0x0 | Specifies the direction input of the BLDC controller. Only used when BLDC controller is an internal direction control mode. One bit per controller.<br>0 - Counter clockwise<br>1 - Clockwise<br>When written to the register assumes the new value XORed with the current value |
| 0x588 | BLDCBrake | 3 | 0x0 | Specifies if the BLDC controller should be held in brake mode. One bit per controller.<br>0 - Release from brake mode<br>1 - Hold in Brake mode<br>When written to the register assumes the new value XORed with the current value |
| | | | | **LED control** |
| 0x590 | LEDUserModeEnable | 4 | 0x0 | User mode access enable to LED control configuration registers. When 1 user access is enabled.<br>One bit per LEDDutySelect select register. |
| 0x594-0x5A0 | LEDDutySelect[3:0] | 4x6 | 0x0 | Specifies the duty cycle for each LED control output. See FIG. 47 for encoding details.<br>The LEDDutySelect[3:0] registers determine the duty cycle of the LED controller outputs |
| | | | | **Period Measure** |
| 0x5B0 | PMUserModeEnable | 2 | 0x0 | User mode access enable to period measure configuration registers. When 1 user access is enabled. Controls access to PMCount, PMLastPeriod.<br>Bit 0 - Period measure unit 0<br>Bit 1 - Period measure unit 1 |
| 0x5B4 | PMCntSrcSelect | 2 | 0x0 | Select the counter increment source for each period measure block. When set to 0 pclk is used, when set to 1 the encoder input is used.<br>One bit per period measure unit. |
| 0x5B8 | PMInputModeSel | 2 | 0x0 | Select the input mode for each period measure circuit.<br>0- Select input 0 only<br>1- Select both inputs 0 and 1 (XORed together)<br>One register per period measure block |
| 0x5BC | PMLastPeriodWrEn | 2 | 0x0 | Enables write access to the PMLastPeriod registers.<br>Bit 0 - Controls PMLastPeriod[0] write access<br>Bit 1 - Controls PMLastPeriod[1] write access |
| 0x5C0-0x5C4 | PMLastPeriod[1:0] | 2x24 | 0x0000 | Period Measure last period of selected input pin (or pins). One bus per period measure circuit.<br>Only writable when PMLastPeriodWrEn is 1, and access permissions are allowed (Limited Write register) |

TABLE 68-continued

GPIO Register Definition

| Address GPIO_base+ | Register | #bits | Reset | Description |
|---|---|---|---|---|
| 0x5D0-0x5D4 | PMCount[1:0] | 2x24 | 0x0000_0000 | Period Measure running counter (Working register) |
| | | Frequency Modifier | | |
| 0x600 | FMUserModeEnable | 1 | 0x0 | User mode access enable to frequency modifier configuration registers. When 1 user access is enabled. Controls access to FM* registers. |
| 0x604 | FMBypass | 1 | 0x0 | Specifies if the frequency modifier should be bypassed.<br>0 - Normal straight through mode<br>1 - Bypass mode |
| 0x608 | FMLsyncHigh | 15 | 0x0000 | Specifies the number of pclk cycles the generated frequency line sync should remain high. Only affects the line sync output through the GPIO pins to other devices. |
| 0x60C | FMLsyncDelay | 15 | 0x0000 | Line sync delay length. Specifies the number of pclk cycles to delay the line sync generation to the PHI.<br>Note the line sync output to the GPIOs is unaffected. |
| 0x610-0x620 | FMFiltCoeff[4:0] | 5x21 | B0: 0x100000 Others: 0x000000 | Specifies the frequency modifier filter coefficients.<br>Values should be expressed in sign magnitude format. Sign bit is MSB.<br>Bus 0- A1 Coefficient<br>Bus 1- A2 Coefficient<br>Bus 2- B0 Coefficient<br>Bus 3- B1 Coefficient<br>Bus 4- B2 Coefficient |
| 0x624 | FMNcoFreqSrc | 1 | 0x0 | Frequency modifier filter output bypass. When 1 the programmed FMNCOFreq is used as input to the NCO, otherwise the calculated FMNCOFiltFreq is used. |
| 0x628 | FMKConst | 32 | 0xFFFF_FFFF | Specifies the frequency modifier K divider constant. Value is always positive magnitude. |
| 0x62C | FMNCOFreq | 24 | 0x00_0000 | Frequency Modifier NCO value programmed by the CPU. Only used when FMNcoFreqSrc is 1. |
| 0x630 | FMNCOMax | 32 | 0xFFFF_FFFF | Specifies the value the NCO accumulator wrap value. |
| 0x634 | FMNCOEnable | 2 | 0x0 | NCO enable bits, NCO generator is enabled control.<br>0 - NCO is disabled<br>1 - NCO is enabled, with no immediate line sync<br>2 - NCO is disabled, immediate line sync<br>3 - NCO is enabled, with immediate line sync<br>Note any write to this register will cause the NCO accumulator to be cleared. |
| 0x638 | FMFreqEst | 24 | 0x00_0000 | Frequency estimate intermediate value calculated by the frequency modifier the result of the FMKConst/PMLastPeriod calculation, used as input to the low pass filter<br>(Read Only Register) |
| 0x63C | FMNCOFiltOut | 24 | 0x00_0000 | Frequency Modifier calculated filter output frequency value. Used as input to the NCO.<br>(Read Only Register) |
| 0x640 | FMStatus | 5 | 0x00 | Frequency modifier status. Non-sticky bits are cleared each time a new sample is received. Sticky bits are cleared by the FMStatusClear register.<br>0 - Divide error (sticky bit)<br>1 - Filter error (sticky bit)<br>2 - Calculation running<br>3 - FreqEst complete and correct<br>4 - FiltOut complete and correct<br>(Read Only Register) |
| 0x644 | FMStatusClear | 2 | 0x0 | FM status sticky bit clear. If written with a one it clears corresponding sticky bit in the |

TABLE 68-continued

GPIO Register Definition

| Address GPIO_base+ | Register | #bits | Reset | Description |
|---|---|---|---|---|
| | | | | FMstatus register<br>0 - Divide error<br>1 - Filter error<br>(Reads as zero) |
| 0x648-64C | FMIIRDelay[1:0] | 2x32 | 0x0000_0000 | Frequency Modifier IIR filter internal delay registers.<br>CPU write to these register will overwrite the internal update within the IIR filter in the Frequency Modifier.<br>(Working Registers) |
| 0x650 | FMDivideOutput | 32 | 0x0000_0000 | Output from K/P divide before saturation to 24 bits. Used for debug only.<br>(Read Only Register) |
| 0x654 | FMFilterOutput | 32 | 0x0000_0000 | Output from filter in signed 24.7 format before rounding to 24.0. Used for debug only.<br>(Read Only Register) |
| | | UART Control | | |
| 0x67C | UartUserModeEnable | 1 | 0x0 | User mode access enable to the Uart configuration registers. When 1 user access is enabled. Controls access to Uart* registers. |
| 0x680 | UartControl | 7 | 0x00 | UART control register.<br>See Table 71 for bit field description |
| 0x684 | UartStatus | 15 | 0x06 | UART status register<br>See Table 71 for bit field description<br>(Read Only Register) |
| 0x688 | UartIntClear | 6 | 0x0 | UART interrupt clear register<br>Clears the underflow, overflow, parity, framing error and break sticky bits.<br>If written with a 1 it clears corresponding bit in the UartStatus register.<br>0 - TX_overflow<br>1 - RX_underflow<br>2 - RX_overflow<br>3 - Parity error<br>4 - Framing error<br>5 - Break<br>(Reads as zero) |
| 0x6B0 | UartIntMask | 8 | 0x0 | UART interrupt mask register<br>Masks the UART interrupts.<br>If written with a 0 it masks the corresponding interrupt<br>0 - TX_overflow<br>1 - RX_underflow<br>2 - RX_overflow<br>3 - Parity error<br>4 - Framing error<br>5 - Break<br>6 - Tx buffer register empty<br>7 - New data in Rx buffer |
| 0x68C | UartScaler | 16 | 0x0000 | Determines the baud rate used to generate the data bits. Note that frequency should be set to 8 times the desired baud-rate. |
| 0x690-0x69C | UartTXData[3:0] | 4x32 | 0x0000_0000 | UART Transmit buffer register. Valid bytes are determined by the register address used to access the TX buffer.<br>Bus 0 - 1 byte valid bits[7:0]<br>Bus 1 - 2 bytes valid bits[15:0]<br>Bus 2 - 3 bytes valid bits[23:0]<br>Bus 3 - 4 bytes valid bits[31:0] |
| 0x6A0-0x6AC | UartRXData[3:0] | 4x32 | 0x0000_0000 | UART receive buffer register. Valid bytes are indicated by bits 14:12 in the UART status register.<br>Address used indicates how many bytes to read from RX buffer<br>Bus 0 - Read 1 byte from RX buffer<br>Bus 1 - Read 2 bytes from RX buffer<br>Bus 2 - Read 3 bytes from RX buffer<br>Bus 3 - Read 4 bytes from RX buffer |

TABLE 68-continued

GPIO Register Definition

| Address GPIO_base+ | Register | #bits | Reset | Description |
| --- | --- | --- | --- | --- |
| | | | | Note unused bytes read as zero. For example a read of 1 byte will return bits 31:8 as zero.<br>(Read Only Register) |
| | | Miscellaneous | | |
| 0x700-0x73C | InterruptSrcSelect[15:0] | 16x6 | 0x00 | Interrupt source select.1 register per interrupt output. Determines the source of the interrupt for each interrupt connection to the interrupt controller.<br>Input pins to the DeGlitch circuits are selected by the DeGlitchPinSelect register.<br>See Table 75 selection mode details.<br>Other values are reserved and unused. |
| 0x780 | WakeUpDetected | 16 | 0x0000 | Indicates active wakeups (wakeup levels) or detected wakeup events (wakeup edges).<br>One bit per interrupt output (gpio_icu_irq[15:0]). All bits are ORed together to generate a 1-bit wakeup state to the CPR (gpio_cpr_wakeup).<br>(Read Only Register) |
| 0x784 | WakeUpDetectedClr | 16 | 0x0000 | Wakeup detect clear register. If written with a 1 it clears corresponding WakeUpDetected bit.<br>Note the CPU clear has a lower priority than a wakeup event. Note that if the wakeup condition is a level and still exists, the bit will remain set.<br>This register always reads as zero.<br>(Write Only Register) |
| 0x788 | WakeUpInputMask | 16 | 0x0000 | Wakeup detect input mask. Masks the setting of the WakeUpDetected register bits. When a bit is set to 1 the corresponding WakeUpDetected bit is set when the wakeup condition is met. When a bit is 0 the wakeup condition is masked, and does not set a WakeUpDetected bit. |
| 0x78C | WakeUpCondition | 32 | 0x0000_0000 | Defines the wakeup condition used to set the WakeUpDetected register. 2 bits per interrupt output (gpio_icu_irq[15:0]) decoded as:<br>00 - Positive edge detect<br>01 - Positive level detect<br>10 - Negative edge detect<br>11 - Negative level detect<br>Bits 1:0 control gpio_icu_irq[0], bits 3:2 control gpio_icu_irq[1] etc. |
| 0x794 | USBOverCurrentEnable | 3 | 0x0 | Enables the USB over current signals to the UHU block.<br>0 - USB Over current disabled<br>1 - USB Over current enabled. |
| 0x798 | SoPECSel | 3 | N/A | Indicates the SoPEC mode selected by bondout options over 3 pads. When the 3 pads are unbonded as in the current package, the value is 111 (reads as 7).<br>(Read Only Register) |
| | | Debug | | |
| 0x7E0-0x7E8 | MCMasCount[2:0] | 3x16 | 0x0000 | Motor master clock counter values.<br>Bus 0 - Master clock count 0<br>Bus 1 - Master clock count 1<br>Bus 2 - Master clock count 2<br>(Read Only Register) |
| 0x7EC | DebugSelect[10:2] | 9 | 0x00 | Debug address select. Indicates the address of the register to report on the gpio_cpu_data bus when it is not otherwise being used. |

14.16.2.1 Supervisor and User Mode Access

The configuration registers block examines the CPU access type (cpu_acode signal) and determines if the access is allowed to the addressed register, based on configured user access registers (as shown in Table 69). If an access is not allowed the GPIO issues a bus error by asserting the gpio_cpu_berr signal.

All supervisor and user program mode accesses results in a bus error.

Access to the CpuIODirection, CpuIOOut and CpuIOIn is filtered by the CpuIOUserModeMask and CpuIOSuperModeMask registers. Each bit masks access to the corresponding bits in the CpuIO* registers for each mode, with CpuIOUserModeMask filtering user data mode access and CpuIOSuperModeMask filtering supervisor data mode access.

The addition of the CpuIOSuperModeMask register helps prevent potential conflicts between user and supervisor code read-modify-write operations. For example a conflict could exist if the user code is interrupted during a read-modify-write operation by a supervisor ISR which also modifies the CpuIO* registers.

An attempt to write to a disabled bit in user or supervisor mode is ignored, and an attempt to read a disabled bit returns zero. If there are no user mode enabled bits for the addressed register then access is not allowed in user mode and a bus error is issued. Similarly for supervisor mode.

When writing to the CpuIOOut, CpuIODirection, BLDCBrake or BLDCDirection registers, the value being written is XORed with the current value in the register to produce the new value. In the case of the CpuIOOut the result is reflected on the GPIO pins.

The pseudocode for determining access to the CpuIOOut [0] register is shown below. Similar code could be shown for the CpuIODirection and CpuIOIn registers.

```
if (cpu_acode == SUPERVISOR_DATA_MODE) then
   // supervisor mode
   if (CpuIOSuperModeMask[0][31:0] == 0) then
      // access is denied, and bus error
      gpio_cpu_berr = 1
   elsif (cpu_rwn == 1) then
      // read mode (no filtering needed)
      gpio_cpu_data[31:0] = CpuIOOut[0][31:0]
   else
      // write mode, filtered by mask
      mask[31:0]            = (cpu_dataout[0][31:0] &
CpuIOSuperModeMask[0][31:0])
      CpuIOOut[0][31:0]     = (cpu_dataout[0][31:0] ^ mask[31:0])
// bitwise XOR operator
elsif (cpu_acode == USER_DATA_MODE) then
   // user datamode
   if (CpuIOUserModeMask[0][31:0] == 0) then
      // access is denied, and bus error
      gpio_cpu_berr = 1
   elsif (cpu_rwn == 1) then
      // read mode, filtered by mask
      gpio_cpu_data[31:0] = ( CpuIOOut[0][31:0] &
      CpuIOUserModeMask[0][31:0])
   else
      // write mode, filtered by mask
      mask[31:0]            = (cpu_dataout[0][31:0] &
CpuIOUserModeMask[0][31:0])
      CpuIOOut[0][31:0]     = (cpu_dataout[0][31:0] ^ mask[31:0] )
// bitwise XOR operator
else
   // access is denied, bus error
   gpio_cpu_berr = 1
```

The PMLastPeriod register has limited write access enabled by the PMLastPeriodWrEn register. If the PMLastPeriodWrEn is not set any attempt to write to PMLastPeriod register has no effect and no bus error is generated (assuming the access permissions allowed an access). The PMLastPeriod register read access is unaffected by the PMLastPeriodWrEn register is governed by normal user and supervisor access rules.

Table 69 details the access modes allowed for registers in the GPIO block. In supervisor mode all registers are accessible. In user mode forbidden accesses result in a bus error (gpio_cpu_berr asserted).

TABLE 69

GPIO supervisor and user access modes

| Register Name | Access Permitted |
|---|---|
| IOModeSelect[63:0] | Supervisor data mode only |
| MMIPinSelect[63:0] | Supervisor data mode only |
| DeGlitchPinSelect[23:0] | Supervisor data mode only |
| IOPinInvert[1:0] | Supervisor data mode only |
| Reset | Supervisor data mode only |
| CPU IO Control | |
| CpuIOUserModeMask[1:0] | Supervisor data mode only |
| CpuIOSuperModeMask[1:0] | Supervisor data mode only |
| CpuIODirection[1:0] | CpuIOUserModeMask and CpuIOSuperModeMask filtered |
| CpuIOOut[1:0] | CpuIOUserModeMask and CpuIOSuperModeMask filtered |
| CpuIOIn[1:0] | CpuIOUserModeMask and CpuIOSuperModeMask filtered |
| CpuDeGlitchUserModeMask | Supervisor data mode only |
| CpuIOInDeglitch | CpuDeGlitchUserModeMask filtered. Unrestricted supervisor data mode access |
| Deglitch control | |
| DeGlitchSelect[23:0] | Supervisor data mode only |
| DeGlitchCount[3:0] | Supervisor data mode only |
| DeGlitchClkSrc[3:0] | Supervisor data mode only |
| DeGlitchFormSelect | Supervisor data mode only |
| PulseDiv[3:0] | Supervisor data mode only |
| Motor Control | |
| MCUserModeEnable | Supervisor data mode only |
| MCMasClockEnable | MCUserModeEnable enabled |
| MCCutoutEn | MCUserModeEnable enabled |
| MCMasClkPeriod[2:0] | MCUserModeEnable enabled |
| MCMasClkSrc[2:0] | MCUserModeEnable enabled |
| MCConfig[5:0] | MCUserModeEnable enabled |
| MCMasClkSelect[5:0] | MCUserModeEnable enabled |
| BLDC Motor Controllers | |
| BLDCMode | MCUserModeEnable enabled |
| BLDCDirection | MCUserModeEnable enabled |
| BLDCBrake | MCUserModeEnable enabled |
| LED control | |
| LEDUserModeEnable | Supervisor data mode only |
| LEDDutySelect[3:0] | LEDUserModeEnable[3:0] enabled |
| Period Measure | |
| PMUserModeEnable | Supervisor data mode only |
| PMCntSrcSelect[1:0] | Supervisor data mode only |
| PMInputModeSel[1:0] | Supervisor data mode only |
| PMLastPeriodWrEn | Supervisor data mode only |
| PMLastPeriod[1:0] | PMUserModeEnable[1:0] enabled, (write controlled by PMLastPeriodWrEn[1:0]) |
| PMCount[1:0] | PMUserModeEnable[1:0] enabled |
| Frequency Modifier | |
| FMUserModeEnable | Supervisor data mode only |
| FMBypass | FMUserModeEnable enabled |
| FMLsyncHigh | FMUserModeEnable enabled |
| FMLsyncDelay | FMUserModeEnable enabled |
| FMFiltCoeff[4:0] | FMUserModeEnable enabled |
| FMNcoFreqSrc | FMUserModeEnable enabled |
| FMKConst | FMUserModeEnable enabled |

TABLE 69-continued

| GPIO supervisor and user access modes | |
|---|---|
| Register Name | Access Permitted |
| FMNCOFreq | FMUserModeEnable enabled |
| FMNCOMax | FMUserModeEnable enabled |
| FMNCOEnable | FMUserModeEnable enabled |
| FMFreqEst | FMUserModeEnable enabled |
| FMFiltOut | FMUserModeEnable enabled |
| FMStatus | FMUserModeEnable enabled |
| FMStatusClear | FMUserModeEnable enabled |
| FMIIRDelay[1:0] | FMUserModeEnable enabled |
| FMDivideOutput | FMUserModeEnable enabled |
| FMFilterOutput | FMUserModeEnable enabled |
| UART Control | |
| UartUserModeEnable | Supervisor data mode only |
| UartControl | UartUserModeEnable enabled |
| UartStatus | UartUserModeEnable enabled |
| UartIntClear | UartUserModeEnable enabled |
| UartIntMask | UartUserModeEnable enabled |
| UartScalar | UartUserModeEnable enabled |
| UartTXData[3:0] | UartUserModeEnable enabled |
| UartRXData[3:0] | UartUserModeEnable enabled |
| Miscellaneous | |
| InterruptSrcSelect[15:0] | Supervisor data mode only |
| WakeUpDetected | Supervisor data mode only |
| WakeUpDetectedClr | Supervisor data mode only |
| WakeUpInputMask | Supervisor data mode only |
| WakeUpCondition | Supervisor data mode only |
| USBOverCurrentEnable | Supervisor data mode only |
| SoPECSel | Supervisor data mode only |

14.16.3 GPIO Partition

14.16.4 Leon Uart

Note the following description contains excerpts from the Leon-2 Users Manual.

Figure 51:
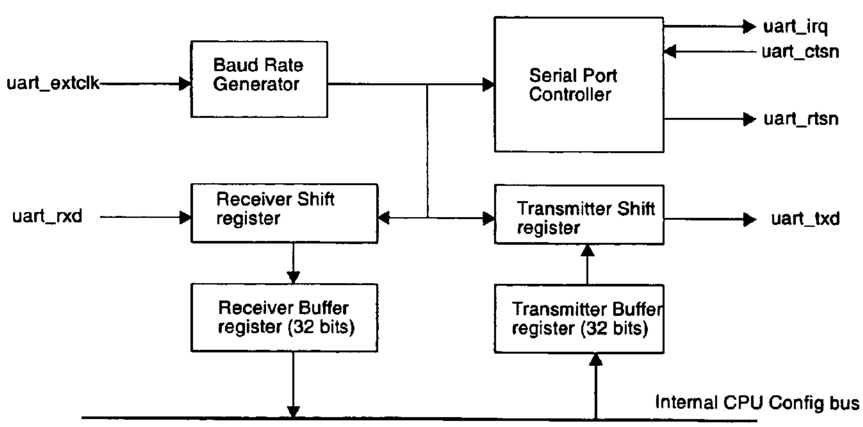
Figure 52:
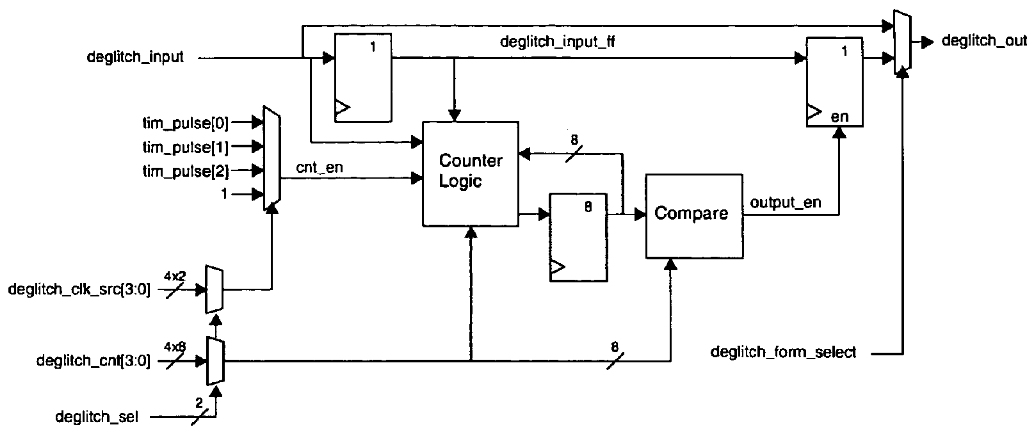
Figure 53:
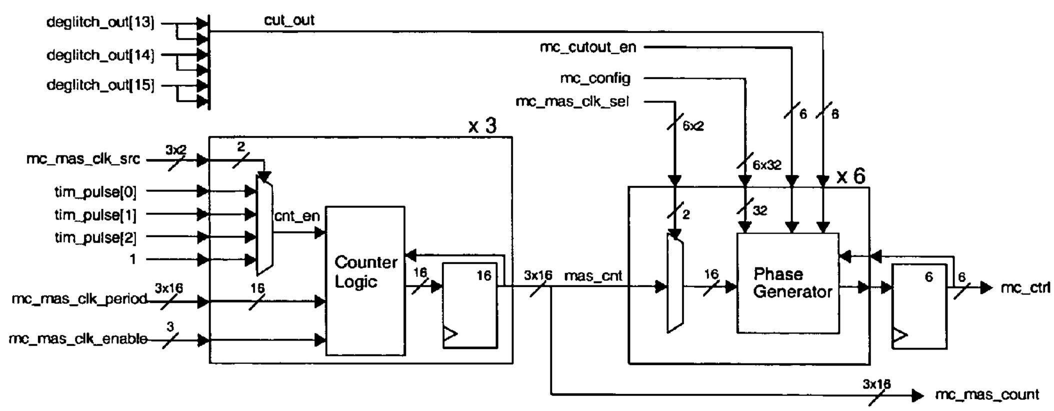
Figure 54:
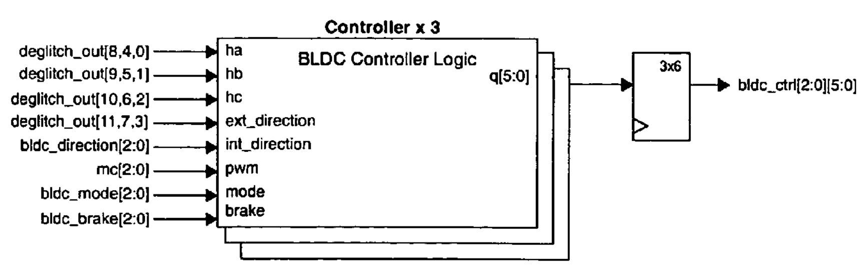
Figure 55:
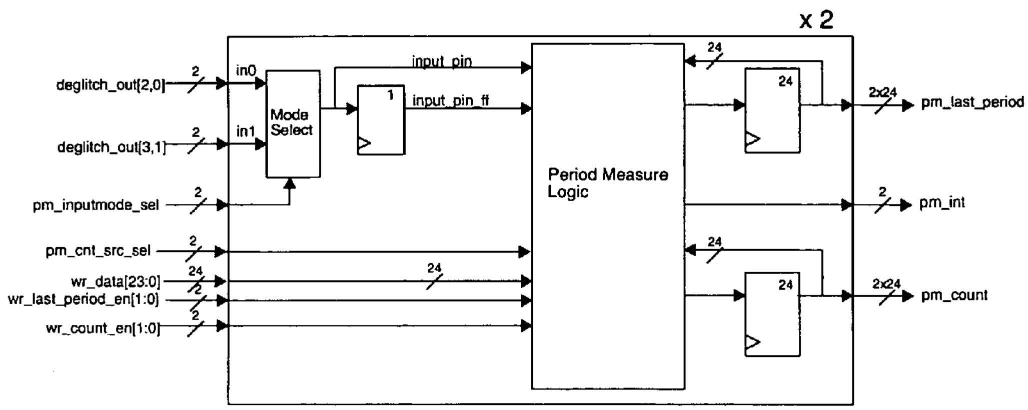
Figure 56:
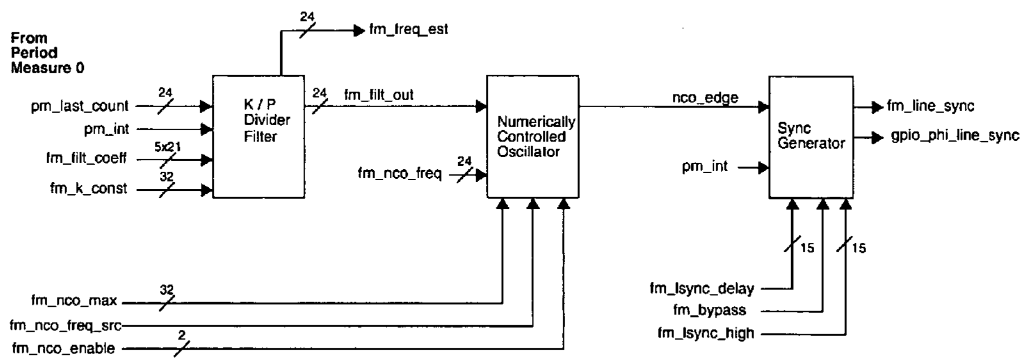
Figure 57:
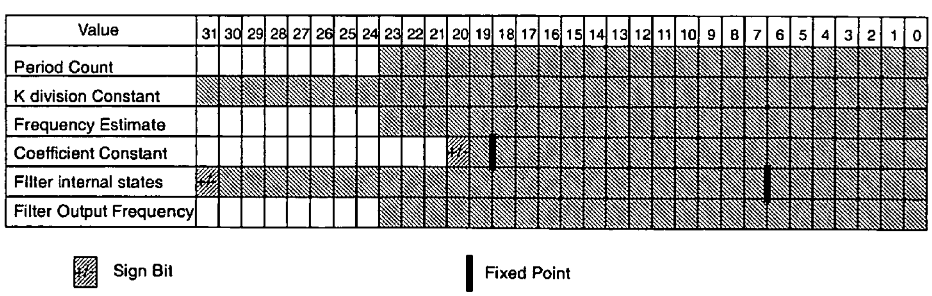
Figure 58:
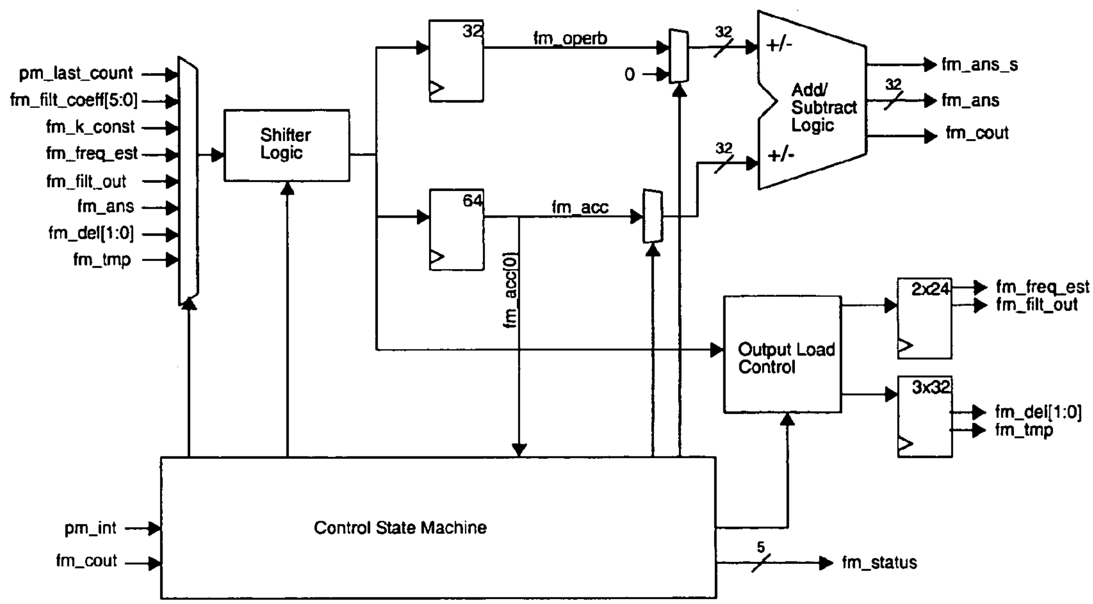
Figure 59:
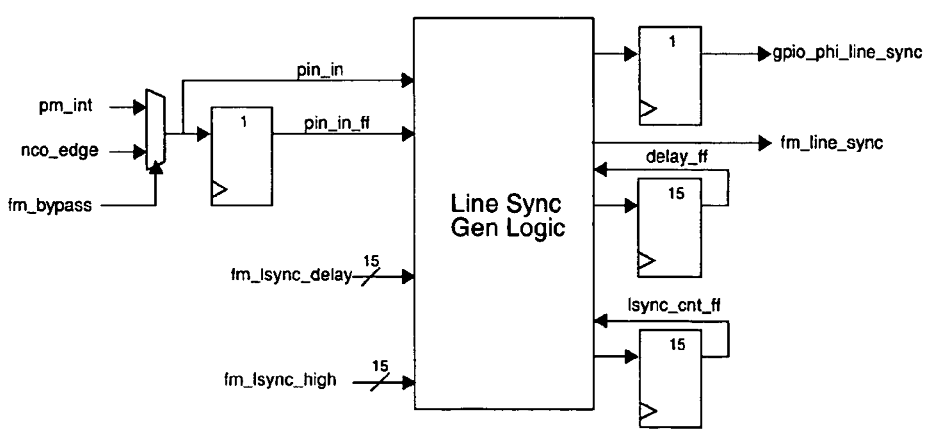
Figure 60:
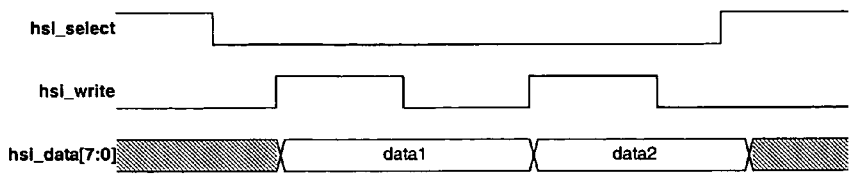
Figure 61:
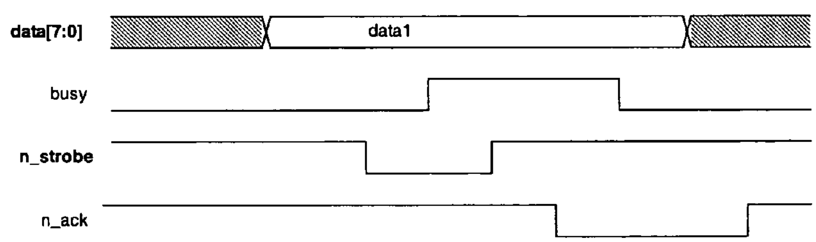
Figure 62:
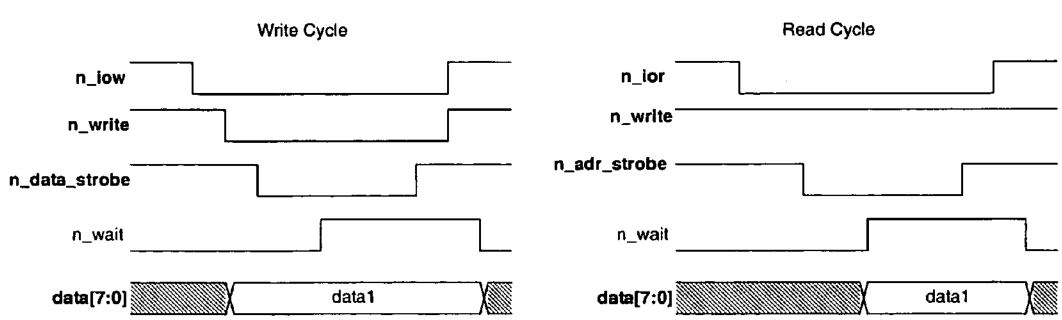
Figure 63:
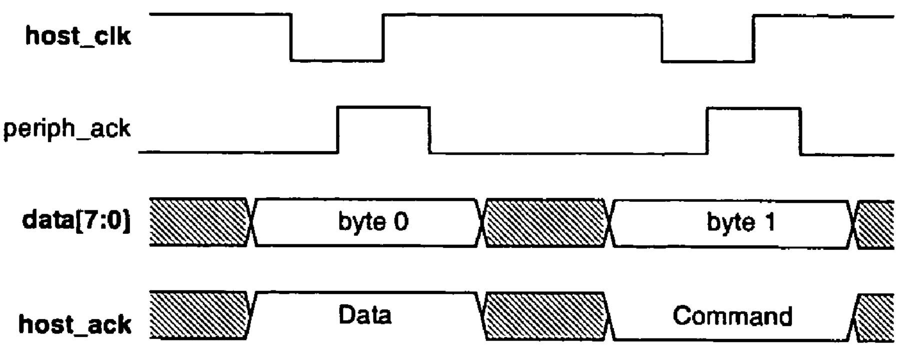
Figure 64:
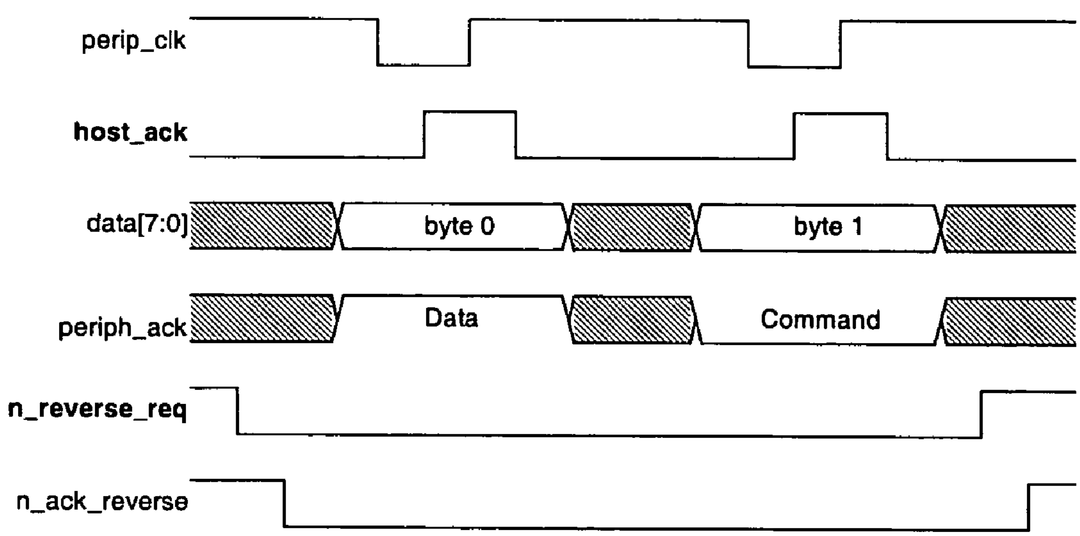
Figure 65:
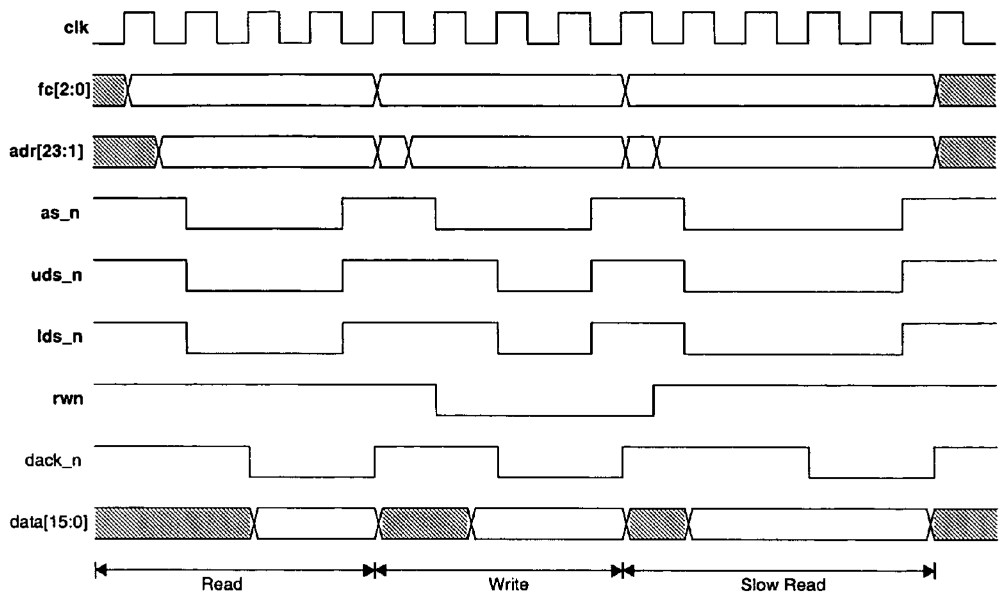
Figure 66:
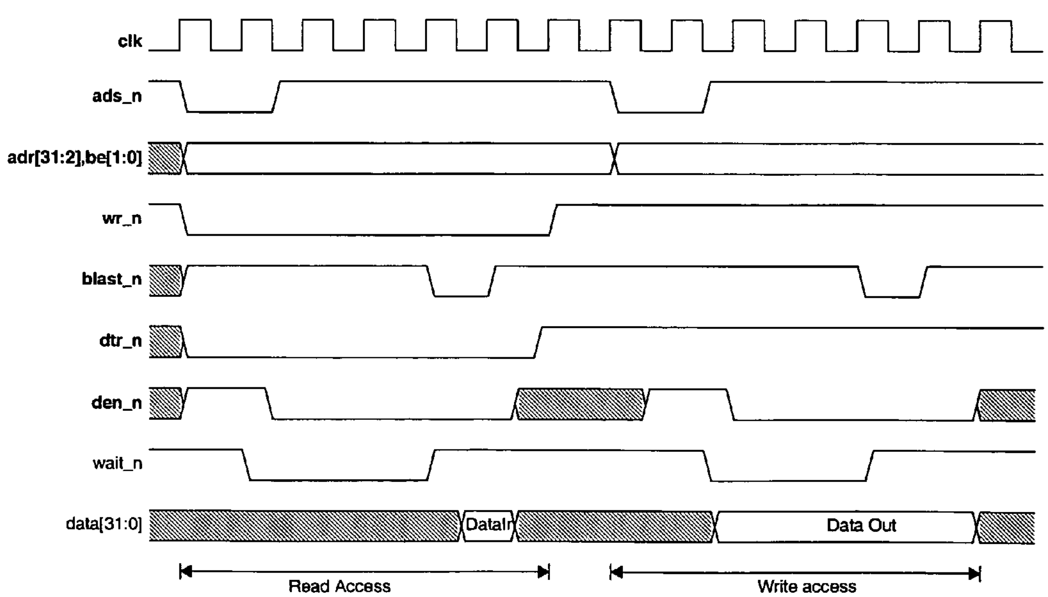
Figure 67:
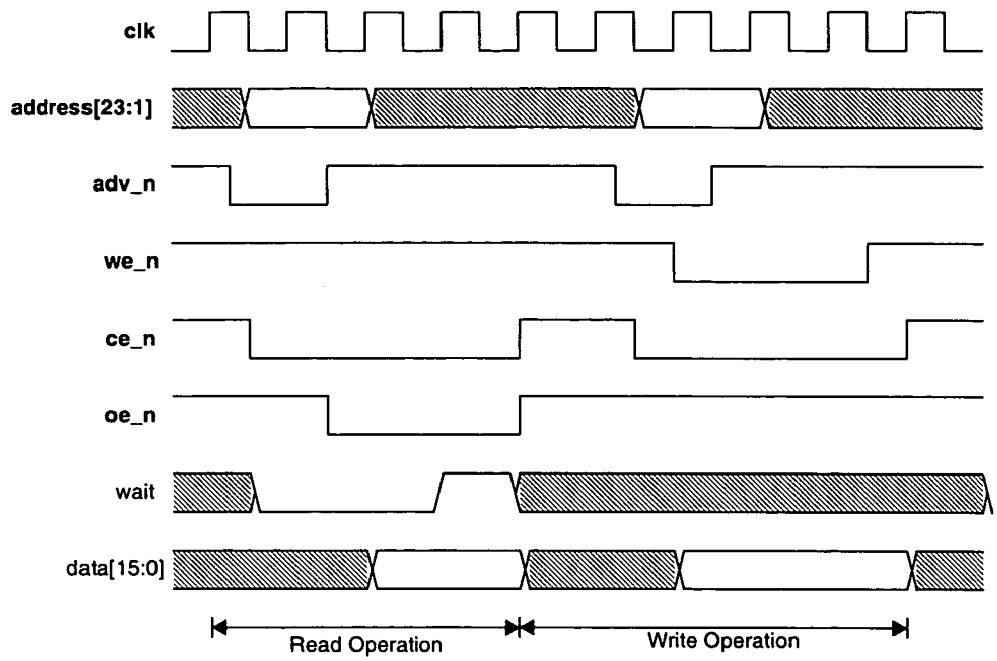
Figure 68:
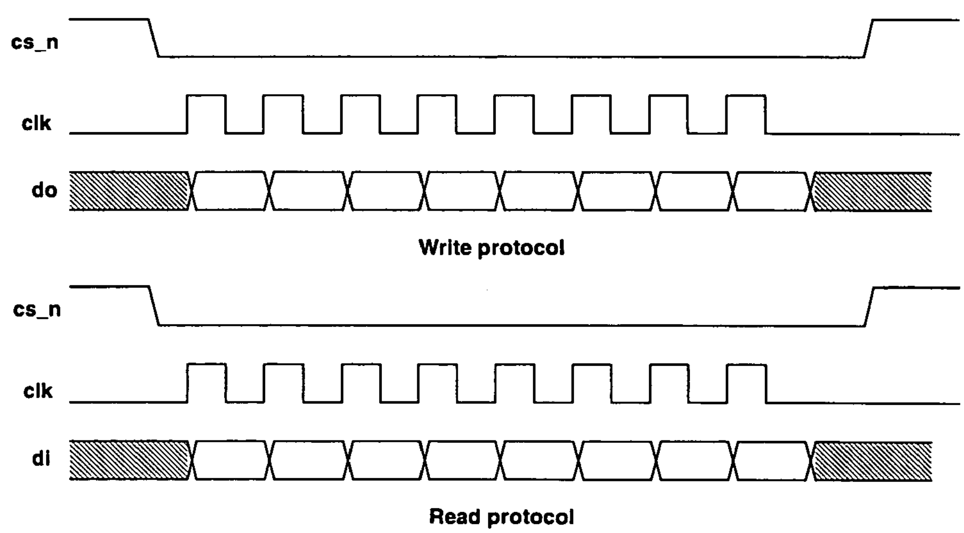
Figure 69:
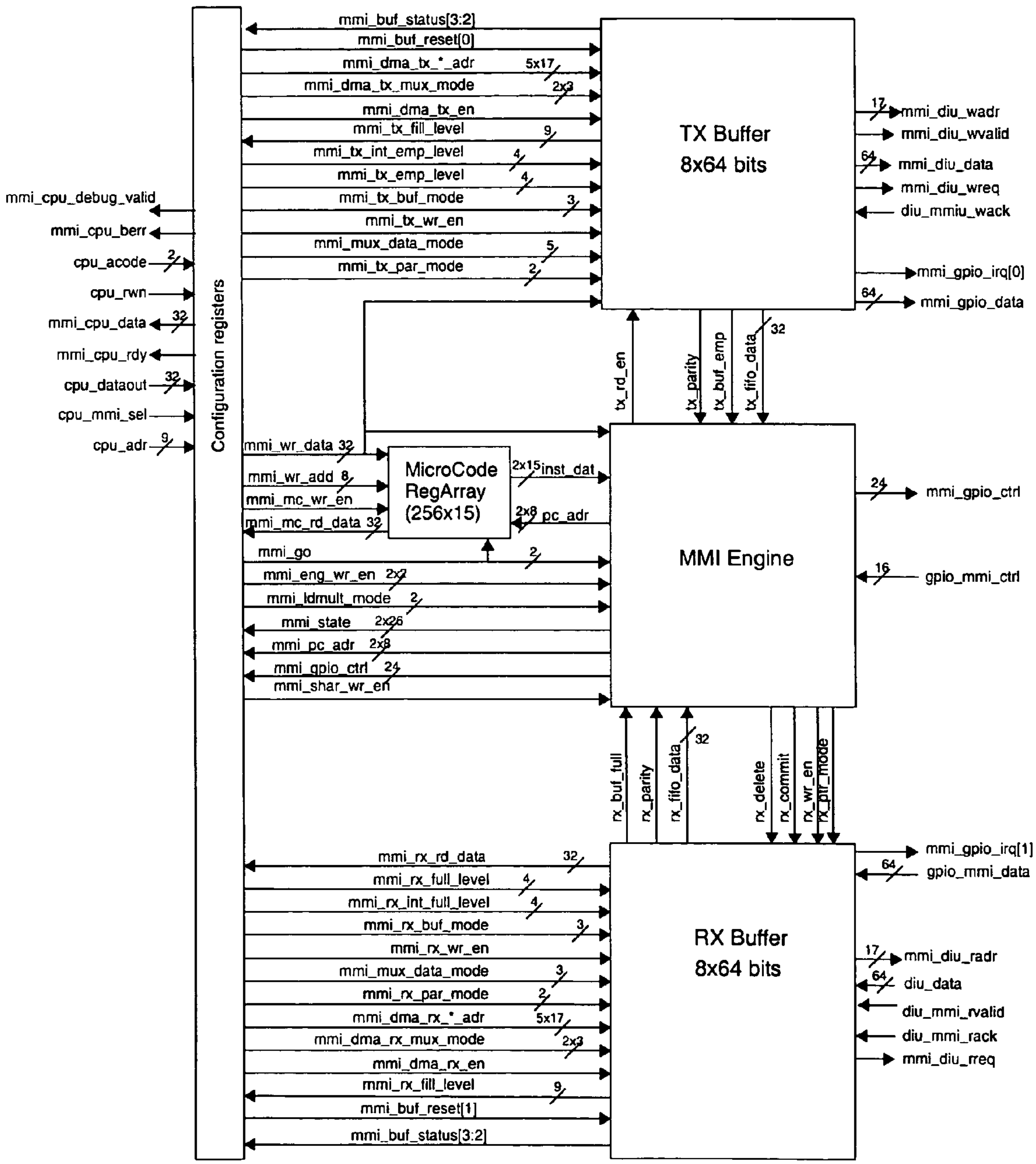
Figure 70:
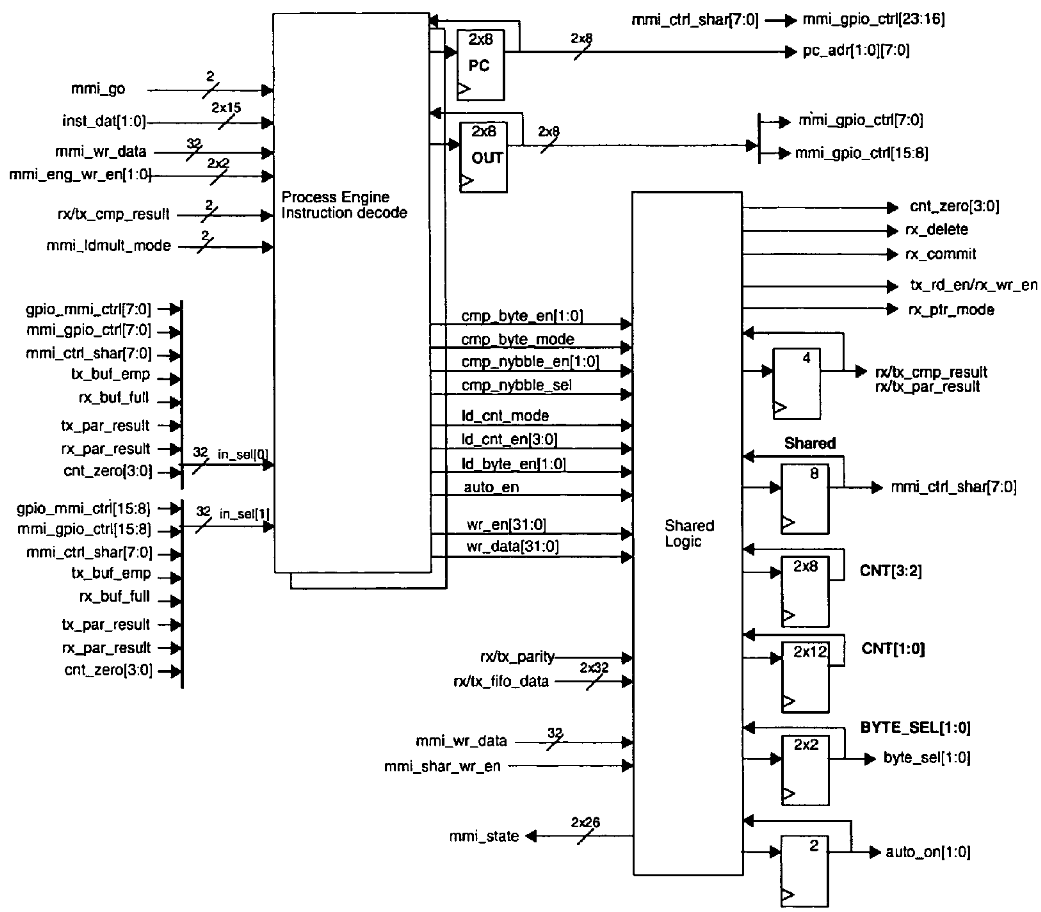
Figures 71, 72:
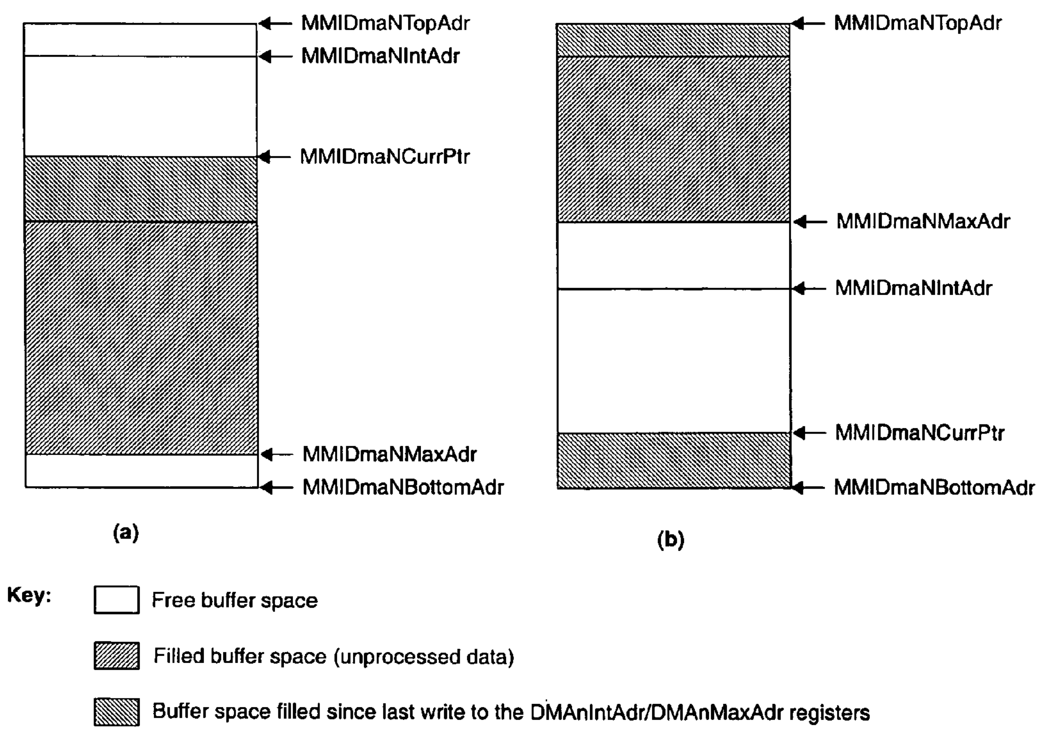
Figure 73:
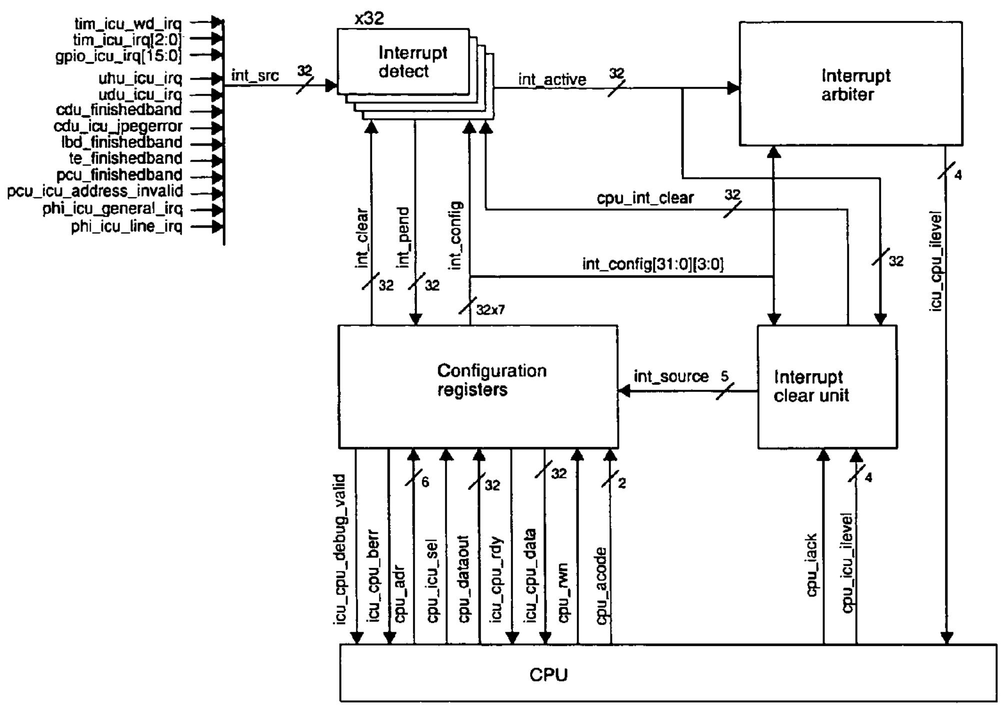
Figure 74:
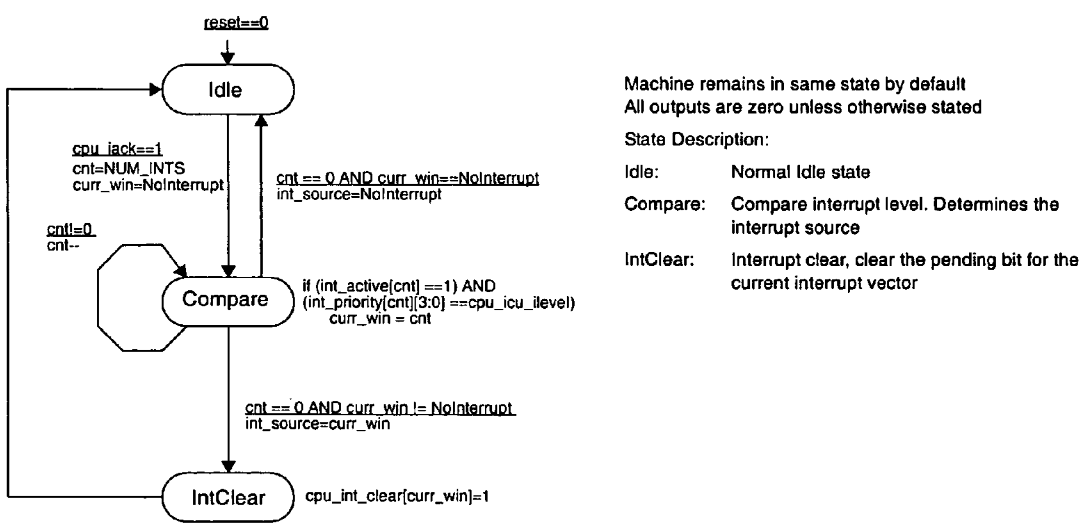
Figure 75:
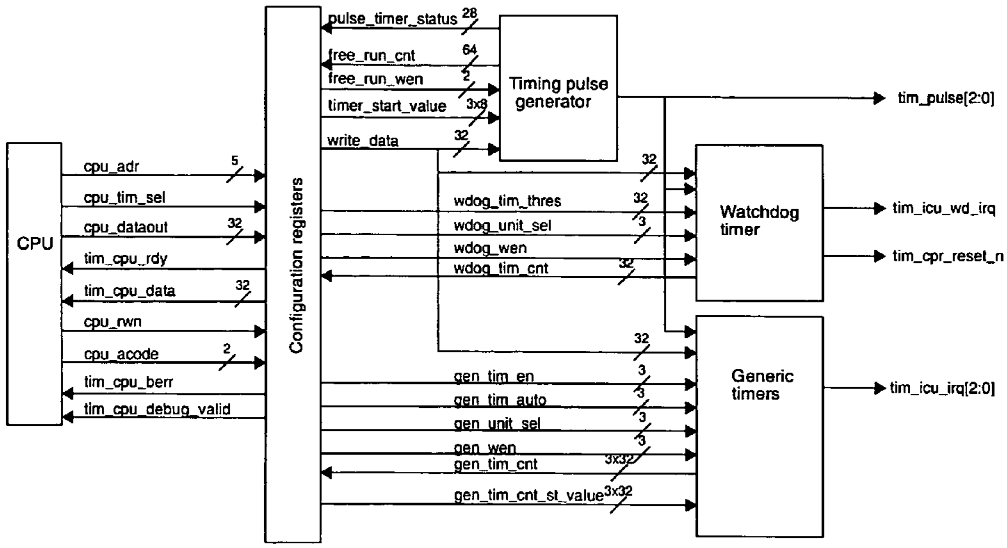
Figure 76:
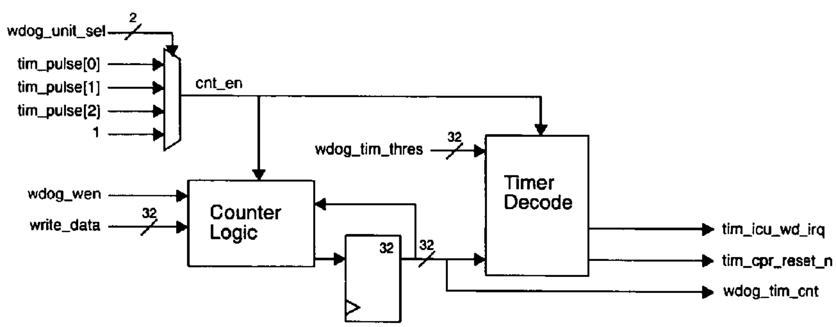
Figure 77:
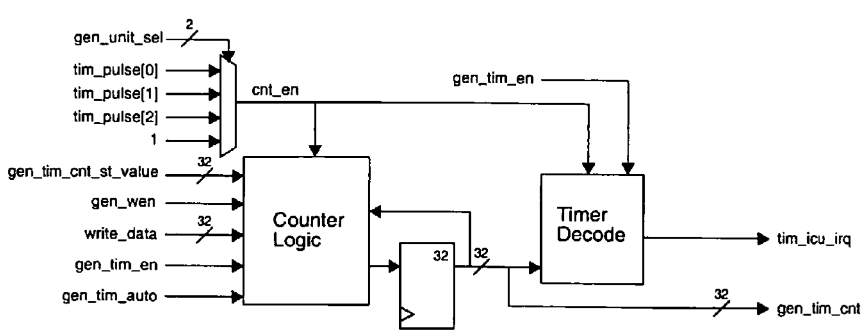
Figure 78:
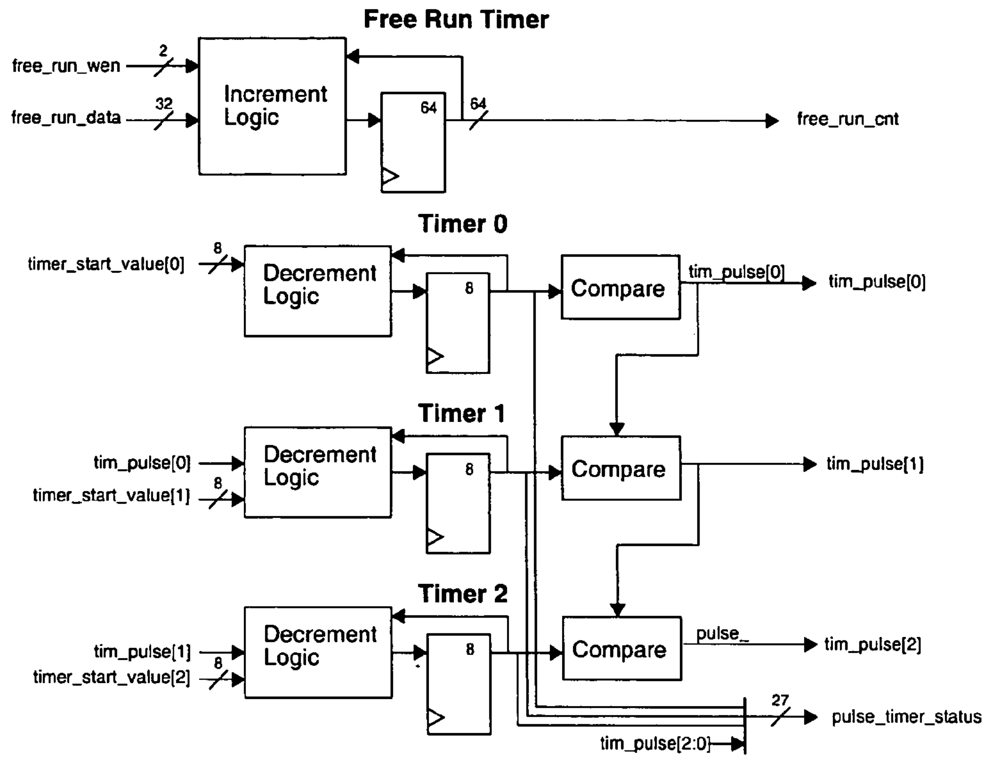
Figure 79:
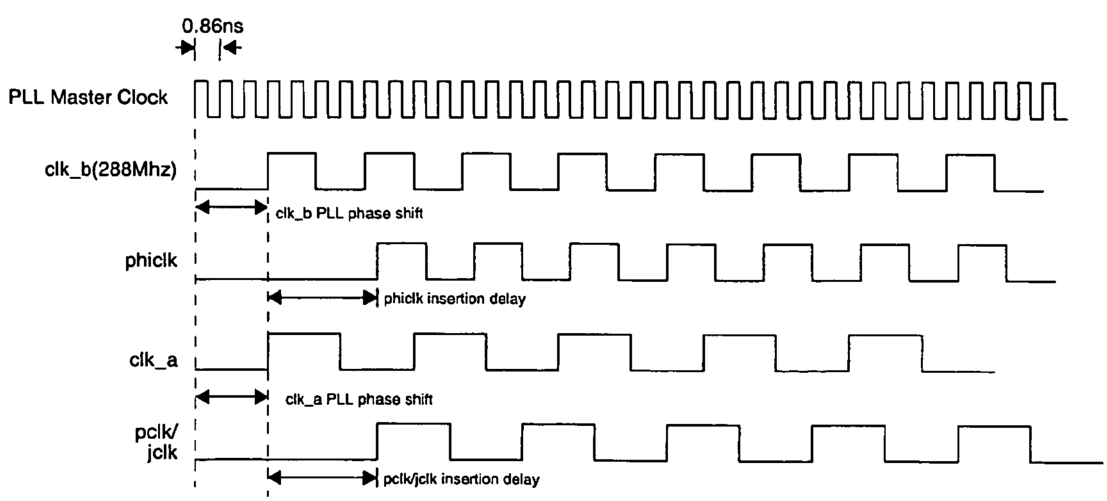
Figure 80:
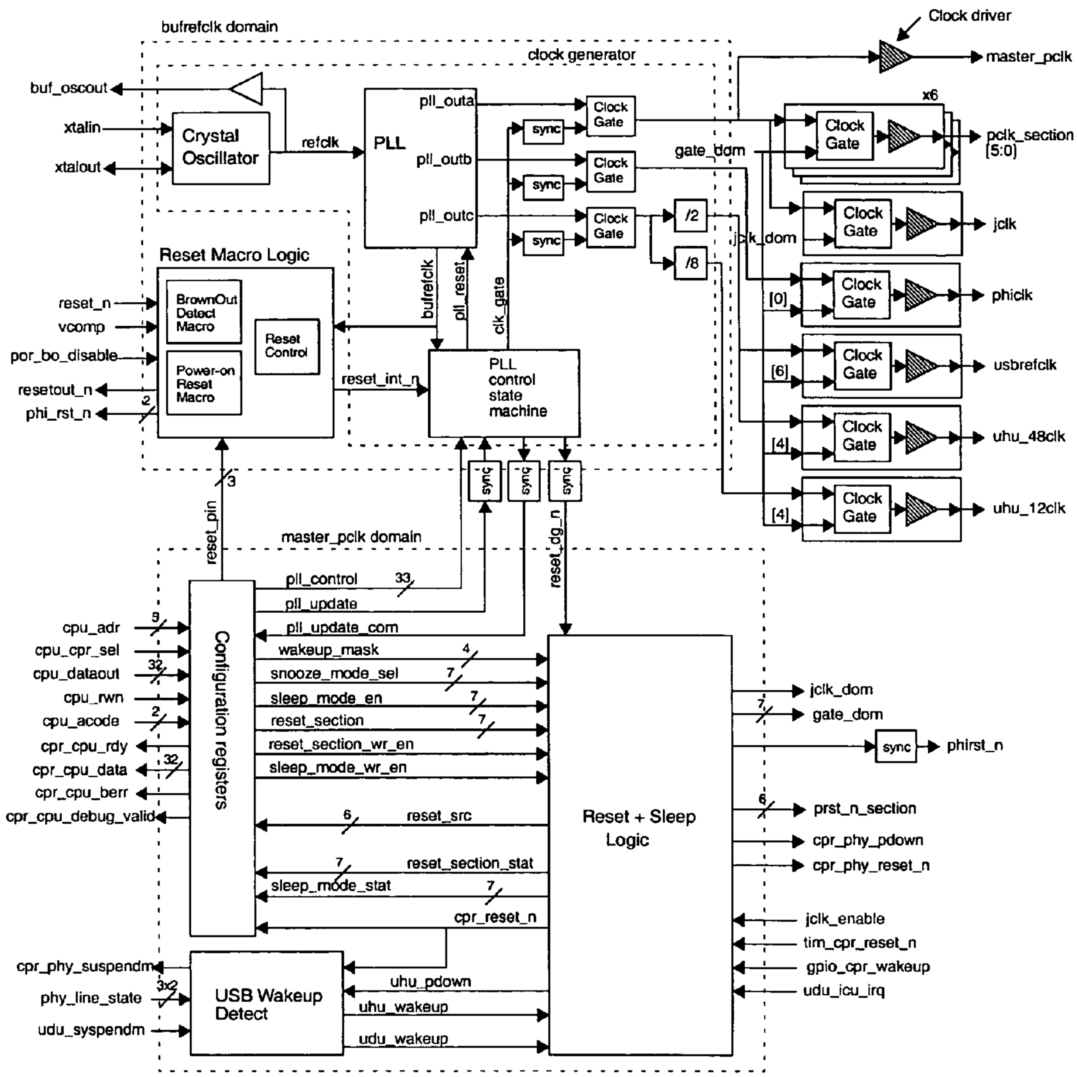
Figure 81:
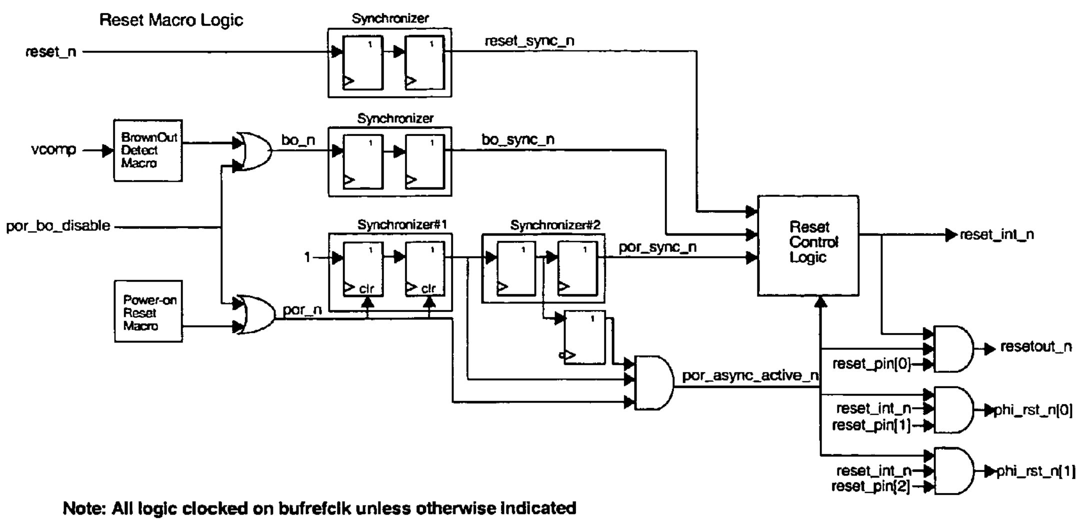
Figure 82:
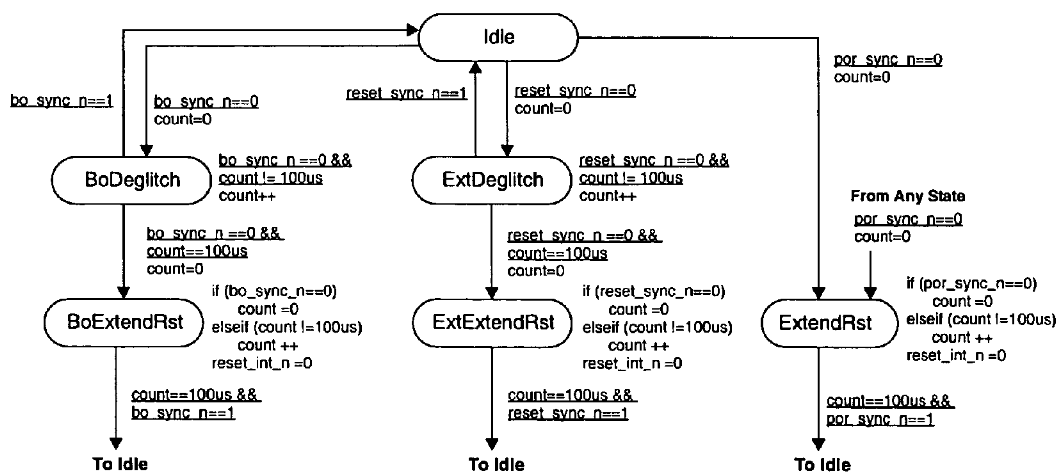
Figure 83:
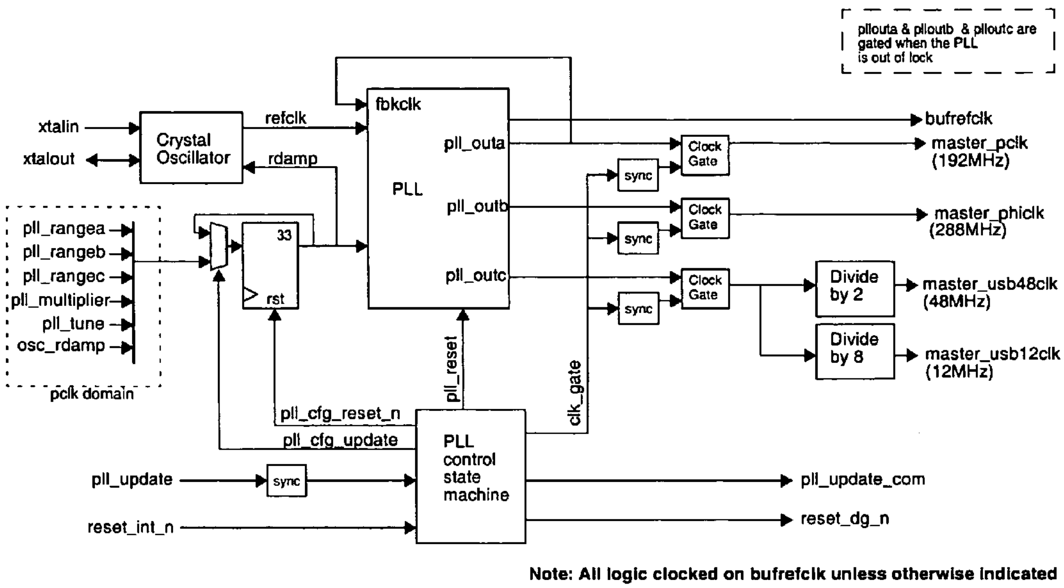
Figure 84:
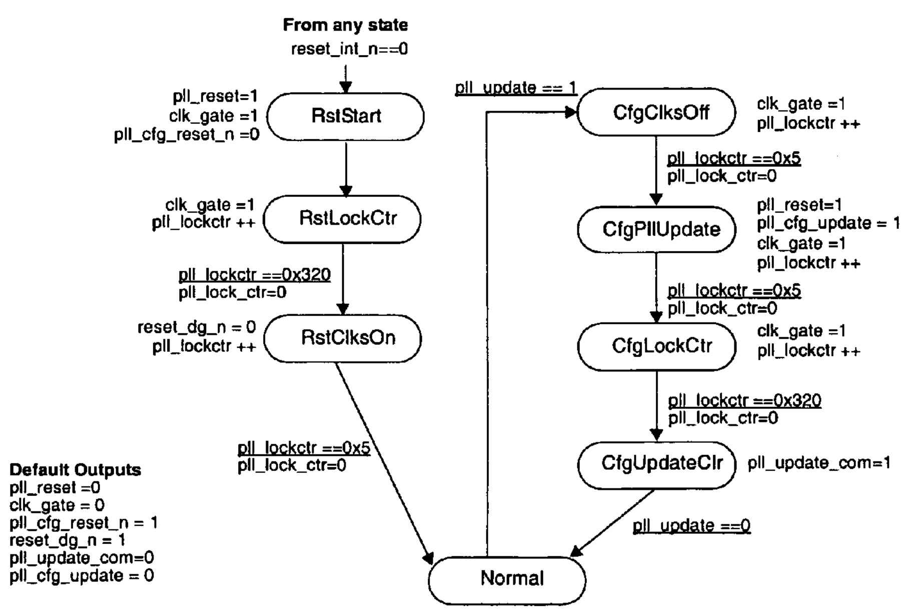
Figure 85:
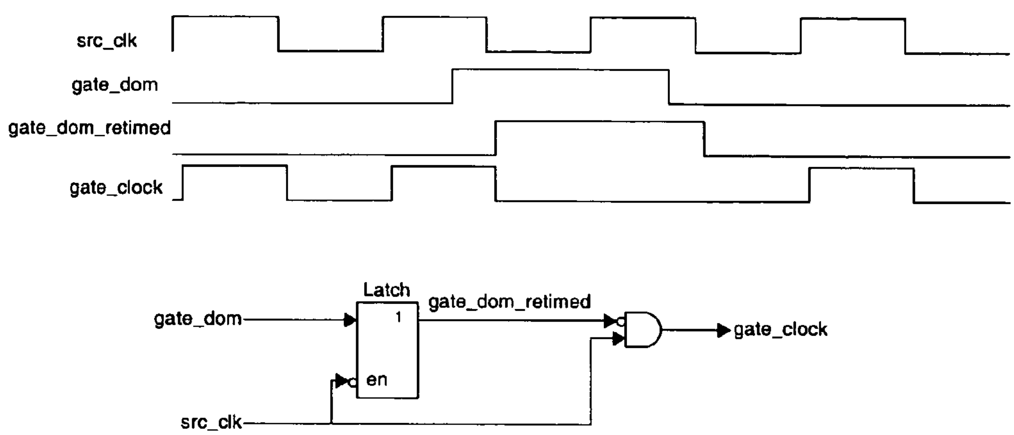
Figure 86:
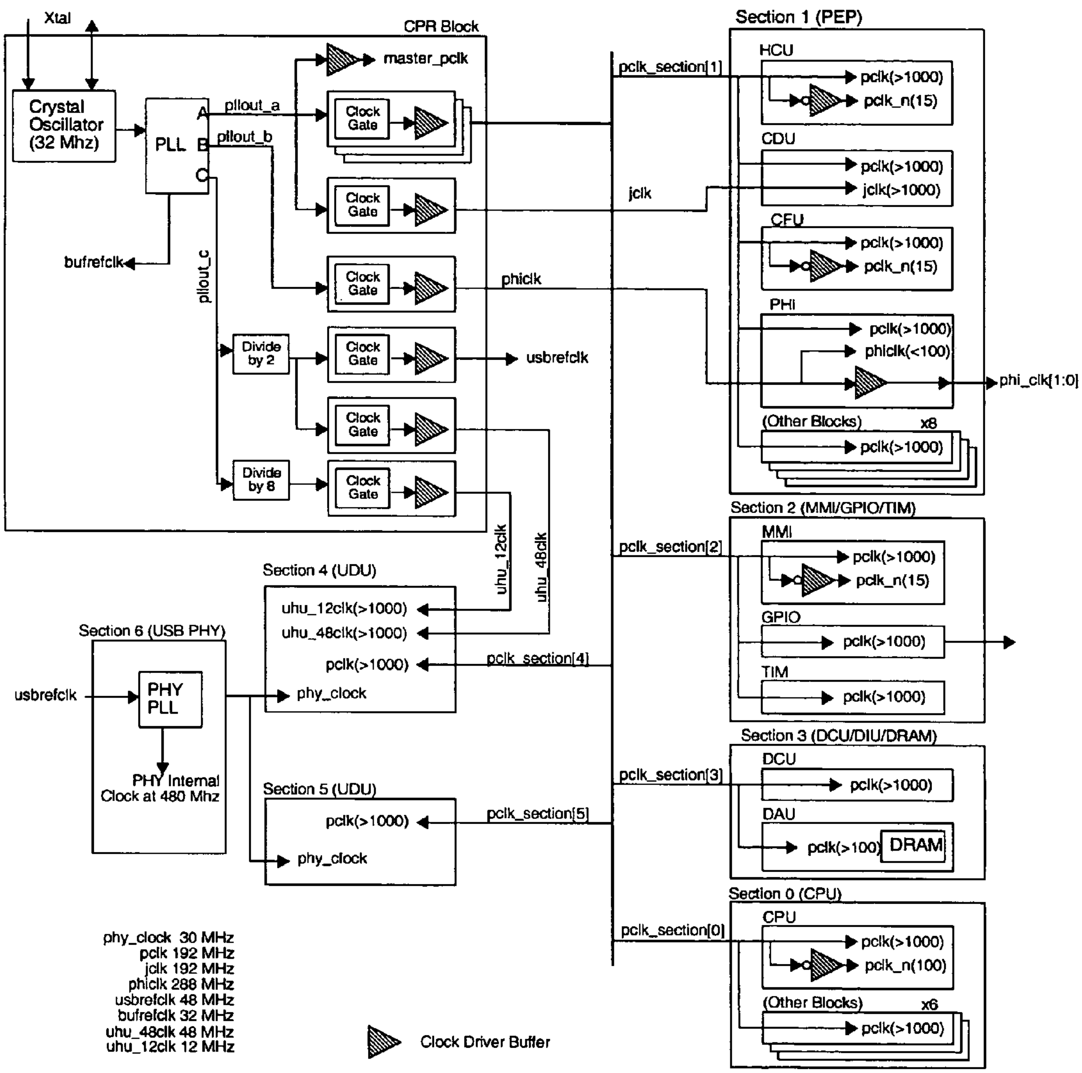
Figure 87:
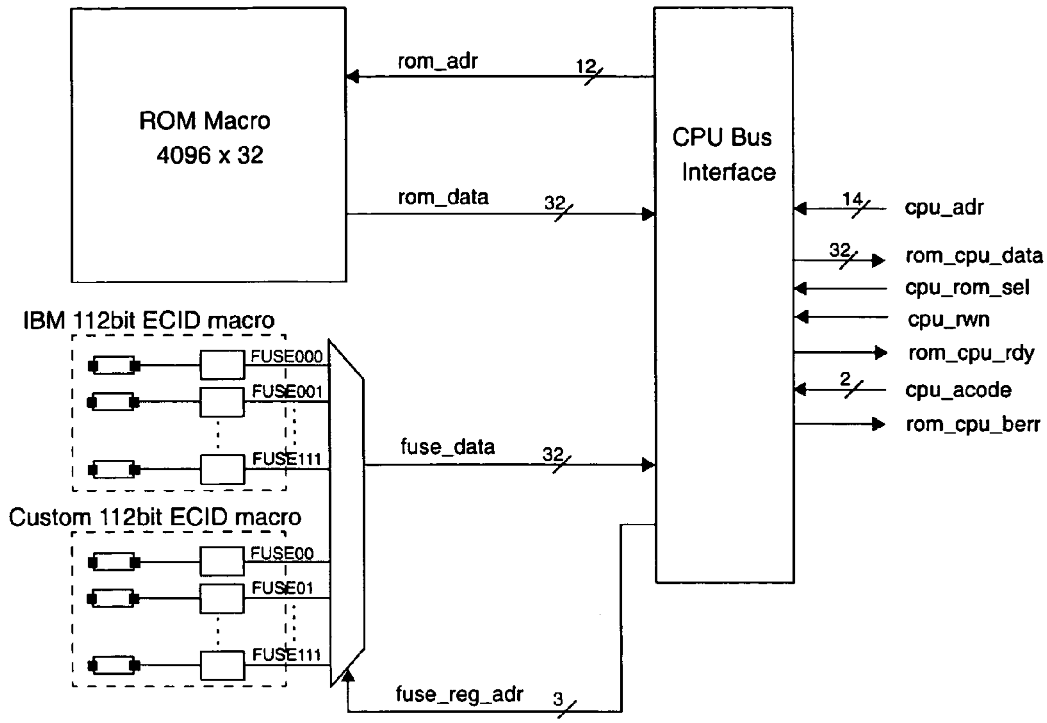

The UART supports data frames with 8 data bits, one optional parity bit and one stop bit. To generate the bitrate, each UART has a programmable 16-bit clock divider. Hardware flow-control is supported through the RTSN/CTSN hand-shake signals. FIG. 51 shows a block diagram of the UART.

Transmitter Operation

The transmitter is enabled through the TE bit in the UartControl register. When ready to transmit, data is transferred from the transmitter buffer register (Tx Buffer) to the transmitter shift register and converted to a serial stream on the transmitter serial output pin (uart_txd). It automatically sends a start bit followed by eight data bits, an optional parity bit, and one stop bit. The least significant bit of the data is sent first.

Following the transmission of the stop bit, if a new character is not available in the TX Buffer register, the transmitter serial data output remains high and the transmitter shift register empty bit (TSRE) will be set in the UART control register. Transmission resumes and the TSRE is cleared when a new character is loaded in the Tx Buffer register. If the transmitter is disabled, it will continue operating until the character currently being transmitted is completely sent out. The Tx Buffer register cannot be loaded when the transmitter is disabled. If flow control is enabled, the uart_ctsn input must be low in order for the character to be transmitted. If it is deasserted in the middle of a transmission, the character in the shift register is transmitted and the transmitter serial output then remains inactive until uart_ctsn is asserted again. If the uart_ctsn is connected to a receivers uart_rtsn, overflow can effectively be prevented.

The Tx Buffer is 32-bits wide which means that the CPU can write a maximum of 4 bytes at anytime. If the Tx Buffer is full, and the CPU attempts to perform a write to it, the transmitter overflow (tx_overflow) sticky bit in the UartStatus register is set (possibly generating an interrupt). This can only be cleared by writing a 1 to the corresponding bit in the UartIntClear register.

The CPU writes to the appropriate address of 4 TX buffer addresses (UartTXdata[3:0]) to indicate the number of bytes that it wishes to load in the TX Buffer but physically this write is to a single register regardless of the address used for the write. The CPU can determine the number of valid bytes present in the buffer by reading the UartStatus register. A CPU read of any of the TX buffer register addresses will return the next 4 bytes to be transmitted by the UART. As the UART transmits bytes, the remaining valid bytes in the TX buffer are shifted down to the least significant byte, and new bytes written are added to the TX buffer after the last valid byte in the TX buffer.

For example if the TX buffer contains 2 valid bytes (TX buffer reads as 0x0000AABB), and the CPU writes 0x0000CCDD to UartTXData[0], the buffer will then contain 3 valid bytes and will read as 0x00DDAABB. If the UART then transmits a byte the new TX buffer will have 2 valid bytes and will read as 0x0000DDAA.

Receiver Operation

The receiver is enabled for data reception through the receiver enable (RE) bit in the UartControl register. The receiver looks for a high to low transition of a start bit on the receiver serial data input pin. If a transition is detected, the state of the serial input is sampled a half bit clock later. If the serial input is sampled high the start bit is invalid and the search for a valid start bit continues. If the serial input is still low, a valid start bit is assumed and the receiver continues to sample the serial input at one bit time intervals (at the theoretical centre of the bit) until the proper number of data bits and the parity bit have been assembled and one stop bit has been detected. The serial input is shifted through an 8-bit shift register where all bits must have the same value before the new value is taken into account, effectively forming a low-pass filter with a cut-off frequency of ⅛ system clock.

During reception, the least significant bit is received first. The data is then transferred to the receiver buffer register (Rx buffer) and the data ready (DR) bit is set in the UART status register. The parity and framing error bits are set at the received byte boundary, at the same time as the receiver ready bit is set. If both Rx buffer and shift registers contain an un-read character (i.e. both registers are full) when a new start bit is detected, then the character held in the receiver shift register is lost and the rx overflow bit is set in the UART status register (possibly generating an interrupt). This can only be cleared by writing a 1 to the corresponding bit in the UartIntClear register. If flow control is enabled, then the uart_rtsn will be negated (high) when a valid start bit is detected and the Px buffer register is full. When the Rx buffer register is read, the uart_rtsn is automatically reasserted again.

The Rx Buffer is 32-bits wide which means that the CPU can read a maximum of 4 bytes at anytime. If the Rx Buffer is not full, and the CPU attempts to read more than the number of valid bytes contained in it, the receiver underflow (rx underflow) sticky bit in the UartStatus register is asserted (possibly generating an interrupt). This can only be cleared writing a 1 to the corresponding bit in the UartIntClear register.

The CPU reads from the appropriate address of 4 RX buffer addresses (UartRXdata[3:0]) to indicate the number of bytes that it wishes to read from the RX Buffer but the read is from a single register regardless of the address used for the read. The CPU can determine the number of valid bytes present in the RX buffer by reading the UartStatus register.

The UART receiver implements a FIFO style buffer. As bytes are received in the UART they are stored in the most significant byte of the buffer. When the CPU reads the RX buffer it reads the least significant bytes. For example if the Rx buffer contains 2 valid bytes (0x0000AABB) and the UART adds a new byte 0xCC the new value will be 0x00CCAABB. If the CPU then reads 2 valid bytes (by reading UartRXData[1] address) the CPU read value will be 0x0000AABB and the buffer status after the read will be 0x000000CC.

Baud-rate Generation

Each UART contains a 16-bit down-counting scaler to generate the desired baud-rate. The scaler is clocked by the system clock and generates a UART tick each time it underflows. The scaler is reloaded with the value of the UartScaler reload register after each underflow. The resulting UART tick frequency should be 8 times the desired baud-rate. If the external clock (EC) bit is set, the scaler will be clocked by the uart_extclk input rather than the system clock. In this case, the frequency of uart_extclk must be less than half the frequency of the system clock.

Loop Back Mode

If the LB bit in the UartControl register is set, the UART will be in loop back mode. In this mode, the transmitter output is internally connected to the receiver input and the uart_rtsn is connected to the uart_ctsn. It is then possible to perform loop back tests to verify operation of receiver, transmitter and associated software routines. In this mode, the outputs remain in the inactive state, in order to avoid sending out data.

Interrupt Generation

All interrupts in the UART are maskable and are masked by the UartIntMask register. All sticky bits are indicated in the following table and are cleared by the corresponding bit in the UartIntClear register. The UART will generate an interrupt (uart_irq) under the following conditions:

TABLE 70

UART interrupts, masks and interrupt clear bits

| Mask/Int Clear bit | Interrupt description | Maskable | Sticky bit |
|---|---|---|---|
| 0 | Transmitter buffer register is overflowed, i.e. TX Overflow bit is set from 0 to 1. | Yes | Yes |
| 1 | The CPU attempts to read more than the number bytes that the receive buffer register holds, i.e RX Underflow bit is set from 0 to 1. | Yes | Yes |
| 2 | Receiver buffer register is full, the receive shift register is full and another databyte arrives, i.e. RX Overflow bit is set from 0 to 1. | Yes | Yes |
| 3 | A character arrives with a parity error, i.e. PE bit is set from 0 to 1. | Yes | Yes |
| 4 | A character arrives with a framing error, i.e. FE bit is set from 0 to 1. | Yes | Yes |
| 5 | A break occurs, i.e. BR bit is set from 0 to 1. | Yes | Yes |
| 6 | Transmitter buffer register moves from occupied to empty, i.e. TH bit is set from 0 to 1. | Yes | No |
| 7 | Receive buffer register moves from empty to occupied, i.e. DR bit is set from 0 to 1. | Yes | No |

UART Status and Control Register Bit Description

TABLE 71

Control and Status register bit descriptions

| bit | UartStatus | UartControl |
|---|---|---|
| 0 | TX Overflow - indicates that a transmitter overflow has occurred | Receiver enable (RE) - if set, enables the receiver. |
| 1 | RX Underflow - indicates that a receiver underflow has occurred | Transmitter enable (TE) - if set, enables the transmitter. |
| 2 | RX Overflow - indicates that a receiver overflow has occurred | Parity select (PS) - selects parity polarity (0 = even parity, 1 = odd parity) |
| 3 | Parity error (PE) - indicates that a parity error was detected. | Parity enable (PE) - if set, enables parity generation and checking. |
| 4 | Framing error (FE) - indicates that a framing error was detected. | Flow control (FL) - if set, enables flow control using CTS/RTS. |
| 5 | Break received (BR) - indicates that a BREAK has been received | Loop back (LB) - if set, loop back mode will be enabled. |
| 6 | Transmitter buffer register empty (TH) - indicates that the transmitter buffer register is empty | External clock - if set, the UART scaler will be clocked by uart__extclk |

TABLE 71-continued

Control and Status register bit descriptions

| bit | UartStatus | UartControl |
|---|---|---|
| 7 | Data ready (DR) - indicates that new data is available in the receiver buffer register. | |
| 8 | Transmitter shift register empty (TSRE) - indicates that the transmitter shift register is empty | |
| 9 | TX buffer fill level (number of valid bytes in | |
| 10 | the TX buffer) | |
| 11 | | |
| 12 | RX buffer fill level (number of valid bytes in | |
| 13 | the RX buffer) | |
| 14 | | |

14.16.5 IO Control

The IO control block connects the IO pin drivers to internal signalling based on configured setup registers and debug control signals. The IOPinInvert register inverts the levels of all gpio_i signals before they get to the internal logic and the level of all gpio_o outputs before they leave the device.

```
// Output Control
for (i=0; i< 64 ; i++) {
    // do input pin inversion if needed
    if (io__pin__invert[i] == 1) then
        gpio__i__var[i] = NOT(gpio__i[i])
    else
        gpio__i__var[i] = gpio__i[i]
    // debug mode select (pins with i > 33 are unaffected by debug)
    if (debug__cntrl[i] == 1) then    // debug mode
        gpio__e[i] = 1;gpio__o__var[i] = debug__data__out[i]
    else // normal mode
        case io__mode__select[i][6:0] is
            X: gpio__data[i] = xxx
            // see Table 72 for full connection details
        end case
        // do output pin inversion if needed
        if (io__pin__invert[i] == 1) then
            gpio__o__var[i] = NOT(gpio__data[i])
        else
            gpio__o__var[i] = gpio__data[i]
        // determine if the pad is input or output
        case io__mode__select[i][12:9] is
            0: out__mode[i] = cpu__io__direction[i]
            // see Table 73 for case selection details
        end case
        gpio__o__var[i]
        // determine how to drive the pin if output
        if (out__mode [i] == 1 ) then
            // see Table 74 for case selection details
```

-continued

```
            case io__mode__select[i][8:7] is
                0: gpio__e[i] = 1
                1: gpio__e[i] = 1
                2: gpio__e[i] = NOT(gpio__o__var[i])
                3: gpio__e[i] = gpio__o__var[i]
            end case
        else
            gpio__e[i] = 0
    // assign the outputs
    gpio__o[i]      = gpio__o__var[i]
    // all gpio are always readable by the CPU
    cpu__io__in[i] = gpio__i__var[i];
    }
```

The input selection pseudocode, for determining which pin connects to which de-glitch circuit.

```
for( i=0 ;i < 24 ; i++)
    {
    pin__num = deglitch__pin__select[i]
    deglitch__input[i] = gpio__i__var[pin__num]
    }
```

The IOModeSelect register configures each GPIO pin. Bits 6:0 select the output to be connected to the data out of a GPIO pin. Bits 12:9 select what control is used to determine if the pin in input or output mode. If the pin is in output mode bits 8:7 select how the tri-state enable of the GPIO pin is derived from the data out or if its driven all the time. If the pin is in input mode the tri-state enable is tied to 0 (i.e. never drives).

Table 72 defines the output mode connections and Table 73 and Table 74 define the tri-state mode connections.

TABLE 72

IO Mode selection connections

| IOModeSelect[6:0] | gpio__o__var[i] | Description |
|---|---|---|
| 3-0 | led__ctrl[3:0] | LED Output 4-1 |
| 9-4 | mc__ctrl[5:0] | Stepper Motor Control 6-1 |
| 15-10 | bldc__ctrl[0][5:0] | BLDC Motor Control 1, output 6-1 |
| 21-16 | bldc__ctrl[1][5:0] | BLDC Motor Control 2, output 6-1 |
| 27-22 | bldc__ctrl[2][5:0] | BLDC Motor Control 3, output 6-1 |
| 28 | lss__gpio__clk[0] | LSS Clock 0 |
| 29 | lss__gpio__clk[1] | LSS Clock 1 |
| 30 | lss__gpio__dout[0] | LSS data 0 |
| 31 | lss__gpio__dout[1] | LSS data 1 |

TABLE 72-continued

IO Mode selection connections

| IOModeSelect[6:0] | gpio_o_var[i] | Description |
|---|---|---|
| 55-32 | mmi_gpio_ctrl[23:0] | MMI Control outputs 23 to 0 |
| 58-56 | uhu_gpio_power_switch[2:0] | USB host power switch control |
| 59 | cpu_io_out[i] | CPU Direct Control |
| 60 | fm_line_sync | Frequency Modifier line sync pulse (undelayed version) |
| 61 | uart_txd | UART TX data out. |
| 62 | uart_rtsn | UART request to send out |
| 63 | 0 | Constant 0. Select when the pin is in input mode. |
| 127-64 | mmi_gpio_data[63:0] | MMI data output 63-0 |

IOModeSelect[12:9] determines the pin direction control

TABLE 73

Pin direction control

| IOModeSelect[12:9] | out_mode[i] | Description |
|---|---|---|
| 0 | 0 | Input mode |
| 1 | 1 | Output mode |
| 2 | cpu_io_dir[i] | Controlled by CPUIODirection[i] register bit |
| 3 | lss_gpio_e[0] | Controlled by the tri-state enable signals from the LSS master 0 |
| 4 | lss_gpio_e[1] | Controlled by the tri-state enable signals from the LSS master 1 |
| Others | N/A | Unused (defaults to input mode) |
| 15-8 | mmi_gpio_ctrl[23:16] | Controlled by MMI shared bits 7:0 (passed to the GPIO as mmi_gpio_ctrl[23:16]) |

IOModeSelect[8:7] determines the tri-state control when the pin is in output mode.

TABLE 74

Output Drive mode

| IOModeSelect[8:7] | gpio_e[i] | Description |
|---|---|---|
| 00 | 1 | In output mode always drive. |
| 01 | 1 | Unused (default to in output mode always drive) |
| 10 | NOT(gpio_o_var[i]) | In output mode when data out is 0, otherwise pad is tri-stated. |
| 11 | gpio_o_var[i] | In output mode when data out is 1, otherwise pad is tri-stated. |

In the case of when LSS data is selected for a pin N, the lss_din signal is connected to the input gpio N. If several pins select LSS data mode then all input gpios are ANDed together before connecting to the lss_din signal. If no pins select LSS data mode the lss_din signal is "11".

The MMIPinSelect registers are used to select the input pin to be used to connect to each gpio_mmi_data output. The pseudocode is

```
for(i=0 ;i<64 ; i++) {
    index = mmi_pin_select[i]
    gpio_mmi_data[i] = gpio_var_i[index]
    }
```

14.16.6 Interrupt Source Select

The interrupt source select block connects several possible interrupt sources to 16 interrupt signals to the interrupt controller block, based on the configured selection InterruptSrcSelect.

```
for(i=0 ;i<16 ; i++) {
    case interrupt_src_select[i]
        gpio_icu_irq[i] = input select // see Table 75 for details
    end case
    }
```

TABLE 75

Interrupt source select

| Select | Source | Description |
|---|---|---|
| 23 to 0 | Deglitch_out[23:0] | Deglitch circuit outputs |
| 47 to 24 | mmi_gpio_ctrl[23:0] | MMI controller outputs |
| 49 to 48 | mmi_gpio_irq[1:0] | MMI buffer interrupt sources |
| 51 to 50 | pm_int[1:0] | Period Measure interrupt source |
| 52 | uart_int | Uart Buffer ready interrupt source |
| 58 to 53 | mc_ctrl[5:0] | Stepper Motor Controller PWM generator outputs |
| Others | 0 | Reserved |

The interrupt source select block also contains a wake up generator. It monitors the GPIO interrupt outputs to detect an wakeup condition (configured by WakeUpCondition) and when a conditions is detected (and is not masked) it sets the corresponding WakeUpDetected bit. One or more set WakeUpDetected bits will result in a wakeup condition to the CPR. Wakeup conditions on an interrupt can be masked by setting the corresponding bit in the WakeUpInputMask register to 0. The CPU can clear WakeUpDetected bits by writing a 1 to the corresponding bit in the WakeUpDetectedClr register. The CPU generated clear has a lower priority than the setting of the WakeUpDetected bit.

```
// default start values
wakeup_var =0
// register the interrupts
gpio_icu_irq_ff = gpio_icu_irq
// test each for wakeup condition
for(i=0;i<16;i++){
  // extract the condition
  wakeup_type = wakeup_condition[(i*2)+1:(i*2)]
  case wakeup_type is
   00: bit_set_var = NOT(gpio_icu_irq_ff[i]) AND
   gpio_icu_irq[i]                                          //
positive edge
   01: bit_set_var = gpio_icu_irq[i]                        //
positive level
   10: bit_set_var = gpio_icu_irq_ff[i] AND
   NOT(gpio_icu_irq[i])                                     //
negative edge
   11: bit_set_var = NOT(gpio_icu_irq[i])                   //
negative level
  end case
  // apply the mask bit
  bit_set_var = bit_set_var AND wakeup_inputmask[i]
  // update the detected bit
  if (bit_set_var = 1) then
    wakeup_detected[i] = 1                    // set value
  elsif (wakeup_detected_clr[i] == 1) then
   wakeup_detected[i] = 0                     // clear value
  else
   wakeup_detected[i] = wakeup_detected[i]   // hold value
  }
// assign the output
gpio_cpr_wakeup = (wakeup_detected != 0x0000)   // OR all bits
together
```

14.16.7 Input Deglitch Logic

The input deglitch logic rejects input states of duration less than the configured number of time units (deglitch_cnt), input states of greater duration are reflected on the output deglitch_out. The time units used (either pclk, 1 μs, 100 μs, 1 ms) by the deglitch circuit is selected by the deglitch_clk_src bus.

There are 4 possible sets of deglitch_cnt and deglitch_clk_src that can be used to deglitch the input pins. The values used are selected by the deglitch_sel signal.

There are 24 deglitch circuits in the GPIO. Any GPIO pin can be connected to a deglitch circuit. Pins are selected for deglitching by the DeGlitchPinSelect registers.

Each selected input can be used in its deglitched form or raw form to feed the inputs of other logic blocks. The deglitch_form_select signal determines which form is used.

The counter logic is given by

```
if (deglitch_input != deglitch_input_ff) then
    cnt          = deglitch_cnt
    output_en  = 0
elsif (cnt == 0 ) then
    cnt          = cnt
    output_en  = 1
elsif (cnt_en == 1) then
    cnt --
    output_en  = 0
```

In the GPIO block GPIO input pins are connected to the control and data inputs of internal sub-blocks through the deglitch circuits. There are a limited number of deglitch circuits (24) and 46 internal sub-block control and data inputs. As a result most deglitch circuits are used for 2 functions. The allocation of deglitch circuits to functions are fixed, and are shown in Table 76.

Note that if a deglitch circuit is used by one sub-block, care must be taken to ensure that other functional connection is disabled. For example if circuit 9 is used by the BLDC controller (bldc_ha[0]), then the MMI block must ensure that is doesn't use its control input 4 (mmi_ctrl_in[4]).

TABLE 76

Deglitch circuit fixed connection allocation

| Circuit No. | Functional Connection A | Functional Connection B | Description |
|---|---|---|---|
| 0 | pm_pin[0][0] | N/A | Period Measure 0 input 0 (connected via pulse divider) |
| 1 | pm_pin[0][1] | N/A | Period Measure 0 input 1 (connected via pulse divider) |
| 2 | pm_pin[1][0] | gpio_mmi_ctrl[0] | Period Measure 1 input 0 (connected via pulse divider)<br>MMI control input |
| 3 | pm_pin[1][1] | gpio_mmi_ctrl[1] | Period Measure 1 input 1 (connected via pulse divider)<br>MMI control input |
| 4 | | gpio_mmi_ctrl[2] | MMI control input |
| 5 | gpio_udu_vbus_status | gpio_mmi_ctrl[3] | USB device Vbus status<br>MMI control input |
| 6 | cut_out[0] | cut_out[1] | Stepper Motor controller phase generator 0 and 1 |
| 7 | cut_out[2] | cut_out[3] | Stepper Motor controller phase generator 2 and 3 |
| 8 | cut_out[4] | cut_out[5] | Stepper Motor controller phase generator 4 and 5 |
| 9 | bldc_ha[0] | gpio_mmi_ctrl[4] | BLDC controller 1 hall A input<br>MMI control input |
| 10 | bldc_hb[0] | gpio_mmi_ctrl[5] | BLDC controller 1 hall B input<br>MMI control input |
| 11 | bldc_hc[0] | gpio_mmi_ctrl[6] | BLDC controller 1 hall C input<br>MMI control input |
| 12 | bldc_ext_dir[0] | gpio_mmi_ctrl[7] | BLDC controller 1 external direction input<br>MMI control input |

TABLE 76-continued

Deglitch circuit fixed connection allocation

| Circuit No. | Functional Connection A | Functional Connection B | Description |
|---|---|---|---|
| 13 | bldc_ha[1] | gpio_mmi_ctrl[8] | BLDC controller 2 hall A input MMI control input |
| 14 | bldc_hb[1] | gpio_mmi_ctrl[9] | BLDC controller 2 hall B input MMI control input |
| 15 | bldc_hc[1] | gpio_mmi_ctrl[10] | BLDC controller 2 hall C input MMI control input |
| 16 | bldc_ext_dir[1] | gpio_mmi_ctrl[11] | BLDC controller 2 external direction input MMI control input |
| 17 | bldc_ha[2] | uart_ctsn | BLDC controller 3 hall A input UART control input |
| 18 | bldc_hb[2] | uart_rxd | BLDC controller 3 hall B input UART data input |
| 19 | bldc_hc[2] | uart_extclk | BLDC controller 3 hall C input UART external clock |
| 20 | bldc_ext_dir[2] | gpio_mmi_ctrl[12] | BLDC controller 3 external direction input MMI control input |
| 21 | gpio_uhu_over_current[0] | gpio_mmi_ctrl[13] | USB Over current, only when enabled by USBOverCurrentEnable[0]. MMI control input |
| 22 | gpio_uhu_over_current[1] | gpio_mmi_ctrl[14] | USB Over current, only when enabled by USBOverCurrentEnable[1]. MMI control input |
| 23 | gpio_uhu_over_current[2] | gpio_mmi_ctrl[15] | USB Over current, only when enabled by USBOverCurrentEnable[2]. MMI control input |

There are 4 deglitch circuits that are connected through pulse divider logic (circuits 0, 1, 2 and 3). If the pulse divider is not required then they can be programmed to operate in direct mode by setting PulseDiv register to 0.

14.16.7.1 Pulse Divider

The pulse divider logic divides the input pulse period by the configured PulseDiv value. For example if PulseDiv is set to 3 the output is divided by 3, or for every 3 input pulses received one is generated.

The pseudocode is shown below:

```
if (pulse_div != 0 ) then          // period divided filtering
    if (pin_in AND NOT pin_in_ff) then    // positive edge detect
        if (pulse_cnt_ff == 1 ) then
            pulse_cnt_ff = pulse_div
            pin_out          = 1
        else
            pulse_cnt_ff    = pulse_cnt_ff - 1
            pin_out          = 0
    else
        pin_out              = 0
else
    pin_out = pin_in                        // direct straight through
                                            connection
```

14.16.8 LED Pulse Generator

The LED pulse generator is used to generate a period of 128 µs with programmable duty cycle for LED control. The LED pulse generator logic consists of a 7-bit counter that is incremented on a 1 µs pulse from the timers block (tim_pulse[0]). The LED control signal is generated by comparing the count value with the configured duty cycle for the LED (led_duty_sel).

The logic is given by:

```
for (i=0 i<4 ;i++) { // for each LED pin
    // period divided into 64 segments
    period_div64 = cnt[6:1];
    if (period_div64 < led_duty_sel[i]) then
        led_ctrl[i] = 1
    else
        led_ctrl[i] = 0
    }
// update the counter every 1us pulse
if (tim_pulse[0] == 1) then
    cnt ++
```

14.16.9 Stepper Motor Control

The motor controller consists of 3 counters, and 6 phase generator logic blocks, one per motor control pin. The counters decrement each time a timing pulse (cnt_en) is received. The counters start at the configured clock period value (mc_mas_clk_period) and decrement to zero. If the counters are enabled (via mc_mas_clk_enable), the counters will automatically restart at the configured clock period value, otherwise they will wait until the counters are re-enabled.

The timing pulse period is one of pclk, 1 µs, 100 µs, 1 ms depending on the mc_mas_clk_src signal. The counters are used to derive the phase and duty cycle of each motor control pin.

```
// decrement logic
if (cnt_en == 1) then
    if ((mas_cnt == 0) AND (mc_mas_clk_enable == 1)) then
      mas_cnt = mc_mas_clk_period[15:0]
    elsif ((mas_cnt == 0) AND (mc_mas_clk_enable == 0)) then
      mas_cnt = 0
    else
      mas_cnt --
```

-continued

```
else    // hold the value
        mas__cnt = mas__cnt
```

The phase generator block generates the motor control logic based on the selected clock generator (mc_mas_clk_sel) the motor control high transition point (curr_mc_high) and the motor control low transition point (curr_mc_low).

The phase generator maintains current copies of the mc_config configuration value (mc_config[31:16] becomes curr_mc_high and mc_config[15:0] becomes curr_mc_low). It updates these values to the current register values when it is safe to do so without causing a glitch on the output motor pin.

Note that when reprogramming the mc_config register to reorder the sequence of the transition points (e.g changing from low point less than high point to low point greater than high point and vice versa) care must taken to avoid introducing glitching on the output pin.

The cut-out logic is enabled by the mc_cutout en signal, and when active causes the motor control output to get reset to zero. When the cut-out condition is removed the phase generator must wait for the next high transition point before setting the motor control high.

There is fixed mapping of the cut_out input of each phase generator to deglitch circuit, e.g. deglitch 13 is connected to phase generator 0 and 1, deglitch 14 to phase generator 2 and 3, and deglitch 15 to phase generator 4 and 5.

There are 6 instances of phase generator block one per output bit.

The logic is given by:

```
// select the input counter to use
case mc__mas__clk__sel[1:0] then
        0: count = mas__cnt[0]
        1: count = mas__cnt[1]
        2: count = mas__cnt[2]
        3: count = 0
end case
// Generate the phase and duty cycle
if (cut__out = 1 AND mc__cutout__en = 1) then
        mc__ctrl = 0
elsif (count == curr__mc__low) then
        mc__ctrl = 0
elsif (count == curr__mc__high) then
        mc__ctrl = 1
else
```

-continued

```
        mc__ctrl = mc__ctrl // remain the same
// update the current registers at period boundary
if (count == 0) then
        curr__mc__high = mc__config[31:16]    // update to new high value
        curr__mc__low  = mc__config[15:0]     // update to new high value
```

14.16.10 BLDC Motor Controller

The BLDC controller logic is identical for all instances, only the input connections are different. The logic implements the truth table shown in Table 66. The six q outputs are combinationally based on the direction, ha, hb, hc, brake and pwm inputs. The direction input has 2 possible sources selected by the mode. The pseudocode is as follows

```
// determine if in internal or external direction mode
if (mode == 1) then // internal mode
        direction = int__direction
else                // external mode
        direction = ext__direction
```

By default the BLDC controller reset to internal direction mode. The direction control is defined with 0 meaning counter clockwise, and 1 meaning clockwise.

14.16.11 Period Measure

The period measure block monitors 1 or 2 selected deglitched inputs (deglitch_out) and detects positive edges. The counter (PMCount) either increments every pclk cycle between successive positive edges detected on the input, or increments on every positive edge on the input, and is selected by PMCntSrcSel register.

When a positive edge is detected on the monitored inputs the PMLastPeriod register is updated with the counter value and the counter (PMCount) is reset to 1.

The pm_int output is pulsed for a one clock each time a positive edge on the selected input is detected. It is used to signal an interrupt to the interrupt source select sub-block (and optionally to the CPU), and to indicate to the frequency modifier that the PMLastPeriod has changed.

There are 2 period measure circuits available each one is independent of the other.

The pseudocode is given by

```
// determine the input mode
case (pm__inputmode__sel) is
        0: input__pin = in0          // direct input
        1: input__pin = in0 ^ in1    // XOR gate, 2 inputs
end case
// monitored edge detect
mon__edge = (input__pin == 1) AND input__pin__ff == 0)    // monitor positive edge detected
// implement the count
if (pm__cnt__src__sel == 1) then                            // direct count mode
        if (mon__edge == 1)then                              // monitor positive
edge detected
            pm__lastperiod[23:0]    = pm__count[23:0]        // update the last
period counter
            pm__int                 = 1
            pm__count[23:0]         = pm__count[23:0] + 1
else                                                        // pclk count mode
        if (mon__edge == 1)then                              // monitor positive
```

-continued

```
edge detected
        pm_lastperiod[23:0]     = pm_count[23:0]          // update the last
period counter
        pm_int                  = 1
        pm_count[23:0]          = 1
      else
        pm_count[23:0]          = pm_count[23:0] + 1
// implement the configuration register write (overwrites logic calculation)
if (wr_last_period_en == 1) then
      pm_lastperiod = wr_data
elsif (wr_count_en == 1) then
      pm_count      = wr_data
```

14.16.12 Frequency Modifier

The frequency modifier block consists of 3 sub-blocks that together implement a frequency multiplier.

14.16.12.1 Divider Filter Logic

The divider filter block performs the following division and filter operation each time a pulse is detected on the pm_int from the period measure block.

```
if (pm_int ==1) then
      fm_freq_est[23:0] =(fm_k_const[31:0] / pm_last_count[23:0])
      // calculate the filter based on co-efficient
      fm_tmp[31:0] = fm_freq_est + A1[20:0] * fm_del[0][31:0] +
A2[20:0] * fm_del[1][31:0]
      // calculate the output
      fm_filt_out[23:0] = B0[20:0]*fm_tmp[31:0] +
B1[20:0]*fm_del[0][31:0] + B2[20:0]*fm_del[1][31:0]
      // update delay registers
      fm_del[1][31:0] = fm_del[0][31:0]
      fm_del[0][31:0] = fm_tmp[31:0]
      }
```

The implementation includes a state machine controlling an adder/subtractor and shifter to execute 3 basic commands Load, used for moving data between state elements (including shifting)

Divide, used for dividing 2 number of positive magnitude

Multiply, multiplies 2 numbers of positive or negative magnitude

Add/Subtract, add or subtract 2 positive or negative numbers

The state machine implements the following commands in sequence, for each new sample received. With the current example implementation each divide takes 33 cycles, each multiply 21 cycles. An add or subtract takes 1 cycle, and each load takes 1 cycle. With the simplest implementation (i.e. one load per cycle) the total number of cycles to complete the calculation of fm_filt_out is 160, 1 divide (33), 5 multiplies (100), 4 add/sub (4) and 23 loads instructions (23), or maximum frequency of 1.2 MHz which is much faster than the expected sample frequency of 20 Khz. Its possible that the calculation frequency could be increased by adding more muxing hardware to increase the number of loads per cycle, or by combining multiply and add operations at the slight increase in accumulator size.

TABLE 77

State machine operation flow

| State | Type | Action | Description |
|---|---|---|---|
| Idle | | None | Waits for pm_int==1 |
| LoadDiv | Load | fm_operb = pm_last_count<br>fm_acc = fm_k_const | Loads up operand for divide function |
| Div | Divide | fm_acc = (fm_acc/fm_operb) | Divide the fm_acc/fm_operb over 33 cycles. See divide description below |
| LoadA2 | Load | fm_freq_est = fm_acc<br>fm_operb = fm_coeff[1]<br>fm_acc = fm_del[1] | Stores the divide result fm_acc and loads up the operands for the A2 coefficient multiplication. |
| MultA2 | Mult | fm_acc = (fm_acc * fm_operb) | Multiplies the fm_acc and fm_operb and stores the result in fm_acc. Takes 20 cycles. See multiply description |
| LoadA1 | Load | fm_tmp = fm_acc<br>fm_operb = fm_coeff[0]<br>fm_acc = fm_del[0] | Stores the multiply result fm_acc and loads up the operands for the A1 coefficient multiplication. |
| MultA1 | Mult | fm_acc = (fm_acc * fm_operb) | Multiplies the fm_acc and fm_operb and stores the result in fm_acc. Takes 20 cycles. |
| AddA1A2 | Add/Sub | fm_acc = +/− fm_acc +/− fm_tmp | Add/subtracts the fm_acc and fm_tmp and stores the result in fm_acc. The add or subtract, and result is dependent on the sign of the inputs. See Add/Sub description. |
| AddFest | Add/Sub | fm_acc = −/+ fm_acc +/− fm_freq_est | Add/subtracts the fm_acc and fm_freq_est and stores the result in fm_acc. The add or subtract, and result is dependent on the sign of the inputs. See Add/Sub description. |

TABLE 77-continued

State machine operation flow

| State | Type | Action | Description |
|---|---|---|---|
| LoadB2 | Load | fm_tmp = fm_acc<br>fm_operb = fm_coeff[4]<br>fm_acc = fm_del[1] | Stores the result in fm_acc in the temporary register fm_tmp. Loads up the operands for the B2 coefficient multiplication. |
| MultB2 | Mult | fm_acc = (fm_acc * fm_operb) | Multiplies fm_acc and fm_operb and stores the result in fm_acc. |
| LoadB1 | Load | fm_del[1] = fm_acc<br>fm_operb = fm_coeff[3]<br>fm_acc = fm_del[0] | Stores the result in fm_acc in the delay register fm_del[1]. Loads up the operands for the B1 coefficient multiplication. |
| MultB1 | Mult | fm_acc = (fm_acc * fm_operb) | Multiplies fm_acc and fm_operb and stores the result in fm_acc. Takes 20 cycles. |
| AddB1B2 | Add | fm_acc = +/− fm_acc +/− fm_del[1] | Adds the coefficient B2 result (which was stored in the delay register) with the coefficient B1 result. The calculation result is stored in fm_acc. |
| LoadB0 | Load | fm_del[1] = fm_acc<br>fm_operb = fm_coeff[2]<br>fm_acc = fm_tmp | Stores the result in fm_acc in the delay register fm_del[1]. Loads up the operands for the B0 coefficient multiplication. |
| MultB0 | Mult | fm_acc = (fm_acc * fm_operb) | Multiplies fm_acc and fm_operb and stores the result in fm_acc. |
| AddB0 | Add/Sub | fm_acc = +/− fm_acc +/− fm_del[1] | Adds the coefficients B2 B1 result (which was stored in the delay register) with the coefficient B0 result. The calculation result is stored in fm_acc. |
| LoadOut | Load | fm_filt_out = fm_acc<br>fm_del[0] = fm_tmp<br>fm_del[1] = fm_del[0] | Performs the delay line shift and loads the output register with the result. |

Divide Operation

The divide operation is implemented with shift and subtract serial operation over 33 cycles. At startup the LoadDiv state loads the accumulator and operand B registers with the dividend (fm_k_const) and the divisor (pm_last_period) calculated by the period measure block.

The accumulator stores the partial remainder and the calculated quotient bits. With each iteration the partial remainder reduces by one bit and the quotient increases by one bit. Storing both together allows for constant minimum sized register to be used, and easy shifting of both values together.

As the division remainder is not required it is possible the quotient register can be combined with the acumalator.

The pseudocode is:

```
// load up the operands
fm_acc[31:0] = fm_k_const[31:0]
// load the divisor
fm_operb[23:0] = {pm_last_period[23:0]}
for (i=0;i<33; i++) {
        // calculate the shifted value
        shift_test[32:0]:= {fm_acc[63:32] & 0 }
        // check for overflow or not
        if (shift_test[32:0] < fm_operb[31:0]) then // subtract zero and shift
          fm_acc[63:0] = {fm_acc[62:0] & 0 }                // quotient bit is
0
        else                                                // sub fm_operb
and shift
          fm_ans[31:0] = shift_test[31:0] − fm_operb[31:0]
          fm_acc[63:0] = {fm_ans[31:0] & fm_acc[30:0] & 1 }  // quotient bit is
1
          }
// bottom 32 bits contain the result of the divide, saturated to 24 bits
if (fm_acc[31:25] != 0) then
          fm_acc[23:0] = 0xFF_FFFF      // saturate case
```

For each cycle the logic compares a shifted left version of the accumulator with the divisor, if the accumulator is greater then the next accumulator value is the shifted left value minus the divisor, and the calculated quotient bit is 1. If the accumulator is less than the divisor then accumulator is shifted left and the calculated quotient bit is zero.

The accumulator register in this example implementation could be reduced to 56 bits if required. The exact implementation will depend on other uses of the adder/shift logic within this block.

Multiply Operation

In the frequency modifier block the low pass filter uses several multiply operations. The multiply operations are all similar (except in how rounding and saturation are performed). All internal states and coefficients of the filter are in signed magnitude form. The coefficients are stored in 21 bits, bit 20 is the sign and bits 19:0 the magnitude. The magnitude uses fixed point representation 1.19.

The internal states of the filter use 32 bits, one sign bit and 31 magnitude bits. The fixed point representation is 24.7.

The multiply is implemented as a series of adds and right shifts.

```
// loads up the operands
fm_acc[19:0]    = fm_coeff[A][19:0]
fm_acc_s        = fm_coeff[A][20]
// loads operand B
fm_operb[30:0] = fm_del[1][30:0]
fm_operb_s      = fm_del_s[1][31]
for (i=0; i<20;i++) {
        if ( fm_acc[0] == 0) then     // add 0
            fm_ans[32:0] = fm_acc[63:32] + 0
        else                          // add coefficient
            fm_ans[32:0] = fm_acc[63:32] + fm_operb[31:0]
        // do the shift before assigning new value
        fm_acc[63:0] = {fm_ans[32:0] & fm_acc[31:1]}
        }
// shift down the acc 12 bits
fm_acc[63:0] = (fm_acc[63:0] >> 12)
// calculate the sign
fm_acc_s = fm_acc_s XOR fm_operb_s
// round the minor bits to 24.7 representation
if ((fm_acc[18:0] > 0x40000)then
        fm_acc[63:0] = (fm_acc[63:0] >> 19) + 1
else
        fm_acc[63:0] = (fm_acc[63:0] >> 19)
// saturate test
if (fm_acc[63:31] != 0) then          // any upper bit is 1
        fm_acc[30:0] = 0xFFFF_FFFF
// assign the sign bit
fm_acc[31] = fm_acc_s
```

Addition/Subtraction

The basic element of both the multiplier and divider is a 32 bit adder. The adder has 2's complement units added to enable easy addition and subtraction of signed magnitude operands. One complement unit on the B operand input and one on the adder output. Each operand has an associated sign bit. The sign bits are compared and the complement of the operands chosen, to produce the correct signed magnitude result.

There are four possible cases to handle, the control logic is shown below

```
// select operation
sel[1:0] = fm_acc_s & fm_operb_s
// case determines which operation to perform
case (sel)
    00:     // both positive
        fm_ans    = fm_acc + fm_operb
        fm_ans_s = 0
    01:     // operb neg, acc pos
        if (fm_operb > fm_acc)
            fm_ans    = 2s_complement(fm_acc +
            2s_complement(fm_operb))
            fm_ans_s = 1
        else
            fm_ans    = fm_acc + 2s_complement(fm_operb)
            fm_ans_s = 0
    10:     // acc neg, operb pos
        if (fm_acc > fm_operb)
            fm_ans    = 2s_complement(fm_acc +
            2s_complement(fm_operb))
            fm_ans_s = 1
        else
            fm_ans    = fm_acc + 2s_complement(fm_operb)
```

-continued

```
            fm_ans_s = 0
    11:   // both negative
        fm_ans    = fm_acc + fm_operb
        fm_ans_s = 1
endcase
```

The output from the addition is saturated to 32 bits for divide and multiply operations and to 31 bits for explicit addition operations.

FMStatus Error Bits

The Divide Error is set whenever saturation occurs in the K/P divide. This includes divide by zero.

The Filter Error is set whenever saturation occurs in any addition or multiplication or if a divide error has occurred.

Both bits remain set until cleared by the CPU.

The other status bits reflect the current status of the filter.

14.16.12.2 Numerical Controlled Oscillator (NCO)

The NCO generates a one cycle pulse with a period configured by the FMNCOMax and either the calculated fm_filt_out value, or the CPU programmed FMNCOFreq value. The configuration bit FMFiltEn controls which one is selected. If 3 is written to the FMNCOEnable register a leading pulse is generated as the accumulator is re-enabled. If 1 is written no leading edge is generated.

The pseudo code

```
// the cpu bypass enabled
if (fm_nco_freq_src == 1) then
        filt_var = fm_filt_out
else
        filt_var = fm_nco_freq
// update the NCO accumulator
nco_var = nco_ff + filt_var
// temporary compare
nco_accum_var    = nco_var - fm_nco_max
// cpu write clears the nco, regardless of value
if (cpu_fm_nco_enable_wr_en_delay == 1) then
        nco_ff    = 0
        nco_edge = fm_nco_enable[1]            // leading edge
emit pulse
elsif (fm_nco_enable[0] == 0) then
        nco_ff    = 0
        nco_edge = 0
elsif ( nco_accum_var > 0 ) then
        nco_ff    = nco_accum_var
        nco_edge = 1
else
        nco_ff    = nco_var
        nco_edge = 0
```

14.16.12.3 Line Sync Generator

The line sync generator block accepts a pulse from either the numerical controlled oscillator (nco_edge) or directly from the period measure circuit 0 (pm_int) and generates a line sync pulse of FMLsyncHigh pclk cycles called fm_line_sync. The fm_bypass signal determines which input pulse is used. It also generates a gpio_phi_line_sync line sync pulse a delayed number of cycles (fm_line_sync delay) later, note that the gpio_phi_line_sync pulse is not stretched and is 1 pclk wide. Line sync generator diagram The line sync generate logic is given as

```
// the output divider logic
// bypass mux
if (fm_bypass == 1) then
        pin_in = pm_int      // direct from the period
measure 0
else
        pin_in = nco_edge  // direct from the NCO
// calculate the positive edge
edge_det = pin_in AND NOT (pin_in_ff)
// implement the line sync logic
if (edge_det == 1) then
        lsync_cnt_ff = fm_lsync_high
        delay_ff        = fm_lsync_delay
else
        if (lsync_cnt_ff != 0 ) then
           lsync_cnt_ff = lsync_cnt_ff - 1
        if (delay_ff != 0 ) then
           delay_ff        = delay_ff - 1
// line sync stretch
if (lsync_cnt_ff == 0 ) then
        fm_line_sync = 0
else
        fm_line_sync = 1
// line sync delay, on delay transition from 1 to 0 or edge_det if
delay is zero
if ((delay_ff == 1 AND delay_nxt = 0) OR (fm_lsync_delay = 0 AND
edge_det = 1)) then
        gpio_phi_line_sync = 1
else
        gpio_phi_line_sync = 0
```

15 Multiple Media Interface (MMI)

The MMI provides a programmable and reconfigurable engine for interfacing with various external devices using existing industry standard protocols such as

- Parallel port, (Centronics, ECP, EPP modes)
- PEC1 HSI interface
- Generic Motorola 68K Microcontroller I/F
- Generic Intel i960 Microcontroller I/F
- Serial interfaces, such as Intel SBB, Motorola SPI, etc.
- Generic Flash/SRAM Parallel interface
- Generic Flash Serial interface
- LSS serial protocol, I2C protocol The MMI connects through GPIO to utilize the GPIO pins as an external interface. It provides 2 independent configurable process engines that can be programmed to toggle GPIOs pins, and control RX and TX buffers. The process engines toggle the GPIOs to implement a standard communication protocol. It also controls the RX or TX buffer for data transfer, from the CPU or DRAM out to the GPIO pins (in the TX case) or from the GPIO pin to the CPU or DRAM in the RX case.

The MMI has 64 possible input data signals, and can produce up to 64 output data signals. The mapping of GPIO pin to input and/or output signal is accomplished in the GPIO block.

The MMI has 16 possible input control signals (8 per process engine), and 24 output control signals (8 per process engine and 8 shared). There is no limit on the amount of inputs, or outputs or shared resources that a process engine uses, but if resources are over allocated care must be taken when writing the microcode to ensure that no resource clashes occur.

The process engines communicate to each other through the 8 shared control bits. The shared controls bits are flags that can be set/cleared by either process engine, and can be tested by both process engines. The shared control bits operate exactly the same as the output control bits, and are connected to the GPIO and can be optionally reflected to the GPIO pins.

Therefore each process engine has 8 control inputs, 8 control outputs and 8 shared control bits that can be tested and particular action taken based on the result.

The MMI contains 1 TX buffer, and 1 RX buffer. Either or both process engines can control either or both buffers. This allows the MMI to operate a RX protocol and TX protocol simultaneously. The MMI cannot operate 2 RX or 2 TX protocols together.

In addition to the normal control pin toggling support, the MMI provides support for basic elements of a higher level of a protocol to be implemented within a process engine, relieving the CPU of the task. The MMI has support for parity generation and checking, basic data compare, count and wait instructions.

The MMI also provides optional direct DMA access in both the TX and RX directions to DRAM, freeing the CPU from the data transfer tasks if desired.

The MMI connects to the interrupt controller (ICU) via the GPIO block. All 24 output control pins and 2 buffer interrupt signals (mmi_gpio_irq[1:0]) are possible interrupt sources for the GPIO interrupts. The mmi_gpio_irq[1] refers to the RX buffer interrupt and the mmi_gpio_irq[0] the TX buffer interrupt. The buffer interrupts indicate to the CPU that the buffer needs to be serviced, i.e. data needs to transferred from the RX or to the TX using the DMA controller or direct CPU accesses.

15.1 EXAMPLE PROTOCOLS SUMMARY

TABLE 78

Summary of control/pin requirements for various communication protocols

| Protocol Type | number of control inputs | number of control outputs | number of bi-dirs | address/ data bus size | Notes |
|---|---|---|---|---|---|
| PEC1 HSI | 1 busy | 1 data write, 1 select per device | 0 | 0 address/8 data | Write only mode |
| Parallel Port (Centronics) | 1 busy, 1 ack | 1 data strobe | 0 | 8 | Unidirectional only SoPEC receive mode |

TABLE 78-continued

Summary of control/pin requirements for various communication protocols

| Protocol Type | number of control inputs | number of control outputs | number of bi-dirs | address/ data bus size | Notes |
|---|---|---|---|---|---|
| Parallel Port (Centronics) | 1 data strobe | 1 busy, 1 ack | 0 | 8 | Unidirectional only SoPEC transmit mode |
| Parallel Port (EPP) | 1 busy/wait 1 ack/interrupt | 1 write, 1 add strobe, 1 data strobe 1 reset line | 8 (data/add bus) | 8 | Bi-directional. |
| Parallel Port (ECP) | 1 Peripheral clk 1 peripheral ack 1 ack reverse 1 Select/Xflag 1 Peripheral req | 1 host clk 1 host ack 1 select/active 1 reverse request | 8 (data/add bus) | 8 | Bi-directional. |
| 68K | 1 acknowledge | 1 add strobe, 1 R/W select 2 Data strobe | 16 (data bus) | up to 19 address, 16 data | In synchronous mode extra bus clock required. Address bus can be any size. |
| i960 | 1 ready/wait | 1 address strobe 1 write/read select 1 wait 1/2 Clocks 2/4 byte selects | 32 (data bus) | up to 32 address, 8/16/32 data bus | Several Bus access types possible |
| Intel Flash | 1 wait | 1 address valid, 1 chip select per device 1 output enable 1 write enable 1 clock 2 optional byte enable (A0, A1) | 8/16/32 (data bus) | up to 24 address 8/16/32 data bus | Asynchronous/synchronous, burst and page modes available |
| x86 (386) | 1 ready 1 next address | 1 add strobe 1 read/write select 2 byte enables 1 data/control select 1 memory select | 16 (data bus) | 8/16 data bus up to 24 address | |
| Motorola SPI Intel SBB | | 1 clock, 1 reset | 1 data | | Could apply to any serial interface |

15.1

In the diagrams below all SoPEC output signals are shown in bold.

15.1.1 PEC1 HSI 15.1.2 Centronics Interface

Setup data

Sample busy and wait until low

If not busy then assert the n_strobe line

De-assert the n_strobe control line.

Sample n_ack low to complete transfer 15.1.3 Parallel EPP Mode

Data Write Cycle

Start the write cycle by setting n_iow low

Setup data on the data line and set n_write low

Test the n_wait signal and set n_data_strobe when n_wait is low

Wait for n_wait to transition high

Then set n_data_strobe high

Set n_write and n_iow high

Wait for n_wait to transition low before starting next transfer

Address Read Cycle

Start the read cycle by setting n_ior low

Test the n_wait signal and set n_adr_strobe low when n_wait is low

Wait for n_wait to transition high

Sample the data word

Set n_adr_strobe and n_ior high to complete the transaction

Wait for n_wail to transition low before starting next transfer 15.1.4 Parallel ECP Mode Forward data and command cycle Host places data on data bus and sets host_ack high to indicate a data transfer Host asserts host_clk low to indicate valid data Peripheral acknowledges by setting periph_ack high Host set host_clk high Peripheral set periph_ack low to indicate that it's ready for next byte Next cycle starts Reverse Data and Command Cycle Host initiates reverse channel transfer by setting n_reverse_req low The peripheral signals ok to proceed by setting n_ack_reverse low The peripheral places data on the data lines and indicates a data cycle by setting periph_ack high Peripheral asserts periph_clk low to indicate valid data Host acknowledges by setting host_ack high Peripheral set periph_clk high, which clocks the data into the host Host sets host_ack low to indicate that it is ready for the next byte Transaction is repeated All transactions complete, host sets n_reverse_req high Peripheral acknowledges by setting n_ack_reverse high 15.1.5 68 K Read and Write Transaction Read Cycle Example Set FC code and rwn signal to high Place address on address bus Set address strobe (as_n) to low, and set uds_n and lds_n as needed Wait for peripheral to place data on the data bus and set dack_n to low Host samples the data and de-asserts as_n, uds_n and lds_n Peripheral removes data from data bus and de-asserts dack_n Write Cycle Set FC code and rwn signal to high Place address on address bus, and data on data bus Set address strobe (as_n) to low, and set uds_n and lds_n as needed Wait for peripheral to sample the data and set dack_n to low Host de-asserts as_n, uds_n and lds_n, set rwn to read and removes data from the bus Peripheral set dack_n to high 15.1.6 i960 Read and Write Example Transaction 15.1.7 Generic Flash Interface There are several type of communication protocols to/from flash, (synchronous, asynchronous, byte, word, page mode, burst modes etc.) the diagram above shows indicative signals and a single possible protocol.

Asynchronous Read

Host set the address lines and brings address valid (adv_n) low

Host sets chip enable low (ce_n)

Host set adv_n high indicating valid data on the address line.

Peripheral drives the wait low

Host sets output enable oe_n low

Peripheral drive data onto the data bus when ready

Peripheral sets wait to high, indicating to the host to sample the data

Hosts set ce_n and oe_n high to complete the transfer

Asynchronous Write

Host set the address lines and brings address valid (adv_n) low

Host sets chip enable low (ce_n)

Host set adv_n high indicating valid data on the address line.

Host sets write enable we_n low, and sets up data on the bus

After a predetermined time host sets we_n high, to signal to the peripheral to sample the data Host completes transfer by setting ce_n high 15.1.8 Serial Flash Interface Serial Write Process Host sets chip select low (cs_n)

Host send 8 clocks cycles with 8 instruction data bits on each positive edge

Device interprets the instruction as a write, and accepts more data bits on clock cycles generated by the host Host terminates the transaction by setting cs_n high Serial Read Process Host sets chip select low (cs_n)

Host send 8 clocks cycles with 8 instruction data bits on each edge

Device interprets the instruction as a read, and sends data bits on clock cycles generated by the host Host terminates the transaction by setting cs_n high 15.2 Implementation 15.2.1 Definition of IO

TABLE 79

MMI I/O definitions

| Port name | Pins | I/O | Description |
|---|---|---|---|
| | | | Clocks and Resets |
| Pclk | 1 | In | System Clock |
| prst_n | 1 | In | System reset, synchronous active low |
| | | | MMI to GPIO |
| mmi_gpio_ctrl[23:0] | 24 | Out | MMI General Purpose control bits output to the GPIO. All bits can be directly connected to pins in the GPIO. In addition, each of bits 23:16 can be used within the GPIO to control whether particular pins are input or output, and if in output mode, under what conditions to drive or tri-state that pin. |
| gpio_mmi_ctrl[15:0] | 16 | In | MMI General Purpose control bits input from the GPIO |
| mmi_gpio_data[63:0] | 64 | Out | MMI parallel data out to the GPIO pins |
| gpio_mmi_data[63:0] | 64 | In | MMI parallel data in from selected GPIO pins |
| mmi_gpio_irq[1:0] | 2 | Out | MMI interrupts for muxing out through the GPIO |

TABLE 79-continued

MMI I/O definitions

| Port name | Pins | I/O | Description |
|---|---|---|---|
| | | | interrupts. Indicates the corresponding buffer needs servicing (either a new DMA setup, or CPU must read/write more data).<br>0 - TX buffer interrupt<br>1 - RX buffer interrupt |
| | | | CPU Interface |
| cpu_adr[10:2] | 9 | In | CPU address bus. Only 9 bits are required to decode the address space for this block |
| cpu_dataout[31:0] | 32 | In | Shared write data bus from the CPU |
| mmi_cpu_data[31:0] | 32 | Out | Read data bus to the CPU |
| cpu_rwn | 1 | In | Common read/not-write signal from the CPU |
| cpu_mmi_sel | 1 | In | Block select from the CPU. When cpu_mmi_sel is high both cpu_adr and cpu_dataout are valid |
| mmi_cpu_rdy | 1 | Out | Ready signal to the CPU. When mmi_cpu_rdy is high it indicates the last cycle of the access. For a write cycle this means cpu_dataout has been registered by the MMI block and for a read cycle this means the data on mmi_cpu_data is valid. |
| mmi_cpu_berr | 1 | Out | Bus error signal to the CPU indicating an invalid access. |
| mmi_cpu_debug_valid | 1 | Out | Debug Data valid on mmi_cpu_data bus. Active high |
| cpu_acode[1:0] | 2 | In | CPU Access Code signals. These decode as follows:<br>00 - User program access<br>01 - User data access<br>10 - Supervisor program access<br>11 - Supervisor data access |
| | | | DIU Read interface |
| mmi_diu_rreq | 1 | Out | MMI unit requests DRAM read. A read request must be accompanied by a valid read address. |
| mmi_diu_radr[21:5] | 17 | Out | Read address to DIU, 256-bit word aligned. |
| diu_mmi_rack | 1 | In | Acknowledge from DIU that read request has been accepted and new read address can be placed on mmi_diu_radr |
| diu_mmi_rvalid | 1 | In | Read data valid, active high. Indicates that valid read data is now on the read data bus, diu_data. |
| diu_data[63:0] | 64 | In | Read data from DIU. |
| | | | DIU Write Interface |
| mmi_diu_wreq | 1 | Out | MMI requests DRAM write. A write request must be accompanied by a valid write address together with valid write data and a write valid. |
| mmi_diu_wadr[21:5] | 17 | Out | Write address to DIU<br>17 bits wide (256-bit aligned word) |
| diu_mmi_wack | 1 | In | Acknowledge from DIU that write request has been accepted and new write address can be placed on mmi_diu_wadr |
| mmi_diu_data[63:0] | 64 | Out | Data from MMI to DIU. 256-bit word transfer over 4 cycles<br>First 64-bits is bits 63:0 of 256 bit word<br>Second 64-bits is bits 127:64 of 256 bit word<br>Third 64-bits is bits 191:128 of 256 bit word<br>Fourth 64-bits is bits 255:192 of 256 bit word |
| mmi_diu_wvalid | 1 | Out | Signal from MMI indicating that data on mmi_diu_data is valid. |

15.2.1

15.2.2 MMI Register Map

The configuration registers in the MMI are programmed via the CPU interface. Refer to section 11.4 on page 76 for a description of the protocol and timing diagrams for reading and writing registers in the MMI. Note that since addresses in SoPEC are byte aligned and the CPU only supports 32-bit register reads and writes, the lower 2 bits of the CPU address bus are not required to decode the address space for the MMI. When reading a register that is less than 32 bits wide zeros are returned on the upper unused bit(s) of mmi_cpu_data. GPIO Register Definition lists the configuration registers in the MMI block.

TABLE 80

MMI Register Definition

| Address GPIO_base+ | Register | #bits | Reset | Description |
|---|---|---|---|---|
| | | MMI Control | | |
| 0x000-0x3FC | MMIConfig[255:0] | 256x15 | N/A | Register access to the Microcode memory. Allows access to configure the MMI reconfigurable engines.<br>Can be written to at any time, can only be read when both MMIGo bits are zero. |
| 0x400 | MMIGo | 2 | 0x0 | MMI Go bits. When set to 0 the MMI engine is disabled. When set to 1 the MMI engine is enabled. One bit per process engine. |
| 0x404 | MMIUserModeEnable | 1 | 0x0 | User Mode Access enable to MMI control configuration registers. When set to 1, user access is enabled. Controls access to MMI* registers except MMIUserModeEnable. |
| 0x408 | MMIBufferMode | 2 | 0x0 | Selects between DMA or CPU access to the RX and TX buffer. When set to 1, DMA access is selected otherwise CPU access is selected.<br>Bit 0 - TX buffer select<br>Bit 1 - RX buffer select |
| 0x40C | MMILdMultMode | 2 | 0x0 | Selects the control bits affected by the LDMULT instruction. One bit per engine:<br>0 = LDMULT updates Tx control bits<br>1 = LDMULT updates Rx control bits |
| 0x410-0x414 | MMIPCAdr[1:0] | 2x8 | 0x00 | Indicates the current engine program counter. Should only be written to by the CPU when Go is 0. Allows the program counter to be set by the CPU. One register per process engine.<br>Bus 0 - Process Engine 0<br>Bus 1 - Process Engine 1<br>(Working Register) |
| 0x418-0x41C | MMIOutputControl[1:0] | 2x8 | 0x00 | Provides CPU access to the process engines output bits, one register per engine<br>0 - Process engine 0, mmi_gpio_ctrl[7:0]<br>1 - Process engine 1, mmi_gpio_ctrl[15:8]<br>(Working Register) |
| 0x420 | MMISharedControl | 8 | 0x00 | Provides CPU access to the process engines' shared output bits (mmi_shar_ctrl[7:0])<br>(Working Register) |
| 0x424 | MMIControl | 24 | 0x00_0000 | Provides CPU access to both sets of outputs bits and the shared output bits.<br>7:0 - Process engine 0, mmi_gpio_ctrl[7:0]<br>15:8 - Process engine 1, mmi_gpio_ctrl[15:8]<br>23:16 - Shared bits mmi_shar_ctrl[7:0]<br>(Working Register) |
| 0x428 | MMIBufReset | 2 | 0x3 | MMI RX & TX buffer clear register. A write of 0 to MMIBufReset[N] resets the RX and TX buffer address pointers as follows:<br>N = 0 - Reset all TX buffer address pointers<br>N = 1 - Reset all RX buffer address |

TABLE 80-continued

MMI Register Definition

| Address GPIO_base+ | Register | #bits | Reset | Description |
| --- | --- | --- | --- | --- |
| | | | | pointers (Self Resetting Register) |
| | | DMA Control | | |
| 0x430 | MMIDmaEn | 2 | 0x0 | MMI DMA enable. Provides a mechanism for controlling DMA access to and from DRAM<br>Bit 0 - Enable DMA TX channel when 1<br>Bit 1 - Enable DMA RX channel when 1 |
| 0x434 | MMIDmaTXBottomAdr[21:5] | 17 | 0x00000 | MMI DMA TX channel bottom address register. A 256 bit aligned address containing the first DRAM address in the DRAM circular buffer to be read for TX data, see Error! Reference source not found. |
| 0x438 | MMIDmaTXTopAdr[21:5] | 17 | 0x00000 | MMI DMA TX channel top address register. A 256 bit aligned address containing the last DRAM address to be read for TX data before wrapping to MMIDmaTXBottomAdr. |
| 0x43C | MMIDmaTXCurrPtr[21:5] | 17 | 0x00000 | MMI DMA TX channel current read pointer. (Working register) |
| 0x440 | MMIDmaTXIntAdr[21:5] | 17 | 0x00000 | MMI DMA TX channel interrupt address register. An interrupt is triggered when MMIDmaTXCurrPtr is >= MMIDmaTXIntAdr. The DRAM may not yet have completed transfer of data from this address to the TX buffer when the interrupt is being handled by the CPU. |
| 0x444 | MMIDmaTXMaxAdr | 22 | 0x00000 | MMIDmaTXMaxAdr[21:5]:<br>MMI DMA TX channel max address register. A 256 bit aligned address containing the last DRAM address to be read for TX data.<br>MMIDmaTXMaxAdr[4:0]:<br>Indicates the number of valid bytes −1 in the last 256-bit DMA word fetch from DRAM.<br>0 - bits 7:0 are valid,<br>1 - bits 15:0 are valid,<br>31 - bits 255:0 bits are valid etc. |
| 0x448-0x44C | MMIDmaTXMuxMode[1:0] | 2x3 | 0x0 | MMI data write mux swap mode<br>Reg 0 controls the mux select for bits[31:0]<br>Reg 1 controls the mux select for bits[63:32]<br>See Data Mux modes for mode definition |
| 0x460 | MMIDmaRXBottomAdr[21:5] | 17 | 0x00000 | MMI DMA RX channel bottom address register. A 256 bit aligned address containing the first DRAM address in the DRAM circular buffer to be written with RX data see Error! Reference source not found. |
| 0x464 | MMIDmaRXTopAdr[21:5] | 17 | 0x00000 | MMI DMA RX channel top address register. A 256 bit aligned address containing the last DRAM address to be written with RX data before wrapping to MMIDmaRXBottomAdr. |
| 0x468 | MMIDmaRXCurrPtr[21:5] | 17 | 0x00000 | MMI DMA RX channel current write pointer.<br>(Working register) |

TABLE 80-continued

MMI Register Definition

| Address GPIO_base+ | Register | #bits | Reset | Description |
|---|---|---|---|---|
| 0x46C | MMIDmaRXIntAdr[21:5] | 17 | 0x00000 | MMI DMA RX channel interrupt address register. An interrupt is triggered when MMIDmaRXCurrPtr is >= MMIDmaRXIntAdr. The RX buffer may not yet have completed transfer of data to this DRAM address when the interrupt is being handled by the CPU. |
| 0x470 | MMIDmaRXMaxAdr[21:5] | 17 | 0x00000 | MMI DMA RX channel max address register. A 256 bit aligned address containing the last DRAM address to be written to with RX data. |
| 0x474-x478 | MMIDmaRXMuxMode[1:0] | 2x3 | 0x0 | MMI data write mux swap mode select.<br>Bus 0 controls the mux select for bits[31:0]<br>Bus 1 controls the mux select for bits[63:32]<br>See Data Mux modes for mode definition |
| | | MMI TX Control | | |
| 0x500-0x57C | MMITXBuf[31:0] | 32x32 | 0x0000_000 | MMI TX Buffer write access. Each time the register is accessed the buffer write pointer is incremented.<br>All registers write to the same TX buffer, the address controls how the data is swapped before writing<br>See Data Mux modes, and Valid bytes address offset for modes of operation.<br>(Write only register) |
| 0x580 | MMITXBufMode | 3 | 0x0 | TX buffer shift mode. Specifies the data transfer mode for the MMI TX buffer<br>0 = Serial Mode (1 bit mode)<br>1 = 8 bit mode<br>2 = 16 bitmode<br>3 = 32 bit mode<br>4 = 64 bit mode<br>Others = Serial Mode |
| 0x584 | MMITXParMode | 2 | 0x0 | TX buffer Parity generation Mode. Specifies the number of bits to use to generate the tx_parity output to the MMI engines.<br>0-8 bit mode<br>1-16 bit mode<br>2-32 bit mode<br>Others - 8 bit mode |
| 0x588 | MMITXEmpLevel | 4 | 0x0 | MMI TX Buffer Empty Level. Specifies the buffer level in 32bit words below which the TX Buffer should indicate buffer empty to the MMI engine (via the tx_buf_emp signal)<br>a minimum programmed value of 0x0 means "activate tx_buff_empty when the TX FIFO is completely empty", i.e. there are 0 bits in the FIFO.<br>a max programmed value of 0xF means "activate tx_buff_empty when there is room for 1x32 bits in the TX FIFO", i.e. there are 15x32 bits in the FIFO. |
| 0x58C | MMITXIntEmpLevel | 4 | 0x0 | MMI TX Buffer Empty Interrupt Level. Specifies the buffer level in |

TABLE 80-continued

MMI Register Definition

| Address GPIO_base+ | Register | #bits | Reset | Description |
|---|---|---|---|---|
| | | | | 32bit words below which the TX Buffer should set the mmi_gpio_irq[0] output and generate an interrupt to the CPU. |
| 0x590 | MMITXBufLevel | 10 | 0x000 | Indicates the current TX buffer fill level in bits (Read only Register) |
| | | MMI RX Control | | |
| 0x600-0x614 | MMIRXBuf[5:0] | 6x32 | 0x0000_000 | MMI RX Buffer read access. Each time the register is accessed the buffer read pointer is incremented. All registers read the same RX buffer, the address controls how the data is swapped before read from the buffer. See Data Mux modes for modes of operation. (Read only Register) |
| 0x620 | MMIRXBufMode | 3 | 0x0 | RX buffer shift mode. Specifies the data transfer mode for the MMI RX buffer<br>0 - Serial Mode (1 bit mode)<br>1-8 bit mode<br>2-16 bit mode<br>3-32 bit mode<br>4-64 bit mode<br>Others - defaults to Serial Mode |
| 0x624 | MMIRXParMode | 2 | 0x0 | RX buffer Parity generation Mode. Specifies the number of bits to use to generate the rx_parity output to the MMI engines.<br>0-8 bit mode<br>1-16 bit mode<br>2-32 bit mode<br>Others - defaults to 8 bit mode |
| 0x628 | MMIRXFullLevel | 4 | 0xF | MMI RX Buffer Full Level. Specifies the buffer level in 32bit words above which the RX Buffer should indicate buffer full to the MMI engine (via the rx_buf_full signal).<br>a minimum programmed value of 0x0 means "activate rx_buff_full when there are 1 × 32 bits in the RX FIFO".<br>a max programmed value of 0xF means "activate rx_buff_full when the RX FIFO is full", i.e. there are 16x32 bits in the FIFO. |
| 0x62C | MMIRXIntFullLevel | 4 | 0xF | MMI RX Buffer Full Interrupt Level. Specifies the buffer level in 32bit words above which the RX Buffer should set the mmi_gpio_irq[1] output and generate an interrupt to the CPU. |
| 0x630 | MMIRXBufLevel | 10 | 0x000 | Indicates the current RX buffer fill level in bits (Read only Register) |
| | | Debug | | |
| 0x640 | MMITXState | 26 | 0x000_0000 | Reports the current state of TX flags, TX byte select, and counters 2 and 0<br>11:0 - Counter 0 current value<br>12 - Counter 0 auto count on<br>14-13 - TX byte select<br>15 - Unused<br>23-16 - Count 2 current value<br>24 - TX parity result<br>25 - TX compare result<br>(Read only Register) |

TABLE 80-continued

MMI Register Definition

| Address GPIO_base+ | Register | #bits | Reset | Description |
|---|---|---|---|---|
| 0x644 | MMIRXState | 26 | 0x000_0000 | Reports the current state of RX flags, RX byte select, and counters 3 and 1.<br>11:0 - Counter 1 current value<br>12 - Counter 1 auto count on<br>14-13 - RX byte select<br>15 - Unused<br>23-16 - Count 3 current value<br>24 - RX parity result<br>25 - RX compare result<br>(Read only Register) |
| 0x648 | DebugSelect[10:2] | 9 | 0x000 | Debug address select. Indicates the address of the register to report on the mmi_cpu_data bus when it is not otherwise being used. |
| 0x64C | MMIBufStatus | 4 | 0x0 | MMI TX & RX buffer status sticky bits used to capture error conditions accessing the RX & TX buffers:<br>0 - TX Buffer overflow bit<br>1 - TX Buffer underflow bit<br>2 - RX Buffer overflow bit<br>3 - RX Buffer underflow bit<br>(Read only Register) |
| 0x650 | MMIBufStatusClr | 4 | 0x0 | MMI TX & RX buffer status clear register, writing a 1 to MMIBufStatusClr[N] clears MMIBufStatus[N].<br>(Write only Register, reads as 0). |
| 0x654 | MMIBufStatusIntEn | 4 | 0x0 | MMI TX & RX buffer status interrupt enable, MMIBufStatusIntEn[N] set to 1 enables interrupts on the mmi_gpio_irq[1:0] bus as follows:<br>N=0 - TX Buffer overflow interrupt enabled on mmi_gpio_irq[0]<br>N=1 - TX Buffer underflow interrupt enabled on mmi_gpio_irq[0)<br>N=2 - RX Buffer overflow interrupt enabled on mmi_gpio_irq[1]<br>N=3 - RX Buffer underflow interrupt enabled on mmi_gpio_irq[1) |

15.2.2.1 Supervisor and User Mode Access

The configuration registers block examines the CPU access type (cpu_acode signal) and determines if the access is allowed to the addressed register (based on the MMIUserModeEnable register). If an access is not allowed the MMI issues a bus error by asserting the mmi_cpu_berr signal.

All supervisor and user program mode accesses results in a bus error.

Supervisor data mode accesses are always allowed to all registers.

User data mode access is allowed to all registers (except MMIUserModeEnable) when the MMIUserModeEnable is set to 1.

15.2.3 MMI Block Partition

15.2.4 MMI Engine

The MMI engine consists of 2 separate microcode engines that have their own input and output resources and have some shared resources for communicating between each engine.

Both engines operate in exactly the same way. Each engine has an independent 8-bit program counter, 8 inputs and 8 output registers bits. In addition there are shared resources between both engines: 8 output register bits, 2×12-bit auto counters and 2×8-bit regular counters. It is the responsibility of the program code to ensure that shared resources are allocated correctly, and that both process threads do not interfere with each other. If both process engines attempt to change the same shared resource at the same time, process engine 0 always wins.

The 12-bit auto counter can be used to implement a timeout facility where the protocol waits for an acknowledge signal, but the protocol also defines a maximum wait time. The 8-bit regular counter can be used to count the number of bits or bytes sent or received for each transaction.

After reset the program counter for each process engine is reset to 0. If the Go bit for a process engine is 0 the program counter will not be allowed to be updated by the engine (although the CPU can update it), and remain at its current value regardless of the instruction at that address. When Go is set to 1 the engine will start executing commands. Note only the CPU can change the Go bit state.

The program counter can be read at any time by the CPU, but should only be written to when Go is 0. The program counter for both engines can be accessed through the MMIPCAdr registers.

The output registers for each process engine and the shared registers can be accessed by the CPU. They can be accessed at any time, but CPU writes always take priority over MMI process engine writes. The registers can be accessed individually through the MMIOutputControl and MMISharedControl registers, or collectively through the MMIControl register.

15.2.4.1 MMI Instruction Decode

The MMI instruction decode logic accepts the instruction data (inst_data) and decodes the instruction into control signals to the shared logic block and the process engine program counter.

The instruction decode block is enabled by the Go bit. If the Go bit is 0 then the program counter is held in its current state and does not update. If the CPU needs to change the program counter it should do so while Go is set to 0.

When the Go bit is 1 then program counter is updated after each instruction. For non-branch instructions the program counter increments, but for branch instruction the program counter can be adjusted by an offset. The instruction variable length encoding and bit fields allocations are shown below.

Input and Output Address Select Allocation

Table 81 defines what input is selected or what output is affected for a particular address as used by the BC, LDMULT, and LDBIT instructions.

The mmi_gpio_ctrl signals are control outputs to the GPIO and gpio_mmi_ctrl are control inputs from the GPIO. The mmi_shar_ctrl signals are shared bits between both processes. They are also control outputs to the GPIO block. The MMI control signals connections to the IO pads are configured in the GPIO. The mmi_shar_ctrl signals have added functionality in the GPIO; they can be used to control whether particular pins are input or output, and if in output mode, under what conditions to drive or tri-state that pin.

Branch Condition Instruction (BC)

The branch condition instruction compares the input bit selected by the IN_SEL code to the bit B (see IN_SEL/OUT_SEL possible values for definition of IN_SEL bits). If both are equal then the PC is adjusted by the PC_OFFSET address specified in the instruction. The PC_OFFSET is a 2's complement value which allows negative as well as positive jumps (sign extended before addition). If they are unequal, then the PC increments as normal.

| BC: | |
|---|---|
| IN_SEL | = inst_dat[12:8] |
| B | = inst_dat[13] |
| PC_OFFSET | = inst_dat[7:0] |

TABLE 81

IN_SEL/OUT_SEL possible values

| IN_SEL/ OUT_SEL | Test mode (read) Process 0 | Load Mode (write) Process 0 | Test mode (read) Process 1 | Load Mode (write) Process 1 |
|---|---|---|---|---|
| [7:0] | gpio_mmi_ctrl[7:0] (control inputs) | Unused | gpio_mmi_ctrl[15:8] (control inputs) | Unused |
| [15:8] | mmi_gpio_ctrl[7:0] (control outputs) | mmi_gpio_ctrl[7:0] (control outputs) | mmi_gpio_ctrl[15:8] (control outputs) | mmi_gpio_ctrl[15:8] (control outputs) |
| [23:16] | mmi_ctrl_shar[7:0] (shared control outputs) | mmi_ctrl_shar[7:0] (shared control outputs) | mmi_ctrl_shar[7:0] (shared control outputs | mmi_ctrl_shar[7:0] (shared control outputs) |
| [24] | tx_buf_emp | tx_buf_rd_en (a write of 0 is NOP, a write of 1 increments the TX pointer) | tx_buf_emp | tx_buf_rd_en (a write of 0 is NOP, a write of 1 increments the TX pointer) |
| [25] | rx_buf_full | rx_buf_wr_en (a write of 0 increments the WritePtr only, a write of 1 increments WritePtr and realigns the CommitWritePtr) | rx_buf_full | rx_buf_wr_en (a write of 0 increments the WritePtr only, a write of 1 increments WritePtr and realigns the CommitWritePtr) |
| [26] | tx_par_result | tx_par_gen (a write of 0 generates odd parity, a write of 1 generate even parity) | tx_par_result | tx_par_gen (a write of 0 generates odd parity, a write of 1 generate even parity) |
| [27] | rx_par_result | rx_par_gen (a write of 0 generates odd parity, a write of 1 generates even parity) | rx_par_result | rx_par_gen (a write of 0 generates odd parity, a write of 1 generates even parity) |
| [31:28] | cnt_zero[3:0] | cnt_dec[3:0] (a write of 0 is NOP, a write of 1 decrements the corresponding counter) | cnt_zero[3:0] | cnt_dec[3:0] (a write of 0 is NOP, a write of 1 decrements the corresponding counter) |

-continued

```
BC:

if ( in_sel[IN_SEL] == B) then
      pc_adr = pc_adr + PC_OFFSET
else
      pc_adr ++
```

Auto Count Instruction (ACNT)

The auto count instruction loads the counter specified by bit B with NUM_CYCLE and starts the counter decrementing each cycle. When the count reaches zero the cnt_zero[N] flag (where N is the counter number) is set and the autocount is disabled.

```
ACNT:

NUM_CYCLES    = inst_dat[11:0]
B             = inst_dat[12]
wr_data[11:0]   = NUM_CYCLES
// determine which counter to load
ld_cnt[B] = 1
auto_en   = 1
```

Note that the counter select in the autocount instruction is 1 bit as only counters 0 and 1 have autocount logic associated with them.

Load Multiple Instruction (LDMULT)

The LDMULT instruction performs a bitwise copy of the 8-bit OUT_VALUE operand into the process engine's 8-bit output register. In parallel with the 8-bit copy process, the LDMULT instruction also performs a write of 1 to up to 4 particular shared control signals through a mask (the MASK [3:0] operand).

Although the 8-bit copy transfers both 1s and 0s to the output register, the write to the shared control signals from a LDMULT is only ever a write of 1. Thus, when a mask bit is 1, a write of 1 is performed to the appropriate shared control signal for that bit. When a mask bit is 0, a write of 1 is not performed. Thus a mask setting of 0000 has no effect. It is not possible to write a 0 to a shared control signal using the LDMULT command; the LDBIT command must be used instead.

The control signals that the mask applies to depend on the setting of the process engine's MMILdMultMode register. When MMILdMultMode is 0, mask bits 0, 1, 2, 3 target OUT_SEL addresses 24, 26, 28, 30 respectively (see Table 81). When MMILdMultMode is 1, mask bits 0, 1, 2, 3 target OUT_SEL addresses 25, 27, 29, 31 respectively.

```
LDMULT:

OUT_VALUE   = inst_dat[7:0]
MASK        = inst_dat[11:8]
// implement the parallel load
wr_en       = 0x0000_FF00
wr_data[7:0]  = OUT_VALUE
// adjust based on engine
if (mmi_ldmult_mode == RX_MODE) then
      adjust = 1
else
      adjust = 0
for(i=0,i<4;i++) {
      if (MASK[i] == 1) then
```

-continued

```
LDMULT:

            index = i * 2 + 24 + adjust
            wr_en[index]     = 1
            wr_data[index]  = 1
      }
```

Compare Nybble Instruction (CMPNYBBLE)

The compare nybble instruction selects a 4-bit value from the RX or TX buffer, applies a mask (MASK) and compares the result with the instruction value (VALUE). If the result is true then the appropriate compare result (either the RX or TX) will be get set to 1. If the result is false then the result flag will get set to 0.

The B2 bit in the instruction selects whether the rx_fifo_data or tx_fifo_data is used for comparison, and also the location of the result. The B1 bit selects the high or low nybble of the byte, which is selected by byte_sel[0] or byte_sel[1].

The byte from the TX buffer is selected by the byte_sel[0] value from the next 32 bits to be read out from the TX buffer, and the byte from the RX buffer is selected by the byte_sel [1] value from the last 32 bits written into the RX buffer. Note that in the RX case bits only need to be written into the buffer and not necessarily committed to the buffer.

The pseudocode is

```
CMPNYBBLE:

VALUE   = inst_dat[3:0]
MASK    = inst_dat[7:4]
B1      = inst_dat[8]
B2      = inst_dat[9]
cmp_byte_en[B2]    = 1
wr_data[7:0]       = {MASK,VALUE}
cmp_nybble_sel     = B1
```

Compare Byte Instruction (CMPBYTE)

The compare byte instruction has 2 modes of operation: mask enabled mode and direct mode. When the mask enable bit (ME) is 0 it compares the byte selected by the byte_sel register which is in turn selected by bit B, with the data value DATA_VALUE and puts the result in the appropriate compare result register (either RX or TX) also selected by B.

If the ME bit is 1 then an 8-bit counter value (counter 2 or 3) selected by bit B is ANDed with MASK, the data byte (selected as before) is also ANDed with the same MASK, the 2 results are compared for equality and the result is stored in the appropriate compare result register (either RX or TX) also selected by B.

```
CMPBYTE:

VALUE  = inst_data[7:0]
B1     = inst_data[9]
ME     = inst_data[8]
// output control to shared logic
wr_data[7:0]       = VALUE
cmp_byte_en[B1]    = 1
cmp_byte_mode      = ME
```

Load Counter Instruction (LDCNT)

The loads counter instruction loads the NUM_COUNT value into the counter selected by the SEL field. If the counter is one of the 12-bit auto count counters (i.e. counter 0 or 1) and the auto-count is currently active, then the auto count will be disabled. If the instruction is loading an 8-bit NUM_COUNT value into a 12-bit counter the value will be zero filled to 12-bits. A load into a counter overwrites any count that is currently progressing in that counter.

```
LDCNT:
NUM__COUNT      = inst__dat[7:0]
SEL             = inst__dat[9:8]
// select to correct load bit
ld__cnt[SEL]  = 1
wr__data[7:0] = NUM__COUNT
```

Branch Condition Compare Result is 1 (BCCMP1)

The branch condition instruction checks the compare result bit (selected by B) and if equal to 1 then jumps to the relative offset from the current PC address. The PC_OFFSET is a 2's complement value which allows negative as well as positive jumps (sign extended before addition).

```
BCCMP1:
PC__OFFSET    = inst__dat[7:0]
B             = inst__dat[8]
// select the compare result to check
if (B == 0) then
    cmp__result = tx__cmp__result
else
    cmp__result = rx__cmp__result
// do the test
if (cmp__result == 1) then
    pc__adr = pc__adr + PC__OFFSET
else
    pc__adr++
```

Load Output Instruction (LDBIT)

The load out instruction loads the value in B into the output selected by OUT_SEL.

```
LDBIT:
OUT__SEL    = inst__dat[4:0]
B           = inst__dat[5]
wr__en[OUT__SEL]   = 1
wr__data[OUT__SEL] = B
```

Load Counter from FIFO (LDCNT_FIFO)

Loads the counter selected by SEL with data from the RX or TX fifo as selected by bit B. The number of nybbles to load is indicated by NYB field, and values are 0 for 1 nybble load, 1 for 2 nybble loads and 2 for 3 nybble load. Note that the 3 nybble loads can only be used with the 12-bit counters. Any unused bits in the counters are loaded with zeros. In all cases a load of a counter from the FIFO will not enable the auto decrement logic.

```
LDCNT__FIFO:
NYB   = inst__dat[1:0]
SEL   = inst__dat[3:2]
B     = inst__dat[4]
ld__cnt[SEL] = 1
wr__data[2:0]    = {B,NYB}
ld__cnt__mode    = 1
```

Load Byte Select Instruction (LDBSEL)

The load byte select register loads the value in SEL into the byte select register selected by bit B. If B is 0 the byte_sel[0] register is updated if B is 1 the byte_sel[1] register is selected.

```
LDBSEL:
SEL    = inst__dat[1:0]
B      = inst__dat[3]
ld__byte[B]       = 1
wr__data[1:0]     = SEL
```

RX Commit (RXCOM) and Delete (RXDEL) Instructions

The RX commit and delete instructions are used to manipulate the RX write pointers. The RX commit command causes the WritePtr value to be assigned to CommitWritePtr, committing any outstanding data to the RX buffer. The RX delete command causes the WritePtr to get set to CommitWritePtr deleting any data written to the FIFO but not yet committed.

15.2.4.2 IO Control Shared Resource Logic

The shared resource logic controls and arbitrates between the MMI process engines and the MMI output resources. Based on the control signals it receives from each engine it determines how the shared resources should be updated. The same control signals come from each process engine. In the following descriptions the pseudocode is shown for one process engine, but in reality the pseudocode will be repeated for the control inputs of both process engine. Process engine 1 will be checked first then process engine 0, giving process engine 0 the higher priority.

The CPU can also write to the shared output registers. Whenever there is contention, process engine 0 always has priority over process engine 1.

```
// update the output and shared bits
for (i=0;i<32;i++) {
  if (wr__en[i] == 1) then
    data__bit = wr__data[i]
    case i is
      15-8    : mmi__gpio__ctrl[i-8]     = data__bit
      23-16   : mmi__ctrl__shar[i-16]    = data__bit
      24      : tx__rd__en               = data__bit
      25      : rx__wr__en      = 1; rx__ptr__mode = data__bit
      26      : tx__par__gen    = 1; tx__par__mode = data__bit
      27      : rx__par__gen    = 1; rx__par__mode = data__bit
      28      : cnt__dec[0]     = 1;
      29      : cnt__dec[1]     = 1;
      30      : cnt__dec[2]     = 1;
      31      : cnt__dec[3]     = 1;
      other:
    endcase
  }
```

-continued

```
    }
  // perform CPU write
  if (mmi_shar_wr_en == 1) then
  mmi_ctrl_shar[7:0] = mmi_wr_data[23:16]
```

Shared Count Logic

The count logic controls the CNT[3:0] counters and cnt_zero[3:0] flags. When an MMI process engine executes an auto count instruction ACNT, a counter is loaded with the auto count value, which automatically counts down to zero. Only counters 0 and 1 can autocount. When the count reaches 0 the cnt_zero flag for that counter is set. If the MMI engine executes a LDCNT instruction a counter is loaded with the count value in the command. Each time a MMI process engine writes to the cnt_dec[3:0] bits the corresponding counter is decremented. A counter load instruction disables any existing auto count still in progress. Counters 0 and 1 are 12-bits wide and can autocount. Counters 2 and 3 are 8-bits wide with no autocount facility.

The pseudocode is given by:

```
// implement the count down
if (auto_on[N] == 1)OR(cnt_dec[N] == 1) then
  cnt[N] --
// implement the load
if (ld_cnt_en[N] == 1) then
  if (ld_cnt_mode[N] == 1) then        // FIFO load mode
    NYB_VALID    = wr_data[1:0]  // number of nybbles valid
    B            = wr_data[2]     // FIFO data select
    if (B == 0) then
      fifo_data[11:0] = tx_fifo_data[11:0]
    else
      fifo_data[11:0] = rx_fifo_data[11:0]
    // create word to load
    case NYB_VALID
      0: cnt[N] = {0x00,fifo_data[3:0]}
      1: cnt[N] = {0x0 ,fifo_data[7:0]}
      2: cnt[N] = fifo_data[11:0]
    end case
  else
    cnt[N] = wr_data
  // check if auto decrement is on and store
  if (auto_en[N] == 1)
    auto_on[N] = 1
  else
    auto_on[N] = 0
// implement the count zero compare
if (cnt[N] == 0) then
  cnt_zero[N] = 1
  auto_on[N] = 0
```

The pseudocode is shown for counter N, but similar code exists for all 4 counters. In the case of counters 2 and 3 no auto decrement logic exists.

Byte Select Shared Logic

In a similar way to the counter the byte select register can be loaded from any process engine. When an MMI process engine executes a load byte select instruction (LDBSEL), the value in the SEL field is loaded in the byte select register selected by the B field.

```
if (ld_byte_en[B] == 1)
  byte_sel[B] = wr_data[1:0]    // SEL value from MMI engine
else
  byte_sel[B] = byte_sel[B]
```

Byte select 0 selects a byte from the TX fifo data 32 bit word, and byte select 1 selects a byte from the RX fifo data 32 bit word.

Parity/Compare Shared Logic

The parity compare logic block implements the parity generation and compare for both process engines. The results are stored in the rx/tx_par_result and rx/tx_cmp_result registers which can be read by the BC instruction in the MMI process engines.

The pseudo-code for the TX parity generation case is:

```
// implement the parity generation
if (tx_par_gen == 1) then
  tx_par_result = tx_parity ^ tx_par_mode
else
  tx_par_result = tx_par_result
```

The compare logic has a few possible modes of operation: nybble compare, byte immediate and byte masked compare. In all cases the result is stored in the tx/rx_cmp result register.

The pseudocode shown illustrates the logic for any process engine comparing data from the TX buffer, and setting the tx_cmp_result flag.

```
// the nybble compare logic
if (cmp_nybble_en[0] == 1)
  // mux the input byte
  mask[3:0] = wr_data[7:4]
  if (cmp_nybble_sel = 1) then     // nybble select
    fifo_data[3:0] = tx_fifo_data[7:4] AND mask[3:0]
  else
    fifo_data[3:0] = tx_fifo_data[3:0] AND mask[3:0]
  // do the compare
  if (wr_data[3:0] == fifo_data[3:0]) then
    tx_cmp_result = 1
  else
    tx_cmp_result = 0
```

The byte immediate and byte masked compare logic is also similar to above. In this case the pseudocode is shown for a process engine checking the TX buffer byte data.

```
// byte compare logic
if (cmp_byte_en[0] == 1) then
  // check for mask mode of not
  if (cmp_byte_mode == 1) then // masked mode
    mask[7:0] = wr_data[7:0]
    if ((cnt[2][7:0] AND mask[7:0]) == (tx_fifo_data[7:0] AND
    mask[7:0]))
then
      tx_cmp_result = 1
    else
      tx_cmp_result = 0
  else                    // immediate mode
    if (wr_data[7:0] == tx_fifo_data[7:0]) then
      tx_cmp_result = 1
    else
      tx_cmp_result = 0
```

In both pseudocode examples above the code is shown for cmp_byte_en[0] and cmp_nybble_en[0], which compare on TX buffer data (tx_fifo_data), and the counter 2 with the instruction data and the result is stored in the TX compare flag (tx_cmp_result). If the compare enable signals were cmp_byte_en[1] or cmp_nybble_en[1], then the command would compare RX buffer data (rx_fifo_data) and counter 3 with the instruction data, and store the result in the RX compare flag (rx_cmp_result).

15.2.5 Data Mux Modes

The data mux block allows easy swapping of data bus bits and bytes for support of different endianess protocols without the need for CPU or MMI engine processing.

The TX and RX buffer blocks each contains instances of a data mux block. The data mux block swaps the bit and byte order of a 32 bit input bus to generate a 32 bit output bus, based on a mode control. It is used on the write side of the TX buffer, and on the read side of the RX buffer.

The mode control to the data mux block depends on whether the block is being used by the DMA access controller or the CPU.

If the DMA controller is accessing the TX or RX buffer, the data mux operation mode is defined by the MMIDmaRXMuxMode and MMIDmaTXMuxMode registers. The DMAs write or read in 64 bits words, so 2 instances of the data mux are required. MMIDma*XMuxMode[0] configures the data mux connected to the lower 32 bits and MMIDma*XMuxMode[1] configures the data mux for the higher 32 bits.

If the CPU is accessing the RX or TX buffer, the data mux operation mode that is used to do the swapping is derived from the offset of the CPU access from the TX/RX buffer base address. For example if the CPU read was from address RX_BUFFER_BASE+0x4, (note that addresses are in bytes), the offset is 1, so Mode 1 bit flip mode would be used to re-order the read data.

The possible modes of data swap and how they reorder the data bits are shown in Data Mux modes.

TABLE 82

Data Mux modes

| Address Offset | Mode | data in to data out |
|---|---|---|
| 0x00 | Mode 0 | Straight through mode, dout[i] = din[i], where i is 0 to 31 |
| 0x04 | Mode 1 | Bit Flip mode, dout[i] = din[31−i], where i is 0 to 31 |
| 0x08 | Mode 2 | Bytewise Bit Flip Mode<br>dout[i] = din[7−i], where i is 0 to 7<br>dout[i] = din[23−i], where i is 8 to 15<br>dout[i] = din[39−i], where i is 16 to 23<br>dout[i] = din[55−i], where i is 24 to 31 |
| 0x0C | Mode 3 | Byte Flip Mode<br>dout[i] = din[i + 24], where i is 0 to 7<br>dout[i] = din[i + 8], where i is 8 to 15<br>dout[i] = din[i − 8], where i is 16 to 23<br>dout[i] = din[i − 24], where i is 24 to 31 |
| 0x10 | Mode 4 | 16 bit word wise bit flip Mode<br>dout[i] = din[15−i], where i is 0 to 15<br>dout[i] = din[47−i], where i is 16 to 31 |
| 0x14 | Mode 5 | 16 bit Word flip Mode<br>dout[i] = din[i + 16], where i is 0 to 15<br>dout[i] = din[i − 16], where i is 16 to 31 |
| 0x18 | Unused | defaults to functionality of Mode 0 |
| 0x1C | Unused | defaults to functionality of Mode 0 |

When the CPU writes to the TX buffer it can also indicate the number of valid bytes in a write by choosing a different address offset. See Valid bytes address offset and associated description. In the MMI address map the TX buffer occupies a region of 32 register spaces. If the CPU writes to any one of these locations the TX buffer write pointer will increase, but the order and number of valid bytes written will by dictated by the address used.

15.2.6 RX Buffer

The RX buffer accepts data from the GPIO inputs controlled by the MMI engine and transfers data to the CPU or to DRAM using the DMA controller. The RX buffer has several modes of operations configured by the MMIRXBufMode register. The mode of operation controls the number of bits that get written into the RX FIFO, each time a rx_wr_en pulse is received from the MMI engine.

The RX buffer can be read by the CPU or the DMA controller (selected by the MMIBufferMode register).

The CPU always reads 32 bits at a time from the RX buffer. The data the CPU reads from the RX buffer is passed through the data mux block before being placed on the CPU data bus. As a result the data byte and bit order are a function of the CPU address used to access the RX buffer (see Data Mux modes).

The DMA controller always transfers 256 bits to DRAM per access, in chunks of 4 double words of 64 bits. The DMA controller passes the data through 2 data muxes, one for the lower 32 bits of each double word and one for the upper 32 bits of each double word, before passing the data to DRAM. The mode the data muxes operate in is configured by the MMIDmaRXMuxMode registers The DMA controller will only request access to DRAM when there is at least 256-bits of data in the RX buffer.

The RX buffer maintains a read pointer (ReadPtr) and 2 write pointers CommitWritePtr and WritePtr to keep track of data in the FIFO. The CommitWritePtr is used to determine the fill level committed to the FIFO, and the WritePtr is used to determine where data should be written in the FIFO, but might not get committed.

The RX buffer calculates the number of valid bits in the FIFO by comparing the read pointer and the write level pointer, and indicates the level to the CPU via the mmi_rx_buf_level bus. The RX buffer compares the calculated level with the configured MMIRxFullLevel to determine when the buffer is full, and indicates to the MMI engine via the rx_buf_full signal.

If the buffer is in CPU access mode it compares the calculated fill level with the configured MMIRxIntFullLevel to determine when an mmi_gpio_int[1] interrupt should be generated. If the buffer is in DMA access mode the mmi_gpio_int[1] will be generated when MMIDmaRXCurrPtr=MMIDmaRXIntAdr, indicating the DMA has filled the DRAM circular buffer to the configured level.

The RX buffer generates parity based on the configured parity mode MMIRxParMode register, and indicates the parity to the MMI engine via the rx_parity signal. The RX buffer always generates odd parity (although the parity can be adjusted to even within the MMI engine). The number of bits over which to generate parity is specified by the parity mode and the exact data used to generate the parity is specified by the WritePtr. For example if the parity mode is 32 bits the parity will be generated on the last 32 bits written into the RX buffer from the WritePtr.

The RX buffer maintains 2 write pointers to allow data to be stored in the buffer, and then subsequently removed by the MMI engine if needed. The CommitWritePtr pointer is used to indicate the write data level to the CPU i.e. data that is committed to the RX buffer. The WritePtr is used to indicate the next position in the buffer to write to. If the CommitWritePtr and WritePtr are the same then all data stored in the RX buffer is committed. The MMI engine can control how the pointers are updated via the rx_commit, rx_wr_en and rx_delete signals. The rx_commit and rx_delete signals are activated by the RX_COMMIT and the RX_DELETE instructions, rx_wr_en is enabled with an LDBIT or LDMULT instruction accessing OUT_SEL[25].

If the rx_wr_en signal is high and the rx_ptr_mode is also high, the WritePtr is incremented (by the mode number of bits) and the CommitWritePtr is set to WritePtr, committing any outstanding data in the RX buffer, and writing a new data word in.

If the rx_wr_en signal is high and rx_ptr_mode is low then only the WritePtr is incremented, the new data is written into the RX buffer but is not committed, and the CPU side of the buffer is unaware that the data exists in the buffer.

The MMI engine can then choose to either commit the data or delete it. If the data is to be deleted (indicated by the rx_delete signal) then WritePtr is set to CommitWritePtr, or if it's to be committed then the CommitWritePtr pointer is set to WritePtr (indicated by the rx_commit signal).

The RX buffer passes 32 bits of FIFO data (via the rx_fifo_data bus) back to the MMI engine for use in the byte compare, nybble compare and counter load instructions. The 32 bits are the last 32 bits written into the RX buffer from the WritePtr.

The RX buffer is 512 bits in total, implemented as an 8 word×64 bit register array.

In the case of a buffer overflow (rx_wr_en active when the buffer is already full) MMIBufStatus[2] is set to 1 and mmi_gpio_irq[1] is pulsed if the corresponding enable, MMIBufStatusIntEn[2]=1.

In the case of a buffer underflow (CPU read when the buffer is empty) MMIBufStatus[3] is set to 1 and mmi_gpio_irq[1] is pulsed if the corresponding enable, MMIBufStatusIntEn[3]=1.

MMIBufStatus[3:0] bits are then cleared by the CPU writing 1 to the corresponding MMIBufStatusClr[3:0] register bits.

15.2.7 TX Buffer

The TX buffer accepts data from the CPU or DRAM for transfer to the GPIO by the MMI engine. The TX buffer has several modes of operation (defined by the MMITXBufMode register). The mode of operation determines the number of data bits to remove from the FIFO each time a tx_rd_en pulse is received from the MMI engine. For example if the mode is set to 32-bit mode, for each tx_rd_en pulse from the MMI engine the read pointer will increase by 32, and the next 32 bits of data in the FIFO will be presented on the mmi_tx_data[31:0] bus.

The TX buffer can be written to by the CPU or the DMA controller (selected by the MMIBufferMode register).

The CPU always writes 32 bits at a time into the TX buffer. The data the CPU writes is passed through the data mux before writing into the TX buffer, so the data byte and bit order is a function of the CPU address used to access the TX buffer (see Data Mux modes).

The DMA controller always transfers 256 bits from DRAM per access, in chunks of 4 double words of 64 bits. The DMA controller passes the data through 2 data muxes, one for the lower 32 bits of each double word and one for the upper 32 bits of each double word, before writing data to TX buffer. The mode the data muxes operate in is configured by the MMIDmaTXMuxMode registers. The DMA controller will only request access from DRAM when there is at least 256-bits of data free in the TX buffer.

The TX buffer calculates the number of valid bits in the FIFO, and indicates the value to the CPU via the MMITXFillLevel. The TX buffer indicates to the MMI engine when the FIFO fill level has fallen below a configured threshold (MMITXEmpLevel), via tx_buf_empty signal.

In CPU access mode the TX buffer also uses the fill level to compare with the configured MMITXIntEmpLevel to indicate the level that an interrupt is generated to the CPU (via the mmi_gpio_int[0] signal). This interrupt is optional, and the CPU could manage the TX buffer by polling the MMITXBufLevel register. If the buffer is in DMA access mode the mmi_gpio_int[0] will be generated when MMIDmaDXCurrPtr=MMIDmaTXIntAdr, indicating the DMA has emptied the DRAM circular buffer to the configured level.

TX buffer generates a parity bit (tx_parity) for the MMI engine. The parity generation is controlled by the MMITXParMode register which determines how many bits are included in the parity calculation. The parity mode is independent of the TX buffer mode. Parity is always generated on the next N bits in the FIFO to be read out, where the N is derived from the parity mode, e.g. if parity mode is 16-bits, then N is 16. The parity generator always generates odd parity.

The TX buffer passes 32 bits of FIFO data (via the tx_fifo_data bus) back to the MMI engine for use in the byte compare, nybble compare and counter load instructions. The 32-bits are the next 32 bits to be read from the TX buffer.

The TX buffer data mux has additional access modes that allow the CPU to indicate the number of valid bytes per 32-bits word written. The CPU indicates this based on the address used to access TX buffer (as with the data muxing modes).

TABLE 83

Valid bytes address offset

| Offset | Valid bytes |
|---|---|
| 0x000 | Straight through mode, byte 0 valid |
| 0x020 | Straight through mode, byte 0, 1 valid |
| 0x040 | Straight through mode, byte 0, 1, 2 valid |
| 0x060 | All 4 bytes are valid (Straight through mode) |

Each 32 bit entry in the TX buffer has an associated number of valid bytes. When the MMI engine has used all the valid bytes in a 32-bit word the read pointer automatically jumps to the next valid byte. This operation is transparent to the MMI engine.

If the TX buffer is operating in DMA mode, all DMA writes (except the last write) to the TX buffer have all bytes valid. The last 256 bit access has a configured number of bytes valid as programmed by the MMIDmaTxMaxAdr[4:0] registers. The last fetch is defined as the access to DRAM address MMIDmaTxMaxAdr[21:5].

The TX buffer is 512 bits in total, implemented as a 8 word×64 bit register array.

In the case of a buffer overflow (CPU write when the buffer is already full) MMIBufStatus[0] is set to 1 and mmi_gpio_irq[0] is pulsed if the corresponding enable, MMIBufStatusIntEn[0]=1.

In the case of a buffer underflow (tx_rd_en active when the buffer is empty) MMIBufStatus[1] is set to 1 and mmi_gpio_irq[0] is pulsed if the corresponding enable, MMIBufStatusIntEn[1]=1.

MMIBufStatus[3:0] bits are then cleared by the CPU writing 1 to the corresponding MMIBufStatusClr[3:0] register bits.

15.2.8 MicroCode Storage

The microcode block allows the CPU to program both MMI processes by writing into the program space for each MMI engine. For each clock cycle the MicroCode block returns 2 instruction words of 15 bits each, one for process engine 0 and one for process engine 1. The data words returned are pointed to by the pc_adr[0] and pc_adr[1] program counters respectively.

The microcode block allows for up to 256 words of instructions (each 15 bits wide) to be shared in any ratio between both engines.

The CPU can write to the microcode memory at any time, but can only read the microcode memory when both mmi_go bits are zero. This prevents any possible arbitration issues when the CPU and either MMI engine wants to read the memory at the same time.

15.2.9 DMA Controller

The RX and TX buffer block each contain a DMA controller. In the RX buffer the DMA controller is responsible for reading data from the RX buffer and transferring data to the DRAM location bounded by the MMIDmaRXTopAdr and MMIDmaRXBottomAdr. In the TX buffer the DMA controller is responsible for data transfer from the DRAM location bounded by the MMIDmaTXTopAdr and MMIDmaTXBottomAdr to the TX buffer. Both DMA controllers maintain pointers indicating the state of the circular buffer in DRAM. The operation of the circular buffers in both cases is the same (despite the fact that data is travelling in opposite directions to and from DRAM).

The TX DMA channel when enabled (MMIDMAEn[0]) will always try to read data from DRAM when there is at least 256 bits free in the TX buffer. The RX DMA channel when enabled (MMIDmaEn[1]) will always try to write data to DRAM when there is at least 256 bits of data in the RX buffer.

The RX circular buffer operation is described below but the TX circular buffer is similar.

15.2.9.1 Circular Buffer Operation

The DMA controller supports the use of circular buffers for each DMA channel. Each circular buffer is controlled by 5 registers: MMIDmaNBottomAdr, MMIDmaNTopAdr, MMIDmaNMaxAdr, MMIDmaNCurrPtr and MMIDmaNIntAdr. The operation of the circular buffers is shown in figure This figure shows two snapshots of the status of a circular buffer with (b) occurring sometime after (a) and some CPU writes to the registers occurring in between (a) and (b). These CPU writes are most likely to be as a result of an interrupt (which frees up buffer space) but could also have occurred in a DMA interrupt service routine resulting from MMIDmaNIntAdr being hit. The DMA manager will continue filling the free buffer space depicted in (a), advancing the MMIDmaNCurrPtr after each write to the DIU. Note that the MMIDmaNCurrPtr register always points to the next address the DMA manager will write to.

The DMA manager produces an interrupt pulse whenever MMIDmaNCurrPtr advances to become equal to MMIDmaNIntAdr. The CPU can then, either in an interrupt service routine or at some other appropriate time, change the MMIDmaNIntAdr to the next location of interest. Example uses of the interrupt include:

- the simple case of informing the CPU that a quantity of data of pre-known size has arrived
- informing the CPU that large enough quantity of data (possibly containing several packets) has arrived and is worthy of attention
- alerting the CPU to the fact that the MMIDmaNCurrPtr is approaching the MMIDmaMaxAdr (assuming the addresses are set up appropriately) and the CPU should take some action.

In the scenario shown in Figure the CPU has determined (most likely as a result of an interrupt) that the filled buffer space in (a) has been freed up and is therefore available to receive more data. The CPU therefore moves the MMIDmaNMaxAdr to the end of the section that has been freed up and moves the MMIDmaNIntAdr address to an appropriate offset from the MMIDmaNMaxAdr address. The DMA manager continues to fill the free buffer space and when it reaches the address in MMIDmaNTopAdr it wraps around to the address in MMIDmaNBottomAdr and continues from there. DMA transfers will continue indefinitely in this fashion until the DMA manager completes an access to the address in the MMIDmaNMaxAdr register.

When the DMA manager completes an access to the MMIDmaNMaxAdr address the DMA manager will stall and wait for more room to be made available. The CPU interrupt service routine will process data from the buffer (freeing up more space in the buffer) and will update the MMIDmaNMaxAdr address to a new value. When the address is updated it indicates to the DMA manager that more room is available in the buffer, allowing the DMA manager to continue transferring data to the buffer.

The circular buffer is initialized by writing the top and bottom addresses to the MMIDmaNTopAdr and MMIDmaNBottomAdr registers, writing the start address (which does not have to be the same as the MMIDmaNBottomAdr even though it usually will be) to the MMIDmaNCurrPtr register and appropriate addresses to the MMIDmaNIntAdr and MMIDmaNMaxAdr registers. The DMA operation will not commence until a 1 has been written to the relevant bit of the MMIDmaEn register.

While it is possible to modify the MMIDmaNTopAdr and MMIDmaNBottomAdr registers after the DMA has started it should be done with caution. The MMIDmaNCurrPtr register should not be written to while the DMA Channel is in operation. DMA operation may be stalled at any time by clearing the appropriate bit of the MMIDmaEn register.

16 Interrupt Controller Unit (ICU)

The interrupt controller accepts up to N input interrupt sources, determines their priority, arbitrates based on the highest priority and generates an interrupt request to the CPU. The ICU complies with the interrupt acknowledge protocol of the CPU. Once the CPU accepts an interrupt (i.e. processing of its service routine begins) the interrupt controller will assert the next arbitrated interrupt if one is pending.

Each interrupt source has a fixed vector number N, and an associated configuration register, IntReg[N]. The format of the IntReg[N] register is shown in Table 84 below.

TABLE 84

IntReg[N] register format

| Field | bit(s) | Description |
|---|---|---|
| Priority | 3:0 | Interrupt priority |
| Type | 5:4 | Determines the triggering conditions for the interrupt<br>00 - Positive edge<br>10 - Negative edge<br>01 - Positive level<br>11 - Negative level |
| Mask | 6 | Mask bit.<br>1 - Interrupts from this source are enabled,<br>0 - Interrupts from this source are disabled.<br>Note that there may be additional masks in operation at the source of the interrupt. |
| Reserved | 31:7 | Reserved. Write as 0. |

Once an interrupt is received the interrupt controller determines the priority and maps the programmed priority to the appropriate CPU priority levels, and then issues an interrupt to the CPU.

The programmed interrupt priority maps directly to the LEON CPU interrupt levels. Level 0 is no interrupt. Level 15 is the highest interrupt level.

16.1 Interrupt Preemption

With standard LEON pre-emption an interrupt can only be pre-empted by an interrupt with a higher priority level. If an interrupt with the same priority level (1 to 14) as the interrupt being serviced becomes pending then it is not acknowledged until the current service routine has completed.

Note that the level 15 interrupt is a special case, in that the LEON processor will continue to take level 15 interrupts (i.e re-enter the ISR) as long as level 15 is asserted on the icu_cpu_ilevel.

Level 0 is also a special case, in that LEON consider level 0 interrupts as no interrupt, and will not issue an acknowledge when level 0 is presented on the icu_cpu_ilevel bus.

Thus when pre-emption is required, interrupts should be programmed to different levels as interrupt priorities of the same level have no guaranteed servicing order. Should several interrupt sources be programmed with the same priority level, the lowest value interrupt source will be serviced first and so on in increasing order.

The interrupt is directly acknowledged by the CPU and the ICU automatically clears the pending bit of the lowest value pending interrupt source mapped to the acknowledged interrupt level.

All interrupt controller registers are only accessible in supervisor data mode. If the user code wishes to mask an interrupt it must request this from the supervisor and the supervisor software will resolve user access levels.

16.2 Interrupt Sources

The mapping of interrupt sources to interrupt vectors (and therefore IntReg[N] registers) is shown in Table 85 below. Please refer to the appropriate section of this specification for more details of the interrupt sources.

TABLE 85

Interrupt sources vector table

| Vector | Source | Description |
|---|---|---|
| 0 | Timers | WatchDog Timer Update request |
| 1 | Timers | Generic Timer 1 interrupt (tim_icu_irq[0]) |
| 2 | Timers | Generic Timer 2 interrupt (tim_icu_irq[1]) |
| 3 | PCU | PEP Sub-system Interrupt- TE finished band |
| 4 | PCU | PEP Sub-system Interrupt- LBD finished band |
| 5 | PCU | PEP Sub-system Interrupt- CDU finished band |
| 6 | PCU | PEP Sub-system Interrupt- CDU error |
| 7 | PCU | PEP Sub-system Interrupt- PCU finished band |
| 8 | PCU | PEP Sub-system Interrupt- PCU Invalid address interrupt |
| 9 | PHI | PEP Sub-system Interrupt- PHI Line Sync Interrupt |
| 10 | PHI | PEP Sub-system Interrupt- PHI General Irq |
| 11 | UHU | USB Host interrupt (uhu_icu_irq[0]) |
| 12 | UDU | USB Device interrupt (udu_icu_irq[1]) |
| 13 | LSS | LSS interrupt, LSS interface 0 interrupt request (lss_icu_irq[0]) |
| 14 | LSS | LSS interrupt, LSS interface 1 interrupt request(lss_icu_irq[1]) |
| 15 | GPIO | GPIO general purpose interrupts (gpio_icu_irq[0]) |
| 16 | GPIO | GPIO general purpose interrupts (gpio_icu_irq[1]) |
| 17 | GPIO | GPIO general purpose interrupts (gpio_icu_irq[2]) |
| 18 | GPIO | GPIO general purpose interrupts (gpio_icu_irq[3]) |
| 19 | GPIO | GPIO general purpose interrupts (gpio_icu_irq[4]) |
| 20 | GPIO | GPIO general purpose interrupts (gpio_icu_irq[5]) |
| 21 | GPIO | GPIO general purpose interrupts (gpio_icu_irq[6]) |
| 22 | GPIO | GPIO general purpose interrupts (gpio_icu_irq[7]) |
| 23 | GPIO | GPIO general purpose interrupts (gpio_icu_irq[8]) |
| 24 | GPIO | GPIO general purpose interrupts (gpio_icu_irq[9]) |
| 25 | GPIO | GPIO general purpose interrupts (gpio_icu_irq[10]) |
| 26 | GPIO | GPIO general purpose interrupts (gpio_icu_irq[11]) |
| 27 | GPIO | GPIO general purpose interrupts (gpio_icu_irq[12]) |
| 28 | GPIO | GPIO general purpose interrupts (gpio_icu_irq[13]) |
| 29 | GPIO | GPIO general purpose interrupts (gpio_icu_irq[14]) |
| 30 | GPIO | GPIO general purpose interrupts (gpio_icu_irq[15]) |
| 31 | Timers | Generic Timer 3 interrupt (tim_icu_irq[2]) |

16.3 Implementation 16.3.1 Definitions of I/O

TABLE 86

Interrupt Controller Unit I/O definition

| Port name | Pins | I/O | Description |
|---|---|---|---|
| | | | Clocks and Resets |
| pclk | 1 | In | System Clock |
| prst_n | 1 | In | System reset, synchronous active low |
| | | | CPU interface |
| cpu_adr[7:2] | 6 | In | CPU address bus. Only 6 bits are required to decode the address space for the ICU block |

TABLE 86-continued

Interrupt Controller Unit I/O definition

| Port name | Pins | I/O | Description |
|---|---|---|---|
| cpu_dataout[31:0] | 32 | In | Shared write data bus from the CPU |
| icu_cpu_data[31:0] | 32 | Out | Read data bus to the CPU |
| cpu_rwn | 1 | In | Common read/not-write signal from the CPU |
| cpu_icu_sel | 1 | In | Block select from the CPU. When cpu_icu_sel is high both cpu_adr and cpu_dataout are valid |
| icu_cpu_rdy | 1 | Out | Ready signal to the CPU. When icu_cpu_rdy is high it indicates the last cycle of the access. For a write cycle this means cpu_dataout has been registered by the ICU block and for a read cycle this means the data on icu_cpu_data is valid. |
| icu_cpu_ilevel[3:0] | 4 | Out | Indicates the priority level of the current active interrupt. |
| cpu_iack | 1 | In | Interrupt request acknowledge from the LEON core. |
| cpu_icu_ilevel[3:0] | 4 | In | Interrupt acknowledged level from the LEON core |
| icu_cpu_berr | 1 | Out | Bus error signal to the CPU indicating an invalid access. |
| cpu_acode[1:0] | 2 | In | CPU Access Code signals. These decode as follows:<br>00 - User program access<br>01 - User data access<br>10 - Supervisor program access<br>11 - Supervisor data access |
| icu_cpu_debug_valid | 1 | Out | Debug Data valid on icu_cpu_data bus. Active high |
| | | | Interrupts |
| tim_icu_wd_irq | 1 | In | Watchdog timer interrupt signal from the Timers block |
| tim_icu_irq[2:0] | 3 | In | Generic timer interrupt signals from the Timers block |
| gpio_icu_irq[15:0] | 16 | In | GPIO pin interrupts |
| uhu_icu_irq | 1 | In | USB host interrupt |
| udu_icu_irq | 1 | In | USB device interrupt. |
| lss_icu_irq[1:0] | 2 | In | LSS interface interrupt request |
| cdu_finishedband | 1 | In | Finished band interrupt request from the CDU |
| cdu_icu_jpegerror | 1 | In | JPEG error interrupt from the CDU |
| lbd_finishedband | 1 | In | Finished band interrupt request from the LBD |
| te_finishedband | 1 | In | Finished band interrupt request from the TE |
| pcu_finishedband | 1 | In | Finished band interrupt request from the PCU |
| pcu_icu_address_invalid | 1 | In | Invalid address interrupt request from the PCU |
| phi_icu_general_irq | 1 | In | PHI general interrupt source. |
| phi_icu_line_irq | 1 | In | Line interrupt request from the PHI |

16.3.1

16.3.2 Configuration Registers

The configuration registers in the ICU are programmed via the CPU interface. Refer to section 11.4 on page 76 for a description of the protocol and timing diagrams for reading and writing registers in the ICU. Note that since addresses in SoPEC are byte aligned and the CPU only supports 32-bit register reads and writes, the lower 2 bits of the CPU address bus are not required to decode the address space for the ICU. When reading a register that is less than 32 bits wide zeros are returned on the upper unused bit(s) of icu_cpu_data. Table 87 lists the configuration registers in the ICU block.

The ICU block will only allow supervisor data mode accesses (i.e. cpu_acode[1:0]=SUPERVISOR_DATA). All other accesses will result in icu_cpu_berr being asserted.

TABLE 87

ICU Register Map

| Address ICU_base+ | Register | #bits | Reset | Description |
|---|---|---|---|---|
| 0x00-0x7C | IntReg[31:0] | 32x7 | 0x00 | Interrupt vector configuration register See Table 84 for bit field definitions, and Table 85 for interrupt source allocation. |
| 0x80 | IntClear | 32 | 0x0000_0000 | Interrupt pending clear register. If written with a one it clears corresponding interrupt Bits[31:0] - Interrupts sources 31 to 0 (Reads as zero) |
| 0x84 | IntPending | 32 | 0x0000_0000 | Interrupt pending register. (Read Only) Bits[31:0]- Interrupts sources 31 to 0 |
| 0x88 | IntSource | 6 | 0x3F | Indicates the interrupt source of the last acknowledged interrupt. The NoInterrupt value is defined as all bits set to one. (Read Only) |

TABLE 87-continued

ICU Register Map

| Address ICU_base+ | Register | #bits | Reset | Description |
|---|---|---|---|---|
| 0x8C | DebugSelect[7:2] | 6 | 0x00 | Debug address select. Indicates the address of the register to report on the icu_cpu_data bus when it is not otherwise being used. |

16.3.3 ICU Partition 16.3.4 Interrupt Detect

The ICU contains multiple instances of the interrupt detect block, one per interrupt source. The interrupt detect block examines the interrupt source signal, and determines whether it should generate request pending (int_pend) based on the configured interrupt type and the interrupt source conditions. If the interrupt is not masked the interrupt will be reflected to the interrupt arbiter via the int_active signal. Once an interrupt is pending it remains pending until the interrupt is accepted by the CPU or it is level sensitive and gets removed. Masking a pending interrupt has the effect of removing the interrupt from arbitration but the interrupt will still remain pending.

When the CPU accepts the interrupt (using the normal ISR mechanism), the interrupt controller automatically generates an interrupt clear for that interrupt source (cpu_int_clear). Alternatively if the interrupt is masked, the CPU can determine pending interrupts by polling the IntPending registers. Any active pending interrupts can be cleared by the CPU without using an ISR via the IntClear registers.

Should an interrupt clear signal (either from the interrupt clear unit or the CPU) and a new interrupt condition happen at the same time, the interrupt will remain pending. In the particular case of a level sensitive interrupt, if the level remains the interrupt will stay active regardless of the clear signal.

The logic is shown below:

```
mask        = int_config[6]
type        = int_config[5:4]
int_pend    = last_int_pend       // the last pending interrupt
// update the pending FF
// test for interrupt condition
if (type == NEG_LEVEL) then
    int_pend = NOT(int_src)
elsif (type == POS_LEVEL)
    int_pend = int_src
elsif ((type == POS_EDGE) AND (int_src == 1) AND (last_int_src ==
0))
    int_pend = 1
elsif ((type == NEG_EDGE) AND (int_src == 0) AND (last_int_src ==
1))
    int_pend = 1
elsif ((int_clear == 1)OR (cpu_int_clear==1)) then
    int_pend = 0
else
    int_pend = last_int_pend // stay the same as before
// mask the pending bit
if (mask == 1) then
    int_active = int_pend
else
    int_active = 0
// assign the registers
```

-continued

```
last_int_src = int_src
last_int_pend = int_pend
```

16.3.5 Interrupt Arbiter

The interrupt arbiter logic arbitrates a winning interrupt request from multiple pending requests based on configured priority. It generates the interrupt to the CPU by setting icu_cpu_ilevel to a non-zero value. The priority of the interrupt is reflected in the value assigned to icu_cpu_ilevel, the higher the value the higher the priority, 15 being the highest, and 0 considered no interrupt.

```
// arbitrate with the current winner
int_ilevel      = 0
for (i=0;i<32;i++) {
  if (int_active[i] == 1) then {
    if (int_config[i][3:0] > win_int_ilevel[3:0]) then
      win_int_ilevel[3:0] = int_config[i][3:0]
      }
    }
  }
// assign the CPU interrupt level
int_ilevel = win_int_ilevel[3:0]
```

16.3.6 Interrupt clear unit

The interrupt clear unit is responsible for accepting an interrupt acknowledge from the CPU, determining which interrupt source generated the interrupt, clearing the pending bit for that source and updating the IntSource register.

When an interrupt acknowledge is received from the CPU, the interrupt clear unit searches through each interrupt source looking for interrupt sources that match the acknowledged interrupt level (cpu_icu_ilevel) and determines the winning interrupt (lower interrupt source numbers have higher priority). When found the interrupt source pending bit is cleared and the IntSource register is updated with the interrupt source number.

The LEON interrupt acknowledge mechanism automatically disables all other interrupts temporarily until it has correctly saved state and jumped to the ISR routine. It is the responsibility of the ISR to re-enable the interrupts. To prevent the IntSource register indicating the incorrect source for an interrupt level, the ISR must read and store the IntSource value before re-enabling the interrupts via the Enable Traps (ET) field in the Processor State Register (PSR) of the LEON.

See section 11.9 on page 113 for a complete description of the interrupt handling procedure. After reset the state machine remains in Idle state until an interrupt acknowledge is received from the CPU (indicated by cpu_iack). When the acknowledge is received the state machine transitions to the Compare state, resetting the source counter (cnt) to the number of interrupt sources.

While in the Compare state the state machine cycles through each possible interrupt source in decrementing order. For each active interrupt source the programmed priority (int_priority[cnt][3:0]) is compared with the acknowledged interrupt level from the CPU (cpu_icu_i-level), if they match then the interrupt is considered the new winner. This implies the last interrupt source checked has the highest priority, e.g interrupt source zero has the highest priority and the first source checked has the lowest priority. After all interrupt sources are checked the state machine transitions to the IntClear state, and updates the int_source register on the transition.

Should there be no active interrupts for the acknowledged level (e.g. a level sensitive interrupt was removed), the IntSource register will be set to NoInterrupt. NoInterrupt is defined as the highest possible value that IntSource can be set to (in this case 0x3F), and the state machine will return to Idle.

The exact number of compares performed per clock cycle is dependent the number of interrupts, and logic area to logic speed trade-off, and is left to the implementer to determine. A comparison of all interrupt sources must complete within 8 clock cycles (determined by the CPU acknowledge hardware).

When in the IntClear state the state machine has determined the interrupt source to clear (indicated by the int_source register). It resets the pending bit for that interrupt source, transitions back to the Idle state and waits for the next acknowledge from the CPU.

The minimum time between successive interrupt acknowledges from the CPU is 8 cycles.

17 Timers Block (TIM)

The Timers block contains general purpose timers, a watchdog timer and timing pulse generator for use in other sections of SoPEC.

17.1 Timing Pulse Generator

The timing block contains a timing pulse generator clocked by the system clock, used to generate timing pulses of programmable periods. The period is programmed by accessing the TimerStartValue registers. Each pulse is of one system clock duration and is active high, with the pulse period accurate to the system clock frequency. The periods after reset are set to 1 μs, 100 μs and 100 ms. The timing pulses are used internally in the timers block for the watchdog and generic timers, and are exported to the GPIO block for other timing functions.

The timing pulse generator also contains a 64-bit free running counter that can be read or reset by accessing the FreeRunCount registers. The free running counter can be used to determine elapsed time between events at system clock accuracy or could be used as an input source in low-security random number generator.

17.2 Watchdog Timer

The watchdog timer is a 32 bit counter value which counts down each time a timing pulse is received. The period of the timing pulse is selected by the WatchDogUnitSel register. The value at any time can be read from the WatchDogTimer register and the counter can be reset by writing a non-zero value to the register. When the counter transitions from 1 to 0, a system wide reset will be triggered as if the reset came from a hardware pin.

The watchdog timer can be polled by the CPU and reset each time it gets close to 1, or alternatively a threshold (WatchDogIntThres) can be set to trigger an interrupt for the watchdog timer to be serviced by the CPU. If the WatchDogIntThres is set to N, then the interrupt will be triggered on the N to N-1 transition of the WatchDogTimer. This interrupt can be effectively masked by setting the threshold to zero. The watchdog timer can be disabled, without causing a reset, by writing zero to the WatchDogTimer register.

All write accesses to the WatchDogTimer register are protected by the WatchDogKey register. The CPU must write the value 0xDEADF1D0 to the WatchDogKey register to enable a write access to the WatchDogTimer register. The next access (and only the next access) to the timers address space will be allowed to write to the WatchDogTimer, all subsequent accesses will not be allowed to write to the WatchDogTimer. Any access to any register in the timers address space will clear the write enable key to the WatchDogTimer. An attempt to write to the WatchDogTimer when writes are not enabled will have no effect.

17.3 Generic Timers

SoPEC contains 3 programmable generic timing counters, for use by the CPU to time the system. The timers are programmed to a particular value and count down each time a timing pulse is received. When a particular timer decrements from 1 to 0, an interrupt is generated. The counter can be programmed to automatically restart the count, or wait until re-programmed by the CPU. At any time the status of the counter can be read from GenCntValue, or can be reset by writing to GenCntValue register. The auto-restart is activated by setting the GenCntAuto register, when activated the counter restarts at GenCntStart Value. A counter can be stopped or started at any time, without affecting the contents of the GenCntValue register, by writing a 1 or 0 to the relevant GenCntEnable register.

17.4 Implementation

17.4.1 Definitions of I/O

TABLE 88

Timers block I/O definition

| Port name | Pins | I/O | Description |
|---|---|---|---|
| | | | Clocks and Resets |
| pclk | 1 | In | System Clock |
| prst_n | 1 | In | System reset, synchronous active low |
| tim_pulse[2:0] | 3 | Out | Timers block generated timing pulses, each one pclk wide<br>0 - Nominal 1 μs pulse<br>1 - Nominal 100 μs pulse<br>2 - Nominal 10 ms pulse |

TABLE 88-continued

Timers block I/O definition

| Port name | Pins | I/O | Description |
|---|---|---|---|
| | | | CPU interface |
| cpu_adr[6:2] | 5 | In | CPU address bus. Only 5 bits are required to decode the address space for the ICU block |
| cpu_dataout[31:0] | 32 | In | Shared write data bus from the CPU |
| Tim_cpu_data[31:0] | 32 | Out | Read data bus to the CPU |
| cpu_rwn | 1 | In | Common read/not-write signal from the CPU |
| cpu_tim_sel | 1 | In | Block select from the CPU. When cpu_tim_sel is high both cpu_adr and cpu_dataout are valid |
| Tim_cpu_rdy | 1 | Out | Ready signal to the CPU. When tim_cpu_rdy is high it indicates the last cycle of the access. For a write cycle this means cpu_dataout has been registered by the TIM block and for a read cycle this means the data on tim_cpu_data is valid. |
| Tim_cpu_berr | 1 | Out | Bus error signal to the CPU indicating an invalid access. |
| cpu_acode[1:0] | 2 | In | CPU Access Code signals. These decode as follows:<br>00 - User program access<br>01 - User data access<br>10 - Supervisor program access<br>11 - Supervisor data access |
| Tim_cpu_debug_valid | 1 | Out | Debug Data valid on tim_cpu_data bus. Active high |
| | | | Miscellaneous |
| Tim_icu_wd_irq | 1 | Out | Watchdog timer interrupt signal to the ICU block |
| Tim_icu_irq[2:0] | 3 | Out | Generic timer interrupt signals to the ICU block |
| Tim_cpr_reset_n | 1 | Out | Watch dog timer system reset. |

17.4.1

17.4.2 Timers Sub-block Partition 17.4.3 Watchdog Timer

The watchdog timer counts down from a pre-programmed value, and generates a system wide reset when equal to one. When the counter passes a pre-programmed threshold (wdog_tim_thres) value an interrupt is generated (tim_icu_wd_irq) requesting the CPU to update the counter. Setting the counter to zero disables the watchdog reset. In supervisor mode the watchdog counter can be written to directly after a valid write of 0xDEADF1D0 to the WatchDogKey register, it can be read from at any time. In user mode all access (both read and write) is denied. Any accesses in user mode will generate a bus error.

The counter logic is given by

```
if (wdog_wen == 1) then
   wdog_tim_cnt = write_data          // load new data
elsif ( wdog_tim_cnt == 0) then
   wdog_tim_cnt = wdog_tim_cnt        // count disabled
elsif (cnt_en == 1) then
   wdog_tim_cnt--
else
   wdog_tim_cnt = wdog_tim_cnt
```

The timer decode logic is

```
if ((wdog_tim_cnt == wdog_tim_thres)
AND (wdog_tim_cnt!= 0) AND (cnt_en == 1)) then
         tim_icu_wd_irq = 1
else
         tim_icu_wd_irq = 0
// reset generator logic
if (wdog_tim_cnt == 1) AND (cnt_en == 1) then
```

-continued

```
         tim_cpr_reset_n = 0
    else
         tim_cpr_reset_n = 1
```

17.4.4 Generic Timers

The generic timers block consists of 3 identical counters. A timer is set to a pre-configured value (GenCntStartValue) and counts down once per selected timing pulse (gen_unit_sel). The timer can be enabled or disabled at any time (gen tim_en), when disabled the counter is stopped but not cleared. The timer can be set to automatically restart (gen_tim_auto) after it generates an interrupt. In supervisor mode a timer can be written to or read from at any time, in user mode access is determined by the GenCntUserModeEnable register settings.

The counter logic is given by

```
if (gen_wen == 1) then
         gen_tim_cnt = write_data
elsif ((cnt_en == 1) AND (gen_tim_en == 1)) then
         if (gen_tim_cnt == 1) OR (gen_tim_cnt == 0) then //
counter may need re-starting
            if (gen_tim_auto == 1) then
               gen_tim_cnt = gen_tim_cnt_st_value
            else
               gen_tim_cnt = 0                    // hold count at zero
         else
            gen_tim_cnt--
else
         gen_tim_cnt = gen_tim_cnt
```

The decode logic is

```
if (gen_tim_cnt == 1)AND (cnt_en == 1)AND (gen_tim_en == 1) then
        tim_icu_irq = 1
else
        tim_icu_irq = 0
```

17.4.5 Timing Pulse Generator

The timing pulse generator contains a general free running 64-bit timer and 3 timing pulse generators producing timing pulses of one cycle duration with a programmable period. The period is programmed by changed the TimerStartValue registers, but have a nominal starting period of 1 µs, 100 µs and 1 ms. Note that each timing pulses is generated from the previous timer pulse and so cascade. A change of the timer period 0 will affect the other timer periods. The maximum period for timer 0 is 1.331 µs (256×pclk), timer 1 is 341 µs (256×1.331 µs) and timer 2 is 87 ms (256×341 µs).

In supervisor mode the free running timer register can be written to or read from at any time, in user mode access is denied. The status of each of the timers can be read by accessing the PulseTimerStatus registers in supervisor mode. Any accesses in user mode will result in a bus error.

17.4.5.1 Free Run Timer

The increment logic block increments the timer count on each clock cycle. The counter wraps around to zero and continues incrementing if overflow occurs. When the timing register (FreeRunCount) is written to, the configuration registers block will set the free_run_wen high for a clock cycle and the value on write_data will become the new count value. If free_run_wen[1] is 1 the higher 32 bits of the counter will be written to, otherwise if free_run_wen[0] the lower 32 bits are written to. It is the responsibility of software to handle these writes in a sensible manner.

The increment logic is given by

```
if (free_run_wen[1] == 1) then
        free_run_cnt[63:32] = write_data
elsif (free_run_wen[0] == 1) then
        free_run_cnt[31:0]  = write_data
else
        free_run_cnt ++
```

17.4.5.2 Pulse Timers

The pulse timer logic generates timing pulses of 1 clock cycle length and programmable period. Nominally they generate pulse periods of 1 µs, 100 µs and 1 ms. The logic for timer 0 is given by:

```
// Nominal 1us generator
if (pulse_0_cnt == 0) then
   pulse_0_cnt = timer_start_value[0]
   tim_pulse[0]= 1
else
   pulse_0_cnt --
   tim_pulse[0]= 0
```

The logic for timer 1 is given by:

```
// 100us generator
if ((pulse_1_cnt == 0) AND (tim_pulse[0] == 1)) then
   pulse_1_cnt = timer_start_value[1]
   tim_pulse[1] = 1
elsif (tim_pulse[0] == 1) then
   pulse_1_cnt --
   tim_pulse[1] = 0
else
   pulse_1_cnt = pulse_1_cnt
   tim_pulse[1] = 0
```

The logic for timer 2 is given by:

```
// 10ms generator
if ((pulse_2_cnt == 0) AND (tim_pulse[1] == 1)) then
   pulse_2_cnt = timer_start_value[2]
   tim_pulse[2] = 1
elsif (tim_pulse[1] == 1) then
   pulse_2_cnt --
   tim_pulse[2] = 0
else
   pulse_2_cnt = pulse_2_cnt
   tim_pulse[2] = 0
```

17.4.6 Configuration Registers

The configuration registers in the TIM are programmed via the CPU interface. Refer to section 11.4.3 on page 77 for a description of the protocol and timing diagrams for reading and writing registers in the TIM. Note that since addresses in SoPEC are byte aligned and the CPU only supports 32-bit register reads and writes, the lower 2 bits of the CPU address bus are not required to decode the address space for the TIM. When reading a register that is less than 32 bits wide zeros are returned on the upper unused bit(s) of tim_pcu_data. Table 89 lists the configuration registers in the TIM block.

TABLE 89

Timers Register Map

| Address TIM_base+ | Register | #bits | Reset | Description |
|---|---|---|---|---|
| 0x00 | WatchDogUnitSel | 2 | 0x0 | Specifies the units used for the watchdog timer:<br>0 - Nominal 1 µs pulse<br>1 - Nominal 100 µs pulse<br>2 - Nominal 10 ms pulse<br>3 - pclk |

TABLE 89-continued

Timers Register Map

| Address TIM_base+ | Register | #bits | Reset | Description |
|---|---|---|---|---|
| 0x04 | WatchDogTimer | 32 | 0xFFFF_FFFF | Specifies the number of units to count before watchdog timer triggers. |
| 0x08 | WatchDogIntThres | 32 | 0x0000_0000 | Specifies the threshold value below which the watchdog timer issues an interrupt |
| 0x0C-0x10 | FreeRunCount[1:0] | 2x32 | 0x0000_0000 | Direct access to the free running counter register.<br>Bus 0 - Access to bits 31-0<br>Bus 1 - Access to bits 63-32 |
| 0x14 to 0x1C | GenCntStartValue[2:0] | 3x32 | 0x0000_0000 | Generic timer counter start value, number of units to count before event |
| 0x20 to 0x28 | GenCntValue[2:0] | 3x32 | 0x0000_0000 | Direct access to generic timer counter registers |
| 0x30 | WatchDogKey | 32 | 0x0000_0000 | Watchdog Timer write enable key. A write of 0xDEADF1D0 will enable the subsequent access of the timers block to write to the WatchDogTimer register. Any other access will disable WatchDogTimer write access.<br>(Reads as zero) |
| 0x40 to 0x48 | GenCntUnitSel[2:0] | 3x2 | 0x0 | Generic counter unit select. Selects the timing units used with corresponding counter:<br>0 - Nominal 1 μs pulse<br>1 - Nominal 100 μs pulse<br>2 - Nominal 10 ms pulse<br>3 - pclk |
| 0x4C to 0x54 | GenCntAuto[2:0] | 3x1 | 0x0 | Generic counter auto re-start select. When high timer automatically restarts, otherwise timer stops. |
| 0x58 to 0x60 | GenCntEnable[2:0] | 3x1 | 0x0 | Generic counter enable.<br>0 - Counter disabled<br>1 - Counter enabled |
| 0x64 | GenCntUserModeEnable | 3 | 0x0 | User Mode Access enable to generic timer configuration register. When 1 user access is enabled.<br>Bit 0 - Generic timer 0<br>Bit 1 - Generic timer 1<br>Bit 2 - Generic timer 2 |
| 0x68 to 0x70 | TimerStartValue[2:0] | 3x8 | 0xBF, 0x63, 0x63 | Timing pulse generator start value. Indicates the start value for each timing pulse timers. For timer 0 the start value specifies the timer period in pclk cycles - 1.<br>For timer 1 the start value specifies the timer period in timer 0 intervals −1.<br>For timer 2 the start value specifies the timer period in timer 1 intervals −1.<br>Nominally the timers generate pulses at 1 us, 100 us and 10 ms intervals respectively. |
| 0x74 | DebugSelect[6:2] | 5 | 0x00 | Debug address select. Indicates the address of the register to report on the tim_cpu_data bus when it is not otherwise being used. |
| | | Read Only Registers | | |
| 0x78 | PulseTimerStatus | 24 | 0x00 | Current pulse timer values, and pulses<br>7:0 - Timer 0 count<br>15:8 - Timer 1 count<br>23:16 - Timer 2 count<br>24 - Timer 0 pulse<br>25 - Timer 1 pulse<br>26 - Timer 2 pulse |

17.4.6.1 Supervisor and User Mode Access

The configuration registers block examines the CPU access type (cpu_acode signal) and determines if the access is allowed to that particular register, based on configured user access registers. If an access is not allowed the block will issue a bus error by asserting the tim_cpu_berr signal.

The timers block is fully accessible in supervisor data mode, all registers can written to and read from. In user mode access is denied to all registers in the block except for the generic timer configuration registers that are granted user data access. User data access for a generic timer is granted by setting corresponding bit in the GenCntUserModeEnable register. This can only be changed in supervisor data mode. If a particular timer is granted user data access then all registers for configuring that timer will be accessible. For example if timer 0 is granted user data access the GenCntStartValue[0], GenCntUnitSel[0], GenCntAuto[0], GenCntEnable[0] and GenCntValue[0] registers can all be written to and read from without any restriction.

Attempts to access a user data mode disabled timer configuration register will result in a bus error.

Table 90 details the access modes allowed for registers in the TIM block. In supervisor data mode all registers are accessible. All forbidden accesses will result in a bus error (tim_cpu_berr asserted).

TABLE 90

TIM supervisor and user access modes

| Register Address | Registers | Access Permission |
|---|---|---|
| 0x00 | WatchDogUnitSel | Supervisor data mode only |
| 0x04 | WatchDogTimer | Supervisor data mode only |
| 0x08 | WatchDogIntThres | Supervisor data mode only |
| 0x0C-0x10 | FreeRunCount | Supervisor data mode only |
| 0x14 | GenCntStartValue[0] | GenCntUserModeEnable[0] |
| 0x18 | GenCntStartValue[1] | GenCntUserModeEnable[1] |
| 0x1C | GenCntStartValue[2] | GenCntUserModeEnable[2] |
| 0x20 | GenCntValue[0] | GenCntUserModeEnable[0] |
| 0x24 | GenCntValue[1] | GenCntUserModeEnable[1] |
| 0x28 | GenCntValue[2] | GenCntUserModeEnable[2] |
| 0x30 | WatchDogKey | Supervisor data mode only |
| 0x40 | GenCntUnitSel[0] | GenCntUserModeEnable[0] |
| 0x44 | GenCntUnitSel[1] | GenCntUserModeEnable[1] |
| 0x48 | GenCntUnitSel[2] | GenCntUserModeEnable[2] |
| 0x4C | GenCntAuto[0] | GenCntUserModeEnable[0] |
| 0x50 | GenCntAuto[1] | GenCntUserModeEnable[1] |
| 0x54 | GenCntAuto[2] | GenCntUserModeEnable[2] |
| 0x58 | GenCntEnable[0] | GenCntUserModeEnable[0] |
| 0x5C | GenCntEnable[1] | GenCntUserModeEnable[1] |
| 0x60 | GenCntEnable[2] | GenCntUserModeEnable[2] |
| 0x64 | GenCntUserModeEnable | Supervisor data mode only |
| 0x68-0x70 | TimerStartValue[2:0] | Supervisor data mode only |
| 0x74 | DebugSelect | Supervisor data mode only |
| 0x78 | PulseTimerStatus | Supervisor data mode only |

18 Clocking, Power and Reset (CPR)

The CPR block provides all of the clock, power enable and reset signals to the SoPEC device.

18.1 Powerdown Modes

The CPR block is capable of powering down certain sections of the SoPEC device. When a section is powered down the clocks to that section are gated in a controlled way to prevent clock glitching. When a section is powered back up the clock is re-enabled without introducing any glitches.

Except in the case of the DIU section, all blocks contained in a section will retain their state while powered down. The DIU is unable to retain state as it relies on a refresh circuit to sustain state in DRAM.

There are 2 types of powerdown mode, sleep and snooze mode (configured by the SnoozeModeSelect register). In sleep mode when a section is powered down and powered back up again, the CPR automatically resets all the blocks in the section, effectively clearing any retained state. In snooze mode when a section is powered down and back up again the blocks are not automatically reset, and so state is retained.

In the case of the PSS state is retained regardless of whether sleep or snooze mode is used to powerdown the block.

For the purpose of powerdown the SoPEC device is divided into sections:

TABLE 91

Powerdown sectioning

| Section Name | Section | Blocks included |
|---|---|---|
| CPU system | Section 0 | CPU, MMU, ICU, ROM, PSS, LSS |
| PEP SubSystem | Section 1 | PCU, CDU, CFU, LBD, SFU, TE, TFU, HCU, DNC, DWU, LLU, PHI |
| MMI System | Section 2 | GPIO, MMI, TIM |
| DIU System | Section 3 | DIU (includes DCU, DAU and DRAM) |
| USB Device | Section 4 | UDU |
| USB Host | Section 5 | UHU |
| USB PHY | Section 6 | USB PHY (common block and all transceivers) |

Note that the CPR block is not located in any section. All configuration registers in the CPR block are clocked by an ungateable clock and have special reset conditions.

18.1.1 Sleep Mode

Each section can be put into sleep (or snooze) mode by setting the corresponding bit in the SleepModeEnable register. To re-enable the section the sleep mode bit needs to be cleared. Any section re-enabled from sleep mode will be automatically reset, those re-enabled from snooze will not. The CPU may choose to reset the section independently at a later stage. Any sections that are reset will need to be re-configured by the CPU.

If the CPU system (section 0) is put into sleep mode, the SoPEC device will remain in sleep mode until either a reset or wakeup condition is detected. The reset condition could come from the external reset pin, the power-on detect macro, the brown-out detect macro, or the watchdog timer (if the section 2 was left powered up). The wakeup condition could come from any of the USB PHY ports, the UDU or the GPIO. In the case of the GPIO and UDU they must be left powered on for them to be capable of generating a wakeup condition. The USB PHY can generate a wakeup condition regardless of its powered state.

18.1.2 Sleep/Snooze Mode Powerdown Procedure

When powering down a section, the section will retain its current state (except in the DIU section). It is possible when powering back up a section that inconsistencies between interface state machines could cause incorrect operation. In order to prevent such conditions from happening, all blocks in a section must be disabled before powering down. This will ensure that blocks are restored in a benign state when powered back up.

In the case of PEP section units setting the Go bit to zero will disable the block. To correctly powerdown PHI LVDS outputs the CPU must disable the PHI data and clock outputs by setting PhiDataEnable and PhiClkEnable registers to zero. The DRAM subsystem can be effectively disabled by setting the RotationSync bit to zero.

The USB host and device sections should be in suspend state, with all DMA channels disabled before powering down. The USB device cannot be put into suspend mode by SoPEC it requires the host to suspend the USB bus.

The USB PHY should only be powered down if both the USB host and device are powered down first, requiring that all transceivers are in suspend state.

When powering down the MMI section:

Disable both MMI engines, and both MMI DMA channels

Disable the timing pulse generator, and watchdog timer in the TIM block

Disable all GPIO interrupts

To powerdown the CPU section:

Load all the code and data needed to powerdown into the caches (Optionally) Disable traps (or at least interrupts)

Perform a dummy write to a CPU subsystem location to flush the MMU DRAM write buffer Write to the SleepModeEnable in the CPR to powerdown the CPU section 18.2 External Reset Sources SoPEC has 3 possible external reset sources, power-on reset (POR), brown-out detect (BOD) and the reset_n pin.

The POR macro monitors the device core voltage and keeps its reset active while the voltage is below a threshold (approximately 0.7v-1.05v).

The BOD macro monitors the voltage on the Vcomp pad and activates its reset whenever the pad voltage drops below a threshold (also approximately 0.7v-1.05v). It is intended that the Vcomp pad be connected to the power supply unregulated output to allow SoPEC to detect a brownout condition early and take action before the core supply gets removed. Note the Vcomp pad is connected through a resistive divider and not directly to the power supply output.

Should there be any operating issues with the POR and BOD macros both can be disabled by setting the por_bo_disable pin to 1.

The reset_n pin allows SoPEC to be reset by an external device.

The reset_n pin and Vcomp pin are susceptible to glitches that could trigger a system wide reset in SoPEC. As a result the output of the BOD macro and the reset_n pin are filtered by an 100 us deglitch circuit before triggering a system reset in the device.

18.3 Software Reset

The CPR provides a mechanism to reset any individual section by accessing the ResetSection register. Like all software resets in SoPEC the ResetSection register is active-low i.e. a 0 should be written to each bit position requiring a reset. The ResetSection register is self-resetting. The CPU can determine if a reset is still in progress by reading the ResetSection register, any bits still 0 indicate a reset in progress.

If a section is powered down and the CPU activates a section reset the CPR will automatically re-enable the clock to that section for the duration of the reset. Once the reset is complete the section will be returned to power down mode.

Resets of sections 0 to 4 will take approximately 16 pclk cycles, section 5 will take 64 pclk cycles and, section 6 will take approximately 10 us.

The CPU can also control the external reset pins, resetout_n and phi_rst_n[1:0] by accessing the ResetPin register. Values in this register are reflected directly on the external pins (assuming a system reset condition is not active at the time). Bits in this register are not self-resetting, and should be reset by the CPU after the required duration to reset the external device has passed.

18.4 Reset Source

The SoPEC device can be reset by a number of sources. When a reset from an internal source is initiated the reset source register (ResetSrc) stores the reset source value. This register can then be used by the CPU to determine the type of boot sequence required after reset.

18.5 Wakeup

The SoPEC device has a number of sources of wakeup. A wakeup event will power up the CPU and DIU sections and possibly others sections depending on the event type. A wakeup source can be disabled by the CPU before going to sleep by writing to the relevant bit in the WakeUpMask register. When the CPU restarts after up after a wakeup event it can determine the wakeup source that caused the event by reading the ResetSrc register. The CPU can then determine the correct wakeup procedure to follow.

TABLE 92

Section power-on state after wakeup event

| Wakeup Source | CPU | DIU | PEP | MMI | UHU | UDU | USB PHY |
|---|---|---|---|---|---|---|---|
| gpio_cpr_wakeup | On | On | Same | On[a] | Same | Same | Same |
| udu_int_wakeup | On | On | Same | Same | Same | On[a] | On[a] |
| udu_wakeup | On | On | Same | Same | Same | On | On |
| uhu_wakeup | On | On | Same | Same | On | Same | On |

[a]Note event could only happen if section was already turned on

The UHU wakeup is determine by monitoring the line state signals of the USB PHY ports allocated to the host. UHU wakeup is only enabled when the CPU has powered down the UHU block. A wakeup condition is defined as a high state on any of the line state signals for longer than 63 pclk cycles (approx 4 bit times at 12 Mbs). The UHU wakeup condition is intended to detect a device connect on the USB bus and wakeup the system. Others line state events are detected by the UHU itself.

The UDU wakeup (resume) is determined by monitoring the suspendm signal from the UDU. A high value of longer than 63 pclk cycles will generate an udu_wakeup event.

The gpio_cpr_wakeup and the udu_int_wakeup are generated by the GPIO and UDU block respectively. Both events can only be generated if the respective blocks are powered on.

18.6 Clock Relationship

The crystal oscillator excites a 32 MHz crystal through the xtalin and xtalout pins. The 32 MHz output is used by the PLL to derive the master VCO frequency of 1152 MHz. The master clock is then divided to produce 192 MHz clock (clk_a), 288 MHz clock (clk_b), and 96 MHz (clk_c) clock sources.

The default settings of the oscillator in SoPEC allow an input range of 20-60 Mhz. The PLL can be configured to generate different clock frequencies and relationships, but the internal PLL VCO frequency must be in the range 850 MHz to 1500 MHz. Note in order to use the any of the USB system the usbrefclk must be 48 Mhz.

The phase relationship of each clock from the PLL will be defined. The relationship of internal clocks clk_a, clk_b and clk_c to xtalin will be undefined.

At the output of the clock block, the skew between each pclk domain (pclk_section[5:0] and jclk) should be within skew tolerances of their respective domains (defined as less than the hold time of a D-type flip flop).

The phiclk and pclk have no defined phase relationship are treated as asynchronous in the design.

The PLL output C (clk_c) is used to generate uhu__48clk (48 MHz) and the uhu__12clk (12 MHz) clocks for use in the UHU block. Both clocks are treated as synchronous and at the output of the clock block the skew between each both domains should be within the skew tolerances of their respective domains.

The usbrefclk is also derived from the PLL output C (clk_c) but has no relationship to the other clocks in the system and is considered asynchronous. It is used as a reference clock for the USB PHY PLL.

18.7 OSC and PLL Control

The PLL in SoPEC can be adjusted by programming the PLLRangeA, PLLRangeB, PLLRangeC, PLLTunebits, PLLGenCtrl and PLLMult registers. The oscillator series damping register can be adjusted by programming the OscRDamp register. If these registers are changed by the CPU the values are not updated until the PLLUpdate register is written to. Writing to the PLLUpdate register triggers the PLL control state machine to update the PLL configuration in a safe way. When an update is active (as indicated by PLLUpdate register) the CPU must not change any of the configuration registers, doing so could cause the PLL to lose lock indefinitely, requiring a hardware reset to recover. Configuring the PLL registers in an inconsistent way can also cause the PLL to lose lock, care must taken to keep the PLL configuration within specified parameters.

The PLLGenCtrl provides a mechanism for powering down and disabling the output dividers of the PLL. The output dividers are disabled by setting the PLLDivOFF bits in the PLLGenCtrl register. Once a divider is turned all clocks derived from it's output will be disabled. If the pll_outa divider is disabled (used to generate pclk) the CPU will be disabled, and the only recovery mechanism, will be a system reset.

The VCO and voltage regulator of the PLL can be disabled by setting the VCO power off, and Regulator power off bits of the PLLGenCtrl register. Once either bit is set the PLL will not generate any clock (unless the PLL bypass bit is set) and the only recovery mechanism will be a system reset.

The PLL bypass bit can be used to bypass the PLL VCO circuit and feed the refclk input directly to the PLL outputs. The PLL feedback bit selects if internal or external feedback is used in the PLL.

The VCO frequency of the PLL is calculated by the number of dividers in the feedback path. The PLL internal VCO output is used as the feedback source.

$$VCOfreq = REFCLK \times PLLMult \times \text{External divider}$$

$$VCOfreq = 32 \times 36 \times 1 = 1152 \text{ Mhz.}$$

In the default PLL setup, PLLMult is set to 0x8d (or x36), PLLRangeA is set to 0xC which corresponds to a divide by 6, PLLRangeB is set to 0xE which corresponds to a divide by 4 and PLLRangeC is set to 0x8 which corresponds to a divide by 12.

$$PLLouta = VCOfreq/PLLRangeA = 1152 \text{ Mhz}/6 = 192 \text{ Mhz}$$

$$PLLoutb = VCOfreq/PLLRangeB = 1152 \text{ Mhz}/4 = 288 \text{ Mhz}$$

$$PLLoutc = VCOfreq/PLLRangeC = 1152 \text{ Mhz}/12 = 96 \text{ Mhz}$$

The PLL selected is PLL8SFLP (low power PLL), and the oscillator is OSCRFBK with integrated parallel feedback resistor.

18.8 Implementation 18.8.1 Definitions of I/O

TABLE 93

CPR I/O definition

| Port name | Pins | I/O | Description |
|---|---|---|---|
| | | | CPR miscellaneous control |
| Xtalin | 1 | In | Crystal input, direct from IO pin. |
| Xtalout | 1 | Inout | Crystal output, direct to IO pin. |
| Buf__oscout | 1 | Out | Buffered version of the output oscillator |
| Jclk__enable | 1 | In | Gating signal for jclk. When 1 jclk is enabled |
| | | | Clocks |
| pclk__section[5:0] | 6 | Out | System clocks for each pclk section |
| Phiclk | 1 | Out | Data out clock (1.5 × pclk) for the PHI block |
| Jclk | 1 | Out | Gated version of system clock used to clock the JPEG decoder core in the CDU |
| Usbrefclk | 1 | Out | USB PHY reference clock, nominally at 48 MHz |
| uhu__48clk | 1 | Out | UHU 48 MHz USB clock. |
| uhu__12clk | 1 | Out | UHU12 MHz USB clock. Synchronous to uhu__48clk. |
| | | | Reset inputs and wakeup |
| reset__n | 1 | In | Reset signal from the reset__n pin. Active low |
| Vcomp | 1 | In | Voltage compare input to the Brown Out detect macro (Analog) |
| por__bo__disable | 1 | In | POR and Brown out macro disable. Active high. |
| tim__cpr__reset__n | 1 | In | Reset signal from watch dog timer. Active low. |
| gpio__cpr__wakeup | 1 | In | SoPEC wakeup from the GPIO. Active high. |
| udu__icu__irq | 1 | In | USB device interrupt signal to the ICU. Used to detect the a UDU interrupt wakeup condition. |

TABLE 93-continued

| Port name | Pins | I/O | Description |
|---|---|---|---|
| | | | CPR I/O definition |
| phy__line__state[2:0][1:0] | 3x2 | In | The current state of the D+/− receivers of each UHU port of the USB PHY. Used to detect PHY generated wakeup conditions. |
| udu__suspendm | 1 | In | UDU suspendm signal to indicate that UHU PHY port should be suspended. Also used to determine a USB resume wakeup event. |
| cpr__phy__suspendm | 1 | Out | CPR PHY suspend mode for UDU PHY port (deglitched version of udu__suspendm) |
| cpr__phy__pdown | 1 | Out | CPR powerdown control of USB multi-port PHY. |
| | | | Reset (Outputs) |
| prst__n__section[5:0] | 6 | Out | System resets for each section, synchronous active low |
| phirst__n | 1 | Out | Reset for PHI block, synchronous to phiclk active low |
| cpr__phy__reset__n | 1 | Out | Reset for the USB PHY block, synchronous to usbrefclk |
| resetout__n | 1 | Out | Reset Output (direct to IO pin) to other system devices, active low. |
| phi__rst__n[1:0] | 2 | Out | Reset out (direct to IO pins) to the printhead. Active low |
| | | | CPU interface |
| cpu__adr[6:2] | 5 | In | CPU address bus. Only 5 bits are required to decode the address space for the CPR block |
| cpu__dataout[31:0] | 32 | In | Shared write data bus from the CPU |
| cpr__cpu__data[31:0] | 32 | Out | Read data bus to the CPU |
| cpu__rwn | 1 | In | Common read/not-write signal from the CPU |
| cpu__cpr__sel | 1 | In | Block select from the CPU. When cpu__cpr__sel is high both cpu__adr and cpu__dataout are valid |
| cpr__cpu__rdy | 1 | Out | Ready signal to the CPU. When cpr__cpu__rdy is high it indicates the last cycle of the access. For a write cycle this means cpu__dataout has been registered by the block and for a read cycle this means the data on cpr__cpu__data is valid. |
| cpr__cpu__berr | 1 | Out | Bus error signal to the CPU indicating an invalid access. |
| cpu__acode[1:0] | 2 | In | CPU Access Code signals. These decode as follows:<br>00 - User program access<br>01 - User data access<br>10 - Supervisor program access<br>11 - Supervisor data access |
| cpr__cpu__debug__valid | 1 | Out | Debug Data valid on cpr__cpu__data bus. Active high |

18.8.2 Configuration Registers

The configuration registers in the CPR are programmed via the CPU interface. Refer to section 11.4 on page 76 for a description of the protocol and timing diagrams for reading and writing registers in the CPR. Note that since addresses in SoPEC are byte aligned and the CPU only supports 32-bit register reads and writes, the lower 2 bits of the CPU address bus are not required to decode the address space for the CPR. When reading a register that is less than 32 bits wide zeros are returned on the upper unused bit(s) of cpr_pcu_data. Table 94 lists the configuration registers in the CPR block.

The CPR block will only allow supervisor data mode accesses (i.e. cpu_acode[1:0]=SUPERVISOR_DATA). All other accesses will result in cpr_cpu_berr being asserted.

TABLE 94

CPR Register Map

| Address CPR__base+ | Register | #bits | Reset | Description |
|---|---|---|---|---|
| 0x00 | SleepModeEnable | 7 | 0x00 | Sleep Mode enable, when high a section of logic is put into powerdown.<br>Bit 0 - Controls section 0, CPU system<br>Bit 1 - Controls section 1, PEP system<br>Bit 2 - Controls section 2, MMI system<br>Bit 3 - Controls section 3, DIU system<br>Bit 4 - Controls section 4, USB device<br>Bit 5 - Controls section 5, USB host<br>Bit 6 - Controls section 6, USB PHY |
| 0x04 | SnoozeModeSelect | 7 | 0x00 | Selects if a section goes into Sleep or Snooze mode when its SleepModeEnable bit is set. One bit per section |

TABLE 94-continued

CPR Register Map

| Address CPR_base+ | Register | #bits | Reset | Description |
|---|---|---|---|---|
| | | | | 0 - Sleep mode<br>1 - Snooze mode |
| 0x08 | ResetSrc | 6 | 0x1[a] | Reset Source register, indicating the source of the last reset<br>Bit 0 - External Reset (includes brownout or POR)<br>Bit 1 - Watchdog timer reset<br>Bit 2 - GPIO wakeup<br>Bit 3 - UDU wakeup (resume condition)<br>Bit 4 - UDU wakeup (interrupt generated wakeup)<br>Bit 5 - UHU wakeup<br>(Read Only Register) |
| 0x10 | WakeUpMask | 4 | 0x0 | Wakeup mask register, when a bit is 1 the corresponding wakeup is disabled.<br>Bit 0 - GPIO wakeup<br>Bit 1 - UDU wakeup (resume condition)<br>Bit 2 - UDU wakeup (interrupt generated wakeup)<br>Bit 3 - UHU wakeup |
| 0x14 | ResetSection | 7 | 0x7F | Active-low synchronous reset for each section, self-resetting. Bits 4-0 self reset after 16 pclk cycles, bit 5 after 64 pclk cycles, bit 6 self resets after 10 us.<br>Bit 0 - Controls section 0, CPU system<br>Bit 1 - Controls section 1, PEP system<br>Bit 2 - Controls section 2, MMI system<br>Bit 3 - Controls section 3, DIU system<br>Bit 4 - Controls section 4, USB device<br>Bit 5 - Controls section 5, USB host<br>Bit 6 - Controls section 6, PHY and all transceivers<br>Note writing a 0 to a bit will start a reset sequence, writing a 1 will not terminate the sequence. |
| 0x18 | ResetPin | 3 | 0x0 | Software control of external reset pins<br>Bit 0 - Controls reset_out_n pin<br>Bit 1 - Controls phi_rst_n[0] pin<br>Bit 2 - Controls phi_rst_n[1] pin |
| 0x1C | DebugSelect[6:2] | 5 | 0x00 | Debug address select. Indicates the address of the register to report on the cpr_cpu_data bus when it is not otherwise being used. |
| | | | PLL Control | |
| 0x20 | PLLTuneBits | 10 | 0x3BC | PLL tuning bits |
| 0x24 | PLLRangeA | 4 | 0xC | PLLOUT A frequency selector (defaults to 192 Mhz with 1152 Mhz VCO) |
| 0x28 | PLLRangeB | 4 | 0xE | PLLOUT B frequency selector (defaults to 288 Mhz with 1152 Mhz VCO) |
| 0x2C | PLLRangeC | 4 | 0x8 | PLLOUT C frequency selector (defaults to 96 Mhz with 1152 Mhz VCO) |
| 0x30 | PLLMultiplier | 8 | 0x8D | PLL multiplier selector, defaults to refclk × 36 |
| 0x34 | PLLGenCtrl | 6 | 0x00 | PLL General Control. When 0 the output divider is enabled when 1 the output divider is disabled.<br>Bit 0 -PLL Output Divider A, when 1 divider is disabled<br>Bit 1 -PLL Output Divider B, when 1 divider is disabled<br>Bit 2 -PLL Output Divider C, when 1 divider is disabled<br>Bit 3 - VCO power off, when 1 PLL VCO is disabled. If disabled refclk will be the only clock available in the system.<br>Bit 4 - Regular power off, when 1 PLL voltage regulator is disabled<br>Bit 5 - PLL Bypass, when 1 refclk drives clock outputs directly<br>Bit 6 - PLL Feedback select, when 1 external feedback is selected otherwise internal feedback is selected. |
| 0x38 | OscRDamp | 3 | 0x0 | Oscillator Damping Resister value. New values written to this register will only get |

TABLE 94-continued

CPR Register Map

| Address CPR_base+ | Register | #bits | Reset | Description |
|---|---|---|---|---|
| | | | | updated to the OSC after a PLLUpdate cycle.<br>0 - Short<br>1 - 50 Ohms<br>2 - 100 Ohms<br>3 - 150 Ohms<br>4 - 200 Ohms<br>5 - 300 Ohms<br>6 - 400 Ohms<br>7 - 500 Ohms |
| 0x3C | PLLUpdate | 1 | 0x0 | PLL update control. A write (of any value) to this register will cause the PLL to lose lock for ~25 us. Reading the register indicates the status of the PLL update.<br>0 - PLL update complete<br>1 - PLL update active<br>No writes to PLLTuneBits, PLLRangeA, PLLRangeB, PLLRangeC, PLLMultiplier, PllGenCtrl, OscRDamp or PLLUpdate are allowed while the PLL update is active. |

[a]Reset value depends on reset source. External reset shown.

18.8.3 CPR Sub-block Partition 18.8.4 USB Wakeup Detect

The USB wakeup block is responsible for detecting a wakeup condition from any of the USB host ports (uhu_wakeup) or a wakeup condition from the UDU (udu_wakeup).

The UDU indicates to the CPR that a resume has happened by setting udu_suspendm signal high. The CPR deglitches the udu_suspendm for 63 pclk cycles (322 ns is approx 4 USB bit times at 12 Mbs). After the deglitch time the CPR indicates the wakeup to the reset and sleep logic block (via udu_wakeup) and signals the USB PHY to resume via the cpr_phy_suspendm signal.

For the UHU wakeup the logic monitors the phy_line_state signals to determine that a device has connected to one of the host ports. The CPR only monitors the phy_line_state when the UHU is powered down. When a device connects it pulls one of the phy_line_state pins high. The CPR monitors all of the line state signals for a high condition of longer than 63 pclk cycles. When detected it signals to the reset and sleep logic that a UHU wakeup condition has occurred.

```
// one loop per input linestate
for (i=0;i<6;i++) {
        if (line_state[i] == 1 AND uhu_pdown == 0 ) then
          if (count[i] == 0) then
            wakeup[i]     = 1;
          else
            count[i]      = count[i] - 1
        else
          count[i]        = 63
        }
// combine all possible wakeup signals together
uhu_wakeup = OR(wakeup[5:0])
```

18.8.5 Sleep and Reset Logic

Reset Generator Logic

The reset generator logic is used to determine which clock domains should be reset, based on configured reset values (reset_section_n), the deglitched external reset (reset_dg_n), watchdog timer reset (tim_cpr_reset_n), the reset sources from the wakeup logic (sleep_trig_reset). The external reset could be due to a brownout detect, or a power on reset or from the reset_n pin, and is deglitched and synchronised before passing to the reset logic block. The reset output pins (resetout_n and phi_rst_n[1:0]) are generated by the reset macro logic.

All resets are lengthened to at least 16 pclk cycles (the UHU domain reset_dom[5] is lengthened to 64 pclk cycles and the USB PHY reset reset_dom[6] is lengthened to 10 us), regardless of the duration of the input reset. If the clock for a particular section is not running and the CPU resets a section, the CPR will automatically re-enable the clock for the duration of the reset.

The external reset sources reset everything including the CPR PLL and the CPR block. The watchdog timer reset resets everything excepts the CPR and CPR PLL. The reset sources triggered by a wakeup from sleep, will cause a reset in their own section only (in snooze mode no reset will occur).

The logic is given by

```
if (reset_dg_n == 0) then
        reset_dom[6:0]    = 0x00      // reset everything
        reset_src[5:0]    = 0x01
        cpr_reset_n       = 0
elsif (tim_cpr_reset_n == 0) then
        reset_dom[6:0]    = 0x00      // reset everything except CPR config
        reset_src[5:0]    = 0x02
        cpr_reset_n       = 1         // CPR config stays the same
else
        // propagate resets from reset section register
        reset_dom[6:0]    = 0x3F      // default to no reset
        cfg_reset_n        = 1        // CPR cfg registers are not in any section
        for (i=0;i<7;i++) {
          if (reset_wr_en == 1 AND reset_section[i] ==0) then
            reset_dom[i] = 0
          if (sleep_trig_reset[i] == 1) then
```

-continued

```
        reset_dom[i] = 0
    }
```

The CPU can trigger a reset condition in the CPR for a particular section by writing a 0 to the section bit in the ResetSection register. The CPU cannot terminate a reset prematurely by writing a 1 to the section bit.

Sleep Logic

The sleep logic is used to generate gating signals for each of SoPECs clock domains. The gate enable (gate_dom) is generated based on the configured sleep_mode_en, wake_up_mask, the internally generated jclk_enable and wakeup signals. When a section is being re-enabled again the logic checks the configuration of the snooze_mode_sel register to determine if it should auto generate a reset for that section. If needed it triggers a section reset by pulsing sleep_trig_reset signal. The logic also stores the last wakeup condition (in the ResetSrc register) that was enabled and detected by the CPR. If 2 or more wakeup conditions happen at the same time the ResetSrc register will report the highest number active wakeup event.

The logic is given by

```
if (sleep_mode_wr_en == 1) then              // CPU write update the register
        sleep_mode_en_ff = sleep_mode_en
// determine what needs to wakeup when a wakeup condition occurs
if (gpio_cpr_wakeup==1 AND wakeup_mask[0]==0) then
        sleep_mode_en_ff[3,2,1]      = 0      // turn on MMI,CPU,DIU
        reset_src[5:0]               = 0x04
if (udu_wakeup==1 AND wakeup_mask[2]==0) then
        sleep_mode_en_ff[6,4,3,1]    = 0      // turn on CPU,DIU,UDU and USB
PHY
        reset_src[5:0]               = 0x08
if (udu_icu_irq==1 AND wakeup_mask[1]==0)then
        sleep_mode_en_ff[6,4,3,1]    = 0      // turn on CPU,DIU,UDU and USB
PHY
        reset_src[5:0]               = 0x10
if (uhu_wakeup==1 AND wakeup_mask[3]==0)then
        sleep_mode_en_ff[6,5,3,1]    = 0      // turn on CPU,DIU,UHU and USB
PHY
        reset_src[5:0]               = 0x20
// in all wakeup cases trigger reset if in sleep (no reset in snooze)
for (i=0; i<7;i++){
        if (neg_edge_detect(sleep_mode_en_ff[i]==1 AND snooze_mode_sel[i]==0)
then
          sleep_trig_reset[i]= 1
        }
// assign the outputs (for read back by CPU)
sleep_mode_stat = sleep_mode_ff
// map the sections to clock domains
gate_dom[5:0]   = sleep_mode_ff[5:0] AND reset_dom[5:0]
cpr_phy_pdown = sleep_mode_ff[6]   AND reset_dom[6]
// the jclk can be turned off by CDU signal and is in PEP section
if (reset_dom[1] == 0) then
        jclk_dom = 1
elsif (jclk_enable == 0) then
        jclk_dom = sleep_mode_ff[1]
```

The clock gating and sleep logic is clocked with the master_pclk clock which is not gated by this logic, but is synchronous to other pclk_section and jclk domains.

Once a section is in sleep mode it cannot generate a reset to restart the device. For example if section 2 is in sleep mode then the watchdog timer is effectively disabled and cannot trigger a reset.

18.8.6 Reset Macro Block

The reset macro block contains the reset macros and associated deglitch logic for the generation of the internal and external resets.

The power on reset (POR) macro monitors the core voltage and triggers a reset event if the core voltage falls below a specified threshold. The brown out detect macro monitors the voltage on the Vcomp pin and triggers a reset condition when the voltage on the pin drops below a specified threshold. Both macros can be disabled by setting the por_bo_disable pin high. The external reset pin (reset_n) and the output of the brownout macro (bo_n) are synchronized to the bufrefclk clock domain before being applied to the reset control logic to help prevent metastability issues.

The POR circuit is treated differently. It is possible that the por_n signal could go active before the internal oscillator (and consequently bufrefclk) has time to startup. The CPR stores the reset condition by asynchronously clearing synchronizer #1. When bufrefclk does start the synchronizer will be flushed inactive. The output of the synchronizer (#1) is passed through another synchronizer (#2) to prevent the possibility of an asynchronous clear affecting the reset control logic.

The resetout_n pin is a general purpose reset that can be used to reset other external devices. The phi_rst_n pins are external reset pins used to reset the printhead. The phi_rst_n and resetout_n pins are active whenever an internal SoPEC reset is active (reset_int_n). The pins can also be controlled by the CPU programming the ResetPin register. The por_async_active_n is used to gate the external reset pins to ensure that external devices are reset even if the internal oscillator in SoPEC is not active.

The reset control logic implements a 100 us deglitch circuit on the bo_sync_n and reset_sync_n inputs signals.

It also ensures the reset output (reset_int_n) is stretched to at least 100 us regardless of the duration of the input reset source. If the state machine detects an active brown out reset condition (bo_sync_n==0) it transitions to the BoDeGlitch state. While in that state if the reset condition remains active for 100 us the state machine transitions to the BoExtendRst state. If the reset condition is removed then the machine returns to Idle. In the BoExtendRst the output reset reset_int_n will be active. The state machine will remain in the BoExtendRst state while the input reset condition remains (bo_sync n==0). When the reset condition is released the (bo_sync_n==1) the state machine must extend the reset to at least 100 us. It remains in the BoExtendRst state until the reset condition has been inactive for 100 us. When true it returns to the Idle state.

The external reset deglitch and extend states operate in exactly the same way as the brownout reset.

A POR reset condition (por_sync_n==0) will automatically cause the state machine to generate an interrupt, no deglitching is performed. When detected the state machine transitions to the ExtendRst state from any other state in the state machine. The machine will remain in ExtendRst while por_sync_n is active. When por_sync_n is deactivated the state machine remains in the ExtendRst for 100 us before returning to the Idle state.

18.8.7 Clock Generator Logic

The clock generator block contains the PLL, crystal oscillator, clock dividers and associated control logic.

The PLL VCO frequency is at 1152 MHz locked to a 32 MHz refclk generated by the crystal oscillator. In test mode the xtalin signal can be driven directly by the test clock generator, the test clock will be reflected on the refclk signal to the PLL.

18.8.7.1 PLL Control State Machine

The PLL will go out of lock whenever pll_reset goes high (the PLL reset is the only active high reset in the device) or if the configuration bits pll_rangea, pll_rangeb, pll_rangec, pll_mult, pll_tune, pll_gen_ctrl or osc_rdamp are changed. The PLL control state machine ensures that the rest of the device is protected from glitching clocks while the PLL is being reset or its configuration is being changed.

In the case of a hardware reset (the reset is deglitched), the state machine first disables the output clocks (via the clk_gate signal), it then holds the PLL in reset while its configuration bits are reset to default values. The state machine then releases the PLL reset and waits approx 25 us to allow the PLL to regain lock. Once the lock time has elapsed the state machine re-enables the output clocks and resets the remainder of the device via the reset_dg_n signal.

When the CPU changes any of the configuration registers it must write to the PLLUpdate register to allow the state machine to update the PLL to the new configuration setup. If a PLLUpdate is detected the state machine first gates the output clocks. It then holds the PLL in reset while the PLL configuration registers are updated. Once updated the PLL reset is released and the state machine waits approx 25 us for the PLL to regain lock before re-enabling the output clocks. Any write to the PLLUpdate register will cause the state machine to perform the update operation regardless of whether the configuration values changed or not.

All logic in the clock generator is clocked on bufrefclk which is always an active clock regardless of the state of the PLL.

18.8.8 Clock Gate Logic

The clock gate logic is used to safely gate clocks without generating any glitches on the gated clock. When the enable is high the clock is active otherwise the clock is gated.

18.9 SoPEC Clock System

19 Rom Block (Rom)

19.1 Overview

The ROM block interfaces to the CPU bus and contains the SoPEC boot code. The ROM block consists of the CPU bus interface, the ROM macro and the ChipID macro. The address space allocated (by the MMU) to the ROM block is 192 Kbytes, although the ROM size is expected to be less than 64 Kbytes. The current ROM size is 16 Kbytes implemented as a 4096×32 macro. Access to the ROM is not cached because the CPU enjoys fast, unarbitrated access to the ROM.

Each SoPEC device requires a means of uniquely identifying that SoPEC i.e. a unique ChipID. IBM's 300 mm ECID (electronic chip id) macro is used to implement the ChipId, providing 112 bits of laser fuses that are set by blowing fuses at manufacture. IBM controls the content of the 112 bits, but incorporate wafer number, X/Y coordinate on the wafer etc. Of the 112 bits, only 80 are currently guaranteed to be programmed by IBM, with the remainder as undefined. Even so, the 112 bits will form a unique identifier for that SoPEC.

In addition, each SoPEC requires a number that can be used to form a key for secure communication with an external QA Device. The number does not need to be unique, just hard for an attacker to guess. The unique ChipId cannot be used to form the key, for although the exact formatting of bits within the 112-bit ID is not published by IBM, a pattern exists, and it is certainly possible to guess valid ChipIds. Therefore SoPEC incorporates a second custom ECID macro that contains an additional 112-bits. The second ECID macro is programmed at manufacture with a completely random number (using a program supplied to IBM by Silverbrook), so that even if an attacker opens a SoPEC package and determines the number for a given chip, the attacker will not be able to determine corresponding numbers for other SoPECs. The way in which the number is used to form a key is a matter for application software, but the ECID macro provides 112-bits of entropy.

The ECID macros allow all fuse bits to be read out in parallel, and the ROM block makes the contents of both macros (totalling 224 fuse bits) available to the CPU in the FuseChipID[N] registers, readable in supervisor mode only.

19.2 Boot Operation

The basic function of the SoPEC boot ROM is like any other boot ROM: to load application software and run it at power-up, reset, or upon being woken from sleep mode. On top of this basic function, the SoPEC Boot ROM has an additional security requirement in that it must only run appropriately digitally signed application software. This is to prevent arbitrary software being run on a SoPEC. The security aspects of the SoPEC are discussed in the "SoPEC Security Overview" document.

The boot ROM requirements and specification can be found in "SoPEC Boot ROM Design Specification".

19.3 Implementation 19.3.1 Definitions of I/O

TABLE 95

ROM Block I/O

| Port name | Pins | I/O | Description |
|---|---|---|---|
| | | | Clocks and Resets |
| prst_n | 1 | In | Global reset. Synchronous to pclk, active low. |
| pclk | 1 | In | Global clock |
| | | | CPU Interface |
| cpu_adr[14:2] | 13 | In | CPU address bus. Only 13 bits are required to decode the address space for this block. |
| rom_cpu_data[31:0] | 32 | Out | Read data bus to the CPU |
| cpu_rwn | 1 | In | Common read/not-write signal from the CPU |
| cpu_acode[1:0] | 2 | In | CPU Access Code signals. These decode as follows:<br>00 - User program access<br>01 - User data access<br>10 - Supervisor program access<br>11 - Supervisor data access |
| cpu_rom_sel | 1 | In | Block select from the CPU. When cpu_rom_sel is high cpu_adr is valid |
| rom_cpu_rdy | 1 | Out | Ready signal to the CPU. When rom_cpu_rdy is high it indicates the last cycle of the access. For a read cycle this means the data on rom_cpu_data is valid. |
| rom_cpu_berr | 1 | Out | ROM bus error signal to the CPU indicating an invalid access. |

19.3.1

19.3.2 Configuration Registers

The ROM block only allows read accesses to the FuseChipID registers and the ROM with supervisor data or program space permissions. Write accesses with the correct permissions has no effect. Any access to the ROM with user mode permissions results in a bus error.

The CPU subsystem bus slave interface is described in more detail in section 9.4.3.

TABLE 96

ROM Block Register Map

| Address ROM_base+ | Register | #bits | Reset | Description |
|---|---|---|---|---|
| 0x00000-0x03FFC | ROM[4095:0] | 4096x32 | N/A | ROM code. |
| 0x2FFE0 | FuseChipID0 | 32 | n/a | Value of corresponding fuse bits 31 to 0 of the IBM 112-bit ECID macro. (Read only) |
| 0x2FFE4 | FuseChipID1 | 32 | n/a | Value of corresponding fuse bits 63 to 32 of the IBM 112-bit ECID macro. (Read only) |
| 0x2FFE8 | FuseChipID2 | 32 | n/a | Value of corresponding fuse bits 95 to 64 of the IBM 112-bit ECID macro. (Read only) |
| 0x2FFEC | FuseChipID3 | 16 | n/a | Value of corresponding fuse bits 111 to 96 of the IBM 112-bit ECID macro. (Read only) |
| 0x2FFF0 | FuseChipID4 | 32 | n/a | Value of corresponding fuse bits 31 to 0 of the Custom 112-bit ECID macro. (Read only) |
| 0x2FFF4 | FuseChipID5 | 32 | n/a | Value of corresponding fuse bits 63 to 32 of the Custom 112-bit ECID macro. (Read only) |
| 0x2FFF8 | FuseChipID6 | 32 | n/a | Value of corresponding fuse bits 95 to 64 of the Custom 112-bit ECID macro. (Read only) |
| 0x2FFFC | FuseChipID7 | 16 | n/a | Value of corresponding fuse bits 111 to 96 of the Custom 112-bit ECID macro. (Read only) |

Note bits 111-96 of the IBM ECID macro (FuseChipID3) are not guaranteed to get programmed in all instances of SoPEC, and as a result could produce inconsistent values when read.

19.4 Sub-Block Partition

IBM offer two variants of their ROM macros; A high performance version (ROMHD) and a low power version (ROMLD). It is likely that the low power version will be used unless some implementation issue requires the high performance version. Both versions offer the same bit density. The sub-block partition diagram below does not include the clocking and test signals for the ROM or ECID macros. The CPU subsystem bus interface is described in more detail in section 11.4.3.

19.4.1

TABLE 97

ROM Block internal signals

| Port name | Width | Description |
|---|---|---|
| Clocks and Resets | | |
| prst_n | 1 | Global reset. Synchronous to pclk, active low. |
| Pclk | 1 | Global clock |
| Internal Signals | | |
| rom_adr[11:0] | 12 | ROM address bus |
| rom_sel | 1 | Select signal to the ROM macro instructing it to access the location at rom_adr |
| rom_oe | 1 | Output enable signal to the ROM block |
| rom_data[31:0] | 32 | Data bus from the ROM macro to the CPU bus interface |
| rom_dvalid | 1 | Signal from the ROM macro indicating that the data on rom_data is valid for the address on rom_adr |
| fuse_data[31:0] | 32 | Data from the FuseChipID[N] register addressed by fuse_reg_adr |
| fuse_reg_adr[2:0] | 3 | Indicates which of the FuseChipID registers is being addressed |

19.4.1 Sub-block Signal Definition

20 Power Safe Storage (PSS)

20.1 Overview

The PSS block provides 128 bytes of storage space that will maintain its state when the rest of the SoPEC device is in sleep mode. The PSS is expected to be used primarily for the storage of signature digests associated with downloaded programmed code but it can also be used to store any information that needs to survive sleep mode (e.g. configuration details). Note that the signature digest only needs to be stored in the PSS before entering sleep mode and the PSS can be used for temporary storage of any data at all other times.

Prior to entering sleep mode the CPU should store all of the information it will need on exiting sleep mode in the PSS. On emerging from sleep mode the boot code in ROM will read the ResetSrc register in the CPR block to determine which reset source caused the wakeup. The reset and wakeup source information indicates whether or not the PSS contains valid stored data. If for any reason a full power-on boot sequence should be performed (e.g. the printer driver has been updated) then this is simply achieved by initiating a full software reset.

Note that a reset or a powerdown (powerdown is implemented by clock gating) of the PSS block will not clear the contents of the 128 bytes of storage. If clearing of the PSS storage is required, then the CPU must write to each location individually.

20.2 Implementation

The storage area of the PSS block is implemented as a 128-byte register array. The array is located from PSS_base through to PSS_base+0x7F in the address map. The PSS block only allows read or write accesses with supervisor data space permissions (i.e. cpu_acode[1:0]=11). All other accesses result in pss_cpu_berr being asserted. The CPU subsystem bus slave interface is described in more detail in section 11.4.3.

20.2.1 Definitions of I/O

TABLE 98

PSS Block I/O

| Port name | Pins | I/O | Description |
|---|---|---|---|
| Clocks and Resets | | | |
| prst_n | 1 | In | Global reset. Synchronous to pclk, active low. |
| pclk | 1 | In | Global clock |
| CPU Interface | | | |
| cpu_adr[6:2] | 5 | In | CPU address bus. Only 5 bits are required to decode the address space for this block. |
| cpu_dataout[31:0] | 32 | In | Shared write data bus from the CPU |
| pss_cpu_data[31:0] | 32 | Out | Read data bus to the CPU |
| cpu_rwn | 1 | In | Common read/not-write signal from the CPU |
| cpu_acode[1:0] | 2 | In | CPU Access Code signals. These decode as follows:<br>00 - User program access<br>01 - User data access<br>10 - Supervisor program access<br>11 - Supervisor data access |
| cpu_pss_sel | 1 | In | Block select from the CPU. When cpu_pss_sel is high both cpu_adr and cpu_dataout are valid |

TABLE 98-continued

PSS Block I/O

| Port name | Pins | I/O | Description |
|---|---|---|---|
| pss_cpu_rdy | 1 | Out | Ready signal to the CPU. When pss_cpu_rdy is high it indicates the last cycle of the access. For a read cycle this means the data on pss_cpu_data is valid. |
| pss_cpu_berr | 1 | Out | PSS bus error signal to the CPU indicating an invalid access. |

20.2.1

21 Low Speed Serial Interface (LSS)

21.1 Overview

Figure 88:
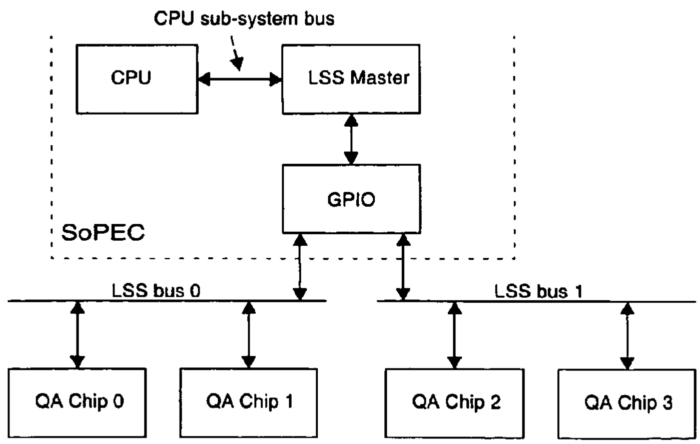

The Low Speed Serial Interface (LSS) provides a mechanism for the internal SoPEC CPU to communicate with external QA chips via two independent LSS buses. The LSS communicates through the GPIO block to the QA chips. This allows the QA chip pins to be reused in multi-SoPEC environments. The LSS Master system-level interface is illustrated in FIG. 88. Note that multiple QA chips are allowed on each LSS bus.

21.2 QA Communication

The SoPEC data interface to the QA Chips is a low speed, 2 pin, synchronous serial bus. Data is transferred to the QA chips via the lss_data pin synchronously with the lss_clk pin. When the lss_clk is high the data on lss_data is deemed to be valid. Only the LSS master in SoPEC can drive the lss_clk pin, this pin is an input only to the QA chips. The LSS block must be able to interface with an open-collector pull-up bus. This means that when the LSS block should transmit a logical zero it will drive 0 on the bus, but when it should transmit a logical 1 it will leave high-impedance on the bus (i.e. it doesn't drive the bus). If all the agents on the LSS bus adhere to this protocol then there will be no issues with bus contention.

The LSS block controls all communication to and from the QA chips. The LSS block is the bus master in all cases. The LSS block interprets a command register set by the SoPEC CPU, initiates transactions to the QA chip in question and optionally accepts return data. Any return information is presented through the configuration registers to the SoPEC CPU. The LSS block indicates to the CPU the completion of a command or the occurrence of an error via an interrupt.

The LSS protocol can be used to communicate with other LSS slave devices (other than QA chips). However should a LSS slave device hold the clock low (for whatever reason), it will be in violation of the LSS protocol and is not supported. The LSS clock is only ever driven by the LSS master.

21.2.1 Start and Stop Conditions

Figure 89:
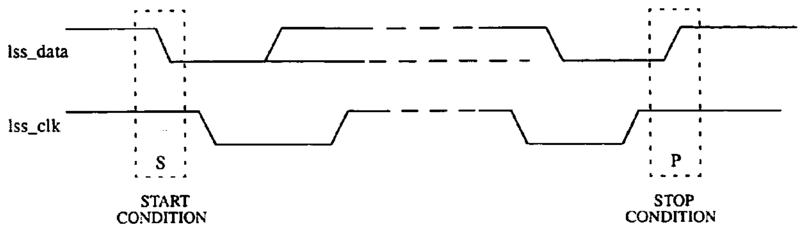

All transmissions on the LSS bus are initiated by the LSS master issuing a START condition and terminated by the LSS master issuing a STOP condition. START and STOP conditions are always generated by the LSS master. As illustrated in FIG. 89, a START condition corresponds to a high to low transition on lss_data while lss_clk is high. A STOP condition corresponds to a low to high transition on lss_data while lss_clk is high.

21.2.2 Data Transfer

Data is transferred on the LSS bus via a byte orientated protocol. Bytes are transmitted serially. Each byte is sent most significant bit (MSB) first through to least significant bit (LSB) last. One clock pulse is generated for each data bit transferred. Each byte must be followed by an acknowledge bit.

The data on the lss_data must be stable during the HIGH period of the lss_clk clock. Data may only change when lss_clk is low. A transmitter outputs data after the falling edge of lss_clk and a receiver inputs the data at the rising edge of lss_clk. This data is only considered as a valid data bit at the next lss_clk falling edge provided a START or STOP is not detected in the period before the next lss_clk falling edge. All clock pulses are generated by the LSS block. The transmitter releases the lss_data line (high) during the acknowledge clock pulse (ninth clock pulse). The receiver must pull down the lss_data line during the acknowledge clock pulse so that it remains stable low during the HIGH period of this clock pulse.

Figure 90:
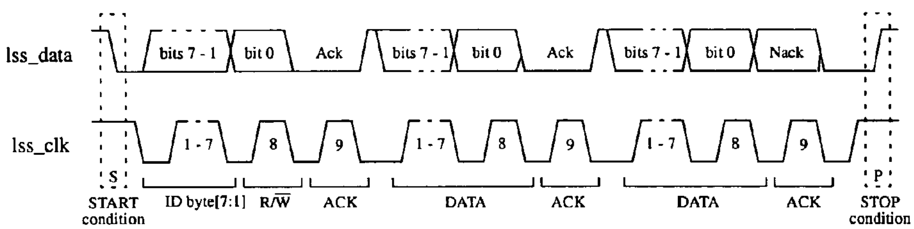
Figure 91:
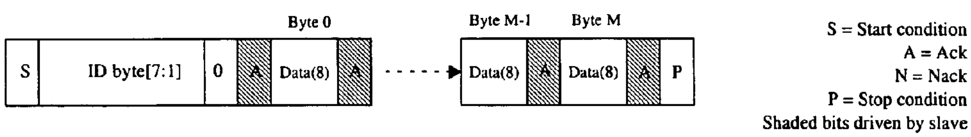

Data transfers follow the format shown in FIG. 90. The first byte sent by the LSS master after a START condition is a primary id byte, where bits 7-2 form a 6-bit primary id (0 is a global id and will address all QA Chips on a particular LSS bus), bit 1 is an even parity bit for the primary id, and bit 0 forms the read/write sense. Bit 0 is high if the following command is a read to the primary id given or low for a write command to that id. An acknowledge is generated by the QA chip(s) corresponding to the given id (if such a chip exists) by driving the lss_data line low synchronous with the LSS master generated ninth lss_clk.

21.2.3 Write Procedure

Figure 92:
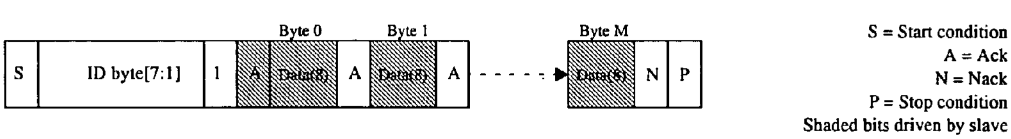

The protocol for a write access to a QA Chip over the LSS bus is illustrated in FIG. 92 below. The LSS master in SoPEC initiates the transaction by generating a START condition on the LSS bus. It then transmits the primary id byte with a 0 in bit 0 to indicate that the following command is a write to the primary id. An acknowledge is generated by the QA chip corresponding to the given primary id. The LSS master will clock out M data bytes with the slave QA Chip acknowledging each successful byte written. Once the slave QA chip has acknowledged the $M^{th}$ data byte the LSS master issues a STOP condition to complete the transfer. The QA chip gathers the M data bytes together and interprets them as a command. See QA Chip Interface Specification for more details on the format of the commands used to communicate with the QA chip. Note that the QA chip is free to not acknowledge any byte transmitted. The LSS master should respond by issuing an interrupt to the CPU to indicate this error. The CPU should then generate a STOP condition on the LSS bus to gracefully complete the transaction on the LSS bus.

21.2.4 Read Procedure

The LSS master in SoPEC initiates the transaction by generating a START condition on the LSS bus. It then transmits the primary id byte with a 1 in bit 0 to indicate that the following command is a read to the primary id. An acknowledge is generated by the QA chip corresponding to the given primary id. The LSS master releases the lss_data bus and proceeds to clock the expected number of bytes from the QA chip with the LSS master acknowledging each successful byte read. The last expected byte is not acknowledged by the LSS master. It then completes the transaction by generating a STOP condition on the LSS bus. See QA Chip Interface Specification for more details on the format of the commands used to communicate with the QA chip.

21.3 Implementation

Figure 93:
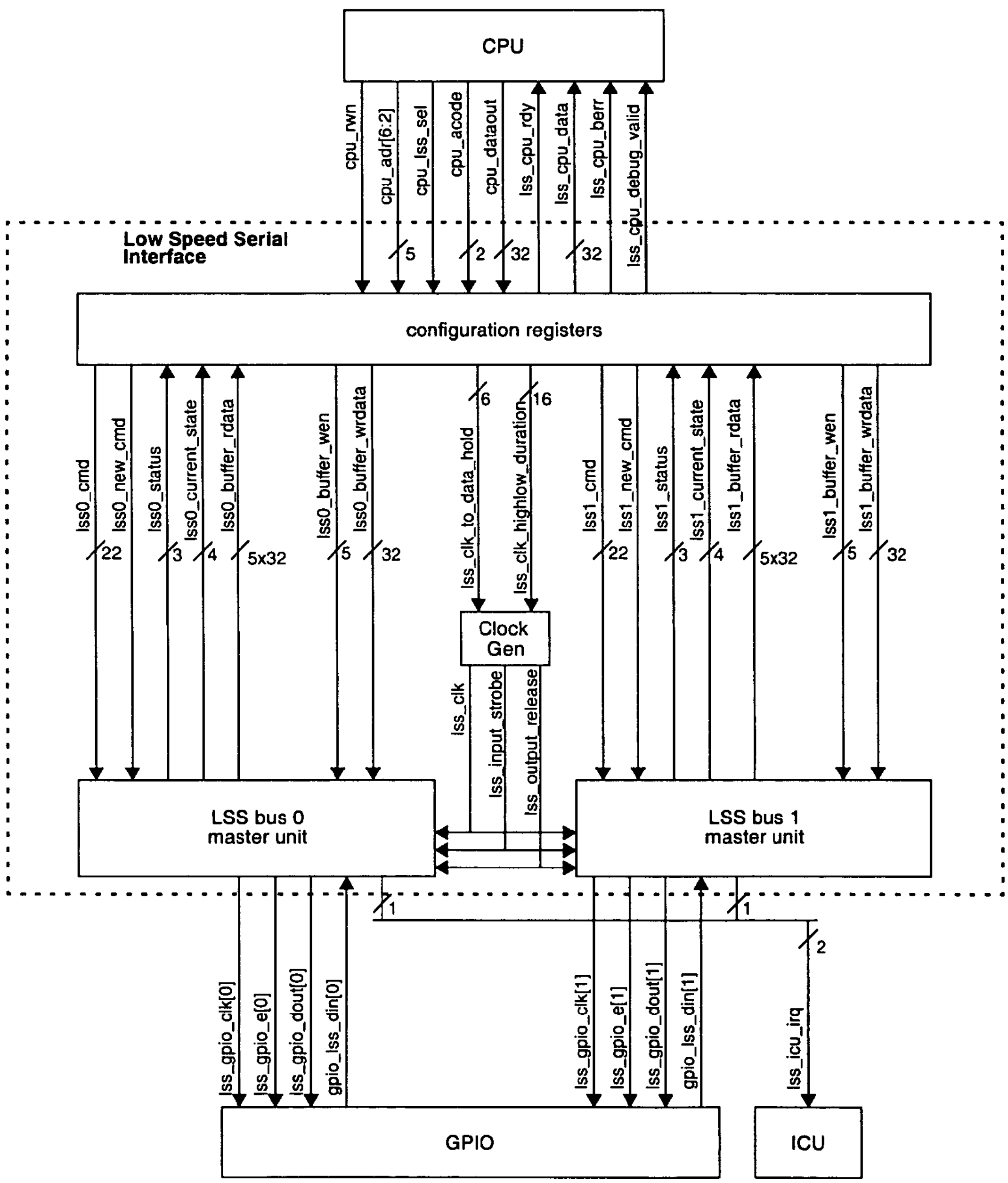
Figure 94:
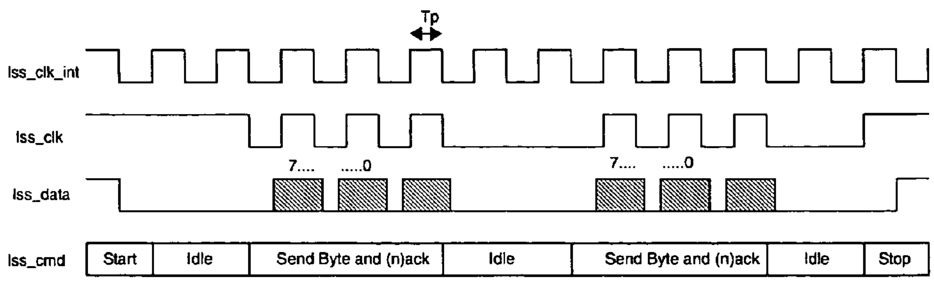

A block diagram of the LSS master is given in FIG. 93. It consists of a block of configuration registers that are programmed by the CPU and two identical LSS master units that generate the signalling protocols on the two LSS buses as well as interrupts to the CPU. The CPU initiates and terminates transactions on the LSS buses by writing an appropriate command to the command register, writes bytes to be transmitted to a buffer and reads bytes received from a buffer, and checks the sources of interrupts by reading status registers.

21.3.1 Definitions of IO

TABLE 99

LSS IO pins definitions

| Port name | Pins | I/O | Description |
|---|---|---|---|
| | | | Clocks and Resets |
| pclk | 1 | In | System Clock |
| prst_n | 1 | In | System reset, synchronous active low |
| | | | CPU Interface |
| cpu_rwn | 1 | In | Common read/not-write signal from the CPU |
| cpu_adr[6:2] | 5 | In | CPU address bus. Only 5 bits are required to decode the address space for this block |
| cpu_dataout[31:0] | 32 | In | Shared write data bus from the CPU |
| cpu_acode[1:0] | 2 | In | CPU access code signals.<br>cpu_acode[0] - Program (0)/Data (1) access<br>cpu_acode[1] - User (0)/Supervisor (1) access |
| cpu_lss_sel | 1 | In | Block select from the CPU. When cpu_lss_sel is high both cpu_adr and cpu_dataout are valid |
| lss_cpu_rdy | 1 | Out | Ready signal to the CPU. When lss_cpu_rdy is high it indicates the last cycle of the access. For a write cycle this means cpu_dataout has been registered by the LSS block and for a read cycle this means the data on lss_cpu_data is valid. |
| lss_cpu_berr | 1 | Out | LSS bus error signal to the CPU. |
| lss_cpu_data[31:0] | 32 | Out | Read data bus to the CPU |
| lss_cpu_debug_valid | 1 | Out | Active high. Indicates the presence of valid debug data on lss_cpu_data. |
| | | | GPIO for LSS buses |
| lss_gpio_dout[1:0] | 2 | Out | LSS bus data output<br>Bit 0 - LSS bus 0<br>Bit 1 - LSS bus 1 |
| gpio_lss_din[1:0] | 2 | In | LSS bus data input<br>Bit 0 - LSS bus 0<br>Bit 1 - LSS bus 1 |
| lss_gpio_e[1:0] | 2 | Out | LSS bus data output enable, active high<br>Bit 0 - LSS bus 0<br>Bit 1 - LSS bus 1 |
| lss_gpio_clk[1:0] | 2 | Out | LSS bus clock output<br>Bit 0 - LSS bus 0<br>Bit 1 - LSS bus 1 |
| | | | ICU interface |
| lss_icu_irq[1:0] | 2 | Out | LSS interrupt requests<br>Bit 0 - interrupt associated with LSS bus 0<br>Bit 1 - interrupt associated with LSS bus 1 |

21.3.1

21.3.2 Configuration Registers

The configuration registers in the LSS block are programmed via the CPU interface. Refer to section 11.4 on page 76 for the description of the protocol and timing diagrams for reading and writing registers in the LSS block. Note that since addresses in SoPEC are byte aligned and the CPU only supports 32-bit register reads and writes, the lower 2 bits of the CPU address bus are not required to decode the address space for the LSS block. Table 100 lists the configuration registers in the LSS block. When reading a register that is less than 32 bits wide zeros are returned on the upper unused bit(s) of lss_cpu_data.

The input cpu_acode signal indicates whether the current CPU access is supervisor, user, program or data. The configuration registers in the LSS block can only be read or written by a supervisor data access, i.e. when cpu_acode equals b11. If the current access is a supervisor data access then the LSS responds by asserting lss_cpu_rdy for a single clock cycle.

If the current access is anything other than a supervisor data access, then the LSS generates a bus error by asserting lss_cpu_berr for a single clock cycle instead of lss_cpu_rdy as shown in section 11.4 on page 76. A write access will be ignored, and a read access will return zero.

TABLE 100

LSS Control Registers

| Address (LSS_base+) | Register | #bits | Reset | Description |
|---|---|---|---|---|
| | | Control registers | | |
| 0x00 | Reset | 1 | 0x1 | A write to this register causes a reset of the LSS. |
| 0x04 | LssClockHighLowDuration | 16 | 0x00C8 | Lss_clk has a 50:50 duty cycle, this register defines the period of lss_clk by means of specifying the duration (in pclk cycles) that lss_clk is low (or high).<br>The reset value specifies transmission over the LSS bus at a nominal rate of 480 kHz, corresponding to a low (or high) duration of 200 pclk (192 Mhz) cycles.<br>Register should not be set to values less than 8. |
| 0x08 | LssClocktoDataHold | 6 | 0x3 | Specifies the number of pclk cycles that Data must remain valid for after the falling edge of lss_clk.<br>Minimum value is 3 cycles, and must to programmed to be less than LssClockHighLowDuration. |
| | | LSS bus 0 registers | | |
| 0x10 | Lss0IntStatus | 3 | 0x0 | LSS bus 0 interrupt status registers<br>Bit 0 - command completed successfully<br>Bit 1 - error during processing of command, not-acknowledge received after transmission<br>of primary id byte on LSS bus 0<br>Bit 2 - error during processing of command, not-acknowledge received after transmission<br>of data byte on LSS bus 0<br>All the bits in Lss0IntStatus are cleared when the Lss0Cmd register gets written to.<br>(Read only register) |
| 0x14 | Lss0CurrentState | 4 | 0x0 | Gives the current state of the LSS bus 0 state machine. (Read only register).<br>(Encoding will be specified upon state machine implementation) |
| 0x18 | Lss0Cmd | 21 | 0x00_0000 | Command register defining sequence of events to perform on LSS bus 0 before interrupting CPU.<br>A write to this register causes all the bits in the Lss0IntStatus register to be cleared as well as generating a lss0_new_cmd pulse. |
| 0x1C-0x2C | Lss0Buffer[4:0] | 5x32 | 0x0000_0000 | LSS Data buffer. Should be filled with transmit data before transmit command, or read data bytes received after a valid read command. |
| | | LSS bus 1 registers | | |
| 0x30 | Lss1IntStatus | 3 | 0x0 | LSS bus 1 interrupt status registers<br>Bit 0 - command completed successfully<br>Bit 1 - error during processing of command, not-acknowledge received after transmission<br>of primary id byte on LSS bus 1<br>Bit 2 - error during processing of command, not-acknowledge received after transmission<br>of data byte on LSS bus 1<br>All the bits in Lss1IntStatus are cleared when the Lss1Cmd register gets written to.<br>(Read only register) |
| 0x34 | Lss1CurrentState | 4 | 0x0 | Gives the current state of the LSS bus 1 state machine. (Read only register)<br>(Encoding will be specified upon state machine implementation) |
| 0x38 | Lss1Cmd | 21 | 0x00_0000 | Command register defining sequence of events to perform on LSS bus 1 before interrupting CPU. |

TABLE 100-continued

LSS Control Registers

| Address (LSS_base+) | Register | #bits | Reset | Description |
|---|---|---|---|---|
| | | | | A write to this register causes all the bits in the Lss1IntStatus register to be cleared as well as generating a lss1_new_cmd pulse. |
| 0x3C-0x4C | Lss1Buffer[4:0] | 5x32 | 0x0000_0000 | LSS Data buffer. Should be filled with transmit data before transmit command, or read data bytes received after a valid read command. |
| | | Debug registers | | |
| 0x50 | LssDebugSel[6:2] | 5 | 0x00 | Selects register for debug output. This value is used as the input to the register decode logic instead of cpu_adr[6:2] when the LSS block is not being accessed by the CPU, i.e. when cpu_lss_sel is 0. The output lss_cpu_debug_valid is asserted to indicate that the data on lss_cpu_data is valid debug data. This data can be mutliplexed onto chip pins during debug mode. |

21.3.2.1 LSS Command Registers

The LSS command registers define a sequence of events to perform on the respective LSS bus before issuing an interrupt to the CPU. There is a separate command register and interrupt for each LSS bus. The format of the command is given in Table 101. The CPU writes to the command register to initiate a sequence of events on an LSS bus. Once the sequence of events has completed or an error has occurred, an interrupt is sent back to the CPU.

Some example commands are:

- a single START condition (Start=1, IdByteEnable=0, RdWrEnable=0, Stop=0)
- a single STOP condition (Start=0, IdByteEnable=0, RdWrEnable=0, Stop=1)
- a START condition followed by transmission of the id byte (Start=1, IdByteEnable=1, RdWrEnable=0, Stop=0, IdByte contains primary id byte)
- a write transfer of 20 bytes from the data buffer (Start=0, IdByteEnable=0, RdWrEnable=1, RdWrSense=0, Stop=0, TxRxByteCount=20)
- a read transfer of 8 bytes into the data buffer (Start=0, IdByteEnable=0, RdWrEnable=1, RdWrSense=1, ReadNack=0, Stop=0, TxRxByteCount=8)
- a complete read transaction of 16 bytes (Start=1, IdByteEnable=1, RdWrEnable=1, RdWrSense=1, ReadNack=1, Stop=1, IdByte contains primary id byte, TxRxByteCount=16), etc.

The CPU can thus program the number of bytes to be transmitted or received (up to a maximum of 20) on the LSS bus before it gets interrupted. This allows it to insert arbitrary delays in a transfer at a byte boundary. For example the CPU may want to transmit 30 bytes to a QA chip but insert a delay between the $20^{th}$ and $21^{st}$ bytes sent. It does this by first writing 20 bytes to the data buffer. It then writes a command to generate a START condition, send the primary id byte and then transmit the 20 bytes from the data buffer. When interrupted by the LSS block to indicate successful completion of the command the CPU can then write the remaining 10 bytes to the data buffer. It can then wait for a defined period of time before writing a command to transmit the 10 bytes from the data buffer and generate a STOP condition to terminate the transaction over the LSS bus.

An interrupt to the CPU is generated for one cycle when any bit in LssNIntStatus is set. The CPU can read LssNIntStatus to discover the source of the interrupt. The LssNIntStatus registers are cleared when the CPU writes to the LssNCmd register. A null command write to the LssNCmd register will cause the LssNIntStatus registers to clear and no new command to start. A null command is defined as Start, IdbyteEnable, RdWrEnable and Stop all set to zero.

TABLE 101

LSS command register description

| bit(s) | name | description |
|---|---|---|
| 0 | Start | When 1, issue a START condition on the LSS bus. |
| 1 | IdByteEnable | ID byte transmit enable:<br>1 - transmit byte in IdByte field<br>0 - ignore byte in IdByte field |
| 2 | RdWrEnable | Read/write transfer enable:<br>0 - ignore settings of RdWrSense, ReadNack and TxRxByteCount<br>1 - if RdWrSense is 0, then perform a write transfer of TxRxByteCount bytes from the<br>data buffer.<br>if RdWrSense is 1, then perform a read transfer of TxRxByteCount bytes into the<br>data buffer. Each byte should be acknowledged and the last byte |

TABLE 101-continued

LSS command register description

| bit(s) | name | description |
|---|---|---|
| | | received is acknowledged/not-acknowledged according to the setting of ReadNack. |
| 3 | RdWrSense | Read/write sense indicator: 0 - write 1 - read |
| 4 | ReadNack | Indicates, for a read transfer, whether to issue an acknowledge or a not-acknowledge after the last byte received (indicated by TxRxByteCount). 0 - issue acknowledge after last byte received 1 - issue not-acknowledge after last byte received. |
| 5 | Stop | When 1, issue a STOP condition on the LSS bus. |
| 7:6 | reserved | Must be 0 |
| 15:8 | IdByte | Byte to be transmitted if IdByteEnable is 1. Bit 8 corresponds to the LSB. |
| 20:16 | TxRxByteCount | Number of bytes to be transmitted from the data buffer or the number of bytes to be received into the data buffer. The maximum value that should be programmed is 20, as the size of the data buffer is 20 bytes. Valid values are 1 to 20, 0 is valid when RdWrEnable = 0, other cases are invalid and undefined. |

The data buffer is implemented in the LSS master block. When the CPU writes to the LssNBuffer registers the data written is presented to the LSS master block via the lssN_buffer_wrdata bus and configuration registers block pulses the lssN_buffer_wen bit corresponding to the register written. For example if LssNBuffer[2] is written to lssN_buffer_wen[2] will be pulsed. When the CPU reads the LssNBuffer registers the configuration registers block reflect the lssN_buffer_rdata bus back to the CPU.

21.3.3 LSS Master Unit

Figure 96:
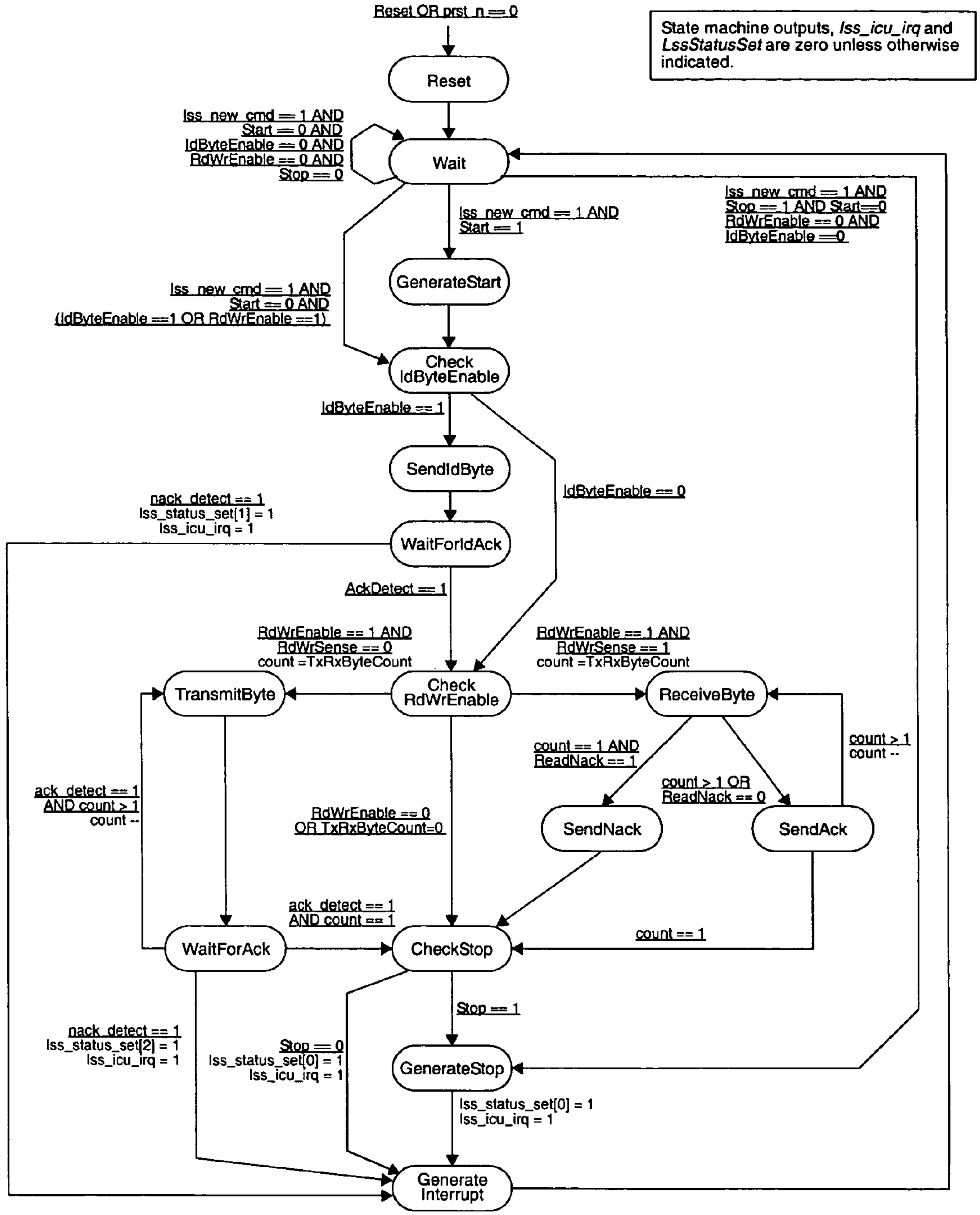

The LSS master unit is instantiated for both LSS bus 0 and LSS bus 1. It controls transactions on the LSS bus by means of the state machine shown in FIG. 96, which interprets the commands that are written by the CPU. It also contains a single 20 byte data buffer used for transmitting and receiving data.

The CPU can write data to be transmitted on the LSS bus by writing to the LssNBuffer registers. It can also read data that the LSS master unit receives on the LSS bus by reading the same registers. The LSS master always transmits or receives bytes to or from the data buffer in the same order.

For a transmit command, LssNBuffer[0][7:01] gets transmitted first, then LssNBuffer[0][15:8], LssNBuffer[0][23:16], LssNBuffer[0][31:24], LssNBuffer[1][7:0] and so on until TxRxByteCount number of bytes are transmitted. A receive command fills data to the buffer in the same order. For each new command the buffer start point is reset.

All state machine outputs, flags and counters are cleared on reset. After a reset the state machine goes to the Reset state and initializes the LSS pins (lss_clk is set to 1, lss_data is tristated and allowed to be pulled up to 1). When the reset condition is removed the state machine transitions to the Wait state.

It remains in the Wait state until lss_new_cmd equals 1. If the Start bit of the command is 0 the state machine proceeds directly to the CheckIdByteEnable state. If the Start bit is 1 it proceeds to the GenerateStart state and issues a START condition on the LSS bus.

In the CheckIdByteEnable state, if the IdByteEnable bit of the command is 0 the state machine proceeds directly to the CheckRdWrEnable state. If the IdByteEnable bit is 1 the state machine enters the SendIdByte state and the byte in the IdByte field of the command is transmitted on the LSS. The WaitForIdAck state is then entered. If the byte is acknowledged, the state machine proceeds to the CheckRdWrEnable state. If the byte is not-acknowledged, the state machine proceeds to the GenerateInterrupt state and issues an interrupt to indicate a not-acknowledge was received after transmission of the primary id byte.

In the CheckRdWrEnable state, if the RdWrEnable bit of the command is 0 the state machine proceeds directly to the CheckStop state. If the RdWrEnable bit is 1, count is loaded with the value of the TxRxByteCount field of the command and the state machine enters either the ReceiveByte state if the RdWrSense bit of the command is 1 or the TransmitByte state if the RdWrSense bit is 0.

For a write transaction, the state machine keeps transmitting bytes from the data buffer, decrementing count after each byte transmitted, until count is 1. If all the bytes are successfully transmitted the state machine proceeds to the CheckStop state. If the slave QA chip not-acknowledges a transmitted byte, the state machine indicates this error by issuing an interrupt to the CPU and then entering the GenerateInterrupt state.

For a read transaction, the state machine keeps receiving bytes into the data buffer, decrementing count after each byte transmitted, until count is 1. After each byte received the LSS master must issue an acknowledge. After the last expected byte (i.e. when count is 1) the state machine checks the ReadNack bit of the command to see whether it must issue an acknowledge or not-acknowledge for that byte. The CheckStop state is then entered.

In the CheckStop state, if the Stop bit of the command is 0 the state machine proceeds directly to the GenerateInterrupt state. If the Stop bit is 1 it proceeds to the GenerateStop state and issues a STOP condition on the LSS bus before proceeding to the GenerateInterrupt state. In both cases an interrupt is issued to indicate successful completion of the command.

The state machine then enters the Wait state to await the next command. When the state machine reenters the Wait state the output pins (lss_data and lss_clk) are not changed, they retain the state of the last command. This allows the possibility of multi-command transactions.

The CPU may abort the current transfer at any time by performing a write to the Reset register of the LSS block.

21.3.3.1 START and STOP Generation

START and STOP conditions, which signal the beginning and end of data transmission, occur when the LSS master generates a falling and rising edge respectively on the data while the clock is high.

In the GenerateStart state, lss_gpio_clk is held high with lss_gpio_e remaining deasserted (so the data line is pulled high externally) for LssClockHighLowDuration pclk cycles. Then lss_gpio_e is asserted and lss_gpio_dout is pulled low (to drive a 0 on the data line, creating a falling edge) with lss_gpio_clk remaining high for another LssClockHighLowDuration pclk cycles.

In the GenerateStop state, both lss_gpio_clk and lss_gpio_dout are pulled low followed by the assertion of lss_gpio_e to drive a 0 while the clock is low. After LssClockHighLowDuration pclk cycles, lss_gpio_clk is set high. After a further LssClockHighLowDuration pclk cycles, lss_gpio_e is deasserted to release the data bus and create a rising edge on the data bus during the high period of the clock.

Figure 95:
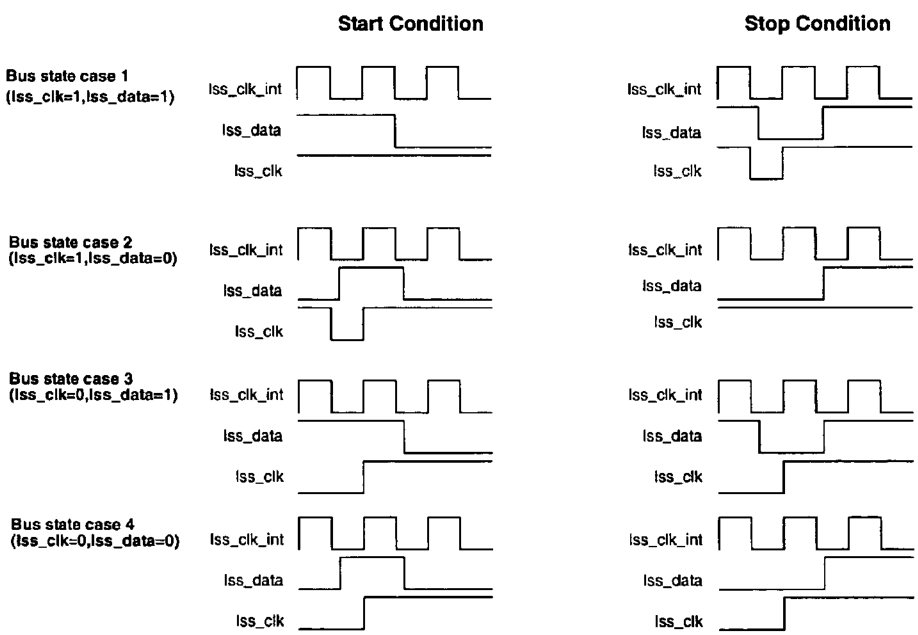

If the bus is not in the required state for start and stop generation (lss_clk=1, lss_data=1 for start, and lss_clk=1, lss_data=0), the state machine moves the bus to the correct state and proceeds as described above. FIG. 95 shows the transition timing from any bus state to start and stop generation 21.3.3.2 Clock Pulse Generation The LSS master holds lss_gpio_clk high while the LSS bus is inactive. A clock pulse is generated for each bit transmitted or received over the LSS bus. It is generated by first holding lss_gpio_clk low for LssClockHighLowDuration pclk cycles, and then high for LssClockHighLowDuration pclk cycles.

21.3.3.3 Data De-Glitching

When data is received in the LSS block it is passed to a de-glitching circuit. The de-glitch circuit samples the data 3 times on pclk and compares the samples. If all 3 samples are the same then the data is passed, otherwise the data is ignored.

Note that the LSS data input on SoPEC is double registered in the GPIO block before being passed to the LSS.

21.3.3.4 Data Reception

The input data, gpio_lss_di, is first synchronised to the pclk domain by means of two flip-flops clocked by pclk (the double register resides in the GPIO block). The LSS master generates a clock pulse for each bit received. The output lss_gpio_e is deasserted LssClockToDataHold pclk cycles after the falling edge of lss_gpio_clk to release the data bus. The value on the synchronised gpio_lss_di is sampled Tstrobe number of clock cycles after the rising edge of lss_gpio_clk (the data is de-glitched over a further 3 stage register to avoid possible glitch detection). See FIG. 97 for further timing information.

In the ReceiveByte state, the state machine generates 8 clock pulses. At each Tstrobe time after the rising edge of lss_gpio_clk the synchronised gpio_lss_di is sampled. The first bit sampled is LssNBuffer[0][7], the second LssNBuffer[0][6], etc to LssNBuffer[0][0] For each byte received the state machine either sends an NAK or an ACK depending on the command configuration and the number of bytes received.

In the SendNack state the state machine generates a single clock pulse. lss_gpio_e is deasserted and the LSS data line is pulled high externally to issue a not-acknowledge.

In the SendAck state the state machine generates a single clock pulse. lss_gpio_e is asserted and a 0 driven on lss_gpio_dout after lss_gpio_clk falling edge to issue an acknowledge.

21.3.3.5 Data Transmission

The LSS master generates a clock pulse for each bit transmitted. Data is output on the LSS bus on the falling edge of lss_gpio_clk.

When the LSS master drives a logical zero on the bus it will assert lss_gpio_e and drive a 0 on lss_gpio_dout after lss_gpio_clk falling edge. lss_gpio_e will remain asserted and lss_gpio_dout will remain low until the next lss_clk falling edge.

When the LSS master drives a logical one lss_gpio_e should be deasserted at lss_gpio_clk falling edge and remain deasserted at least until the next lss_gpio_clk falling edge. This is because the LSS bus will be externally pulled up to logical one via a pull-up resistor.

In the SendId byte state, the state machine generates 8 clock pulses to transmit the byte in the IdByte field of the current valid command. On each falling edge of lss_gpio_clk a bit is driven on the data bus as outlined above. On the first falling edge IdByte[7] is driven on the data bus, on the second falling edge IdByte[6] is driven out, etc.

In the TransmitByte state, the state machine generates 8 clock pulses to transmit the byte at the output of the transmit FIFO. On each falling edge of lss_gpio_clk a bit is driven on the data bus as outlined above. On the first falling edge LssNBuffer[0][7] is driven on the data bus, on the second falling edge LssNBuffer[0][6] is driven out, etc on to LssNBuffer[0][7] bits.

In the WaitForAck state, the state machine generates a single clock pulse. At Tstrobe time after the rising edge of lss_gpio_clk the synchronized gpio_lss_di is sampled. A 0 indicates an acknowledge and ack_detect is pulsed, a 1 indicates a not-acknowledge and nack_detect is pulsed.

21.3.3.6 Data Rate Control

The CPU can control the data rate by setting the clock period of the LSS bus clock by programming appropriate value in LssClockHighLowDuration. The default setting for the register is 200 (pclk cycles) which corresponds to transmission rate of 480 kHz on the LSS bus (the lss_clk is high for LssClockHighLowDuration cycles then low for LssClockHighLowDuration cycles). The lss_clk will always have a 50:50 duty cycle. The LssClockHighLowDuration register should not be set to values less than 8.

The hold time of lss_data after the falling edge of lss_clk is programmable by the LssClocktoDataHold register. This register should not be programmed to less than 2 or greater than the LssClockHighLowDuration value.

21.3.3.7 LSS Master Timing Parameters

Figure 97:
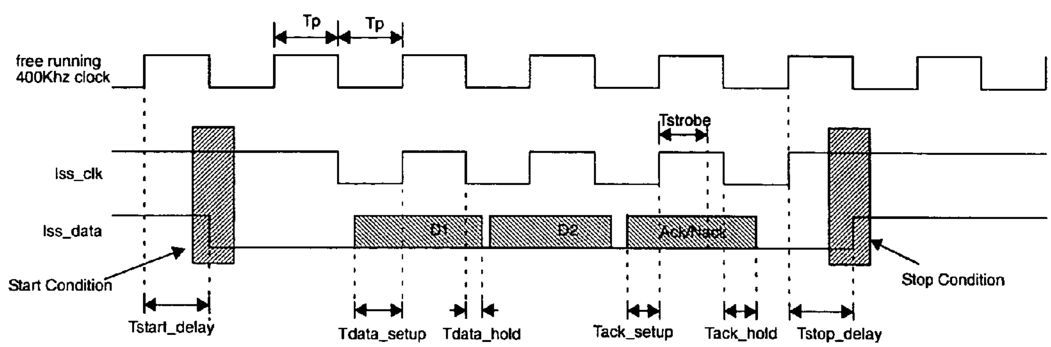

The LSS master timing parameters are shown in FIG. 97 and the associated values are shown in Table 102.

TABLE 102

LSS master timing parameters

| Parameter | Description | min | nom | max | unit |
|---|---|---|---|---|---|
| LSS master Driving | | | | | |
| Tp | LSS clock period divided by 2 | 8 | 200 | FFFF | pclk cycles |
| Tstart_delay | Time to start data edge from rising clock edge | Tp + LssClocktoDataHold | | | pclk cycles |
| Tstop_delay | Time to stop data edge from rising clock edge | Tp + LssClocktoDataHold | | | pclk cycles |
| Tdata_setup | Time from data setup to rising clock edge | Tp − 2 − LssClocktoDataHold | | | pclk cycles |
| Tdata_hold | Time from falling clock edge to data hold | LssClocktoDataHold | | | pclk cycles |
| Tack_setup | Time that outgoing (N)Ack is setup before lss_clk rising edge | Tp − 2 − LssClocktoDataHold | | | pclk cycles |
| Tack_hold | Time that outgoing (N)Ack is held after lss_clk falling edge | LssClocktoDataHold | | | pclk cycles |
| LSS Master Sampling | | | | | |
| Tstrobe | LSS master strobe point for incoming data and (N)Ack values | Tp − 2 | | Tp − 2 | pclk cycles |

Dram Subsystem

22 DRAM Interface Unit (DIU)

22.1 Overview

Figure 98:
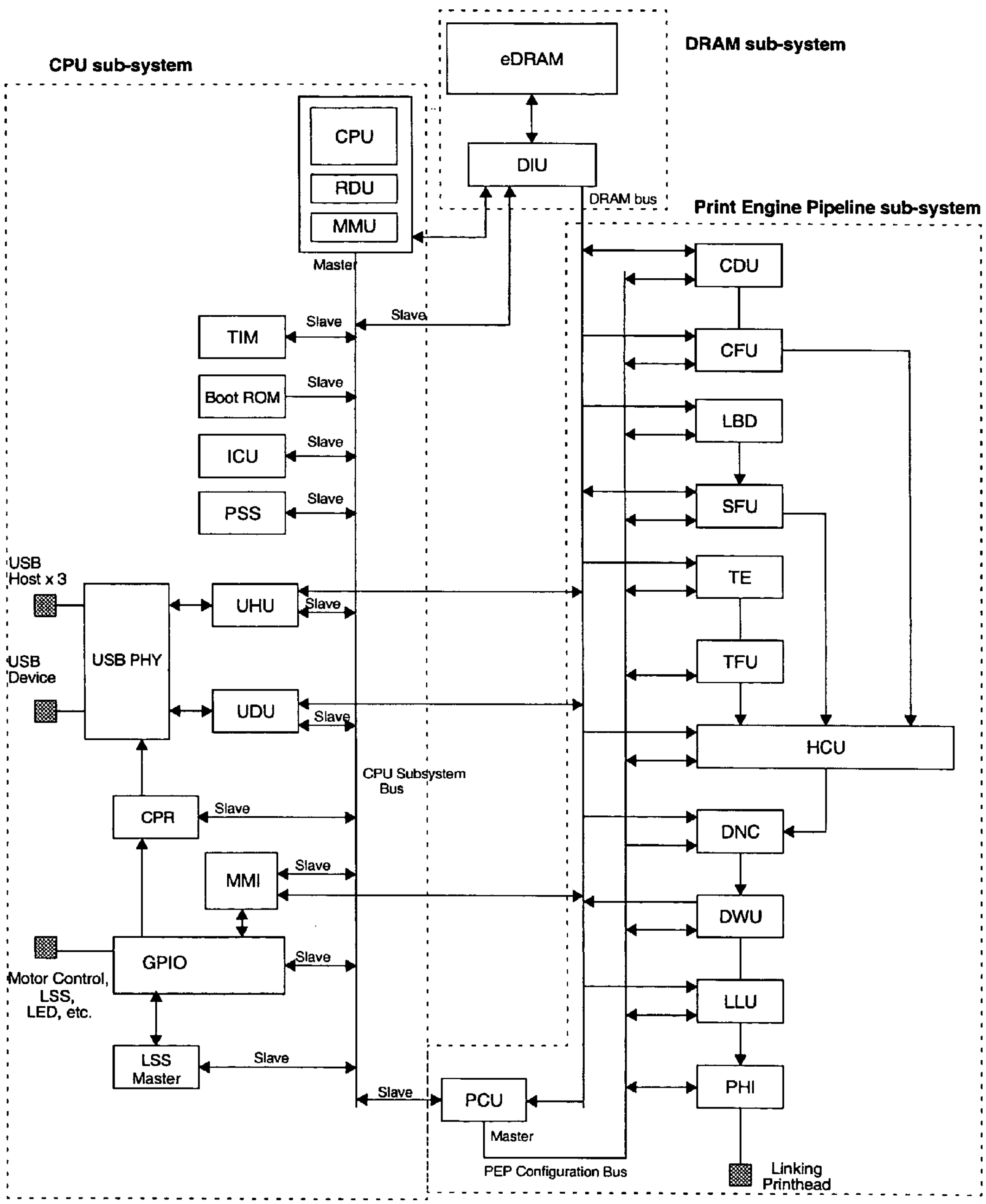

FIG. 98 shows how the DIU provides the interface between the on-chip 20 Mbit embedded DRAM and the rest of SoPEC. In addition to outlining the functionality of the DIU, this chapter provides a top-level overview of the memory storage and access patterns of SoPEC and the buffering required in the various SoPEC blocks to support those access requirements.

The main functionality of the DIU is to arbitrate between requests for access to the embedded DRAM and provide read or write accesses to the requesters. The DIU must also implement the refresh logic for the embedded DRAM.

The arbitration scheme uses a fully programmable timeslot mechanism for non-CPU requesters to meet the bandwidth and latency requirements for each unit, with unused slots re-allocated to provide best effort accesses. The CPU is allowed high priority access, giving it minimum latency, but allowing bounds to be placed on its bandwidth consumption.

The interface between the DIU and the SoPEC requesters is similar to the interface on PEC1 i.e. separate control, read data and write data busses.

The embedded DRAM is used principally to store:

- CPU program code and data.
- PEP (re)programming commands.
- Compressed pages containing contone, bi-level and raw tag data and header information.
- Decompressed contone and bi-level data.
- Dotline store during a print.
- Print setup information such as tag format structures, dither matrices and dead nozzle information.

22.2 IBM Cu-11 Embedded DRAM

22.2.1 Single Bank

SoPEC will use the 1.5 V core voltage option in IBM's 0.13 μm class Cu-11 process.

The random read/write cycle time and the refresh cycle time is 3 cycles at 192 MHz. An open page access will complete in 1 cycle if the page mode select signal is clocked at 384 MHz or 2 cycles if the page mode select signal is clocked every 192 MHz cycle. The page mode select signal will be clocked at 192 MHz in SoPEC in order to simplify timing closure. The DRAM word size is 256 bits.

Most SoPEC requesters will make single 256 bit DRAM accesses (see Section 22.4). These accesses will take 3 cycles as they are random accesses i.e. they will most likely be to a different memory row than the previous access. The entire 20 Mbit DRAM will be implemented as a single memory bank.

In Cu-11, the maximum single instance size is 16 Mbit. The first 1 Mbit tile of each instance contains an area overhead so the cheapest solution in terms of area is to have only 2 instances. 16 Mbit and 4 Mbit instances would together consume an area of 14.63 $mm^2$ as would 2 times 10 Mbit instances. 4 times 5 Mbit instances would require 17.2 $mm^2$.

The instance size will determine the frequency of refresh. Each refresh requires 3 clock cycles. In Cu-11 each row consists of 8 columns of 256-bit words. This means that 10 Mbit requires 5120 rows. A complete DRAM refresh is required every 3.2 ms. Two times 10 Mbit instances would require a refresh every 120 clock cycles, if the instances are refreshed in parallel.

The SoPEC DRAM will be constructed as two 10 Mbit instances implemented as a single memory bank.

22.3 SoPEC Memory Usage Requirements

The memory usage requirements for the embedded DRAM are shown in Table 103.

TABLE 103

Memory Usage Requirements

| Block | Size | Description |
|---|---|---|
| Compressed page store | 2048 Kbytes | Compressed data page store for Bi-level and contone data |
| Decompressed Contone Store | 108 Kbyte | 13824 lines with scale factor 6 = 2304 pixels, store 12 lines, 4 colors = 108 kB<br>13824 lines with scale factor 5 = 2765 pixels, store 12 lines, 4 colors = 130 kB |
| Spot line store | 5.1 Kbyte | 13824 dots/line so 3 lines is 5.1 kB |
| Tag Format Structure | Typically 12 Kbyte (2.5 mm tags @ 800 dpi) | 55 kB in for 384 dot line tags<br>2.5 mm tags (1/10th inch) @ 1600 dpi require 160 dot lines = 160/384 × 55 or 23 kB<br>2.5 mm tags (1/10th inch) @ 800 dpi require 80/384 × 55 = 12 kB |
| Dither Matrix store | 4 Kbytes | 64 × 64 dither matrix is 4 kB<br>128 × 128 dither matrix is 16 kB<br>256 × 256 dither matrix is 64 kB |
| DNC Dead Nozzle Table | 1.4 Kbytes | Delta encoded, (10 bit delta position + 6 dead nozzle mask) × % Dnozzle<br>5% dead nozzles requires (10 + 6) × 692 Dnozzles = 1.4 Kbytes |
| Dot-line store | 369.6 Kbytes | Assume each color row is separated by 5 dot lines on the print head<br>The dot line store will be<br>0 + 5 + 10 . . . 50 + 55 = 330 half dot lines + 48 extra half dot lines (4 per dot row) + 60 extra half dot lines estimated to account for printhead misalignment = 438 half dot lines.<br>438 half dot lines of 6912 dots = 369.6 Kbytes |
| PCU Program code | 8 Kbytes | 1024 commands of 64 bits = 8 kB |
| CPU | 64 Kbytes | Program code and data |
| TOTAL | 2620 Kbytes (12 Kbyte TFS storage) | |

Note:

Total storage is fixed to 2560 Kbytes to align to 20 Mbit DRAM. This will mean that less space than noted in Table 103 may be available for the compressed band store.

22.4 SoPEC Memory Access Patterns

Table 104 shows a summary of the blocks on SoPEC requiring access to the embedded DRAM and their individual memory access patterns. Most blocks will access the DRAM in single 256-bit accesses. All accesses must be padded to 256-bits except for 64-bit CDU write accesses and CPU write accesses. Bits which should not be written are masked using the individual DRAM bit write inputs or byte write inputs, depending on the foundry. Using single 256-bit accesses means that the buffering required in the SoPEC DRAM requesters will be minimized.

TABLE 104

Memory access patterns of SoPEC DRAM Requesters

| DRAM requester | Direction | Memory access pattern |
|---|---|---|
| CPU | R | Single 256-bit reads. |
| | W | Single writes of up to 128 bits in 8-bit multiples. |
| UHU | R | Single 256-bit reads. |
| | W | Single 256-bit writes, with byte enables. |
| UDU | R | Single 256-bit reads. |
| | W | Single 256-bit writes, with byte enables. |
| MMI | R | Single 256-bit reads. |
| | W | Single 256-bit writes. |
| CDU | R | Single 256-bit reads of the compressed contone data. |
| | W | Each CDU access is a write to 4 consecutive DRAM words in the same row but only 64 bits of each word are written with the remaining bits write masked.<br>The access time for this 4 word page mode burst is 3 + 2 + 2 + 2 = 9 cycles if the page mode select signal is clocked at 192 MHz. |

TABLE 104-continued

Memory access patterns of SoPEC DRAM Requesters

| DRAM requester | Direction | Memory access pattern |
|---|---|---|
| CFU | R | Single 256 bit reads. |
| LBD | R | Single 256 bit reads. |
| SFU | R | Separate single 256 bit reads for previous and current line but sharing the same DIU interface |
| | W | Single 256 bit writes. |
| TE(TD) | R | Single 256 bit reads. Each read returns 2 times 128 bit tags. |
| TE(TFS) | R | Single 256 bit reads. TFS is 136 bytes. This means there is unused data in the fifth 256 bit read. A total of 5 reads is required. |
| HCU | R | Single 256 bit reads. 128 × 128 dither matrix requires 4 reads per line with double buffering. 256 × 256 dither matrix requires 8 reads at the end of the line with single buffering. |
| DNC | R | Single 256 bit dead nozzle table reads. Each dead nozzle table read contains 16 dead-nozzle tables entries each of 10 delta bits plus 6 dead nozzle mask bits. |
| DWU | W | Single 256 bit writes since enable/disable DRAM access per color plane. |
| LLU | R | Single 256 bit reads since enable/disable DRAM access per color plane. |
| PCU | R | Single 256 bit reads. Each PCU command is 64 bits so each 256 bit word can contain 4 PCU commands. PCU reads from DRAM used for reprogramming PEP should be executed with minimum latency. If this occurs between pages then there will be free bandwidth as most of the other SoPEC Units will not be requesting from DRAM. If this occurs between bands then the LDB, CDU and TE bandwidth will be free. So the PCU should have a high priority to access to any spare bandwidth. |
| Refresh | | Single refresh. |

22.5 Buffering Required in SoPEC DRAM Requesters

If each DIU access is a single 256-bit access then we need to provide a 256-bit double buffer in the DRAM requester. If the DRAM requester has a 64-bit interface then this can be implemented as an 8×64-bit FIFO.

TABLE 105

Buffer sizes in SoPEC DRAM requesters

| DRAM Requester | Direction | Access patterns | Buffering required in block |
|---|---|---|---|
| CPU | R | Single 256-bit reads. | Cache. |
| | W | Single writes of up to 128 bits in 8-bit multiples. | Single 128-bit buffer. |
| UHU | R | Single 256-bit reads. | Double 256-bit buffer. |
| | W | Single 256-bit writes, with byte enables. | Double 256-bit buffer. |
| UDU | R | Single 256-bit reads. | Double 256-bit buffer. |
| | W | Single 256-bit writes, with byte enables. | Double 256-bit buffer. |
| MMI | R | Single 256-bit reads. | Double 256-bit buffer. |
| | W | Single 256-bit writes. | Double 256-bit buffer. |
| CDU | R | Single 256-bit reads of the compressed contone data. | Double 256-bit buffer. |
| | W | Each CDU access is a write to 4 consecutive DRAM words in the same row but only 64 bits of each word are written with the remaining bits write masked. | Double half JPEG block buffer. |
| CFU | R | Single 256 bit reads. | Triple 256-bit buffer. |
| LBD | R | Single 256 bit reads. | Double 256-bit buffer. |
| SFU | R | Separate single 256 bit reads for previous and current line but sharing the same DIU interface | Double 256-bit buffer for each read channel. |
| | W | Single 256 bit writes. | Double 256-bit buffer. |
| TE(TD) | R | Single 256 bit reads. | Double 256-bit buffer. |

TABLE 105-continued

Buffer sizes in SoPEC DRAM requesters

| DRAM Requester | Direction | Access patterns | Buffering required in block |
|---|---|---|---|
| TE(TFS) | R | Single 256 bit reads. TFS is 136 bytes. This means there is unused data in the fifth 256 bit read. A total of 5 reads is required. | Double line-buffer for 136 bytes implemented in TE. |
| HCU | R | Single 256 bit reads. 128 × 128 dither matrix requires 4 reads per line with double buffering. 256 × 256 dither matrix requires 8 reads at the end of the line with single buffering. | Configurable between double 128 byte buffer and single 256 byte buffer. |
| DNC | R | Single 256 bit reads | Double 256-bit buffer. Deeper buffering could be specified to cope with local clusters of dead nozzles. |
| DWU | W | Single 256 bit writes per enabled odd/even color plane. | Double 256-bit buffer per color plane. |
| LLU | R | Single 256 bit reads per enabled odd/even color plane. | Quad 256-bit buffer per color plane. |
| PCU | R | Single 256 bit reads. Each PCU command is 64 bits so each 256 bit DRAM read can contain 4 PCU commands. Requested command is read from DRAM together with the next 3 contiguous 64-bits which are cached to avoid unnecessary DRAM reads. | Single 256-bit buffer. |
| Refresh | | Single refresh. | None |

22.6 SoPEC DIU Bandwidth Requirements

TABLE 106

SoPEC DIU Bandwidth Requirements

| Block Name | Direction | Number of cycles between each 256-bit DRAM access to meet peak bandwidth | Peak Bandwidth which must be supplied (bits/cycle) | Average Bandwidth (bits/cycle) | Example number of allocated timeslots[1] |
|---|---|---|---|---|---|
| CPU | R | | | | |
| | W | | | | |
| UHU | R | 102 | 480 Mbit/s[2] | 2.5 bits/cycle | 3 |
| | W | 102 | 480 Mbit/s | 2.5 bits/cycle | 3 |
| UDU | R | 102 | 480 Mbit/s | 2.5 bits/cycle | 3 |
| | W | 102 | 480 Mbit/s | 2.5 bits/cycle | 3 |
| MMI | R | 102 | 480 Mbit/s[3] | 2.5 bits/cycle | 3 |
| | W | 102 | 480 Mbit/s | 2.5 bits/cycle | 3 |
| CDU | R | 128 (SF = 4), 288 (SF = 6), 1:1 compression[4] | $64/n^2$ (SF = n), 1.8 (SF = 6), 4 (SF = 4) (1:1 compression) | $32/10*n^2$ (SF = n), 0.09 (SF = 6), 0.2 (SF = 4) (10:1 compression)[5] | 2 (SF = 6) 4 (SF = 4) |
| | W | For individual accesses: 16 cycles (SF = 4), 36 cycles (SF = 6), $n^2$ cycles (SF = n). Will be implemented as a page mode burst of 4 accesses every 64 cycles (SF = 4), 144 (SF = 6), $4*n^2$ (SF = n) cycles[6] | $64/n^2$ (SF = n), 1.8 (SF = 6), 4 (SF = 4) | $32/n^2$ (SF = n)[7], 0.9 (SF = 6), 2 (SF = 4) | 2 (SF = 6)[8] 4 (SF = 4) |

TABLE 106-continued

SoPEC DIU Bandwidth Requirements

| Block Name | Direction | Number of cycles between each 256-bit DRAM access to meet peak bandwidth | Peak Bandwidth which must be supplied (bits/cycle) | Average Bandwidth (bits/cycle) | Example number of allocated timeslots[1] |
|---|---|---|---|---|---|
| CFU | R | 32 (SF = 4), 48 (SF = 6)[9] | 32/n (SF = n), 5.4 (SF = 6), 8 (SF = 4) | 32/n (SF = n), 5.4 (SF = 6), 8 (SF = 4) | 6 (SF = 6) 8 (SF = 4) |
| LBD | R | 256 (1:1 compression)[10] | 1 (1:1 compression) | 0.1 (10:1 compression)[11] | 1 |
| SFU | R | 128[12] | 2 | 2 | 2 |
| | W | 256[13] | 1 | 1 | 1 |
| TE(TD) | R | 252[14] | 1.02 | 1.02 | 1 |
| TE(TFS) | R | 5 reads per line[15] | 0.093 | 0.093 | 0 |
| HCU | R | 4 reads per line for 128 × 128 dither matrix[16] | 0.074 | 0.074 | 0 |
| DNC | R | 106 (5% dead-nozzles 10-bit delta encoded)[17] | 2.4 (clump of dead nozzles) | 0.8 (equally spaced dead nozzles) | 3 |
| DWU | W | 6 writes every 256[18] | 6 | 6 | 6 |
| LLU | R | 9 reads every 256[19] | 12.86 | 8.57 | 9 |
| PCU | R | 256[20] | 1 | 1 | 1 |
| Refresh | | 120[21] | 2.13 | 2.13 | 3 (effective) |
| TOTAL[22] | | | SF = 6: 34.5 SF = 4: 41.9 excluding CPU | SF = 6: 27.1 SF = 4: 31.2 excluding CPU | SF = 6: 35 excluding CPU, UHU, UDU, MMI, refresh SF = 4: 41 excluding CPU, UHU, UDU, MMI, refresh |

Notes:

[1]The number of allocated timeslots is based on 64 timeslots each of 1 bit/cycle but broken down to a granularity of 0.25 bit/cycle. Bandwidth is allocated based on peak bandwidth.

[2]High-speed USB requires 480 Mbit/s raw bandwidth. Full-speed USB requires 12 Mb/s raw bandwidth.

[3]Here assume maximum required MMI bandwidth is equivalent to USB high-speed bandwidth.

[4]At 1:1 compression CDU must read a 4 color pixel (32 bits) every $SF^2$ cycles. CDU read bandwidth must match CDU write bandwidth.

[5]At 10:1 average compression CDU must read a 4 color pixel (32 bits) every $10*SF^2$ cycles.

[6]4 color pixel (32 bits) is required, on average, by the CFU every $SF^2$ (scale factor) cycles.
The time available to write the data is a function of the size of the buffer in DRAM. 1.5 buffering means 4 color pixel (32 bits) must be written every $SF^2/2$ (scale factor) cycles. Therefore, at a scale factor of SF, 64 bits are required every $SF^2$ cycles.
Since 64 valid bits are written per 256-bit write (FIG. 152 on page 464) then the DRAM is accessed every $SF^2$ cycles i.e. at SF4 an access every 16 cycles, at SF6 an access every 36 cycles.
If a page mode burst of 4 accesses is used then each access takes (3 + 2 + 2 + 2) equals 9 cycles. This means at SF, a set of 4 back-to-back accesses must occur every $4*SF^2$ cycles. This assumes the page mode select signal is clocked at 192 MHz. CDU timeslots therefore take 9 cycles.
For scale factors lower than 4 double buffering will be used.

[7]The peak bandwidth is twice the average bandwidth in the case of 1.5 buffering.

[8]Each CDU(W) burst takes 9 cycles instead of 4 cycles for other accesses so CDU timeslots are longer.

[9]4 color pixel (32 bits) read by CFU every SF cycles. At SF4, 32 bits is required every 4 cycles or 256 bits every 32 cycles. At SF6, 32bits every 6 cycles or 256 bits every 48 cycles.

[10]At 1:1 compression require 1 bit/cycle or 256 bits every 256 cycles.

[11]The average bandwidth required at 10:1 compression is 0.1 bits/cycle.

[12]Two separate reads of 1 bit/cycle.

[13]Write at 1 bit/cycle.

[14]Each tag can be consumed in at most 126 dot cycles and requires 128 bits. This is a maximum rate of 256 bits every 252 cycles.

[15]17 × 64 bit reads per line in PEC1 is 5 × 256 bit reads per line in SoPEC. Double-line buffered storage.

[16]128 bytes read per line is 4 × 256 bit reads per line. Double-line buffered storage.

[17]5% dead nozzles 10-bit delta encoded stored with 6-bit dead nozzle mask requires 0.8 bits/cycle read access or a 256-bit access every 320 cycles. This assumes the dead nozzles are evenly spaced out. In practice dead nozzles are likely to be clumped. Peak bandwidth is estimated as 3 times average bandwidth.

[18]6 bits/cycle requires 6 × 256 bit writes every 256 cycles.

TABLE 106-continued

SoPEC DIU Bandwidth Requirements

| Block Name | Direction | Number of cycles between each 256-bit DRAM access to meet peak bandwidth | Peak Bandwidth which must be supplied (bits/cycle) | Average Bandwidth (bits/cycle) | Example number of allocated timeslots[1] |
|---|---|---|---|---|---|

[19]The LLU requires DIU access of approx 6.43 bits/cycle. This is to keep the PHI fed at an effective rate of 225 Mb/s assuming 12 segments but taking account that only 11 segments can actually be driven. For SegSpan = 640 and SegDotOffset = 0 the LLU will use 256 bits, 256 bits, and then 128 bits of the last DRAM word. Not utilizing the last 128-bits means the average bandwidth required increases by ⅓ to8.57 bits/cycle. The LLU quad buffer will be able to keep the LLU supplied with data if the DIU supplies this average bandwidth.
6 bits/192 MHz SoPEC cycle average but will peak at 2 × 6 bits per 128 MHz print head cycle or 8 bits/SoPEC cycle. The PHI can equalise the DRAM access rate over the line so that the peak rate equals the average rate of 6 bits/cycle. The print head is clocked at an effective speed of 106 MHz.
[20]Assume one 256 read per 256 cycles is sufficient i.e. maximum latency of 256 cycles per access is allowable.
[21]Refresh must occur every 3.2 ms. Refresh occurs row at a time over 5120 rows of 2 parallel 10 Mbit instances. Refresh must occur every 120 cycles. Each refresh takes 3 cycles.
[22]In a printing SoPEC USB host, USB device and MMI connections are unlikely to be simultaneously present.

22.7 DIU Bus Topology

22.7.1 Basic Topology

TABLE 107

SoPEC DIU Requesters

| Read | Write | Other |
|---|---|---|
| CPU | CPU | Refresh |
| UHU | UHU | |
| UDU | UDU | |
| MMI | MMI | |
| CDU | CDU | |
| CFU | SFU | |
| LBD | DWU | |
| SFU | | |
| TE(TD) | | |
| TE(TFS) | | |
| HCU | | |
| DNC | | |
| LLU | | |
| PCU | | |

Table 107 shows the DIU requesters in SoPEC. There are 12 read requesters and 5 write requesters in SoPEC as compared with 8 read requesters and 4 write requesters in PEC1. Refresh is an additional requester.

In PEC1, the interface between the DIU and the DIU requesters had the following main features:

- separate control and address signals per DIU requester multiplexed in the DIU according to the arbitration scheme,
- separate 64-bit write data bus for each DRAM write requester multiplexed in the DIU,
- common 64-bit read bus from the DIU with separate enables to each DIU read requester.

Timing closure for this bussing scheme was straightforward in PEC1. This suggests that a similar scheme will also achieve timing closure in SoPEC. SoPEC has 5 more DRAM requesters but it will be in a 0.13 um process with more metal layers and SoPEC will run at approximately the same speed as PEC1.

Using 256-bit busses would match the data width of the embedded DRAM but such large busses may result in an increase in size of the DIU and the entire SoPEC chip. The SoPEC requesters would require double 256-bit wide buffers to match the 256-bit busses. These buffers, which must be implemented in flip-flops, are less area efficient than 8-deep 64-bit wide register arrays which can be used with 64-bit busses. SoPEC will therefore use 64-bit data busses. Use of 256-bit busses would however simplify the DIU implementation as local buffering of 256-bit DRAM data would not be required within the DIU.

22.7.1.1 CPU DRAM Access

The CPU is the only DIU requestor for which access latency is critical. All DIU write requesters transfer write data to the DIU using separate point-to-point busses. The CPU will use the cpu_diu_wdata[127:0] bus. CPU reads will not be over the shared 64-bit read bus. Instead, CPU reads will use a separate 256-bit read bus.

22.7.2 Making More Efficient Use of DRAM Bandwidth

The embedded DRAM is 256-bits wide. The 4 cycles it takes to transfer the 256-bits over the 64-bit data busses of SoPEC means that effectively each access will be at least 4 cycles long. It takes only 3 cycles to actually do a 256-bit random DRAM access in the case of IBM DRAM.

22.7.2.1 Common Read Bus

Figure 99:
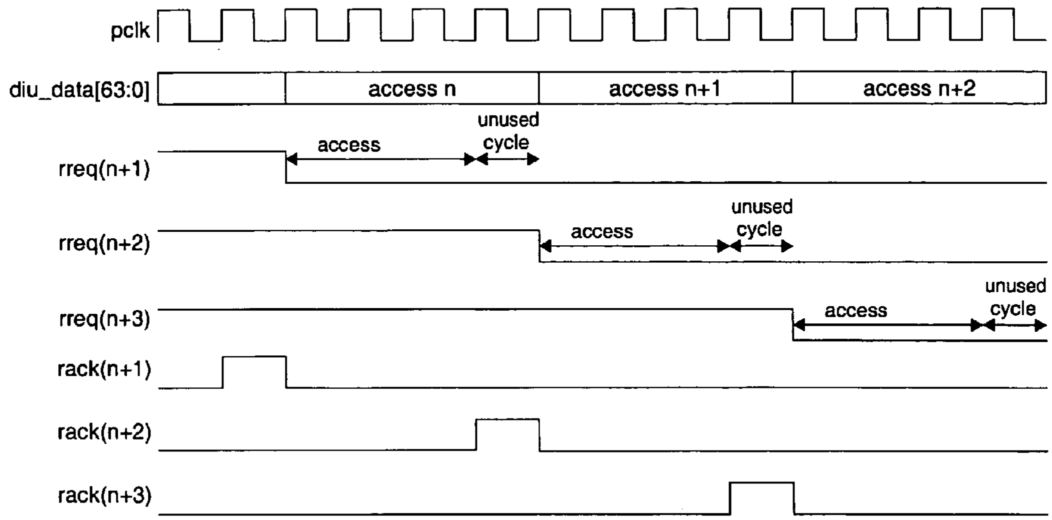

If a common read data bus is used, as in PEC1, then during back to back read accesses the next DRAM read cannot start until the read data bus is free. So each DRAM read access can occur only every 4 cycles. This is shown in FIG. 99 with the actual DRAM access taking 3 cycles leaving 1 unused cycle per access.

22.7.2.2 Interleaving CPU and Non-CPU Read Accesses

The CPU has a separate 256-bit read bus. All other read accesses are 256-bit accesses are over a shared 64-bit read bus. Interleaving CPU and non-CPU read accesses means the effective duration of an interleaved access timeslot is the DRAM access time (3 cycles) rather than 4 cycles.

Figure 100:
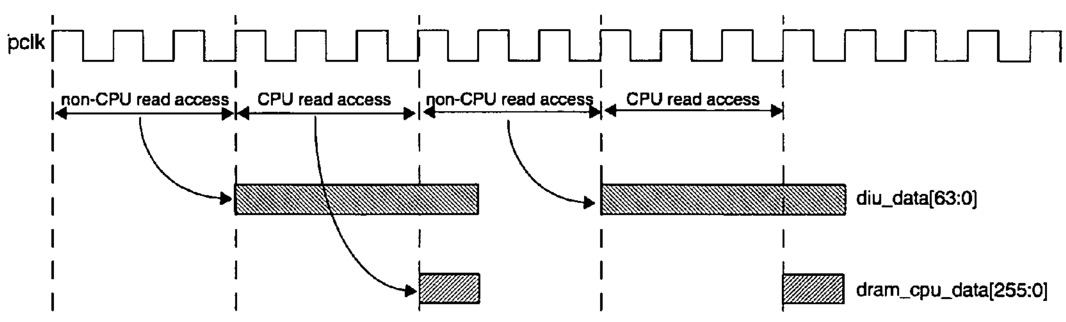

FIG. 100 shows interleaved CPU and non-CPU read accesses.

22.7.2.3 Interleaving Read and Write Accesses

Having separate write data busses means write accesses can be interleaved with each other and with read accesses. So now the effective duration of an interleaved access timeslot is the DRAM access time (3 cycles) rather than 4 cycles. Interleaving is achieved by ordering the DIU arbitration slot allocation appropriately.

Figure 101:
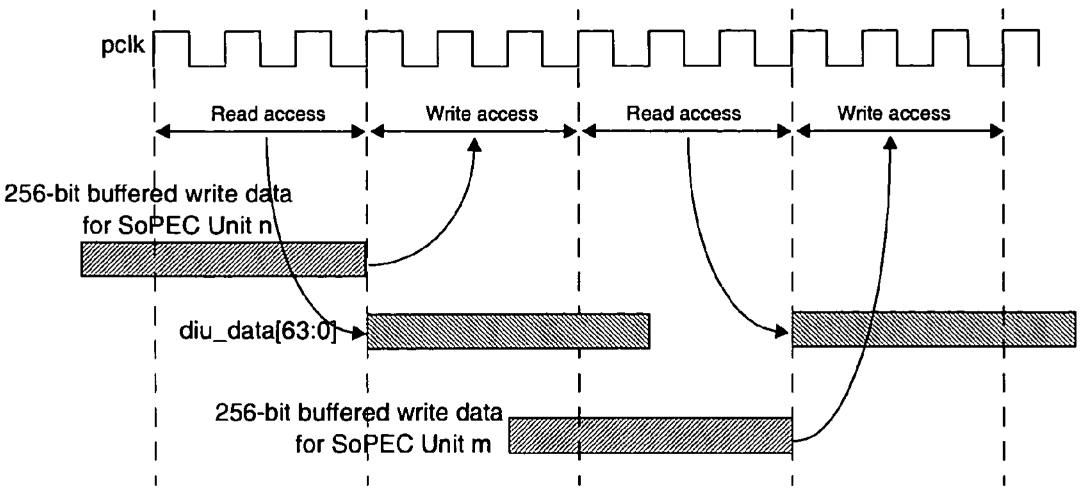
Figure 102:
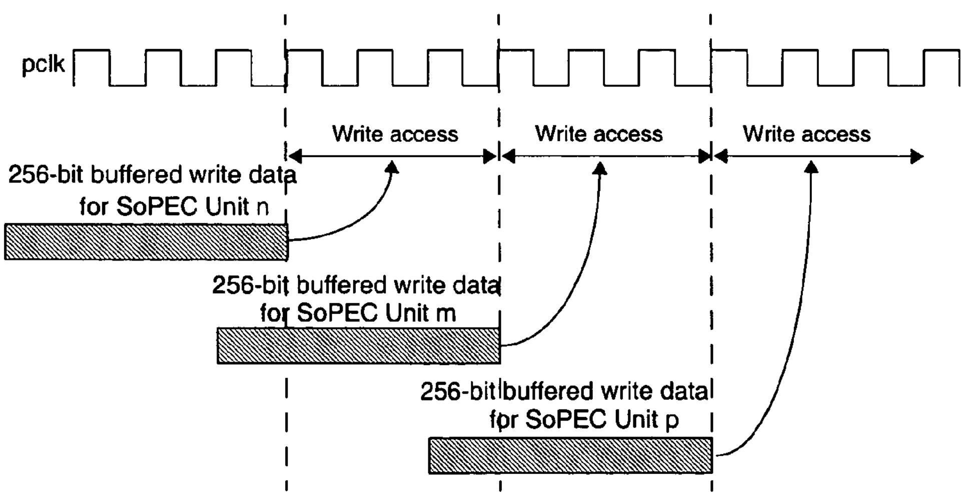

FIG. 101 shows interleaved read and write accesses. FIG. 102 shows interleaved write accesses.

256-bit write data takes 4 cycles to transmit over 64-bit busses so a 256-bit buffer is required in the DIU to gather the write data from the write requester. The exception is CPU write data which is transferred in a single cycle.

FIG. 102 shows multiple write accesses being interleaved to obtain 3 cycle DRAM access.

Since two write accesses can overlap two sets of 256-bit write buffers and multiplexors to connect two write requestors simultaneously to the DIU are required.

From Table 106, write requestors only require approximately one third of the total non-CPU bandwidth. This means that a rule can be introduced such that non-CPU write requestors are not allocated adjacent timeslots. This means that a single 256-bit write buffer and multiplexor to connect the one write requestor at a time to the DIU is all that is required.

Note that if the rule prohibiting back-to-back non-CPU writes is not adhered to, then the second write slot of any attempted such pair will be disregarded and re-allocated under the unused read round-robin scheme.

22.7.3 Bus Widths Summary

TABLE 108

SoPEC DIU Requesters Data Bus Width

| Read | Bus access width | Write | Bus access width |
|---|---|---|---|
| CPU | 256 (separate) | CPU | 128 |
| UHU | 64 (shared) | UHU | 64 |
| UDU | 64 (shared) | UDU | 64 |
| MMI | 64 (shared) | MMI | 64 |
| CDU | 64 (shared) | CDU | 64 |
| CFU | 64 (shared) | SFU | 64 |
| LBD | 64 (shared) | DWU | 64 |
| SFU | 64 (shared) | | |
| TE(TD) | 64 (shared) | | |
| TE(TFS) | 64 (shared) | | |
| HCU | 64 (shared) | | |
| DNC | 64 (shared) | | |
| LLU | 64 (shared) | | |
| PCU | 64 (shared) | | |

22.7.4 Conclusions

Timeslots should be programmed to maximise interleaving of shared read bus accesses with other accesses for 3 cycle DRAM access. The interleaving is achieved by ordering the DIU arbitration slot allocation appropriately. CPU arbitration has been designed to maximise interleaving with non-CPU requesters 22.8 SoPEC DRAM Addressing Scheme The embedded DRAM is composed of 256-bit words. However the CPU-subsystem may need to write individual bytes of DRAM. Therefore it was decided to make the DIU byte addressable. 22 bits are required to byte address 20 Mbit of DRAM.

Most blocks read or write 256 bit words of DRAM. Therefore only the top 17 bits i.e. bits 21 to 5 are required to address 256-bit word aligned locations.

The exceptions are

CDU which can write 64-bits so only the top 19 address bits i.e. bits 21-3 are required.

CPU writes can be 8, 16 or 32-bits. The cpu_diu_wmask [1:0] pins indicate whether to write 8, 16 or 32 bits.

All DIU accesses must be within the same 256-bit aligned DRAM word. The exception is the CDU write access which is a write of 64-bits to each of 4 contiguous 256-bit DRAM words.

22.8.1 Write Address Constants Specific to the CDU

Note the following conditions which apply to the CDU write address, due to the four masked page-mode writes which occur whenever a CDU write slot is arbitrated.

The CDU address presented to the DIU is cdu_diu_wadr [21:3].

Bits [4:3] indicate which 64-bit segment out of 256 bits should be written in 4 successive masked page-mode writes.

Each 10-Mbit DRAM macro has an input address port of width [15:0]. Of these bits, [2:0] are the "page address". Page-mode writes, where these LSBs (i.e. the "page" or column address) are varied the rest of the address is kept constant, are faster than random writes. This is taken advantage of for CDU writes.

To guarantee against trying to span a page boundary, the DIU treats "cdu_diu_wadr[6:5]" as being fixed at "00".

From cdu_diu_wadr[21:3], a initial address of cdu_diu_wadr[21:7], concatenated with "00", is used as the starting location for the first CDU write. This address is then auto-incremented a further three times.

22.9 DIU Protocols

The DIU protocols are

Pipelined i.e. the following transaction is initiated while the previous transfer is in progress.

Split transaction i.e. the transaction is split into independent address and data transfers.

22.9.1 Read Protocol Except CPU

The SoPEC read requesters, except for the CPU, perform single 256-bit read accesses with the read data being transferred from the DIU in 4 consecutive cycles over a shared 64-bit read bus, diu_data[63:0]. The read address <unit>_diu_radr[21:5] is 256-bit aligned.

The read protocol is:

*<unit>_diu_rreq is asserted along with a valid <unit>_diu_radr[21:5].

The DIU acknowledges the request with diu_<unit>_rack. The request should be deasserted. The minimum number of cycles between <unit>_diu_rreq being asserted and the DIU generating an diu_<unit>_rack strobe is 2 cycles (1 cycle to register the request, 1 cycle to perform the arbitration—see Section 22.14.10).

The read data is returned on diu_data[63:0] and its validity is indicated by diu_<unit>_rvalid. The overall 256 bits of data are transferred over four cycles in the order: [63:0]->[127:64]->[191:128]->[255:192].

When four diu_<unit>_rvalid pulses have been received then if there is a further request <unit>_diu_rreq should be asserted again. diu_<unit>_rvalid will be always be asserted by the DIU for four consecutive cycles. There is a fixed gap of 2 cycles between diu_<unit>_rack and the first diu_<unit>_rvalid pulse. For more detail on the timing of such reads and the implications for back-to-back sequences, see Section 22.14.10.

22.9.2 Read Protocol for CPU

The CPU performs single 256-bit read accesses with the read data being transferred from the DIU over a dedicated 256-bit read bus for DRAM data, dram_cpu_data[255:0. The read address cpu_adr[21:5] is 256-bit aligned.

The CPU DIU read protocol is:

cpu_diu_rreq is asserted along with a valid cpu_adr[21:5].

The DIU acknowledges the request with diu_cpu_rack. The request should be deasserted. The minimum number of cycles between cpu_diu_rreq being asserted and the DIU generating a cpu_diu_rack strobe is 1 cycle (1 cycle to perform the arbitration—see Section 22.14.10).

The read data is returned on dram_cpu_data[255:0] and its validity is indicated by diu_cpu_rvalid.

When the diu_cpu_rvalid pulse has been received then if there is a further request cpu_diu_rreq should be asserted again. The diu_cpu_rvalid pulse has a gap of 1 cycle after diu_cpu_rack (1 cycle for the read data to be returned from the DRAM—see Section 22.14.10).

22.9.3 Write Protocol Except CPU and CDU

The SoPEC write requestors, except for the CPU and CDU, perform single 256-bit write accesses with the write data being transferred to the DIU in 4 consecutive cycles over dedicated point-to-point 64-bit write data busses. The write address <unit>_diu_wadr[21:5] is 256-bit aligned.

The write protocol is:

<unit>_diu_wreq is asserted along with a valid <unit>_diu_wadr[21:5].

The DIU acknowledges the request with diu_<unit>_wack. The request should be deasserted. The minimum number of cycles between <unit>_diu_wreq being asserted and the DIU generating an diu_<unit>_wack strobe is 2 cycles (1 cycle to register the request, 1 cycle to perform the arbitration—see Section 22.14.10).

In the clock cycles following diu_<unit>_wack the SoPEC Unit outputs the <unit>_diu_data[63:0], asserting <unit>_diu_wvalid. The first <unit>_diu_wvalid pulse must occur the clock cycle after diu_<unit>_wack. <unit>_diu_wvalid remains asserted for the following 3 clock cycles. This allows for reading from an SRAM where new data is available in the clock cycle after the address has changed e.g. the address for the second 64-bits of write data is available the cycle after diu_<unit>_wack meaning the second 64-bits of write data is a further cycle later. The overall 256 bits of data is transferred over four cycles in the order: [63:0]->[127:64]->[191:128]->[255:192].

Figure 105:
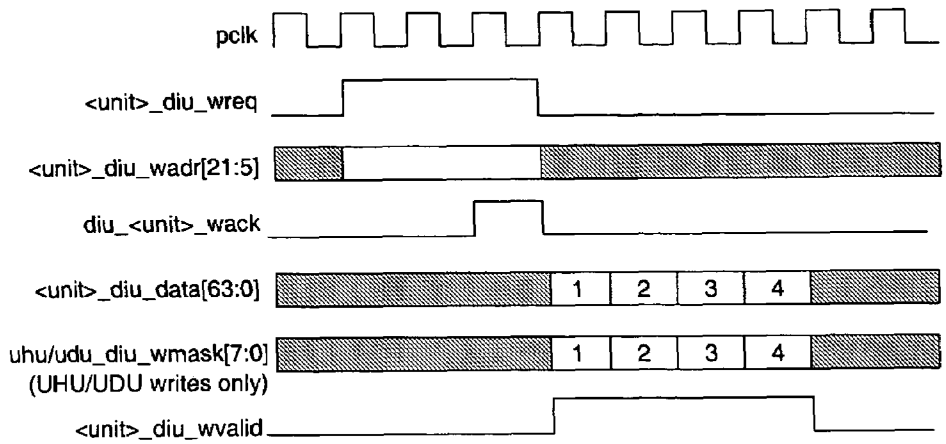

Note that for UHU and UDU writes, each 64-bit quarter-word has an 8-bit byte enable mask associated with it. A different mask is used with each quarter-word. The 4 mask values are transferred along with their associated data, as shown in FIG. 105.

If four consecutive <unit>_diu_wvalid pulses are not provided by the requester immediately following the diu_<unit>_wack, then the arbitration logic will disregard the write and re-allocate the slot under the unused read round-robin scheme.

Once all the write data has been output then if there is a further request <unit>_diu_wreq should be asserted again.

22.9.4 CPU Write Protocol

The CPU performs single 128-bit writes to the DIU on a dedicated write bus, cpu_diu_wdata[127:0]. There is an accompanying write mask, cpu_diu_wmask[15:0], consisting of 16 byte enables and the CPU also supplies a 128-bit aligned write address on cpu_diu_wadr[21:4]. Note that writes are posted by the CPU to the DIU and stored in a 1-deep buffer. When the DAU subsequently arbitrates in favour of the CPU, the contents of the buffer are written to DRAM.

The CPU write protocol, illustrated in FIG. 106., is as follows:—

The DIU signals to the CPU via diu_cpu_write_rdy that its write buffer is empty and that the CPU may post a write whenever it wishes.

The CPU asserts cpu_diu_wdatavalid to enable a write into the buffer and to confirm the validity of the write address, data and mask.

The DIU de-asserts diu_cpu_write_rdy in the following cycle. If the CPU address is in range (i.e. does not exceed the maximum legal DRAM address) then the rdy signal is held low to indicate that the write buffer is full and that the posted write is pending execution. However, for out-of-range CPU addresses, diu_cpu_write_rdy stays low just for one cycle and nothing is loaded into the write buffer.

Note that the check for a legal address for a CPU write is carried out at the time of posting, i.e. while cpu_diu_datavalid is high. If the address is valid, then the buffer is loaded and the write will be executed, regardless of any subsequent reconfiguration of the disableUpperDRAMMacro register.

When the CPU is awarded a DRAM access by the DAU, the buffer's contents are written to memory. The DIU re-asserts diu_cpu_write_rdy once the write data has been captured by DRAM, namely in the "MSN 1" DCU state.

The CPU can then, if it wishes, asynchronously use the new value of diu_cpu_write_rdy to enable a new posted write in the same "MSN1" cycle.

22.90.5 CDU Write Protocol

The CDU performs four 64-bit word writes to 4 contiguous 256-bit DRAM addresses with the first address specified by cdu_diu_wadr[21:3]. The write address cdu_diu_wadr[21:5] is 256-bit aligned with bits cdu_diu_wadr[4:3] allowing the 64-bit word to be selected.

The write protocol is:

cdu_diu_wdata is asserted along with a valid cdu_diu_wadr[21:3].

The DIU acknowledges the request with diu_cdu_wack The request should be deasserted. The minimum number of cycles between cdu_diu_wreq being asserted and the DIU generating an diu_cdu_wack strobe is 2 cycles (1 cycle to register the request, 1 cycle to perform the arbitration—see Section 22.14.10).

In the four clock cycles following diu_cdu_wack the CDU outputs the cdu_diu_data[63:0], together with asserted cdu_diu_wvalid. The first cdu_diu_wvalid pulse must occur the clock cycle after diu_cdu_wack. cdu_diu_wvalid remains asserted for the following 3 clock cycles. This allows for reading from an SRAM where new data is available in the clock cycle after the address has changed e.g. the address for the second 64-bits of write data is available the cycle after diu_cdu_wack meaning the second 64-bits of write data is a further cycle later. Data is transferred over the 4-cycle window in an order, such that each successive 64 bits will be written to a monotonically increasing (by 1 location) 256-bit DRAM word.

If four consecutive cdu_diu_wvalid pulses are not provided with the data immediately following the write acknowledgment, then the arbitration logic will disregard the write and re-allocate the slot under the unused read round-robin scheme.

Once all the write data has been output then if there is a further request cdu_diu_wreq should be asserted again.

22.10 DIU Arbitration Mechanism

The DIU will arbitrate access to the embedded DRAM. The arbitration scheme is outlined in the next sections.

22.10.1 Timeslot Based Arbitration Scheme

Table 106 summarised the bandwidth requirements of the SoPEC requesters to DRAM. If the DIU requesters are allocated in terms of peak bandwidth then 35.25 bits/cycle (at SF=6) and 40.75 bits/cycle (at SF=4) are reuired for all the requesters except the CPU.

A timeslot scheme is defined with 64 main timeslots. The number of used main timeslots is programmable between 1 and 64.

Since DRAM read requestors, except for the CPU, are connected to the DIU via a 64-bit data bus each 256-bit DRAM access requires 4 pclk cycles to transfer the read data over the shared read bus. The timeslot rotation period for 64 timeslots each of 4 pclk cycles is 256 pclk cycles. Each timeslot represents a 256-bit access every 256 pclk cycles or 1 bit/cycle. This is the granularity of the majority of DIU requesters bandwidth requirements in Table 106.

The SoPEC DIU requesters can be represented using 4 bits (Table 129 on page 378). Using 64 timeslots means that to allocate each timeslot to a requester, a total of 64×5-bit configuration registers are required for the 64 main timeslots.

Timeslot based arbitration works by having a pointer point to the current timeslot. When re-arbitration is signaled the arbitration winner is the current timeslot and the pointer advances to the next timeslot. Each timeslot denotes a single access. The duration of the timeslot depends on the access.

Note that advancement through the timeslot rotation is dependent on an enable bit, RotationSync, being set. The consequences of clearing and setting this bit are described in section 22.14.12.2.1 on page 408.

If the SoPEC Unit assigned to the current timeslot is not requesting then the unused timeslot arbitration mechanism outlined in Section 22.10.6 is used to select the arbitration winner.

Note that there is always an arbitration winner for every slot. This is because the unused read re-allocation scheme includes refresh in its round-robin protocol. If all other blocks are not requesting, an early refresh will act as fall-back for the slot.

22.10.2 Separate Read and Write Arbitration Windows

For write accesses, except the CPU, 256-bits of write data are transferred from the SoPEC DIU write requesters over 64-bit write busses in 4 clock cycles. This write data transfer latency means that writes accesses, except for CPU writes and also the CDU, must be arbitrated 4 cycles in advance. (The CDU is an exception because CDU writes can start once the first 64-bits of write data have been transferred since each 64-bits is associated with a write to a different 256-bit word).

Figure 109:
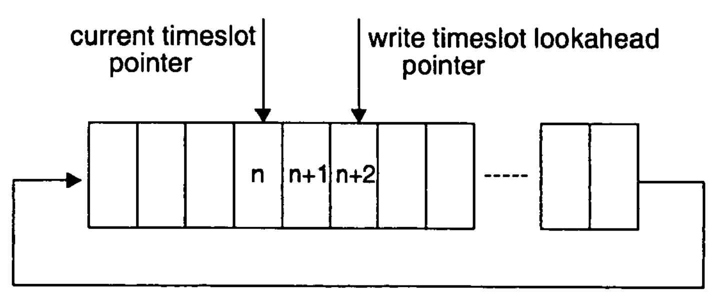

Since write arbitration must occur 4 cycles in advance, and the minimum duration of a timeslot is 3 cycles, the arbitration rules must be modified to initiate write accesses in advance. Accordingly, there is a write timeslot lookahead pointer shown in FIG. 109 two timeslots in advance of the current timeslot pointer.

The following examples illustrate separate read and write timeslot arbitration with no adjacent write timeslots. (Recall rule on adjacent write timeslots introduced in Section 22.7.2.3 on page 333.)

Figure 110:
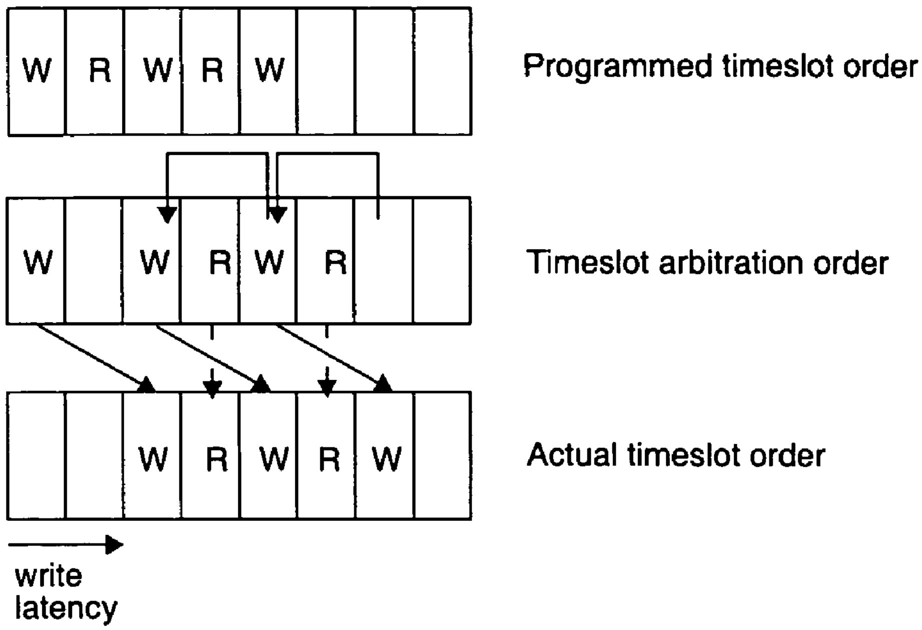

In FIG. 110 writes are arbitrated two timeslots in advance. Reads are arbitrated in the same timeslot as they are issued. Writes can be arbitrated in the same timeslot as a read. During arbitration the command address of the arbitrated SoPEC Unit is captured.

Figure 111:
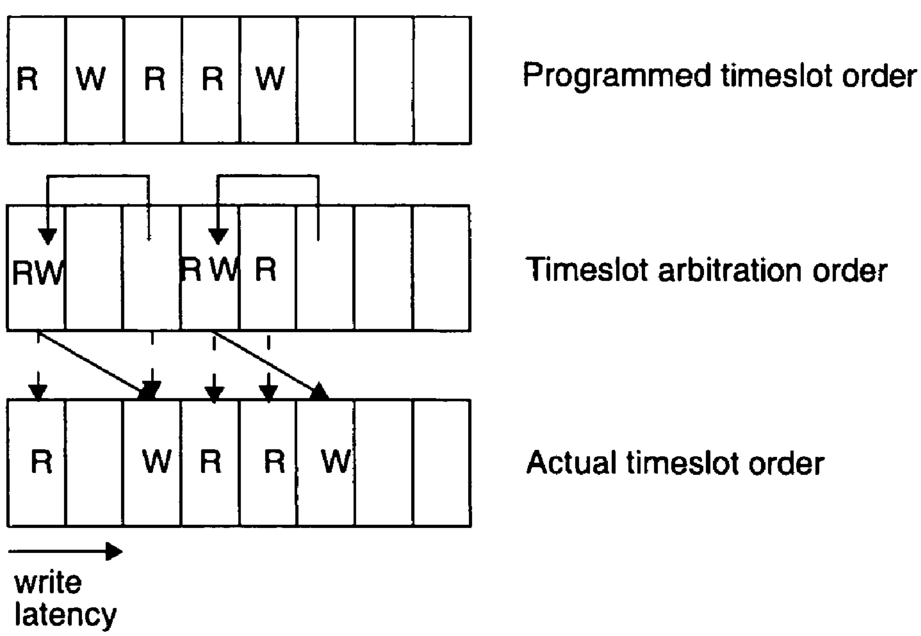
Figure 112:
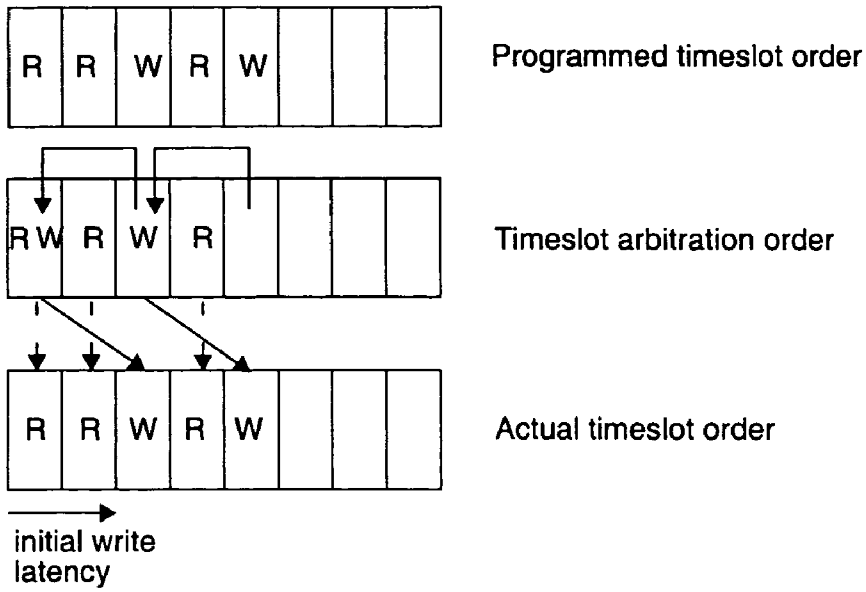
Figure 113:
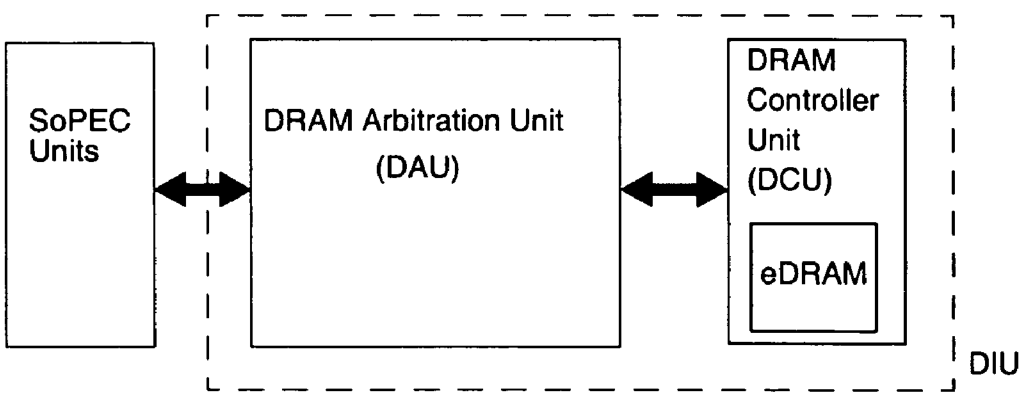

Other examples are shown in FIG. 111 and FIG. 112. The actual timeslot order is always the same as the programmed timeslot order i.e. out of order accesses do not occur and data coherency is never an issue.

Each write must always incur a latency of two timeslots.

Startup latency may vary depending on the position of the first write timeslot. This startup latency is not important.

Table 109 shows the 4 scenarios depending on whether the current timeslot and write timeslot lookahead pointers point to read or write accesses.

TABLE 109

Arbitration with separate windows for read and write accesses

| current timeslot pointer | write timeslot lookahead pointer | actions |
|---|---|---|
| read | write | Initiate DRAM read, Initiate write arbitration |
| read1 | read2 | Initiate DRAM read1. |
| write1 | write2 | Initiate write2 arbitration. Execute DRAM write1. |
| write | read | Execute DRAM write. |

If the current timeslot pointer points to a read access then this will be initiated immediately.

If the write timeslot lookahead pointer points to a write access then this access is arbitrated immediately, or immediately after the read access associated with the current timeslot pointer is initiated.

When a write access is arbitrated the DIU will capture the write address. When the current timeslot pointer advances to the write timeslot then the actual DRAM access will be initiated. Writes will therefore be arbitrated 2 timeslots in advance of the DRAM write occurring.

At initialisation, the write lookahead pointer points to the first timeslot. The current timeslot pointer is invalid until the write lookahead pointer advances to the third timeslot when the current timeslot pointer will point to the first timeslot. Then both pointers advance in tandem.

CPU write accesses are excepted from the lookahead mechanism.

If the selected SoPEC Unit is not requesting then there will be separate read and write selection for unused timeslots. This is described in Section 22.10.6.

22.10.3 Arbitration of CPU Accesses

What distinguishes the CPU from other SoPEC requesters, is that the CPU requires minimum latency DRAM access i.e. preferably the CPU should get the next available timeslot whenever it requests.

The minimum CPU read access latency is estimated in Table 110. This is the time between the CPU making a request to the DIU and receiving the read data back from the DIU.

TABLE 110

Estimated CPU read access latency ignoring caching

| CPU read access latency | Duration |
|---|---|
| Register the read data in CPU | 1 cycle |
| CPU MMU logic issues request and DIU arbitration completes | 1 cycle |
| Transfer the read address to the DRAM | 1 cycle |
| DRAM read latency | 1 cycle |
| DRAM read latency | 1 cycle |
| CPU internally completes transaction | 1 cycle |
| CPU MMU logic issues request and DIU arbitration completes | 1 cycle |
| TOTAL gap between requests | 5 cycles |

If the CPU, as is likely, requests DRAM access again immediately after receiving data from the DIU then the CPU could access every second timeslot if the access latency is 6 cycles. This assumes that interleaving is employed so that timeslots last 3 cycles. If the CPU access latency were 7 cycles, then the CPU would only be able to access every third timeslot.

If a cache hit occurs the CPU does not require DRAM access. For its next DIU access it will have to wait for its next assigned DIU slot. Cache hits therefore will reduce the number of DRAM accesses but not speed up any of those accesses.

To avoid the CPU having to wait for its next timeslot it is desirable to have a mechanism for ensuring that the CPU always gets the next available timeslot without incurring any latency on the non-CPU timeslots.

This can be done by defining each timeslot as consisting of a CPU access preceding a non-CPU access. Each timeslot will last 6 cycles i.e. a CPU access of 3 cycles and a non-CPU access of 3 cycles. This is exactly the interleaving behaviour outlined in Section 22.7.2.2. If the CPU does not require an access, the timeslot will take 3 or 4 and the timeslot rotation will go faster. A summary is given in Table 111.

TABLE 111

Timeslot access times.

| Access | Duration | Explanation |
|---|---|---|
| CPU access + non-CPU access | 3 + 3 = 6 cycles | Interleaved access |
| non-CPU access | 4 cycles | Access and preceding access both to shared read bus |
| non-CPU access | 3 cycles | Access and preceding access not both to shared read bus |
| CDU write access | 3 + 2 + 2 + 2 = 9 cycles | Page mode select signal is clocked at 192 MHz |

CDU write accesses require 9 cycles. CDU write accesses preceded by a CPU access require 12 cycles. CDU timeslots therefore take longer than all other DIU requesters timeslots.

With a 256 cycle rotation there can be 42 accesses of 6 cycles.

For low scale factor applications, it is desirable to have more timeslots available in the same 256 cycle rotation. So two counters of 4-bits each are defined allowing the CPU to get a maximum of (CPUPreAccessTimeslots+1) pre-accesses for every (CPUTotalTimeslots+1) main slots. A timeslot counter starts at CPUTotalTimeslots and decrements every timeslot, while another counter starts at CPUPreAccessTimeslots and decrements every timeslot in which the CPU uses its access. When the CPU pre-access counter goes to zero before CPUTotalTimeslots, no further CPU accesses are allowed. When the CPUTotalTimeslots counter reaches zero both counters are reset to their respective initial values.

The CPU is not included in the list of SoPEC DIU requesters, Table 130, for the main timeslot allocations. The CPU cannot therefore be allocated main timeslots. It relies on pre-accesses in advance of such slots as the sole method for DRAM transfers.

CPU access to DRAM can never be fully disabled, since to do so would render SoPEC inoperable. Therefore the CPUPreAccessTimeslots and CPUTotalTimeslots register values are interpreted as follows: In each succeeding window of (CPUTotalTimeslots+1) slots, the maximum quota of CPU pre-accesses allowed is (CPUPreAccessTimeslots+1). The "+1" implementations mean that the CPU quota cannot be made zero.

The various modes of operation are summarised in Table 112 with a nominal rotation period of 256 cycles.

TABLE 112

CPU timeslot allocation modes with nominal rotation period of 256 cycles

| Access Type | Nominal Timeslot Duration | Number of timeslots | Notes |
|---|---|---|---|
| CPU Pre-access i.e. CPUPreAccessTimeslots = | 6 cycles | 42 timeslots | Each access is CPU + non-CPU. If CPU does not use a timeslot then rotation is faster. |

TABLE 112-continued

| CPU timeslot allocation modes with nominal rotation period of 256 cycles | | | |
|---|---|---|---|
| Access Type | Nominal Timeslot Duration | Number of timeslots | Notes |
| CPUTotalTimeslots Fractional CPU Pre-access i.e. CPUPreAccessTimeslots < CPUTotalTimeslots | 4 or 6 cycles | 42–64 timeslots | Each CPU + non-CPU access requires a 6 cycle timeslot. Individual non-CPU timeslots take 4 cycles if current access and preceding access are both to shared read bus. Individual non-CPU timeslots take 3 cycles if current access and preceding access are not both to shared read bus. |

22.10.4 CDU Accesses

As indicated in Section 22.10.3, CDU write accesses require 9 cycles. CDU write accesses preceded by a CPU access require 12 cycles. CDU timeslots therefore take longer than all other DIU requesters timeslots. This means that when a write timeslot is unused it cannot be re-allocated to a CDU write as CDU accesses take 9 cycles. The write accesses which the CDU write could otherwise replace require only 3 or 4 cycles.

Unused CDU write accesses can be replaced by any other write access according to 22.10.6.1 Unused write timeslots allocation on page 348.

22.10.5 Refresh Controller

Refresh is not included in the list of SoPEC DIU requesters, Table 130, for the main timeslot allocations. Timeslots cannot therefore be allocated to refresh.

The DRAM must be refreshed every 3.2 ms. Refresh occurs row at a time over 5120 rows of 2 parallel 10 Mbit instances. A refresh operation must therefore occur every 120 cycles. The refresh_period register has a default value of 118. Each refresh takes 3 cycles. Setting refresh_period to 118 means a refresh occurs every 119 cycles. This allows any delays on issuing the refresh for a particular row due e.g. to CDUW, CPU preaccess to be caught up.]

A refresh counter will count down the number of cycles between each refresh. When the down-counter reaches 0, the refresh controller will issue a refresh request and the down-counter is reloaded with the value in refresh_period and the count-down resumes immediately. Allocation of main slots must take into account that a refresh is required at least once every 120 cycles.

Refresh is included in the unused read and write timeslot allocation. If unused timeslot allocation results in refresh occurring early by N cycles, then the refresh counter will have counted down to N. In this case, the refresh counter is reset to refresh_period and the count-down recommences.

Refresh can be preceded by a CPU access in the same way as any other access. This is controlled by the CPUPreAccessTimeslots and CPUTotalTimeslots configuration registers. Refresh will therefore not affect CPU performance. A sequence of accesses including refresh might therefore be CPU, refresh, CPU, actual timeslot.

22.10.6 Allocating Unused Timeslots

Unused slots are re-allocated separately depending on whether the unused access was a read access or a write access. This is best-effort traffic. Only unused non-CPU accesses are re-allocated.

22.10.6.1 Unused Write Timeslots Allocation

Unused write timeslots are re-allocated according to a fixed priority order shown in Table 113.

TABLE 113

| Unused write timeslot priority order | |
|---|---|
| Name | Priority Order |
| UHU(W) | 1 |
| UDU(W) | 2 |
| SFU(W) | 3 |
| DWU | 4 |
| MMI(W) | 5 |
| Unused read timeslot allocation | 6 |

CDU write accesses cannot be included in the unused timeslot allocation for write as CDU accesses take 9 cycles. The write accesses which the CDU write could otherwise replace require only 3 or 4 cycles.

Unused write timeslot allocation occurs two timeslots in advance as noted in Section 22.10.2. If the units at priorities 1-5 are not requesting then the timeslot is re-allocated according to the unused read timeslot allocation scheme described in Section 22.10.6.2. However, the unused read timeslot allocation will occur when the current timeslot pointer of FIG. 109 reaches the timeslot i.e. it will not occur in advance.

22.10.6.2 Unused Read Timeslots Allocation

Unused read timeslots are re-allocated according to a two level round-robin scheme. The SoPEC Units included in read timeslot re-allocation is shown in Table 131

TABLE 114

| Unused read timeslot allocation Name |
|---|
| UHU(R) |
| UDU(R) |
| CDU(R) |
| CFU |
| LBD |
| SFU(R) |
| TE(TD) |
| TE(TFS) |
| HCU |
| DNC |
| LLU |
| PCU |
| MMI |
| CPU/Refresh |

Each SoPEC requester has an associated bit, ReadRoundRobinLevel, which indicates whether it is in level 1 or level 2 round-robin.

TABLE 115

| Read round-robin level selection | |
|---|---|
| Level | Action |
| ReadRoundRobinLevel = 0 | Level 1 |
| ReadRoundRobinLevel = 1 | Level 2 |

A pointer points to the most recent winner on each of the round-robin levels. Re-allocation is carried out by traversing level 1 requesters, starting with the one immediately succeeding the last level 1 winner. If a requesting unit is found, then it wins arbitration and the level 1 pointer is shifted to its position. If no level 1 unit wants the slot, then level 2 is similarly examined and its pointer adjusted.

Since refresh occupies a (shared) position on one of the two levels and continually requests access, there will always be some round-robin winner for any unused slot.

22.10.5.2.1 Shared CPU/Refresh Round-Robin Position

Note that the CPU can conditionally be allowed to take part in the unused read round-robin scheme. Its participation is controlled via the configuration bit EnableCPURoundRobin. When this bit is set, the CPU and refresh share a joint position in the round-robin order, shown in Table 114. When cleared, the position is occupied by refresh alone.

If the shared position is next in line to be awarded an unused non-CPU read/write slot, then the CPU will have first option on the slot. Only if the CPU doesn't want the access, will it be granted to refresh. If the CPU is excluded from the round robin, then any awards to the position benefit refresh.

22.11 Guidelines for Programming the DIU

Some guidelines for programming the DIU arbitration scheme are given in this section together with an example.

22.11.1 Circuit Latency

Circuit latency is a fixed service delay which is incurred, as and from the acceptance by the DIU arbitration logic of a block's pending read/write request. It is due to the processing time of the request, readying the data, plus the DRAM access time. Latencies differ for read and write requests. See Tables 79 and 80 for respective breakdowns.

If a requesting block is currently stalled, then the longest time it will have to wait between issuing a new request for data and actually receiving it would be its timeslot period, plus the circuit latency overhead, along with any intervening non-standard slot durations, such as refresh and CDU(W). In any case, a stalled block will always incur this latency as an additional overhead, when coming out of a stall.

In the case where a block starts up or unstalls, it will start processing newly-received data at a time beyond its serviced timeslot equivalent to the circuit latency. If the block's timeslots are evenly spaced apart in time to match its processing rate, (in the hope of minimizing stalls,) then the earliest that the block could restall, if not re-serviced by the DIU, would be the same latency delay beyond its next timeslot occurrence. Put another way, the latency incurred at start-up pushes the potential DIU-induced stall point out by the same fixed delta beyond each successive timeslot allocated to the block. This assumes that a block re-requests access well in advance of its upcoming timeslots. Thus, for a given stall-free run of operation, the circuit latency overhead is only incurred initially when unstalling.

While a block can be stalled as a result of how quickly the DIU services its DRAM requests, it is also prone to stalls caused by its upstream or downstream neighbours being able to supply or consume data which is transferred between the blocks directly, (as opposed to via the DIU). Such neighbour-induced stalls, often occurring at events like end of line, will have the effect that a block's DIU read buffer will tend to fill, as the block stops processing read data. Its DIU write buffer will also tend to fill, unable to despatch to DRAM until the downstream block frees up shared-access DRAM locations. This scenario is beneficial, in that when a block unstalls as a result of its neighbour releasing it, then that block's read/write DIU buffers will have a fill state less likely to stall it a second time, as a result of DIU service delays.

A block's slots should be scheduled with a service guarantee in mind. This is dictated by the block's processing rate and hence, required access to the DRAM. The rate is expressed in terms of bits per cycle across a processing window, which is typically (though not always) 256 cycles. Slots should be evenly interspersed in this window (or "rotation") so that the DIU can fulfill the block's service needs.

The following ground rules apply in calculating the distribution of slots for a given non-CPU block:—

- The block can, at maximum, suffer a stall once in the rotation, (i.e. unstall and restall) and hence incur the circuit latency described above.

This rule is, by definition, always fulfilled by those blocks which have a service requirement of only 1 bit/cycle (equivalent to 1 slot/rotation) or fewer. It can be shown that the rule is also satisfied by those blocks requiring more than 1 bit/cycle. See Section 22.12.4 Slot Distributions and Stall Calculations for Individual Blocks, on page 360.

- Within the rotation, enough slots must be subtracted to allow for scheduled refreshes. (See Section 22.11.2 Refresh latencies).
- In programming the rotation, account must be taken of the fact that any CDU(W) accesses will consume an extra 6 cycles/access, over and above the norm, in CPU pre-access mode, or 5 cycles/access without pre-access.

The total delay overhead due to latency, refreshes and CDU(W) can be factored into the service guarantee for all blocks in the rotation by deleting once, (i.e. reducing the rotation window,) that number of slots which equates to the cumulative duration of these various anomalies.

The use of lower scale factors will imply a more frequent demand for slots by non-CPU blocks. The percentage of slots in the overall rotation which can therefore be designated as CPU pre-access ones should be calculated last, based on what can be accommodated in the light of the non-CPU slot need.

Read latency is summarised below in Table 116.

TABLE 116

Read latency

| Non-CPU read access latency | Duration |
|---|---|
| non-CPU read requester internally generates DIU request | 1 cycle |
| register the non-CPU read request | 1 cycle |
| complete the arbitration of the request | 1 cycle |
| transfer the read address to the DRAM | 1 cycle |
| DRAM read latency | 1 cycle |
| register the DRAM read data in DIU | 1 cycle |
| register the 1st 64-bits of read data in requester | 1 cycle |
| register the 2nd 64-bits of read data in requester | 1 cycle |
| register the 3rd 64-bits of read data in requester | 1 cycle |
| register the 4th 64-bits of read data in requester | 1 cycle |
| TOTAL | 10 cycles |

Write latency is summarised in Table 117.

TABLE 117

Write latency

| Non-CPU write access latency | Duration |
|---|---|
| non-CPU write requester internally generates DIU request | 1 cycle |
| register the non-CPU write request | 1 cycle |
| complete the arbitration of the request | 1 cycle |
| transfer the acknowledge to the write requester | 1 cycle |
| transfer the 1st 64 bits of write data to the DIU | 1 cycle |
| transfer the 2nd 64 bits of write data to the DIU | 1 cycle |
| transfer the 3rd 64 bits of write data to the DIU | 1 cycle |
| transfer the 4th 64 bits of write data to the DIU | 1 cycle |
| Write to DRAM with locally registered write data | 1 cycle |
| TOTAL | 9 cycles |

Timeslots removed to allow for read latency will also cover write latency, since the former is the larger of the two.

22.11.2 Refresh Latencies

The number of allocated timeslots for each requester needs to take into account that a refresh must occur every 120 cycles. This can be achieved by deleting timeslots from the rotation since the number of timeslots is made programmable.

This approach takes account of the refresh latencies of blocks which have a service requirement of only 1 bit/cycle (equivalent to 1 slot/rotation) or fewer. It can be shown that the rule is also satisfied by those blocks requiring more than 1 bit/cycle. See Section 22.12.4 Slot Distributions and Stall Calculations for Individual Blocks, on page 360.

Refresh is preceded by a CPU access in the same way as any other access. This is controlled by the CPUPreAccessTimeslots and CPUTotalTimeslots configuration registers. Refresh will therefore not affect CPU performance.

As an example, in CPU pre-access mode each timeslot will last 6 cycles. If the timeslot rotation has 50 timeslots then the rotation will last 300 cycles. The refresh controller will trigger a refresh every 100 cycles. Up to 47 timeslots can be allocated to the rotation ignoring refresh. Three timeslots deleted from the 50 timeslot rotation will allow for the latency of a refresh every 100 cycles.

22.11.3 Ensuring Sufficient DNC and PCU Access

PCU command reads from DRAM are exceptional events and should complete in as short a time as possible. Similarly, sufficient free bandwidth should be provided to account for DNC accesses e.g. when clusters of dead nozzles occur. In Table 106 DNC is allocated 3 times average bandwidth. PCU and DNC can also be allocated to the level 1 round-robin allocation for unused timeslots so that unused timeslot bandwidth is preferentially available to them.

22.11.4 Basing Timeslot Allocation on Peak Bandwidths

Since the embedded DRAM provides sufficient bandwidth to use 1:1 compression rates for the CDU and LBD, it is possible to simplify the main timeslot allocation by basing the allocation on peak bandwidths. As combined bi-level and tag bandwidth, including the SFU, at 1:1 scaling is only 5 bits/cycle, usually only the contone scale factor will be considered as the variable in determining timeslot allocations.

If slot allocation is based on peak bandwidth requirements then DRAM access will be guaranteed to all SoPEC requesters. If slots are not allocated for peak bandwidth requirements then we can also allow for the peaks deterministically by adding some cycles to the print line time.

22.11.5 Adjacent Timeslot Restrictions 22.11.5.1 Non-CPU Write Adjacent Timeslot Restrictions Non-CPU write requestors should not be assigned adjacent timeslots as described in Section 22.7.2.3. This is because adjacent timeslots assigned to non-CPU requestors would require two sets of 256-bit write buffers and multiplexors to connect two write requestors simultaneously to the DIU. Only one 256-bit write buffer and multiplexor is implemented. Recall from section 22.7.2.3 on page 333 that if adjacent non-CPU writes are attempted, that the second write of any such pair will be disregarded and re-allocated under the unused read scheme.

22.11.5.2 Same DIU Requestor Adjacent Timeslot Restrictions

All DIU requesters have state-machines which request and transfer the read or write data before requesting again. From FIG. 103 read requests have a minimum separation of 9 cycles. From FIG. 105 write requests have a minimum separation of 7 cycles. Therefore adjacent timeslots should not be assigned to a particular DIU requester because the requester will not be able to make use of all these slots.

In the case that a CPU access precedes a non-CPU access timeslots last 6 cycles so write and read requesters can only make use of every second timeslot. In the case that timeslots are not preceded by CPU accesses timeslots last 4 cycles so the same write requester can use every second timeslot but the same read requestor can use only every third timeslot. Some DIU requestors may introduce additional pipeline delays before they can request again. Therefore timeslots should be separated by more than the minimum to allow a margin.

22.11.6 Line Margin

The SFU must output 1 bit/cycle to the HCU. Since HCUNumDots may not be a multiple of 256 bits the last 256-bit DRAM word on the line can contain extra zeros. In this case, the SFU may not be able to provide 1 bit/cycle to the HCU. This could lead to a stall by the SFU. This stall could then propagate if the margins being used by the HCU are not sufficient to hide it. The maximum stall can be estimated by the calculation: DRAM service period−X scale factor*dots used from last DRAM read for HCU line.

Similarly, if the line length is not a multiple of 256-bits then e.g. the LLU could read data from DRAM which contains padded zeros. This could lead to a stall. This stall could then propagate if the page margins cannot hide it.

A single addition of 256 cycles to the line time will suffice for all DIU requesters to mask these stalls.

Example Outline DIU Programming 22.12.1 Full Speed USB Device, No MMI or UHU Connections

TABLE 118

Timeslot allocation based on peak bandwidth with full-speed USB device, no MMI or UHU connections and LLU SegSpan = 640, SegSpanStart = 0

| Block Name | Direction | Peak Bandwidth which must be supplied (bits/cycle) | MainTimeslots allocated |
|---|---|---|---|
| UDU | R | 0.0625 | 1 |
| | W | 0.0625 | 1 |
| CDU | R | 1.8 (SF = 6), 4 (SF = 4) | 2 (SF = 6) 4 (SF = 4) |
| | W | 1.8 (SF = 6), 4 (SF = 4) | 2 (SF = 6) 4 (SF = 4) |
| CFU | R | 5.4 (SF = 6), 8 (SF = 4) | 6 (SF = 6) 8 (SF = 4) |
| LBD | R | 1 | 1 |
| SFU | R | 2 | 2 |
| | W | 1 | 1 |
| TE(TD) | R | 1.02 | 1 |
| TE(TFS) | R | 0.093 | 0 |
| HCU | R | 0.074 | 0 |
| DNC | R | 2.4 | 3 |
| DWU | W | 6 | 6 |
| LLU | R | 8.57 | 9 |
| PCU | R | 1 | 1 |
| UHU | R | 0 | 0 |
| | W | 0 | 0 |
| MMI | R | 0 | 0 |
| | W | 0 | 0 |
| TOTAL | | | 36 (SF = 6) 42 (SF = 4) |

22.12.1

Table 118 shows an allocation of main timeslots based on the peak bandwidths of Table 106.

The bandwidth required for each unit is calculated allowing extra cycles for read and write circuit latency for each access requiring a bandwidth of more than 1 bit/cycle. Fractional bandwidth is supplied via unused read slots.

The timeslot rotation is 256 cycles. Timeslots are deleted from the rotation to allow for circuit latencies for accesses of up to 1 bit per cycle i.e. 1 timeslot per rotation.

EXAMPLE 1

Contone Scale-Factor=6, Bi-Level Scale Factor=1, USB Device Full-Speed, No MMI or UHU Connections, LLU SegSpan=640, SegSpanStart=0

Program the MainTimeslot configuration register (Table 129) for peak required bandwidths of SoPEC Units according to the scale factor.

Program the read round-robin allocation to share unused read slots. Allocate PCU, DNC, HCU and TFS to level 1 read round-robin.

Assume scale-factor of 6 and peak bandwidths from Table 118.

Assign all DIU requesters except TE(TFS) and HCU to multiples of 1 timeslot, as indicated in Table 118, where each timeslot is 1 bit/cycle. This requires 36 timeslots.

No timeslots are explicitly allocated for the fractional bandwidth requirements of TE(TFS) and HCU accesses. Instead, these units are serviced via unused read slots.

Therefore, 36 scheduled slots are used in the rotation for main timeslots, some or all of which may be able to have a CPU pre-access, provided they fit in the rotation window.

Each of the 2 CDU(W) accesses requires 9 cycles. Per access, this implies an overhead of 6 cycles. Over the rotation the 2 CDU(W) accesses have an overhead of 12 cycles.

Assuming all blocks require a service guarantee of no more than a single stall across 256 bits, allow 10 cycles for read latency once in the rotation.

There can be 3 refreshes over the rotation. If each of these refreshes has a pre-access then 3×6=18 cycles must be allowed in the rotation.

A total of 12+10+18=40 cycles have to be subtracted from the rotation period to allow for CDUW/startup/refresh latency.

Assume a 256 cycle timeslot rotation.

CDU(W), read latency and refresh reduce the number of available cycles in a rotation to: 256−40=216 cycles.

As a result, 216 cycles available for 36 accesses implies each access can take 216/36=6 cycles maximum. So, all accesses can have a pre-access.

Therefore the CPU achieves a pre-access ratio of 36/36=100% of the programmed slots in the rotation. Any refreshes in the rotation can also have pre-accesses. The rotation is speeded up by 10 cycles to allow for any startup latencies. The rotation is speeded up by 6 cycles to allow for the extra 6 cycle latency for each of 2 CDUW accesses.CDU(W), read latency and refresh reduce the number of available cycles in a rotation to: 256−40=216 cycles.

EXAMPLE 2

Contone Scale-Factor=4, Bi-Level Scale Factor=1, USB Device Full-Speed, No MMI or UHU Connections, LLU SegSpan=640, SegSpanStart=0

Program the MainTimeslot configuration register (Table 129) for peak required bandwidths of SoPEC Units according to the scale factor. Program the read round-robin allocation to share unused read slots. Allocate PCU, DNC, HCU and TFS to level 1 read round-robin.

Assume scale-factor of 4 and peak bandwidths from Table 118.

Assign all DIU requestors except TE(TFS) and HCU multiples of 1 timeslot, as indicated in Table 118, where each timeslot is 1 bit/cycle. This requires 42 timeslots.

No timeslots are explicitly allocated for the fractional bandwidth requirements of TE(TFS) and HCU accesses. Instead, these units are serviced via unused read slots.

Therefore, 42 scheduled slots are used in the rotation for main timeslots, some or all of which can have a CPU pre-access, provided they fit in the rotation window.

Each of the 4 CDU(W) accesses requires 9 cycles. Per access, this implies an overhead of 6 cycles. Over the rotation the 4 CDU(W) accesses have an overhead of 24 cycles.

Assuming all blocks require a service guarantee of no more than a single stall across 256 bits, allow 10 cycles for read latency once in the rotation.

There can be 3 refreshes over the rotation. If each of these refreshes has a pre-access then 3×6=18 cycles must be allowed in the rotation.

A total of 24+10+18=52 cycles have to be subtracted from the rotation period to allow for CDUW/startup/refresh latency.

Assume a 256 cycle timeslot rotation.

CDU(W), read latency and refresh reduce the number of available cycles in a rotation to: 256−52=204 cycles.

As a result, between 204 are available for 42 accesses, which implies each access can take 204/42=4.85 cycles.

Work out how many slots can have a pre-access: For the available 204 cycles, this implies (42−n)*6+n*4<=204, where n=number of slots with no pre-access cycle. Solving the equation gives n>=24.

So 18 slots out of the 42 programmed slots in the rotation can have CPU pre-accesses.

Therefore the CPU achieves a pre-access ratio of 18/42=42.8% of the programmed slots in the rotation. Any refreshes in the rotation can also have pre-accesses. The rotation is speeded up by 10 cycles to allow for any startup latencies. The rotation is speeded up by 6 cycles to allow for the extra 6 cycle latency for each of 4 CDUW accesses.

22.12.2 High Speed USB Host

TABLE 119

Timeslot allocation based on peak bandwidth with high-speed USB host, no MMI or USB device connections and LLU SegSpan = 320, SegSpanStart = 64, 5:1 contone compression

| Block Name | Direction | Peak Bandwidth which must be supplied (bits/cycle) | MainTimeslots allocated |
|---|---|---|---|
| UDU | R | 0 | 0 |
| | W | 0 | 0 |
| CDU | R | 1.8/5 (SF = 6), 4/5 (SF = 4) | 1 (SF = 6) 1 (SF = 4) |
| | W | 1.8 (SF = 6), 4 (SF = 4) | 2 (SF = 6) 4 (SF = 4) |
| CFU | R | 5.4 (SF = 6), 8 (SF = 4) | 6 (SF = 6) 8 (SF = 4) |
| LBD | R | 1 | 1 |
| SFU | R | 2 | 2 |
| | W | 1 | 1 |
| TE(TD) | R | 1.02 | 1 |
| TE(TFS) | R | 0.093 | 0 |

TABLE 119-continued

Timeslot allocation based on peak bandwidth with high-speed USB host, no MMI or USB device connections and LLU SegSpan = 320, SegSpanStart = 64, 5:1 contone compression

| Block Name | Direction | Peak Bandwidth which must be supplied (bits/cycle) | MainTimeslots allocated |
|---|---|---|---|
| HCU | R | 0.074 | 0 |
| DNC | R | 2.4 | 3 |
| DWU | W | 6 | 6 |
| LLU | R | 12.86 (average) | 13 |
| PCU | R | 1 | 1 |
| UHU | R | 480 Mbit/s | 3 |
| | W | 480 Mbit/s | 3 |
| MMI | R | 0 | 0 |
| | W | 0 | 0 |
| TOTAL | | | 43 (SF = 6) 47 (SF = 4) |

22.12.2

EXAMPLE 3

Contone Scale-Factor=6, Bi-Level Scale Factor=1, USB Host High-Speed, No MMI or USB Device Connections, LLU SegSpan=320, SegSpanStart=64

Program the MainTimeslot configuration register (Table 129) for peak required bandwidths of SoPEC Units according to the scale factor. Program the read round-robin allocation to share unused read slots. Allocate PCU, DNC, HCU and TFS to level 1 read round-robin.

Assume scale-factor of 6 and peak bandwidths from Table 119.

Assign all DIU requestors except TE(TFS) and HCU multiples of 1 timeslot, as indicated in Table 119, where each timeslot is 1 bit/cycle. This requires 43 timeslots.

No timeslots are explicitly allocated for the fractional bandwidth requirements of TE(TFS) and HCU accesses. Instead, these units are serviced via unused read slots.

Therefore, 43 scheduled slots are used in the rotation for main timeslots, some or all of which can have a CPU pre-access, provided they fit in the rotation window.

Each of the 2 CDU(W) accesses requires 9 cycles. Per access, this implies an overhead of 6 cycles. Over the rotation the 2 CDU(W) accesses have an overhead of 12 cycles.

Assuming all blocks require a service guarantee of no more than a single stall across 256 bits, allow 10 cycles for read latency once in the rotation.

There can be 3 refreshes over the rotation. If each of these refreshes has a pre-access then 3×6=18 cycles must be allowed in the rotation.

A total of 12+10+18=40 cycles have to be subtracted from the rotation period to allow for CDUW/startup/refresh latency.

Assume a 256 cycle timeslot rotation.

CDU(W), read latency and refresh reduce the number of available cycles in a rotation to: 256−40=216 cycles.

As a result, between 216 are available for 44 accesses, which implies each access can take 216/43=5.02 cycles.

Work out how many slots can have a pre-access: For the available 216 cycles, this implies (43−n)*6+n*4<=216, where n=number of slots with no pre-access cycle. Solving the equation gives n>=24. Check answer: 22*6+21*4=216.

So 22 slots out of the 43 programmed slots in the rotation can have CPU pre-accesses.

Therefore the CPU achieves a pre-access ratio of 22/43=51.1% of the programmed slots in the rotation. Any refreshes in the rotation can also have pre-accesses. The rotation is speeded up by 10 cycles to allow for any startup latencies. The rotation is speeded up by 6 cycles to allow for the extra 6 cycle latency for each of 2 CDUW accesses.

EXAMPLE 3

Contone Scale-Factor=4, Bi-Level Scale Factor=1, USB Host High-Speed, No MMI or UHU Connections, LLU SegSpan=320, SegSpanStart=64

Program the MainTimeslot configuration register (Table 129) for peak required bandwidths of SoPEC Units according to the scale factor. Program the read round-robin allocation to share unused read slots. Allocate PCU, DNC, HCU and TFS to level 1 read round-robin.

Assume scale-factor of 4 and peak bandwidths from Table 119.

Assign all DIU requestors except TE(TFS) and HCU multiples of 1 timeslot, as indicated in Table 119, where each timeslot is 1 bit/cycle. This requires 47 timeslots.

No timeslots are explicitly allocated for the fractional bandwidth requirements of TE(TFS) and HCU accesses. Instead, these units are serviced via unused read slots.

Therefore, 47 scheduled slots are used in the rotation for main timeslots, some or all of which can have a CPU pre-access, provided they fit in the rotation window.

Each of the 4 CDU(W) accesses requires 9 cycles. Per access, this implies an overhead of 6 cycles. Over the rotation the 4 CDU(W) accesses have an overhead of 24 cycles.

Assuming all blocks require a service guarantee of no more than a single stall across 256 bits, allow 10 cycles for read latency once in the rotation.

There can be 3 refreshes over the rotation. If each of these refreshes has a pre-access then 3×6=18 cycles must be allowed in the rotation.

A total of 24+10+18=52 cycles have to be subtracted from the rotation period to allow for CDUW/startup/refresh latency.

Assume a 256 cycle timeslot rotation.

CDU(W), read latency and refresh reduce the number of available cycles in a rotation to: 256−52=204 cycles.

As a result, between 204 are available for 47 accesses, which implies each access can take 204/47=4.34 cycles.

Work out how many slots can have a pre-access: For the available 204 cycles, this implies (47−n)*6+n*4<=204, where n=number of slots with no pre-access cycle. Solving the equation gives n>=48. Check answer: 8*6+39*4=204.

So 8 slots out of the 47 programmed slots in the rotation can have CPU pre-accesses.

Therefore the CPU achieves a pre-access ratio of 8/47=17% of the programmed slots in the rotation. Any refreshes in the rotation can also have pre-accesses. The rotation is speeded up by 10 cycles to allow for any startup latencies. The rotation is speeded up by 6 cycles to allow for the extra 6 cycle latency for each of 4 CDUW accesses.

22.12.3 Communications SoPEC with High Speed USB Host, USB Device and MMI Connections

TABLE 120

Timeslot allocation based on peak bandwidth with high-speed USB host, high-speed USB device and MMI connections (non printing SoPEC)

| Block Name | Direction | Peak Bandwidth which must be supplied (bits/cycle) | MainTimeslots allocated |
|---|---|---|---|
| UDU | R | 480 Mbit/s | 1 |
| | W | 480 Mbit/s | 1 |
| CDU | R | 0 | 0 |
| | W | 0 | 0 |
| CFU | R | 0 | 0 |
| LBD | R | 0 | 0 |
| SFU | R | 0 | 0 |
| | W | 0 | 0 |
| TE(TD) | R | 0 | 0 |
| TE(TFS) | R | 0 | 0 |
| HCU | R | 0 | 0 |
| DNC | R | 0 | 0 |
| DWU | W | 0 | 0 |
| LLU | R | 0 | 0 |
| PCU | R | 0 | 0 |
| UHU | R | 480 Mbit/s | 1 |
| | W | 480 Mbit/s | 1 |
| MMI | R | 480 Mbit/s | 1 |
| | W | 480 Mbit/s | 1 |
| TOTAL | | | 6 |

22.12.3

EXAMPLE 4

High-Speed USB Host, High-Speed USB Device and MMI Connections (Non-Printing SoPEC)

For this programming example only 6 DIU slots are required. CPU pre-accesses are possible for each slot. The rotation will complete in 6 slots each of 6 cycles or 36 cycles. Each of the 6 slots can transfer 256 bits of DIU data every 36 cycles. So a slot is 256/36 times 192 Mbit/s or 1365 Mbit/s.

22.12.4 Slot Distributions and Stall Calculations for Individual Blocks

The following sections show how the slots for blocks with a service requirement greater than 1 bit/cycle should be distributed. Calculations are included to check that such blocks will not suffer more than one stall per rotation due to startup, refresh or CDUW accesses.

Therefore the total delay overhead due to latency, refreshes and CDU(W) can be factored into the service guarantee for all blocks in the rotation by deleting once, (i.e. reducing the rotation window) that number of slots which equates to the cumulative duration of these various anomalies.

22.12.4.1 SFU

This has 2 bits/cycle on read but this is two separate channels of 1 bit/cycle sharing the same DIU interface so it is effectively 2 channels each of 1 bit/cycle so allowing the same margins as the LBD will work.

22.12.4.2 DWU

The DWU has 12 double buffers in each of the 6 colour planes, odd and even. These buffers are filled by the DNC and will request DIU access when double buffers fill. The DNC supplies 6 bits to the DWU every cycle (6 odd in one cycle, 6 even in the next cycle). So the service deadline is 512 cycles, given 6 accesses per 256-cycle rotation.

22.12.4.3 CFU

The solution for the CFU is to increase its double 256-bit buffer interface to the DIU. The CFU implements a quad-256 bit buffer interface to the DIU.

The requirement is that the DIU stall should be less than the time taken for the CFU to consume its extra 512 bits of buffering. The total DIU stall=refresh latency+extra CDU (W) latency+read circuit latency=3+5 (for 4 cycle timeslots)+10=18 cycles. The CFU can consume its data at 8 bits/cycle at SF=4. An extra 144 bits of buffering i.e. 8×18 bits is needed. Therefore the extra 512 bits of buffering is more than enough.

Sometimes in slot allocations slots cannot be evenly allocated around the slot rotation. The CFU has an extra 512−144=368 bits of buffering to cope with this. This 368 bits will last 46 cycles at SF=4. Therefore the CFU can cope with not exactly evenly spaced slot distributions.

22.12.4.4 LLU

The LLU requires DIU access of approx 6.43 bits/cycle. This is to keep the PHI fed at an effective rate of 225 Mb/s assuming 12 segments but taking account that only 11 segments can actually be driven. For SegSpan=640 and SegDotOffset=0 the LLU will use 256 bits, 256 bits, and then 128 bits of the last DRAM word. Not utilizing the last 128-bits means the average bandwidth required increases by ⅓ to 8.57 bits/cycle. The LLU quad buffer will be able to keep the LLU supplied with data if the DIU supplies this average bandwidth.

Thus each channel requires approximately 1.43 bits/cycle or 1.43 slots per 256 cycle rotation. The allocation of cycles for a startup following a stall will allow for a stall once per rotation.

22.12.4.5 DNC

This has a 2.4 bits/cycle bandwidth requirement. Each access will see the DIU stall of 18 cycles. 2.4 bits/cycle corresponds to an access every 106 cycles within a 256 cycle rotation. So to allow for DIU latency, an access is needed every 106-18 or 88 cycles. This is a bandwidth of 2.9 bits/cycle, requiring 3 timeslots in the rotation.

22.12.4.6 CDU

The JPEG decoder produces 8 bits/cycle. Peak CDUR[ead] bandwidth is 4 bits/cycle (SF=4), peak CDUW[rite] bandwidth is 4 bits/cycle (SF=4). both with 1.5 DRAM buffering.

The CDU(R) does a DIU read every 64 cycles at scale factor 4 with 1.5 DRAM buffering. The delay in being serviced by the DIU could be read circuit latency (10)+refresh (3)+extra CDU(W) cycles (6)=19 cycles. The JPEG decoder can consume each 256 bits of DIU-supplied data at 8 bits/cycle, i.e. in 32 cycles. If the DIU is 19 cycles late (due to latency) in supplying the read data then the JPEG decoder will have finished processing the read data 32+19=49 cycles after the DIU access. This is 64−49=15 cycles in advance of the next read. This 15 cycles is the upper limit on how much the DIU read service can further be delayed, without causing a stall. Given this margin, a stall on the read side will not occur. This margin means that the CDU can cope with not exactly evenly spaced slot distributions.

On the write side, for scale factor 4, the access pattern is a DIU writes every 64 cycles with 1.5 DRAM buffering. The JPEG decoder runs at 8 bits cycle and consumes 256 bits in 32 cycles. The CDU will not stall if the JPEG decode time (32)+DIU stall (19)<64, which is true. The extra margin means that the CDU can cope with not exactly evenly spaced slot distributions.

22.13 CPU DRAM Access Performance

The CPU's share of the timeslots can be specified in terms of guaranteed bandwidth and average bandwidth allocations.

The CPU's access rate to memory depends on

- the CPU read access latency i.e. the time between the CPU making a request to the DIU and receiving the read data back from the DIU.
- how often it can get access to DIU timeslots.

Table 110 estimated the CPU read latency as 5 cycles.

How often the CPU can get access to DIU timeslots depends on the access type. This is summarised in Table 121.

TABLE 121

CPU DRAM access performance

| Access Type | Nominal Timeslot duration | CPU DRAM access rate | Notes |
|---|---|---|---|
| CPU Pre-access | 6 cycles | Lower bound (guaranteed bandwidth) is 192 MHz/6 = 32 MHz | CPU can access every timeslot. |
| Fractional CPU Pre-access | 4 or 6 cycles | Lower bound (guaranteed bandwidth) is (192 MHz * N/P) | CPU accesses precede a fraction N of timeslots where N = C/T. C = CPUPreAccessTimeslots T = CPUTotalTimeslots P = (6*C + 4*(T − C))/T |

In both CPU Pre-access and Fractional CPU Pre-access modes, if the CPU is not requesting the timeslots will have a duration of 3 or 4 cycles depending on whether the current access and preceding access are both to the shared read bus. This will mean that the timeslot rotation will run faster and more bandwidth is available.

If the CPU runs out of its instruction cache then instruction fetch performance is only limited by the on-chip bus protocol. If data resides in the data cache then 192 MHz performance is achieved. Accessing memory mapped registers, PSS or ROM with a 3 cycle bus protocol (address cycle+data cycle) gives 64 MHz performance.

Due to the action of CPU caching, some bandwidth limiting of the CPU in Fractional CPU Pre-access mode is expected to have little or no impact on the overall CPU performance.

22.14 Implementation

The DRAM Interface Unit (DIU) is partitioned into 2 logical blocks to facilitate design and verification.

a. The DRAM Arbitration Unit (DAU) which interfaces with the SoPEC DIU requesters.

b. The DRAM Controller Unit (DCU) which accesses the embedded DRAM.

The basic principle in design of the DIU is to ensure that the eDRAM is accessed at its maximum rate while keeping the CPU read access latency as low as possible.

The DCU is designed to interface with single bank 20 Mbit IBM Cu-11 embedded DRAM performing random accesses every 3 cycles. Page mode burst of 4 write accesses, associated with the CDU, are also supported.

The DAU is designed to support interleaved accesses allowing the DRAM to be accessed every 3 cycles where back-to-back accesses do not occur over the shared 64-bit read data bus.

22.14.1 DIU Partition 22.14.2 Definition of DCU IO

TABLE 122

DCU interface

| Port Name | Pins | I/O | Description |
|---|---|---|---|
| | | | Clocks and Resets |
| Pclk | 1 | In | SoPEC Functional clock |
| dau_dcu_reset_n | 1 | In | Active-low, synchronous reset in pclk domain. Incorporates DAU hard and soft resets. |
| | | | Inputs from DAU |
| dau_dcu_msn2stall | 1 | In | Signal indicating from DAU Arbitration Logic which when asserted stalls DCU in MSN2 state. |
| dau_dcu_adr[21:5] | 17 | In | Signal indicating the address for the DRAM access. This is a 256-bit aligned DRAM address. |
| dau_dcu_rwn | 1 | In | Signal indicating the direction for the DRAM access (1 = read, 0 = write). |
| dau_dcu_cduwpage | 1 | In | Signal indicating if access is a CDU write page mode access (1 = CDU page mode, 0 = not CDU page mode). |
| dau_dcu_refresh | 1 | In | Signal indicating that a refresh command is to be issued. If asserted dau_dcu_adr, dau_dcu_rwn and dau_dcu_cduwpage are ignored. |
| dau_dcu_wdata | 256 | In | 256-bit write data to DCU |
| dau_dcu_wmask | 32 | In | Byte encoded write data mask for 256-bit dau_dcu_wdata to DCU Polarity: A "1" in a bit field of dau_dcu_wmask means that the corresponding byte in the 256-bit dau_dcu_wdata is written to DRAM. |
| | | | Outputs to DAU |
| dcu_dau_adv | 1 | Out | Signal indicating to DAU to supply next command to DCU |
| dcu_dau_wadv | 1 | Out | Signal indicating to DAU to initiate next non-CPU write |
| dcu_dau_refreshcomplete | 1 | Out | Signal indicating that the DCU has completed a refresh. |
| dcu_dau_rdata | 256 | Out | 256-bit read data from DCU. |
| dcu_dau_rvalid | 1 | Out | Signal indicating valid read data on dcu_dau_rdata. |

22.14.2

22.14.3 DRAM Access Types

The DRAM access types used in SoPEC are summarised in Table 123. For a refresh operation the DRAM generates the address internally.

TABLE 123

SoPEC DRAM access types

| Type | Access |
|---|---|
| Read | Random 256-bit read |
| Write | Random 256-bit write with byte write masking |
| | Page mode write for burst of 4 256-bit words with byte write masking |
| Refresh | Single refresh |

22.14.4 Constructing the 20 Mbit DRAM from Two 10 Mbit Instances

The 20 Mbit DRAM is constructed from two 10 Mbit instances. The address ranges of the two instances are shown in Table 124.

TABLE 124

Address ranges of the two 10 Mbit instances in the 20 Mbit DRAM

| Instance | Address | Hex 256-bit word address | Binary 256-bit word address |
|---|---|---|---|
| Instance0 | First word in lower 10 Mbit | 00000 | 0 0000 0000 0000 0000 |
| Instance0 | Last word in lower 10 Mbit | 09FFF | 0 1001 1111 1111 1111 |
| Instance1 | First word in upper 10 Mbit | 0A000 | 0 1010 0000 0000 0000 |
| Instance1 | Last word in upper 10 Mbit | 13FFF | 1 0011 1111 1111 1111 |

There are separate macro select signals, inst0_MSN and inst1_MSN, for each instance and separate dataout busses inst0_DO and inst1_DO, which are multiplexed in the DCU. Apart from these signals both instances share the DRAM output pins of the DCU.

The DRAM Arbitration Unit (DAU) generates a 17 bit address, dau_dcu_adr[21:5], sufficient to address all 256-bit words in the 20 Mbit DRAM. The upper 4 bits are used to select between the two memory instances by gating their MSN pins. If instance1 is selected then the lower 16-bits are translated to map into the 10 Mbit range of that instance. The multiplexing and address translation rules are shown in Table 125.

In the case that the DAU issues a refresh, indicated by dau_dcu_refresh, then both macros are selected. The other control signals

TABLE 125

Instance selection and address translation

| dau_dcu_refresh | DAU Address bits dau_dcu_adr[21:18] | Instance selected | inst0_MSN | inst1_MSN | Address translation |
|---|---|---|---|---|---|
| 0 | <0101 | Instance0 | MSN | 1 | A[15:0] = dau_dcu_adr[20:5] |
| | >=0101 | Instance1 | 1 | MSN | A[15:0] = dau_dcu_adr[21:5] − hA000 |
| 1 | — | Instance0 and Instance1 | MSN | MSN | — |

dau_dcu_adr[21:5], dau_dcu_rwn and dau_dcu_cduwpage are ignored.

Figure 115:
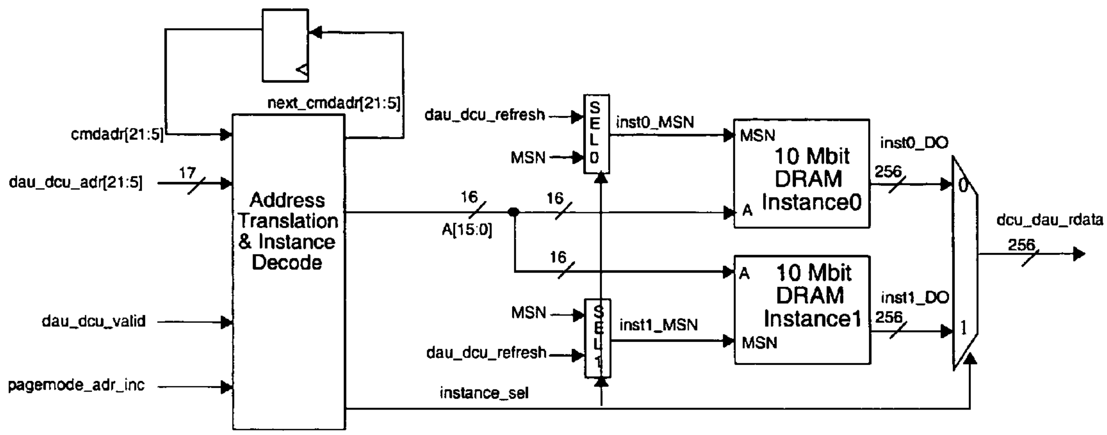

The instance selection and address translation logic is shown in FIG. 115.

The address translation and instance decode logic also increments the address presented to the DRAM in the case of a page mode write. Pseudo code is given below.

```
if rising_edge(dau_dcu_valid) then
    //capture the address from the DAU
    next_cmdadr[21:5] = dau_dcu_adr[21:5]
elsif pagemode_adr_inc == 1 then
    //increment the address
    next_cmdadr[21:5] = cmdadr[21:5] + 1
else
    next_cmdadr[21:5] = cmdadr[21:5]
if rising_edge(dau_dcu_valid) then
    //capture the address from the DAU
    adr_var[21:5]:= dau_dcu_adr[21:5]
else
    adr_var[21:5]:= cmdadr[21:5]
if adr_var[21:17] < 01010 then
    //choose instance0
    instance_sel = 0
    A[15:0] = adr_var[20:5]
else
    //choose instance1
    instance_sel = 1
        A[15:0] = adr_var[21:5] - hA000
```

Pseudo code for the select logic, SEL0, for DRAM Instance0 is given below.

```
//instance0 selected or refresh
if instance_sel == 0 OR dau_dcu_refresh == 1 then
    inst0_MSN = MSN
else
    inst0_MSN = 1
```

Pseudo code for the select logic, SEL1, for DRAM Instance1 is given below.

```
//instance1 selected or refresh
if instance_sel == 1 OR dau_dcu_refresh == 1 then
    inst1_MSN = MSN
else
    inst1_MSN = 1
```

During a random read, the read data is returned, on dcu_dau_rdata, after time $T_{acc}$, the random access time, which varies between 3 and 8 ns (see Table 127). To avoid any metastability issues the read data must be captured by a flip-flop which is enabled 2 pclk cycles or 10.4 ns after the DRAM access has been started. The DCU generates the enable signal dcu_dau_rvalid to capture dcu_dau_rdata.

The byte write mask dau_dcu_wmask[31:0] must be expanded to the bit write mask bitwritemask[255:0]needed by the DRAM.

22.14.5 DAU-DCU Interface Description

Figure 116:
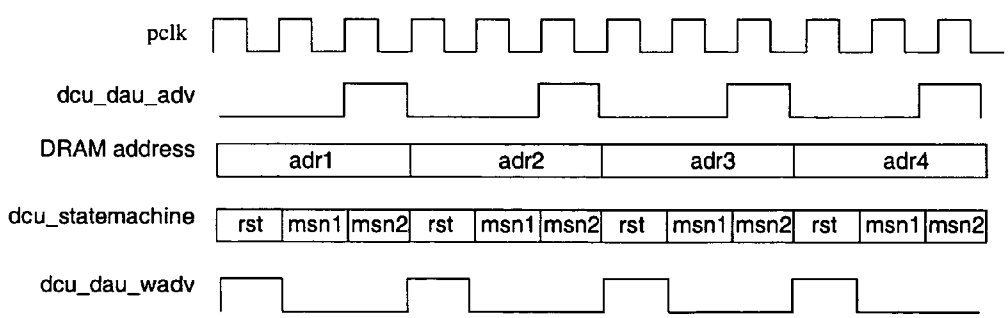

The DCU asserts dcu_dau_adv in the MSN2 state to indicate to the DAU to supply the next command. dcu_dau_adv causes the DAU to perform arbitration in the MSN2 cycle. The resulting command is available to the DCU in the following cycle, the RST state. The timing is shown in FIG. 116. The command to the DRAM must be valid in the RST and MSN1 states, or at least meet the hold time requirement to the MSN falling edge at the start of the MSN1 state.

Note that the DAU issues a valid arbitration result following every dcu_dau_adv pulse. If no unit is requesting DRAM access, then a fall-back refresh request will be issued. When dau_dcu_refresh is asserted the operation is a refresh and dau_dcu_adr, dau_dcu_rwn and dau_dcu_cduwpage are ignored.

The DCU generates a second signal, dcu_dau_wadv, which is asserted in the RST state. This indicates to the DAU that it can perform arbitration in advance for non-CPU writes. The reason for performing arbitration in advance for non-CPU writes is explained in "Command Multiplexor Sub-block".

The DCU state-machine can stall in the MSN2 state when the signal dau_dcu_msn2stall is asserted by the DAU Arbitration Logic, The states of the DCU state-machine are summarised in Table 126.

TABLE 126

States of the DCU state-machine

| State | Description |
|---|---|
| RST | Restore state |
| MSN1 | Macro select state 1 |
| MSN2 | Macro select state 2 |

22.14.6 DCU State Machines

Figure 117:
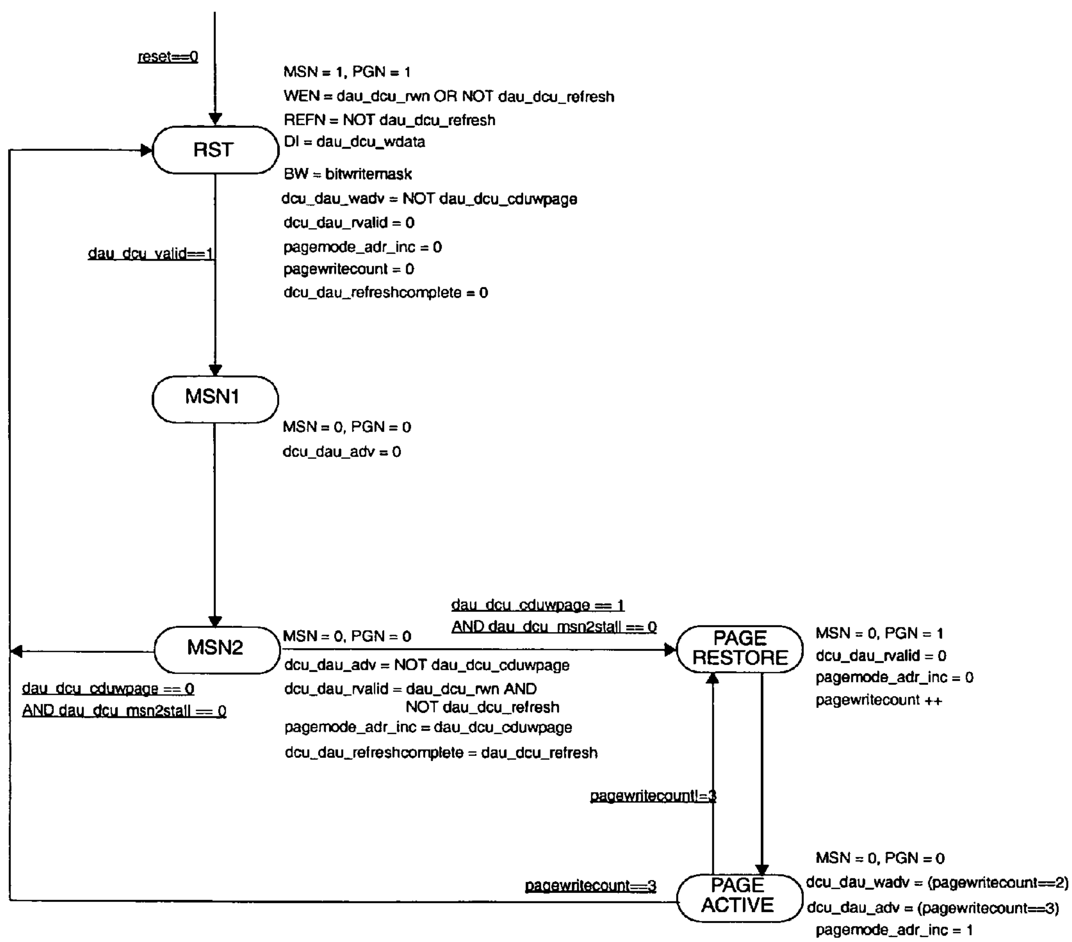
Figure 118:
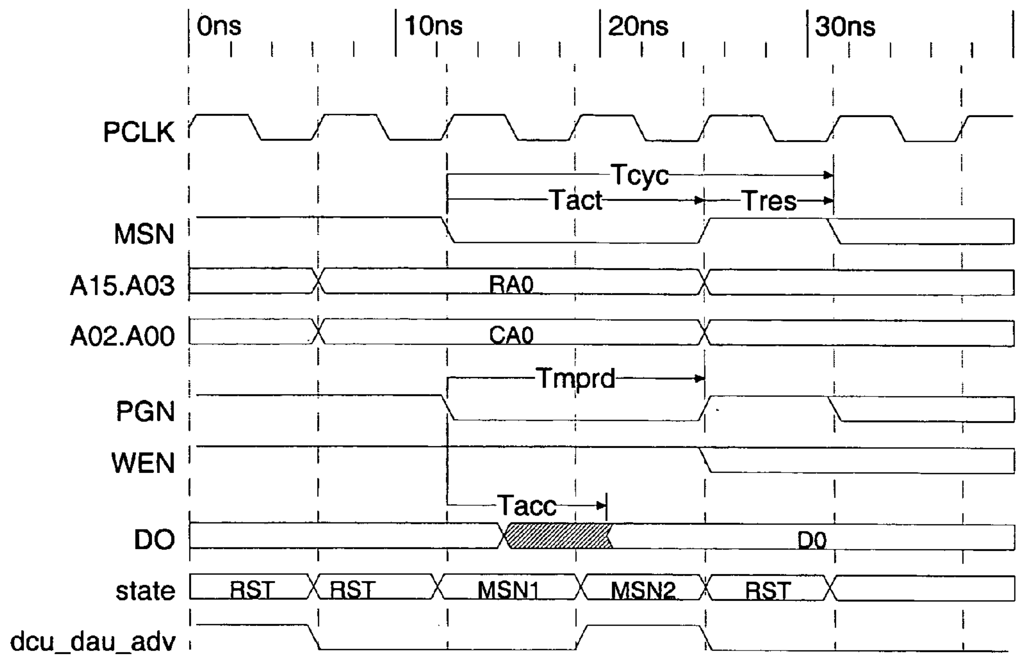
Figure 119:
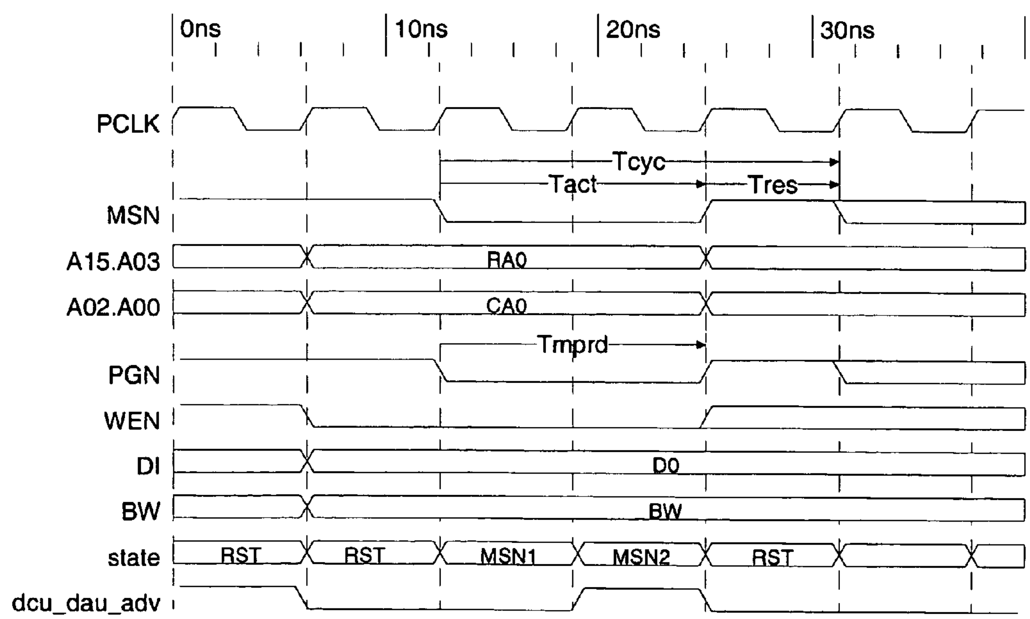
Figure 120:
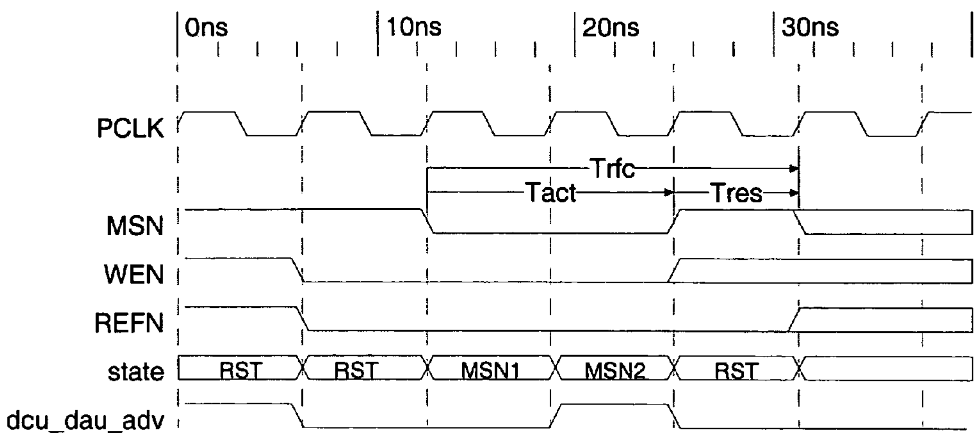
Figure 121:
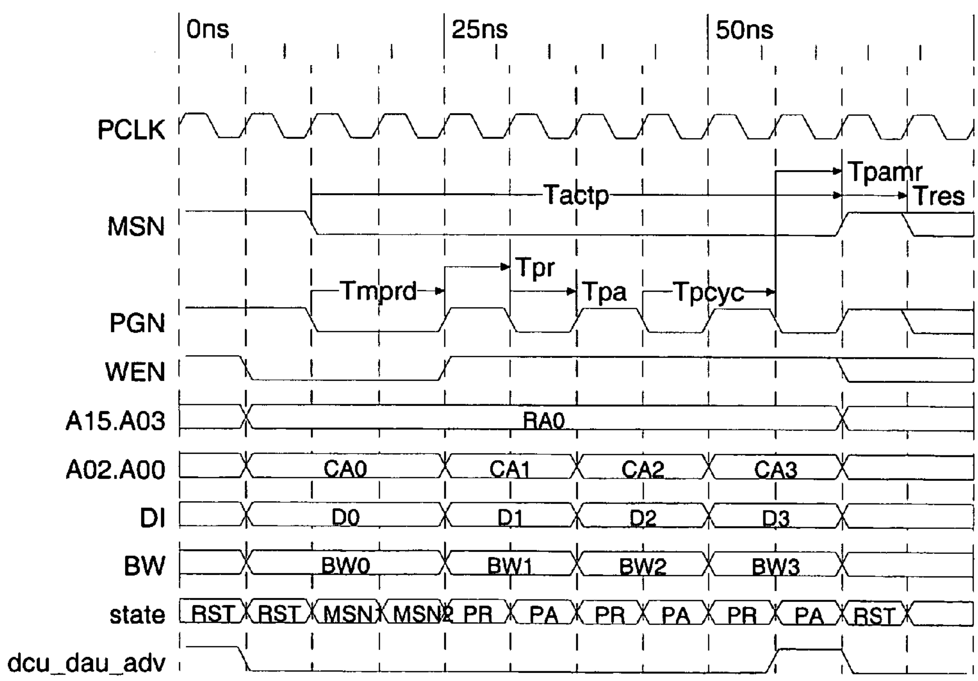

The IBM DRAM has a simple SRAM like interface. The DRAM is accessed as a single bank. The state machine to access the DRAM is shown in FIG. 117.

The signal pagemode_adr_inc is exported from the DCU as dcu_dau_cduwaccept. dcu_dau_cduwaccept tells the DAU to supply the next write data to the DRAM 22.14.7 CU-11 DRAM Timing Diagrams The IBM Cu-11 embedded DRAM datasheet Table 127 shows the timing parameters which must be obeyed for the IBM embedded DRAM.

TABLE 127

1.5 V Cu-11 DRAM a.c. parameters

| Symbol | Parameter | Min | Max | Units |
|---|---|---|---|---|
| $T_{set}$ | Input setup to MSN/PGN | 1 | — | ns |
| $T_{hld}$ | Input hold to MSN/PGN | 2 | — | ns |
| $T_{acc}$ | Random access time | 3 | 8 | ns |
| $T_{act}$ | MSN active time | 8 | 100k | ns |
| $T_{res}$ | MSN restore time | 4 | — | ns |
| $T_{cyc}$ | Random R/W cycle time | 12 | — | ns |
| $T_{rfc}$ | Refresh cycle time | 12 | — | ns |
| $T_{accp}$ | Page mode access time | 1 | 3.9 | ns |
| $T_{pa}$ | PGN active time | 1.6 | — | ns |
| $T_{pr}$ | PGN restore time | 1.6 | — | ns |
| $T_{pcyc}$ | PGN cycle time | 4 | — | ns |
| $T_{mprd}$ | MSN to PGN restore delay | 6 | — | ns |
| $T_{actp}$ | MSN active for page mode | 12 | — | ns |
| $T_{ref}$ | Refresh period | — | 3.2 | ms |
| $T_{pamr}$ | Page active to MSN restore | 4 | — | ns |

The IBM DRAM is asynchronous. In SoPEC it interfaces to signals clocked on pclk. The following timing diagrams show how the timing parameters in Table 127 are satisfied in SoPEC.

22.14.8 Definition of DAU IO

TABLE 128

DAU interface

| Port Name | Pins | I/O | Description |
|---|---|---|---|
| **Clocks and Resets** | | | |
| Pclk | 1 | In | SoPEC Functional clock |
| prst_n | 1 | In | Active-low, synchronous reset in pclk domain |
| dau_dcu_reset_n | 1 | Out | Active-low, synchronous reset in pclk domain. This reset signal, exported to the DCU, incorporates the locally captured DAU version of hard reset (prst_n) and the soft reset configuration register bit "Reset". |
| **CPU Interface** | | | |
| cpu_adr[21:2] | 20 | In | CPU address bus for DRAM reads and configuration register read/write access.<br>The former uses address bits [21:5], while the latter uses bits [10:2].<br>DRAM addresses therefore cannot cross a 256-bit word boundary. |
| cpu_dataout | 32 | In | Data bus from the CPU for configuration register writes. Not used for DRAM accesses. |
| diu_cpu_data | 32 | Out | Configuration, status and debug read data bus to the CPU |
| diu_cpu_debug_valid | 1 | Out | Signal indicating the data on the diu_cpu_data bus is valid debug data. |
| cpu_rwn | 1 | In | Common read/not-write signal from the CPU |
| cpu_acode | 2 | In | CPU access code signals.<br>cpu_acode[0] - Program (0)/ Data (1) access<br>cpu_acode[1] - User (0)/ Supervisor (1) access<br>The DAU will only allow supervisor mode accesses to data space. |
| cpu_diu_sel | 1 | In | Block select from the CPU. When cpu_diu_sel is high, both cpu_adr and cpu_dataout are valid for configuration register accesses. |

TABLE 128-continued

| Port Name | Pins | I/O | Description |
|---|---|---|---|
| DAU interface | | | |
| diu_cpu_rdy | 1 | Out | Ready signal to the CPU. When diu_cpu_rdy is high it indicates the last cycle of the access. For a write cycle this means cpu_dataout has been registered by the block and for a read cycle this means the data on diu_cpu_data is valid. |
| diu_cpu_berr | 1 | Out | Bus error signal to the CPU indicating an invalid access. |
| cpu_diu_wdatavalid | 1 | In | Write enable for the CPU posted write buffer. Also confirms that the CPU write data, address and mask are valid. |
| diu_cpu_write_rdy | 1 | Out | Flag indicating that the CPU posted write buffer is empty. |
| cpu_diu_wdata | 128 | In | CPU write data which is loaded into the posted write buffer. |
| cpu_diu_wadr[21:4] | 18 | In | 128-bit aligned CPU write address for posted write. |
| cpu_diu_wmask[15:0] | 16 | In | Byte enables for 128-bit CPU posted write. |
| cpu_diu_rreq | 1 | In | Request by the CPU to read from DRAM. When asserted, indicates that cpu_adr refers to a DRAM address. |
| DIU Read Interface to SoPEC Units | | | |
| <unit>_diu_rreq | 1 | In | SoPEC unit requests DRAM read. A read request must be accompanied by a valid read address. |
| <unit>_diu_radr[21:5] | 17 | In | Read address to DIU<br>17 bits wide (256-bit aligned word).<br>Note: "<unit>" refers to non-CPU requesters only. CPU read addresses are provided via "cpu_adr". |
| diu_<unit>_rack | 1 | Out | Acknowledge from DIU that read request has been accepted and new read address can be placed on <unit>_diu_radr |
| diu_data | 64 | Out | Data from DIU to SoPEC Units except CPU.<br>First 64-bits is bits 63:0 of 256 bit word<br>Second 64-bits is bits 127:64 of 256 bit word<br>Third 64-bits is bits 191:128 of 256 bit word<br>Fourth 64-bits is bits 255:192 of 256 bit word |
| dram_cpu_data | 256 | Out | 256-bit data from DRAM to CPU. |
| diu_<unit>_rvalid | 1 | Out | Signal from DIU telling SoPEC Unit that valid read data is on the diu_data bus |
| DIU Write Interface to SoPEC Units | | | |
| <unit>_diu_wreq | 1 | In | SoPEC unit requests DRAM write. A write request must be accompanied by a valid write address.<br>Note: "<unit>" refers to non-CPU requesters only. |
| <unit>_diu_wadr[21:5] | 17 | In | Write address to DIU except CPU, CDU<br>17 bits wide (256-bit aligned word)<br>Note: "<unit>" refers to non-CPU requesters, excluding the CDU. |
| uhu_diu_wmask[7:0] | 8 | In | Byte write enables applicable to a given 64-bit quarter-word transferred from the UHU. Note that different mask values are |

TABLE 128-continued

| DAU interface | | | |
|---|---|---|---|
| Port Name | Pins | I/O | Description |
| | | | used with each quarter-word. |
| udu_diu_wmask[7:0] | 8 | In | Byte write enables applicable to a given 64-bit quarter-word transferred from the UDU. Note that different mask values are used with each quarter-word. |
| cdu_diu_wadr[21:3] | 19 | In | CDU Write address to DIU<br>19 bits wide (64-bit aligned word)<br>Addresses cannot cross a 256-bit word DRAM boundary. |
| diu_<unit>_wack | 1 | Out | Acknowledge from DIU that write request has been accepted and new write address can be placed on <unit>_diu_wadr |
| <unit>_diu_data[63:0] | 64 | In | Data from SoPEC Unit to DIU except CPU.<br>First 64-bits is bits 63:0 of 256 bit word<br>Second 64-bits is bits 127:64 of 256 bit word<br>Third 64-bits is bits 191:128 of 256 bit word<br>Fourth 64-bits is bits 255:192 of 256 bit word<br>Note: "<unit>" refers to non-CPU requesters only. |
| <unit>_diu_wvalid | 1 | In | Signal from SoPEC Unit indicating that data on <unit>_diu_data is valid.<br>Note: "<unit>" refers to non-CPU requesters only. |
| Outputs to DCU | | | |
| dau_dcu_msn2stall | 1 | Out | Signal indicating from DAU Arbitration Logic which when de-asserted stalls DCU in MSN2 state. |
| dau_dcu_adr[21:5] | 17 | Out | Signal indicating the address for the DRAM access. This is a 256-bit aligned DRAM address. |
| dau_dcu_rwn | 1 | Out | Signal indicating the direction for the DRAM access (1 = read, 0 = write). |
| dau_dcu_cduwpage | 1 | Out | Signal indicating if access is a CDU write page mode access (1 = CDU page mode, 0 = not CDU page mode). |
| dau_dcu_refresh | 1 | Out | Signal indicating that a refresh command is to be issued. If asserted dau_dcu_cmd_adr, dau_dcu_rwn and dau_dcu_cduwpage are ignored. |
| dau_dcu_wdata | 256 | Out | 256-bit write data to DCU |
| dau_dcu_wmask | 32 | Out | Byte-encoded write data mask for 256-bit dau_dcu_wdata to DCU<br>Polarity: A "1" in a bit field of dau_dcu_wmask means that the corresponding byte in the 256-bit dau_dcu_wdata is written to DRAM. |
| dau_dcu_disable_upper_dram_macro | 1 | Out | Signal which disables all inputs to the upper 10 Mbit macro, including refresh. |
| Inputs from DCU | | | |
| dcu_dau_adv | 1 | In | Signal indicating to DAU to supply next command to DCU |
| dcu_dau_wadv | 1 | In | Signal indicating to DAU to initiate next non-CPU write |
| dcu_dau_refreshcomplete | 1 | In | Signal indicating that the DCU has completed a refresh. |
| dcu_dau_rdata | 256 | In | 256-bit read data from DCU. |
| dcu_dau_rvalid | 1 | In | Signal indicating valid read data on dcu_dau_rdata. |

The CPU subsystem bus interface is described in more detail in Section 11.4.3. The DAU block will only allow supervisor-mode accesses to update its configuration registers (i.e. cpu_acode[1:0] b 11). All other accesses will result in diu_cpu_berr being asserted.

22.14.9 DAU Configuration Registers

TABLE 129

DAU configuration registers

| Address (DIU_base+) | Register | #bits | Reset | Description |
|---|---|---|---|---|
| | | | Reset | |
| 0x00 | Reset | 1 | 0x1 | A write to this register causes a reset of the DIU. This register can be read to indicate the reset state: 0 - reset in progress 1 - reset not in progress |
| | | | Refresh | |
| 0x04 | RefreshPeriod | 9 | 0x076 | Refresh controller. When set to 0 refresh is off, otherwise the value indicates the number of cycles, less one, between each refresh. [Note that for a system clock frequency of 192 MHz, a value exceeding 0x76 (indicating a 119-cycle refresh period) should not be programmed, or the DRAM will malfunction.] [0x76 = d118 or a refresh occurs every 119 cycles. This allows any delays on issuing the the refresh for a particular row due e.g. to CDUW, CPU preaccess to be caught up.] |
| | | | Timeslot allocation and control | |
| 0x08 | NumMainTimeslots | 6 | 0x01 | Number of main timeslots (1–64) less one |
| 0x0C | CPUPreAccessTimeslots | 4 | 0x0 | (CPUPreAccessTimeslots + 1) main slots out of a total of (CPUTotalTimeslots + 1) are preceded by a CPU access. |
| 0x10 | CPUTotalTimeslots | 4 | 0x0 | (CPUPreAccessTimeslots + 1) main slots out of a total of (CPUTotalTimeslots + 1) are preceded by a CPU access. |
| 0x100–0x1FC | MainTimeslot[63:0] | 64x5 | [63:1][3:0] = 0x01 [0][3:0] = 0x1B | Programmable main timeslots (up to 64 main timeslots). |
| 0x200 | ReadRoundRobinLevel | 14 | 0x0000 | For each read requester plus refresh 0 = level1 of round-robin 1 = level2 of round-robin The bit order is defined in Table 131. |
| 0x204 | EnableCPURoundRobin | 1 | 0x1 | Allows the CPU to participate in the unused read round-robin scheme. If disabled, the shared CPU/refresh round-robin position is dedicated solely to refresh. |
| 0x208 | RotationSync | 1 | 0x1 | Writing 0, followed by 1 to this bit allows the timeslot rotation to advance on a cycle basis which can be determined by the CPU. |
| 0x20C | minNonCPUReadAdr[21:10] | 12 | 0x200000 | 12 MSBs of lowest DRAM address which may be read by non-CPU requesters. |
| 0x210 | minDWUWriteAdr[21:10] | 12 | 0x200000 | 12 MSBs of lowest DRAM address which may be written to by the DWU. |

TABLE 129-continued

DAU configuration registers

| Address (DIU_base+) | Register | #bits | Reset | Description |
|---|---|---|---|---|
| 0x214 | minNonCPUWriteAdr[21:10] | 12 | 0x200000 | 12 MSBs of lowest DRAM address which may be written to by non-CPU requesters other than the DWU. |
| 0x218 | DisableUpperDramMacro | 1 | 0x0 | When asserted, no writes are allowed to the upper DRAM 10 Mbit macro. The macro is not refreshed and reads to its address space return all zeros.<br>Note: Any writes to the upper macro which have been pre-arbitrated/posted, but not yet executed in advance of this bit being activated, will be honoured. |
| 0x21C | StickyAdrReset | 1 | 0x0 | When a "1" is written to this address, the "sticky_invalid_dram_adr" field of "arbitrationHistory" is cleared. The "stickyAdrReset" register reads back always as all zeros. |
| | | Debug | | |
| 0x300 | debugSelect[11:2] | 10 | 0x304 | Debug address select. Indicates the address of the register to report on the diu_cpu_data bus when it is not otherwise being used. When this signal carries debug information the signal diu_cpu_debug_valid will be asserted.<br>Note: For traceability reasons, any registers read using "debugSelect" have the following fields superimposed at their MSB end, provided the bits concerned are not otherwise assigned:-<br>Bit 31:27 = arb_sel[4:0]**<br>Bit 26:24 = access_type[2:0]<br>**NB: A unique identifier code, 0x0C, is substituted in this "arb_sel" field during the first rotation sync preamble cycle, to allow easy determination of where an arbitration sequence begins. |
| | | Debug: arbitration and performance | | |
| 0x304 | ArbitrationHistory | 26 | — | Bit 0 = sticky_invalid_dram_adr<br>Bit 1 = sticky_back2back_non_cpu_write<br>Bit 2 = back2back_non_cpu_write<br>Bit 3 = arb_gnt<br>Bit 4 = pre_arb_gnt<br>Bit 9:5 = arb_sel<br>Bit 14:10 = write_sel<br>Bit 20:15 = arb_history_timeslot;<br>Bit 23:21 = access_type<br>Bit 24 = rotation_sync<br>Bit 26:25 = rotation_state<br>See Section 22.14.9.2 DIU Debug for a description of the fields.<br>Read only register. |
| 0x308 | DIUReadPerformance | 22 | — | Bit 0 = cpu_diu_rreq<br>Bit 1 = uhu_diu_rreq<br>Bit 2 = udu_diu_rreq<br>Bit 3 = cdu_diu_rreq<br>Bit 4 = cfu_diu_rreq<br>Bit 5 = lbd_diu_rreq<br>Bit 6 = sfu_diu_rreq |

TABLE 129-continued

DAU configuration registers

| Address (DIU_base+) | Register | #bits | Reset | Description |
| --- | --- | --- | --- | --- |
| | | | | Bit 7 = td_diu_rreq<br>Bit 8 = tfs_diu_rreq<br>Bit 9 = hcu_diu_rreq<br>Bit 10 = dnc_diu_rreq<br>Bit 11 = llu_diu_rreq<br>Bit 12 = pcu_diu_rreq<br>Bit 13 = mmi_diu_rreq<br>Bit 18:14 = read_sel[4:0]<br>Bit 19 = read_complete<br>Bit 20 = refresh_req<br>Bit 21 = dcu_dau_refreshcomplete<br>See Section 22.14.9.2 DIU Debug for a description of the fields.<br>Read only register. |
| 0x30C | DIUWritePerformance | | — | Bit 0 = NOT diu_cpu_write_rdy<br>Bit 1 = uhu_diu_wreq<br>Bit 2 = uhu_diu_wreq<br>Bit 3 = cdu_diu_wreq<br>Bit 4 = sfu_diu_wreq<br>Bit 5 = dwu_diu_wreq<br>Bit 6 = mmi_diu_wreq<br>Bit 11:7 = write_sel[4:0]<br>Bit 12 = write_complete<br>Bit 13 = refresh_req<br>Bit 14 = dcu_dau_refreshcomplete<br>See Section 22.14.9.2 DIU Debug for a description of the fields.<br>Read only register. |
| Debug DIU read requesters interface signals | | | | |
| 0x310 | CPUReadInterface | 25 | — | Bit 0 = cpu_diu_rreq<br>Bit 20:1 = cpu_adr[21:2]<br>Bit 21 = diu_cpu_rack<br>Bit 22 = diu_cpu_rvalid<br>Read only register. |
| 0x314 | UHUReadInterface | 20 | — | Bit 0 = uhu_diu_rreq<br>Bit 17:1 = uhu_diu_radr[21:5]<br>Bit 18 = diu_uhu_rack<br>Bit 19 = diu_uhu_rvalid<br>Read only register. |
| 0x318 | UDUReadInterface | 20 | — | Bit 0 = udu_diu_rreq<br>Bit 17:1 = udu_diu_radr[21:5]<br>Bit 18 = diu_udu_rack<br>Bit 19 = diu_udu_rvalid<br>Read only register. |
| 0x31C | CDUReadInterface | 20 | — | Bit 0 = cdu_diu_rreq<br>Bit 17:1 = cdu_diu_radr[21:5]<br>Bit 18 = diu_cdu_rack<br>Bit 19 = diu_cdu_rvalid<br>Read only register. |
| 0x320 | CFUReadInterface | 20 | — | Bit 0 = cfu_diu_rreq<br>Bit 17:1 = cfu_diu_radr[21:5]<br>Bit 18 = diu_cfu_rack<br>Bit 19 = diu_cfu_rvalid<br>Read only register. |
| 0x324 | LBDReadInterface | 20 | — | Bit 0 = lbd_diu_rreq<br>Bit 17:1 = lbd_diu_radr[21:5]<br>Bit 18 = diu_lbd_rack<br>Bit 19 = diu_lbd_rvalid<br>Read only register. |
| 0x328 | SFUReadInterface | 20 | — | Bit 0 = sfu_diu_rreq<br>Bit 17:1 = sfu_diu_radr[21:5]<br>Bit 18 = diu_sfu_rack<br>Bit 19 = diu_sfu_rvalid<br>Read only register. |
| 0x32C | TDReadInterface | 20 | — | Bit 0 = td_diu_rreq<br>Bit 17:1 = td_diu_radr[21:5]<br>Bit 18 = diu_td_rack<br>Bit 19 = diu_td_rvalid<br>Read only register. |
| 0x330 | TFSReadInterface | 20 | — | Bit 0 = tfs_diu_rreq |

TABLE 129-continued

DAU configuration registers

| Address (DIU_base+) | Register | #bits | Reset | Description |
|---|---|---|---|---|
| | | | | Bit 17:1 = tfs_diu_radr[21:5]<br>Bit 18 = diu_tfs_rack<br>Bit 19 = diu_tfs_rvalid<br>Read only register. |
| 0x334 | HCUReadInterface | 20 | — | Bit 0 = hcu_diu_rreq<br>Bit 17:1 = hcu_diu_radr[21:5]<br>Bit 18 = diu_hcu_rack<br>Bit 19 = diu_hcu_rvalid<br>Read only register. |
| 0x338 | DNCReadInterface | 20 | — | Bit 0 = dnc_diu_rreq<br>Bit 17:1 = dnc_diu_radr[21:5]<br>Bit 18 = diu_dnc_rack<br>Bit 19 = diu_dnc_rvalid<br>Read only register. |
| 0x33C | LLUReadInterface | 20 | — | Bit 0 = llu_diu_rreq<br>Bit 17:1 = lluu_diu_radr[21:5]<br>Bit 18 = diu_llu_rack<br>Bit 19 = diu_llu_rvalid<br>Read only register. |
| 0x340 | PCUReadInterface | 20 | — | Bit 0 = pcu_diu_rreq<br>Bit 17:1 = pcu_diu_radr[21:5]<br>Bit 18 = diu_pcu_rack<br>Bit 19 = diu_pcu_rvalid<br>Read only register. |
| 0x344 | MMIReadInterface | 20 | | Bit 0 = mmi_diu_rreq<br>Bit 17:1 = mmi_diu_radr[21:5]<br>Bit 18 = diu_mmi_rack<br>Bit 19 = diu_mmi_rvalid<br>Read only register. |
| | | Debug DIU write requesters interface signals | | |
| 0x348 | CPUWriteInterface | 20 | — | Bit 0 = cpu_diu_wdatavalid<br>Bit 1 = diu_cpu_write_rdy<br>Bit 19:2 = cpu_diu_wadr[21:4]<br>Read only register. |
| 0x34C | UHUWriteInterface | 20 | — | Bit 0 = uhu_diu_wreq<br>Bit 17:1 = uhu_diu_wadr[21:5]<br>Bit 18 = diu_uhu_wack<br>Bit 19 = uhu_diu_wvalid<br>Bit 27:20 = uhu_diu_wmask<br>Read only register. |
| 0x350 | UDUWriteInterface | 20 | — | Bit 0 = udu_diu_wreq<br>Bit 17:1 = udu_diu_wadr[21:5]<br>Bit 18 = diu_udu_wack<br>Bit 19 = udu_diu_wvalid<br>Bit 27:20 = udu_diu_wmask<br>Read only register. |
| 0x354 | CDUWriteInterface | 22 | — | Bit 0 = cdu_diu_wreq<br>Bit 19:1 = cdu_diu_wadr[21:3]<br>Bit 20 = diu_cdu_wack<br>Bit 21 = cdu_diu_wvalid<br>Read only register. |
| 0x358 | SFUWriteInterface | 20 | — | Bit 0 = sfu_diu_wreq<br>Bit 17:1 = sfu_diu_wadr[21:5]<br>Bit 18 = diu_sfu_wack<br>Bit 19 = sfu_diu_wvalid<br>Read only register. |
| 0x35C | DWUWriteInterface | 20 | — | Bit 0 = dwu_diu_wreq<br>Bit 17:1 = dwu_diu_wadr[21:5]<br>Bit 18 = diu_dwu_wack<br>Bit 19 = dwu_diu_wvalid<br>Read only register. |
| 0x360 | MMIWriteInterface | 20 | — | Bit 0 = mmi_diu_wreq<br>Bit 17:1 = mmi_diu_wadr[21:5]<br>Bit 18 = diu_mmi_wack<br>Bit 19 = mmi_diu_wvalid<br>Read only register. |
| | | Debug DAU-DCU interface signals | | |
| 0x364 | DAU-DCUInterface | 25 | — | Bit 16:0 = dau_dcu_adr[21:5]<br>Bit 17 = dau_dcu_rwn<br>Bit 18 = dau_dcu_cduwpage<br>Bit 19 = dau_dcu_refresh<br>Bit 20 = dau_dcu_msn2stall |

TABLE 129-continued

DAU configuration registers

| Address (DIU_base+) | Register | #bits | Reset | Description |
|---|---|---|---|---|
| | | | | Bit 21 = dcu_dau_adv<br>Bit 22 = dcu_dau_wadv<br>Bit 23 = dcu_dau_refreshcomplete<br>Bit 24 = dcu_dau_rvalid<br>Bit 25 = dau_dcu_disable_upper_dram_macro<br>Read only register. |

Each main timeslot can be assigned a SoPEC DIU requestor according to Table 130.

TABLE 130

SoPEC DIU requester encoding for main timeslots.

| Name | Index (binary) | Index(HEX) |
|---|---|---|
| | Write | |
| UHU(W) | b0_0000 | 0x00 |
| UDU(W) | b0_0001 | 0x01 |
| CDU(W) | b0_0010 | 0x02 |
| SFU(W) | b0_0011 | 0x03 |
| DWU | b0_0100 | 0x04 |
| MMI(W) | b0_0101 | 0x05 |
| | Read | |
| UHU(R) | b1_0000 | 0x10 |
| UDU(R) | b1_0001 | 0x11 |
| CDU(R) | b1_0010 | 0x12 |
| CFU | b1_0011 | 0x13 |
| LBD | b1_0100 | 0x14 |
| SFU(R) | b1_0101 | 0x15 |
| TE(TD) | b1_0110 | 0x16 |
| TE(TFS) | b1_0111 | 0x17 |
| HCU | b1_1000 | 0x18 |
| DNC | b1_1001 | 0x19 |
| LLU | b1_1010 | 0x1A |
| PCU | b1_1011 | 0x1B |
| MMI | b1_1100 | 0x1C |

ReadRoundRobinLevel and ReadRoundRobinEnable registers are encoded in the bit order defined in Table 131.

TABLE 131

Read round-robin registers bit order

| Name | Bit index |
|---|---|
| UHU(R) | 0 |
| UDU(R) | 1 |
| CDU(R) | 2 |
| CFU | 3 |
| LBD | 4 |
| SFU(R) | 5 |
| TE(TD) | 6 |
| TE(TFS) | 7 |
| HCU | 8 |
| DNC | 9 |
| LLU | 10 |
| PCU | 11 |
| MMI | 12 |
| CPU/ Refresh | 13 |

22.14.9.1 22.14.9.1 Configuration Register Reset State

The RefreshPeriod configuration register has a reset value of 0x076 which ensures that a refresh will occur every 119 cycles and the contents of the DRAM will remain valid.

The CPUPreAccessTimeslots and CPUTotalTimeslots configuration registers both have a reset value of 0x0. Matching values in these two registers means that every slot has a CPU pre-access. NumMainTimeslots is reset to 0x1, so there are just 2 main timeslots in the rotation initially. These slots alternate between UDU writes and PCU reads, as defined by the reset value of MainTimeslot[63:0], thus respecting at reset time the general rule that adjacent non-CPU writes are not permitted.

The first access issued by the DIU after reset will be a refresh.

22.14.9.2 DIU Debug

External visibility of the DIU must be provided for debug purposes. To facilitate this debug registers are added to the DIU address space.

The DIU CPU system data bus diu_cpu_data[31:0] returns configuration and status register information to the CPU. When a configuration or status register is not being read by the CPU debug data is returned on diu_cpu_data [31:0] instead. An accompanying active high diu_cpu_debug_valid signal is used to indicate when the data bus contains valid debug data.

The DIU features a DebugSelect register that controls a local multiplexor to determine which register is output on diu_cpu_data[31:0].

For traceability reasons, any registers read using "debugSelect" have the following fields superimposed at their MSB end, provided the bits concerned are not otherwise assigned:—

Bit 31:27=arb_sel[4:0]

Bit 26:24=access_type[2:0]

Note that a unique identifier code, "0x0C", is substituted in this "arb_sel" field during the first rotation sync preamble cycle, to allow easy determination of where an arbitration sequence begins.

Three kinds of debug information are gathered:

a. The order and access type of DIU requesters winning arbitration.

This information can be obtained by observing the signals in the ArbitrationHistory debug register at DIU_Base+0x304 described in Table 132.

TABLE 132

ArbitrationHistory debug register description, DIU_base+0x304

| Field name | Bits | Description |
|---|---|---|
| sticky_invalid_dram_adr | 1 | Sticky bit which indicates an attempted DRAM access (CPU or non-CPU) with an invalid address. Cleared by reset or by an explicit write of "1" by the CPU to "stickyAdrReset". |
| sticky_back2back_non_cpu_write | 1 | Sticky version of "back2back_non_cpu_write", cleared on reset. |
| back2back_non_cpu_write | 1 | Cycle-by-cycle indicator of attempted illegal back-to-back non-CPU write. (Recall from section 20.7.2.3 on page 212 that the second write of any such pair is disregarded and re-allocated via the unused read round-robin scheme.) |
| arb_gnt | 1 | Signal lasting 1 cycle which is asserted in the cycle following a main arbitration. |
| pre_arb_gnt | 1 | Signal lasting 1 cycle which is asserted in the cycle following a pre-arbitration award. |
| arb_sel | 5 | Signal indicating which requesting SoPEC Unit has won arbitration. Encoding is described in Table 133. Refresh winning arbitration is indicated by access_type. |
| write_sel | 5 | Signal indicating which requesting SoPEC Unit has won pre-arbitration. Only valid when pre_arb_gnt is asserted. Encoding is described in Table 133. |
| timeslot_number | 6 | Signal indicating which main timeslot is either currently being serviced, or about to be serviced. The latter case applies where a main slot is pre-empted by a CPU pre-access or a scheduled refresh. |
| access_type | 3 | Signal indicating the origin of the winning arbitration<br>000 = Standard CPU pre-access.<br>001 = Scheduled refresh.<br>010 = Scheduled non-CPU timeslot.<br>011 = CPU access via unused read slot, re-allocated by round robin.<br>100 = Non-CPU write via unused write slot, re-allocated at pre-arbitration.<br>101 = Non-CPU read via unused read slot, re-allocated by round robin.<br>110 = Refresh via unused read/write slot, re-allocated by round robin.<br>111 = CPU/Refresh access due to RotationSync = 0. |
| rotation_sync | 1 | Current value of the RotationSync configuration bit. |
| rotation_state | 2 | These bits indicate the current status of pre-arbitration and main timeslot rotation, as a result of the RotationSync setting.<br>00 = Pre-arb enabled, rotation enabled.<br>01 = Pre-arb disabled, rotation enabled.<br>10 = Pre-arb disabled, rotation disabled.<br>11 = Pre-arb enabled, rotation disabled.<br>00 is the normal functional setting when RotationSync is 1.<br>01 indicates that pre-arbitration has halted at the end of its rotation because of RotationSync having been cleared. However the main arbitration has yet to finish its current rotation.<br>10 indicates that both pre-arb and the main rotation have halted, due to RotationSync being 0 and that only CPU accesses and refreshes are allowed.<br>11 indicates that RotationSync has just been changed from 0 to 1 and that pre-arbitration is being given a head start to look ahead for non-CPU writes, in advance of the main rotation starting up again. |

TABLE 133 arb_sel, read_sel and write_sel encoding

| Name | Index (binary) | Index (HEX) |
|---|---|---|
| | Write | |
| UHU(W) | b0_0000 | 0x00 |
| UDU(W) | b0_0001 | 0x01 |
| CDU(W) | b0_0010 | 0x02 |
| SFU(W) | b0_0011 | 0x03 |
| DWU | b0_0100 | 0x04 |
| MMI(W) | b0_0101 | 0x05 |
| | Read | |
| UHU(R) | b1_0000 | 0x10 |
| UDU(R) | b1_0001 | 0x11 |
| CDU(R) | b1_0010 | 0x12 |
| CFU | b1_0011 | 0x13 |
| LBD | b1_0100 | 0x14 |
| SFU(R) | b1_0101 | 0x15 |
| TE(TD) | b1_0110 | 0x16 |
| TE(TFS) | b1_0111 | 0x17 |
| HCU | b1_1000 | 0x18 |
| DNC | b1_1001 | 0x19 |
| LLU | b1_1010 | 0x1A |
| PCU | b1_1011 | 0x1B |
| MMI(R) | b1_1100 | 0x1C |
| Refresh | | |
| Refresh | 1_1101 | 0x1D |
| | CPU | |
| CPU(R) | b1_1111 | 0x1F |
| CPU(W) | b0_1111 | 0x0F |

The encoding for arb_sel is described in Table 133.

b. The time between a DIU requester requesting an access and completing the access.

This information can be obtained by observing the signals in the DIUPerformance debug register at DIU_Base+0x308 described in Table 134. The encoding for read_sel and write_sel is described in Table 133. The data collected from DIUPerformance can be post-processed to count the number of cycles between a unit requesting DIU access and the access being completed.

TABLE 134

DIUReadPerformance debug register description, DIU_base+0x308

| Field name | Bits | Description |
|---|---|---|
| <unit>_diu_rreq | 14 | Signal indicating that SoPEC unit requests a DRAM read. |
| read_sel[4:0] | 5 | Signal indicating the SoPEC Unit for which the current read transaction is occurring. Encoding is described in Table 117. |
| read_complete | 1 | Signal indicating that read transaction to SoPEC Unit indicated by read_sel is complete i.e. that the last read data has been output by the DIU. |
| refresh_req | 1 | Signal indicating that refresh has requested a DIU access. |
| dcu_dau_refresh_complete | 1 | Signal indicating that refresh has completed. |

TABLE 135

DIUWritePerformance debug register description, DIU_base+0x30C

| Field name | Bits | Description |
|---|---|---|
| NOT diu_cpu_write_rdy | 1 | Inverse of diu_cpu_write_rdy. Indicates that a write has been posted by the CPU and is awaiting execution. |
| <unit>_diu_wreq | 6 | Signal indicating that SoPEC unit requests a DRAM write. |
| write_sel[4:0] | 5 | Signal indicating the SoPEC Unit for which the current write transaction is occurring. Encoding is described in Table 133. |
| write_complete | 1 | Signal indicating that write transaction to SoPEC Unit indicated by write_sel is complete i.e. that the last write data has been transferred to the DIU. |
| refresh_req | 1 | Signal indicating that refresh has requested a DIU access. |
| dcu_dau_refresh_complete | 1 | Signal indicating that refresh has completed. |

c. Interface signals to DIU requestors and DAU-DCU interface.

c.

All interface signals (with the exception of data buses at the interfaces between the DAU and DCU) and DIU write and read requestors can be monitored in debug mode by observing debug registers DIU_Base+0x310 to DIU_Base+0x360.

22.14.10 DRAM Arbitration Unit (DAU)

Figure 114:
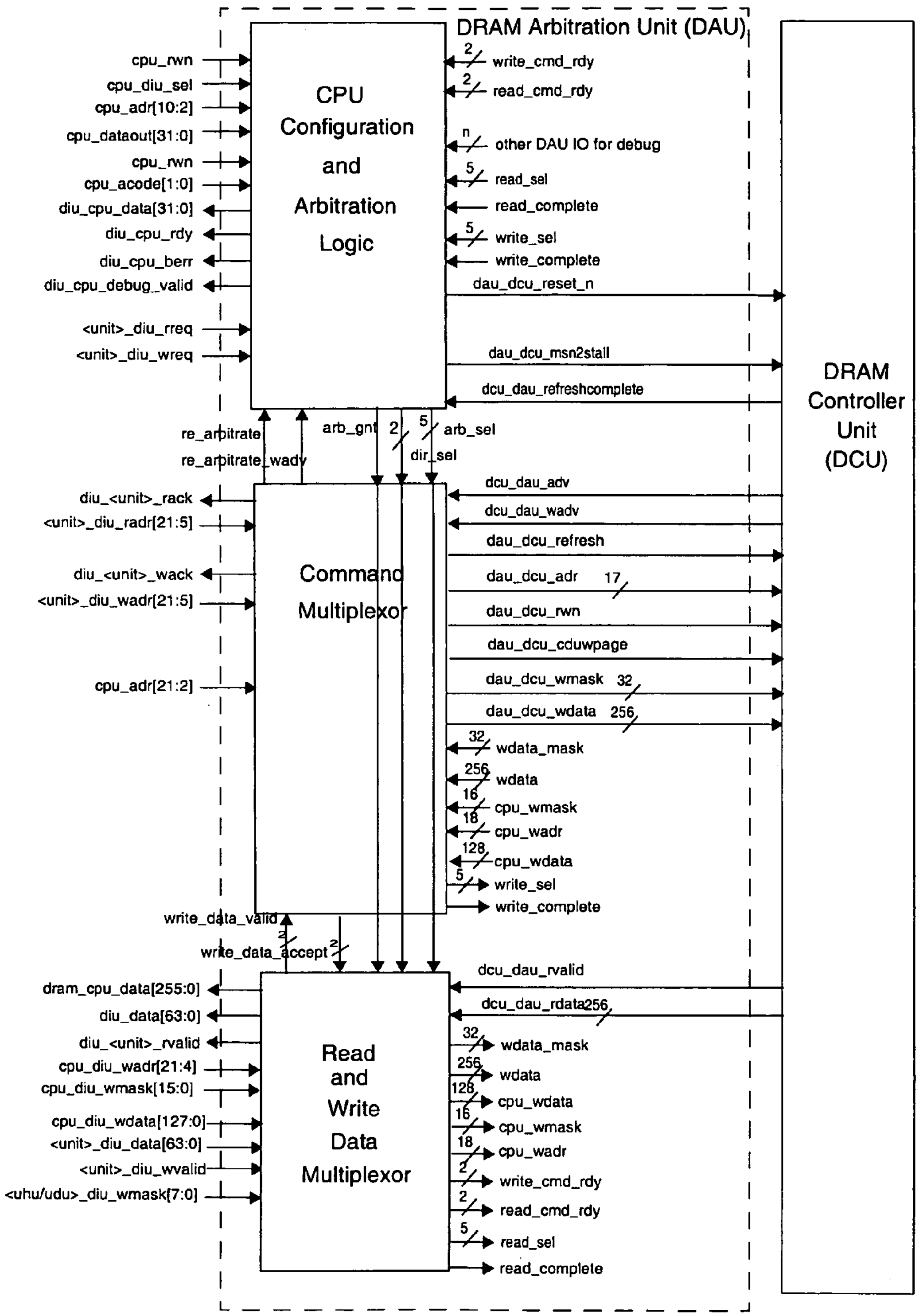

The DAU is shown in FIG. 114.

The DAU is composed of the following sub-blocks a. CPU Configuration and Arbitration Logic sub-block.

b. Command Multiplexor sub-block.

c. Read and Write Data Multiplexor sub-block.

The function of the DAU is to supply DRAM commands to the DCU.

The DCU requests a command from the DAU by asserting dcu_dau_adv.

The DAU Command Multiplexor requests the Arbitration Logic sub-block to arbitrate the next DRAM access. The Command Multiplexor passes dcu_dau_adv as the re_arbitrate signal to the Arbitration Logic sub-block.

If the RotationSync bit has been cleared, then the arbitration logic grants exclusive access to the CPU and scheduled refreshes. If the bit has been set, regular arbitration occurs. A detailed description of RotationSync is given in section 22.14.12.2.1 on page 408.

Until the Arbitration Logic has a valid result it stalls the DCU by asserting dau_dcu_msn2stall. The Arbitration Logic then returns the selected arbitration winner to the Command Multiplexor which issues the command to the DRAM. The Arbitration Logic could stall for example if it selected a shared read bus access but the Read Multiplexor indicated it was busy by de-asserting read_cmd_rdy[1].

In the case of a read command the read data from the DRAM is multiplexed back to the read requestor by the Read Multiplexor. In the case of a write operation the Write Multiplexor multiplexes the write data from the selected DIU write requestor to the DCU before the write command can occur. If the write data is not available then the Command Multiplexor will keep dau_dcu_valid de-asserted. This will stall the DCU until the write command is ready to be issued.

Arbitration for non-CPU writes occurs in advance. The DCU provides a signal dcu_dau_wadv which the Command Multiplexor issues to the Arbitrate Logic as re_arbitrate_wadv. If arbitration is blocked by the Write Multiplexor being busy, as indicated by write_cmd_rdy [1] being de-asserted, then the Arbitration Logic will stall the DCU by asserting dau_dcu_msn2stall until the Write Multiplexor is ready.

22.14.10 Read Accesses

Figure 122:
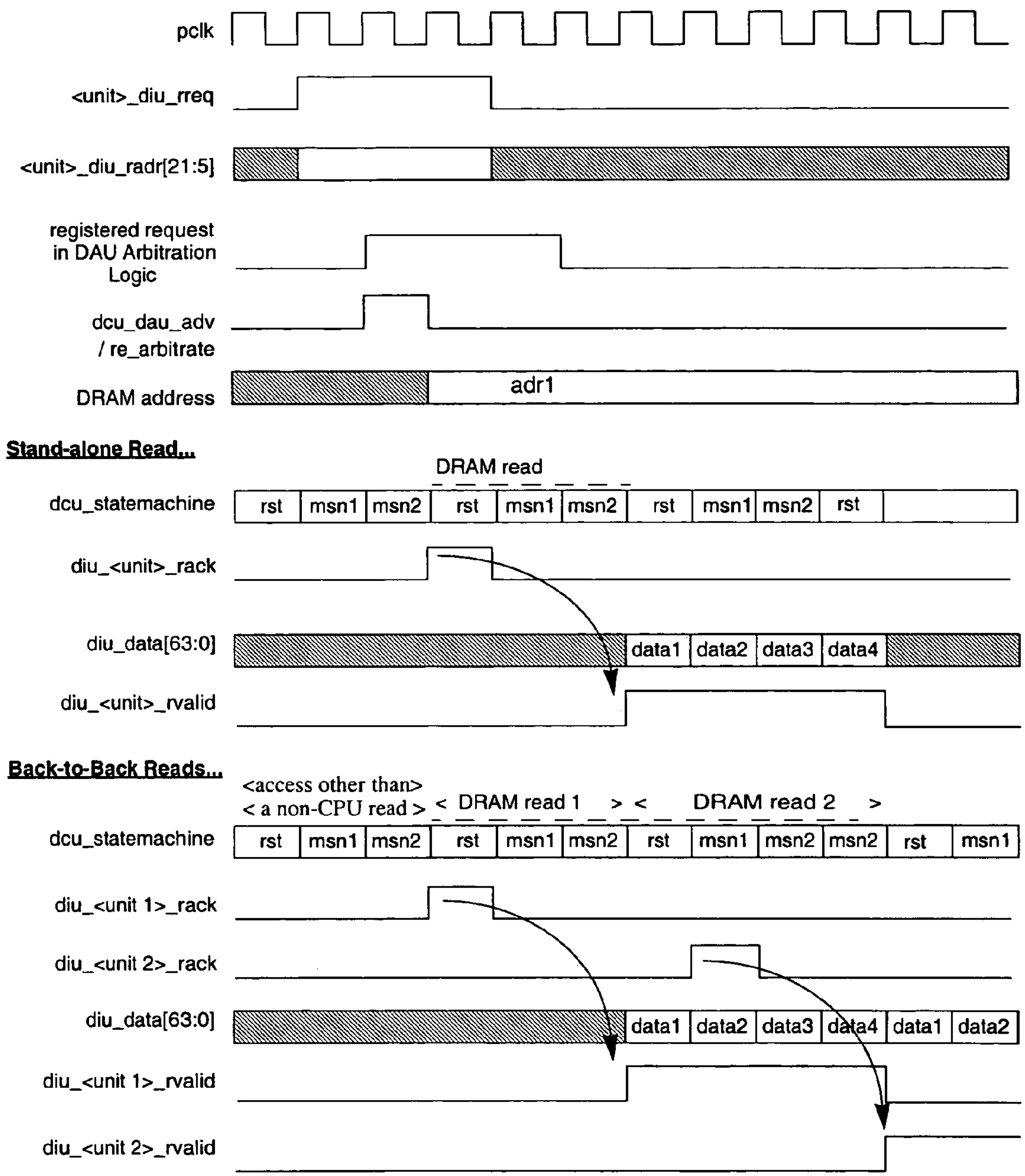

The timing of a non-CPU DIU read access are shown in FIG. 122. Note re_arbitrate is asserted in the MSN2 state of the previous access.

Note the fixed timing relationship between the read acknowledgment and the first rvalid for all non-CPU reads. This means that the second and any later reads in a back-to-back non-CPU sequence have their acknowledgments asserted one cycle later, i.e. in the "MSN 1" DCU state.

Figure 123:
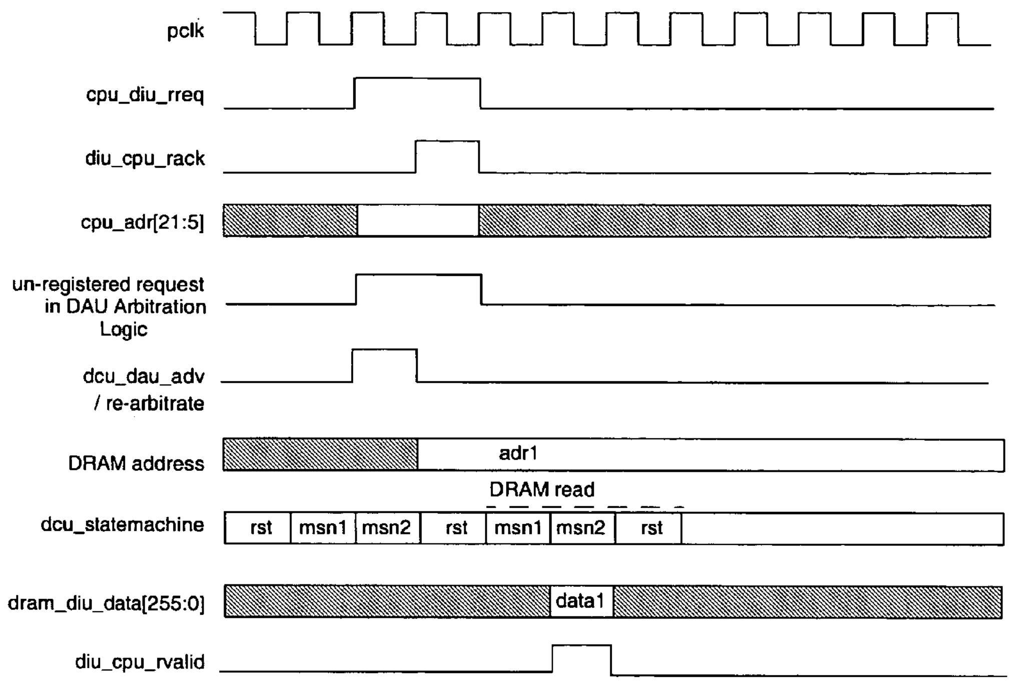

The timing of a CPU DIU read access is shown in FIG. 123. Note re_arbitrate is asserted in the MSN2 state of the previous access.

Some points can be noted from FIG. 122 and FIG. 123.

DIU requests:

For non-CPU accesses the <unit>_diu_rreq signals are registered before the arbitration can occur.

For CPU accesses the cpu_diu_rreq signal is not registered to reduce CPU DIU access latency.

Arbitration occurs when the dcu_dau_adv signal from the DCU is asserted. The DRAM address for the arbitration winner is available in the next cycle, the RST state of the DCU.

The DRAM access starts in the MSN1 state of the DCU and completes in the RST state of the DCU.

Read data is available:

In the MSN2 cycle where it is output unregistered to the CPU

In the MSN2 cycle and registered in the DAU before being output in the next cycle to all other read requesters in order to ease timing.

The DIU protocol is in fact:

Pipelined i.e. the following transaction is initiated while the previous transfer is in progress.

Split transaction i.e. the transaction is split into independent address and data transfers.

Some general points should be noted in the case of CPU accesses:

Since the CPU request is not registered in the DIU before arbitration, then the CPU must generate the request, route it to the DAU and complete arbitration all in 1 cycle. To facilitate this CPU access is arbitrated late in the arbitration cycle (see Section 22.14.12.2).

Since the CPU read data is not registered in the DAU and CPU read data is available 8 ns after the start of the access then 2.4 ns are available for routing and any shallow logic before the CPU read data is captured by the CPU (see Section 22.14.4).

Figure 124:
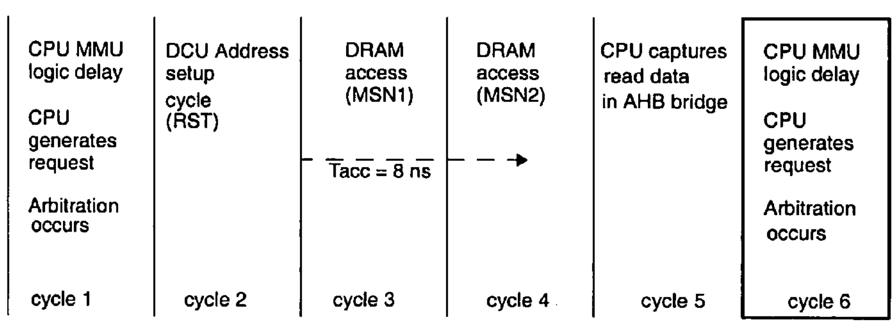

The phases of CPU DIU read access are shown in FIG. 124. This matches the timing shown in Table 110.

22.14.10.2 Write Accesses

Figure 125:
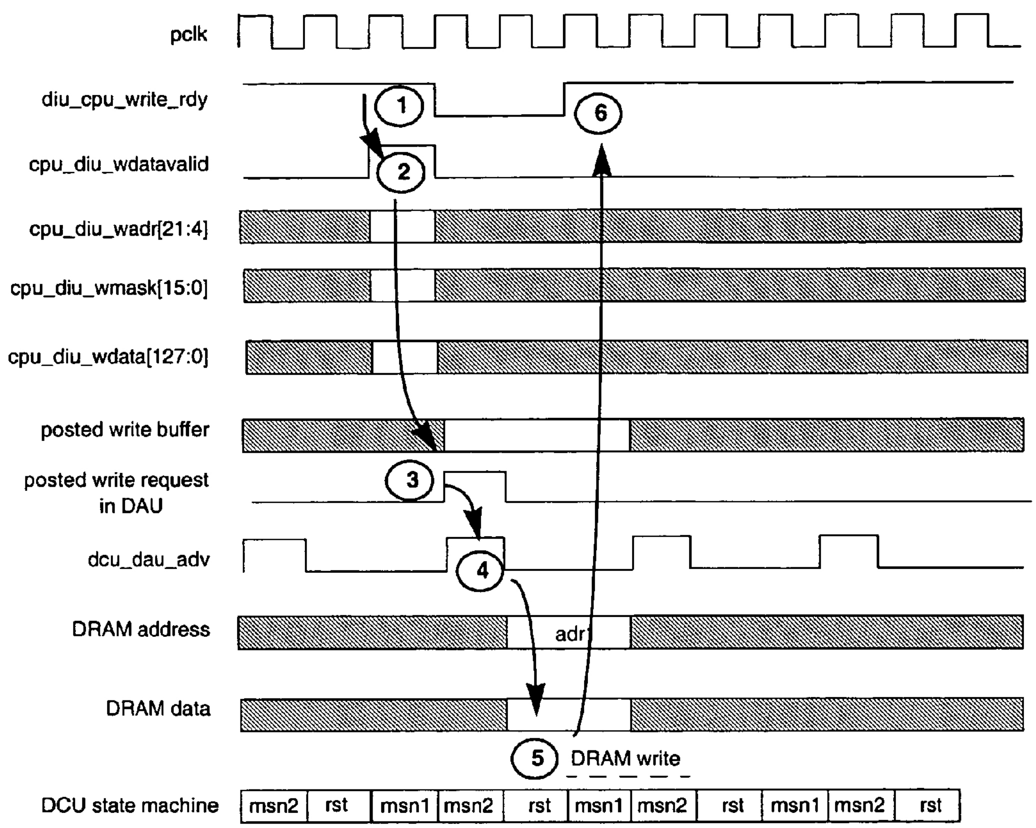

CPU writes are posted into a 1-deep write buffer in the DIU and written to DRAM as shown below in FIG. 125.

The sequence of events is as follows:—

[1] The DIU signals that its buffer for CPU posted writes is empty (and has been for some time in the case shown).

[2] The CPU asserts cpu_diu_wdatavalid to enable a write to the DIU buffer and presents valid address, data and write mask. The CPU considers the write posted and thus complete in the cycle following [2] in the diagram below.

[3] The DIU stores the address/data/mask in its buffer and indicates to the arbitration logic that a posted write wishes to participate in any upcoming arbitration.

[4] Provided the CPU still has a pre-access entitlement left, or is next in line for a round-robin award, a slot is arbitrated in favour of the posted write. Note that posted CPU writes have higher arbitration priority than simultaneous CPU reads.

[5] The DRAM write occurs.

[6] The earliest that "diu_cpu_write_rdy" can be re-asserted in the "MSN1" write. In the same cycle, having seen the re-assertion, the CPU can asynchronously turn around "cpu_diu_wdatavalid" and enable a subsequent posted write, should it wish to do so.

The timing of a non-CPU/non-CDU DIU write access is shown below in FIG. 126.

Compared to a read access, write data is only available from the requester 4 cycles after the address. An extra cycle is used to ensure that data is first registered in the DAU, before being despatched to DRAM. As a result, writes are pre-arbitrated 5 cycles in advance of the main arbitration decision to actually write the data to memory.

The diagram above shows the following sequence of events:—

[1] A non-CPU block signals a write request.

[2] A registered version of this is available to the DAU arbitration logic.

[3] Write pre-arbitration occurs in favour of the requester.

[4] A write acknowledgment is returned by the DIU.

[5] The pre-arbitration will only be upheld if the requester supplies 4 consecutive write data quarter-words, qualified by an asserted wvalid flag.

[6] Provided this has happened, the main arbitration logic is in a position at [6] to reconfirm the pre-arbitration decision. Note however that such reconfirmation may have to wait a further one or two DRAM accesses, if the write is pre-empted by a CPU pre-access and/or a scheduled refresh.

[7] This is the earliest that the write to DRAM can occur.

Note that neither the arbitration at [8] nor the pre-arbitration at [9] can award its respective slot to a non-CPU write, due to the ban on back-to-back accesses.

Figure 127:
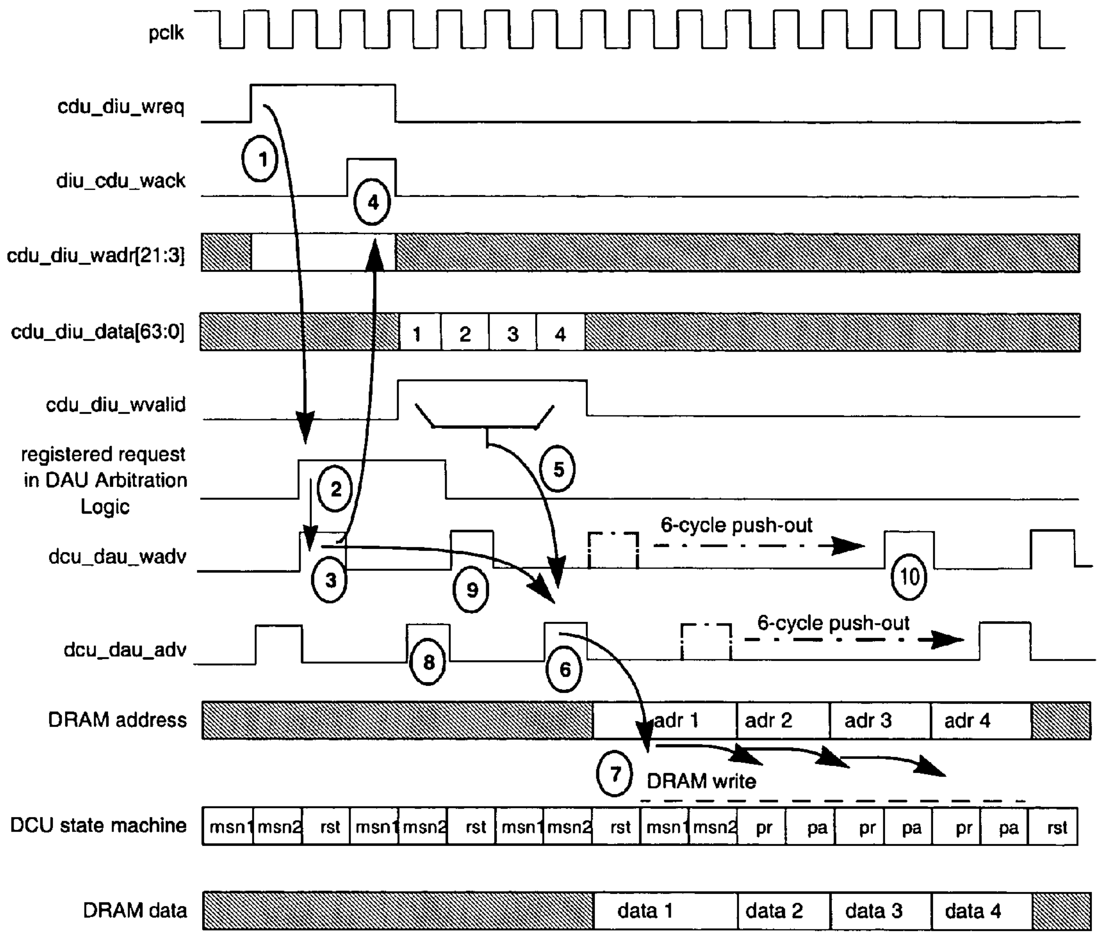

The timing of a CDU DIU write access is shown overleaf in FIG. 127.

This is similar to a regular non-CPU write access, but uses page mode to carry out 4 consecutive DRAM writes to contiguous addresses. As a consequence, subsequent accesses are delayed by 6 cycles, as shown in the diagram.

22.14.10.3 Back-To-Back CPU Accesses

CPU accesses are pre-accesses in front of main timeslots i.e. every CPU access is normally separated by a main timeslot. However, if the EnableCPURoundRobin configuration bit is set then the CPU will win any unused timeslots which would have gone to Refresh. This allows for the possibility of back to back CPU accesses i.e.

unused round-robin CPU access followed by a CPU pre-access or pairs of unused round-robin CPU accesses.

The CPU-DIU protocols described in Section 22.9 and Section 22.14.10 impose a restriction on back-to-back CPU accesses. Section 22.9.2 Read Protocol for CPU indicates that if the CPU is doing a read transaction it cannot issue another request until the read is complete i.e. until it has received a diu_cpu_rvalid pulse. This follows from the single AHB master interface presented by LEON to the CPU block: a second transaction cannot start until at least the same cycle as the READY signal for the first transaction is received. The CPU block imposes the following restrictions:

The earliest a cpu_diu_rreq can be issued is after a gap bf 1 cycle following diu_cpu_rvalid.

The earliest a diu_cpu_wdatavalid can be issued is after a gap of 1 cycle following diu_cpu_rvalid.

This leads to the following back-to-back CPU access behaviour.

READ-READ: accesses can happen separated by main timeslots

Require 2nd cpu_diu_rreq asserted with maximum 2 cycles gap from 1st diu_cpu_rvalid i.e. by next DIU MSN2 state since CPU reads are arbitrated in the DIU MSN2 state and cpu_diu_rreq is a combinatorial input to the DAU arbitration logic.

Actual implementation is cpu_diu_rreq can be issued after a gap of 1 cycle following diu_cpu_rvalid (meets requirement).

READ-WRITE: accesses can happen separated by main timeslots

Require cpu_diu_wdatavalid asserted with maximum 1 cycle gap from diu_cpu_rvalid i.e. by next DIU MSN1 as CPU write must be accepted in posted write buffer before it can participate in the arbitration in the DIU MSN2 state.

Actual implementation is a gap of 1 cycle from diu_cpu_rvalid assertion to cpu_diu_wdatavalid assertion (meets requirement).

WRITE-WRITE: accesses can happen in adjacent timeslots

Require 2nd cpu_diu_wdatavalid asserted combinatorially with diu_cpu_write_rdy re-assertion i.e. by next DIU MSN1 state as CPU write must be accepted in posted write buffer before it can participate in the arbitration in the DIU MSN2 state.

Actual implementation is identical.

WRITE-READ: accesses can happen in adjacent timeslots

Require cpu_diu_rreq asserted with maximum 1 cycle gap from diu_cpu_write_rdy assertion i.e. by next DIU MSN2 state since CPU reads are arbitrated in the MSN2 state and cpu_diu_rreq is a combinatorial input to the DAU arbitration logic. The minimum gap from cpu_diu_vdatavalid assertion to diu_cpu_write_rdy assertion is 2 cycles. So the requirement translates to a maximum gap of 3 cycles in cpu_diu_rreq assertion from cpu_diu_wdatavalid assertion.

Actual implementation is a gap of 1 cycle from cpu_diu_rreq assertion from cpu_diu_wdatavalid assertion (meets requirement).

22.14.11 Command Multiplexor Sub-Block

TABLE 136

Command Multiplexor Sub-block IO Definition

| Port name | Pins | I/O | Description |
|---|---|---|---|
| **Clocks and Resets** | | | |
| pclk | 1 | In | System Clock |
| prst_n | 1 | In | System reset, synchronous active low |
| **DIU Read Interface to SoPEC Units** | | | |
| <unit>_diu_radr[21:5] | 17 | In | Read address to DIU 17 bits wide (256-bit aligned word). |
| diu_<unit>_rack | 1 | Out | Acknowledge from DIU that read request has been accepted and new read address can be placed on <unit>_diu_radr |
| cpu_adr[21:4] | 18 | In | CPU address for read from DRAM. |
| **DIU Write Interface to SoPEC Units** | | | |
| <unit>_diu_wadr[21:5] | 17 | In | Write address to DIU except CPU, CDU 17 bits wide (256-bit aligned word) |
| cdu_diu_wadr[21:3] | 19 | In | CDU Write address to DIU 19 bits wide (64-bit aligned word) Addresses cannot cross a 256-bit word DRAM boundary. |
| diu_<unit>_wack | 1 | Out | Acknowledge from DIU that write request has been accepted and new write address can be placed on <unit>_diu_radr |
| **Outputs to CPU Interface and Arbitration Logic sub-block** | | | |
| re_arbitrate | 1 | Out | Signalling telling the arbitration logic to choose the next arbitration winner. |
| re_arbitrate_wadv | 1 | Out | Signal telling the arbitration logic to choose the next arbitration winner for non-CPU writes 2 timeslots in advance |
| **Debug Outputs to CPU Configuration and Arbitration Logic Sub-block** | | | |
| write_sel | 5 | Out | Signal indicating the SoPEC Unit for which the current write transaction is occurring. Encoding is described in Table 133. |

TABLE 136-continued

Command Multiplexor Sub-block IO Definition

| Port name | Pins | I/O | Description |
|---|---|---|---|
| write_complete | 1 | Out | Signal indicating that write transaction to SoPEC Unit indicated by write_sel is complete. |
| Inputs from CPU Interface and Arbitration Logic sub-block | | | |
| arb_gnt | 1 | In | Signal lasting 1 cycle which indicates arbitration has occurred and arb_sel is valid. |
| arb_sel | 5 | In | Signal indicating which requesting SoPEC Unit has won arbitration. Encoding is described in Table 133. |
| dir_sel | 2 | In | Signal indicating which sense of access associated with arb_sel<br>00: issue non-CPU write<br>01: read winner<br>10: write winner<br>11: refresh winner |
| Inputs from Read Write Multiplexor Sub-block | | | |
| write_data_valid | 2 | In | Signal indicating that valid write data is available for the current command.<br>00 = not valid<br>01 = CPU write data valid<br>10 = non-CPU write data valid<br>11 = both CPU and non-CPU write data valid |
| wdata | 256 | In | 256-bit non-CPU write data |
| wdata_mask | 32 | In | Byte mask for non-CPU write data. |
| cpu_wdata | 128 | In | 128-bit CPU write data from posted write buffer. |
| cpu_wadr[21:4] | 18 | In | CPU write address [21:4] from posted write buffer. |
| cpu_wmask | 16 | In | CPU byte mask from posted write buffer. |
| Outputs to Read Write Multiplexor Sub-block | | | |
| write_data_accept | 2 | Out | Signal indicating the Command Multiplexor has accepted the write data from the write multiplexor<br>00 = not valid<br>01 = accepts CPU write data<br>10 = accepts non-CPU write data<br>11 = not valid |
| Inputs from DCU | | | |
| dcu_dau_adv | 1 | In | Signal indicating to DAU to supply next command to DCU |
| dcu_dau_wadv | 1 | In | Signal indicating to DAU to initiate next non-CPU write |
| Outputs to DCU | | | |
| dau_dcu_adr[21:5] | 17 | Out | Signal indicating the address for the DRAM access. This is a 256-bit aligned DRAM address. |
| dau_dcu_rwn | 1 | Out | Signal indicating the direction for the DRAM access (1 = read, 0 = write). |
| dau_dcu_cduwpage | 1 | Out | Signal indicating if access is a CDU write page mode access (1 = CDU page mode, 0 = not CDU page mode). |
| dau_dcu_refresh | 1 | Out | Signal indicating that a refresh command is to be issued. If asserted dau_dcu_adr, dau_dcu_rwn and dau_dcu_cduwpage are ignored. |
| dau_dcu_wdata | 256 | Out | 256-bit write data to DCU |
| dau_dcu_wmask | 32 | Out | Byte encoded write data mask for 256-bit dau_dcu_wdata to DCU |

22.14.11.1 Command Multiplexor Sub-Block Description

The Command Multiplexor sub-block issues read, write or refresh commands to the DCU, according to the SoPEC Unit selected for DRAM access by the Arbitration Logic. The Command Multiplexor signals the Arbitration Logic to perform arbitration to select the next SoPEC Unit for DRAM access. It does this by asserting the re_arbitrate signal. re_arbitrate is asserted when the DCU indicates on dcu_dau_adv that it needs the next command.

Figure 128:
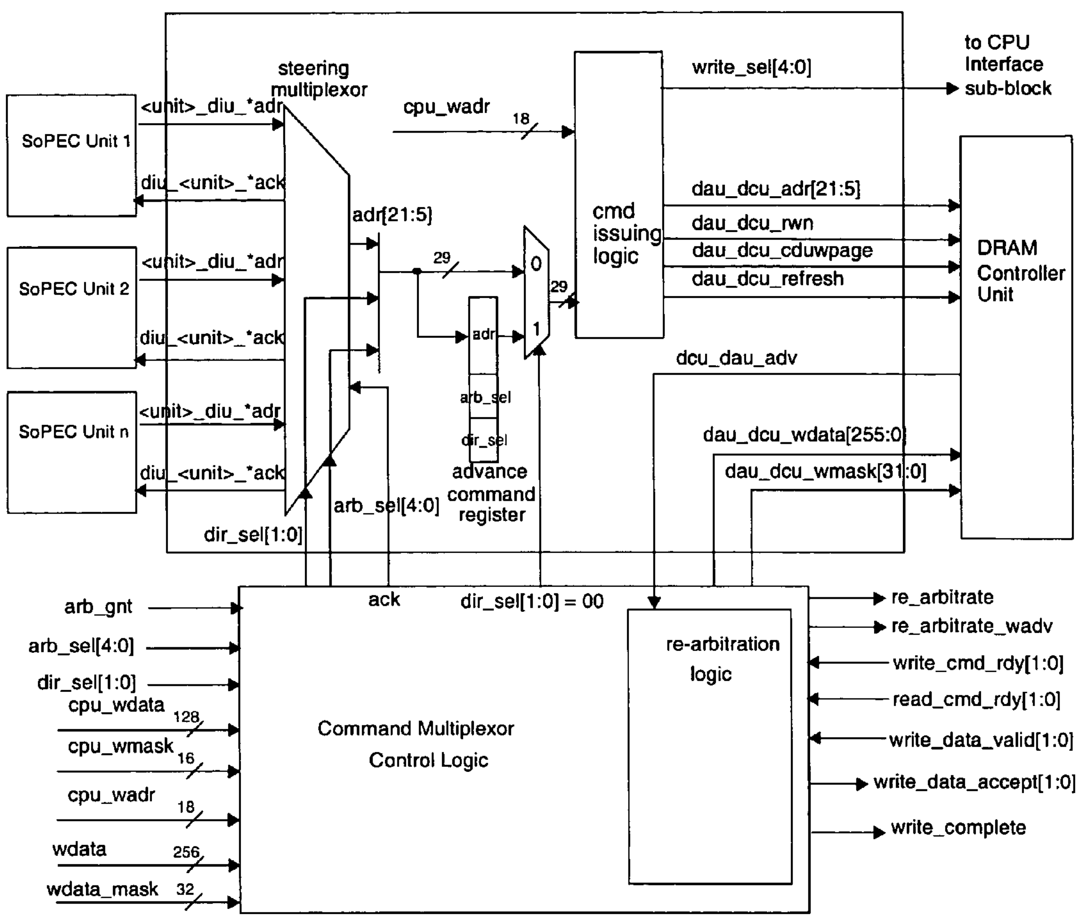

The Command Multiplexor is shown in FIG. 128.

Initially, the issuing of commands is described. Then the additional complexity of handling non-CPU write commands arbitrated in advance is introduced.

DAU-DCU Interface

See Section 22.14.5 for a description of the DAU-DCU interface.

Generating re_arbitrate

The condition for asserting re_arbitrate is that the DCU is looking for another command from the DAU. This is indicated by dcu_dau_adv being asserted.

re_arbitrate=dcu_dau_adv

Interface to SoPEC DIU Requesters

When the Command Multiplexor initiates arbitration by asserting re_arbitrate to the Arbitration Logic sub-block, the arbitration winner is indicated by the arb_sel[4:0] and dir_sel[1:0] signals returned from the Arbitration Logic. The validity of these signals is indicated by arb_gnt. The encoding of arb_sel[4:0] is shown in Table 133.

Figure 129:
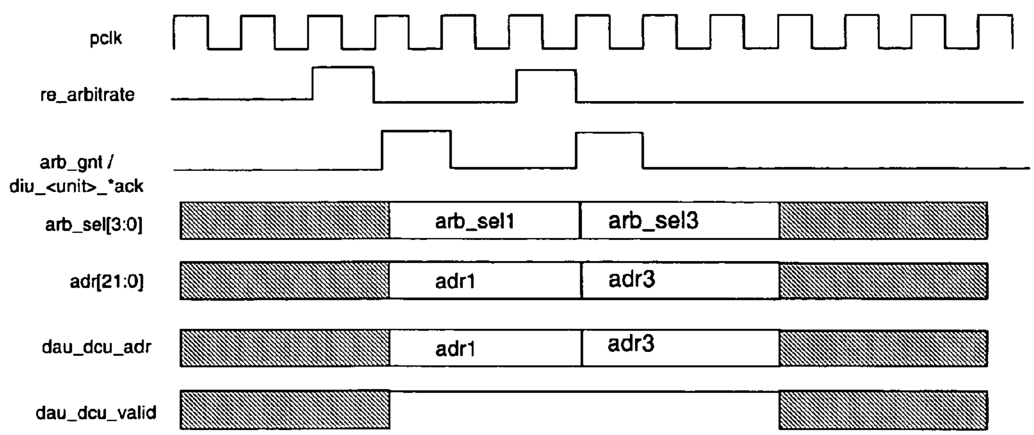

The value of arb_sel[4:0] is used to control the steering multiplexor to select the DIU address of the winning arbitration requester. The arb_gnt signal is decoded as an acknowledge, diu_<unit>_*ack back to the winning DIU requester. The timing of these operations is shown in FIG. 129. adr[21:0] is the output of the steering multiplexor controlled by arb_sel[4:0]. The steering multiplexor can acknowledge DIU requestors in successive cycles.

Command Issuing Logic

The address presented by the winning SoPEC requestor from the steering multiplexor is presented to the command issuing logic together with arb_sel[4:0] and dir_sel[1:0].

The command issuing logic translates the winning command into the signals required by the DCU. adr_[21:0], arb_sel[4:0] and dir_sel[1:0] comes from the steering multiplexor.

```
dau_dcu_adr[21:5] = adr[21:5]
dau_dcu_rwn = (dir_sel[1:0] == read)
dau_dcu_cduwpage = (arb_sel[4:0] == CDU write)
dau_dcu_refresh = (dir_sel[1:0]== refresh)
```

dau_dcu_valid indicates that a valid command is available to the DCU.

For a write command, dau_dcu_valid will not be asserted until there is also valid write data present. This is indicated by the signal write_data_valid[1:0] from the Read Write Data Multiplexor sub-block.

For a write command, the data issued to the DCU on dau_dcu_wdata[255:0] is multiplexed from cpu_wdata[127:0] and wdata[255:0] depending on whether the write is a CPU or non-CPU write. The write data from the Write Multiplexor for the CDU is available on wdata[63:0]. This data must be issued to the DCU on dau_dcu_wdata[255:0]. wdata[63:0] is copied to each 64-bit word of dau_dcu_wdata [255:0].

```
dau_dcu_wdata[255:0] = 0x00000000
if (arb_sel[4:0]==CPU write) then
    dau_dcu_wdata[127:0] = cpu_wdata[127:0]
    dau_dcu_wdata[255:127] = cpu_wdata[127:0]
elsif (arb_sel[4:0]==CDU write)) then
    dau_dcu_wdata[63:0] = wdata[63:0]
    dau_dcu_wdata[127:64] = wdata[63:0]
    dau_dcu_wdata[191:128] = wdata[63:0]
    dau_dcu_wdata[255:192] = wdata[63:0]
else
    dau_dcu_wdata[255:0] = wdata[255:0]
```

CPU Write Masking

The CPU write data bus is only 128 bits wide. cpu_wmask [15:0] indicates how many bytes of that 128 bits should be written. The associated address cpu_wadr[21:4] is a 128-bit aligned address. The actual DRAM write must be a 256-bit access. The command multiplexor issues the 256-bit DRAM address to the DCU on dau_dcu_adr[21:5]. cpu_wadr[4] and cpu_wmask[15:0] are used jointly to construct a byte write mask dau_dcu_wmask[31:0] for this 256-bit write access.

UHU/UDU Write Masking

For UHU/UDU writes, each quarter-word transferred by the requester is accompanied by an independent byte-wide mask <uhu/udu>_diu_wmask[7:0]. The cumulative 32-bit mask from the 4 data transfer cycles is used to make up wdata_mask[31:0]. This, in turn, is reflected in dau_dcu_wmask[31:0] during execution of the actual write.

CDU Write Masking

The CPU performs four 64-bit word writes to 4 contiguous 256-bit DRAM addresses with the first address specified by cdu_diu_wadr[21:3]. The write address cdu_diu_wadr [21:5] is 256-bit aligned with bits cdu_diu_wadr[4:3] allowing the 64-bit word to be selected. If these 4 DRAM words lie in the same DRAM row then an efficient access will be obtained.

The command multiplexor logic must issue 4 successive accesses to 256-bit DRAM addresses cdu_diu_wadr[21:5],+1,+2,+3.

dau_dcu_wmask[31:0] indicates which 8 bytes (64-bits) of the 256-bit word are to be written. dau_dcu_wmask[31:0] is calculated using cdu_diu_wadr[4:3] i.e. bits 8*cdu_diu_wadr[4:3] to 8*(cdu_diu_wadr[4:3]+1)−1 of dau_dcu_wmask[31:0]are asserted.

Arbitrating Non-CPU Writes in Advance

In the case of a non-CPU write commands, the write data must be transferred from the SoPEC requester before the write can occur. Arbitration should occur early to allow for any delay for the write data to be transferred to the DRAM.

Figure 126:
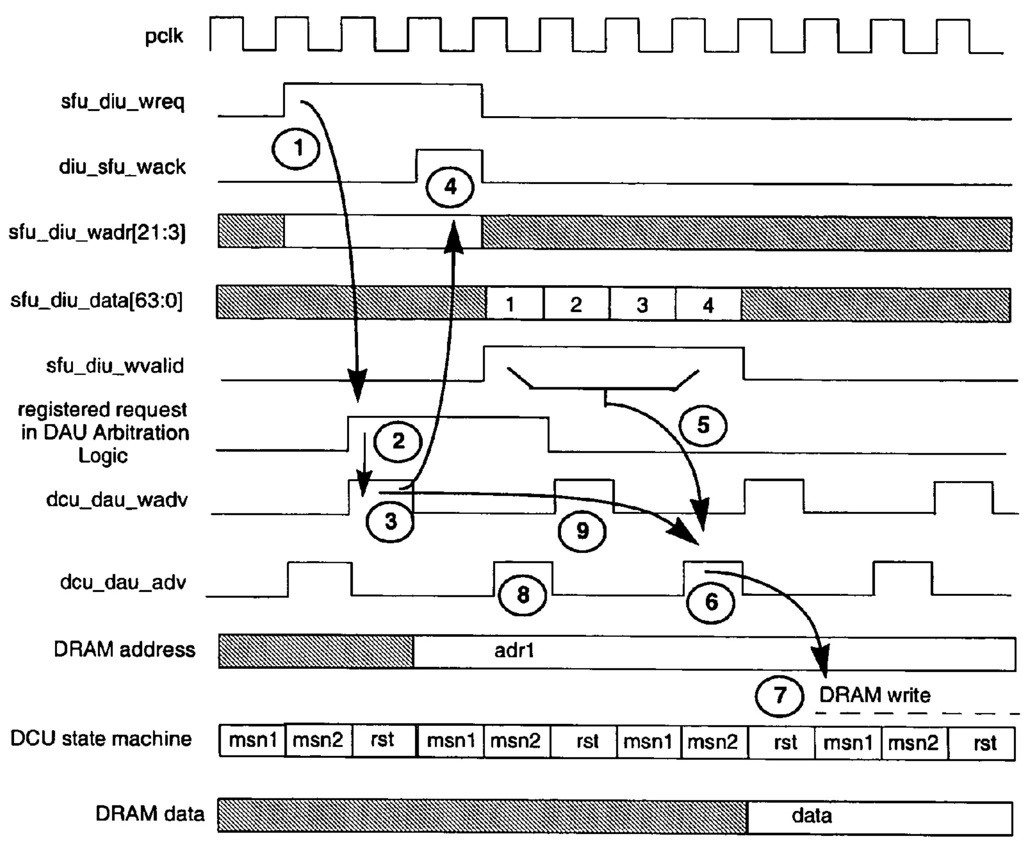

FIG. 126 indicates that write data transfer over 64-bit busses will take a further 4 cycles after the address is transferred. The arbitration must therefore occur 4 cycles in advance of arbitration for read accesses, FIG. 122 and FIG. 123, or for CPU writes FIG. 125. Arbitration of CDU write accesses, FIG. 127, should take place 1 cycle in advance of arbitration for read and CPU write accesses. To simplify implementation CDU write accesses are arbitrated 4 cycles in advance, similar to other non-CPU writes.

Figure 130:
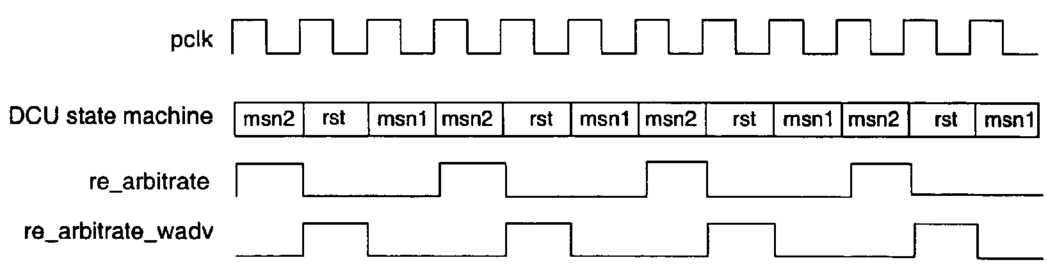

The Command Multiplexor generates another version of re_arbitrate called re_arbitrate_wadv based on the signal dcu_dau_wadv from the DCU. In the 3 cycle DRAM access dcu_dau_adv and therefore re_arbitrate are asserted in the MSN2 state of the DCU state-machine. dcu_dau_wadv and therefore re_arbitrate_wadv will therefore be asserted in the following RST state, see FIG. 130. This matches the timing required for non-CPU writes shown in FIG. 126 and FIG. 127.

re_arbitrate_wadv causes the Arbitration Logic to perform an arbitration for non-CPU in advance.

```
re_arbitrate = dcu_dau_adv
re_arbitrate_wadv = dcu_dau_wadv
```

If the winner of this arbitration is a non-CPU write then arb_gnt is asserted and the arbitration winner is output on arb_sel[4:0] and dir_sel[1:0]. Otherwise arb_gnt is not asserted.

Since non-CPU write commands are arbitrated early, the non-CPU command is not issued to the DCU immediately but instead written into an advance command register.

```
if (arb_sel(4:0 == non-CPU write) then
    advance_cmd_register[3:0] = arb_sel[4:0]
    advance_cmd_register[5:4] = dir_sel[1:0]
    advance_cmd_register[27:6] = adr[21:0]
```

If a DCU command is in progress then the arbitration in advance of a non-CPU write command will overwrite the steering multiplexor input to the command issuing logic. The arbitration in advance happens in the DCU MSN1 state. The new command is available at the steering multiplexor in the MSN2 state. The command in progress will have been latched in the DRAM by MSN falling at the start of the MSN1 state.

Issuing Non-CPU Write Commands

The arb_sel[4:0] and dir_sel[1:0] values generated by the Arbitration Logic reflect the out of of order arbitration sequence.

This out of order arbitration sequence is exported to the Read Write Data Multiplexor sub-block. This is so that write data in available in time for the actual write operation to DRAM. Otherwise a latency would be introduced every time a write command is selected.

However, the Command Multiplexor must execute the command stream in-order.

In-order command execution is achieved by waiting until re_arbitrate has advanced to the non-CPU write timeslot from which re_arbitrate_vadv has previously issued a non-CPU write written to the advance command register.

If re_arbitrate_wadv arbitrates a non-CPU write in advance then within the Arbitration Logic the timeslot is marked to indicate whether a write was issued.

When re_arbitrate advances to a write timeslot in the Arbitration Logic then one of two actions can occur depending on whether the slot was marked by re_arbitrate_wadv to indicate whether a write was issued or not.

Non-CPU write arbitrated by re_arbitrate_wadv

If the timeslot has been marked as having issued a write then the arbitration logic responds to re_arbitrate by issuing arb_sel[4:0], dir_sel[1:0] and asserting arb_gnt as for a normal arbitration but selecting a non-CPU write access. Normally, re_arbitrate does not issue non-CPU write accesses. Non-CPU writes are arbitrated by re_arbitrate_wadv. dir_sel[1:0]==00 indicates a non-CPU write issued by re_arbitrate.

The command multiplexor does not write the command into the advance command register as it has already been placed there earlier by re_arbitrate_wadv. Instead, the already present write command in the advance command register is issued when write_data_valid[J]=1. Note, that the value of arb_sel[4:0] issued by re_arbitrate could specify a different write than that in the advance command register since time has advanced. It is always the command in the advance command register that is issued. The steering multiplexor in this case must not issue an acknowledge back to SoPEC requester indicated by the value of arb_sel[4:0].

```
if (dir_sel[1:0] == 00) then
    command_issuing_logic[27:0] == advance_cmd_register[27:0]
else
    command_issuing_logic[27:0] == steering_multiplexor[27:0]
ack = arb_gnt AND NOT (dir_sel[1:0] == 00)
```

Non-CPU write not arbitrated by re_arbitrate_wadv

If the timeslot has been marked as not having issued a write, the re_arbitrate will use the un-used read timeslot selection to replace the un-used write timeslot with a read timeslot according to Section 22.10.6.2 Unused read timeslots allocation.

The mechanism for write timeslot arbitration selects non-CPU writes in advance. But the selected non-CPU write is stored in the Command Multiplexor and issued when the write data is available. This means that even if this timeslot is overwritten by the CPU reprogramming the timeslot before the write command is actually issued to the DRAM, the originally arbitrated non-CPU write will always be correctly issued.

Accepting Write Commands

When a write command is issued then write_data_accept[1:0] is asserted. This tells the Write Multiplexor that the current write data has been accepted by the DRAM and the write multiplexor can receive write data from the next arbitration winner if it is a write. write_data_accept[1:0] differentiates between CPU and non-CPU writes. A write command is known to have been issued when re_arbitrate_wadv to decide on the next command is detected.

In the case of CDU writes the DCU will generate a signal dcu_dau_cdu_waccept which tells the Command Multiplexor to issue a write_data_accept[1]. This will result in the Write Multiplexor supplying the next CDU write data to the DRAM.

```
write_data_accept[0] = RISING EDGE(re_arbitrate_wadv)
                AND
command_issuing_logic(dir_sel[1]==1)
                AND
command_issuing_logic(arb_sel[4:0]==CPU)
    write_data_accept[1] = (RISING EDGE(re_arbitrate_wadv)
                AND
command_issuing_logic(dir_sel[1]==1)
                AND
command_issuing_logic(arb_sel[4:0]==non_CPU))
                OR dcu_dau_cduwaccept==1
```

Debug Logic Output to CPU Configuration and Arbitration Logic Sub-Block write_sel[4:0] reflects the value of arb_sel[4:0] at the command issuing logic. The signal write_complete is asserted when every any bit of write_data_accept[1:0] is asserted.

write_complete=write_data_accept[0] OR write_data_accept [1]

write_sel[4:0] and write_complete are CPU readable from the DIUPerformance and WritePerformance status registers. When write_complete is asserted write_sel[4:01] will indicate which write access the DAU has issued.

22.14.2 CPU Configuration and Arbitration Logic Sub-Block

TABLE 137

CPU Configuration and Arbitration Logic Sub-block IO Definition

| Port name | Pins | I/O | Description |
|---|---|---|---|
| | | | Clocks and Resets |
| Pclk | 1 | In | System Clock |
| prst_n | 1 | In | System reset, synchronous active low |

TABLE 137-continued

CPU Configuration and Arbitration Logic Sub-block IO Definition

| Port name | Pins | I/O | Description |
| --- | --- | --- | --- |
| | | | CPU Interface data and control signals |
| cpu_adr[10:2] | 9 | In | 9 bits (bits 10:2) are required to decode the configuration register address space. |
| cpu_dataout | 32 | In | Data bus from the CPU for configuration register writes. |
| diu_cpu_data | 32 | Out | Configuration, status and debug read data bus to the CPU |
| diu_cpu_debug_valid | 1 | Out | Signal indicating the data on the diu_cpu_data bus is valid debug data. |
| cpu_rwn | 1 | In | Common read/not-write signal from the CPU |
| cpu_acode | 2 | In | CPU access code signals.<br>cpu_acode[0] - Program (0)/Data (1) access<br>cpu_acode[1] - User (0)/Supervisor (1) access<br>The DAU will only allow supervisor mode accesses to data space. |
| cpu_diu_sel | 1 | In | Block select from the CPU. When cpu_diu_sel is high both cpu_adr and cpu_dataout are valid |
| diu_cpu_rdy | 1 | Out | Ready signal to the CPU. When diu_cpu_rdy is high it indicates the last cycle of the access. For a write cycle this means cpu_dataout has been registered by the block and for a read cycle this means the data on diu_cpu_data is valid. |
| diu_cpu_berr | 1 | Out | Bus error signal to the CPU indicating an invalid access. |
| | | | DIU Read Interface to SoPEC Units |
| <unit>_diu_rreq | 11 | In | SoPEC unit requests DRAM read. |
| | | | DIU Write Interface to SoPEC Units |
| diu_cpu_write_rdy | 1 | In | Indicator that CPU posted write buffer is empty. |
| <unit>_diu_wreq | 4 | In | Non-CPU SoPEC unit requests DRAM write. |
| | | | Inputs from Command Multiplexor sub-block |
| re_arbitrate | 1 | In | Signal telling the arbitration logic to choose the next arbitration winner. |
| re_arbitrate_wadv | 1 | In | Signal telling the arbitration logic to choose the next arbitration winner for non-CPU writes 2 timeslots in advance |
| | | | Outputs to DCU |
| dau_dcu_msn2stall | 1 | Out | Signal indicating from DAU Arbitration Logic which when asserted stalls DCU in MSN2 state. |
| | | | Inputs from Read and Write Multiplexor sub-block |
| read_cmd_rdy | 2 | In | Signal indicating that read multiplexor is ready for next read read command.<br>00 = not ready<br>01 = ready for CPU read<br>10 = ready for non-CPU read<br>11 = ready for both CPU and non-CPU reads |
| write_cmd_rdy | 2 | In | Signal indicating that write multiplexor is ready for next write command.<br>00 = not ready<br>01 = ready for CPU write<br>10 = ready for non-CPU write<br>11 = ready for both CPU and non-CPU write |
| | | | Outputs to other DAU sub-block s |
| arb_gnt | 1 | In | Signal lasting 1 cycle which indicates arbitration has occurred and arb_sel is valid. |
| arb_sel | 5 | In | Signal indicating which requesting SoPEC Unit has won arbitration. Encoding is described in Table 133. |
| dir_sel | 2 | In | Signal indicating which sense of access associated with arb_sel<br>00: issue non-CPU write<br>01: read winner<br>10: write winner<br>11: refresh winner |
| | | | Debug Inputs from Read-Write Multiplexor sub-block |
| read_sel | 5 | In | Signal indicating the SoPEC Unit for which the current read transaction is occurring. Encoding is described in Table 133. |
| read_complete | 1 | In | Signal indicating that read transaction to SoPEC Unit indicated by read_sel is complete. |

TABLE 137-continued

CPU Configuration and Arbitration Logic Sub-block IO Definition

| Port name | Pins | I/O | Description |
|---|---|---|---|
| | | | Debug Inputs from Command Multiplexor sub-block |
| write_sel | 5 | In | Signal indicating the SoPEC Unit for which the current write transaction is occurring. Encoding is described in Table 133. |
| write_complete | 1 | In | Signal indicating that write transaction to SoPEC Unit indicated by write_sel is complete. |
| | | | Debug Inputs from DCU |
| dcu_dau_refreshcomplete | 1 | In | Signal indicating that the DCU has completed a refresh. |
| | | | Debug Inputs from DAU IO |
| various | n | In | Various DAU IO signals which can be monitored in debug mode |

22.14.12

Figure 131:
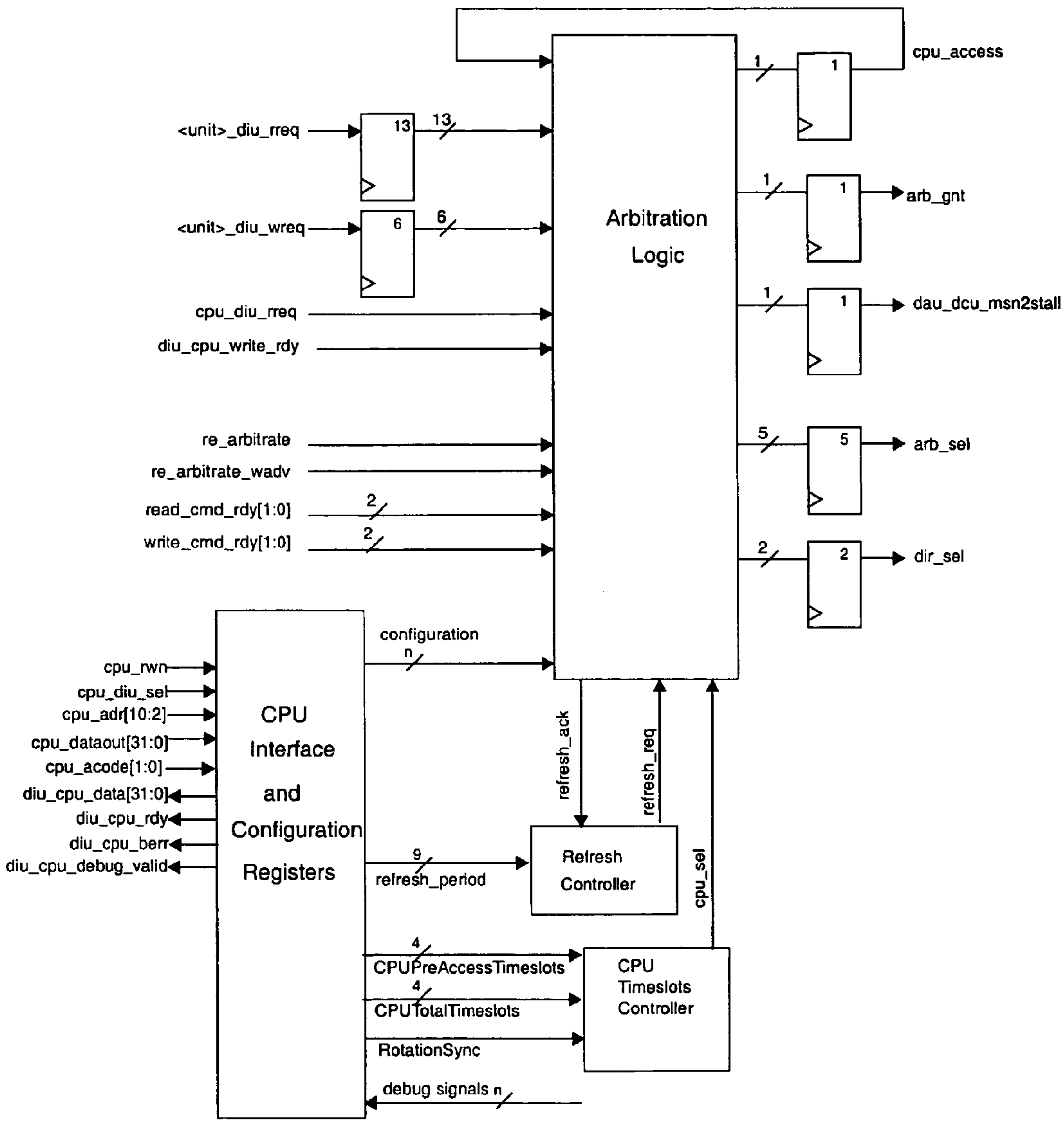

The CPU Interface and Arbitration Logic sub-block is shown in FIG. 131.

22.14.12.1 CPU Interface and Configuration Registers Description

The CPU Interface and Configuration Registers sub-block provides for the CPU to access DAU specific registers by reading or writing to the DAU address space.

The CPU subsystem bus interface is described in more detail in Section 11.4.3. The DAU block will only allow supervisor mode accesses to data space (i.e. cpu_acode[1:0]=b11). All other accesses will result in diu_cpu_berr being asserted.

The configuration registers described in Section 22.14.9 DAU Configuration Registers are implemented here.

22.14.12.2 Arbitration Logic Description

Figure 132:
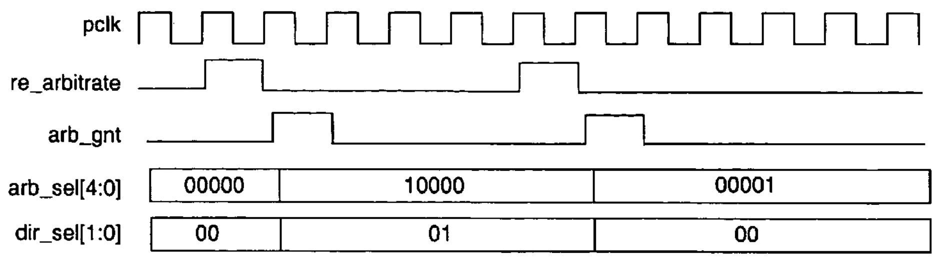
Figure 133:
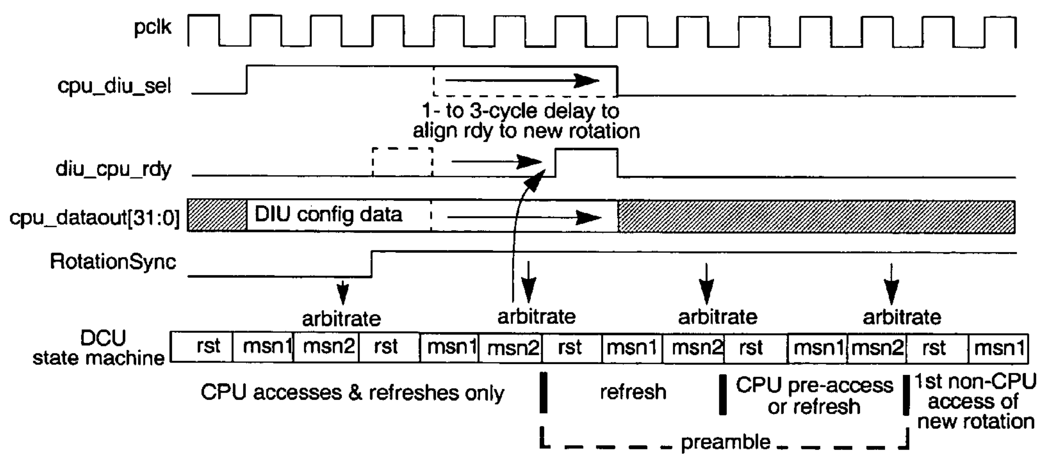

Arbitration is triggered by the signal re_arbitrate from the Command Multiplexor sub-block with the signal arb_gnt indicating that arbitration has occurred and the arbitration winner is indicated by arb_sel[4:0]. The encoding of arb_sel [4:0] is shown in Table 133. The signal dir_sel[1:0] indicates if the arbitration winner is a read, write or refresh. Arbitration should complete within one clock cycle so arb_gnt is normally asserted the clock cycle after re_arbitrate and stays high for 1 clock cycle. arb_sel[4:0] and dir_sel[1:0] remain persistent until arbitration occurs again. The arbitration timing is shown in FIG. 132.

22.14.12.2.1 Rotation Synchronization

A configuration bit, RotationSync, is used to initialize advancement through the timeslot rotation, in order that the CPU will know, on a cycle basis, which timeslot is being arbitrated. This is essential for debug purposes, so that exact arbitration sequences can be reproduced.

In general, if RotationSync is set, slots continue to be arbitrated in the regular order specified by the timeslot rotation. When the bit is cleared, the current rotation continues until the slot pointers for pre- and main arbitration reach zero. The arbitration logic then grants DRAM access exclusively to the CPU and refreshes.

When the CPU again writes to RotationSync to cause a 0-to-1 transition of the bit, the rdy acknowledgment back to the CPU for this write will be exactly coincident with the RST cycle of the initial refresh which heralds the enabling of a new rotation. This refresh, along with the second access which can be either a CPU pre-access or a refresh, (depending on the CPU's request inputs), form a 2-access "preamble" before the first non-CPU requester in the new rotation can be serviced. This preamble is necessary to give the write pre-arbitration the necessary head start on the main arbitration, so that write data can be loaded in time. See FIG. 105 below. The same preamble procedure is followed when emerging from reset.

The alignment of rdy with the commencement of the rotation ensures that the CPU is always able to calculate at any point how far a rotation has progressed. RotationSync has a reset value of 1 to ensure that the default power-up rotation can take place.

Note that any CPU writes to the DIU's other configuration registers should only be made when RotationSync is cleared. This ensures that accesses by non-CPU requesters to DRAM are not affected by partial configuration updates which have yet to be completed.

22.14.2.2 Motivation for Rotation Synchronization

The motivation for this feature is that communications with SoPEC from external sources are synchronized to the internal clock of our position within a DIU full timeslot rotation. This means that if an external source told SOPEC to start a print 3 separate times, it would likely be at three different points within a full DIU rotation. This difference means that the DIU arbitration for each of the runs would be different, which would manifest itself externally as anomalous or inconsistent print performance. The lack of reproducibility is the problem here.

However, if in response to the external source saying to start the print, we caused the internal to pass through a known state at a fixed time offset to other internal actions, this would result in reproducible prints. So, the plan is that the software would do a rotation synchronize action, then writes "Go" into various PEP units to cause the prints. This means the DIU state will be the identical with respect to the PEP units state between separate runs.

22.14.12.2.3 Wind-Down Protocol when Rotation Synchronization is Initiated

When a zero is written to "RotationSync", this initiates a "wind-down protocol" in the DIU, in which any rotation already begun must be fully completed. The protocol implements the following sequence:—

The pre-arbitration logic must reach the end of whatever rotation it is on and stop pre-arbitrating.

Only when this has happened, does the main arbitration consider doing likewise with its current rotation. Note that the main arbitration lags the pre-arbitration by at least 2 DRAM accesses, subject to variation by CPU pre-accesses and/or scheduled refreshes, so that the two arbitration processes are sometimes on different rotations.

Once the main arbitration has reached the end of its rotation, rotation synchronization is considered to be fully activated. Arbitration then proceeds as outlined in the next section.

22.14.12.2.4 Arbitration During Rotation Synchronization

Note that when RotationSync is '0' and, assuming the terminating rotation has completely drained out, then DRAM arbitration is granted according to the following fixed priority order:—

Scheduled Refresh->CPU(W)->CPU(R)->Default Refresh.

CPU pre-access counters play no part in arbitration during this period. It is only subsequently, when emerging from rotation sync, that they are reloaded with the values of CPUPreAccessTimeslots and CPUTotalTimeslots and normal service resumes.

22.14.12.2.5 Timeslot-Based Arbitration

Figure 108:
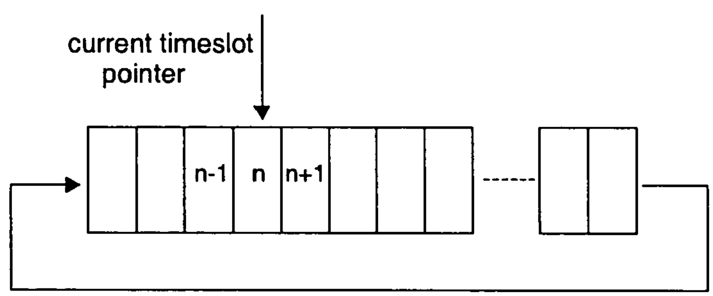
Figure 134:
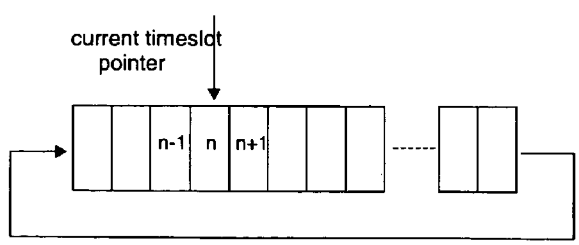
FIG. 134. Timeslot based arbitration
FIG. 135. Timeslot based arbitration with separate pointers
FIG. 136. CPU pre-access write lookahead pointer
FIG. 137. Arbitration hierarchy
FIG. 138. Hierarchical round-robin priority comparison
FIG. 139. Read Multiplexor partition.
Figure 135:
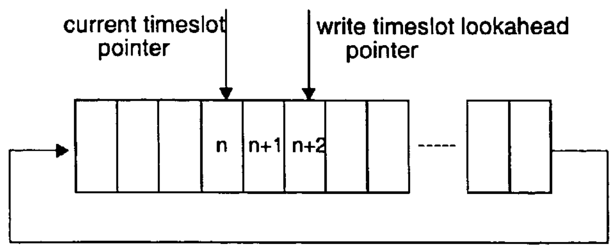
Figure 136:
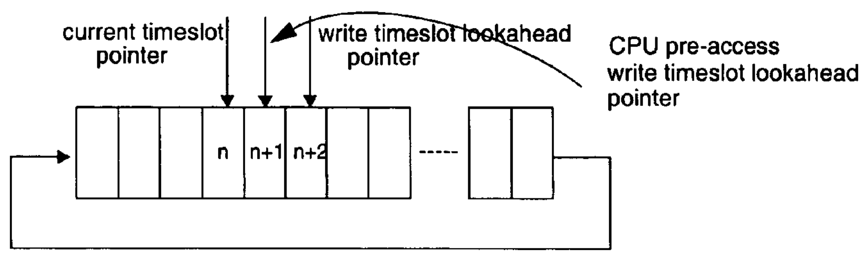

Timeslot-based arbitration works by having a pointer point to the current timeslot. This is shown in FIG. 108 repeated here as FIG. 134. When re-arbitration is signaled the arbitration winner is the current timeslot and the pointer advances to the next timeslot. Each timeslot denotes a single access. The duration of the timeslot depends on the access.

If the SoPEC Unit assigned to the current timeslot is not requesting then the unused timeslot arbitration mechanism outlined in Section 22.10.6 is used to select the arbitration winner. Note that this unused slot re-allocation is guaranteed to produce a result, because of the inclusion of refresh in the round-robin scheme.

Pseudo-code to represent arbitration is given below:

```
if re_arbitrate == 1 then
        arb_gnt = 1
    if current timeslot requesting then
            choose(arb_sel, dir_sel) at current timeslot
        else // un-used timeslot scheme
                choose winner according to un-used timeslot
allocation of Section 22.10.6
        arb_gnt = 0
```

22.14.12.3 Arbitrating Non-CPU Writes in Advance

In the case of a non-CPU write commands, the write data must be transferred from the SoPEC requester before the write can occur. Arbitration should occur early to allow for any delay for the write data to be transferred to the DRAM.

FIG. 126 indicates that write data transfer over 64-bit busses will take a further 4 cycles after the address is transferred. The arbitration must therefore occur 4 cycles in advance of arbitration for read accesses, FIG. 122 and FIG. 123, or for CPU writes FIG. 125. Arbitration of CDU write accesses, FIG. 127, should take place 1 cycle in advance of arbitration for read and CPU write accesses. To simplify implementation CDU write accesses are arbitrated 4 cycles in advance, similar to other non-CPU writes.

The Command Multiplexor generates a second arbitration signal re_arbitrate_wadv which initiates the arbitration in advance of non-CPU write accesses.

The timeslot scheme is then modified to have 2 separate pointers:

re_arbitrate can arbitrate read, refresh and CPU read and write accesses according to the position of the current timeslot pointer.

re_arbitrate_wadv can arbitrate only non-CPU write accesses according to the position of the write lookahead pointer.

Pseudo-code to represent arbitration is given below:

```
//re_arbitrate
if (re_arbitrate == 1) AND (current timeslot pointer!= non-CPU
write) then
   arb_gnt = 1
   if current timeslot requesting then
         choose(arb_sel, dir_sel) at current timeslot
   else // un-used read timeslot scheme
      choose winner according to un-used read timeslot allocation of
Section 22.10.6.2
```

If the SoPEC Unit assigned to the current timeslot is not requesting then the unused read timeslot arbitration mechanism outlined in Section 22.10.6.2 is used to select the arbitration winner.

```
//re_arbitrate_wadv
if (re_arbitrate_wadv == 1) AND (write lookahead timeslot pointer ==
non-CPU write)  then
   if write lookahead timeslot requesting then
         choose(arb_sel, dir_sel) at write lookahead timeslot
      arb_gnt = 1
   elsif un-used write timeslot scheme has a requestor
      choose winner according to un-used write timeslot allocation of
Section 22.10.6.1
      arb_gnt = 1
   else
      //no arbitration winner
      arb_gnt = 0
```

re_arbitrate is generated in the MSN2 state of the DCU state-machine, whereas re_arbitrate_wadv is generated in the RST state. See FIG. 116.

The write lookahead pointer points two timeslots in advance of the current timeslot pointer. Therefore re_arbitrate_wadv causes the Arbitration Logic to perform an arbitration for non-CPU two timeslots in advance. As noted in Table 111, each timeslot lasts at least 3 cycles. Therefor re_arbitrate_wadv arbitrates at least 4 cycles in advance.

At initialisation, the write lookahead pointer points to the first timeslot. The current timeslot pointer is invalid until the write lookahead pointer advances to the third timeslot when the current timeslot pointer will point to the first timeslot. Then both pointers advance in tandem.

Some accesses can be preceded by a CPU access as in Table 111. These CPU accesses are not allocated timeslots. If this is the case the timeslot will last 3 (CPU access)+3 (non-CPU access)=6 cycles. In that case, a second write lookahead pointer, the CPU pre-access write lookahead pointer, is selected which points only one timeslot in advance. re_arbitrate_wadv will still arbitrate 4 cycles in advance.

In the case that the write timeslot lookahead pointers do not advance due to a refresh or a refresh preceeded by a CPU-preaccess then the pre-arbitration is repeated every dcu_dau_wadv pulse until a requesting non-CPU write requester is found or until the pointers start to advance again.

22.14.12.3.1 Issuing Non-CPU Write Commands

Although the Arbitration Logic will arbitrate non-CPU writes in advance, the Command Multiplexor must issue all accesses in the timeslot order. This is achieved as follows:

If re_arbitrate_wadv arbitrates a non-CPU write in advance then within the Arbitration Logic the timeslot is marked to indicate whether a write was issued.

```
//re__arbitrate__wadv
if (re__arbitrate__wadv == 1) AND (write lookahead timeslot pointer ==
non-CPU write)  then
   if write lookahead timeslot requesting then
         choose(arb__sel, dir__sel) at write lookahead timeslot
      arb__gnt = 1
      MARK__timeslot = 1
   elsif un-used write timeslot scheme has a requestor
      choose winner according to un-used write timeslot allocation of
Section 22.10.6.1
      arb__gnt = 1
      MARK__timeslot = 1
   else
      //no pre-arbitration winner
      arb__gnt = 0
      MARK__timeslot = 0
```

When re_arbitrate advances to a write timeslot in the Arbitration Logic then one of two actions can occur depending on whether the slot was marked by re_arbitrate_adv to indicate whether a write was issued or not.

Non-CPU write arbitrated by re_arbitrate_wadv

If the timeslot has been marked as having issued a write then the arbitration logic responds to re_arbitrate by issuing arb_sel[4:0], dir_sel[1:0] and asserting arb_gnt as for a normal arbitration but selecting a non-CPU write access. Normally, re_arbitrate does not issue non-CPU write accesses. Non-CPU writes are arbitrated by re_arbitrate_wadv. dir_sel[1:0]==00 indicates a non-CPU write issued by re_arbitrate.

Non-CPU write not arbitrated by re_arbitrate_wadv

If the timeslot has been marked as not having issued a write, the re_arbitrate will use the un-used read timeslot selection to replace the un-used write timeslot with a read timeslot according to Section 22.10.6.2 Unused read timeslots allocation.

```
//re__arbitrate except for non-CPU writes
if (re__arbitrate == 1) AND (current timeslot pointer!= non-CPU
write) then
   arb__gnt = 1
   if current timeslot requesting then
         choose(arb__sel, dir__sel) at current timeslot
   else // un-used read timeslot scheme
      choose winner according to un-used read timeslot allocation of
Section 22.10.6.2
      arb__gnt = 1
//non-CPU write MARKED as issued
elsif (re__arbitrate == 1) AND (current timeslot pointer == non-CPU
         write) AND (MARK__timeslot == 1) then
         //indicate to Command Multiplexor that non-CPU write has been
arbitrated in
         //advance
         arb__gnt = 1
         dir__sel[1:0] == 00
//non-CPU write not MARKED as issued
elsif (re__arbitrate == 1) AND (current timeslot pointer == non-CPU
         write) AND (MARK__timeslot == 0) then
      choose winner according to un-used read timeslot allocation of
Section 22.10.6.2
      arb__gnt = 1
```

22.14.12.4 Flow Control

If read commands are to win arbitration, the Read Multiplexor must be ready to accept the read data from the DRAM. This is indicated by the read_cmd_rdy[1:0] signal. read_cmd_rdy[1:0] supplies flow control from the Read Multiplexor.

```
read__cmd__rdy[0]==1 //Read multiplexor ready for CPU read
read__cmd__rdy[1]==1 //Read multiplexor ready for non-CPU read
```

The Read Multiplexor will normally always accept CPU reads, see Section 22.14.13.1, so read_cmd_rdy[0]==1 should always apply.

Similarly, if write commands are to win arbitration, the Write Multiplexor must be ready to accept the write data from the winning SoPEC requestor. This is indicated by the write_cmd_rdy[1:0] signal. write_cmd_rdy[1:0] supplies flow control from the Write Multiplexor.

```
write__cmd__rdy[0]==1 //Write multiplexor ready for CPU write
write__cmd__rdy[1]==1 //Write multiplexor ready for non-CPU write
```

The Write Multiplexor will normally always accept CPU writes, see Section 22.14.13.2, so write_cmd_rdy[0]==1 should always apply.

Non-CPU Read Flow Control

If re_arbitrate selects an access then the signal dau_dcu_msn2stall is asserted until the Read Write Multiplexor is ready.

arb>gnt is not asserted until the Read Write Multiplexor is ready.

This mechanism will stall the DCU access to the DRAM until the Read Write Multiplexor is ready to accept the next data from the DRAM in the case of a read.

```
//other access flow control
dau__dcu__msn2stall = (((re__arbitrate selects CPU read) AND
   read__cmd__rdy[0]==0) OR
                  (re__arbitrate selects non-CPU read) AND
   read__cmd__rdy[1]==0))
arb__gnt not asserted until dau__dcu__msn2stall de-asserts
```

22.14.12.5 Arbitration Hierarchy

CPU and refresh are not included in the timeslot allocations defined in the DAU configuration registers of Table 129.

The hierarchy of arbitration under normal operation is a. CPU access b. Refresh access c. Timeslot access.

Figure 137:
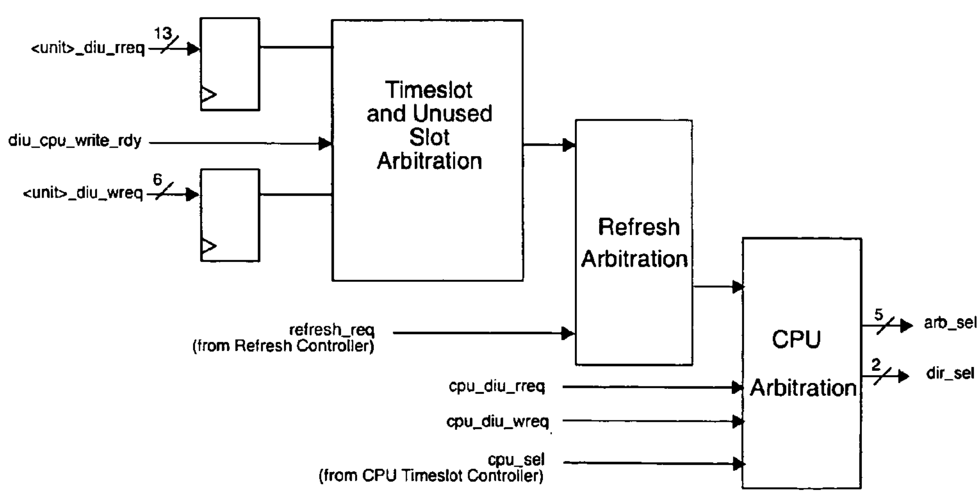

This is shown in FIG. 137. The first DRAM access issued after reset must be a refresh.

As shown in FIG. 137, the DIU request signals <unit>_diu_rreq, <unit>_diu_wreq are registered at the input of the arbitration block to ease timing. The exceptions are the refresh_req signal, which is generated locally in the sub-block and cpu_diu_rreq. The CPU read request signal is not registered so as to keep CPU DIU read access latency to a minimum. Since CPU writes are posted, cpu_diu_wreq is registered so that the DAU can process the write at a later juncture. The arbitration logic is coded to perform arbitration of non-CPU requests first and then to gate the result with the CPU requests. In this way the CPU can make the requests available late in the arbitration cycle.

Note that when RotationSync is set to '0', a modified hierarchy of arbitration is used. This is outlined in section 20.14.12.2.3 on page 280.

22.14.12.6 Timeslot Access

The basic timeslot arbitration is based on the MainTimeslot configuration registers. Arbitration works by the timeslot pointed to by either the current or write lookahead pointer winning arbitration. The pointers then advance to the next timeslot. This was shown in FIG. 103.

Each main timeslot pointer gets advanced each time it is accessed regardless of whether the slot is used.

22.14.12.7 Unused Timeslot Allocation

If an assigned slot is not used (because its corresponding SoPEC Unit is not requesting) then it is reassigned according to the scheme described in Section 22.10.6.

Only used non-CPU accesses are reallocated. CDU write accesses cannot be included in the unused timeslot allocation for write as CDU accesses take 6 cycles. The write accesses which the CDU write could otherwise replace require only 3 or 4 cycles.

Unused write accesses are re-allocated according to the fixed priority scheme of Table 113. Unused read timeslots are re-allocated according to the two-level round-robin scheme described in Section 22.10.6.2.

A pointer points to the most recently re-allocated unit in each of the round-robin levels. If the unit immediately succeeding the pointer is requesting, then this unit wins the arbitration and the pointer is advanced to reflect the new winner. If this is not the case, then the subsequent units (wrapping back eventually to the pointed unit) in the level 1 round-robin are examined. When a requesting unit is found this unit wins the arbitration and the pointer is adjusted. If no unit is requesting then the pointer does not advance and the second level of round-robin is examined in a similar fashion.

In the following pseudo-code the bit indices are for the ReadRoundRobinLevel configuration register described in Table 131.

```
//choose the winning arbitration level
level1 = 0
level2 = 0
for i = 0 to 13
    if unit(i) requesting AND ReadRoundRobinLevel(i) = 0 then
    level1 = 1
    if unit(i) requesting AND ReadRoundRobinLevel(i) = 1 then
    level2 = 1
```

Round-robin arbitration is effectively a priority assignment with the units assigned a priority according to the round-robin order of Table 131 but starting at the unit currently pointed to.

```
//levelptr is pointer of selected round robin level
priority is array 0 to 13
    //assign decreasing priorities from the current pointer; maximum
priority is 13
    for i = 1 to 14
        priority(levelptr + i) = 14 − i
      i++
```

The arbitration winner is the one with the highest priority provided it is requesting and its ReadRoundRobinLevel bit points to the chosen level. The levelptr is advanced to the arbitration winner.

Figure 138:
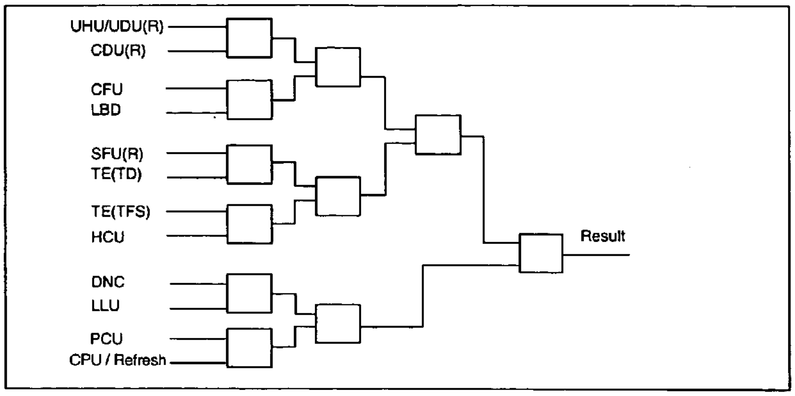

The priority comparison can be done in the hierarchical manner shown in FIG. 138.

22.14.12.8 How CPU and Non-CPU Address Restrictions Affect Arbitration

Recall from Table 129, "DAU configuration registers," on page 378 that there are minimum valid DRAM addresses for non-CPU accesses, defined by minNonCPUReadAdr, minDWUWriteAdr and minNonCPUWriteAdr. Similarly, neither the CPU nor non-CPU units may attempt to access a location which exceeds the maximum legal DRAM word address (either 0x1_3FFF or, if disableUpperDRAMMacro is set to "1", 0x0_9FFF).

To ensure compliance with these address restrictions, the following DIU response occurs for any incorrectly addressed non-CPU writes:—

Issue a write acknowledgment at pre-arbitration time, to prevent the write requester from hanging.

Disregard the incoming write data and write valids and void the pre-arbitration.

Subsequently re-allocate the write slot at main arbitration time via the round robin.

For incorrectly addressed CPU posted write attempts, the DIU response is:—

De-assert diu_cpu_write_rdy for 1 cycle only, so that the CPU sees a normal response.

Disregard the data, address and mask associated with the incorrect access. Leave the buffer empty for later, legal CPU writes.

For any incorrectly addressed CPU or non-CPU reads, the response is:—

Arbitrate the slot in favour of the scheduled, misbehaving requester.

Issue the read acknowledgement and rvalid(s) to keep the requester from hanging.

Execute a nominal read of the maximum legal DRAM address (0x1_3FFF or 0x0_9FFF).

Intercept the resultant read data from the DCU and send back all zeros to the requester instead.

If an invalidly addressed CPU or non-CPU access is attempted, then a sticky bit, sticky_invalid_dram_adr, is set in the ArbitrationHistory configuration register. See Table 132 on page 385 for details.

22.14.1.9 Refresh Controller Description

The refresh controller implements the functionality described in detail in Section 22.10.5. Refresh is not included in the timeslot allocations.

CPU and refresh have priority over other accesses. If the refresh controller is requesting i.e. refresh_req is asserted, then the refresh request will win any arbitration initiated by re_arbitrate. When the refresh has won the arbitration refresh_req is de-asserted.

The refresh counter is reset to RefreshPeriod[8:0] i.e. the number of cycles between each refresh. Every time this counter decrements to 0, a refresh is issued by asserting refresh_req. The counter immediately reloads with the value in RefreshPeriod[8:0] and continues its countdown. It does not wait for an acknowledgment, since the priority of a refresh request supersedes that of any pending non-CPU access and it will be serviced immediately. In this way, a refresh request is guaranteed to occur every (RefreshPeriod[8:0]+1) cycles. A given refresh request may incur some incidental delay in being serviced, due to alignment with DRAM accesses and the possibility of a higher-priority CPU pre-access.

Refresh is also included in the unused read and write timeslot allocation, having second option on awards to a round-robin position shared with the CPU. A refresh issued as a result of an unused timeslot allocation also causes the refresh counter to reload with the value in RefreshPeriod[8:0].

The first access issued by the DAU after reset must be a refresh. This assures that refreshes for all DRAM words fall within the required 3.2 ms window.

```
//issue a refresh request if counter reaches 0 or at reset or for re-allocated slot
  if RefreshPeriod != 0 AND (refresh_cnt == 0 OR
        diu_soft_reset_n == 0 OR
        prst_n ==0 OR unused_timeslot_allocation == 1) then
      refresh_req = 1
    //de-assert refresh request when refresh acked
    else if refresh_ack == 1 then
      refresh_req = 0
    //refresh counter
   if refresh_cnt == 0 OR diu_soft_reset_n == 0 OR
prst_n ==0 OR unused_timeslot_allocation == 1 then
      refresh_cnt = RefreshPeriod
    else
      refresh_cnt = refresh_cnt - 1
```

Refresh can preceded by a CPU access in the same way as any other access. This is controlled by the CPUPreAccessTimeslots and CPUTotalTimeslots configuration registers. Refresh will therefore not affect CPU performance. A sequence of accesses including refresh might therefore be CPU, refresh, CPU, actual timeslot.

22.14.12.10 CPU Timeslot Controller Description

CPU accesses have priority over all other accesses. CPU access is not included in the timeslot allocations. CPU access is controlled by the CPUPreAccessTimeslots and CPUTotalTimeslots configuration registers.

To avoid the CPU having to wait for its next timeslot it is desirable to have a mechanism for ensuring that the CPU always gets the next available timeslot without incurring any latency on the non-CPU timeslots.

This is be done by defining each timeslot as consisting of a CPU access preceding a non-CPU access. Two counters of 4-bits each are defined allowing the CPU to get a maximum of (CPUPreAccessTimeslots+1) pre-accesses out of a total of (CPUTotalTimeslots+1) main slots. A timeslot counter starts at CPUTotalTimeslots and decrements every timeslot, while another counter starts at CPUPreAccessTimeslots and decrements every timeslot in which the CPU uses its access. If the pre-access entitlement is used up before (CPUTotalTimeslots+1) slots, no further CPU accesses are allowed. When the CPUTotalTimeslots counter reaches zero both counters are reset to their respective initial values.

When CPUPreAccessTimeslots is set to zero then only one pre-access will occur during every (CPUTotalTimeslots+1) slots.

22.14.12.10.1 Conserving CPU Pre-Accesses

In section 22.10.6.2.1 on page 349, it is described how the CPU can be allowed participate in the unused read round-robin scheme. When enabled by the configuration bit EnableCPURoundRobin, the CPU shares a joint position in the round robin with refresh. In this case, the CPU has priority, ahead of refresh, in availing of any unused slot awarded to this position.

Such CPU round-robin accesses do not count towards depleting the CPU's quota of pre-accesses, specified by CPUPreAccessTimeslots. Note that in order to conserve these pre-accesses, the arbitration logic, when faced with the choice of servicing a CPU request either by a pre-access or by an immediately following unused read slot which the CPU is poised to win, will opt for the latter.

22.14.13 Read and Write Data Multiplexor Sub-Block

TABLE 138

Read and Write Multiplexor Sub-block IO Definition

| Port name | Pins | I/O | Description |
|---|---|---|---|
| **Clocks and Resets** | | | |
| pclk | 1 | In | System Clock |
| prst_n | 1 | In | System reset, synchronous active low |
| **DIU Read Interface to SoPEC Units** | | | |
| diu_data | 64 | Out | Data from DIU to SoPEC Units except CPU.<br>First 64-bits is bits 63:0 of 256 bit word<br>Second 64-bits is bits 127:64 of 256 bit word<br>Third 64-bits is bits 191:128 of 256 bit word<br>Fourth 64-bits is bits 255:192 of 256 bit word |
| dram_cpu_data | 256 | Out | 256-bit data from DRAM to CPU. |
| diu_<unit>_rvalid | 1 | Out | Signal from DIU telling SoPEC Unit that valid read data is on the diu_data bus |
| **DIU Write Interface to SoPEC Units** | | | |
| <unit>_diu_data | 64 | In | Data from SoPEC Unit to DIU except CPU.<br>First 64-bits is bits 63:0 of 256 bit word<br>Second 64-bits is bits 127:64 of 256 bit word<br>Third 64-bits is bits 191:128 of 256 bit word<br>Fourth 64-bits is bits 255:192 of 256 bit word |
| <unit>_diu_wvalid | 1 | In | Signal from SoPEC Unit indicating that data on <unit>_diu_data is valid.<br>Note that "unit" refers to non-CPU requesters only. |
| <uhu/udu>_diu_wmask | 8 | In | Byte mask for each quarter-word transferred from the UHU/UDU. |
| cpu_diu_wdata | 128 | In | Write data from CPU to DIU. Input to the posted write buffer. |

TABLE 138-continued

| Port name | Pins | I/O | Description |
|---|---|---|---|
| **Read and Write Multiplexor Sub-block IO Definition** | | | |
| cpu_diu_wadr[21:4] | 18 | In | Write address from the CPU. Input to the posted write buffer. |
| cpu_diu_wmask | 16 | In | Byte mask for CPU write. Input to the posted write buffer. |
| cpu_diu_wdatavalid | 1 | In | Write enable for the CPU posted write buffer. Also confirms the validity of cpu_diu_wdata. |
| diu_cpu_write_rdy | 1 | Out | Indicator that the CPU posted write buffer is empty. |
| **Inputs from CPU Configuration and Arbitration Logic Sub-block** | | | |
| arb_gnt | 1 | In | Signal lasting 1 cycle which indicates arbitration has occurred and arb_sel is valid. |
| arb_sel | 5 | In | Signal indicating which requesting SoPEC Unit has won arbitration. Encoding is described in Table 133. |
| dir_sel | 2 | In | Signal indicating which sense of access associated with arb_sel<br>00: issue non-CPU write<br>01: read winner<br>10: write winner<br>11: refresh winner |
| **Outputs to Command Multiplexor Sub-block** | | | |
| write_data_valid | 2 | Out | Signal indicating that valid write data is available for the current command.<br>00 = not valid<br>01 = CPU write data valid<br>10 = non-CPU write data valid<br>11 = both CPU and non-CPU write data valid |
| Wdata | 256 | Out | 256-bit non-CPU write data |
| Wdata_mask | 32 | Out | Byte mask for non-CPU write data. |
| cpu_wdata | 128 | Out | Posted CPU write data. |
| cpu_wadr[21:4] | 18 | Out | Posted CPU write address. |
| cpu_wmask | 16 | Out | Posted CPU write mask. |
| **Inputs from Command Multiplexor Sub-block** | | | |
| write_data_accept | 2 | In | Signal indicating the Command Multiplexor has accepted the write data from the write multiplexor<br>00 = not valid<br>01 = accepts CPU write data<br>10 = accepts non-CPU write data<br>11 = not valid |
| **Inputs from DCU** | | | |
| dcu_dau_rdata | 256 | In | 256-bit read data from DCU. |
| dcu_dau_rvalid | 1 | In | Signal indicating valid read data on dcu_dau_rdata. |
| **Outputs to CPU Configuration and Arbitration Logic Sub-block** | | | |
| read_cmd_rdy | 2 | Out | Signal indicating that read multiplexor is ready for next read read command.<br>00 = not ready<br>01 = ready for CPU read<br>10 = ready for non-CPU read<br>11 = ready for both CPU and non-CPU reads |
| write_cmd_rdy | 2 | Out | Signal indicating that write multiplexor is ready for next write command.<br>00 = not ready<br>01 = ready for CPU write<br>10 = ready for non-CPU write<br>11 = ready for both CPU and non-CPU writes |
| **Debug Outputs to CPU Configuration and Arbitration Logic Sub-block** | | | |
| read_sel | 5 | Out | Signal indicating the SoPEC Unit for which the current read transaction is occurring. Encoding is described in Table 133. |
| read_complete | 1 | Out | Signal indicating that read transaction to SoPEC Unit indicated by read_sel is complete. |

2.14.13

22.14.13.1 Read Multiplexor Logic Description

The Read Multiplexor has 2 read channels a separate read bus for the CPU, dram_cpu_data[255:0].

and a shared read bus for the rest of SoPEC, diu_data[63:0].

The validity of data on the data busses is indicated by signals diu_<unit>_rvalid.

Figure 103:
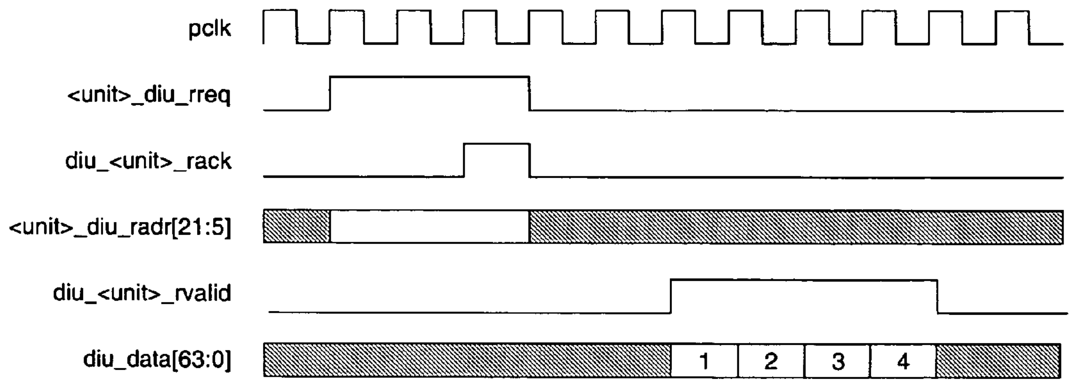
Figure 104:
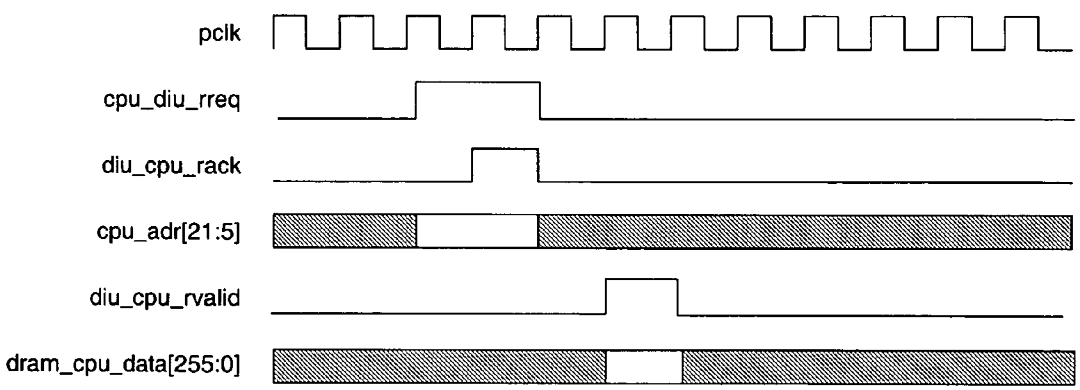

Timing waveforms for non-CPU and CPU DIU read accesses are shown in FIG. 103 and FIG. 104, respectively.

Figure 140:
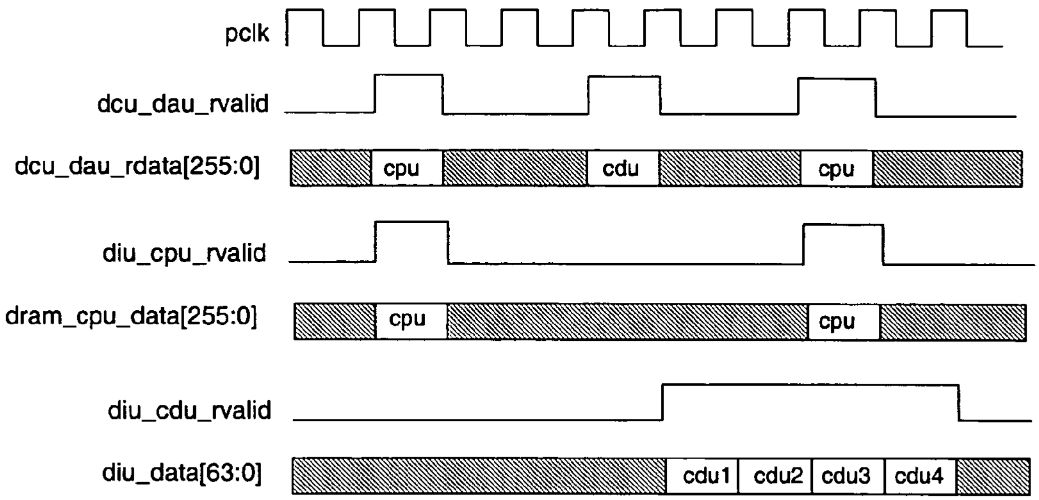
FIG. 140. Read Multiplexor timing
FIG. 141. Read command queue (4 deep buffer)
FIG. 142. State-machines for shared read bus accesses
FIG. 143. Read Multiplexor timing for back to back shared read bus transfers
FIG. 144. Write multiplexor partition
FIG. 145. Block diagram of PCU
FIG. 146. PCU accesses to PEP registers
FIG. 147. Command Arbitration and execution
FIG. 148. DRAM command access state machine
FIG. 149. Outline of contone data flow with respect to CDU
FIG. 150. Block diagram of CDU
FIG. 151. State machine to read compressed contone data
FIG. 152. DRAM storage arrangement for a single line of JPEG 8×8 blocks in 4 colors
FIG. 153. State machine to write decompressed contone data
FIG. 154. Lead-in and lead-out clipping of contone data in multi-SoPEC environment FIG. 155. Block diagram of CFU
FIG. 156. DRAM storage arrangement for a single line of JPEG blocks in 4 colors
FIG. 157. State machine to read decompressed contone data from DRAM
FIG. 158. Block diagram of color space converter
FIG. 159. High level block diagram of LBD in context
FIG. 160. Schematic outline of the LBD and the SFU
FIG. 161. Block diagram of lossless bi-level decoder
FIG. 162. Stream decoder block diagram
FIG. 163. Command controller block diagram
FIG. 164. State diagram for the Command Controller (CC) state machine
FIG. 165. Next Edge Unit block diagram
FIG. 166. Next edge unit buffer diagram
FIG. 167. Next edge unit edge detect diagram
FIG. 168. State diagram for the Next Edge Unit (NEU) state machine
FIG. 169. Line fill unit block diagram
FIG. 170. State diagram for the Line Fill Unit (LFU) state machine
FIG. 171. Bi-level DRAM buffer
FIG. 172. Interfaces between LBD/SFU/HCU
FIG. 173. SFU Sub-Block Partition
FIG. 174. LBDPrevLineFifo Sub-block
FIG. 175. Timing of signals on the LBDPrevLineFIFO interface to DIU and Address Generator
FIG. 176. Timing of signals on LBDPrevLineFIFO interface to DIU and Address Generator
FIG. 177. LBDNextLineFifo Sub-block
FIG. 178. Timing of signals on LBDNextLineFIFO interface to DIU and Address Generator
FIG. 179. LBDNextLineFIFO DIU Interface State Diagram
FIG. 180. LDB to SFU write interface
FIG. 181. LDB to SFU read interface (within a line)
FIG. 182. HCUReadLineFifo Sub-block
FIG. 183. DIU Write Interface
FIG. 184. DIU Read Interface multiplexing by select_hrfplf
FIG. 185. DIU read request arbitration logic
FIG. 186. Address Generation
FIG. 187. X scaling control unit
FIG. 188. Y scaling control unit
FIG. 189. Overview of X and Y scaling at HCU interface
FIG. 190. High level block diagram of TE in context
FIG. 191. Example QR Code developed by Denso of Japan
FIG. 192. Netpage tag structure
FIG. 193. Netpage tag with data rendered at 1600 dpi (magnified view)
FIG. 194. Example of 2×2 dots for each block of QR code
FIG. 195. Placement of tags for portrait & landscape printing
FIG. 196. General representation of tag placement
FIG. 197. Composition of SoPEC's tag format structure
FIG. 198. Simple 3×3 tag structure
FIG. 199. 3×3 tag redesigned for 21×21 area (not simple replication)
FIG. 200. TE Block Diagram
FIG. 201. TE Hierarchy
FIG. 202. Tag Encoder Top-Level FSM
FIG. 203. Logic to combine dot information and Encoded Data
FIG. 204. Generation of Lastdotintag
FIG. 205. Generation of Dot Position Valid
FIG. 206. Generation of write enable to the TFU
FIG. 207. Generation of Tag Dot Number
FIG. 208. TDI Architecture
FIG. 209. Data Flow Through the TDI
FIG. 210. Raw tag data interface block diagram
FIG. 211. RTDI State Flow Diagram
FIG. 212. Relationship between te_endoftagdata, te_startofbandstore and te_endofbandstore
FIG. 213. TDi State Flow Diagram
FIG. 214. Mapping of the tag data to codewords 0-7 for (15,5) encoding.

The Read Multiplexor timing is shown in FIG. 140. FIG. 140 shows both CPU and non-CPU reads. Both CPU and non-CPU channels are independent i.e. data can be output on the CPU read bus while non-CPU data is being transmitted in 4 cycles over the shared 64-bit read bus.

CPU read data, dram_cpu_data[255:0], is available in the same cycle as output from the DCU. CPU read data needs to be registered immediately on entering the CPU by a flip-flop enabled by the diu_cpu_rvalid signal.

Figure 139:
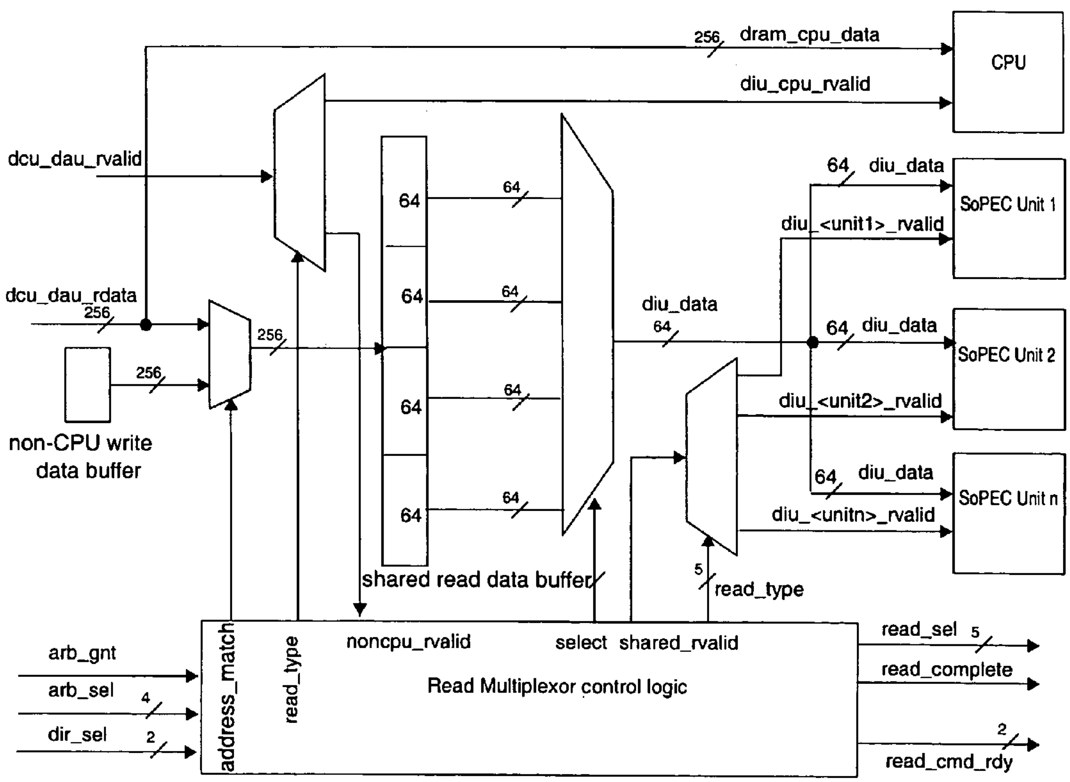

To ease timing, non-CPU read data from the DCU is first registered in the Read Multiplexor by capturing it in the shared read data buffer of FIG. 139 enabled by the dcu_dau_rvalid signal. The data is then partitioned in 64-bit words on diu_data[63:0].

22.14.13.1.1 Non-CPU Read Data Coherency

Note that for data coherency reasons, a non-CPU read will always result in read data being returned to the requester which includes the after-effects of any pending (i.e. pre-arbitrated, but not yet executed) non-CPU write to the same address, which is currently cached in the non-CPU write buffer. This is shown graphically in FIG. 139 on page 421.

Should the pending write be partially masked, then the read data returned must take account of that mask. Pending, masked writes by the CDU, UHU and UDU, as well as all unmasked non-CPU writes are fully supported.

Since CPU writes are dealt with on a dedicated write channel, no attempt is made to implement coherency between posted, unexecuted CPU writes and non-CPU reads to the same address.

22.14.13.1.2 Read Multiplexor Command Queue

When the Arbitration Logic sub-block issues a read command the associated value of arb_sel[4:0], which indicates which SoPEC Unit has won arbitration, is written into a buffer, the read command queue.

```
write_en = arb_gnt AND dir_sel[1:0]=="01"
if write_en==1 then
  WRITE arb_sel into read command queue
```

Figure 141:
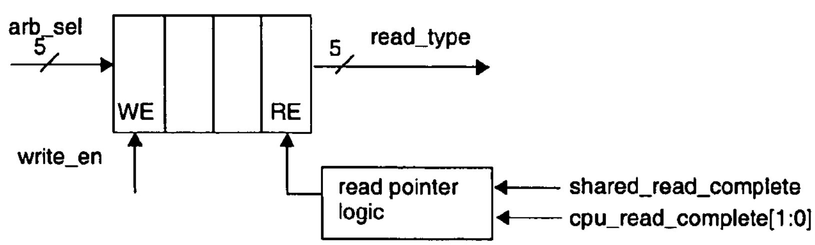

The encoding of arb_sel[4:0] is given in Table 133. dir_sel[1:0]=="01" indicates that the operation es a read. The read command queue is shown in FIG. 141.

The command queue could contain values of arb_sel[4:0] for 3 reads at a time.

In the scenario of FIG. 140 the command queue can contain 2 values of arb_sel[4:0] i.e. for the simultaneous CDU and CPU accesses.

Figure 143:
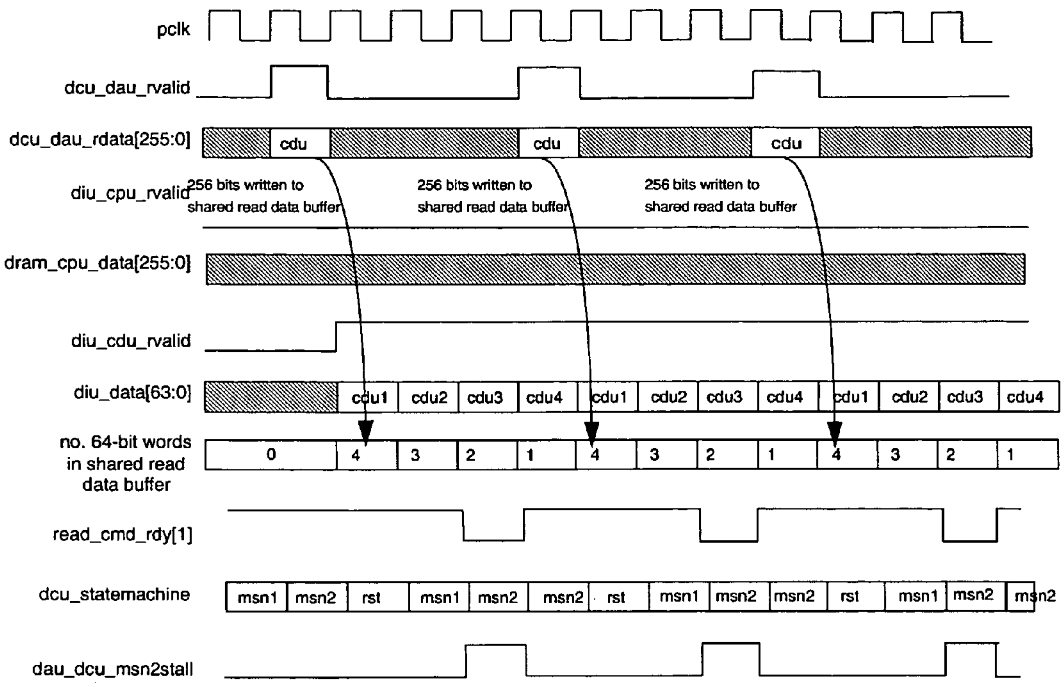
Figure 144:
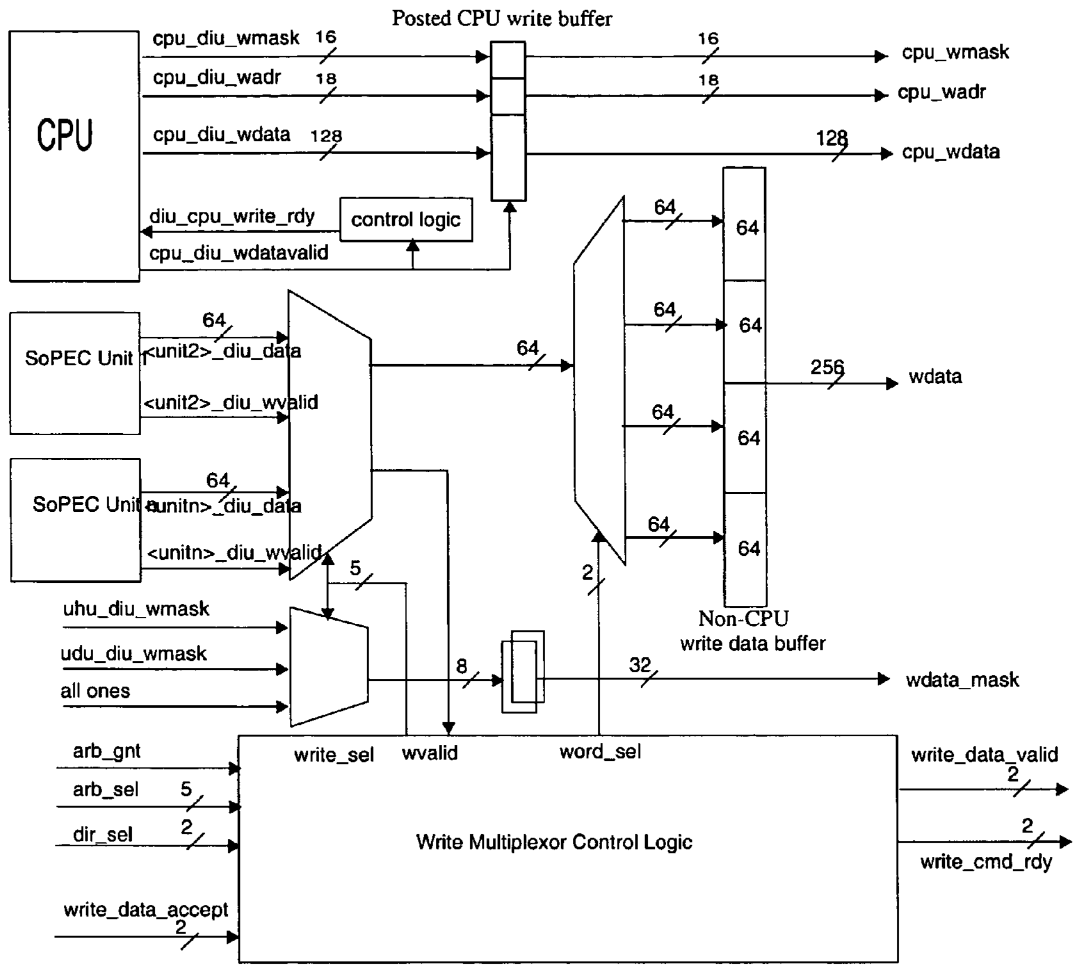
Figure 145:
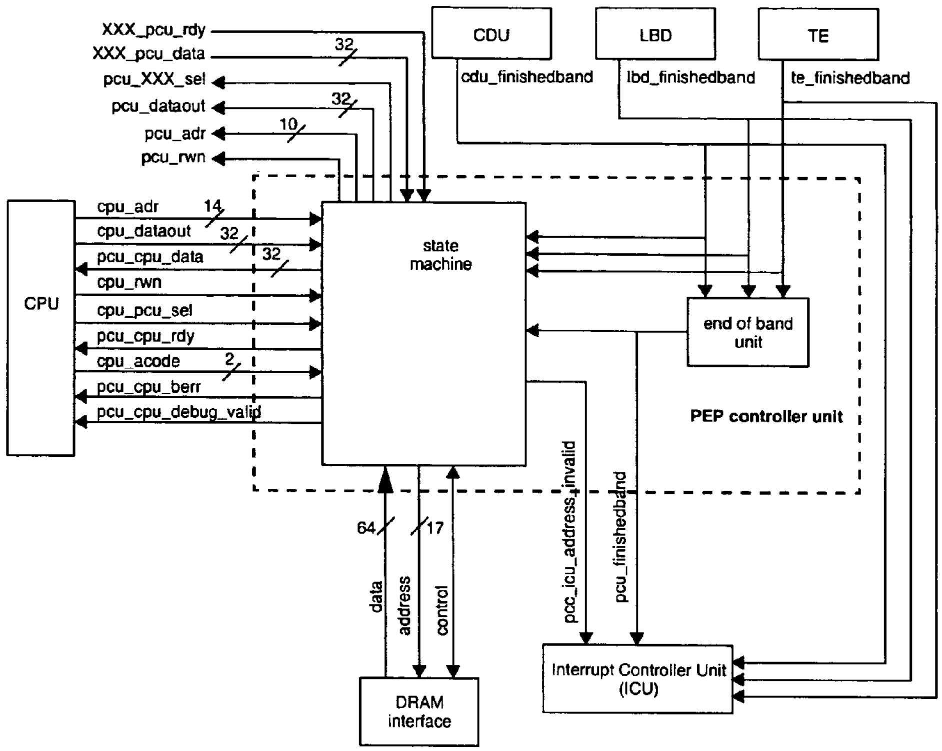

In the scenario of FIG. 143, the command queue can contain 3 values of arb_sel[4:0] i.e. at the time of the second dcu_dau_rvalid pulse the command queue will contain an arb_sel[4:0] for the arbitration performed in that cycle, and the two previous arb_sel[4:0] values associated with the data for the first two dcu_dau_rvalid pulses, the data associated with the first dcu_dau_rvalid pulse not having been fully transfered over the shared read data bus.

The read command queue is specified as 4 deep so it is never expected to fill.

The top of the command queue is a signal read_type[4:0] which indicates the destination of the current read data. The encoding of read_type[4:0] is given in Table 133.

22.14.13.1.3 CPU Reads

Read data for the CPU goes straight out on dram_cpu_data[255:0] and dcu_dau_rvalid is output on diu_cpu_rvalid. cpu_read_complete(0) is asserted when a CPU read at the top of the read command queue occurs. cpu_read_complete(0) causes the read command queue to be popped.

```
cpu_read_complete(0)=(read_type[4:0]==CPU read)
    AND (dcu_dau_rvalid==1)
```

If the current read command queue location points to a non-CPU access and the second read command queue location points to a CPU access then the next dcu_dau_rvalid pulse received is associated with a CPU access. This is the scenario illustrated in FIG. 140. The dcu_dau_rvalid pulse from the DCU must be output to the CPU as diu_cpu_rvalid. This is achieved by using cpu_read_complete(1) to multiplex dcu_dau_rvalid to diu_cpu_rvalid. cpu_read_complete(1) is also used to pop the second from top read command queue location from the read command queue.

```
cpu_read_complete(1) = (read_type == non-CPU read)
        AND SECOND(read_type == CPU
read) AND (dcu_dau_rvalid == 1)
```

22.14.13.1.4 Multiplexing dcu_dau_rvalid read_type[4:0] and cpu_read_complete(1) multiplexes the data valid signal, dcu_dau—rvalid. from the DCU, between the CPU and the shared read bus logic. diu_cpu_rvalid is the read valid signal going to the CPU. noncpu_rvalid is the read valid signal used by the Read Multiplexor control logic to generate read valid signals for non-CPU reads.

```
if read_type[4:0] == CPU-read then
//select CPU
  diu_cpu_rvalid:= 1
  noncpu_rvalid:= 0
if (read_type[4:0]== non-CPU-read) AND
SECOND(read_type[4:0]== CPU-read)
  AND dcu_dau_rvalid == 1 then
//select CPU
  diu_cpu_rvalid:= 1
  noncpu_rvalid:= 0
else
  //select shared read bus logic
  diu_cpu_rvalid:= 0
  noncpu_rvalid:= 1
```

22.14.13.1.5 Non-CPU Reads

Read data for the shared read bus is registered in the shared read data buffer using noncpu_rvalid. The shared read buffer has 4 locations of 64 bits with separate read pointer, read_ptr[1:0], and write pointer, write_ptr[1:0].

```
if noncpu_rvalid == 1 then
  shared_read_data_buffer[write_ptr] = dcu_dau_data[63:0]
  shared_read_data_buffer[write_ptr+1] = dcu_dau_data[127:64]
  shared_read_data_buffer[write_ptr+2] = dcu_dau_data[191:128]
  shared_read_data_buffer[write_ptr+3] = dcu_dau_data[255:192]
```

The data written into the shared read buffer must be output to the correct SoPEC DIU read requestor according to the value of read_type[4:0] at the top of the command queue.

The data is output 64 bits at a time on diu_data[63:0] according to a multiplexor controlled by read_ptr[2:0].

diu_data[63:0]=shared_read_data_buffer[read_ptr]

FIG. 139 shows how read_type[4:0] also selects which shared read bus requesters diu_<unit>_rvalid signal is connected to shared_rvalid. Since the data from the DCU is registered in the Read Multiplexor then shared_rvalid is a delayed version of noncpu_rvalid.

When the read valid, diu_<unit>_rvalid, for the command associated with read_type[4:0] has been asserted for 4 cycles then a signal shared_read complete is asserted. This indicates that the read has completed. shared_read complete causes the value of read_type[4:0] in the read command queue to be popped.

Figure 142:
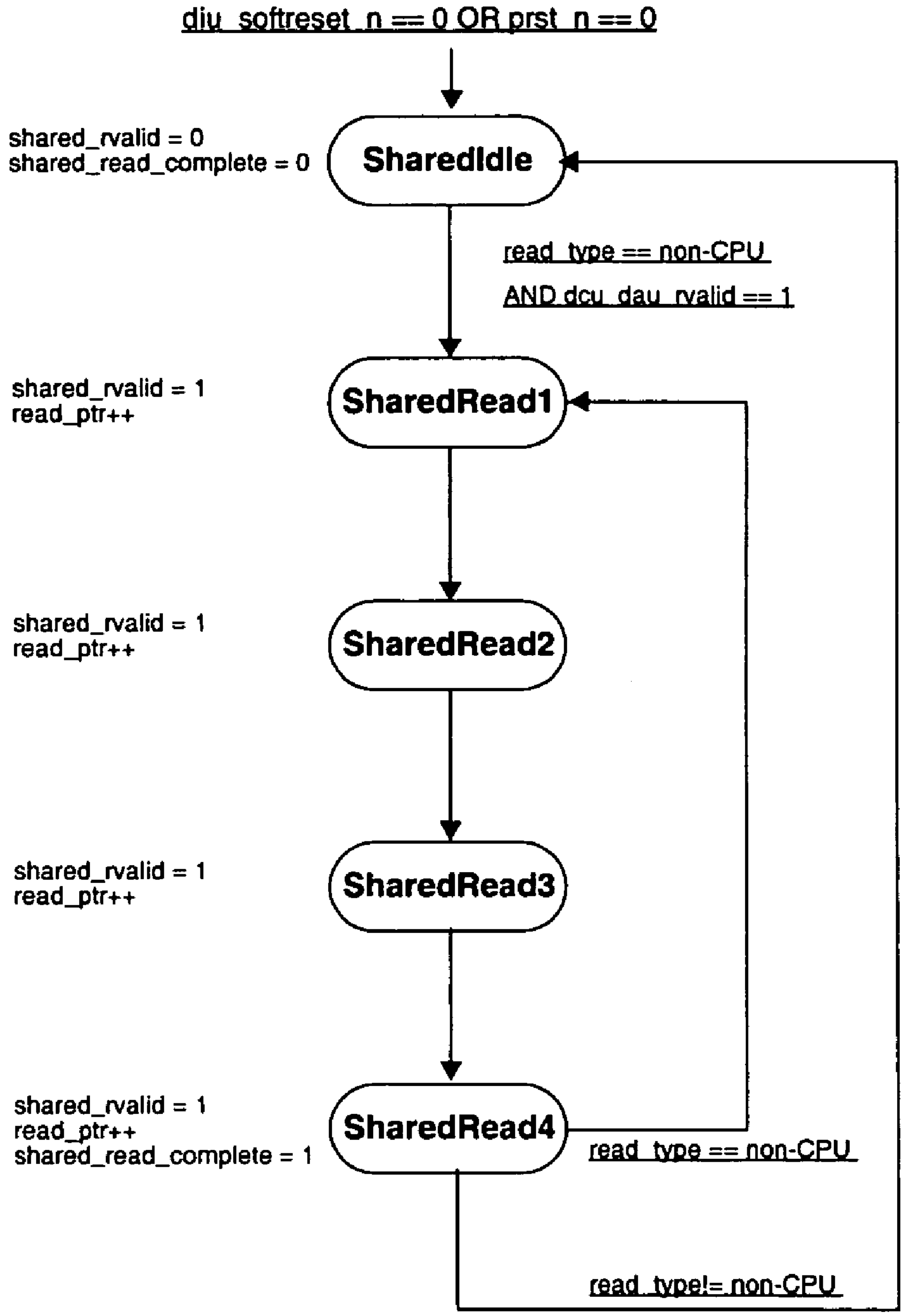

A state machine for shared read bus access is shown in FIG. 142. This show the generation of shared_rvalid, shared_read_complete and the shared read data buffer read pointer, read_ptr[2:0], being incremented.

Some points to note from FIG. 142 are:

- shared_rvalid is asserted the cycle after dcu_dau_rvalid associated with a shared read bus access. This matches the cycle delay in capturing dau_dcu_data[255:0] in the shared read data buffer. shared_rvalid remains asserted in the case of back to back shared read bus accesses.
- shared_read complete is asserted in the last shared_rvalid cycle of a non-CPU access. shared_read_complete causes the shared read data queue to be popped.

22.14.13.1.6 Read Command Queue Read Pointer Logic

The read command queue read pointer logic works as follows.

```
if shared_read_complete == 1 OR cpu_read_complete(0) == 1 then
  POP top of read command queue
if cpu_read_complete(1) == 1 then
  POP second read command queue location
```

22.14.13.1.7 Debug Signals shared_read complete and cpu_read_complete together define read complete which indicates to the debug logic that a read has completed. The source of the read is indicated on read_sel[4:0].

```
read_complete = shared_read_complete OR cpu_read_complete(0)
          OR cpu_read_complete(1)
if cpu_read_complete(1) == 1 then
  read_sel:= SECOND(read_type)
else
  read_sel:= read_type
```

22.14.13.1.8 Flow Control

There are separate indications that the Read Multiplexor is able to accept CPU and shared read bus commands from the Arbitration Logic. These are indicated by read_cmd_rd [1:0].

The Arbitration Logic can always issue CPU reads except if the read command queue fills. The read command queue should be large enough that this should never occur.

```
//Read Multiplexor ready for Arbitration Logic to issue CPU reads
read_cmd_rdy[0] == read command queue not full
```

For the shared read data, the Read Multiplexor deasserts the shared read bus read_cmd_rdy[1] indication until a space is available in the read command queue. The read command queue should be large enough that this should never occur.

read_cmd_rdy[1] is also deasserted to provide flow control back to the Arbitration Logic to keep the shared read data bus just full.

```
//Read Multiplexor not ready for Arbitration Logic to issue non-CPU
reads
  read_cmd_rdy[1] = (read command queue not full) AND
  (flow_control = 0)
```

read_cmd_rdy[1]=(read command queue not full) AND (flow_control=0)

The flow control condition is that DCU read data from the second of two back-to-back shared read bus accesses becomes available. This causes read_cmd_rdy[1] to deassert for 1 cycle, resulting in a repeated MSN2 DCU state. The timing is shown in FIG. 143.

```
flow_control = (read_type[4:0] == non-CPU read)
  AND SECOND(read_type[4:0] == non-CPU read)
  AND (current DCU state == MSN2)
AND (previous DCU state == MSN1).
```

FIG. 143 shows a series of back to back transfers over the shared read data bus. The exact timing of the implementation must not introduce any additional latency on shared read bus read transfers i.e. arbitration must be re-enabled just in time to keep back to back shared read bus data full.

The following sequence of events is illustrated in FIG. 143:

- Data from the first DRAM access is written into the shared read data buffer.
- Data from the second access is available 3 cycles later, but its transfer into the shared read buffer is delayed by a cycle, due to the MSN2 stall condition. (During this delay, read data for access 2 is maintained at the output of the DRAM.) A similar 1-cycle delay is introduced for every subsequent read access until the back-to-back sequence comes to an end.
- Note that arbitration always occurs during the last MSN2 state of any access. So, for the second and later of any back-to-back non-CPU reads, arbitration is delayed by one cycle, i.e. it occurs every fourth cycle instead of the standard every third.

This mechanism provides flow control back to the Arbitration Logic sub-block. Using this mechanism means that the access rate will be limited to which ever takes longer—DRAM access or transfer of read data over the shared read data bus. CPU reads are always be accepted by the Read Multiplexor.

22.14.13 Write Multiplexor Logic Description

The Write Multiplexor supplies write data to the DCU.

There are two separate write channels, one for CPU data on cpu_diu_wdata[127:0], one for non-CPU data on wdata [255:0]. A signal write_data_valid[1:0] indicates to the Command Multiplexor that the data is valid. The Command Multiplexor then asserts a signal write_data_accept[1:0] indicating that the data has been captured by the DRAM and the appropriate channel in the Write Multiplexor can accept the next write data.

Figure 106:
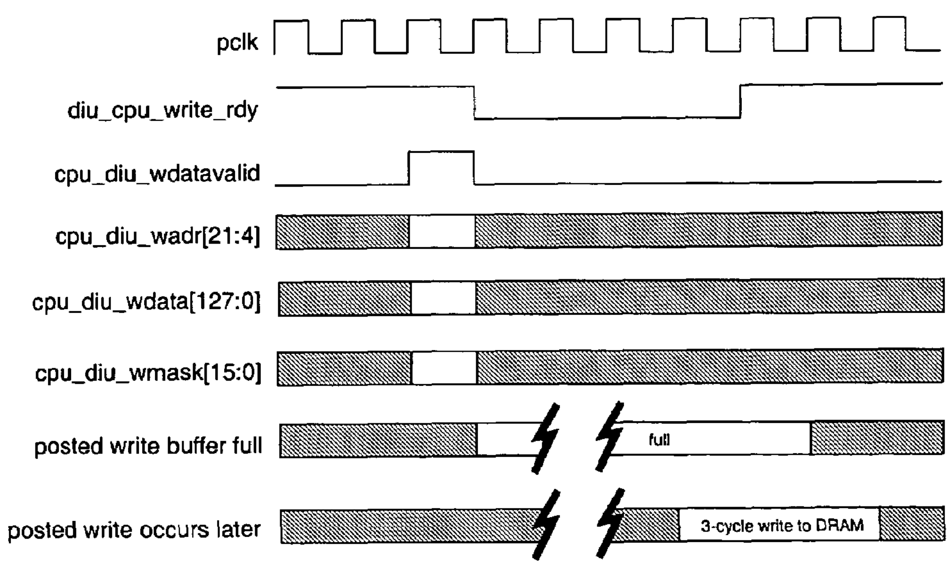
Figure 107:
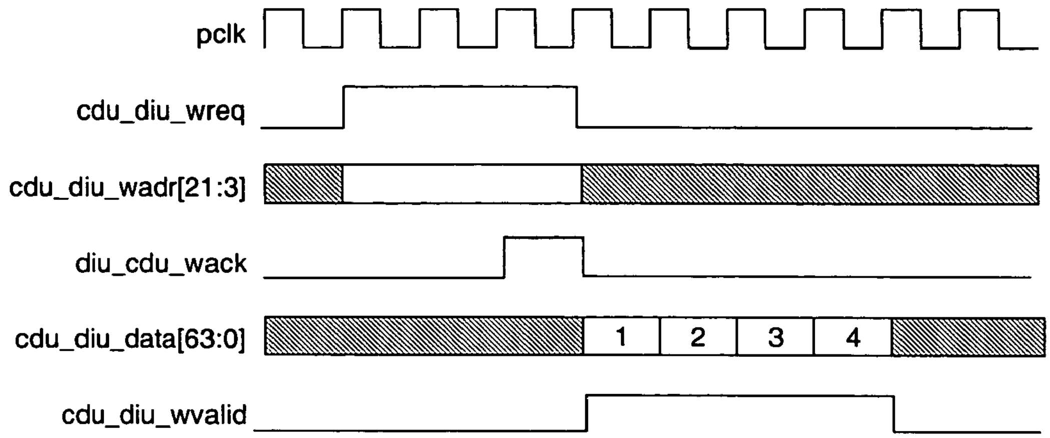
FIG. 107. Write Protocol shown for CDU making four contiguous 64-bit accesses
FIG. 108. Timeslot based arbitration
FIG. 109. Timeslot based arbitration with separate pointers
FIG. 110. Example (a), separate read and write arbitration
FIG. 111. Example (b), separate read and write arbitration
FIG. 112. Example (c), separate read and write arbitration
FIG. 113. DIU Partition
FIG. 114. DIU Partition
FIG. 115. Multiplexing and address translation logic for two memory instances
FIG. 116. Timing of dau_dcu_valid, dcu_dau_adv and dcu_dau_wadv
FIG. 117. DCU state machine
FIG. 118. Random read timing
FIG. 119. Random write timing
FIG. 120. Refresh timing
FIG. 121. Page mode write timing
FIG. 122. Timing of non-CPU DIU read access
FIG. 123. Timing of CPU DIU read access
FIG. 124. CPU DIU read access
FIG. 125. Timing of CPU DIU write access
FIG. 126. Timing of a non-CDU/non-CPU DIU write access
FIG. 127. Timing of CDU DIU write access
FIG. 128. Command multiplexor sub-block partition
FIG. 129. Command Multiplexor timing at DIU requestors interface
FIG. 130. Generation of re_arbitrate and re_arbitrate_wadv
FIG. 131. CPU Interface and Arbitration Logic
FIG. 132. Arbitration timing
FIG. 133. Setting RotationSync to enable a new rotation.

Timing waveforms for write accesses are shown in FIG. 105 to FIG. 107, respectively.

There are 3 types of write accesses:

CPU Accesses

CPU write data on cpu_diu_wdata[127:0] is output on cpu_wdata[127:0]. Since CPU writes are posted, a local buffer is used to store the write data, address and mask until the CPU wins arbitration. This buffer is one position deep. write_data_valid[0], which is synonymous with !diu_cpu_write_rdy, remains asserted until the Command Multiplexor indicates it has been written to the DRAM by asserting write_data_accept[0]. The CPU write buffer can then accept new posted writes.

For non-CPU writes, the Write Multiplexor multiplexes the write data from the DIU write requester to the write data buffer and the <unit>_diu_wvalid signal to the write multiplexor control logic.

CDU Accesses 64-bits of write data each for a masked write to a separate 256-bit word are transferred to the Write Multiplexor over 4 cycles.

When a CDU write is selected the first 64-bits of write data on cdu_diu_wdata[63:0] are multiplexed to non_cpu_wdata[63:0]. write_data_valid[1] is asserted to indicate a non-CPU access when cdu_diu_wvalid is asserted. The data is also written into the first location in the write data buffer. This is so that the data can continue to be output on non_cpu_wdata[63:0] and write_data_valid[1] remains asserted until the Command Multiplexor indicates it has been written to the DRAM by asserting write_data_accept[1]. Data continues to be accepted from the CDU and is written into the other locations in the write data buffer. Successive write_data_accept[1] pulses cause the successive 64-bit data words to be output on wdata[63:0] together with write_data_valid[1]. The last write_data_accept[1] means the write buffer is empty and new write data can be accepted.

Other write accesses.

256-bits of write data are transferred to the Write Multiplexor over 4 successive cycles. When a write is selected the first 64-bits of write data on <unit>_diu_wdata[63:0] are written is into the write data buffer. The next 64-bits of data are written to the buffer in successive cycles. Once the last 64-bit word is available on <unit>_diu_wdata[63:0] the entire word is output on non_cpu_wdata[255:0], write_data_valid[1] is asserted to indicate a non-CPU access, and the last 64-bit word is written into the last location in the write data buffer. Data continues to be output on non_cpu_wdata[255:0] and write_data_valid[1] remains asserted until the Command Multiplexor indicates it has been written to the DRAM by asserting write_data_accept[1]. New write data can then be written into the write buffer.

CPU Write Multiplexor Control Logic

When the Command Multiplexor has issued the CPU write it asserts write_data_accept[0]. write_data_accept[0] causes the write multiplexor to assert write_cmd_rdy[0].

The signal write_cmd_rdy[0] tells the Arbitration Logic sub-block that it can issue another CPU write command i.e. the CPU write data buffer is empty.

Non-CPU Write Multiplexor Control Logic

The signal write_cmd_rdy[1] tells the Arbitration Logic sub-block that the Write Multiplexor is ready to accept another non-CPU write command. When write_cmd_rdy[1] is asserted the Arbitration Logic can issue a write command to the Write Multiplexor. It does this by writing the value of arb_sel[4:0] which indicates which SoPEC Unit has won arbitration into a write command register, write_cmd[3:0].

```
write_en = arb_gnt AND dir_sel[1]==1 AND arb_sel = non-CPU
if write_en==1 then
  write_cmd = arb_sel
```

The encoding of arb_sel[4:0] is given in Table 133. dir_sel[1]==1 indicates that the operation is a write. arb_sel[4:0] is only written to the write command register if the write is a non-CPU write.

A rule was introduced in Section 22.7.2.3 Interleaving read and write accesses to the effect that non-CPU write accesses would not be allocated adjacent timeslots. This means that a single write command register is required.

The write command register, write_cmd[3:0], indicates the source of the write data. write_cmd[3:0] multiplexes the write data <unit>_diu_vdata, and the data valid signal, <unit>_diu_vvalid from the selected write requester to the write data buffer. Note, that CPU write data is not included in the multiplex as the CPU has its own write channel. The <unit>_diu_wvalid are counted to generate the signal word_sel[1:0] which decides which 64-bit word of the write data buffer to store the data from <unit>_diu_wdata.

```
        //when the Command Multiplexor accepts the write data
        if write_data_accept[1] = 1 then
          //reset the word select signal
word_sel[1:0]=00
        //when wvalid is asserted
        if wvalid = 1 then
          //increment the word select signal
          if word_sel[1:0] == 11 then
            word_sel[1:0] == 00
          else
            word_sel[1:0] == word_sel[1:0] + 1
```

wvalid is the <unit>_diu_wvalid signal multiplexed by write_cmd[3:0]. word_sel[1:0]is reset when the Command Multiplexor accepts the write data. This is to ensure that word_sel[1:0] is always starts at 00 for the first wvalid pulse of a 4 cycle write data transfer.

The write command register is able to accept the next write when the Command Multiplexor accepts the write data by asserting write_data_accept[1]. Only the last write_data_accept[1] pulse associated with a CDU access (there are 4) will cause the write command register to be ready to accept the next write data.

Flow Control Back to the Command Multiplexor write_cmd_rdy[0] is asserted when the CPU data buffer is empty.

write_cmd_rdy[1] is asserted when both the write command register and the write data buffer is empty.

PEP Subsystem

23 Controller Unit (PCU)

23.1 Overview

The PCU has three functions:

The first is to act as a bus bridge between the CPU-bus and the PCU-bus for reading and writing PEP configuration registers.

The second is to support page banding by allowing the PEP blocks to be reprogrammed between bands by retrieving commands from DRAM instead of being programmed directly by the CPU.

The third is to send register debug information to the RDU, within the CPU subsystem, when the PCU is in Debug Mode.

23.2 Interfaces Between PCU and Other Units 23.3 Bus Bridge

The PCU is a bus-bridge between the CPU-bus and the PCU-bus. The PCU is a slave on the CPU-bus but is the only master on the PCU-bus. See FIG. 14 on page 43.

23.3.1 CPU Accessing PEP

All the blocks in the PEP can be addressed by the CPU via the PCU. The MMU in the CPU-subsystem decodes a PCU select signal, cpu_pcu_sel for all the PCU mapped addresses (see section 11.4.3 on page 77). Using cpu_adr bits 15-12 the PCU decodes individual block selects for each of the blocks within the PEP. The PEP blocks then decode the remaining address bits needed to address their PCU-bus mapped registers. Note: the CPU is only permitted to perform supervisor-mode data-type accesses of the PEP, i.e. cpu_acode=11. If the PCU is selected by the CPU and any other code is present on the cpu_acode bus the access is ignored by the PCU and the pcu_cpu_berr signal is strobed, CPU commands have priority over DRAM commands. When the PCU is executing each set of four commands retrieved from DRAM the CPU can access PCU-bus registers. In the case that DRAM commands are being executed and the CPU resets the CmdSource to zero, the contents of the DRAM CmdFifo is invalidated and no further commands from the fifo are executed. The CmdPending and NextBandCmdEnable work registers are also cleared.

When a DRAM command writes to the CmdAdr register it means the next DRAM access will occur at the address written to CmdAdr. Therefore if the JUMP instruction is the first command in a group of four, the other three commands get executed and then the PCU will issue a read request to DRAM at the address specified by the JUMP instruction. If the JUMP instruction is the second command then the following two commands will be executed before the PCU requests from the new DRAM address specified by the JUMP instruction etc. Therefore the PCU will always execute the remaining commands in each four command group before carrying out the JUMP instruction.

23.4 Page Banding

The PCU can be programmed to associate microcode in DRAM with each finishedband signal. When a finishedband signal is asserted the PCU reads commands from DRAM and executes these commands. These commands are each 64-bits (see Section 23.8.5) and consist of 32-bit address bits and 32 data bits and allow PCU mapped registers to be programmed directly by the PCU.

If more than one finishedband signal is received at the same time, or others are received while microcode is already executing, the PCU holds the commands as pending, and executes them at the first opportunity.

Each microcode program associated with cdu_finishedband, lbd_finishedband and te_finishedband typically restarts the appropriate unit with new addresses—a total of about 4 or 5 microcode instructions. As well, or alternatively, pcu_finishedband can be used to set up all of the units and therefore involves many more instructions. This minimizes the time that a unit is idle in between bands. The pcu_finishedband control signal is issued once the specified combination of CDU, LBD and TE (programmed in BandSelectMask) have finished their processing for a band.

23.5 Interrupts, Address Legality and Security

Interrupts are generated when the various page expansion units have finished a particular band of data from DRAM. The cdu_finishedband, lbd_finishedband and te_finishedband signals are combined in the PCU into a single interrupt pcu_finishedband which is exported by the PCU to the interrupt controller (ICU).

The PCU mapped registers are only accessible from Supervisor Data Mode. The area of DRAM where PCU commands are stored should be a Supervisor Mode only DRAM area, although this is enforced by the MMU and not by the PCU.

When the PCU is executing commands from DRAM, any block-address decoded from a command which is not part of the PEP block-address map causes the PCU to ignore the command and strobe the pcu_icu_address_invalid interrupt signal. The CPU can then interrogate the PCU to find the source of the illegal command. The MMU ensures that the CPU cannot address an invalid PEP subsystem block.

When the PCU is executing commands from DRAM, any address decoded from a command which is not part of the PEP address map causes the PCU to:

Cease execution of current command and flush all remaining commands already retrieved from DRAM.

Clear CmdPending work-register.

Clear NextBandCmdEnable registers.

Set CmdSource to zero.

In addition to cancelling all current and pending DRAM accesses the PCU strobes the pcu_icu_address_invalid interrupt signal. The CPU can then interrogate the PCU to find the source of the illegal command.

23.6 Debug Mode

When there is a need to monitor the (possibly changing) value in any PEP configuration register, the PCU can be placed in Debug Mode. This is done via the CPU setting the DebugSelect register within the PCU. Once in Debug Mode the PCU continually reads the target PEP configuration register and sends the read value to the RDU. Debug Mode has the lowest priority of all PCU functions: if the CPU wishes to perform an access or there are DRAM commands to be executed they will interrupt the Debug access, and the PCU only resumes Debug access once a CPU or DRAM command has completed.

23.7 Implementation 23.7.1 Definitions of I/O

TABLE 139

PCU Port List

| Port Name | Pins | I/O | Description |
|---|---|---|---|
| | | | Clocks and Resets |
| Pclk | 1 | In | SoPEC functional clock |
| Prst_n | 1 | In | Active-low, synchronous reset in pclk domain |

TABLE 139-continued

PCU Port List

| Port Name | Pins | I/O | Description |
|---|---|---|---|
| | | | End of Band Functionality |
| Cdu__finishedband | 1 | In | Finished band signal from CDU |
| Lbd__finishedband | 1 | In | Finished band signal from LBD |
| te__finishedband | 1 | In | Finished band signal from TE |
| Pcu__finishedband | 1 | Out | Asserted once the specified combination of CDU, LBD, and TE have finished their processing for a band. |
| | | | PCU address error |
| Pcu__icu__address__invalid | 1 | Out | Strobed if PCU decodes a non PEP address from commands retrieved from DRAM or CPU. |
| | | | CPU Subsystem Interface Signals |
| Cpu__adr[15:2] | 14 | In | CPU address bus. 14 bits are required to decode the address space for the PEP. |
| Cpu__dataout[31:0] | 32 | In | Shared write data bus from the CPU |
| Pcu__cpu__data[31:0] | 32 | Out | Read data bus to the CPU |
| Cpu__rwn | 1 | In | Common read/not-write signal from the CPU |
| Cpu__acode[1:0] | 2 | In | CPU Access Code signals. These decode as follows:<br>00 - User program access<br>01 - User data access<br>10 - Supervisor program access<br>11 - Supervisor data access |
| Cpu__pcu__sel | 1 | In | Block select from the CPU. When cpu__pcu__sel is high both cpu__adr and cpu__dataout are valid |
| Pcu__cpu__rdy | 1 | Out | Ready signal to the CPU. When pcu__cpu__rdy is high it indicates the last cycle of the access. For a write cycle this means cpu__dataout has been registered by the block and for a read cycle this means the data on pcu__cpu__data is valid. |
| Pcu__cpu__berr | 1 | Out | Bus error signal to the CPU indicating an invalid access. |
| Pcu__cpu__debug__valid | 1 | Out | Debug Data valid on pcu__cpu__data bus. Active high. |
| | | | PCU Interface to PEP blocks |
| Pcu__adr[11:2] | 10 | Out | PCU address bus. The 10 least significant bits of cpu__adr [15:2] allow 1024 32-bit word addressable locations per PEP block. Only the number of bits required to decode the address space are exported to each block. |
| Pcu__dataout[31:0] | 32 | Out | Shared write data bus from the PCU |
| <unit>__pcu__datain[31:0] | 32 | In | Read data bus from each PEP subblock to the PCU |
| Pcu__rwn | 1 | Out | Common read/not-write signal from the PCU |
| Pcu__<unit>__sel | 1 | Out | Block select for each PEP block from the PCU. Decoded from the 4 most significant bits of cpu__adr[15:2]. When pcu__<unit>__sel is high both pcu__adr and pcu__dataout are valid |
| <unit>__pcu__rdy | 1 | In | Ready from each PEP block signal to the PCU. When <unit>__pcu__rdy is high it indicates the last cycle of the access. For a write cycle this means pcu__dataout has been registered by the block and for a read cycle this means the data on <unit>__pcu__datain is valid. |
| | | | DIU Read Interface signals |
| Pcu__diu__rreq | 1 | Out | PCU requests DRAM read. A read request must be accompanied by a valid read address. |
| Pcu__diu__radr[21:5] | 17 | Out | Read address to DIU<br>17 bits wide (256-bit aligned word). |
| Diu__pcu__rack | 1 | In | Acknowledge from DIU that read request has been accepted and new read address can be placed on pcu__diu__radr |
| Diu__data[63:0] | 64 | In | Data from DIU to PCU.<br>First 64-bits is bits 63:0 of 256 bit word<br>Second 64-bits is bits 127:64 of 256 bit word<br>Third 64-bits is bits 191:128 of 256 bit word<br>Fourth 64-bits is bits 255:192 of 256 bit word |
| Diu__pcu__rvalid | 1 | In | Signal from DIU telling PCU that valid read data is on the diu__data bus |

23.7.1

23.7.2 Configuration Registers

TABLE 140

PCU Configuration Registers

| Address PCU_base+ | register | #bits | reset | description |
|---|---|---|---|---|
| | | Control registers | | |
| 0x00 | Reset | 1 | 0x1 | A write to this register causes a reset of the PCU.<br>This register can be read to indicate the reset state:<br>0 - reset in progress<br>1 - reset not in progress |
| 0x04 | CmdAdr[21:5]<br>(256-bit aligned DRAM address) | 17 | 0x00000 | The address of the next set of commands to retrieve from DRAM.<br>When this register is written to, either by the CPU or DRAM command, 1 is also written to CmdSource to cause the execution of the commands at the specified address. |
| 0x08 | BandSelectMask[2:0] | 3 | 0x0 | Selects which input finishedBand flags are to be watched to generate the combined pcu_finishedband signal.<br>Bit0 - lbd_finishedband<br>Bit1 - cdu_finishedband<br>Bit2 - te_finishedband |
| 0x0C, 0x10, 0x14, 0x18 | NextBandCmdAdr[3:0][21:5]<br>(256-bit aligned DRAM address) | 4x17 | 0x00000 | The address to transfer to CmdAdr as soon as possible after the next finishedBand[n] signal has been received as long as NextBandCmdEnable[n] is set.<br>A write from the PCU to NextBandCmdAdr[n] with a non-zero value also sets NextBandCmdEnable[n]. A write from the PCU to NextBandCmdAdr[n] with a 0 value clears NextBandCmdEnable[n]. |
| 0x1C | NextCmdAdr[21:5] | 17 | 0x00000 | The address to transfer to CmdAdr when the CPU pending bit (CmdPending[4]) get serviced.<br>A write from the PCU to NextCmdAdr[n] with a non-zero value also sets CmdPending[4].<br>A write from the PCU to NextCmdAdr[n] with a 0 value clears CmdPending[4] |
| 0x20 | CmdSource | 1 | 0x0 | 0 - commands are taken from the CPU<br>1 - commands are taken from the CPU as well as DRAM at CmdAdr. |
| 0x24 | DebugSelect[15:2] | 14 | 0x0000 | Debug address select. Indicates the address of the register to report on the pcu_cpu_data bus when it is not otherwise being used, and the PEP bus is not being used<br>Bits [15:12] select the unit (see Table 141)<br>Bits [11:2] select the register within the unit |
| | | Work registers (read only) | | |
| 0x28 | InvalidAddress[21:3]<br>(64-bit aligned DRAM) | 19 | 0 | DRAM Address of current 64-bit command attempting to execute.<br>Read only register. |
| 0x2C | CmdPending | 5 | 0x00 | For each bit n, where n is 0 to 3<br>0 - no commands pending for NextBandCmdAdr[n]<br>1 - commands pending for NextBandCmdAdr[n]<br>For bit 4<br>0 - no commands pending for NextCmdAdr[n]<br>1 - commands pending for NextCmdAdr[n]<br>Read only register. |
| 0x34 | FinishedSoFar | 3 | 0x0 | The appropriate bit is set whenever the corresponding input finishedBand flag is set and the corresponding bit in the BandSelectMask bit is also set.<br>If all FinishedSoFar bits are set wherever BandSelect bits are also set, all FinishedSoFar bits are cleared and the output pcu_finishedband signal is given.<br>Read only register. |
| 0x38 | NextBandCmdEnable | 4 | 0x0 | This register can be written to indirectly (i.e. the bits are set or cleared via writes to |

TABLE 140-continued

| PCU Configuration Registers | | | | |
|---|---|---|---|---|
| Address PCU_base+ | register | #bits | reset | description |
| | | | | NextBandCmdAdr[n])<br>For each bit:<br>0 - do nothing at the next finishedBand[n] signal.<br>1 - Execute instructions at NextBandCmdAdr[n] as soon as possible after receipt of the next finishedBand[n] signal.<br>Bit0 - lbd_finishedband<br>Bit1 - cdu_finishedband<br>Bit2 - te_finishedband<br>Bit3 - pcu_finishedband<br>Read only register. |

23.7.2

23.8 Detailed Description

23.8.1 PEP Blocks Register Map

All PEP accesses are 32-bit register accesses.

From Table 141 it can be seen that four bits only are necessary to address each of the sub-blocks within the PEP part of SoPEC. Up to 14 bits may be used to address any configurable 32-bit register within PEP. This gives scope for 1024 configurable registers per sub-block. This address comes either from the CPU or from a command stored in DRAM. The bus is assembled as follows:

adr[15:12]=sub-block address adr[n:2]=32-bit register address within sub-block, only the number of bits required to decode the registers within each sub-block are used.

TABLE 141

| PEP blocks Register Map | |
|---|---|
| Block | Block Select Decode = cpu_adr[15:12] |
| PCU | 0x0 |
| CDU | 0x1 |
| CFU | 0x2 |
| LBD | 0x3 |
| SFU | 0x4 |
| TE | 0x5 |
| TFU | 0x6 |
| HCU | 0x7 |
| DNC | 0x8 |
| DWU | 0x9 |
| LLU | 0xA |
| PHI | 0xB |
| Reserved | 0xC to 0xF |

23.8.2 Internal PCU PEP Protocol

The PCU performs PEP configuration register accesses via a select signal, pcu_<block>_sel. The read/write sense of the access is communicated via the pcu_rwn signal (1=read, 0=write). Write data is clocked out, and read data clocked in upon receipt of the appropriate select-read/write-address combination.

Figure 146:
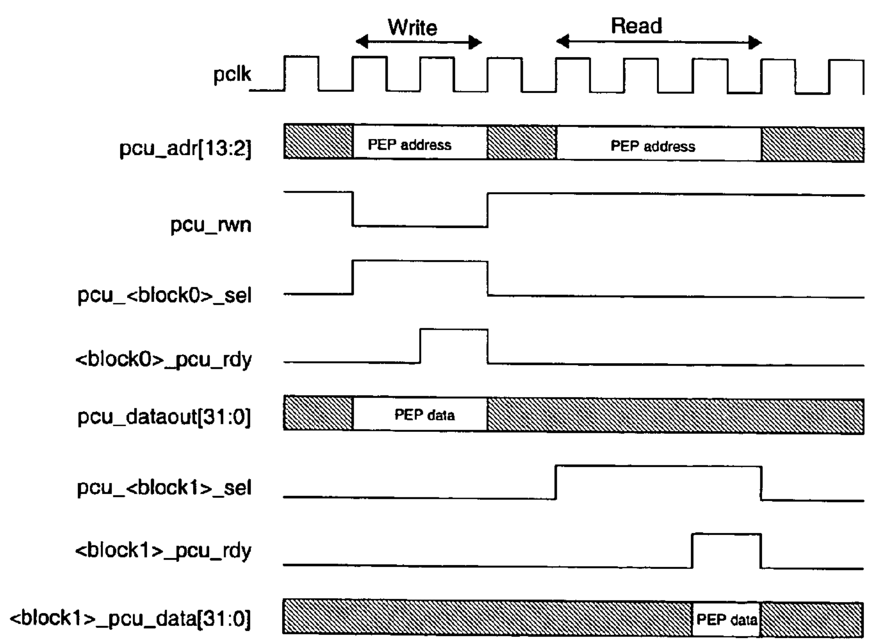
Figure 147:
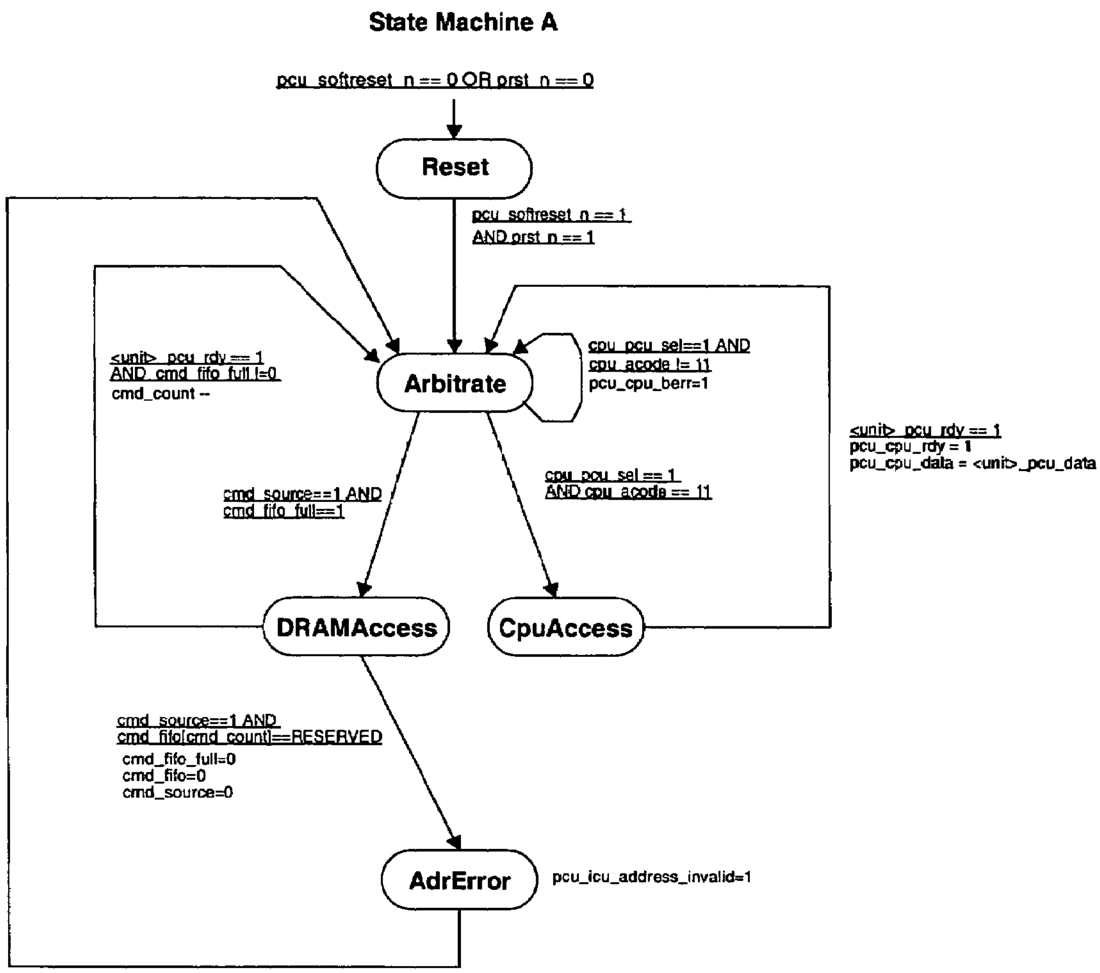
Figure 148:
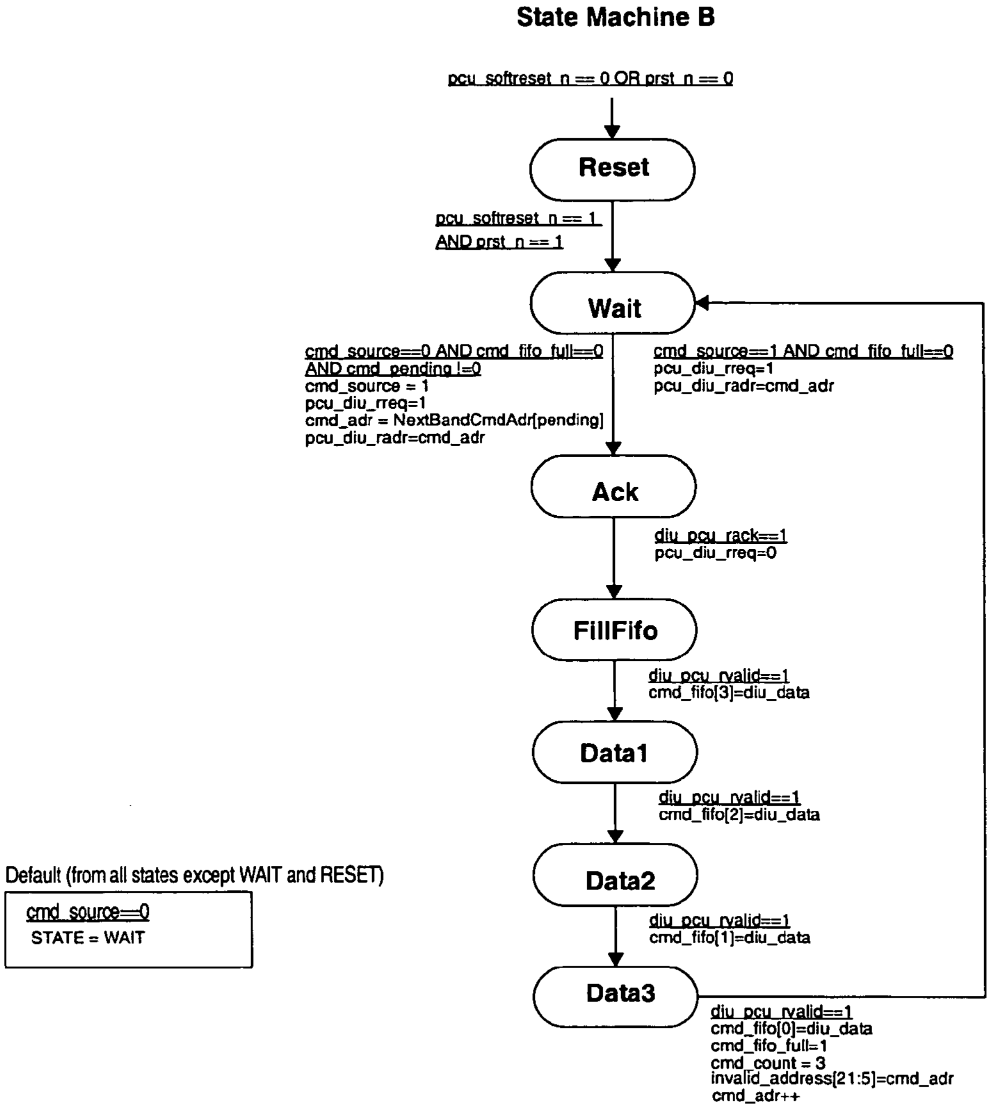

FIG. 146 shows a write operation followed by a read operation. The read operation is shown with wait states while the PEP block returns the read data.

For access to the PEP blocks a simple bus protocol is used. The PCU first determines which particular PEP block is being addressed so that the appropriate block select signal can be generated. During a write access PCU write data is driven out with the address and block select signals in the first cycle of an access. The addressed PEP block responds by asserting its ready signal indicating that it has registered the write data and the access can complete. The write data bus is common to all PEP blocks.

A read access is initiated by driving the address and select signals during the first cycle of an access. The addressed PEP block responds by placing the read data on its bus and asserting its ready signal to indicate to the PCU that the read data is valid. Each block has a separate point-to-point data bus for read accesses to avoid the need for a tri-stateable bus.

Consecutive accesses to a PEP block must be separated by at least a single cycle, during which the select signal must be de-asserted.

23.8.3 PCU DRAM Access Requirements

The PCU can execute register programming commands stored in DRAM. These commands can be executed at the start of a print run to initialize all the registers of PEP. The PCU can also execute instructions at the start of a page, and between bands. In the inter-band time, it is critical to have the PCU operate as fast as possible. Therefore in the inter-page and inter-band time the PCU needs to get low latency access to DRAM.

A typical band change requires on the order of 4 commands to restart each of the CDU, LBD, and TE, followed by a single command to terminate the DRAM command stream. This is on the order of 5 commands per restart component.

The PCU does single 256 bit reads from DRAM. Each PCU command is 64 bits so each 256 bit DRAM read can contain 4 PCU commands. The requested command is read from DRAM together with the next 3 contiguous 64-bits which are cached to avoid unnecessary DRAM reads. Writing zero to CmdSource causes the PCU to flush commands and terminate program access from DRAM for that command stream. The PCU requires a 256-bit buffer to the 4 PCU commands read by each 256-bit DRAM access. When the buffer is empty the PCU can request DRAM access again. 1024 commands of 64 bits requires 8 Kbytes of DRAM storage.

Programs stored in DRAM are referred to as PCU Program Code.

23.8.4 End of Band Unit

The state machine is responsible for watching the various input xx_finishedband signals, setting the FinishedSoFar flags, and outputting the pcu_finishedband flags as specified by the BandSelect register.

Each cycle, the end of band unit performs the following tasks:

```
pcu_finishedband = (FinishedSoFar[0] == BandSelectMask[0]) AND
                   (FinishedSoFar[1] == BandSelectMask[1]) AND
                   (FinishedSoFar[2] == BandSelectMask[2]) AND
                   (BandSelectMask[0] OR BandSelectMask[1] OR
BandSelectMask[2])
       if (pcu_finishedband == 1) then
          FinishedSoFar[0] = 0
          FinishedSoFar[1] = 0
          FinishedSoFar[2] = 0
       else
          FinishedSoFar[0] = (FinishedSoFar[0] OR
lbd_finishedband) AND BandSelectMask[0]
          FinishedSoFar[1] = (FinishedSoFar[1] OR
cdu_finishedband) AND BandSelectMask[1]
          FinishedSoFar[2] = (FinishedSoFar[2] OR
te_finishedband) AND BandSelectMask[2]
```

Note that it is the responsibility of the microcode at the start of printing a page to ensure that all 3 FinishedSoFar bits are cleared. It is not necessary to clear them between bands since this happens automatically.

If a bit of BandSelectMask is cleared, then the corresponding bit of FinishedSoFar has no impact on the generation of pcu_finishedband.

23.8.5 Executing Commands from DRAM

Registers in PEP can be programmed by means of simple 64-bit commands fetched from DRAM. The format of the commands is given in Table 142. Register locations can have a data value of up to 32 bits. Commands are PEP register write commands only.

TABLE 142

Register write commands in PEP

| command | bits 63-32 | bits 31-16 | bits 15-2 | bits 1-0 |
|---|---|---|---|---|
| Register write | data | zero | 32-bit word address | zero |

Due attention must be paid to the endianness of the processor. The LEON processor is a big-endian processor.

23.8.6 General Operation

Upon a Reset condition, CmdSource is cleared (to 0), which means that all commands are initially sourced only from the CPU bus interface. Registers and can then be written to or read from one location at a time via the CPU bus interface.

If CmdSource is 1, commands are sourced from the DRAM at CmdAdr and from the CPU bus. Writing an address to CmdAdr automatically sets CmdSource to 1, and causes a command stream to be retrieved from DRAM. The PCU executes commands from the CPU or from the DRAM command stream, giving higher priority to the CPU always.

If CmdSource is 0 the DRAM requestor examines the CmdPending bits to determine if a new DRAM command stream is pending. If any of CmdPending bits are set, then the appropriate NextBandCmdAdr or NextCmdAdr is copied to CmdAdr (causing CmdSource to get set to 1) and a new command DRAM stream is retrieved from DRAM and executed by the PCU. If there are multiple pending commands the DRAM requestor will service the lowest number pending bit first. Note that a new DRAM command stream only gets retrieved when the current command stream is empty.

If there are no DRAM commands pending, and no CPU commands the PCU defaults to an idle state. When idle the PCU address bus defaults to the DebugSelect register value (bits 11 to 2 in particular) and the default unit PCU data bus is reflected to the CPU data bus. The default unit is determined by the DebugSelect register bits 15 to 12.

In conjunction with this, upon receipt of a finishedBand[n] signal, NextBandCmdEnable[n] is copied to CmdPending[n] and NextBandCmdEnable[n] is cleared. Note, each of the LBD, CDU, and TE (where present) may be re-programmed individually between bands by appropriately setting NextBandCmdAdr[2-0] respectively. However, execution of inter-band commands may be postponed until all blocks specified in the BandSelectMask register have pulsed their finishedband signal. This may be accomplished by only setting NextBandCmdAdr[3] (indirectly causing NextBandCmdEnable[3] to be set) in which case it is the pcu_finishedband signal which causes NextBandCmdEnable[3] to be copied to CmdPending[3].

To conveniently update multiple registers, for example at the start of printing a page, a series of Write Register commands can be stored in DRAM. When the start address of the first Write Register command is written to the CmdAdr register (via the CPU), the CmdSource register is automatically set to 1 to actually start the execution at CmdAdr. Alternatively the CPU can write to NextCmdAdr causing the CmdPending[4] bit to get set, which will then get serviced by the DRAM requestor in the pending bit arbitration order.

The final instruction in the command block stored in DRAM must be a register write of 0 to CmdSource so that no more commands are read from DRAM. Subsequent commands will come from pending programs or can be sent via the CPU bus interface.

23.8.6.1 Debug Mode

Debug mode is implemented by reusing the normal CPU and DRAM access decode logic. When in the Arbitrate state (see state machine A below), the PEP address bus is defaulted to the value in the DebugSelect register. The top bits of the DebugSelect register are used to decode a select to a PEP unit and the remaining bits are reflected on the PEP address bus. The selected units read data bus is reflected on the pcu_cpu_data bus to the RDU in the CPU. The pcu_cpu_debug_valid signal indicates to the RDU that the data on the pcu_cpu_data bus is valid debug data.

Normal CPU and DRAM command access requires the PEP bus, and as such causes the debug data to be invalid during the access. This is indicated to the RDU by setting pcu_cpu_debug_valid to zero.

The decode logic is:

```
// Default Debug decode
if state == Arbitrate then
        if (cpu_pcu_sel == 1 AND cpu_acode /=
        SUPERVISOR_DATA_MODE) then
```

-continued

```
        pcu_cpu_debug_valid      = 0      // bus error condition
        pcu_cpu_data             = 0
      else
        <unit>                   = decode(DebugSelect[15:12])
        if (<unit>   == PCU) then
          pcu_cpu_data           = Internal PCU register
        else
          pcu_cpu_data           = <unit>_pcu_datain[31:0]
        pcu_adr[11:2]            = DebugSelect[11:2]
        pcu_cpu_debug_valid      = 1 AFTER 4 clock cycles
else
      pcu_cpu_debug_valid        = 0
```

23.8.7 State Machines

DRAM command fetching and general command execution is accomplished using two state machines. State machine A evaluates whether a CPU or DRAM command is being executed, and proceeds to execute the command(s). Since the CPU has priority over the DRAM it is permitted to interrupt the execution of a stream of DRAM commands.

Machine B decides which address should be used for DRAM access, fetches commands from DRAM and fills a command fifo which A executes. The reason for separating the two functions is to facilitate the execution of CPU or Debug commands while state machine B is performing DRAM reads and filling the command fifo. In the case where state machine A is ready to execute commands (in its Arbitrate state) and it sees both a full DRAM command fifo and an active cpu_pcu_sel then the DRAM commands are executed last.

23.8.7.1 State Machine A: Arbitration and Execution of Commands

The state-machine enters the Reset state when there is an active strobe on either the reset pin, prst_n, or the PCU's soft-reset register. All registers in the PCU are zeroed, unless otherwise specified, on the next rising clock edge. The PCU self-deasserts the soft reset in the pclk cycle after it has been asserted.

The state changes from Reset to Arbitrate when prst_n==1 and PCU_softreset==1.

The state-machine waits in the Arbitrate state until it detects a request for CPU access to the PEP units (cpu_pcu_sel==1 and cpu_acode==11) or a request to execute DRAM commands CmdSource==1DRAM commands are available, CmdFifoFull=1. Note if (cpu_pcu_sel==1 and cpu_acode!=11) the CPU is attempting an illegal access. The PCU ignores this command and strobes the cpu_pcu_berr for one cycle.

While in the Arbitrate state the machine assigns the DebugSelect register to the PCU unit decode logic and the remaining bits to the PEP address bus. When in this state the debug data returned from the selected PEP unit is reflected on the CPU bus (pcu_cpu_data bus) and the pcu_cpu_debug_valid=1.

If a CPU access request is detected (cpu_pcu_sel==1 and cpu_acode==11) then the machin proceeds to the CpuAccess state. In the CpuAccess state the cpu address is decoded and used to determine the PEP unit to select. The remaining address bits are passed through to the PEP address bus. The machine remains in the CpuAccess state until a valid ready from the selected PEP unit is received. When received the machine returns to the arbitrate state, and the ready signal to the CPU is pulsed.

```
        // decode the logic
        pcu_<unit>_sel = decode(cpu_adr[15:12])
        pcu_adr[11:2]    = cpu_adr[11:2]
```

The CPU is prevented (by the MMU) from generating an invalid PEP unit address and so CPU accesses cannot generate an invalid address error.

If the state machine detects a request to execute DRAM commands (CmdSource==1), it waits in the Arbitrate state until commands have been loaded into the command FIFO from DRAM (all controlled by state machine B). When the DRAM commands are available (cmd_fifo_full==1) the state machine proceeds to the DRAMAccess state.

When in the DRAMAccess state the commands are executed from the cmd_fifo. A command in the cmd_fifo consists of 64-bits (or which the FIFO holds 4). The decoding of the 64-bits to commands is given in Table 142. For each command the decode is

```
    // DRAM command decode
    pcu_<unit>_sel     = decode( cmd_fifo[cmd_count][15:12] )
    pcu_adr[11:2]      = cmd_fifo[cmd_count][11:2]
    pcu_dataout        = cmd_fifo[cmd_count][63:32]
```

When the selected PEP unit returns a ready signal (<unit>_pcu_rdy==1) indicating the command has completed, the state machine returns to the Arbitrate state. If more commands exists (cmd_count!=0) the transition decrements the command count.

When in the DRAMAccess state, if when decoding the DRAM command address bus (cmd_fifo[cmd_count][15:12]), the address selects a reserved address, the state machine proceeds to the AdrError state, and then back to the Arbitrate state. An address error interrupt is generated and the DRAM command FIFOs are cleared.

A CPU access can pre-empt any pending DRAM commands. After each command is completed the state machine returns to the Arbitrate state. If a CPU access is required and DRAM command stream is executing the CPU access always takes priority. If a CPU or DRAM command sets the CmdSource to 0, all subsequent DRAM commands in the command FIFO are cleared. If the CPU sets the CmdSource to 0 the CmdPending and NextBandCmdEnable work registers are also cleared.

23.8.7.2 State Machine B: Fetching DRAM Commands

A system reset (prst_n==0) or a software reset (pcu_softreset_n==0) causes the state machine to reset to the Reset state. The state machine remains in the Reset until both reset conditions are removed. When removed the machine proceeds to the Wait state.

The state machine waits in the Wait state until it determines that commands are needed from DRAM. Two possible conditions exist that require DRAM access. Either the PCU is processing commands which must be fetched from DRAM (cmd_source==1), and the command FIFO is empty (cmd_fifo_full==0), or the cmd_source==0 and the command FIFO is empty and there are some commands pending (cmd_pending !=0).

In either of these conditions the machine proceeds to the Ack state and issues a read request to DRAM (pcu_diu_rreq==1), it calculates the address to read from dependent on the transition condition. In the command pending transition condition, the highest priority NextBandCmdAdr (or NextCmdAdr) that is pending is used for the read address (pcu_diu_radr) and is also copied to the CmdAdr register. If multiple pending bits are set the lowest pending bits are serviced first. In the normal PCU processing transition the pcu_diu_radr is the CmdAdr register.

When an acknowledge is received from the DRAM the state machine goes to the FillFifo state. In the FillFifo state the machine waits for the DRAM to respond to the read request and transfer data words. On receipt of the first word of data diu_pcu_rvalid==1, the machine stores the 64-bit data word in the command FIFO (cmd_fifo[3]) and transitions to the Data1, Data2, Data3 states each time waiting for a diu_pcu_rvalid==1 and storing the transferred data word to cmd_fifo[2], cmd_fifo[1] and cmd_fifo[0] respectively.

When the transfer is complete the machine returns to the Wait state, setting the cmd_count to 3, the cmd_fifo_full is set to 1 and the CmdAdr is incremented.

If the CPU sets the CmdSource register to 0 while the PCU is in the middle of a DRAM access, the statemachine returns to the Wait state and the DRAM access is aborted.

23.8.7.3 PCU_ICU_Address_Invalid Interrupt

When the PCU is executing commands from DRAM, addresses decoded from commands which are not PCU mapped addresses (4-bits only) will cause the current command to be ignored and the pcu_icu_address_invalid interrupt signal to be strobed. When an invalid command occurs all remaining commands already retrieved from DRAM are flushed from the CmdFifo, and the CmdPending, NextBandCmdEnable and CmdSource registers are cleared to zero.

The CPU can then interrogate the PCU to find the source of the illegal DRAM command via the InvalidAddress register.

The CPU is prevented by the MMU from generating an invalid address command.

24 Contone Decoder Unit (CDU)

24.1 Overview

The Contone Decoder Unit (CDU) is responsible for performing the optional decompression of the contone data layer.

The input to the CDU is up to 4 planes of compressed contone data in JPEG interleaved format. This will typically be 3 planes, representing a CMY contone image, or 4 planes representing a CMYK contone image. The CDU must support a page of A4 length (11.7 inches) and Letter width (8.5 inches) at a resolution of 267 ppi in 4 colors and a print speed of 1 side per 2 seconds.

The CDU and the other page expansion units support the notion of page banding. A compressed page is divided into one or more bands, with a number of bands stored in memory. As a band of the page is consumed for printing a new band can be downloaded. The new band may be for the current page or the next page. Band-finish interrupts have been provided to notify the CPU of free buffer space.

The compressed contone data is read from the on-chip DRAM. The output of the CDU is the decompressed contone data, separated into planes. The decompressed contone image is written to a circular buffer in DRAM with an expected minimum size of 12 lines and a configurable maximum. The decompressed contone image is subsequently read a line at a time by the CFU, optionally color converted, scaled up to 1600 ppi and then passed on to the HCU for the next stage in the printing pipeline. The CDU also outputs a cdu_finishedband control flag indicating that the CDU has finished reading a band of compressed contone data in DRAM and that area of DRAM is now free. This flag is used by the PCU and is available as an interrupt to the CPU.

24.2 Storage Requirements for Decompressed Contone Data in DRAM

A single SoPEC must support a page of A4 length (11.7 inches) and Letter width (8.5 inches) at a resolution of 267 ppi in 4 colors and a print speed of 1 side per 2 seconds. The printheads specified in the Linking Printhead Databook have 13824 nozzles per color to provide full bleed printing for A4 and Letter. At 267 ppi, there are 2304 contone pixels per line represented by 288 JPEG blocks per color. However each of these blocks actually stores data for 8 lines, since a single JPEG block is 8×8 pixels. The CDU produces contone data for 8 lines in parallel, while the HCU processes data linearly across a line on a line by line basis. The contone data is decoded only once and then buffered in DRAM. This means two sets of 8 buffer-lines are required—one set of 8 buffer lines is being consumed by the CFU while the other set of 8 buffer lines is being generated by the CDU.

The buffer requirement can be reduced by using a 1.5 buffering scheme, where the CDU fills 8 lines while the CFU consumes 4 lines. The buffer space required is a minimum of 12 line stores per color, for a total space of 108 KBytes. A circular buffer scheme is employed whereby the CDU may only begin to write a line of JPEG blocks (equals 8 lines of contone data) when there are 8-lines free in the buffer. Once the full 8 lines have been written by the CDU, the CFU may now begin to read them on a line by line basis.

This reduction in buffering comes with the cost of an increased peak bandwidth requirement for the CDU write access to DRAM. The CDU must be able to write the decompressed contone at twice the rate at which the CFU reads the data. To allow for trade-offs to be made between peak bandwidth and amount of storage, the size of the circular buffer is configurable. For example, if the circular buffer is configured to be 16 lines it behaves like a double-buffer scheme where the peak bandwidth requirements of the CDU and CFU are equal. An increase over 16 lines allows the CDU to write ahead of the CFU and provides it with a margin to cope with very poor local compression ratios in the image.

SoPEC should also provide support for A3 printing and printing at resolutions above 267 ppi. This increases the storage requirement for the decompressed contone data (buffer) in DRAM. Table 143 gives the storage requirements for the decompressed contone data at some sample contone resolutions for different page sizes. It assumes 4 color planes of contone data and a 1.5 buffering scheme.

TABLE 143

Storage requirements for decompressed contone data (buffer)

| Page size | Contone resolution (ppi) | Scale factor[a] | Pixels per line | Storage required (kBytes) |
|---|---|---|---|---|
| A4/Letter[b] | 267 | 6 | 2304 | 108[d] |
| | 400 | 4 | 3456 | 162 |
| | 800 | 2 | 6912 | 324 |
| A3[c] | 267 | 6 | 3248 | 152.25 |
| | 400 | 4 | 4872 | 228.37 |
| | 800 | 2 | 9744 | 456.75 |

[a]Required for CFU to convert to final output at 1600 dpi
[b]Linking printhead has 13824 nozzles per color providing full bleed printing for A4/Letter
[c]Linking printhead has 19488 nozzles per color providing full bleed printing for A3
[d]12 lines × 4 colors × 2304 bytes.

24.3 Decompression Performance Requirements

The JPEG decoder core can produce a single color pixel every system clock (pclk) cycle, making it capable of decoding at a peak output rate of 8 bits/cycle. SoPEC processes 1 dot (bi-level in 6 colors) per system clock cycle to achieve a print speed of 1 side per 2 seconds for full bleed A4/Letter printing. The CFU replicates pixels a scale factor (SF) number of times in both the horizontal and vertical directions to convert the final output to 1600 ppi. Thus the CFU consumes a 4 color pixel (32 bits) every SF×SF cycles. The 1.5 buffering scheme described in section 24.2 on page 447 means that the CDU must write the data at twice this rate. With support for 4 colors at 267 ppi, the decompression output bandwidth requirement is 1.78 bits/cycle.

The JPEG decoder is fed directly from the main memory via the DRAM interface. The amount of compression determines the input bandwidth requirements for the CDU. As the level of compression increases, the bandwidth decreases, but the quality of the final output image can also decrease. Although the average compression ratio for contone data is expected to be 10:1, the average bandwidth allocated to the CDU allows for a local minimum compression ratio of 5:1 over a single line of JPEG blocks. This equates to a peak input bandwidth requirement of 0.36 bits/cycle for 4 colors at 267 ppi, full bleed A4/Letter printing at 1 side per 2 seconds.

Table 144 gives the decompression output bandwidth requirements for different resolutions of contone data to meet a print speed of 1 side per 2 seconds. Higher resolution requires higher bandwidth and larger storage for decompressed contone data in DRAM. A resolution of 400 ppi contone data in 4 colors requires 4 bits/cycle, which is practical using a 1.5 buffering scheme. However, a resolution of 800 ppi would require a double buffering scheme (16 lines) so the CDU only has to match the CFU consumption rate. In this case the decompression output bandwidth requirement is 8 bits/cycle, the limiting factor being the output rate of the JPEG decoder core.

TABLE 144

CDU performance requirements for full bleed A4/Letter printing at 1 side per 2 seconds.

| Contone resolution (ppi) | Scale factor | Decompression output bandwidth requirement (bits/cycle)[a] |
|---|---|---|
| 267 | 6 | 1.78 |
| 400 | 4 | 4 |
| 800 | 2 | 8[b] |

[a]Assumes 4 color pixel contone data and a 12 line buffer.
[b]Scale factor 2 requires at least a 16 line buffer.

24.4 Data Flow

Figure 149:
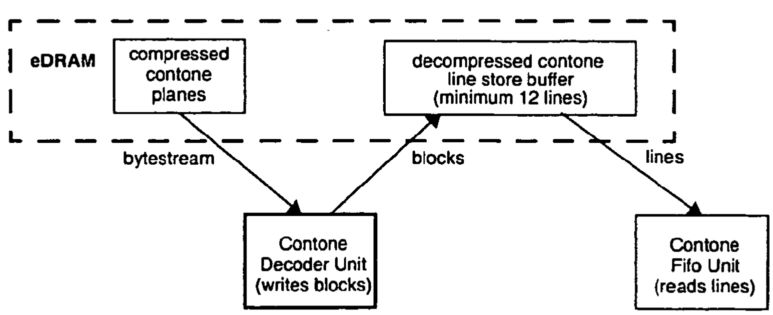

FIG. 149 shows the general data flow for contone data—compressed contone planes are read from DRAM by the CDU, and the decompressed contone data is written to the 12-line circular buffer in DRAM. The line buffers are subsequently read by the CFU.

The CDU allows the contone data to be passed directly on, which will be the case if the color represented by each color plane in the JPEG image is an available ink. For example, the four colors may be C, M, Y, and K, directly represented by CMYK inks. The four colors may represent gold, metallic green etc. for multi-SoPEC printing with exact colors.

However JPEG produces better compression ratios for a given visible quality when luminance and chrominance channels are separated. With CMYK, K can be considered to be luminance, but C, M, and Y each contain luminance information, and so would need to be compressed with appropriate luminance tables. We therefore provide the means by which CMY can be passed to SoPEC as YCrCb. K does not need color conversion. When being JPEG compressed, CMY is typically converted to RGB, then to YCrCb and then finally JPEG compressed. At decompression, the YCrCb data is obtained and written to the decompressed contone store by the CDU. This is read by the CFU where the YCrCb can then be optionally color converted to RGB, and finally back to CMY.

The external RIP provides conversion from RGB to YCrCb, specifically to match the actual hardware implementation of the inverse transform within SoPEC, as per CCIR 601-2 except that Y, Cr and Cb are normalized to occupy all 256 levels of an 8-bit binary encoding.

The CFU provides the translation to either RGB or CMY. RGB is included since it is a necessary step to produce CMY, and some printers increase their color gamut by including RGB inks as well as CMYK.

24.5 Implementation

Figure 150:
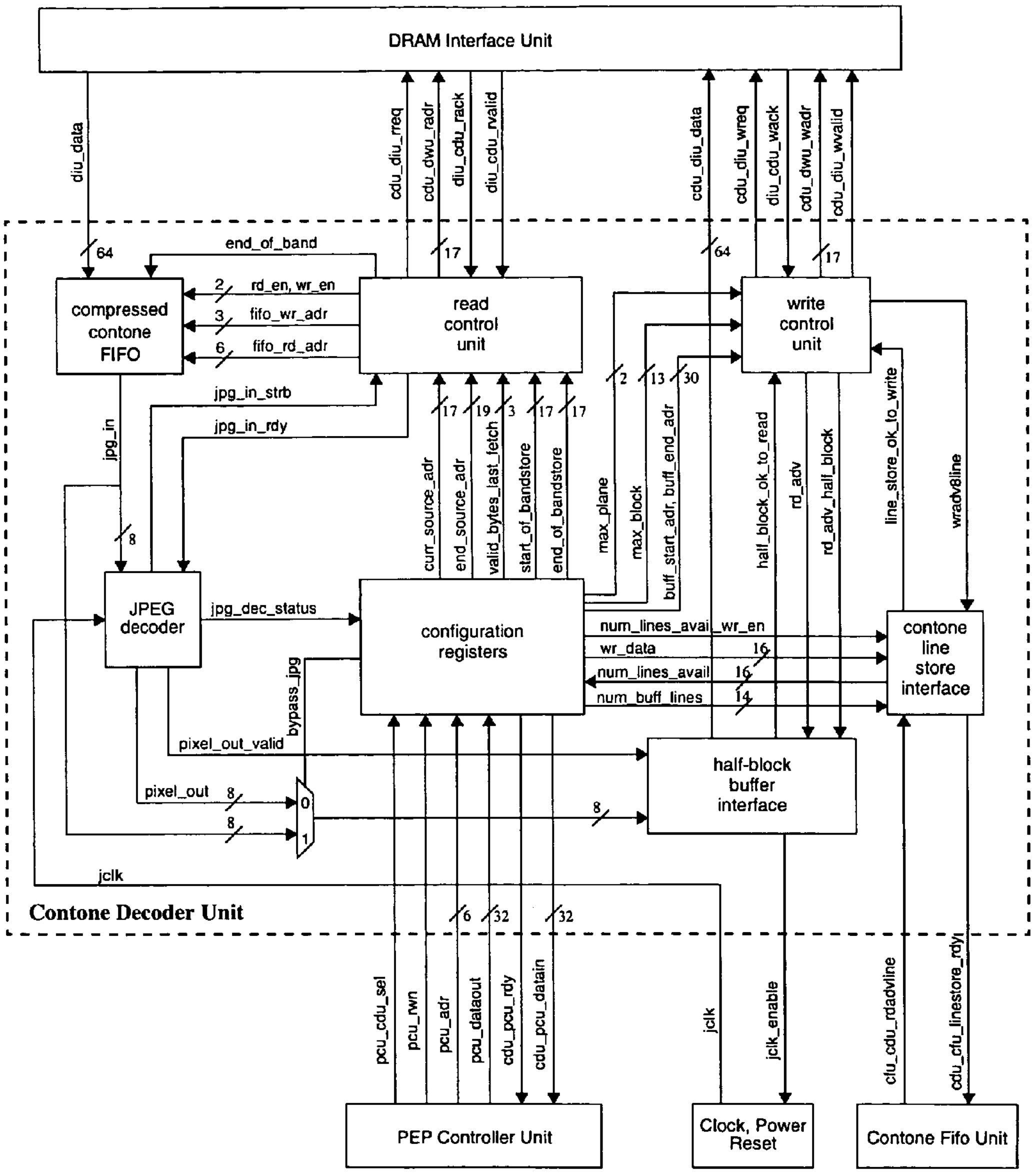

A block diagram of the CDU is shown in FIG. 150.

All output signals from the CDU (cdu_cfu_wradv8line, cdu_finishedband, cdu_icu_jpegerror, and control signals to the DIU) must always be valid after reset. If the CDU is not currently decoding, cdu_cfu_wradv8line, cdu_finishedband and cdu_icu_jpegerror will always be 0.

The read control unit is responsible for keeping the JPEG decoder's input FIFO full by reading compressed contone bytestream from external DRAM via the DIU, and produces the cdu_finishedband signal. The write control unit accepts the output from the JPEG decoder a half JPEG block (32 bytes) at a time, writes it into a double-buffer, and writes the double buffered decompressed half blocks to DRAM via the DIU, interacting with the CFU in order to share DRAM buffers.

24.5.1 Definitions of I/O

TABLE 145

CDU port list and description

| Port name | Pins | I/O | Description |
|---|---|---|---|
| | | | Clocks and reset |
| Pclk | 1 | In | System clock. |
| Jclk | 1 | In | Gated version of system clock used to clock the JPEG decoder core and logic at the output of the core. Allows for stalling of the JPEG core at a pixel sample boundary. |

TABLE 145-continued

CDU port list and description

| Port name | Pins | I/O | Description |
|---|---|---|---|
| jclk_enable | 1 | Out | Gating signal for jclk. |
| prst_n | 1 | In | System reset, synchronous active low. |
| jrst_n | 1 | In | Reset for jclk domain, synchronous active low. |
| | | | PCU interface |
| pcu_cdu_sel | 1 | In | Block select from the PCU. When pcu_cdu_sel is high both pcu_adr and pcu_dataout are valid. |
| pcu_rwn | 1 | In | Common read/not-write signal from the PCU. |
| pcu_adr[7:2] | 6 | In | PCU address bus. Only 6 bits are required to decode the address space for this block. |
| pcu_dataout[31:0] | 32 | In | Shared write data bus from the PCU. |
| cdu_pcu_rdy | 1 | Out | Ready signal to the PCU. When cdu_pcu_rdy is high it indicates the last cycle of the access. For a write cycle this means pcu_dataout has been registered by the block and for a read cycle this means the data on cdu_pcu_datain is valid. |
| cdu_pcu_datain[31:0] | 32 | Out | Read data bus to the PCU. |
| | | | DIU read interface |
| cdu_diu_rreq | 1 | Out | CDU read request, active high. A read request must be accompanied by a valid read address. |
| Diu_cdu_rack | 1 | In | Acknowledge from DIU, active high. Indicates that a read request has been accepted and the new read address can be placed on the address bus, cdu_diu_radr. |
| cdu_diu_radr[21:5] | 17 | Out | CDU read address. 17 bits wide (256-bit aligned word). |
| Diu_cdu_rvalid | 1 | In | Read data valid, active high. Indicates that valid read data is now on the read data bus, diu_data. |
| Diu_data[63:0] | 64 | In | Read data from DRAM. |
| | | | DIU write interface |
| cdu_diu_wreq | 1 | Out | CDU write request, active high. A write request must be accompanied by a valid write address and valid write data. |
| Diu_cdu_wack | 1 | In | Acknowledge from DIU, active high. Indicates that a write request has been accepted and the new write address can be placed on the address bus, cdu_diu_wadr. |
| cdu_diu_wadr[21:3] | 19 | Out | CDU write address. 19 bits wide (64-bit aligned word). |
| cdu_diu_wvalid | 1 | Out | Write data valid, active high. Indicates that valid data is now on the write data bus, cdu_diu_data. |
| cdu_diu_data[63:0] | 64 | Out | Write data bus. |
| | | | CFU interface |
| cfu_cdu_rdadvline | 1 | In | Read line pulse, active high. Indicates that the CFU has finished reading a line of decompressed contone data to the circular buffer in DRAM and that line of the buffer is now free. |
| cdu_cfu_linestore_rdy | 1 | Out | Indicates if the contone line store has 1 or more lines available to read by the CFU. |
| | | | ICU interface |
| cdu_finishedband | 1 | Out | CDU's finishedBand flag, active high. Interrupt to the CPU to indicate that the CDU has finished processing a band of compressed contone data in DRAM and that area of DRAM is now free. This signal goes to both the interrupt controller and the PCU. |
| cdu_icu_jpegerror | 1 | Out | Active high interrupt indicating an error has occurred in the JPEG decoding process and decompression has stopped. A reset of the CDU must be performed to clear this interrupt. |

24.5.2 Configuration Registers

The configuration registers in the CDU are programmed via the PCU interface. Refer to section 23.8.2 on page 439 for the description of the protocol and timing diagrams for reading and writing registers in the CDU. Note that since addresses in SoPEC are byte aligned and the PCU only supports 32-bit register reads and writes, the lower 2 bits of the PCU address bus are not required to decode the address space for the CDU.

When reading a register that is less than 32 bits wide zeros are returned on the upper unused bit(s) of cdu_pcu_datain.

The software reset logic should include a circuit to ensure that both the pclk and jclk domains are reset regardless of the state of the jclk_enable when the reset is initiated.

The CDU contains the following additional registers:

TABLE 146

CDU registers

| Address (CDU_base+) | Register name | #bits | Value on reset | Description |
|---|---|---|---|---|
| | | Control registers | | |
| 0x00 | Reset | 1 | 0x1 | A write to this register causes a reset of the CDU. This terminates all internal operations within the CS6150. All configuration data previously loaded into the core except for the tables is deleted. |
| 0x04 | Go | 1 | 0x0 | Writing 1 to this register starts the CDU. Writing 0 to this register halts the CDU.<br>When Go is deasserted the state-machines go to their idle states but all counters and configuration registers keep their values.<br>When Go is asserted all counters are reset, but configuration registers keep their values (i.e. they don't get reset). NextBandEnable is cleared when Go is asserted.<br>The CFU must be started before the CDU is started.<br>Go must remain low for at least 384 jclk cycles after a hardware reset (prst_n = 0) to allow the JPEG core to complete its memory initialisation sequence.<br>This register can be read to determine if the CDU is running (1 - running, 0 - stopped). |
| | | Setup registers | | |
| 0x0C | NumLinesAvail | 16 | 0x0000 | The number of image lines of data that there is space available for in the decompressed data buffer in DRAM.<br>If this drops < 8 the CDU will stall.<br>In normal operation this value will start off at NumBuffLines and will be decremented by 8 whenever the CDU writes a line of JPEG blocks (8 lines of data) to DRAM and incremented by 1 whenever the CFU reads a line of data from DRAM.<br>NumLinesAvail can be adjusted by the CPU to prevent the CDU from stalling. When the CPU writes to this register, the NumLinesAvail is incremented by the CPU write value. (Working Register) |
| 0x10 | MaxPlane | 2 | 0x0 | Defines the number of contone planes − 1.<br>For example, this will be 0 for K (greyscale printing), 2 for CMY, and 3 for CMYK. |
| 0x14 | MaxBlock | 13 | 0x000 | Number of JPEG MCUs (or JPEG block equivalents, i.e. 8x8 bytes) in a line − 1. |
| 0x18 | BuffStartAdr[21:7] | 15 | 0x0000 | Points to the start of the decompressed contone circular buffer in DRAM, aligned to a half JPEG block boundary.<br>A half JPEG block consists of 4 words of 256-bits, enough to hold 32 contone pixels in 4 colors, i.e. half a JPEG block. |
| 0x1C | BuffEndAdr[21:7] | 15 | 0x0000 | Points to the start of the last half JPEG block at the end of the decompressed contone circular buffer in DRAM, aligned to a half JPEG block boundary.<br>A half JPEG block consists of 4 |

TABLE 146-continued

| Address (CDU_base+) | Register name | #bits | Value on reset | Description |
|---|---|---|---|---|
| CDU registers | | | | |
| | | | | words of 256-bits, enough to hold 32 contone pixels in 4 colors, i.e. half a JPEG block. |
| 0x20 | NumBuffLines[15:2] | 14 | 0x000C | Defines size of buffer in DRAM in terms of the number of decompressed contone lines. The size of the buffer should be a multiple of 4 lines with a minimum size of 8 lines. |
| 0x24 | BypassJpg | 1 | 0x0 | Determines whether or not the JPEG decoder will be bypassed (and hence pixels are copied directly from input to output)<br>0 - don't bypass, 1 - bypass<br>Should not be changed between bands. |
| 0x30 | NextBandCurrSourceAdr[21:5] | 17 | 0x0_0000 | The 256-bit aligned word address containing the start of the next band of compressed contone data in DRAM.<br>This value is copied to CurrSourceAdr when both DoneBand is 1 and NextBandEnable is 1, or when Go transitions from 0 to 1. |
| 0x34 | NextBandEndSourceAdr[21:3] | 19 | 0x0_0000 | The 64-bit aligned word address containing the last bytes of the next band of compressed contone data in DRAM.<br>This value is copied to EndSourceAdr when both DoneBand is 1 and NextBandEnable is 1, or when Go transitions from 0 to 1. |
| 0x38 | NextBandValidBytesLastFetch | 3 | 0x0 | Indicates the number of valid bytes − 1 in the last 64-bit fetch of the next band of compressed contone data from DRAM. e.g. 0 implies bits 7:0 are valid, 1 implies bits 15:0 are valid, 7 implies all 63:0 bits are valid etc.<br>This value is copied to ValidBytesLastFetch when both DoneBand is 1 and NextBandEnable is 1 or when Go transitions from 0 to 1. |
| 0x3C | NextBandEnable | 1 | 0x0 | When NextBandEnable is 1 and DoneBand is 1<br>NextBandCurrSourceAdr is copied to CurrSourceAdr,<br>NextBandEndSourceAdr is copied to EndSourceAdr<br>NextBandValidBytesLastFetch is copied to ValidBytesLastFetch<br>DoneBand is cleared,<br>NextBandEnable is cleared.<br>NextBandEnable is cleared when Go is asserted.<br>Note that DoneBand gets cleared regardless of the state of Go. |
| Read-only registers | | | | |
| 0x40 | DoneBand | 1 | 0x0 | Specifies whether or not the current band has finished loading into the local FIFO. It is cleared to 0 when Go transitions from 0 to 1.<br>When the last of the compressed contone data for the band has been loaded into the local FIFO, the cdu_finishedband signal is given out and the DoneBand flag is set.<br>If NextBandEnable is 1 at this time then CurrSourceAdr, EndSourceAdr and ValidBytesLastFetch are updated with the values for the next |

TABLE 146-continued

| Address (CDU_base+) | Register name | #bits | Value on reset | Description |
|---|---|---|---|---|
| | **CDU registers** | | | |
| | | | | band and DoneBand is cleared. Processing of the next band starts immediately. If NextBandEnable is 0 then the remainder of the CDU will continue to run, decompressing the data already loaded, while the read control unit waits for NextBandEnable to be set before it restarts. |
| 0x44 | CurrSourceAdr[21:5] | 17 | 0x0_0000 | The current 256-bit aligned word address within the current band of compressed contone data in DRAM. |
| 0x48 | EndSourceAdr[21:3] | 19 | 0x0_0000 | The 64-bit aligned word address containing the last bytes of the current band of compressed contone data in DRAM. |
| 0x4C | ValidBytesLastFetch | 3 | 0x00 | Indicates the number of valid bytes − 1 in the last 64-bit fetch of the current band of compressed contone data from DRAM. e.g. 0 implies bits 7:0 are valid, 1 implies bits 15:0 are valid, 7 implies all 63:0 bits are valid etc. |
| | **JPEG decoder core setup registers** | | | |
| 0x50 | JpgDecMask | 5 | 0x00 | As segments are decoded they can also be output on the DecJpg (JpgDecHdr) port with the user selecting the segments for output by setting bits in the jpgDecMask port as follows:<br>4 SOF+SOS+DNL<br>3 COM+APP<br>2 DRI<br>1 DQT<br>0 DHT<br>If any one of the bits of jpgDecMask is asserted then the SOI and EOI markers are also passed to the DecJpg port. |
| 0x54 | JpgDecTType | 1 | 0x0 | Test type selector:<br>0 - DCT coefficients displayed on JpgDecTdata<br>1 - QDCT coefficient displayed on JpgDecTdata |
| 0x58 | JpgDecTestEn | 1 | 0x0 | Signal which causes the memories to be bypassed for test purposes. |
| 0x5C | JpgDecPType | 4 | 0x0 | Signal specifying parameters to be placed on port JpgDecPValue (See Table 147). |
| | **JPEG decoder core read-only status registers** | | | |
| 0x60 | JpgDecHdr | 8 | 0x00 | Selected header segments from the JPEG stream that is currently being decoded. Segments selected using JpgMask. |
| 0x64 | JpgDecTData | 13 | 0x0000 | 12 - TSOS output of CS1650, indicates the first output byte of the first 8 × 8 block of the test data.<br>11 - TSOB output of CS1650, indicates the first output byte of each 8×8 block of test data.<br>10-0 - 11-bit output test data port - displays DCT coefficients or quantized coefficients depending on value of JpgDecTType. |
| 0x68 | JpgDecPValue | 16 | 0x0000 | Decoding parameter bus which enables various parameters used by the core to be read. The data available on the PValue port is for information only, and does not contain control signals for the decoder core. |

TABLE 146-continued

CDU registers

| Address (CDU_base+) | Register name | #bits | Value on reset | Description |
|---|---|---|---|---|
| 0x6C | JpgDecStatus | 24 | 0x00_0000 | Bit 23 - jpg_core_stall (if set, indicates that the JPEG core is stalled by gating of jclk as the output JPEG halfblock double-buffers of the CDU are full)<br>Bit 22 - pix_out_valid (This signal is an output from the JPEG decoder core and is asserted when a pixel is being output<br>Bits 21-16 - fifo_contents (Number of bytes in compressed contone FIFO at the input of CDU which feeds the JPEG decoder core)<br>Bits 15-0 are JPEG decoder status outputs from the CS6150 (see Table 148 for description of bits). |
| Setup registers (remain constant during the processing of multiple bands) | | | | |
| 0x80 | CduStartOfBandStore[21:5] | 17 | 0x0_0000 | Points to the 256-bit word that defines the start of the memory area allocated for CDU page bands. Circular address generation wraps to this start address. |
| 0x84 | CduEndOfBandStore[21:5] | 17 | 0x1_FFFF | Points to the 256-bit word that defines the last address of the memory area allocated for CDU page bands.<br>If the current read address is from this address, then instead of adding 1 to the current address, the current address will be loaded from the CduStartOfBandStore register. |

24.5.3 Typical Operation

The CDU should only be started after the CFU has been started.

For the first band of data, users set up NextBandCurrSourceAdr, NextBandEndSourceAdr, NextBandValidBytesLastFetch, and the various MaxPlane, MaxBlock, BuffStartBlockAdr, BuffEndBlockAdr and NumBuffLines. Users then set the CDU's Go bit to start processing of the band. When the compressed contone data for the band has finished being read in, the cdu_finishedband interrupt will be sent to the PCU and CPU indicating that the memory associated with the first band is now free. Processing can now start on the next band of contone data.

In order to process the next band NextBandCurrSourceAdr, NextBandEndSourceAdr and NextBandValidBytesLastFetch need to be updated before finally writing a 1 to NextBandEnable. There are 4 mechanisms for restarting the CDU between bands:

a. cdu_finishedband causes an interrupt to the CPU. The CDU will have set its DoneBand bit. The CPU reprograms the NextBandCurrSourceAdr, NextBandEndSourceAdr and NextBandValidBytesLastFetch registers, and sets NextBandEnable to restart the CDU.
b. The CPU programs the CDU's NextBandCurrSourceAdr, NextBandCurrEndAdr and NextBandValidBytesLastFetch registers and sets the NextBandEnable bit before the end of the current band. At the end of the current band the CDU sets DoneBand As NextBandEnable is already 1, the CDU starts processing the next band immediately.
c. The PCU is programmed so that cdu_finishedband triggers the PCU to execute commands from DRAM to reprogram the NextBandCurrSourceAdr, NextBandEndSourceAdr and NextBandValidBytesLastFetch registers and set the NextBandEnable bit to start the CDU processing the next band. The advantage of this scheme is that the CPU could process band headers in advance and store the band commands in DRAM ready for execution.
d. This is a combination of b and c above. The PCU (rather than the CPU in b) programs the CDU's NextBandCurrSourceAdr, NextBandCurrEndAdr and NextBandValidBytesLastFetch registers and sets the NextBandEnable bit before the end of the current band. At the end of the current band the CDU sets DoneBand and pulses cdu_finishedband As NextBandEnable is already 1, the CDU starts processing the next band immediately. Simultaneously, cdu_finishedband triggers the PCU to fetch commands from DRAM. The CDU will have restarted by the time the PCU has fetched commands from DRAM. The PCU commands program the CDU's next band shadow registers and sets the NextBandEnable bit.

If an error occurs in the JPEG stream, the JPEG decoder will suspend its operation, an error bit will be set in the JpgDecStatus register and the core will ignore any input data and await a reset before starting decoding again. An interrupt is sent to the CPU by asserting cdu_icu_jpegerror and the CDU should then be reset by means of a write to its Reset register before a new page can be printed.

24.5.4 Read Control Unit

Figure 151:
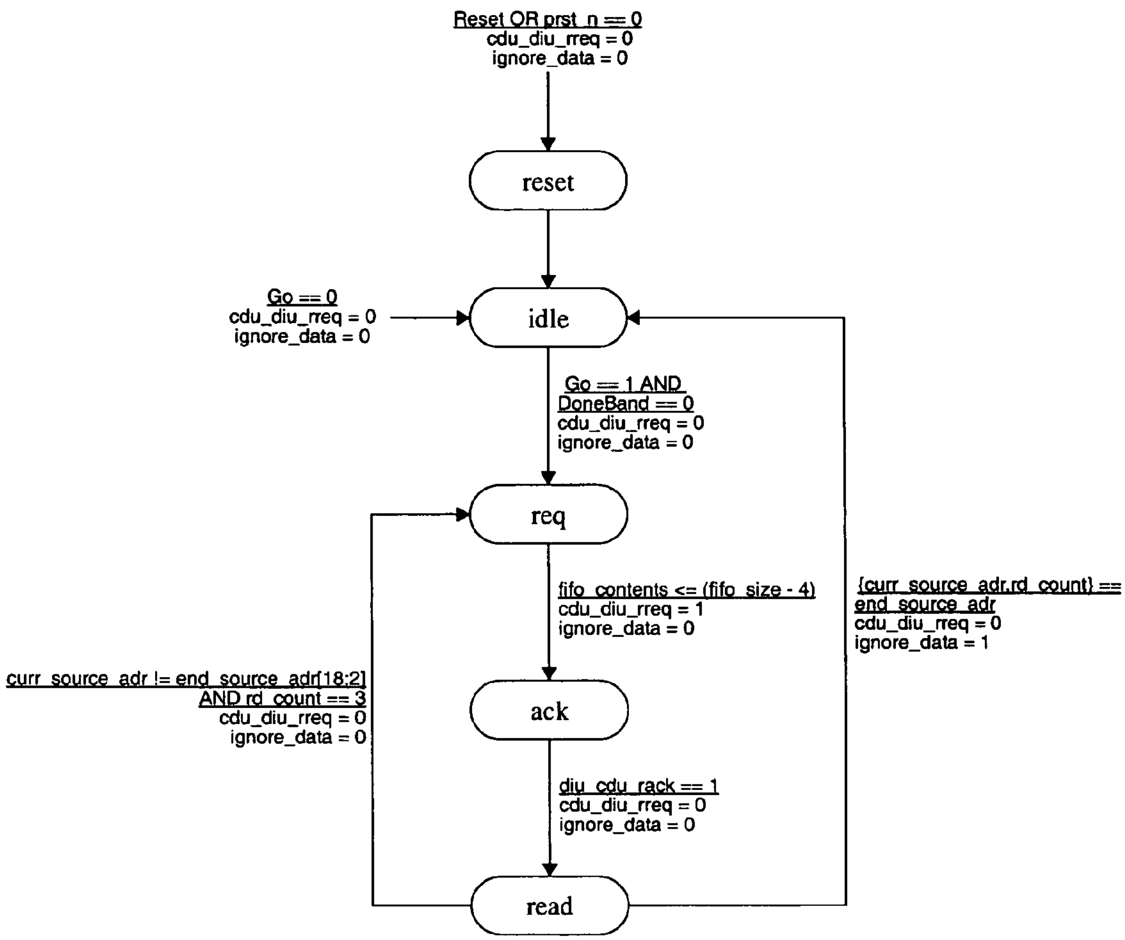

The read control unit is responsible for reading the compressed contone data and passing it to the JPEG decoder via the FIFO. The compressed contone data is read from DRAM in single 256-bit accesses, receiving the data from the DIU over 4 clock cycles (64-bits per cycle). The protocol and timing for read accesses to DRAM is described in section 22.9.1 on page 337. Read accesses to DRAM are implemented by means of the state machine described in FIG. 151.

All counters and flags should be cleared after reset. When Go transitions from 0 to 1 all counters and flags should take their initial value. While the Go bit is set, the state machine relies on the DoneBand bit to tell it whether to attempt to read a band of compressed contone data. When DoneBand is set, the state machine does nothing. When DoneBand is clear, the state machine continues to load data into the JPEG input FIFO up to 256-bits at a time while there is space available in the FIFO. Note that the state machine has no knowledge about numbers of blocks or numbers of color planes—it merely keeps the JPEG input FIFO full by consecutive reads from DRAM. The DIU is responsible for ensuring that DRAM requests are satisfied at least at the peak DRAM read bandwidth of 0.36 bits/cycle (see section 24.3 on page 448).

A modulo 4 counter, rd_count, is use to count each of the 64-bits received in a 256-bit read access. It is incremented whenever diu_cdu_rvalid is asserted. As each 64-bit value is returned, indicated by diu_cdu_rvalid being asserted, curr_source_adr is compared to both end_source_adr and end_of_bandstore:

- If {curr_source_adr, rd_count} equals end_source_adr, the end_of_band control signal sent to the FIFO is 1 (to signify the end of the band), the finishedCDUBand signal is output, and the DoneBand bit is set. The remaining 64-bit values in the burst from the DIU are ignored, i.e. they are not written into the FIFO.
- If rd_count equals 3 and {curr_source_adr, rd_count} does not equal end_source_adr, then curr_source_adr is updated to be either start_of_bandstore or curr_source_adr+1, depending on whether curr_source_adr also equals end_of_bandstore. The end_of_band control signal sent to the FIFO is 0.

curr_source_adr is output to the DIU as cdu_diu_radr.

A count is kept of the number of 64-bit values in the FIFO. When diu_cdu_rvalid is 1 and ignore_data is 0, data is written to the FIFO by asserting FifoWr, and fifo_contents[3:0] and fifo_wr_adr[2:0] are both incremented.

When fifo_contents[3:0] is greater than 0, jpg_in_strb is asserted to indicate that there is data available in the FIFO for the JPEG decoder core. The JPEG decoder core asserts jpg_in_rdy when it is ready to receive data from the FIFO. Note it is also possible to bypass the JPEG decoder core by setting the BypassJpg register to 1. In this case data is sent directly from the FIFO to the half-block double-buffer. While the JPEG decoder is not stalled (jpg_core_stall equal 0), and jpg_in_rdy (or bypass_jpg) and jpg_in_strb are both 1, a byte of data is consumed by the JPEG decoder core. fifo_rd_adr[5:0] is then incremented to select the next byte. The read address is byte aligned, i.e. the upper 3 bits are input as the read address for the FIFO and the lower 3 bits are used to select a byte from the 64 bits. If fifo_rd_adr[2:0]=111 then the next 64-bit value is read from the FIFO by asserting fifo_rd, and fifo_contents[3:0] is decremented.

24.5.5 Compressed Contone FIFO

The compressed contone FIFO conceptually is a 64-bit input, and 8-bit output FIFO to account for the 64-bit data transfers from the DIU, and the 8-bit requirement of the JPEG decoder.

In reality, the FIFO is actually 8 entries deep and 65-bits wide (to accommodate two 256-bit accesses), with bits 63-0 carrying data, and bit 64 containing a 1-bit end_of_band flag. Whenever 64-bit data is written to the FIFO from the DIU, an end_of_band flag is also passed in from the read control unit. The end_of_band bit is 1 if this is the last data transfer for the current band, and 0 if it is not the last transfer. When end_of_band=1 during an input, the ValidBytesLastFetch register is also copied to an image version of the same.

On the JPEG decoder side of the FIFO, the read address is byte aligned, i.e. the upper 3 bits are input as the read address for the FIFO and the lower 3 bits are used to select a byte from the 64 bits (1st byte corresponds to bits 7-0, second byte to bits 15-8 etc.). If bit 64 is set on the read, bits 63-0 contain the end of the bytestream for that band, and only the bytes specified by the image of ValidBytesLastFetch are valid bytes to be read and presented to the JPEG decoder.

Note that ValidBytesLastFetch is copied to an image register as it may be possible for the CDU to be reprogrammed for the next band before the previous band's compressed contone data has been read from the FIFO (as an additional effect of this, the CDU has a non-problematic limitation in that each band of contone data must be more than 4×64-bits, or 32 bytes, in length).

24.5.6 CS6150 JPEG Decoder

JPEG decoder functionality is implemented by means of a modified version of the Amphion CS6150 JPEG decoder core. The decoder is run at a nominal clock speed of 160 MHz. (Amphion have stated that the CS6150 JPEG decoder core can run at 185 MHz in 0.13 um technology). The core is clocked by jclk which a gated version of the system clock pclk. Gating the clock provides a mechanism for stalling the JPEG decoder on a single color pixel-by-pixel basis. Control of the flow of output data is also provided by the PixOutEnab input to the JPEG decoder. However, this only allows stalling of the output at a JPEG block boundary and is insufficient for SoPEC. Thus gating of the clock is employed and PixOutEnab is instead tied high.

The CS6150 decoder automatically extracts all relevant parameters from the JPEG bytestream and uses them to control the decoding of the image. The JPEG bytestream contains data for the Huffman tables, quantization tables, restart interval definition and frame and scan headers. The decoder parses and checks the JPEG bytestream automatically detecting and processing all the JPEG marker segments. After identifying the JPEG segments the decoder re-directs the data to the appropriate units to be stored or processed as appropriate. Any errors detected in the bytestream, apart from those in the entropy coded segments, are signalled and, if an error is found, the decoder stops reading the JPEG stream and waits to be reset.

JPEG images must have their data stored in interleaved format with no subsampling. Images longer than 65536 lines are allowed: these must have an initial imageHeight of 0. If the image has a Define Number Lines (DNL) marker at the end (normally necessary for standard JPEG, but not necessary for SoPEC's version of the CS6150), it must be equal to the total image height mod 64 k or an error will be generated.

See the CS6150 Databook for more details on how the core is used, and for timing diagrams of the interfaces. The CS6150 decoder read from DRAM must be in the same format as if it was produced by the JPEG decoder: 8×8 blocks of pixels in the correct color order. The data is uncompressed and is therefore lossless.

The following subsections describe the means by which the CS6150 internals can be made visible.

24.5.6.1 JPEG Decoder Reset

The JPEG decoder has 2 possible types of reset, an asynchronous reset and a synchronous clear. In SoPEC the asynchronous reset is connected to the hardware synchronous reset of the CDU and can be activated by any hardware reset to SoPEC (either from external pin or from any of the wake-up sources, e.g. USB activity, Wake-up register timeout) or by resetting the PEP section (ResetSection register in the CPR block).

The synchronous clear is connected to the software reset of the CDU and can be activated by the low to high transition of the Go register, or a software reset via the Reset register.

The 2 types of reset differ, in that the asynchronous reset, resets the JPEG core and causes the core to enter a memory initialization sequence that takes 384 clock cycles to complete after the reset is deasserted. The synchronous clear resets the core, but leaves the memory as is. This has some implications for programming the CDU.

In general the CDU should not be started (i.e. setting Go to 1) until at least 384 cycles after a hardware reset. If the CDU is core memory in an unknown state. This is allowed if the memory is to be initialized from the incoming JPEG stream.

24.5.6.2 JPEG Decoder Parameter Bus

The decoding parameter bus JpgDecPValue is a 16-bit port used to output various parameters extracted from the input data stream and currently used by the core. The 4-bit selector input (JpgDecPType) determines which internal parameters are displayed on the parameter bus as per Table 147. The data available on the PValue port does not contain control signals used by the CS6150.

TABLE 147

Parameter bus definitions

| PType | Output orientation | PValue |
|---|---|---|
| 0x0 | FY[15:0] | FY: number of lines in frame |
| 0x1 | FX[15:0] | FX: number of columns in frame |
| 0x2 | 00_YMCU[13:0] | YMCU: number of MCUs in Y direction of the current scan |
| 0x3 | 00_XMCU[13:0] | XMCU: number of MCUs in X direction of the current scan |
| 0x4 | Cs0[7:0]_Tq0[1:0]_V0[2:0]_H0[2:0] | Cs0: identifier for the first scan component<br>Tq0: quantization table identifier for the first scan component<br>V0: vertical sampling factor for the first scan component. Values = 1-4<br>H0: horizontal sampling factor for the first scan component. Values = 1-4 |
| 0x5 | Cs1[7:0]_Tq1[1:0]_V1[2:0]_H1[2:0] | Cs1, Tq1, V1 and H1 for the second scan component.<br>V1, H1 undefined if NS < 2 |
| 0x6 | Cs2[7:0]_Tq2[1:0]_V2[2:0]_H2[2:0] | Cs2, Tq2, V2 and H2 for the second scan component.<br>V2, H2 undefined if NS < 3 |
| 0x7 | Cs3[7:0]_Tq3[1:0]_V3[2:0]_H3[2:0] | Cs3, Tq3, V3 and H3 for the second scan component.<br>V3, H3 undefined if NS < 4 |
| 0x8 | CsH[15:0] | CsH: no. of rows in current scan |
| 0x9 | CsV[15:0] | CsV: no. of columns in current scan |
| 0xA | DRI[15:0] | DRI: restart interval |
| 0xB | 000_HMAX[2:0]_VMAX[2:0]_MCUBLK[3:0]_NS[2:0] | HMAX: maximal horizontal sampling factor in frame VMAX: maximal vertical sampling factor in frame MCUBLK: number of blocks per MCU of the current scan, from 1 to 10<br>NS: number of scan components in current scan, 1-4 |

24.5.6 JPEG Decoder Status Register

The status register flags indicate the current state of the CS6150 operation. When an error is detected during the decoding process, the decompression process in the JPEG decoder is suspended and an interrupt is sent to the CPU by asserting cdu_icu_jpegerror (generated from DecError). The CPU can check the source of the error by reading the JpgDecStatus register. The CS6150 waits until a reset process is invoked by asserting the hard reset prst_n or by a soft reset of the CDU. The individual bits of JpgDecStatus are set to zero at reset and active high to indicate an error condition as defined in Table 148.

Note: A DecHfError will not block the input as the core will try to recover and produce the correct amount of pixel data. The DecHfError is cleared automatically at the start of the next image and so no intervention is required from the user. If any of the other errors occur in the decode mode then, following the error cancellation, the core will discard all input data until the next Start Of Image (SOI) without triggering any more errors.

The progress of the decoding can be monitored by observing the values of TblDef, IDctInProg, DecInProg and JpgInProg.

TABLE 148

JPEG decoder status register definitions

| Bit | Name | Description |
|---|---|---|
| 15-12 | TblDef[7:4] | Indicates the number of Huffman tables defined, 1 bit/table. |
| 11-8 | TblDef[3:0] | Indicates the number of quantization tables defined, 1 bit/table. |
| 7 | DecHfError | Set when an undefined Huffman table symbol is referenced during decoding. |
| 6 | CtlError | Set when an invalid SOF parameter or an invalid SOS parameter is detected.<br>Also set when there is a mismatch between the DNL segment input to the core and the number of lines in the input image which have already been decoded. Note that SoPEC's implementation of the CS6150 does not require a final DNL when the initial setting for ImageHeight is 0. This is to allow images longer than 64k lines. |
| 5 | HtError | Set when an invalid DHT segment is detected. |
| 4 | QtError | Set when an invalid DQT segment is detected. |
| 3 | DecError | Set when anything other than a JPEG marker is input.<br>Set when any of DecFlags[6:4] are set.<br>Set when any data other than the SOI marker is detected at the start of a stream.<br>Set when any SOF marker is detected other than SOF0. Set if incomplete Huffman or quantization definition is detected. |
| 2 | IDctInProg | Set when IDCT starts processing first data of a scan. Cleared when IDCT has processed the last data of a scan. |
| 1 | DecInProg | For each scan this signal is asserted after the SigSOS (Start of Scan Segment) signal has been output from the core and is de-asserted when the decoding of a scan is complete. It indicates that the core is in the decoding state. |
| 0 | JpgInProg | Set when core starts to process input data (JpgIn) and de-asserted when decoding has been completed i.e. when the last pixel of last block of the image is output. |

24.5.7 Half-Block Buffer Interface

Since the CDU writes 256 bits (4×64 bits) to memory at a time, it requires a double-buffer of 2×256 bits at its output. This is implemented in an 8×64 bit FIFO. It is required to be able to stall the JPEG decoder core at its output on a half JPEG block boundary, i.e. after 32 pixels (8 bits per pixel). We provide a mechanism for stalling the JPEG decoder core by gating the clock to the core (with jclk_enable) when the FIFO is full. The output FIFO is responsible for providing two buffered half JPEG blocks to decouple JPEG decoding (read control unit) from writing those JPEG blocks to DRAM (write control unit). Data coming in is in 8-bit quantities but data going out is in 64-bit quantities for a single color plane.

24.5.8 Write Control Unit

Figure 152:
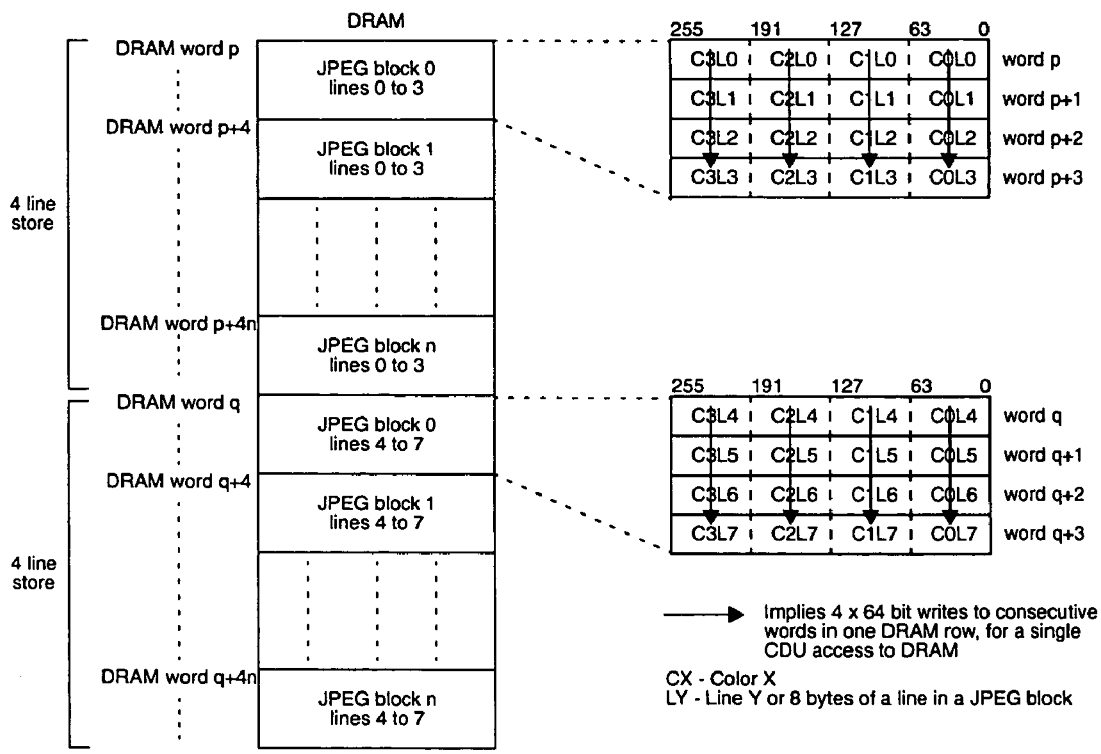

A line of JPEG blocks in 4 colors, or 8 lines of decompressed contone data, is stored in DRAM with the memory arrangement as shown FIG. 152. The arrangement is in order to optimize access for reads by writing the data so that 4 color components are stored together in each 256-bit DRAM word.

The CDU writes 8 lines of data in parallel but stores the first 4 lines and second 4 lines separately in DRAM. The write sequence for a single line of JPEG 8×8 blocks in 4 colors, as shown in FIG. 152, is as follows below and corresponds to the order in which pixels are output from the JPEG decoder core:

block 0, color 0, line 0 in word p bits 63-0, line 1 in word p+1 bits 63-0,
line 2 in word p+2 bits 63-0, line 3 in word p+3 bits 63-0,
block 0, color 0, line 4 in word q bits 63-0, line 5 in word q+1 bits 63-0,
line 6 in word q+2 bits 63-0, line 7 in word q+3 bits 63-0,
block 0, color 1, line 0 in word p bits 127-64, line 1 in word p+1 bits 127-64,
line 2 in word p+2 bits 127-64, line 3 in word p+3 bits 127-64,
block 0, color 1, line 4 in word q bits 127-64, line 5 in word q+1 bits 127-64,
line 6 in word q+2 bits 127-64, line 7 in word q+3 bits 127-64,
repeat for block 0 color 2, block 0 color 3........
block 1, color 0, line 0 in word p+4 bits 63-0, line 1 in word p+5 bits 63-0,
etc...................................................
block N, color 3, line 4 in word q+4n bits 255-192, line 5 in word q+4n+1 bits 255-192,
line 6 in word q+4n+2 bits 255-192, line 7 in word q+4n+3 bit 255-192

In SoPEC data is written to DRAM 256 bits at a time. The DIU receives a 64-bit aligned address from the CDU, i.e. the lower 2 bits indicate which 64-bits within a 256-bit location are being written to. With that address the DIU also receives half a JPEG block (4 lines) in a single color, 4×64 bits over 4 cycles. All accesses to DRAM must be padded to 256 bits or the bits which should not be written are masked using the individual bit write inputs of the DRAM. When writing decompressed contone data from the CDU, only 64 bits out of the 256-bit access to DRAM are valid, and the remaining bits of the write are masked by the DIU. This means that the decompressed contone data is written to DRAM in 4 back-to-back 64-bit write masked accesses to 4 consecutive 256-bit DRAM locations/words.

Figure 153:
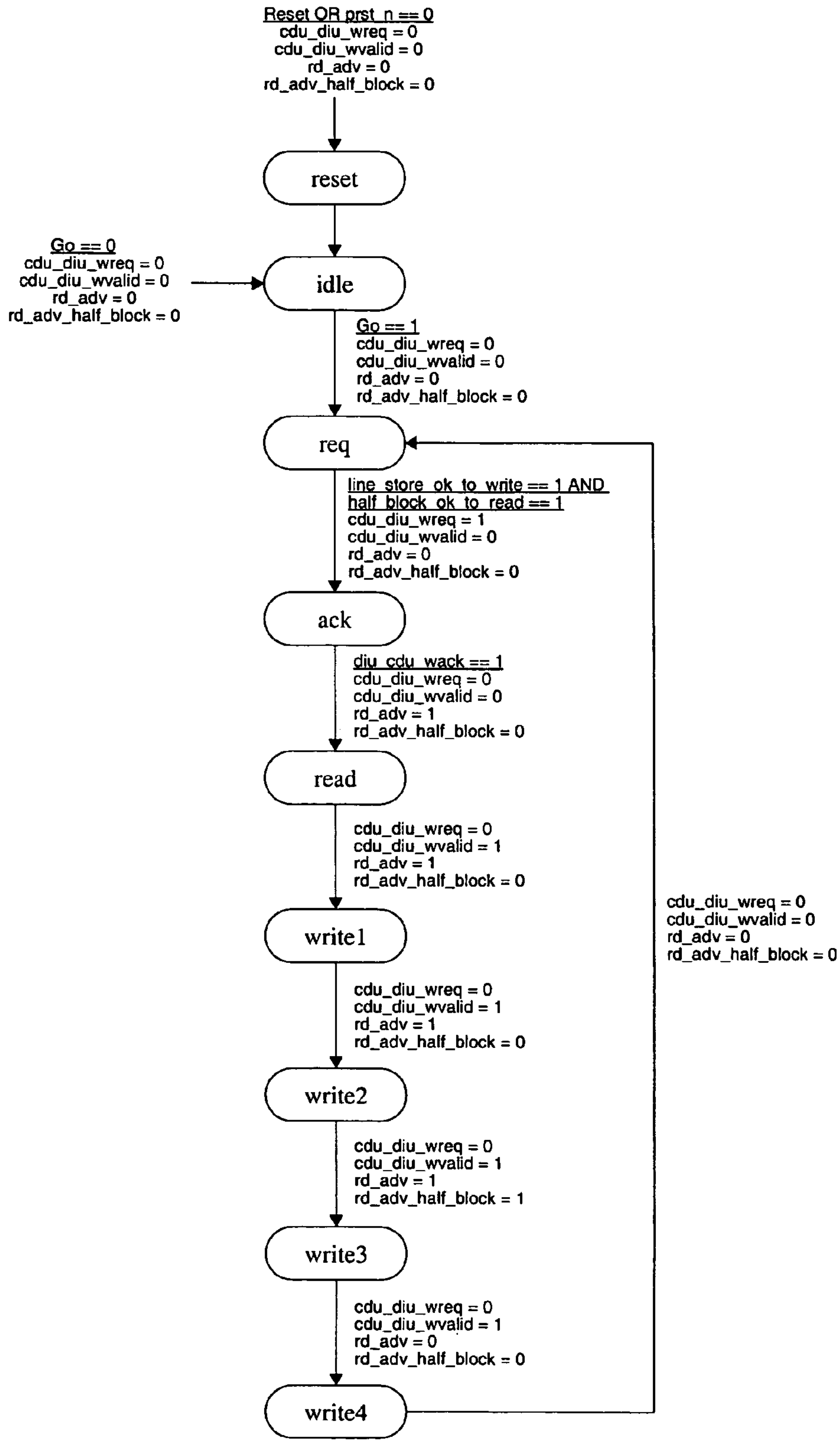

Writing of decompressed contone data to DRAM is implemented by the state machine in FIG. 153. The CDU writes the decompressed contone data to DRAM half a JPEG block at a time, 4×64 bits over 4 cycles. All counters and flags should be cleared after reset. When Go transitions from 0 to 1 all counters and flags should take their initial value. While the Go bit is set, the state machine relies on the half block_ok_to_read and line_store_ok_to_write flags to tell it whether to attempt to write a half JPEG block to DRAM. Once the half-block buffer interface contains a half JPEG block, the state machine requests a write access to DRAM by asserting cdu_diu_wreq and providing the write address, corresponding to the first 64-bit value to be written, on cdu_diu_wadr (only the address the first 64-bit value in each access of 4×64 bits is issued by the CDU. The DIU can generate the addresses for the second, third and fourth 64-bit values). The state machine then waits to receive an acknowledge from the DIU before initiating a read of 4 64-bit values from the half-block buffer interface by asserting rd_adv for 4 cycles. The output cdu_diu_wvalid is asserted in the cycle after rd_adv to indicate to the DIU that valid data is present on the cdu_diu_data bus and should be written to the specified address in DRAM. A rd_adv_half_block pulse is then sent to the half-block buffer interface to indicate that the current read buffer has been read and should now be available to be written to again. The state machine then returns to the request state.

The pseudocode below shows how the write address is calculated on a per clock cycle basis. Note counters and flags should be cleared after reset. When Go transitions from 0 to 1 all counters and flags should be cleared and lwr_halfblock_adr gets loaded with buff_start_adr and upr_halfblock_adr gets loaded with buff_start_adr+max_block+1.

```
// assign write address output to DRAM
        cdu_diu_wadr[6:5] = 00        // corresponds to linenumber, only first
address is
                        // issued for each DRAM access. Thus line is always 0.
                        // The DIU generates these bits of the address.
        cdu_diu_wadr[4:3] = color
        if (half == 1) then
          cdu_diu_wadr[21:7] = upr_halfblock_adr    // for lines 4-7 of JPEG
block
        else
          cdu_diu_wadr[21:7] = lwr_halfblock_adr    // for lines 0-3 of JPEG
block
// update half, color, block and addresses after each DRAM write access
        if (rd_adv_half_block == 1) then
          if (half == 1) then
            half = 0
            if (color == max_plane) then
              color = 0
              if (block == max_block) then        // end of writing a line of JPEG
blocks
                  pulse wradv8line
                  block = 0
                    // update half block address for start of next line of JPEG
blocks taking
                    // account of address wrapping in circular buffer and 4
line offset
                    if (upr_halfblock_adr == buff_end_adr) then
                        upr_halfblock_adr = buff_start_adr + max_block + 1
                      elsif (upr_halfblock_adr + max_block + 1 ==
buff_end_adr) then
                        upr_halfblock_adr = buff_start_adr
                    else
                        upr_halfblock_adr = upr_halfblock_adr + max_block + 2
              else
                    block ++
                    upr_halfblock_adr ++        // move to address for lines 4-
7 for next block
            else
              color ++
          else
            half = 1
            if (color == max_plane) then
              if (block == max_block) then     // end of writing a line of JPEG
blocks
                    // update half block address for start of next line of JPEG
blocks taking
                    // account of address wrapping in circular buffer and 4
line offset
                    if (lwr_halfblock_adr == buff_end_adr) then
                        lwr_halfblock_adr = buff_start_adr + max_block + 1
                    elsif (lwr_halfblock_adr + max_block + 1 == buff_end_adr)
then
                        lwr_halfblock_adr = buff_start_adr
                    else
                        lwr_halfblock_adr = lwr_halfblock_adr + max_block + 2
              else
                    lwr_halfblock_adr ++        // move to address for lines 0-
3 for next block
```

24.5.9 Contone Line Store Interface

The contone line store interface is responsible for providing the control over the shared resource in DRAM. The CDU writes 8 lines of data in up to 4 color planes, and the CFU reads them line-at-a-time. The contone line store interface provides the mechanism for keeping track of the number of lines stored in DRAM, and provides signals so that a given line cannot be read from until the complete line has been written.

The CDU writes 8 lines of data in parallel but writes the first 4 lines and second 4 lines to separate areas in DRAM. Thus, when the CFU has read 4 lines from DRAM that area now becomes free for the CDU to write to. Thus the size of the line store in DRAM should be a multiple of 4 lines. The minimum size of the line store interface is 8 lines, providing a single buffer scheme. Typical sizes are 12 lines for a 1.5 buffer scheme while 16 lines provides a double-buffer scheme.

The size of the contone line store is defined by num_buff_lines. A count is kept of the number of lines stored in DRAM that are available to be written to. When Go transitions from 0 to 1, NumLinesAvail is set to the value of num_buff_lines. The CDU may only begin to write to DRAM as long as there is space available for 8 lines, indicated when the line_store_ok_to_write bit is set. When the CDU has finished writing 8 lines, the write control unit sends an wradv8line pulse to the contone line store interface, and NumLinesAvail is decremented by 8. The write control unit then waits for line_store_ok_to_write to be set again.

If the contone line store is not empty (has one or more lines available in it), the CDU will indicate to the CFU via the cdu_cfu_linestore_rdy signal. The cdu_cfu_linestore_rdy signal is generated by comparing the NumLinesAvail with the programmed num_buff_lines.

```
cdu_cfu_linestore_rdy=
    (num_lines_avail!=num_buff_lines) AND
    (cdu_go==1)
```

As the CFU reads a line from the contone line store it will pulse the cfu_cdu_rdadvline to indicate that it has read a full line from the line store. NumLinesAvail is incremented by 1 on receiving a cfu_cdu_rdadvline pulse.

To enable running the CDU while the CFU is not running the NumLinesAvail register can also be updated via the configuration register interface. In this scenario the CPU polls the value of the NumLinesAvail register and adjusts it to prevent stalling of the CDU (NumLinesAvail<8). When the CPU writes to the NumLinesAvail register, it increments the NumLinesAvail register by the CPU write value.

If the CPU and the internal logic (via the wradv8line signal) attempt to update NumLinesAvail register together, the register will be updated to old value+the new CPU value−8. In all CPU update cases the register will be set to 0xFFFF if the calculation is greater than 0xFFFF.

25 Contone FIFO Unit (CFU)

25.1 Overview

The Contone FIFO Unit (CFU) is responsible for reading the decompressed contone data layer from the circular buffer in DRAM, performing optional color conversion from YCrCb to RGB followed by optional color inversion in up to 4 color planes, and then feeding the data on to the HCU. Scaling of data is performed in the horizontal and vertical directions by the CFU so that the output to the HCU matches the printer resolution. Non-integer scaling is supported in both the horizontal and vertical directions. Typically, the scale factor will be the same in both directions but may be programmed to be different.

25.2 Bandwidth Requirements

The CFU must read the contone data from DRAM fast enough to match the rate at which the contone data is consumed by the HCU.

Pixels of contone data are replicated a X scale factor (SF) number of times in the X direction and Y scale factor (SF) number of times in the Y direction to convert the final output to 1600 dpi. Replication in the X direction is performed at the output of the CFU on a pixel-by-pixel basis while replication in the Y direction is performed by the CFU reading each line a number of times, according to the Y-scale factor, from DRAM. The HCU generates 1 dot (bi-level in 6 colors) per system clock cycle to achieve a print speed of 1 side per 2 seconds for full bleed A4/Letter printing. The CFU output buffer needs to be supplied with a 4 color contone pixel (32 bits) every SF cycles. With support for 4 colors at 267 ppi the CFU must read data from DRAM at 5.33 bits/cycle.

25.3 Color Space Conversion

The CFU allows the contone data to be passed directly on, which will be the case if the color represented by each color plane in the JPEG image is an available ink. For example, the four colors may be C, M, Y, and K, directly represented by CMYK inks. The four colors may represent gold, metallic green etc. for multi-SoPEC printing with exact colors.

JPEG produces better compression ratios for a given visible quality when luminance and chrominance channels are separated. With CMYK, K can be considered to be luminance, but C, M and Y each contain luminance information and so would need to be compressed with appropriate luminance tables. We therefore provide the means by which CMY can be passed to SoPEC as YCrCb. K does not need color conversion.

When being JPEG compressed, CMY is typically converted to RGB, then to YCrCb and then finally JPEG compressed. At decompression, the YCrCb data is obtained, then color converted to RGB, and finally back to CMY.

The external RIP provides conversion from RGB to YCrCb, specifically to match the actual hardware implementation of the inverse transform within SoPEC, as per CCIR 601-2 except that Y, Cr and Cb are normalized to occupy all 256 levels of an 8-bit binary encoding.

The CFU provides the translation to either RGB or CMY. RGB is included since it is a necessary step to produce CMY, and some printers increase their color gamut by including RGB inks as well as CMYK.

Consequently the JPEG stream in the color space convertor is one of:

- 1 color plane, no color space conversion
- 2 color planes, no color space conversion
- 3 color planes, no color space conversion
- 3 color planes YCrCb, conversion to RGB
- 4 color planes, no color space conversion
- 4 color planes YCrCbX, conversion of YCrCb to RGB, no color conversion of X Note that if the data is non-compressed, there is no specific advantage in performing color conversion (although the CDU and CFU do permit it).

25.4 Color Space Inversion

In addition to performing optional color conversion the CFU also provides for optional bit-wise inversion in up to 4 color planes. This provides the means by which the conversion to CMY may be finalized, or to may be used to provide planar correlation of the dither matrices.

The RGB to CMY conversion is given by the relationship:

C=255−R

M=255−G

Y=255−B

These relationships require the page RIP to calculate the RGB from CMY as follows:

R=255−C

G=255−M

B=255−Y 25.5 Scaling

Scaling of pixel data is performed in the horizontal and vertical directions by the CFU so that the output to the HCU matches the printer resolution. The CFU supports non-integer scaling with the scale factor represented by a numerator and a denominator. Only scaling up of the pixel data is allowed, i.e. the numerator should be greater than or equal to the denominator. For example, to scale up by a factor of two and a half, the numerator is programmed as 5 and the denominator programmed as 2.

Scaling is implemented using a counter as described in the pseudocode below. An advance pulse is generated to move to the next dot (x-scaling) or line (y-scaling).

```
if (count + denominator − numerator >= 0) then
   count = count + denominator − numerator
   advance = 1
else
   count = count + denominator
   advance = 0
```

25.6 Lead-In and Lead-Out Clipping

The JPEG algorithm encodes data on a block by block basis, each block consists of 64 8-bit pixels (representing 8 rows each of 8 pixels). If the image is not a multiple of 8 pixels in X and Y then padding must be present. This padding (extra pixels) will be present after decoding of the JPEG bytestream.

Extra padded lines in the Y direction (which may get scaled up in the CFU) will be ignored in the HCU through the setting of the BottomMargin register.

Extra padded pixels in the X direction must also be removed so that the contone layer is clipped to the target page as necessary.

Figure 154:
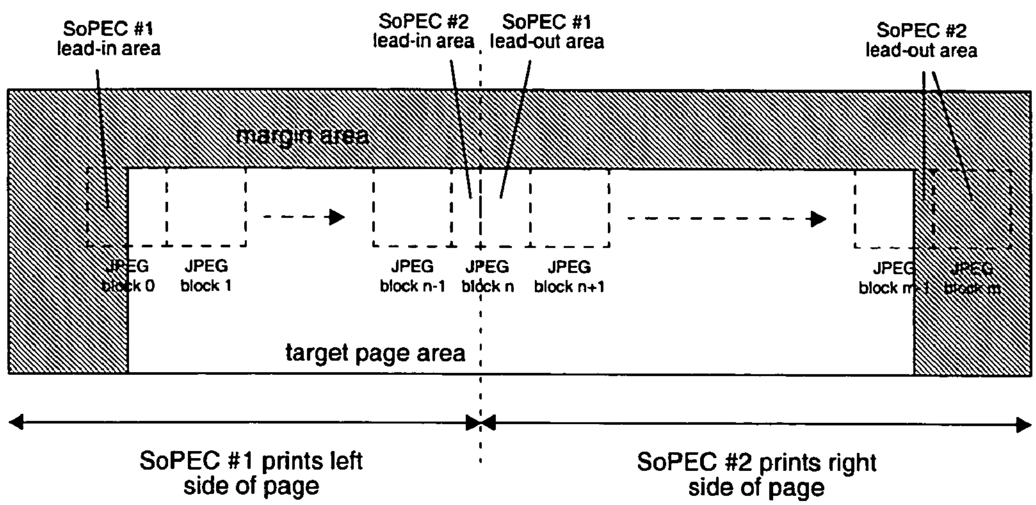

In the case of a multi-SoPEC system, 2 SoPECs may be responsible for printing the same side of a page, e.g. SoPEC #1 controls printing of the left side of the page and SoPEC #2 controls printing of the right side of the page and shown in FIG. 154. The division of the contone layer between the 2 SoPECs may not fall on a 8 pixel (JPEG block) boundary. The JPEG block on the boundary of the 2 SoPECs (JPEG block n below) will be the last JPEG block in the line printed by SoPEC #1 and the first JPEG block in the line printed by SoPEC #2. Pixels in this JPEG block not destined for SoPEC #1 are ignored by appropriately setting the LeadOutClipNum. Pixels in this JPEG block not destined for SoPEC #2 must be ignored at the beginning of each line. The number of pixels to be ignored at the start of each line is specified by the LeadInClipNum register.

It may also be the case that the CDU writes out more JPEG blocks than is required to be read by the CFU, as shown for SoPEC #2 below. In this case the value of the MaxBlock register in the CDU is set to correspond to JPEG block m but the value for the MaxBlock register in the CFU is set to correspond to JPEG block m−1. Thus JPEG block m is not read in by the CFU.

Additional clipping on contone pixels is required when they are scaled up to the printer's resolution. The scaling of the first valid pixel in the line is controlled by setting the XstartCount register. The HcuLineLength register defines the size of the target page for the contone layer at the printer's resolution and controls the scaling of the last valid pixel in a line sent to the HCU.

25.7 Implementation

Figure 155:
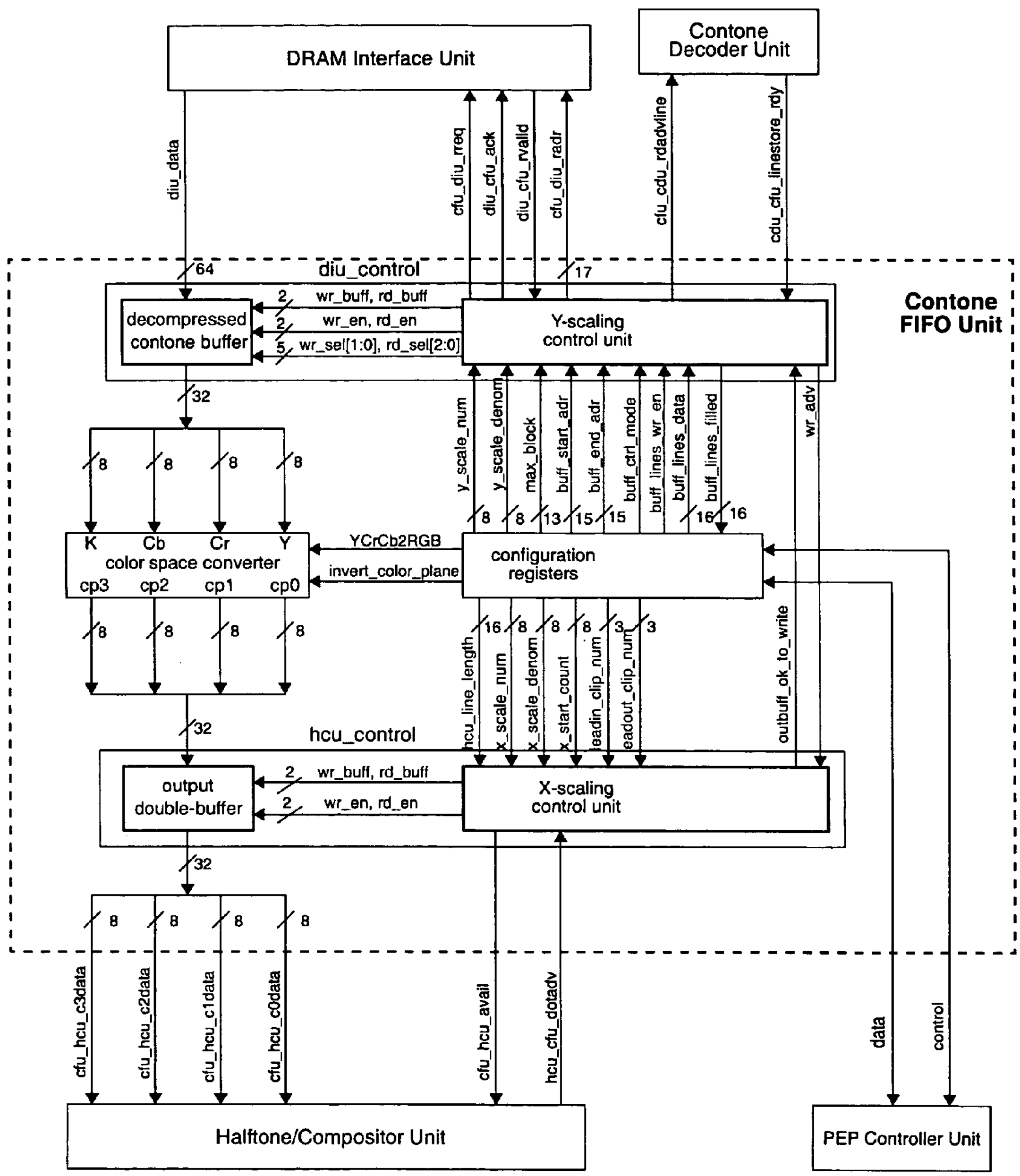

FIG. 155 shows a block diagram of the CFU.

25.7.1 Definitions of I/O

TABLE 149

CFU port list and description

| Port Name | Pins | I/O | Description |
|---|---|---|---|
| | | | Clocks and reset |
| pclk | 1 | In | System clock |
| prst_n | 1 | In | System reset, synchronous active low. |
| | | | PCU interface |
| pcu_cfu_sel | 1 | In | Block select from the PCU. When pcu_cfu_sel is high both pcu_adr and pcu_dataout are valid. |
| pcu_rwn | 1 | In | Common read/not-write signal from the PCU. |
| pcu_adr[6:2] | 5 | In | PCU address bus. Only 5 bits are required to decode the address space for this block. |
| pcu_dataout[31:0] | 32 | In | Shared write data bus from the PCU. |
| cfu_pcu_rdy | 1 | Out | Ready signal to the PCU. When cfu_pcu_rdy is high it indicates the last cycle of the access. For a write cycle this means pcu_dataout has been registered by the block and for a read cycle this means the data on cfu_pcu_datain is valid. |
| cfu_pcu_datain[31:0] | 32 | Out | Read data bus to the PCU. |
| | | | DIU interface |
| cfu_diu_rreq | 1 | Out | CFU read request, active high. A read request must be accompanied by a valid read address. |

TABLE 149-continued

CFU port list and description

| Port Name | Pins | I/O | Description |
|---|---|---|---|
| diu_cfu_rack | 1 | In | Acknowledge from DIU, active high. Indicates that a read request has been accepted and the new read address can be placed on the address bus, cfu_diu_radr. |
| cfu_diu_radr[21:5] | 17 | Out | CFU read address. 17 bits wide (256-bit aligned word). |
| diu_cfu_rvalid | 1 | In | Read data valid, active high. Indicates that valid read data is now on the read data bus, diu_data. |
| diu_data[63:0] | 64 | In | Read data from DRAM. |
| | | | CDU interface |
| cdu_cfu_linestore_rdy | 1 | In | When high indicates that the contone line store has 1 or more lines available to be read by the CFU. |
| cfu_cdu_rdadvline | 1 | Out | Read line pulse, active high. Indicates that the CFU has finished reading a line of decompressed contone data to the circular buffer in DRAM and that line of the buffer is now free. |
| | | | HCU interface |
| hcu_cfu_advdot | 1 | In | Informs the CFU that the HCU has captured the pixel data on cfu_hcu_c[0-3]data lines and the CFU can now place the next pixel on the data lines. |
| cfu_hcu_avail | 1 | Out | Indicates valid data present on cfu_hcu_c[0-3]data lines. |
| cfu_hcu_c0data[7:0] | 8 | Out | Pixel of data in contone plane 0. |
| cfu_hcu_c1data[7:0] | 8 | Out | Pixel of data in contone plane 1. |
| cfu_hcu_c2data[7:0] | 8 | Out | Pixel of data in contone plane 2. |
| cfu_hcu_c3data[7:0] | 8 | Out | Pixel of data in contone plane 3. |

25.7.2 Configuration Registers

The configuration registers in the CFU are programmed via the PCU interface. Refer to section 23.8.2 on page 439 for the description of the protocol and timing diagrams for reading and writing registers in the CFU. Note that since addresses in SoPEC are byte aligned and the PCU only supports 32-bit register reads and writes, the lower 2 bits of the PCU address bus are not required to decode the address space for the CFU. When reading a register that is less than 32 bits wide zeros are returned on the upper unused bit(s) of cfu_pcu_datain. The configuration registers of the CFU are listed in Table 150:

TABLE 150

CFU registers

| Address (CFU_base+) | Register Name | #bits | Value on Reset | Description |
|---|---|---|---|---|
| | | | | Control registers |
| 0x00 | Reset | 1 | 0x1 | A write to this register causes a reset of the CFU. |
| 0x04 | Go | 1 | 0x0 | Writing 1 to this register starts the CFU. Writing 0 to this register halts the CFU.<br>When Go is deasserted the state-machines go to their idle states but all counters and configuration registers keep their values.<br>When Go is asserted all counters are reset, but configuration registers keep their values (i.e. they don't get reset).<br>The CFU must be started before the CDU is started.<br>This register can be read to determine if the CFU is running<br>(1 - running, 0 - stopped). |
| | | | | Setup registers |
| 0x10 | MaxBlock | 13 | 0x0000 | Number of JPEG MCUs (or JPEG block equivalents, i.e. 8x8 bytes) in a line − 1. |
| 0x14 | BuffStartAdr[21:7] | 15 | 0x0000 | Points to the start of the decompressed contone circular buffer in DRAM, aligned to a half JPEG block boundary.<br>A half JPEG block consists of 4 words of 256-bits, enough to hold 32 contone pixels in 4 colors, i.e. half a JPEG block. |

TABLE 150-continued

CFU registers

Figure 156:
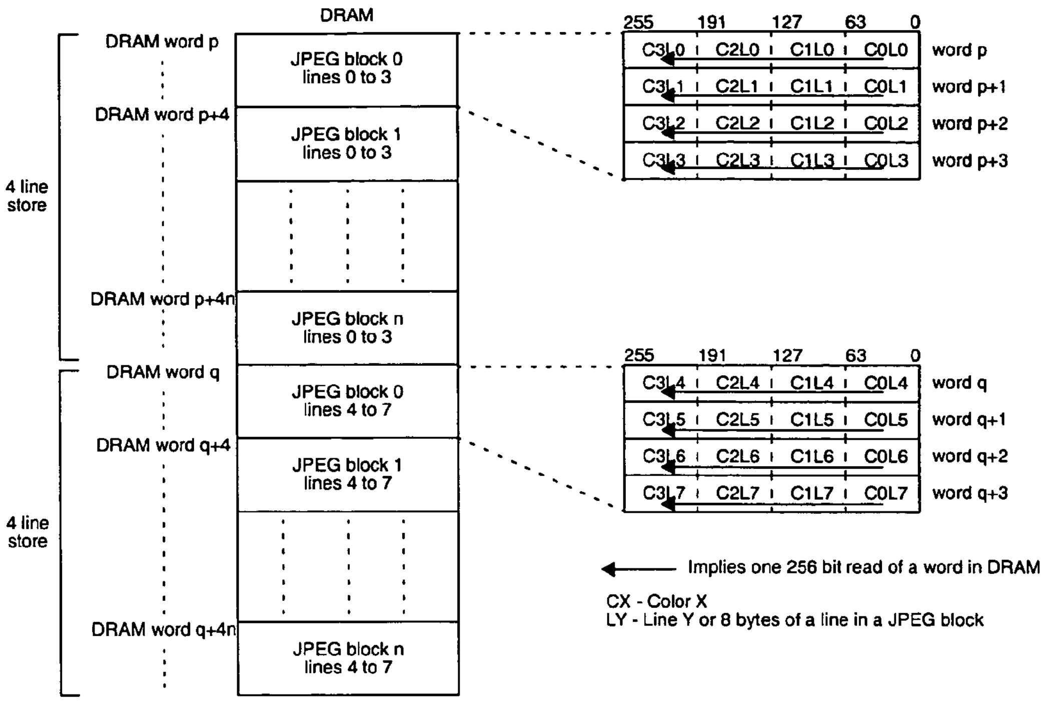

| Address (CFU_base+) | Register Name | #bits | Value on Reset | Description |
|---|---|---|---|---|
| 0x18 | BuffEndAdr[21:7] | 15 | 0x0000 | Points to the end of the decompressed contone circular buffer in DRAM, aligned to a half JPEG block boundary (address is inclusive).<br>A half JPEG block consists of 4 words of 256-bits, enough to hold 32 contone pixels in 4 colors, i.e. half a JPEG block. |
| 0x1C | 4LineOffset | 13 | 0x0000 | Defines the offset between the start of one 4 line store to the start of the next 4 line store. In FIG. 156 on page 476, if BufStartAdr corresponds to line 0 block 0 then BuffStartAdr + 4LineOffset corresponds to line 4 block 0.<br>4LineOffset is specified in units of128 bytes, e.g. 0 - 128 bytes, 1 - 256 bytes etc.<br>This register is required in addition to MaxBlock as the number of JPEG blocks in a line required by the CFU may be different from the number of JPEG blocks in a line written by the CDU. |
| 0x20 | YCrCb2RGB | 1 | 0x0 | Set this bit to enable conversion from YCrCb to RGB. Should not be changed between bands. |
| 0x24 | InvertColorPlane | 4 | 0x0 | Set these bits to perform bit-wise inversion on a per color plane basis.<br>bit0 - 1 invert color plane 0<br>0 do not convert<br>bit1 - 1 invert color plane 1<br>0 do not convert<br>bit2 - 1 invert color plane 2<br>0 do not convert<br>bit3 - 1 invert color plane 3<br>0 do not convert<br>Should not be changed between bands. |
| 0x28 | HcuLineLength | 16 | 0x0000 | Number of contone pixels − 1 in a line (after scaling). Equals the number of hcu_cfu_dotadv pulses − 1 received from the HCU for each line of contone data. |
| 0x2C | LeadInClipNum | 3 | 0x0 | Number of contone pixels to be ignored at the start of a line (from JPEG block 0 in a line). They are not passed to the output buffer to be scaled in the X direction. |
| 0x30 | LeadOutClipNum | 3 | 0x0 | Number of contone pixels to be ignored at the end of a line (from JPEG block MaxBlock in a line). They are not passed to the output buffer to be scaled in the X direction. |
| 0x34 | XstartCount | 8 | 0x00 | Value to be loaded at the start of every line into the counter used for scaling in the X direction. Used to control the scaling of the first pixel in a line to be sent to the HCU.<br>This value will typically be zero, except in the case where a number of dots are clipped on the lead in to a line. |
| 0x38 | XscaleNum | 8 | 0x01 | Numerator of contone scale factor in X direction. |
| 0x3C | XscaleDenom | 8 | 0x01 | Denominator of contone scale factor in X direction. |
| 0x40 | YscaleNum | 8 | 0x01 | Numerator of contone scale factor in Y direction. |
| 0x44 | YscaleDenom | 8 | 0x01 | Denominator of contone scale factor in Y direction. |
| 0x50 | BuffCtrlMode | 1 | 0x0 | Specifies if the contone line buffer logic is controlled externally by interaction between the CFU/CFU or is controlled internally by the CFU.<br>0 - External Mode (CFU/CDU controlled)<br>1 - Internal Mode (CFU controlled)<br>When in internal mode the CFU ignores cdu_cfu_linestore_rdy and cfu_cdu_rdadvline is set to 0. |
| 0x54 | BuffLinesFilled | 16 | 0x0000 | Unused and unchanged in external mode (when BuffCtrlMode is 0). When in internal mode (BuffCtrlMode = 1), BuffLinesFilled is adjusted by the CPU to indicate the number of image lines of data that there is available in the decompressed data buffer in DRAM.<br>When the CPU writes to this register, the BuffLinesFilled is incremented by the CPU write value<br>This value is updated by the CPU and decremented by 1 whenever the CFU reads a |

TABLE 150-continued

CFU registers

| Address (CFU_base+) | Register Name | #bits | Value on Reset | Description |
|---|---|---|---|---|
| | | | | line of data from DRAM (used in internal mode only). (Working Register) |

25.7.3 Storage of Decompressed Contone Data in DRAM

The CFU reads decompressed contone data from DRAM in single 256-bit accesses. JPEG blocks of decompressed contone data are stored in DRAM with the memory arrangement as shown The arrangement is in order to optimize access for reads by writing the data so that 4 color components are stored together in each 256-bit DRAM word. The means that the CFU reads 64-bits in 4 colors from a single line in each 256-bit DRAM access.

The CFU reads data line at a time in 4 colors from DRAM. The read sequence, as shown in FIG. 156, is as follows:

line 0, block 0 in word p of DRAM
line 0, block 1 in word p+4 of DRAM
........................................
line 0, block n in word p+4n of DRAM
(repeat to read line a number of times according to scale factor)
line 1, block 0 in word p+1 of DRAM
line 1, block 1 in word p+5 of DRAM
etc......................................

The CFU reads a complete line in up to 4 colors a Y scale factor number of times from DRAM before it moves on to read the next. When the CFU has finished reading 4 lines of contone data that 4 line store becomes available for the CDU to write to.

25.7.4 Decompressed Contone Buffer

Since the CFU reads 256 bits (4 colors×64 bits) from memory at a time, it requires storage of at least 2×256 bits at its input. To allow for all possible DIU stall conditions the input buffer is increased to 3×256 bits to meet the CFU target bandwidth requirements. The CFU receives the data from the DIU over 4 clock cycles (64-bits of a single color per cycle). It is implemented as 4 buffers. Each buffer conceptually is a 64-bit input and 8-bit output buffer to account for the 64-bit data transfers from the DIU, and the 8-bit output per color plane to the color space converter.

On the DRAM side, wr_buff indicates the current buffer within each triple-buffer that writes are to occur to. wr_sel selects which triple-buffer to write the 64 bits of data to when wr_en is asserted.

On the color space converter side, rd_buff indicates the current buffer within each triple-buffer that reads are to occur from. When rd_en is asserted a byte is read from each of the triple-buffers in parallel. rd_sel is used to select a byte from the 64 bits (1st byte corresponds to bits 7-0, second byte to bits 15-8 etc.).

Due to the limitations of available register arrays in IBM technology, the decompressed contone buffer is implemented as a quadruple buffer. While this offers some benefits for the CFU it is not necessitated by the bandwidth requirements of the CFU.

25.7.5 Y-Scaling Control Unit

Figure 157:
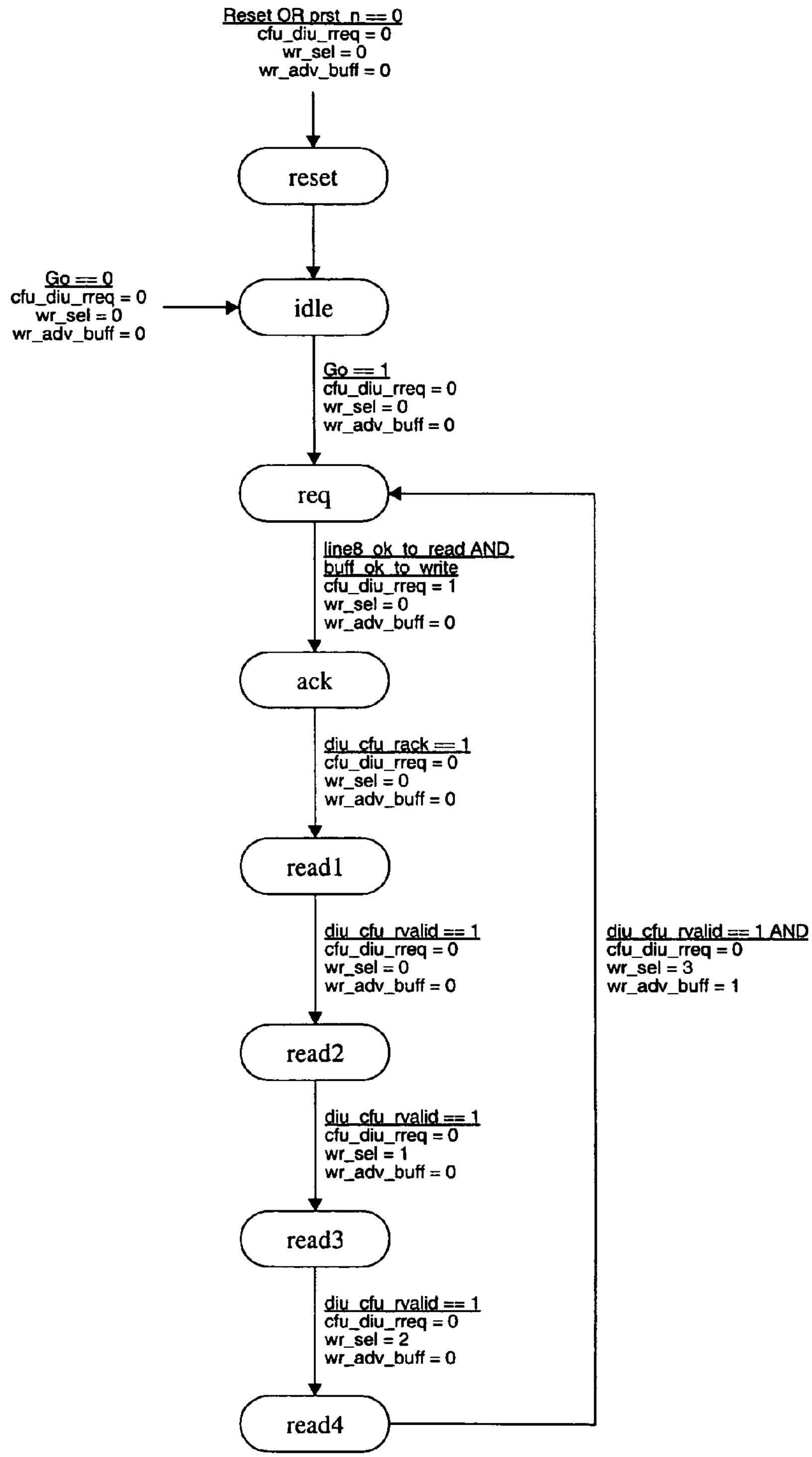

The Y-scaling control unit is responsible for reading the decompressed contone data and passing it to the color space converter via the decompressed contone buffer. The decompressed contone data is read from DRAM in single 256-bit accesses, receiving the data from the DIU over 4 clock cycles (64-bits per cycle). The protocol and timing for read accesses to DRAM is described in section 22.9.1 on page 337. Read accesses to DRAM are implemented by means of the state machine described in FIG. 157.

All counters and flags should be cleared after reset. When Go transitions from 0 to 1 all counters and flags should take their initial value. While the Go bit is set, the state machine relies on the line8_ok_to_read and buff_ok_to_write flags to tell it whether to attempt to read a line of compressed contone data from DRAM. When line8_ok_to_read is 0 the state machine does nothing. When line8_ok_to_read is 1 the state machine continues to load data into the decompressed contone buffer up to 256-bits at a time while there is space available in the buffer.

A bit is kept for the status of each 64-bit buffer: buff_avail[0] and buff_avail[1]. It also keeps a single bit (rd_buff) for the current buffer that reads are to occur from, and a single bit (wr_buff) for the current buffer that writes are to occur to.

buff_ok_to_write equals ~buff_avail[wr_buff]. When a wr_adv[wr_buff]is set, and wr_buff is inverted. Whenever diu_cfu_rvalid is asserted, wr_en is asserted to write the 64-bits of data from DRAM to the buffer selected by wr_sel and wr_buff.

buff_ok_to_read equals buff_avail[rd_buff]. If there is data available in the buffer and the output double-buffer has space available (outbuff_ok_to_write equals 1) then data is read from the buffer by asserting rd_en and rd_sel gets incremented to point to the next value. wr_adv is asserted in the following cycle to write the data to the output double-buffer of the CFU. When finished reading the buffer, rd_sel equals b111 and rd_en is asserted, buff_avail[rd_buff] is set, and rd_buff is inverted.

Each line is read a number of times from DRAM, according to the Y-scale factor, before the CFU moves on to start reading the next line of decompressed contone data. Scaling to the printhead resolution in the Y direction is thus performed.

The pseudocode below shows how the read address from DRAM is calculated on a per clock cycle basis. Note all counters and flags should be cleared after reset or when Go is cleared. When a 1 is written to Go, both curr_halfblock and line_start_halfblock get loaded with buff_start_adr, and y_scale_count gets loaded with y_scale_denom. Scaling in the Y direction is implemented by line replication by re-reading lines from DRAM. The algorithm for non-integer scaling is described in the pseudocode below.

```
// assign read address output to DRAM
        cdu_diu_wadr[21:7]    = curr_halfblock
        cdu_diu_wadr[6:5]     = line[1:0]
// update block, line, y_scale_count and addresses after each DRAM read access
        if (wr_adv_buff == 1) then
           if (block == max_block) then  // end of reading a line of contone in
up to 4 colors
              block = 0
              // check whether to advance to next line of contone data in DRAM
              if (y_scale_count + y_scale_denom − y_scale_num >= 0) then
                 y_scale_count = y_scale_count + y_scale_denom − y_scale_num
                pulse RdAdvline
                if (line == 3) then          // end of reading 4 line store of
contone data
                   line = 0
                   // update half block address for start of next line taking
account of
                   // address wrapping in circular buffer and 4 line offset
                   if ((line_start_adr + 4line_offset) > buff_end_adr)) then
                      curr_halfblock = buff_start_adr
                      line_start_adr = buff_start_adr
                   else
                      curr_halfblock = line_start_adr + 4line_offset
                      line_start_adr = line_start_adr + 4line_offset
                else
                   line ++
                      curr_halfblock = line_start_adr
                   else
                    // re-read current line from DRAM
                    y_scale_count = y_scale_count + y_scale_denom
                    curr_halfblock = line_start_adr
                else
                   block ++
                   curr_halfblock ++
```

25.7.6 Contone Line Store Interface

The contone line store interface is responsible for providing the control over the shared resource in DRAM. The CDU writes 8 lines of data in up to 4 color planes, and the CFU reads them line-at-a-time. The contone line store interface provides the mechanism for keeping track of the number of lines stored in DRAM, and provides signals so that a given line cannot be read from until the complete line has been written.

The contone line store interface has two modes of operation, internal and external as configured by the BuffCtrlMode register.

In external mode the CDU indicates to the CFU if data is available in the contone line store buffer (via cdu_cfu_linestore_rdy signal). When the CFU has completed reading a line of contone data from DRAM, the Y-scaling control unit sends a cfu_cdu_rdadvline signal to the CDU to free up the line in the buffer in DRAM. The BuffLinesFilled register is ignored, is not automatically updated by the CFU, and can be adjusted by the CPU without interference in external mode In internal mode the cfu_cdu_rdadvline signal is set to zero and the cdu_cfu_linestore_rdy signal is ignored.

The CPU must update the BuffLinesFilled register to indicate to the CFU that data is available in the contone buffer for reading. When the CFU has completed reading a line of contone data from DRAM, the Y-scaling control unit will decrement the BuffLinesFilled register. The CFU will stall if BuffLinesFilled is 0. When the CPU writes to the BuffLinesFilled register, the register value is incremented by the CPU write value and not overwritten. If the CPU attempts to update a new value to the BuffLinesFilled register and the internal CFU tries to decrement the value at exactly the same time, the register will take on the old value+the new CPU write value−1. For any CPU update of the BuffLinesFilled register, the register is set to 0xFFFF if the result of the new value is greater than 0xFFFF.

25.7.7 Color Space Converter (CSC)

The color space converter consists of 2 stages: optional color conversion from YCrCb to RGB followed by optional bit-wise inversion in up to 4 color planes.

The convert YCrCb to RGB block takes 3 8-bit inputs defined as Y, Cr, and Cb and outputs either the same data YCrCb or RGB. The YCrCb2 RGB parameter is set to enable the conversion step from YCrCb to RGB. If YCrCb2RGB equals 0, the conversion does not take place, and the input pixels are passed to the second stage. The 4th color plane, if present, bypasses the convert YCrCb to RGB block. Note that the latency of the convert YCrCb to RGB block is 1 cycle. This latency should be equalized for the 4th color plane as it bypasses the block.

The second stage involves optional bit-wise inversion on a per color plane basis under the control of invert_color_plane. For example if the input is YCrCbK, then YCrCb2RGB can be set to 1 to convert YCrCb to RGB, and invert_color_plane can be set to 0111 to then convert the RGB to CMY, leaving K unchanged.

If YCrCb2RGB equals 0 and invert_color_plane equals 0000, no color conversion or color inversion will take place, so the output pixels will be the same as the input pixels.

Figure 158:
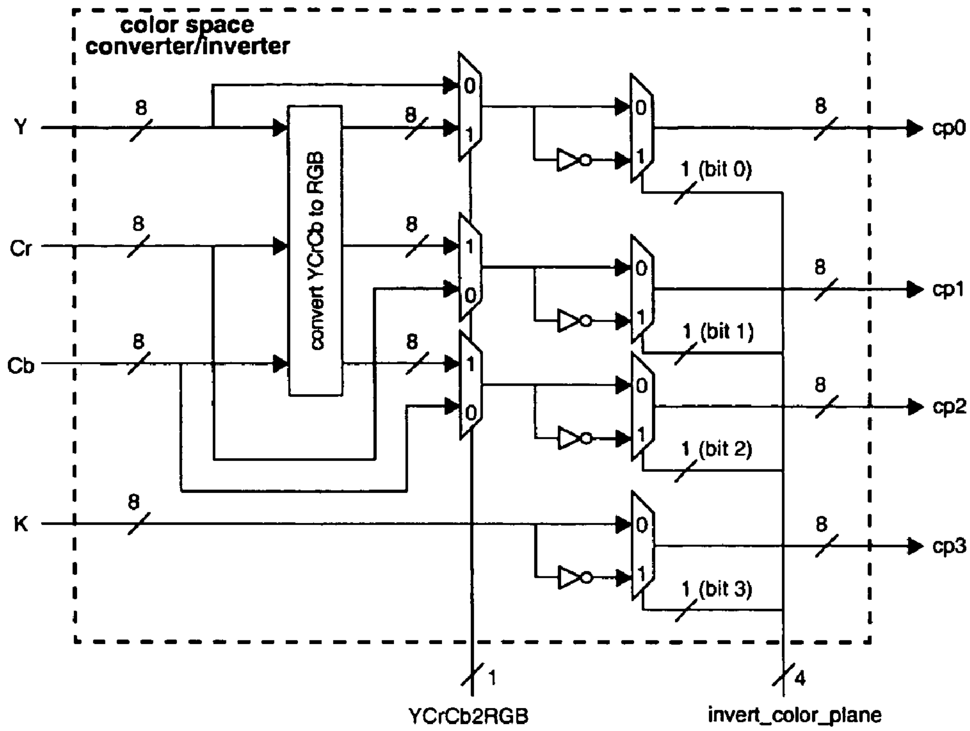
Figure 159:
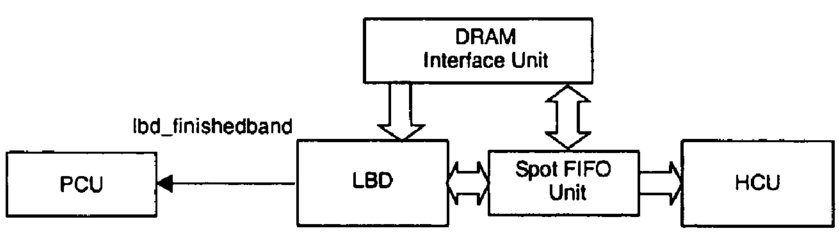

FIG. 158 shows a block diagram of the color space converter.

Although only 10 bits of coefficients are used (1 sign bit, 1 integer bit, 8 fractional bits), full internal accuracy is maintained with 18 bits. The conversion is implemented as follows:

$R^*=Y+(359/256)(Cr-128)$ $G^*=Y-(183/256)(Cr-128)-(88/256)(Cb-128)$ $B^*=Y+(454/256)(Cb-128)$

R*, G* and B* are rounded to the nearest integer and saturated to the range 0-255 to give R, G and B. Note that, while a Reset results in all-zero output, a zero input gives output RGB=[0, 136, 0].

25.7.8 X-Scaling Control Unit

The CFU has a 2×32-bit double-buffer at its output between the color space converter and the HCU. The X-scaling control unit performs the scaling of the contone data to the printers output resolution, provides the mechanism for keeping track of the current read and write buffers, and ensures that a buffer cannot be read from until it has been written to.

A bit is kept for the status of each 32-bit buffer: buff_avail[0] and buff_avail[1]. It also keeps a single bit (rd_buff) for the current buffer that reads are to occur from, and a single bit (wr_buff) for the current buffer that writes are to occur to.

The output value outbuff_ok_to_write equals ~buff_avail [wr_buff]. Contone pixels are counted as they are received from the Y-scaling control unit, i.e. when wr_adv is 1. Pixels in the lead-in and lead-out areas are ignored, i.e. they are not written to the output buffer. Lead-in and lead-out clipping of pixels is implemented by the following pseudocode that generates the wr_en pulse for the output buffer.

```
if (wradv == 1) then
   if (pixel__count == {max__block,b111}) then
      pixel__count = 0
   else
      pixel__count ++
   if ((pixel__count < leadin__clip__num)
            OR (pixel__count > ({max__block,b111} –
leadout__clip__num))) then
      wr__en = 0
   else
      wr__en = 1
```

When a wr_en pulse is sent to the output double-buffer, buff_avail[wr_buff] is set, and wr_buff is inverted.

The output cfu_hcu_avail equals buff_avail[rd_buff]. When cfu_hcu_avail equals 1, this indicates to the HCU that data is available to be read from the CFU. The HCU responds by asserting hcu_cfu_advdot to indicate that the HCU has captured the pixel data on cfu_hcu_c[0-3]data lines and the CFU can now place the next pixel on the data lines.

The input pixels from the CSC may be scaled a non-integer number of times in the X direction to produce the output pixels for the HCU at the printhead resolution. Scaling is implemented by pixel replication. The algorithm for non-integer scaling is described in the pseudocode below. Note, x_scale_count should be loaded with x_start_count after reset and at the end of each line. This controls the amount by which the first pixel is scaled by. hcu_line_length and hcu_cfu_dotadv control the amount by which the last pixel in a line that is sent to the HCU is scaled by.

```
if (hcu__cfu__dotadv == 1) then
  if (x__scale__count + x__scale__denom – x__scale__num >= 0) then
    x__scale__count = x__scale__count + x__scale__denom –
    x__scale__num
    rd__en = 1
  else
    x__scale__count = x__scale__count + x__scale__denom
```

-continued

```
    rd__en = 0
else
  x__scale__count = x__scale__count
  rd__en = 0
```

When a rd_en pulse is received, buff_avail[rd_buff] is cleared, and rd_buff is inverted.

A 16-bit counter, dot_adv_count is used to keep a count of the number of hcu_cfu_dotadv pulses received from the HCU. If the value of dot_adv_count equals hcu_line_length and a hcu_cfu_dotadv pulse is received, then a rd_en pulse is genrated to present the next dot at the output of the CFU, dot_adv_count is reset to 0 and x_scale_count is loaded with x_start_count.

26 Lossless Bi-Level Decoder (LBD)

26.1 Overview

The Lossless Bi-level Decoder (LBD) is responsible for decompressing a single plane of bi-level data. In SoPEC bi-level data is limited to a single spot color (typically black for text and line graphics).

The input to the LBD is a single plane of bi-level data, read as a bitstream from DRAM. The LBD is programmed with the start address of the compressed data, the length of the output (decompressed) line, and the number of lines to decompress. Although the requirement for SoPEC is to be able to print text at 10:1 compression, the LBD can cope with any compression ratio if the requested DRAM access is available. A pass-through mode is provided for 1:1 compression. Ten-point plain text compresses with a ratio of about 50:1. Lossless bi-level compression across an average page is about 20:1 with 10:1 possible for pages which compress poorly.

The output of the LBD is a single plane of decompressed bi-level data. The decompressed bi-level data is output to the SFU (Spot FIFO Unit), and in turn becomes an input to the HCU (Halftoner/Compositor unit) for the next stage in the printing pipeline. The LBD also outputs a lbd_finishedband control flag that is used by the PCU and is available as an interrupt to the CPU.

26.2 Main Features of LBD

Figure 160:
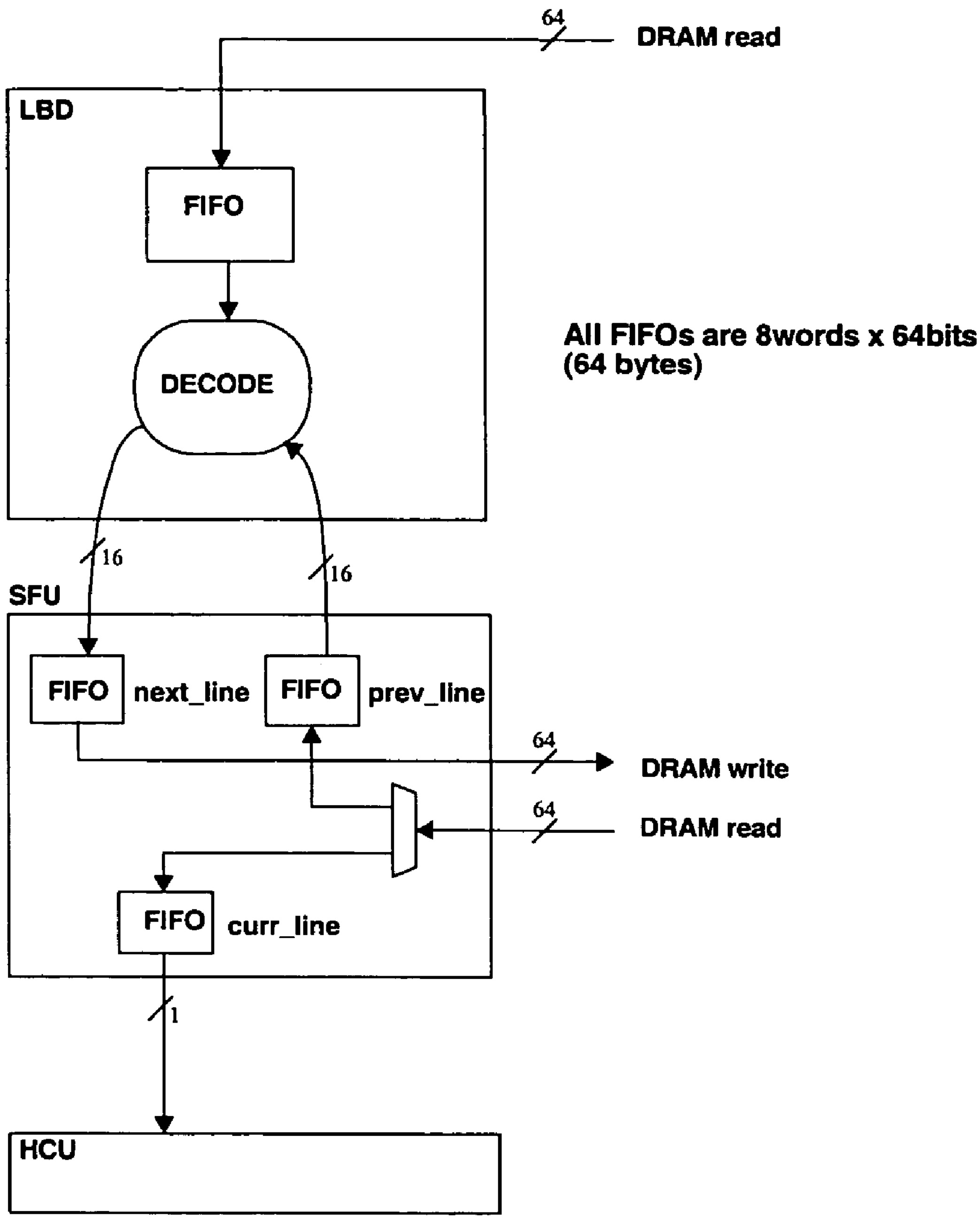

FIG. 160 shows a schematic outline of the LBD and SFU.

The LBD is required to support compressed images of up to 1600 dpi. The line buffers must therefore be long enough to store a complete line at 1600 dpi.

The PEC1 LBD is required to output 2 dots/cycle to the HCU. This throughput capability is retained for SoPEC to minimise changes to the block, although in SoPEC the HCU will only read 1 dot/cycle. The PEC1 LDB outputs 16 bits in parallel to the PEC1 spot buffer. This is also retained for SoPEC. Therefore the LBD in SoPEC can run much faster than is required. This is useful for allowing stalls, e.g. due to band processing latency, to be absorbed.

The LBD has a pass-through mode to cope with local negative compression. Pass-through mode is activated by a special run-length code. Pass-through mode continues to either end of line or for a pre-programmed number of bits, whichever is shorter. The special run-length code is always executed as a run-length code, followed by pass-through.

The LBD outputs decompressed bi-level data to the NextLineFIFO in the Spot FIFO Unit (SFU). This stores the decompressed lines in DRAM, with a typical minimum of 2 lines stored in DRAM, nominally 3 lines up to a programmable number of lines. The SFU's NextLineFIFO can fill while the SFU waits for write access to DRAM. Therefore the LBD must be able to support stalling at its output during a line.

The LBD uses the previous line in the decoding process. This is provided by the SFU via its PrevLineFIFO. Decoding can stall in the LBD while this FIFO waits to be filled from DRAM.

A signal sfu_ldb_rdy indicates that both the SFU's NextLineFIFO and PrevLineFIFO are available for writing and reading respectively.

A configuration register in the LBD controls whether the first line being decoded at the start of a band uses the previous line read from the SFU or uses an all 0's line instead, thereby allowing a band to be compressed independently of its predecessor at the discretion of the RIP.

The line length is stored in DRAM must be programmable to a value greater than 128. At 1600 dpi, an A4 line of 13824 dots requires 1.7 Kbytes of storage and an A3 line of 19488 dots requires 2.4 Kbytes of storage.

The compressed spot data can be read at a rate of 1 bit/cycle for pass-through mode 1:1 compression.

The LBD finished band signal is exported to the PCU and is additionally available to the CPU as an interrupt.

26.2.1 Bi-Level Decoding in the LBD

The black bi-level layer is losslessly compressed using Silverbrook Modified Group 4 (SMG4) compression which is a version of Group 4 Facsimile compression without Huffman and with simplified run length encodings. The encoding are listed in Table 151 and Table 152

TABLE 151

Bi-Level group 4 facsimile style compression encodings

| | Encoding | Description |
|---|---|---|
| Same as Group 4 Facsimile | 1000 | Pass Command: a0 ← b2, skip next two edges |
| | 1 | Vertical(0): a0 ← b1, color = !color |
| | 110 | Vertical(1): a0 ← b1 + 1, color = !color |
| | 010 | Vertical(−1): a0 ← b1 − 1, color = !color |
| | 110000 | Vertical(2): a0 ← b1 + 2, color = !color |
| | 010000 | Vertical(−2): a0 ← b1 − 2, color = !color |
| Unique to this Implementation | 100000 | Vertical(3): a0 ← b1 + 3, color = !color |
| | 000000 | Vertical(−3): a0 ← b1 − 3, color = !color |
| | <RL><RL>100 | Horizontal: a0 ← a0 + <RL> + <RL> |

TABLE 152

Run length (RL) encodings

| | Encoding | Description |
|---|---|---|
| Unique to this Implementation | RRRRR1 | Short Black Runlength (5 bits) |
| | RRRRR1 | Short White Runlength (5 bits) |
| | RRRRRRRRRR10 | Medium Black Runlength (10 bits) |
| | RRRRRRRR10 | Medium White Runlength (8 bits) |
| | RRRRRRRRRR10 | Medium Black Runlength with RRRRRRRRRR <= 31, Enter pass-through |
| | RRRRRRRR10 | Medium White Runlength with RRRRRRRR <= 31, Enter pass-through |
| | RRRRRRRRRRRRRRR00 | Long Black Runlength (15 bits) |
| | RRRRRRRRRRRRRRR00 | Long White Runlength (15 bits) |

Since the compression is a bitstream, the encodings are read right (least significant bit) to left (most significant bit). The run lengths given as RRRRR in Table 152 are read in the same way (least significant bit at the right to most significant bit at the left).

An additional enhancement to the G4 fax algorithm relates to pass-through mode. It is possible for data to compress negatively using the G4 fax algorithm. On occasions like this it would be easier to pass the data to the LBD as un-compressed data. Pass-through mode is a new feature that was not implemented in the PEC1 version of the LBD. When the LBD is in pass-through mode the least significant bit of the data stream is an un-compressed bit. This bit is used to construct the current line.

Therefore SMG4 has a pass-through mode to cope with local negative compression. Pass-through mode is activated by a special run-length code. Pass-through mode continues to either end-of-line or for a pre-programmed number of bits, whichever is shorter. The special run-length code is always executed as a run-length code, followed by pass-through.

To enter pass-through mode the LBD takes advantage of the way run lengths can be written. Usually if one of the runlength pair is less than or equal to 31 it should be encoded as a short runlength. However under the coding scheme of Table 152 it is still legal to write it as a medium or long runlength. The LBD has been designed so that if a short runlength value is detected in a medium runlength, then once the horizontal command containing this runlength is decoded completely this will tell the LBD to enter pass-through mode and the bits following the runlength is un-compressed data. The number of bits to pass-through is either a programmed number of bits or the end of the line which ever comes first. Once the pass-through mode is completed the current color is the same as the color of the last bit of the passed through data.

26.2.2 DRAM Access Requirements

The compressed page store for contone, bi-level and raw tag data is programmable, and can be of the order of 2 Mbytes. The LBD accesses the compressed page store in single 256-bit DRAM reads. The LBD uses a 256-bit double buffer in its interface to the DIU. At 1600 dpi the LBD's DIU bandwidth requirements are summarized in Table 153

TABLE 153

DRAM bandwidth requirements

| Direction | Maximum number of cycles between each 256-bit DRAM access | Peak Bandwidth (bits/cycle) | Average Bandwidth (bits/cycle) |
|---|---|---|---|
| Read | 256[1] (1:1 compression) | 1 (1:1 compression) | 0.1 (10:1 compression) |

[1]At 1:1 compression the LBD requires 1 bit/cycle or 256 bits every 256 cycles.

26.3 Implementation

26.3.1 Definitions of IO

TABLE 154

LBD Port List

| Port Name | Pins | I/O | Description |
|---|---|---|---|
| | | | **Clocks and Resets** |
| Pclk | 1 | In | SoPEC Functional clock. |
| prst_n | 1 | In | Global reset signal. |
| | | | **Bandstore signals** |
| lbd_finishedband | 1 | Out | LBD finished band signal to PCU and Interrupt Controller. |
| | | | **DIU Interface signals** |
| lbd_diu_rreq | 1 | Out | LBD requests DRAM read. A read request must be accompanied by a valid read address. |
| lbd_diu_radr[21:5] | 17 | Out | Read address to DIU<br>17 bits wide (256-bit aligned word). |
| diu_lbd_rack | 1 | In | Acknowledge from DIU that read request has been accepted and new read address can be placed on lbd_diu_radr. |
| diu_data[63:0] | 64 | In | Data from DIU to SoPEC Units.<br>First 64-bits is bits 63:0 of 256 bit word.<br>Second 64-bits is bits 127:64 of 256 bit word.<br>Third 64-bits is bits 191:128 of 256 bit word.<br>Fourth 64-bits is bits 255:192 of 256 bit word. |
| diu_lbd_rvalid | 1 | In | Signal from DIU telling SoPEC Unit that valid read data is on the diu_data bus |
| | | | **PCU Interface data and control signals** |
| pcu_addr[5:2] | 4 | In | PCU address bus. Only 4 bits are required to decode the address space for this block. |
| pcu_dataout[31:0] | 32 | In | Shared write data bus from the PCU. |
| lbd_pcu_datain[31:0] | 32 | Out | Read data bus from the LBD to the PCU. |
| pcu_rwn | 1 | In | Common read/not-write signal from the PCU. |
| pcu_lbd_sel | 1 | In | Block select from the PCU. When pcu_lbd_sel is high both pcu_addr and pcu_dataout are valid. |
| lbd_pcu_rdy | 1 | Out | Ready signal to the PCU. When lbd_pcu_rdy is high it indicates the last cycle of the access. For a write cycle this means pcu_dataout has been registered by the block and for a read cycle this means the data on lbd_pcu_datain is valid. |
| | | | **SFU Interface data and control signals** |
| sfu_lbd_rdy | 1 | In | Ready signal indicating SFU has previous line data available for reading and is also ready to be written to. |
| lbd_sfu_advline | 1 | Out | Advance line signal to previous and next line buffers |
| lbd_sfu_pladvword | 1 | Out | Advance word signal for previous line buffer. |
| sfu_lbd_pldata[15:0] | 16 | In | Data from the previous line buffer. |
| lbd_sfu_wdata[15:0] | 16 | Out | Write data for next line buffer. |
| lbd_sfu_wdatavalid | 1 | Out | Write data valid signal for next line buffer data. |

26.3.1

26.3.2 Configuration Registers

TABLE 155

LBD Configuration Registers

| Address (LBD_base+) | Register Name | #Bits | Value on Reset | description |
|---|---|---|---|---|
| | | | | **Control registers** |
| 0x00 | Reset | 1 | 0x1 | A write to this register causes a reset of the LBD.<br>This register can be read to indicate the reset state:<br>0 - reset in progress<br>1 - reset not in progress |

TABLE 155-continued

LBD Configuration Registers

| Address (LBD_base+) | Register Name | #Bits | Value on Reset | description |
|---|---|---|---|---|
| 0x04 | Go | 1 | 0x0 | Writing 1 to this register starts the LBD. Writing 0 to this register halts the LBD. The Go register is reset to 0 by the LBD when it finishes processing a band. When Go is deasserted the state-machines go to their idle states but all counters and configuration registers keep their values. When Go is asserted all counters are reset, but configuration registers keep their values (i.e. they don't get reset). The LBD should only be started after the SFU is started. This register can be read to determine if the LBD is running (1 - running, 0 - stopped). |
| | Setup registers (constant for during processing the page) | | | |
| 0x08 | LineLength | 16 | 0x0000 | Width of expanded bi-level line (in dots) (must be set greater than 128 bits). |
| 0x0C | PassThroughEnable | 1 | 0x1 | Writing 1 to this register enables passthrough mode. Writing 0 to this register disables passthrough mode thereby making the LBD compatible with PEC1. |
| 0x10 | PassThroughDotLength | 16 | 0x0000 | This is the dot length − 1 for which pass-through mode will last. If the end of the line is reached first then pass-through will be disabled. The value written to this register must be a non-zero value. |
| | Work registers (need to be set up before processing a band) | | | |
| 0x14 | NextBandCurrReadAdr[21:5] (256-bit aligned DRAM address) | 17 | 0x00000 | Shadow register which is copied to CurrReadAdr when (NextBandEnable == 1 & Go == 0). NextBandCurrReadAdr is the address of the start of the next band of compressed bi-level data in DRAM. |
| 0x18 | NextBandLinesRemaining | 15 | 0x0000 | Shadow register which is copied to LinesRemaining when (NextBandEnable == 1 & Go == 0). NextBandLinesRemaining is the number of lines to be decoded in the next band of compressed bi-level data. |
| 0x1C | NextBandPrevLineSource | 1 | 0x0 | Shadow register which is copied to PrevLineSource when (NextBandEnable == 1 & Go == 0). 1 - use the previous line read from the SFU for decoding the first line at the start of the next band. 0 - ignore the previous line read from the SFU for decoding the first line at the start of the next band (an all 0's line is used instead). |
| 0x20 | NextBandEnable | 1 | 0x0 | If (NextBandEnable == 1 & Go == 0) then NextBandCurrReadAdr is copied to CurrReadAdr, NextBandLinesRemaining is copied to LinesRemaining, NextBandPrevLineSource is copied |

TABLE 155-continued

LBD Configuration Registers

| Address (LBD_base+) | Register Name | #Bits | Value on Reset | description |
|---|---|---|---|---|
| | | | | Go is set, NextBandEnable is cleared. To start LBD processing NextBandEnable should be set. |
| | Setup registers (remain constant during the processing of multiple bands) | | | |
| 0x24 | LbdStartOfBandStore[21:5] | 17 | 0x0_0000 | Points to the 256-bit word that defines the start of the memory area allocated for LBD page bands. Circular address generation wraps to this start address. |
| 0x28 | LbdEndOfBandStore[21:5] | 17 | 0x1_FFFF | Points to the 256-bit word that defines the last address of the memory area allocated for LBD page bands. If the current read address is from this address, then instead of adding 1 to the current address, the current address will be loaded from the LbdStartOfBandStore register. |
| | Work registers (read only for external access) | | | |
| 0x2C | CurrReadAdr[21:5] (256-bit aligned DRAM address) | 17 | — | The current 256-bit aligned read address within the compressed bi-level image (DRAM address). Read only register. |
| 0x30 | LinesRemaining | 15 | — | Count of number of lines remaining to be decoded. The band has finished when this number reaches 0. Read only register. |
| 0x34 | PrevLineSource | 1 | — | 1 - uses the previous line read from the SFU for decoding the first line at the start of the next band. 0 - ignores the previous line read from the SFU for decoding the first line at the start of the next band (an all 0's line is used instead). Read only register. |
| 0x38 | CurrWriteAdr | 15 | — | The current dot position for writing to the SFU. Read only register. |
| 0x3C | FirstLineOfBand | 1 | — | Indicates whether the current line is considered to be the first line of the band. Read only register. |

26.3.2

26.3.3 Starting the LBD Between Bands

The LBD should be started after the SFU. The LBD is programed with a start address for the compressed bi-level data, a decode line length, the source of the previous line and a count of how many lines to decode. The LBD's NextBandEnable bit should then be set (this will set LBD Go). The LBD decodes a single band and then stops, clearing its Go bit and issuing a pulse on lbd_finishedband. The LBD can then be restarted for the next band while the HCU continues to process previously decoded bi-level data from the SFU.

There are 4 mechanisms for restarting the LBD between bands:

a. lbd_finishedband causes an interrupt to the CPU. The LBD will have stopped and cleared its Go bit. The CPU reprograms the LBD, typically the NextBandCurrReadAdr, NextBandLinesRemaining and NextBandPrevLineSource shadow registers, and sets NextBandEnable to restart the LBD.

b. The CPU programs the LBD's NextBandCurrReadAdr, NextBandLinesRemaining, and NextBandPrevLineSource shadow registers and sets the NextBandEnable flag before the end of the current band. At the end of the band the LBD clears Go, NextBandEnable is already set so the LBD restarts immediately.

c. The PCU is programmed so that lbd_finishedband triggers the PCU to execute commands from DRAM to reprogram the LBD's NextBandCurrReadAdr, NextBandLinesRemaining, and NextBandPrevLineSource shadow registers and set NextBandEnable to restart the LBD. The advantage of this scheme is that the CPU could process band headers in advance and store the band commands in DRAM ready for execution.

d. This is a combination of b and c above. The PCU (rather than the CPU in b) programs the LBD's NextBandCurrReadAdr, NextBandLinesRemaining, and NextBandPrevLineSource shadow registers and sets the NextBandEnable flag before the end of the current band. At the end of the band the LBD clears Go and pulses lbd_finishedband NextBandEnable is already set so the LBD restarts immediately. Simultaneously, lbd_finishedband triggers the PCU to fetch commands from DRAM. The LBD will have restarted by the time the PCU has fetched commands from DRAM. The PCU commands program the LBD's shadow registers and sets NextBandEnable for the next band.

26.3.4 Top-Level Description

Figure 161:
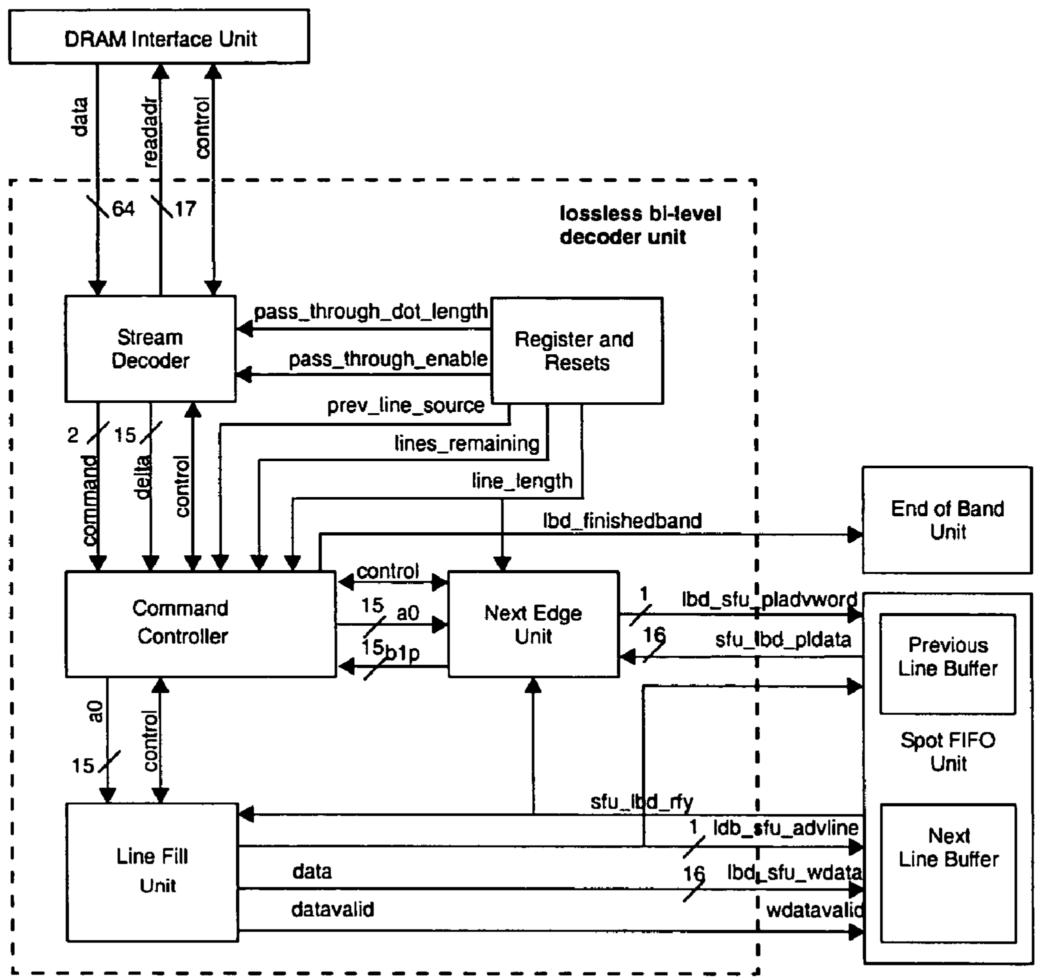

A block diagram of the LBD is shown in FIG. 161.

The LBD contains the following sub-blocks:

TABLE 156

Functional sub-blocks in the LBD

| name | description |
|---|---|
| Registers and Resets | PCU interface and configuration registers. Also generates the Go and the Reset signals for the rest of the LBD |
| Stream Decoder | Accesses the bi-level description from the DRAM through the DIU interface. It decodes the bit stream into a command with arguments, which it then passes to the command controller. |
| Command Controller | Interprets the command from the stream decoder and provide the line fill unit with a limit address and color to fill the SFU Next Line Buffer. It also provides the next edge unit starting address to look for the next edge. |
| Next Edge Unit | Scans through the Previous Line Buffer using its current address to find the next edge of a color provided by the command controller. The next edge unit outputs this as the next current address back to the command controller and sets a valid bit when this address is at the next edge. |
| Line Fill Unit | Fills the SFU Next Line Buffer with a color from its current address up to a limit address. The color and limit are provided by the command controller. |

In the following description the LBD decodes data for its current decode line but writes this data into the SFU's next line buffer.

The LBD is able to stall mid-line should the SFU be unable to supply a previous line or receive a current line frame due to band processing latency.

All output control signals from the LBD must always be valid after reset. For example, if the LBD is not currently decoding, lbd_sfu_advline (to the SFU) and lbd_finishedband will always be 0.

26.3.5 Registers and Resets Sub-Block Description

The LBD page band store is defined by the registers LbdStartofBandStore and LbdEndOfBandStore, that enable sequential memory accesses to the page band stores to be circular in nature. The register descriptions for the LBD are listed in Table 155.

During initialisation of the LBD, the LineLength and the LinesRemaining configuration values are written to the LBD. The 'Registers and Resets' sub-block supplies these signals to the other sub-blocks in the LBD. In the case of LinesRemaining, this number is decremented for every line that is completed by the LBD.

If pass-through is used during a band the PassThroughEnable register needs to be programmed and PassThroughDotLength programmed with the length of the compressed bits in pass-through mode.

PrevLineSource is programmed during the initialisation of a band, if the previous line supplied for the first line is a valid previous line, a 1 is written to PrevLineSource so that the data is used. If a 0 is written the LBD ignores the previous line information supplied and acts as if it is receiving all zeros for the previous line regardless of what is received from the SFU.

The 'Registers and Resets' sub-block also generates the resets used by the rest of the LBD and the Go bit which tells the LBD that it can start requesting data from the DIU and commence decoding of the compressed data stream.

26.3.6 Stream Decoder Sub-Block Description

The Stream Decoder reads the compressed bi-level image from the DRAM via the DIU (single accesses of 256-bits) into a double 256-bit FIFO. The barrel shift register uses the 64-bit word from the FIFO to fill up the empty space created by the barrel shift register as it is shifting its contents. The bit stream is decoded into a command/arguments pair, which in turn is passed to the command controller.

Figure 162:
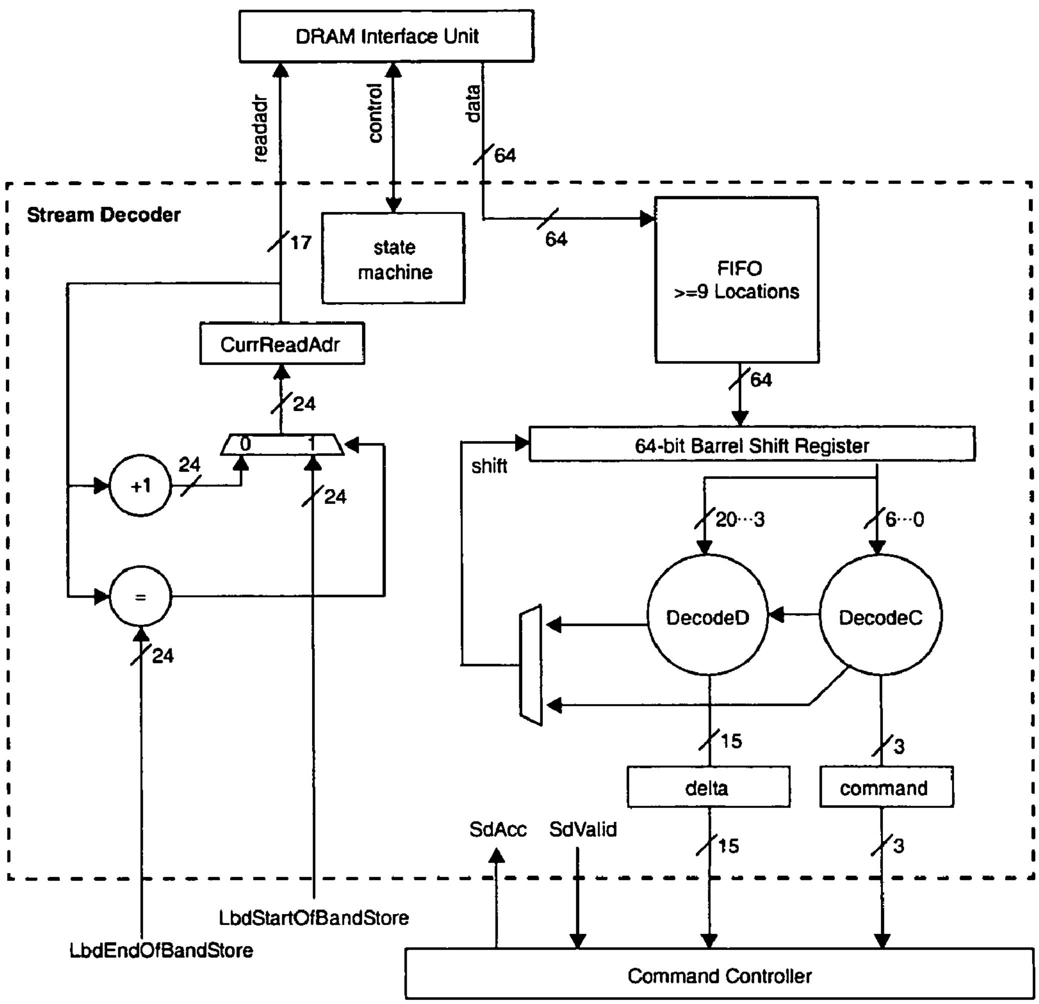

A dataflow block diagram of the stream decoder is shown in FIG. 162.

26.3.6.1 DecodeC—Decode Command

The DecodeC logic encodes the command from bits 6 . . . 0 of the bit stream to output one of three commands: SKIP, VERTICAL and RUNLENGTH. It also provides an output to indicate how many bits were consumed, which feeds back to the barrel shift register.

There is a fourth command, PASS_THROUGH, which is not encoded in bits 6 . . . 0, instead it is inferred in a special runlength. If the stream decoder detects a short runlength value, i.e. a number less than 31, encoded as a medium runlength this tell the Stream Decoder that once the horizontal command containing this runlength is decoded completely the LBD enters PASS_THROUGH mode. Following the runlength there will be a number of bits that represent un-compressed data. The LBD will stay in PASS_THROUGH mode until all these bits have been decoded successfully. This will occur once a programmed number of bits is reached or the line ends, which ever comes first.

26.3.6.2 DecodeD—Decode Delta

The DecodeD logic decodes the run length from bits 20 . . . 3 of the bit stream. If DecodeC is decoding a vertical command, it will cause DecodeD to put constants of –3 through 3 on its output. The output delta is a 15 bit number, which is generally considered to be positive, but since it needs to only address to 13824 dots for an A4 page and 19488 dots for an A3 page (of 32,768), a 2's complement representation of −3, −2, −1 will work correctly for the data pipeline that follows. This unit also outputs how many bits were consumed.

In the case of PASS_THROUGH mode, DecodeD parses the bits that represent the un-compressed data and this is used by the Line Fill Unit to construct the current line frame. DecodeD parses the bits at one bit per clock cycle and passes the bit in the less significant bit location of delta to the line fill unit.

DecodeD currently requires to know the color of the run length to decode it correctly as black and white runs are encoded differently. The stream decoder keeps track of the next color based on the current color and the current command.

26.3.6.3 State-Machine

This state machine continuously fetches consecutive DRAM data whenever there is enough free space in the FIFO, thereby keeping the barrel shift register full so it can continually decode commands for the command controller. Note in FIG. 162 that each read cycle curr_read_addr is compared to lbd_end_of_band_store. If the two are equal, curr_read_addr is loaded with lbd_start_of_band_store (circular memory addressing). Otherwise curr_read_addr is simply incremented. lbd_start_of_band_store and lbd_end_of_band _store need to be programed so that the distance between them is a multiple of the 256-bit DRAM word size.

When the state machine decodes a SKIP command, the state machine provides two SKIP instructions to the command controller.

The RUNLENGTH command has two different run lengths. The two run lengths are passed to the command controller as separate RUNLENGTH instructions. In the first instruction fetch, the first run length is passed, and the state machine selects the DecodeD shift value for the barrel shift. In the second instruction fetch from the command controller another RUNLENGTH instruction is generated and the respective shift value is decoded. This is achieved by forcing DecodeC to output a second RUNLENGTH instruction and the respective shift value is decoded.

For PASS_THROUGH mode, the PASS_THROUGH command is issued every time the command controller requests a new command. It does this until all the un-compressed bits have been processed.

26.3.7 Command Controller Sub-Block Description

The Command Controller interprets the command from the Stream Decoder and provides the line fill unit with a limit address and color to fill the SFU Next Line Buffer. It provides the next edge unit with a starting address to look for the next edge and is responsible for detecting the end of line and generating the eob_cc signal that is passed to the line fill unit.

Figure 163:
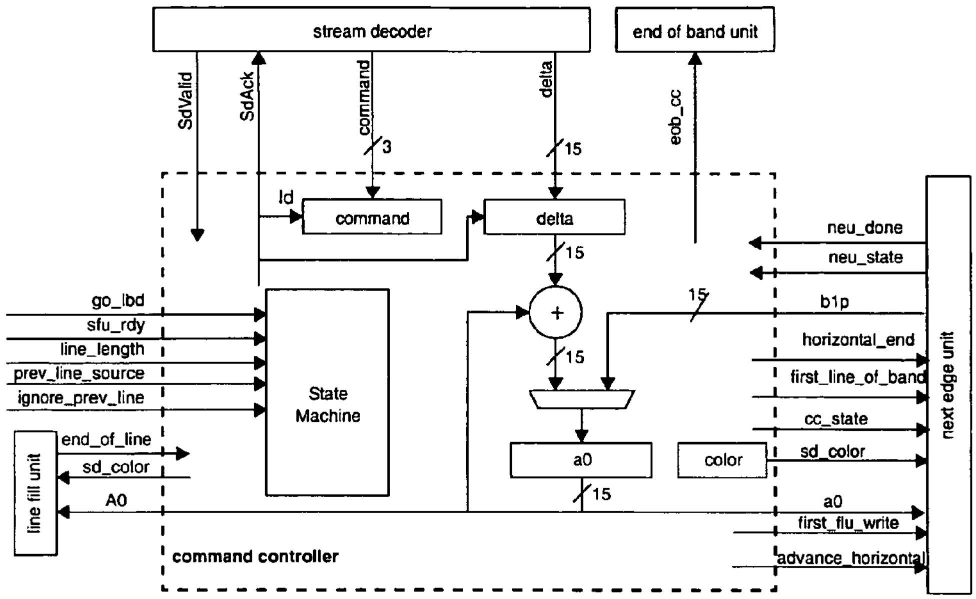
Figure 164:
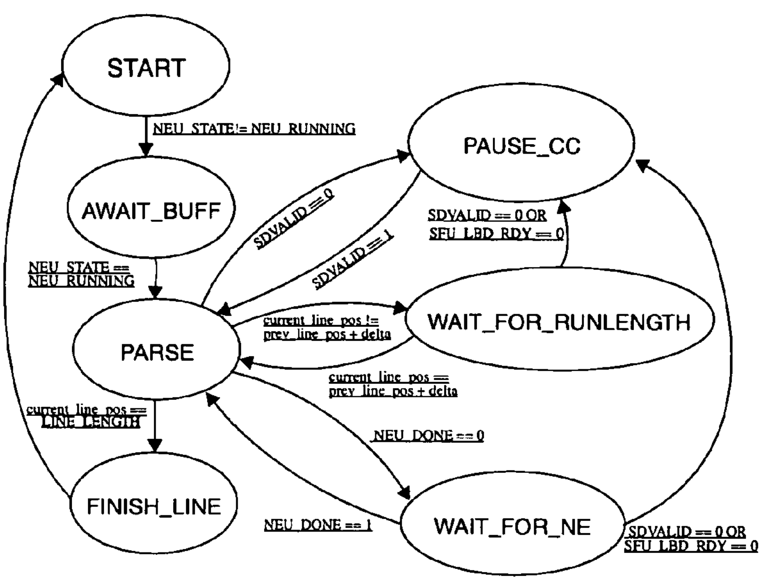

A dataflow block diagram of the command controller is shown in FIG. 163. Note that data names such as a0 and b1p denote the reference or starting changing element on the coding line and the first changing element on the reference line to the right of a0 and of the opposite color to a0 respectively.

26.3.7.1 State Machine

The following is an explanation of all the states that the state machine utilizes.

i START

This is the state that the Command Controller enters when a hard or soft reset occurs or when Go has been de-asserted. This state cannot be left until the reset has been removed, Go has been asserted and the NEU (Next Edge Unit), the SD (Stream Decoder) and the SFU are ready.

ii AWAIT_BUFFER

The NEU contains a buffer memory for the data it receives from the SFU. When the command controller enters this state the NEU detects this and starts buffering data, the command controller is able to leave this state when the state machine in the NEU has entered the NEU_RUNNING state. Once this occurs the command controller can proceed to the PARSE state.

iii PAUSE_CC

During the decode of a line it is possible for the FIFO in the stream decoder to get starved of data if the DRAM is not able to supply replacement data fast enough. Additionally the SFU can also stall mid-line due to band processing latency. If either of these cases occurs the LBD needs to pause until the stream decoder gets more of the compressed data stream from the DRAM or the SFU can receive or deliver new frames. All of the remaining states check if sdvalid goes to zero (this denotes a starving of the stream decoder) or if sfu_lbd_rdy goes to zero and that the LBD needs to pause. PAUSE_CC is the state that the command controller enters to achieve this and it does not leave this state until sdvalid and sfu_lbd_rdy are both asserted and the LBD can recommence decompressing.

iv PARSE

Once the command controller enters the PARSE state it uses the information that is supplied by the stream decoder. The first clock cycle of the state sees the sdack signal getting asserted informing the stream decoder that the current register information is being used so that it can fetch the next command.

When in this state the command controller can receive one of four valid commands:

a) Runlength or Horizontal

For this command the value given as delta is an integer that denotes the number of bits of the current color that must be added to the current line.

Should the current line position, a0, be added to the delta and the result be greater than the final position of the current frame being processed by the Line Fill Unit (only 16 bits at a time), it is necessary for the command controller to wait for the Line Fill Unit (LFU) to process up to that point. The command controller changes into the WAIT_FOR_RUNLENGTH state while this occurs.

When the current line position, a0, and the delta together equal or exceed the LINE_LENGTH, which is programmed during initialisation, then this denotes that it is the end of the current line. The command controller signals this to the rest of the LBD and then returns to the START state.

b) Vertical

When this command is received, it tells the command controller that, in the previous line, it needs to find a change from the current color to opposite of the current color, i.e. if the current color is white it looks from the current position in the previous line for the next time where there is a change in color from white to black. It is important to note that if a black to white change occurs first it is ignored.

Once this edge has been detected, the delta will denote which of the vertical commands to use, refer to Table 151. The delta will denote where the changing element in the current line is relative to the changing element on the previous line, for a Vertical(2) the new changing element position in the current line will correspond to the two bits extra from changing element position in the previous line.

Should the next edge not be detected in the current frame under review in the NEU, then the command controller enters the WAIT_FOR_NE state and waits there until the next edge is found.

c) Skip

A skip follow the same functionality as to Vertical(0) commands but the color in the current line is not changed as it is been filled out. The stream decoder supplies what looks like two separate skip commands that the command controller treats the same a two Vertical(0) commands and has been coded not to change the current color in this case.

d) Pass-Through

When in pass-through mode the stream decoder supplies one bit per clock cycle that is uses to construct the current frame. Once pass-through mode is completed, which is controlled in the stream decoder, the LBD can recommence normal decompression again. The current color after pass-through mode is the same color as the last bit in un-compressed data stream. Pass-through mode does not need an extra state in the command controller as each pass-through command received from the stream decoder can always be processed in one clock cycle.

v WAIT_FOR_RUNLENGTH

As some RUNLENGTH's can carry over more than one 16-bit frame, this means that the Line Fill Unit needs longer than one clock cycle to write out all the bits represented by the RUNLENGTH. After the first clock cycle the command controller enters into the WAIT_FOR_RUNLENGTH state until all the RUNLENGTH data has been consumed. Once finished and provided it is not the end of the line the command controller will return to the PARSE state.

vi WAIT_FOR_NE

Similar to the RUNLENGTH commands the vertical commands can sometimes not find an edge in the current 16-bit frame. After the first clock cycle the command controller enters the WAIT_FOR_NE state and remains here until the edge is detected. Provided it is not the end of the line the command controller will return to the PARSE state.

vii FINISH_LINE

At the end of a line the command controller needs to hold its data for the SFU before going back to the START state. Command controller remains in the FINISH_LINE state for one clock cycle to achieve this.

26.3.8 Next Edge Unit Sub-Block Description

Figure 165:
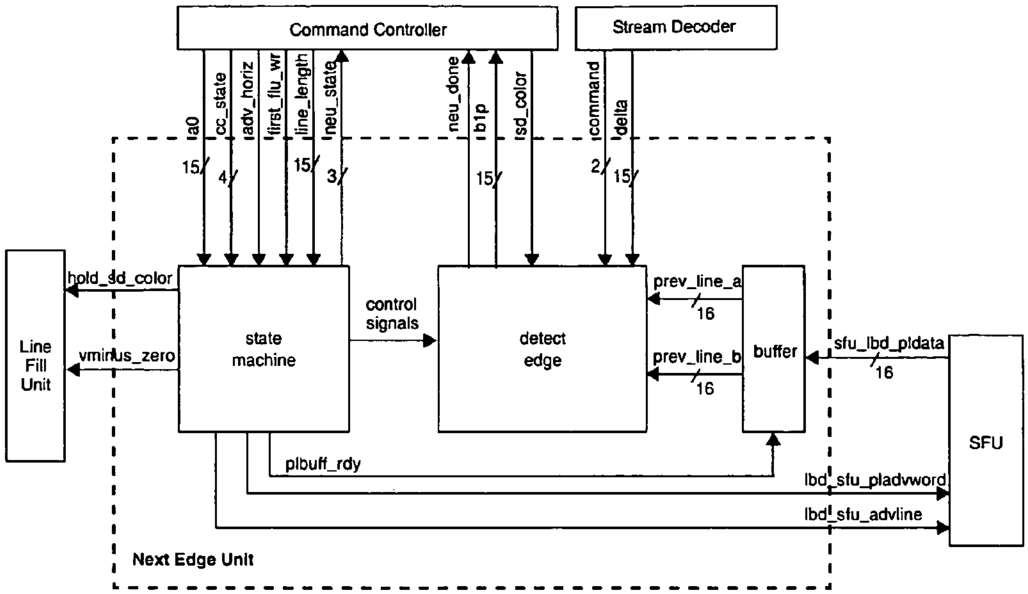

The Next Edge Unit (NEU) is responsible for detecting color changes, or edges, in the previous line based on the current address and color supplied by the Command Controller. The NEU is the interface to the SFU and it buffers the previous line for detecting an edge. For an edge detect operation the Command Controller supplies the current address, this typically was the location of the last edge, but it could also be the end of a run length. With the current address a color is also supplied and using these two values the NEU will search the previous line for the next edge. If an edge is found the NEU returns this location to the Command Controller as the next address in the current line and it sets a valid bit to tell the Command Controller that the edge has been detected. The Line Fill Unit uses this result to construct the current line. The NEU operates on 16-bit words and it is possible that there is no edge in the current 16 bits in the NEU. In this case the NEU will request more words from the SFU and will keep searching for an edge. It will continue doing this until it finds an edge or reaches the end of the previous line, which is based on the LINE_LENGTH. A dataflow block diagram of the Next Edge unit is shown in FIG. 165.

26.3.8.1 NEU Buffer

The algorithm being employed for decompression is based on the whole previous line and is not delineated during the line. However the Next Edge Unit, NEU, can only receive 16 bits at a time from the SFU. This presents a problem for vertical commands if the edge occurs in the successive frame, but refers to a changing element in the current frame.

To accommodate this the NEU works on two frames at the same time, the current frame and the first 3 bits from the successive frame. This allows for the information that is needed from the previous line to construct the current frame of the current line.

Figure 166:
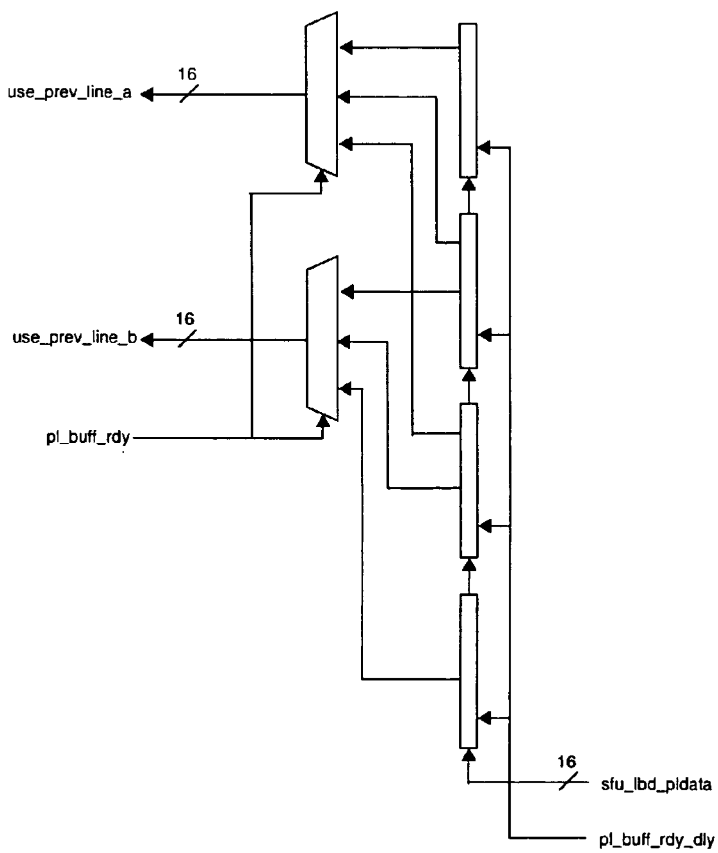

In addition to this buffering there is also buffering right after the data is received from the SFU as the SFU output is not registered. The current implementation of the SFU takes two clock cycles from when a request for a current line is received until it is returned and registered. However when NEU requests a new frame it needs it on the next clock cycle to maintain a decoded rate of 2 bits per clock cycle. A more detailed diagram of the buffer in the NEU is shown in FIG. 166.

The output of the buffer are two 16-bit vectors, use_prev_line_a and use_prev_line_b, that are used to detect an edge that is relevant to the current line being put together in the Line Fill Unit.

26.3.8.2 NEU Edge Defect

Figure 167:
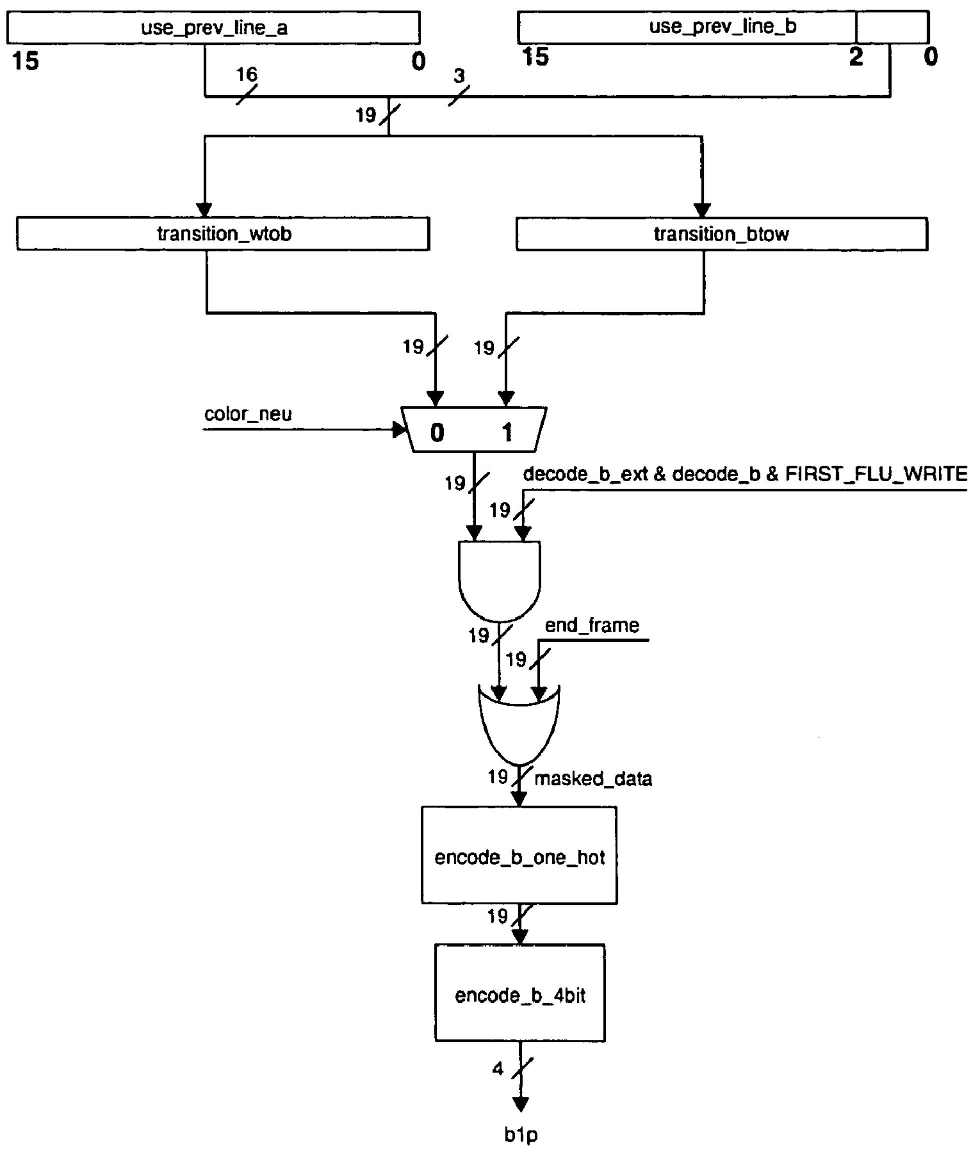
Figure 168:
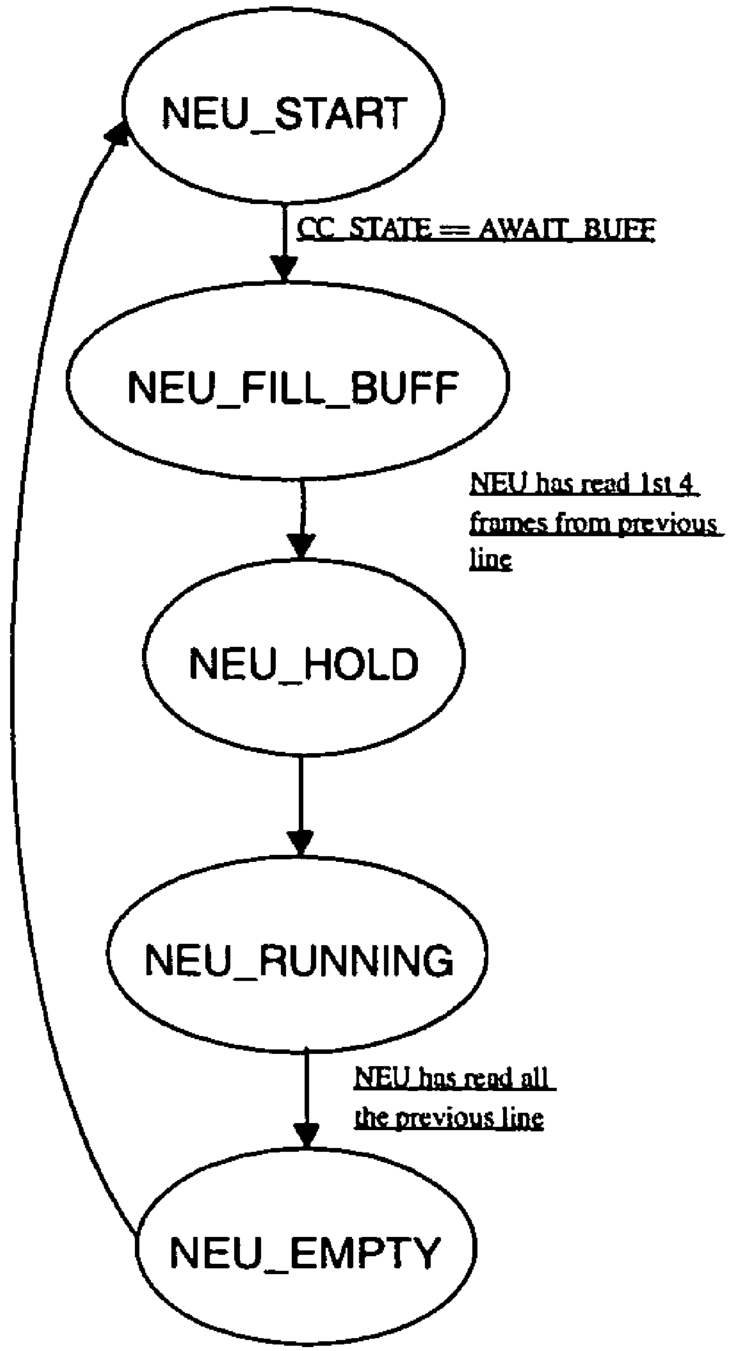
Figure 169:
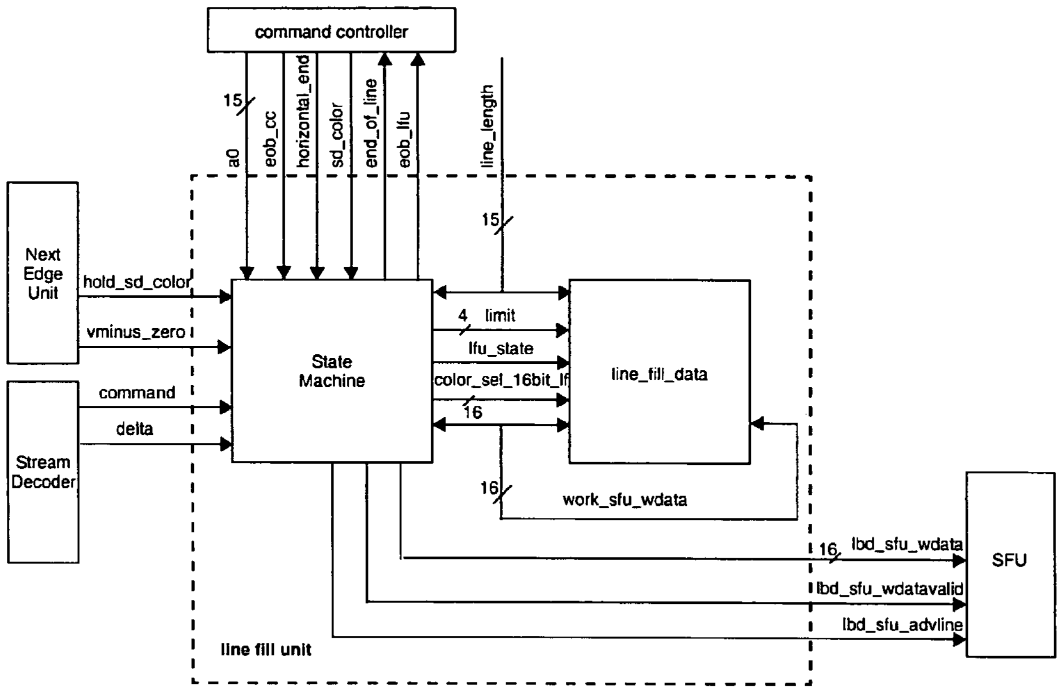
Figure 170:
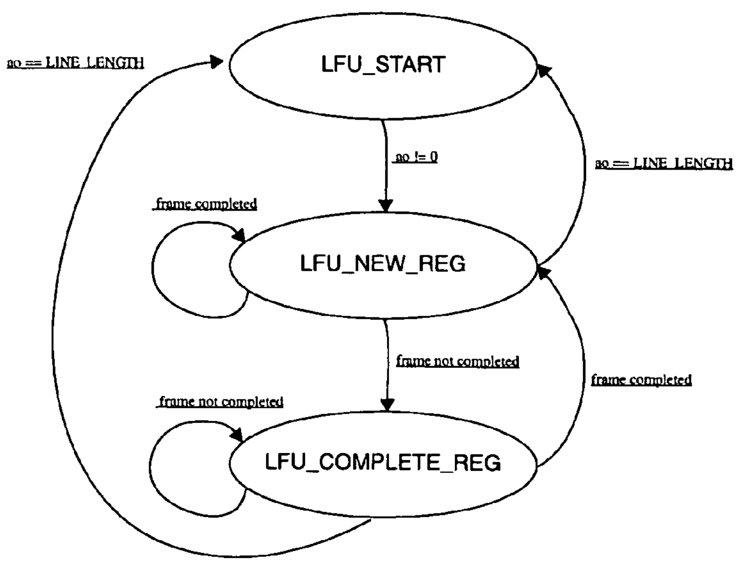

The NEU Edge Detect block takes the two 16 bit vectors supplied by the buffer and based on the current line position in the current line, a0, and the current color, sd_color, it will detect if there is an edge relevant to the current frame. If the edge is found it supplies the current line position, b1p, to the command controller and the line fill unit. The configuration of the edge detect is shown in FIG. 167.

The two vectors from the buffer, use_prev_line_a and use_prev_line_b, pass into two sub-blocks, transition_wtob and transition_btow, transition_wtob detects if any white to black transitions occur in the 19 bit vector supplied and outputs a 19-bit vector displaying the transitions. transition_wtob is functionally the same as transition_btow, but it detects white to black transitions.

The two 19-bit vectors produced enter into a multiplexer and the output of the multiplexer is controlled by color_neu. color_neu is the current edge transition color that the edge detect is searching for.

The output of the multiplexer is masked against a 19-bit vector, the mask is comprised of three parts concatenated together: decode_b_ext, decode_b and FIRST_FLU_WRITE.

The output of transition_wtob (and it complement transition_btow) are all the transitions in the 16 bit word that is under review. The decode_b is a mask generated from a0. In bit-wise terms all the bits above and including a0 are 1's and all bits below a0 are 0's. When they are gated together it means that all the transition below a0 are ignored and the first transition after a0 is picked out as the next edge.

The decode_b block decodes the 4 lsb of the current address (a0) into 16-bit mask bits that control which of the data bits are examined. Tables 157 shows the truth table for this block.

TABLE 157

Decode_b truth table

| input | Output |
|---|---|
| 0000 | 1111111111111111 |
| 0001 | 1111111111111110 |
| 0010 | 1111111111111100 |
| 0011 | 1111111111111000 |
| 0100 | 1111111111110000 |
| 0101 | 1111111111100000 |
| 0110 | 1111111111000000 |
| 0111 | 1111111110000000 |
| 1000 | 1111111100000000 |
| 1001 | 1111111000000000 |
| 1010 | 1111110000000000 |
| 1011 | 1111100000000000 |
| 1100 | 1111000000000000 |
| 1101 | 1110000000000000 |
| 1110 | 1100000000000000 |
| 1111 | 1000000000000000 |

For cases when there is a negative vertical command from the stream decoder it is possible that the edge is in the three lower significant bits of the next frame. The decode_b_ext block supplies the mask so that the necessary bits can be used by the NEU to detect an edge if present, Table 158 shows the truth table for this block.

TABLE 158

Decode_b_ext truth table

| delta | output |
|---|---|
| Vertical(−3) | 111 |
| Vertical(−2) | 111 |
| Vertical(−1) | 011 |
| OTHERS | 001 |

FIRST_FLU_WRITE is only used in the first frame of the current line. 2.2.5 a) in ANSI/EIA 538-1988, Facsimile Coding Schemes and Coding Control Functions for Group 4 Facsimile Equipment, August 1988 refers to "Processing the first picture element", in which it states that "The first starting picture element, a0, on each coding line is imaginarily set at a position just before the first picture element, and is regarded as a white picture element". transition_wtob and transition_btow are set up produce this case for every single frame. However it is only used by the NEU if it is not masked out. This occurs when FIRST_FLU_WRITE is '1' which is only asserted at the beginning of a line.

2.2.5 b) in ANSI/EIA 538-1988, Facsimile Coding Schemes and Coding Control Functions for Group 4 Facsimile Equipment, August 1988 covers the case of "Processing the last picture element", this case states that "The coding of the coding line continues until the position of the imaginary changing element situated after the last actual element is coded". This means that no matter what the current color is the NEU needs to always find an edge at the end of a line. This feature is used with negative vertical commands.

The vector, end_frame, is a "one-hot" vector that is asserted during the last frame. It asserts a bit in the end of line position, as determined by LineLength, and this simulates an edge in this location which is ORed with the transition's vector. The output of this, masked_data, is sent into the encodeB_one_hot block 26.3.8.3 Encode_b_one_hot The encode_b_one_hot block is the first stage of a two stage process that encodes the data to determine the address of the 0 to 1 transition. Table 159 lists the truth table outlining the functionally required by this block.

TABLE 159

Encode_b_one_hot Truth Table

| input | output |
|---|---|
| XXXXXXXXXXXXXXXXXX1 | 0000000000000000001 |
| XXXXXXXXXXXXXXXXX10 | 0000000000000000010 |
| XXXXXXXXXXXXXXXX100 | 0000000000000000100 |
| XXXXXXXXXXXXXXX1000 | 0000000000000001000 |
| XXXXXXXXXXXXXX10000 | 0000000000000010000 |
| XXXXXXXXXXXXX100000 | 0000000000000100000 |
| XXXXXXXXXXXX1000000 | 0000000000001000000 |
| XXXXXXXXXXX10000000 | 0000000000010000000 |
| XXXXXXXXXX100000000 | 0000000000100000000 |
| XXXXXXXXX1000000000 | 0000000001000000000 |
| XXXXXXXX10000000000 | 0000000010000000000 |
| XXXXXXX100000000000 | 0000000100000000000 |
| XXXXXX1000000000000 | 0000001000000000000 |
| XXXXX10000000000000 | 0000010000000000000 |
| XXXX100000000000000 | 0000100000000000000 |
| XXX1000000000000000 | 0001000000000000000 |
| XX10000000000000000 | 0010000000000000000 |
| X100000000000000000 | 0100000000000000000 |
| 1000000000000000000 | 1000000000000000000 |
| 0000000000000000000 | 0000000000000000000 |

The output of encode_b_one_hot is a "one-hot" vector that will denote where that edge transition is located. In cases of multiple edges, only the first one will be picked.

26.3.8.4 Encode_b_4bit

Encode_b_4bit is the second stage of the two stage process that encodes the data to determine the address of the 0 to 1 transition.

Encode_b_4bit receives the "one-hot" vector from encode_b_one_hot and determines the bit location that is asserted. If there is none present this means that there was no edge present in this frame. If there is a bit asserted the bit location in the vector is converted to a number, for example if bit 0 is asserted then the number is one, if bit one is asserted then the number is one, etc. The delta supplied to the NEU determines what vertical command is being processed. The formula that is implemented to return b1p to the command controller is:

for V(n) b1p = x + n modulus16 where x is the number that was extracted from the "one-hot" vector and n is the vertical command.

26.3.8.5 State Machine

The following is an explanation of all the states that the NEU state machine utilizes.

i NEU_START

This is the state that NEU enters when a hard or soft reset occurs or when Go has been de-asserted. This state can not left until the reset has been removed, Go has been asserted and it detects that the command controller has entered it's AWAIT_BUFF state. When this occurs the NEU enters the NEU_FILL_BUFF state.

ii NEU_FILL_BUFF

Before any compressed data can be decoded the NEU needs to fill up its buffer with new data from the SFU. The rest of the LBD waits while the NEU retrieves the first four frames from the previous line. Once completed it enters the NEU_HOLD state.

iii NEU_HOLD

The NEU waits in this state for one clock cycle while data requested from the SFU on the last access returns.

iv NEU_RUNNING

NEU_RUNNING controls the requesting of data from the SFU for the remainder of the line by pulsing lbd_sfu_pladvword when the LBD needs a new frame from the SFU. When the NEU has received all the word it needs for the current line, as denoted by the LineLength, the NEU enters the NEU_EMPTY state.

v NEU_EMPTY

NEU waits in this state while the rest of the LBD finishes outputting the completed line to the SFU. The NEU leaves this state when Go gets deasserted. This occurs when the end_of_line signal is detected from the LBD.

26.3.9 Line Fill Unit Sub-Block Description

The Line Fill Unit, LFU, is responsible for filling the next line buffer in the SFU. The SFU receives the data in blocks of sixteen bits. The LFU uses the color and a0 provided by the Command Controller and when it has put together a complete 16-bit frame, it is written out to the SFU. The LBD signals to the SFU that the data is valid by strobing the lbd_sfu_wdatavalid signal.

When the LFU is at the end of the line for the current line data it strobes lbd_sfu_advline to indicate to the SFU that the end of the line has occurred.

A dataflow block diagram of the line fill unit is shown in FIG. 167.

The dataflow above has the following blocks:

26.3.9.1 State Machine

The following is an explanation of all the states that the LFU state machine utilizes.

i LFU_START

This is the state that the LFU enters when a hard or soft reset occurs or when Go has been de-asserted. This state can not left until the reset has been removed, Go has been asserted and it detects that a0 is no longer zero, this only occurs once the command controller start processing data from the Next Edge Unit, NEU.

ii LFU_NEW_REG

LFU_NEW_REG is only entered at the beginning of a new frame. It can remain in this state on subsequent cycles if a whole frame is completed in one clock cycle. If the frame is completed the LFU will output the data to the SFU with the write enable signal. However if a frame is not completed in one clock cycle the state machine will change to the LFU_COMPLETE_REG state to complete the remainder of the frame. LFU_NEW_REG handles all the lbd_sfu_wdata writes and asserts lbd_sfu_wdatavalid as necessary.

iii LFU_COMPLETE_REG

LFU_COMPLETE_REG fills out all the remaining parts of the frame that were not completed in the first clock cycle. The command controller supplies the a0 value and the color and the state machine uses these to derive the limit and color_sel__16bit_lf which the line_fill_data block needs to construct a frame. Limit is the four lower significant bits of a0 and color_sel__16bit_lf is a 16-bit wide mask of sd_color. The state machine also maintains a check on the upper eleven bits of a0. If these increment from one clock cycle to the next that means that a frame is completed and the data can be written to the SFU. In the case of the LineLength being reached the Line Fill Unit fills out the remaining part of the frame with the color of the last bit in the line that was decoded.

26.3.9 line_fill_data line_fill_data takes the limit value and the color_sel__16bit_lf values and constructs the current frame that the command controller and the next edge unit are decoding. The following pseudo code illustrate the logic followed by the line_fill_data. work_sfu_wdata is exported by the LBD to the SFU as lbd_sfu_wdata.

```
if (lfu__state == LFU__START) OR (lfu__state == LFU__NEW__REG)
then
  work__sfu__wdata = color__sel__16bit__lf
else
  work__sfu__wdata[(15 - limit) downto limit] =
    color__sel__16bit__lf[(15 - limit) downto limit]
```

27 Spot FIFO Unit (SFU)

27.1 Overview

The Spot FIFO Unit (SFU) provides the means by which data is transferred between the LBD and the HCU. By abstracting the buffering mechanism and controls from both units, the interface is clean between the data user and the data generator. The amount of buffering can also be increased or decreased without affecting either the LBD or HCU. Scaling of data is performed in the horizontal and vertical directions by the SFU so that the output to the HCU matches the printer resolution. Non-integer scaling is supported in both the horizontal and vertical directions. Typically, the scale factor will be the same in both directions but may be programmed to be different.

27.2 Main Features of the SFU

The SFU replaces the Spot Line Buffer Interface (SLBI) in PEC1. The spot line store is now located in DRAM.

The SFU outputs the previous line to the LBD, stores the next line produced by the LBD and outputs the HCU read line. Each interface to DRAM is via a feeder FIFO. The LBD interfaces to the SFU with a data width of 16 bits. The SFU interfaces to the HCU with a data width of 1 bit.

Since the DRAM word width is 256-bits but the LBD line length is a multiple of 16 bits, a capability to flush the last multiples of 16-bits at the end of a line into a 256-bit DRAM word size is required. Therefore, SFU reads of DRAM words at the end of a line, which do not fill the DRAM word, will already be padded.

A signal sfu_lbd_rdy to the LBD indicates that the SFU is available for writing and reading. For the first LBD line after SFU Go has been asserted, previous line data is not supplied until after the first lbd_sfu_advline strobe from the LBD (zero data is supplied instead), and sfu_lbd_rdy to the LBD indicates that the SFU is available for writing. lbd_sfu_advline tells the SFU to advance to the next line. lbd_sfu_pladvword tells the SFU to supply the next 16-bits of previous line data. Until the number of lbd_sfu_pladvword strobes received is equivalent to the LBD line length, sfu_lbd_rdy indicates that the SFU is available for both reading and writing. Thereafter it indicates the SFU is available for writing. The LBD should not generate lbd_sfu_pladvword or lbd_sfu_advline strobes until sfu_lbd_rdy is asserted.

A signal sfu_hcu_avail indicates that the SFU has data to supply to the HCU. Another signal hcu_sfu_advdot, from the HCU, tells the SFU to supply the next dot. The HCU should not generate the hcu_sfu_advdot signal until sfu_hcu_avail is true. The HCU can therefore stall waiting for the sfu_hcu_avail signal.

X and Y non-integer scaling of the bi-level dot data is performed in the SFU.

At 1600 dpi the SFU requires 1 dot per cycle for all DRAM channels, 3 dots per cycle in total (read+read+write). Therefore the SFU requires two 256 bit read DRAM access per 256 cycles, 1 write access every 256 cycles. A single DIU read interface will be shared for reading the current and previous lines from DRAM.

27.3 Bi-Level DRAM Memory Buffer Between LBD, SFU and HCU

Figure 171:
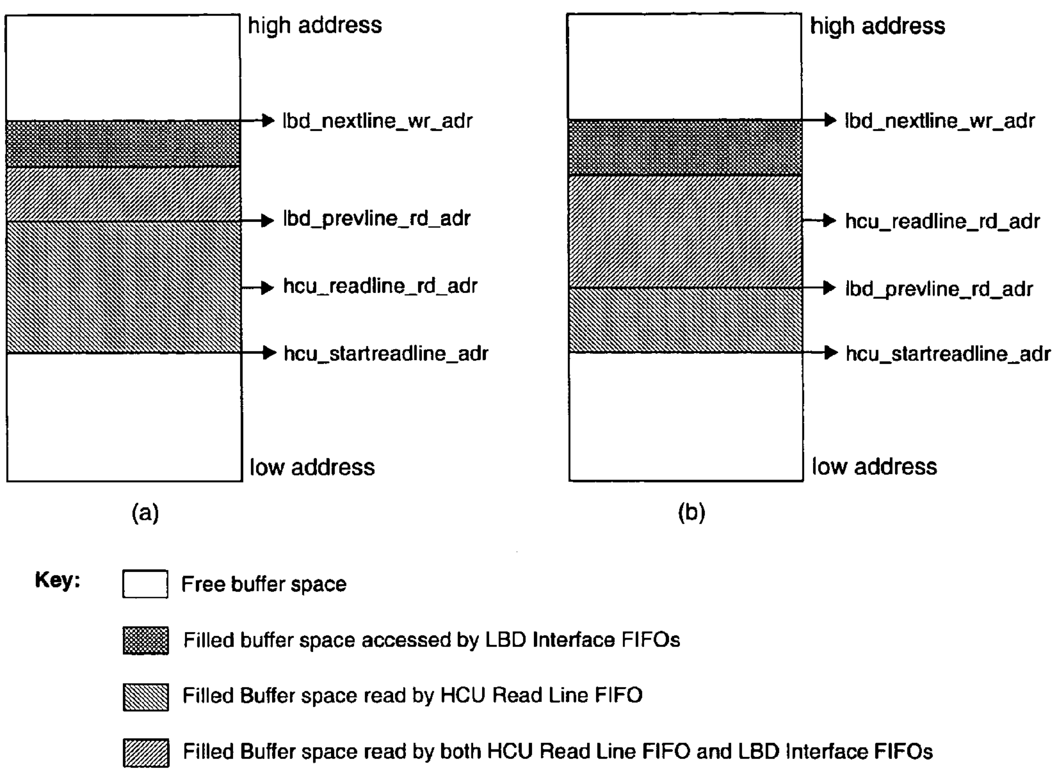
Figure 172:
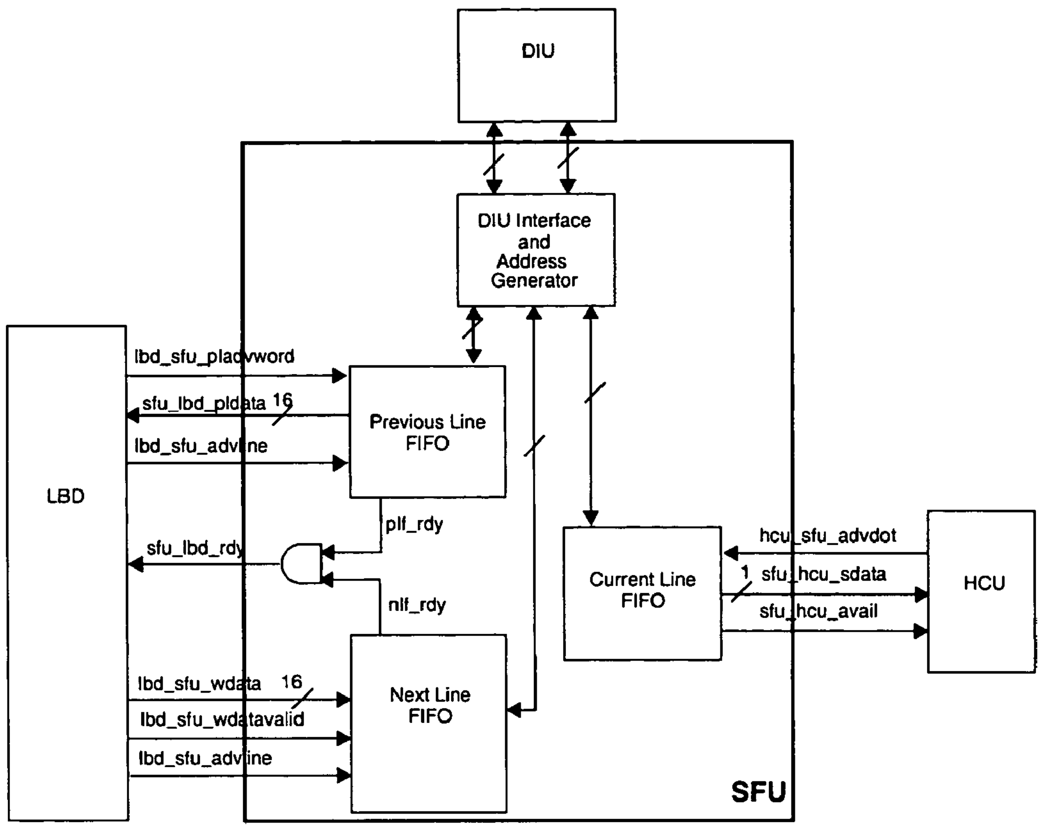
Figure 173:
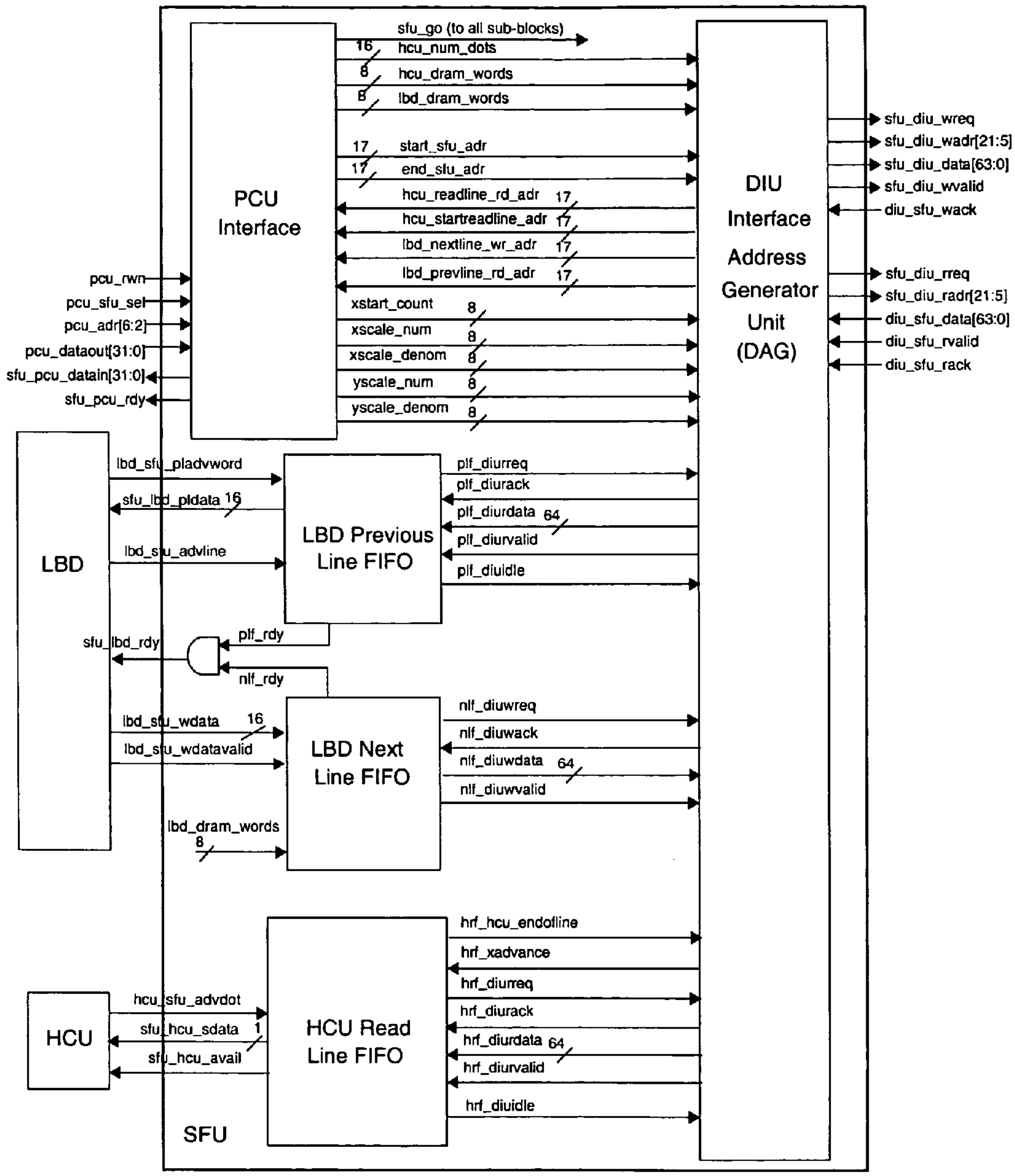
Figure 174:
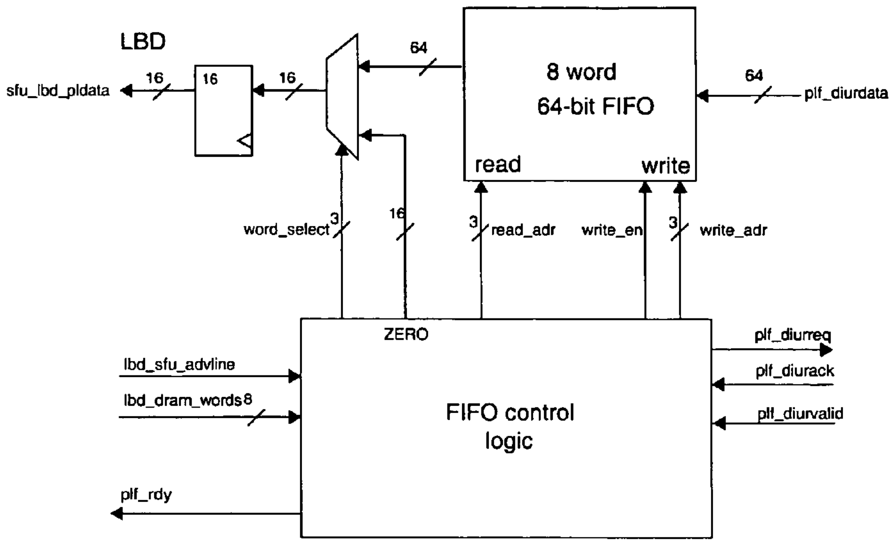
Figure 175:
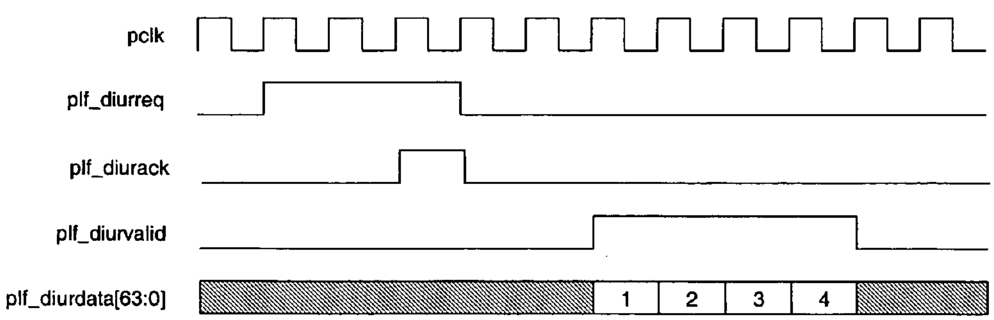

FIG. 171 shows a bi-level buffer store in DRAM. FIG. 171 (*a*) shows the LBD previous line address reading after the HCU read line address in DRAM. FIG. 171 (*b*) shows the LBD previous line address reading before the HCU read line address in DRAM.

Although the LBD and HCU read and write complete lines of data, the bi-level DRAM buffer is not line based. The buffering between the LBD, SFU and HCU is a FIFO of programmable size. The only line based concept is that the line the HCU is currently reading cannot be over-written because it may need to be re-read for scaling purposes.

The SFU interfaces to DRAM via three FIFOs:

a. The HCUReadLineFIFO which supplies dot data to the HCU.
b. The LBDNextLineFIFO which writes decompressed bi-level data from the LBD.
c. The LBDPrevLineFIFO which reads previous decompressed bi-level data for the LBD.

There are four address pointers used to manage the bi-level DRAM buffer:

a. hcu_readline_rd_adr[21:5] is the read address in DRAM for the HCUReadLineFIFO.
b. hcu_startreadline_adr[21:5] is the start address in DRAM for the current line being read by the HCUReadLineFIFO.
C. lbd_nextline_wr_adr[21:5] is the write address in DRAM for the LBDNextLineFIFO.
d. lbd_prevline_rd_adr[21:5] is the read address in DRAM for the LBDPrevLineFIFO.

The address pointers must obey certain rules which indicate whether they are valid:

a. hcu_readline_rd_adr is only valid if it is reading earlier in the line than lbd_nextline_wr_adr is writing i.e. the fifo is not empty
b. The SFU (lbd_nextline_wr_adr) cannot overwrite the current line that the HCU is reading from (hcu_startreadline_adr) i.e. the fifo is not full, when compared with the HCU read line pointer
c. The LBDNextLineFIFO (lbd_nextline_wr_adr) must be writing earlier in the line than LBDPrevLineFIFO (lbd_prevline_rd_adr) is reading and must not overwrite the current line that the HCU is reading from i.e. the fifo is not full when compared to the PrevLineFifo read pointer
d. The LBDPrevLineFIFO (lbd_prevline_rd_adr) can read right up to the address that LBDNextLineFIFO (lbd_nextline_wr_adr) is writing i.e the fifo is not empty.
e. At startup i.e. when sfu_go is asserted, the pointers are reset to start_sfu_adr[21:5].
f. The address pointers can wrap around the SFU bi-level store area in DRAM.

As a guideline, the typical FIFO size should be a minimum of 2 lines stored in DRAM, nominally 3 lines, up to a programmable number of lines. A larger buffer allows lines to be decompressed in advance. This can be useful for absorbing local complexities in compressed bi-level images.

27.4 DRAM Access Requirements

The SFU has 1 read interface to the DIU and 1 write interface. The read interface is shared between the previous and current line read FIFOs.

The spot line store requires 5.1 Kbytes of DRAM to store 3 A4 lines. The SFU will read and write the spot line store in single 256-bit DRAM accesses. The SFU will need 256-bit double buffers for each of its previous, current and next line interfaces.

The SFU's DIU bandwidth requirements are summarized in Table 160.

TABLE 160

DRAM bandwidth requirements

| Direction | Maximum number of cycles between each 256-bit DRAM access | Peak Bandwidth required to be supported by DIU (bits/cycle) | Average Bandwidth (bits/cycle) |
|---|---|---|---|
| Read | 128[1] | 2 | 2 |
| Write | 256[2] | 1 | 1 |

[1]Two separate reads of 1 bit/cycle.
[2]Write at 1 bit/cycle.

27.5 Scaling

Scaling of bi-level data is performed in both the horizontal and vertical directions by the SFU so that the output to the HCU matches the printer resolution. The SFU supports non-integer scaling with the scale factor represented by a numerator and a denominator. Only scaling up of the bi-level data is allowed, i.e. the numerator should be greater than or equal to the denominator. Scaling is implemented using a counter as described in the pseudocode below. An advance pulse is generated to move to the next dot (x-scaling) or line (y-scaling).

```
if (count + denominator >= numerator) then
   count = (count + denominator) − numerator
   advance = 1
else
   count = count + denominator
   advance = 0
```

X scaling controls whether the SFU supplies the next dot or a copy of the current dot when the HCU asserts hcu_sfu_advdot. The SFU counts the number of hcu_sfu_advdot signals from the HCU. When the SFU has supplied an entire HCU line of data, the SFU will either re-read the current line from DRAM or advance to the next line of HCU read data depending on the programmed Y scale factor.

An example of scaling for numerator=7 and denominator=3 is given in Table 161. The signal advance if asserted causes the next input dot to be output on the next cycle, otherwise the same input dot is output

TABLE 161

Non-integer scaling example for scaleNum = 7, scaleDenom = 3

| count | advance | dot |
|---|---|---|
| 0 | 0 | 1 |
| 3 | 0 | 1 |
| 6 | 1 | 1 |
| 2 | 0 | 2 |
| 5 | 1 | 2 |
| 1 | 0 | 3 |
| 4 | 1 | 3 |
| 0 | 0 | 4 |
| 3 | 0 | 4 |
| 6 | 1 | 4 |
| 2 | 0 | 5 |

27.6 Lead-In and Lead-Out Clipping

To account for the case where there may be two SoPEC devices, each generating its own portion of a dot-line, the first dot in a line may not be replicated the total scale-factor number of times by an individual SoPEC. The dot will ultimately be scaled-up correctly with both devices doing part of the scaling, one on its lead-out and the other on its lead in. Scaled dot on the lead-out, i.e. which go beyond the HCU linelength, will be ignored. Scaling on the lead-in, i.e. of the first valid dot in the line, is controlled by setting the XstartCount register.

At the start of each line count in the pseudo-code above is set to XstartCount. If there is no lead-in, XstartCount is set to 0 i.e. the first value of count in Table 161. If there is lead-in then XstartCount needs to be set to the appropriate value of count in the sequence above.

27.7 Interfaces Between LDB, SFU and HCU 27.7.1 LDB-SFU Interfaces

The LBD has two interfaces to the SFU. The LBD writes the next line to the SFU and reads the previous line from the SFU.

27.7.1.1 LBDNextLineFIFO Interface

The LBDNextLineFIFO interface from the LBD to the SFU comprises the following signals:

lbd_sfu_wdata, 16-bit write data.

lbd_sfu_wdatavalid, write data valid.

lbd_sfu_advline, signal indicating LDB has advanced to the next line.

The LBD should not write to the SFU until sfu_lbd_rdy is true. The LBD can therefore stall waiting for the sfu_lbd_rdy signal.

27.7.1.2 LBDPrevLineFIFO Interface

The LBDPrevLineFIFO interface from the SFU to the LBD comprises the following signals:

sfu_lbd_pldata, 16-bit data.

The previous line read buffer interface from the LBD to the SDU comprises the following signals:

lbd_sfu_pladvword, signal indicating to the SFU to supply the next 16-bit word.

lbd_sfu_advline, signal indicating LDB has advanced to the next line.

Previous line data is not supplied until after the first lbd_sfu_advline strobe from the LBD (zero data is supplied instead). The LBD should not assert lbd_sfu_pladvword unless sfu_lbd_rdy is asserted.

27.7.1.3 Common Control Signals sfu_lbd_rdy indicates to the LBD that the SFU is available for writing. After the first lbd_sfu_advline and before the number of lbd_sfu_pladvword strobes received is equivalent to the LBD line length, sfu_lbd_rdy indicates that the SFU is available for both reading and writing. Thereafter it indicates the SFU is available for writing.

The LBD should not generate lbd_sfu_pladvword or lbd_sfu_advline strobes until sfu_lbd_rdy is asserted.

27.7.2 SFU-HCU Current Line FIFO Interface

The interface from the SFU to the HCU comprises the following signals:

sfu_hcu_sdata, 1-bit data.

sfu_hcu_avail, data valid signal indicating that there is data available in the SFU HCUReadLineFIFO.

The interface from HCU to SFU comprises the following signals:

hcu_sfu_advdot, indicating to the SFU to supply the next dot.

The HCU should not generate the hcu_sfu_advdot signal until sfu_hcu_avail is true. The HCU can therefore stall waiting for the sfu_hcu_avail signal.

27.8 Implementation 27.8.1 Definitions of IO

TABLE 162

SFU Port List

| Port Name | Pins | I/O | Description |
|---|---|---|---|
| | | | Clocks and Resets |
| Pclk | 1 | In | SoPEC Functional clock. |
| prst_n | 1 | In | Global reset signal. |
| | | | DIU Read Interface signals |
| sfu_diu_rreq | 1 | Out | SFU requests DRAM read. A read request must be accompanied by a valid read address. |
| sfu_diu_radr[21:5] | 17 | Out | Read address to DIU<br>17 bits wide (256-bit aligned word). |
| diu_sfu_rack | 1 | In | Acknowledge from DIU that read request has been accepted and new read address can be placed on sfu_diu_radr. |
| diu_data[63:0] | 64 | In | Data from DIU to SoPEC Units.<br>First 64-bits are bits 63:0 of 256 bit word.<br>Second 64-bits are bits 127:64 of 256 bit word. |

TABLE 162-continued

SFU Port List

| Port Name | Pins | I/O | Description |
|---|---|---|---|
| | | | Third 64-bits are bits 191:128 of 256 bit word. Fourth 64-bits are bits 255:192 of 256 bit word. |
| diu_sfu_rvalid | 1 | In | Signal from DIU telling SoPEC Unit that valid read data is on the diu_data bus. |
| DIU Write Interface signals | | | |
| sfu_diu_wreq | 1 | Out | SFU requests DRAM write. A write request must be accompanied by a valid write address together with valid write data and a write valid. |
| sfu_diu_wadr[21:5] | 17 | Out | Write address to DIU 17 bits wide (256-bit aligned word). |
| diu_sfu_wack | 1 | In | Acknowledge from DIU that write request has been accepted and new write address can be placed on sfu_diu_wadr. |
| sfu_diu_data[63:0] | 64 | Out | Data from SFU to DIU. First 64-bits are bits 63:0 of 256 bit word. Second 64-bits are bits 127:64 of 256 bit word. Third 64-bits are bits 191:128 of 256 bit word. Fourth 64-bits are bits 255:192 of 256 bit word. |
| sfu_diu_wvalid | 1 | Out | Signal from PEP Unit indicating that data on sfu_diu_data is valid. |
| PCU Interface data and control signals | | | |
| pcu_adr[6:2] | 5 | In | PCU address bus. Only 5 bits are required to decode the address space for this block |
| pcu_dataout[31:0] | 32 | In | Shared write data bus from the PCU |
| sfu_pcu_datain[31:0] | 32 | Out | Read data bus from the SFU to the PCU |
| pcu_rwn | 1 | In | Common read/not-write signal from the PCU |
| pcu_sfu_sel | 1 | In | Block select from the PCU. When pcu_sfu_sel is high both pcu_adr and pcu_dataout are valid |
| sfu_pcu_rdy | 1 | Out | Ready signal to the PCU. When sfu_pcu_rdy is high it indicates the last cycle of the access. For a write cycle this means pcu_dataout has been registered by the block and for a read cycle this means the data on sfu_pcu_datain is valid. |
| LBD Interface Data and Control Signals | | | |
| sfu_lbd_rdy | 1 | Out | Signal indication that SFU has previous line data available and is ready to be written to. |
| lbd_sfu_advline | 1 | In | Line advance signal for both next and previous lines. |
| lbd_sfu_pladvword | 1 | In | Advance word signal for previous line buffer. |
| sfu_lbd_pldata[15:0] | 16 | Out | Data from the previous line buffer. |
| lbd_sfu_wdata[15:0] | 16 | In | Write data for next line buffer. |
| lbd_sfu_wdatavalid | 1 | In | Write data valid signal for next line buffer data. |
| HCU Interface Data and Control Signals | | | |
| hcu_sfu_advdot | 1 | In | Signal indicating to the SFU that the HCU is ready to accept the next dot of data from SFU. |
| sfu_hcu_sdata | 1 | Out | Bi-level dot data. |
| sfu_hcu_avail | 1 | Out | Signal indicating valid bi-level dot data on sfu_hcu_sdata. |

27.8.1

27.8.2 Configuration Registers

TABLE 163

SFU Configuration Registers

| Address (SFU_base+) | register name | #bits | value on reset | description |
|---|---|---|---|---|
| Control registers | | | | |
| 0x00 | Reset | 1 | 0x1 | A write to this register causes a reset of the SFU. This register can be read to indicate the reset state: 0 - reset in progress 1 - reset not in progress |

TABLE 163-continued

SFU Configuration Registers

| Address (SFU_base+) | register name | #bits | value on reset | description |
|---|---|---|---|---|
| 0x04 | Go | 1 | 0x0 | Writing 1 to this register starts the SFU. Writing 0 to this register halts the SFU. When Go is deasserted the state-machines go to their idle states but all counters and configuration registers keep their values. When Go is asserted all counters are reset, but configuration registers keep their values (i.e. they don't get reset). The SFU must be started before the LBD is started. This register can be read to determine if the SFU is running (1 - running, 0 - stopped). |
| | Setup registers (constant for during processing the page) | | | |
| 0x08 | HCUNumDots | 16 | 0x0000 | Width of HCU line (in dots). |
| 0x0C | HCUDRAMWords | 8 | 0x00 | Number of 256-bit DRAM words in a HCU line − 1. |
| 0x10 | LBDDRAMWords | 8 | 0x00 | Number of 256-bit words in a LBD line − 1. (LBD line length must be at least 128 bits). |
| 0x14 | StartSfuAdr[21:5] (256-bit aligned DRAM address) | 17 | 0x00000 | First SFU location in memory. |
| 0x18 | EndSfuAdr[21:5] (256-bit aligned DRAM address) | 17 | 0x00000 | Last SFU location in memory. |
| 0x1C | XstartCount | 8 | 0x00 | Value to be loaded at the start of every line into the counter used for scaling in the X direction. Used to control the scaling of the first dot in a line. This value will typically equal zero, except in the case where a number of dots are clipped on the lead in to a line. XstartCount must be programmed to be less than the XscaleNum value. |
| 0x20 | XscaleNum | 8 | 0x01 | Numerator of spot data scale factor in X direction. |
| 0x24 | XscaleDenom | 8 | 0x01 | Denominator of spot data scale factor in X direction. |
| 0x28 | YscaleNum | 8 | 0x01 | Numerator of spot data scale factor in Y direction. |
| 0x2C | YscaleDenom | 8 | 0x01 | Denominator of spot data scale factor in Y direction. |
| | Work registers | | | |
| 0x30 | HCUReadLinePtr[31:5] (256-bit aligned DRAM address) | 18 | 0x00000 | Current address pointer for the HCU read data<br>31 - hcu_readline_rd_wrap FIFO wrap flag<br>30:22 - Unused, read as zero<br>21:5 - hcu_readline_rd_adr HCU read data DRAM address.<br>Read only register. |
| 0x34 | HCUStartReadLinePtr[31:5] (256-bit aligned DRAM address) | 18 | 0x00000 | Start address pointer of a line being read by HCU buffer<br>31 - hcu_startreadline_wrap FIFO wrap flag<br>30:22 - Unused, read as zero<br>21:5 - hcu_startreadline_adr HCU line start DRAM address.<br>Read only register. |

TABLE 163-continued

SFU Configuration Registers

| Address (SFU_base+) | register name | #bits | value on reset | description |
|---|---|---|---|---|
| 0x38 | LBDNextLinePtr[31:5] (256-bit aligned DRAM address) | 18 | 0x00000 | Current address pointer for the LBD next line write data<br>31 - lbd_nextline_wr_wrap FIFO wrap flag<br>30:22 - Unused, read as zero<br>21:5 - lbd_nextline_wr_adr LBD next line write data DRAM address.<br>Register can be written to by CPU.<br>(Working Register) |
| 0x3C | LBDPrevLinePtr[31:5] (256-bit aligned DRAM address) | 18 | 0x00000 | Current address pointer for the LBD previous line read data<br>31 - lbd_prevline_rd_wrap FIFO wrap flag<br>30:22 - Unused, read as zero<br>21:5 - lbd_prevline_rd_adr LBD previous line read data DRAM address.<br>Read only register |
| 0x40 | FIFOStatus | 5 | 0x19 | SFU FIFO status debug register.<br>0 - plf_nlf_fifo_emp, previous line and next line FIFO empty signal<br>1 - plf_nlf_fifo_full, previous line and next line FIFO full signal<br>2 - nlf_hrf_fifo_full, next line and HCU read FIFO full signal<br>3 - hrf_nlf_fifo_emp, HCU read and next line FIFO empty signal<br>4 - start_hrf_nlf_fifo_emp, HCU line start read FIFO and next line FIFO empty signal<br>See section 27.8.10.4 on page 534 for exact definition of how the signals are derived.<br>Read only register |

27.8.2

27.8.3 SFU Sub-Block Partition

The SFU contains a number of sub-blocks:

| Name | Description |
|---|---|
| PCU Interface | PCU interface, configuration and status registers. Also generates the Go and the Reset signals for the rest of the SFU |
| LBD Previous Line FIFO | Contains FIFO which is read by the LBD previous line interface. |
| LBD Next Line FIFO | Contains FIFO which is written by the LBD next line interface. |
| HCU Read Line FIFO | Contains FIFO which is read by the HCU interface. |
| DIU Interface and Address Generator | Contains DIU read interface and DIU write interface. Manages the address pointers for the bi-level DRAM buffer. Contains X and Y scaling logic. |

The various FIFO sub-blocks have no knowledge of where in DRAM their read or write data is stored. In this sense the FIFO sub-blocks are completely de-coupled from the bi-level DRAM buffer. All DRAM address management is centralised in the DIU Interface and Address Generation sub-block. DRAM access is pre-emptive i.e. after a FIFO unit has made an access then as soon as the FIFO has space to read or data to write a DIU access will be requested immediately. This ensures there are no unnecessary stalls introduced e.g. at the end of an LBD or HCU line.

There now follows a description of the SFU sub-blocks.

27.8.4 PCU Interface Sub-Block

The PCU interface sub-block provides for the CPU to access SFU specific registers by reading or writing to the SFU address space.

27.8.5 LBDPrevLineFIFO Sub-Block

TABLE 164

LBDPrevLineFIFO Additional IO Definitions

| Port Name | Pins | I/O | Description |
|---|---|---|---|
| | | | Internal Output |
| plf_rdy | 1 | Out | Signal indicating LBDPrevLineFIFO is ready to be read from. Until the first lbd_sfu_advline for a band has been received and after the number of reads from DRAM for a line is received is equal to LBDDRAMWords, plf_rdy is always asserted. During the second and subsequent lines plf_rdy is deasserted whenever the LBDPrevLineFIFO has one word left in the FIFO. |
| | | | DIU and Address Generation sub-block Signals |
| plf_diurreq | 1 | Out | Signal indicating the LBDPrevLineFIFO has 256-bits of data free. |
| plf_diurack | 1 | In | Acknowledge that read request has been accepted and plf_diurreq should be de-asserted. |
| plf_diurdata | 1 | In | Data from the DIU to LBDPrevLineFIFO. First 64-bits are bits 63:0 of 256 bit word. Second 64-bits are bits 127:64 of 256 bit word. Third 64-bits are bits 191:128 of 256 bit word. Fourth 64-bits is are 255:192 of 256 bit word. |
| plf_diurrvalid | 1 | In | Signal indicating data on plf_diurdata is valid. |
| Plf_diuidle | 1 | Out | Signal indicating DIU state-machine is in the IDLE state. |

27.8.5

27.8.5.1 General Description

The LBDPrevLineFIFO sub-block comprises a double 256-bit buffer between the LBD and the DIU Interface and Address Generator sub-block. The FIFO is implemented as 8 times 64-bit words. The FIFO is written by the DIU Interface and Address Generator sub-block and read by the LBD.

Whenever 4 locations in the FIFO are free the FIFO will request 256-bits of data from the DIU Interface and Address Generation sub-block by asserting plf_diurreq. A signal plf_diurack indicates that the request has been accepted and plf_diurreq should be de-asserted.

The data is written to the FIFO as 64-bits on plf_diurdata [63:0] over 4 clock cycles. The signal plf_diurvalid indicates that the data returned on plf_diurdata[63:0] is valid. plf_diurvalid is used to generate the FIFO write enable, write_en, and to increment the FIFO write address, write_adr[2:0]. If the LBDPrevLineFIFO still has 256-bits free then plf_diurreq should be asserted again.

The DIU Interface and Address Generation sub-block handles all address pointer management and DIU interfacing and decides whether to acknowledge a request for data from the FIFO.

Figure 176:
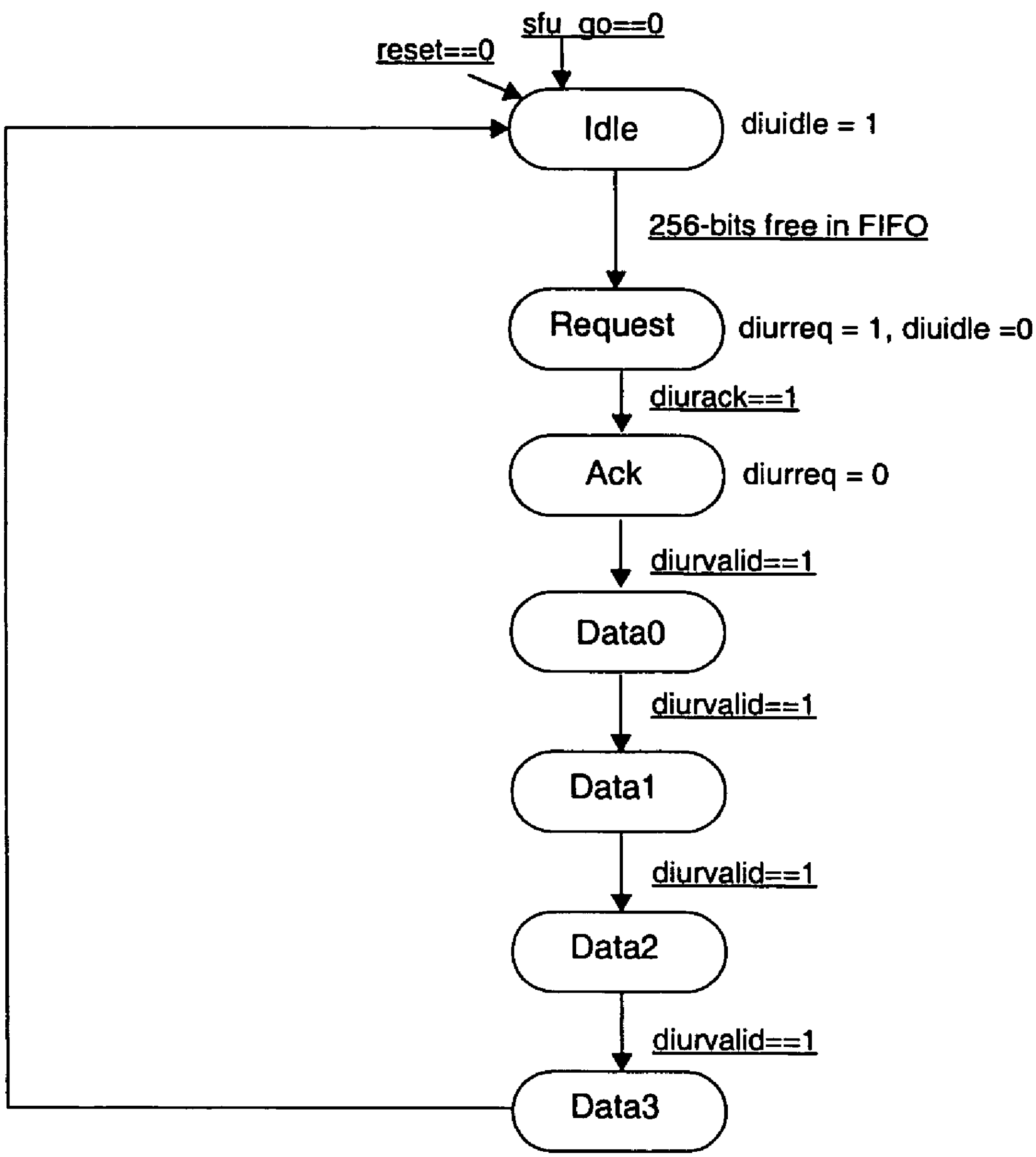
Figure 177:
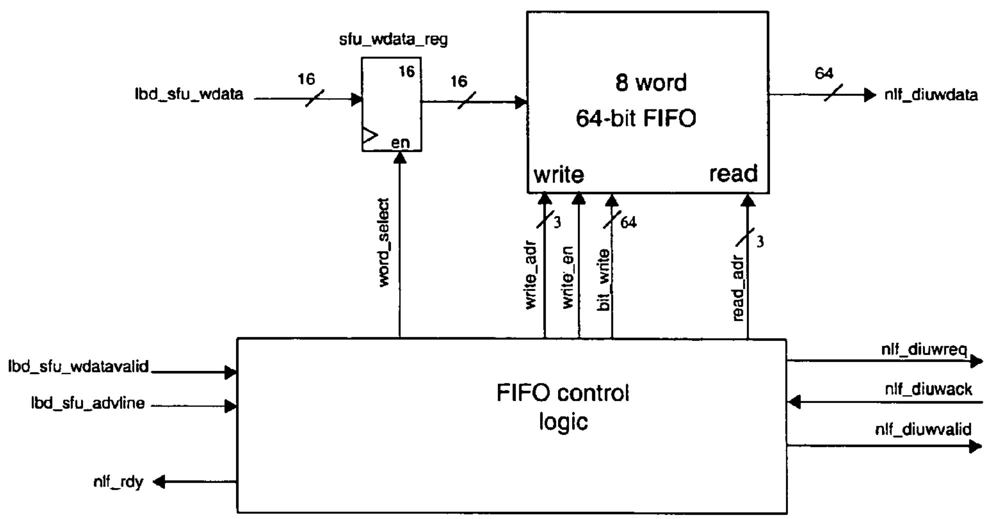
Figure 178:
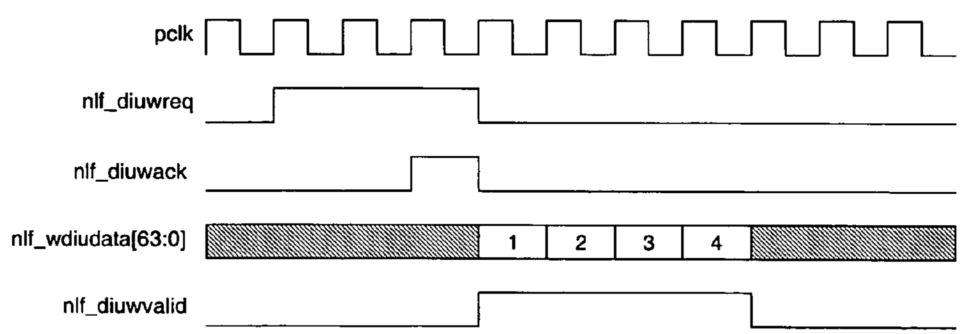

The state diagram of the LBDPrevLineFIFO DIU Interface is shown in FIG. 176. If sfu_go is deasserted then the state-machine returns to its idle state.

The LBD reads 16-bit wide data from the LBDPrevLineFIFO on sfu_lbd_pldata[15:0] lbd_sfu_pladvword from the LBD tells the LBDPrevLineFIFO to supply the next 16-bit word. The FIFO control logic generates a signal word_select which selects the next 16-bits of the 64-bit FIFO word to output on sfu_lbd_pldata[15:0] When the entire current 64-bit FIFO word has been read by the LBD lbd_sfu_pladvword will cause the next word to be popped from the FIFO.

Previous line data is not supplied until after the first lbd_sfu_advline strobe from the LBD after sfu_go is asserted (zero data is supplied instead). Until the first lbd_sfu_advline strobe after sfu_go lbd_sfu_pladword strobes are ignored.

The LBDPrevLineFIFO control logic uses a counter, pl_count[7:0], to counts the number of DRAM read accesses for the line. When the pl_count counter is equal to the LBDDRAMWords, a complete line of data has been read by the LBD the plf_rdy is set high, and the counter is reset. It remains high until the next lbd_sfu_advline strobe from the LBD. On receipt of the lbd_sfu_advline strobe the remaining data in the 256-bit word in the FIFO is ignored, and the FIFO read_adr is rounded up if required.

The LBDPrevLineFIFO generates a signal plf_rdy to indicate that it has data available. Until the first lbd_sfu_advline for a band has been received and after the number of DRAM reads for a line is equal to LBDDRAMWords, plf_rdy is always asserted. During the second and subsequent lines plf_rdy is deasserted whenever the LBDPrevLineFIFO has one word left.

The last 256-bit word for a line read from DRAM can contain extra padding which should not be output to the LBD. This is because the number of 16-bit words per line may not fit exactly into a 256-bit DRAM word. When the count of the number of DRAM reads for a line is equal to lbd_dram_words the LBDPrevLineFIFO must adjust the FIFO write address to point to the next 256-bit word boundary in the FIFO for the next line of data. At the end of a line the read address must round up the nearest 256-bit word boundary and ignore the remaining 16-bit words. This can be achieved by considering the FIFO read address, read_adr[2:0], will require 3 bits to address 8 locations of 64-bits. The next 256-bit aligned address is calculated by inverting the MSB of the read_adr and setting all other bits to 0.

```
if (read_adr[1:0] /= b00 AND lbd_sfu_advline == 1)then
    read_adr[1:0] = b00
    read_adr[2] = ~read_adr[2]
```

27.8.6 LBDNextLineFIFO Sub-Block

TABLE 165

LBDNextLineFIFO Additional IO Definition

| Port Name | Pins | I/O | Description |
|---|---|---|---|
| | | | LBDNextLineFIFO Interface Signals |
| nlf_rdy | 1 | Out | Signal indicating LBDNextLineFIFO is ready to be written to i.e. there is space in the FIFO. |
| | | | DIU and Address Generation sub-block Signals |
| nlf_diuwreq | 1 | Out | Signal indicating the LBDNextLineFIFO has 256-bits of data for writing to the DIU. |
| nlf_diuwack | 1 | In | Acknowledge from DIU that write request has been accepted and write data can be output on nlf_diuwdata together with nlf_diuwvalid. |
| nlf_diuwdata | 1 | Out | Data from LBDNextLineFIFO to DIU Interface.<br>First 64-bits is bits 63:0 of 256 bit word<br>Second 64-bits is bits 127:64 of 256 bit word<br>Third 64-bits is bits 191:128 of 256 bit word<br>Fourth 64-bits is bits 255:192 of 256 bit word |
| nlf_diuwvalid | 1 | In | Signal indicating that data on wlf_diuwdata is valid. |

27.8.6

27.8.6.1 General Description

The LBDNextLineFIFO sub-block comprises a double 256-bit buffer between the LBD and the DIU Interface and Address Generator sub-block. The FIFO is implemented as 8 times 64-bit words. The FIFO is written by the LBD and read by the DIU Interface and Address Generator.

Whenever 4 locations in the FIFO are full the FIFO will request 256-bits of data to be written to the DIU Interface and Address Generator by asserting nlf_diuwreq. A signal nlf_diuwack indicates that the request has been accepted and nlf_diuwreq should be de-asserted. On receipt of nlf_diuwack the data is sent to the DIU Interface as 64-bits on nlf_diuwdata[63:0] over 4 clock cycles. The signal nlf_diuwvalid indicates that the data on nlf_diuwdata[63:0] is valid. nlf_diuwvalid should be asserted with the smallest latency after nlf_diuwack. If the LBDNextLineFIFO still has 256-bits more to transfer then nlf_diuwreq should be asserted again.

Figure 179:
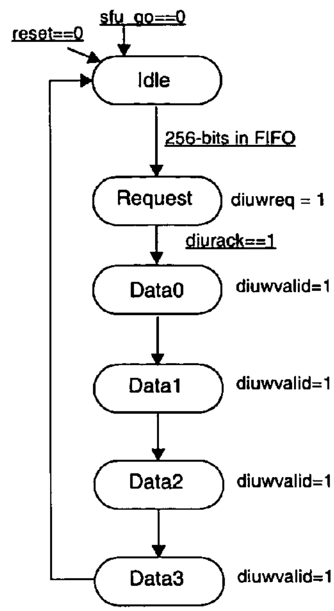

The state diagram of the LBDNextLineFIFO DIU Interface is shown in FIG. 179. If sfu_go is deasserted then the state-machine returns to its Idle state.

The signal nlf_rdy indicates that the LBDNextLineFIFO has space for writing by the LBD. The LBD writes 16-bit wide data supplied on lbd_sfu_wdata[15:0]. lbd_sfu_wvalid indicates that the data is valid.

The LBDNextLineFIFO control logic counts the number of lbd_sfu_wvalid signals and is used to correctly address into the next line FIFO. The lbd_sfu_wvalid counter is rounded up to the nearest 256-bit word when a lbd_sfu_advline strobe is received from the LBD. Any data remaining in the FIFO is flushed to DRAM with padding being added to fill a complete 256-bit word.

27.8.7 sfu_lbd_rdy Generation

The signal sfu_lbd_rdy is generated by ANDing plf_rdy from the LBDPrevLineFIFO and nlf_rdy from the LBDNextLineFIFO.

sfu_lbd_rdy indicates to the LBD that the SFU is available for writing i.e. there is space available in the LBDNextLineFIFO. After the first lbd_sfu_advline and before the number of lbd_sfu_pladvword strobes received is equivalent to the line length, sfu_lbd_rdy indicates that the SFU is available for both reading, i.e. there is data in the LBDPrevLineFIFO, and writing. Thereafter it indicates the SFU is available for writing.

27.8.8 LBD-SFU Interfaces Timing Waveform Description

Figure 180:
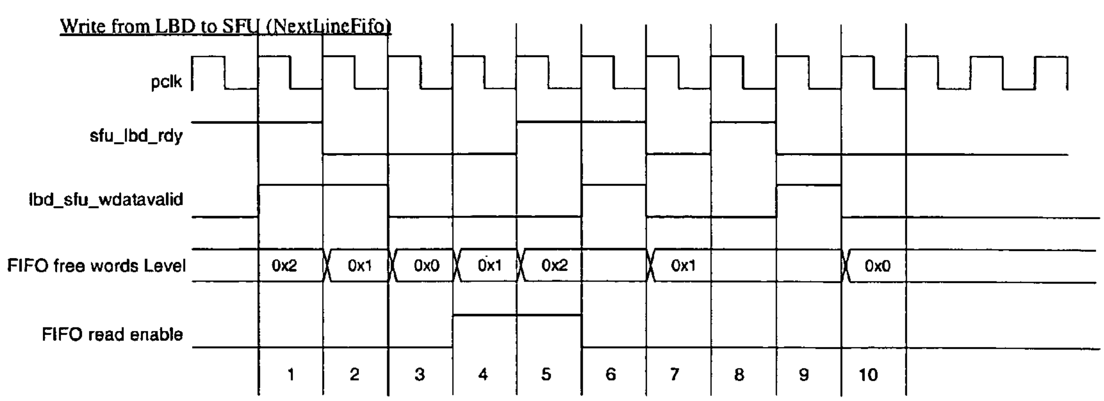
Figure 181:
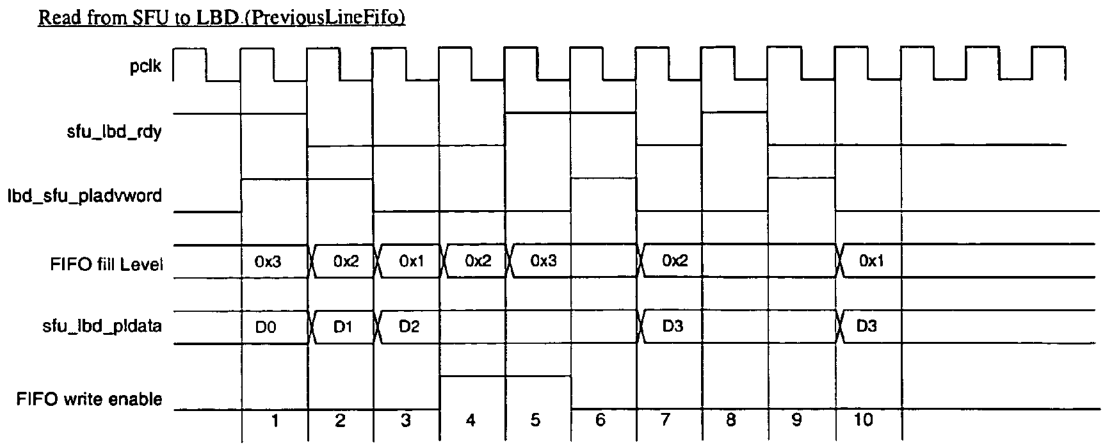
Figure 182:
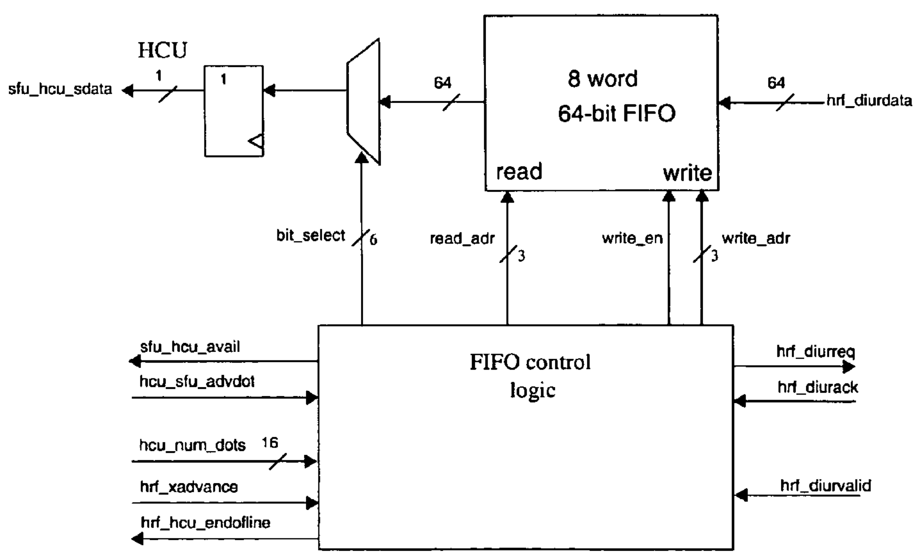
Figure 183:
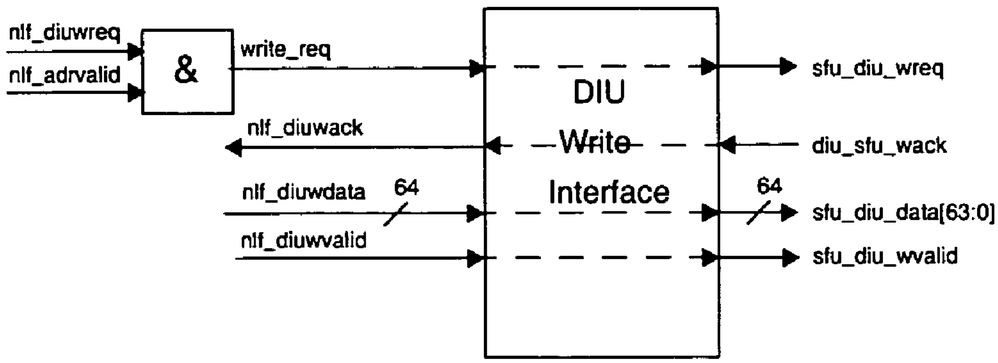

In FIG. 180 and FIG. 181, shows the timing of the data valid and ready signals between the SFU and LBD. A diagram and pseudocode is given for both read and write interfaces between the SFU and LBD.

27.8.8.1 LBD-SFU Write Interface Timing

The main points to note from FIG. 180 are:

- In clock cycle 1 sfu_lbd_rdy detects that it has only space to receive 2 more 16 bit words from the LBD after the current clock cycle.
- The data on lbd_sfu_wdata is valid and this is indicated by lbd_sfu_wdatavalid being asserted.
- In clock cycle 2 sfu_lbd_rdy is deasserted however the LBD can not react to this signal until clock cycle 3. So in clock cycle 3 there is also valid data from the LBD which consumes the last available location available in the FIFO in the SFU (FIFO free level is zero).
- In clock cycle 4 and 5 the FIFO is read and 2 words become free in the FIFO.
- In cycle 4 the SFU determines that the FIFO has more room and asserts the ready signal on the next cycle.
- The LBD has entered a pause mode and waits for sfu_lbd_rdy to be asserted again, in cycle 5 the LBD sees the asserted ready signal and responds by writing one unit into the FIFO, in cycle 6.
- The SFU detects it has 2 spaces left in the FIFO and the current cycle is an active write (same as in cycle 1), and deasserts the ready on the next cycle.

In cycle 7 the LBD did not have data to write into the FIFO, and so the FIFO remains with one space left The SFU toggles the ready signal every second cycle, this allows the LBD to write one unit at a time to the FIFO.

In cycle 9 the LBD responds to the single ready pulse by writing into the FIFO and consuming the last remaining unit free.

The write interface pseudocode for generating the ready is.

```
// ready generation pseudocode
if (fifo_free_level > 2)then
            nlf_rdy = 1
elsif (fifo_free_level == 2) then
            if (lbd_sfu_wdatavalid == 1)then
               nlf_rdy = 0
            else
               nlf_rdy = 1
elsif (fifo_free_level == 1) then
            if (lbd_sfu_wdatavalid == 1)then
               nlf_rdy = 0
            else
               nlf_rdy = NOT(sfu_lbd_rdy)
else
               nlf_rdy = 0
sfu_lbd_rdy = (nlf_rdy AND plf_rdy)
```

27.8.8.2 SFU-LBD Read Interface

The read interface is similar to the write interface except that read data (sfu_lbd_pldata) takes an extra cycle to respond to the data advance signal (lbd_sfu_pladvword signal).

It is not possible to read the FIFO totally empty during the processing of a line, one word must always remain in the FIFO. At the end of a line the fifo can be read to totally empty. This functionality is controlled by the SFU with the generation of the plf_rdy signal.

There is an apparent corner case on the read side which should be highlighted. On examination this turns out to not be an issue.

Scenario 1:

sfu_lbd_rdy will go low when there is still is still 2 pieces of data in the FIFO. If there is a lbd_sfu_pladvword pulse in the next cycle the data will appear on sfu_lbd_pldata[15:0 ].

Scenario 2:

sfu_lbd_rdy will go low when there is still 2 pieces of data in the FIFO. If there is no lbd_sfu_pladvword pulse in the next cycle and it is not the end of the page then the SFU will read the data for the next line from DRAM and the read FIFO will fill more, sfu_lbd_rdy will assert again, and so the data will appear on sfu_lbd_pldata[15:0]. If it happens that the next line of data is not available yet the sfu_lbd_pldata bus will go invalid until the next lines data is available. The LBD does not sample the sfu_lbd_pldata bus at this time (i.e. after the end of a line) and it is safe to have invalid data on the bus.

Scenario 3:

sfu_lbd_rdy will go low when there is still 2 pieces of data in the FIFO. If there is no lbd_sfu_pladvword pulse in the next cycle and it is the end of the page then the SFU will do no more reads from DRAM, sfu_lbd_rdy will remain de-asserted, and the data will not be read out from the FIFO. However last line of data on the page is not needed for decoding in the LBD and will not be read by the LBD. So scenario 3 will never apply.

The pseudocode for the read FIFO ready generation

```
// ready generation pseudocode
if (pl_count == lbd_dram_words) then
            plf_rdy = 1
elsif (fifo_fill_level > 3)then
            plf_rdy = 1
elsif (fifo_fill_level == 3) then
            if (lbd_sfu_pladvword == 1)then
               plf_rdy      = 0
            else
               plf_rdy      = 1
elsif (fifo_fill_level == 2) then
            if (lbd_sfu_pladvword == 1)then
               plf_rdy      = 0
            else
               plf_rdy      = NOT(sfu_lbd_rdy)
else
            plf_rdy         = 0
sfu_lbd_rdy = (plf_rdy AND nlf_rdy)
```

27.8.9 HCUReadLineFIFO Sub-Block

TABLE 166

HCUReadLineFIFO Additional IO Definition

| Port Name | Pins | I/O | Description |
|---|---|---|---|
| | | | DIU and Address Generation sub-block Signals |
| hrf_xadvance | 1 | In | Signal from horizontal scaling unit<br>1 - supply the next dot<br>1 - supply the current dot |
| hrf_hcu_endofline | 1 | Out | Signal lasting 1 cycle indicating then end of the HCU read line. |
| hrf_diurreq | 1 | Out | Signal indicating the HCUReadLineFIFO has space for 256-bits of DIU data. |
| hrf_diurack | 1 | In | Acknowledge that read request has been accepted and hrf_diurreq should be de-asserted. |
| hrf_diurdata | 1 | In | Data from HCUReadLineFIFO to DIU.<br>First 64-bits are bits 63:0 of 256 bit word.<br>Second 64-bits are bits 127:64 of 256 bit word.<br>Third 64-bits are bits 191:128 of 256 bit word.<br>Fourth 64-bits are bits 255:192 of 256 bit word. |

TABLE 166-continued

HCUReadLineFIFO Additional IO Definition

| Port Name | Pins | I/O | Description |
|---|---|---|---|
| hrf_diurvalid | 1 | In | Signal indicating data on hrf_diurdata is valid. |
| hrf_diuidle | 1 | Out | Signal indicating DIU state-machine is in the IDLE state. |

27.8.9

27.8.9.1 General Description

The HCUReadLineFIFO sub-block comprises a double 256-bit buffer between the HCU and the DIU Interface and Address Generator sub-block. The FIFO is implemented as 8 times 64-bit words. The FIFO is written by the DIU Interface and Address Generator sub-block and read by the HCU.

The DIU Interface and Address Generation (DAG) sub-block interface of the HCUReadLineFIFO is identical to the LBDPrevLineFIFO DIU interface.

Whenever 4 locations in the FIFO are free the FIFO will request 256-bits of data from the DAG sub-block by asserting hrf_diurreq. A signal hrf_diurack indicates that the request has been accepted and hrf_diurreq should be de-asserted.

The data is written to the FIFO as 64-bits on hrf_diurdata [63:0] over 4 clock cycles. The signal hrf_diurvalid indicates that the data returned on hrf_diurdata[63:0] is valid. hrf_diurvalid is used to generate the FIFO write enable, write_en, and to increment the FIFO write address, write_adr[2:0]. If the HCUReadLineFIFO still has 256-bits free then hrf_diurreq should be asserted again.

The HCUReadLineFIFO generates a signal sfu_hcu_avail to indicate that it has data available for the HCU. The HCU reads single-bit data supplied on sfu_hcu_sdata. The FIFO control logic generates a signal bit_select which selects the next bit of the 64-bit FIFO word to output on sfu_hcu_sdata. The signal hcu_sfu_advdot tells the HCUReadLineFIFO to supply the next dot (hrf_advance=1) or the current dot (hrf_xadvance=0) on sfu_hcu_sdata according to the hrf_xadvance signal from the scaling control unit in the DAG sub-block. The HCU should not generate the hcu_sfu_advdot signal until sfu_hcu_avail is true. The HCU can therefore stall waiting for the sfu_hcu_avail signal.

When the entire current 64-bit FIFO word has been read by the HCU hcu_sfu_advdot will cause the next word to be popped from the FIFO.

The last 256-bit word for a line read from DRAM and written into the HCUReadLineFIFO can contain dots or extra padding which should not be output to the HCU. A counter in the HCUReadLineFIFO, hcuadvdot_count[15:0], counts the number of hcu_sfu_advdot strobes received from the HCU. When the count equals hcu_num_dots[15:0] the HCUReadLineFIFO must adjust the FIFO read address to point to the next 256-bit word boundary in the FIFO. This can be achieved by considering the FIFO read address, read_adr[2:0], will require 3 bits to address 8 locations of 64-bits. The next 256-bit aligned address is calculated by inverting the MSB of the read_adr and setting all other bits to 0.

```
If (hcuadvdot_count == hcu_num_dots) then
   read_adr[1:0] = b00
   read_adr[2] = ~read_adr[2]
```

The DIU Interface and Address Generator sub-block scaling unit also needs to know when hcuadvdot_count equals hcu_num_dots. This condition is exported from the HCUReadLineFIFO as the signal hrf_hcu_endofline. When the hrf_hcu_endofline is asserted the scaling unit will decide based on vertical scaling whether to go back to the start of the current line or go onto the next line.

27.8.9.2 DRAM Access Limitation

The SFU must output 1 bit/cycle to the HCU. Since HCUNumDots may not be a multiple of 256 bits the last 256-bit DRAM word on the line can contain extra zeros. In this case, the SFU may not be able to provide 1 bit/cycle to the HCU. This could lead to a stall by the SFU. This stall could then propagate if the margins being used by the HCU are not sufficient to hide it. The maximum stall can be estimated by the calculation: DRAM service period−X scale factor*dots used from last DRAM read for HCU line.

27.8.10 DIU Interface and Address Generator Sub-Block

TABLE 167

DIU Interface and Address Generator Additional IO Description

| Port name | Pins | I/O | Description |
|---|---|---|---|
| | | | Internal LBDPrevLineFIFO Inputs |
| plf_diurreq | 1 | In | Signal indicating the LBDPrevLineFIFO has 256-bits of data free. |
| plf_diurack | 1 | Out | Acknowledge that read request has been accepted and plf_diurreq should be de-asserted. |
| plf_diurdata | 1 | Out | Data from the DIU to LBDPrevLineFIFO.<br>First 64-bits are bits 63:0 of 256 bit word<br>Second 64-bits are bits 127:64 of 256 bit word<br>Third 64-bits are bits 191:128 of 256 bit word |

TABLE 167-continued

DIU Interface and Address Generator Additional IO Description

| Port name | Pins | I/O | Description |
|---|---|---|---|
| | | | Fourth 64-bits are bits 255:192 of 256 bit word |
| plf_diurrvalid | 1 | Out | Signal indicating data on plf_diurdata is valid. |
| plf_diuidle | 1 | In | Signal indicating DIU state-machine is in the IDLE state. |
| | | Internal LBDNextLineFIFO Inputs | |
| nlf_diuwreq | 1 | In | Signal indicating the LBDNextLineFIFO has 256-bits of data for writing to the DIU. |
| nlf_diuwack | 1 | Out | Acknowledge from DIU that write request has been accepted and write data can be output on nlf_diuwdata together with nlf_diuwvalid. |
| nlf_diuwdata | 1 | In | Data from LBDNextLineFIFO to DIU Interface. First 64-bits are bits 63:0 of 256 bit word Second 64-bits are bits 127:64 of 256 bit word Third 64-bits are bits 191:128 of 256 bit word Fourth 64-bits are bits 255:192 of 256 bit word |
| nlf_diuwvalid | 1 | In | Signal indicating that data on wlf_diuwdata is valid. |
| | | Internal HCUReadLineFIFO Inputs | |
| hrf_hcu_endofline | 1 | In | Signal lasting 1 cycle indicating then end of the HCU read line. |
| hrf_xadvance | 1 | Out | Signal from horizontal scaling unit 1 - supply the next dot 1 - supply the current dot |
| hrf_diurreq | 1 | In | Signal indicating the HCUReadLineFIFO has space for 256-bits of DIU data. |
| hrf_diurack | 1 | Out | Acknowledge that read request has been accepted and hrf_diurreq should be de-asserted. |
| hrf_diurdata | 1 | Out | Data from HCUReadLineFIFO to DIU. First 64-bits are bits 63:0 of 256 bit word Second 64-bits are bits 127:64 of 256 bit word Third 64-bits are bits 191:128 of 256 bit word Fourth 64-bits are bits 255:192 of 256 bit word |
| hrf_diurvalid | 1 | Out | Signal indicating data on plf_diurdata is valid. |
| hrf_diuidle | 1 | In | Signal indicating DIU state-machine is in the IDLE state. |

27.8.10

27.8.10.1 General Description

The DIU Interface and Address Generator (DAG) sub-block manages the bi-level buffer in DRAM. It has a DIU Write Interface for the LBDNextLineFIFO and a DIU Read Interface shared between the HCUReadLineFIFO and LBD-PrevLineFIFO.

All DRAM address management is centralised in the DAG. DRAM access is pre-emptive i.e. after a FIFO unit has made an access then as soon as the FIFO has space to read or data to write a DIU access will be requested immediately. This ensures there are no unnecessary stalls introduced e.g. at the end of an LBD or HCU line.

The control logic for horizontal and vertical non-integer scaling logic is completely contained in the DAG sub-block. The scaling control unit exports the hlf_xadvance signal to the HCUReadLineFIFO which indicates whether to replicate the current dot or supply the next dot for horizontal scaling.

27.8.10.2 DIU Write Interface

The LBDNextLineFIFO generates all the DIU write interface signals directly except for sfu_diu_wadr[21:5] which is generated by the Address Generation logic The DIU request from the LBDNextLineFIFO will be negated if its respective address pointer in DRAM is invalid i.e. nlf_adrvalid=0. The implementation must ensure that no erroneous requests occur on sfu_diu_wreq.

27.8.10.3 DIU Read Interface

Both HCUReadLineFIFO and LBDPrevLineFIFO share the read interface. If both sources request simultaneously, then the arbitration logic implements a round-robin sharing of read accesses between the HCUReadLineFIFO and LBD-PrevLineFIFO.

Figure 184:
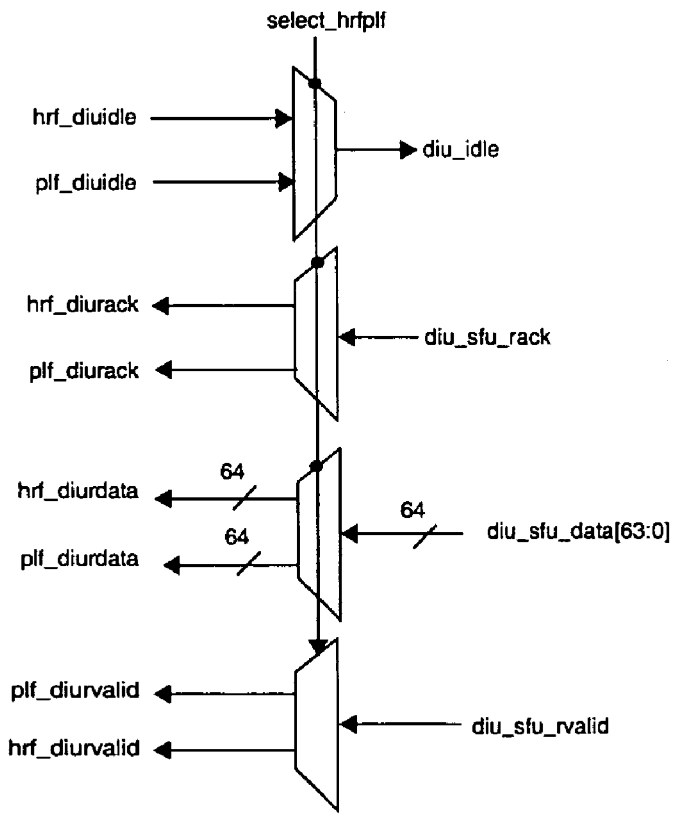

The DIU read request arbitration logic generates a signal, select_hrfplf which indicates whether the DIU access is from the HCUReadLineFIFO or LBDPrevLineFIFO (0=HCUReadLineFIFO, 1=LBDPrevLineFIFO). FIG. 184 shows select_hrfplf multiplexing the returned DIU acknowledge and read data to either the HCUReadLineFIFO or LBDPrevLineFIFO.

Figure 185:
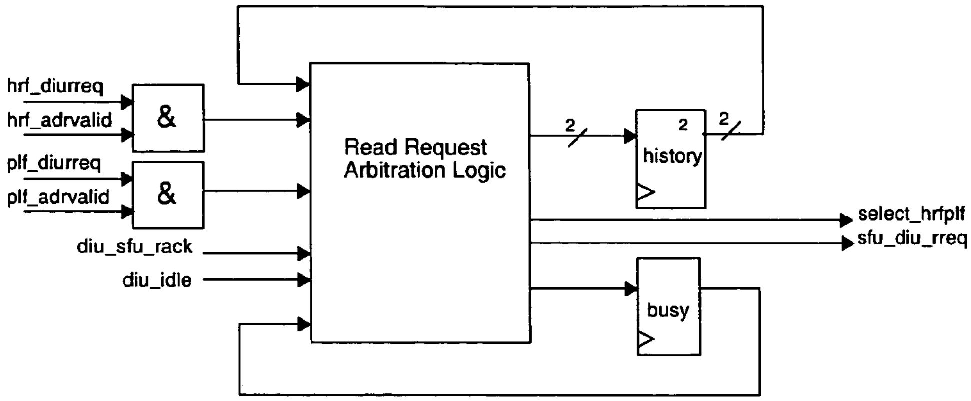
Figure 186:
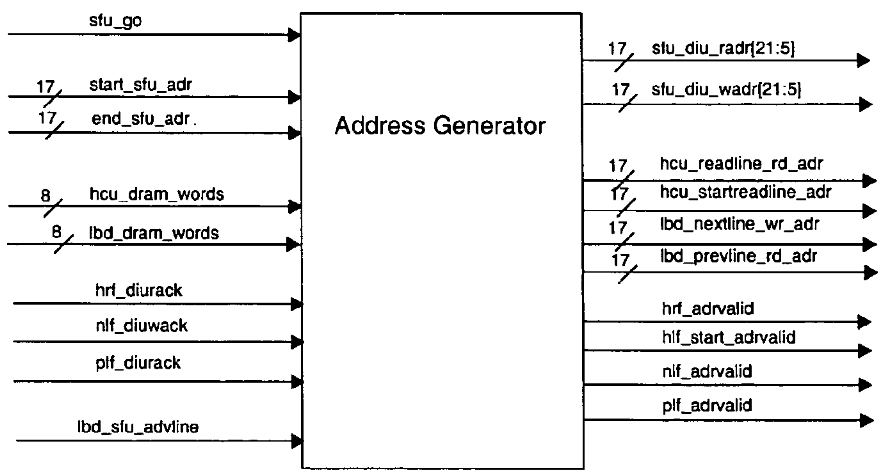
Figure 187:
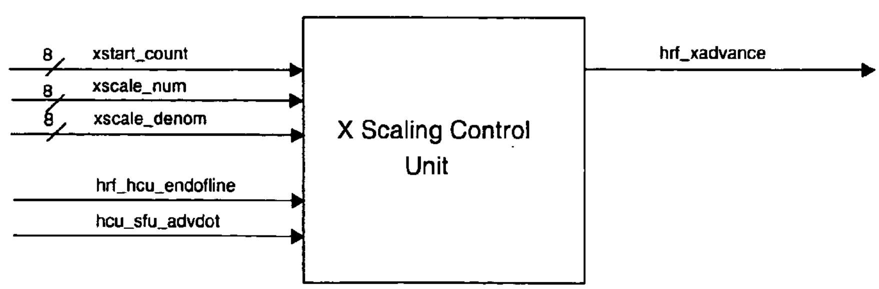
Figure 188:
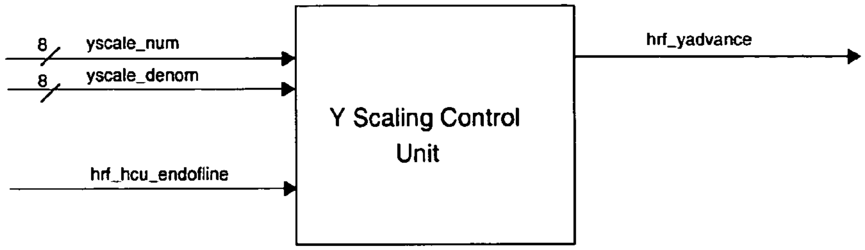

The DIU read request arbitration logic is shown in FIG. 185. The arbitration logic will select a DIU read request on hrf_diurreq or plf_diurreq and assert sfu_diu_rreq which goes to the DIU. The accompanying DIU read address is generated by the Address Generation Logic. The select signal select_hrfplf will be set according to the arbitration winner (0=HCUReadLineFIFO, 1=LBDPrevLineFIFO). sfu_diu_rreq is cleared when the DIU acknowledges the request on diu_sfu_rack. Arbitration cannot take place again until the DIU state-machine of the arbitration winner is in the idle state, indicated by diu_idle. This is necessary to ensure that the DIU read data is multiplexed back to the FIFO that requested it.

The DIU read requests from the HCUReadLineFIFO and LBDPrevLineFIFO will be negated if their respective addresses in DRAM are invalid, hrf_adrvalid=0 or plf_adrvalid=0. The implementation must ensure that no erroneous requests occur on sfu_diu_rreq.

If the HCUReadLineFIFO and LBDPrevLineFIFO request simultaneously, then if the request is not following immediately another DIU read port access, the arbitration logic will choose the HCUReadLineFIFO by default. If there are back to back requests to the DIU read port then the arbitration logic implements a round-robin sharing of read accesses between the HCUReadLineFIFO and LBDPrevLineFIFO.

A pseudo-code description of the DIU read arbitration is given below.

```
// history is of type {none, hrf, plf}, hrf is HCUReadLineFIFO, plf is
LBDPrevLineFIFO
// initialisation on reset
select__hrfplf = 0 // default choose hrf
history = none // no DIU read access immediately preceding
// state-machine is busy between asserting sfu__diu__rreq and diu__idle = 1
// if DIU read requester state-machine is in idle state then de-assert
busy
if (diu__idle == 1) then
   busy = 0
//if acknowledge received from DIU then de-assert DIU request
if (diu__sfu__rack == 1) then
   //de-assert request in response to acknowledge
   sfu__diu__rreq = 0
// if not busy then arbitrate between incoming requests
// if request detected then assert busy
if (busy == 0) then
   //if there is no request
   if (hrf__diurreq == 0) AND (plf__diurreq == 0) then
      sfu__diu__rreq = 0
      history = none
   // else there is a request
   else {
      // assert busy and request DIU read access
      busy = 1
      sfu__diu__rreq = 1
      // arbitrate in round-robin fashion between the requestors
      // if only HCUReadLineFIFO requesting choose HCUReadLineFIFO
      if (hrf__diurreq == 1) AND (plf__diurreq == 0) then
         history = hrf
         select__hrfplf = 0
      // if only LBDPrevLineFIFO requesting choose LBDPrevLineFIFO
      if (hrf__diurreq == 0) AND (plf__diurreq == 1) then
         history = plf
         select__hrfplf = 1
      //if both HCUReadLineFIFO and LBDPrevLineFIFO requesting
      if (hrf__diurreq == 1) AND (plf__diurreq == 1) then
         // no immediately preceding request choose HCUReadLineFIFO
         if (history == none) then
            history = hrf
            select__hrfplf = 0
         // if previous winner was HCUReadLineFIFO choose LBDPrevLineFIFO
         elsif (history == hrf) then
            history = plf
            select__hrfplf = 1
         // if previous winner was LBDPrevLineFIFO choose HCUReadLineFIFO
         elsif (history == plf) then
            history = hrf
            select__hrfplf = 0
      // end there is a request
      }
```

27.8.10.4 Address Generation Logic

The DIU interface generates the DRAM addresses of data read and written by the SFU's FIFOs.

A write request from the LBDNextLineFIFO on nlf_diuwreq causes a write request from the DIU Write Interface. The Address Generator supplies the DRAM write address on sfu_diu_wadr[21:5].

A winning read request from the DIU read request arbitration logic causes a read request from the DIU Read Interface. The Address Generator supplies the DRAM read address on sfu_diu_radr[21:5].

The address generator is configured with the number of DRAM words to read in a HCU line, hcu_dram_words, the first DRAM address of the SFU area, start_sfu_adr[21:5], and the last DRAM address of the SFU area, end_sfu_adr [21:5].

Note hcu_dram_words configuration register specifies the number of DRAM words consumed per line in the HCU, while lbd_dram words specifies the number of DRAM words generated per line by the LBD. These values are not required to be the same.

For example the LBD may store 10 DRAM words per line (lbd_dram_words=10), but the HCU may consume 5 DRAM words per line. In such case the hcu_dram_words would be set to 5 and the HCU Read Line FIFO would trigger a new line after it had consumed 5 DRAM words (via hrf_hcu_endofline).

Address Generation

There are four address pointers used to manage the bi-level DRAM buffer:

a. hcu_readline_rd_adr is the read address in DRAM for the HCUReadLineFIFO.

b. hcu_startreadline_adr is the start address in DRAM for the current line being read by the HCUReadLineFIFO.

c. lbd_nextline_wr_adr is the write address in DRAM for the LBDNextLineFIFO.

d. lbd_prevline_rd_adr is the read address in DRAM for the LBDPrevLineFIFO.

The current value of these address pointers are readable by the CPU.

Four corresponding address valid flags are required to indicate whether the address pointers are valid, based on whether the FIFOs are full or empty.

a. hlf_adrvalid, derived from hrf_nlf_fifo_emp b. hlf_start_adrvalid, derived from start_hrf_nlf_fifo_emp c. nlf_adrvalid. derived from nlf_plf_fifo_full and nlf_hrf_fifo_full d. plf_adrvalid. derived from plf_nlf_fifo_emp DRAM requests from the FIFOs will not be issued to the DIU until the appropriate address flag is valid.

Once a request has been acknowledged, the address generation logic can calculate the address of the next 256-bit word in DRAM, ready for the next request.

Rules for Address Pointers

The address pointers must obey certain rules which indicate whether they are valid:

a. hcu_readline_rd_adr is only valid if it is reading earlier in the line than lbd_nextline_wr_adr is writing i.e. the fifo is not empty b. The SFU (lbd_nextline_wr_adr) cannot overwrite the current line that the HCU is reading from (hcu_startreadline_adr) i.e. the fifo is not full, when compared with the HCU read line pointer c. The LBDNextLineFIFO (lbd_nextline_wr_adr) must be writing earlier in the line than LBDPrevLineFIFO (lbd_prevline_rd_adr) is reading and must not overwrite the current line that the HCU is reading from i.e. the fifo is not full when compared to the PrevLineFifo read pointer d. The LBDPrevLineFIFO (lbd_prevline_rd_adr) can read right up to the address that LBDNextLineFIFO (lbd_nextline_wr_adr) is writing i.e the fifo is not empty.

e. At startup i.e. when sfu_go is asserted, the pointers are reset to start_sfu_adr[21:5].

f. The address pointers can wrap around the SFU bi-level store area in DRAM.

Address generator pseudo-code:

```
Initialization:
if (sfu_go rising edge) then {
            // initialise address pointers to start of SFU address space
            lbd_prevline_rd_adr                 = start_sfu_adr[21:5]
            lbd_nextline_wr_adr                 = start_sfu_adr[21:5]
            hcu_readline_rd_adr                 = start_sfu_adr[21:5]
            hcu_startreadline_adr               = start_sfu_adr[21:5]
            lbd_nextline_wr_wrap                = 0
            lbd_prevline_rd_wrap                = 0
            hcu_startreadline_wrap              = 0
            hcu_readline_rd_wrap                = 0
            }
Determine FIFO fill and empty status:
// calculate which FIFOs are full and empty
plf_nlf_fifo_emp = (lbd_prevline_rd_adr  == lbd_nextline_wr_adr) AND
            (lbd_prevline_rd_wrap        == lbd_nextline_wr_wrap)
nlf_plf_fifo_full = (lbd_nextline_wr_adr == lbd_prevline_rd_adr) AND
            (lbd_prevline_rd_wrap        != lbd_nextline_wr_wrap)
nlf_hrf_fifo_full = (lbd_nextline_wr_adr == hcu_startreadline_adr ) AND
            (hcu_startreadline_wrap      != lbd_nextline_wr_wrap )
// hcu start address can jump addresses and so needs comparitor
if (hcu_startreadline_wrap == lbd_nextline_wr_wrap) then
            start_hrf_nlf_fifo_emp =  (hcu_startreadline_adr >=lbd_nextline_wr_adr)
else
            start_hrf_nlf_fifo_emp = NOT(hcu_startreadline_adr >=lbd_nextline_wr_adr)
// hcu read address can jump addresses and so needs comparitor
if (hcu_readline_rd_wrap == lbd_nextline_wr_wrap) then
            hrf_nlf_fifo_emp =  (hcu_readline_rd_adr >=lbd_nextline_wr_adr)
else
            hrf_nlf_fifo_emp = NOT(hcu_readline_rd_adr >=lbd_nextline_wr_adr)
Address pointer updating:
// LBD Next line FIFO
// if DIU write acknowledge and LBDNextLineFIFO is not full with reference to PLF and HRF
if (lbd_nextline_wr_en == 1) then
            lbd_nextline_wr_adr = cpu_wr_data[21:5]
            lbd_nextline_wr_wrap = cpu_wr_data[31]
elsif (diu_sfu_wack == 1 AND nlf_plf_fifo_full != 1 AND nlf_hrf_fifo_full !=1 ) then
            if (lbd_nextline_wr_adr == end_sfu_adr) then              // if end of SFU address
range
              lbd_nextline_wr_adr = start_sfu_adr                     // go to start of SFU
address range
              lbd_nextline_wr_wrap= NOT (lbd_nextline_wr_wrap)        // invert the wrap bit
            else
              lbd_nextline_wr_adr++                                   // increment address pointer
```

-continued

```
// LBD PrevLine FIFO
//if DIU read acknowledge and LBDPrevLineFIFO is not empty
if (diu_sfu_rack == 1 AND select_hrfplf == 1 AND plf_nlf_fifo_emp !=1) then
        if (lbd_prevline_rd_adr == end_sfu_adr) then
          lbd_prevline_rd_adr = start_sfu_adr                 // go to start of SFU address
range
          lbd_prevline_rd_wrap= NOT (lbd_prevline_rd_wrap)    // invert the wrap bit
        else
          lbd_prevline_rd_adr++                               // increment address pointer
// HCU ReadLine FIFO
// if DIU read acknowledge and HCUReadLineFIFO fifo is not empty
if (diu_sfu_rack == 1 AND select_hrfplf == 0 AND hrf_nlf_fifo_emp != 1) then
        // going to update hcu read line address
        if (hrf_hcu_endofline == 1) AND (hrf_yadvance == 1) then {   // read the next line
from DRAM
          // advance to start of next HCU line in DRAM
          hcu_startreadline_adr = hcu_startreadline_adr + lbd_dram_words
          offset = hcu_startreadline_adr - end_sfu_adr - 1        // allow for address
wraparound
          if (offset >= 0) then
            hcu_startreadline_adr = start_sfu_adr + offset
            hcu_startreadline_wrap= NOT(hcu_startreadline_wrap)
          hcu_readline_rd_adr = hcu_startreadline_adr
          hcu_readline_rd_wrap= hcu_startreadline_wrap
          }
        elsif (hrf_hcu_endofline == 1) AND (hrf_yadvance == 0) then
          hcu_readline_rd_adr = hcu_startreadline_adr         // restart and re-use the
same line
          hcu_readline_rd_wrap= hcu_startreadline_wrap
        elsif (hcu_readline_rd_adr == end_sfu_adr) then      // check if the FIFO needs
to wrap space
          hcu_readline_rd_adr = start_sfu_adr                 // go to start of SFU
address space
          hcu_readline_rd_wrap= NOT (hcu_readline_rd_wrap)
        else
          hcu_readline_rd_adr ++                              // increment address pointer
```

The CPU can update the lbd_nextline_wr_adr address and lbd_nextline_wr_wrap by writing to the LBDNextLinePtr register. The CPU access mechanism should only be used when LBD is disabled to avoid conflicting LBD and CPU updates to the next line FIFO address. The CPU access always has higher priority than the internal logic update to the lbd_nextline_wr_adr register. When updating the lbd_nextline_wr_adr address register the CPU must ensure that the new address does not jump the hcu_startreadline_adr address, failure to do may cause the SFU to stall indefinitely.

27.8.10.4.1 X Scaling of Data for HCUReadLineFIFO

The signal hcu_sfu_advdot tells the HCUReadLineFIFO to supply the next dot or the current dot on sfu_hcu_sdata according to the hrf_xadvance signal from the scaling control unit. When hrf_xadvance is 1 the HCUReadLineFIFO should supply the next dot. When hrf_xadvance is 0 the HCUReadLineFIFO should supply the current dot.

The algorithm for non-integer scaling is described in the pseudocode below. Note, x_scale_count should be loaded with x_start_count after reset and at the end of each line. The end of the line is indicated by hrf_hcu_endofline from the HCUReadLineFIFO.

```
if (hcu_sfu_advdot == 1) then
  if (x_scale_count + x_scale_denom - x_scale_num >= 0) then
    x_scale_count = x_scale_count + x_scale_denom -
    x_scale_num
    hrf_xadvance = 1
  else
    x_scale_count = x_scale_count + x_scale_denom
    hrf_xadvance = 0
```

-continued

```
else
  x_scale_count = x_scale_count
  hrf_xadvance = 0
```

27.8.10.4.2 Y Scaling of Data for HCUReadLineFIFO

The HCUReadLineFIFO counts the number of hcu_sfu_advdot strobes received from the HCU. When the count equals hcu_num_dots the HCUReadLineFIFO will assert hrf_hcu_endofline for a cycle.

The algorithm for non-integer scaling is described in the pseudocode below. Note, y_scale_count should be loaded with zero after reset.

```
if (hrf_hcu_endofline == 1) then
  if (y_scale_count + y_scale_denom - y_scale_num >= 0) then
    y_scale_count = y_scale_count + y_scale_denom -
    y_scale_num
    hrf_yadvance = 1
  else
    y_scale_count = y_scale_count + y_scale_denom
    hrf_yadvance = 0
else
  y_scale_count = y_scale_count
  hrf_yadvance = 0
```

When the hrf_hcu_endofline is asserted the Y scaling unit will decide whether to go back to the start of the current line, by setting hrf_yadvance=0, or go onto the next line, by setting hrf_yadvance=1.

Figure 189:
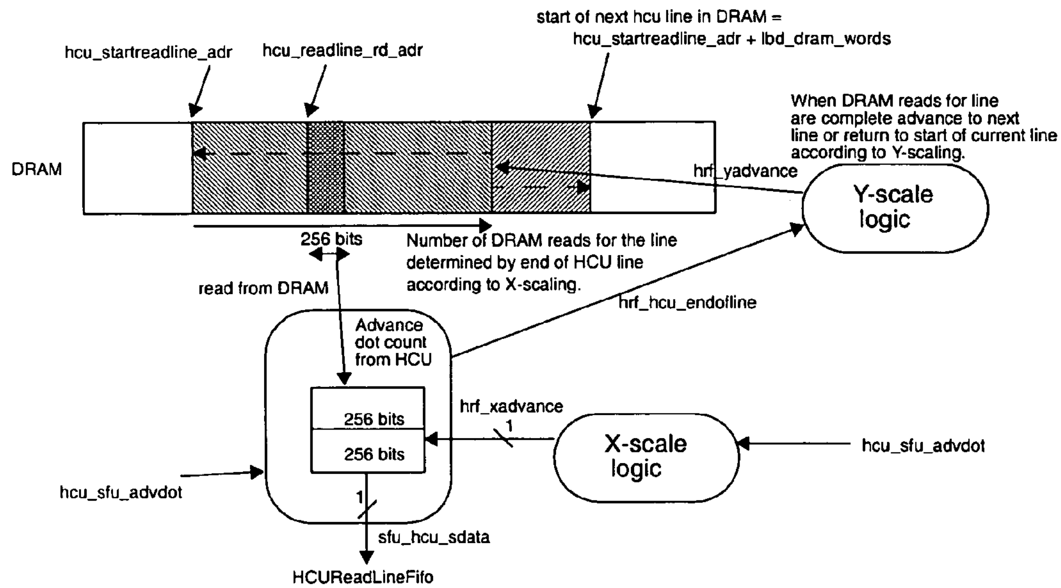

FIG. 189 shows an overview of X and Y scaling for HCU data.

28 Tag Encoder (TE)

28.1 Overview

The Tag Encoder (TE) provides functionality for Netpage-enabled applications, and typically requires the presence of IR ink (although K ink can be used for tags in limited circumstances).

The TE encodes fixed data for the page being printed, together with specific tag data values into an error-correctable encoded tag which is subsequently printed in infrared or black ink on the page. The TE places tags on a triangular grid, and can be programmed for both landscape and portrait orientations.

Basic tag structures are normally rendered at 1600 dpi, while tag data is encoded into an arbitrary number of printed dots. The TE supports integer scaling in the Y-direction while the TFU supports integer scaling in the X-direction. Thus, the TE can render tags at resolutions less than 1600 dpi which can be subsequently scaled up to 1600 dpi.

Figure 190:
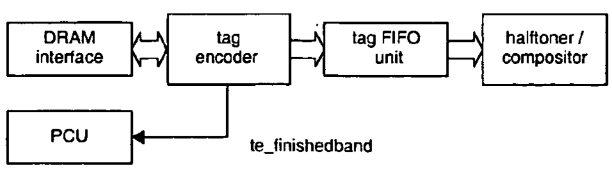

The output from the TE is buffered in the Tag FIFO Unit (TFU) which is in turn used as input by the HCU. In addition, a te_finishedband signal is output to the end of band unit once the input tag data has been loaded from DRAM. The high level data path is shown by the block diagram in FIG. 190.

After passing through the HCU, the tag plane is subsequently printed with an infrared-absorptive ink that can be read by a Netpage sensing device. Since black ink can be IR absorptive, limited functionality can be provided on offset-printed pages using black ink on otherwise blank areas of the page—for example to encode buttons. Alternatively an invisible infrared ink can be used to print the position tags over the top of a regular page. However, if invisible IR ink is used, care must be taken to ensure that any other printed information on the page is printed in infrared-transparent CMY ink, as black ink will obscure the infrared tags. The monochromatic scheme was chosen to maximize dynamic range in blurry reading environments.

When multiple SoPEC chips are used for printing the same side of a page, it is possible that a single tag will be produced by two SoPEC chips. This implies that the TE must be able to print partial tags.

The throughput requirement for the SoPEC TE is to produce tags at half the rate of the PEC1 TE. Since the TE is reused from PEC1, the SoPEC TE over-produces by a factor of 2.

In PEC1, in order to keep up with the HCU which processes 2 dots per cycle, the tag data interface has been designed to be capable of encoding a tag in 63 cycles. This is actually accomplished in either 52 cycles or 36 cycles approximately, depending on the type of encoding used. If the SoPEC TE were to be modified from two dots production per cycle to a nominal one dot per cycle it should not lose the 63/52 cycle performance edge attained in the PEC1 TE.

28.2 What are Tags?

The first barcode was described in the late 1940's by Woodland and Silver, and finally patented in 1952 (U.S. Pat. No. 2,612,994) when electronic parts were scarce and very expensive. Now however, with the advent of cheap and readily available computer technology, nearly every item purchased from a shop contains a barcode of some description on the packaging. From books to CDs, to grocery items, the barcode provides a convenient way of identifying an object by a product number. The exact interpretation of the product number depends on the type of barcode. Warehouse inventory tracking systems let users define their own product number ranges, while inventory in shops must be more universally encoded so that products from one company don't overlap with products from another company. Universal Product Codes (UPC) were introduced in the mid 1970 's at the request of the National Association of Food Chains for this very reason.

Barcodes themselves have been specified in a large number of formats. The older barcode formats contain characters that are displayed in the form of lines. The combination of black and white lines describe the information the barcodes contains. Often there are two types of lines to form the complete barcode: the characters (the information itself) and lines to separate blocks for better optical recognition. While the information may change from barcode to barcode, the lines to separate blocks stays constant. The lines to separate blocks can therefore be thought of as part of the constant structural components of the barcode.

Barcodes are read with specialized reading devices that then pass the extracted data onto the computer for further processing. For example, a point-of-sale scanning device allows the sales assistant to add the scanned item to the current sale, places the name of the item and the price on a display device for verification etc. Light-pens, gun readers, scanners, slot readers, and cameras are among the many devices used to read the barcodes.

To help ensure that the data extracted was read correctly, checksums were introduced as a crude form of error detection. More recent barcode formats, such as the Aztec 2D barcode developed by Andy Longacre in 1995 (U.S. Pat. No. 5,591,956), but now released to the public domain, use redundancy encoding schemes such as Reed-Solomon. Very often the degree of redundancy encoding is user selectable.

Figure 191:
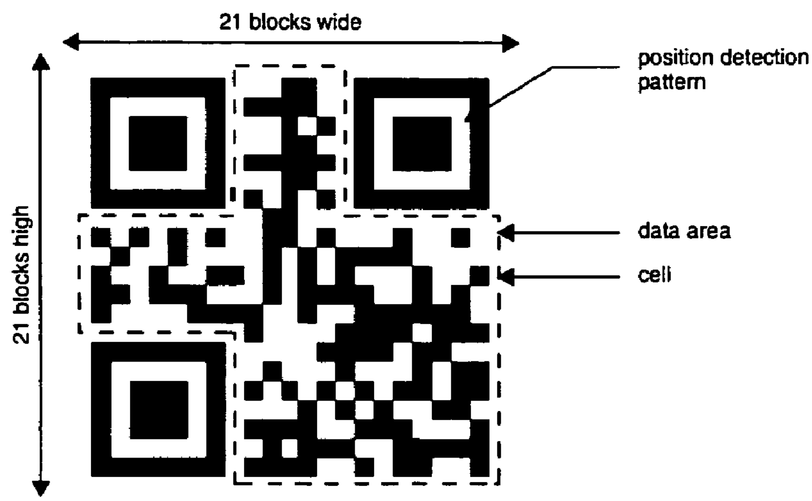

More recently there has also been a move from the simple one dimensional barcodes (line based) to two dimensional barcodes. Instead of storing the information as a series of lines, where the data can be extracted from a single dimension, the information is encoded in two dimensions. Just as with the original barcodes, the 2D barcode contains both information and structural components for better optical recognition. FIG. 191 shows an example of a QR Code (Quick Response Code), developed by Denso of Japan (U.S. Pat. No. 5,726,435). Note the barcode cell is comprised of two areas: a data area (depends on the data being stored in the barcode), and a constant position detection pattern. The constant position detection pattern is used by the reader to help locate the cell itself, then to locate the cell boundaries, to allow the reader to determine the original orientation of the cell (orientation can be determined by the fact that there is no 4th corner pattern).

The number of barcode encoding schemes grows daily. Yet very often the hardware for producing these barcodes is specific to the particular barcode format. As printers become more and more embedded, there is an increasing desire for real-time printing of these barcodes. In particular, Netpage enabled applications require the printing of 2D barcodes (or tags) over the page, preferably in infra-red ink. The tag encoder in SoPEC uses a generic barcode format encoding scheme which is particularly suited to real-time printing. Since the barcode encoding format is generic, the same rendering hardware engine can be used to produce a wide variety of barcode formats.

Unfortunately the term "barcode" is interpreted in different ways by different people. Sometimes it refers only to the data area component, and does not include the constant position detection pattern. In other cases it refers to both data and constant position detection pattern.

We therefore use the term tag to refer to the combination of data and any other components (such as position detection pattern, blank space etc. surround) that must be rendered to help hold or locate/read the data. A tag therefore contains the following components:

- data area(s). The data area is the whole reason that the tag exists. The tag data area(s) contains the encoded data (optionally redundancy-encoded, perhaps simply checksummed) where the bits of the data are placed within the data area at locations specified by the tag encoding scheme.
- constant background patterns, which typically includes a constant position detection pattern. These help the tag reader to locate the tag. They include components that are easy to locate and may contain orientation and perspective information in the case of 2D tags. Constant background patterns may also include such patterns as a blank area surrounding the data area or position detection pattern. These blank patterns can aid in the decoding of the data by ensuring that there is no interference between tags or data areas.

In most tag encoding schemes there is at least some constant background pattern, but it is not necessarily required by all. For example, if the tag data area is enclosed by a physical space and the reading means uses a non-optical location mechanism (e.g. physical alignment of surface to data reader) then a position detection pattern is not required.

Figure 192:
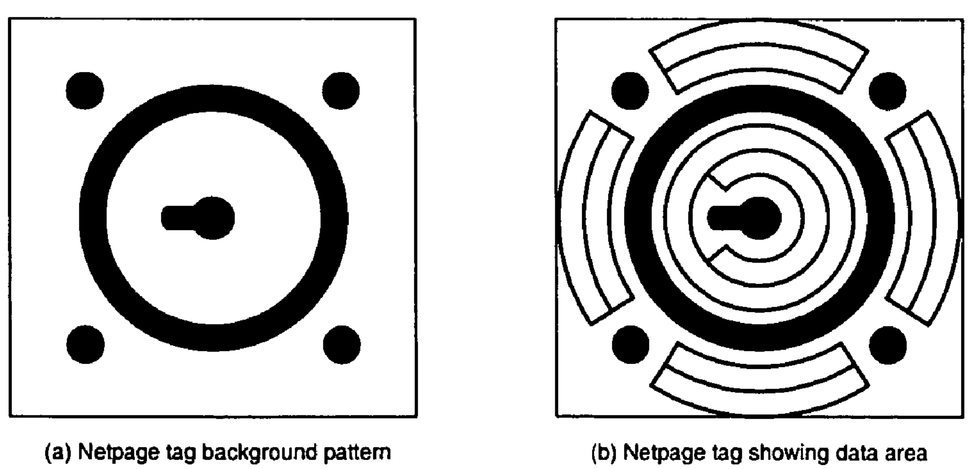
Figure 193:
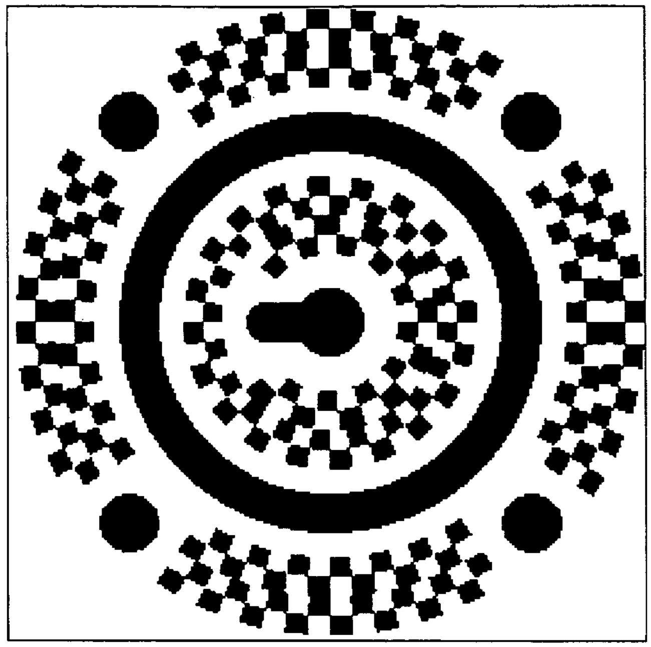

Different tag encoding schemes have different sized tags, and have different allocation of physical tag area to constant position detection pattern and data area. For example, the QR code has 3 fixed blocks at the edges of the tag for position detection pattern (see FIG. 191) and a data area in the remainder. By contrast, the Netpage tag structure (see FIGS. 192 and 193) contains a circular locator component, an orientation feature, and several data areas. FIG. 192(*a*) shows the Netpage tag constant background pattern in a resolution independent form. FIG. 192(*b*) is the same as FIG. 192(*a*), but with the addition of the data areas to the Netpage tag. FIG. 193 is an example of dot placement and rendering to 1600 dpi for a Netpage tag. Note that in FIG. 193 a single bit of data is represented by many physical output dots to form a block within the data area.

28.2.1 Contents of the Data Area

The data area contains the data for the tag.

Figure 194:
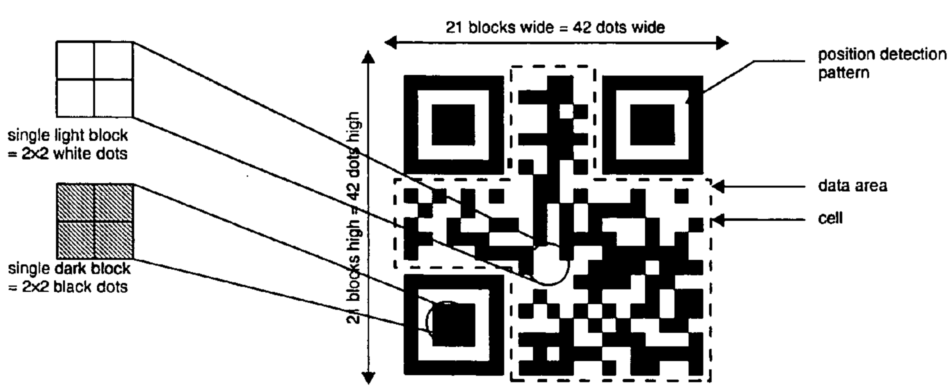

Depending on the tag's encoding format, a single bit of data may be represented by a number of physical printed dots. The exact number of dots will depend on the output resolution and the target reading/scanning resolution. For example, in the QR code (see FIG. 191), a single bit is represented by a dark module or a light module, where the exact number of dots in the dark module or light module depends on the rendering resolution and target reading/scanning resolution. For example, a dark module may be represented by a square block of printed dots (all on for binary 1, or all off for binary 0), as shown in FIG. 194.

The point to note here is that a single bit of data may be represented in the printed tag by an arbitrary printed shape. The smallest shape is a single printed dot, while the largest shape is theoretically the whole tag itself, for example a giant macrodot comprised of many printed dots in both dimensions.

An ideal generic tag definition structure allows the generation of an arbitrary printed shape from each bit of data.

28.2.2 What do the Bits Represent?

Given an original number of bits of data, and the desire to place those bits into a printed tag for subsequent retrieval via a reading/scanning mechanism, the original number of bits can either be placed directly into the tag, or they can be redundancy-encoded in some way. The exact form of redundancy encoding will depend on the tag format.

The placement of data bits within the data area of the tag is directly related to the redundancy mechanism employed in the encoding scheme. The idea is generally to place data bits together in 2D so that burst errors are averaged out over the tag data, thus typically being correctable. For example, all the bits of Reed-Solomon codeword would be spread out over the entire tag data area so to minimize being affected by a burst error.

Since the data encoding scheme and shape and size of the tag data area are closely linked, it is desirable to have a generic_tag format structure. This allows the same data structure and rendering embodiment to be used to render a variety of tag formats.

28.2.2.1 Fixed and Variable Data Components

In many cases, the tag data can be reasonably divided into fixed and variable components. For example, if a tag holds N bits of data, some of these bits may be fixed for all tags while some may vary from tag to tag.

For example, the Universal product code allows a country code and a company code. Since these bits don't change from tag to tag, these bits can be defined as fixed, and don't need to be provided to the tag encoder each time, thereby reducing the bandwidth when producing many tags.

Another example is Netpage tags. A single printed page contains a number of Netpage tags. The page-id will be constant across all the tags, even though the remainder of the data within each tag may be different for each tag. By reducing the amount of variable data being passed to SoPEC's tag encoder for each tag, the overall bandwidth can be reduced.

Depending on the embodiment of the tag encoder, these parameters will be either implicit or explicit, and may limit the size of tags renderable by the system. For example, a software tag encoder may be completely variable, while a hardware tag encoder such as SoPEC's tag encoder may have a maximum number of tag data bits.

28.2.2.2 Redundancy-Encode the Tag Data within the Tag Encoder

Instead of accepting the complete number of TagData bits encoded by an external encoder, the tag encoder accepts the basic non-redundancy-encoded data bits and encodes them as required for each tag. This leads to significant savings of bandwidth and on-chip storage.

In SoPEC's case for Netpage tags, only 120 bits of original data are provided per tag, and the tag encoder encodes these 120 bits into 360 bits. By having the redundancy encoder on board the tag encoder the effective bandwidth and internal storage required is reduced to only 33% of what would be required if the encoded data was read directly.

28.3 Placement of Tags on a Page

Figure 195:
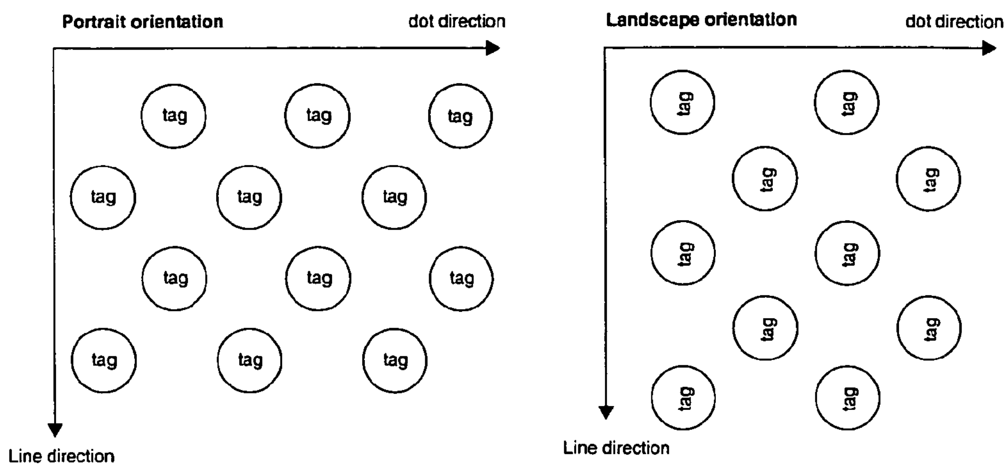

The TE places tags on the page in a triangular grid arrangement as shown in FIG. 195.

The triangular mesh of tags combined with the restriction of no overlap of columns or rows of tags means that the process of tag placement is greatly simplified. For a given line of dots, all the tags on that line correspond to the same part of the general tag structure. The triangular placement can be considered as alternative lines of tags, where one line of tags is inset by one amount in the dot dimension, and the other line of dots is inset by a different amount. The dot inter-tag gap is the same in both lines of tag, and is different from the line inter-tag gap.

Note also that as long as the tags themselves can be rotated, portrait and landscape printing are essentially the same—the placement parameters of line and dot are swapped, but the placement mechanism is the same.

Figure 196:
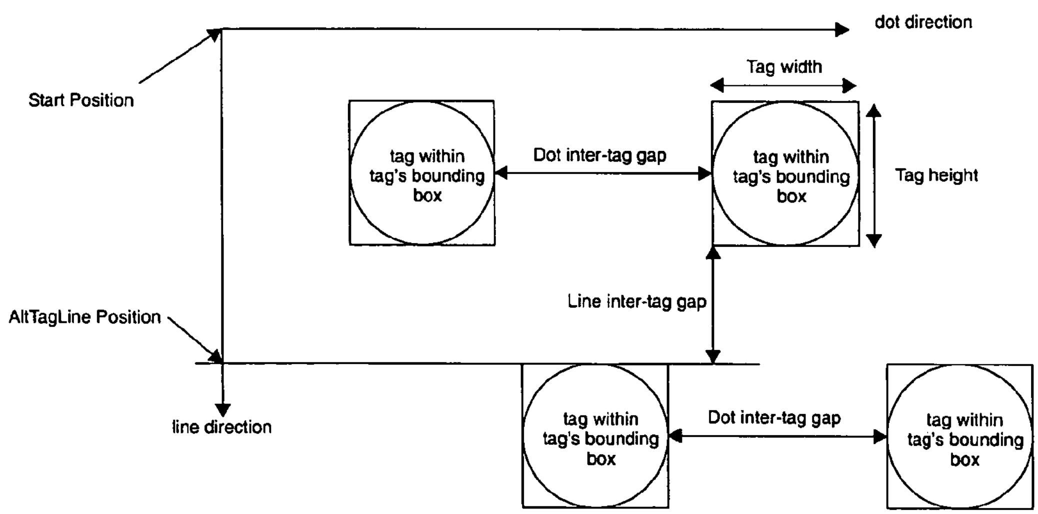

The general case for placement of tags therefore relies on a number of parameters, as shown in FIG. 196.

The parameters are more formally described in Table 168. Note that these are placement parameters and not registers.

TABLE 168

Tag placement parameters

| parameter | description | restrictions |
|---|---|---|
| Tag height | The number of dot lines in a tag's bounding box | minimum 1 |
| Tag width | The number of dots in a single line of the tag's bounding box. The number of dots in the tag itself may vary depending on the shape of the tag, but the number of dots in the bounding box will be constant (by definition). | minimum 1 |
| Dot inter-tag gap | The number of dots from the edge of one tag's bounding box to the start of the next tag's bounding box, in the dot direction. | minimum = 0 |
| Line inter-tag gap | The number of dot lines from the edge of one tag's bounding box to the start of the next tag's bounding box, in the line direction. | minimum = 0 |
| Start Position | Defines the status of the top left dot on the page - is an offset in dot & row within the tag or the inter-tag gap. | — |
| AltTagLinePosition | Defines the status for the start of the alternate row of tags. Is an offset in dot within the tag or within the dot inter-tag gap (the row position is always 0). | — |

28.4 Basic Tag Encoding Parameters

SoPEC's tag encoder imposes range restrictions on tag encoding parameters as a direct result of on-chip buffer sizes. Table 169 lists the basic encoding parameters as well as range restrictions where appropriate. Although the restrictions were chosen to take the most likely encoding scenarios into account, it is a simple matter to adjust the buffer sizes and corresponding addressing to allow arbitrary encoding parameters in future implementations.

TABLE 169

Encoding parameters

| name | definition | maximum value imposed by TE |
|---|---|---|
| W | page width | $2^{14}$ dotpairs or 20.48 inches at 1600 dpi |
| S | tag size | typical tag size is 2 mm × 2 mm maximum tag size is 384 dots × 384 dots before scaling i.e. 6 mm × 6 mm at 1600 dpi |
| N | number of dots in each dimension of the tag | 384 dots before scaling |
| E | redundancy encoding for tag data | Reed-Solomon GF($2^4$) at 5:10 or 7:8 |
| $D_F$ | size of fixed data (unencoded) | 40 or 56 bits |
| $R_F$ | size of redundancy-encoded fixed data | 120 bits |
| $D_V$ | size of variable data (unencoded) | 120 or 112 bits |
| $R_V$ | size of redundancy-encoded variable data | 360 or 240 bits |
| T | tags per page width | 256 |

The fixed data for the tags on a page need only be supplied to the TE once. It can be supplied as 40 or 56 bits of unencoded data and encoded within the TE as described in Section 28.4.1. Alternatively it can be supplied as 120 bits of pre-encoded data (encoded arbitrarily).

The variable data for the tags on a page are those 112 or 120 data bits that are variable for each tag. Variable tag data is supplied as part of the band data, and is always encoded by the TE as described in Section 28.4.1, but may itself be arbitrarily pre-encoded.

28.4.1 Redundancy Encoding

The mapping of data bits (both fixed and variable) to redundancy encoded bits relies heavily on the method of redundancy encoding employed. Reed-Solomon encoding was chosen for its ability to deal with burst errors and effectively detect and correct errors using a minimum of redundancy.

In this implementation of the TE, Reed-Solomon encoding over the Galois Field GF($2^4$) is used. Symbol size is 4 bits. Each codeword contains 15 4-bit symbols for a codeword length of 60 bits. The primitive polynomial is $p(x)=x^4+x+1$, and the generator polynomial is $g(x)=(x+\alpha)(x+\alpha^2) \ldots (x+\alpha^{2t})$, where t=the number of symbols that can be corrected.

Of the 15 symbols, there are two possibilities for encoding:

RS(15, 5): 5 symbols original data (20 bits), and 10 redundancy symbols (40 bits). The 10 redundancy symbols mean that up to 5 symbols in error can be correct. The generator polynomial is therefore $g(x)=(x+\alpha)(x+\alpha^2)\ldots(x+\alpha^{10})$.

RS(15, 7): 7 symbols original data (28 bits), and 8 redundancy symbols (32 bits). The 8 redundancy symbols mean that up to 4 symbols in error can be corrected. The generator polynomial is $g(x)=(x+\alpha)(x+\alpha^2)\ldots(x+\alpha^8)$.

In the first case, with 5 symbols of original data, the total amount of original data per tag is 160 bits (40 fixed, 120 variable). This is redundancy encoded to give a total amount of 480 bits (120 fixed, 360 variable) as follows:

- Each tag contains up to 40 bits of fixed original data. Therefore 2 codewords are required for the fixed data, giving a total encoded data size of 120 bits. Note that this fixed data only needs to be encoded once per page.
- Each tag contains up to 120 bits of variable original data. Therefore 6 codewords are required for the variable data, giving a total encoded data size of 360 bits.

In the second case, with 7 symbols of original data, the total amount of original data per tag is 168 bits (56 fixed, 112 variable). This is redundancy encoded to give a total amount of 360 bits (120 fixed, 240 variable) as follows:

- Each tag contains up to 56 bits of fixed original data. Therefore 2 codewords are required for the fixed data, giving a total encoded data size of 120 bits. Note that this fixed data only needs to be encoded once per page.
- Each tag contains up to 112 bits of variable original data. Therefore 4 codewords are required for the variable data, giving a total encoded data size of 240 bits.

The choice of data to redundancy ratio depends on the application. The TE takes approximately 52 cycles to encode a tag using RS(15,5) and approximately 36 cycles using RS(15,7).

28.5 Data Structures Used by Tag Encoder 28.5.1 Tag Format Structure

The Tag Format Structure (TFS) is the template used to render tags, optimized so that the tag can be rendered in real time. The TFS contains an entry for each dot position within the tag's bounding box. Each entry specifies whether the dot is part of the constant background pattern or part of the tag's data component (both fixed and variable).

The TFS is very similar to a bitmap in that it contains one entry for each dot position of the tag's bounding box. The TFS therefore has TagHeight×TagWidth entries, where TagHeight matches the height of the bounding box for the tag in the line dimension, and TagWidth matches the width of the bounding box for the tag in the dot dimension. A single line of TFS entries for a tag is known as a tag line structure.

Figure 197:
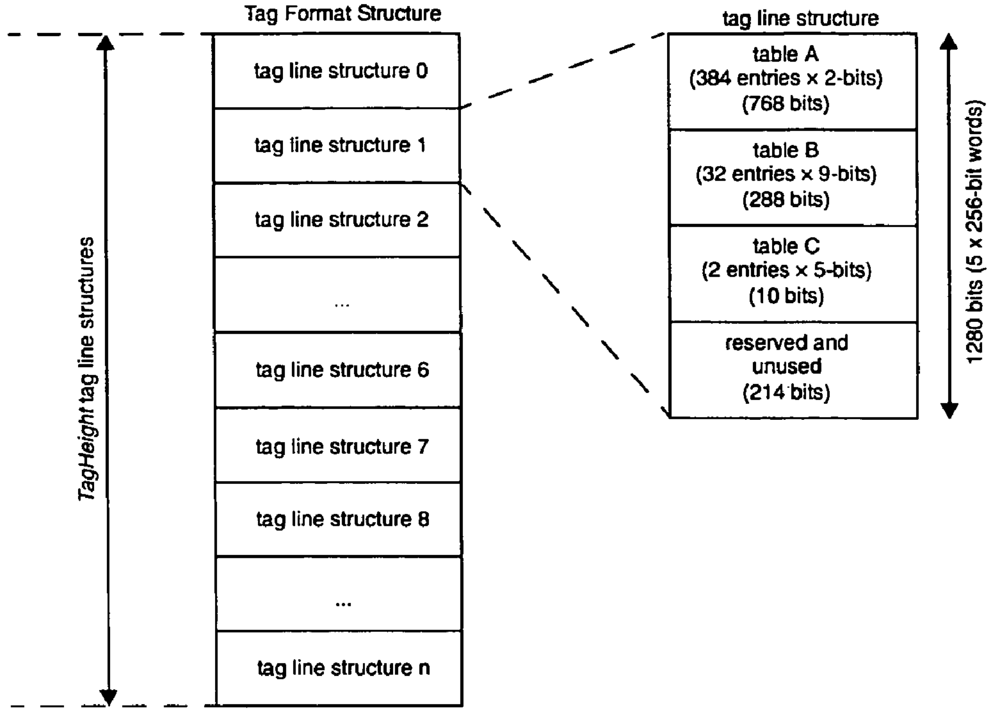

The TFS consists of TagHeight number of tag line structures, one for each 1600 dpi line in the tag's bounding box. Each tag line structure contains three contiguous tables, known as tables A, B, and C. Table A contains 384 2-bit entries, one entry for each of the maximum number of dots in a single line of a tag (see Table 169). The actual number of entries used should match the size of the bounding box for the tag in the dot dimension, but all 384 entries must be present. Table B contains 32 9-bit data addresses that refer to (in order of appearance) the data dots present in the particular line. All 32 entries must be present, even if fewer are used. Table C contains two 5-bit pointers into table B, and therefore comprises 10 bits. Padding of 214 bits is added. The total length of each tag line structure is therefore 5×256-bit DRAM words. Thus a TFS containing TagHeight tag line structures requires a TagHeight*160 bytes. The structure of a TFS is shown in FIG. 197.

A full description of the interpretation and usage of Tables A, B and C is given in section 28.8.3 on page 593.

28.5.1.1 Scaling a Tag

If the size of the printed dots is too small, then the tag can be scaled in one of several ways. Either the tag itself can be scaled by N dots in each dimension, which increases the number of entries in the TFS. As an alternative, the output from the TE can be scaled up by pixel replication via a scale factor greater than 1 in the both the TE and TFU.

For example, if the original TFS was 21×21 entries, and the scaling were a simple 2×2 dots for each of the original dots, we could increase the TFS to be 42×42. To generate the new TFS from the old, we would repeat each entry across each line of the TFS, and then we would repeat each line of the TFS. The net number of entries in the TFS would be increased fourfold (2×2).

Figure 198:
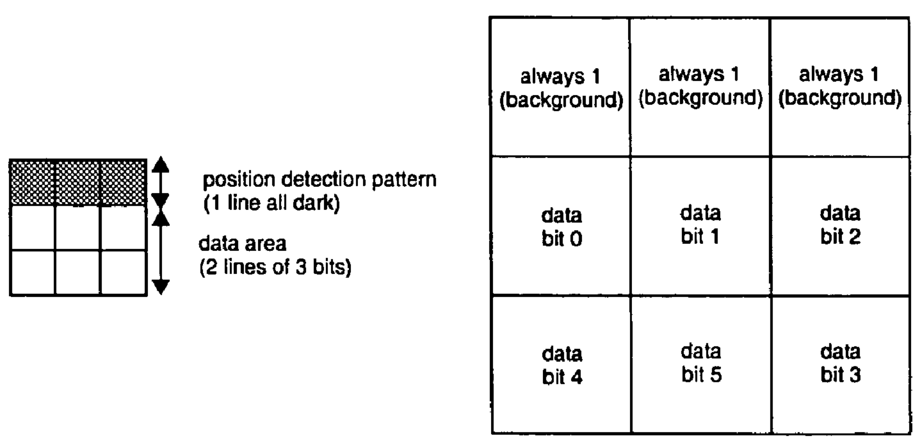
Figure 199:
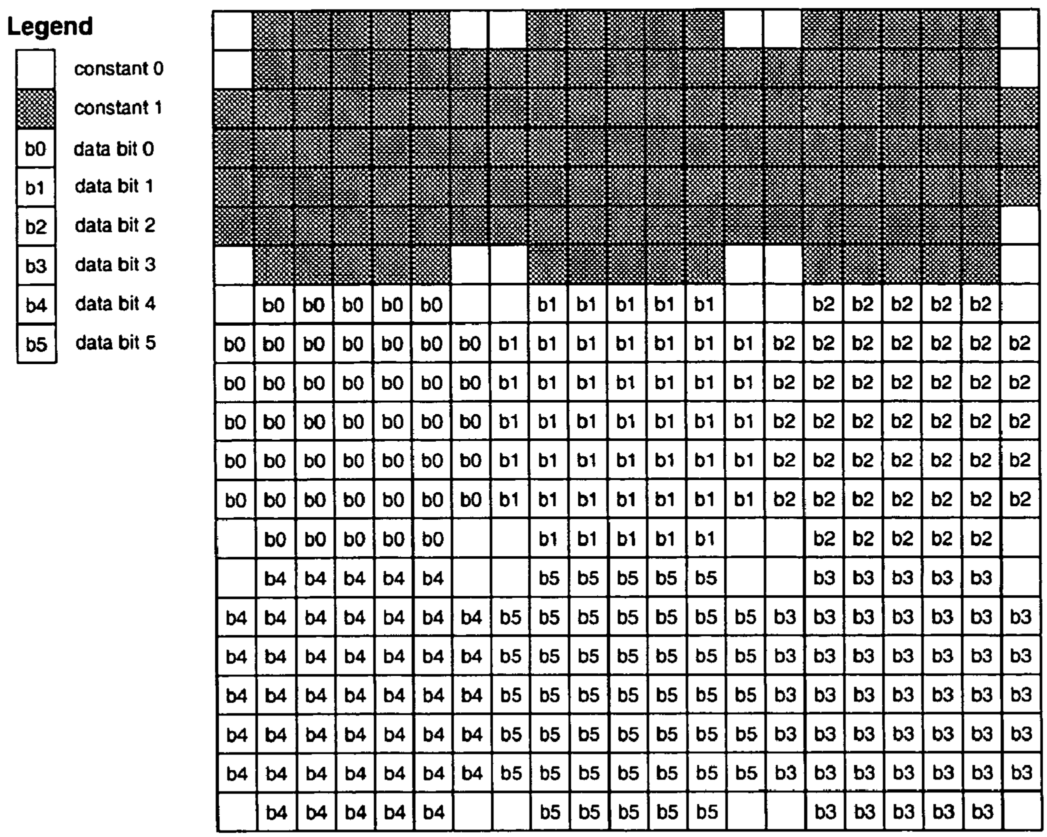
Figure 200:
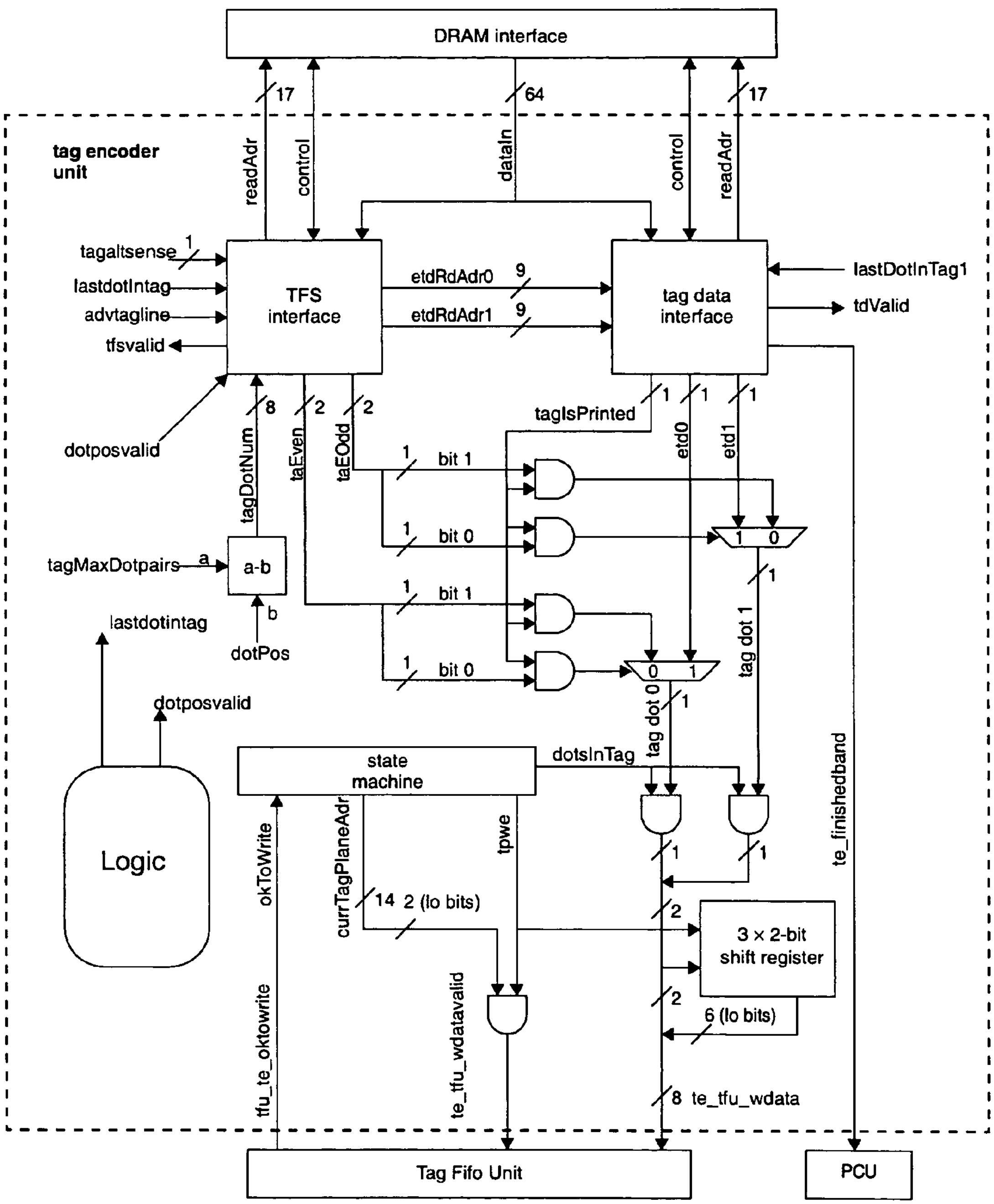

The TFS allows the creation of macrodots instead of simple scaling. Looking at FIG. 198 for a simple example of a 3×3 dot tag, we may want to produce a physically large printed form of the tag, where each of the original dots was represented by 7×7 printed dots. If we simply performed replication by 7 in each dimension of the original TFS, either by increasing the size of the TFS by 7 in each dimension or putting a scale-up on the output of the tag generator output, then we would have 9 sets of 7×7 square blocks. Instead, we can replace each of the original dots in the TFS by a 7×7 dot definition of a rounded dot. FIG. 199 shows the results.

Consequently, the higher the resolution of the TFS the more printed dots can be printed for each macrodot, where a macrodot represents a single data bit of the tag. The more dots that are available to produce a macrodot, the more complex the pattern of the macrodot can be. As an example, FIG. 193 on page 542 shows the Netpage tag structure rendered such that the data bits are represented by an average of 8 dots×8 dots (at 1600 dpi), but the actual shape structure of a dot is not square. This allows the printed Netpage tag to be subsequently read at any orientation.

28.5.2 Raw Tag Data

The TE requires a band of unencoded variable tag data if variable data is to be included in the tag bit-plane. A band of unencoded variable tag data is a set of contiguous unencoded tag data records, in order of encounter top left of printed band from top left to lower right.

An unencoded tag data record is 128 bits arranged as follows: bits 0-111 or 0-119 are the bits of raw tag data, bit 120 is a flag used by the TE (TagIsPrinted), and the remaining 7 bits are reserved (and should be 0). Having a record size of 128 bits simplifies the tag data access since the data of two tags fits into a 256-bit DRAM word. It also means that the flags can be stored apart from the tag data, thus keeping the raw tag data completely unrestricted. If there is an odd number of tags in line then the last DRAM read will contain a tag in the first 128 bits and padding in the final 128 bits.

The TagIsPrinted flag allows the effective specification of a tag resolution mask over the page. For each tag position the TagIsPrinted flag determines whether any of the tag is printed or not. This allows arbitrary placement of tags on the page. For example, tags may only be printed over particular active areas of a page. The TagIsPrinted flag allows only those tags to be printed. TagIsPrinted is a 1 bit flag with values as shown in Table 170.

TABLE 170

| TagIsPrinted values | |
|---|---|
| value | description |
| 0 | Don't print the tag in this tag position. Output 0 for each dot within the tag bounding box. |
| 1 | Print the tag as specified by the various tag structures. |

28.5.3 DRAM Storage Requirements

The total DRAM storage required by a single band of raw tag data depends on the number of tags present in that band. Each tag requires 128 bits. Consequently if there are N tags in the band, the size in DRAM is 16N bytes.

The maximum size of a line of tags is 163×128 bits. When maximally packed, a row of tags contains 163 tags (see Table 169) and extends over a minimum of 126 print lines. This equates to 282 KBytes over a Letter page.

The total DRAM storage required by a single TFS is TagHeight/7 KBytes (including padding). Since the likely maximum value for TagHeight is 384 (given that SoPEC restricts TagWidth to 384), the maximum size in DRAM for a TFS is 55 KBytes.

28.5.4 DRAM Access Requirements

The TE has two separate read interfaces to DRAM for raw tag data, TD, and tag format structure, TFS.

The memory usage requirements are shown in Table 171. Raw tag data is stored in the compressed page store

TABLE 171

| Memory usage requirements | | |
|---|---|---|
| Block | Size | Description |
| Compressed page store | 2048 Kbytes | Compressed data page store for Bi-level, contone and raw tag data. |
| Tag Format Structure | 55 Kbyte (384 dot line tags @ 1600 dpi) | 55 kB in PEC1 for 384 dot line tags (the benchmark) at 1600 dpi 2.5 mm tags (1/10th inch) @ 1600 dpi require 160 dot lines = 160/384 × 55 or 23 kB 2.5 mm tags @ 800 dpi require 80/384 × 55 = 12 kB |

The TD interface will read 256-bits from DRAM at a time. Each 256-bit read returns 2 times 128-bit tags. The TD interface to the DIU will be a 256-bit double buffer. If there is an odd number of tags in line then the last DRAM read will contain a tag in the first 128 bits and padding in the final 128 bits.

The TFS interface will also read 256-bits from DRAM at a time. The TFS required for a line is 136 bytes. A total of 5 times 256-bit DRAM reads is required to read the TFS for a line with 192 unused bits in the fifth 256-bit word. A 136-byte double-line buffer will be implemented to store the TFS data.

The TE's DIU bandwidth requirements are summarized in Table 172.

TABLE 172

| DRAM bandwidth requirements | | | | |
|---|---|---|---|---|
| Block Name | Direction | Maximum number of cycles between each 256-bit DRAM access | Peak Bandwidth (bits/cycle) | Average Bandwidth (bits/cycle) |
| TD | Read | Single 256 bit reads[1]. | 1.02 | 1.02 |
| TFS | Read | Single 256 bit reads[2]. TFS is 136 bytes. This means there is unused data in the fifth 256 bit read. A total of 5 reads is required. | 0.093 | 0.093 |

[1]Each 2 mm tag lasts 126 dot cycles and requires 128 bits. This is a rate of 256 bits every 252 cycles.
[2]17 × 64 bit reads per line in PEC1 is 5 × 256 bit reads per line in SoPEC with unused bits in the last 256-bit read.

28.5.5 TD and TFS Bandstore Wrapping

Both TD and TFS storage in DRAM can wrap around the bandstore area. The bounds of the band store are defined by the TeStartofBandStore and TeEndofBandStore registers in Table 174. The TD and TFS DRAM interfaces therefore support bandstore wrapping. If the TD or TFS DRAM interface increments an address it is checked to see if it matches the end of bandstore address. If so, then the address is mapped to the start of the bandstore.

28.5.6 Tag Sizes

SoPEC allows for tags to be between 0 to 384 dots. A typical 2 mm tag requires 126 dots. Short tags do not change the internal bandwidth or throughput behaviours at all. Tag height is specified so as to allow the DRAM storage for raw tag data to be specified. Minimum tag width is a condition imposed by throughput limitations, so if the width is too small TE cannot consistently produce 2 dots per cycle across several tags (also there are raw tag data bandwidth implications). Thinner tags still work, they just take longer and/or need scaling.

28.6 Implementation 28.6.1 Tag Encoder Architecture

A block diagram of the TE can be seen below.

The TE writes lines of bi-level tag plane data to the TFU for later reading by the HCU. The TE is responsible for merging the encoded tag data with the tag structure (interpreted from the TFS). Y-integer scaling of tags is performed in the TE with X-integer scaling of the tags performed in the TFU. The encoded tag layer is generated 2 bits at a time and output to the TFU at this rate. The HCU however only consumes 1 bit per cycle from the TFU. The TE must provide support for 126 dot Tags (2 mm densely packed) with 108 Tags per line with 128 bits per tag.

The tag encoder consists of a TFS interface that loads and decodes TFS entries, a tag data interface that loads tag raw data, encodes it, and provides bit values on request, and a state machine to generate appropriate addressing and control signals. The TE has two separate read interfaces to DRAM for raw tag data, TD, and tag format structure, TFS.

28.6.2 Y-Scaling Output Lines

In order to support scaling in the Y direction the following modifications to the PEC1 TE are made to the Tag Data Interface, Tag Format Structure Interface and TE Top Level:

for Tag Data Interface: program the configuration registers of Table 174, firstTagLineHeight and tagMaxLine with true value i.e. not multiplied up by the scale factor YScale. Within the Tag Data interface there are two counters, countx and county that have a direct bearing on the rawTagDataAddr generation. countx decrements as tags are read from DRAM. It is reset to NumTags[RtdTagSense] at start of each line of tags. county is decremented as each line of tags is completely read from DRAM i.e. countx=0. Scaling may be performed by counting the number of times countx reaches zero and only decrementing county when this number reaches YScale. This will cause the TagData Interface to read each line of tag data NumTags[RtdTagSense]*YScale times.

for Tag Format Structure Interface: The implication of Y-scaling for the TFS is that each Tag Line Structure is used YScale times. This may be accomplished in the following way:

Fetch each TagLineStructure YScale times. This solution involves controlling the activity of currTfsAddr with YScale. In SoPEC the TFS must supply five addresses to the DIU to read each individual Tag Line Structure. The DIU returns 4*64-bit words for each of the 5 accesses. This is different from the behaviour in PEC1, where one address is given and 17 data-words were returned by the DIU. Since the behaviour of the currTfsAddr must be changed to meet the requirements of the SoPEC DIU it makes sense to include the Y-Scaling into this change i.e. a count of the number of completed sets of 5 accesses to the DIU is compared to YScale. Only when this count equals YScale can currTfsAddr be loaded with the base address of the next lines Tag Line Structure in DRAM, otherwise it is re-loaded with the base address of the current lines Tag Line Structure in DRAM.

Figure 201:
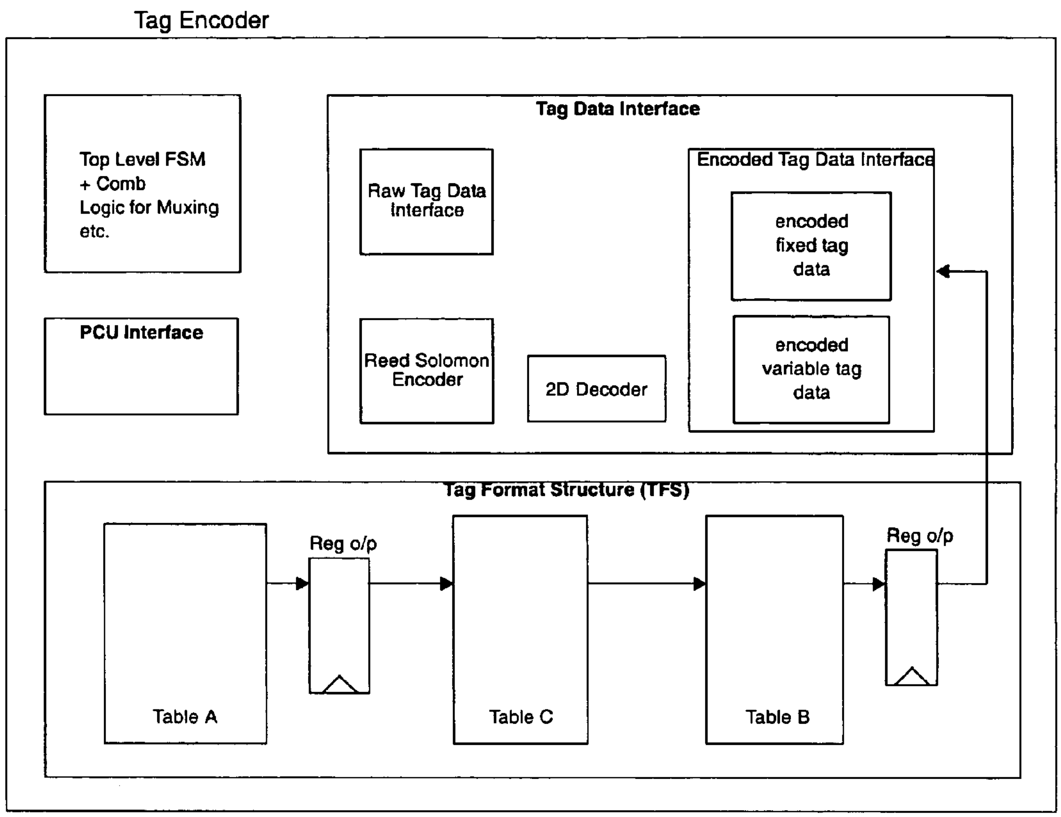
Figure 202:
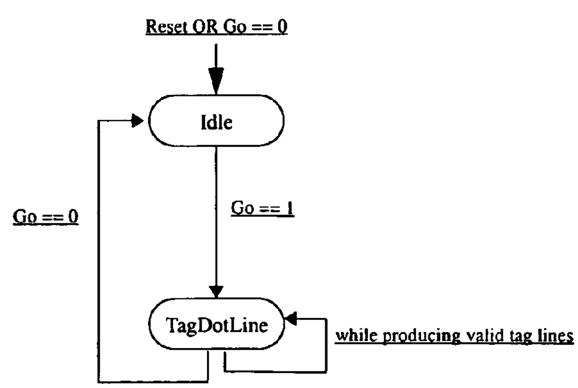

For Top Level: The Top Level of the TE has a counter, LinePos, which is used to count the number of completed output lines when in a tag gap or in a line of tags. At the start (i.e. top-left hand dot-pair) of a gap or tag LinePos is loaded with either TagGapLine or TagMaxLine. The value of LinePos is decremented at last dot-pair in line. Y-Scaling may be accomplished by gating the decrement of LinePos based on YScale value 28.6.3 TE Physical Hierarchy FIG. 201 above illustrates the structural hierarchy of the TE. The top level contains the Tag Data Interface (TDI), Tag Format Structure (TFS), and an FSM to control the generation of dot pairs along with a block to carry out the PCU read/write decoding. There is also some additional logic for muxing the output data and generating other control signals.

At the highest level, the TE state machine processes the output lines of a page one line at a time, with the starting position either in an inter-tag gap or in a tag (a SoPEC may be only printing part of a tag due to multiple SoPECs printing a single line).

If the current position is within an inter-tag gap, an output of 0 is generated. If the current position is within a tag, the tag format structure is used to determine the value of the output dot, using the appropriate encoded data bit from the fixed or variable data buffers as necessary. The TE then advances along the line of dots, moving through tags and inter-tag gaps according to the tag placement parameters.

There are three stalling mechanisms that can halt the dot pipeline:

- tfu_te_oktowrite is deasserted (stalling back from the TFU block);
- tfsvalid is deasserted whilst processing a tag (stalling from the TFS DRAM interface);
- tdvalid is deasserted whilst processing a tag (stalling from the TD DRAM interface).

If any of these three stalling events occurs the dot pipeline is completely stalled and will only start up again when all three signals are active (high).

28.6.4 IO Definitions

TABLE 173

TE Port List

| Port Name | Pins | I/O | Description |
|---|---|---|---|
| | | | Clocks and Resets |
| pclk | 1 | In | SoPEC Functional clock. |
| prst_n | 1 | In | Global reset signal. |
| | | | Bandstore Signals |
| te_finishedband | 1 | Out | TE finished band signal to PCU and ICU. |
| | | | PCU Interface data and control signals |
| pcu_addr[8:2] | 7 | In | PCU address bus. 7 bits are required to decode the address space for this block. |
| pcu_dataout[31:0] | 32 | In | Shared write data bus from the PCU. |
| te_pcu_datain[31:0] | 32 | Out | Read data bus from the TE to the PCU. |
| pcu_rwn | 1 | In | Common read/not-write signal from the PCU. |
| pcu_te_sel | 1 | In | Block select from the PCU. When pcu_te_sel is high both pcu_addr and pcu_dataout are valid. |
| te_pcu_rdy | 1 | Out | Ready signal to the PCU. When te_pcu_rdy is high it indicates the last cycle of the access. For a write cycle this means pcu_dataout has been registered by the block and for a read cycle this means the data on te_pcu_datain is valid. |
| | | | TD (raw Tag Data) DIU Read Interface signals |
| td_diu_rreq | 1 | Out | TD requests DRAM read. A read request must be accompanied by a valid read address. |

TABLE 173-continued

TE Port List

| Port Name | Pins | I/O | Description |
|---|---|---|---|
| td_diu_radr[21:5] | 17 | Out | TD read address to DIU. 17 bits wide (256-bit aligned word). |
| diu_td_rack | 1 | In | Acknowledge from DIU that TD read request has been accepted and new read address can be placed on te_diu_radr. |
| diu_data[63:0] | 64 | In | Data from DIU to TE. First 64-bits are bits 63:0 of 256 bit word; Second 64-bits are bits 127:64 of 256 bit word; Third 64-bits are bits 191:128 of 256 bit word; Fourth 64-bits are bits 255:192 of 256 bit word. |
| diu_td_rvalid | 1 | In | Signal from DIU telling TD that valid read data is on the diu_data bus. |
| TFS (Tag Format Structure) DIU Read Interface signals | | | |
| tfs_diu_rreq | 1 | Out | TFS requests DRAM read. A read request must be accompanied by a valid read address. |
| tfs_diu_radr[21:5] | 17 | Out | TFS Read address to DIU 17 bits wide (256-bit aligned word). |
| diu_tfs_rack | 1 | In | Acknowledge from DIU that TFS read request has been accepted and new read address can be placed on tfs_diu_radr. |
| diu_data[63:0] | 64 | In | Data from DIU to TE. First 64-bits are bits 63:0 of 256 bit word; Second 64-bits are bits 127:64 of 256 bit word; Third 64-bits are bits 191:128 of 256 bit word; Fourth 64-bits are bits 255:192 of 256 bit word. |
| diu_tfs_rvalid | 1 | In | Signal from DIU telling TFS that valid read data is on the diu_data bus. |
| TFU Interface data and control signals | | | |
| tfu_te_oktowrite | 1 | In | Ready signal indicating TFU has space available and is ready to be written to. Also asserted from the point that the TFU has received its expected number of bytes for a line until the next te_tfu_wradvline |
| te_tfu_wdata[7:0] | 8 | Out | Write data for TFU. |
| te_tfu_wdatavalid | 1 | Out | Write data valid signal. This signal remains high whenever there is valid output data on te_tfu_wdata |
| te_tfu_wradvline | 1 | Out | Advance line signal strobed when the last byte in a line is placed on te_tfu_wdata |

28.6.4

28.6.5 Configuration Registers

The configuration registers in the TE are programmed via the PCU interface. Refer to section 23.8.2 on page 439 for the description of the protocol and timing diagrams for reading and writing registers in the TE. Note that since addresses in SoPEC are byte aligned and the PCU only supports 32-bit register reads and writes the lower 2 bits of the PCU address bus are not required to decode the address space for the TE. Table 174 lists the configuration registers in the TE.

Registers which address DRAM are 256-bit word aligned.

TABLE 174

TE Configuration Registers

| Address TE_base+ | register name | #bits | value on reset | description |
|---|---|---|---|---|
| Control registers | | | | |
| 0x000 | Reset | 1 | 1 | A write to this register causes a reset of the TE. This register can be read to indicate the reset state: 0 - reset in progress 1 - reset not in progress |
| 0x004 | Go | 1 | 0 | Writing 1 to this register starts the TE. Writing 0 to this register halts the TE. When Go is deasserted the state-machines go to their idle states but all counters and configuration registers keep |

TABLE 174-continued

| Address TE_base+ | register name | #bits | value on reset | description |
|---|---|---|---|---|
| TE Configuration Registers | | | | |
| | | | | their values. When Go is asserted all counters are reset, but configuration registers keep their values (i.e. they don't get reset). NextBandEnable is cleared when Go is asserted. The TFU must be started before the TE is started. This register can be read to determine if the TE is running (1 = running, 0 = stopped). |
| Setup registers (constant for processing of a page) | | | | |
| 0x040 | TfsStartAdr[21:5] (256-bit aligned DRAM address) | 17 | 0 | Points to the first word of the first TFS line in DRAM. |
| 0x044 | TfsEndAdr[21:5] (256-bit aligned DRAM address) | 17 | 0 | Points to the last word of the last TFS line in DRAM. |
| 0x048 | TfsFirstLineAdr[21:5] (256-bit aligned DRAM address) | 17 | 0 | Points to the first word of the first TFS line to be encountered on the page. If the start of the page is in an inter-tag gap, then this value will be the same as TFSStartAdr since the first tag line reached will be the top line of a tag. |
| 0x04C | DataRedun | 1 | 0 | Defines the data to redundancy ratio for the Reed Solomon encoder. Symbol size is always 4 bits, Codeword size is always 15 symbols (60 bits).<br>0 - 5 data symbols (20 bits), 10 redundancy symbols (40 bits)<br>1 - 7 data symbols (28 bits), 8 redundancy symbols (32 bits) |
| 0x050 | Decode2Den | 1 | 0 | Determines whether or not the data bits are to be 2D decoded rather than redundancy encoded (each 2 bits of the data bits becomes 4 output data bits).<br>0 = redundancy encode data<br>1 = decode each 2 bits of data into 4 bits |
| 0x054 | VariableDataPresent | 1 | 0 | Defines whether or not there is variable data in the tags. If there is none, no attempt is made to read tag data, and tag encoding should only reference fixed tag data. |
| 0x058 | EncodeFixed | 1 | 0 | Determines whether or not the lower 40 (or 56) bits of fixed data should be encoded into 120 bits or simply used as is. |
| 0x05C | TagMaxDotpairs | 8 | 0 | The width of a tag in dot-pairs, minus 1.<br>Minimum 0, Maximum = 191. |
| 0x060 | TagMaxLine | 9 | 0 | The number of lines in a tag, minus 1.<br>Minimum 0, Maximum = 383. |
| 0x064 | TagGapDot | 14 | 0 | The number of dot pairs between tags in the dot dimension minus 1.<br>Only valid if TagGapPresent[bit 0] = 1. |
| 0x068 | TagGapLine | 14 | 0 | Defines the number of dotlines between tags in the line dimension minus 1. |

TABLE 174-continued

| Address TE_base+ | register name | #bits | value on reset | description |
|---|---|---|---|---|
| | TE Configuration Registers | | | |
| | | | | Only valid if TagGapPresent[bit1] = 1. |
| 0x06C | DotPairsPerLine | 14 | 0 | Number of output dot pairs to generate per tag line. |
| 0x070 | DotStartTagSense | 2 | 0 | Determines for the first/even (bit 0) and second/odd (bit 1) rows of tags whether or not the first dot position of the line is in a tag. 1 = in a tag, 0 = in an inter-tag gap. |
| 0x074 | TagGapPresent | 2 | 0 | Bit 0 is 1 if there is an inter-tag gap in the dot dimension, and 0 if tags are tightly packed. Bit 1 is 1 if there is an inter-tag gap in the line dimension, and 0 if tags are tightly packed. |
| 0x078 | Yscale | 8 | 1 | Tag scale factor in Y direction. Output lines to the TFU will be generated YScale times. |
| 0x080 to 0x084 | DotStartPos[1:0] | 2x14 | 0 | Determines for the first/even (0) and second/odd (1) rows of tags the number of dotpairs remaining minus 1, in either the tag or inter-tag gap at the start of the line. |
| 0x088 to 0x08C | NumTags[1:0] | 2x8 | 0 | Determines for the first/even and second/odd rows of tags how many tags are present in a line (equals number of tags minus 1). |
| | Setup band related registers | | | |
| 0x0C0 | NextBandStartTagDataAdr[21:5] (256-bit aligned DRAM address) | 17 | 0 | Holds the value of StartTagDataAdr for the next band. This value is copied to StartTagDataAdr when DoneBand is 1 and NextBandEnable is 1, or when Go transitions from 0 to 1. |
| 0x0C4 | NextBandEndOfTagData[21:5] (256-bit aligned DRAM address) | 17 | 0 | Holds the value of EndOfTagData for the next band. This value is copied to EndOfTagData when DoneBand is 1 and NextBandEnable is 1, or when Go transitions from 0 to 1. |
| 0x0C8 | NextBandFirstTagLineHeight | 9 | 0 | Holds the value of FirstTagLineHeight for the next band. This value is copied to FirstTagLineHeight when DoneBand gets is 1 and NextBandEnable is 1, or when Go transitions from 0 to 1. |
| 0x0CC | NextBandEnable | 1 | 0 | When NextBandEnable is 1 and DoneBand is 1, then when te_finishedband is set at the end of a band: NextBandStartTagDataAdr is copied to StartTagDataAdr NextBandEndOfTagData is copied to EndOfTagData NextBandFirstTagLineHeight is copied to FirstTagLineHeight DoneBand is cleared NextBandEnable is cleared. NextBandEnable is cleared when Go is asserted. |
| | Read-only band related registers | | | |
| 0x0D0 | DoneBand | 1 | 0 | Specifies whether the tag data interface has finished loading all the tag data for the band. |

TABLE 174-continued

TE Configuration Registers

| Address TE_base+ | register name | #bits | value on reset | description |
|---|---|---|---|---|
| | | | | It is cleared to 0 when Go transitions from 0 to 1. When the tag data interface has finished loading all the tag data for the band, the te_finishedband signal is given out and the DoneBand flag is set. If NextBandEnable is 1 at this time then startTagDataAdr, endOfTagData and firstTaglineHeight are updated with the values for the next band and DoneBand is cleared. Processing of the next band starts immediately. If NextBandEnable is 0 then the remainder of the TE will continue to run, while the read control unit waits for NextBandEnable to be set before it restarts. Read only. |
| 0x0D4 | StartTagDataAdr[21:5] (256-bit aligned DRAM address) | 17 | 0 | The start address of the current row of raw tag data. This is initially points to the first word of the band's tag data. Read only. |
| 0x0D8 | EndOfTagData[21:5] (256-bit aligned DRAM address) | 17 | 0 | Points to the address of the final tag for the band. When all the tag data up to and including address endOfTagData has been read in, the te_finishedband signal is given and the doneBand flag is set. Read only. |
| 0x0DC | FirstTagLineHeight | 9 | 0 | The number of lines minus 1 in the first tag encountered in this band. This will be equal to TagMaxLine if the band starts at a tag boundary. Read only. |
| | Setup registers (remain constant during the processing of multiple bands) | | | |
| 0x0E0 | TeStartOfBandStore[21:5] | 17 | 0x0_0000 | Points to the 256-bit word that defines the start of the memory area allocated for TE page bands. Circular address generation wraps to this start address. |
| 0x0E4 | TeEndOfBandStore[21:5] | 17 | 0x1_FFFF | Points to the 256-bit word that defines the last address of the memory area allocated for TE page bands. If the current read address is from this address, then instead of adding 1 to the current address, the current address will be loaded from the TeStartOfBandStore register. |
| | Work registers (set before starting the TE and must not be touched between bands) | | | |
| 0x100 | LineInTag | 1 | 0 | Determines whether or not the first line of the page is in a line of tags or in an inter-tag gap. 1 - in a tag, 0 - in an inter-tag gap. |
| 0x104 | LinePos | 14 | 0 | The number of lines remaining minus 1, in either the tag or the inter-tag gap in at the start of the page. |

TABLE 174-continued

TE Configuration Registers

| Address TE_base+ | register name | #bits | value on reset | description |
|---|---|---|---|---|
| 0x110 to 0x11C | TagData[3:0] | 4x32 | 0 | This 128 bit register must be set up initially with the fixed data record for the page. This is either the lower 40 (or 56) bits (and the encodeFixed register should be set), or the lower 120 bits (and encodedFixed should be clear). The tagData[0] register contains the lower 32 bits and the tagData[3] register contains the upper 32 bits. This register is used throughout the tag encoding process to hold the next tag's variable data. |
| Work registers (set internally) Read-only from the point of view of PCU register access | | | | |
| 0x140 | DotPos | 14 | 0 | Defines the number of dotpairs remaining in either the tag or inter-tag gap. Does not need to be setup. |
| 0x144 | CurrTagPlaneAdr | 14 | 0 | The dot-pair number being generated. |
| 0x148 | DotsInTag | 1 | 0 | Determines whether the current dot pair is in a tag or not<br>1 - in a tag, 0 - in an inter-tag gap. |
| 0x14C | TagAltSense | 1 | 0 | Determines whether the production of output dots is for the first (and subsequent even) or second (and subsequent odd) row of tags. |
| 0x154 | CurrTFSAdr[21:5] (256-bit aligned DRAM address) | 17 | 0 | Points to the next 256 bit word of the TFS to be read in. |
| 0x15C | CountX | 8 | 0 | The number of tags read by the raw tag data interface for the current line. |
| 0x160 | CountY | 9 | 0 | The number of times (minus 1) the tag data for the current line of tags needs to be read in by the raw tag data interface. |
| 0x164 | RtdTagSense | 1 | 0 | Determines whether the raw tag data interface is currently reading even rows of tags (=0) or odd rows of tags (=1) with respect to the start of the page. Note that this can be different from tagAltSense since the raw tag data interface is reading ahead of the production of dots. |
| 0x168 | RawTagDataAdr[21:5] (256-bit aligned DRAM address) | 17 | 0 | The current read address within the unencoded raw tag data. |

28.6.5.1 Starting the TE and Restarting the TE Between Bands

The TE must be started after the TFU.

For the first band of data, users set up NextBandStartTagDataAdr, NextBandEndTagData and NextBandFirstTagLineHeight as well as other TE configuration registers. Users then set the TE's Go bit to start processing of the band. When the tag data for the band has finished being decoded, the te_finishedband interrupt will be sent to the PCU and ICU indicating that the memory associated with the first band is now free. Processing can now start on the next band of tag data.

In order to process the next band NextBandStartTagDataAdr, NextBandEndTagData and NextBandFirstTagLineHeight need to be updated before writing a 1 to NextBandEnable. There are 4 mechanisms for restarting the TE between bands:

a. te_finishedband causes an interrupt to the CPU. The TE will have set its DoneBand bit. The CPU reprograms the NextBandStartTagDataAdr, NextBandEndTagData and NextBandFirstTagLineHeight registers, and sets NextBandEnable to restart the TE.

b. The CPU programs the TE's NextBandStartTagDataAdr, NextBandEndTagData and NextBandFirstTagLineHeight registers and sets the NextBandEnable flag before the end of the current band. At the end of the current band the TE sets DoneBand As NextBandEnable is already 1, the TE starts processing the next band immediately.

c. The PCU is programmed so that te_finishedband triggers the PCU to execute commands from DRAM to reprogram the NextBandStartTagDataAdr, NextBandEndTagData and NextBandFirstTagLineHeight registers and set the NextBandEnable bit to start the TE processing the next band. The advantage of this scheme is that the CPU could process band headers in advance and store the band commands in DRAM ready for execution.

d. This is a combination of b and c above. The PCU (rather than the CPU in b) programs the TE's NextBandStartTagDataAdr, NextBandEndTagData and NextBandFirstTagLineHeight registers and sets the NextBandEnable bit before the end of the current band. At the end of the current band the TE sets DoneBand and pulses te_finishedband. As NextBandEnable is already 1, the TE starts processing the next band immediately. Simultaneously, te_finishedband triggers the PCU to fetch commands from DRAM. The TE will have restarted by the time the PCU has fetched commands from DRAM. The PCU commands program the TE next band shadow registers and sets the NextBandEnable bit.

After the first tag on the page, all bands have their first tag start at the top i.e. NextBandFirstTagLineHeight=TagMaxLine. Therefore the same value of NextBandFirstTagLineHeight will normally be used for all bands. Certainly, NextBandFirstTagLineHeight should not need to change after the second time it is programmed.

28.6.6 TE Top Level FSM

The following diagram illustrates the states in the FSM.

At the highest level, the TE state machine steps through the output lines of a page one line at a time, with the starting position either in an inter-tag gap (signal dotsintag=0) or in a tag (signals tfsvalid and tdvalid and lineintag=1) (a SoPEC may be only printing part of a tag due to multiple SoPECs printing a single line).

If the current position is within an inter-tag gap, an output of 0 is generated. If the current position is within a tag, the tag format structure is used to determine the value of the output dot, using the appropriate encoded data bit from the fixed or variable data buffers as necessary. The TE then advances along the line of dots, moving through tags and inter-tag gaps according to the tag placement parameters.

Table 175 highlights the signals used within the FSM.

TABLE 175

Signals used within TE top level FSM

| Signal Name | Function |
|---|---|
| pclk | Sync clock used to register all data within the FSM |
| prst__n, te__reset | Reset signals |
| advtagline | 1 cycles pulse indicating to TDI and TFS sub-blocks to move onto the next line of Tag data |
| currdotlineadr[13:0] | Address counter starting 2 pclk ahead of currtagplaneadr to generate the correct dotpair for the current line |
| dotpos | Counter to identify how many dotpairs wide the tag/gap is |
| dotsintag | Signal identifying whether the dotpair are in a tag(1)/gap(0) |
| lineintag__temp | Identical to lineintag but generated 1 pclk earlier |
| linepos__shadow | Shadow register for linepos due to linepos being written to by 2 different processes |
| tagaltsense | Flag which alternates between tag/gap lines |
| te__state | FSM state variable |
| Teplanebuf | 6-bit shift register used to format dotpairs into a byte for the TFU |
| Wradvline | Advance line signal strobed when the last byte in a line is placed on te__tfu__wdata |

The tag_dot_line_state can be broken down into 3 different stages.

Stage1:—The state tag_dot_line is entered due to the go signal becoming active. This state controls the writing of dotbytes to the TFU. As long as the tag line buffer address is not equal to the dotpairsperline register value and tfu_te_oktowrite is active, and there is valid TFS and TD available or taggaps, dotpairs are buffered into bytes and written to the TFU. The tag line buffer address is used internally but not supplied to the TFU since the TFU is a FIFO rather than the line store used in PEC1.

While generating the dotline of a tag/gap line (lineintag flag=1) the dot position counter dotpos is decremented/reloaded (with tagmaxdotpairs or taggapdot) as the TE moves between tags/gaps. The dotsintag flag is toggled between tags/gaps (0 for a gap, 1 for a tag). This pattern continues until the end of a dotline approaches (currdotlineadr==dotpairsperline).

Stage2:—At this point the end of a dot line is reached so it is time to decrement the linepos counter if still in a tag/gap row or reload the linepos register, dotpos counter and reprogram the dotsintag flag if going onto another tag/gap or pure gap row. When dotpos=0 the end of a tag/gap has been reached, when linepos=0 the end of a tag row is reached.

Stage3:—This stage implements the writing of dotpairs to the correct part of the 6-bit shift register based on the LSBs of currtagplaneadr and also implements the counter for the currtagplaneadr. The currtagplaneadr is reset on reaching currtagplaneadr=(dotpairsperline−1).

28.6.7 Combinational Logic

The TDI is responsible for providing the information data for a tag while the TFSI is responsible for deciding whether a particular dot on the tag should be printed as background pattern or tag information. Every dot within a tag's boundary is either an information dot or part of the background pattern.

The resulting lines of dots are stored in the TFU.

The TFSI reads one Tag Line Structure (TLS) from the DIU for every dot line of tags. Depending on the current printing position within the tag (indicated by the signal tagdotnum), the TFS interface outputs dot information for two dots and if necessary the corresponding read addresses for encoded tag data. The read address are supplied to the TDI which outputs the corresponding data values.

Figure 203:
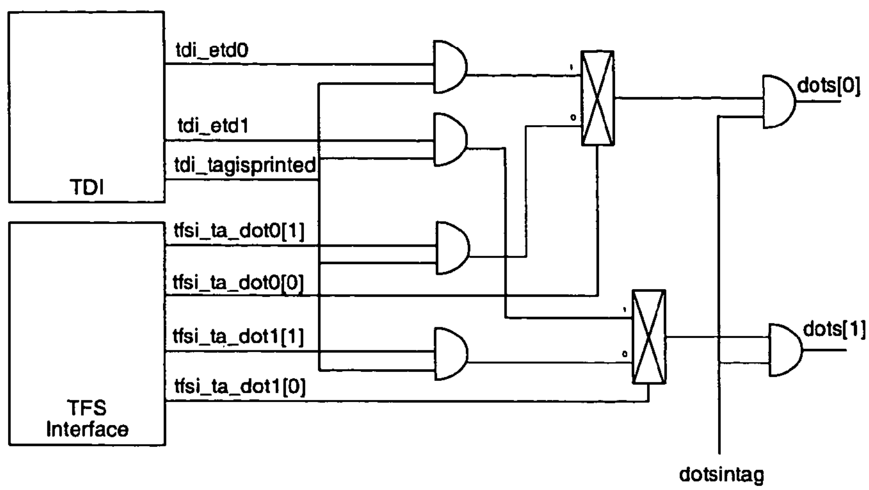
Figure 204:
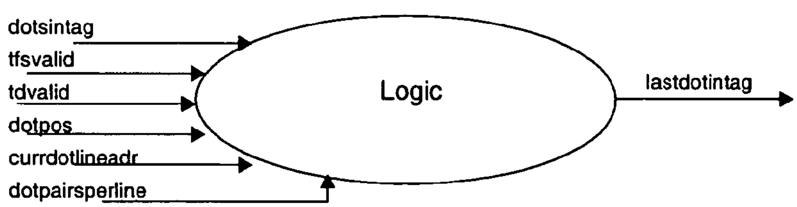
Figure 205:
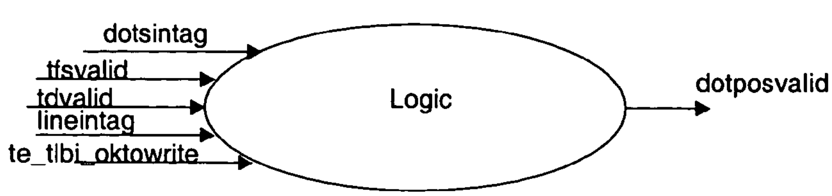
Figure 206:
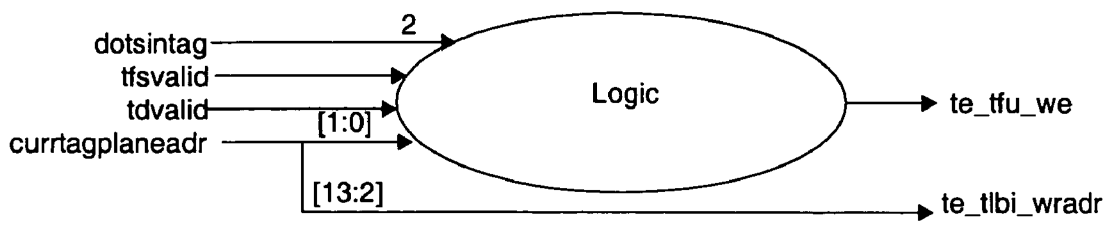
Figure 207:
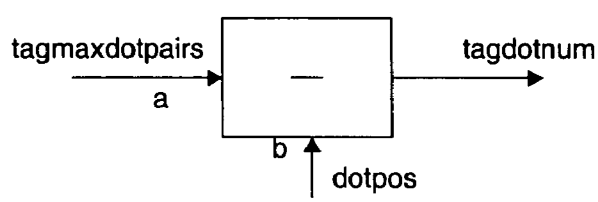

These data values (tdi_etd0 and tdi_etd1) are then combined with the dot information (tfsi_ta_dot0 and tfsi_ta_dot1) to produce the dot values that will actually be printed on the page (dots), see FIG. 203.

The signal lastdotintag is generated by checking that the dots are in a tag (dotsintag=1) and that the dotposition counter dotpos is equal to zero. It is also used by the TFS to load the index address register with zeros at the end of a tag as this is always the starting index when going from one tag to the next. lastdotintag is also used in the TDi FSM (etd_switch state) to pulse the etd_advtag signal hence switching buffers in the ETDi for the next tag.

The dotposvalid signal is created based on being in a tag line (lineintag1=1), dots being in a tag (dotsintag=1), having a valid tag format structure available (tfsvalid=1) and having encoded tag data available (tdvalid1=1). The dotposvalid signal is used as an enable to load the Table C address register with the next index into Table B which in turn provides the 2 addresses to make 2 dots available.

The signal te_tfu_wdatavalid can only be active if in a taggap or if valid tag data is available (tdvalid and tfsvalid) and the currtagpplaneadr(1:0) equal 11 i.e. a byte of data has been generated by combining four dotpairs.

The signal tagdotnum tells the TFS how many dotpairs remain in a tag/gap. It is calculated by subtracting the value in the dotpos counter from the value programmed in the tagmaxdotpairs register.

28.7 Tag Data Interface (TDI)

28.7.1 I/O Specification

TABLE 176

TDI Port List

| signal name | I/O | Description |
|---|---|---|
| **Clocks and Resets** | | |
| Pclk | In | SoPEC system clock |
| prst_n | In | Active-low, synchronous reset in pclk domain. |
| **DIU Read Interface Signals** | | |
| diu_data[63:0] | In | Data from DRAM. |
| td_diu_rreq | Out | Data request to DRAM. |
| td_diu_radr[21:5] | Out | Read address to DRAM. |
| diu_td_rack | In | Data acknowledge from DRAM. |
| diu_td_rvalid | In | Data valid signal from DRAM. |
| **PCU Interface Data, Control Signals and** | | |
| pcu_dataout[31:0] | In | PCU writes this data. |
| pcu_addr[8:2] | In | PCU accesses this address. |
| pcu_rwn | In | Global read/write-not signal from PCU. |
| pcu_te_sel | In | PCU selects TE for r/w access. |
| pcu_te_reset | In | PCU reset. |
| td_te_doneband | Out | PCU readable registers. |
| td_te_dataredun | | |
| td_te_decode2den | | |
| td_te_variabledatapresent | | |
| td_te_encodefixed | | |
| td_te_numtags0 | | |
| td_te_numtags1 | | |
| td_te_starttagdataadr | | |
| td_te_rawtagdataadr | | |
| td_te_endoftagdata | | |
| td_te_firsttaglineheight | | |
| td_te_tagdata0 | | |
| td_te_tagdata1 | | |
| td_te_tagdata2 | | |
| td_te_tagdata3 | | |
| td_te_countx | | |
| td_te_county | | |
| td_te_rtdtagsense | | |
| td_te_readsremaining | | |
| **TFS (Tag Format Structure)** | | |
| tfsi_adr0[8:0] | In | Read address for dot0 |
| tfsi_adr1[8:0] | In | Read address for dot1 |
| **Bandstore Signals** | | |
| te_endofbandstore[21:5] | In | Address of the end of the current band of data. 256-bit word aligned DRAM address. |
| te_startofbandstore[21:5] | In | Address of the start of the current band of data. 256-bit word aligned DRAM address. |
| te_finishedband | Out | Tag encoder band finished |

28.7.1

28.7.2 Introduction

The tag data interface is responsible for obtaining the raw tag data and encoding it as required by the tag encoder. The smallest typical tag placement is 2 mm×2 mm, which means a tag is at least 126 1600 dpi dots wide.

In PEC1, in order to keep up with the HCU which processes 2 dots per cycle, the tag data interface has been designed to be capable of encoding a tag in 63 cycles. This is actually accomplished in either approximately 52 cycles or 36 cycles within PEC1 depending on the encoding method. For SoPEC the TE need only produce one dot per cycle; it should be able to produce tags in no more than twice the time taken by the PEC1 TE. Moreover, any change in implementation from two dots to one dot per cycle should not lose the 63⁄52 cycle performance edge attained in the PEC1 TE.

Figure 209:
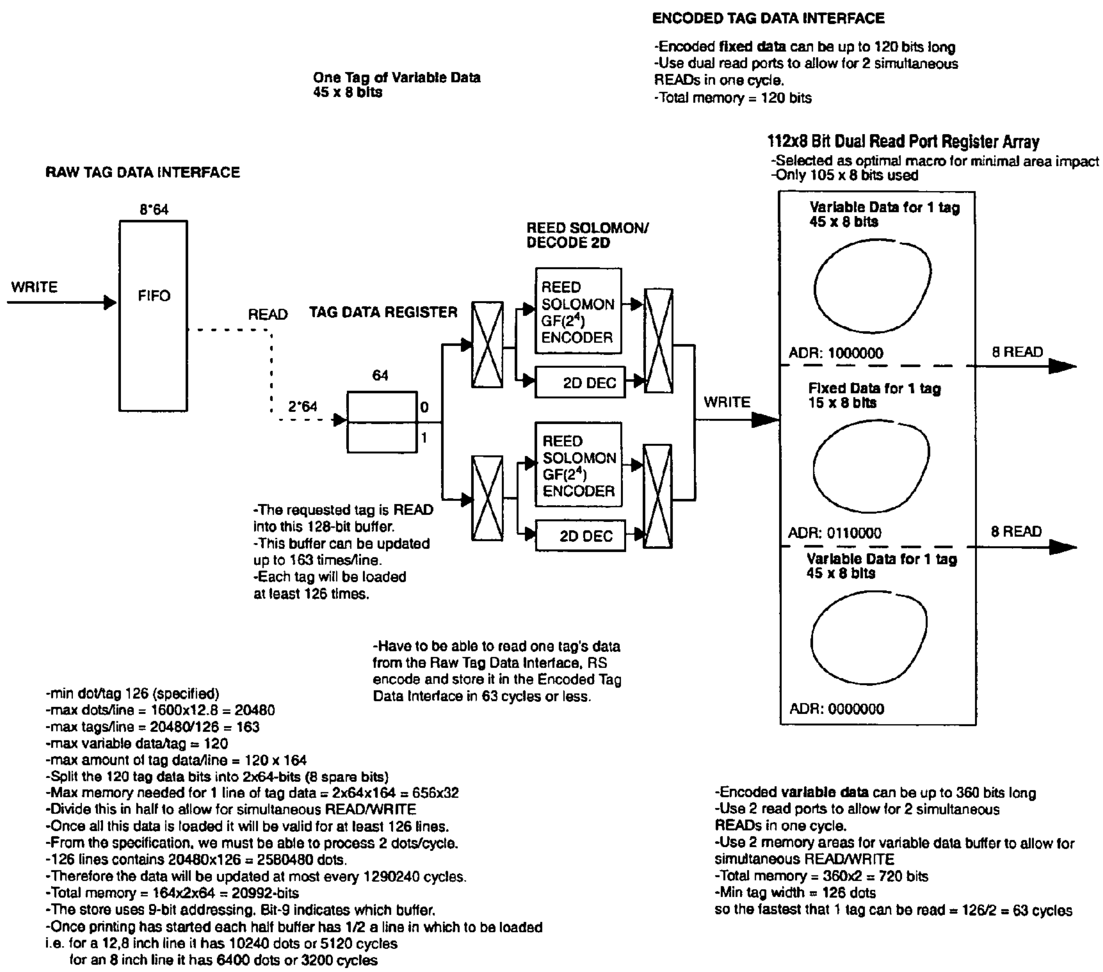

As shown in FIG. 209, the tag data interface contains a raw tag data interface FSM that fetches tag data from DRAM, two symbol-at-a-time $GF(2^4)$ Reed-Solomon encoders, an encoded data interface and a state machine for controlling the encoding process. It also contains a tagData register that needs to be set up to hold the fixed tag data for the page.

The type of encoding used depends on the registers TE_encodefixed, TE_dataredun and TE_decode2den the options being, (15,5) RS coding, where every 5 input symbols are used to produce 15 output symbols, so the output is 3 times the size of the input. This can be performed on fixed and variable tag data.

(15,7) RS coding, where every 7 input symbols are used to produce 15 output symbols, so for the same number of input symbols, the output is not as large as the (15,5)

code (for more details see section 28.7.6 on page 580). This can be performed on fixed and variable tag data.

2D decoding, where each 2 input bits are used to produce 4 output bits. This can be performed on fixed and variable tag data.

no coding, where the data is simply passed into the Encoded Data Interface. This can be performed on fixed data only.

Each tag is made up of fixed tag data (i.e. this data is the same for each tag on the page) and variable tag data (i.e. different for each tag on the page).

Fixed tag data is either stored in DRAM as 120-bits when it is already coded (or no coding is required), 40-bits when (15,5) coding is required or 56-bits when (15,7) coding is required. Once the fixed tag data is coded it is 120-bits long. It is then stored in the Encoded Tag Data Interface.

The variable tag data is stored in the DRAM in uncoded form. When (15,5) coding is required, the 120-bits stored in DRAM are encoded into 360-bits. When (15,7) coding is required, the 112-bits stored in DRAM are encoded into 240-bits. When 2D decoding is required, if DataRedun=0, the 120-bits stored in DRAM are converted into 240-bits, if DataRedun=1 112-bits stored in DRAM are converted to 224. In each case the encoded bits are stored in the Encoded Tag Data Interface.

The encoded fixed and variable tag data are eventually used to print the tag.

The fixed tag data is loaded in once from the DRAM at the start of a page. It is encoded as necessary and is then stored in one of the 8×15-bits registers/RAMs in the Encoded Tag Data Interface. This data remains unchanged in the registers/RAMs until the next page is ready to be processed.

The 120-bits of unencoded variable tag data for each tag is stored in four 32-bit words. The TE re-reads the variable tag data, for a particular tag from DRAM, every time it produces that tag. The variable tag data FIFO which reads from DRAM has enough space to store 4 tags.

28.7.2.1 Bandstore Wrapping

Both TD and TFS storage in DRAM can wrap around the bandstore area. The bounds of the band store are described by inputs from the CDU shown in Table 190. The TD and TFS DRAM interfaces therefore support bandstore wrapping. If the TD or TFS DRAM interface increments an address it is checked to see if it matches the end of bandstore address. If so, then the address is mapped to the start of the bandstore.

28.7.3 Data Flow

An overview of the dataflow through the TDI can be seen in FIG. 209 below.

The TD interface consists of the following main sections:

the Raw Tag Data Interface—fetches tag data from DRAM;

the tag data register;

2 Reed Solomon encoders—each encodes one 4-bit symbol at a time;

the Encoded Tag Data Interface—supplies encoded tag data for output;

Two 2D decoders.

The main performance specification for PEC1 is that the TE must be able to output data at a continuous rate of 2 dots per cycle.

28.7.4 Raw Tag Data Interface

The raw tag data interface (RTDI) provides a simple means of accessing raw tag data in DRAM. The RTDI passes tag data into a FIFO where it can be subsequently read as required. The 64-bit output from the FIFO can be read directly, with the value of the wr_rd_counter being used to set/reset as the enable signal (rtdAvail). The FIFO is clocked out with receipt of an rtdRd signal from the TS FSM.

Figure 210:
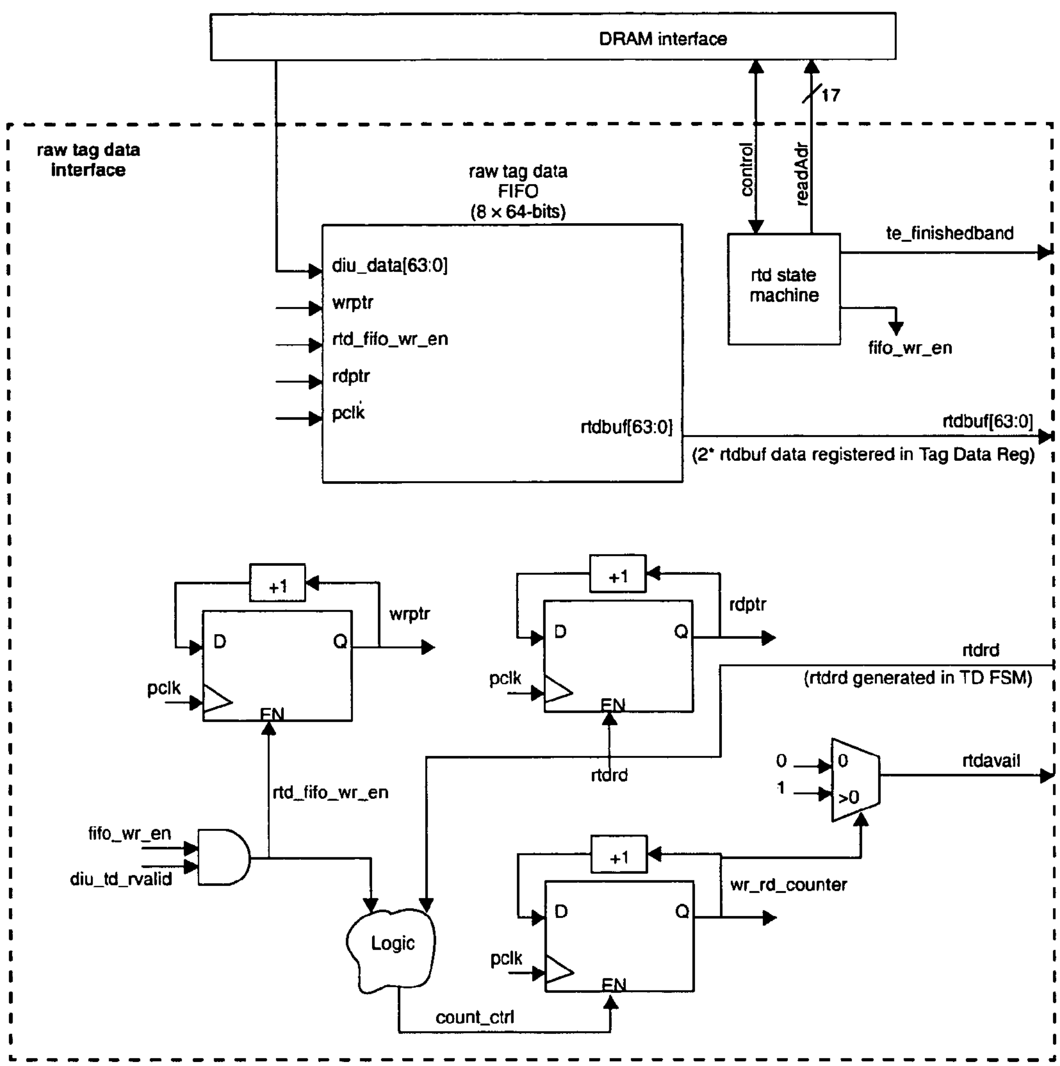

FIG. 210 shows a block diagram of the raw tag data interface.

28.7.4.1 RTDI FSM

The RTDI state machine is responsible for keeping the raw tag FIFO full. The state machine reads the line of tag data once for each printline that uses the tag. This means a given line of tag data will be read TagHeight times. Typically this will be 126 times or more, based on an approximately 2 mm tag. Note that the first line of tag data may be read fewer times since the start of the page may be within a tag. In addition odd and even rows of tags may contain different numbers of tags.

Section 28.6.5.1 outlines how to start the TE and restart it between bands. Users must set the NextBandStartTagDataAdr, NextBandEndOfTagData, NextBandFirstTagLineHeight and numTags[0], numTags[1] registers before starting the TE by asserting Go.

To restart the tag encoder for second and subsequent bands of a page, the NextBandStartTagDataAdr, NextBandEndOfTagData and NextBandFirstTagLineHeight registers need to be updated (typically numTags[0] and numTags[1] will be the same if the previous band contains an even number of tag rows) and NextBandEnable set. See Section 28.6.5.1 for a full description of the four ways of reprogramming the TE between bands.

The tag data is read once for every printline containing tags. When maximally packed, a row of tags contains 163 tags (see Table 169 on page 546).

Figure 211:
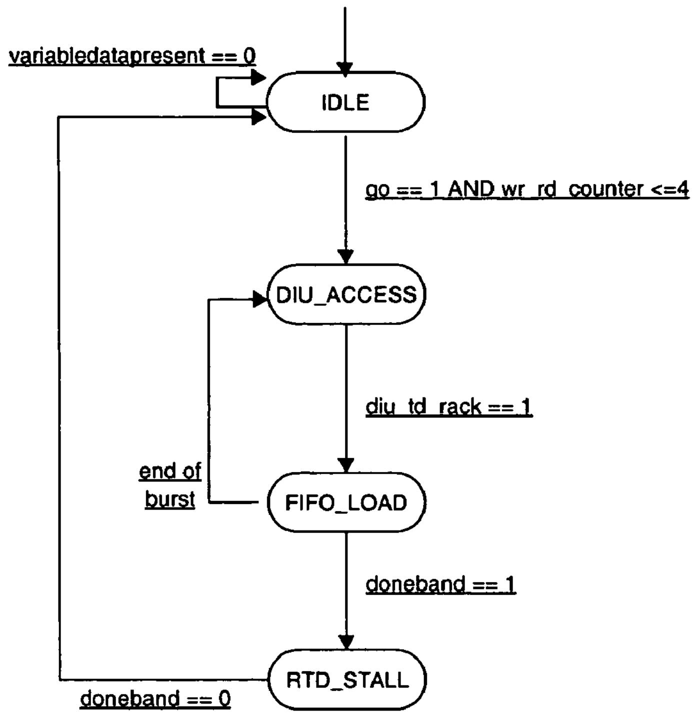
Figure 212:
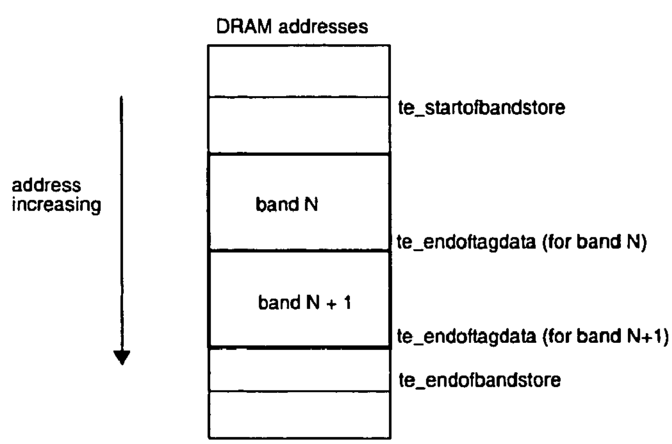

The RTDI State Flow diagram is shown in FIG. 211. An explanation of the states follows:

idle state:—Stay in the idle state if there is no variable data present. If there is variable data present and there are at least 4 spaces left in the FIFO then request a burst of 2 tags from the DRAM (1*256 bits). Counter countx is assigned the number of tags in a even/odd line which depends on the value of register rtdtagsense. Down-counter county is assigned the number of dot lines high a tag will be (min 126). Initially it must be set the firsttaglineheight value as the TE may be between pages (i.e. a partial tag). For normal tag generation county will take the value of tagmaxline register.

diu_access:—The diu_access state will generate a request to the DRAM if there are at least 4 spaces in the FIFO. This is indicated by the counter wr_rd_counter which is incremented/decremented on writes/reads of the FIFO. As long as wr_rd_counter is less than 4 (FIFO is 8 high) there must be 4 locations free. A control signal called td_diu_radrvalid is generated for the duration of the DRAM burst access. Addresses are sent in bursts of 1. If there is an odd number of tags in line then the last DRAM read will contain a tag in the first 128 bits and padding in the final 128 bits.

fifo_load:—This state controls the addressing to the DRAM. Counters countx and county are used to monitor whether the TE is processing a line of dots within a row of tags. When countx is zero it means all tag dots for this row are complete. When county is zero it means the TE is on the last line of dots (prior to Y scaling) for this row of tags. When a row of tags is complete the sense of rtdtagsense is inverted (odd/even). The rawtagdataadr is compared to the te_endoftagdata address. If rawtagdataadr=endoftagdata the doneband signal is set, the finishedband signal is pulsed, and the FSM enters the rtd_stall state until the doneband signal is reset to zero by the PCU by which time the rawtagdata, endoftagedata and firsttaglineheight registers are setup with new values to restart the TE. This state is used to count the 64-bit reads from the DIU. Each time diu_td_rvalid is high rtd_data_count is incremented by 1. The compare of rtd_data_count=rtd_num is necessary to find out when either all 4*64-bit data has been received or n*64-bit data (depending on a match of rawtagdataadr=endoftagdata in the middle of a set of 4*64-bit values being returned by the DIU.

rtd_stall:—This state waits for the doneband signal to be reset (see page 560 for a description of how this occurs). Once reset the FSM returns to the idle state. This states also performs the same count on the diu_data read as above in the case where diu_td_rvalid has not gone high by the time the addressing is complete and the end of band data has been reached i.e. rawtagdataadr=endoftagdata 28.7.5 TDI State Machine The tag data state machine has two processing phases. The first processing phase is to encode the fixed tag data stored in the 128-bit (2×64-bit) tag data register. The second is to encode tag data as it is required by the tag encoder.

When the Tag Encoder is started up, the fixed tag data is already preloaded in the 128 bit tag data record. If encodeFixed is set, then the 2 codewords stored in the lower bits of the tag data record need to be encoded: 40 bits if dataRedun=0, and 56 bits if dataRedun=1. If encodeFixed is clear, then the lower 120 bits of the tag data record must be passed to the encoded tag data interface without being encoded.

When encodeFixed is set, the symbols derived from codeword 0 are written to codeword 6 and the symbols derived from codeword 1 are written to codeword 7. The data symbols are stored first and then the remaining redundancy symbols are stored afterwards, for a total of 15 symbols. Thus, when dataRedun=0, the 5 symbols derived from bits 0-19 are written to symbols 0-4, and the redundancy symbols are written to symbols 5-14. When dataRedun=1, the 7 symbols derived from bits 0-27 are written to symbols 0-6, and the redundancy symbols are written to symbols 7-14.

When encodeFixed is clear, the 120 bits of fixed data is copied directly to codewords 6 and 7.

Figure 213:
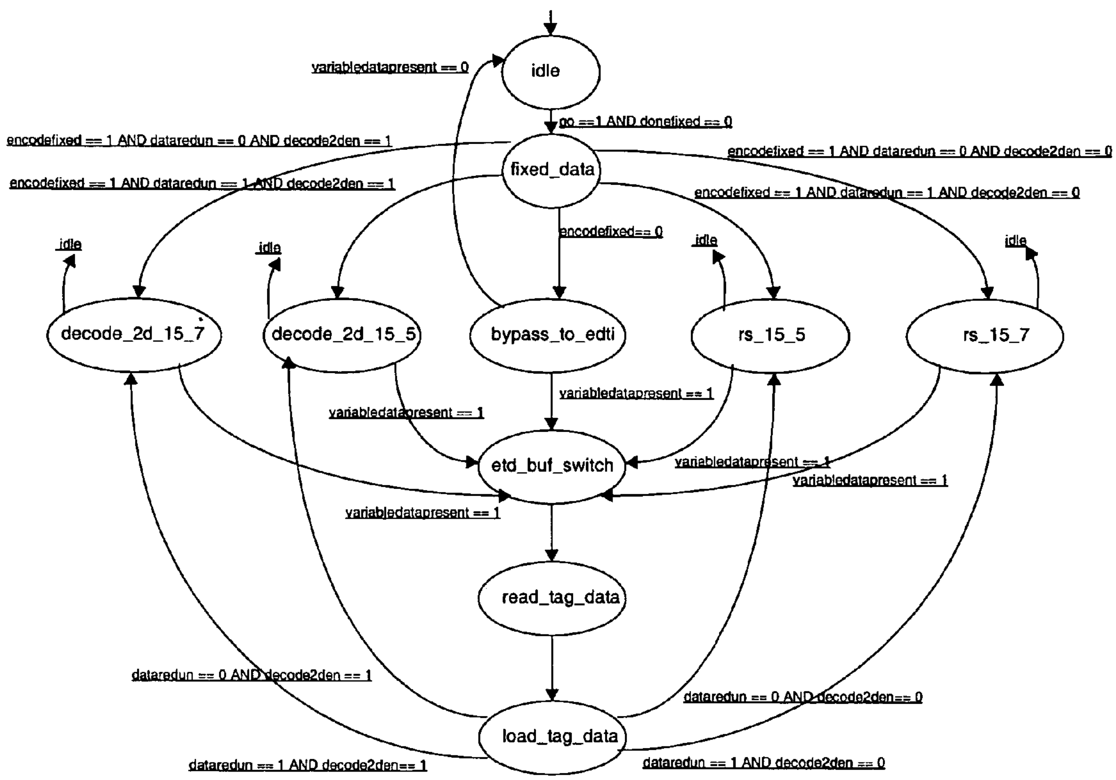
Figure 214:
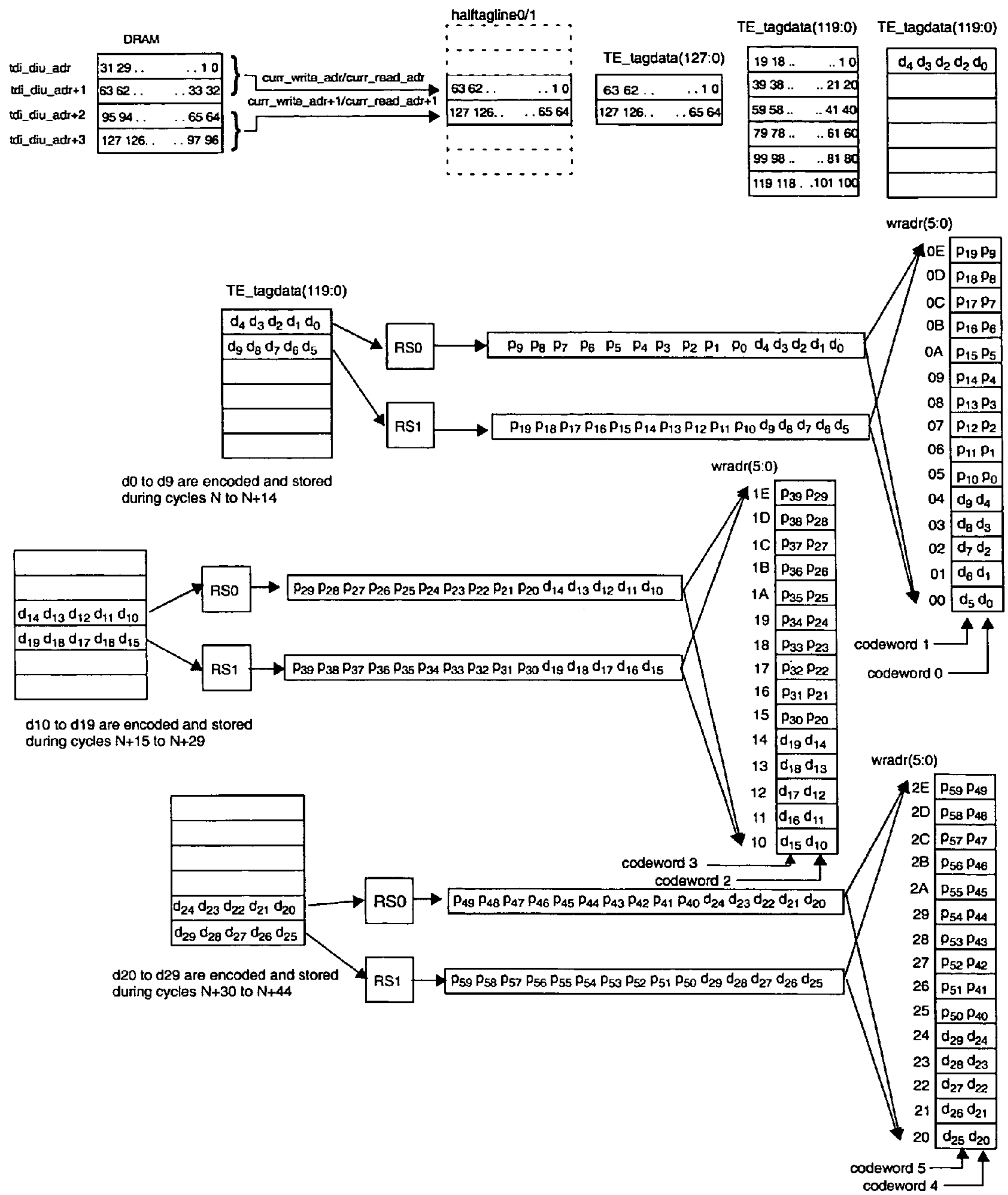
Figure 215:
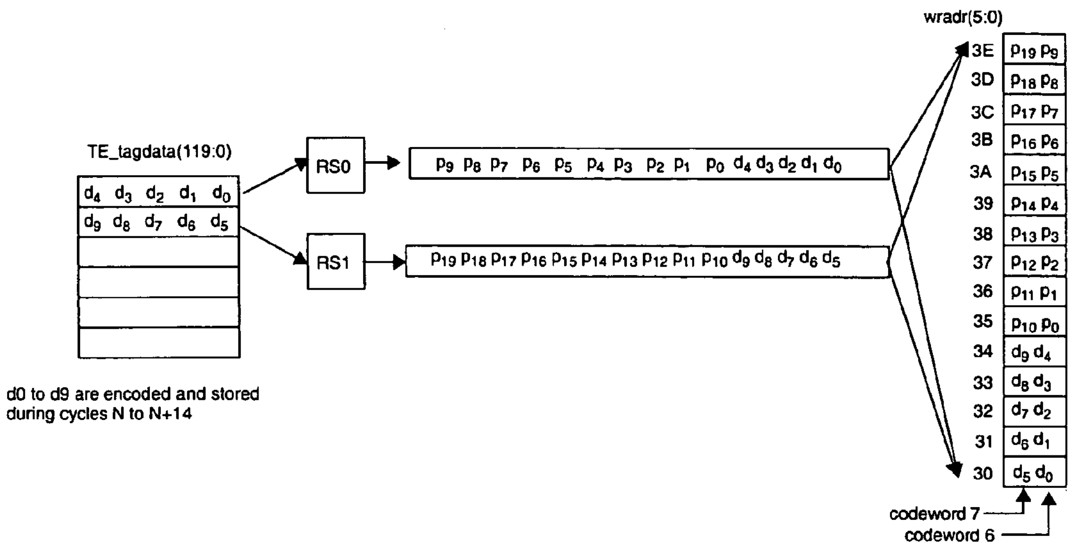
FIG. 215. Coding and mapping of uncoded Fixed Tag Data for (15,5) RS encoder
FIG. 216. Mapping of pre-coded Fixed Tag Data
FIG. 217. Coding and mapping of Variable Tag Data for (15,7) RS encoder
FIG. 218. Coding and mapping of uncoded Fixed Tag Data for (15,7) RS encoder
FIG. 219. Mapping of 2D decoded Variable Tag Data, DataRedun=0
FIG. 220. Simple block diagram for an m=4 Reed Solomon Encoder
FIG. 221. RS Encoder I/O diagram
FIG. 222. (15,5) & (15,7) RS Encoder block diagram
FIG. 223. (15,5) RS Encoder timing diagram
FIG. 224. (15,7) RS Encoder timing diagram
FIG. 225. Circuit for multiplying by $\alpha 3$
FIG. 226. Adding two field elements, (15,5) encoding.
Figure 216:
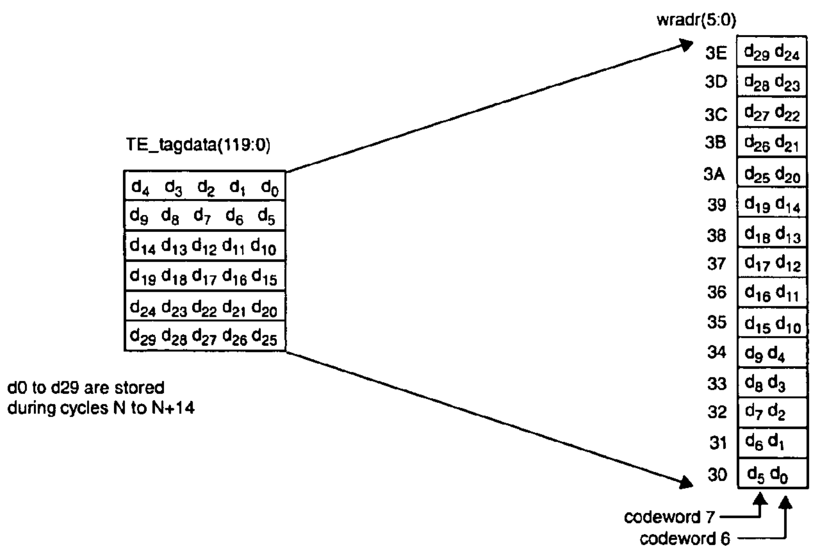
Figure 217:
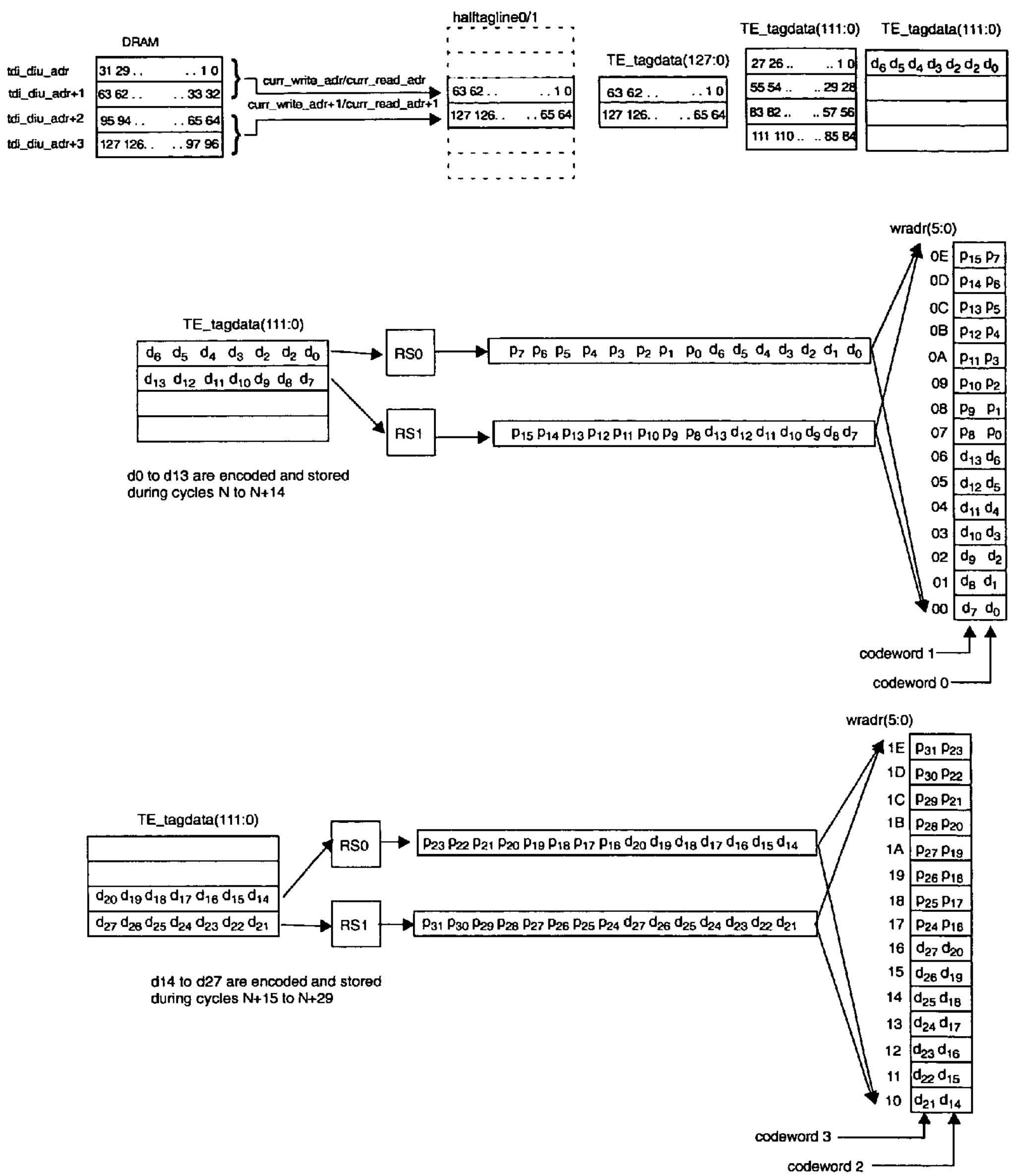
Figure 218:
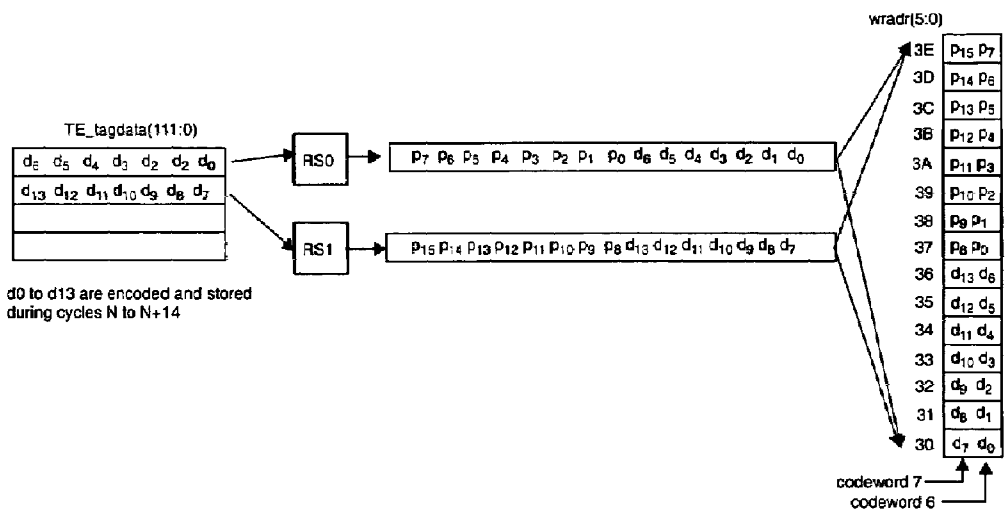
Figure 219:
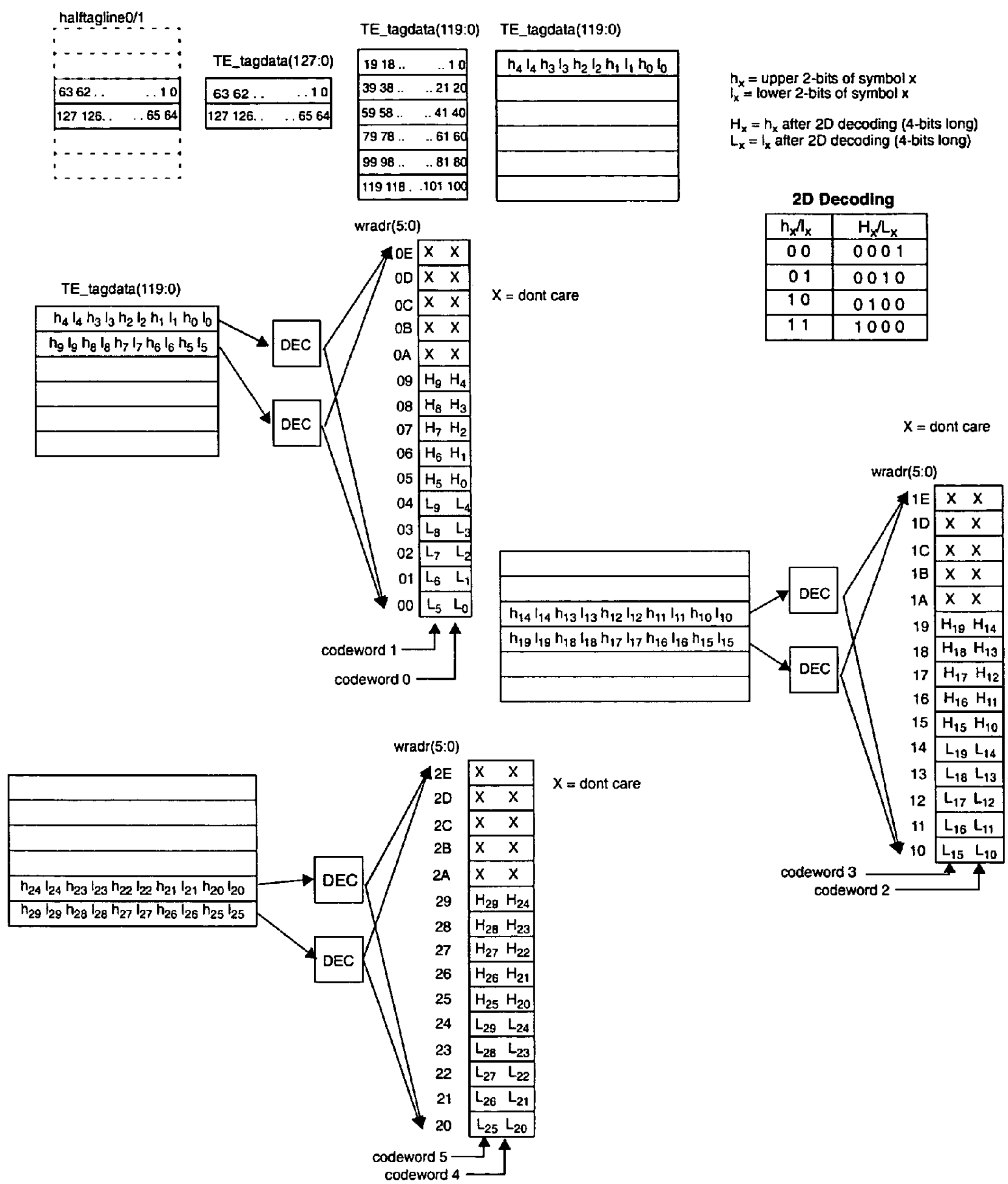
Figure 220:
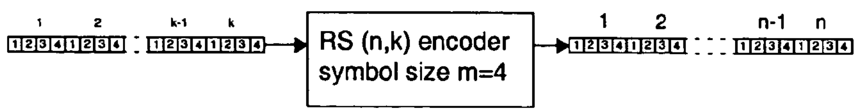
Figure 221:
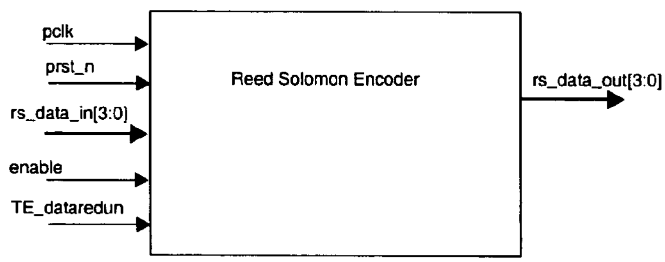

The TDI State Flow diagram is shown in FIG. 213. An explanation of the states follows.

idle:—In the idle state wait for the tag encoder go signal—top_go=1. The first task is to either store or encode the Fixed data. Once the Fixed data is stored or encoded/stored the donefixed flag is set. If there is no variable data the FSM returns to the idle state hence the reason to check the donefixed flag before advancing i.e. only store/encode the fixed data once.

fixed_data:—In the fixed_data state the FSM must decode whether to directly store the fixed data in the ETDi or if the fixed data needs to be either (15:5) (40-bits) or (15:7) (56-bits) RS encoded or 2D decoded. The values stored in registers encodefixed and dataredun and decode2den determine what the next state should be.

bypass_to_etdi:—The bypass_to_etdi takes 120-bits of fixed data(pre-encoded) from the tag_data(127:0) register and stores it in the 15*8 (by 2 for simultaneous reads) buffers. The data is passed from the tag_data register through 3 levels of muxing (level1, level2, level3) where it enters the RS0/RS1 encoders (which are now in a straight through mode (i.e. control__5 and control__7 are zero hence the data passes straight from the input to the output). The MSBs of the etd_wr_adr must be high to store this data as codewords 6, 7.

etd_buf_switch:—This state is used to set the tdvalid signal and pulse the etd_adv_tag signal which in turn is used to switch the read write sense of the ETDi buffers (wrsb0). The firsttime signal is used to identify the first time a tag is encoded. If zero it means read the tag data from the RTDi FIFO and encode. Once encoded and stored the FSM returns to this state where it evaluates the sense of tdvalid. First time around it will be zero so this sets tdvalid and returns to the readtagdata state to fill the 2nd ETDi buffer. After this the FSM returns to this state and waits for the lastdotintag signal to arrive. In between tags when the lastdotingtag signal is received the etd adv_tag is pulsed and the FSM goes to the readtagdata state.

readtagdata:—The readtagdata state waits to receive a rtdavail signal from the raw tag data interface which indicates there is raw tag data available. The tag_data register is 128-bits so it takes 2 pulses of the rtdrd signal to get the 2*64-bits into the tag_data register. If the rtdavail signal is set rtdrd is pulsed for 1 cycle and the FSM steps onto the loadtagdata state. Initially the flag first64bits will be zero. The 64-bits of rtd are assigned to the tag data[63:0] and the flagfirst64bits is set to indicate the first raw tag data read is complete. The FSM then steps back to the read_tagdata state where it generates the second rtdrd pulse. The FSM then steps onto the loadtagdata state for where the second 64-bits of rawtag data are assigned to tag data[128:64].

loadtagdata:—The loadtagdata state writes the raw tag data into the tag_data register from the RTDi FIFO.

The first64bits flag is reset to zero as the tag_data register now contains 120/112 bits of variable data. A decode of whether to (15:5) or (15:7) RS encode or 2D decode this data decides the next state.

rs__15__5:—The rs__15__5 (Reed Solomon (15:5) mode) state either encodes 40-bit Fixed data or 120-bit Variable data and provides the encoded tag data write address and write enable (etd_wr_adr and etdwe respectively). Once the fixed tag data is encoded the donefixed flag is set as this only needs to be done once per page. The variabledatapresent register is then polled to see if there is variable data in the tags. If there is variable data present then this data must be read from the RTDi and loaded into the tag_data register. Else the tdvalid flag must be set and FSM returns to the idle state. control__5 is a control bit for the RS Encoder and controls feedforward and feedback muxes that enable (15:5) encoding.

The rs__15__5 state also generates the control signals for passing 120-bits of variable tag data to the RS encoder in 4-bit symbols per clock cycle. rs_counter is used both to control the level1_mux and act as the 15-cycle counter of the RS Encoder. This logic cycles for a total of 3*15 cycles to encode the 120-bits.

rs__15__7:—The rs__15__7 state is similar to the rs__15__5 state except the level1_mux has to select 7 4-bit symbols instead of 5.

decode__2d__15__5, decode__2d__15__7:—The decode__2d states provides the control signals for passing the 120-bit variable data to the 2D decoder. The 2 lsbs are decoded to create 4 bits. The 4 bits from each decoder are combined and stored in the ETDi. Next the 2 MSBs are decoded to create 4 bits. Again the 4 bits from each decoder are combined and stored in the ETDi.

Figure 208:
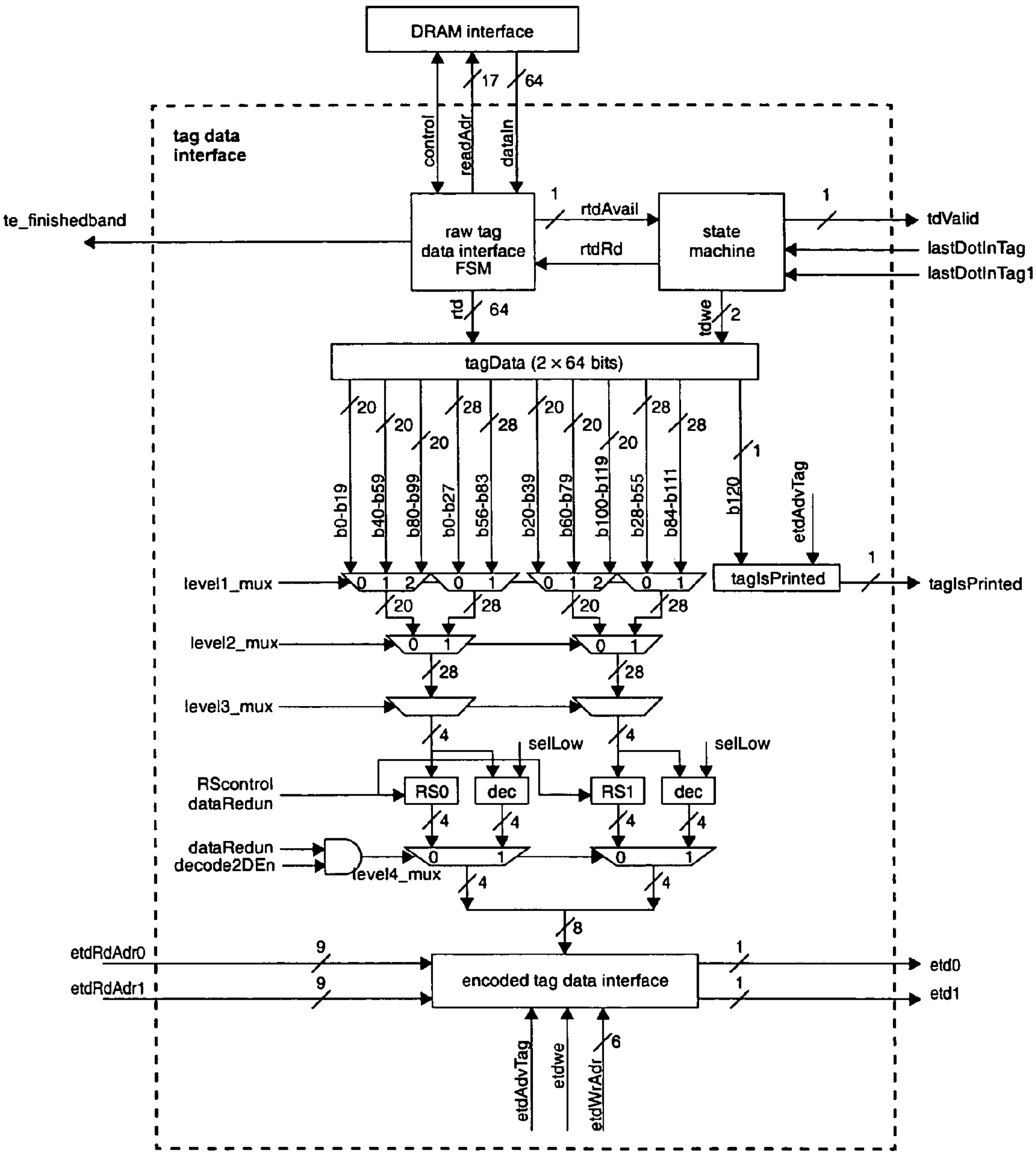

As can be seen from FIG. 208 on page 566 there are 3 stages of muxing between the Tag Data register and the RS encoders or 2D decoders. Levels 1-2 are controlled by level1_mux and level2_mux which are generated within the TDi FSM as is the write address to the ETDi buffers (etd_wr_adr)

FIGS. 214 through 219 illustrate the mappings used to store the encoded fixed and variable tag data in the ETDI buffers.

28.7.6 Reed Solomon (RS) Encoder 28.7.7 Introduction

A Reed Solomon code is a non binary, block code. If a symbol consists of m bits then there are q=2m possible symbols defining the code alphabet. In the TE, m=4 so the number of possible symbols is q=16.

An (n,k) RS code is a block code with k information symbols and n code-word symbols. RS codes have the property that the code word n is limited to at most q+1 symbols in length.

In the case of the TE, both (15,5) and (15,7) RS codes can be used. This means that up to 5 and 4 symbols respectively can be corrected.

Only one type of RS coder is used at any particular time. The RS coder to be used is determined by the registers TE_dataredun and TE_decode2den:

TE_dataredun=0 and TE_decode2den=0, then use the (15,5) RS coder

TE_dataredun=1 and TE_decode2den=0, then use the (15,7) RS coder

For a (15, k) RS code with m=4, k 4-bit information symbols applied to the coder produce 15 4-bit codeword symbols at the output. In the TE, the code is systematic so the first k codeword symbols are the same the as the k input information symbols.

A simple block diagram can be seen in.

28.7.8 I/O Specification

A I/O diagram of the RS encoder can be seen in.

28.7.9 Proposed Implementation

In the case of the TE, (15,5) and (15,7) codes are to be used with 4-bits per symbol.

The primitive polynomial is $p(x)=x^4+x+1$

In the case of the (15,5) code, this gives a generator polynomial of $$g(x)=(x+a)(x+a^2)(x+a^3)(x+a^4)(x+a^5)(x+a^6)(x+a^7)(x+a^8)(x+a^9)(x+a^{10})$$

$$g(x)=x^{10}+a^2x^9+a^3x^8+a^9x^7+a^6x^6+a^{14}x^5+a^2x^4+ax^3+a^6x^2+ax+a^{10}$$

$$g(x)=x^{10}+g_9x^9+g_8x^8+g_7x^7+g_6x^6+g_5x^5+g_4x^4+g_3x^3+g_2x^2+g_1x+g_0$$

In the case of the (15,7) code, this gives a generator polynomial of $$h(x)=(x+a)(x+a^2)(x+a^3)(x+a^4)(x+a^5)(x+a^6)(x+a^7)(x+a^8)$$

$$h(x)=x^8+a^{14}x^7+a^2x^6+a^4x^5+a^2x^4+a^{13}x^3+a^5x^2+a^{11}x+a^6$$

$$h(x)=x^8+h_7x^7+h_6x^6+h_5x^5+h_4x^4+h_3x^3+h_2x^2+h_1x+h_0$$

The output code words are produced by dividing the generator polynomial into a polynomial made up from the input symbols.

Figure 222:
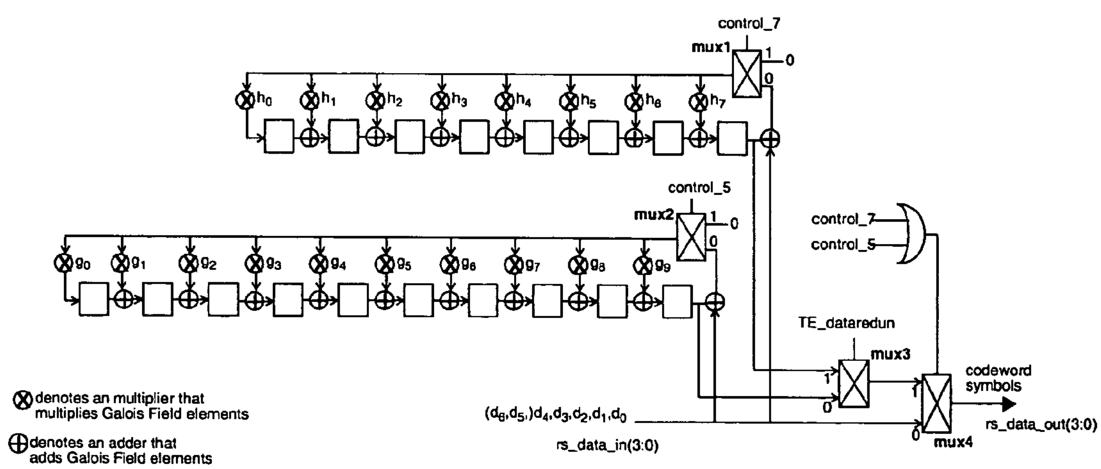
Figure 223:
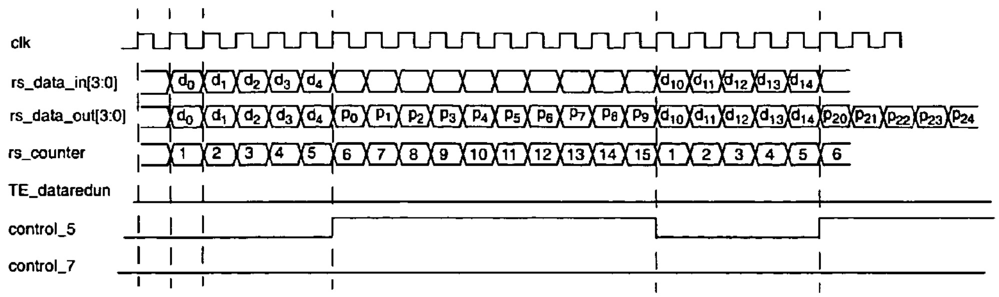
Figure 224:
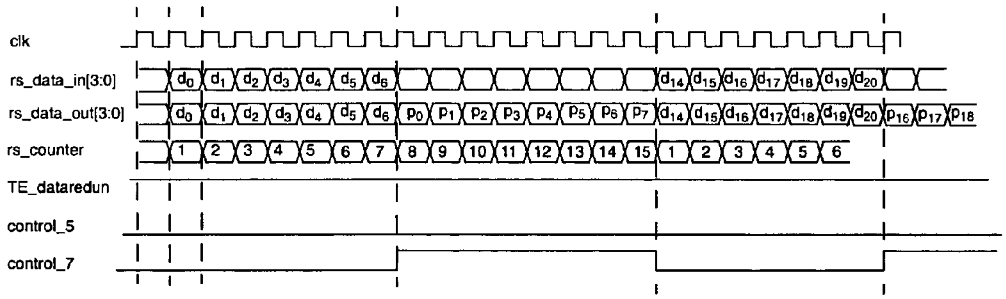

This division is accomplished using the circuit shown in FIG. 222.

The data in the circuit are Galois Field elements so addition and multiplication are performed using special circuitry. These are explained in the next sections.

The RS coder can operate either in (15,5) or (15,7) mode. The selection is made by the registers TE_dataredun and TE_decode2den.

When operating in (15,5) mode control_7 is always zero and when operating in (15,7) mode control_5 is always zero.

Firstly consider (15,5) mode i.e. TE_dataredun is set to zero.

For each new set of 5 input symbols, processing is as follows:

The 4-bits of the first symbol do are fed to the input port rs_data_in(3:0) and control_5 is set to 0. mux2 is set so as to use the output as feedback. control_5 is zero so mux4 selects the input (rs_data_in) as the output (rs_data_out). Once the data has settled (<<1 cycle), the shift registers are clocked. The next symbol $d_1$ is then applied to the input, and again after the data has settled the shift registers are clocked again. This is repeated for the next 3 symbols $d_2$, $d_3$ and $d_4$. As a result, the first 5 outputs are the same as the inputs. After 5 cycles, the shift registers now contain the next 10 required outputs. control_5 is set to 1 for the next 10 cycles so that zeros are fed back by mux2 and the shift register values are fed to the output by mux3 and mux4 by simply clocking the registers.

A timing diagram is shown below.

Secondly consider (15,7) mode i.e. TE_dataredun is set to one.

In this case processing is similar to above except that control_7 stays low while 7 symbols ($d_0$, $d_1$ . . . $d_6$) are fed in. As well as being fed back into the circuit, these symbols are fed to the output. After these 7 cycles, control_7 is set to 1 and the contents of the shift registers are fed to the output.

A timing diagram is shown below.

The enable signal can be used to start/reset the counter and the shift registers.

The RS encoders can be designed so that encoding starts on a rising enable edge. After 15 symbols have been output, the encoder stops until a rising enable edge is detected. As a result there will be a delay between each codeword.

Alternatively, once the enable goes high the shift registers are reset and encoding will proceed until it is told to stop. rs_data_in must be supplied at the correct time. Using this method, data can be continuously output at a rate of 1 symbol per cycle, even over a few codewords.

Alternatively, the RS encoder can request data as it requires.

The performance criterion that must be met is that the following must be carried out within 63 cycles load one tag's raw data into TE_tagdata encode the raw tag data store the encoded tag data in the Encoded Tag Data Interface In the case of the raw fixed tag data at the start of a page, there is no definite performance criterion except that it should be encoded and stored as fast as possible.

28.7.10 Galois Field Elements and their Representation

A Galois Field is a set of elements in which we can do addition, subtraction, multiplication and division without leaving the set.

The TE uses RS encoding over the Galois Field $GF(2^4)$. There are $2^4$ elements in $GF(2^4)$ and they are generated using the primitive polynomial $p(x)=x^4+x+1$.

The 16 elements of $GF(2^4)$ can be represented in a number of different ways. Table shows three possible representations—the power, polynomial and 4-tuple representation.

TABLE 177

| GF($2^4$) representations | | |
|---|---|---|
| power representation | Polynomial Representation | 4-tuple representation ($a_0$ $a_1$ $a_2$ $a_3$) |
| 0 | 0 | (0 0 0 0) |
| 1 | 1 | (1 0 0 0) |
| a | x | (0 1 0 0) |
| $\alpha^2$ | $x^2$ | (0 0 1 0) |
| $\alpha^3$ | $x^3$ | (0 0 0 1) |
| $\alpha^4$ | 1 + x | (1 1 0 0) |
| $\alpha^5$ | x + $x^2$ | (0 1 1 0) |
| $\alpha^6$ | $x^2$ + $x^3$ | (0 0 1 1) |
| $\alpha^7$ | 1 + x + $x^3$ | (1 1 0 1) |
| $\alpha^8$ | 1 + $x^2$ | (1 0 1 0) |
| $\alpha^9$ | X + $x^3$ | (0 1 0 1) |
| $\alpha^{10}$ | 1 + x + $x^2$ | (1 1 1 0) |
| $\alpha^{11}$ | X + $x^2$ + $x^3$ | (0 1 1 1) |
| $\alpha^{12}$ | 1 + x + $x^2$ + $x^3$ | (1 1 1 1) |
| $\alpha^{13}$ | 1 + $x^2$ + $x^3$ | (1 0 1 1) |
| $\alpha^{14}$ | 1 + $x^3$ | (1 0 0 1) |

28.7.11 Multiplication of GF($2^4$) Elements

The multiplication of two field elements $\alpha^a$ and $\alpha^b$ is defined as $$\alpha^c=\alpha^a.\alpha^b=\alpha^{(a+b)modulo\ 15}$$

Thus $$\alpha^1.\alpha^2=\alpha^3$$

$$\alpha^5.\alpha^{10}=\alpha^{15}$$

$$\alpha^6.\alpha^{12}=\alpha^3$$

So if the elements are available in exponential form, multiplication is simply a matter of modulo 15 addition. If the elements are in polynomial/tuple form, the polynomials must be multiplied and reduced mod $x^4+x+1$. Suppose we wish to multiply the two field elements in GF($2^4$):

$$\alpha^a=a_3x^3+a_2x^2+a_1x^1+a_0$$

$$\alpha^b=b_3x^3+b_2x^2+b_1x^1+b_0$$

where $a_i$, $b_i$ are in the field (0,1) (i.e. modulo 2 arithmetic)

Multiplying these out and using $x^4+x+1=0$ we get:

$$\alpha^{a+b} = [(a_0b_3 + a_1b_2 + a_2b_1 + a_3b_0) + a_3b_3]x^3 + [(a_0b_2 + a_1b_1 + a_2b_0) + a_3b_3 + (a_3b_2 + a_2b_3)]x^2 +$$

-continued $$[(a_0b_1 + a_1b_0) + (a_3b_2 + a_2b_3) + (a_1b_3 + a_2b_2 + a_3b_1)]x + [(a_0b_0 + a_1b_3 + a_2b_2 + a_3b_1)]$$

$$\alpha^{a+b} = [a_0b_3 + a_1b_2 + a_2b_1 + a_3(b_0 + b_3)]x^3 + [a_0b_2 + a_1b_1 + a_2(b_0 + b_3) + a_3(b_2 + b_3)]x^2 + [a_0b_1 + a_1(b_0 + b_3) + a_2(b_2 + b_3) + a_3(b_1 + b_2)]x + [a_0b_0 + a_1b_3 + a_2b_2 + a_3b_1]$$

If we wish to multiply an arbitrary field element by a fixed field element we get a more simple form. Suppose we wish to multiply $\alpha^b$ by $\alpha^3$.

In this case $\alpha^3=x^3$ so (a0 a1 a2 a3)=(0 0 0 1). Substituting this into the above equation gives $$\alpha^c=(b_0+b_3)x^3+(b_2+b_3)x^2+(b_1+b_2)x+b_1$$

Figure 225:
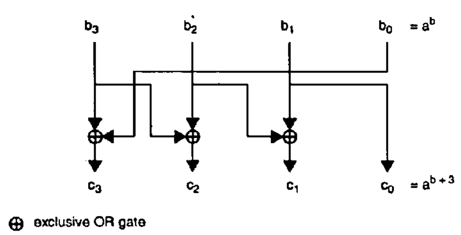

This can be implemented using simple XOR gates as shown in FIG. 225.

28.7.12 Addition of GF($2^4$) Elements

If the elements are in their polynomial/tuple form, polynomials are simply added.

Suppose we wish to add the two field elements in GF($2^4$):

$$\alpha^a=a_3x^3+a_2x^2+a_1x+a_0$$

$$\alpha^b=b_3x^3+b_2x^2+b_1x+b_0$$

where $a_i$, $b_i$ are in the field (0,1) (i.e. modulo 2 arithmetic)

$$\alpha^c=\alpha^a+\alpha^b=(a_3+b_3)x^3+(a_2+b_2)x^2+(a_1+b_1)x+(a_0+b_0)$$

Figure 226:
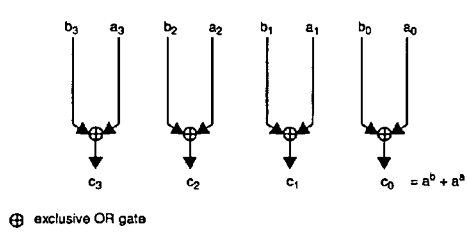
Figure 227:
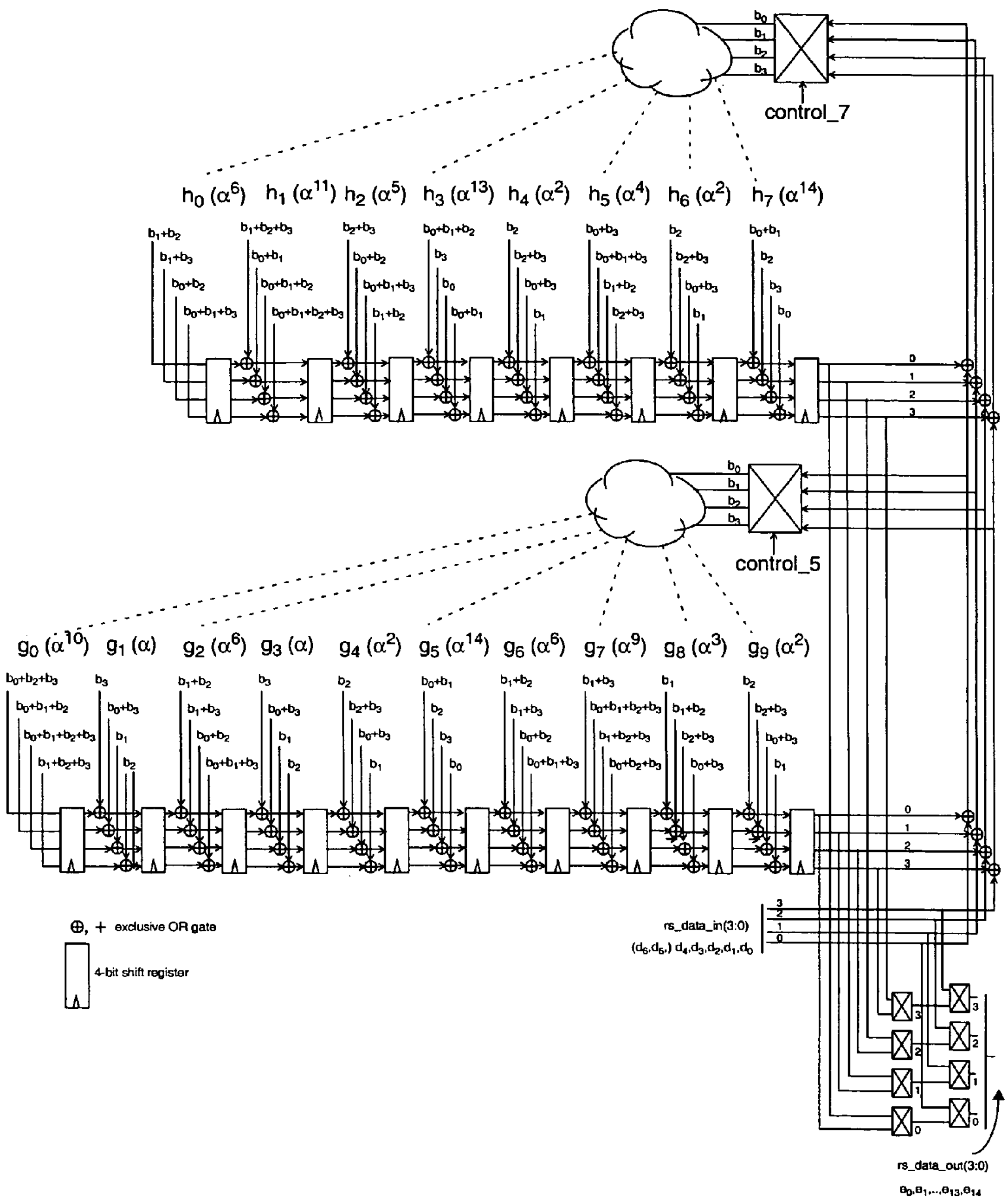
FIG. 227. RS Encoder Implementation
FIG. 228. encoded tag data interface
FIG. 229. Breakdown of the Tag Format Structure
FIG. 230. TFSI FSM State Flow Diagram
FIG. 231. TFS Block Diagram
FIG. 232. Table A address generator
FIG. 233. Table C interface block diagram
FIG. 234. Table B interface block diagram
FIG. 235. Interfaces between TE, TFU and HCU
FIG. 236. 16-byte FIFO in TFU
FIG. 237. High level block diagram showing the HCU and its external interfaces
FIG. 238. Block diagram of the HCU
FIG. 239. Block diagram of the control unit
FIG. 240. Block diagram of determine advdot unit
FIG. 241. Page structure
FIG. 242. Block diagram of margin unit
FIG. 243. Block diagram of dither matrix table interface
FIG. 244. Example reading lines of dither matrix from DRAM
FIG. 245. State machine to read dither matrix table
FIG. 246. Contone dotgen unit
FIG. 247. Block diagram of dot reorg unit
FIG. 248. HCU to DNC interface (also used in DNC to DWU, LLU to PHI)
FIG. 249. SFU to HCU (all feeders to HCU)
FIG. 250. Representative logic of the SFU to HCU interface
FIG. 251. High level block diagram of DNC
FIG. 252. Dead nozzle table format
FIG. 253. Set of dots operated on for error diffusion
FIG. 254. Block diagram of DNC
FIG. 255. Sub-block diagram of ink replacement unit
FIG. 256. Dead nozzle table state machine
FIG. 257. Logic for dead nozzle removal and ink replacement
FIG. 258. Sub-block diagram of error diffusion unit
FIG. 259. Maximum length 32-bit LFSR used for random bit generation FIG. 260. High level data flow diagram of DWU in context
FIG. 261. Printhead Nozzle Layout for conceptual 36 Nozzle AB single segment printhead
FIG. 262. Paper and printhead nozzles relationship (example with $D_1=D_2=5$)
FIG. 263. Dot line store logical representation
FIG. 264. Conceptual view of 2 adjacent printhead segments possible row alignment
FIG. 265. Conceptual view of 2 adjacent printhead segments row alignment (as seen by the LLU)
FIG. 266. Even dot order in DRAM (13312 dot wide line)
FIG. 267. Dotline FIFO data structure in DRAM (LLU specification)
FIG. 268. DWU partition
FIG. 269. Sample dot_data generation for color 0 even dot
FIG. 270. Buffer address generator sub-block
FIG. 271. DIU Interface sub-block
FIG. 272. Interface controller state diagram
FIG. 273. High level data flow diagram of LLU in context
FIG. 274. Paper and printhead nozzles relationship (example with $D_1=D_2=5$)
FIG. 275. Conceptual view of vertically misaligned printhead segment rows (external)
FIG. 276. Conceptual view of vertically misaligned printhead segment rows (internal)
FIG. 277. Conceptual view of color dependent vertically misaligned printhead segment rows (internal)
FIG. 278. Conceptual horizontal misalignment between segments
FIG. 279. Relative positions of dot fired (example cases)
FIG. 280. Example left and right margins
FIG. 281. Dot data generated and transmitted order
FIG. 282. Dotline FIFO data structure in DRAM (LLU specification)
FIG. 283. LLU partition
FIG. 284. DIU interface
FIG. 285. Interface controller state diagram
FIG. 286. Address generator logic
FIG. 287. Write pointer state machine
FIG. 288. PHI to linking printhead connection (Single SoPEC)
FIG. 289. PHI to linking printhead connection (2 SoPECs)
FIG. 290. CPU command word format
FIG. 291. Example data and command sequence on a print head channel
FIG. 292. PHI block partition
FIG. 293. Data generator state diagram
FIG. 294. PHI mode Controller
FIG. 295. Encoder RTL diagram
FIG. 296. 28-bit scrambler
FIG. 297. Printing with 1 SoPEC
FIG. 298. Printing with 2 SoPECs (existing hardware)
FIG. 299. Each SoPEC generates dot data and writes directly to a single printhead
FIG. 300. Each SoPEC generates dot data and writes directly to a single printhead
FIG. 301. Two SoPECs generate dots and transmit directly to the larger printhead
FIG. 302. Serial Load
FIG. 303. Parallel Load
FIG. 304. Two SoPECs generate dot data but only one transmits directly to the larger printhead
FIG. 305. Odd and Even nozzles on same shift register
FIG. 306. Odd and Even nozzles on different shift registers
FIG. 307. Interwoven shift registers
FIG. 308. Linking Printhead Concept
FIG. 309. Linking Printhead 30 ppm
FIG. 310. Linking Printhead 60 ppm
FIG. 311. Theoretical 2 tiles assembled as A-chip/A-chip—right angle join
FIG. 312. Two tiles assembled as A-chip/A-chip
FIG. 313. Magnification of color n in A-chip/A-chip
FIG. 314. A-chip/A-chip growing offset
FIG. 315. A-chip/A-chip aligned nozzles, sloped chip placement
FIG. 316. Placing multiple segments together
FIG. 317. Detail of a single segment in a multi-segment configuration
FIG. 318. Magnification of inter-slope compensation
FIG. 319. A-chip/B-chip
FIG. 320. A-chip/B-chip multi-segment printhead
FIG. 321. Two A-B-chips linked together
FIG. 322. Two A-B-chips with on-chip compensation
FIG. 323. Frequency modifier block diagram
FIG. 324. Output frequency error versus input frequency
FIG. 325. Output frequency error including K
FIG. 326. Optimised for output jitter<0.2%, $F_{sys}=48$ MHz, K=25
FIG. 327. Direct form II biquad
FIG. 328. Output response and internal nodes
FIG. 329. Butterworth filter (Fc=0.005) gain error versus input level
FIG. 330. Step response
FIG. 331. Output frequency quantisation (K=2ˆ25)
FIG. 332. Jitter attenuation with a 2nd order Butterworth, $F_c=0.05$
FIG. 333. Period measurement and NCO cumulative error
FIG. 334. Stepped input frequency and output response
FIG. 335. Block diagram overview
FIG. 336. Multiply/divide unit
FIG. 337. Power-on-reset detection behaviour
FIG. 338. Brown-out detection behaviour
FIG. 339. Adapting the IBM POR macro for brown-out detection
FIG. 340. Deglitching of power-on-reset signal
FIG. 341. Deglitching of brown-out detector signal
FIG. 342. Proposed top-level solution
FIG. 343. First Stage Image Format
FIG. 344. Second Stage Image Format
FIG. 345. Overall Logic Flow
FIG. 346. Initialization Logic Flow
FIG. 347. Load & Verify Second Stage Image Logic Flow
FIG. 348. Load from LSS Logic Flow
FIG. 349. Load from USB Logic Flow
FIG. 350. Verify Header and Load to RAM Logic Flow
FIG. 351. Body Verification Logic Flow
FIG. 352. Run Application Logic Flow
FIG. 353. Boot ROM Memory Layout
FIG. 354. Overview of LSS buses for single SoPEC system
FIG. 355. Overview of LSS buses for single SoPEC printer
FIG. 356. Overview of LSS buses for simplest two-SoPEC printer
FIG. 357. Overview of LSS buses for alternative two-SoPEC printer
FIG. 358. SoPEC System top level partition
FIG. 359. Print construction and Nozzle position
FIG. 360. Conceptual horizontal misplacement between segments FIG. 361. Printhead row positioning and default row firing order FIG. 362. Firing order of fractionally misaligned segment FIG. 363. Example of yaw in printhead IC misplacement FIG. 364. Vertical nozzle spacing FIG. 365. Single printhead chip plus connection to second chip FIG. 366. Two printheads connected to form a larger printhead FIG. 367. Colour arrangement.

Again this can be implemented using simple XOR gates as shown in FIG. 226.

28.7.13 Reed Solomon Implementation

The designer can decide to create the relevant addition and multiplication circuits and instantiate them where necessary. Alternatively the feedback multiplications can be combined as follows.

Consider the multiplication $$\alpha^a.\alpha^b=\alpha^c$$

or in terms of polynomials $$(a_3x^3+a_2x^2+a_1x+a_0).(b_3x^3+b_2x^2+b_1x+b_0)=(c_3x^3+c_2x^2+c_1x+c_0)$$

If we substitute all of the possible field elements in for $\alpha^a$ and express ac in terms of $\alpha^b$, we get the table of results shown in Table 178.

TABLE 178

| $\alpha^c$ multiplied by all field elements, expressed in terms of $\alpha^b$ | | | | | |
|---|---|---|---|---|---|
| $\alpha^a = a_3x^3 + a_2x^2 + a_1x + a_0$ | | | | | |
| fixed | | $c_3x^3 + c_2x^2 + c_1x + c_0$ | | | |
| field element | ($a_0$ $a_1$ $a_2$ $a_3$) | $c_0$ | $c_1$ | $c_2$ | $c_3$ |
| 0 | (0 0 0 0) | | | | |
| 1 | (1 0 0 0) | $b_0$ | $b_1$ | $b_2$ | $b_3$ |
| a | (0 1 0 0) | $b_3$ | $b_0 + b_3$ | $b_1$ | $b_2$ |
| $\alpha^2$ | (0 0 1 0) | $b_2$ | $b_2 + b_3$ | $b_0 + b_3$ | $b_1$ |
| $\alpha^3$ | (0 0 0 1) | $b_1$ | $b_1 + b_2$ | $b_2 + b_3$ | $b_0 + b_3$ |
| $\alpha^4$ | (1 1 0 0) | $b_0 + b_3$ | $b_0 + b_1 + b_3$ | $b_1 + b_2$ | $b_2 + b_3$ |

TABLE 178-continued

| $\alpha^c$ multiplied by all field elements, expressed in terms of $\alpha^b$ | | | | | |
|---|---|---|---|---|---|
| $\alpha^a = a_3x^3 + a_2x^2 + a_1x + a_0$ | | | | | |
| fixed | | $c_3x^3 + c_2x^2 + c_1x + c_0$ | | | |
| field element | $(a_0\ a_1\ a_2\ a_3)$ | $c_0$ | $c_1$ | $c_2$ | $c_3$ |
| $\alpha^5$ | (0 1 1 0) | $b_2 + b_3$ | $b_0 + b_2$ | $b_0 + b_1 + b_3$ | $b_1 + b_2$ |
| $a^6$ | (0 0 1 1) | $b_1 + b_2$ | $b_1 + b_3$ | $b_0 + b_2$ | $b_0 + b_1 + b_3$ |
| $\alpha^7$ | (1 1 0 1) | $b_0 + b_1 + b_3$ | $b_0 + b_2 + b_3$ | $b_1 + b_3$ | $b_0 + b_2$ |
| $\alpha^8$ | (1 0 1 0) | $b_0 + b_2$ | $b_1 + b_2 + b_3$ | $b_0 + b_2 + b_3$ | $b_1 + b_3$ |
| $\alpha^9$ | (0 1 0 1) | $b_1 + b_3$ | $b_0 + b_1 + b_2 + b_3$ | $b_1 + b_2 + b_3$ | $b_0 + b_2 + b_3$ |
| $\alpha^{10}$ | (1 1 1 0) | $b_0 + b_2 + b_3$ | $b_0 + b_1 + b_2$ | $b_0 + b_1 + b_2 + b_3$ | $b_1 + b_2 + b_3$ |
| $\alpha^{11}$ | (0 1 1 1) | $b_1 + b_2 + b_3$ | $b_0 + b_1$ | $b_0 + b_1 + b_2$ | $b_0 + b_1 + b_2 + b_3$ |
| $\alpha^{12}$ | (1 1 1 1) | $b_0 + b_1 + b_2 + b_3$ | $b_0$ | $b_0 + b_1$ | $b_0 + b_1 + b_2$ |
| $\alpha^{13}$ | (1 0 1 1) | $b_0 + b_1 + b_2$ | $b_3$ | $b_0$ | $b_0 + b_1$ |
| $\alpha^{14}$ | (1 0 0 1) | $b_0 + b_1$ | $b_2$ | $b_3$ | $b_0$ |

the following signals are required:

$b_0$, $b_1$, $b_2$, $b_3$,
$(b_0+b_1)$, $(b_0+b_2)$, $(b_0+b_3)$, $(b_1+b_2)$, $(b_1+b_3)$, $(b_2+b_3)$,
$(b_0+b_1+b_2)$, $(b_0+b_1+b_3)$, $(b_0+b_2+b_3)$, $(b_1+b_2+b_3)$,
$(b_0+b_1+b_2+b_3)$

The implementation of the circuit can be seen in Figure. The main components are XOR gates, 4-bit shift registers and multiplexers.

The RS encoder has 4 input lines labelled 0, 1, 2 & 3 and 4 output lines labelled 0, 1, 2 & 3. This labelling corresponds to the subscripts of the polynomial/4-tuple representation. The mapping of 4-bit symbols from the TE_tagdata register into the RS is as follows:

the LSB in the TE_tagdata is fed into line0
the next most significant LSB is fed into line1
the next most significant LSB is fed into line2
the MSB is fed into line3

The RS output mapping to the Encoded tag data interface is similar. Two encoded symbols are stored in an 8-bit address. Within these 8 bits:

line0 is fed into the LSB (bit 0/4)
line1 is fed into the next most significant LSB (bit 1/5)
line2 is fed into the next most significant LSB (bit 2/6)
line3 is fed into the MSB (bit 3/7)

28.7.14 2D Decoder

The 2D decoder is selected when TE_decode2den=1. It operates on variable tag data only. its function is to convert 2-bits into 4-bits according to Table 179.

TABLE 179

| Operation of 2D decoder | |
|---|---|
| input | output |
| 0 0 | 0 0 0 1 |
| 0 1 | 0 0 1 0 |
| 1 0 | 0 1 0 0 |
| 1 1 | 1 0 0 0 |

28.7.15 Encoded Tag Data Interface

Figure 228:
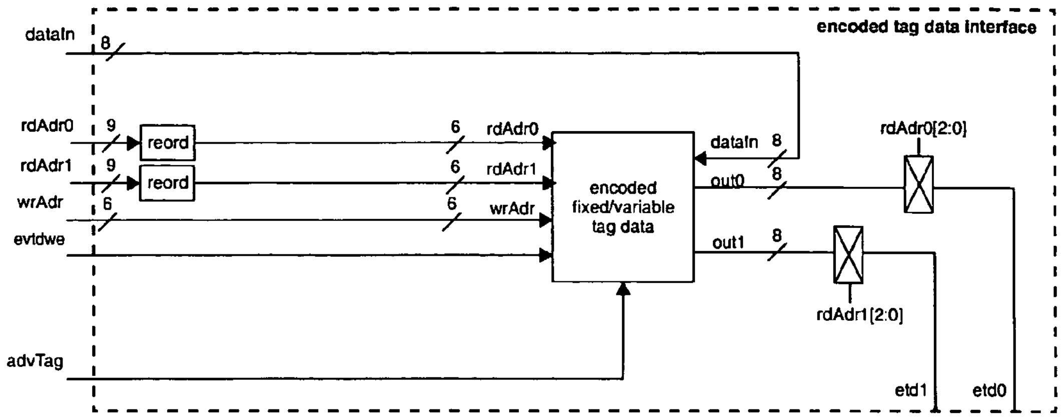

The encoded tag data interface contains an encoded fixed tag data store interface and an encoded variable tag data store interface, as shown in FIG. 228.

The two reord units simply reorder the 9 input bits to map low-order codewords into the bit selection component of the address as shown in Table 180. Reordering of write addresses is not necessary since the addresses are already in the correct format.

TABLE 180

| Reord unit | | | | |
|---|---|---|---|---|
| | input | | output | |
| bit# | bit | interpretation | bit | interpretation |
| 8 | A | select 1 of 8 codewords | A | select 1 of 4 codeword |
| 7 | B | | B | tables |
| 6 | C | | D | select 1 of 15 symbols |
| 5 | D | select 1 of 15 symbols | E | |
| 4 | E | | F | |
| 3 | F | | G | |
| 2 | G | | C | select 1 of 8 bits |
| 1 | H | select 1 of 4 bits | H | |
| 0 | I | | I | |

The encoded fixed and variable data are stored in a 112×8 bit dual port reg array. The MSB for the reg. array's write address is the inverted wrsb0 signal which switches selecting either the lower or upper half of the reg. array to write variable data. The fixed data is stored in the top of the lower half of the reg. array (from address 0110000 to 100000) and is written in by adding an offset to the reg. array write address.

28.8 Tag Format Structure (TFS) Interface 28.8.1 Introduction

The TFS specifies the contents of every dot position within a tags border i.e.:

is the dot part of the background?
is the dot part of the data?

Figure 229:
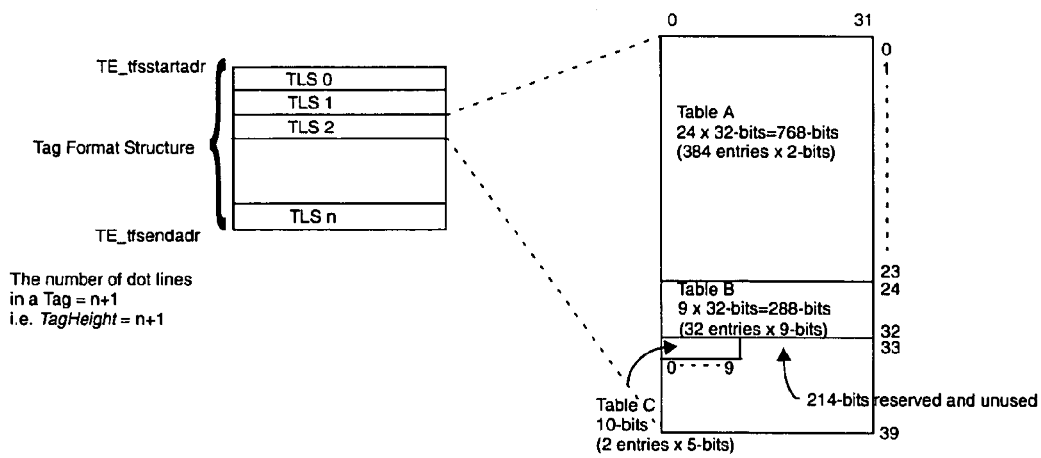
Figure 230:
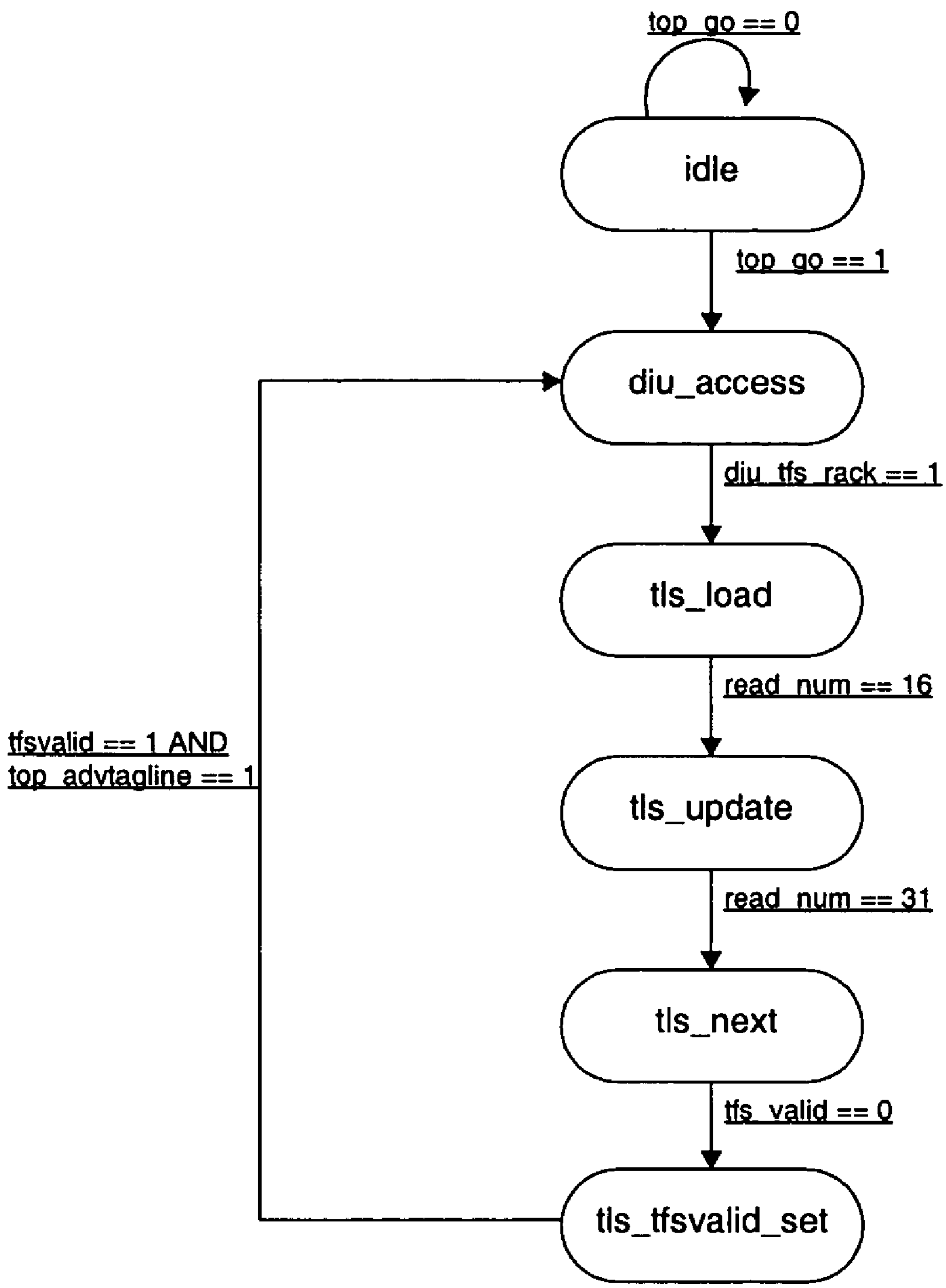

The TFS is broken up into Tag Line Structures (TLS) which specify the contents of every dot position in a particular line of a tag. Each TLS consists of three tables—A, B and C (see FIG. 229).

For a given line of dots, all the tags on that line correspond to the same tag line structure. Consequently, for a given line of output dots, a single tag line structure is required, and not the entire TFS. Double buffering allows the next tag line structure to be fetched from the TFS in DRAM while the existing tag line structure is used to render the current tag line.

The TFS interface is responsible for loading the appropriate line of the tag format structure as the tag encoder advances through the page. It is also responsible for producing table A and table B outputs for two consecutive dot positions in the current tag line.

- There is a TLS for every dot line of a tag.
- All tags that are on the same line have the exact same TLS.
- A tag can be up to 384 dots wide, so each of these 384 dots must be specified in the TLS.
- The TLS information is stored in DRAM and one TLS must be read into the TFS Interface for each line of dots that are outputted to the Tag Plane Line Buffers.
- Each TLS is read from DRAM as 5 times 256-bit words with 214 padded bits in the last 256-bit DRAM read.

28.8.2 I/O Specification

TABLE 181

Tag Format Structure Interface Port List

| signal name | signal type | description |
|---|---|---|
| Pclk | In | SoPEC system clock |
| prst_n | In | Active-low, synchronous reset in pclk domain |
| top_go | In | Go signal from TE top level |
| | | DRAM |
| diu_data[63:0] | In | Data from DRAM |
| diu_tfs_rack | In | Data acknowledge from DRAM |
| diu_tfs_rvalid | In | Data valid from DRAM |
| tfs_diu_rreq | Out | Read request to DRAM |
| tfs_diu_radr[21:5] | Out | Read address to DRAM |
| | | tag encoder top level |
| top_advtagline | In | Pulsed after the last line of a row of tags |
| top_tagaltsense | In | For even tag rows = 0 i.e. 0, 2, 4 . . .<br>For odd tag rows = 1 i.e. 1, 3, 5 . . . |
| top_lastdotintag | In | Last dot in tag is currently being processed |
| top_dotposvalid | In | Current dot position is a tag dot and its structure data and tag data is available |
| top_tagdotnum[7:0] | In | Counts from zero up to TE_tagmaxdotpairs (min. = 1, max. = 192) |
| tfsi_valid | Out | TLS tables A, B and C, ready for use |
| tfsi_ta_dot0[1:0] | Out | Even entry from Table A corresponding to top_tagdotnum |
| tfsi_ta_dot1[1:0] | Out | Odd entry from Table A corresponding to top_tagdotnum |
| | | tag encoder top level (PCU read decoder) |
| tfs_te_tfsstartadr[23:0] | Out | TFS tfsstartadr register |
| tfs_te_tfsendadr[23:0] | Out | TFS tfsendadr register |
| tfs_te_tfsfirstlineadr[23:0] | Out | TFS tfsfirstlineadr register |
| tfs_te_currtfsadr[23:0] | Out | TFS currtfsadr register |
| | | TDI |
| tfsi_tdi_adr0[8:0] | Out | Read address for dot0 (even dot) |
| tfsi_tdi_adr1[8:0] | Out | Read address for dot1 (odd dot) |

28.8.2

28.8.2.1 State Machine

The state machine is responsible for generating control signals for the various TFS table units, and to load the appropriate line from the TFS. The states are explained below.

idle:—Wait for top_go to become active. Pulse adv_tfs_line for 1 cycle to reset tawradr and tbwradr registers.

Pulsing adv_tfs_line will switch the read/write sense of Table B so switching Table A here as well to keep things the same i.e. wrta0=NOT(wrta0).

diu_access:—In the diu_access state a request is sent to the DIU. Once an ack signal is received Table A write enable is asserted and the FSM moves to the tls_load state.

tls_load:—The DRAM access is a burst of 5 256-bit accesses, ultimately returned by the DIU as 5*(4*64 bit) words. There will be 192 padded bits in the last 256-bit DRAM word. The first 12 64-bit words reads are for Table A, words 12 to 15 and some of 16 are for Table B while part of read 16 data is for Table C. The counter read_num is used to identify which data goes to which table. The table B data is stored temporarily in a 288-bit register until the tls_update state hence tbwe does not become active until read_num=16).

The DIU data goes directly into Table A (12*64).

The DIU data for Table B is loaded into a 288-bit register.

The DIU data goes directly into Table C.

tls_update:—The 288-bits in Table B need to written to a 32*9 buffer. The tls_update state takes care of this using the read_num counter.

tls_next:—This state checks the logic level of tfsvalid and switches the read/write senses of Table A (wrta0) and Table B a cycle later (using the adv_tfs_line pulse). The reason for switching Table A a cycle early is to make sure the top_level address via tagdotnum is pointing to the correct buffer. Keep in mind the top_level is working a cycle ahead of Table A and 2 cycles ahead of Table B.

If tfsValid is 1, the state machine waits until the advTagLine signal is received. When it is received, the state machine pulses advTFSLine (to switch read/write sense in tables A, B, C), and starts reading the next line of the TFS from currTFSAdr.

If tfsValid is 0, the state machine pulses advTFSLine (to switch read/write sense in tables A, B, C) and then jumps to the tls_tfsvalid_set state where the signal tfsValid is set to 1 (allowing the tag encoder to start, or to continue if it had been stalled). The state machine can then start reading the next line of the TFS from currTFSAdr.

tls_tfsvalid_next:—Simply sets the tfsvalid signal and returns the FSM to the diu_access state.

If an advTagLine signal is received before the next line of the TFS has been read in, tfsValid is cleared to 0 and processing continues as outlined above.

28.8.2.2 Bandstore Wrapping

Both TD and TFS storage in DRAM can wrap around the bandstore area. The bounds of the band store are described by inputs from the CDU shown in Table 190. The TD and TFS DRAM interfaces therefore support bandstore wrapping. If the TD or TFS DRAM interface increments an address it is checked to see if it matches the end of bandstore address. If so, then the address is mapped to the start of the bandstore.

The TFS state flow diagram is shown in below.

28.8.3 Generating a Tag from Tables A, B and C

The TFS contains an entry for each dot position within the tag's bounding box. Each entry specifies whether the dot is part of the constant background pattern or part of the tag's data component (both fixed and variable).

The TFS therefore has TagHeight×TagWidth entries, where TagHeight is the height of the tag in dot-lines and TagWidth is the width of the tag in dots. The TFS entries that specify a single dot-line of a tag are known as a Tag Line Structure.

The TFS contains a TLS for each of the 1600 dpi lines in the tag's bounding box. Each TLS contains three contiguous tables, known as tables A, B and C.

Table A contains 384 2-bit entries i.e. one entry for each dot in a single line of a tag up to the maximum width of a tag. The actual number of entries used should match the size of the bounding box for the tag in the dot dimension, but all 384 entries must be present.

Table B contains 32 9-bit data address that refer to (in order of appearance) the data dots present in the particular line. Again, all 32 entries must be present, even if fewer are used.

Table C contains two 5-bit pointers into table B and is followed by 22 unused bits. The total length of each TLS is therefore 34 32-bit words.

Each output dot value is generated as follows: Each entry in Table A consists of 2-bits—bit0 and bit1. These 2-bit are interpreted according to Table, Table and Table.

TABLE 182

Interpretation of bit0 from entry in Table A

| bit0 | interpretation |
|---|---|
| 0 | the output bit comes directly from bit1 (see Table). |
| 1 | the output bit comes from a data bit. Bit1 is used in conjunction with Tag Line Structure Table B to determine which data bit will be output. |

TABLE 183

Interpretation of bit1 from entry in table A when bit0 = 0

| bit 1 | interpretation |
|---|---|
| 0 | output 0 |
| 1 | output 1 |

TABLE 184

Interpretation of bit1 from entry in table A when bit0 = 1

| bit 1 | Interpretation |
|---|---|
| 0 | output data bit pointed to by current index into Table B. |
| 1 | output data bit pointed to by current index into Table B, and advance index by 1. |

If bit0=0 then the output dot for this entry is part of the constant background pattern. The dot value itself comes from bit1 i.e. if bit1=0 then the output is 0 and if bit1=1 then the output is 1.

If bit0=1 then the output dot for this entry comes from the variable or fixed tag data. Bit1 is used in conjunction with Tables B and C to determine data bits to use.

To understand the interpretation of bit1 when bit0=1 we need to know what is stored in Table B. Table B contains the addresses of all the data bits that are used in the particular line of a tag in order of appearance.

Therefore, up to 32 different data bits can appear in a line of a tag. The address of the first data dot in a tag will be given by the address stored in entry 0 of Table B. As we advance along the various data dots we will advance through the various Table B entries.

Each Table B entry is 9-bits long and each points to a specific variable or fixed data bit for the tag. Each tag contains a maximum of 120 fixed and 360 variable data bits, for a total of 480 data bits. To aid address decoding, the addresses are based on the RS encoded tag data. Table lists the interpretation of the 9-bit addresses.

TABLE 185

Interpretation of 9-bit tag data address in Table B

| bit pos | name | description |
|---|---|---|
| 8 | CodeWordSelect | Select 1 of 8 codewords. |
| 7 | | Codewords 0, 1, 2, 3, 4, 5 are variable data. |
| 6 | | Codewords 6, 7 are fixed data. |
| 5 | SymbolSelect | Select 1 of 15 symbols (1111 invalid) |
| 4 | | |
| 3 | | |
| 2 | | |
| 1 | BitSelect | Select 1 of 4 bits from the selected symbols |
| 0 | | |

If the fixed data is supplied to the TE in an unencoded form, the symbols derived from codeword 0 of fixed data are written to codeword 6 and the symbols derived from fixed data codeword 1 are written to codeword 7. The data symbols are stored first and then the remaining redundancy symbols are stored afterwards, for a total of 15 symbols. Thus, when 5 data symbols are used, the 5 symbols derived from bits 0-19 are written to symbols 0-4, and the redundancy symbols are written to symbols 5-14. When 7 data symbols are used, the 7 symbols derived from bits 0-27 are written to symbols 0-6, and the redundancy symbols are written to symbols 7-14

However, if the fixed data is supplied to the TE in a pre-encoded form, the encoding could theoretically be anything. Consequently the 120 bits of fixed data is copied to codewords 6 and 7 as shown in Table 186.

TABLE 186

| Mapping of fixed data to codeword/symbols when no redundancy encoding | | |
|---|---|---|
| input bits | output symbol range | output codeword |
| 0-19 | 0-4 | 6 |
| 20-39 | 0-4 | 7 |
| 40-59 | 5-9 | 6 |
| 60-79 | 5-9 | 7 |
| 80-99 | 10-14 | 6 |
| 100-119 | 10-14 | 7 |

It is important to note that the interpretation of bit1 from Table A (when bit0=1) is relative. A 5-bit index is used to cycle through the data address in Table B. Since the first tag on a particular line may or may not start at the first dot in the tag, an initial value for the index into Table B is needed. Subsequent tags on the same line will always start with an index of 0, and any partial tag at the end of a line will simply finish before the entire tag has been rendered. The initial index required due to the rendering of a partial tag at the start of a line is supplied by Table C. The initial index will be different for each TLS and there are two possible initial indexes since there are effectively two types of rows of tags in terms of initial offsets.

Table C provides the appropriate start index into Table B (25-bit indices). When rendering even rows of tags, entry 0 is used as the initial index into Table B, and when rendering odd rows of tags, entry 1 is used as the initial index into Table B. The second and subsequent tags start at the left most dots position within the tag, so can use an initial index of 0.

28.8.4 Architecture

Figure 231:
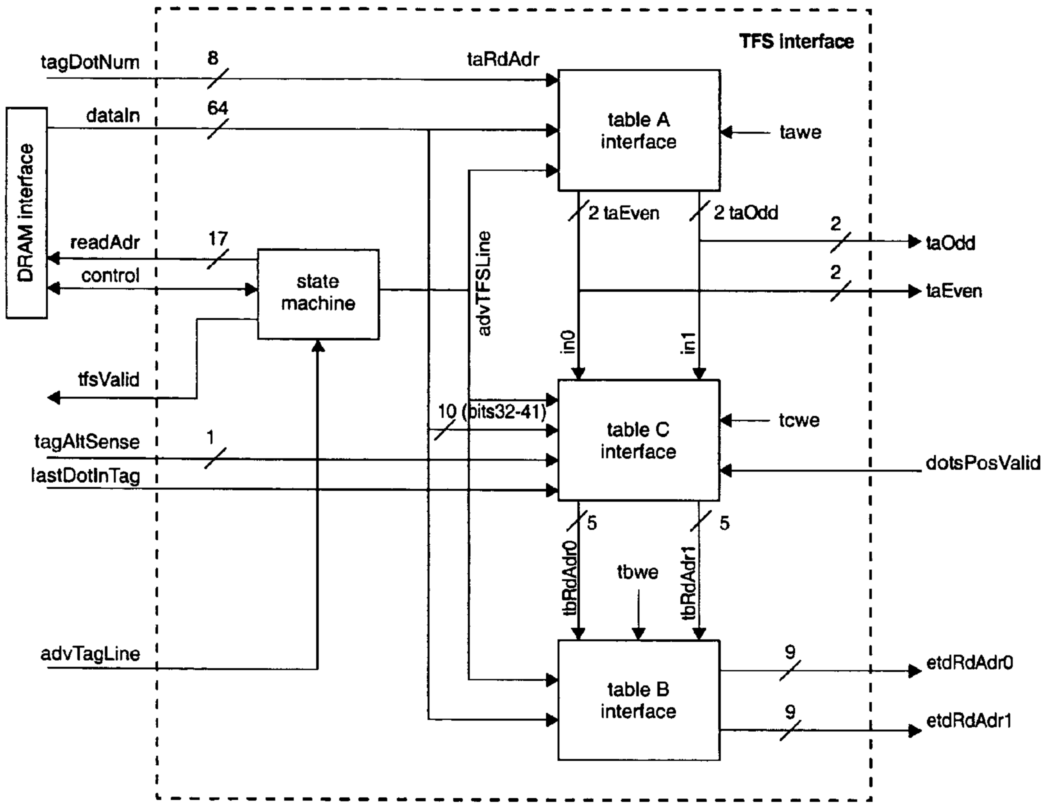
Figure 232:
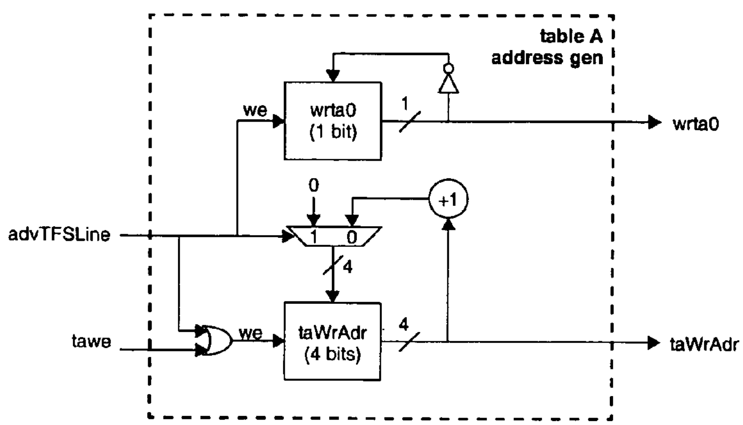

A block diagram of the Tag Format Structure Interface can be seen in FIG. 231.

28.8.4.1 Table A interface

The implementation of table A is a 32×64-bit reg. array with a small amount of control logic.

Each time an AdvTFSLine pulse is received, the sense of which half of the reg. array is being read from or written to changes. This is accomplished by a 1-bit flag called wrta0. Although the initial state of wrta0 is irrelevant, it must invert upon receipt of an AdvTFSLine pulse. A 4-bit counter called taWrAdr keeps the write address for the 12 writes that occur after the start of each line (specified by the AdvTFSLine control input). The tawe (table A write enable) input is set whenever the data in is to be written to table A. The taWrAdr address counter automatically increments with each write to table A. Address generation for tawe and taWrAdr is shown in Table 232.

28.8.4.2 Table C Interface

Figure 233:
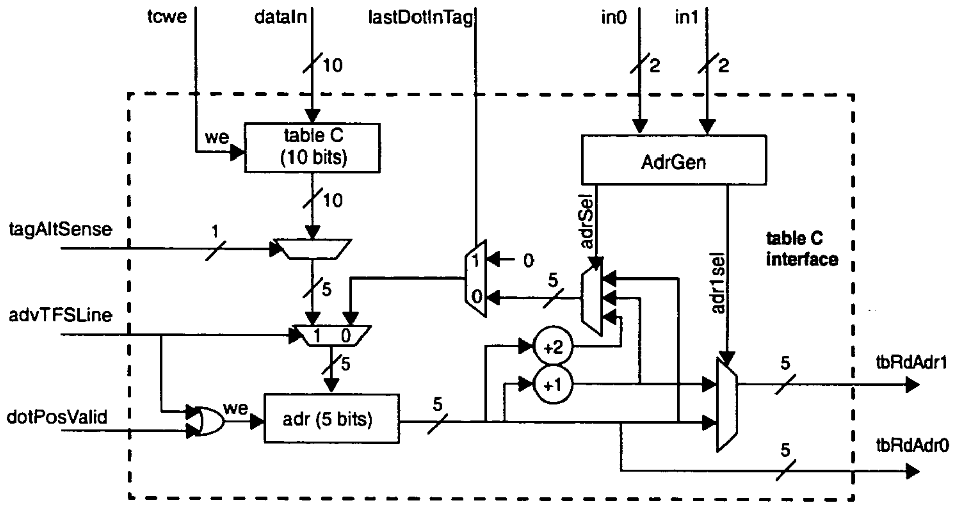

A block diagram of the table C interface is shown below in FIG. 233.

The address generator for table C contains a 5 bit address register adr that is set to a new address at the start of processing the tag (either of the two table C initial values based on tagAltSense at the start of the line, and 0 for subsequent tags on the same line). Each cycle two addresses into table B are generated based on the two 2-bit inputs (in0 and in1). As shown Section 187, the output address tbRdAdr0 is always adr and tbRdAdr1 is one of adr and adr+1, and at the end of the cycle adr takes on one of adr, adr+1, and adr+2.

TABLE 187

| AdrGen lookup table | | | | |
|---|---|---|---|---|
| inputs | | outputs | | |
| in0 | in1 | adr0Sel | adr1Sel | adrSel |
| 00 | 00 | X | X | adr |
| 00 | 01 | X | adr | adr |
| 00 | 10 | X | X | adr |
| 00 | 11 | X | adr | adr + 1 |
| 01 | 00 | adr | X | adr |
| 01 | 01 | adr | adr | adr |
| 01 | 10 | adr | X | adr |
| 01 | 11 | adr | adr | adr + 1 |
| 10 | 00 | X | X | adr |
| 10 | 01 | X | adr | adr |
| 10 | 10 | X | X | adr |
| 10 | 11 | X | adr | adr + 1 |
| 11 | 00 | adr | X | adr + 1 |
| 11 | 01 | adr | adr + 1 | adr + 1 |
| 11 | 10 | adr | X | adr + 1 |
| 11 | 11 | adr | adr + 1 | adr + 2 |

28.8.4.3 Table B Interface

Figure 234:
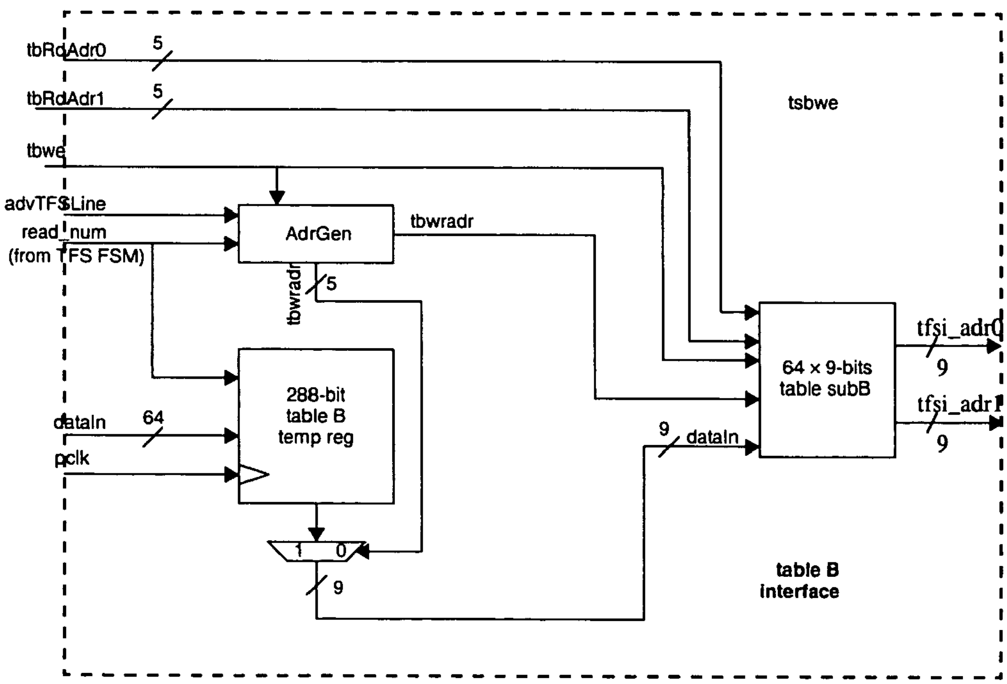
Figure 235:
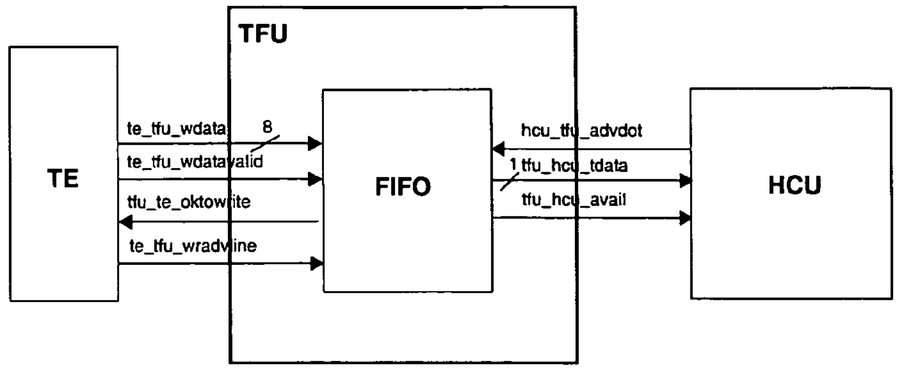

The table B interface implementation generates two two encoded tag data addresses (tfsi_adr0, tfsi_adr1) based on two table B input addresses (tbRdAdr0, tbRdAdr1). A block diagram of table B can be seen in FIG. 234.

Table B data is initially loaded into the 288-bit table B temporary register via the TFS FSM. Once all 288-bit entries have been loaded from DRAM, the data is written in 9-bit chunks to the 64*9 dual port register array based on tbwradr.

Each time an AdvTFSLine pulse is received, the sense of which sub buffer is being read from or written to changes. This is accomplished by a 1-bit flag called wrtb0. Although the initial state of wrib0 is irrelevant, it must invert upon receipt of an AdvTFSLine pulse.

29 Tag FIFO Unit (TFU)

29.1 Overview

The Tag FIFO Unit (TFU) provides the means by which data is transferred between the Tag Encoder (TE) and the HCU. By abstracting the buffering mechanism and controls from both units, the interface is clean between the data user and the data generator.

The TFU is a simple FIFO interface to the HCU. The Tag Encoder will provide support for arbitrary Y integer scaling up to 1600 dpi. X integer scaling of the tag dot data is performed at the output of the FIFO in the TFU. There is feedback to the TE from the TFU to allow stalling of the TE during a line. The TE interfaces to the TFU with a data width of 8 bits. The TFU interfaces to the HCU with a data width of 1 bit.

The depth of the TFU FIFO is chosen as 16 bytes so that the FIFO can store a single 126 dot tag.

29.1.1 Interfaces between TE, TFU and HCU 29.1.1.1 TE-TFU Interface

The interface from the TE to the TFU comprises the following signals:

te_tfu_wdata, 8-bit write data.

te_tfu_wdatavalid, write data valid.

te_tfu_wradvline, accompanies the last valid 8-bit write data in a line.

The interface from the TFU to TE comprises the following signal:

tfu_te_oktowrite, indicating to the TE that there is space available in the TFU FIFO.

The TE writes data to the TFU FIFO as long as the TFU's tfu_te_oktowrite output bit is set. The TE write will not occur unless data is accompanied by a data valid signal.

29.1.1.2 TFU-HCU Interface

The interface from the TFU to the HCU comprises the following signals:

tfu_hcu_tdata, 1-bit data.

tfu_hcu_avail, data valid signal indicating that there is data available in the TFU FIFO.

The interface from HCU to TFU comprises the following signal:

hcu_tfu_advdot, indicating to the TFU to supply the next dot.

29.1.1.2.1 X Scaling

Tag data is replicated a scale factor (SF) number of times in the X direction to convert the final output to 1600 dpi. Unlike both the CFU and SFU, which support non-integer scaling, the scaling is integer only. Replication in the X direction is performed at the output of the TFU FIFO on a dot-by-dot basis.

To account for the case where there may be two SoPEC devices, each generating its own portion of a dot-line, the first dot in a line may not be replicated the total scale-factor number of times by an individual TFU. The dot will ultimately be scaled-up correctly with both devices doing part of the scaling, one on its lead-out and the other on its lead in.

Note two SoPEC TEs may be involved in producing the same byte of output tag data straddling the printhead boundary. The HCU of the left SoPEC will accept from its TE the correct amount of dots, ignoring any dots in the last byte that do not apply to its printhead. The TE of the right SoPEC will be programmed the correct number of dots into the tag and its output will be byte aligned with the left edge of the printhead.

29.2 Definitions of I/O

TABLE 188

TFU Port List

| Port Name | Pins | I/O | Description |
|---|---|---|---|
| | | | Clocks and Resets |
| Pclk | 1 | In | SoPEC Functional clock. |
| prst_n | 1 | In | Global reset signal. |
| | | | PCU Interface data and control signals |
| pcu_adr[4:2] | 3 | In | PCU address bus. Only 3 bits are required to decode the address space for this block. |
| pcu_dataout[31:0] | 32 | In | Shared write data bus from the PCU. |
| tfu_pcu_datain[31:0] | 32 | Out | Read data bus from the TFU to the PCU. |
| pcu_rwn | 1 | In | Common read/not-write signal from the PCU. |
| pcu_tfu_sel | 1 | In | Block select from the PCU. When pcu_tfu_sel is high both pcu_adr and pcu_dataout are valid. |
| tfu_pcu_rdy | 1 | Out | Ready signal to the PCU. When tfu_pcu_rdy is high it indicates the last cycle of the access. For a write cycle this means pcu_dataout has been registered by the block and for a read cycle this means the data on tfu_pcu_datain is valid. |
| | | | TE Interface data and control signals |
| te_tfu_wdata[7:0] | 8 | In | Write data for TFU FIFO. |
| te_tfu_wdatavalid | 1 | In | Write data valid signal. |
| te_tfu_wradvline | 1 | In | Advance line signal strobed when the last byte in a line is placed on te_tfu_wdata |
| tfu_te_oktowrite | 1 | Out | Ready signal indicating TFU has space available in it's FIFO and is ready to be written to. |
| | | | HCU Interface data and control signals |
| hcu_tfu_advdot | 1 | In | Signal indicating to the TFU that the HCU is ready to accept the next dot of data from TFU. |
| tfu_hcu_tdata | 1 | Out | Data from the TFU FIFO. |
| tfu_hcu_avail | 1 | Out | Signal indicating valid data available from TFU FIFO. |

29.2

29.3 Configuration Registers

TABLE 189

TFU Configuration Registers

| Address TFU_Base+ | register name | #bits | value on reset | description |
|---|---|---|---|---|
| | | | | Control registers |
| 0x00 | Reset | 1 | 1 | A write to this register causes a reset of the TFU. |

TABLE 189-continued

TFU Configuration Registers

| Address TFU_Base+ | register name | #bits | value on reset | description |
|---|---|---|---|---|
| | | | | This register can be read to indicate the reset state: 0 - reset in progress 1 - reset not in progress. |
| 0x04 | Go | 1 | see text | Writing 1 to this register starts the TFU. Writing 0 to this register halts the TFU. When Go is deasserted the state-machines go to their idle states but all counters and configuration registers keep their values. When Go is asserted all counters are reset, but configuration registers keep their values (i.e. they don't get reset). The TFU must be started before the TE is started. This register can be read to determine if the TFU is running (1 = running, 0 = stopped). |
| Setup registers (constant during processing of page) | | | | |
| 0x08 | XScale | 8 | 1 | Tag scale factor in X direction. |
| 0x0C | XFracScale | 8 | 1 | Tag scale factor in X direction for the first dot in a line (must be programmed to be less than or equal to XScale) |
| 0x10 | TEByteCount | 12 | 0 | The number of bytes to be accepted from the TE per line. Once this number of bytes have been received subsequent bytes are ignored until there is a strobe on the te_tfu_wradvline |
| 0x14 | HCUDotCount | 16 | 0 | The number of (optionally) x-scaled dots per line to be supplied to the HCU. Once this number has been reached the remainder of the current FIFO byte is ignored. |

29.3

29.4 Detailed Description

Figure 236:
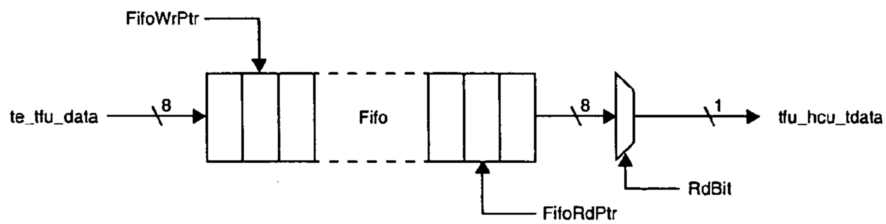

The FIFO is a simple 16-byte store with read and write pointers, and a contents store, FIG. 236. 16 bytes is sufficient to store a single 126 dot tag.

Each line a total of TEByteCount bytes is read into the FIFO. All subsequent bytes are ignored until there is a strobe on the te_tfu_wradvline signal, whereupon bytes for the next line are stored.

On the HCU side, a total of HCUDotCount dots are produced at the output. Once this count is reached any more dots in the FIFO byte currently being processed are ignored. For the first dot in the next line the start of line scale factor, XFracScale, is used.

The behaviour of these signals and the control signals between the TFU and the TE and HCU is detailed below.

```
// Concurrently Executed Code:
// TE always allowed to write when there's either (a) room or (b) no
room and all
// bytes for that line have been received.
if ((FifoCntnts != FifoMax) OR (FifoCntnts == FifoMax and ByteToRx
== 0)) then
   tfu_te_oktowrite = 1
else
   tfu_te_oktowrite = 0
// Data presented to HCU when there is (a) data in FIFO and (b) the
HCU has not
// received all dots for a line
if (FifoCntnts != 0) AND (BitToTx != 0)then
   tfu_hcu_avail = 1
else
   tfu_hcu_avail = 0
// Output mux of FIFO data
```

-continued

```
            tfu_hcu_tdata = Fifo[FifoRdPnt][RdBit]
            // Sequentially Executed Code:
            if (te_tfu_wdatavalid == 1) AND (FifoCntnts != FifoMax) AND
(ByteToRx != 0) then
              Fifo[FifoWrPnt] = te_tfu_wdata
              FifoWrPnt ++
              FifoContents ++
              ByteToRx --
            if (te_tfu_wradvline == 1) then
              ByteToRx = TEByteCount
            if (hcu_tfu_advdot == 1 and FifoCntnts != 0) then {
              BitToTx ++
              if (RepFrac == 1) then
                RepFrac = Xscale
                if (RdBit = 7) then
                  RdBit = 0
                  FifoRdPnt ++
                  FifoContents --
                else
                  RdBit++
              else
                RepFrac--
              if(BitToTx == 1) then {
                RepFrac = XFracScale
                RdBit = 0
                FifoRdPnt ++
                FifoContents--
                BitToTx = HCUDotCount
                }
              }
```

What is not detailed above is the fact that, since this is a circular buffer, both the fifo read and write-pointers wrap-around to zero after they reach two. Also not detailed is the fact that if there is a change of both the read and write-pointer in the same cycle, the fifo contents counter remains unchanged.

30 Halftoner Compositor Unit (HCU)

30.1 Overview

The Halftoner Compositor Unit (HCU) produces dots for each nozzle in the destination printhead taking account of the page dimensions (including margins). The spot data and tag data are received in bi-level form while the pixel contone data received from the CFU must be dithered to a bi-level representation. The resultant 6 bi-level planes for each dot position on the page are then remapped to 6 output planes and output one dot at a time (6 bits) to the next stage in the printing pipeline, namely the dead nozzle compensator (DNC).

30.2 Data Flow

Figure 237:
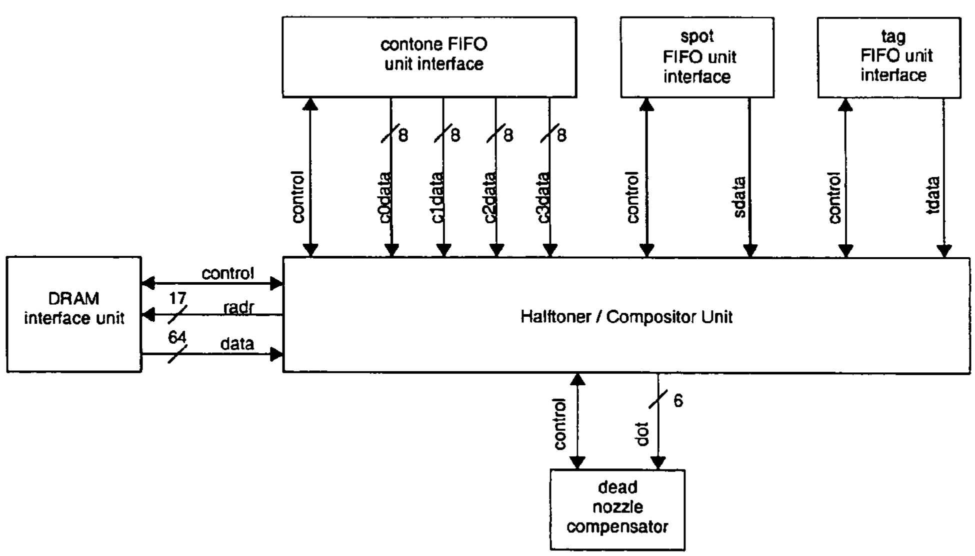

FIG. 237 shows a simple dot data flow high level block diagram of the HCU. The HCU reads contone data from the CFU, bi-level spot data from the SFU, and bi-level tag data from the TFU. Dither matrices are read from the DRAM via the DIU. The calculated output dot (6 bits) is read by the DNO.

The HCU is given the page dimensions (including margins), and is only started once for the page. It does not need to be programmed in between bands or restarted for each band. The HCU stalls appropriately if its input buffers are starved. At the end of the page the HCU continues to produce 0 for all dots as long as data is requested by the units further down the pipeline (this allows later units to conveniently flush pipelined data).

The HCU performs a linear processing of dots, calculating the 6-bit output of a dot in each cycle. The mapping of 6 calculated bits to 6 output bits for each dot allows for such example mappings as compositing of the spot0 layer over the appropriate contone layer (typically black), the merging of CMY into K (if K is present in the printhead), the splitting of K into CMY dots if there is no K in the printhead, and the generation of a fixative output bitstream if required.

30.3 DRAM Storage Requirements

SoPEC allows for a number of different dither matrix configurations up to 256 bytes wide. The dither matrix is stored in DRAM. Using either a single or double-buffer scheme a line of the dither matrix must be read in by the HCU over a SoPEC line time. SoPEC must produce 13824 dots per line for A4/Letter printing which takes 13824 cycles.

The following give the storage and bandwidths requirements for some of the possible configurations of the dither matrix.

- 4 Kbyte DRAM storage required for one 64×64 (preferred) byte dither matrix
- 6.25 Kbyte DRAM storage required for one 80×80 byte dither matrix
- 16 Kbyte DRAM storage required for four 64×64 byte dither matrices
- 64 Kbyte DRAM storage required for one 256×256 byte dither matrix It takes 4 or 8 read accesses to load a line of dither matrix into the dither matrix buffer, depending on whether a single or double buffer is used (configured by DoubleLineBuffregister).

30.4 Implementation

Figure 238:
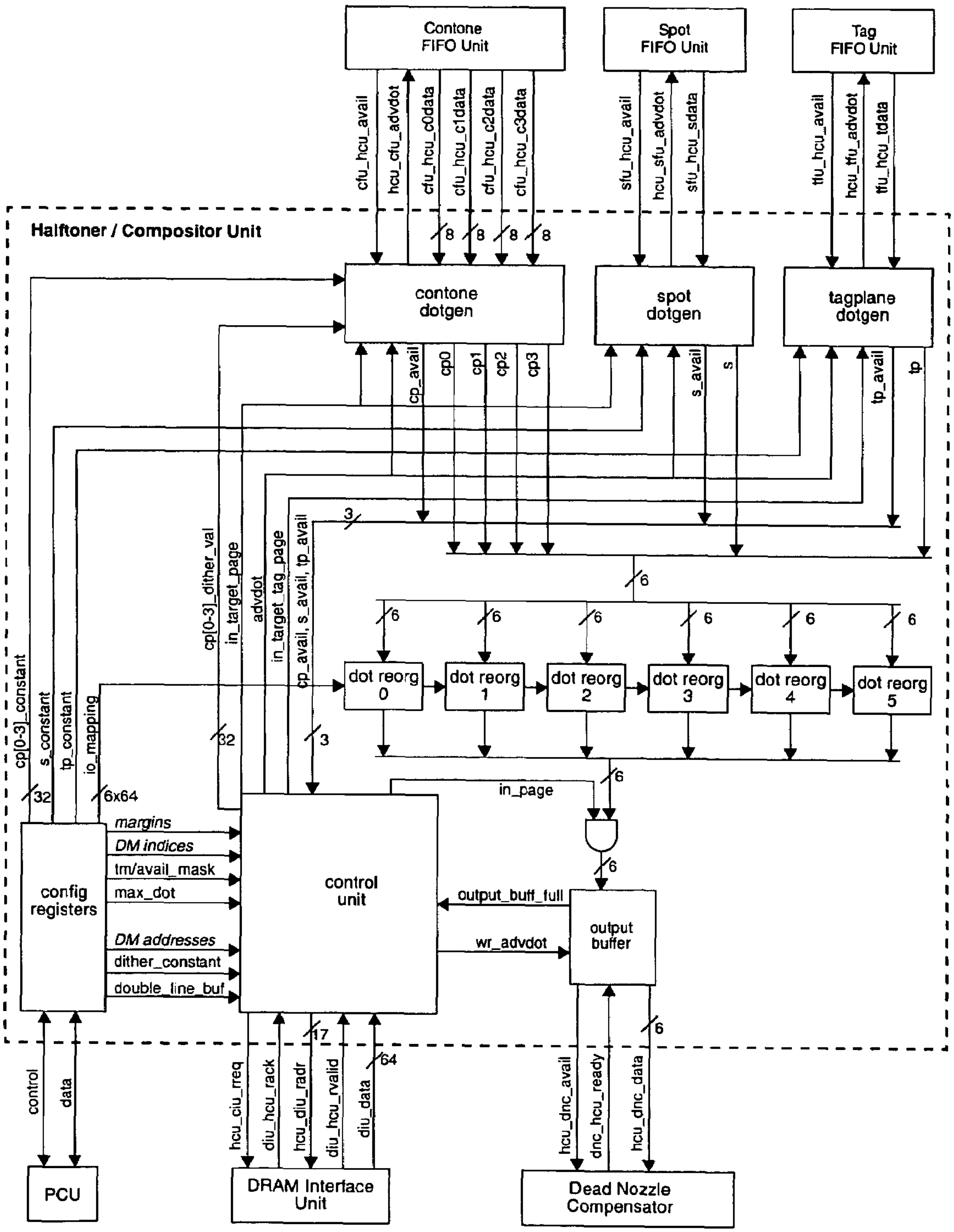

A block diagram of the HCU is given in FIG. 238.

30.4.1 Definition of I/O

TABLE 190

HCU port list and description

| Port name | Pins | I/O | Description |
| --- | --- | --- | --- |
| | | | Clocks and reset |
| pclk | 1 | In | System clock. |
| prst_n | 1 | In | System reset, synchronous active low. |
| | | | PCU interface |
| pcu_hcu_sel | 1 | In | Block select from the PCU. When pcu_hcu_sel is high both pcu_adr and pcu_dataout are valid. |
| pcu_rwn | 1 | In | Common read/not-write signal from the PCU. |
| pcu_adr[7:2] | 6 | In | PCU address bus. Only 6 bits are required to decode the address space for this block. |
| pcu_dataout[31:0] | 32 | In | Shared write data bus from the PCU. |
| hcu_pcu_rdy | 1 | Out | Ready signal to the PCU. When hcu_pcu_rdy is high it indicates the last cycle of the access. For a write cycle this means pcu_dataout has been registered by the block and for a read cycle this means the data on hcu_pcu_datain is valid. |
| hcu_pcu_datain[31:0] | 32 | Out | Read data bus to the PCU. |
| | | | DIU interface |
| hcu_diu_rreq | 1 | Out | HCU read request, active high. A read request must be accompanied by a valid read address. |
| diu_hcu_rack | 1 | In | Acknowledge from DIU, active high. Indicates that a read request has been accepted and the new read address can be placed on the address bus, hcu_diu_radr. |
| hcu_diu_radr[21:5] | 17 | Out | HCU read address. 17 bits wide (256-bit aligned word). |
| diu_hcu_rvalid | 1 | In | Read data valid, active high. Indicates that valid read data is now on the read data bus, diu_data. |
| diu_data[63:0] | 64 | In | Read data from DIU. |
| | | | CFU interface |
| cfu_hcu_avail | 1 | In | Indicates valid data present on cfu_hcu_c[3-0]data lines. |
| cfu_hcu_c0data[7:0] | 8 | In | Pixel of data in contone plane 0. |
| cfu_hcu_c1data[7:0] | 8 | In | Pixel of data in contone plane 1. |
| cfu_hcu_c2data[7:0] | 8 | In | Pixel of data in contone plane 2. |
| cfu_hcu_c3data[7:0] | 8 | In | Pixel of data in contone plane 3. |
| hcu_cfu_advdot | 1 | Out | Informs the CFU that the HCU has captured the pixel data on cfu_hcu_c[3-0]data lines and the CFU can now place the next pixel on the data lines. |
| | | | SFU interface |
| sfu_hcu_avail | 1 | In | Indicates valid data present on sfu_hcu_sdata. |
| sfu_hcu_sdata | 1 | In | Bi-level dot data. |
| hcu_sfu_advdot | 1 | Out | Informs the SFU that the HCU has captured the dot data on sfu_hcu_sdata and the SFU can now place the next dot on the data line. |
| | | | TFU interface |
| tfu_hcu_avail | 1 | In | Indicates valid data present on tfu_hcu_tdata. |
| tfu_hcu_tdata | 1 | In | Tag dot data. |
| hcu_tfu_advdot | 1 | Out | Informs the TFU that the HCU has captured the dot data on tfu_hcu_tdata and the TFU can now place the next dot on the data line. |
| | | | DNC interface |
| dnc_hcu_ready | 1 | In | Indicates that DNC is ready to accept data from the HCU. |
| hcu_dnc_avail | 1 | Out | Indicates valid data present on hcu_dnc_data. |
| hcu_dnc_data[5:0] | 6 | Out | Output bi-level dot data in 6 ink planes. |

30.4.1

30.4.2 Configuration Registers

The configuration registers in the HCU are programmed via the PCU interface. Refer to section 23.8.2 on page 439 for the description of the protocol and timing diagrams for reading and writing registers in the HCU. Note that since addresses in SoPEC are byte aligned and the PCU only supports 32-bit register reads and writes, the lower 2 bits of the PCU address bus are not required to decode the address space for the HCU. When reading a register that is less than 32 bits wide zeros are returned on the upper unused bit(s) of hcu_pcu_datain. The configuration registers of the HCU are listed in Table 191.

TABLE 191

HCU Registers

| Address (HCU_base+) | Register Name | #bits | Value on Reset | Description |
|---|---|---|---|---|
| Control registers | | | | |
| 0x00 | Reset | 1 | 0x1 | A write to this register causes a reset of the HCU. |
| 0x04 | Go | 1 | 0x0 | Writing 1 to this register starts the HCU. Writing 0 to this register halts the HCU. When Go is asserted all counters, flags etc. are cleared or given their initial value, but configuration registers keep their values. When Go is deasserted the state-machines go to their idle states but all counters and configuration registers keep their values. The HCU should be started after the CFU, SFU, TFU, and DNC. This register can be read to determine if the HCU is running (1 = running, 0 = stopped). |
| Setup registers (constant for during processing) | | | | |
| 0x10 | AvailMask | 4 | 0x0 | Mask used to determine which of the dotgen units etc. are to be checked before a dot is generated by the HCU within the specified margins for the specified color plane. If the specified dotgen unit is stalled, then the HCU will also stall. See Table 192 for bit allocation and definition. |
| 0x14 | TMMask | 4 | 0x0 | Same as AvailMask, but used in the top margin area before the appropriate target page is reached. |
| 0x18 | PageMarginY | 32 | 0x0000_0000 | The first line considered to be off the page. |
| 0x1C | MaxDot | 16 | 0x0000 | This is the maximum dot number −1 present across a page. For example if a page contains 13824 dots, then MaxDot will be 13823. |
| 0x20 | TopMargin | 32 | 0x0000_0000 | The first line on a page to be considered within the target page for contone and spot data. (0 = first printed line of page) |
| 0x24 | BottomMargin | 32 | 0x0000_0000 | The first line in the target bottom margin for contone and spot data (i.e. first line after target page). |
| 0x28 | LeftMargin | 16 | 0x0000 | The first dot on a line within the target page for contone and spot data. |
| 0x2C | RightMargin | 16 | 0xFFFF | The first dot on a line within the target right margin for contone and spot data. |
| 0x30 | TagTopMargin | 32 | 0x0000_0000 | The first line on a page to be considered within the target page for tag data. (0 = first printed line of page) |
| 0x34 | TagBottomMargin | 32 | 0x0000_0000 | The first line in the target bottom margin for tag data (i.e. first line after target page). |
| 0x38 | TagLeftMargin | 16 | 0x0000 | The first dot on a line within the target page for tag data. |
| 0x3C | TagRightMargin | 16 | 0xFFFF | The first dot on a line within the target right margin for tag data. |
| 0x44 | StartDMAdr[21:5] | 17 | 0x0_0000 | Points to the first 256-bit word of the first line of the dither matrix in DRAM. |
| 0x48 | EndDMAdr[21:5] | 17 | 0x0_0000 | Points to the last address of the group of four 256-bit reads (or 8 if single buffering) that reads in the last line of the dither matrix. |
| 0x4C | LineIncrement | 5 | 0x2 | The number of 256-bit words in DRAM from the start of one line of the dither matrix and the start of the next line, i.e. the value by which the DRAM address is incremented at the start of a line so that it points to the start of the next line of the dither matrix. |
| 0x50 | DMInitIndexC0 | 8 | 0x00 | If using the single-buffer scheme this register represents the initial index within 256-byte dither matrix line buffer for contone plane 0. If using double-buffer scheme, only the 7 lsbs are used. |
| 0x54 | DMLwrIndexC0 | 8 | 0x00 | If using the single-buffer scheme this register represents the lower index within 256-byte dither matrix line buffer for contone plane 0. If using double-buffer scheme, only the 7 lsbs are used. |

TABLE 191-continued

HCU Registers

| Address (HCU_base+) | Register Name | #bits | Value on Reset | Description |
|---|---|---|---|---|
| 0x58 | DMUprIndexC0 | 8 | 0x3F | If using the single-buffer scheme this register represents the upper index within 256-byte dither matrix line buffer for contone plane 0. After reading the data at this location the index wraps to DMLwrIndexC0. If using double-buffer scheme, only the 7 lsbs are used. |
| 0x5C | DMInitIndexC1 | 8 | 0x00 | If using the single-buffer scheme this register represents the initial index within 256-byte dither matrix line buffer for contone plane 1. If using double-buffer scheme, only the 7 lsbs are used. |
| 0x60 | DMLwrIndexC1 | 8 | 0x00 | If using the single-buffer scheme this register represents the lower index within 256-byte dither matrix line buffer for contone plane 1. If using double-buffer scheme, only the 7 lsbs are used. |
| 0x64 | DMUprIndexC1 | 8 | 0x3F | If using the single-buffer scheme this register represents the upper index within 256-byte dither matrix line buffer for contone plane 1. After reading the data at this location the index wraps to DMLwrIndexC1. If using double-buffer scheme, only the 7 lsbs are used. |
| 0x68 | DMInitIndexC2 | 8 | 0x00 | If using the single-buffer scheme this register represents the initial index within 256-byte dither matrix line buffer for contone plane 2. If using double-buffer scheme, only the 7 lsbs are used. |
| 0x6C | DMLwrIndexC2 | 8 | 0x00 | If using the single-buffer scheme this register represents the lower index within 256-byte dither matrix line buffer for contone plane 2. If using double-buffer scheme, only the 7 lsbs are used. |
| 0x70 | DMUprIndexC2 | 8 | 0x3F | If using the single-buffer scheme this register represents the upper index within 256-byte dither matrix line buffer for contone plane 2. After reading the data at this location the index wraps to DMLwrIndexC2. If using double-buffer scheme, only the 7 lsbs are used. |
| 0x74 | DMInitIndexC3 | 8 | 0x00 | If using the single-buffer scheme this register represents the initial index within 256-byte dither matrix line buffer for contone plane 3. If using double-buffer scheme, only the 7 lsbs are used. |
| 0x78 | DMLwrIndexC3 | 8 | 0x00 | If using the single-buffer scheme this register represents the lower index within 256-byte dither matrix line buffer for contone plane 3. If using double-buffer scheme, only the 7 lsbs are used. |
| 0x7C | DMUprIndexC3 | 8 | 0x3F | If using the single-buffer scheme this register represents the upper index within 256-byte dither matrix line buffer for contone plane 3. After reading the data at this location the index wraps to DMLwrIndexC3. If using double-buffer scheme, only the 7 lsbs are used. |
| 0x80 | DoubleLineBuf | 1 | 0x1 | Selects the dither line buffer mode to be single or double buffer.<br>0 - single line buffer mode<br>1 - double line buffer mode |
| 0x84 to 0x98 | IOMappingLo | 6x32 | 0x0000_0000 | The dot reorg mapping for output inks 0 to 5. For each ink's 64-bit IOMapping value, IOMappingLo represents the low order 32 bits. |
| 0x9C to 0xB0 | IOMappingHi | 6x32 | 0x0000_0000 | The dot reorg mapping for output inks 0 to 5. For each ink's 64-bit IOMapping value, IOMappingHi represents the high order 32 bits. |
| 0xB4 to 0xC0 | cpConstant | 4x8 | 0x00 | The constant contone value to output for contone plane N when printing in the margin areas of the page. This value will typically be 0. |
| 0xC4 | sConstant | 1 | 0x0 | The constant bi-level value to output for spot when printing in the margin areas of the page. This value will typically be 0. |
| 0xC8 | tConstant | 1 | 0x0 | The constant bi-level value to output for tag data when printing in the margin areas of the page. This value will typically be 0. |

TABLE 191-continued

HCU Registers

| Address (HCU_base+) | Register Name | #bits | Value on Reset | Description |
|---|---|---|---|---|
| 0xCC | DitherConstant | 8 | 0xFF | The constant value to use for dither matrix when the dither matrix is not available, i.e. when the signal dm_avail is 0. This value will typically be 0xFF so that cpConstant can easily be 0x00 or 0xFF without requiring a dither matrix (DitherConstant is primarily used for threshold dithering in the margin areas). |
| Debug registers (read only) | | | | |
| 0xD0 | HcuPortsDebug | 14 | N/A | Bit 13 = tfu_hcu_avail<br>Bit 12 = hcu_tfu_advdot<br>Bit 11 = sfu_hcu_avail<br>Bit 10 = hcu_sfu_advdot<br>Bit 9 = cfu_hcu_avail<br>Bit 8 = hcu_cfu_advdot<br>Bit 7 = dnc_hcu_ready<br>Bit 6 = hcu_dnc_avail<br>Bits 5-0 = hcu_dnc_data |
| 0xD4 | HcuDotgenDebug | 15 | N/A | Bit 14 = after_top_margin<br>Bit 13 = in_tag_target_page<br>Bit 12 = in_target_page<br>Bit 11 = tp_avail<br>Bit 10 = s_avail<br>Bit 9 = cp_avail<br>Bit 8 = dm_avail<br>Bit 7 = advdot<br>Bits 5-0 = [tp, s, cp3, cp2, cp1, cp0] (i.e. 6 bit input to dot reorg units) |
| 0xD8 | HcuDitherDebug1 | 17 | N/A | Bit 17 = advdot<br>Bit 16 = dm_avail<br>Bit 15-8 = cp1_dither_val<br>Bits 7-0 = cp0_dither_val |
| 0xDC | HcuDitherDebug2 | 17 | N/A | Bit 17 = advdot<br>Bit 16 = dm_avail<br>Bit 15-8 = cp3_dither_val<br>Bits 7-0 = cp2_dither_vall |

30.4.3 Control Unit

Figure 239:
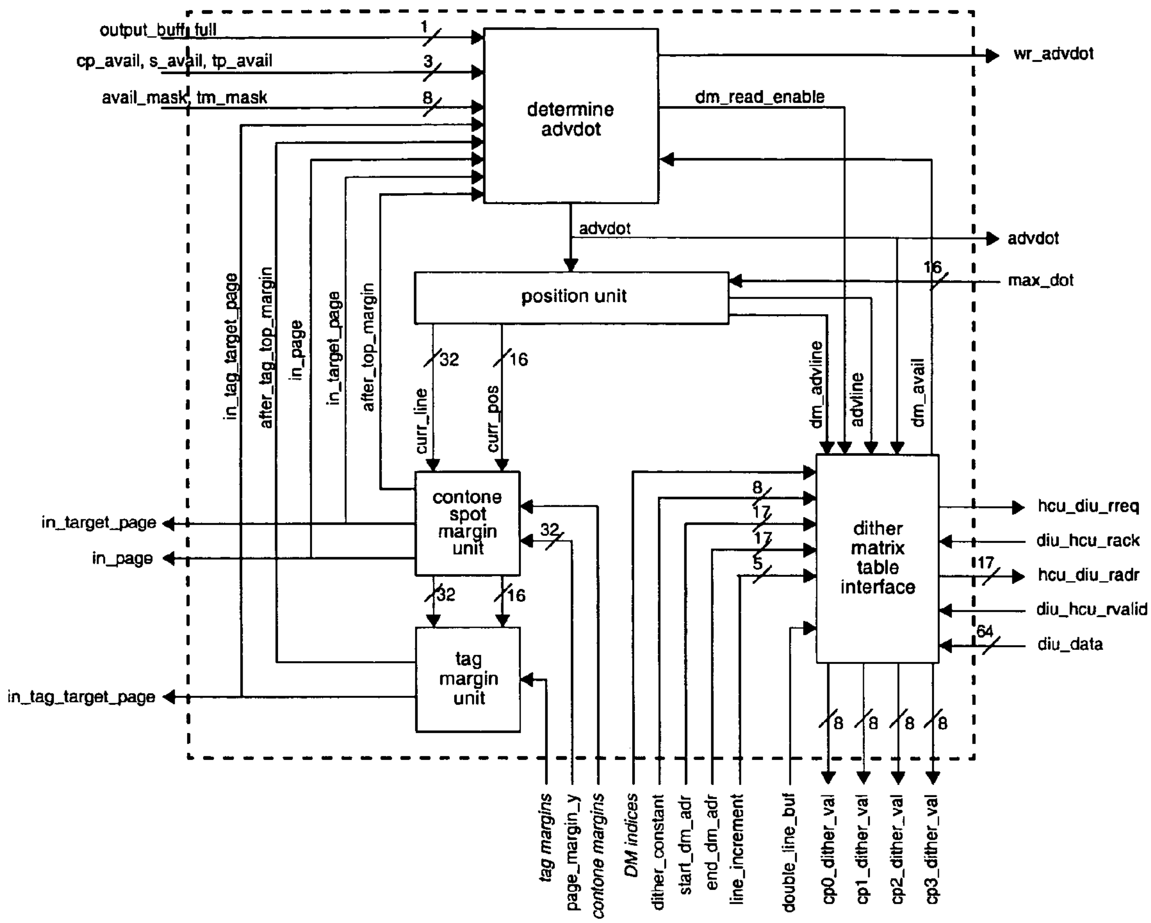

The control unit is responsible for controlling the overall flow of the HCU. It is responsible for determining whether or not a dot will be generated in a given cycle, and what dot will actually be generated—including whether or not the dot is in a margin area, and what dither cell values should be used at the specific dot location. A block diagram of the control unit is shown in FIG. 239.

The inputs to the control unit are a number of avail flags specifying whether or not a given dotgen unit is capable of supplying 'real' data in this cycle. The term 'real' refers to data generated from external sources, such as contone line buffers, bi-level line buffers, and tag plane buffers. Each dotgen unit informs the control unit whether or not a dot can be generated this cycle from real data. It must also check that the DNC is ready to receive data.

The contone/spot margin unit is responsible for determining whether the current dot coordinate is within the target contone/spot margins, and the tag margin unit is responsible for determining whether the current dot coordinate is within the target tag margins.

The dither matrix table interface provides the interface to DRAM for the generation of dither cell values that are used in the halftoning process in the contone dotgen unit.

30.4.3.1 Determine Advdot

The HCU does not always require contone planes, bi-level or tag planes in order to produce a page. For example, a given page may not have a bi-level layer, or a tag layer. In addition, the contone and bi-level parts of a page are only required within the contone and bi-level page margins, and the tag part of a page is only required within the tag page margins. Thus output dots can be generated without contone, bi-level or tag data before the respective top margins of a page has been reached, and 0s are generated for all color planes after the end of the page has been reached (to allow later stages of the printing pipeline to flush).

Consequently the HCU has an AvailMask register that determines which of the various input avail flags should be taken notice of during the production of a page from the first line of the target page, and a TMMask register that has the same behaviour, but is used in the lines before the target page has been reached (i.e. inside the target top margin area). The dither matrix mask bit TMask[0] is the exception, it applies to all margins areas, not just the top margin. Each bit in the AvailMask refers to a particular avail bit: if the bit in the AvailMask register is set, then the corresponding avail bit must be 1 for the HCU to advance a dot. The bit to avail correspondence is shown in Table 192. Care should be taken with TMMask—if the particular data is not available after the top margin has been reached, then the HCU will stall, potentially causing a print buffer underrun if the printhead has already commenced printing and the HCU stalls for long enough. Note that the avail bits for contone and spot colors are ANDed with in_target_page after the target page area has been reached to allow dot production in the contone/spot margin areas without needing any data in the CFU and SFU. The avail bit for tag color is ANDed with in_tag_target_page after the target tag page area has been reached to allow dot production in the tag margin areas without needing any data in the TFU.

TABLE 192

Correspondence between bit in AvailMask and avail flag

| bit # in AvailMask | avail flag | description |
|---|---|---|
| 0 | dm_avail | dither matrix data available |
| 1 | cp_avail | contone pixels available |
| 2 | s_avail | spot color available |
| 3 | tp_avail | tag plane available |

Figure 240:
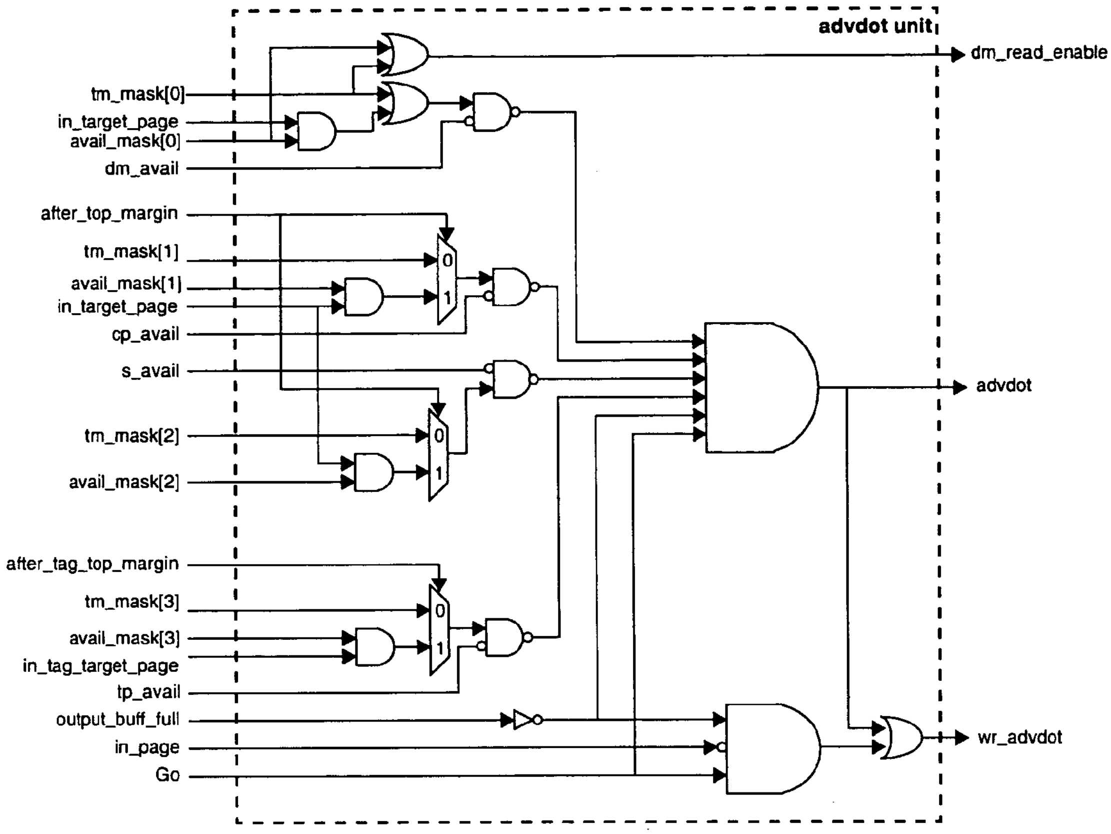

Each of the input avail bits is processed with its appropriate mask bit and the after_top_margin flag (note the dither matrix is the exception, as it is processed with in_target_page). The output bits are ANDed together along with Go and output_buff_full (which specifies whether the output buffer is ready to receive a dot in this cycle) to form the output bit advdot. We also generate wr_advdot. In this way, if the output buffer is full or any of the specified avail flags is clear, the HCU stalls. When the end of the page is reached, in_page is deasserted and the HCU continues to produce 0 for all dots as long as the DNC requests data. A block diagram of the determine advdot unit is shown in FIG. 240.

The advance dot block also determines if the current page needs a dither matrix. It indicates this to the dither matrix table interface block via the dm_read_enable signal. If no dither is required in the margins or in the target page then dm_read_enable is 0 and no dither is read in for this page.

30.4.3.2 Position Unit

The position unit is responsible for outputting the position of the current dot (curr_pos, curr_line) and whether or not this dot is the last dot of a line (advline). Both curr_pos and curr_line are set to 0 at reset or when Go transitions from 0 to 1. The position unit relies on the advdot input signal to advance through the dots on a page. Whenever an advdot pulse is received, curr_pos gets incremented. If curr_pos equals max_dot then an adviine pulse is generated as this is the last dot in a line, curr_line gets incremented, and the curr_pos is reset to 0 to start counting the dots for the next line.

The position unit also generates a filtered version of advline called dm_advline to indicate to the dither matrix pointers to increment to the next line. The dm_advline is only incremented when dither is required for that line.

```
if ((after_top_margin AND avail_mask[0]) OR tm_mask[0]) then
        dm_advline = advline
else
        dm_advline = 0
```

30.4.3.3 Margin Unit

Figure 241:
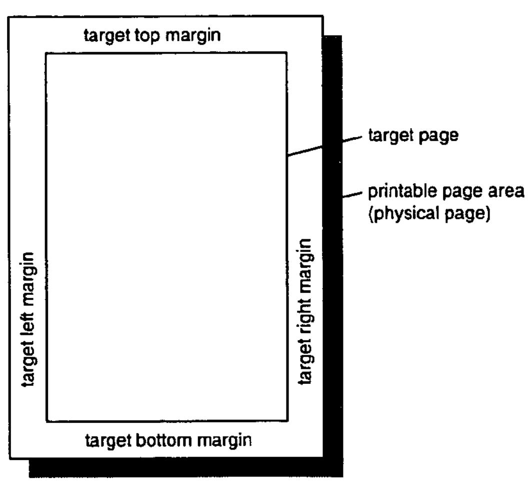

The responsibility of the margin unit is to determine whether the specific dot coordinate is within the page at all, within the target page or in a margin area (see FIG. 241). This unit is instantiated for both the contone/spot margin unit and the tag margin unit.

The margin unit takes the current dot and line position, and returns three flags.

the first, in_page, is 1 if the current dot is within the page, and 0 if it is outside the page.

the second flag, in_target_page, is 1 if the dot coordinate is within the target page area of the page, and 0 if it is within the target top/left/bottom/right margins.

the third flag, after_top margin, is 1 if the current dot is below the target top margin, and 0 if it is within the target top margin.

Figure 242:
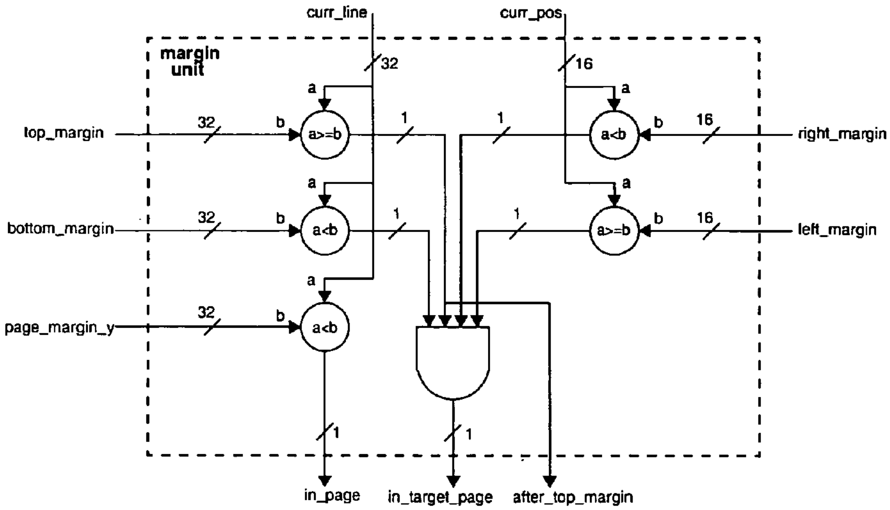

A block diagram of the margin unit is shown in FIG. 242.

30.4.3.4 Dither Matrix Table Interface

The dither matrix table interface provides the interface to DRAM for the generation of dither cell values that are used in the halftoning process in the contone dotgen unit. The control flag dm_read_enable enables the reading of the dither matrix table line structure from DRAM. If dm_read_enable is 0, the dither matrix is not specified in DRAM and no DRAM accesses are attempted. The dither matrix table interface has an output flag dm_avail which specifies if the current line of the specified matrix is available. The HCU can be directed to stall when dm_avail is 0 by setting the appropriate bit in the HCU's AvailMask or TMMask registers. When dm_avail is 0 the value in the DitherConstant register is used as the dither cell values that are output to the contone dotgen unit.

Figure 243:
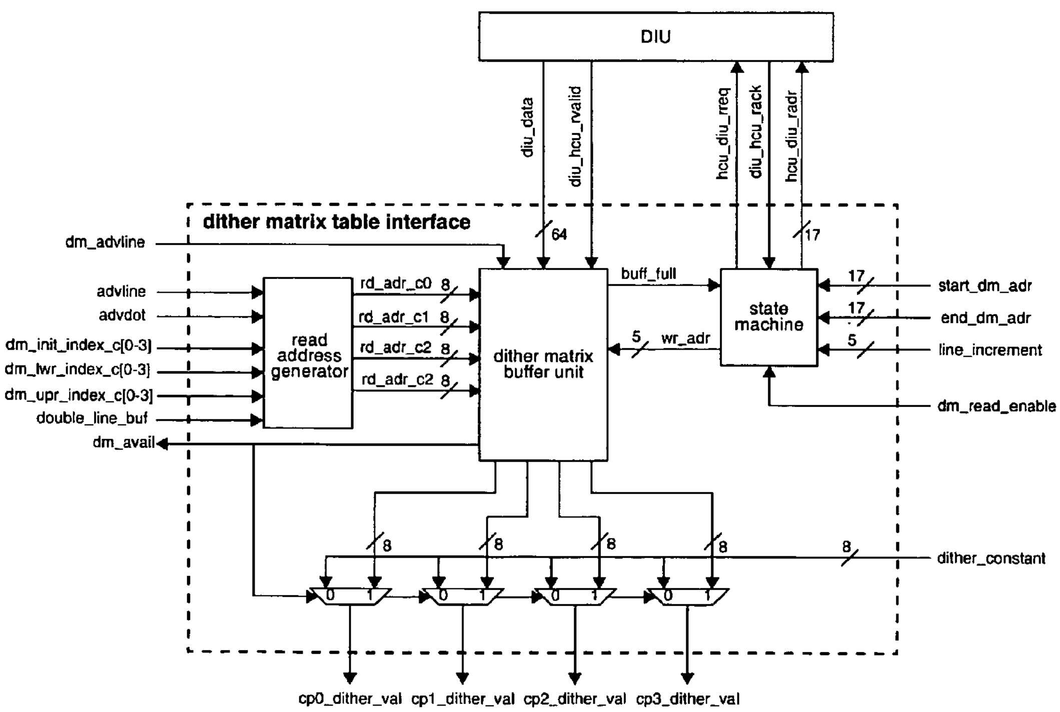

The dither matrix table interface consists of a state machine that interfaces to the DRAM interface, a dither matrix buffer that provides dither matrix values, and a unit to generate the addresses for reading the buffer. FIG. 243 shows a block diagram of the dither matrix table interface.

30.4.3.5 Dither Data Structure in DRAM

The dither matrix is stored in DRAM in 256-bit words, transferred to the HCU in 64-bit words and consumed by the HCU in bytes. Table 193 shows the 64-bit words mapping to 256-bit word addresses, and Table 194 shows the 8-bit dither value mapping in the 64-bit word.

TABLE 193

Dither Data stored in DRAM

| Address[21:5] | Data[255:0] | | | |
|---|---|---|---|---|
| 00000 | D3 [255:192] | D2 [191:128] | D1 [127:64] | D0 [63:0] |
| 00001 | D7 [255:192] | D6 [191:128] | D5 [127:64] | D4 [63:0] |
| 00010 | D11 [255:192] | D10 [191:128] | D9 [127:64] | D8 [63:0] |
| 00011 | D15 [255:192] | D14 [191:128] | D13 [127:64] | D12 [63:0] |
| 00100 | D19 [255:192] | D18 [191:128] | D17 [127:64] | D16 [63:0] |
| etc | | | | |

When the HCU first requests data from DRAM, the 64-bit word transfer order is D0,D1,D2,D3. On the second request the transfer order is D4,D5,D6,D7 and so on for other requests.

TABLE 194

Dither data stored in HCUs line buffer

| Dither index[7:0] | Data[7:0] |
|---|---|
| 00 | D0[7:0] |
| 01 | D0[15:8] |
| 02 | D0[23:16] |
| 03 | D0[31:24] |
| 04 | D0[39:32] |
| 05 | D0[47:40] |

TABLE 194-continued

Dither data stored in HCUs line buffer

| Dither index[7:0] | Data[7:0] |
|---|---|
| 06 | D0[55:48] |
| 07 | D0[63:56] |
| 08 | D1[7:0] |
| 09 | D1[15:8] |
| 0A | D1[23:16] |
| 0B | D1[31:24] |
| 0C | D1[39:32] |
| 0D | D1[47:40] |
| 0E | D1[55:48] |
| 0F | D1[63:56] |
| 10 | D2[7:0] |
| 11 | D2[15:8] |
| 12 | D2[23:16] |
| 13 | D2[32:24] |
| 14 | D2[39:32] |
| 15 | D2[47:40] |
| 16 | D2[55:48] |
| 17 | D2[63:56] |
| 18 | D3[7:0] |
| 19 | D3[15:8] |
| 1A | D3[23:16] |
| 1B | D3[31:24] |
| 1C | D3[39:32] |
| 1D | D3[47:40] |
| 1E | D3[55:48] |
| 1F | D3[63:56] |
| 20 | D4[7:0] |
| 21 | D4[15:8] |
| 22 | D4[23:16] |
| 23 | D4[31:24] |
| 24 | D4[39:32] |
| 25 | D4[47:40] |
| 26 | D4[55:48] |
| 27 | D4[63:56] |
| 28 | D5[7:0] |
| 29 | D5[15:8] |
| 2A | D5[23:16] |
| 2B | D5[31:24] |
| 2C | D5[39:32] |
| 2D | D5[47:40] |
| 2E | D5[55:48] |
| 2F | D5[63:56] |
| etc. | etc. |

30.4.3.5.1 Dither Matrix Buffer

The state machine loads dither matrix table data a line at a time from DRAM and stores it in a buffer. A single line of the dither matrix is either 256 or 128 8-bit entries, depending on the programmable bit DoubleLineBuf. If this bit is enabled, a double-buffer mechanism is employed such that while one buffer is read from for the current line's dither matrix data (8 bits representing a single dither matrix entry), the other buffer is being written to with the next line's dither matrix data (64-bits at a time). Alternatively, the single buffer scheme can be used, where the data must be loaded at the end of the line, thus incurring a delay.

The single/double buffer is implemented using a 256 byte 3-port register array, two reads, one write port, with the reads clocked at double the system clock rate (320 MHz) allowing 4 reads per clock cycle.

The dither matrix buffer unit also provides the mechanism for keeping track of the current read and write buffers, and providing the mechanism such that a buffer cannot be read from until it has been written to. In this case, each buffer is a line of the dither matrix, i.e. 256 or 128 bytes.

The dither matrix buffer maintains a read and write pointer for the dither matrix. The output value dm_avail is derived by comparing the read and write pointers to determine when the dither matrix is not empty. The write pointer wr_adr is incremented each time a 64-bit word is written to the dither matrix buffer and the read pointer rd_ptr is incremented each time dm_advline is received. If double_line_buf is 0 the rd_ptr will increment by 2, otherwise it will increment by 1. If the dither matrix buffer is full then no further writes will be allowed (buff_full=1), or if the buffer is empty no further buffer reads are allowed (buff_emp=1).

The read addresses are byte aligned and are generated by the read address generator. A single dither matrix entry is represented by 8 bits and an entry is read for each of the four contone planes in parallel. If double buffer is used (double_line_buf=]) the read address is derived from 7-bit address from the read address generator and 1-bit from the read pointer. If double_line_buf=0 then the read address is the full 8-bits from the read address generator.

```
if (double__line__buf == 1 )then
        read__port[7:0] = {rd__ptr[0],rd__adr[6:0]}     // concatenation
else
        read__port[7:0] = rd__adr[7:0]
```

30.4.3.5.2 Read Address Generator

For each contone plane there is a initial, lower and upper index to be used when reading dither cell values from the dither matrix double buffer. The read address for each plane is used to select a byte from the current 256-byte read buffer. When Go gets set (0 to 1 transition), or at the end of a line, the read addresses are set to their corresponding initial index. Otherwise, the read address generator relies on advdot to advance the addresses within the inclusive range specified the lower and upper indices, represented by the following pseudocode:

```
if (advdot == 1) then
   if (advline == 1) then
      rd__adr = dm__init__index
   elsif (rd__adr == dm__upr__index) then
      rd__adr = dm__lwr__index
   else
      rd__adr ++
else
   rd__adr = rd__adr
```

30.4.3.5.3 State Machine

Figure 245:
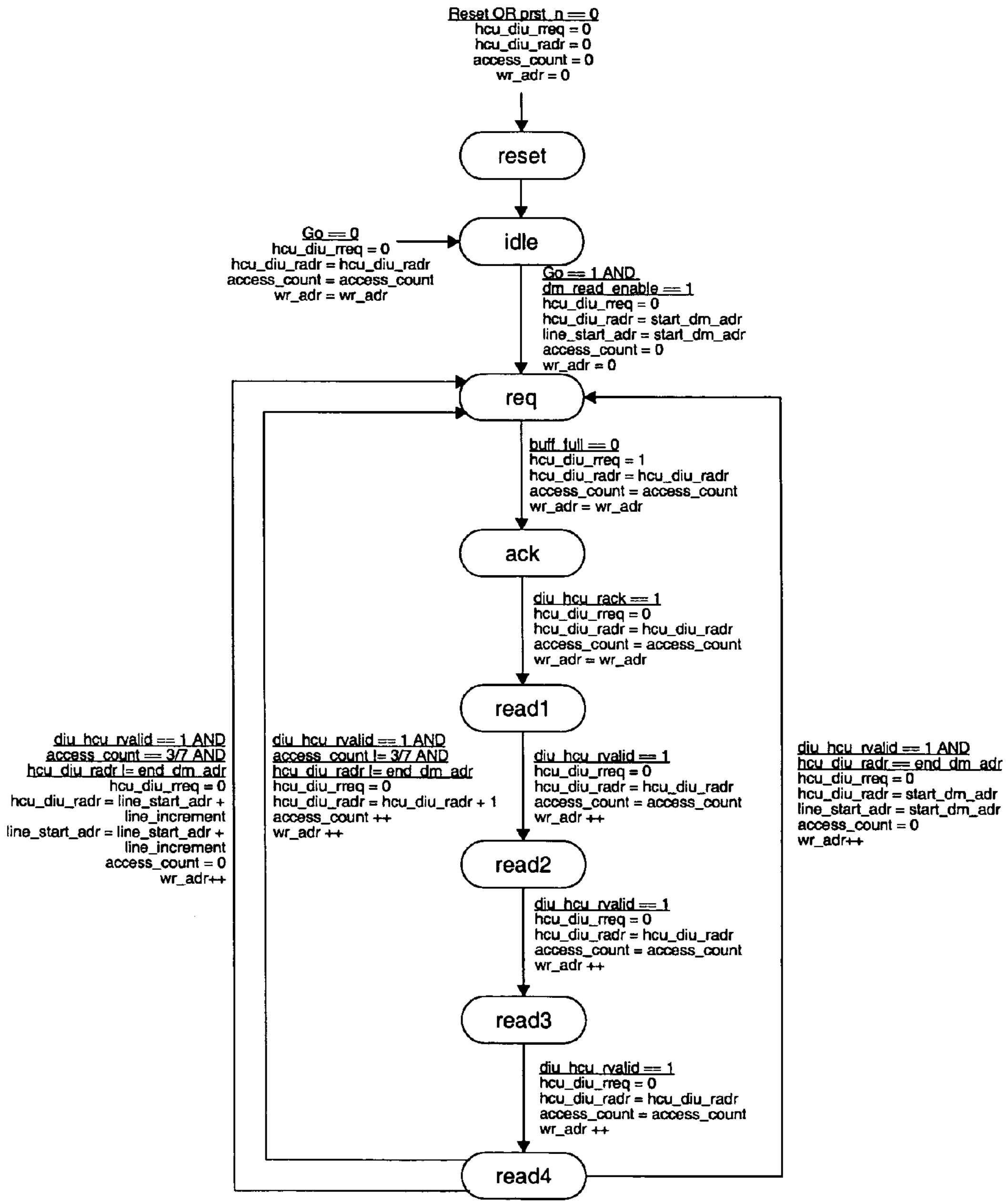

The dither matrix is read from DRAM in single 256-bit accesses, receiving the data from the DIU over 4 clock cycles (64-bits per cycle). The protocol and timing for read accesses to DRAM is described in section 22.9.1 on page 337. Read accesses to DRAM are implemented by means of the state machine described in FIG. 245.

All counters and flags are cleared after reset or when Go transitions from 0 to 1. While the Go bit is 1, the state machine relies on the dm_read_enable bit to tell it whether to attempt to read dither matrix data from DRAM. When dm_read_enable is clear, the state machine does nothing and remains in the idle state. When dm_read_enable is set, the state machine continues to load dither matrix data, 256-bits at a time (received over 4 clock cycles, 64 bits per cycle), while there is space available in the dither matrix buffer, (buff_full!=1).

The read address and line_start_adr are initially set to start_dm_adr. The read address gets incremented after each read access. It takes 4 or 8 read accesses to load a line of dither matrix into the dither matrix buffer, depending on whether single or double buffering is being used. A count is kept of the accesses to DRAM.

When a read access completes and access_count equals 3 or 7, a line of dither matrix has just been loaded from and the read address is updated to line_start_adr plus line_increment so it points to the start of the next line of dither matrix. (line_start_adr is also updated to this value). If the read address equals end_dm_adr then the next read address will be start_dm_adr, thus the read address wraps to point to the start of the area in DRAM where the dither matrix is stored.

The write address for the dither matrix buffer is implemented by means of a modulo-32 counter that is initially set to 0 and incremented when diu_hcu_rvalid is asserted.

Figure 244:
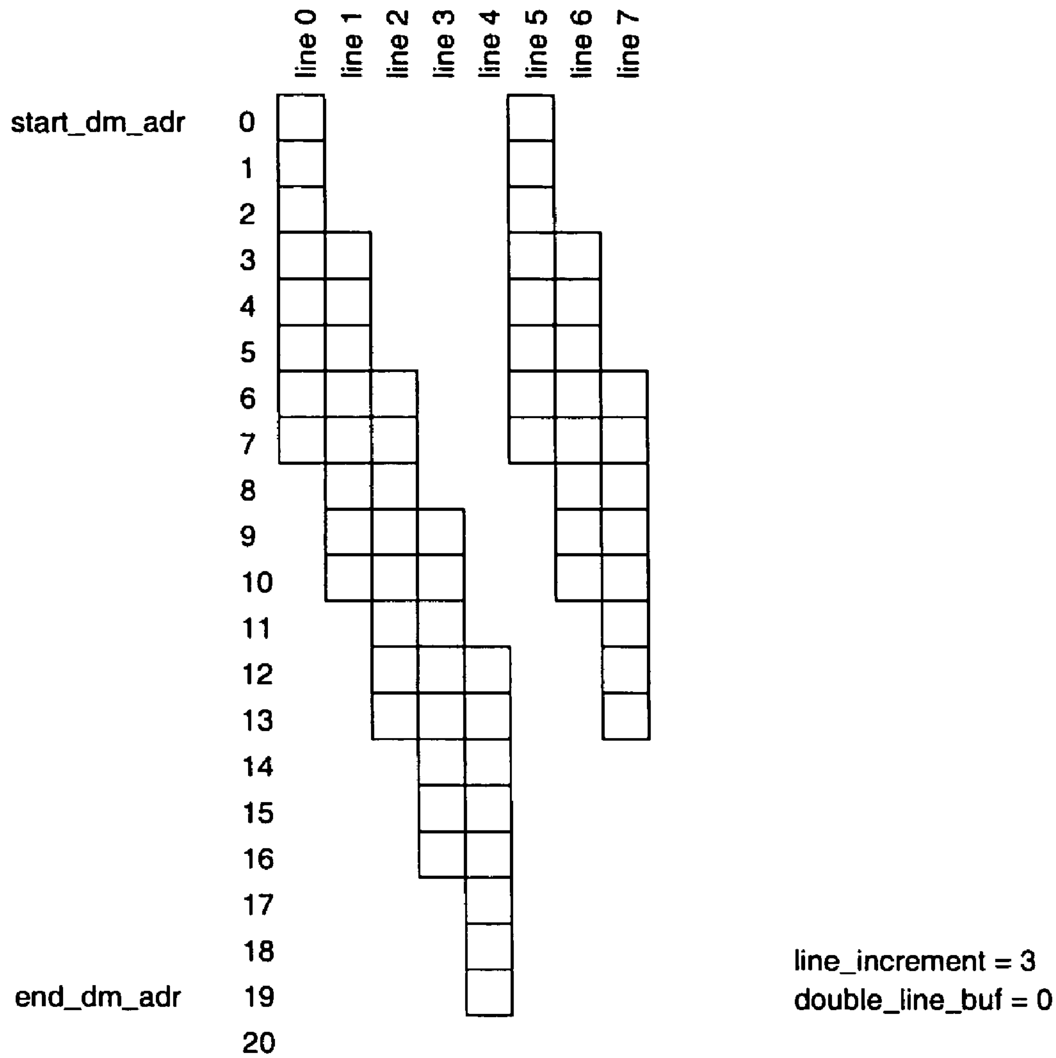

FIG. 244 shows an example of setting start_dm_adr and end_dm_adr values in relation to the line increment and double line buffer settings. The calculation of end_dm_adr is

```
// end__dm__adr calculation
dm__height = Dither matrix height in lines
if (double__line__buf == 1)        //
            end__dm__adr[21:5] = start__dm__adr[21:5] +
(((dm__height - 1)*line__inc) + 3) << 5)
else
            end__dm__adr[21:5] = start__dm__adr[21:5] +
(((dm__height - 1)*line__inc) + 7) << 5)
```

30.4.4 Contone Dotgen Unit

The contone dotgen unit is responsible for producing a dot in up to 4 color planes per cycle. The contone dotgen unit also produces a cp_avail flag which specifies whether or not contone pixels are currently available, and the output hcu_cfu_advdot to request the CFU to provide the next contone pixel in up to 4 color planes.

Figure 246:
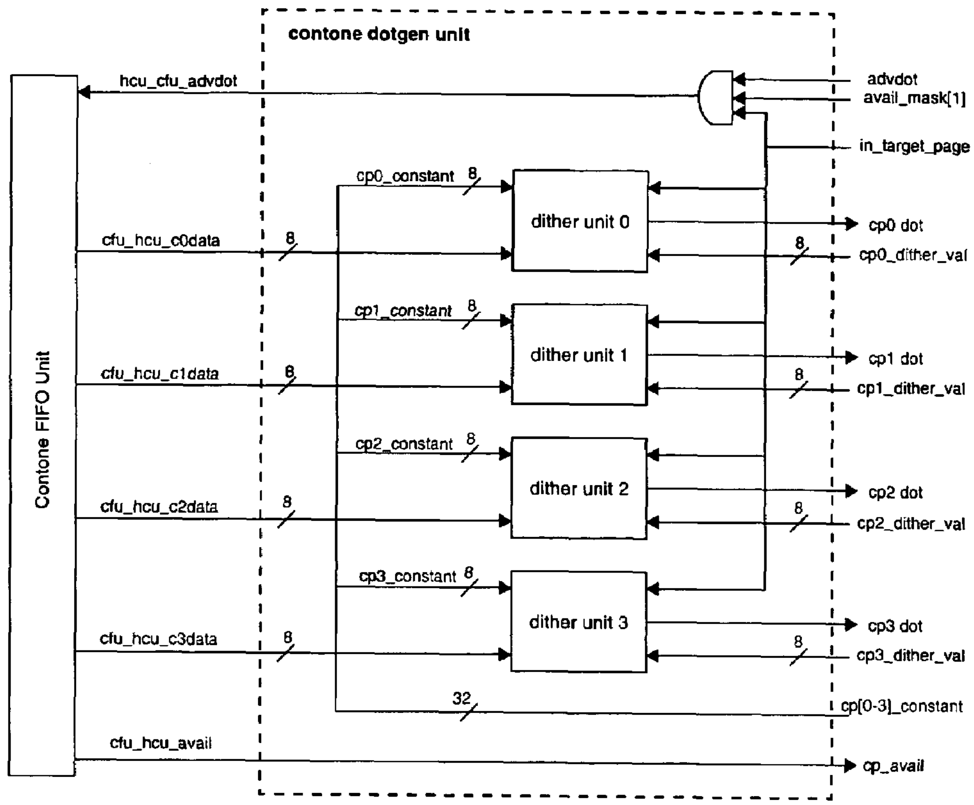

The block diagram for the contone dotgen unit is shown in FIG. 246.

A dither unit provides the functionality for dithering a single contone plane. The contone image is only defined within the contone/spot margin area. As a result, if the input flag in_target_page is 0, then a constant contone pixel value is used for the pixel instead of the contone plane.

The resultant contone pixel is then halftoned. The dither value to be used in the halftoning process is provided by the control data unit. The halftoning process involves a comparison between a pixel value and its corresponding dither value. If the 8-bit contone value is greater than or equal to the 8-bit dither matrix value a 1 is output. If not, then a 0 is output. This means each entry in the dither matrix is in the range 1-255 (0 is not used).

Note that constant use is dependant on the in_target_page signal only. If in_target_page is 1 then the cfu_hcu_c*_data passes through, regardless of the stalling behaviour or the avail_mask[1] setting. This allows a constant value to be setup on the CFU output data, and the use of different constants while inside and outside the target page. The hcu_cfu_advdot will always be zero if the avail_mask[1] is zero.

30.4.5 Spot Dotgen Unit

The spot dotgen unit is responsible for producing a dot of bi-level data per cycle. It deals with bi-level data (and therefore does not need to halftone) that comes from the LBD via the SFU. Like the contone layer, the bi-level spot layer is only defined within the contone/spot margin area. As a result, if input flag in_target_page is 0, then a constant dot value (typically this would be 0) is used for the output dot.

The spot dotgen unit also produces a s_avail flag which specifies whether or not spot dots are currently available for this spot plane, and the output hcu_sfu_advdot to request the SFU to provide the next bi-level data value. The spot dotgen unit can be represented by the following pseudocode:

```
        s__avail = sfu__hcu__avail
        if (in__target__page == 1 AND avail__mask[2] == 0 )OR
(in__target__page == 0) then
            hcu__sfu__advdot = 0
        else
            hcu__sfu__advdot = advdot
        if (in__target__page == 1) then
            sp = sfu__hcu__sdata
        else
            sp = sp__constant
```

Note that constant use is dependant on the in_target_page signal only. If in_target_page is 1 then the sfu_hcu_data passes through, regardless of the stalling behaviour or the avail_mask setting. This allows a constant value to be setup on the SFU output data, and the use of different constants while inside and outside the target page. The hcu_sfu_advdot will always be zero if the avail_mask[2] is zero.

30.4.6 Tag Dotgen unit

This unit is very similar to the spot dotgen unit (see Section 30.4.5) in that it deals with bi-level data, in this case from the TE via the TFU. The tag layer is only defined within the tag margin area. As a result, if input flag in_tag_target_page is 0, then a constant dot value, tp_constant (typically this would be 0), is used for the output dot. The tagplane dotgen unit also produces a tp_avail flag which specifies whether or not tag dots are currently available for the tagplane, and the output hcu_tfu_advdot to request the TFU to provide the next bi-level data value.

The hcu_tfu_advdot generation is similar to the SFU and CFU, except it depends only on in_target_page and advdot. It does not take avail_mask into account when inside the target page.

30.4.7 Dot Reorg Unit

The dot reorg unit provides a means of mapping the bi-level dithered data, the spot0 color, and the tag data to output inks in the actual printhead. Each dot reorg unit takes a set of 6 1-bit inputs and produces a single bit output that represents the output dot for that color plane.

The output bit is a logical combination of any or all of the input bits. This allows the spot color to be placed in any output color plane (including infrared for testing purposes), black to be replaced by cyan, magenta and yellow (in the case of no black ink in the Memjet printhead), and tag dot data to be placed in a visible plane. An output for fixative can readily be generated by simply combining desired input bits.

The dot reorg unit contains a 64-bit lookup to allow complete freedom with regards to mapping. Since all possible combinations of input bits are accounted for in the 64 bit lookup, a given dot reorg unit can take the mapping of other reorg units into account. For example, a black plane reorg unit may produce a 1 only if the contone plane 3 or spot color inputs are set (this effectively composites black bi-level over the contone). A fixative reorg unit may generate a 1 if any 2 of the output color planes is set (taking into account the mappings produced by the other reorg units).

If dead nozzle replacement is to be used (see section 31.4.2 on page 631), the dot reorg can be programmed to direct the dots of the specified color into the main plane, and 0 into the other. If a nozzle is then marked as dead in the DNC, swapping the bits between the planes will result in 0 in the dead nozzle, and the required data in the other plane.

If dead nozzle replacement is to be used, and there are no tags, the TE can be programmed with the position of dead nozzles and the resultant pattern used to direct dots into the specified nozzle row. If only fixed background TFS is to be used, a limited number of nozzles can be replaced. If variable tag data is to be used to specify dead nozzles, then large numbers of dead nozzles can be readily compensated for.

The dot reorg unit can be used to average out the nozzle usage when two rows of nozzles share the same ink and tag encoding is not being used. The TE can be programmed to produce a regular pattern (e.g. 0101 on one line, and 1010 on the next) and this pattern can be used as a directive as to direct dots into the specified nozzle row.

Figure 247:
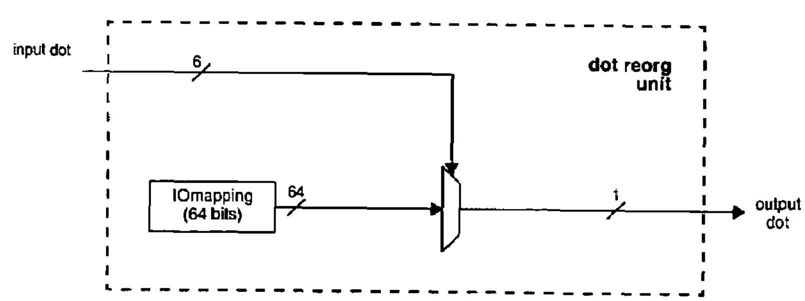

Each reorg unit contains a 64-bit IOMapping value programmable as two 32-bit HCU registers, and a set of selection logic based on the 6-bit dot input ($2^6$=64 bits), as shown in FIG. 247.

The mapping of input bits to each of the 6 selection bits is as defined in Table 195.

TABLE 195

Mapping of input bits to 6 selection bits

| address bit of lookup | tied to | likely interpretation |
|---|---|---|
| 0 | bi-level dot from contone layer 0 | cyan |
| 1 | bi-level dot from contone layer 1 | magenta |
| 2 | bi-level dot from contone layer 2 | yellow |
| 3 | bi-level dot from contone layer 3 | black |
| 4 | bi-level spot0 dot | black |
| 5 | bi-level tag dot | infra-red |

30.4.8 Output Buffer

The output buffer de-couples the stalling behaviour of the feeder units from the stalling behaviour of the DNC. The larger the buffer the greater de-coupling. Currently the output buffer size is 2.

If the Go bit is set to 0 no read or write of the output buffer is permitted. On a 0 to 1 transition of the Go bit the contents of the output buffer are cleared.

The output buffer also implements the interface logic to the DNC. If there is data in the output buffer the hcu_dnc_avail signal is 1, otherwise is 0. If both hcu_dnc avail and dnc_hcu ready are 1 then data is read from the output buffer.

On the write side if there is space available in the output buffer the logic indicates to the control unit via the output_buff_full signal. The control unit will then allow writes to the output buffer via the wr_advdot signal. If the writes to the output buffer are after the end of a page (indicated by in_page equal to 0) then all dots written into the output buffer are set to zero.

30.4.8.1 HCU to DNC Interface

Figure 248:
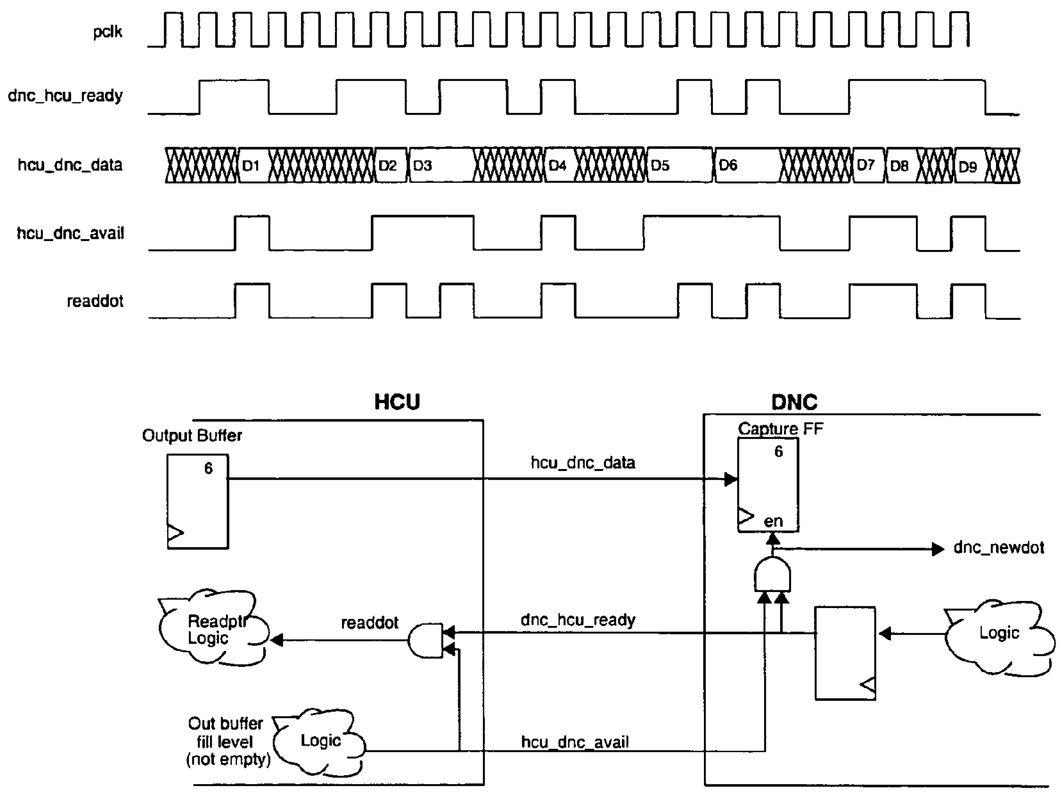

FIG. 248 shows the timing diagram and representative logic of the HCU to DNC interface. The hcu_dnc_avail signal indicate to the DNC that the HCU has data available. The dnc_hcu_ready signal indicates to the HCU that the DNC is ready to accept data. When both signals are high data is transferred from the HCU to the DNC. Once the HCU indicates it has data available (setting the hcu_dnc_avail signal high) it can only set the hcu_dnc_avail low again after a dot is accepted by the DNC.

30.4.9 Feeder to HCU Interfaces

Figure 249:
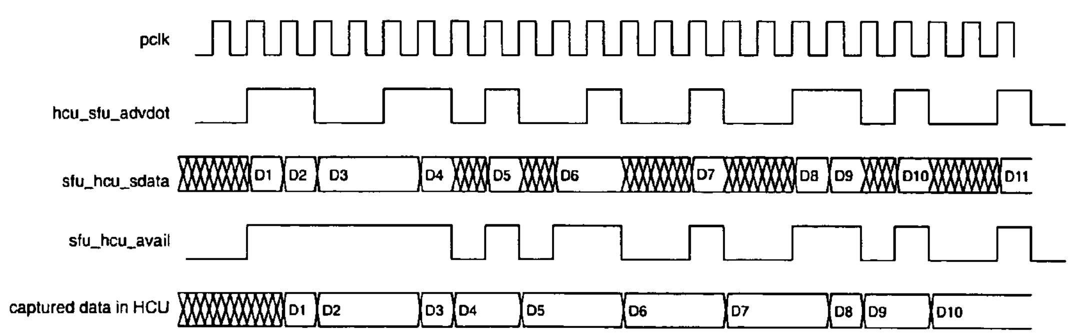
Figure 250:
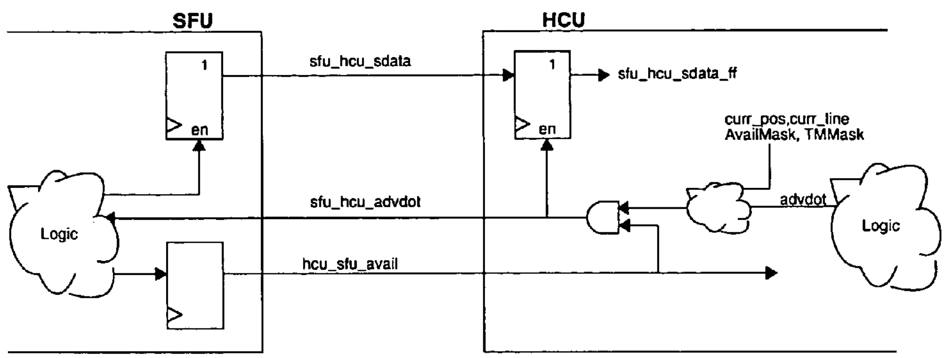

FIG. 249 shows the feeder unit to HCU interface timing diagram, and FIG. 250 shows representative logic of the interface with the register positions. sfu_hcu_data and sfu_hcu_avail are always registered while the sfu_hcu_advdot is not. The hcu_sfu_avail signal indicates to the HCU that the feeder unit has data available, and sfu_hcu_advdot indicates to the feeder unit that the HCU has captured the last dot. The HCU can never produce an advance dot pulse while the avail is low. The diagrams show the example of the SFU to HCU interface, but the same interface is used for the other feeder units TFU and CFU.

31 Dead Nozzle Compensator (DNC)

31.1 Overview

Figure 251:
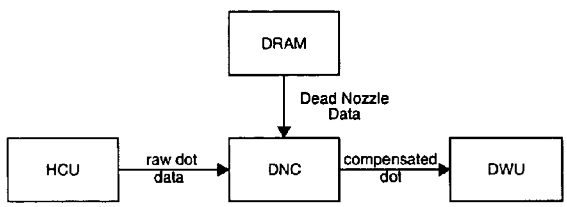

The Dead Nozzle Compensator (DNC) is responsible for adjusting Memjet dot data to take account of non-functioning nozzles in the Memjet printhead. Input dot data is supplied from the HCU, and the corrected dot data is passed out to the DWU. The high level data path is shown by the block diagram in FIG. 251.

The DNC compensates for a dead nozzles by performing the following operations:

Dead nozzle removal, i.e. turn the nozzle off

Ink replacement by direct substitution e.g. K->$K_{alternative}$

Ink replacement by indirect substitution e.g. K->CMY

Error diffusion to adjacent nozzles

Fixative corrections

The DNC is required to efficiently support up to 5% dead nozzles, under the expected DRAM bandwidth allocation, with no restriction on where dead nozzles are located and handle any fixative correction due to nozzle compensations. Performance must degrade gracefully after 5% dead nozzles.

31.2 Dead Nozzle Identification

Figure 252:
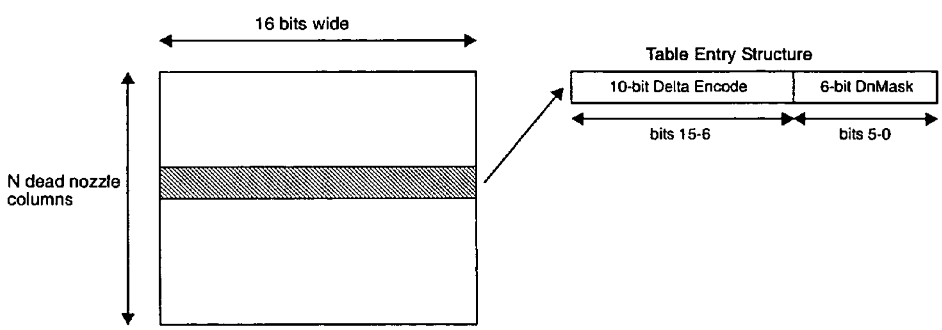

Dead nozzles are identified by means of a position value and a mask value. Position information is represented by a 10-bit delta encoded format, where the 10-bit value defines the number of dots between dead nozzle columns. The delta information is stored with an associated 6-bit dead nozzle mask (dn_mask) for the defined dead nozzle position. Each bit in the dn_mask corresponds to an ink plane. A set bit indicates that the nozzle for the corresponding ink plane is dead. The dead nozzle table format is shown in FIG. 252. The DNC reads dead nozzle information from DRAM in single 256-bit accesses. A 10-bit delta encoding scheme is chosen so that each table entry is 16 bits wide, and 16 entries fit exactly in each 256-bit read. Using 10-bit delta encoding means that the maximum distance between dead nozzle columns is 1023 dots. It is possible that dead nozzles may be spaced further than 1023 dots from each other, so a null dead nozzle identifier is required. A null dead nozzle identifier is defined as a 6-bit dn_mask of all zeros. These null dead nozzle identifiers should also be used so that:

the dead nozzle table is a multiple of 16 entries (so that it is aligned to the 256-bit DRAM locations)

the dead nozzle table spans the complete length of the line, i.e. the first entry dead nozzle table should have a delta from the first nozzle column in a line and the last entry in the dead nozzle table should correspond to the last nozzle column in a line.

Note that the DNC deals with the width of a page. This may or may not be the same as the width of the printhead (printhead ICs may overlap due to misalignment during assembly, and additionally, the LLU may introduce margining to the page). Care must be taken when programming the dead nozzle table so that dead nozzle positions are correctly specified with respect to the page and printhead.

31.3 DRAM Storage and Bandwidth Requirement

The memory required is largely a factor of the number of dead nozzles present in the printhead (which in turn is a factor of the printhead size). The DNC reads a 16-bit entry from the dead nozzle table for every dead nozzle. Table 196 shows the DRAM storage and average bandwidth requirements for the DNC for different percentages of dead nozzles and different page sizes.

TABLE 196

Dead Nozzle storage and average bandwidth requirements

| Page size | % Dead Nozzles | Dead nozzle table Memory (KBytes) | Dead nozzle table Bandwidth (bits/cycle) |
|---|---|---|---|
| A4[a] | 5% | 1.4[c] | 0.8[d] |
| | 10% | 2.7 | 1.6 |
| | 15% | 4.1 | 2.4 |
| A3[b] | 5% | 1.9 | 0.8 |
| | 10% | 3.8 | 1.6 |
| | 15% | 5.7 | 2.4 |

[a]Linking printhead has 13824 nozzles per color providing full bleed printing for A4/Letter
[b]Linking printhead has 19488 nozzles per color providing full bleed printing for A3
[c]16 bits × 13824 nozzles × 0.05 dead
[d](16 bits read/20 cycles) = 0.8 bits/cycle 31.4 Nozzle Compensation The DNC receives 6 bits of dot information every cycle from the HCU, 1 bit per color plane. When the dot position corresponds to a dead nozzle column, the associated 6-bit dn_mask indicates which ink plane(s) contains a dead nozzle(s). The DNC first deletes dots destined for the dead nozzle. It then replaces those dead dots, either by placing the data destined for the dead nozzle into an adjacent ink plane (direct substitution) or into a number of ink planes (indirect substitution). After ink replacement, if a dead nozzle is made active again then the DNC performs error diffusion. Finally, following the dead nozzle compensation mechanisms the fixative, if present, may need to be adjusted due to new nozzles being activated, or dead nozzles being removed.

31.4.1 Dead Nozzle Removal

If a nozzle is defined as dead, then the first action for the DNC is to turn off (zeroing) the dot data destined for that nozzle. This is done by a bit-wise ANDing of the inverse of the dn_mask with the dot value.

31.4.2 Ink Replacement

Ink replacement is a mechanism where data destined for the dead nozzle is placed into an adjacent ink plane of the same color (direct substitution, e.g. K->$K_{alternative}$), or placed into a number of ink planes, the combination of which produces the desired color (indirect substitution, e.g. K->CMY). Ink replacement is performed by filtering out ink belonging to nozzles that are dead and then adding back in an appropriately calculated pattern. This two step process allows the optional re-inclusion of the ink data into the original dead nozzle position to be subsequently error diffused. In the general case, fixative data destined for a dead nozzle should not be left active intending it to be later diffused.

The ink replacement mechanism has 6 ink replacement patterns, one per ink plane, programmable by the CPU. The dead nozzle mask is ANDed with the dot data to see if there are any planes where the dot is active but the corresponding nozzle is dead. The resultant value forms an enable, on a per ink basis, for the ink replacement process. If replacement is enabled for a particular ink, the values from the corresponding replacement pattern register are ORed into the dot data. The output of the ink replacement process is then filtered so that error diffusion is only allowed for the planes in which error diffusion is enabled. The output of the ink replacement logic is ORed with the resultant dot after dead nozzle removal. See FIG. 257 on page 642 for implementation details.

For example if we consider the printhead color configuration C, M, Y, $K_1$, $K_2$, IR and the input dot data from the HCU is b101100. Assuming that the $K_1$ ink plane and IR ink plane for this position are dead so the dead nozzle mask is b000101. The DNC first removes the dead nozzle by zeroing the $K_1$ plane to produce b101000. Then the dead nozzle mask is ANDed with the dot data to give b000100 which selects the ink replacement pattern for $K_1$ (in this case the ink replacement pattern for $K_1$ is configured as b000010, i.e. ink replacement into the $K_2$ plane). Providing error diffusion for $K_2$ is enabled, the output from the ink replacement process is b000001. This is ORed with the output of dead nozzle removal to produce the resultant dot b101010. As can be seen the dot data in the defective $K_1$ nozzle was removed and replaced by a dot in the adjacent $K_2$ nozzle in the same dot position, i.e. direct substitution.

In the example above the $K_1$ ink plane could be compensated for by indirect substitution, in which case ink replacement pattern for $K_1$ would be configured as b111000 (substitution into the CMY color planes), and this is ORed with the output of dead nozzle removal to produce the resultant dot b111000. Here the dot data in the defective $K_1$ ink plane was removed and placed into the CMY ink planes.

31.4.3 Error Diffusion

Based on the programming of the lookup table the dead nozzle may be left active after ink replacement. In such cases the DNC can compensate using error diffusion. Error diffusion is a mechanism where dead nozzle dot data is diffused to adjacent dots.

When a dot is active and its destined nozzle is dead, the DNC will attempt to place the data into an adjacent dot position, if one is inactive. If both dots are inactive then the choice is arbitrary, and is determined by a pseudo random bit generator. If both neighbor dots are already active then the bit cannot be compensated by diffusion.

Figure 253:
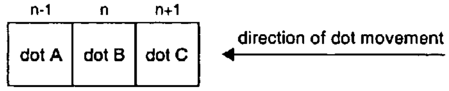

Since the DNC needs to look at neighboring dots to determine where to place the new bit (if required), the DNC works on a set of 3 dots at a time. For any given set of 3 dots, the first dot received from the HCU is referred to as dot A, and the second as dot B, and the third as dot C. The relationship is shown in FIG. 253.

For any given set of dots ABC, only B can be compensated for by error diffusion if B is defined as dead. A 1 in dot B will be diffused into either dot A or dot C if possible. If there is already a 1 in dot A or dot C then a 1 in dot B cannot be diffused into that dot.

The DNC must support adjacent dead nozzles. Thus if dot A is defined as dead and has previously been compensated for by error diffusion, then the dot data from dot B should not be diffused into dot A. Similarly, if dot C is defined as dead, then dot data from dot B should not be diffused into dot C.

Error diffusion should not cross line boundaries. If dot B contains a dead nozzle and is the first dot in a line then dot A represents the last dot from the previous line. In this case an active bit on a dead nozzle of dot B should not be diffused into dot A. Similarly, if dot B contains a dead nozzle and is the last dot in a line then dot C represents the first dot of the next line. In this case an active bit on a dead nozzle of dot B should not be diffused into dot C.

Thus, as a rule, a 1 in dot B cannot be diffused into dot A if a 1 is already present in dot A,
dot A is defined as dead,
or dot A is the last dot in a line.

Similarly, a 1 in dot B cannot be diffused into dot C if a 1 is already present in dot C,
dot C is defined as dead,
or dot C is the first dot in a line.

If B is defined to be dead and the dot value for B is 0, then no compensation needs to be done and dots A and C do not need to be changed.

If B is defined to be dead and the dot value for B is 1, then B is changed to 0 and the DNC attempts to place the 1 from B into either A or C:

- If the dot can be placed into both A and C, then the DNC must choose between them. The preference is given by the current output from the random bit generator, 0 for "prefer left" (dot A) or 1 for "prefer right" (dot C).
- If dot can be placed into only one of A and C, then the 1 from B is placed into that position.
- If dot cannot be placed into either one of A or C, then the DNC cannot place the dot in either position.

TABLE 197

Error Diffusion Truth Table when dot B is dead

| Input | | | | Output | | |
|---|---|---|---|---|---|---|
| A OR A dead OR A last in line | B | C OR C dead OR C first in line | Rand[a] | A | B | C |
| 0 | 0 | 0 | X | A input | 0 | C input |
| 0 | 0 | 1 | X | A input | 0 | C input |
| 0 | 1 | 0 | 0 | **1**[b] | 0 | C input |
| 0 | 1 | 0 | 1 | A input | 0 | **1** |
| 0 | 1 | 1 | X | **1** | 0 | C input |
| 1 | 0 | 0 | X | A input | 0 | C input |
| 1 | 0 | 1 | X | A input | 0 | C input |
| 1 | 1 | 0 | X | A input | 0 | **1** |
| 1 | 1 | 1 | X | A input | 0 | C input |

Table 197 shows the truth table for DNC error diffusion operation when dot B is defined as dead.
[a]Output from random bit generator. Determines direction of error diffusion (0 = left, 1 = right)
[b]Bold emphasis is used to show the DNC inserted a 1

The random bit value used to arbitrarily select the direction of diffusion is generated by a 32-bit maximum length random bit generator. The generator generates a new bit for each dot in a line regardless of whether the dot is dead or not. The random bit generator is initialized with a 32-bit programmable seed value.

31.4.4 Fixative Correction

After the dead nozzle compensation methods have been applied to the dot data, the fixative, if present, may need to be adjusted due to new nozzles being activated, or dead nozzles being removed. For each output dot the DNC determines if fixative is required (using the FixativeRequiredMask register) for the new compensated dot data word and whether fixative is activated already for that dot. For the DNC to do so it needs to know the color plane that has fixative, this is specified by the FixativeMask1 configuration register. Table 198 indicates the actions to take based on these calculations.

TABLE 198

Truth table for fixative correction

| Fixative Present | Fixative required | Action |
|---|---|---|
| 1 | 1 | Output dot as is. |
| 1 | 0 | Clear fixative plane. |
| 0 | 1 | Attempt to add fixative. |
| 0 | 0 | Output dot as is. |

The DNC also allows the specification of another fixative plane, specified by the FixativeMask2 configuration register, with FixativeMask1 having the higher priority over FixativeMask2. When attempting to add fixative the DNC first tries to add it into the planes defined by FixativeMask1. However, if any of these planes is dead then it tries to add fixative by placing it into the planes defined by FixativeMask2.

Note that the fixative defined by FixativeMask1 and FixativeMask2 could possibly be multi-part fixative, i.e. 2 bits could be set in FixativeMask1 with the fixative being a combination of both inks.

31.5 Nozzle Activate Logic

Ink becomes more viscous in a nozzle the longer it remains uncapped but inactive. This leads to the possibility of the nozzles becoming blocked with ink if they are not fired within a particular time period (ink chemistry dependent). If the time period is longer than the time taken to print a page, then all printhead nozzles can be fired between pages. However, if the time period is shorter than the time taken to print a page, then it is necessary to fire all the nozzles during the printing of the page such that all of the nozzles have been fired at least once during the time period.

The DNC implements a simple system to activate a configured mask of nozzles DncKeepWetMask0 after DncKeepWetCnt0 number of dots and then DncKeepWetMask1 after DncKeepWetCnt1 number of dots. The sequence is repeated for all dot in a page. The DncKeepWetMask is applied ANDed with the DNMask so as to prevent the nozzle activate logic from incorrectly activating a dead nozzle. The nozzle activate logic is applied within the ink replacement unit but before the ink replacement logic.

It is probably desirable to have all six nozzles print to the same dot, (a b111111 dot), but this might be two much ink to put in one place. Thus dot masks are supported, allowing us to spread the load a little (e.g. b000111, b111000). If this isn't necessary, then just program DncKeepWetCnt0=DncKeepWetCnt1 and DncKeepWetMask0=DncKeepWetMask1.

The DncKeepWetCnt0, DncKeepWetCnt1 counters need to be programmed correctly in relation to the page width and length, to ensure that all nozzles in a line are fired with sufficient frequency to prevent nozzle blocking, and to ensure that nozzles don't get fired in such a sequence to introduce noticeable on page artifacts.

31.6 Implementation

Figure 254:
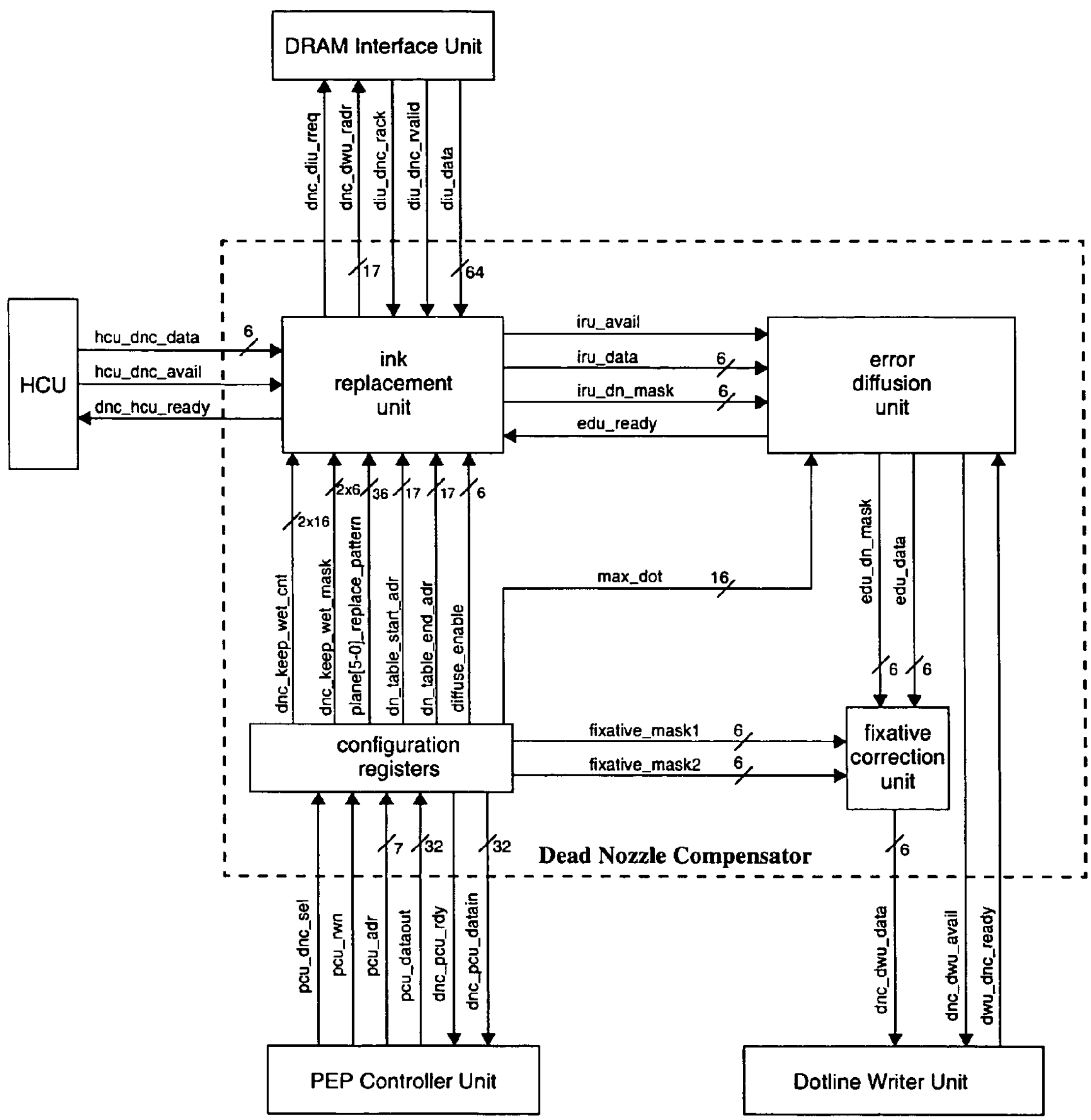

A block diagram of the DNC is shown in FIG. 254.

31.6.1 Definitions of I/O

TABLE 199

DNC port list and description

| Port name | Pins | I/O | Description |
|---|---|---|---|
| | | | Clocks and Resets |
| pclk | 1 | In | System Clock. |
| prst_n | 1 | In | System reset, synchronous active low. |
| | | | PCU interface |
| pcu_dnc_sel | 1 | In | Block select from the PCU. When pcu_dnc_sel is high both pcu_adr and pcu_dataout are valid. |
| pcu_rwn | 1 | In | Common read/not-write signal from the PCU. |
| pcu_adr[6:2] | 5 | In | PCU address bus. Only 5 bits are required to decode the address space for this block. |
| pcu_dataout[31:0] | 32 | In | Shared write data bus from the PCU. |
| dnc_pcu_rdy | 1 | Out | Ready signal to the PCU. When dnc_pcu_rdy is high it indicates the last cycle of the access. For a write cycle this means pcu_dataout has been registered by the block and for a read cycle this means the data on dnc_pcu_datain is valid. |
| dnc_pcu_datain[31:0] | 32 | Out | Read data bus to the PCU. |
| | | | DIU interface |
| dnc_diu_rreq | 1 | Out | DNC unit requests DRAM read. A read request must be accompanied by a valid read address. |
| dnc_diu_radr[21:5] | 17 | Out | Read address to DIU, 256-bit word aligned. |
| diu_dnc_rack | 1 | In | Acknowledge from DIU that read request has been accepted and new read address can be placed on dnc_diu_radr |
| diu_dnc_rvalid | 1 | In | Read data valid, active high. Indicates that valid read data is now on the read data bus, diu_data. |
| diu_data[63:0] | 64 | In | Read data from DIU. |
| | | | HCU interface |
| dnc_hcu_ready | 1 | Out | Indicates that DNC is ready to accept data from the HCU. |
| hcu_dnc_avail | 1 | In | Indicates valid data present on hcu_dnc_data. |
| hcu_dnc_data[5:0] | 6 | In | Output bi-level dot data in 6 ink planes. |
| | | | DWU interface |
| dwu_dnc_ready | 1 | In | Indicates that DWU is ready to accept data from the DNC. |
| dnc_dwu_avail | 1 | Out | Indicates valid data present on dnc_dwu_data. |
| dnc_dwu_data[5:0] | 6 | Out | Output bi-level dot data in 6 ink planes. |

31.6.1

31.6.2 Configuration Registers

The configuration registers in the DNC are programmed via the PCU interface. Refer to section 23.8.2 on page 439 for the description of the protocol and timing diagrams for reading and writing registers in the DNC. Note that since addresses in SoPEC are byte aligned and the PCU only supports 32-bit register reads and writes, the lower 2 bits of the PCU address bus are not required to decode the address space for the DNC. When reading a register that is less than 32 bits wide zeros are returned on the upper unused bit(s) of dnc_pcu_datain. Table 200 lists the configuration registers in the DNC.

TABLE 200

DNC configuration registers

| Address (DNC_base+) | Register name | #bits | Value on reset | Description |
|---|---|---|---|---|
| | | | | Control registers |
| 0x00 | Reset | 1 | 0x1 | A write to this register causes a reset of the DNC. |
| 0x04 | Go | 1 | 0x0 | Writing 1 to this register starts the DNC. Writing 0 to this register halts the DNC. When Go is asserted all counters, flags |

TABLE 200-continued

DNC configuration registers

| Address (DNC_base+) | Register name | #bits | Value on reset | Description |
|---|---|---|---|---|
| | | | | etc. are cleared or given their initial value, but configuration registers keep their values. When Go is deasserted the state-machines go to their idle states but all counters and configuration registers keep their values. This register can be read to determine if the DNC is running (1 = running, 0 = stopped). |
| Setup registers (constant during processing) | | | | |
| 0x10 | MaxDot | 16 | 0x0000 | This is the maximum dot number −1 present across a page. For example if a page contains 13824 dots, then MaxDot will be 13823. Note that this number may or may not be the same as the number of dots across the printhead as some margining may be introduced in the PHI. |
| 0x14 | LSFR | 32 | 0x0000_0000 | The current value of the LFSR register used as the 32-bit maximum length random bit generator. Users can write to this register to program a seed value for the 32-bit maximum length random bit generator. Must not be all 1s, as the LFSR taps are applied via XNOR. (It is expected that writing a seed value will not occur during the operation of the LFSR). A read will return the current LSFR value. This LSFR value could also have a possible use as a random source in program code. (Working Register) |
| 0x20 | FixativeMask1 | 6 | 0x00 | Defines the higher priority fixative plane(s). Bit 0 represents the settings for plane 0, bit 1 for plane 1 etc. For each bit: 1 = the ink plane contains fixative. 0 = the ink plane does not contain fixative. |
| 0x24 | FixativeMask2 | 6 | 0x00 | Defines the lower priority fixative plane(s). Bit 0 represents the settings for plane 0, bit 1 for plane 1 etc. Used only when FixativeMask1 planes are dead. For each bit: 1 = the ink plane contains fixative. 0 = the ink plane does not contain fixative. |
| 0x28 | FixativeRequiredMask | 6 | 0x00 | Identifies the ink planes that require fixative. Bit 0 represents the settings for plane 0, bit 1 for plane 1 etc. For each bit: 1 = the ink plane requires fixative. 0 = the ink plane does not require fixative (e.g. ink is self-fixing) |
| 0x30 | DnTableStartAdr[21:5] | 17 | 0x0_0000 | Start address of Dead Nozzle Table in DRAM, specified in 256-bit words. |
| 0x34 | DnTableEndAdr[21:5] | 17 | 0x0_0000 | End address of Dead Nozzle Table in DRAM, specified in 256-bit words, i.e. the location containing the last entry in the Dead Nozzle Table. The Dead Nozzle Table should be aligned to a 256-bit boundary, if necessary it can be padded with null entries. |
| 0x40-0x54 | PlaneReplacePattern[5:0] | 6x6 | 0x00 | Defines the ink replacement pattern for each of the 6 ink planes. PlaneReplacePattern[0] is the ink replacement pattern for plane 0, PlaneReplacePattern[1] is the ink replacement pattern for plane 1, etc. For each 6-bit replacement pattern for a plane, a 1 in any bit positions indicates the alternative ink planes to be used for this plane. |
| 0x58 | DiffuseEnable | 6 | 0x3F | Defines whether, after ink replacement, error diffusion is allowed to be performed on each plane. |

TABLE 200-continued

DNC configuration registers

| Address (DNC_base+) | Register name | #bits | Value on reset | Description |
|---|---|---|---|---|
| | | | | Bit 0 represents the settings for plane 0, bit 1 for plane 1 etc. For each bit:<br>1 = error diffusion is enabled<br>0 = error diffusion is disabled |
| 0x60 | DncKeepWetCnt0 | 16 | 0x0000 | Specifies the number of dots −1 between mask insertion points where the DncKeepWetMask0 is inserted into the dot stream. For example if 0 the mask will be inserted every dot, if 1 it's inserted every second dot. |
| 0x64 | DncKeepWetCnt1 | 16 | 0x0000 | Specifies the number of dots −1 between mask insertion points where the DncKeepWetMask1 is inserted into the dot stream. |
| 0x68 | DncKeepWetMask0 | 6 | 0x00 | Specifies which nozzles need to be fired after the DncKeepWetCnt0 number of dots have been transmitted |
| 0x6C | DncKeepWetMask1 | 6 | 0x00 | Specifies which nozzles need to be fired after the DncKeepWetCnt1 number of dots have been transmitted |
| | | Debug registers (read only) | | |
| 0x70 | DncOutputDebug | 8 | N/A | Bit 7 = dwu_dnc_ready<br>Bit 6 = dnc_dwu_avail<br>Bits 5-0 = dnc_dwu_data |
| 0x74 | DncReplaceDebug | 14 | N/A | Bit 13 = edu_ready<br>Bit 12 = iru_avail<br>Bits 11-6 = iru_dn_mask<br>Bits 5-0 = iru_data |
| 0x78 | DncDiffuseDebug | 14 | N/A | Bit 13 = dwu_dnc_ready<br>Bit 12 = dnc_dwu_avail<br>Bits 11-6 = edu_dn_mask<br>Bits 5-0 = edu_data |

31.6.3 Ink Replacement Unit

Figure 255:
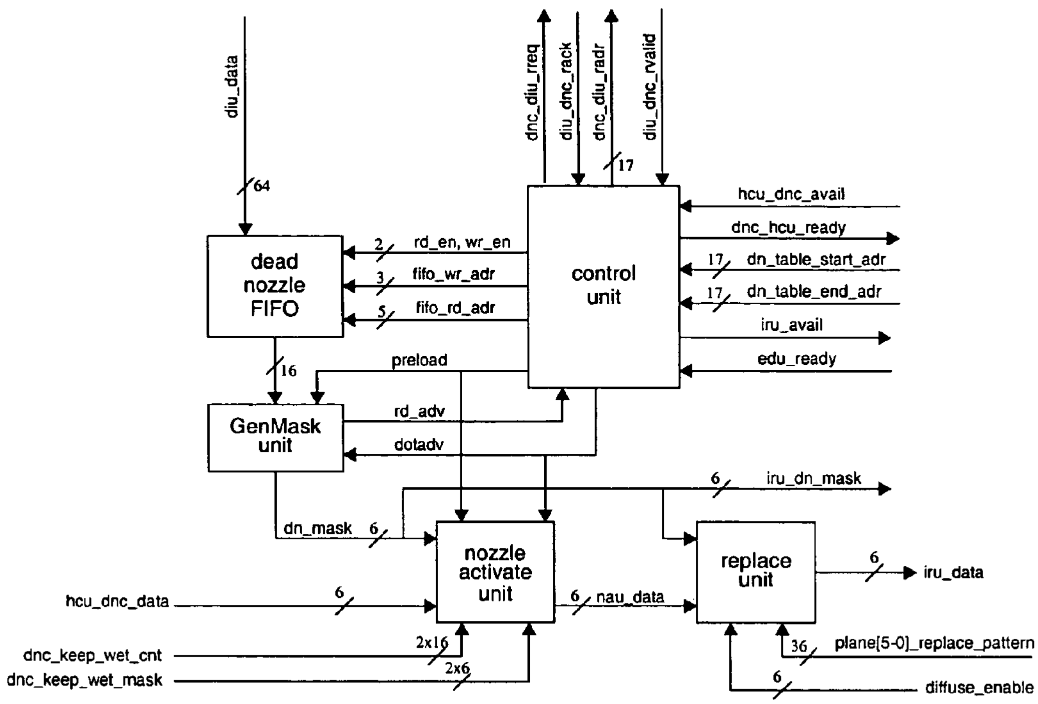

FIG. 255 shows a sub-block diagram for the ink replacement unit.

31.6.3.1 Control unit

Figure 256:
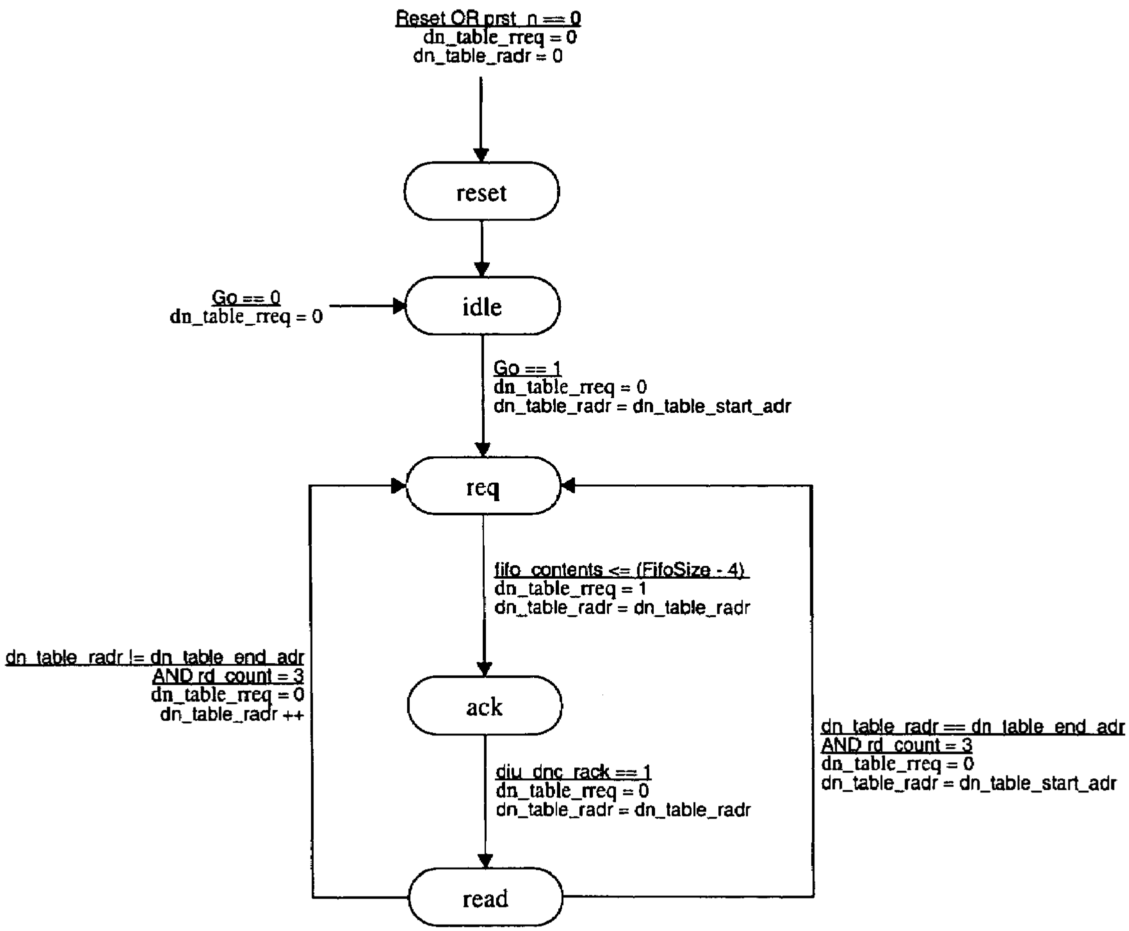

The control unit is responsible for reading the dead nozzle table from DRAM and making it available to the DNC via the dead nozzle FIFO. The dead nozzle table is read from DRAM in single 256-bit accesses, receiving the data from the DIU over 4 clock cycles (64-bits per cycle). The protocol and timing for read accesses to DRAM is described in section 22.9.1 on page 337. Reading from DRAM is implemented by means of the state machine shown in FIG. 256.

All counters and flags should be cleared after reset. When Go transitions from 0 to 1 all counters and flags should take their initial value. While the Go bit is 1, the state machine requests a read access from the dead nozzle table in DRAM provided there is enough space in its FIFO.

A modulo-4 counter, rd_count, is used to count each of the 64-bits received in a 256-bit read access. It is incremented whenever diu_dnc_rvalid is asserted. When Go is 1, dn_table_radr is set to dn_table_start_adr. As each 64-bit value is returned, indicated by diu_dnc_rvalid being asserted, dn_table_radr is compared to dn_table_end_adr:

If rd_count equals 3 and dn_table_radr equals dn_table_end_adr, then dn_table_radr is updated to dn_table_start_adr.

If rd_count equals 3 and dn_table_radr does not equal dn_table_end_adr, then dn_table_radr is incremented by 1.

A count is kept of the number of 64-bit values in the FIFO. When diu_dnc_rvalid is 1 data is written to the FIFO by asserting wr_en, and fifo_contents and fifo_wr_adr are both incremented.

When fifo_contents[3:0] is greater than 0 and edu_ready is 1, dnc_hcu_ready is asserted to indicate that the DNC is ready to accept dots from the HCU. If hcu_dnc_avail is also 1 then a dotadv pulse is sent to the GenMask unit, indicating the DNC has accepted a dot from the HCU, and iru_avail is also asserted. After Go is set, a single preload pulse is sent to the GenMask unit once the FIFO contains data.

When a rd_adv pulse is received from the GenMask unit, fifo_rd_adr[4:0] is then incremented to select the next 16-bit value. If fifo_rd_adr[1:0]=11 then the next 64-bit value is read from the FIFO by asserting rd_en, and fifo_contents [3:0] is decremented.

31.6.3.2 Dead Nozzle FIFO

The dead nozzle FIFO conceptually is a 64-bit input, and 16-bit output FIFO to account for the 64-bit data transfers from the DIU, and the individual 16-bit entries in the dead nozzle table that are used in the GenMask unit. In reality, the FIFO is actually 8 entries deep and 64-bits wide (to accommodate two 256-bit accesses).

On the DRAM side of the FIFO the write address is 64-bit aligned while on the GenMask side the read address is 16-bit aligned, i.e. the upper 3 bits are input as the read address for the FIFO and the lower 2 bits are used to select 16 bits from the 64 bits (1st 16 bits read corresponds to bits 15-0, second 16 bits to bits 31-16 etc.).

31.6.3.3 Nozzle Activate Unit

The nozzle activate unit is responsible for activating nozzles periodically to prevent nozzle blocking. It inserts a nozzle activate mask dnc_keep_wet_mask every dnc_keep_wet_cnt number of active dots. The logic alternates between 2 configurable count and mask values, and repeats until Go is deasserted.

The logic is implemented with a single counter which is loaded with dnc_keep_wet_cnt0 when the preload signal from the control unit is received. The counter decrements each time an active dot is produced as indicated by the dotadv signal. When the counter is 0, the dnc_keep_wet_mask0 is inserted in the dot stream, and the counter is loaded with the dnc_keep_wet_cnt1. The counter is again decremented with each dotadv and when 0 the dnc_keep_wet_mask1 is inserted in the dot stream. The counter is loaded dnc_keep_wet_cnt0 value and the process is repeated.

When a dnc_keep_wet_mask value is inserted in the dot stream the nozzle activate unit checks the dn_mask value to prevent a dead nozzle getting activated by the inserted dot.

The pseudocode is:

```
if (preload == 1) then
            cnt_sel    = 0
            dot_cnt    = dnc_keep_wet_cnt[cnt_sel]
elsif ( dotadv == 1 ) then
            if ( dot_cnt == 0) then
                // insert nozzle mask
                dot_insert = (dnc_keep_wet_mask[cnt_sel]
                AND NOT(dn_mask))
                nau_data  = hcu_dnc_data OR dot_insert
                cnt_sel    = NOT(cnt_sel)
                dot_cnt    = dnc_keep_wet_cnt[cnt_sel]
            else
                dot_cnt --
```

31.6.3.4 GenMask Unit

The GenMask unit generates the 6-bit dn_mask that is sent to the replace unit. It consists of a 10-bit delta counter and a mask register.

After Go is set, the GenMask unit will receive a preload pulse from the control unit indicating the first dead nozzle table entry is available at the output of the dead nozzle FIFO and should be loaded into the delta counter and mask register. A rd_adv pulse is generated so that the next dead nozzle table entry is presented at the output of the dead nozzle FIFO. The delta counter is decremented every time a dotadv pulse is received. When the delta counter reaches 0, it gets loaded with the current delta value output from the dead nozzle FIFO, i.e. bits 15-6, and the mask register gets loaded with mask output from the dead nozzle FIFO, i.e. bits 5-0. A rd_adv pulse is then generated so that the next dead nozzle table entry is presented at the output of the dead nozzle FIFO.

When the delta counter is 0 the value in the mask register is output as the dn_mask, otherwise the dn_mask is all 0s.

The GenMask unit has no knowledge of the number of dots in a line; it simply loads a counter to count the delta from one dead nozzle column to the next. Thus as described in section 31.2 on page 629 the dead nozzle table should include null identifiers if necessary so that the dead nozzle table covers the first and last nozzle column in a line.

31.6.3.5 Replace Unit

Figure 257:
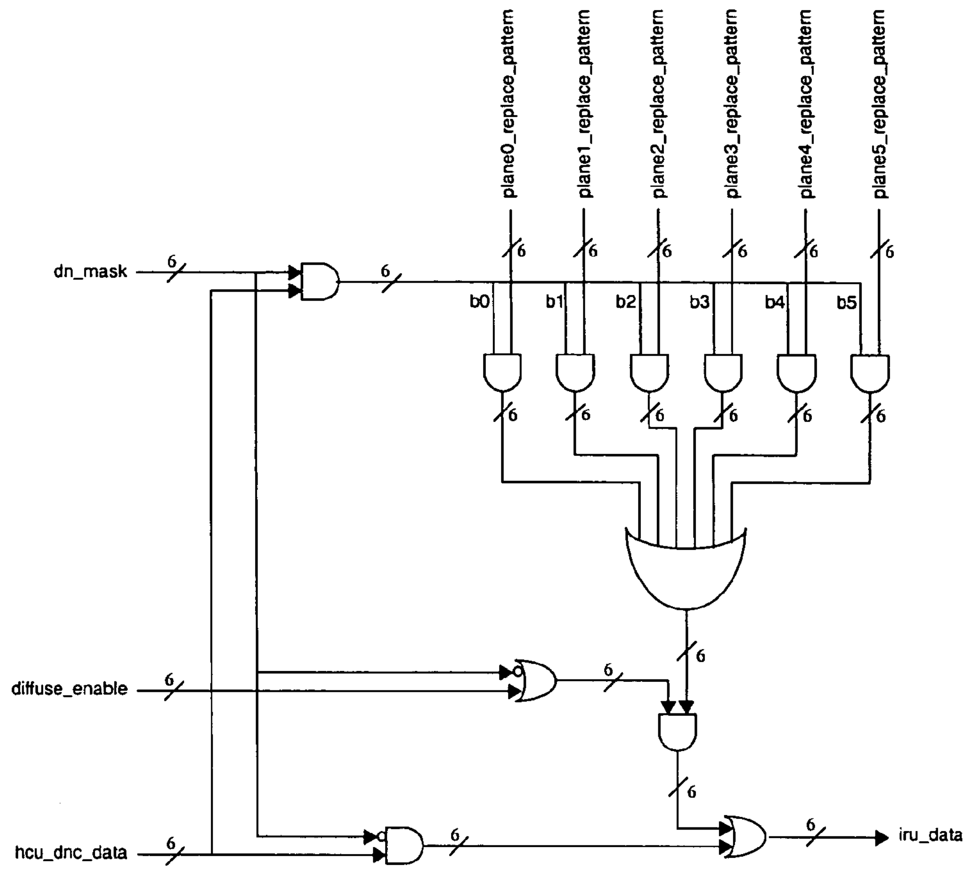

Dead nozzle removal and ink replacement are implemented by the combinatorial logic shown in FIG. 257. Dead nozzle removal is performed by bit-wise ANDing of the inverse of the dn_mask with the dot value.

The ink replacement mechanism has 6 ink replacement patterns, one per ink plane, programmable by the CPU. The dead nozzle mask is ANDed with the dot data to see if there are any planes where the dot is active but the corresponding nozzle is dead. The resultant value forms an enable, on a per ink basis, for the ink replacement process. If replacement is enabled for a particular ink, the values from the corresponding replacement pattern register are ORed into the dot data. The output of the ink replacement process is then filtered so that error diffusion is only allowed for the planes in which error diffusion is enabled.

The output of the ink replacement process is ORed with the resultant dot after dead nozzle removal. If the dot position does not contain a dead nozzle then the dn_mask will be all 0s and the dot, hcu_dnc_data, will be passed through unchanged.

31.6.4 Error Diffusion Unit

Figure 258:
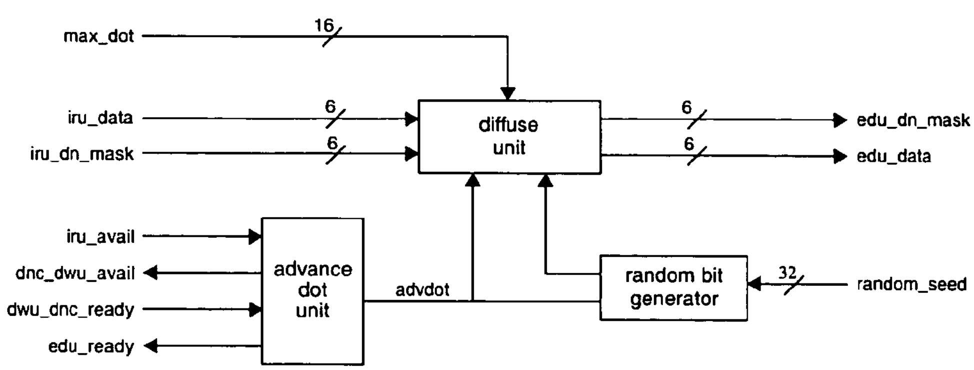

FIG. 258 shows a sub-block diagram for the error diffusion unit.

31.6.4.1 Random Bit Generator

Figure 259:
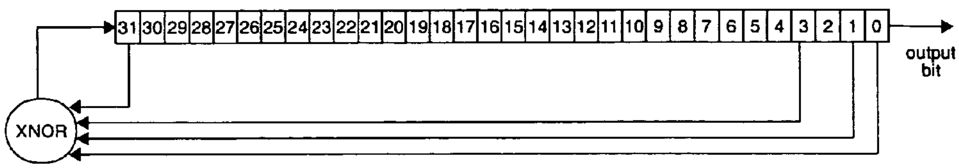
Figure 260:
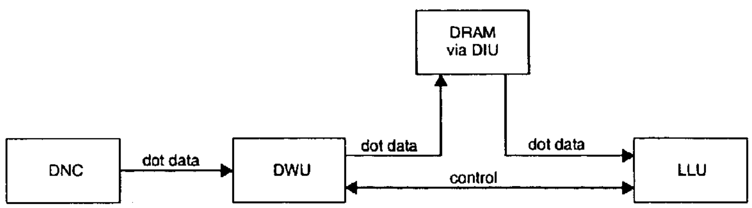

The random bit value used to arbitrarily select the direction of diffusion is generated by a maximum length 32-bit LFSR. The tap points and feedback generation are shown in FIG. 259. The LFSR generates a new bit for each dot in a line regardless of whether the dot is dead or not, i.e shifting of the LFSR is enabled when advdot equals 1. The LFSR can be initialised with a 32-bit programmable seed value, random_seed. This seed value is loaded into the LFSR whenever a write occurs to the RandomSeed register. Note that the seed value must not be all 1s as this causes the LFSR to lock-up.\

31.6.4.2 Advance Dot Unit

The advance dot unit is responsible for determining in a given cycle whether or not the error diffuse unit will accept a dot from the ink replacement unit or make a dot available to the fixative correct unit and on to the DWU. It therefore receives the dwu_dnc_ready control signal from the DWU, the iru_avail flag from the ink replacement unit, and generates dnc_dwu_avail and edu_ready control flags.

Only the divu_dnc_ready signal needs to be checked to see if a dot can be accepted and asserts edu_ready to indicate this. If the error diffuse unit is ready to accept a dot and the ink replacement unit has a dot available, then a advdot pulse is given to shift the dot into the pipeline in the diffuse unit. Note that since the error diffusion operates on 3 dots, the advance dot unit ignores dwu_dnc_ready initially until 3 dots have been accepted by the diffuse unit. Similarly dnc_dwu_avail is not asserted until the diffuse unit contains 3 dots and the ink replacement unit has a dot available.

31.6.4.3 Diffuse Unit

The diffuse unit contains the combinatorial logic to implement the truth table from Table 197. The diffuse unit receives a dot consisting of 6 color planes (1 bit per plane) as well as an associated 6-bit dead nozzle mask value.

Error diffusion is applied to all 6 planes of the dot in parallel. Since error diffusion operates on 3 dots, the diffuse unit has a pipeline of 3 dots and their corresponding dead nozzle mask values. The first dot received is referred to as dot A, and the second as dot B, and the third as dot C. Dots are shifted along the pipeline whenever advdot is 1. A count is also kept of the number of dots received. It is incremented whenever advdot is 1, and wraps to 0 when it reaches max_dot. When the dot count is 0 dot C corresponds to the first dot in a line. When the dot count is 1 dot A corresponds to the last dot in a line.

In any given set of 3 dots, the diffuse unit only compensates for dead nozzles from the point of view of dot B (the processing of data due to the deadness of dot A and/or dot C is undertaken when the data is at dot B i.e. one dot-time earlier for data now in dot A, or one dot-time later for data now in dot C). Dead nozzles are identified by bits set in iru_dn_mask. If dot B contains a dead nozzle(s), the corresponding bit(s) in dot A, dot C, the dead nozzle mask value for A, the dead nozzle mask value for C, the dot count, as well as the random bit value are input to the truth table logic and the dots A, B and C assigned accordingly. If dot B does not contain a dead nozzle then the dots are shifted along the pipeline unchanged.

31.6.5 Fixative Correction Unit

The fixative correction unit consists of combinatorial logic to implement fixative correction as defined in Table 201. For each output dot the DNC determines if fixative is required for the new compensated dot data word and whether fixative is activated already for that dot.

```
FixativePresent = ((FixativeMask1 | FixativeMask2) & edu_data) != 0
FixativeRequired = (FixativeRequiredMask & edu_data) != 0
```

It then looks up the truth table to see what action, if any, needs to be taken.

TABLE 201

Truth table for fixative correction

| Fixative Present | Fixative required | Action | Output |
|---|---|---|---|
| 1 | 1 | Output dot as is. | dnc_dwu_data = edu_data |
| 1 | 0 | Clear fixative plane. | dnc_dwu_data = (edu_data) & ~(FixativeMask1 \| FixativeMask2) |
| 0 | 1 | Attempt to add fixative. | if (FixativeMask1 & DnMask) != 0 dnc_dwu_data = (edu_data) \| (FixativeMask2 & ~DnMask) else dnc_dwu_data = (edu_data) \| (FixativeMask1) |
| 0 | 0 | Output dot as is. | dnc_dwu_data = edu_data |

When attempting to add fixative the DNC first tries to add it into the plane defined by FixativeMask1. However, if this plane is dead then it tries to add fixative by placing it into the plane defined by FixativeMask2. Note that if both FixativeMask1 and FixativeMask2 are both all 0s then the dot data will not be changed.

32 Dotline Writer Unit (DWU)

32.1 Overview

The Dotline Writer Unit (DWU) receives 1 dot (6 bits) of color information per cycle from the DNC. Dot data received is bundled into 256-bit words and transferred to the DRAM. The DWU (in conjunction with the LLU) implements a dot line FIFO mechanism to compensate for the physical placement of nozzles in a printhead, and provides data rate smoothing to allow for local complexities in the dot data generate pipeline.

32.2 Physical Requirement Imposed by the Printhead

The physical placement of nozzles in the printhead means that in one firing sequence of all nozzles, dots will be produced over several print lines. The printhead consists of up to 12 rows of nozzles, one for each color of odd and even dots. Nozzles rows of the same color are separated by $D_1$ print lines and nozzle rows of different adjacent colors are separated by $D_2$ print lines. See FIG. 261 for reference. The first color to be printed is the first row of nozzles encountered by the incoming paper. In the example this is color 0 odd, although is dependent on the printhead type. Paper passes under printhead moving upwards.

Due to the construction limitations the printhead can have nozzles mildly sloping over several lines, or a vertical alignment discontinuity at potentially different horizontal positions per row ($D_3$). The DWU doesn't need any knowledge of the discontinuities only that it stores sufficient lines in the dot store to allow the LLU to compensate.

Figure 261:
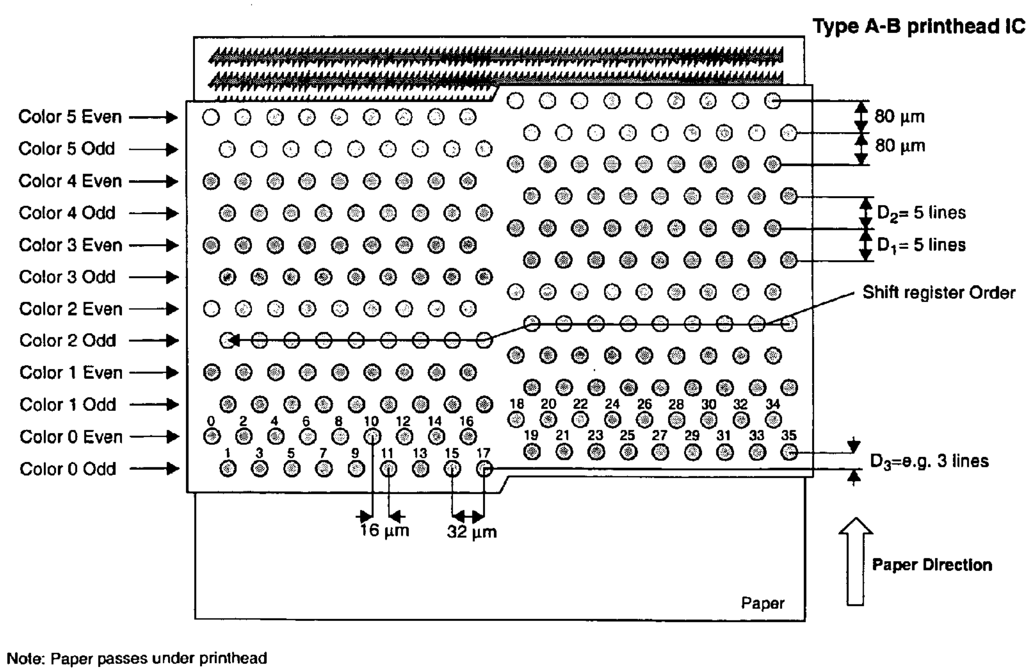

FIG. 261 shows a possible vertical misalignment of rows within a printhead segment. There will also be possible vertical and horizontal misalignment of rows between adjacent printhead segments.

The DWU compensates for horizontal misalignment of nozzle rows within printhead segments, and writes data out to half line buffers so that the LLU is able to compensate for vertical misalignments between and within printhead segments. The LLU also compensates for the horizontal misalignment between a printhead segment.

For example if the physical separation of each half row is 80 μm equating to $D_1=D_2=5$ print lines at 1600 dpi.

Figure 262:
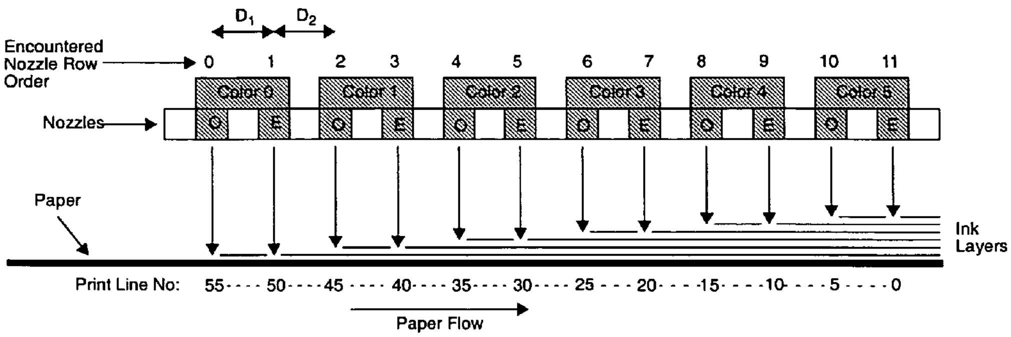

This means that in one firing sequence, color 0 odd nozzles 1-17 will fire on dotline L, color 0 even nozzles 0-16 will fire on dotline L-$D_1$, color 1 odd nozzles 1-17 will fire on dotline L-$D_1$-$D_2$ and so on over 6 color planes odd and even nozzles. The total number of physical lines printed onto over a single line time is given as $(0+5+5\ldots+5)+1=11\times5+1=56$. See FIG. 262 for example diagram.

It is expected that the physical spacing of the printhead nozzles will be 80 μm (or 5 dot lines), although there is no dependency on nozzle spacing. The DWU is configurable to allow other line nozzle spacings.

TABLE 202

Relationship between Nozzle color/sense and line firing

| | Even line encountered firs | | Odd line encountered first | |
|---|---|---|---|---|
| Color | Sense | line | sense | line |
| Color 0 | Even | L | even | L-5 |
| | Odd | L-5 | odd | L |
| Color 1 | Even | L-10 | even | L-15 |
| | Odd | L-15 | odd | L-10 |
| Color 2 | Even | L-20 | even | L-25 |
| | Odd | L-25 | odd | L-20 |
| Color 3 | Even | L-30 | even | L-35 |
| | Odd | L-35 | odd | L-30 |
| Color 4 | Even | L-40 | even | L-45 |
| | Odd | L-45 | odd | L-40 |
| Color 5 | Even | L-50 | even | L-55 |
| | Odd | L-55 | odd | L-50 |

32.3 Line Rate De-Coupling

The DWU block is required to compensate for the physical spacing between lines of nozzles. It does this by storing dot lines in a FIFO (in DRAM) until such time as they are required by the LLU for dot data transfer to the printhead interface. Colors are stored separately because they are needed at different times by the LLU. The dot line store must store enough lines to compensate for the physical line separation of the printhead but can optionally store more lines to allow system level data rate variation between the read (printhead feed) and write sides (dot data generation pipeline) of the FIFOs.

Figure 263:
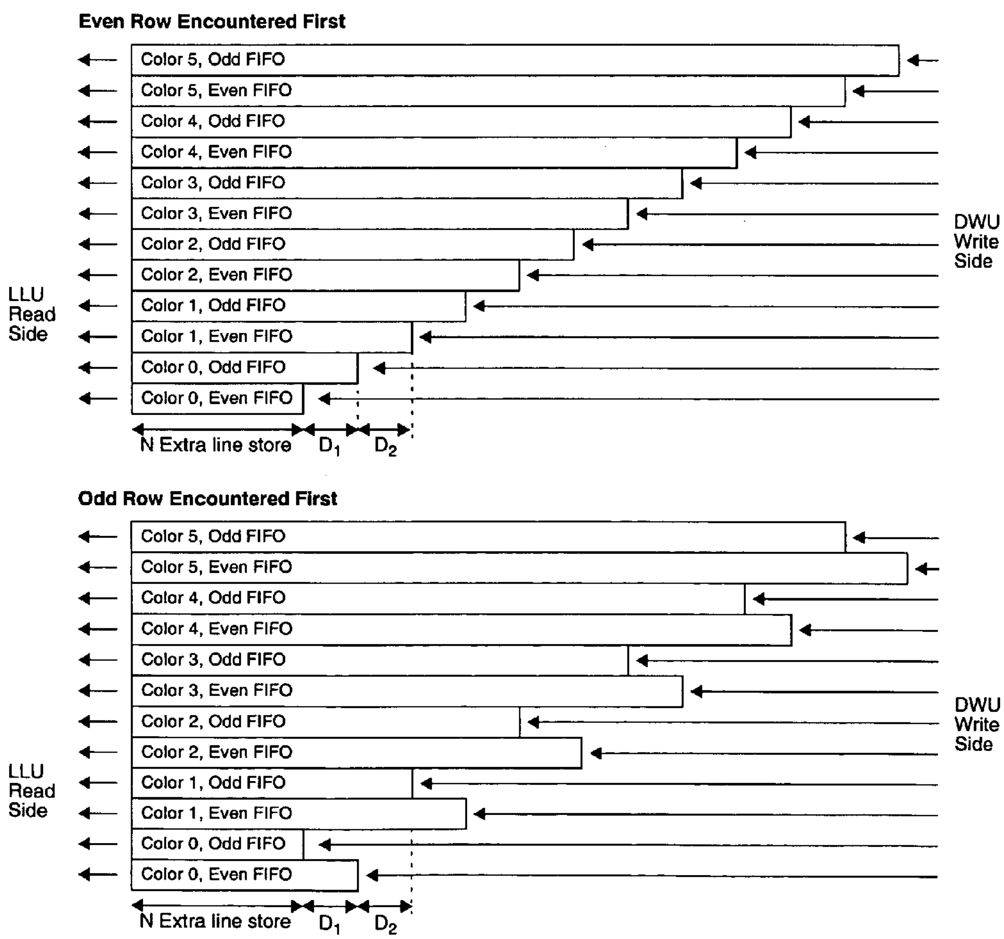

A logical representation of the FIFOs is shown in FIG. 263, where N is defined as the optional number of extra half lines in the dot line store for data rate de-coupling.

If the printhead contains nozzles sloping over X lines or a vertical misalignment of Y lines then the DWU must store N>X and N>Y lines in the dotstore to allow the LLU to compensate for the nozzle slope and any misalignment. It is also possible that the effects of a slope, and a vertical misalignment are accumulative, in such cases N>(X+Y).

32.3.1 Line Length Relationship

The DNC and the DWU concept of line lengths can be different. The DNC can be programmed to produce less dots than the DWU expects per line, or can be programmed to produce an odd number of dots (the DWU always expect an even number of dots per line). The DWU produces NozzleSkewPadding more dots than it excepts from the DNC per line. If the DNC is required to produce an odd number of dots, the NozzleSkewPadding value can be adjusted to ensure the output from the DWU is still even. The relationship of line lengths between DWU and DNC must always satisfy:

$$(LineSize+1)*2-NozzleSkewPadding==DncLineLength$$

32.4 Dot Line Store Storage Requirements

For an arbitrary page width of d dots (where d is even), the number of dots per half line is d/2.

For interline spacing of $D_2$ and inter-color spacing of $D_1$, with C colors of odd and even half lines, the number of half line storage is $(C-1)(D_2+D_1)+D_1$.

For N extra half line stores for each color odd and even, the storage is given by (N*C*2).

The total storage requirement is $((C-1)(D_2+D_1)+D_1+(N*C*2))*d/2$ in bits.

Note that when determining the storage requirements for the dot line store, the number of dots per line is the page width and not necessarily the printhead width. The page width is often the dot margin number of dots less than the printhead width. They can be the same size for full bleed printing.

For example in an A4 page a line consists of 13824 dots at 1600 dpi, or 6912 dots per half dot line. To store just enough dot lines to account for an inter-line nozzle spacing of 5 dot lines it would take 55 half dot lines for color 5 odd, 50 dot lines for color 5 even and so on, giving 55+50+45 . . . 10+5+0=330 half dot lines in total. If it is assumed that N=4 then the storage required to store 4 extra half lines per color is 4×12=48, in total giving 330+48=378 half dot lines. Each half dot line is 6912 dots, at 1 bit per dot give a total storage requirement of 6912 dots×378 half dot lines/8 bits=Approx 319 Kbytes. Similarly for an A3 size page with 19488 dots per line, 9744 dots per half line×378 half dot lines/8=Approx 450 Kbytes.

TABLE 203

Storage requirement for dot line store

| Page size | Nozzle Spacing | Lines required (N = 0) | Storage (N = 0) Kbytes | Lines required (N = 4) | Storage (N = 4) Kbytes |
|---|---|---|---|---|---|
| A4 | 4 | 264 | 223 | 312 | 263 |
| | 5 | 330 | 278 | 378 | 319 |

TABLE 203-continued

Storage requirement for dot line store

| Page size | Nozzle Spacing | Lines required (N = 0) | Storage (N = 0) Kbytes | Lines required (N = 4) | Storage (N = 4) Kbytes |
|---|---|---|---|---|---|
| A3 | 4 | 264 | 314 | 312 | 371 |
| | 5 | 330 | 392 | 378 | 450 |

The potential size of the dot line store makes it unfeasible to be implemented in on-chip SRAM, requiring the dot line store to be implemented in embedded DRAM. This allows a configurable dotline store where unused storage can be redistributed for use by other parts of the system.

32.5 Nozzle Row Skew

Due to construction limitations of the printhead it is possible that nozzle rows within a printhead segment may be misaligned relative to each other by up to 5 dots per half line, which means 56 dot positions over 12 half lines (i.e. 28 dot pairs). Vertical misalignment can also occur but is compensated for in the LLU and not considered here. The DWU is required to compensate for the horizontal misalignment.

Dot data from the HCU (through the DNC) produces a dot of 6 colors all destined for the same physical location on paper. If the nozzle rows in the within a printhead segment are aligned as shown in FIG. 261 then no adjustment of the dot data is needed.

Figure 264:
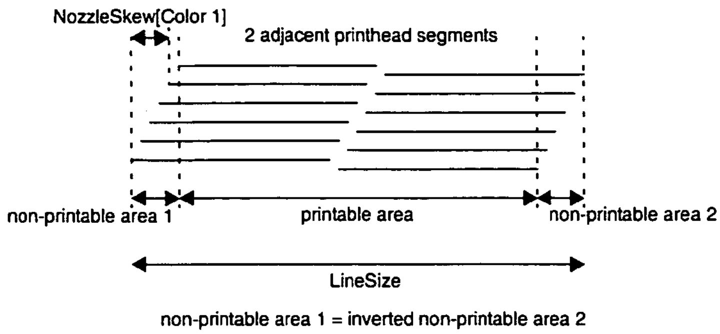

A conceptual misaligned printhead is shown in FIG. 264. The exact shape of the row alignment is arbitrary, although is most likely to be sloping (if sloping, it could be sloping in either direction).

Figure 265:
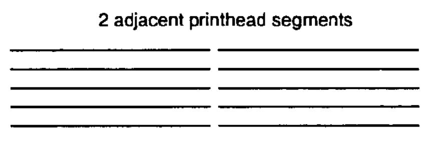

The DWU is required to adjust the shape of the dot streams to take into account the relative horizontal displacement of nozzles rows between 2 adjacent printhead segments. The LLU compensates for the vertical skew between printhead segments, and the vertical and horizontal skew within printhead segments. The nozzle row skew function aligns rows to compensate for the seam between printhead segments (as shown in FIG. 264) and not for the seam within a printhead (as shown in FIG. 261). The DWU nozzle row function results in aligned rows as shown in the example in FIG. 265.

To insert the shape of the skew into the dot stream, for each line we must first insert the dots for non-printable area 1, then the printable area data (from the DNC), and then finally the dots for non-printable area 2. This can also be considered as: first produce the dots for non-printable area 1 for line n, and then a repetition of:

produce the dots for the printable area for line n (from the DNC)

produce the dots for the non-printable area 2 (for line n) followed by the dots of non-printable area 1 (for line n+1)

The reason for considering the problem this way is that regardless of the shape of the skew, the shape of non-printable area 2 merged with the shape of non-printable area 1 will always be a rectangle since the widths of non-printable areas 1 and 2 are identical and the lengths of each row are identical. Hence step 2 can be accomplished by simply inserting a constant number (NozzleSkewPadding) of 0 dots into the stream.

For example, if the color n even row non-printable area 1 is of length X, then the length of color n even row non-printable area 2 will be of length NozzleSkevPadding−X. The split between non-printable areas 1 and 2 is defined by the NozzleSkew registers.

Data from the DNC is destined for the printable area only, the DWU must generate the data destined for the non-printable areas, and insert DNC dot data correctly into the dot data stream before writing dot data to the fifos. The DWU inserts the shape of the misalignment into the dot stream by delaying dot data destined to different nozzle rows by the relative misalignment skew amount.

32.6 Local Buffering

An embedded DRAM is expected to be of the order of 256 bits wide, which results in 27 words per half line of an A4 page, and 39 words per half line of A3. This requires 27 words×12 half colors (6 colors odd and even)=324×256-bit DRAM accesses over a dotline print time, equating to 6 bits per cycle (equal to DNC generate rate of 6 bits per cycle). Each half color is required to be double buffered, while filling one buffer the other buffer is being written to DRAM. This results in 256 bits×2 buffers×12 half colors i.e. 6144 bits in total. With 2× buffering the average and peak DRAM bandwidth requirement is the same and is 6 bits per cycle.

Should the DWU fail to get the required DRAM access within the specified time, the DWU will stall the DNC data generation. The DWU will issue the stall in sufficient time for the DNC to respond and still not cause a FIFO overrun. Should the stall persist for a sufficiently long time, the PHI will be starved of data and be unable to deliver data to the printhead in time. The sizing of the dotline store FIFO and internal FIFOs should be chosen so as to prevent such a stall happening.

32.7 Dotline Data in Memory

The dot data shift register order in the printhead is shown in FIG. 261 (the transmit order is the opposite of the shift register order). In the example shown dot 1, dot 3, dot 5, . . . , dot 33, dot 35 would be transmitted to the printhead in that order. As data is always transmitted to the printhead in increasing order it is beneficial to store the dot lines in increasing order to facilitate easy reading and transfer of data by the LLU and PHI.

For each line in the dot store the order is the same (although for odd lines the numbering will be different the order will remain the same). Dot data from the DNC is always received in increasing dot number order. The dot data is bundled into 256-bit words and written in increasing order in DRAM, word 0 first, then word 1, and so on to word N, where N is the number of words in a line. The starting point for the first dot in a DRAM word is configured by the AlignmentOffset register.

Figure 266:
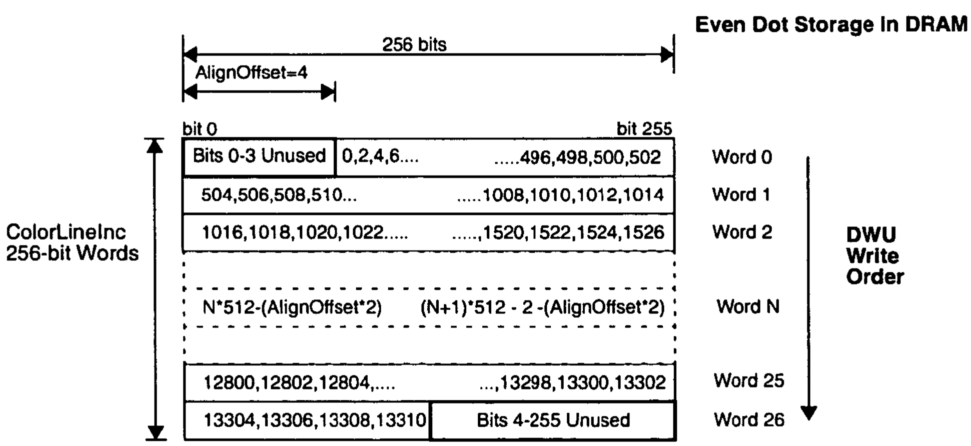
Figure 267:
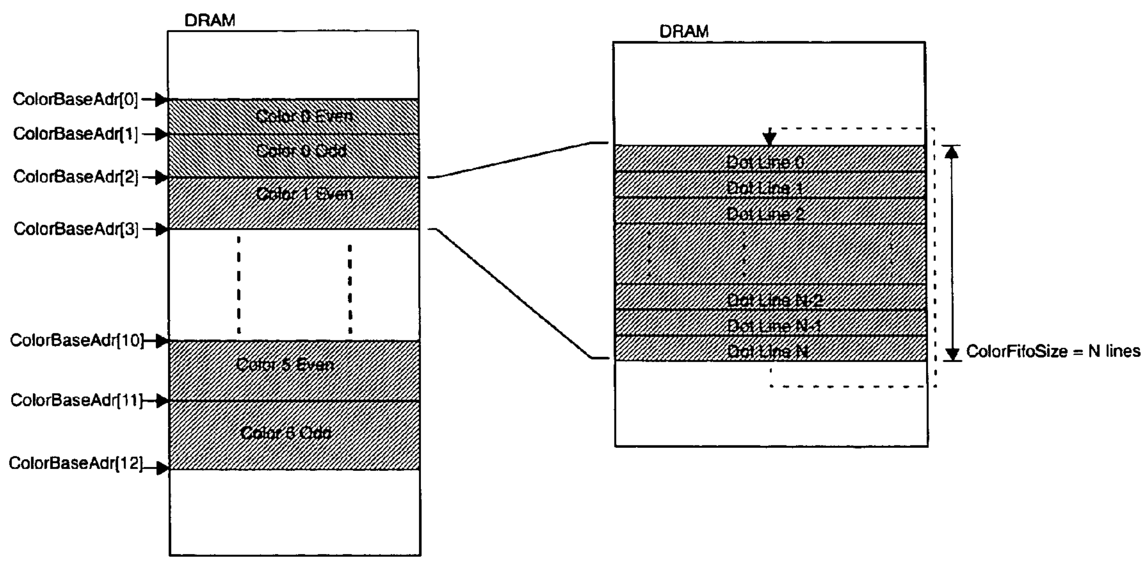
Figure 268:
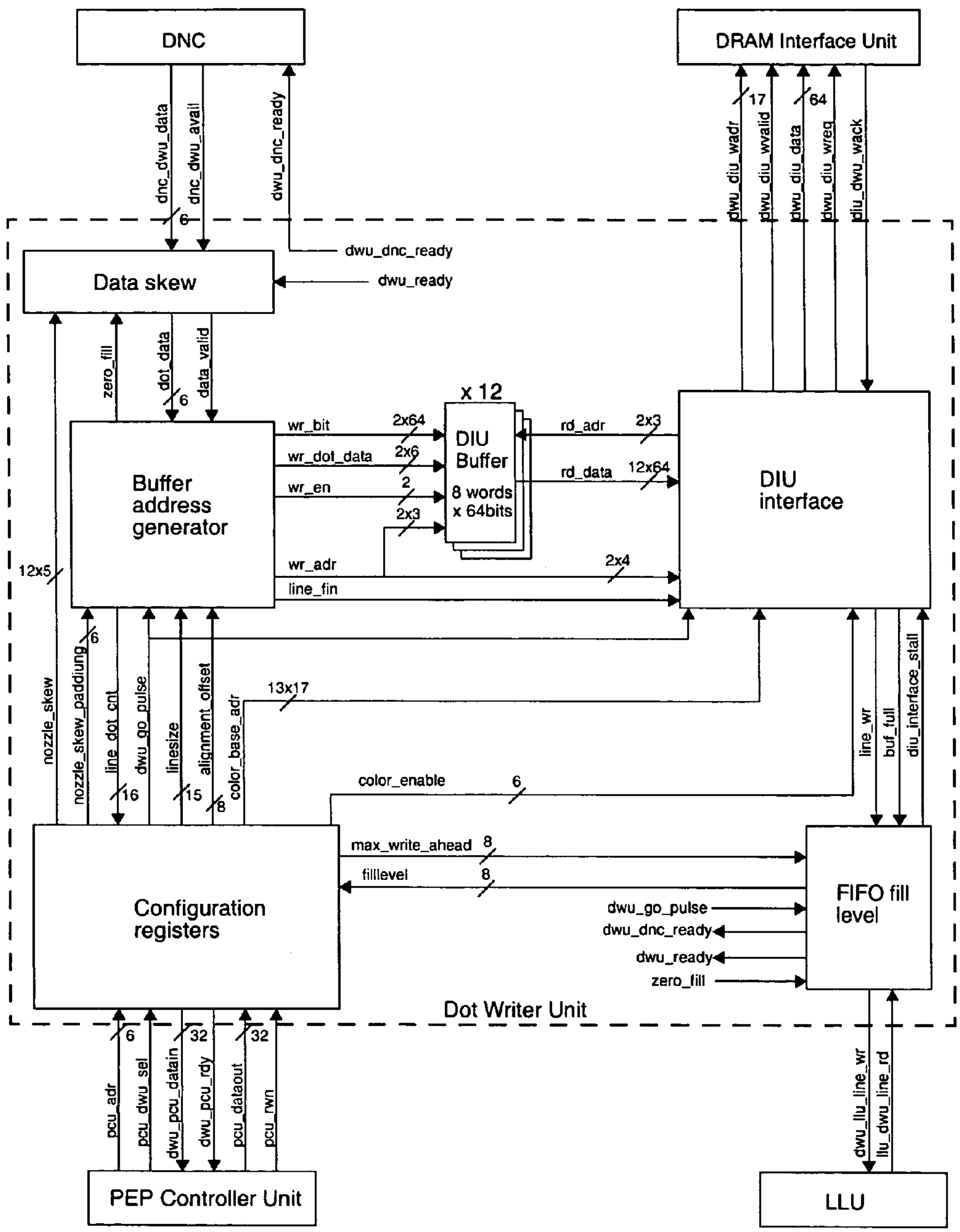
Figure 269:
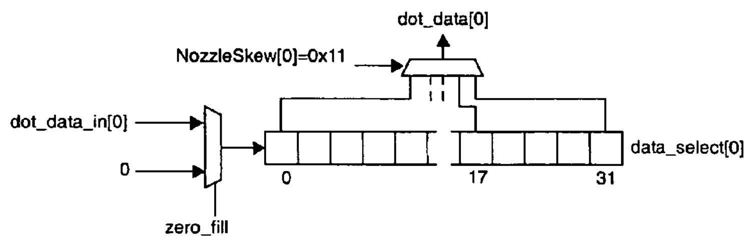
Figure 270:
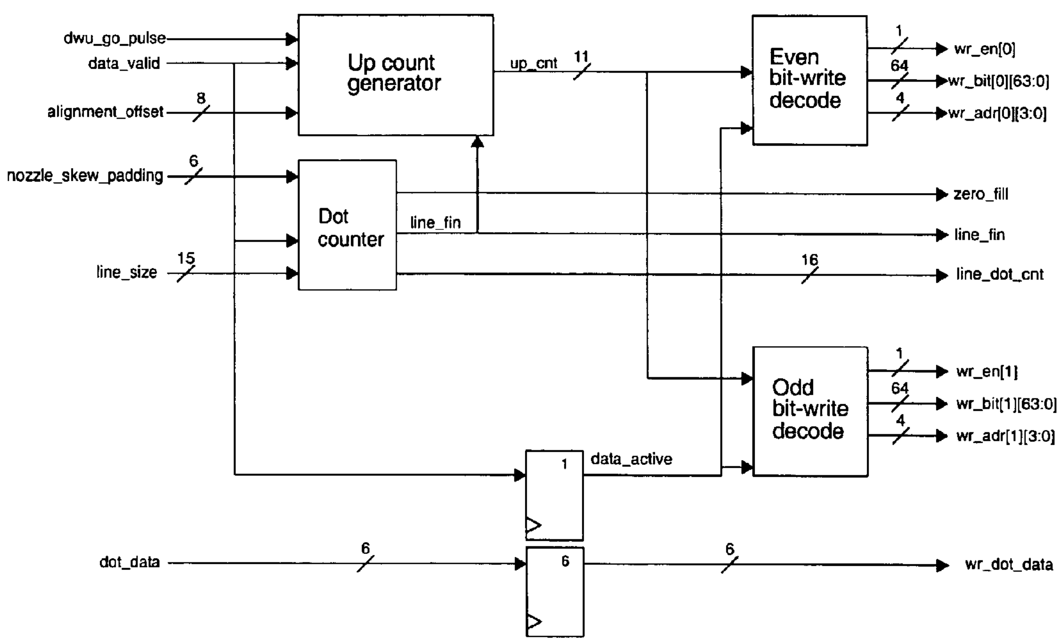
Figure 271:
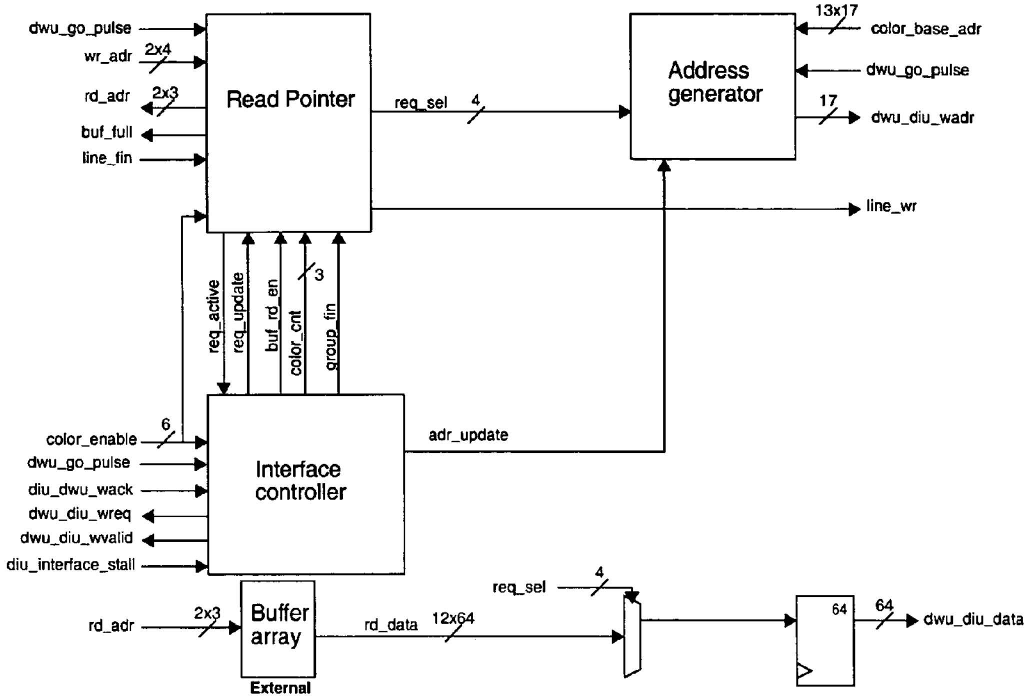
Figure 272:
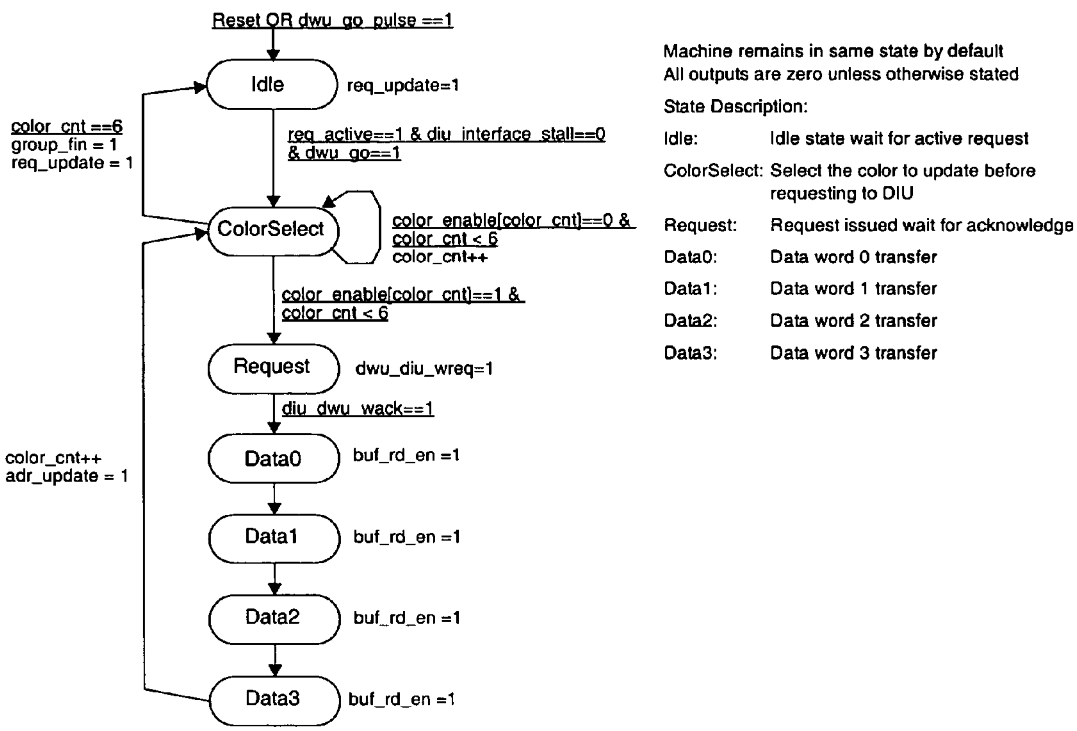

The dot order in DRAM is shown in FIG. 266.

The start address for each half color N is specified by the ColorBaseAdr[N] registers and the end address (actually the end address plus 1) is specified by the ColorBaseAdr[N+1]. Note there are 12 colors in total, 0 to 11, the ColorBaseAdr [12] register specifies the end of the color 11 dot FIFO and not the start of a new dot FIFO. As a result the dot FIFOs must be specified contiguously and increasing in DRAM.

As each line is written to the FIFO, the DWU increments the FifoFillLevel register, and as the LLU reads a line from the FIFO the FifoFillLevel register is decremented. The LLU indicates that it has completed reading a line by a high pulse on the llu_dwu_line_rd line.

When the number of lines stored in the FIFO is equal to the MaxWriteAhead value the DWU will indicate to the DNC that it is no longer able to receive data (i.e. a stall) by deasserting the dwu_dnc_ready signal.

The ColorEnable register determines which color planes should be processed, if a plane is turned off, data is ignored for that plane and no DRAM accesses for that plane are generated.

32.8 Implementation 32.8.1 Definitions of I/O

TABLE 204

DWU I/O Definition

| Port name | Pins | I/O | Description |
|---|---|---|---|
| | | | Clocks and Resets |
| pclk | 1 | In | System Clock |
| prst_n | 1 | In | System reset, synchronous active low |
| | | | DNC Interface |
| dwu_dnc_ready | 1 | Out | Indicates that DWU is ready to accept data from the DNC. |
| dnc_dwu_avail | 1 | In | Indicates valid data present on dnc_dwu_data. |
| dnc_dwu_data[5:0] | 6 | In | Input bi-level dot data in 6 ink planes. |
| | | | LLU Interface |
| dwu_llu_line_wr | 1 | Out | DWU line write. Indicates that the DWU has completed a full line write. Active high |
| llu_dwu_line_rd | 1 | In | LLU line read. Indicates that the LLU has completed a line read. Active high. |
| | | | PCU Interface |
| pcu_dwu_sel | 1 | In | Block select from the PCU. When pcu_dwu_sel is high both pcu_adr and pcu_dataout are valid. |
| pcu_rwn | 1 | In | Common read/not-write signal from the PCU. |
| pcu_adr[7:2] | 6 | In | PCU address bus. Only 6 bits are required to decode the address space for this block. |
| pcu_dataout[31:0] | 32 | In | Shared write data bus from the PCU. |
| dwu_pcu_rdy | 1 | Out | Ready signal to the PCU. When dwu_pcu_rdy is high it indicates the last cycle of the access. For a write cycle this means pcu_dataout has been registered by the block and for a read cycle this |

TABLE 204-continued

| DWU I/O Definition | | | |
|---|---|---|---|
| Port name | Pins | I/O | Description |
| | | | means the data on dwu_pcu_datain is valid. |
| dwu_pcu_datain[31:0] | 32 | Out | Read data bus to the PCU. |
| | | | DIU Interface |
| dwu_diu_wreq | 1 | Out | DWU requests DRAM write. A write request must be accompanied by a valid write address together with valid write data and a write valid. |
| dwu_diu_wadr[21:5] | 17 | Out | Write address to DIU<br>17 bits wide (256-bit aligned word) |
| diu_dwu_wack | 1 | In | Acknowledge from DIU that write request has been accepted and new write address can be placed on dwu_diu_wadr |
| dwu_diu_data[63:0] | 64 | Out | Data from DWU to DIU. 256-bit word transfer over 4 cycles<br>First 64-bits is bits 63:0 of 256 bit word<br>Second 64-bits is bits 127:64 of 256 bit word<br>Third 64-bits is bits 191:128 of 256 bit word<br>Fourth 64-bits is bits 255:192 of 256 bit word |
| dwu_diu_wvalid | 1 | Out | Signal from DWU indicating that data on dwu_diu_data is valid. |

32.8.3 Configuration Registers

The configuration registers in the DWU are programmed via the PCU interface. Refer to section 23.8.2 on page 439 for a description of the protocol and timing diagrams for reading and writing registers in the DWU.

Note that since addresses in SoPEC are byte aligned and the PCU only supports 32-bit register reads and writes, the lower 2 bits of the PCU address bus are not required to decode the address space for the DWU.

When reading a register that is less than 32 bits wide zeros are returned on the upper unused bit(s) of dwu_pcu_data. Table 205 lists the configuration registers in the DWU.

TABLE 205

| DWU registers description | | | | |
|---|---|---|---|---|
| Address DWU_base+ | Register | #bits | Reset | Description |
| | | Control Registers | | |
| 0x00 | Reset | 1 | 0x1 | Active low synchronous reset, self de-activating. A write to this register will cause a DWU block reset. |
| 0x04 | Go | 1 | 0x0 | Active high bit indicating the DWU is programmed and ready to use. A low to high transition will cause DWU block internal states to reset (configuration registers are not reset). |
| | | Dot Line Store Configuration | | |
| 0x08-0x38 | ColorBaseAdr[12:0][21:5] | 13x17 | 0x00000 | Specifies the base address (in words) in memory where data from a particular half color (N) will be placed.<br>Also specifies the end address +1 (256-bit words) in memory where fifo data for a particular half color ends. For color N the start address is ColorBaseAdr[N] and the end address +1 is ColorBaseAdr[N+1] |
| 0x40 | ColorEnable | 6 | 0x3F | Indicates whether a particular color is active or not.<br>When inactive no data is written to DRAM for that color.<br>0 - Color off<br>1 - Color on<br>One bit per color, bit 0 is Color 0 and so on. |
| 0x44 | MaxWriteAhead | 8 | 0x00 | Specifies the maximum number of lines that the DWU can be ahead of the LLU |
| 0x48 | LineSize | 15 | 0x0000 | Indicates the number of dot-pairs −1 per line produced by the DWU. For |

TABLE 205-continued

DWU registers description

| Address DWU_base+ | Register | #bits | Reset | Description |
|---|---|---|---|---|
| | | | | example a value of 99 implies a line size of 200 dots ((99+1) * 2). |
| 0x4C | NozzleSkewPadding | 6 | 0x00 | Specifies the number of dots the DWU needs to generate to flush the data skew buffers. Corresponds to the non-printable area of the printhead plus some padding if required. Must be programmed to greater than or equal to the maximum value in the NozzleSkew registers. |
| 0x50-0x7C | NozzleSkew | 12x5 | 0x00 | Specifies the relative skew of dot data nozzle rows in the printhead. Valid range is 0 (no skew) through to 31. Units represent dot-pairs, a skew of 1 for a row represents two dots on the page.<br>Bus 0, 1 - Even, Odd line color 0<br>Bus 2, 3 - Even, Odd line color 1<br>Bus 4, 5 - Even, Odd line color 2<br>Bus 6, 7 - Even, Odd line color 3<br>Bus 8, 9 - Even, Odd line color 4<br>Bus 10, 11 - Even, Odd line color 5 |
| 0x80 | AlignmentOffset | 8 | 0x00 | Specifies the starting bit position in a 256 bit DRAM word for the first dot from even and odd data of all colors |
| | | Working Registers | | |
| 0x90 | LineDotCnt | 16 | 0x0000 | Indicates the number of remaining dots in the current line. (Read Only) |
| 0x94 | FifoFillLevel | 8 | 0x00 | Number of lines in the FIFO, written to but not read. (Read Only) |

A low to high transition of the Go register causes the internal states of the DWU to be reset. All configuration registers will remain the same. The block indicates the transition to other blocks via the dwu_go_pulse signal.

32.8.4 Data Skew

The data skew block inserts the shape of the printhead skew into the dot data stream by delaying dot data by the relative nozzle skew amount (given by nozzle_skew). It generates zero fill data introduced into the dot data stream to achieve the relative skew (and also to flush dot data from the delay registers).

The data skew block consists of 12 31-bit shift registers, one per color odd and even. The shift registers are in groups of 6, one group for even colors, and one for odd colors. Each time a valid data word is received from the DNC the dot data is shifted into either the odd or even group of shift registers. The odd_even_sel register determines which group of shift registers are valid for that cycle and alternates for each new valid data word. When a valid word is received for a group of shift registers, the shift register is shifted by one location with the new data word shifted into the registers (the top word in the register will be discarded).

When the dot counter determines that the data skew block should zero fill (zero_fill), the data skew block will shift zero dot data into the shift registers until the line has completed. During this time the DNC will be stalled by the de-assertion of the dwu_dnc_ready signal.

The data skew block selects dot data from the shift registers and passes it to the buffer address generator block. The data bits selected are determined by the configured index values in the NozzleSkew registers.

```
// determine when data is valid
data__valid = (((dnc__dwu__avail == 1)OR(zero__fill == 1)) AND
(dwu__ready ==1))
// implement the zero fill mux
if (zero__fill == 1) then
                    dot__data__in = 0
else
                    dot__data__in = dnc__dwu__data
// the data delay buffers
if (dwu__go__pulse ==1) then
                    data__delay[1:0][30:0][5:0]    = 0          // reset all delay buffer
odd=1, even=0
                    odd__even__sel                 = 0
elsif (data__valid == 1) then {
                    odd__even__sel = ~odd__even__sel
```

-continued

```
                // update the odd/even buffers, with shift
                data__delay[odd__even__sel][30:1][5:0]= data__delay[odd__even__sel][29:0][5:0]
// shift data
                data__delay[odd__even__sel][0][5:0] = dot__data__in[5:0]          // shift in
new data
                // select the correct output data
                for (i=0;i<6; i++) {
                    // skew selector
                    skew = nozzle__skew[ {i,odd__even__sel} ]                      // temporary
variable
                    // data select array, include data delay and input dot data
                    data__select[31:0] = {data__delay[odd__even__sel][30:0], dot__data__in}
                    // mux output the data word to next block (33 to 1 mux)
                    dot__data[i] = data__select[skew][i]
                    }
                }
```

32.8.5 Fifo Fill Level

The DWU keeps a running total of the number of lines in the dot store FIFO. Each time the DWU writes a line to DRAM (determined by the DIU interface subblock and signalled via line_wr) it increments the filllevel and signals the line increment to the LLU (pulse on dwu_llu_line_wr). Conversely if it receives an active llu_dwu_line_rd pulse from the LLU, the filllevel is decremented. If the filllevel increases to the programmed max level (max_write_ahead) then the DIU interface is stalled and further writes to DRAM are prevented. If the DIU buffers subsequently fill the DWU will stall the DNC by de-asserting the dwu_dnc_ready signal.

diu_interface_stall=(filllevel==max_write_ahead)

If one or more of the DIU buffers fill, the DIU interface signals the fill level logic via the buf_fill signal which in turn causes the DWU to de-assert the dwu_dnc_ready signal to stall the DNC. The buf_full signals will remain active until the DIU services a pending request from the full buffer, reducing the buffer level.

When the dot counter block detects that it needs to insert zero fill dots (zero_fill equals 1) the DWU will stall the DNC while the zero dots are being generated (by de-asserting dwu_dnc_ready), but will allow the data skew block to generate zero fill data (the dwu_ready signal).

```
dwu__dnc__ready   = ( NOT(buf__full==1 OR zero__fill==1) AND
dwu__go==1)
dwu__ready        = NOT(buf__full==1)
```

The DWU does not increment the fill level until a complete line of dot data is in DRAM not just a complete line received from the DNC. This ensures that the LLU cannot start reading a partial line from DRAM before the DWU has finished writing the line.

The fill level is reset to zero each time a new page is started, on receiving a pulse via the dwu_go_pulse signal.

The line fifo fill level can be read by the CPU via the PCU at any time by accessing the FifoFillLevel register.

32.8.6 Buffer Address Generator 32.8.6.1 Buffer Address Generator Description

The buffer address generator subblock is responsible for accepting data from the data skew block and writing it to the DIU buffers in the correct order.

The buffer address and active bit-write for a particular dot data write is calculated by the buffer address generator based on the dot count of the current line, programmed sense of the color and the line size.

All configuration registers should be programmed while the Go bit is set to zero, once complete the block can be enabled by setting the Go bit to one. The transition from zero to one will cause the internal states to reset.

For the first dot in a half color, the bit 0 of the wr_bit bus will be active (in buffer word 0), for the second dot bit 1 is active and so on to the 255$^{th}$ dot where bit 63 is active (in buffer word 3). This is repeated for all 256-bit words until the final word where only a partial number of bits are written before the word is transferred to DRAM.

The first dot of line does not have to align to a DRAM word. The alignment offset register configures the offset amount of the first dot from the 256-bit DRAM word boundary.

32.8.6.2 Bit-write Decode

The buffer address generator contains 2 instances of the bit-write decode, one configured for odd dot data the other for even. Each block determines if it is active on this cycle by comparing its configured type with the current dot count address and the data active signal.

The wr_bit bus is a direct decoding of the lower 6 count bits (up_cnt[6:1]), and the DIU buffer address is the remaining higher bits of the counter (up_cnt[10:7]).

The signal generation is given as follows:

```
// determine if active, based on instance type
wr__en          = data__active & (up__cnt[0] ^ odd__even__type)
// odd =1, even =0
// determine the bit write value
wr__bit[63:0]  = decode(up__cnt[6:1])
// determine the buffer 64-bit address
wr__adr[3:0]   = up__cnt[10:7]
```

32.8.6.3 Up Counter Generator

The up counter increments for each new dot and is used to determine the write position of the dot in the DIU buffers for odd and even data. At the end of each line of dot data (as indicated by line_fin), the counter is rounded up to the nearest 256-bit word boundary, and the up_cnt[8:1] bits are initialized to the alignment_offset (note bit 0 is cleared). This causes the DIU buffers to be flushed to DRAM including any partially filled 256-bit words. The counter is reset to alignment offset if the dwu_go_pulse is one.

```
// Up-Counter Logic
if (dwu_go_pulse == 1) then {
        up_cnt[10:0] = {"00",alignment_offset[7:0],"0"}     // zero filled
concatenation
elsif (line_fin == 1 ) then
        // round up (line_fin must be coincident with data_valid)
        up_cnt[10:9]++
        // bit-selector
        up_cnt[8:1]= alignment_offset[7:0]
        up_cnt[0] = 0
elsif (data_valid == 1) then
        up_cnt[10:0]++
```

32.8.6.4 Dot Counter

The dot counter simply counts each active dot received from the data skew block. It sets the counter to line_size*2 and decrements each time a valid dot is received. When the count equals zero the line_fin signal is pulsed and the counter is reset to line_size*2.

When the count is less than the nozzle_skew padding value the dot counter indicates to the data skew block to zero fill the remainder of the line (via the zero_fill signal). Note that the nozzle_skew_padding units are dots as opposed to dot-pairs as used by the line_size, hence the by 2 multiplication for loading of the dot counter.

The counter is reset to line_size*2 when dwu_go_pulse is 1.

32.8.7 DIU Buffer

The DIU buffer is a 64 bit×8 word dual port register array with bit write capability. The buffer could be implemented with flip-flops should it prove more efficient.

32.8.8 DIU Interface 32.8.8.1 DIU Interface General Description

The DIU interface determines when a buffer needs a data word to be transferred to DRAM. It generates the DRAM address based on the dot line position, the color base address and the other programmed parameters. A write request is made to DRAM and when acknowledged a 256-bit data word is transferred. The interface determines if further words need to be transferred and repeats the transfer process.

If the FIFO in DRAM has reached its maximum level, or one of the buffers has temporarily filled, the DWU will stall data generation from the DNC.

A similar process is repeated for each line until the end of page is reached. At the end of a page the CPU is required to reset the internal state of the block before the next page can be printed. A low to high transition of the Go register will cause the internal block reset, which causes all registers in the block to reset with the exception of the configuration registers. The transition is indicated to subblocks by a pulse on dwu_go_pulse signal.

32.8.8.2 Interface Controller

The interface controller state machine waits in Idle state until an active request is indicated by the read pointer (via the req_active signal) and the DIU access is not stalled by the fifo fill level block (via the diu_interface_stall signal). When an active request is received the machine proceeds to the Color Select state to determine which buffers need a data transfer. In the Color Select state it cycles through each color and determines if the color is enabled (and consequently the buffer needs servicing), if enabled it jumps to the Request state, otherwise the color_cnt is incremented and the next color is checked.

In the Request state the machine issues a write request to the DIU and waits in the Request state until the write request is acknowledged by the DIU (diu_dwu_wack). Once an acknowledge is received the state machine clocks through 4 cycles transferring 64-bit data words each cycle and incrementing the corresponding buffer read address. After transferring the data to the DIU the machine returns to the Color Select state to determine if further buffers need servicing. On the transition the controller indicates to the address generator (adr_update) to update the address for that selected color.

If all colors are transferred (color_cnt equal to 6) the state machine returns to Idle, updating the last word flags (group_fin) and request logic (req_update).

The dwu_diu_wvalid signal is a delayed version of the buf_rd_en signal to allow for pipeline delays between data leaving the buffer and being clocked through to the DIU block.

The state machine will return from any state to Idle if the reset or the dwu_go pulse is 1.

32.8.8.3 Address Generator

The address generator block maintains 12 pointers (color_adr[1:0]) to DRAM corresponding to current write address in the dot line store for each half color. When a DRAM transfer occurs the address pointer is used first and then updated for the next transfer for that color. The pointer used is selected by the req_sel bus, and the pointer update is initiated by the adr_update signal from the interface controller.

For all colors the color_base_adr specifies the address of the first word of first line of the fifo.

For each half colors, the initialization value (i.e. when dwu_go_pulse is 1) is the color_base_adr. For each word that is written to DRAM the pointer compared with the base address for the next color. If they are equal then the pointer set to the base address (color_base_adr), otherwise it is incremented The address is calculated as follows:

```
if (dwu_go_pulse == 1) then
        color_adr[11:0] = color_base_adr[11:0][21:5]
elsif (adr_update == 1) then {
        // determine the color
        color = req_sel[3:0]
        // temp variable
        tmp_adr = color_adr[color] + 1
        if (tmp_adr == color_base_adr[color+1][21:5]) then   // wrap
around condition
           color_adr[color] = color_base_adr[color][21:5]
        else
           color_adr[color] = tmp_adr
        }
// select the correct address, for this transfer
dwu_diu_wadr = color_adr[req_sel]
```

32.8.8.4 Read Pointer

The read pointer logic maintains the buffer read address pointers. The read pointer is used to determine which 64-bit words to read from the buffer for transfer to DRAM.

The read pointer logic compares the read and write pointers of each DIU buffer to determine which buffers require data to be transferred to DRAM, and which buffers are full (the buf_full signal).

Buffers are grouped into odd and even buffers groups. If an odd buffer requires DRAM access the odd_pend signals will be active, if an even buffer requires DRAM access the even_pend signals will be active. If a group of odd buffers are being serviced and an even buffer becomes pending, the odd group of buffers will be completed before the starting the even group, and vice versa.

If both odd and even buffers require DRAM access at exactly the same time, the logic selects the alternative group of buffers to the last serviced group. Between each allocation of DRAM resources to a group of buffers the logic stores the last serviced group in the last_serviced register.

If any buffer requires a DRAM transfer, the logic will indicate to the interface controller via the req_active signal, with the odd_even_sel signal determining which group of buffers get serviced. The interface controller will check the color_enable signal and issue DRAM transfers for all enabled colors in a group. When the transfers are complete it tells the read pointer logic to update the requests pending via req_update signal.

The req_sel[3:0] signal tells the address generator which buffer is being serviced, it is constructed from the odd_even_sel signal and the color_cnt[2:0] bus from the interface controller. When data is being transferred to DRAM the word pointer and read pointer for the corresponding buffer are updated. The req_sel determines which pointer should be incremented.

```
// determine if request is active even
if ( wr_adr[0][3:2] != rd_adr[0][3:2] )
        even_pend = 1
else
        even_pend = 0
// determine if request is active odd
if ( wr_adr[1][3:2] != rd_adr[1][3:2] )
        odd_pend = 1
else
        odd_pend = 0
// determine if any buffer is full
if ((wr_adr[0][2:0] == rd_adr[0][2:0]) AND (wr_adr[1][3] !=
rd_adr[1][3])) then
        buf_full = 1
// fixed servicing order, only update when controller dictates so
if (req_update == 1) then {
        // determine which group to service (based on last serviced)
        sel = {even_pend,odd_pend,last_serviced}
        case sel
          000 : odd_even_sel=0; req_active=0; last_serviced=0;
          001 : odd_even_sel=0; req_active=0; last_serviced=1;
          010 : odd_even_sel=1; req_active=1; last_serviced=1;
          011 : odd_even_sel=1; req_active=1; last_serviced=0;
          100 : odd_even_sel=0; req_active=1; last_serviced=0;
          101 : odd_even_sel=0; req_active=1; last_serviced=0;
          110 : odd_even_sel=1; req_active=1; last_serviced=1;
          111 : odd_even_sel=0; req_active=1; last_serviced=0;
        endcase
        }
// selected requestor
req_sel[3:0] = {color_cnt[2:0] , odd_even_sel}    // concatentation
```

The read address pointer logic consists of 2 2-bit counters and a word select pointer. The pointers are reset when dwu_go_pulse is one. The word pointer (word_ptr) is common to all buffers and is used to read out the 64-bit words from DIU buffer. It is incremented when buf_rd_en is active. When a group of buffers are updated the state machine increments the read pointer (rd_ptr[odd_even_sel]) via the group_fin signal. A concatenation of the read pointer and the word pointer are use to construct the buffer read address. The read pointers are not reset at the end of each line.

```
    // determine which pointer to update
    if (dwu_go_pulse == 1) then
            rd_ptr[1:0]    = 0
```

-continued

```
            word_ptr       = 0
    elsif (buf_rd_en == 1) then {
            word_ptr++                    // word pointer update
    elsif (group_fin == 1) then
            rd_ptr[odd_even_sel]++      // update the read pointer
    // create the address from the pointer,and word reader
    rd_adr[odd_even_sel] = {rd_ptr[odd_even_sel],word_ptr}
    // concatenation
```

The read pointer block determines if the word being read from the DIU buffers is the last word of a line. The buffer address generator indicate the last dot is being written into the buffers via the line_fin signal. When received the logic marks the 256-bit word in the buffers as the last word. When the last word is read from the DIU buffer and transferred to DRAM, the flag for that word is reflected to the address generator.

```
    // line end set the flags
    if (dwu_go_pulse == 1) then
            last_flag[1:0][1:0] = 0
    elsif (line_fin == 1 ) then
            // determines the current 256-bit word even been written to
            last_flag[0][wr_adr[0][2]] = 1    // even group flag
            // determines the current 256-bit word odd been written to
            last_flag[1][wr_adr[1][2]] = 1    // odd group flag
    // last word reflection to address generator
    last_wd = last_flag[odd_even_sel][rd_ptr[req_sel][0]]
    // clear the flag
    if (group_fin == 1 ) then
            last_flag[odd_even_sel][rd_ptr[req_sel][0]] = 0
```

When a complete line has been written into the DIU buffers (but has not yet been transferred to DRAM), the buffer address generator block will pulse the line_fin signal. The DWU must wait until all enabled buffers are transferred to DRAM before signaling the LLU that a complete line is available in the dot line store (dwu_llu_line_wr signal). When the line_fin is received all buffers will require transfer to DRAM. Due to the arbitration, the even group will get serviced first then the odd. As a result the line finish pulse to the LLU is generated from the last_flag of the odd group.

```
// must be odd,odd group transfer complete and the last word
dwu_llu_line_wr = odd_even_sel AND group_fin AND last_wd
```

33 Line Loader Unit (LLU)

33.1 Overview

Figure 273:
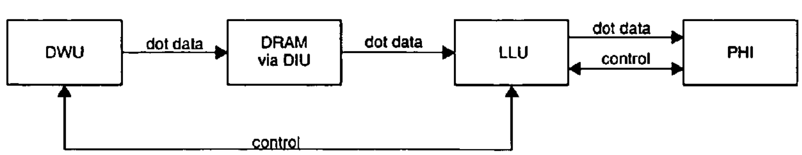

The Line Loader Unit (LLU) reads dot data from the line buffers in DRAM and structures the data into even and odd dot channels destined for the same print time. The blocks of dot data are transferred to the PHI and then to the printhead. FIG. 273 shows a high level data flow diagram of the LLU in context.

33.2 Physical Requirement Imposed by the Printhead

Figure 274:
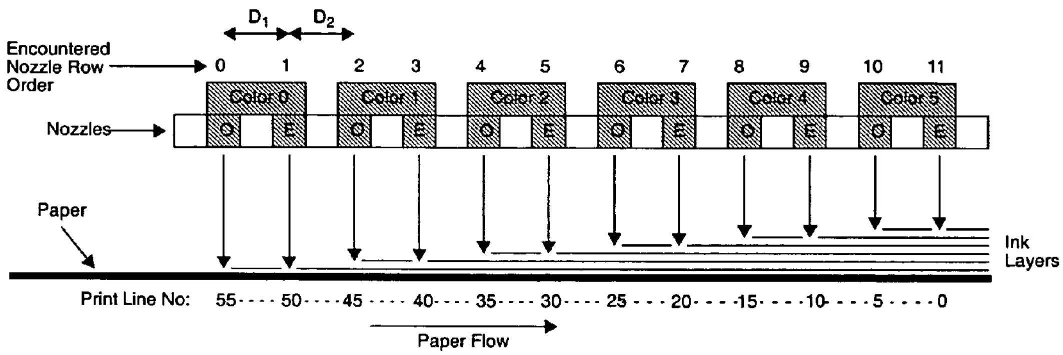
Figure 275:
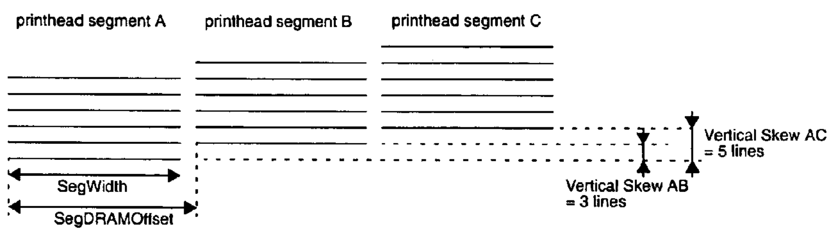
Figure 276:
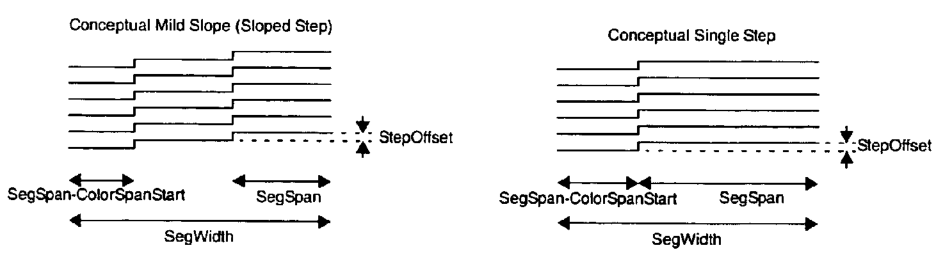
Figure 277:
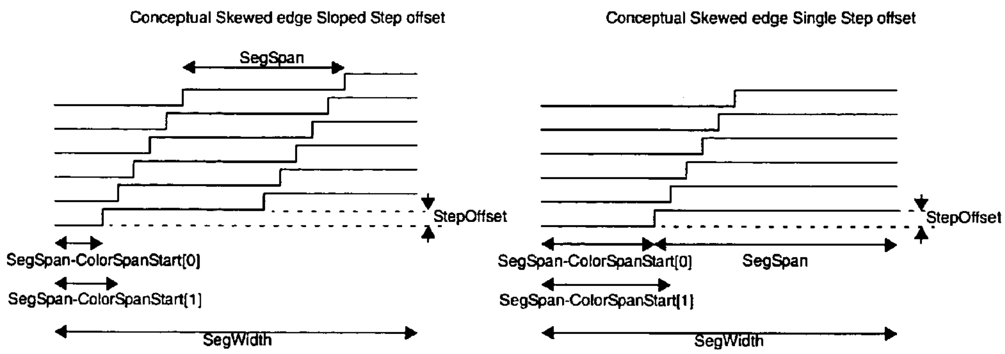

The DWU re-orders dot data into 12 separate dot data line FIFOs in the DRAM. Each FIFO corresponds to 6 colors of odd and even data. The LLU reads the dot data line FIFOs and sends the data to the printhead interface. The LLU decides when data should be read from the dot data line FIFOs to correspond with the time that the particular nozzle on the printhead is passing the current line. The interaction of the DWU and LLU with the dot line FIFOs compensates for the physical spread of nozzles firing over several lines at once. For further explanation see Section 32 Dotline Writer Unit (DWU) and Section 34 PrintHead Interface (PHI). FIG. 274 shows the physical relationship between nozzle rows and the line time the LLU starts reading from the dot line store.

A printhead is constructed from printhead segments. One A4 printhead can be constructed from up to 11 printhead segments. A single LLU needs to be capable of driving up to 11 printhead segments, although it may be required to drive less. The LLU will read this data out of FIFOs written by the DWU, one FIFO per half-color.

The PHI needs to send data out over 6 data lines, each data line may be connected to up to two segments. When printing A4 portrait, there will be 11 segments. This means five of the data lines will have two segments connected and one will have a single segment connected (any printhead channel could have a single segment connected). In a dual SoPEC system, one of the SoPECs will be connected to 5 segments, while the other is connected to 6 segments.

Focusing for a moment on the single SoPEC case, SoPEC maintains a data generation rate of 6 bits per cycle throughout the data calculation path. If all 6 data lines broadcast for the entire duration of a line, then each would need to sustain 1 bit per cycle to match SoPECs internal processing rate. However, since there are 11 segments and 6 data lines, one of the lines has only a single segment attached. This data line receives only half as much data during each print line as the other data lines. So if the broadcast rate on a line is 1 bit per cycle, then we can only output at a sustained rate of 5.5 bits per cycle, thus not matching the internal generation rate. These lines therefore need an output rate of at least $6/5.5$ bits per cycle.

Due to clock generation limitations in SoPEC the PHI datalines can transport data at $6/5$ bits per cycle, slightly faster than required.

While the data line bandwidth is slightly more than is needed, the bandwidth needed is still slightly over 1 bit per cycle, and the LLU data generators that prepare data for them must produce data at over 1 bit per cycle. To this end the LLU will target generating data at 2 bits per cycle for each data line.

The LLU will have 6 data generators. Each data generator will produce the data for either a single segment, or for 2 segments. In cases where a generator is servicing multiple segments the data for one entire segment is generated first before the next segments data is generated. Each data generator will have a basic data production rate of 2 bits per cycle, as discussed above. The data generators need to cater to variable segment width. The data generators will also need to cater for the full range of printhead designs currently considered plausible. Dot data is generated and sent in increasing order.

33.3 Printhead Flexibility

What has to be dealt with in the LLU is summarized here.

The generators need to be able to cope with segments being vertically offset. This could be due to poor placement and assembly techniques, or due to each printhead segment being placed slightly above or below the previous printhead segment.

They need to be able to cope with the segments being placed at mild slopes. The slopes being discussed and planned for are of the order of 5-10 lines across the width of the printhead (termed Sloped Step).

It is necessary to cope with printhead segments that have a single internal step of 3-10 lines thus avoiding the need for continuous slope. Note the term step is used to denote when the LLU changes the dot line it is reading from in the dot line store. To solve this we will reuse the mild sloping facility, but allow the distance stepped back to be arbitrary, thus it would be several steps of one line in most mild sloping arrangements and one step of several lines in a single step printhead. SoPEC should cope with a broad range of printhead sizes. It is likely that the printheads used will be 1280 dots across. Note this is 640 dots/nozzles per half color.

It is also necessary that the LLU be able to cope with a single internal step, where the step position varies per nozzle row within a segment rather than per segment (termed Single Step).

The LLU can compensate for either a Sloped Step or Single Step, and must compensate all segments in the printhead with the same manner.

33.3.1 Between Segments Vertical Row Skew

Due to construction limitations of the linking printhead it is possible that nozzle rows may be misaligned relative to each other. Odd and even rows, and adjacent color rows may be horizontally misaligned by up to 5 dot positions relative to each other. Vertical misalignment can also occur between printhead segments used to construct the printhead. The DWU compensates for some horizontal misalignment issues (see Section 32.5), and the LLU compensates for the vertical misalignments and some horizontal misalignment.

The vertical skew between printhead segments can be different between any 2 segments. For example the vertical difference between segment A and segment B (Vertical skew AB) and between segment B and segment C (Vertical skew BC) can be different.

The LLU compensates for this by maintaining a different set of address pointers for each segment. The segment offset register (SegDRAMOffset) specifies the number of DRAM words offset from the base address for a segment. It specifies the number of DRAM words to be added to the color base address for each segment, and is the same for all odd colors and even colors within that segment. The SegDotOffset specifies the bit position within that DRAM word to start processing dots, there is one register for all even colors and one for all odd colors within that segment. The segment offset is programmed to account for a number of dot lines, and compensates for the printhead segment mis-alignment. For example in the diagram above the segment offset for printhead segment B is SegWidth+(LineLength*3) in DRAM words.

33.3.2 Vertical Skew within a Segment

Vertical skew within a segment can take the form of either a single step of 3-10 lines, or a mild slope of 5-10 lines across the length of the printhead segment. Both types of vertical skew are compensated for by the LLU using the same mechanism, but with different programming.

Within a segment there may be a mild slope that the LLU must compensate for by reading dot data from different parts of the dot store as it produces data for a segment. Every SegSpan number of dot pairs the LLU dot generator must adjust the address pointer by StepOffset. The StepOffset is added to the address pointer but a negative offset can be achieved by setting StepOffset sufficiently large enough to wrap around the dot line store. When a dot generator reaches the end of a segment span and jumps to the new DRAM word specified by the offset, the dot pointer (pointing to the dot within a DRAM word) continues on from the same position it finished. It is possible (and likely) that the span step will not align with a segment edge. The span counter must start at a configured value (Color SpanStart) to compensate for the mis-alignment of the span step and the segment edge.

The programming of the Color SpanStart, StepOffset and SegSpan can be easily reprogrammed to account for the single step case.

All segments in a printhead are compensated using the same Color SpanStart, StepOffset and SegSpan settings, no parameter can be adjusted on a per segment basis.

With each step jump not aligned to a 256-bit word boundary, data within a DRAM word will be discarded. This means that the LLU must have increased DRAM bandwidth to compensate for the bandwidth lost due to data getting discarded.

33.3.3 Color Dependent Vertical Skew within a Segment

The LLU is also required to compensate for color row dependant vertical step offset. The position of the step offset is different for each color row and but the amount of the offset is the same per color row. Color dependent vertical skew will be the same for all segments in the printhead.

The color dependant step compensation mechanism is a variation of the sloped and single step mechanisms described earlier. The step offset position within a printhead segment varies per color row. The step offset position is adjusted by setting the span counter to different start values depending on the color row being processed. The step offset is defined as SegSpan−ColorSpanStart[N] where N specifies the color row to process.

In the skewed edge sloped step case it is likely the mechansim will be used to compensate for effects of the shape of the edge of the printhead segment. In the skewed edge single step case it is likely the mechansim will be used to compensate for the shape of the edge of the printhead segment and to account for the shape of the internal edge within a segment.

33.4 Horizontal Misalignment Between Adjacent Segments

Figure 278:
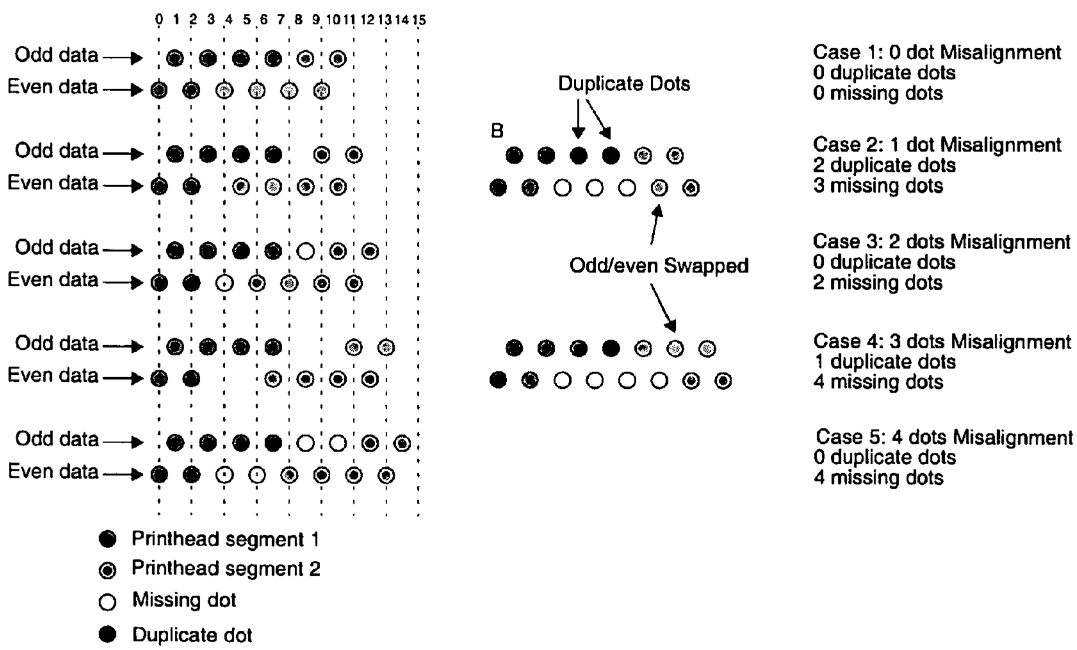

The LLU is required to compensate for horizontal misalignments between printhead segments. FIG. 278 shows possible misalignment cases.

In order for the LLU to compensate for horizontal misalignment it must deal with 3 main issues Swap odd/even dots to even/odd nozzle rows (case 2 and 4)

Remove duplicated dots (case 2 and 4)

Read dots on a dot boundary rather than a dot pair

In case 2 the second printhead segment is misaligned by one dot. To compensate for the misalignment the LLU must send odd nozzle data to the even nozzle row, and even nozzle data to the odd nozzle row in printhead segment 2. The OddAligned register configures if a printhead segment should have odd/even data swapped, when set the LLU reads even dot data and transmits it to the odd nozzle row (and visa versa).

When data is swapped, nozzles in segment 2 will overlap with nozzles in segment 1 (indicated in FIG. 278), potentially causing the same dot data to be fired twice to the same position on the paper. To prevent this the LLU provides a mechanism whereby the first dots in a nozzle row in a segment are zeroed or prevented from firing. The SegStartDotRemove register configures the number of starting dots (up to a maximum of 3 dots) in a row that should be removed or zeroed out on a per segment basis. For each segment there are 2 registers one for even nozzle rows and one for odd nozzle rows.

Another consequence of nozzle row swapping, is that nozzle row data destined for printhead segment 2 is no longer aligned. Recall that the DWU compensates for a fixed horizontal skew that has no knowledge of odd/even nozzle data swapping. Notice that in Case 2*b* in FIG. 278 that odd dot data destined for the even nozzle row of printhead segment 2 must account for the 3 missing dots between the printhead segments, whereas even dot data destined for the odd nozzle row of printhead segment 2 must account for the 2 duplicate dots at the start of the nozzle row. The LLU allows for this by providing different starting offsets for odd and even nozzles rows and a per segment basis. The SegDRAMOffset and SegDotOffset registers have 12 sets of 2 registers, one set per segment, and within a set one register per odd/even nozzle row. The SegDotOffset register allows specification of dot offsets on a dot boundary.

33.5 Sub Line Vertical Skew Compensation Between Adjacent Segments

The LLU (in conjunction with sub-line compensation in printhead segments) is required to compensate for sub-line vertical skew between printhead segments.

Figure 279:
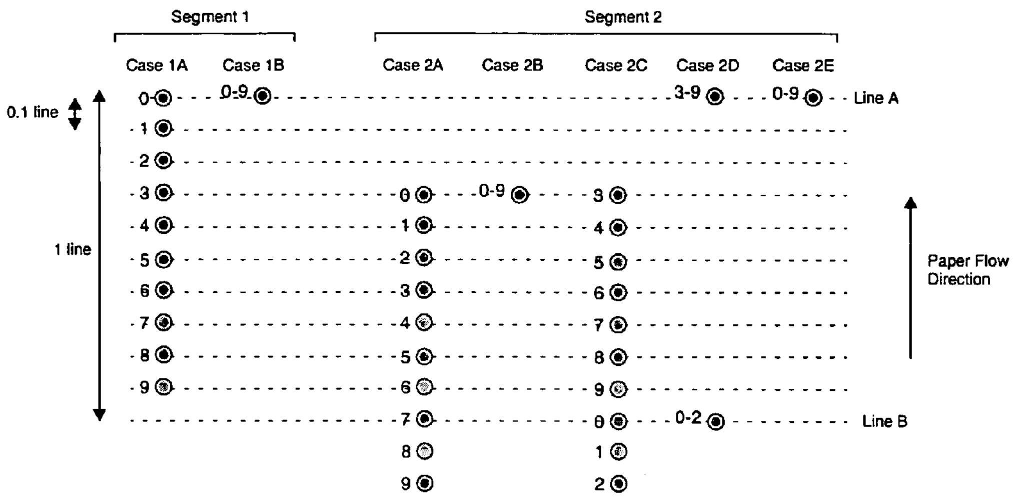
Figure 280:
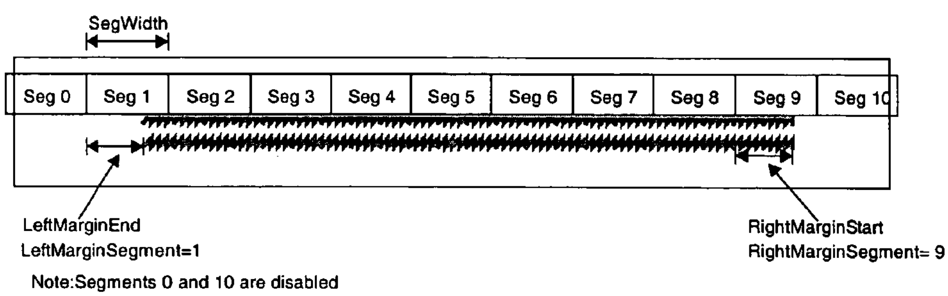

FIG. 279 shows conceptual example cases to illustrate the sub-line compensation problem.

Consider a printhead segment with 10 rows each spaced exactly 5 lines apart. The printhead segment takes 10 us to fire a complete line, 10 us per row. The paper is moving continuously while the segment is firing, so row 0 will fire on line A, row 1 will 10 us later on Line A+0.1 of a line, and so on until to row 9 which is fire 90 us later on line A+0.9 of a line (note this assumes the 5 line row spacing is already compensated for). The resultant dot spacing is shown in case 1A in FIG. 279.

If the printhead segment is constructed with a row spacing of 4.9 lines and the LLU compensates for a row spacing of 5 lines, case 1B will result with all nozzle rows firing exactly on top of each other. Row 0 will fire on line A, row 1 will fire 10 us later and the paper will have moved 0.1 line, but the row separation is 4.9 lines resulting in row 1 firing on line A exactly, (line A+4.9 lines physical row spacing−5 lines due to LLU row spacing compensation+0.1 lines due to 10 us firing delay=line A).

Consider segment 2 that is skewed relative to segment 1 by 0.3 of a line. A normal printhead segment without sub-line adjustment would print similar to case 2A. A printhead segment with sub-line compensation would print similar to case 2B, with dots from all nozzle rows landing on Line A+segment skew (in this case 0.3 of a line).

If the firing order of rows is adjusted, so instead of firing rows 0, 1, 2 . . . 9, the order is 3, 4, 5 . . . 8, 9, 0, 1, 2, and a printhead with no sub-line compensation is used a pattern similar to case 2C will result. A dot from nozzle row 3 will fire at line A+segment skew, row 4 at line A+segment skew+0.1 of a line etc. (note that the dots are now almost aligned with segment 1). If a printhead with sub-line compensation is used, a dot from nozzle row 3 will fire on line A, row 4 will fire on line A and so on to row 9, but rows 0, 1, 2 will fire on line B (as shown in case 2D).

The LLU is required to compensate for normal row spacing (in this case spacing of 5 lines), it needs to also compensate on a per row basis for a further line due to sub-line compensation adjustments in the printhead. In case 2D, the firing pattern and resulting dot locations for rows 0, 1, 2 means that these rows would need to be loaded with data from the following line of a page in order to be printing the correct dot data to the correct position. When the LLU adjustments are applied and a sub-line compensating printhead segment is used a dot pattern as shown in case 2E will result, compensating for the sub-line skew between segment 1 and 2.

The LLU is configured to adjust the line spacing on a per row per segment basis by programming the SegColorRowInc registers, one register per segment, and one bit per row.

The specific sub-line placement of each row, and subsequent standard firing order is dependant on the design of the printhead in question. However, for any such firing order, a different ordering can be constructed, like in the above sample, that results in sub-line correction. And while in the example above it is the first three rows which required adjustment it might equally be the last three or even three non-contiguous rows that require different data than normal when this facility is engaged. To support this flexibly the LLU needs to be able to specify for each segment a set of rows for which the data is loaded from one line further into the page than the default programming for that half-color.

33.6 Dot Margin

The LLU provides a mechanism for generating left and right margin dot data, for transmission to the printhead. In the margin areas the LLU will generate zero data and will not read data from DRAM for margin dots, saving some DRAM bandwidth.

The left margin is specified by the LeftMarginEnd and LeftMarginSegment registers. The LeftMarginEnd specifies the dot position that the left margin ends, and the LeftMarginSegment register specifies which segment the margin ends in. The LeftMarginEnd allows a value up the segment size, but larger margins can be specified by selecting further in segments in the printhead, and disabling interim segments.

The right margin is specified by the RightMarginStart and RightMarginSegment registers. The RightMarginStart specifies the dot position that the right margin starts, and the RightMarginSegment register specifies which segment the margin start in.

33.7 Dot Generate and Transmit Order

The LLU contains 6 dot generators, each of which generate data in a fixed but configurable order for easy transmission to the printhead. Each dot generator can produce data for 0, 1 or 2 printhead segments, and is required to produce dots at a rate of 2 dots per cycle. The number of printhead segments is configured by the SegConfig register. The SegConfig register is a map of active segments. The dot generators will produce zero data for inactive segments and dot data for active segments. Register 0, bits 5:0 of SegConfig specifies group 0 active segments, and register 1 bits 5:0 specify group 1 active segments (in each case one bit per generator). The number of groups of segments is configured by the MaxSegment register.

Group 0 segments are defined as the group of segments that are supplied with data first from each generator (segments 0,2,4,6,8,10), and group 1 segments are supplied with data second from each generator (segments 1,3,5,7,9,11).

The 6 dot generators transfer data to the PHI together, therefore they must generate the same volume of data regardless of the number of segments each is driving. If a dot generator is configured to drive 1 segment then it must generate zero data for the remaining printhead segment.

If MaxSegment is set to 0 then all generators will generate data for one segment only, if it's set to 1 then all generators will produce data for 2 segments. The SegConfig register controls if the data produced is dot data or zero data.

For each segment that a generator is configured for, it will produce up to N half colors of data configured by the MaxColor register. The MaxColor register should be set to values less than 12 when GenerateOrder is set to 0 and less then 6 when GenerateOrder is 1.

For each color enabled the dot generators will transmit one half color of dot data (possibly even data) first in increasing order, and then one half color of dot data in increasing order (possibly odd data). The number of dots produced for each half color (i.e. an odd or even color) is configured by the SegWidth register.

The half color generation order is configured by the OddAligned and GenerateOrder registers. The GenerateOrder register effects all generators together, whereas the OddAligned register configures the generation order on a per segment basis. Table 206 shows the half color generation order and how it's effected by the configuration registers.

TABLE 206

Generator data order

| OddAligned | GenerateOrder | Data Order (half color number) |
|---|---|---|
| 0 | 0 | 0, 1, 2, 3, 4, 5, 6, 7, 8, 9, 10, 11 |
| 0 | 1 | 0, 2, 4, 6, 8, 10 |
| 1 | 0 | 1, 0, 3, 2, 5, 4, 7, 6, 9, 8, 11, 10 |
| 1 | 1 | 1, 3, 5, 7, 9, 11 |

Figure 281:
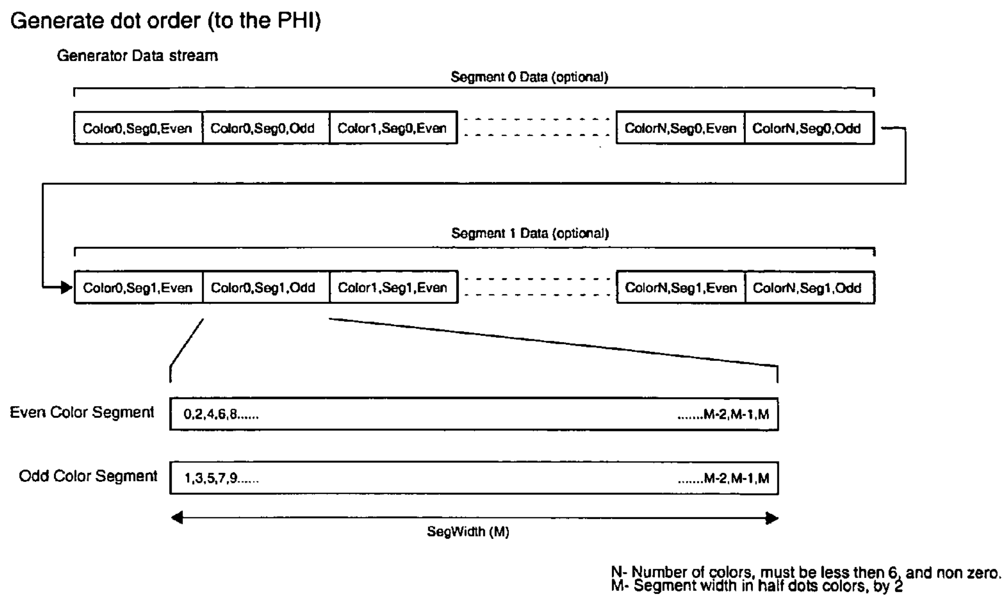
Figure 282:
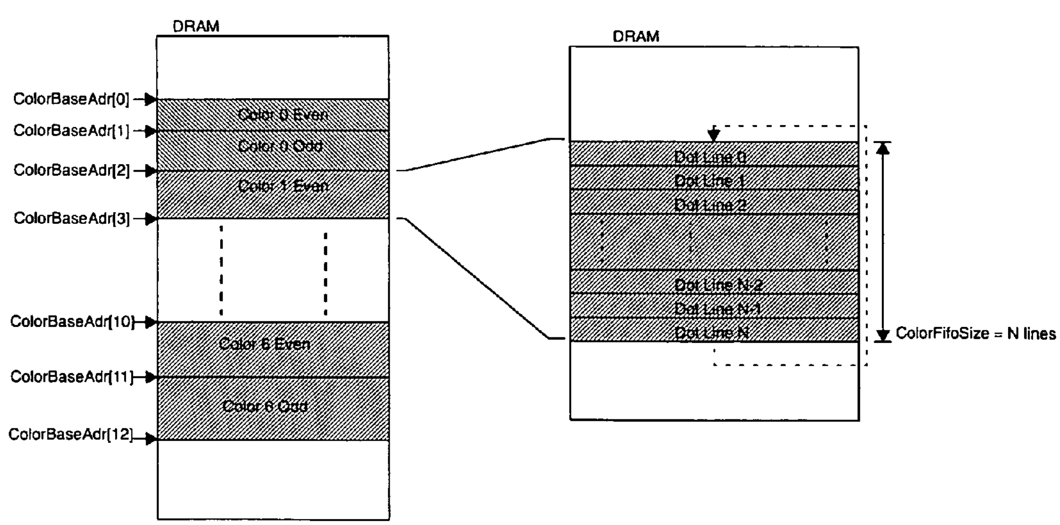
Figure 283:
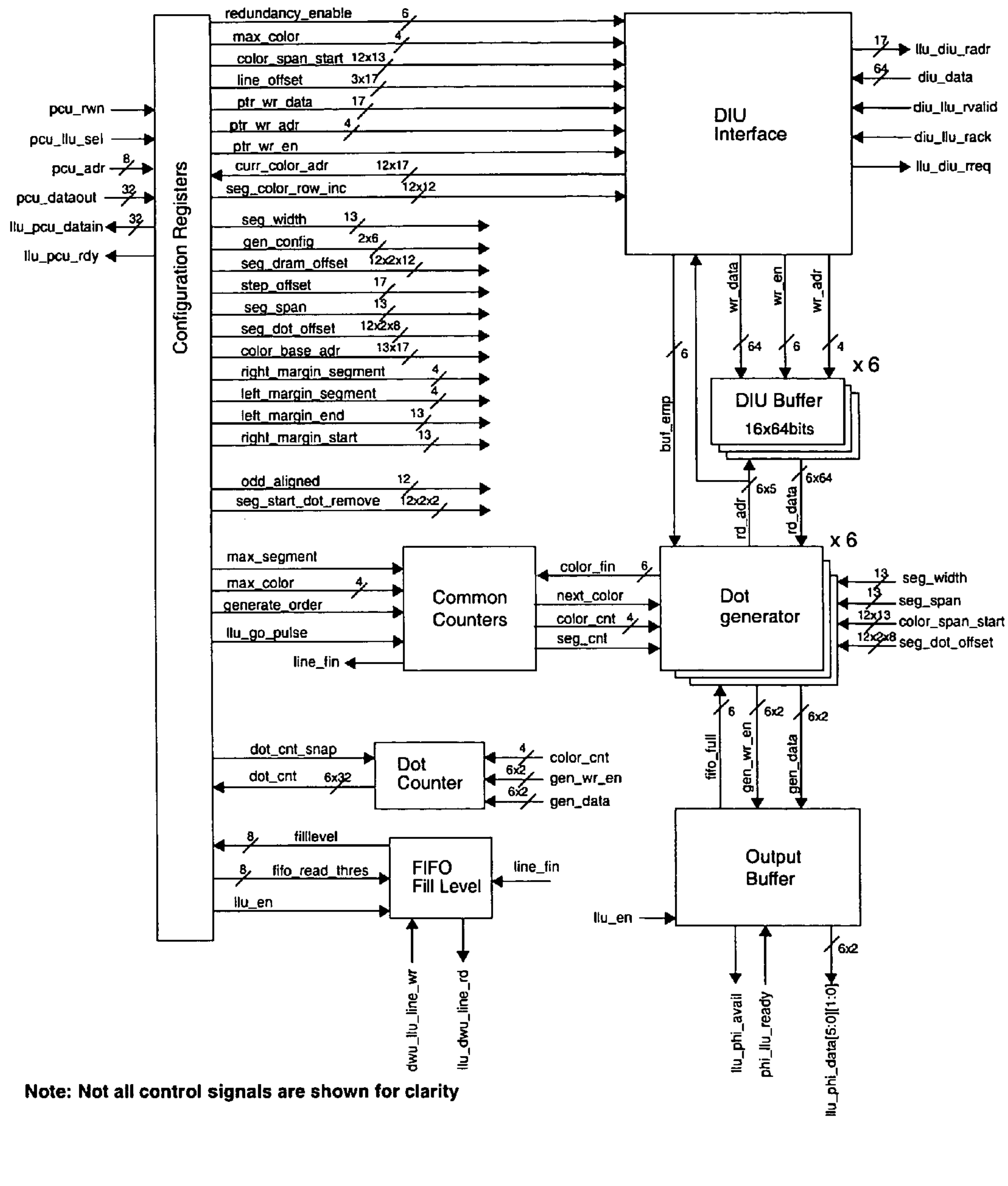
Figure 286:
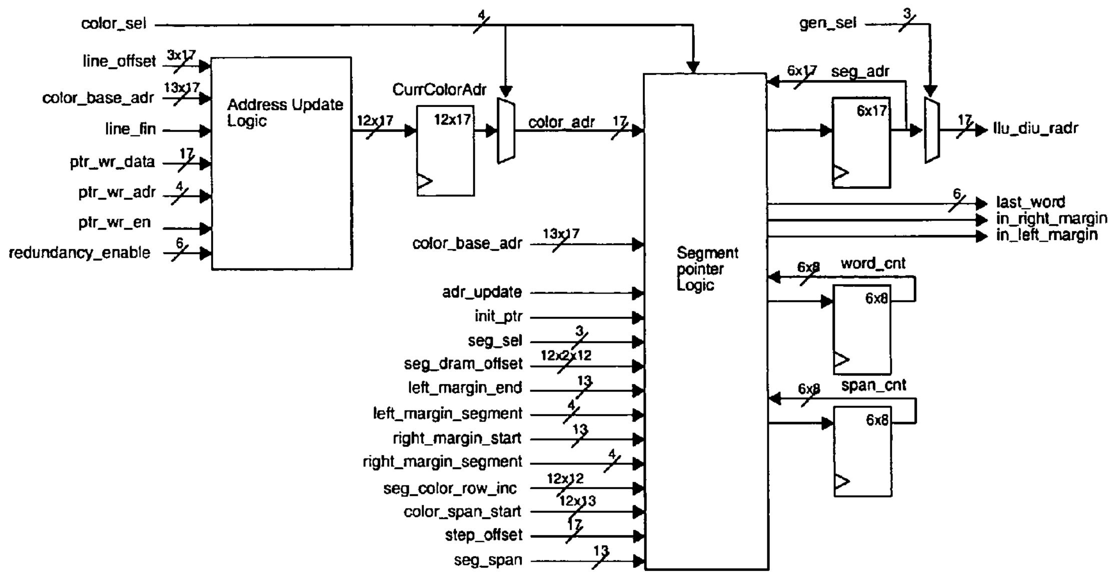
Figure 287:
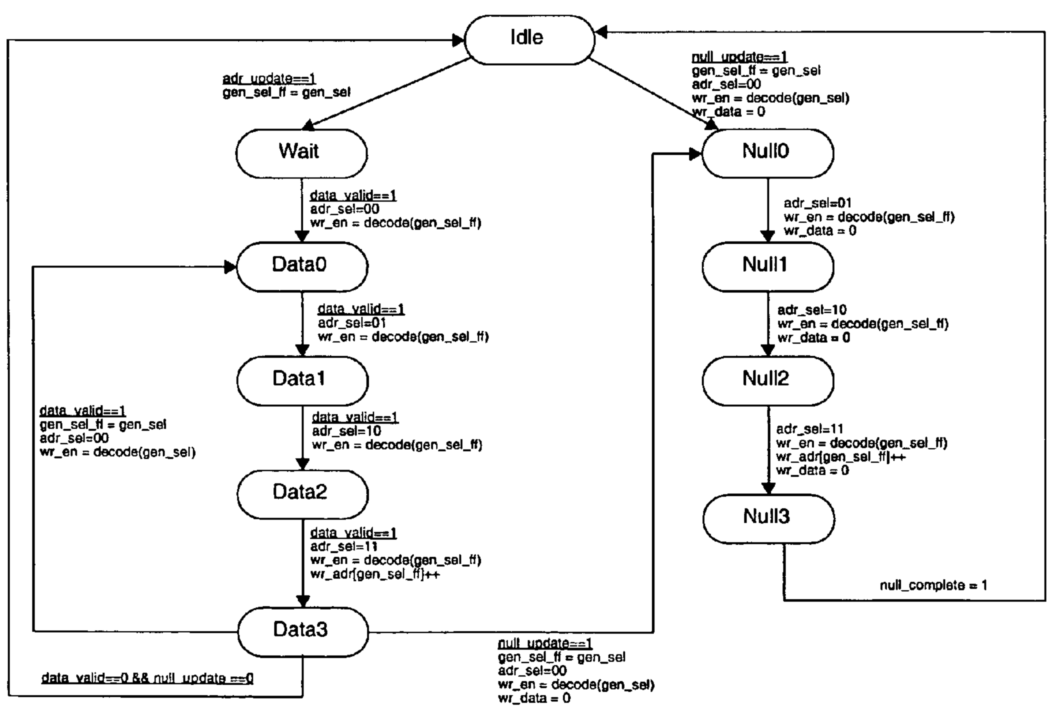
Figure 288:
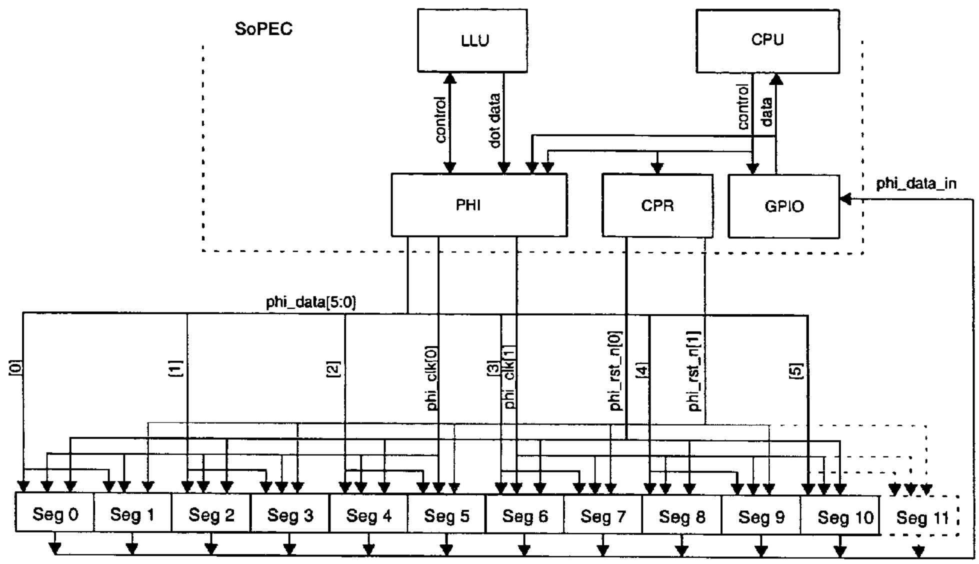
Figure 289:
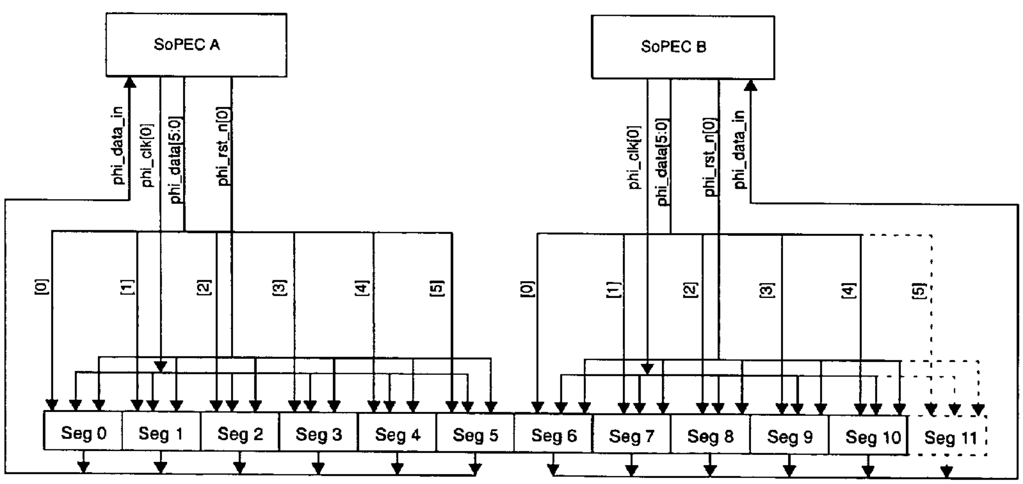

An example transmit order is shown in FIG. 281.

33.8 LLU Start-Up

At the start of a page the LLU must wait for the dot line store in DRAM to fill to a configured level (given by FifoReadThreshold) before starting to read dot data. Once the LLU starts processing dot data for a page it must continue until the end of a page, the DWU (and other PEP blocks in the pipeline) must ensure there is always data in the dot line store for the LLU to read, otherwise the LLU will stall, causing the PHI to stall and potentially generate a print error. The FifoReadThreshold should be chosen to allow for data rate mismatches between the DWU write side and the LLU read side of the dot line FIFO. The LLU will not generate any dot data until the FifoReadThreshold level in the dot line FIFO is reached.

Once the FifoReadThreshold is reached the LLU begins page processing, the FifoReadThreshold is ignored from then on.

33.8.1 Dot Line FIFO Initialization

For each dot line FIFO there are conceptually 12 pointers (one per segment) reading from it, each skewed by a number of dot lines in relation to the other (the skew amount could be positive or negative). Determining the exact number of valid lines in the dot line store is complicated by having several pointers reading from different positions in the FIFO. It is convenient to remove the problem by pre-zeroing the dot line FIFOs effectively removing the need to determine exact data validity. The dot FIFOs can be initialized in a number of ways, including the CPU writing 0s, the LBD/SFU writing a set of 0 lines (16 bits per cycle), the HCU/DNC/DWU being programmed to produce 0 data 33.9 LLU Bandwidth Requirements The LLU is required to generate data for feeding to the printhead interface, the rate required is dependent on the printhead construction and on the line rate configured. Each dot generator in the LLU can generate dots at a rate of 2 bits per cycle, this gives a maximum of 12 bits per cycle (for 6 dot generators). The SoPEC data generation pipeline (including the DWU) maintains a data rate of 6 bits per cycle.

The PHI can transfer data to each printhead segment at maximum raw rate of 288 Mb/s, but allowing for line sync and control word overhead of 2%, and 8b10b encoding, the effective bandwidth is 225 Mb/s or 1.17 bits per pclk cycle per generator. So a 2 dots per cycle generation rate easily meets the LLU to PHI bandwidth requirements.

To keep the PHI fully supplied with data the LLU would need to produce 1.17×6=7.02 bits per cycle. This assumes that there are 12 segments connected to the PHI. The maximum number of segments the PHI will have connected is 11, so the LLU needs to produce data at the rate of 11/12 of 7.02 or approx 6.43 bits per cycle. This is slightly greater than the front end pipeline rate of 6 bits per cycle.

The printhead construction can introduce a gentle slope (or line discontinuities) that is not perfectly 256 bit aligned (the size of a DRAM word), this can cause the LLU to retrieve 256 bits of data from DRAM but only use a small amount of it, the remainder resulting in wasted DRAM bandwidth. The DIU bandwidth allocation to the LLU will need to be increased to compensate for this wasted bandwidth.

For example if the LLU only uses on average 128 bits out of every 256 bits retrieved from the DRAM, the LLU bandwidth allocation in the DIU will need to be increased to 2×6.43=12.86 bits per cycle.

It is possible in certain localized cases the LLU will use only 1 bit out of some DRAM words, but this would be local peak, rather than an average. As a result the LLU has quad buffers to average out local peak bandwidth requirements.

Note that while the LLU and PHI could produce data at greater than 6 bits per cycle rate, the DWU can only produce data at 6 bits per cycle rate, therefore a single SoPEC will only be able to sustain an average of 6 bits per cycle over the page print duration (unless there are significant margins for the page). If there are significant margins the LLU can operate at a higher rate than the DWU on average, as the margin data is generated by the LLU and not written by the DWU.

33.10 Specifying Dot FIFOs

The start address for each half color N is specified by the ColorBaseAdr[N] registers and the end address (actually the end address plus 1) is specified by the ColorBaseAdr[N+1]. Note there are 12 colors in total, 0 to 11, the ColorBaseAdr [12] register specifies the end of the color 11 dot FIFO and not the start of a new dot FIFO. As a result the dot FIFOs must be specified contiguously and increasing in DRAM.

33.11 Dot Counter

The LLU keeps a dot usage count for each of the color planes (called AccumDotCount). If a dot is used in a particular color plane the corresponding counter is incremented. Each counter is 32 bits wide and saturates if not reset. A write to the InkDotCountSnap register causes the AccumDotCount[N] values to be transferred to the InkDotCount[N] registers (where N is 5 to 0, one per color). The AccumDotCount registers are cleared on value transfer.

The InkDotCount[N] registers can be written to or read from by the CPU at any time. On reset the counters are reset to zero.

The dot counter only counts dots that are passed from the LLU through the PHI to the printhead. Any dots generated by direct CPU control of the PHI pins will not be counted.

33.12 Implementation 33.12.2 Definitions of I/O

TABLE 207

LLU I/O definition

| Port name | Pins | I/O | Description |
|---|---|---|---|
| | | | Clocks and Resets |
| pclk | 1 | In | System clock. |
| prst_n | 1 | In | System reset, synchronous active low. |
| | | | PHI Interface |
| llu_phi_data[5:0][1:0] | 6x2 | Out | Dot Data from LLU to the PHI, each 2-bit data stream is output to its corresponding printhead connection.<br>Data is active when llu_phi_avail is 1. |
| phi_llu_ready | 1 | In | Indicates that PHI is ready to accept data from the LLU. |
| llu_phi_avail | 1 | Out | Indicates valid data present on all llu_phi_data buses. |
| | | | DIU Interface |
| llu_diu_rreq | 1 | Out | LLU requests DRAM read. A read request must be accompanied by a valid read address. |
| llu_diu_radr[21:5] | 17 | Out | Read address to DIU<br>17 bits wide (256-bit aligned word). |
| diu_llu_rack | 1 | In | Acknowledge from DIU that read request has been accepted and new read address can be placed on llu_diu_radr. |
| diu_data[63:0] | 64 | In | Data from DIU to LLU. Each access is 256-bits received over 4 clock cycles<br>First 64-bits is bits 63:0 of 256 bit word<br>Second 64-bits is bits 127:64 of 256 bit word<br>Third 64-bits is bits 191:128 of 256 bit word<br>Fourth 64-bits is bits 255:192 of 256 bit word |
| diu_llu_rvalid | 1 | In | Signal from DIU telling LLU that valid read data is on the diu_data bus. |

TABLE 207-continued

| LLU I/O definition | | | |
|---|---|---|---|
| Port name | Pins | I/O | Description |
| | | | DWU Interface |
| dwu_llu_line_wr | 1 | In | DWU line write. Indicates that the DWU has completed a full line write. Active high. |
| llu_dwu_line_rd | 1 | Out | LLU line read. Indicates that the LLU has completed a line read. Active high. |
| | | | PCU Interface |
| pcu_llu_sel | 1 | In | Block select from the PCU. When pcu_llu_sel is high both pcu_adr and pcu_dataout are valid. |
| pcu_rwn | 1 | In | Common read/not-write signal from the PCU. |
| pcu_adr[9:2] | 8 | In | PCU address bus. Only 8 bits are required to decode the address space for this block. |
| pcu_dataout[31:0] | 32 | In | Shared write data bus from the PCU. |
| llu_pcu_rdy | 1 | Out | Ready signal to the PCU. When llu_pcu_rdy is high it indicates the last cycle of the access. For a write cycle this means pcu_dataout has been registered by the block and for a read cycle this means the data on llu_pcu_datain is valid. |
| llu_pcu_datain[31:0] | 32 | Out | Read data bus to the PCU. |

33.12.3 Configuration Registers

The configuration registers in the LLU are programmed via the PCU interface. Refer to section 23.8.2 on page 439 for a description of the protocol and timing diagrams for reading and writing registers in the LLU. Note that since addresses in SoPEC are byte aligned and the PCU only supports 32-bit register reads and writes, the lower 2 bits of the PCU address bus are not required to decode the address space for the LLU. When reading a register that is less than 32 bits wide zeros are returned on the upper unused bit(s) of llu_pcu_datain. Table 208 lists the configuration registers in the LLU.

TABLE 208

| LLU registers description | | | | |
|---|---|---|---|---|
| Address LLU_base+ | Register | #bits | Reset | Description |
| | | Control Registers | | |
| 0x000 | Reset | 1 | 0x1 | Active low synchronous reset, self de-activating. A write to this register will cause a LLU block reset. |
| 0x004 | Go | 1 | 0x0 | Active high bit indicating the LLU is programmed and ready to use. A low to high transition will cause LLU block internal states to reset. |
| | | Configuration | | |
| 0x010-0x040 | ColorBaseAdr[12:0][21:5] | 13x17 | 0x00000 | Specifies the base address (in words) in memory where data from a particular half color (N) will be placed. Also specifies the end address + 1 (256-bit words) in memory where FIFO data for a particular half color ends. For color N the start address is ColorBaseAdr[N] and the end address + 1 is ColorBaseAdr[N+ 1] |
| 0x044 | MaxColor | 4 | 0xB | Indicates the number of half colors + 1 per segment to produce data for, must be less than 12. e.g. for printheads with 10 half colors set to 9. |
| 0x048 | MaxSegment | 1 | 0x0 | Indicates the number of segment groups that the LLU is required to generate data for. 0 - Generate data for 1 group of segments 1 - Generate data for 2 groups of segments |
| 0x050-0x054 | SegConfig[1:0] | 2x6 | 0x00 | Specifies the active segments for each generator. One register per segment group, one bit per segment. 0 - Segment inactive, generate null data |

TABLE 208-continued

LLU registers description

| Address LLU_base+ | Register | #bits | Reset | Description |
|---|---|---|---|---|
| | | | | 1 - Segment active, generate data<br>Register 0 indicates the first group of segments transmitted from each generator (group 0), register 1 indicates the second group of segments transmitted from each generator (group 1). |
| 0x058 | GenerateOrder | 1 | 0x0 | Specifies the data order that all generators should produce.<br>0 - Alternating odd/even data<br>1 - Odd or even data only |
| 0x060-0x08C | ColorSpanStart[11:0] | 12x13 | 0x000 | Specifies the slope counter start value. One register per color, must be programmed to less than SegSpan. |
| 0x090 | StepOffset | 17 | 0x000 | StepOffset: Specifies the number of DRAM words to jump when a step offset occurs. |
| 0x094 | SegSpan | 13 | 0x000 | Specifies the number of half color dots to traverse before adjusting a particular DRAM address pointer by StepOffset. |
| 0x0A0-0x0CC | SegColorRowInc[11:0] | 12x12 | 0x000 | Specifies if the starting DRAM address of a nozzle row in a segment should be adjusted by adding LineOffset[0]. One register per segment, and one bit per color nozzle row.<br>0 - DRAM address is not adjusted<br>1 - DRAM address is adjusted by adding LineOffset[0] |
| 0x100-0x15c | SegDRAMOffset[11:0][1:0] | 12x2x12 | 0x00 | Specifies the number of DRAM words that a segment is offset from the dot line start DRAM word.<br>12 groups of registers, one group per segment. Each group contains 2 registers, register 0 for even nozzle rows, register 1 for odd nozzle rows. |
| 0x160-0x1Bc | SegDotOffset[11:0][1:0] | 12x2x8 | 0x00 | Specifies the start dot index within the first DRAM word of a color per segment.<br>12 groups of registers, one group per segment. Each group contains 2 registers, register 0 for even nozzle rows, register 1 for odd nozzle rows. |
| 0x200-0x25C | SegStartDotRemove[11:0][1:0] | 12x2x2 | 0x0 | Specifies the number of dots to remove at the start of a segment row.<br>12 groups of registers, one group per segment. Each group contains 2 registers, register 0 for even nozzle rows, register 1 for odd nozzle rows. |
| 0x260 | OddAligned | 12 | 0x000 | Specifies if the printhead segment is aligned correctly. One bit per segment.<br>0 - Odd dot data into odd nozzle rows<br>1 - Odd dot data into even nozzle rows<br>Note the generate order is affected by the odd alignment. Bits 5:0 control group 0 segments, bits 11:6 control group 1 segments. |
| 0x264 | LeftMarginEnd | 14 | 0x0 | Specifies the left margin end dot position. |
| 0x268 | LeftMarginSegment | 4 | 0x0 | Left margin segment. Specifies the printhead segment the left margin ends in. |
| 0x26C | RightMarginStart | 14 | 0x0 | Specifies the right margin start dot position. |
| 0x270 | RightMarginSegment | 4 | 0x0 | Right margin segment. Specifies the printhead segment the right margin starts in. |
| 0x274 | SegWidth[12:3] | 10 | 0x000 | Specifies the number of half color dots per printhead segment (must be set to a multiple of 8). |
| 0x280-0x2DC | CurrColorAdr[11:0][21:5] | 12x17 | 0x00000 | Current working address associated with each color.<br>(Working Register) |
| 0x2E0 | LineOffset[2:0] | 3x17 | 0x00000 | Specifies the address offset for the ColorBaseAdr per line. The RedundancyEnable specifies which registers are used per color. |

TABLE 208-continued

LLU registers description

| Address LLU_base+ | Register | #bits | Reset | Description |
|---|---|---|---|---|
| | | | | Specified in DRAM words. Reg 0 - Used when color redundancy is disabled Reg1, 2 - Used when color redundancy is enabled |
| 0x2E4 | RedundancyEnable | 6 | 0x00 | Redundancy enable. One bit per color. When 0 LineOffset[0] is used to determine the next line address. When 1 LineOffset[1:0] are used to determine the next alternating line address. For example LineOffset[0] is used of even lines and LineOffset[1] is used for odd lines. |
| 0x300-0x314 | InkDotCount[5:0] | 6x32 | 0x0000_0000 | Indicates the number of Dots used for a particular color, where N specifies a color from 0 to 5. Value valid after a write access to InkDotCountSnap |
| 0x320 | InkDotCountSnap | 1 | 0x0 | Write access causes the AccumDotCount values to be transferred to the InkDotCount registers. The AccumDotCount are reset afterwards. (Reads as zero) |
| 0x324 | FifoReadThreshold | 8 | 0x00 | Specifies the number of lines that should be in the FIFO before the LLU starts reading. |
| | | Debug Registers | | |
| 0x328 | FifoFillLevel | 8 | 0x00 | Number of lines in the dot line FIFO, lines written in but not read out. (Read Only) |
| 0x340-0x354 | AccumDotCount[5:0] | 6x32 | 0x00000000 | Current running count of ink dots used. One register per color. (Read Only) |

A low to high transition of the Go register causes the internal states of the LLU to be reset. All configuration registers will remain the same. The block indicates the transition to other blocks via the llu_go_pulse signal.

33.12.4 Common Counter

The dot generation logic consists of 2 parts, a common counter block and 6 individual dot generators. The dot generators read data for the same color and same segment from each buffer together, and determine when to supply a dot collectively. This logic is implemented in the common counters area.

The common counter block maintains a color count (color_cnt) and a segment group count (seg_cnt) that are used by each of the dot generators to determine the data generation order. Each dot generator operates independently when producing data for a particular color nozzle row. When a dot generator has completed a color nozzle row it signals to the common block the row is complete (color_fin) and waits for the common block to determine that all dot generators have completed a color row. Once all are complete the common block updates the color and segment counters and signals to the dot generator to start the next row (next_color). This is repeated until data for all color rows and segments have been generated.

The common counter block passes the segment count (seg_cnt) to each dot generator to allow the dot generator to calculate which segment number they are processing data for. It also determines when the line is complete (line_fin) and signals to the FIFO fill level block to increment the line level (which in turn is used to signal the DWU that a complete line was read from the DIU buffers).

The generate_order value is also used within the dot generators to determine the data generation order.

```
// general decode
// trigger the next color when all are finished
next_color      = (color_fin[5:0] == 0x3F)
seg_fin         = next_color AND (color_cnt == max_color)
line_fin        = seg_fin  AND  (seg_cnt == max_segment)
// advance all the counters for each new 2 dots
if (llu_go_pulse == 1) then
                color_cnt       = 0
                seg_cnt         = 0
elsif (line_fin == 1) then
                color_cnt       = 0
                seg_cnt         = 0
elsif (seg_fin == 1) then
                color_cnt       = 0
                seg_cnt         ++
elsif (next_color == 1) then
                color_cnt = color_cnt + 1
```

The common counter block also passes the color count value to the Dot Counter block to allow the dot counter to correctly count active dots for each color plane.

33.12.5 Dot Generator

In the LLU there are 6 instances of the dot generator, each independently reading data from the DIU buffer for transfer out on a single data channel in the PHI. The dot generator determines the dot generation order, a dots position in a line and in left and right margins.

The dot generator determines when data can be read from a DIU buffer and written to the output buffer for sending to the PHI. It waits for the llu_en from the fifo fill level block, for data in the DIU buffers (buf_emp) and that the output buffer is not full data (fifo_full) before enabling a dot producing cycle (dot_active). The dot generator normally produces 2 dots per cycle, but under certain conditions only one dot may be produced in a cycle. The output buffer smooths the irregular dot production rates between dot generators.

Each dot generator maintains a dot count (dot_cnt), a slope counter (slope_cnt), an index (dot_index) and a read pointer (read_adr). The dot count is used to determine when a color nozzle row is complete and for comparison with the left and right margin configuration values to evaluate when a dot is in the margin area and should be zeroed out.

The dot index points to the current data bit within the current DIU buffer word (as selected by read pointer). It is used to determine when the read pointer should be incremented. The dot index is initialized to a seg_dot_offset register value at the start of each new nozzle row. The value used is dependant on the oddness of the nozzle row and the segment the dot generator is producing data for. The dot index is updated as each dot is produced, and is used to index into each 64-bit DIU buffer word to select data to write to the output buffer. When the index count is 0x3F, the counter wraps to 0 and causes a read pointer increment.

The read pointer indicates the DIU buffer word to read. The read pointer is normally incremented on an even dot boundary. If a condition happens to cause a read pointer increment on an odd dot boundary then the dot generator must write only one dot to the output buffer and wait until the next clock cycle to read the next dot from the new DIU buffer word (a stall condition). When this condition happens the dot generator only produces one dot per cycle (for the current and next cycle) as opposed to the normal 2 dots per cycle.

The slope counter tracks the position of nozzle row discontinuities and determines when the dot generator should increment the DIU buffer read pointer to read the next 256 bit word from the buffer. The slope counter is initialized to a color_span_start[N] register value at the start of each new nozzle row N. The value chosen is dependant on the current color row that data is being generated for. The slope counter is incremented as each dot is processed, and when equal to the seg_span the read pointer is incremented and the slope counter is reset to 0.

The dot generator compares the dot count with the configured left and right margin values and calculates when a generator is processing data for a segment within the margin areas. When in the margin areas it clears the dot data before writing to the output buffer. A similar mechanism is used to remove segment starting dots.

```
// segment number, derived from segment count
seg_sel          = DOT_GENERATOR_INDEX + (seg_cnt * 2)          // segment number
right_margin_en  = (seg_sel == right_margin_segment)            // select margin segment
left_margin_en   = (seg_sel == left_margin_segment)
dot_active       = llu_en AND NOT(fifo_full) AND NOT(buf_emp)   // dot generator advance
color_fin        = (dot_cnt == seg_width)                       // color is finished
// advance all the counters each cycle
if (llu_go_pulse == 1) then
          slope_cnt    = color_span_start[color_sel]
          dot_index    = seg_dot_offset[seg_sel][odd_sel]
          read_adr     = 0
          stall        = 0
elsif (dot_active == 1) then
        // pointer updates
        if (next_color == 1) then
          slope_cnt    = color_span_start[color_sel]
          read_adr      ++
          dot_index    = seg_dot_offset[seg_sel][odd_sel]
          dot_cnt      = 0
          stall        = 0
        else
          for (n=stall; n<2; n ++) {                          // loop per dot
            stall = 0                                         // clear the stall flag
            if (color_fin == 0) then                          // regular dot increase)
              if ((slope_cnt == seg_span)then
                slope_cnt = 0
                if (dot_index == 0xff AND read_adr[1:0] = 11) then
                  read_adr     = read_adr + 1                 // 64bit word inc(also new
256bit word)
                  stall        = NOT(n)                       // only stall if processing
dot 0
                elsif(dot_index == 0xff) then
                  read_adr     = read_adr + 5                 // 256bit word and 64bit word
increment
                  stall        = NOT(n)                       // only stall if processing
dot 0
                else
                  read_adr     = read_adr + 4                 // 256bit word increment
                  stall        = NOT(n)                       // only stall if processing
dot 0
                dot_index ++
              else
                slope_cnt++
                // check the index
                if (dot_index == 0xff) then                   // wrap around condition
```

-continued

```
                    read_adr      ++
                    stall         = NOT(n)                  // only stall if processing
dot 0
                  dot_index    ++
                // always increment the dot count
                dot_cnt        ++
                gen_wr_en[n]   = 1                          // write enable
                // determine the data bit(s) to write to the output buffer
                if ((dot_cnt <= seg_start_dot_remove[seg_sel][odd_sel]) OR
                    (right_margin_en == 1 AND dot_cnt > right_margin_start) OR
                    (left_margin_en == 1 AND dot_cnt < left_margin_end)) then
                  gen_wr_data[n] = 0
                else
                  gen_wr_data[n] = rd_data[dot_index]
                }
```

The dot generator also determines the data generation order based on the OddAligned and GenerateOrder configuration registers.

When the generate_order bit is 0, each dot generator produces MaxColor nozzle rows of data (value must be less than 12). The dot generator can produce either odd followed by even data or vice versa. The odd_aligned bit for the current segment configures the order.

When the generate_order bit is 1, each dot generator produces MaxColor (value must be less than 6) nozzle rows of data (value must be less than 6), either odd or even rows are produced as configured by the odd_aligned bit for the current segment the dot generator is producing data for.

```
// derive the color_sel from the color counter select
order_sel       = {generate_order,odd_aligned[seg_sel]}
case order_sel
              00: color_sel = color_cnt[3:0]
              01: color_sel = color_cnt[3:1],NOT(color_cnt[0])
              10: color_sel = color_cnt[2:0],0
              11: color_sel = color_cnt[2:0],1
endcase
// select between odd/even control
odd_sel = color_sel[0]
```

33.12.6 Output Buffer

The output buffer accepts data (either 1 or 2 bits per clock cycle) from each of the dot generators and aligns the data into 12-bit data words for transfer to the PHI. The dot generators don't produce dots at a constant rate, frequently the dot generator will produce only 1 dot per cycle depending on the offset values for the printhead segment it's driving. The output buffer smooths the different generation rates of the dot generators, to allow an almost constant transfer rate to the PHI.

The output buffer consists of 6 FIFOs each with 8 bits storage. There are 6 independent write pointers (wr_ptr) and one read pointer (rd_ptr). The read and write pointers are compared to determine if data is available for the transfer (fifo_empty) to the PHI and if there is room left in the FIFOs (fifo_full).

The write pointer is incremented every time a dot is written to the output buffer.

```
// update the write pointers and data
for(i=0; i<6; i++) {              // loop per generators
          for(n=0; n<2; n++){              // loop per write bit
```

-continued

```
              if (gen_wr_en[i][n] == 1) then
                fifo_data[i][wr_adr[i]] = gen_wr_data[n]
                wr_adr[i] ++
              }
            }
// calculate the fifo full/empty flags
for(i=0; i<6; i++) {              // loop per generators
            // fifo full (needs to allow for 2 dots each cycle)
            if (wr_adr[i][2:0] == rd_adr[2:0]) AND
            (wr_adr[i][3] != rd_adr[3]) then
              fifo_full[i] = 1
            else
              fifo_full[i] = 0
            // fifo empty
            if (wr_adr[i][3:0] == rd_adr[3:0])then
              fifo_empty[i] = 1
            else
              fifo_empty[i] = 0
            }
// implement the read side logic
if (llu_en == 1 AND fifo_empty[5:0] == 0x00 AND
phi_llu_rdy == 1) then
            llu_phi_avail = 1
            llu_phi_data[5:0][1:0] = fifo_data[5:0][rd_adr+1:rd_adr]
            rd_adr = rd_adr + 2
```

33.12.7 Fifo Fill Level

The LLU keeps a running total of the number of lines in the dot line store FIFO. Every time the DWU signals a line end (dwu_llu_line_wr active pulse) it increments the filllevel. Conversely if the LLU detects a line end (line_fin pulse) the filllevel is decremented and the line read is signalled to the DWU via the llu_dwu_line_rd signal.

The LLU fill level block is used to determine when the dot line has enough data stored before the LLU should begin to start reading. The LLU at page start is disabled. It waits for the DWU to write lines to the dot line FIFO, and for the fill level to increase. The LLU remains disabled until the fill level has reached the programmed threshold (fifo_read_thres). When the threshold is reached it signals the LLU to start processing the page by setting llu_en high. Once the LLU has started processing dot data for a page it will not stop if the filllevel falls below the threshold, but will stall if filllevel falls to zero.

The line FIFO fill level can be read by the CPU via the PCU at any time by accessing the FifoFillLevel register. The CPU must toggle the Go register in the LLU for the block to be correctly initialized at page start and the FIFO level reset to zero.

```
if (llu_go_pulse == 1) then
        filllevel = 0
elsif ((line_fin == 1) AND (dwu_llu_line_wr == 1)) then
        // do nothing
elsif (line_fin == 1) then
        filllevel --
elsif (dwu_llu_line_wr == 1) then
        filllevel ++
// determine the threshold, and set the LLU going
if (llu_go_pulse == 1)
        llu_en_ff = 0
elsif (filllevel == fifo_read_threshold) then
        llu_en_ff = 1
// filter the enable base do the fill level
llu_en = llu_en_ff AND NOT (filllevel == 0)
```

33.12.8 DIU Interface

The DIU interface block is responsible for determining when dot data needs to be read from DRAM. It keeps the dot generators supplied with data and calculates the DRAM read address based on configured parameters, FIFO fill levels and position in a line.

The fill level block enables DIU requests by activating the llu_en signal. The DIU interface controller then issues requests to the DIU for the LLU buffers to be filled with dot line data (or fill the LLU buffers with null data without requesting DRAM access, if required).

The DIU interface determines which buffers should be filled with null data and which should request DRAM access. New requests are issued until the dot line is completely read from DRAM, at this point it re-initializes the address pointers and counters, and starts processing the next line. The DIU interface once enabled always tries to keep the DIU buffers full.

For each request to the DRAM the address generator calculates where in the DRAM the dot data should be read from. The MaxColor register determines how many half colors are enabled, and the SegConfig register indicates if a segment is enabled, the interface never issues DRAM requests for disabled colors or segments.

33.12.8.1 Interface Controller

The interface controller co-ordinates and issues requests for data transfers, either from DRAM or null data transfers. It maintains 2 counters, the color count (color_cnt) to keep track of the current half color being operated on and the segment pass count (seg_cnt), to indicate if each generator is transmitting to the first or second group of segments connected to that generator. The state machine operates on a per line basis and once enabled it transfers data for MaxColor number of half colors, and MaxSegment number of segments. If a generator is configured for less than MaxSegment number of segments then null data is generated to fill the buffer. Note that when null data is generated the address pointers are updated the same, even though data isn't being read from DRAM.

The state machine waits in the Idle state until it is enabled by the LLU controller (llu_en). On transition to the GenSelect state it clears all counters and initializes the pointers in the address generator via the init_ptr signal. In the GenState it tests if a buffer is full and if data is required for each generator. It selects the generator to service and then decides if a null or real data transfer is required (based on the SegConfig setting or if the segment is in the left or right margin area). If the request is null it transitions to the NullRequest state pulsing the null_update signal indicating to the pointer logic to generate a null data transfer. It waits in the NullRequest state for the write pointer block to complete the writing of null data into the buffer and once complete it pulses the null_complete signal indicating the transfer is complete and the interface controller can continue.

If the request is a real data transfer, it transitions to the Request state, issues a request to the DIU and waits for an acknowledge back from the DIU.

```
GEN_SELECT:
for(i=0; i< 6; i++) {
   // determine the next generator to get data for
   index = (last_win + i) mod 6
   // check the buffer, its configuration, and if it's the last word
   if (buf_full[index] == 0 AND last_word[index] == 0)
      gen_sel = index
      last_win = index
   }
 // picked the generator winner, determine if null transfer needed
 if(seg_config[seg_cnt][gen_sel]==0 OR in_right_margin==1 OR
in_left_margin==1)then
   NULL_REQUEST      // issue a null request
 else
   REQUEST           // do a regular request
```

When an acknowledge (or null complete) is received the state machine goes to the CntUpdate state to update the internal counters and signal to the address generator to update its address pointers. The CntUpdate state checks the last_word signals from the address generator to determine if all words for all enabled generators have been read from DRAM, and if so it re-initializes the pointers in the address generator to the start of the next color. If all generators are on their last word and the color_cnt is equal to max_color, and segment counter is at the maximum the state machine jumps to the Idle state triggering the line update to the current color pointers in the address generator (via the line_fin signal).

```
CNT_UPDATE:
// compare all active generators, all colors complete
if (last_word == 0x3F) then {
  color_fin= 1
  init_ptr = 1                              // re -initialize the pointers
  next_state = GEN_SELECT
  if (color_cnt == max_color) then
    color_cnt = 0
    if (seg_cnt == max_segment) then     // line is finished
      seg_cnt     = 0
      line_fin    = 1
      next_state  = IDLE
    else
      seg_cnt ++
  else
    // increment the color count
    color_cnt = color_cnt + 1
  }
else
  color_fin= 0
```

In addition to the basic state machine functionality the interface controller also contains logic to select the correct segment and color configuration registers.

```
// segment select, derived from generator select
if (seg_cnt == 0) then
    seg_sel = gen_sel * 2
else
    seg_sel = (gen_sel * 2) + 1
// derive the color_sel from the color counter select, and generate order
order_sel     = {generate_order,odd_aligned[seg_sel]}
case order_sel
    00: color_sel = color_cnt[3:0]
    01: color_sel = color_cnt[3:1],NOT(color_cnt[0])
    10: color_sel = color_cnt[2:0],0
    11: color_sel = color_cnt[2:0],1
endcase
```

33.12.8.2 Address Generator

The address generator logic determines the correct read address to read data from DRAM for the LLU. The address generator takes into account the segment size, segment slope and segment offset to determine the correct stream of DRAM words to be written into the buffers to allow the dot generators to create the correct dot stream to the PHI.

Address Update Logic

When a complete line of data has been read from DRAM and placed into the buffers the interface controller will signal to the address generator (via the line_fin signal) to update the CurrColorAdr pointers. The CurrColorAdr pointers indicate the start address of each half color in the dot store. The CurrColorAdr pointers can be written to by the CPU, and are programmed with the relative line offsets (converted into DRAM addresses) of each half color at startup.

When a line is completed the LLU address pointers are updated by an offset amount. The offset amount depends on the LineOffset[2:0] registers and the RedundancyEnable register. The LLU checks the RedundancyEnable for each color, and then selects the LineOffset value. If redundancy is not enabled the offset for that color will be LineOffset[0]. If redundancy is enabled then the offset will be either LineOffset[2] (even lines) or LineOffset[1] (odd lines) depending on the state of the line_ptr. The line_ptr selects between alternating offsets for redundancy enabled colors.

For each new line, the address generator updates the odd/even line offset select (line_ptr) and then updates the CurrColorAdr pointers, one per clock cycle. Each time it updates a pointer it checks the defined FIFO boundaries for that half color (ColorBaseAdr) and performs wrapping if needed.

```
if (line_fin == 1) then
  // toggle the line offset select
  line_ptr = NOT(line_ptr)
  // start address update process (12 cycles)
  for (i=0;i<12;i++) {
    // select what to update with
    if (redundancy_enable[i/2] == 1) then
      if (line_ptr == 1) then
        offset = line_offset[2]      // even lines
      else
        offset = line_offset[1]      // odd lines
    else
      offset = line_offset[0]
    // assign temporary variables
    next_adr    = curr_color_adr[i] + offset
    start_adr   = color_base_adr[i]
    end_adr     = color_base_adr[i+1]
    // check the wrapping
    if (next_adr > start_adr) then // wrap case
```

-continued

```
      curr_color_adr[i] = next_adr - start_adr
    else
      curr_color_adr[i] = next_adr
    }
  }
```

Segment Pointer Logic

In order to determine the correct address to read from DRAM the address generator maintains a segment span counter, a segment address and a word counter for each dot generator. The word counter (word_cnt) counts the number of DRAM words received per half color, and is an indication of the dot position rounded to the nearest DRAM word boundary. It is compared with SegWidth, RightMarginStart and LeftMarginEnd to determine the last word of a color, the right margin and the left margin boundaries respectively.

The span counter determines when the read address needs to be adjusted by the StepOffset to compensate for the segment slope. The segment address pointer maintains the current address in DRAM that the next access for that generator will read from.

The pointers are initialized before a group of DRAM words for one color is read from DRAM. The interface controller signals the initialization before any DRAM access, setting init_ptr signal high. The word count (word_cnt) for generator gen_sel is set to 0, the span counter (span_cnt) for generator gen_sel is set to Color SpanStart selected by the color select (color_sel). The address pointer (seg_adr) for generator seg_sel is initialized to the color base address pointer for color_sel plus the segment offset address SegDRAMOffset selected by the current segment being processed (seg_sel) plus LineOffset[0] if configured by the SegColorRowInc registers. The segment select (seg_sel), generator select (gen_sel) and color select (color_sel) have direct mapping to each other and are determined by the interface controller.

Each time the interface controller needs to read data from DRAM it uses the address first and then updates the pointer. It signals the pointer update by setting adr_update high and indicates the pointer to update with the gen_sel signal. Every time the interface controller signals an address update the word counter is incremented, and the span counter is updated and compared to determine if the address pointer needs to jump by the address offset amount.

There are 2 possible span offset cases. If the span counter is greater than or equal to the segment span (SegSpan) and not aligned on 256 bit boundary then the address pointer is incremented by the offset (StepOffset). If it is aligned and is equal to SegSpan then address pointer is incremented by the offset+1. The span counter is updated to the current value−SegSpan.

In all cases when the address pointers are being updated the new value is compared with the FIFO boundaries, and wraps to take the FIFO boundaries into account.

The pseudocode is as follows:

```
// calculate the span counter, determine what to do with adr pointer
span_tmp = span_cnt + 256
color_step_tmp = color_step[color_sel]
odd_sel = color_sel[0]         // indicates if we're calculating for an odd
or even row
if (init_ptr == 1)                    // start condition for
```

-continued

```
   span_cnt[gen_sel] = color_span_start[color_sel]
   // per color per segment adjust
   if (seg_color_row_inc[seg_sel][color_sel] == 1) then
      next_adr          = color_adr[color_sel] +
seg_dram_offset[seg_sel][odd_sel] + line_offset[0]
   else
      next_adr          = color_adr[color_sel] +
seg_dram_offset[seg_sel][odd_sel]
   word_cnt[gen_sel] = 0
elsif (adr_update == 1) then
   word_cnt[gen_sel] = word_cnt[gen_sel] + 1
   if (span_tmp == seq_span) AND (span_tmp[7:0] == 0) then  // span
offset jump + inc reqd
      span_cnt[gen_sel]    = 0
      next_adr             = seg_adr[gen_sel] + step_offset + 1
   elsif (span_tmp > seq_span)then                           // span
offset jump required
      span_cnt[gen_sel]    = span_tmp − seq_span
      next_adr             = seg_adr[gen_sel] + step_offset
   else
      span_cnt[gen_sel]    = span_tmp
      next_adr             = seg_adr[gen_sel] + 1
// perform FIFO boundary wrapping
start_adr = color_base_adr[color_sel]
end_adr = color_base_adr[color_sel + 1]
// check the wrapping
if (next_adr > start_adr) then // wrap case
   seg_adr[seg_sel] = next_adr − start_adr
else
   seg_adr[seg_sel] = next_adr
```

Output Decode Logic

The output decode logic indicates to the interface controller when a generator is creating dot data within the margin areas for a segment and that dot data for that nozzle row has completed.

```
odd_sel = color_sel[0]        // indicates if we're calculating for an
odd or even row
if (adr_update == 1) then
   // detect last word to tell state machine (depends on generator selected)
   dot_cnt = {(word_cnt[gen_sel] + 1),(256 −
seg_dot_offset[seg_sel][odd_sel][7:0])}
   if (dot_cnt > seg_width) then
      last_word = 1
   else
      last_word = 0
   // calculate the margin info (right)
   if (seg_sel == right_margin_segment) AND
   (dot_cnt > right_margin_start)
then
      in_right_margin = 1
   else
      in_right_margin = 0
   // calculate the margin info (left)
   if (seg_sel == left_margin_segment) AND
   (dot_cnt < left_margin_end) then
      in_left_margin = 1
   else
      in_left_margin = 0
```

33.12.8.3 Write Pointer

The write pointer logic maintains the buffer write address pointers, determines when the DIU buffers need a data transfer and signals when the DIU buffers are empty. The write pointers determine the address in the DIU buffers that the data should be transferred to.

The write pointer logic compares the read and write pointers of each DIU buffer to determine which buffers require data to be transferred from DRAM, which buffers are empty (the buf_emp signal) and which buffer are full (buf_full signals).

The write pointer logic performs 2 types of write, either a real data write or a null write. A null write fills the buffer with zero data and does not involve a DRAM access. The interface controller indicates a real write with the adr_update signal and a null write with the null_update signal.

In the case of a real write, the adr_update signal is pulsed and the state machine transitions from Idle to Wait state storing the gen_sel in gen_sel_ff. This allows the interface controller to begin requesting data for the next dot generator buffer before data for the current buffer has been received. When data arrives the state machine transitions through Data0, Data1, Data2 and to Data3 each time writing a 64-bit word into the buffer selected by gen_sel_ff.

It is possible (although unlikely) that back to back data transfers could be received from DRAM. If the state machine detects new data access as it is finishing the previous access it updates the gen_sel_ff register, transitions back to the Data0 state and continues as normal.

If the state machine receives a null_update signal from the interface controller it stores the selected generator as before and automatically writes 4 zero data words to the selected buffer.

The write address pointer logic consists of 6 3-bit counters and a data valid state machine. The counters are reset when llu_go_pulse is one.

The write pointers also calculate the buffer full and empty signals. The read and write pointers for each buffer are compared to determine the fill levels. The buffer empty is ORed together before passing to the dot generators.

```
// generate the read buffer full/empty logic
for (i=0 i< 6; i+=){
   // buffer empty
   if (read_adr[i] == wr_adr[i]) then
      buf_emp[i] = 1;
   else
      buf_emp[i] = 0;
   // buffer full
   if (read_adr[i][4]      != wr_adr[i][2]) AND (
 read_adr[i][3:2] == wr_adr[i][1:0])
      buf_full[i] = 1
   else
      buf_full[i] = 1
   }
```

The write address for each buffer is derived from the pointer for the buffer (wr_adr[gen_sel_ff]) and the adr_sel signal decoded from the state machine.

33.12.9 Dot Counter

The dot counter keeps a running count of the number of dots fired for each color plane. The counters are 32 bits wide and saturate. When the CPU wants to read the dot count for a particular color plane it must write to the InkDotCountSnap register. This causes all 6 running counter values to be transferred to the InkDotCount registers in the configuration registers block. The running counter values are then reset.

```
// reset if being snapped
if (ink_dot_count_snap == 1) then{
         ink_dot_count[5:0]      = accum_dot_count[5:0]
         accum_dot_count[5:0]    = 0
         }
```

-continued

```
// update the counts
if (llu_en == 1) then
        color = color_sel / 2        // half color to normal color
        for (x=0; x<6; x++) {
            for (y=0; y<1; y++) {
                // saturate the counter
                if (accum_dot_count[color] != 0xffff_ffff) AND
(llu_phi_data[x][y] == 1) then
                    accum_dot_count[color] ++
            }
        }
```

34 Printhead Interface (PHI)

34.1 Overview

The Printhead interface (PHI) accepts dot data from the LLU and transmits the dot data to the printhead, using the printhead interface mechanism. The PHI generates the control and timing signals necessary to load and drive the printhead. A printhead is constructed from a number of printhead segments. The PHI has 6 transmission lines (printhead channel), each line is capable of driving up to 2 printhead segments, allowing a single PHI to drive up to 12 printhead segments. The PHI is capable of driving any combination of 0, 1 or 2 segments on any printhead channel.

The PHI generates control information for transmission to each printhead segment. The control information can be generated automatically by the PHI based on configured values, or can be constructed by the the CPU for the PHI to insert into the data stream.

34.2 Physical Layer

The PHI transmits data to printhead segments at a rate of 288 Mhz, over 6 LVDS data lines synchronous to 2 clocks. Both clocks are in phase with each other. In order to assist sampling of data in the printhead segments, each data line is encoded with 8b10b encoding, to minimize the maximum number of bits without a transition. Each data line requires a continuous stream of symbols, if a data line has no data to send it must insert IDLE symbols to enable the receiving printhead to remain synchronized. The data is also scrambled to reduce EMI effects due to long sequences of identical data sent to the printhead segment (i.e. IDLE symbols between lines). The descrambler also has the added benefit in the receiver of increasing the chance single bit errors will be seen multiple times. The 28-bit scrambler is self-synchronizing with a feedback polynomial of $1+x^{15}+x^{28}$.

34.3 Control Commands

The PHI needs to send control commands to each printhead segment as part of the normal line and page download to each printhead segment. The control commands indicate line position, color row information, fire period, line sync pulses etc. to the printhead segments.

A control command consists of one control symbol, followed by 0 or more data or control symbols. A data or control symbol is defined as a 9-bit unencoded word. A data symbol has bit 8 set to 0, the remaining 8 bits represent the data character. A control symbol has bit 8 set to 1, with the 8 remaining bits set to a limited set of other values to complete the 8b10b code set (see Table 213 for control character definitions).

Table 209 lists the configurable control commands that are generated internally by the PHI for data transfer to the printhead.

TABLE 209

Command configuration definition

| Cfg Register | Mnemonic | Command | Description |
|---|---|---|---|
| IdleCmdCfg | IDLE | IDLE | Idle symbols are ignored by the printhead segments. Note IdleCmdCfg configures the Idle symbol value directly. |
| CmdCfg[0] | RES_A | RESUME_A | Resume line data transfer, printhead segment group A (segments 0,2,4,6,8,10) |
| CmdCfg[1] | RES_B | RESUME_B | Resume line data transfer, printhead segment group B (segments 1,3,5,7,9,11) |
| CmdCfg[2] | NC_A | NEXT_COLOR_A | Increment the nozzle row for the last active printhead segments |
| CmdCfg[3] | NC_B | NEXT_COLOR_B | Increment the nozzle row for the last active printhead segments |
| CmdCfg[4] | FIRE | FIRE | Line Sync and FIRE command to all printhead segments |

Each command is defined by CmdCfg[CMD_NAME] register. The command configuration register configures 2 pointers into a symbol array (currently the symbol array is 32 words, but could be extended). Bits 4:0 of the command configuration register indicate the start symbol, and bits 9:5 indicate the end symbol. Bit 10 is the empty string bit and is used to indicate that the command is empty, when set the command is ignored and no symbols are sent. When a command is transmitted to a printhead segment, the symbol pointed to by the start pointer is send first, then the start pointer+1 etc. and all symbols to the end symbol pointer. If the end symbol pointer is less than the start symbol pointer the PHI will send all symbols from start to stop wrapping at 32.

The IDLE command is configured differently to the others. It is always only one symbol in length and cannot be configured to be empty. The IDLE symbol value is defined by the IdleCmdCfg register.

The symbol array can be programmed by accessing the SymbolTable registers. Note that the symbol table can be written to at any time, but can only be read when Go is set to 0.

34.4 CPU Access

The PHI provides a mechanism for the CPU to send data and control words to any individual segment or to broadcast to all segments simultaneously. The CPU writes commands to the command FIFO, and the PHI accepts data from the command FIFO, and transmits the symbols to the addressed printhead segment, or broadcasts the symbols to all printhead segments.

The CPU command is of the form:

The 9-bit symbol can be a control or data word, the segment address indicates which segment the command should be sent to. Valid segment addresses are 0-11 and the broadcast address is 15. There is a direct mapping of segment addresses to printhead data lines, segment addresses 0 and 1 are sent out printhead channel 0, addresses 2 and 3 are sent out printhead channel 1, and so on to addresses 10 and 11 which are send out printhead channel 5. The end of command (EOC) flag indicates that the word is the last word of a command. In multi-word commands the segment address for the first word determines which printhead channel the command gets sent to, the segment address field in subsequent words is ignored.

The PHI operates in 2 modes, CPU command mode and data mode. A CPU command always has higher priority than the data stream (or a stream of idles) for transmission to the printhead. When there is data in the command FIFO, the PHI will change to CPU command mode as soon as possible and start transmitting the command word. If the PHI detects data in the command FIFO, and the PHI is in the process of transmitting a control word the PHI waits for the control word to complete and then switches to CPU command mode. Note that idles are not considered control words. The PHI will remain in CPU command mode until it encounters a command word with the EOC flag set and no other data in the command FIFO.

The PHI must accept data for all printhead channels from the LLU together, and transmit all data to all printhead segments together. If the CPU command FIFO wants to send data to a particular printhead segment, the PHI must stall all data channels from the LLU, and send IDLE symbols to all other print channels not addressed by the CPU command word. If the PHI enters CPU command mode and begins to transmit command words, and the command FIFO becomes empty but the PHI has not encountered an EOC flag then the PHI will continue to stall the LLU and insert IDLE symbols into the print streams. The PHI remains in CPU command mode until an EOC flag is encountered.

To prevent such stalling the command FIFO has an enable bit CmdFIFOEnable which enables the PHI reading the command FIFO. It allows the CPU to write several words to the command FIFO without the PHI beginning to read the FIFO. If the CPU disables the FIFO (setting CmdFIFOEnable to 0) and the PHI is currently in CPU command mode, the PHI will continue transmitting the CPU command until it encounters an EOC flag and will then disable the FIFO.

When the PHI is switching from CPU command mode to data transfer mode, it sends a RESUME command to the printhead channel group data transfer that was interrupted. This enables each printhead to easily differentiate between control and data streams. For example if the PHI is transmitting data to printhead group B and is interrupted to transmit a CPU command, then upon return to data mode the PHI must send a RESUME_B control command. If the PHI was between pages (when Go=0) transmitting IDLE commands and was interrupted by a CPU command, it doesn't need to send any resume command before returning to transmit IDLE.

The command FIFO can be written to at any time by the CPU by writing to the CmdFifo register. The CmdFiFO register allows FIFO style access to the command FIFO. Writing to the CmdFIFO register will write data to the command FIFO address pointed to by the write pointer and will increment the write pointer. The CmdFIFO register can be read at any time but will always return the command FIFO value pointed to by the internal read pointer.

The current fill level of the CPU command FIFO can be read by accessing the CmdFIFOLevel register.

The command FIFO is 32 words×14 bits.

34.5 Line Sync

The PHI synchronizes line data transmission with sync pulses generated by the GPIO block (which in turn could be synchronized to the GPIO block in another SoPEC). The PHI waits for a line sync pulse and then transmits line data and the FIRE command to all printhead segments.

It is possible that when a line sync pulse arrives at the PHI that not all the data has finished being sent to the printheads. If the PHI were to forward this signal on then it would result in an incorrect print of that line, which is an error condition. This would indicate a buffer underflow in PEC1.

However, in SoPEC the printhead segments can only receive line sync signals from the SoPEC providing them data. Thus it is possible that the PHI could delay in sending the line sync pulse until it had finished providing data to the printhead. The effect of this would be a line that is printed slightly after where it should be printed. In a single SoPEC system this effect would probably not be noticeable, since all printhead segments would have undergone the same delay. In a multi-SoPEC system delays would cause a difference in the location of the lines, if the delay was great this may be noticeable.

If a line sync is early the PHI records it as a pending line sync and will send the corresponding next line and FIRE command at the next available time (i.e. when the current line of data is finished transferring to the printhead). It is possible that there may be multiple pending line syncs, whether or not this is an error condition is printer specific. The PHI records all pending line syncs (LineSyncPend register), and if the level of pending lines syncs rises over a configured level (LineSyncMaxPend register) the PHI will set the MaxSyncPend bit in the PhiStatus register which if enabled can cause an interrupt. The CPU interrupt service routine can then evaluate the appropriate response, which could involve halting the PHI.

The PHI also has 2 print speed limitation mechanisms. The LineTimeMin register specifies the minimum line time period in pclk cycles and the DynLineTimeMin register which also specifies the minimum line time period in pclk cycles but is updated dynamically after each FIRE command is transmitted. The PHI calculates DynLineTimeCalcMin value based on the last line sync period adjusted by a scale factor specified by the DynLineTimeMinScaleNum register. When a FIRE command is transmitted to the printhead the PHI moves the DynLineTimeCalcMin to the DynLineTimeMin register to limit the next line time. The DynLineTimeCalcMin value is updated for each new line sync (same as the FirePeriodCalc) whereas the DynLineTimeMin register is updated when a FIRE command is transmitted to the printhead (same as the FirePeriod register). The dynamic minimum line time is intended to ensure the previous calculated fire period will have sufficient time to fire a complete line before the PHI begins sending the next line of data.

The scale factor is defined as the ratio of the DynLineTimeMinScaleNum numerator value to a fixed denominator value of 0x10000, allowing a maximum scale factor of 1.

The PHI also provides a mechanism where it can generate an interrupt to the ICU (phi_icu_line_irq) after a fixed number of line syncs are received or a fixed number of FIRE commands are sent to the printhead. The LineInterrupt register specifies the number of line syncs (or FIRE commands) to count before the interrupt is generated and the LineInterruptSrc register selects if the count should be line syncs or FIRE commands.

34.6 Line Data Order

The PHI sends data to each printhead segment in a fixed order inserting the appropriate control command sequences into the data stream at the correct time. The PHI receives a fixed data stream from the LLU, it is the responsibility of the PHI to determine which data is destined for which line, color nozzle row and printhead segment, and to insert the correct command sequences.

The SegWidth register specifies the number of dot pairs per half color nozzle row. To avoid padding to the nearest 8 bits (data symbol input amount) the SegWidth must be programmed to a multiple of 8.

The MaxColor register specifies the number of half nozzle rows per printhead segment.

The MaxSegment specifies the maximum number segments per printhead channel. If MaxSegment is set to 0 then all enabled channels will generate a data stream for one segment only. If MaxSegment is set to 1 then all enabled channels will generate data for 2 segments. The LLU will generate null data for any missing printhead segments.

The PageLenLine register specifies the number of lines of data to accept from the LLU and transfer to the printhead before setting the page finished flag (PhiPageFinish) in the PhiStatus register.

Printhead segments are divided into 2 groups, group A segments are 0,2,4,6,8,10 and group B segments are 1,3,5, 7,9,11. For any printhead channel, group A segment data is transmitted first then group B.

Each time a line sync is received from the GPIO, the PHI sends a line of data and a fire (FIRE) command to all printhead segments.

The PHI first sends a next color command (NC_A) for the first half color nozzle row followed by nozzle data for the first half color dots. The number of dots transmitted (and accepted from the LLU) is configured by SegWidth register. The PHI then sends a next color command indicating to the printhead to reconfigure to accept the next color nozzle data. The PHI then sends the next half color dots. The process is repeated for MaxColor number of half nozzle rows. After all dots for a particular segment are transmitted, the PHI sends a next color B (NC_B) command to indicate to the group B printheads to prepare to accept nozzle row data. The command and data sequence is repeated as before. The line transmission to the printhead is completed with the transmission of a FIRE command.

The PHI can optionally insert a number of IDLE symbols before each next color command. The number of IDLE symbols inserted is configured by the IdleInsert register. If it's set to zero no symbols will be inserted.

When a line is complete, the PHI decrements the PageLenLine counter, and waits for the next line sync pulse from the GPIO before beginning the next line of data.

The PHI continues sending line data until the PageLenLine counter is 0 indicating the last line. When the last line is transmitted to the printhead segments, the PHI sets a page finished flag (PhiPageFinish) in the PhiStatus register. The PHI will then wait until the Go bit is toggled before sending the next page to the printhead.

34.7 Miscellaneous Printhead Control

Before starting printing SoPEC must configure the printhead segments. If there is more than one printhead segment on a printline, the printhead segments must be assigned a unique ID per print line. The IDs are assigned by holding one group of segments in reset while the other group is programmed by a CPU command stream issued through the PHI. The PHI does not directly control the printhead reset lines. They are connected to CPR block output pins and are controlled by the CPU through the CPR.

The printhead also provides a mechanism for reading data back from each individual printhead segment. All printhead segments use a common data back channel, so only one printhead segment can send data at a time. SoPEC issues a CPU command stream directed at a particular printhead segment, which causes the segment to return data on the back channel. The back channel is connected to a GPIO input, and is sampled by the CPU through the GPIO.

If SoPEC is being used in a multi-SoPEC printing system, it is possible that not all print channels, or clock outputs are being used. Any unused data outputs can be disabled by programming the PhiDataEnable register, or unused clock outputs disabled by programming the PhiClkEnable.

The CPU when enabling or disabling the clock or data outputs must ensure that the printhead segments they are connected to are held in a benign state while toggling the enable status of the output pins.

34.8 Fire Period

The PHI calculates the fire period needed in the printhead segments based on the last line sync period, adjusted by a fractional amount. The fractional factor is dependant on the way the columns in the printhead are grouped, the particular clock used within the printhead to count this period and the proportion of a line time over which the nozzles for that line must be fired. For example, one current plan has fire groups consisting of 32 nozzle columns which are physically located in a way that require them to be fired over a period of around 96% of the line time. A count is needed to indicate a period of (linetime/32)*96% for a 144 MHz clock.

The fractional amount the fire period is adjusted by is configured by the FireScaleNum register. The scale factor is the ratio of the configurable FireScaleNum numerator register and a fixed denominator of 0x10000. Note that the fire period is calculated in the pclk domain, but is used in the phiclk domain. The fractional registers will need to be programmed to take account of the ratio of the pclk and phiclk frequencies.

A new fire period is calculated with every new line sync pulse from the GPIO, regardless of whether the line sync pulse results in a new line of data being send to the printhead segments, or the line sync pending level. The latest calculated fire period by can read by accessing the FirePeriodCalc register.

The PHI transfers the last calculated fire period value (FirePeriodCalc) to the FirePeriod register immediately before the FIRE command is sent to the printhead. This prevents the FirePeriod value getting updated during the transfer of a FIRE command to the printhead, possibly sending an incorrect fire period value to the printhead.

The PHI can optionally send the calculated fire period by placing META character symbols in a command stream (either a CPU command, or a command configured in the command table). The META symbols are detected by the PHI and replaced with the calculated fire period. Currently 2 META characters are defined.

TABLE 210

| META character definition | | |
|---|---|---|
| Name | Symbol | Replaced by |
| META1 | K0.6 | FirePeriod[7:0] |
| META2 | K0.7 | FirePeriod[15:8] |

The last calculated fire period can be accessed by reading the FirePeriod register.

34.9 Print Sequence

Immediately after the PHI leaves its reset it will start sending IDLE commands to all printhead data channels. The PHI will not accept any data from the LLU until the Go bit is set. Note the command table can be programmed at any time but cannot be used by the internal PHY when Go is 0.

When Go is set to 1 the PHI will accept data from the LLU. When data actually arrives in the data buffer the PHI will set the PhiDataReady bit in the PhiStatus register. The PHI will not start sending data to the printhead until it receives 2 line syncs from the GPIO (gpio_phi_line_sync). The PHI needs to wait for 2 line syncs to allow it to calculate the fire period value. The first line sync will not become pending, and will not result in a corresponding FIRE command. Note that the PHI does not need to wait for data from the LLU before it can calculate the fire period. If the PHI is waiting for data from the LLU any line syncs it receives from the GPIO (except the first one) will become pending.

Once data is available and the fire period is calculated the PHI will start producing print streams. For each line transmitted the PHI will wait for a line sync pulse (or the minimum line time if a line sync is pending) before sending the next line of data to the printheads. The PHI continues until a full page of data has been transmitted to the printhead (as specified by the PageLenLine register). When the page is complete the PHI will automatically clear the Go bit and will set the PhiPageFinish flag in the PhiStatus register. Any bit in the PhiStatus register can be used to generate an interrupt to the ICU.

34.10 Implementation 34.10.1 Definitions of I/O

TABLE 211

| Printhead interface I/O definition | | | |
|---|---|---|---|
| Port name | Pins | I/O | Description |
| | | | Clocks and Resets |
| pclk | 1 | In | System Clock. |
| phiclk | 1 | In | PHI data transfer clock. |
| prst_n | 1 | In | System reset, synchronous active low. Synchronous to pclk. |
| phirst_n | 1 | In | System reset, synchronous active low. Synchronous to phiclk. |
| | | | General |
| phi_icu_general_irq | 1 | Out | PHI to ICU general interrupt. Active high. |
| phi_icu_line_irq | 1 | Out | Indicates the PHI has detected LineInterrupt number of line syncs or FIRE commands. Active high pulse. |
| gpio_phi_line_sync | 1 | In | GPIO to PHI line sync pulse to synchronise the dot generation output in the printhead with the motor controllers and paper sensors. |
| | | | LLU Interface |
| llu_phi_data[5:0][1:0] | 6x2 | In | Dot Data from LLU to the PHI, 6 data streams, 2bits each. Data is active when llu_phi_avail is 1. |
| phi_llu_ready | 1 | Out | Indicates that PHI is ready to accept data from the LLU. |
| llu_phi_avail | 1 | In | Indicates valid data present on corresponding llu_phi_data. |
| | | | Printhead Interface |
| phi_data[5:0] | 6 | Out | Dot data output to printhead segments. 1 bit to 1 or 2 printhead segments. |
| phi_data_ts_n[5:0] | 6 | Out | Dot data tri-state control output. When 0 the corresponding phi_data pins are disabled. |
| phi_clk[1:0] | 2 | Out | Dot data source clocks. |
| phi_clk_ts_n[5:0] | 2 | Out | PHI dot data source clocks tri-state enable. When set to 0 the corresponding phi_clk output pins are disabled. |
| | | | PCU Interface |
| pcu_phi_sel | 1 | In | Block select from the PCU. When pcu_phi_sel is high both pcu_adr and pcu_dataout are valid. |
| pcu_rwn | 1 | In | Common read/not-write signal from the PCU. |
| pcu_adr[8:2] | 7 | In | PCU address bus. Only 7 bits are required to decode the address space for this block. |
| pcu_dataout[31:0] | 32 | In | Shared write data bus from the PCU. |
| phi_pcu_rdy | 1 | Out | Ready signal to the PCU. When phi_pcu_rdy is high it indicates the last cycle of the access. For a |

TABLE 211-continued

| Printhead interface I/O definition | | | |
|---|---|---|---|
| Port name | Pins | I/O | Description |
| | | | write cycle this means pcu__dataout has been registered by the block and for a read cycle this means the data on phi__pcu__datain is valid. |
| phi__pcu__datain[31:0] | 32 | Out | Read data bus to the PCU. |

34.10.3 Configuration Registers

The configuration registers in the PHI are programmed via the PCU interface. Refer to section 23.8.2 on page 439 for a description of the protocol and timing diagrams for reading and writing registers in the PHI. Note that since addresses in SoPEC are byte aligned and the PCU only supports 32-bit register reads and writes, the lower 2 bits of the PCU address bus are not required to decode the address space for the PHI. When reading a register that is less than 32 bits wide zeros are returned on the upper unused bit(s) of phi_pcu_datain. Table 212 lists the configuration registers in the PHI

TABLE 212

| PHI registers description | | | | |
|---|---|---|---|---|
| Address PHI__base+ | Register | #bits | Reset | Description |
| | | Control Registers | | |
| 0x000 | Reset | 1 | 0x1 | Active low synchronous reset, self de-activating. A write to this register will cause a PHI block reset. |
| 0x004 | Go | 1 | 0x0 | Active high bit indicating the PHI is programmed and ready to use. A low to high transition will cause the PHI to reset the Line Sync, Fire Period, data state machine, LLU interface and input buffer. No other sections of the PHI will be affected. |
| | | General Control | | |
| 0x010 | PageLenLine | 32 | 0x0000__0000 | Specifies the number of dot lines in a page. Indicates the number of lines left to process in this page while the PHI is running. Note should only be programmed when Go is 0. (Working register) |
| 0x014 | MaxColor | 4 | 0xB | Indicates the number of half colors+ 1 per segment to produce data for, must be less than 12. e.g. for printheads with10 half colors set to 9. |
| 0x018 | SegWidth[12:3] | 10 | 0x000 | Specifies the number of half color dots per printhead segment (must be set to a multiple of 8). |
| 0x01C | MaxSegment | 1 | 0x1 | Specifies the maximum number of segments per print channel<br>0 - 1 segment per print channel<br>1 - 2 segments per print channel |
| 0x020 | IdleInsert | 5 | 0x00 | Specifies the number IDLE symbols to insert before each next color symbol when generating line data.<br>If set to 0 no symbols are inserted. |
| 0x024 | PhiClkEnable | 2 | 0x0 | PHI clock enable. One bit per clock output, when 1 enables the output clock, otherwise the output clock is switched off.<br>Bit 0 - Enables phi__clk[0]<br>Bit 1 - Enables phi__clk[1]<br>Also controls the tri-state enable of the phi__clk outputs. |
| 0x028 | PhiDataEnable | 6 | 0x00 | PHI data channel enable. One bit per output print channel. When 1 the output data line is enabled.<br>Bit 0 - Enables phi__data[0]<br>Bit 1 - Enables phi__data[1]<br>Bit 2 - Enables phi__data[2]<br>Bit 3 - Enables phi__data[3]<br>Bit 4 - Enables phi__data[4]<br>Bit 5 - Enables phi__data[5]<br>Also controls the tri-state enable of the phi__data outputs. |

TABLE 212-continued

PHI registers description

| Address PHI_base+ | Register | #bits | Reset | Description |
|---|---|---|---|---|
| | | Command Configuration | | |
| 0x080-0x0FC | CmdTable[31:0] | 32x9 | 0x00 | Command Configuration lookup table. |
| 0x100-0x120 | CmdCfg[4:0] | 5x11 | 0x000 | Command pointer configuration for each command. See Table 209 for command definition. One register per command.<br>Bits 4:0 - Start Symbol pointer into CmdTable<br>Bits 9:5 - End Symbol pointer into CmdTable<br>Bit 10 - Command empty |
| 0x124 | IdleCmdCfg | 9 | 0x100 | Idle Command Symbol value (Defaults to K0.0) |
| | | CPU Command FIFO | | |
| 0x130 | CmdFIFO | 14 | 0x0000 | CPU command FIFO access. Each time the register is written to, the buffer write pointer is incremented.<br>A read of this register will return the command FIFO data word pointed to by the read pointer. |
| 0x134 | CmdFIFOLevel | 6 | 0x00 | CPU Command FIFO level. Indicates the current CPU command FIFO fill level in words. (Read only Register) |
| 0x138 | CmdFIFOEnable | 1 | 0x0 | CPU Command FIFO enable. When 1 allows the command FIFO to be read by the PHI. |
| | | Line Sync Control | | |
| 0x140 | LineTimeMin | 24 | 0x00_0000 | Specifies the minimum number of pclk cycles between adjacent FIRE commands send to the printhead. Line sync pulses of a shorter period will not translate into a FIRE command immediately and will remain pending until the specified number of pclk cycles has elapsed. |
| 0x144 | DynLineTimeMinScaleNum | 16 | 0x0001 | Numerator of dynamic line sync scale factor, denominator is fixed at 0x10000. Must be non zero. Used to calculate the current minimum line time period based on the last line sync. |
| 0x148 | DynLineTimeMin | 24 | 0x00_0000 | Specifies the minimum number of pclk cycles between adjacent FIRE commands send to the printhead, but is updated dynamically from the DynLineTimeCalcMin register when a FIRE command is transmitted.<br>Line sync pulses of a shorter period will not translate into a FIRE command immediately and will remain pending until the specified number of pclk cycles has elapsed.<br>(Read Only Register) |
| 0x14C | DynLineTimeCalcMin | 24 | 0x00_0000 | Dynamically calculated minimum line time in pclk cycles, updated after each new line sync pulse.<br>(Read Only Register) |
| 0x150 | LineInterrupt | 16 | 0x0000 | Number of line syncs (or FIRE commands) to occur before generating a phi_icu_line_irq interrupt.<br>When set to 0 interrupt is disabled. |
| 0x154 | LineInterruptSrc | 1 | 0x0 | Selects the line interrupt source for input into the LineInterrupt counter<br>0 - Select raw line input from the GPIO<br>1 - Select FIRE commands as send out in the print stream |
| 0x158 | LineSyncMaxPend | 10 | 0x000 | Specifies the maximum value for the LineSyncPend register before setting the MaxSyncPend bit in the PhiStatus register.<br>When set to 0, MaxSyncPend bit is disabled and is never set. |
| 0x15C | FireScaleNum | 16 | 0x0001 | Numerator of Fire Period scale factor, denominator is fixed at 0x10000. Must be non zero. Used to determine the fire period based on the last line sync period |
| 0x160 | FirePeriod | 16 | 0x0000 | Last transmitted fire period value. Updated from the FirePeriodCalc when (a cycle before) a FIRE command is transmitted.<br>(Read Only Register) |
| 0x164 | FirePeriodCalc | 16 | 0x0000 | Last Calculated fire period value.<br>(Read Only Register) |

TABLE 212-continued

PHI registers description

| Address PHI_base+ | Register | #bits | Reset | Description |
|---|---|---|---|---|
| 0x170 | PhiStatus | 4 | 0x0 | Indicates the status and source of the PHI general interrupt<br>0 - MaxSyncPend, Max line sync pending interrupt<br>1 - Invalid 8b10b control command<br>2 - PhiDataReady, PHI data ready<br>3 - PhiPageFinish PHI page finish flag<br>All bits are sticky, and can be cleared by writing a1 to the corresponding bit in PhiStatusClear register.<br>(Read Only Register) |
| 0x174 | PhiStatusClear | 4 | 0x0 | PHI status clear register. If written with a 1 it clears corresponding PhiStatus sticky bit.<br>0 - MaxSyncPend, Max line sync pending interrupt<br>1 - Invalid 8b10b control command<br>2 - PhiDataReady, PHI data ready<br>3 - PhiPageFinish PHI page finish flag<br>For example a write of 0xC will clear the PhiDataReady, and PhiPageFinish sticky bit in the PhiStatus register.<br>(Reads as zero) |
| 0x178 | PhiStatusMask | 4 | 0x0 | Enables the PhiStatus bits as sources to generate a phi_icu_general_irq interrupt. When high the interrupt source bit is masked. |
| | | Working Registers | | |
| 0x1A0 | OutBufLevel | 2 | 0x0 | Output buffer fill level in words.<br>(Read Only register) |
| 0x1A4 | DataBufferLevel | 4 | 0x0 | Data buffer fill level in words.<br>(Read Only register) |
| 0x1A8 | LineSyncPend | 10 | 0x000 | Indicates the number of outstanding line syncs (and lines of data) yet to be sent to the printhead.<br>(Read Only register) |

A low to high transition of the Go register causes the LLU interface and data buffer, Line sync, Fire Period and data state machine to be reset. All other logic and configuration registers in the PHI will remain the same. The block indicates the transition to other blocks via the phi_go_pulse signal.

When changing the configuration values PhiDataEnable and PhiClkEnable the phiclk clock must be enabled for the changes to take effect.

34.10.4 Line Sync

The line sync block implements the line sync pending logic, and determines when an interrupt should be generated and sent to the ICU. It also includes logic to prevent line times of less than the configured minimum size, or the calculated minimum size.

The line sync block receives a line sync pulse from the GPIO (via the gpio_phi_line_sync signal), if there is no line data currently being sent (line_complete==1) and the minimum period time has elapsed (both static and dynamic) then it will generate a line_start pulse to the print stream controller to begin transmitting the next line of data to the printhead segments.

If a line sync pulse arrives while there is a line still being transmitted the line sync becomes pending, and the pending counter is incremented. When the current line being transmitted is complete the logic will generate a new line_start pulse and decrement the pending counter. The pending counter can be read by the CPU at any time by reading the LineSyncPend register.

The LineTimeMin register specifies the minimum time between successive line start pulses to the print stream controller. If a line has completed and there are several line syncs pending the next line will not begin until the LineTimeMin counter has expired. Once the counter has expired the logic will issue a new line_start pulse and decrement the LineSyncPend counter. Similar logic exists for the DynLineTimeMin value.

```
// all gpio pulses result in a pending except the first one
if (gpio_phi_line_sync_first == 1) then
        line_sync_pend_inc          = gpio_phi_line_sync
elsif (gpio_phi_line_sync == 1) then
        gpio_phi_line_sync_first   = 1
// implement the line start control (filtered later by line count)
if((min_period_cnt > line_time_min) AND
   (min_period_cnt > dyn_line_time_min) AND
   (line_sync_pend != 0) AND
   (page_len_line != 0) AND
   (line_complete == 1) AND (phi_go == 1) then
        line_start = 1
else
        line_start = 0
// implement the line sync pending count
case (line_sync_pend_inc,line_start)
        00: line_sync_pend = line_sync_pend
        01: line_sync_pend = line_sync_pend - 1
        10: line_sync_pend = line_sync_pend + 1
        11: line_sync_pend = line_sync_pend
endcase
// implement the min period counter
if (line_start == 1) then
```

-continued

```
        min__period__cnt = 0
elsif (min__period__cnt != 0xFFFFFF) then   // allow to saturate, no wrap
        min__period__cnt ++
```

If the LineSyncPend register exceeds the LineSyncMaxPend configured level the line sync block will set the MaxSyncPend bit in the PhiStatus register. The bit is sticky and can be optionally used to generate an interrupt to the CPU.

```
// max pending interrupt
if (phi__go__pulse == 1) then
        max__pend__int = 0
elsif (line__sync__pend > line__sync__max__pend) then
        max__pend__int = 1
```

The line sync block also generates a line sync interrupt (phi_icu_line_irq) every LineInterrupt number of line syncs received from the GPIO (or FIRE commands sent out in the print stream). The LineInterruptSrc register selects the line sync source. This interrupt can be disabled by programming the LineInterrupt register to 0.

```
// select the line sync source
if (line__interrupt__src ==1) then
   line__sync = line__start
else
   line__sync = gpio__phi__line__sync
// the internal line sync count interrupt
if (phi__go__pulse ==1) then
   line__count = 0
elsif ( line__sync == 1 AND line__count == 0) then
   line__count = line__interrupt
elsif ((line__sync == 1) AND (line__count != 0)) then
   line__count --
// determine when to pulse the interrupt
if (line__interrupt == 0 ) then // interrupt disabled
   phi__icu__line__irq = 0;
elsif (line__sync == 1 AND line__count == 1) then
   phi__icu__line__irq = 1
```

The line sync block also keeps track of the number of lines generated by the PHI. The PageLenLine registers is a working register, and must be programmed to the number of lines per page before the Go bit is set to 1 to enable the PHI. After a line is transmitted by the PHI the PageLenLine register will be decremented. When the counter decrements to 0, the line sync block will set the PhiPageFinish bit in the PhiStatus register. This sticky can be used to optionally trigger an interrupt to the CPU. No further line start pulses will be created while the PageLenLine is 0.

```
// implement the page line count
if (page__len__wr__en == 1) then
   page__len__line    = cpu__wr__data          // cpu write
access
elsif (line__sync__pend__dec == 1 AND page__len__line != 0) then
// else working mode
   page__len__line --
else             // hold
   page__len__line    = page__len__line
// generate the page finish
page__finish__int = (page__len__line == 0) AND (line__complete == 1)
```

34.10.5 Fire Period

The fire period calculator measures the line sync period and scales the period to produce the fire period and dynamic line time minimum value. The fire period can optionally be sent to the printhead by inserting META characters in the definition of commands. The META characters are defined in Table 210. The scale factor for the FirePeriod is defined by the FireScaleNum (with a denominator of 0x10000), and the scale factor for the DynLineTimeCalcMin value is defined by the DynLineTimeMinScaleNum (with a denominator value of 0x10000).

```
if (phi__go__pulse == 1) then
   fire__period__calc = 0
   curr__fire__period = 0
   fire__accum         = 0
elsif (gpio__phi__line__sync == 1) then
   fire__period__calc = curr__fire__period
   curr__fire__period = 0
else
   fire__var[16:0] = fire__accum[15:0] + fire__scale__num[15:0]
   // update the counter on each wrap
   if (fire__var[16] == 1) then // detect an overflow
      curr__fire__period ++
   // update the accum
   fire__accum[15:0]    = fire__var[15:0]
```

Similar logic is used to calculate to the DynLineTimeMin value.

When the print stream controller transitions to the FIRE command state it issues a fire_start pulse to indicate to the line sync block to capture the calculated minimum line time and fire period.

```
// update the dynamic value when a FIRE is sent
if (fire__start == 1) then
   dyn__line__time__min = dyn__line__time__calc__min
   fire__period             = fire__period__calc
```

34.10.6 LLU Interface

The LLU interface accepts data from the LLU in 6×2 data bit form and constructs 48-bit data words over 4 cycles and writes them into the Data buffer. The LLU interface accepts data from the LLU as long as the data buffer is not full and the Go bit is set. The LLU interface also calculates the buffer empty signal to indicate to the print stream controller when the data buffer has data available.

```
// phi__llu__ready generation
phi__llu__ready = phi__go AND NOT( db__buf__full)
// a valid dot data word is
word__valid = phi__llu__ready AND llu__phi__avail
// generate the address and de-serializer pointers
if (phi__go__pulse == 1) then
   wr__adr    = 0
elsif (word__valid == 1) then
   wr__adr ++               // write address is allowed to wrap naturally
// generate the bit mask from the read address
db__wr__en = word__valid
db__wr__adr = wr__adr[5:2]
case wr__adr[1:0]
   00 : db__wr__mask[47:0] = 0x0303__0303__0303
   01: db__wr__mask[47:0] = 0x0C0C__0C0C__0C0C
   10: db__wr__mask[47:0] = 0x3030__3030__3030
   11: db__wr__mask[47:0] = 0xC0C0__C0C0__C0C0
endcase
```

-continued

```
// generate the buffer empty/full signals
db_buf_emp = (rd_adr[4:0] == wr_adr[6:2])
// buffer full level
if ((rd_adr[4] != wr_adr[6]) AND (rd_adr[4:0] == wr_adr[5:2]) then
   db_buf_full = 1
else
   db_buf_full = 0
```

The db_buf_emp bit is used in the configuration registers to generate the PhiDataReady status bit in the PhiStatus register. After reset the PhiDataReady bit is set to zero. When the data buffer becomes non-empty for the first time the PhiDataReady bit will get set to one.

For the LLU interface timing diagram see FIG. 248 on page 627.

34.10.7 Command Table

The command table logic contains programmed values for the control symbol lookup table. The print stream controller reads locations in the command table to determine the values of symbols used to construct control commands. The lookup pointers per command are configured by the CmdCfg registers.

The CPU programs the command table by writing to the CmdTable registers. The CPU can write to the command table at any time. But to ensure correct operation of the PHI the CPU should only change the command table when the Go bit is 0.

The command table logic is implemented using a register array (to save logic area). The register array has one read and one write port. The write port is dedicated to the CPU, but the read port needs to be shared between CPU read access and PHI internal read access. To simplify arbitration on the read port, the Go bit is used to switch between CPU access (Go=0) and PHI internal access (Go=1).

34.10.8 Command FIFO

Figure 290:
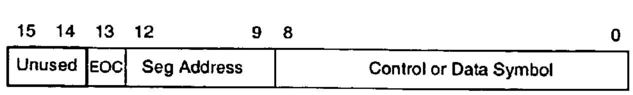

The command FIFO provides a mechanism for the CPU to send control or data commands to printhead segments. The CPU writes a sequence of command words to the FIFO (by writing to the CmdFIFO registers) to make a command. Each command word contains 9 symbol bits, 4 segment address bits and an end of command (EOC) bit (as defined in FIG. 290). A command consists of one or more command words terminated with the EOC bit set in the last word. Each write access to any CmdFIFO register location causes the write pointer to get incremented. The CmdFIFOEnable bit controls if data in the FIFO is to be presented to the PHI for transmission to the printhead segments. If CmdFIFOEnable is 0 the cmd_emp signal is forced high indicating to the print stream controller that the CmdFIFO is empty. If CmdFIFOEnable is 1 then any data in the CmdFIFO will be available for transfer. The CmdFIFOEnable bit is intended to allow the CPU to write a complete command (which could be a number of command words) to the FIFO before the print stream controller begins reading data from the command FIFO.

If the print stream controller has started transmitting a command from the command FIFO, and the command FIFO becomes empty then the controller will wait until a terminating command word is sent (i.e. EOC flag set to zero) before reverting back to transmitting regular data. While it is waiting for an EOC flag it will insert IDLE symbols into the print stream.

The FIFO reports the fill level of the command FIFO via the CmdFifoLevel register.

The command FIFO is implemented using a register array (to save logic area).

```
// implement the write pointers
if (cf_wr_en == 1) then // active CPU write
   wr_adr ++
// generate the buffer empty signals
cmd_emp = (wr_adr == cmd_rd_adr ) OR (cf_fifo_enable == 0)
// determine FIFO fill level
cf_fifo_level = (wr_adr - cmd_rd_adr)
// connect the read
rd_adr = cmd_rd_adr
```

34.10.9 Print Stream Generator

The print stream generator consists of 2 controller state machines and some logic to maintain the output buffer. The PHI mode controller arbitrates and controls access to the output buffer. It arbitrates between CPU sourced commands or data streams, and data controller sourced commands or data streams. The data controller state machine accepts nozzle data from the data buffer (or indirectly from the LLU). It generates and wraps the nozzle data with the appropriate command symbols to produce the print stream.

34.10.9.1 Data Controller

Figure 291:
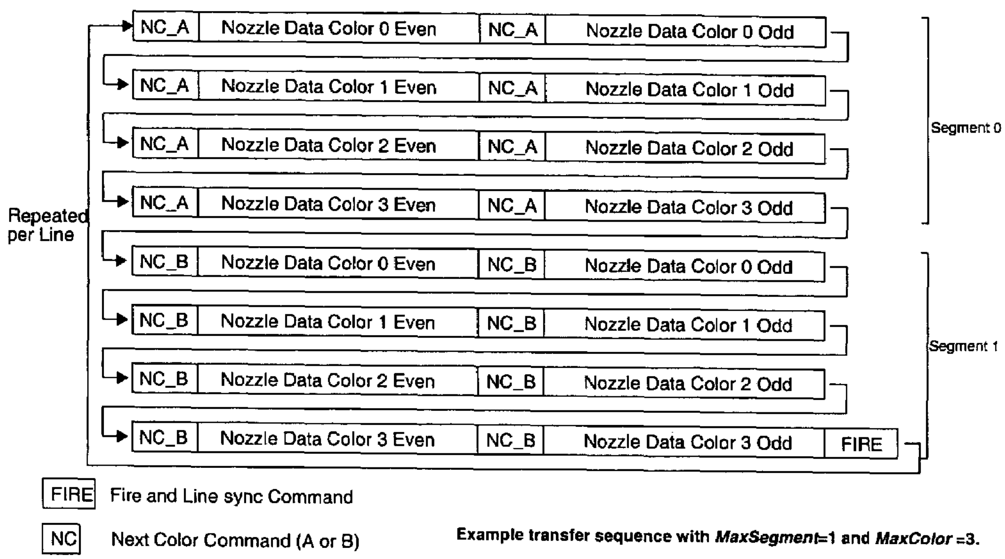
Figure 292:
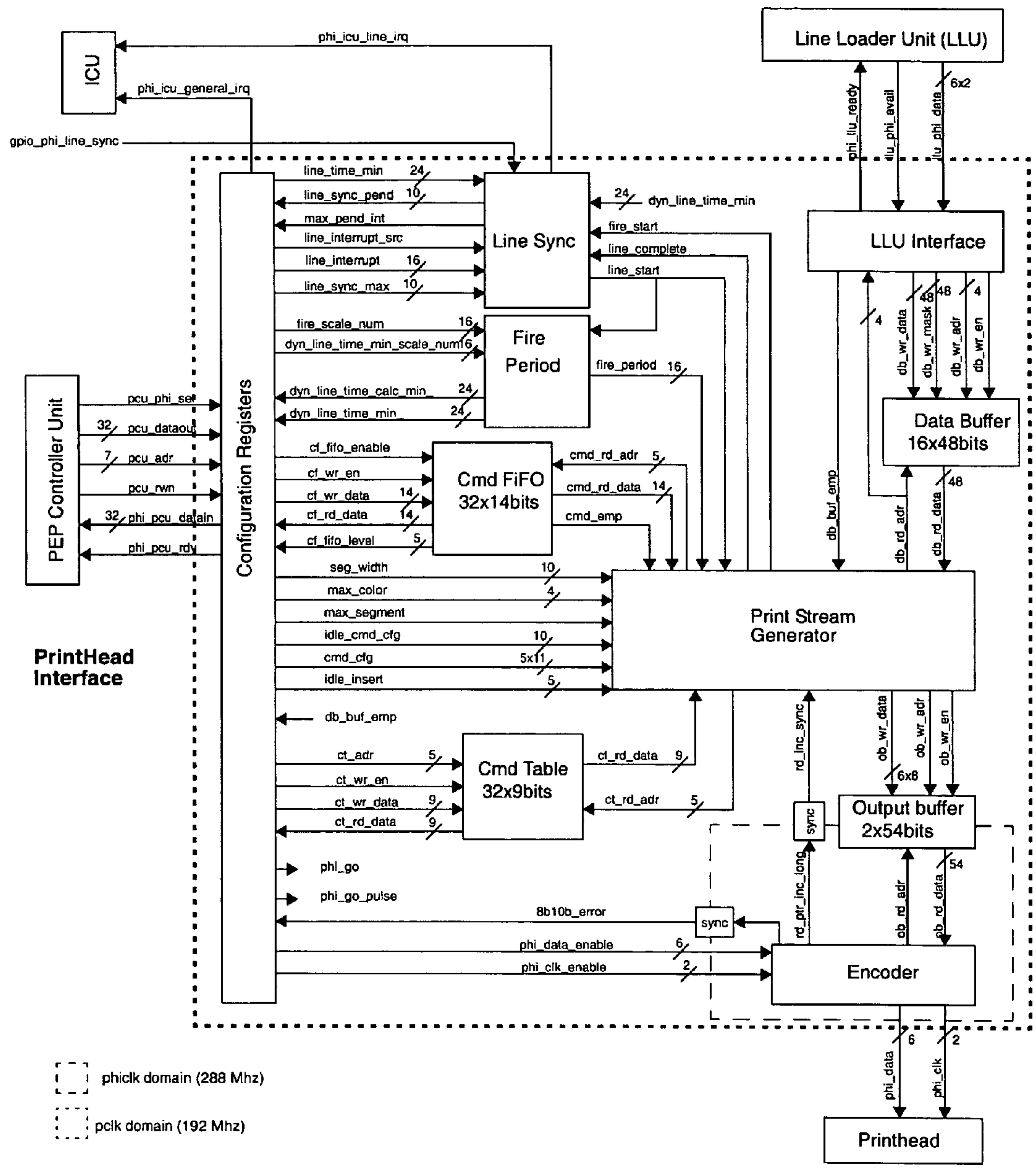
Figure 293:
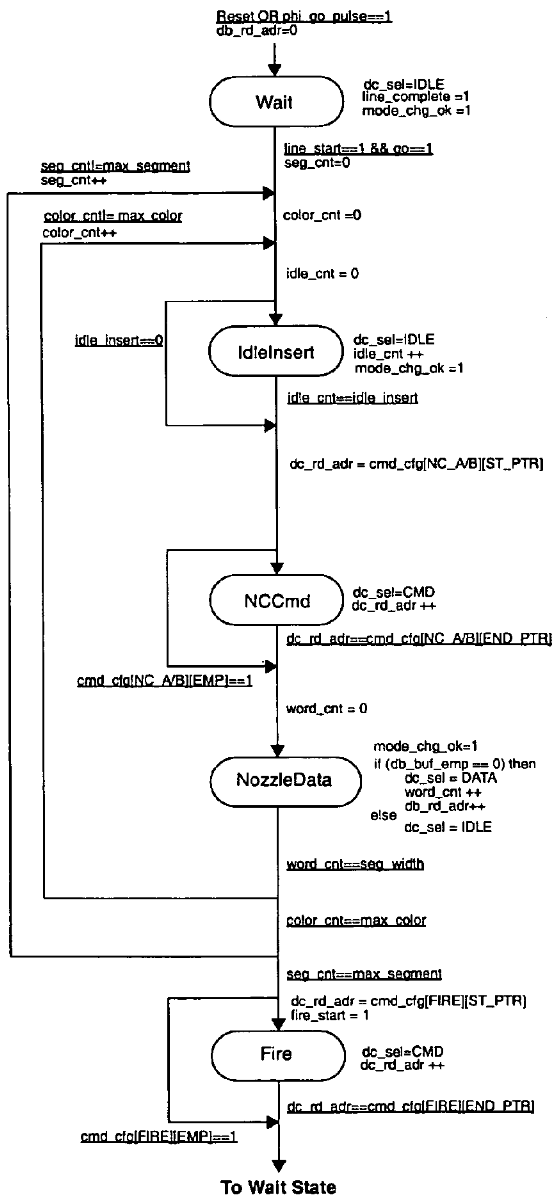
Figure 294:
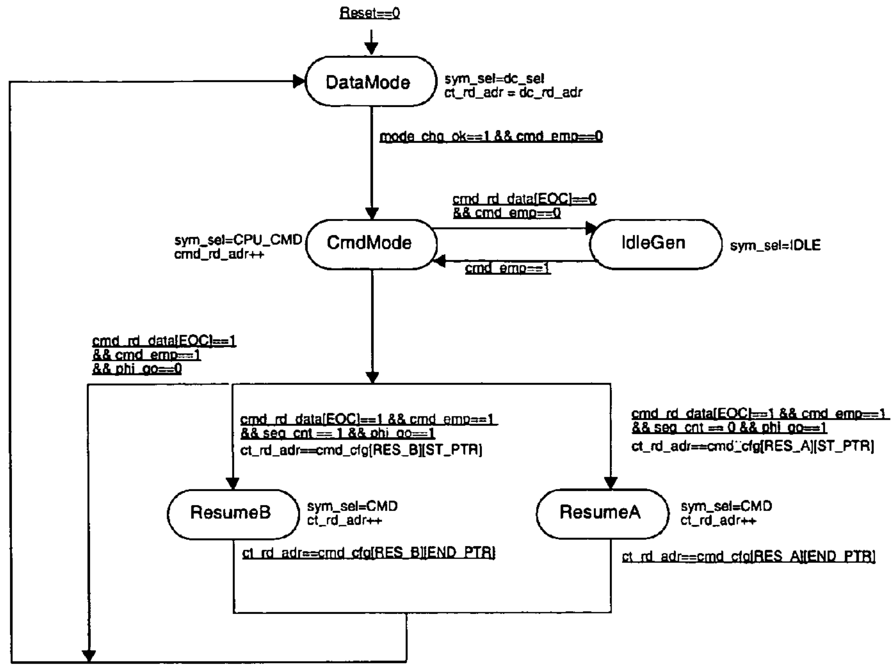
Figure 295:
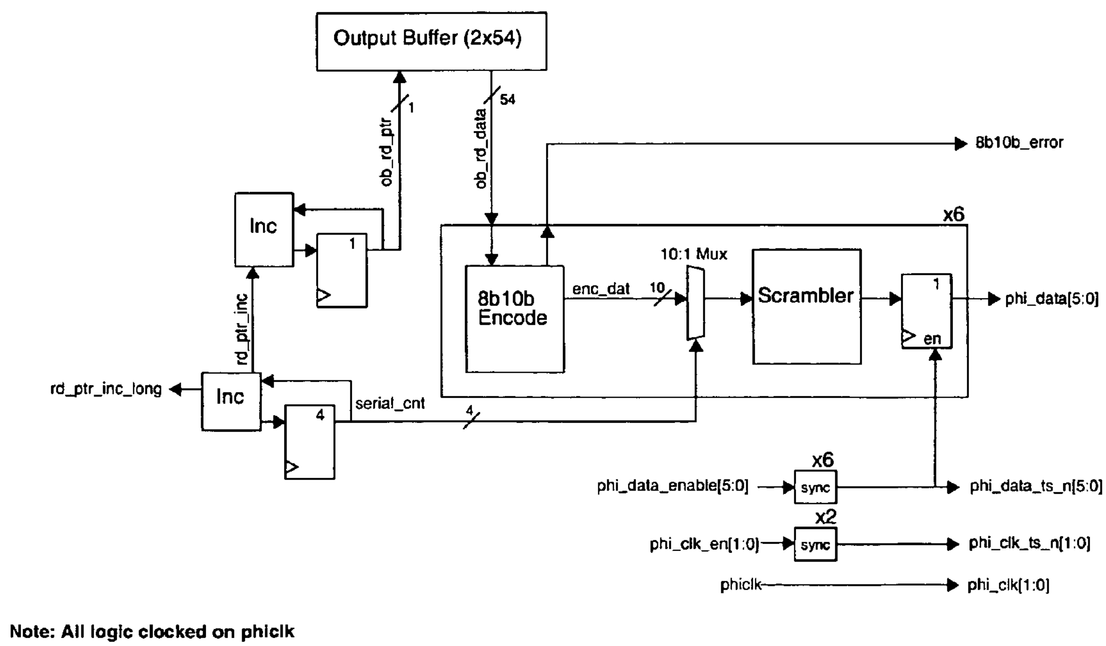
Figure 296:
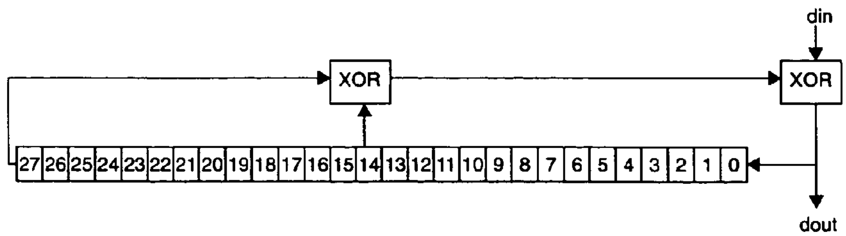

The data controller state machine accepts nozzle data from the LLU (via the data buffer) and wraps the raw nozzle data with control commands to correctly indicate to each printhead segment the correct destination of the nozzle row data. The state machine creates the command and data sequence as shown in FIG. 291.

The data controller state machine resets to the Wait state. While in the Wait state it inserts Idle commands into the print stream. It remains in the Wait state until it receives a start line pulse from the line sync block (via the line start signal). When true the state machine begins generating the control and data streams for transmission to the printhead segments.

The state machine transitions to the IdleInsert state, and produces idle_insert number of Idle symbols. If idle_insert is 0 the state is bypassed. All transitions to IdleInsert cause the idle_cnt counter to reset. When complete the state machine transitions to NCCmd state.

On transition into a command state (NCCmd) the command table read address (dc_rd_adr) is loaded with configured start pointer for that command CmdCfg[NC][ST_PTR]. The command could be NC_A or NC_B depending on the value of the segment counter (seg_cnt). While in the command state the dc_rd_adr address is incremented each time a symbol word is written into the output buffer. If the output buffer becomes full the pointer will remain at the current value. While in the NCCmd state the state machine indicates to the symbol mux to select symbols from the command table (ct_ard_data). The state machine determines the command has completed by comparing the dc_rd_adr with the configured end pointer for that command CfgCmd[NC][END_PTR]. If the CfgCmd[NC][EMP] empty bit is set the NCCmd state is bypassed.

When the command transfer is complete the state machine transitions to the NozzleData state to transfer data from the data buffer to the output buffer and eventually to the printhead. All transitions to the NozzleData state cause the word counter to reset (word_cnt). While in the NozzleData state the word_cnt counter is incremented each time a data word is transferred from the data buffer to the output buffer. The state machine remains in this state until all data words for one nozzle row of a half color are transmitted. It determines the end of a nozzle row by comparing the word count with configured segment width (SegWidth). The SegWidth register is specified as the number of dot pairs per nozzle row, and a data word is equivalent to 8 dot-pairs. In order to compare like units, the comparison uses the SegWidth[13:3] bits as the bottom bits are redundant (hence the requirement that SegWidth must be programmed to a multiple of 8). While in the NozzleData state the db_rd_data is switched through the symbol mux to the output buffer (ob_wr_data).

When the NozzleData state has detected that the nozzle data transfer has completed, the state machine tests the color counter. If the counter is less than the configured MaxColor it will return to the IdleInsert state and increment the color counter. The loop is repeated until all colors have been transmitted to the printhead. When the color count is equal to MaxColor the state machine determines if it needs to send data for the next printhead segment group by comparing the segment count (seg_cnt) to the configured number of segments (MaxSegment). If they are equal the state machine transitions to the Fire state. If not the state machine increments the seg_cnt, transitions to the IdleInsert state and begins generating the command and data stream for the next group of segments as before.

When the state machine transitions to the Fire state the command table read address is set to CfgCmd[FIRE][ST_PTR], and the fire_start signal is pulse. The fire_start pulse indicates to the line sync block to update the fire period and dynamic line time minimum value. While in the Fire state the command table address is incremented, and the symbol mux is set to select symbols from the command table (ct_rd_data), and is output to all print channels. The state machine remains in the Fire state until the dc_rd_adr is equal the configured fire command end pointer CmdCfg[FIRE][END_PTR]. When true the state machine transitions back to the Wait state to wait for the next line start pulse. If the CmdCfg[FIRE][EMP] bit is set the Fire state is bypassed and the state machine transitions from the NozzleData state directly to the Wait state.

At any time when the state machine is generating commands or data symbols, the output buffer could become full. If this happens the state machine will halt and wait for space to become available before starting again.

If the state machine is in the NozzleData state and the input data buffer becomes empty, the state machine will signal to the symbol mux to generate idle symbols until the data buffer has data available again.

When the data controller state machine is in the process of sending control commands to the print channels, it needs to disable the PHI mode state machine from switching in CPU control words. It disables the PHI mode machine by setting the mode_chg_ok signal to 0. When the machine is in a nozzle data transfer state or Wait state the mode_chg_ok is set to 1 enabling the mode change state machine.

34.10.9.2 PHI Mode Controller

The PHI mode controller determines the symbol source for the output print stream, arbitrates between CPU command mode (CPU sourced stream) and data mode (data controller sourced stream), and handles the switching between both modes.

The state machine resets to the DataMode state. It allows the data controller state machine control of the symbol mux (sym_sel=dc_sel) and command table (ct_rd_adr=dc_rd_adr).

The state machine will remain in the DataMode, until it detects that there is data available in the CPU command FIFO (cmd_emp==0). If the data controller state machine is not in the middle of sending a control command (as indicated by the mode_chg_ok signal) then it will then transition to the CmdMode state.

When in the CmdMode state the state machine routes symbols from the command FIFO to the print channels as defined by the address in the command FIFO. The state machine will remain in the CmdMode until the command FIFO is empty and the end of command (EOC) flag is detected in the last control word from the command FIFO.

If the command FIFO becomes empty while in the CmdMode state, but the command is not terminated with the EOC flag the state machine transitions to the IdleGen state and fills the print streams with IDLE symbols. It remains in the IdleGen state until more data is available in the command FIFO.

When the state machine detects that it needs to return to DataMode it must send a RESUME command to all previously active printhead segments to allow the printhead segments to easily distinguish between command and nozzle data. If there are 2 segments configured per print channel (phi_mode=1) then the state machine will send a RESUMEA command if the segment group interrupted was group A (indicated by the seg_cnt) or a RESUMEB command if the segment group interrupted was group B. The RESUME commands are sent and generated the same way as the NC (New Color) commands for the data controller.

If the state machine detects the empty flag for the RESUMEA or RESUMEB commands is set it will bypass the ResumeA/B generation states and transition directly from CmdMode to DataMode.

When the RESUME commands are transmitted the state machine returns to the DataMode state and re-enables the data controller.

If the transmission of CPU commands did not interrupt any data transfer to the printheads then the state machine can transition directly from CmdMode to DataMode without considering the RESUME states. The state machine determines if it has been printing by the status of the Go bit.

34.10.9.3 Symbol Mux

The symbol mux selects the input symbols and constructs the outgoing data word to the output buffer based on control signals from the mode and data controllers. The input source symbols can come from the the CPU command FIFO, the Data buffer, the Command Table, or from the state machines directly.

The symbol mux monitors the all outgoing symbols for special meta characters (see Table 210 for definition). If encountered the symbol mux inserts the last calculated FirePeriod values instead of the meta characters.

```
// implement the mux
case (sym_sel)
  IDLE:
    for (i=0;i<6;i++){
      ob_wr_data[i][8:0] = idle_cmd_cfg
      }
  CMD:
    for (i=0;i<6;i++){
      ob_wr_data[i][8:0] = ct_rd_data[8:0]
      }
  DATA:
    ob_wr_data[0][8:0] = (0,db_rd_data[7:0])
    ob_wr_data[1][8:0] = (0,db_rd_data[15:8])
    ob_wr_data[2][8:0] = (0,db_rd_data[23:16])
    ob_wr_data[3][8:0] = (0,db_rd_data[31:24])
```

-continued

```
    ob__wr__data[4][8:0] = (0,db__rd__data[39:32])
    ob__wr__data[5][8:0] = (0,db__rd__data[47:40])
  CPU__CMD:
    if (cmd__rd__data[ADR] == BROADCAST) then
      for (i=0;i<6;i++){
        ob__wr__data[i][8:0] = cmd__rd__data[8:0]
        }
    elsif (cmd__rd__data[ADR] < 12)    // valid segment address
      // prefill with idles
      for (i=0;i<6;i++){
        ob__wr__data[i][8:0] = idle__cmd__cfg[8:0]
        }
      // determine the correct printline
      index        = (cmd__rd__data[ADR] >> 1 )    // divide by 2
      ob__wr__data[index] = cmd__rd__data[8:0]
    else                // invalid segment address (all
idles)
      for (i=0;i<6;i++){
        ob__wr__data[i][8:0] = idle__cmd__cfg[8:0]
        }
endcase
// test for META Characters
for (i=0;i<6;i++){
  if (ob__wr__data[i] == META1) then
    ob__wr__data[i] = (0,fire__period[7:0])
  elsif (ob__wr__data[i] == META2) then
    ob__wr__data[i] = (0,fire__period[15:8])
  }
```

34.10.9.4 Output Buffer Logic

The output buffer is 2 word by 54 bits wide and is primarily used separate the pclk and phiclk clock domains. The print stream generator maintains a read and write pointer to the output buffer. Each time generator logic produces an output data word (either control or data) the word is written to the output buffer and write pointer is incremented. Each time the encoder logic reads a word from the output buffer it sends a rd_ptr_inc_long pulse (of 2 phiclk duration) to the print stream generator. The pulse is resynced to the pclk domain by a synchronizer and is positive edge detected. When an edge is detected the read pointer in the to the output buffer is incremented. The read and writer pointers are compared to determine when there is space available in the output buffer and to allow the print stream controller to continue.

34.10.10 Encoder

The encoder block consists of a 8b10b encoder, a serializer and a 28-bit scrambler for each print channel. All print channels operate together, so common control logic can be shared between each of the channels.

The encoder block will begin generating data as soon as the reset is released. The timing of the reset to the encoder will always ensure that the output buffer feeder logic can put at least 1 word of data into the buffer before the encoder block can read it. After that it is the responsibility of the feeder blocks to ensure that the output buffer always has data in it for the encoder to read.

All logic in the encoder block clocks on the phiclk. All configuration registers in the PHI are clocked on pclk. Any change in the configuration of PhiDataEnable and PhiClkEnable will be resynchronized to phiclk before being applied in the phiclk domain. To ensure that the PHI data clock pins are correctly tri-stated, the phiclk domain must be active when programming the PhiDataEnable and PhiClkEnable configuration registers.

34.10.10.1 Serializer

The serializer circuit accepts a 10 bit encoded word from the 8b10b encoder and produces a serial scrambled data stream. The serializer consists of a read address pointer used to select a word from the output buffer and a serial counter used to select one of the 10 output bits from the 8b10b encoder for input into the scrambler.

Each time a new bit is output the serial counter is incremented, when it reaches 9 it is reset to 0 and the read pointer is incremented, reading a new value from the output buffer. Once enabled the serializer continues reading the output buffer and producing data. It never checks the output buffer for buffer empty signals. It is the responsibility of the output buffer feeding units to ensure that it always has data available. Note that if the raw data feed to the PHI gets stalled the print stream controller will insert IDLE commands to keep the output buffer full.

Every time the encoder block updates the output buffer read pointer it needs to inform the print stream controller that the word is free. It sends a 2 cycle long pulse (rd_ptr_inc_long) to the print stream controller to indicate that a word was read. The pulse needs to be 2 cycles long to always ensure that it will be detected in the slower pclk domain. If the ratio of the phiclk to pclk is changed to be greater than 1.5 then the pulse will need to be further lengthened.

Note that the output of the serializer is LSB transmitted first, e.g. enc_dat[0] first, enc_dat[1], . . . , enc_dat[8] and enc_dat[9].

34.10.10.2 Scrambler

The scrambler is 28-bit register with the feedback generator of $G(x)=1+x^{15}+x^{28}$. For each active clock cycle the scrambler is updated and a new data bit is generated.

34.10.10.3 8b10b Encoding

The data out of each printhead channel is encoded using 8b10b encoding. The encoding prevents long streams of 0 or 1s and helps the printhead to find and retain lock. The encoder takes 8 data bits and a control bit as input and generates a 10 bit encoded output. The output pattern generated is 6/4, 5/5 or 4/6 ratio of ones to zeros, all other patterns are invalid. This ensures that the maximum consecutive run of ones or zeros in a serial stream is limited to 5.

The nomenclature used is Zxx.y where Z is either D for data characters or K for control characters, xx is the decimal value of the input bits 4:0, and Y the decimal representation of input bits 7:5. Each output symbol has a positive, neutral or negative disparity associated with it. Positive disparity symbols have more ones than zeros, negative disparity have more zeros than ones and neutral symbols have equal numbers of ones and zeros. All 256 data characters map to either 1 or 2 symbols. Of the data characters that map to only one symbol, the disparity of that symbol is neutral. Any data character that maps into a positive disparity symbol also maps into negative disparity symbols. Some characters map into 2 different neutral disparity symbols.

The encoder maintains a running disparity for each print channel. The disparity bit is used to select between encoded symbols where 2 exist, and follows the following rules:

- Neutral disparity symbols leave the disparity bit unchanged.
- If running disparity bit is negative, choose a symbol with positive disparity, if it exists and change disparity bit to positive.
- If running disparity bit is positive, choose a symbol with negative disparity, if it exists and change disparity bit to negative.
- Running disparity bit starts negative after reset.

In addition to normal data encoding several control characters are defined. Table 213 shows the possible legal control characters and their encoded outputs. Any attempts to encode other control characters will result in an encode error causing the 8b10b_error_flag to get set in the PhiStatus register.

TABLE 213

8b10b control characters

| Input | | Output [9:0] | | New | |
|---|---|---|---|---|---|
| Code | in[8:0] | +RD | −RD | RD | Notes |
| K0.0 | 1 000 00000 | 1111__000000 | 0000__111111 | flip | Idle Character |
| K1.0 | 1 000 00001 | 1110__000011 | 0001__111100 | same | Write Character |

The data character encoder is split into a 5b/6b encoder and a 3b/4b encoder. The 5b/6b encoder encodes input bits 4:0 to produce output bits 5:0 and a running disparity. The 3b/4b encoder encodes input bits 7:5 to produce output bits 9:6 and an output running disparity. The running disparity of the 5b/6b encoder is used as the disparity input to the 3b/4b encoder. Table 214 and Table 215 indicate the codes used for data characters.

TABLE 214

5b/6b data character encoding

| Input | | Output[5:0] | | |
|---|---|---|---|---|
| Code | in[4:0] | +RD | −RD | New RD |
| D0 | 00000 | 000110 | 111001 | flip |
| D1 | 00001 | 010001 | 101110 | flip |
| D2 | 00010 | 010010 | 101101 | flip |
| D3 | 00011 | 100011 | | same |
| D4 | 00100 | 010100 | 101011 | flip |
| D5 | 00101 | 100101 | | same |
| D6 | 00110 | 100110 | | same |
| D7 | 00111 | 111000 | 000111 | same |
| D8 | 01000 | 011000 | 100111 | flip |
| D9 | 01001 | 101001 | | same |
| D10 | 01010 | 101010 | | same |
| D11 | 01011 | 001011 | | same |
| D12 | 01100 | 101100 | | same |
| D13 | 01101 | 001101 | | same |
| D14 | 01110 | 001110 | | same |
| D15 | 01111 | 000101 | 111010 | flip |
| D16 | 10000 | 001001 | 110110 | flip |
| D17 | 10001 | 110001 | | same |
| D18 | 10010 | 110010 | | same |
| D19 | 10011 | 010011 | | same |
| D20 | 10100 | 110100 | | same |
| D21 | 10101 | 010101 | | same |
| D22 | 10110 | 010110 | | same |
| D23 | 10111 | 101000 | 010111 | flip |
| D24 | 11000 | 001100 | 110011 | flip |
| D25 | 11001 | 011001 | | same |
| D26 | 11010 | 011010 | | same |
| D27 | 11011 | 100100 | 011011 | flip |
| D28 | 11100 | 011100 | | same |
| D29 | 11101 | 100010 | 011101 | flip |
| D30 | 11110 | 100001 | 011110 | flip |
| D31 | 11111 | 001010 | 110101 | flip |

TABLE 215

3b/4b data character code

| Input | | Output[9:6] | | |
|---|---|---|---|---|
| Code | in[7:5] | +RD | −RD | New RD |
| Dx.0 | 000 | 0010 | 1101 | flip |
| Dx.1 | 001 | 1001 | | same |
| Dx.2 | 010 | 1010 | | same |
| Dx.3 | 011 | 1100 | 0011 | same |
| Dx.4 | 100 | 0100 | 1011 | flip |
| Dx.5 | 101 | 0101 | | same |
| Dx.6 | 110 | 0110 | | same |
| Dx.7 | 111 | 1000 | 0111 | flip |

1.5 Page Sizes

TABLE 216

A4 and US Letter page sizes

| | Millimetres | | Inches | |
|---|---|---|---|---|
| | Width | Length | Width | Length |
| A4 | 210.0 | 297.0 | 8.26 | 11.69 |
| US Letter | 215.9 | 279.4 | 8.5 | 11 |

Bi-Lithic

This section describes the bi-lithic printhead (as distinct from the linking printhead) from the point of view of printing 30 ppm from a SoPEC ASIC, as well as architectures that solve the 60 ppm printing requirement using the bi-lithic printhead model.

2. 30 Ppm

To print at 30 ppm, the printheads must print a single page within 2 seconds. This would include the time taken to print the page itself plus any inter-page gap (so that the 30 ppm target could be met). The required printing rate assumes an inter-sheet spacing of 4 cm.

Figure 297:
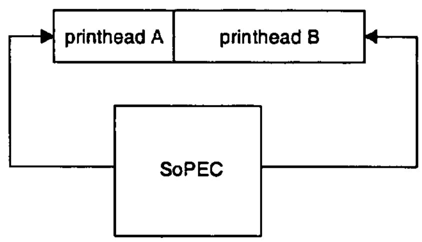

A baseline SoPEC system connecting to two printhead segments is shown in FIG. 297. The two segments (A and B) combine to form a printhead of typical width 13,824 nozzles per color.

We assume decoupling of data generation, transmission to the printhead, and firing.

2.1 Generating the Dot Data

A single SoPEC produces the data for both printheads for the entire page. Therefore it has the entire line time in which to generate the dot data.

2.1.1 Letter Pages

A Letter page is 11 inches high. Assuming 1600 dpi and a 4 cm inter-page gap, there are 20,120 lines. This is a line rate of 10.06 KHz (a line time of 99.4 us).

The printhead is 14,080 dots wide. To calculate these dots within the line time, SoPEC requires a 140.8 MHz dot generation rate. Since SoPEC is run at 160 MHz and generates 1 dot per cycle, it is able to meet the Letter page requirement and cope with a small amount of stalling during the dot generation process.

2.1.2 A4 Pages

An A4 page is 297 mm high. Assuming 62.5 dots/mm and a 4 cm inter-page gap, there are 21,063 lines. This is a line rate of 10.54 KHz (a line time of 94.8 us).

The printhead is 14,080 dots wide. To calculate these dots within the line time, SoPEC requires a 148.5 MHz dot generation rate. Since SoPEC is run at 160 MHz and generates 1 dot per cycle, it is able to meet the A4 page requirement and cope with minimal stalling.

2.2 Transmitting the Dot Data to the Printhead

Assuming an n-color printhead, SoPEC must transmit 14,080 dots×n-bits within the line time. i.e. n× the data generation rate=n-bits×14,080 dots×10.54 KHz. Thus a 6-color printhead requires 874.2 Mb/sec.

The transmission time is further constrained by the fact that no data must be transmitted to the printhead segments during a window around the linesync pulse. Assuming a 1% overhead for linesync overhead (being very conservative), the required transmission bandwidth for 6 colors is 883 Mb/sec.

However, the data is transferred to both segments simultaneously. This means the longest time to transfer data for a line is determined by the time to transfer print data to the longest print segment. There are 9744 nozzles per color across a type7 printhead. We therefore must be capable of transmitting 6-bits×9744 dots at the line rate i.e. 6-bits×9744×10.54 KHz=616.2 Mb/sec. Again, assuming a 1% overhead for linesync overhead, the required transmission bandwidth to each printhead is 622.4 Mb/sec.

The connections from SoPEC to each segment consist of 2×1-bit data lines that operate at 320 MHz each. This gives a total of 640 Mb/sec.

Therefore the dot data can be transmitted at the appropriate rate to the printhead to meet the 30 ppm requirement.

2.3 Hardware Specification 2.3.1 Dot Generation Hardware

SoPEC has a dot generation pipeline that generates 1×6-color dot per cycle.

The LBD and TE are imported blocks from PEC1, with only marginal changes, and these are therefore capable of nominally generating 2 dots per cycle. However the rest of the pipeline is only capable of generating 1 dot per cycle.

2.3.2 Dot Transmission Hardware

SoPEC is capable of transmitting data to 2 printheads simultaneously. Connections are 2 data plus 1 clock, each sent as an LVDS 2-wire pair. Each LVDS wire-pair is run at 320 MHz.

SoPEC is in a 100-pin QFP, with 12 of those wires dedicated to the transmission of print data (6 wires per printhead segment). Additional wires connect SoPEC to the printhead, but they are not considered for the purpose of this discussion.

2.3.3 Within the Printhead

The dot data is accepted by the printhead at 2-bits per cycle at 320 MHz. 6 bits are available after 3 cycles at 320 MHz, and these 6-bits are then clocked into the shift registers within the printhead at a rate of 106 MHz. Thus the data movement within the printhead shift registers is able to keep up with the rate at which data arrives in the printhead.

3. 60 Ppm

This chapter describes the issues introduced by printing at 60 ppm, with the cases of 4, 5, and 6 colors in the printhead.

Figure 298:
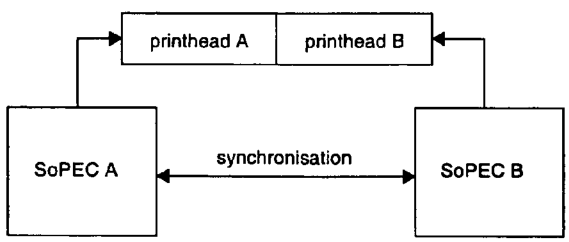

The arrangement is shown in FIG. 298.

3.1 Data Generation

A 60 ppm printer is 1 page per second. i.e

A4=21,063 lines. This is a line rate of 21.06 KHz (a line time of 47.4 us)

Letter=20,120 lines. This is a line rate of 20.12 KHz (a line time of 49.7 us)

If each SoPEC is responsible for generating the data for its specific printhead, then the worst case for dot generation is the largest printhead. The dot generation rate for the 3 printhead configurations is shown in Table 218.

TABLE 218

| Dot generation rate required | 5:5 | 6:4 | 7:3 |
|---|---|---|---|
| # dots in largest printhead segment | 6912 | 8328 | 9744 |
| Required dot generation rate | 145.6 MHz | 175.4 MHz | 205.2 MHz |

Since the preferred embodiment of SoPEC is run at 160 MHz, it is only able to meet the dot requirement rate for the 5:5 printhead, and not the 6:4 or 7:3 printheads.

3.2 Transmitting the Dot Data to the Printhead

Each SoPEC must transmit a printhead's worth of bits per color to the printhead per line. The transmission time is further constrained by the fact that no data must be transmitted to the printhead segments during a window around the linesync pulse. Assuming that the line sync overhead is constant regardless of print speed, then a 1% overhead at 30 ppm translates into a 2% overhead at 60 ppm.

The required transmission bandwidths are therefore as described in Table 219.

TABLE 219

| Transmission bandwidth required | 5:5 | 6:4 | 7:3 |
|---|---|---|---|
| # dots in largest printhead segment | 6912 | 8328 | 9744 |
| Transmission rate per color plane | 145.6 Mb/sec | 175.4 Mb/sec | 205.2 Mb/sec |
| With linesync overhead of 2% | 148.5 Mb/sec | 179 Mb/sec | 209.3 Mb/sec |
| Transmission rate for 4 colors | 594 Mb/sec | 716 Mb/sec | 837 Mb/sec |
| Transmission rate for 5 colors | 743 Mb/sec | 895 Mb/sec | 1047 Mb/sec |
| Transmission rate for 6 colors | 891 Mb/sec | 1074 Mb/sec | 1256 Mb/sec |

Since we have 2 lines to the printhead operating at 320 MHz each, the total bandwidth available is 640 Mb/sec. The existing connection to the printhead will only deliver data to a 4-color 5:5 arrangement printhead fast enough for 60 ppm. The connection speed in the preferred embodiment is not fast enough to support any other printhead or color configuration.

3.3 Within the Printhead

The dot data is currently accepted by the printhead at 2-bits per cycle at 320 MHz. Although the connection rate is only fast enough for 4 color 5:5 printing (see Section 3.2), the data must still be moved around in the shift registers once received.

The 5:5 printer 4-color dot data is accepted by the printhead at 2-bits per cycle at 320 MHz. 4 bits are available after 2 cycles at 320 MHz, and these 4-bits would then need to be clocked into the shift registers within the printhead at a rate of 160 MHz.

Since the 6:4 and 7:3 printhead configuration schemes require additional bandwidth etc., the printhead needs some change to support these additional forms of 60 ppm printing.

4 Examples of 60 ppm Architectures

Given the problems described in Section 3, the following issues have been addressed for 60 ppm printing based on the earlier SoPEC architecture:

rate of data generation transmission to the printhead shift register setup within the printhead.

Figure 299:
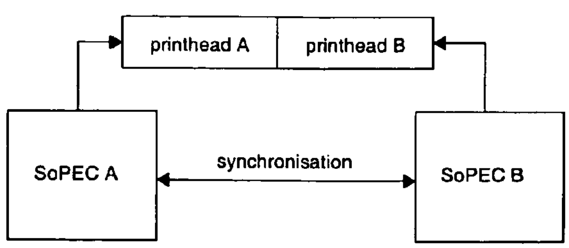
Figure 300:
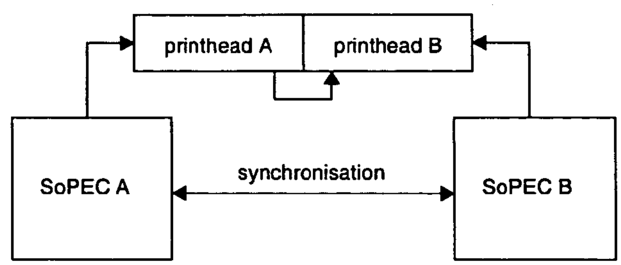
Figure 301:
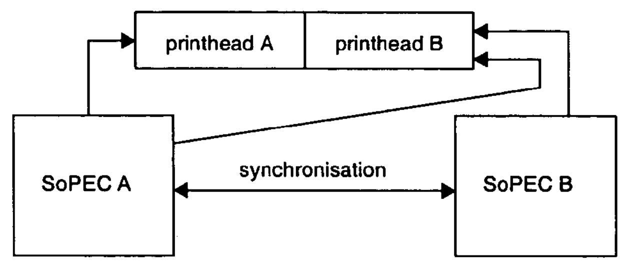

Assuming the current bi-lithic printhead, there are 3 basic classes of solutions to allow 60 ppm:

a. Each SoPEC generates dot data and transmits that data to a single printhead connection, as shown in FIG. 299.
b. One SoPEC generates data and transmits to the smaller printhead, but both SoPECs generate and transmit directly to the larger printhead, as shown in FIG. 300.
c. Same as (b) except that SoPEC A only transmits to printhead B via SoPEC B (i.e. instead of directly), as shown in FIG. 301

4.1 Class a: Each SoPEC Writes to a Printhead

This solution class is where each SoPEC generates dot data and transmits that data to a single printhead connection, as shown in FIG. 299. The existing SoPEC architecture is targeted at this class of solution.

Two methods of implementing a 60 ppm solution of this class are examined in the following sections.

4.1.1 Basic Speed Improvement

To achieve 60 ppm using the same basic architecture as currently implemented, the following needs to occur:

Increase effective dot generation-rate to 206 MHz (see Table 2)

Increase bandwidth to printhead to 1256 Mb/sec (see Table 3)

Increase bandwidth of printhead shift registers to match transmission bandwidth

It should be noted that even when all these speed improvements are implemented, one SoPEC will still be producing 40% more dots than it would be under a 5:5 scheme. i.e. this class of solution is not load balanced.

4.1.2 Connect Printheads Together to Appear Logically as a 5:5

In this scenario, each SoPEC generates data as if for a 5:5 printhead, and the printhead, even though it is physically a 5:5, 6:4 or 7:3 printhead, maintains a logical appearance of a 5:5 printhead.

There are a number of means of accomplishing this logical appearance, but they all rely on the two printheads being connected in some way, as shown in FIG. 300.

In this embodiment, the dot generation rate no longer needs to be addressed as only the 5:5 dot generation rate is required, and the current speed of 160 MHz is sufficient.

4.2 Class B: Two SoPECs Write Directly to a Single Printhead

This solution class is where one SoPEC generates data and transmits to the smaller printhead, but both SoPECs generate and transmit directly to the larger printhead, as shown in FIG. 301. i.e. SoPEC A transmits to printheads A and B, while SoPEC B transmits only to printhead B. The intention is to allow each SoPEC to generate the dot data for a type 5 printhead, and thereby to balance the dot generation load.

Since the connections between SoPEC and printhead are point-to-point, it requires a doubling of printhead connections on the larger printhead (one connection set goes to SoPEC A and the other goes to SoPEC B).

The two methods of implementing a 60 ppm solution of this class depend on the internals of the printhead, and are examined in the following sections.

4.2.1 Serial Load

Figure 302:
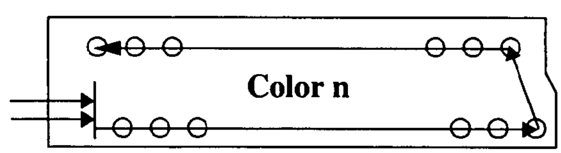

This is the scenario when the two connections on the printhead are connected to the same shift register. Thus the shift register can be driven by either SoPEC, as shown in FIG. 302.

The 2 SoPECs take turns (under synchronisation) in transmitting on their individual lines as follows:

SoPEC B transmits even (or odd) data for 5 segments

SoPEC A transmits data for 5-printhead A segments even and odd

SoPEC B transmits the odd (or even) data for 5 segments.

Meanwhile SoPEC A is transmitting the data for printhead A, which will be length 3, 4, or 5.

Note that SoPEC A is transmitting as if to a printhead combination of N:5−N, which means that the dot generation pathway (other than synchronization) is already as defined.

Although the dot generation problem is resolved by this scenario (each SoPEC generates data for half the page width and therefore it is load balanced), the transmission speed for each connection must be sufficient to deliver to a type7 printhead i.e. 1256 Mb/sec (see Table 3). In addition, the bandwidth of the printhead shift registers must be altered to match the transmission bandwidth.

4.2.2 Parallel Load

Figure 303:
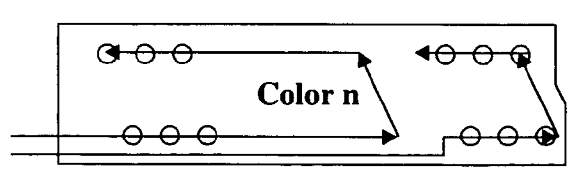

This is the scenario when the two connections on the printhead are connected to different shift registers, as shown in FIG. 303. Thus the two SoPECs can write to the printhead in parallel.

Note that SoPEC A is transmitting as if to a printhead combination of N:5−N, which means that the dot generation pathway is already as defined.

The dot generation problem is resolved by this scenario since each SoPEC generates data for half the page width and therefore it is load balanced.

Since the connections operate in parallel, the transmission speed required is that required to address 5:5 printing, i.e. 891 Mb/sec. In addition, the bandwidth of the printhead shift registers must be altered to match the transmission bandwidth.

4.3 Class C: Two SoPECs Write to a Single Printhead, One Indirectly

Figure 304:
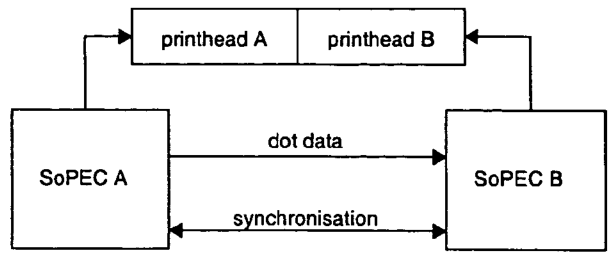

This solution class is the same as that described in Section 4.2 except that SoPEC A only transmits to printhead B via SoPEC B (i.e. instead of directly), as shown in FIG. 304 i.e. SoPEC A transmits directly to printhead A and indirectly to printhead B via SoPEC B, while SoPEC B transmits only to printhead B.

This class of architecture has the attraction that a printhead is driven by a single SoPEC, which minimizes the number of pins on a printhead. However it requires receiver connections on SoPEC B. It becomes particularly practical (costwise) if those receivers are currently unused (i.e. they would have been used for transmitting to the second printhead in a single SoPEC system). Of course this assumes that the pins are not being used to achieve the higher bandwidth.

Since there is only a single connection on the printhead, the serial load scenario as described in Section 4.2.1 would be the mechanism for transfer of data, with the only difference that the connections to the printhead are via SoPEC B.

Although the dot generation problem is resolved by this scenario (each SoPEC generates data for half the page width and therefore it is load balanced), the transmission speed for each connection must be sufficient to deliver to a type7 printhead i.e. 1256 Mb/sec. In addition, the bandwidth of the printhead shift registers must be altered to match the transmission bandwidth.

If SoPEC B provides at least a line buffer for the data received from SoPEC A, then the transmission between SoPEC A and printhead A is decoupled, and although the bandwidth from SoPEC B to printhead B must be 1256 Mb/sec, the bandwidth between the two SoPECs can be lower i.e. enough to transmit 2 segments worth of data (359 Mb/sec).

4.4 Additional Comments on Architectures A, B, and C

Architecture A has the problem that no matter what the increase in speed, the solution is not load balanced, leaving architecture B or C the more preferred solution where load-balancing between SoPEC chips is desirable or necessary. The main advantage of an architecture A style solution is that it reduces the number of connections on the printhead.

All architectures require the increase in bandwidth to the printhead, and a change to the internal shift register structure of the printhead.

4.5 Other Architectures

Other architectures can be used where different printhead modules are used. For example, in one embodiment, the dot data is provided from a single printed controller (SoPEC) via multiple serial links to a printhead. Preferably, the links in this embodiment each carry dot data for more than one channel (color, etc) of the printhead. For example, one link can carry CMY dot data from the printer controller and the other channel can carry K, IR and fixative channels.

5. Methods of Solution 5.1 Increasing Dot Generation Rate 5.1.1 Clock Speed Increase The clock frequency of SoPEC could be increased from 160 MHz, e.g. to 176 or 192 MHz. 192 MHz is convenient because it allows the simple generation of a 48 MHz clock as required for the USB cores.

Under architecture A, a 176 MHz clock speed would be sufficient to generate dot data for 5:5 and 6:4 printheads (see Table 2), but would not be sufficient to generate data for a 7:3 printhead.

With architectures B and C, any clock speed increase can be applied to increasing the inter-page gap, or the ability to cope with local stalling.

The cost of increasing the dot generation speed is:

- a slight increase in area within SoPEC
- an increase in time to achieve timing closure in SoPEC
- the possibility of the JPEG core being reduced to half speed if it can't be run at the target frequency (current speed rating on CU11 is 185 MHz)
- the possibility of the LEON core being reduced in speed if it can't be run at the target frequency
- an increase in power consumption thereby requiring a different (more expensive) package.

All of these factors are exacerbated by the proportion of speed increase. A 10% speed increase is within the JPEG core tolerance.

5.1.2 Load Sharing

Since a single SoPEC is incapable of generating the data required for a type6 or type 7 printhead, yet is capable of generating the data for a type5 printhead, it is possible to share the generation load by having each SoPEC generate the data for half the total printhead width.

Architectures B and C are specifically designed to load share dot generation.

The problem introduced by load sharing is that the data from both SoPEC A and SoPEC B must be transmitted to the larger printhead. See Section 4 for more details.

5.2 Increasing Transmission Bandwidth 5.2.1 Bandwidth increase with no change in connections for SoPEC At present there are 2 sets of connections from SoPEC to the printheads. Each set consists of 2 data plus a clock, running at twice the nominal SoPEC clock frequency i.e. 160 MHz gives 320 Mb/sec per channel.

If one of the clocks can be re-used as a data connection, it is possible to have up to 5 channels going to the printhead, as shown in Table 220.

TABLE 220

| SoPEC clock speed | Increasing # of Channels: 1 | 2 | 3 | 4 | 5 |
|---|---|---|---|---|---|
| 160 MHz | 320 Mb/sec | 640 Mb/sec | 960 Mb/sec | 1280 Mb/sec | 1600 Mb/sec |
| 176 MHz | 352 Mb/sec | 704 Mb/sec | 1056 Mb/sec | 1408 Mb/sec | 1760 Mb/sec |
| 192 MHz | 384 Mb/sec | 768 Mb/sec | 1152 Mb/sec | 1536 Mb/sec | 1920 Mb/sec |

For all clock speeds of SoPEC from 160 MHz to 192 MHz:

- Architecture A requires 4 channels on SoPEC and 4 on the printhead
- Architecture B serial requires 4 channels on SoPEC and 8 on the printhead
- Architecture B parallel requires 3 channels on SoPEC and 6 on the printhead.
- Architecture C requires 8 channels. Since SoPEC only has 5, this scenario would only be possible by allocating more pins to transmission.

5.2.2 Bandwidth Increase with Clock Forwarding Scheme

Assuming we keep our clock forwarding scheme, our I/O could run at 450 MHz, with resultant bandwidths as shown in Table 221.

TABLE 221

| Basic xmit rate | Increasing # of Channels at 450 MHz: 1 | 2 | 3 | 4 | 5 |
|---|---|---|---|---|---|
| 450 MHz | 450 Mb/sec | 900 Mb/sec | 1350 Mb/sec | 1800 Mb/sec | 2250 Mb/sec |

The following would then be true:

- Architecture A requires 3 channels on SoPEC and 3 on the printhead
- Architecture B serial requires 3 channels on SoPEC, and 6 on the printhead
- Architecture B parallel requires 2 channels on SoPEC, and 4 on the printhead.

Architecture C requires 6 channels and 6 on the printhead. Since SoPEC only has 5 (4+reuse of clock as data), this scenario would only be possible by allocating more pins to transmission.

5.2.3 Bandwidth Increase with Encoded Clock Scheme

Assuming our own flavour of SerDes, 600 Mb/sec might be possible.

To accomplish 600 Mb/sec, SerDes would be required on the printhead (extra PLL plus approx 1 $mm^2$ of logic). The fastest possible SerDes on 0.35 micron CMOS is in the order of 0.75 Gbit/sec, which gives an effective data rate per channel of 600 Mb/sec.

The resultant bandwidths as shown in Table 222.

TABLE 222

| | Increasing # of Channels at 600 MHz | | | | |
|---|---|---|---|---|---|
| Basic xmit rate | 1 | 2 | 3 | 4 | 5 |
| 600 MHz | 600 Mb/sec | 1200 Mb/sec | 1800 Mb/sec | 2400 Mb/sec | 3200 Mb/sec |

The following would then be true:

Architecture A requires 2 channels and 2 on the printhead

Architecture B serial could possibly get away with 2 channels on SoPEC (1200 vs 1256), and 4 on the printhead Architecture B parallel requires 2 channels on SoPEC, and 4 on the printhead.

Architecture C requires 4 channels and 4 on the printhead.

Going faster with SerDes with IBM-specific macros does not give any benefits because:

the printhead is limited due to 0.35 micron process there is a significant cost for the SerDes core plus a royalty per chip it would require a change of package to flip-chip style, more than doubling the cost of SoPEC there are physical constraints on the connection between SoPEC and the printhead cartridge, esp in the 3R printer application.

Figure 305:
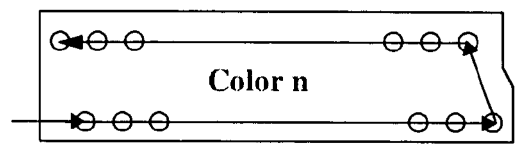
Figure 306:
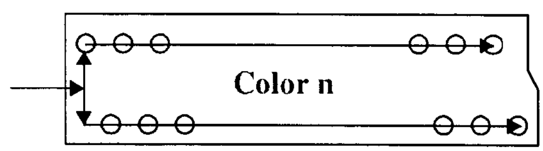

5.3 Bandwidth within the Printhead 5.3.1 Shift Registers that Shift in 1 Direction Instead of having the odd and even nozzles connected by a single shift register, as is currently done and shown in FIG. 305, it is possible to place the even and odd nozzles on separate shift registers, as shown in FIG. 306.

By having the odd and even nozzles on different shift registers, the 6-bits of data is still received at the high rate (e.g. 320 MHz), but the shift register rate is halved, since each shift register is written to half as frequently. Thus it is possible to collect 12 bits (an odd and even dot), then shift them into the 12 shift registers (6 even, 6 odd) at 80 MHz (or whatever appropriate).

The effect is that data for even and odd dots has the same sense (i.e. always increasing or decreasing depending on the orientation of the printhead to the paper movement). However for the two printhead segments (and therefore the 2 SoPECs), the sense would be opposite (i.e. the data is always shifting towards the join point at the centre of the printhead).

As long as each SoPEC is responsible for writing to a single printhead segment (in a 5:5 printer this will be the case), then no change is required to SoPEC's DWU or PHI given the shift register arrangement in FIG. 306. The LLU needs to change to allow reading of odd and even data in an interleaved fashion (in the preferred form, all evens are read before all odds or vice versa). Additionally, the LLU would need to be changed be to permit the data rate required for data transmission.

However testing the integrity of the shift registers is of concern since there is no path back.

5.3.1.1 Interwoven Shift Registers

Figure 307:
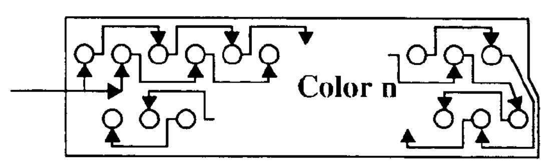

Instead of having odd and even dots on separate shift registers (as described in Section 5.3.1), it is possible to interweave the shift registers to keep the same sense of data transmission (e.g. from within the LLU), but keep the CMOS testing and lower speed shift-registers. Thus it is possible to collect 12 bits (representing two dots), then shift them into the 12 shift registers at 80 MHz (or as appropriate). The arrangement is shown FIG. 307.

The interweaving requires more wiring that the solution described in Section 5.3.1, however it has the following advantages:

The DWU is unchanged.

The LLU stays the same in so far as the even dots are generated first, then the odd dots (or vice versa). The LLU still needs the bandwidth change for transmission.

A shift register test path is enabled.

The relative dot generation and bandwidth required is lower for A4 printing due to only half of the off-page dots needing to be sent.

5.4 60 Ppm Bi-Lithic Summary 60 ppm printing using bi-lithic printheads is risky due to increased CPU requirements, increased numbers of pins, and the high data rates at which the transmission occurs. It also relies on stitching working correctly on the printheads to allow the creation of long printheads over several reticles.

Therefore an alternative to 60 ppm printing via bi-lithic printheads should be found.

Linking Printheads

6. Basic Concepts

Figure 308:

The basic idea of the linking printhead is that we create a printhead from tiles each of which can be fully formed within the reticle. The printheads are linked together as shown in FIG. 308 to form the page-width printhead. For example, an A4/Letter page is assembled from 11 tiles.

The printhead is assembled by linking or butting up tiles next to each other. The physical process used for linking means that wide-format printheads are not readily fabricated (unlike the 21 mm tile). However printers up to around A3 portrait width (12 inches) are expected to be possible.

The nozzles within a single segment are grouped physically to reduce ink supply complexity and wiring complexity. They are also grouped logically to minimize power consumption and to enable a variety of printing speeds, thereby allowing speed/power consumption trade-offs to be made in different product configurations.

Each printhead segment contains a constant number of nozzles per color (currently 1280), divided into half (640) even dots and half (640) odd dots. If all of the nozzles for a single color were fired at simultaneously, the even and odd dots would be printed on different dot-rows of the page such that the spatial difference between any even/odd dot-pair is an exact number of dot lines. In addition, the distance between a dot from one color and the corresponding dot from the next color is also an exact number of dot lines.

The exact distance between even and odd nozzle rows, and between colors will vary between embodiments, so it is preferred that these relationships be programmable with respect to SoPEC.

6.1 Data Interface

Each printhead segment has minimum signal pins to reduce cost.

TABLE 223

Signal Pins

| Name | Direction | Pins | Description | Speed |
|---|---|---|---|---|
| Clk | Input | 2 × LDVS Receivers with no termination | Clock to sample Data, and for internal processing. | 288 MHz |
| Data | Input | 2 × LDVS Receivers with no termination | Data is a 8b:10b encoded data stream. This stream contains add data and command to the print head. | 288 MHz |
| RstL | Input | 1 × 3.3 V CMOS Input | Active low reset. Puts all control registers into a known test, and disables printing. | DC |
| Do | Output | 1 × 3.3 CMOS Tristate Output | Do is a general purpose output, usually used to read register values back from the print head. Default state is tristate. | 28.8 MHz |

6.1.1 Building a 30 ppm printer with SoPEC

Figure 309:
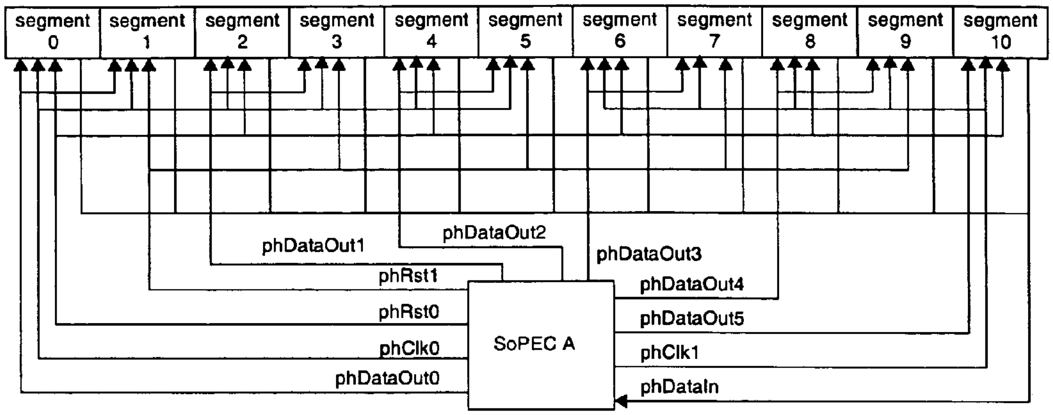

When II segments are joined together to create a 30 ppm printhead, a single SoPEC will connect to them as shown in FIG. 309 below.

Notice that each phDataOutn lvds pair goes to two adjacent printhead segments, and that each phClkn signal goes to 5 or 6 printhead segments. Each phRstn signal goes to alternate printhead segments.

6.1.2 Assigning Ids to the Printheads for Further Communication

SoPEC drives phRst0 and phRst1 to put all the segments into reset.

SoPEC then lets phRst1 come out of reset, which means that all the segment 1, 3, 5, 7, and 9 are now alive and are capable of receiving commands.

SoPEC can then communicate with segment 1 by sending commands down phDataOut0, and program the segment 1 to be id 1. It can communicate with segment 3 by sending commands down phDataOut1, and program segment 3 to be id 1. This process is repeated until all segments 1, 3, 5, 7, and 9 are assigned ids of 1. The id only needs to be unique per segment addressed by a given phDataOutn line.

SoPEC can then let phRst0 come out of reset, which means that segments 0, 2, 4, 6, 8, and 10 are all alive and are capable of receiving commands. The default id after reset is 0, so now each of the segments is capable of receiving commands along the same pDataOutn line.

6.1.3 Sending Commands to the Printhead

SoPEC needs to be able to send commands to individual printheads, and it does so by writing to particular registers at particular addresses.

The exact relationship between id and register address etc. is yet to be determined, but at the very least it will involve the CPU being capable of telling the PHI to send a command byte sequence down a particular phDataOutn line.

One possibility is that one register contains the id (possibly 2 bits of id). Further, a command may consist of:

register write register address data

A 10-bit wide fifo can be used for commands in the PHI.

6.1.4 Building a 60 ppm Printer with 2 SoPECs

Figure 310:
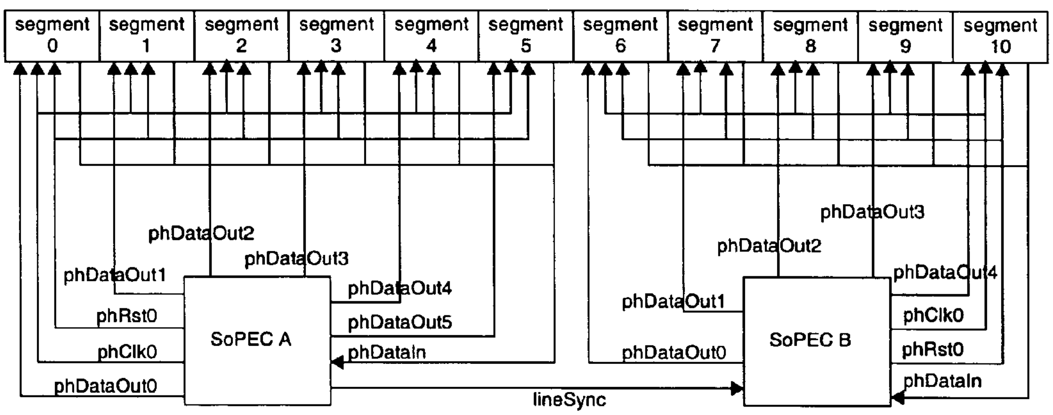

When 11 segments are joined together to create a 60 ppm printhead, the 2 SoPECs will connect to them as shown in FIG. 310 below.

In the 60 ppm case only phClk0 and phRst0 are used (phClk1 and phRst1 are not required). However note that lineSync is required instead. It is possible therefore to reuse phRst1 as a lineSync signal for multi-SoPEC synchronisation. It is not possible to reuse the pins from phClk1 as they are lvds. It should be possible to disable the lvds pads of phClk1 on both SoPECs and phDataOut5 on SoPEC B and therefore save a small amount of power.

6.2 Segment Options

This section details various classes of printhead that can be used. With the exception of the PEC1 style slope printhead, SoPEC is designed to be capable of working with each of these printhead types at full 60 ppm printing speed.

6.2.1 A-Chip/A-Chip

This printhead style consists of identical printhead tiles (type A) assembled in such a way that rows of nozzles between 2 adjacent chips have no vertical misalignment.

Figure 311:
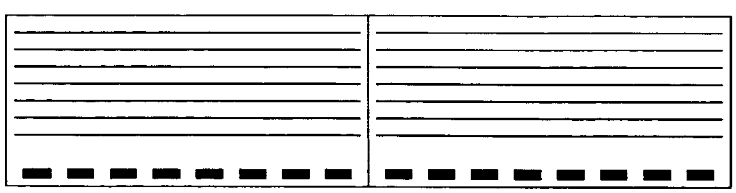

The most ideal format for this kind of printhead from a data delivery point of view is a rectangular join between two adjacent printheads, as shown in FIG. 311. However due to the requirement for dots to be overlapping, a rectangular join results in a it results in a vertical stripe of white down the join section since no nozzle can be in this join region. A white stripe is not acceptable, and therefore this join type is not acceptable.

Figure 312:
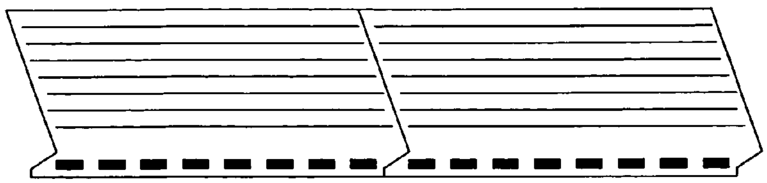
Figure 313:
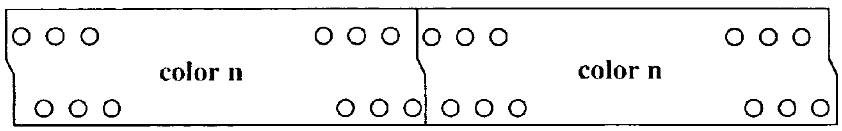

FIG. 312 shows a sloping join similar to that described for the bi-lithic printhead chip, and FIG. 313 is a zoom in of a single color component, illustrating the way in which there is no visible join from a printing point of view (i.e. the problem seen in FIG. 311 has been solved).

6.2.2 A-Chip/A-Chip Growing Offset

Figure 314:
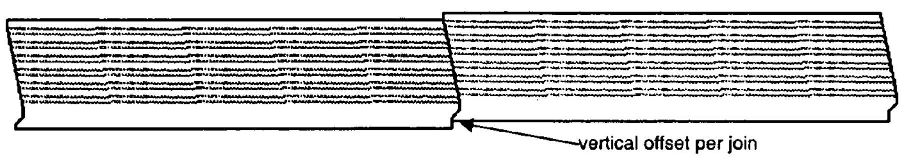

The A-chip/A-chip setup described in Section 6.2.1 requires perfect vertical alignment. Due to a variety of factors (including ink sealing) it may not be possible to have perfect vertical alignment. To create more space between the nozzles, A-chips can be joined with a growing vertical offset, as shown in FIG. 314.

The growing offset comes from the vertical offset between two adjacent tiles. This offset increases with each join. For example, if the offset were 7 lines per join, then an 11 segment printhead would have a total of 10 joins, and 70 lines.

To supply print data to the printhead for a growing offset arrangement, the print data for the relevant lines must be present. A simplistic solution of simply holding the entire line of data for each additional line required leads to increased line store requirements. For example, an 11 segment×1280-dot printhead requires an additional 11×1280-dots×6-colors per line i.e. 10.3125 Kbytes per line. 70 lines requires 722 Kbytes of additional storage. Considering SoPEC contains only 2.5 MB total storage, an additional 722 Kbytes just for the offset component is not desirable. Smarter solutions require storage of smaller parts of the line, but the net effect is the same: increased storage requirements to cope with the growing vertical offset.

6.2.3 A-Chip/A-Chip Aligned Nozzles, Sloped Chip Placement

The problem of a growing offset described in Section 6.2.2 is that a number of additional lines of storage need to be kept, and this number increases proportional to the number of joins i.e. the longer the printhead the more lines of storage are required.

However, we can place each chip on a mild slope to achieve a a constant number of printlines regardless of the number of joins. The arrangement is similar to that used in PEC1, where the printheads are sloping. The difference here is that each printhead is only mildly sloping, for example so that the total number of lines gained over the length of the printhead is 7. The next printhead can then be placed offset from the first, but this offset would be from the same base. i.e. a printhead line of nozzles starts addressing line n, but moves to different lines such that by the end of the line of nozzles, the dots are 7 dotlines distant from the startline. This means that the 7-line offset required by a growing-offset printhead can be accommodated.

Figure 315:
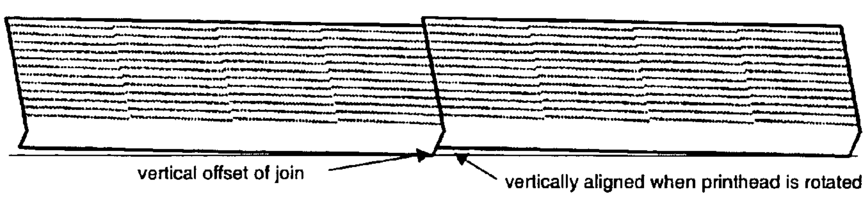

The arrangement is shown in FIG. 315.

If the offset were 7 rows, then a total of 72.2 KBytes are required to hold the extra rows, which is a considerable saving over the 722 Kbytes required by the solution in Section 6.2.2.

Note also, that in this example, the printhead segments are vertically aligned (as in PEC1). It may be that the slope can only be a particular amount, and that growing offset compensates for additional differences—i.e. the segments could in theory be misaligned vertically. In general SoPEC must be able to cope with vertically misaligned printhead segments as defined in Section 6.2.2.

The question then arises as to how much slope must be compensated for at 60 ppm speed. Basically—as much as can comfortably handled without too much logic. However, amounts like 1 in 256 (i.e. 1 in 128 with respect to a half color), or 1 in 128 (i.e. 1 in 64 with respect to a half color) must be possible. Greater slopes and weirder slopes (e.g. 1 in 129 with respect to a half color) must be possible, but with a sacrifice of speed i.e. SoPEC must be capable even if it is a slower print.

Note also that the nozzles are aligned, but the chip is placed sloped. This means that when horizontal lines are attempted to be printed and if all nozzles were fired at once, the effect would be lots of sloped lines. However, if the nozzles are fired in the correct order relative to the paper movement, the result is a straight line for n dots, then another straight line for n dots 1 line up.

6.2.3.1 PEC1 Style Slope

This is the physical arrangement used by printhead segments addressed by PEC1. Note that SoPEC is not expected to work at 60 ppm speed with printheads connected in this way. However it is expected to work and is shown here for completeness, and if tests should prove that there is no working alternative to the 21 mm tile, then SoPEC will require significant reworking to accommodate this arrangement at 60 ppm.

Figure 316:
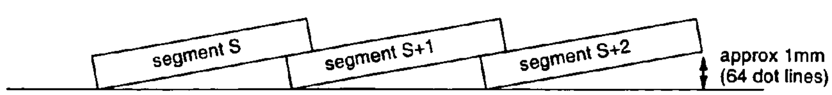

In this scheme, the segments are joined together by being placed on an angle such that the segments fit under each other, as shown in FIG. 316. The exact angle will depend on the width of the Memjet segment and the amount of overlap desired, but the vertical height is expected to be in the order of 1 mm, which equates to 64 dot lines at 1600 dpi.

Figure 317:
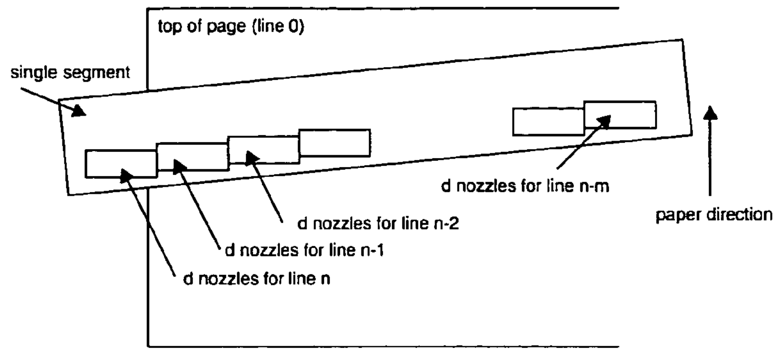

FIG. 317 shows more detail of a single segment in a multi-segment configuration, considering only a single row of nozzles for a single color plane. Each of the segments can be considered to produce dots for multiple sets of lines. The leftmost d nozzles (d depends on the angle that the segment is placed at) produce dots for line n, the next d nozzles produce dots for line n−1, and so on.

6.2.4 A-Chip/A-Chip with Inter-Line Slope Compensation

This is effectively the same as described in Section 6.2.3 except that the nozzles are physically arranged inside the printhead to compensate for the nozzle firing order given the desire to spread the power across the printhead. This means that one nozzle and its neighbor can be vertically separated on the printhead by 1 printline. i.e. the nozzles don't line up across the printhead. This means a jagged effect on printed "horizontal lines" is avoided, while achieving the goal of averaging the power.

Figure 318:

The arrangement of printheads is the same as that shown in FIG. 315. However the actual nozzles are slightly differently arranged, as illustrated via magnification in FIG. 318.

6.2.5 A-Chip/B-Chip

Another possibility is to have two kinds of printing chips: an A-type and a B-type. The two types of chips have different shapes, but can be joined together to form long printheads. A parallelogram is formed when the A-type and B-type are joined.

Figure 319:
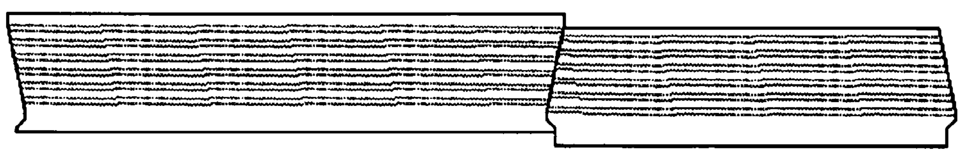

The two types are joined together as shown in FIG. 319.

Figure 320:
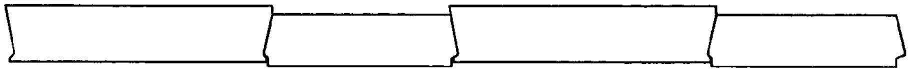

Note that this is not a growing offset. The segments of a multiple-segment printhead have alternating fixed vertical offset from a common point, as shown in FIG. 320.

If the vertical offset from a type-A to a type-B printhead were n lines, the entire printhead regardless of length would have a total of n lines additionally required in the line store. This is certainly a better proposition than a growing offset).

However there are many issues associated with an A-chip/B-chip printhead. Firstly, there are two different chips i.e. an A-chip, and a B-chip. This means 2 masks, 2 developments, verification, and different handling, sources etc. It also means that the shape of the joins are different for each printhead segment, and this can also imply different numbers of nozzles in each printhead. Generally this is not a good option.

6.2.6 A-B Chip with SoPEC Compensation

The general linking concept illustrated in the A-chip/B-chip of Section 6.2.5 can be incorporated into a single printhead chip that contains the A-B join within the single chip type.

Figure 321:
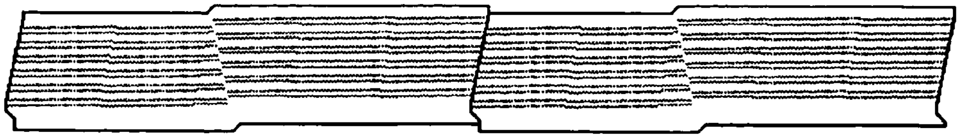

This kind of joining mechanism is referred to as the A-B chip since it is a single chip with A and B characteristics. The two types are joined together as shown in FIG. 321.

This has the advantage of the single chip for manipulation purposes.

Note that as with the A-chip/B-chip of Section 6.2.5, SoPEC must compensate for the vertical misalignment within the printhead. The amount of misalignment is the amount of additional line storage required.

Note that this kind of printhead can effectively be considered similar to the mildly sloping printhead described in Section 6.2.3 except that the step at the discontinuity is likely to be many lines vertically (on the order of 7 or so) rather than the 1 line that a gentle slope would generate.

6.2.7 A-B Chip with Printhead Compensation

This kind of printhead is where we push the A-B chip discontinuity as far along the printhead segment as possible—right to the edge. This maximises the A part of the chip, and minimizes the B part of the chip. If the B part is small enough, then the compensation for vertical misalignment can be incorporated on the printhead, and therefore the printhead appears to SoPEC as if it was a single typeA chip. This only makes sense if the B part is minimized since printhead real-estate is more expensive at 0.35 microns rather than on SoPEC at 0.18 microns.

Figure 322:
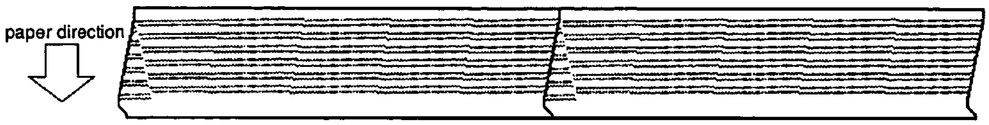
Figure 323:
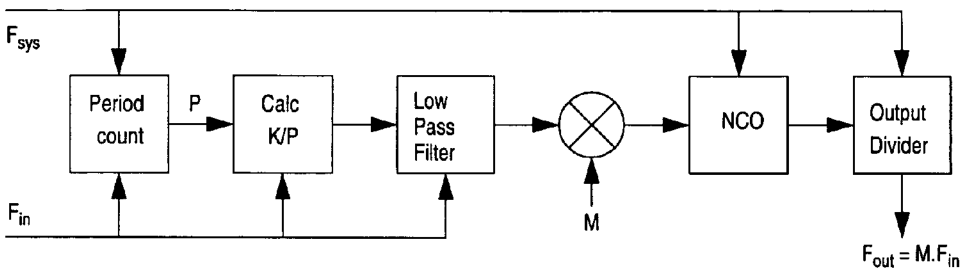
Figure 324:
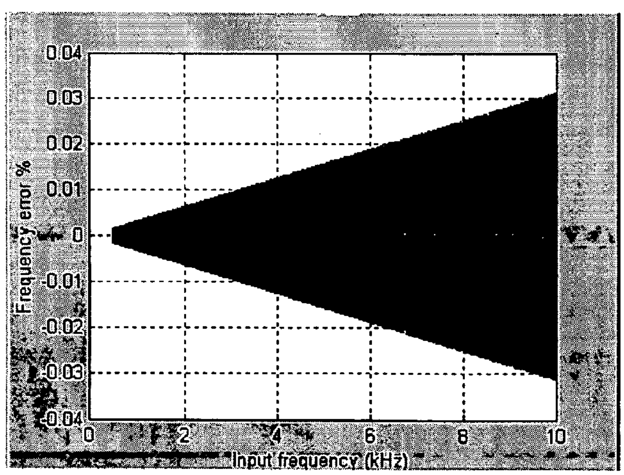
Figure 325:
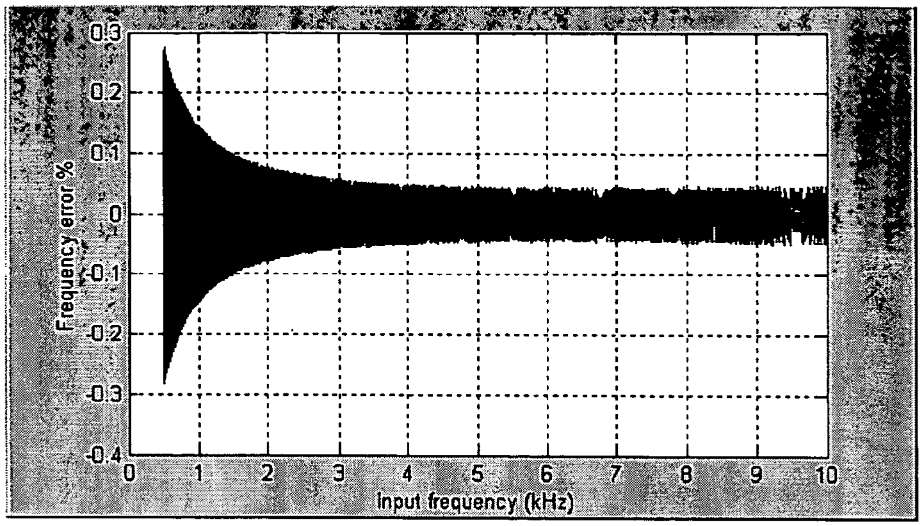

The arrangement is shown in FIG. 322.

Note that since the compensation is accomplished on the printhead, the direction of paper movement is fixed with respect to the printhead. This is because the printhead is keeping a history of the data to apply at a later time and is only required to keep the small amount of data from the B part of the printhead rather than the A part.

6.2.8 Various Combinations of the Above

Within reason, some of the various linking methods can be combined. For example, we may have a mild slope of 5 over the printhead, plus an on-chip compensation for a further 2 lines for a total of 7 lines between type A chips. The mild slope of 5 allows for a 1 in 128 per half color (a reasonable bandwidth increase), and the remaining 2 lines are compensated for in the printheads so do not impact bandwidth at all.

However we can assume that some combinations make less sense. For example, we do not expect to see an A-B chip with a mild slope.

We are currently aiming for the arrangement shown in Section 6.2.7. However if this proves difficult we will aim for a combination of Section 6.2.7 and Section 6.2.3.

6.2.9 Redundancy

SoPEC also caters for printheads and printhead modules that have redundant nozzle rows. The idea is that for one print line, we fire from nozzles in row x, in the next print line we fire from the nozzles in row y, and the next print line we fire from row x again etc. Thus, if there are any defective nozzles in a given row, the visual effect is halved since we only print every second line from that row of nozzles. This kind of redundancy requires SoPEC to generate data for different physical lines instead of consecutive lines, and also requires additional dot line storage to cater for the redundant rows of nozzles.

Redundancy can be present on a per-color basis. For example, K may have redundant nozzles, but C, M, and Y have no redundancy.

In the preferred form, we are concerned with redundant row pairs, i.e. rows 0+1 always print odd and even dots of the same colour, so redundancy would require say rows 0+1 to alternate with rows 2+3.

To enable alternating between two redundant rows (for example), two additional registers REDUNDANT_ROWS_0[7:0] and REDUNDANT_ROWS_1[7:0] are provided at addresses 8 and 9. These are protected registers, defaulting to 0x00. Each register contains the following fields:

Bits [2:0]—RowPairA (000 means rows 0+1, 001 means rows 2+3 etc)

Bits [5:3]—RowPairB (000 means rows 0+1, 001 means rows 2+3 etc)

Bit [6]—toggleAB (0 means loadA/fireB, 1 means loadB/fireA)

Bit [7]—valid (0 means ignore the register).

The toggle bit changes state on every FIRE command; SoPEC needs to clear this bit at the start of a page.

The operation for redundant row printing would use similar mechanism to those used when printing less than 5 colours:

with toggleAB=0, the RowPairA rows would be loaded in the DATA_NEXT sequence, but the RowPairB rows would be skipped. The TDC FIFO would insert dummy data for the RowPairB rows. The RowPairA rows would not be fired, while the RowPairB rows would be fired.

with toggleAB=1, the RowPairB rows would be loaded in the DATA_NEXT sequence, but the RowPairA rows would be skipped. The TDC FIFO would insert dummy data for the RowPairA rows. The RowPairB rows would not be fired, while the RowPairA rows would be fired.

In other embodiments, one or more redundant rows can also be used to implement per-nozzle replacement in the case of one or more dead nozzles. In this case, the nozzles in the redundant row only pirnt dots for positions where a nozzle in the main row is defective. This may mean that only a relatively small numbers of nozzles in the redundant row ever print, but this setup has the advantage that two failed printhead modules (ie, printhead modules with one or more defective nozzles) can be used, perhaps mounted alongside each other on the one printhead, to provide gap-free printing. Of course, if this is to work correctly, it is important to select printhead modules that have different defective nozzles, so that the operative nozzles in each printhead module can compensate for the dead nozzle or nozzles in the other.

Whilst probably of questionable commercial usefullness, it is also possible to have more than one additional row for redundancy per color. It is also possible that only some rows have redundant equivalents. For example, black might have a redundant row due to its high visibility on white paper, whereas yellow might be a less likely candidate since a defective yellow nozzle is much less likely to produce a visually objectionable result.

7. DWU

To accomplish the various printhead requirements described in Section 6, the DWU specification must be updated. This document assumes version 3.3 of the SoPEC spec as a starting reference.

The changes to the DWU are minor and basically result in a simplification of the unit.

7.1 Nozzle Skew

The preferred data skew block copes with a maximum skew of 24 dots by the use of 12 12-bit shift registers (one shift register per half-color). This can be improved where desired; to cope with a 64 dot skew (i.e. 12 32-bit shift registers), for example.

7.2 Ascending Only

The DWU currently has an ability to write data in an increasing sense (ascending addresses) or in a decreasing sense (descending addresses). So for example, registers such as ColorLineSense specify direction for a particular half-color.

The DWU now only needs to deal with increasing sense only.

8. LLU

To accomplish the various printhead requirements described in Section 6, the LLU specification must be updated. This document assumes version 3.3 of the SoPEC spec as a starting reference.

The LLU needs to provide data for up to eleven printhead segments. It will read this data out of fifos written by the DWU, one fifo per half-color.

The PHI needs to send data out over 6 data lines, where each data line may be connected to up to two segments. When printing A4 portrait, there will be II segments. This means five of the datalines will have two segments connected and one will have a single segment connected. (I say 'one' and not 'the last', since the singly used line may go to either end, or indeed into the middle of the page.) In a dual SoPEC system, one of the SoPECs will be connected to 5 segments, while the other is connected to 6 segments.

Focusing for a moment on the single SoPEC case. SoPEC maintains a data generation rate of 6 bpc throughout the data calculation path. If all six data lines broadcast for the entire duration of a line, then each would need to sustain 1 bpc to match SoPEC's internal processing rate. However, since there are eleven segments and six data lines, one of the lines has only a single segment attached. This dataline receives only half as much data during each print line as the other datalines. So if the broadcast rate on a line is 1 bpc, then we can only output at a sustained rate of 5.5 bpc, thus not matching the internal generation rate. These lines therefore need an output rate of at least 6/5.5 bpc. However, from an earlier version of the plan for the PHI and printheads the dataline is set to transport data at 6/5 bpc, which is also a convenient clock to generate and thus has been retained.

So, the datalines carry over one bit per cycle each. While their bandwidth is slightly more than is needed, the bandwidth needed is still slightly over 1 bpc, and whatever prepares the data for them must produce the data at over 1 bpc. To this end the LLU will target generating data at 2 bpc for each data line.

The LLU will have six data generators. Each data generator will produce data from either a single segment, or two segments. In those cases where a generator is servicing multiple segments the data for one entire segment is generated before the next segment is generated. Each data generator will have a basic data production rate of 2 bpc, as discussed above. The data generators need to cater to variable segment width. The data generators will also need to cater for the full range of printhead designs currently considered plausible. Dot data is generated and sent in increasing order.

8.1 Printhead Flexibility Issues

The full range of printheads is discussed in Section 6. What has to be dealt with will be summarised here.

The generators need to be able to cope with segments being vertically offset relative to each other. This could be due to poor placement and assembly techniques, or due to each printhead being placed slightly above or below the previous printhead.

They need to be able to cope with the segments being placed at mild slopes. The slopes being discussed and thus planned for are on the order of 5-10 lines across the width of the printhead.

It is necessary to cope with printhead that have a single internal step of 3-10 lines thus avoiding the need for continuous slope. To solve this we will reuse the mild sloping facility, but allow the distance stepped back to be arbitrary, thus it would be several steps of one line in most mild sloping arrangements and one step of several lines in a single step printhead.

SoPEC should cope with a broad range of printhead sizes. It is likely that the printheads used will be 1280 dots across. Note this is 640 dots/nozzles per half color.

8.2 Comments with Respect to the Current Spec

- If the printheads attempt to read from data that the DWU has not written (such as negative line addresses) this data will be pre-zeroed by some means prior to the print.
- The basic diagram of the block can be altered. For example, instead of Odd/Even generators, there can be just six generators, where each generator processes all colours for the segments under its control.
- Registers list and descriptions have changed to support different LLU design. The new registers are discussed below.

8.3 New Design 8.3.1 Dot Generator

A dot generator will process zero or one or two segments, based on a two bit configuration. When processing a segment it will process the twelve half colors in order, color zero even first, then color zero odd, then color 1 even, etc. The LLU will know how long a segments is, and we will assume all segments are the same length.

To process a color of a segment the generator will need to load the correct word from dram. Each color will have a current base address, which is a pointer into the dot fifo for that color. Each segment has an address offset, which is added to the base address for the current color to find the first word of that colour. For each generator we maintain a current address value, which is operated on to determine the location future reads occur from for that segment. Each segment also has a start bit index associated with it that tells it where in the first word it should start reading data from.

A dot generator will hold a current 256 bit word it is operating on. It maintains a current index into that word. This bit index is maintained for the duration of one color (for one segment), it is incremented whenever data is produced and reset to the segment specified value when a new color is started. 2 bits of data are produced for the PHI each cycle (subject to being ready and handshaking with the PHI).

From the start of the segment each generator maintains a count, which counts the number of bits produced from the current line. The counter is loaded from a start-count value (from a table indexed by the half-color being processed) that is usually set to 0, but in the case of the A-B printhead, may be set to some other non-zero value. The LLU has a slope span value, which indicates how many dots may be produced before a change of line needs to occur. When this many dots have been produced by a dot generator, it will load a new data word and load 0 into the slope counter. The new word may be found by adding a dram address offset value held by the LLU. This value indicates the relative location of the new word; the same value serves for all segment and all colours. When the new word is loaded, the process continues from the current bit index, if bits 62 and 63 had just been read from the old word (prior to slope induced change) then bits 64 and 65 would be used from the newly loaded word.

When the current index reaches the end of the 256 bits current data word, a new word also needs to be loaded. The address for this value can be found by adding one to the current address.

It is possible that the slope counter and the bit index counter will force a read at the same time. In this case the address may be found by adding the slope read offset and one to the current address.

Observe that if a single handshaking is use between the dot generators and the PHI then the slope counter as used above is identical between all 6 generators, i.e. it will hold the same counts and indicate loads at the same times. So a single slope counter can be used. However the read index differs for each generator (since there is a segment configured start value. This means that when a generator encounters a 256-bit boundary in the data will also vary from generator to generator.

8.3.2 Line Handling

After all of the generators have calculated data for all of their segments the LLU should advance a line. This involves signalling the consumption to the DWU, and incrementing all the base address pointers for each color. This increment will generally be done by adding an address offset the size of a line of data. However, to support a possible redundancy model for the printheads, we may need to get alternate lines from different offsets in the fifo. That is, we may print alternate lines on the page from different sets of nozzles in the print head. This is presented as only a single line of nozzles to the PHI and LLU, but the offset of that line with respect to the leading edge of the printhead changes for alternating line. To support this incrementing the LLU stores two address offsets. These offsets are applied on alternate lines. In the normal case both these offsets will simply be programmed to the same value, which will equate to the line size.

The fill level remains as currently described in 31.7.5.

The LLU allows the current base addresses for each color to be writeable by the CPU. These registers will then be set to point to appropriate locations with respect to the starting location used by the DWU, and the design of the printhead in question.

8.3.3 Configuration

Each data generator needs

A 2 bit description indicating how many segments it is dealing with.

Each segment (allowing for 12) requires:

A bit index (2 bit aligned)

A dram address offset. (indicates the relative location of the first address to be loaded to the current base address for that color Each page/printhead configuration requires:

segment width (from the perspective of half colors so eg 640, not 1280)

slope span (dots counted before stepping)

start count [×12] (loaded into the slope counter at the start of the segment), typically 0 slope step dram offset (distance to new word when a slope step occurs)

current color base address [x12] (writeable work registers)

line dram offset [x2] (address offset for current color base address for each alternating line)

The following current registers remain:

Reset

Go

FifoReadThreshold,

FillLevel (work reg)

Note each generator is specifically associated with two entries in the segment description tables. (So generator 0->0&1, 1->2&3, etc.)

The 2 bits indicating how many segments can be a counter, or just a mask. The latter may contribute to load balancing in some cases.

8.3.4 State

Data generation involves a current nozzle count a current slope count a current data word.

a current index.

a current segment (of the two to choose from)

future data words, pre-loaded by some means.

8.3.5 Address Calculation and DIU Issues.

Firstly a word on bandwidth. The old LLU needed to load the full line of data once, so it needed to process at the same basic rate as the rest of SoPEC, that is 6 bpc. The new LLU loads data based on individual colors for individual segments. A segment probably has 640 nozzles in it. At 256 bits per read, this is typically three reads. However obviously not all of what is read is used. At best we use all of two 256-bit reads, and 128 bits of a third read. This results in a ⅚ wastage. So instead of 6 bpc will would need to average 7.2 bpc over the line. If implemented, mild sloping would make this worse.

8.3.6 Address Calculation

Dram reads are not instantaneous. As a result, the next word to be used by a generators should attempt to be loaded in advance. How do we do this? Consider a state the generator may be in. Say it has the address of the last word we loaded. It has the current index, into that word, as well as the current count versus the segment width and the current count used to handle sloping. By inspecting these variables we can readily determine if the next word to be read for a line we are generating will be read because the slope count was reached or a 256-bit boundary was reached by the index, or both, or because the end of the segment was reached. Since we can make that determination, it is simple to calculate now the next word needed, instead of waiting until it is actually needed. Note with the possibility that the end of the segment will be reached before, or at, either slope or 256-bit effect, in which case the next read in based on the next color (or the next segment).

If that were all we did, it would facilitate double buffering, because whenever we loaded 256 bit data value into the generator we can deduce from the state at that time the next location to read from and start loading it.

Given the potentially high bandwidth requirements for this block it is likely that a significant over-allocation of DIU slots would be needed to ensure timely delivery. This can be avoided by using more buffering as is done for the CFU.

On this topic, if the number of slots allocated is sufficiently high, it may be required that the LLU be able to access every second slot in a particular programming of the DIU. For this to occur, it needs to be able to lodge its next request before it has completed processing the prior request. i.e. after the ack it must be able to request instead of waiting for all the valids like the rest of the PEP units do.

Consider having done the advance load as described above. Since we know why we did the load, it is a simple matter to calculate the new index and slope count and dot count (vs printhead width) that would coincide with it being used. If we calculate these now and store them separately to the ones being used directly by the data generator, then we can use them to calculate the next word again. And continue doing this until we ran out of buffer allocation, at which point we could hold these values until the buffer was free.

Thus if a certain size buffer were allocated to each data generator, it would be possible for it to fill it up with advance reads, and maintain it in that state if enough bandwidth was allocated.

One point not yet considered is the end-of-line. When the lookahead state says we have finished a color we can move to the next, and when it says we have finished the first of two segments, we can move to the next. But when we finished reading the last data of our last segment (whether two or one) we need to wait for the line based values to update before we can continue reading. This could be done after the last read, or before the first read which ever is easier to recognize. So, when the read ahead for a generator realises it needs to start a new line, it should set a bit. When all the non-idle generators have reached this start then the line advance actions take place. These include updating the color base address pointers, and pulsing the DWU.

The above implies a fifo for each generator, of $(3\text{-}4)_{x256}$ bits, and this may be a reasonable solution. It may in fact be smaller to have the advance data read into a common storage area, such as 1×6×256 bit for the generators, and 12×256 bit for the storage area for example.

9. PHI

9.1 Overview

The PHI has six input data lines and it needs to have a local buffer for this data. The data arrives at 2 bits per cycle, needs to be stored in multiples of 8 bits for exporting, and will need to buffer at least a few of these bytes to assist the LLU, by making its continuous supply constraints much weaker.

9.2 Overview

The PHI accepts data from the LLU, and transmits the data to the printheads. Each printhead is constructed from a number of printhead segments. There are six transmission lines, each of which can be connected to two printhead segments, so up to 12 segments may be addressed. However, for A4 printing, only II segments are needed, so in a single SOPEC system, 11 segments will be connected. In a dual SOPEC system, each SOPEC will normally be connect to 5 or 6 segments. However, the PHI should cater for any arrangement of segments off its data lines.

Each data line performs 8b10b encoding. When transmitting data, this converts 8 bits of data to a 10 bit symbol for transmission. The encoding also support a number of Control characters, so the symbol to be sent is specified by a control bit and 8 data bits. When processing dot data, the control bit can be inferred to be zero. However, when sending command strings or passing on CPU instructions or writes to the printhead, the PHI will need to be given 9 bit values, allowing it to determine what to do with them.

The PHI accepts six 2-bit data lines from the LLU. These data lines can all run off the same enable and if so the PHI will only need to produce a single ready signal (or which fine grained protocol is selected). The PHI collects the 2-bit values from each line, and compiles them into 8-bit values for each line. These 8 bit values are store in a short fifo, and eventually fed to the encoder for transmission to printheads. There is a fixed mapping between the input lines and the output lines. The line are label 0 to 5 and they address segments 0 to 11. (0->[0,1] and 1->[2,3]).

The connection requirements of the printheads are as follows. Each printhead has 1 LVDS clk input, 1 LVDS data input, 1 RstL input and one Data out line. The data out lines will combined to a single input back into the SOPEC (probably via the GPIO). The RstL needs to be driven by the board, so the printhead reset on power-up, but should also be drivable by SOPEC (thus supporting differentiation for the printheads, this would also be handled by GPIOs, and may require 2 of them.

The data is transmitted to each printhead segment in a specified order. If more than one segment is connected to a given data line, then the entire data for one segment will be transmitted, then the data for the other segment.

For a particular segment, a line consists of a series of nozzle rows. These consist of a control sequence to start each color, followed by the data for that row of nozzles. This will typically be 80 bytes. The PHI is not told by the LLU when a row has ended, or when a line has ended, it maintains a count of the data from the LLU and compares it to a length register. If the LLU does not send used colors, the PHI also needs to know which colors aren't used, so it can respond appropriately. To avoid padding issues the LLU will always be programmed to provide a segment width that is a multiple of 8 bits. After sending all of the lines, the PHI will wait for a line sync pulse (from the GPIO) and, when it arrives, send a line sync to all of the printheads. Line syncs handling has changed from PEC1 and will be described further below. It is possible that in addition to this the PHI may be required to tell the printhead the line sync period, to assist it in firing nozzles at the correct rate.

To write to a particular printhead the PHI needs to write the message over the correct line, and address it to the correct target segment on that line. Each line only supports two segments. They can be addressed separately or a broadcast address can be used to address them both.

The line sync and if needed the period reporting portion of each line can be broadcast to every printhead, so broadcast address on every active line. The nozzle data portion needs to be line specific.

Apart from these line related messages, SOPEC also needs to send other commands to the printheads. These will be register read and write commands. The PHI needs to send these to specific segments or broadcast them, selected on a case by case basis. This is done by providing a data path from the CPU to the printheads via the PHI. The PHI holds a command stream the CPU has written, and sends these out over the data lines. These commands are inserted into the nozzle data streams being produced by the PHI, or into the gap between line syncs and the first nozzle line start. Each command terminates with a resume nozzle data instruction.

CPU instructions are inserted into the dot data stream to the printhead. Sometimes these instructions will be for particular printheads, and thus go out over single data line. If the LLU has a single handshaking line then the benefit of stalling only on will be limited to the depth of the fifo of data coming from the LLU. However there if a number of short commands are sent to different printheads they could effectively mask each other by taking turns to load the fifo corresponding to that segment. In some cases, the benefit in time may not warrant the additional complexity, since with single handshaking and good cross segment synchronisation, all the fifo logic can be simplified and such register writes are unlikely to be numerous. If there is multiple handshaking with the LLU, then stalling a single line while the CPU borrows it is simple and a good idea.

9.3 Transport Layer

The data is sent via LVDS lines to the printhead. The data is 8b10b encoded to include lots of edges, to assist in sampling the data at the correct point. The line requires continuous supply of symbols, so when not sending data the PHI must send Idle commands. Additionally the line is scrambled using a self-synchronising scrambler. This is to reduce emissions when broadcast long sequences of identical data, as would be the case when idling between lines. See printhead doc for more info.

9.4 CPU Section 9.5 Line Sync Section

It is possible that when a line sync pulse arrives at the PHI that not all the data has finished being sent to the printheads. If the PHI were to forward this signal on then it would result in an incorrect print of that line, which is an error condition. This would indicate a buffer underflow in PEC1. However, in SoPEC the printhead can only receive line sync signals from the SOPEC providing them data. Thus it is possible that the PHI could delay in sending the line sync pulse until it had finished providing data to the printheads. The effect of this would be a line that is printed very slightly after where it should be printed. In a single SOPEC system the this effect would probably not be noticeable, since all printhead would have undergone the same delay. In a multi-SoPEC system delays would cause a difference in the location of the lines, if the delay was great this may be noticeable. So, rather than entering an error state when a line sync arrive prior to sending the line, we will simply record its arrival and send it as soon as possible. If a single line sync is early (with respect to data processing completing) than it will be sent out with a delay, however it is likely the next line sync will arrive early as well. If the reason for this is mechanical, such as the paper is moving too fast, then it is conceivable that a line sync may arrive at a point in which a line sync is currently pending, so we would have two pending.

Whether or not this is an error condition may be printer specifc, so rather than forcing it to be an error condition, the PHI will allow a substantial number of pending line syncs. To assist in making sure no error condition has arrived in a specific system, the PHI will be configured to raise an interrupt when the number pending exceeds a programmed value. The PHI continues as normal, handling the pending line sync as before, it is up to the CPU to deal with the possibility this is an error case. This means a system may be programmed to notice a single line sync that is only a few cycles early, or to remain unaware of being several lines behind where it is supposed to be. The register counting the number of pending line syncs should be 10+ bits and should saturate if incremented past that. Given that line syncs aren't necessarily performing any synchronisation it may be preferrable to rename them, perhaps line fire.

As in PEC1 there is a need to set a limiting speed. This could be done at the generation point, but since motor control may be a share responsibility with the OEM, it is safer to place a limiting factor in the PHI. Consequently the PHI will have a register which is the minimum time allowed between it sending line syncs. If this time has not expire when a line sync would have otherwise been sent, then the line remains pending, as above, until the minimum period has passed.

9.6 Config. PHI Needs

A Segment width in nozzles.

Optionally a six bit mask of active lines.

Segment1Present bit: describes if data should be generated for segments 0 & 1, or just segment 0 of each line.

A "colors present" count.

Optionally a 12 bit mask showing the presence of each segment.

Command array, containing symbols for printhead instructions the PHI needs to know. Can be 10×9-bit.

Command Sequences

The printhead will support a small range of activities. Most likely these include register reads and writes and line fire actions. The encoding scheme being used between the PHI and the printhead sends 10 bits symbols, which decode to either 8 bit data values or to a small number of non-data symbols. The symbols can be used to form command sequences. For example, a 16-bit register write might take the form of <WRITE SYMBOL><data reg_addr><data value1><data value2>. More generally, a command sequence will be considered to be a string of symbols and data of fixed length, which starts with a non-data symbol and which has a known effect on the printhead. This definition covers write, reads, line syncs, idle indicators, etc.

Unfortunately there are a lot of symbols and data to be sent in a typical page. There is a trade-off that can be made between the lengths of command sequences and their resistance to isolated bit errors. Clearly, resisting isolated bit errors in the communications link is a good thing, but reducing overhead sent with each line is also a good thing. Since noise data for this line is difficult to guess in advance, and the tolerance for print failure may vary from system to system, as will the tolerance for communication overhead, the PHI will try to approach it requirements in a very general way.

Rather than defining at this point the specific content and structure of the command sequences the printhead will accept, instead we will define the general nature, and the specific purpose of each command that the PHI needs to know about.

General Line Processing

The PHI has a bit mask of active segments. It processes the data for the line in two halves: the even segments and then the odd segments. If none of the bits are set for a particular half, then it is skipped.

Processing of segment data involves collecting data from the LLU, collating it, and passing through the encoder, wrapped in appropriate command sequences. If the PHI was required to transmit register addresses of each nozzle line, prior to sending the data, then it would need either storage for twenty four command strings (one for each nozzle row on each segment for a wire), or it would need to be able to calculate the string to send, which would require setting that protocol exactly. Instead, printheads will accept a "start of next nozzle data" command sequence, which instruct the printhead that the following bytes are data for the next nozzle row. This command sequence needs to be printhead specific, so only one of the two printheads on any particular line will start listen for nozzle data. Thus to send a line's worth of data to a particular segment one needs to, for each color in the printhead, send a StartNextNozzleRow string followed by SegmentWidth bytes of data. When sending nozzle data, if the supply of data fails, the IDLE command sequence should be inserted. If necessary this can be inserted many times. After sending all of the data to one segment, data is then sent to the other segment. After all the nozzle data is sent to both printhead the PHI should issue IDLE command sequences until it receives a line sync pulse. At this point it should send the LineSync command sequence and start the next line.

The PHI has six data out lines. Each of these needs a fifo. To avoid having six separate fifo management circuits, the PHI will process the data for each line in synch with the other lines. To allow this the same number of symbols must be placed into each fifo at a time. For the nozzle data this is managed by having the PHI unaware of which segments actually exist, it only needs to know if any have two segments. If any have two segments, then it produces two segments worth of data onto every active line. If adding command data from the CPU to a specific fifo then we insert Idle command sequences into each of the other fifos so that an equal number of byte have been sent. It is likely that the IDLE command sequence will be a single symbol, if it isn't then this would require that all CPU command sequences were a multiple of the length of the IDLE sequence. This guarantee has been given by the printhead designers.

9.7 Line Sync Periods

The PHI may need to tell the printheads how long the line syncs are. It is possible that the printheads will determine this for themselves, this would involve counting the time since the last lsync. This would make it difficult to get the first line correct on a page and require that the first line be all zeroes, or otherwise tolerant of being only partially fired.

Other options include:

PHI calculated and transmits a period with each line sync.

the PCU calculates a period and writes it to the printheads occasionally.

the line fire command includes a line sync period (again written by the CPU or perhaps calculated by the PHI.

Frequency Modifier Algorithm Study

1 Introduction

The frequency modifier is required to alter the pulse rate from an optical encoder used to monitor the printer speed. The output rate will then be used to trigger the printing of a new line. Due to mechanical jitter, input pulses will not be evenly spaced. High frequency jitter should be filtered out by the modifier leaving it to track the remaining jitter.

A secondary requirement is to provide an output which is proportional to frequency that can be used by the motor control loop.

Key specification

Input frequency range 500 Hz to 10 kHz

Frequency multiplication factor 1-6

FM output jitter<0.2%

Lock within 20 input cycles

Long term (1 page) output frequency accuracy typ. ±0.01% ±0.1% max.

Filter dependant characteristics—

Cut off frequency $F_c$ programmable 0.01-1× input frequency

Settling time<=(1/$F_c$)

Output frequency overshoot<5%

Several possible solutions were considered. Firstly, a PLL was studied but the characteristics were found to vary significantly over the 10:1 input frequency range making it unsuitable. Secondly, a scheme which avoided calculating frequency (an unpleasant 1/X calculation) was modelled which involved filtering in the period domain. The 1/X non-linearity gave rise to an asymetric transient response which would be different depending on the sense of a frequency step which was considered to be undesirable.

The scheme described here requires a calculation of K/X thus providing and output proportional to frequency and good transient behaviour.

2 Implementation

System clock cycles are counted over the period between input pulses resulting in count P. The calculation K/P, where K is a constant, results in an output proportional to instantaneous frequency. This is low pass filtered to attenuate input jitter and then multiplied by M, the output frequency multiplier (which may also be achieved by changing the filter gain). The resulting signal controls the frequency of the NCO which may be divided by the output divider in order to reduce the size of the NCO accumulator.

The system clock $F_{sys}$ is expected to be 192 MHz.

2.1 Accuracy

The accuracy requirements for each block impact on the hardware gate count or CPU cycle count so should be minimised/optimised to achieve the target output frequency accuracy.

2.1.1 Period Measurement and NCO

The period measurement accuracy will be lowest for the highest frequency, currently 10 kHz. The period count will then be 192 MHz/10 kHz=19200 resulting in an accuracy of 0.0052% The long term output frequency accuracy will only be limited by the precision of the calculations following the period measurement (and the measurement itself). The NCO can only produce jitter free output frequencies which are an integer division of $F_{sys}$. Fractional frequencies are derived by alternating between adjacent integer divisions. The worst case accuracy is for the highest output frequency which will be 6×10 kHz=60 kHz resulting in an accuracy of 0.0313%.

Assuming frequency errors only due to the period measurement and NCO, $$F_{outL} = \frac{F_{sys}}{ceil\left(\frac{1}{M \times ceil\left(\frac{F_{sys}}{F_{in}}\right)}\right)} \qquad F_{outH} = \frac{F_{sys}}{\mathrm{floor}\left(\frac{1}{M \times \mathrm{floor}\left(\frac{F_{sys}}{F_{in}}\right)}\right)}$$

These equations are plotted below for $F_{sys}$=192 MHz and M=6.

The division K/P requires a sufficiently large K to preserve the accuracy of P but the least accurate result is obtained for the most accurate (largest) value of P. For K=$_2A_{32}$, and P=384000, the error will be about 0.0089% which is greater than the 0.0052% maximum error for P. However, since the overall accuracy required is 0.5%, K can be reduced.

$$K_{bitmin} = ceil\left(\log 2\left(\frac{F_{sys}}{F_{inmin}} \times \frac{1}{tol}\right)\right)$$

For $F_{inmax}$=500 Hz, tol=0.5%, $K_{bitmin}$=27 bits (or 26 bits if rounding can be applied) assuming no other significant sources of error. Reducing K will reduce the computational effort for K/P and the result can be represented by 13 bits.

Accounting for K and rounding, $$F_{outL}=F_{sys}/(\mathrm{ceil}(K/(M\times\mathrm{floor}(0.5+K/(\mathrm{ceil}(F_{sys}/F_{in}))))))$$

$$F_{outH}=F_{sys}/(\mathrm{floor}(K/(M\times\mathrm{floor}(0.5+K/(\mathrm{floor}(F_{sys}/F_{in}))))))$$

This is plotted below for $F_{sys}$=192 MHz and M=6.

A further bit could be saved by relaxing the specification to 0.56%.

The NCO accumulator can be reduced by increasing its speed and dividing down after; the maximum allowable frequency being $F_{sys}/2$. Also, the simplest NCO counts modulo 2ˆN as does the divider. The maximum output frequency required after division is 60 kHz.

Division of $F_{sys}/2$ for 60 kHz is 1600 so choose 1024 requiring 10 bits (D) in the divider. The NCO would then run at 1024×60 kHz=61.44 MHz. The width of the NCO is then K-D=27−10=17 bits.

Figure 326:
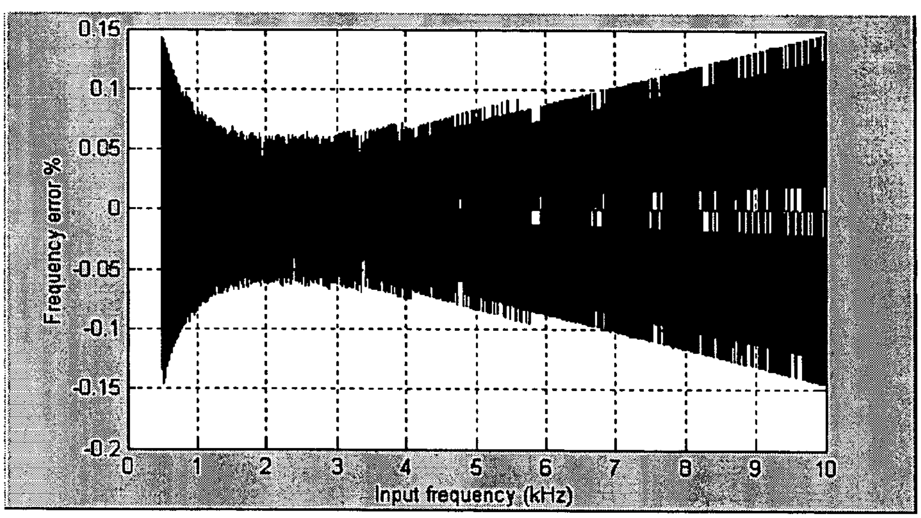

The accuracy of both the period measurement and NCO are better than required with $F_{sys}$=192 MHz. The limiting factor is the output jitter specification of <0.2% (taken to mean peak). Reducing $F_{sys}$ by 4 to 48 MHz will result in worst case output jitter of ±0.146%. K can also be reduced by 2 bits so that the low and high frequency accuracy are the same as shown in FIG. 326.

2.1.2 Filter

The accuracy of the filter required will depend on the actual filter coefficients used and the Q's of the filter poles (distance from the unit circle on the Z-plane). Low Q poles are usd to meet the overshoot requirement of <5% and so internal signal swings and coefficient accuracy are moderate.

Since there is no requirement for linear phase, it is be assumed that IIR filters can be used as these usually require less computation than an equivalent FIR filter. These can then be built from general purpose biquad sections; a second order section may be sufficent and can provide 2 poles (complex conjugate pair) and 2 zeroes with the transfer function:—

$$H(z)=\frac{b0+b1z^{-1}+b2z^{-2}}{1+a1z^{-1}+a2z^{-2}}$$

(Note that the use of a's and b's in numerator and denominator varies in the literature)

The direct form II of this filter is popular since a common shift register is used for both numerator and denominator calculation. The overall filter gain can be scaled by multiplying the b coefficients by a constant; in this case M.

The internal gain at points A and B needs to be checked to ensure there is sufficient overhead in the word lengths used. An example is shown for a 2nd order Butterworth filter with $F_c$=0.125 with a1=0.941753, a2=−0.332960, b0=0.097802, b1=0.195603, b2=0.097802.

Figure 327:
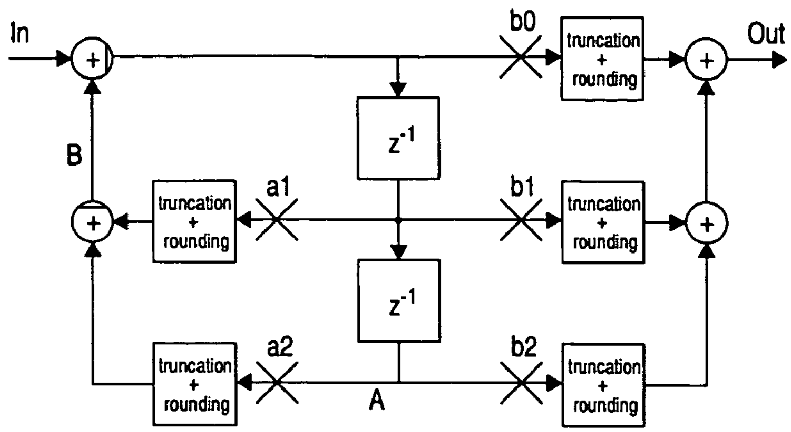
Figure 328:
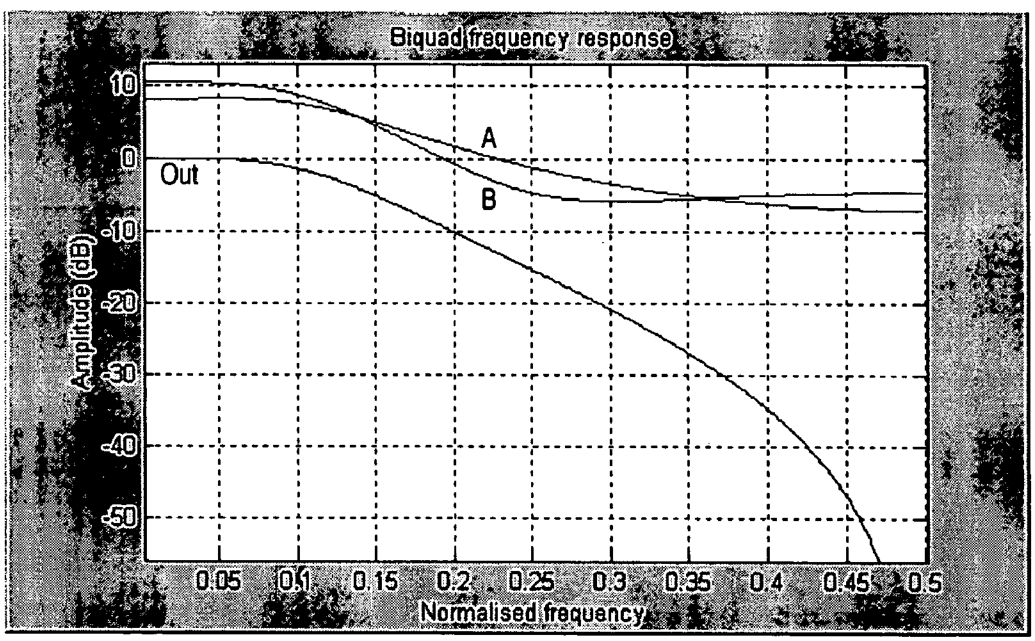
Figure 329:
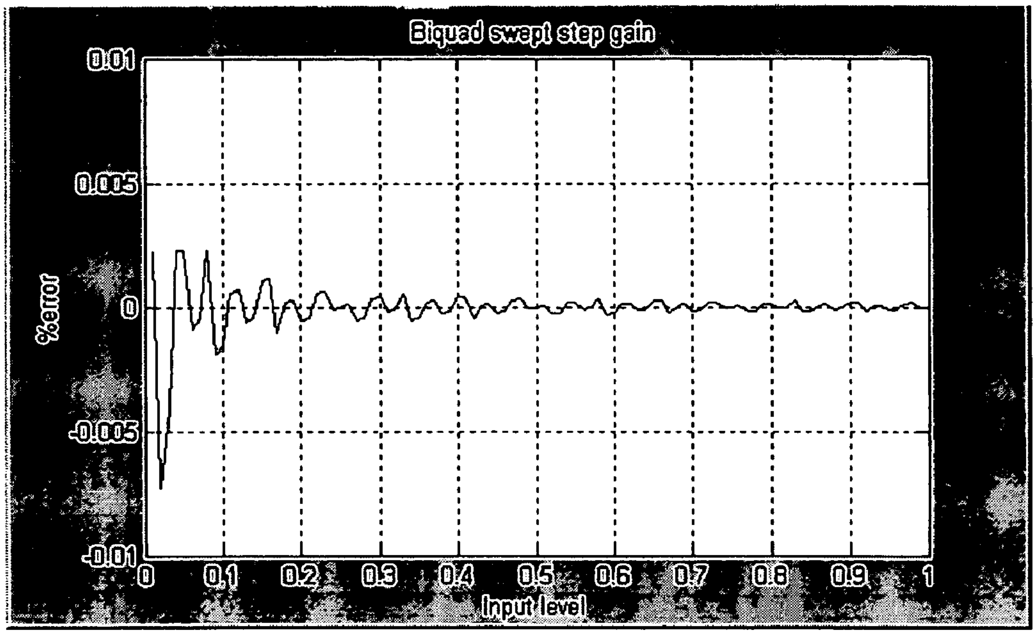

The recursive part of the filter needs to be handled correctly; the two adders to the left shown with bars (FIG. 327) need to saturate to prevent overflow (and underflow). The result needs to be truncated and rounded so as to limit the precision in the recursive loop.

If a full scale input were applied to this filter, at least an additional 2 bits is needed internally to avoid overflow. Alternatively, the input level can be reduced with loss of precision.

The filter internal gain is inversely proportional to the normalised cut off frequency so the lowest cut off required will determine the number of internal bits and coefficient wordlength.

A Butterworth filter with a normalised cut-off frequency of 0.01, intended to represent the likely lower limit, has been simulated. This requires 20 bits of internal precision, 16 bit coefficients and an allowance of 9 bits for internal gain.

The dc gain of the filter is $$H(0)=\frac{b0+b1+b2}{1-a1-a2}$$

(accounting for the sign of a's)

For the filter to be stable, the gain around the recursive part must be less than 1 so that (a1+a2)<1.

TABLE 224

Butterworth filter coefficients

| Cut-off | a1 | A2 | b0 | b1 | b2 |
|---|---|---|---|---|---|
| Lim ->0.5 | ->−2 | ->−1 | ->1 | ->2 | ->1 |
| 0.2 | 0.368189 | −0.195640 | 0.206863 | 2*b0 | b0 |
| 0.1 | 1.142078 | −0.412403 | 0.067581 | 2*b0 | b0 |
| 0.05 | 1.752252 | −0.779727 | 0.006869 | 2*b0 | b0 |
| 0.01 | 1.911091 | −0.914879 | 0.000947 | 2*b0 | b0 |
| 0.005 | 1.955525 | −0.956493 | 0.000242 | 2*b0 | b0 |
| Lim ->0 | ->2 | ->−1 | ->0 | ->0 | ->0 |

The lower the cut-off frequency, the higher the internal gain due to the demominator. For low cut-off frequencies, the largest signal occurs after multiplication by a1. The largest number that has to be accomodated is then a1/(1−a1−a2). If a cut-off frequency of 0.005 were to be used (with a full scale input representing an encoder frequency of 20 kHz), then the maximum internal level is 2020× the input level requiring 11 extra bits.

The limit cases above also hold true for elliptic and Chebyshev type 1 filters (and probably other common filter types under extreme conditions).

The most important factor in determining the filter accuracy is how its gain changes as a function of input level; fixed gain errors can be trimmed elsewhere or the coefficients adjusted for less quantisation error (with some small error in cut-off frequency).

The input level is swept from 1 (full scale) to 0.01 for an input word length of 19 bits showing a gain error of <±0.01%. For each setting of input level, a step response simulation was performed allowing the output to settle before measuring the level.

2.1.3 Printed Accuracy

An A4 page is 30 cm long and at 1600 dpi, will require 18.9K lines full bleed. An ideal target of 0.01% cumulative error (scaling error in M) over the page has been set although 0.1% should be acceptable. Error in the accuracy of the NCO does not accumulate over time; in fact the mean value will become more accurate when averaged over a longer period. The period measurement is also expected to become more accurate when averaged over time. Cumulative error will result in gain errors due to the calculation of K/P and the accuracy of the filter coefficients. Also, M needs to be quantised far more accurately than fractional increments of 0.1 given in the first version of the specification (which would result in an error of 10% worst case).

A clock frequency of 192 MHz will therefore be used and K increased to 32 bits. With an input frequency of 10 KHz and M=1.9, the short term accuracy will be 0.015%. The filter dc gain should be accurate to within 0.005 dB.

3 Matlab Model

Figure 330:
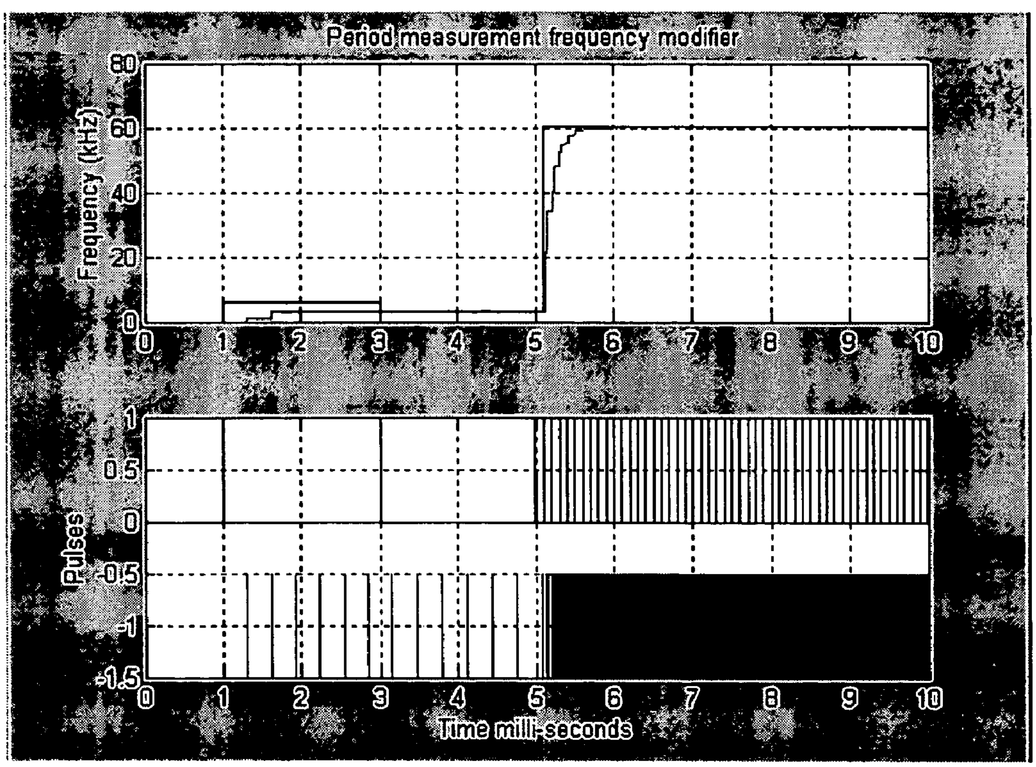

The frequency modifier has been modelled in Matlab with a typical result shown in FIG. 330.

This shows the response to an input step frequency from 0.5 kHz to 10 kHz using a single pole filter with a normalised cut off frequency of 0.25 and $F_{sys=}$48 MHz. The upper trace shows the instantaneous output frequency and input frequency multiplied by M=6 for reference. Input and output pulses are plotted in the lower trace.

Figure 331:
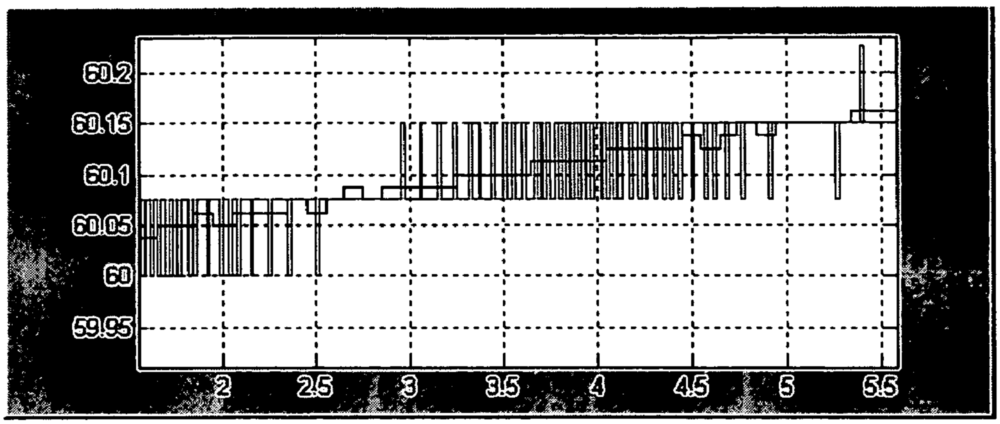
Figure 332:
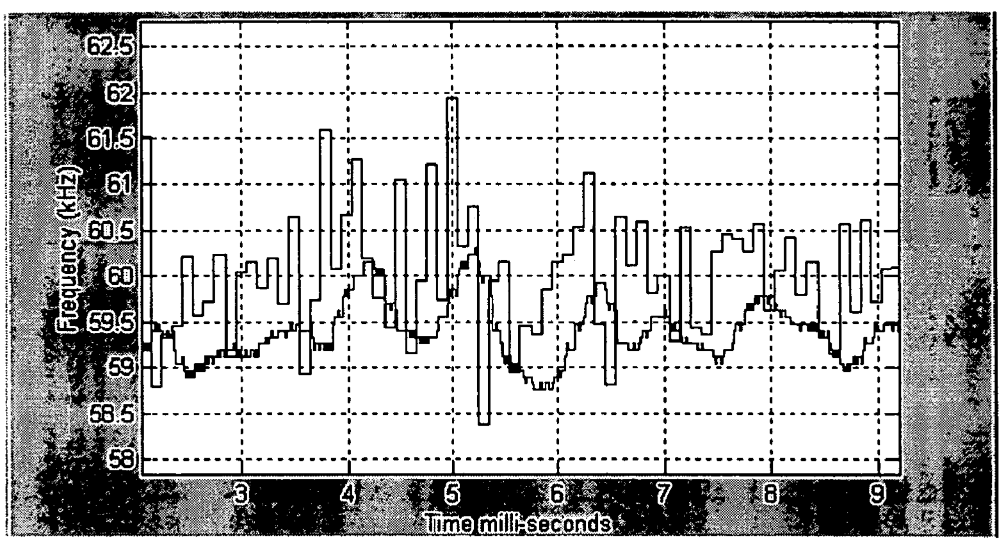

FIG. 331 shows the quantisation of output frequency following a ramping input frequency.

3.1 Cumulative Error

Figure 333:
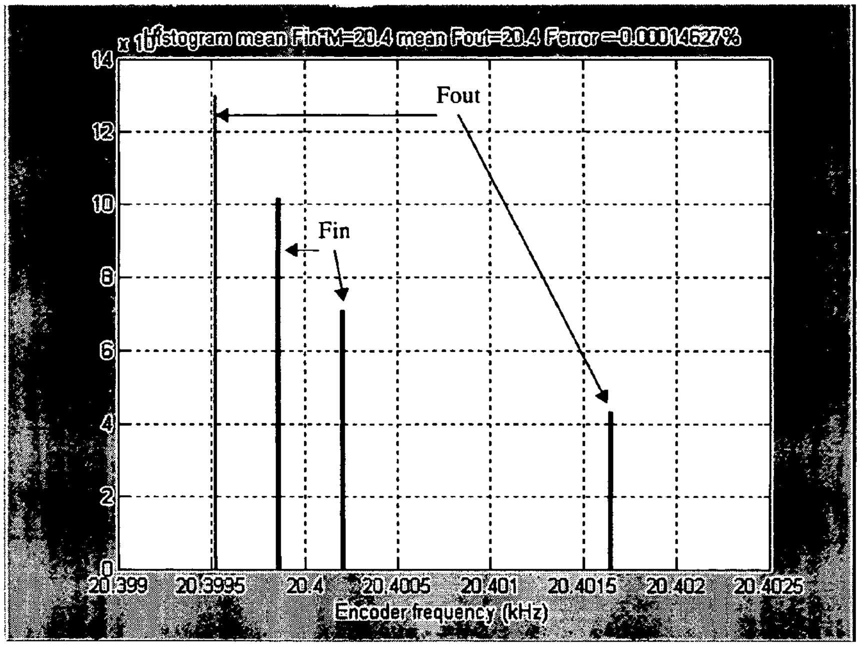
Figure 334:
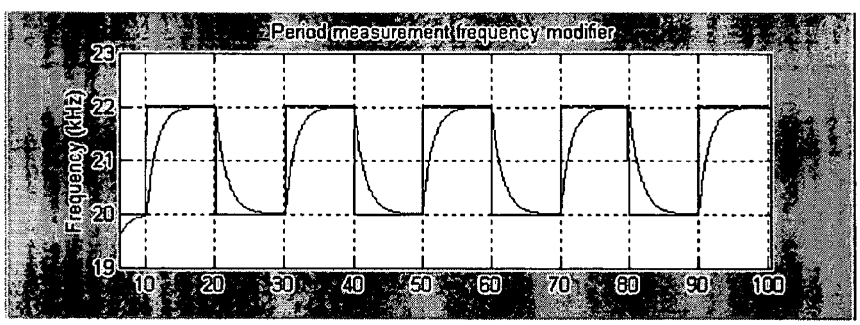
Figure 335:
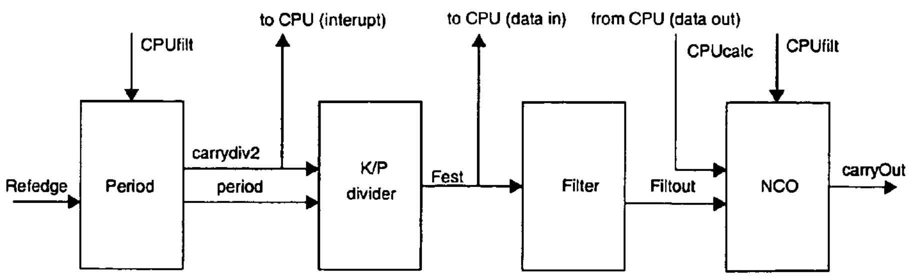
Figure 336:
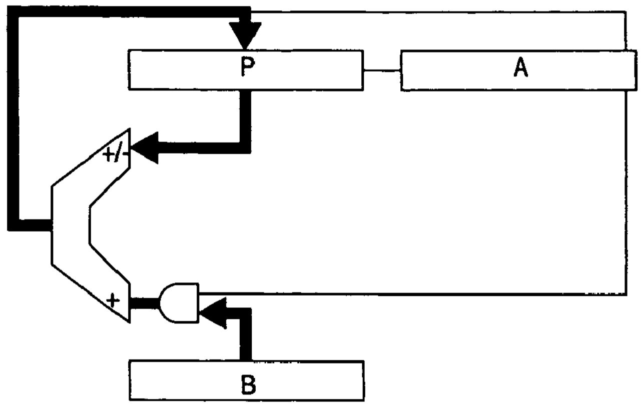

A long (1 page=1 second) simulation was used to check if there was any systematic error in the period measurement and NCO parts of the algorithm (FIG. 333).

The encoder frequency of 3.4 kHz was generated by an NCO and measured using a system clock of 192 MHz. The result is multiplied (mathematically) by 6 to produce $F_{in}$ and $F_{out}$ is the measured output frequency. The histogram shows that both $F_{in}$ and $F_{out}$ are approximated by two discrete frequencies (quantisation due to sampling); note that the spread of $F_{out=}$6× the spread of $F_{in}$. Furthermore, the other bins in the histogram are empty The mean of $F_{in}$ and $F_{out}$ are also calculated to determine $F_{error}=(F_{out}-F_{in})/F_{in}$ which is the cumulative frequency error measured over 1 second.

The cumulative error with filtering has been simulated with a stepped frequency input. Since the filter response time depends on the encoder frequency, a step down in frequency will take longer to settle than a step up resulting in a mean output frequency error.

A single pole filter with a normallised cut-off frequency of 0.01 was used. The mean frequency needs to be measured over an integer number of cycles to ensure no errors due to including part of a cycle. The above shows a step frequency increase by 10% from 20 kHz to 22 kHz. This resulted in a mean frequency error of 0.0675% measured over the last 80% of the simulation. Note that this error does not accumulate.

With a frequency step of 1%, the frequency error was found to be 0.000627% indicating the error is proportional to the area under the frequency error curve.

4 Hardware Specification

Assumption—data from the encoder has been deglitched 4.1 Bit Allocation

TABLE 225

| Signals | |
|---|---|
| | Meaning |
| P | Period count |
| K | Division constant |
| F | Frequency estimate = K/P |
| C | Filter coefficient (signed) |
| B | Filter states (delay elements) |
| N | NCO input (no output divider) |

Coefficients will be in the range −2<C<+2 with the top MSB being the sign bit. Bits of B to the left of the decimal point are to handle the maximum internal gain of the filter. The encoder frequency input to the frequency modifier may be divided (externally) and the NCO accumulator length programmed allowing optimum use of the available dynamic range of the filter. With K=2ˆ32−1, 19 bits will allow the NCO to operate over the range 0-23.44 kHz.

4.2 Arithmetic Unit

A time shared accumulator will be able to perform the division K/P and the filter computations (MAC). For the biquad, 2 state and 5 coefficient registers are required. A temporary storage register will be needed to hold the result of the K/P calculation as input to the biquad and 3 temporary registers for intermediate biquad calculations. Left and right shifting may also be needed to optimise input signal scaling to the biquad.

Optionally, some or all the (slow) calculation may be performed in software. Thus, the output of the period measurement counter could be sent to the CPU which will calculate K/P which is needed for motor control.

The result is either output to the filter hardware or the filter calculated in software. In both cases, a result needs to be written to a register which can be read by the hardware.

Note (Period threshold to add in div2 if >5 kHz)

4.2.1 Division

Since both K and A will be positive numbers, division is more straightforward than multiplication.

4.2.2 Multiplication

For the biquad, input samples will always be positive and coefficients may be positive or negative. However, internal states may be bipolar. It may be simpler to represent the coefficients in sign magnitude and the data in 2's complement. Coefficients are then placed in the A register and data in the B register.

The adder/subtractor must saturate in the event of an overflow/underflow.

4.3 Period Counter and Divide by 1 or 2

Count cycles of the system clock. On receiving a rising edge from the encoder (Refedge) transfer the count to a holding register and reset the counter to 1 (not 0). The counter should saturate at periodMax=2ˆ19−1 and flag an error. If the period is less than periodMin, set the holding register to periodMin and flag an error.

The divide by 1 or 2 counter is used to limit the interrupt rate to the CPU. If the input frequency is measured to be >5 kHz, the input is divided by 2; the output of the period counter is corrected for this.

TABLE 226

Bit allocation (dec)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| | | | | | | | | | | | | | P | P | P | P | P | P | P | P | P | P | P | P | P | P | P | P | P | P | P |
| K | K | K | K | K | K | K | K | K | K | K | K | K | K | K | K | K | K | K | K | K | K | K | K | K | K | K | K | K | K | K | K |
| | | | | | | | | | | | | 0 | F | F | F | F | F | F | F | F | F | F | F | F | F | F | F | F | F | F | F |
| | | | | | | | | | | | C | C | C | C | C | C | C | C | C | C | C | C | C | C | C | C | C | C | C | C | C |
| B | B | B | B | B | B | B | B | B | B | B | B | B | B | B | B | B | B | B | B | B | B | B | B | B | B | B | B | B | B | B | B |
| 0 | 0 | 0 | 0 | 0 | 0 | 0 | 0 | 0 | 0 | 0 | 0 | 0 | N | N | N | N | N | N | N | N | N | N | N | N | N | N | N | N | N | N | N |

Note that in all the following pseudocode, execution is sequential and not concurrent.

```
%divide by 1 or 2
  if div2d>0
    div2=div2d−1;
  else
    div2=endiv2;
  end;
  if Refedge==1
    div2d=div2;
  end;
  carrydiv2=Refedge&(div2d==0);
%Period counter
  if carrydiv2==0;
    if carryN==1;
      percnt=percnt+1; %Will need saturation
    end;
  else
    if endiv2==1 %Correct period for div by 2
      period=floor(percnt/2); %Is this ok?
    else
      period=percnt; %Transfer result to reg period
    end;
    percnt=1;
  end;
  if period>=periodMax %Saturate
    period=periodMax;
  end;
  if period<=periodMin %Lower limit
    period=periodMin;
  end;
  if period<fivek
    endiv2=1&CPUfilt;
  else
    endiv2=0;
  end;
```

4.4 Biquad Filter

The filter updates as new input edges arrive. Note that the multiplication factor M will be built into the coefficients b0, b1 and b2.

```
if carrydiv2==1
        z2=z1;
        z1=z0;
        z0=Fest(i)+a1*z1+a2*z2;
        Yo=b0*z0+b1*z1+b2*z2;
end;
```

4.5 NCO and Output Divider

Out is the 2^wordlength of the output divider=2^10−1. The input multiplexer is not coded.

```
%NCO (fowards only)
  NCO=NCOd+Filtout;
  if NCO>=K/Out−1
    NCO=NCO−K/Out;
  end;
%NCO edge detector (forwards only)
  if NCOd>NCO
    NCOedge=1;
  else
    NCOedge=0;
  end;
    NCOd=NCO;
%Output divider
  if divoutd>0
    divout=divoutd−1;
  else
```

-continued

```
    divout=Out−1;
  end;
  if NCOedge==1
    divoutd=divout;
  end;
  carryOut=NCOedge&(divoutd==0);
```

1 Resets Introduction

The following sections specify the reset requirements for the SoPEC ASIC and SoPEC-based systems. It presents a solution designed to meet all the requirements.

Requirements

2 Reset Requirements 2.1 SoPEC Devices

The requirements for resetting the SoPEC ASIC are as follows:

SoPEC needs to be able to generate its own power-on-reset because it may be the system master, and it is therefore possible, and potentially more cost effective, that no external reset will be supplied. The power-on-reset may happen before the bufrefclk is running. Therefore, this event needs to be asynchronously trapped, and then acted-upon as soon as the clock starts running.

SoPEC also needs to be able to protect itself, and the system, during a brown-out event. To this end, it is required to monitor the unregulated power supply, with the assumption that it will exhibit the brown-out sooner than $V_{core}$.

If a brown-out event occurs, the event must remain active for at least 100 µs before SoPEC resets itself (providing 100 µs of deglitching on the reset event). Beyon 100 µs, if the event remains active, SoPEC will continue to be held in reset, until the 100 µs after the event has been cleared.

SoPEC requires a fail-safe mechanism, in case the internal analog reset circuitry is found to be defective. Another pin may be used to allow this circuitry to be bypassed.

SoPEC must provide a means for allowing itself to be reset by an external device. It must provide deglitching of the external reset, similar to that provided for the brown-out detection.

2.2 SoPEC-Based Systems

The reset requirements for systems containing SoPEC device(s) are as follows:

If no external reset source is supplied, then SoPEC should be able to distribute its own internally-generated reset to the rest of the system, and so there is a need for a reset_out pad, which can also support SoPEC resetting the system through software. As well as directly resetting other system devices, this signal can be used to cycle the power on the QA chips, forcing them to reset themselves.

The printhead segments require special consideration for reset purposes. It is preferable to have them remain reset as soon as the system begins powering up and during brown-out. Also, there is a requirement to reset even-numbered printhead segments together, and likewise for the odd-numbered ones. So, two separate outputs are required to achieve this. These outputs should also be software controllable so that SoPEC can determine which group of printheads are reset, and when.

Figure 342:
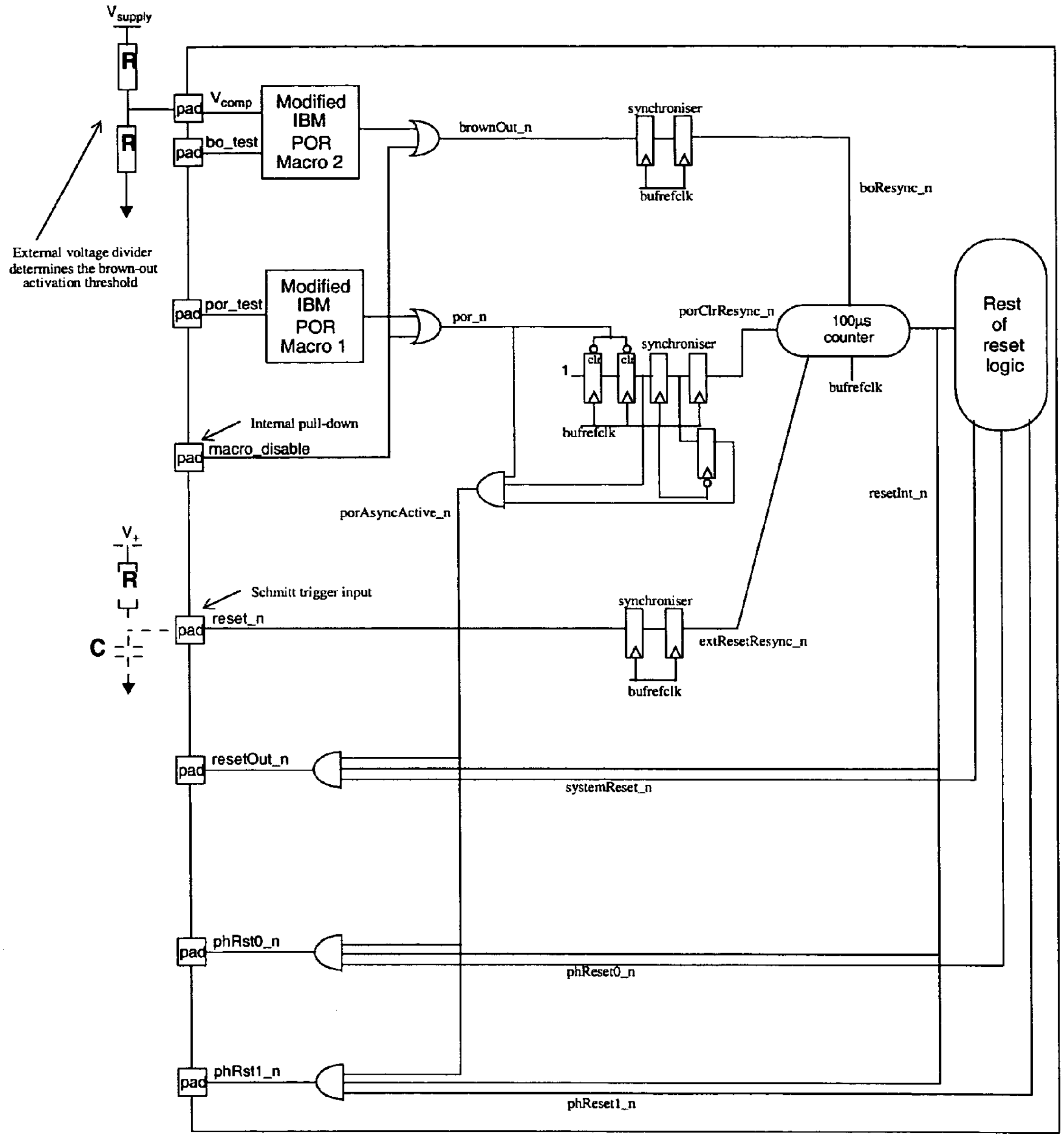

FIG. 342 presents a diagram of the overall solution designed to meet all of the reset requirements.

The following sections discuss in more detail, the various components making up the solution.

Solutions

3 Power-On-Reset Detection

This section presents the requirements and a solution for the internal power-on-reset detection functionality.

3.1 Functional Requirements

The functionality of the power-on-reset detection circuit can be summarised as follows:

Where the supply voltage is rising, the output of the circuit must transition from 0 to 1 at a voltage threshold where the core standard cell logic is able to record this transition.

While the core voltage remains above the threshold, the output of the detection circuit must remain stable at 1.

If the core voltage drops below the threshold voltage, then the circuit's output must drop back to 0, permitting the device to be reset correctly if the core voltage rises again.

Figure 337:
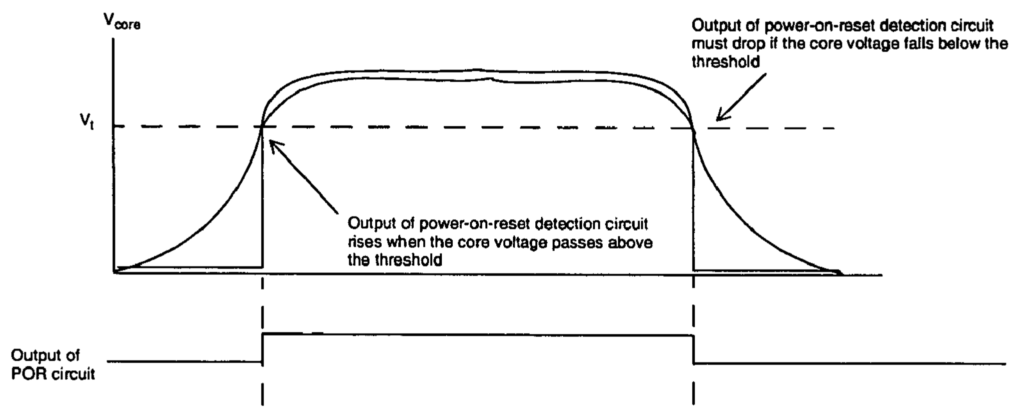
Figure 338:
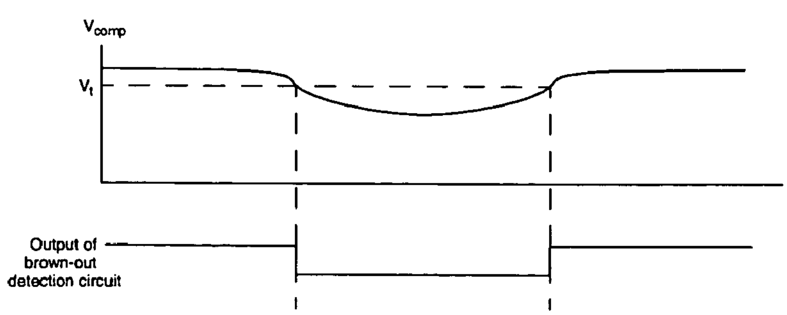

The waveforms in FIG. 337 show the functionality that is required for the power-on-reset detection circuit within SoPEC.

3.2 Proposed Solution

The existing POR macro from IBM is capable of achieving the power-up part of requirement. However, it must be modified in order for its output to fall back to 0 if the core voltage drops below the threshold.

Removing the output stages that "clamp" the POR macro output to $V_{dd}$ is sufficient for the macro to behave as shown above.

Note that this change will also meet a requirement of the brown-out detection circuit.

3.3 Special Considerations 3.3.1 Glitch Protection

Because the output of the power-on-reset detection can (and most likely will) be active long before the internal clock of the device is active, the fact that the circuit's output was 0 must be recorded asynchronously. This is achieved by using the POR macro's output to asynchronously clear a flip-flop, as shown in FIG. 342.

Because there is no guarantee that the clocks are running when the macro indicates that the core voltage has risen, it is not possible to deglitch, by digital means, this circuit's output. This means that glitches on the core voltage will reset the entire device, and anything connected to SoPEC's output reset pins.

Therefore, it may be desirable to place this macro in an area of the chip where it will be exposed to less noise, e.g. away from high-speed switching I/Os.

3.3.2 Test Pin

This circuit requires a dedicated input test pin, to facilitate in-package testing.

There is the possibility that this input pin can be driven by an external source, in functional mode. This may provide a means of using a reset from an external source which does not need to be deglitched.

4 Brown-Out Detection

This section presents the requirements and a solution for the internal brown-out detection functionality.

4.1 Functional Requirements

The functionality of the brown-out detection circuit can be summarised as follows:

The circuit must monitor a divided-down version, $V_{comp}$, of the unregulated power supply.

If the $V_{comp}$ input falls below the threshold (the same as that of the POR macro), then the output must drop to 0, and remain at 0 while $V_{comp}$ is lower than the threshold.

If $V_{comp}$ rises above the threshold, then the output must go to 1 and remain there while $V_{comp}$ is above the threshold.

4.2 Proposed Solution

It is proposed to use a modified version of the existing IBM POR macro to meet the requirements for brown-out detection.

If the existing POR macro is modified to allow its output to drop to 0 when the voltage falls below the threshold, then the same modified macro can be used to achieve the behaviour required for the brown-out detection.

Figure 339:
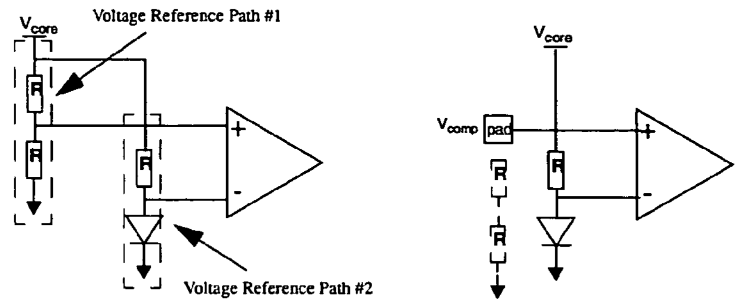

As shown in FIG. 339, the + input of the comparator must be hooked up to the input $V_{comp}$ pad to allow the external unregulated supply to be monitored.

The internal voltage divider, that is present on this comparator input, needs to be disconnected.

4.3 Special Considerations 4.3.1 Vcomp Input Voltages

The voltage range on this pin needs to be flexible to suit a number of power-supply configurations. It is intended that the maximum operational voltage on this input will be 3.6V, in accordance with recommendations from discussions with IBM. The brown-out circuit therefore requires 3.6V ESD protection, with a thick oxide comparator differential pair.

A standard 3.3V analog input pad should be sufficient for the $V_{comp}$ input.

Appendix A contains an analysis of the expected behaviour of the modified macro in brown-out situations, with Vcomp derived from different unregulated supply voltages.

Note that the maximum voltage that will be applied to this pin will never exceed 3.6V.

If brown-out detection is required, then this input will be driven by an external resistive voltage divider, in order to ensure that the voltage on this pin drops below the diode voltage thresold, during a brown-out event.

If brown-out detection is not required, then this pin will be tied to 1.5V, thereby causing the output of the brown-out comparator to go to 1.

4.3.2 Test Pin

This circuit requires a dedicated input test pin, to facilitate in-package testing.

5 Bypass Mode and External Reset 5.1 Functional Requirements

A fail-safe mechanism must be provided to allow the analog reset circuits to be bypassed, and an external source to be used to reset the device.

5.2 Proposed Solution

An input macro_disable pin, with an internal pull-down resistor, will be used to allow the outputs of both analog reset circuits to be disabled.

This pin only needs to be hooked up externally if there is a problem with either of the analog reset circuits.

A separate input pin, reset_n, will be used for the purposes of providing an external reset to SoPEC.

Any source that is driving the reset_n pin is required to ensure that it activates the reset for long enough for SoPEC's internal PLL is to start running (which can take of the order of 10 ms, following power-up), and for the deglitch circuit to then establish that the external reset has been active for at least 100 □s.

It is not proposed to allow just one of the internal reset circuits to be active, but the other bypassed. Instead, where either of these circuits is not functioning appropriately, both will be bypassed, and the provision of power-on-reset and brown-out protection will be carried out by an external source, via the reset_n input of SoPEC.

Note that the external reset can be used, regardless of whether the internal analog reset circuits are bypassed or not.

6 Deglitching

This section outlines the requirements for deglitching of the various reset-related signals within SoPEC.

6.1 Functional Requirements

Figure 340:
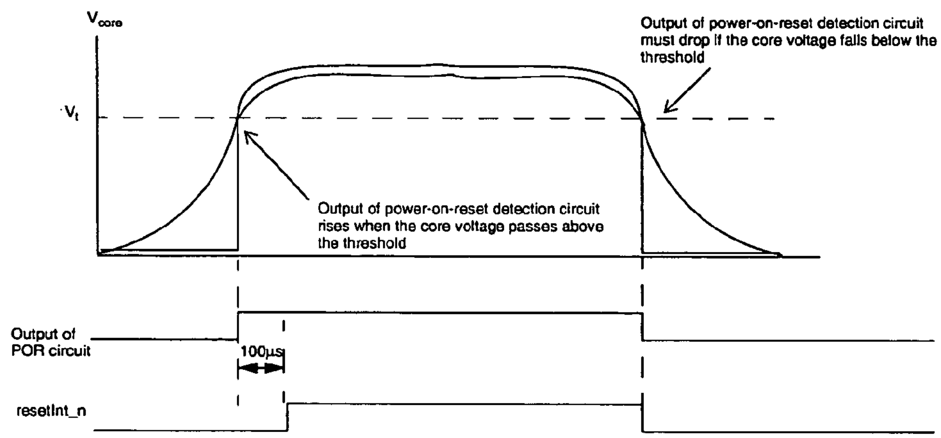

As shown in FIG. 340, the deglitch circuit must activate the internal reset of SoPEC, resetInt_n, if the POR macro output goes to 0. It should hold resetInt_n active for 100 µs, before deactivating it (assuming that the POR output is no longer active). This functionality is simply intended to provide 100 µs of settling time for the core voltage.

Note that bufrefclk may not be active when the core voltage has risen above the threshold. For this reason, the deglitch circuit must asynchronously capture any transition to 0 that happens on the output of the POR macro, and react appropriately when bufrefclk becomes active.

Figure 341:
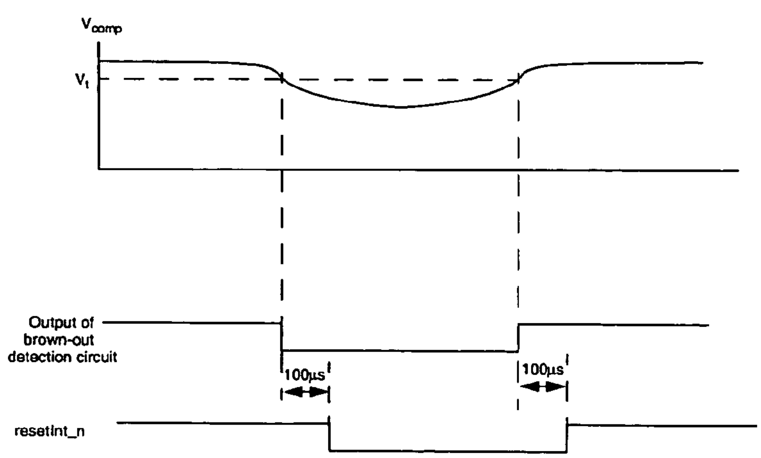

As shown in FIG. 341, the deglitch circuit must provide deglitching of the brown-out detection circuit's output, by checking that it has been at 0 for at least 100 µs before activating the internal reset. It should continue to hold resetInt_n active for 100 µs following a transition to 1 of the brown-out detection output.

The deglitch circuit must also provide deglitching of the external reset, reset_n, by checking that it has been held at 0 for at least 100 µs before activating the internal reset. It should continue to hold resetInt_n active for 100 µs following a transition to 1 of reset_n.

6.2 Proposed Solution

This section contains sample pseudo code for the state machine used to deglitch the brown-out and external reset signals, and to extend the reset activation time following a power-on-reset.

It is envisaged that this counter and state-machine logic, along with any other standard-cell logic required for the entire solution shown in FIG. 342, will be contained within SoPEC's CPR module.

```
if (porClrResync_n == 0) # Reset the state machine following power-up
        state ←activate_power_on_reset
        count ←0
        resetInt_n ←0 # Using an active low internal reset
    endif
    idle
      resetInt_n ←1
      count ←0
      state ←idle
```

-continued

```
    if (porClrResync_n == 0)
      state ←activate_power_on_reset
    elsif (extResetResync_n == 0)
      state ←falling_ext_reset
    elsif (boResync_n == 0)
      state ←falling_bo
    endif
# Activate the internal reset if (and while) porClrResync_n is 0.
# When porClrResync_n goes to 1, hold the reset active for a further
100µs
activate_power_on_reset
      resetInt_n ←0# Continue to hold the internal reset active
      count ←0
      state ←activate_power_on_reset
    if ( porClrResync_n == 1) # POR has been deasserted
      if ( count ≠ 100µs)
        state ←activate_power_on_reset
        resetInt_n ←0# Continue to hold the internal reset active for
        100µs
        count ←count+1
      else
        state ←idle
      endif
    endif
# If boResync_n goes to 0, deglitch before activating internal reset
falling_bo
    resetInt_n ←1 # Hold inactive until the required time has been
    reached
    state ←idle
    if (boResync_n == 0) # While boResync_n remains low, increment
    count
      if ( count ≠ 100µs)
        state ←falling_bo
        count ←count+1
      else
        state ←activate_bo_reset
        count ←0
      endif
    endif
# Generate the reset due to brown-out internally for at least 100µs
activate_bo_reset
    if (boResync_n == 0) # If brown-out is still active, hold reset active
      count ←0
      resetInt_n ←0# Continue to hold the internal reset active
      state ←activate_bo_reset
    elsif ( count ≠ 100µs) # Hold reset active for 100µs after brown-out
clears
      state ←activate_bo_reset
      resetInt_n ←0# Hold the internal reset active for 100µs
      count ←count+1
    else
      state ←idle
    endif
# If extResetResync_n goes to 0, deglitch before activating internal
reset falling_ext_reset
    resetInt_n ←1 # Hold inactive until the required time has been
    reached
    state ←idle
    if (extResetResync_n == 0) # While extResetResync_n remains
    low, inc.
count
      if ( count ≠ 100µs)
        state ←falling_ext_reset
        count ←count+1
      else
        state ←activate_ext_reset
        count ←0
      endif
    endif
# Generate the reset due to brown-out internally for at least 100µs
activate_ext_reset
    if (extResetResync_n == 0) # If ext. reset is still active, hold reset
active
      count ←0
      resetInt_n ←0# Continue to hold the internal reset active
      state ←activate_ext_reset
    elsif ( count ≠ 100µs) # Hold reset active for 100µs after ext reset
clears
      state ←activate_ext_reset
```

-continued

```
        resetInt_n ←0# Hold the internal reset active for 100µs
        count ←count+1
    else
  state ←idle
endif
```

6.3 Special Considerations

6.3.1 Deglitch Time Period

There may be a strong argument for making the deglitch time a metal-programmable feature, in case the deglitch time needs to be extended (counter then has to be designed to be large enough to handle the possibility of the time being increased up to say, 100 ms).

6.3.2 Test Mux

A test mux needs to be added to allow the asynchronously resettable register, which captures the fact that the power-on-reset detection circuit's output was 0 before bufrefclk was running, to be fully controllable during test mode.

Overall Solution

7 Top-Level Reset Circuit

7.1 Top-Level Schematic

FIG. 342 presents the overall solution to the requirements, and shows how the various sub-solutions, outlined in the previous sections, relate to each other.

7.2 Signal

TABLE 227

Description of signals presented in FIG. 342

| Port Name | Pad Type | Description |
|---|---|---|
| | | External Ports |
| $V_{comp}$ | Analog Input 3.3 V | Input voltage for brown-out detection comparator. If the voltage on this input, which is derived from the unregulated power supply, drops below the output of the voltage reference circuit, then the output of the comparator is set low. |
| reset_n | Input 3.3 V Schmitt trigger. | This active-low signal can be used to provide an external reset to SoPEC.<br>This signal must be activated long enough to ensure that SoPEC's internal PLL is running (taking of the order of 10 ms on power-up) so that this signal can be deglitched for 100□s. |
| por_test | Input 1.5 V | This is a signal for the in-package testing of the IBM POR macro. |
| bo_test | Input 1.5 V | This is a signal for the in-package testing of the IBM macro, modified for brown-out detection. |
| macro_disable | Input 3.3 V with pull-down | This active high signal allows the analog power-on-reset and brown-out detection circuits to be completely bypassed.<br>If unconnected, it will be pulled down by its pad to ensure that it remains inactive, allowing the internal analog circuits to reset the device. |
| resetOut_n | Output 3.3 V | This active low output can be used to reset other devices in the system. The signal is active when the internal power-on-reset is active (not deglitched), or if the internal SoPEC reset has been activated by a brown-out or external power-on-reset (deglitched), or where the systemReset_n register in the CPR block is set to 0 by the CPU.<br>Note that this signal can be used to adjust the $V_{comp}$ threshold for the brown-out detector, if so desired. |
| phRst0_n | Output 3.3 V | This active low output can be used to reset the even-numbered printhead segments. The signal is active when the internal power-on-reset is active (not deglitched), or if the internal SoPEC reset has been activated by a brown-out or external power-on-reset (deglitched), or where the phReset0_n register in the CPR block is set to 0 by the CPU. |
| phRst1_n | Output 3.3 V | This active low output can be used to reset the odd-numbered printhead segments. The signal is active when the internal power-on-reset is active (not deglitched), or if the internal SoPEC reset has been activated by a brown-out or external power-on-reset (deglitched) or where the phReset1_n register in the CPR block is set to 0 by the CPU. |
| | | Internal Signals |
| Bufrefclk | | Output from PLL. Operational from 0.9 V upwards. Requires 10 ms wake-up time. |
| brownOut_n | | Asynchronous output from the brown-out detector, ORed with the macro_disable signal. It is active low if $V_{supply}$ has fallen so low that $V_{comp}$ (which has been derived by dividing down $V_{supply}$) is below the<br>voltage reference threshold of the macro. |

TABLE 227-continued

Description of signals presented in FIG. 342

| Port Name | Pad Type | Description |
|---|---|---|
| BoResync_n | | Active low, it is brownOut_n synchronised to bufrefclk. |
| extResetResync_n | | Active low, it is reset_n synchronised to bufrefclk. |
| por_n | | Active low power-on-reset signal, output from macro_disable OR gate. |
| porAsyncActive_n | | Active low signal derived from por_n. This signal goes low during power-up, and remains low until resetInt_n gets deasserted. It is used to drive SoPEC's output reset signals. |
| PorClrResync_n | | Active low signal derived from por_n being active (low). Resynchronised to bufrefclk, this signal indicates that por_n has gone to 0, even if bufrefclk was not running when this occurred. |
| ResetInt_n | | This is the active low internal reset signal for SoPEC. It is a deglitched version of the reset activity. This signal is active immediately following an internal power-on-reset, or if an external reset or brown-out event has been activated for more than 100□s. |
| systemReset_n | | This active low signal is the output from the systemReset_n register in the CPR module. It allows the CPU to reset other devices in the system, by writing 0 to the register. |
| PhReset0_n | | This active low signal is the output from the phReset0_n register in the CPR module. It allows the CPU to reset the even-numbered printhead segments by writing 0 to the register. |
| PhReset1_n | | This active low signal is the output from the phReset1_n register in the CPR module. It allows the CPU to reset the odd-numbered printhead segments by writing 0 to the register. |

Appendix A: Brown-Out Design Example

The comparison voltage of the brown-out detector is derived from a diode with a temperature sensitivity of ~2.2 mV/C. The variation in trigger point for the IBM POS is taken from the datasheet and shown in the table 228 below.

As shown in FIG. 339, there is a potential divider which increases the trigger point voltage of the circuit compared with the actual diode voltage. The divider has a ratio of 15/16 (derived from the detailed IBM-supplied schematic). The actual diode voltage used can then be calculated.

TABLE 228

POS temperature sensitivity

| Trigger voltage | Temperature | Diode voltage |
|---|---|---|
| 0.75 ± 5 mV | 100° C. | 0.7031 ($V_{dmin}$) |
| 0.95 ± 5 mV | 25° C. | 0.8906 |
| 1.05 ± 5 mV | −20° C. | 0.9844 ($V_{dmax}$) |

The design range for brown-out detection can then be calculated (the 5 mV offset and resistor tolerance will be ignored for now).

Case 1

Suppose the lower limit for detection is the point at which a linear regulator deriving a 3.3V supply drops out. Then $V_{detL1}=V_{drop}+3.3V$, where a typical value for $V_{drop}=0.5V$. To guarantee this, the lowest comparison voltage is used. The required resistor division ratio is then $Div_L=V_{dmin}/V_{detL1}$ then $V_{detH1}=V_{dmax}/Div_L$.

Case 2

Alternatively, let the upper limit for detection $V_{detH2}=V_{pos}-V_{marg}$, where $V_{marg}$ represents a voltage margin to prevent false triggering of the detector (say 0.5V). The highest comparison voltage then must be used giving a resistor division ratio $Div_H=V_{dmax}/V_{detH2}$. Then $V_{detL2}=V_{dmin}/Div_H$.

Results for this are shown below.

TABLE 229

Macro behaviour for different supply voltages ($V_{pos}$)

| | Case1 | | Case2 | |
|---|---|---|---|---|
| $V_{pos}$ | $V_{detL1}$ | $V_{detH1}$ | $V_{detL2}$ | $V_{detH2}$ |
| 5 | 3.8 | 5.321 | 3.213 | 4.5 |
| 8 | 3.8 | 5.321 | 5.355 | 7.5 |
| 12 | 3.8 | 5.321 | 8.214 | 11.5 |

These results show that there is no feasible solution for $V_{pos}=5V$ since $V_{detL2}<V_{detL1}$ and $V_{detL1}>V_{detH2}$. The minimum value for $V_{pos}$ meeting both requirements is 5.832V.

If the maximum divider current is $I_{divmax}$, then the lower resistor $R_L=V_{pos}Div/I_{divmax}$ and the upper resistor $R_U=V_{pos}(1-Div)/I_{divmax}$.

4 Requirements 4.1 Functional Requirements

1. Place the PEP Subsystem in sleep mode;
   At system reset the PEP Subsystem is initialised and left on. It is the Boot ROM's responsibility to place the PEP Subsystem in sleep mode, thereby saving power until the PEP Subsystem is required.
2. Copy Boot ROM software (itself) into RAM;
   The Boot ROM is copied to RAM because running from ROM is too slow.
3. Enable watchdog timer to catch unexpected timeouts and errant software;
4. Load application software;
   Memory must be cleared before loading application software, to clear any information left over from the software previously run.
   First attempt to load from an LSS device; then
   Attempt to load from the USB device.

5. Verify loaded application software has a correct digital signature;
   Application software without a correct digital signature is not run.
6. Run loaded and verified application software;
7. The boot time from SoPEC suspend mode must be less than 1 second;
   The boot time from applying power is less important than the boot time from suspend, however it should also be in the same order of time.
8. IO pins should only be initialised as they are required during the boot-strap process.
   This enables 10 pins to be used for other purposes, if they are not required for booting in the current hardware configuration.

4.2 Non-Functional Requirements

1. Object code size must be minimized, and should be less than 64 Kbytes;
2. Software will use an abstraction layer to read and write to all IO devices;

This will enable 10 devices simulation for host testing.

5 Design

Notes:

All multi-byte quantities shown throughout this design are stored in most significant byte first byte-order (big-endian) format, to match the architecture of the SoPEC's SPARC CPU. Please beware that all SoPEC blocks other than the SPARC CPU are least significant byte first byte-order (little-endian) format.

5.1 First Stage Boot Loader

The First Stage Boot Loader is a smaller loader that only loads the Second Stage Boot Loader program from ROM into RAM. It does this so the main Boot ROM functionality will run from RAM. Running from RAM is much quicker than running from ROM, as the ROM has a narrower memory bus and is not cached. Running the Boot Loader from RAM will give a much faster boot time.

The First Stage Boot Loader loads the Second Stage Boot Loader program into RAM using the format described in Section 5.1.1.

Notes:

The First Stage Boot Loader software should not require a stack.

Although the First Stage Boot Loader could copy its copy routine from ROM to RAM to reduce boot time slightly, this is not done, and the copy function is run directly from ROM. The calculation below shows the time reduction does not warrant the complexity or ROM code size it adds:

Fetching an opcode from the cache takes 1 cycle

Fetching an opcode from the ROM takes 8 cycles.

The copy loop will be 6 opcodes:

Load double from source

Store double to destination

Increment source

Increment destination

Decrement loop count

Branch

For a 64 k image, this will loop 8192 times (it copies 8 bytes at a time).

Running from ROM therefore increases the boot time by:

$$7\times6\times8192=344064 \text{ cycles}=1.8 \text{ ms}$$

5.1.1 First Stage Image Format

Figure 343:
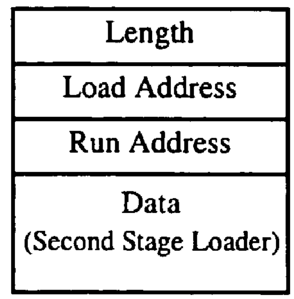

The First Stage Boot Loader loads an image with the format described in FIG. 343 and Table 230, that is located in ROM, directly beyond the First Stage Boot Loader itself.

TABLE 230

First Stage Image Fields

| Field | Size bits (bytes) [32-bit words] | Description |
|---|---|---|
| Length | 32 (4) [1] | The Length of the Data field.<br>Note: The unit for this length is to be determined during implementation, from what is most efficient. The unit selected could be 32-bit, 64-bit or 256-bit words. |
| Load Address | 32 (4) [1] | The RAM address to start loading the contents of the Data field at. |
| Run Address | 32 (4) [1] | The address to start execution of the loaded image at. |
| Data | variable | The Second Stage Boot Loader software image to load. |

5.2 Second Stage Boot Loader

The Second Stage Boot Loader loads Application Software from an SBR4320 Serial Flash, an LSS EEPROM or the USB device interface—from a USB host such as a PC or another SoPEC. The Second Stage Boot Loader first attempts to load Application Software from SBR4320, then from EEPROM, and finally from USB.

For Application software to be loaded, validated, and run, it must pass all verification checks. These verification checks are listed in Table 5.

The Application Software, whether loaded from SBR4320, EEPROM or a USB host, is contained within the same Second Stage image format. This image format is described in Section 5.2.1.

Application Software will only be loaded into RAM between the Minimum Address and Maximum Address inclusive, as define in Table 231.

TABLE 231

RAM Load Address Range

| Address | Value | Description |
|---|---|---|
| Minimum Address | The bottom of SoPEC RAM | Application Software can only be loaded on or above this address. |
| Maximum Address | The top of SoPEC RAM less 128 Kbytes | Application Software can only be loaded on or below this address. |

5.2.1 Second Stage Image Format

Figure 344:
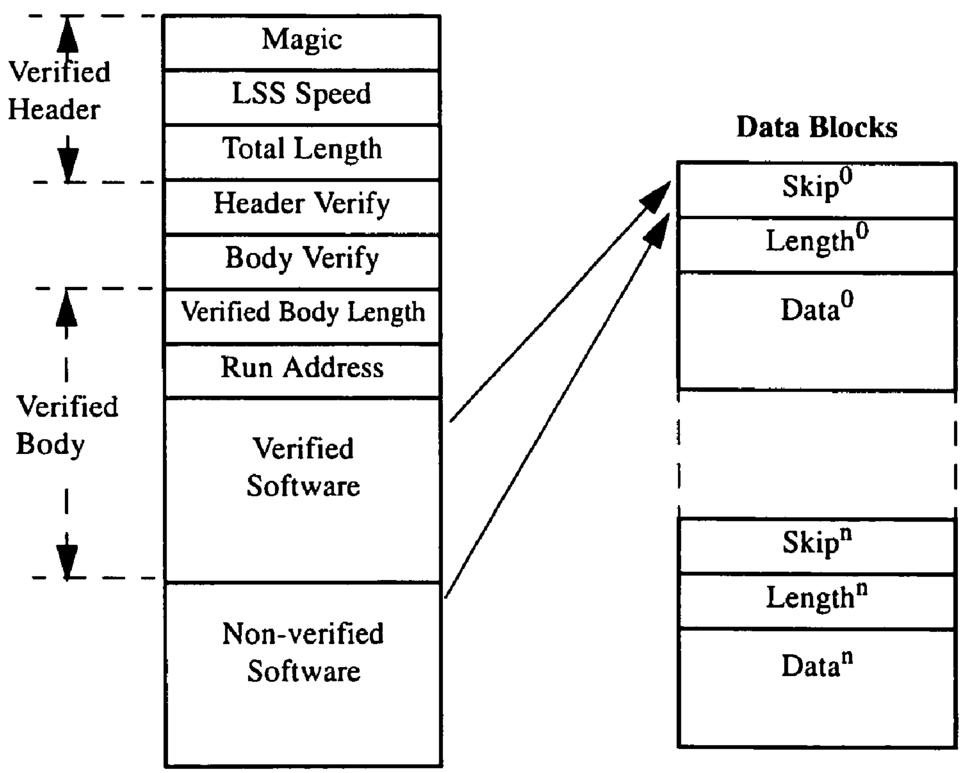
Figure 345:
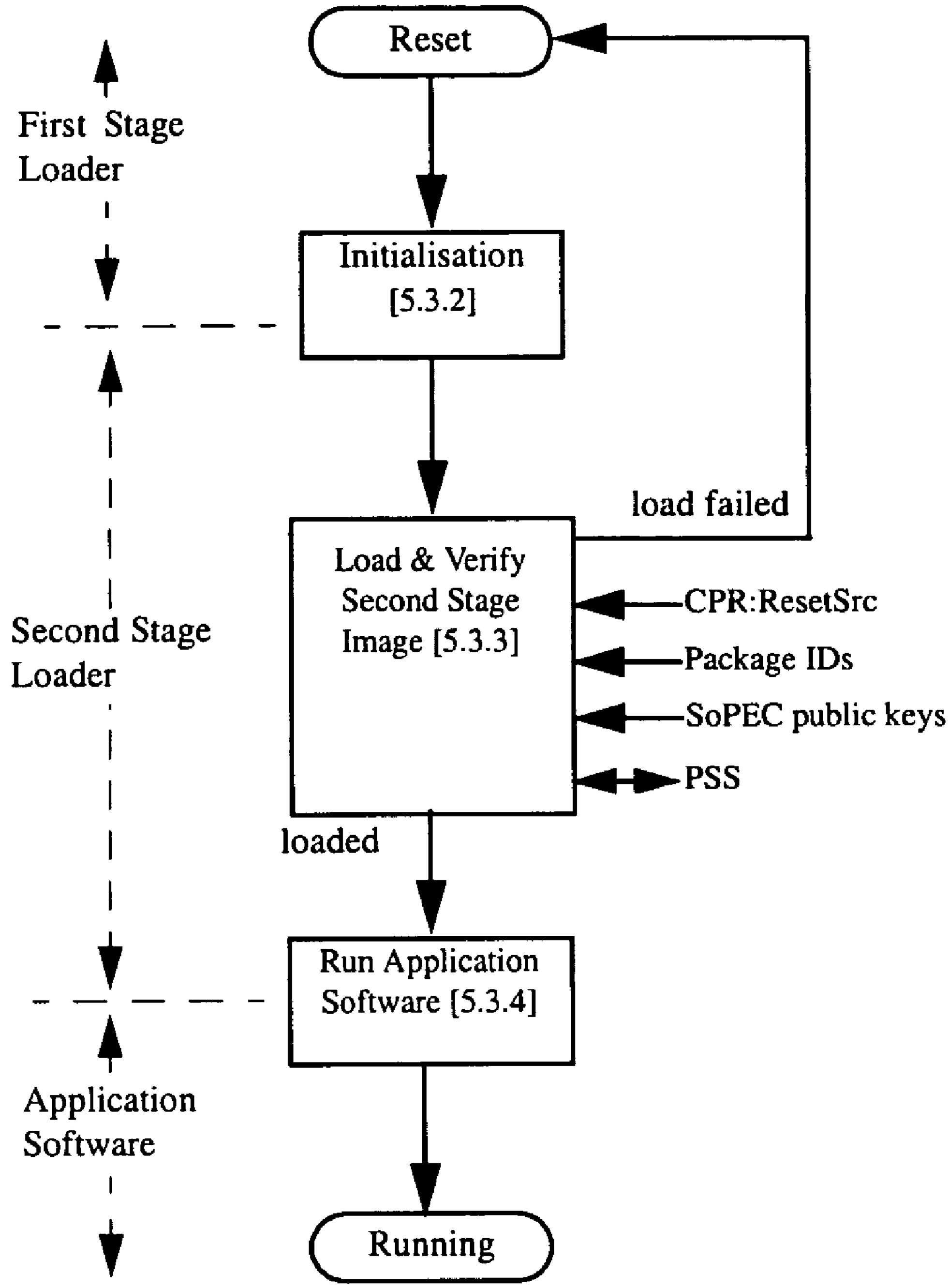
Figure 346:
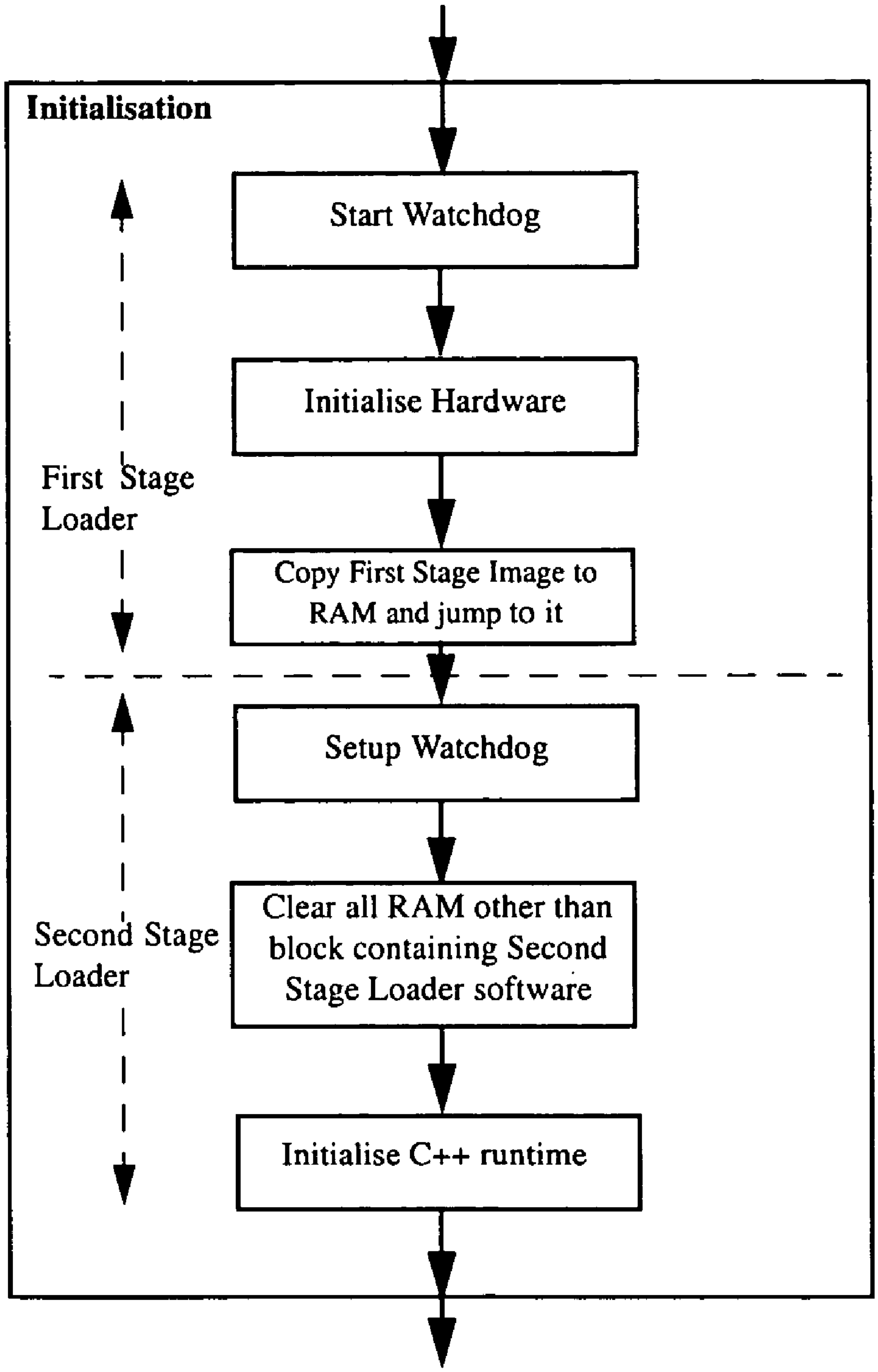
Figure 347:
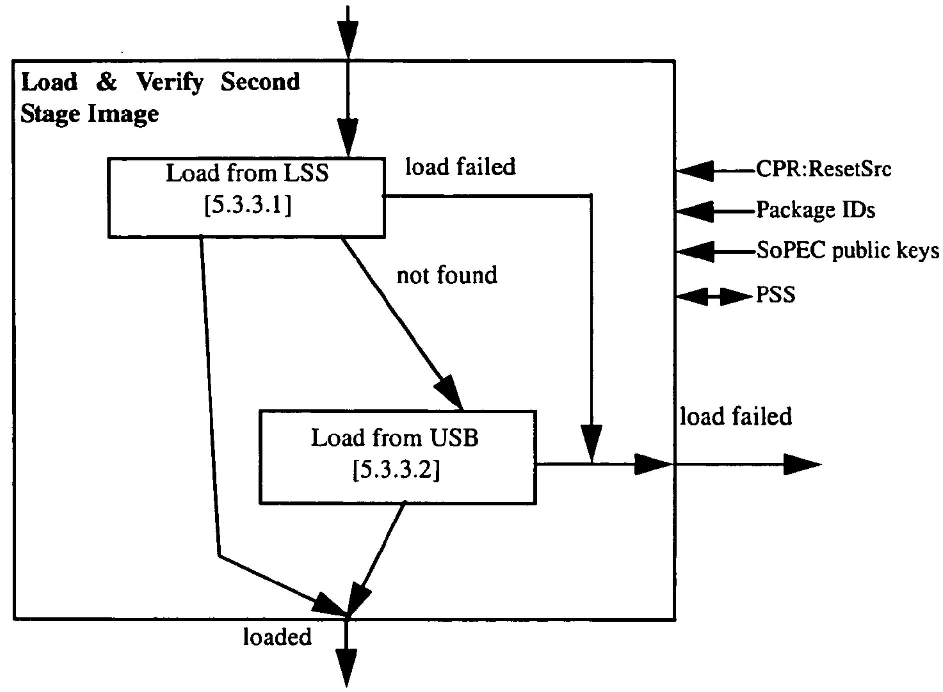
Figure 348:
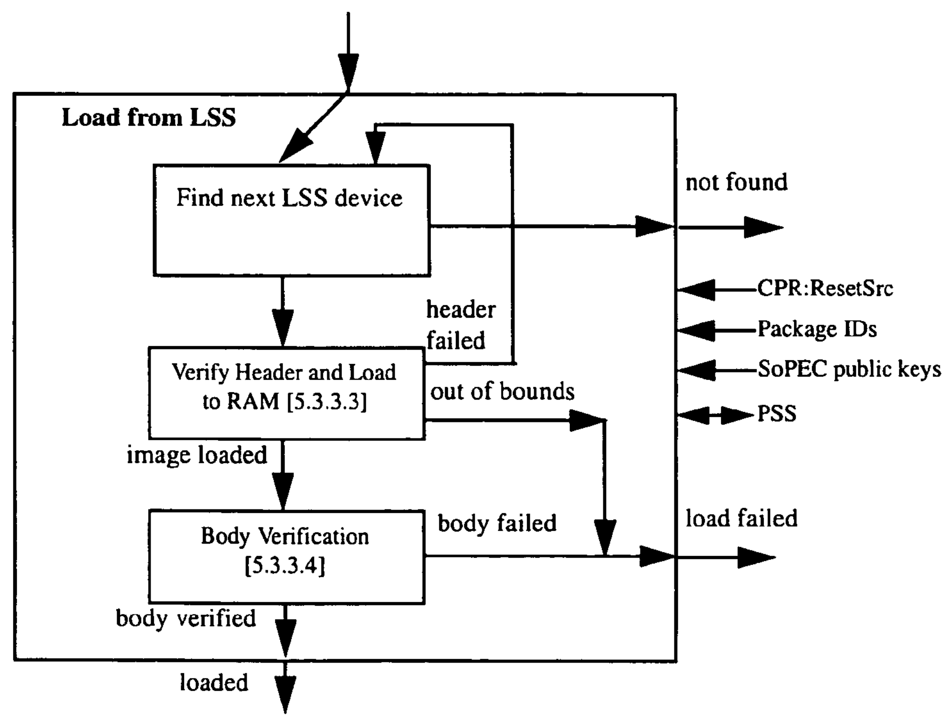
Figure 349:
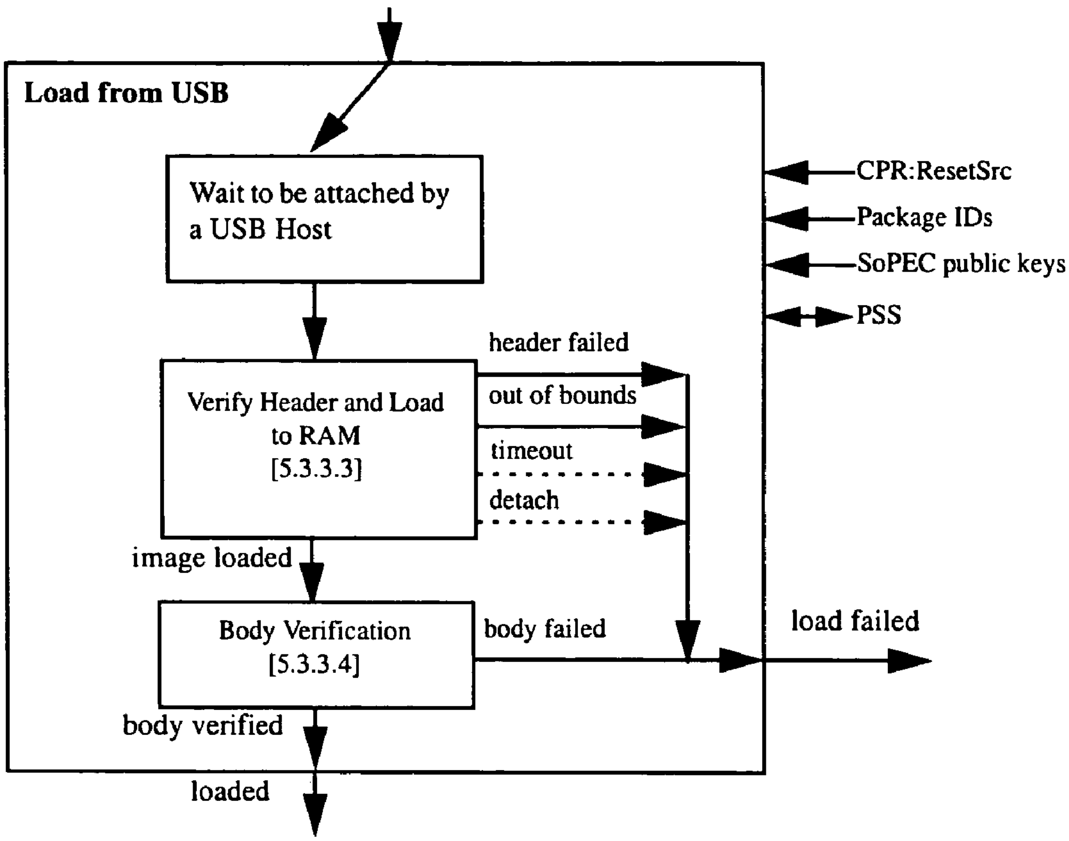
Figure 350:
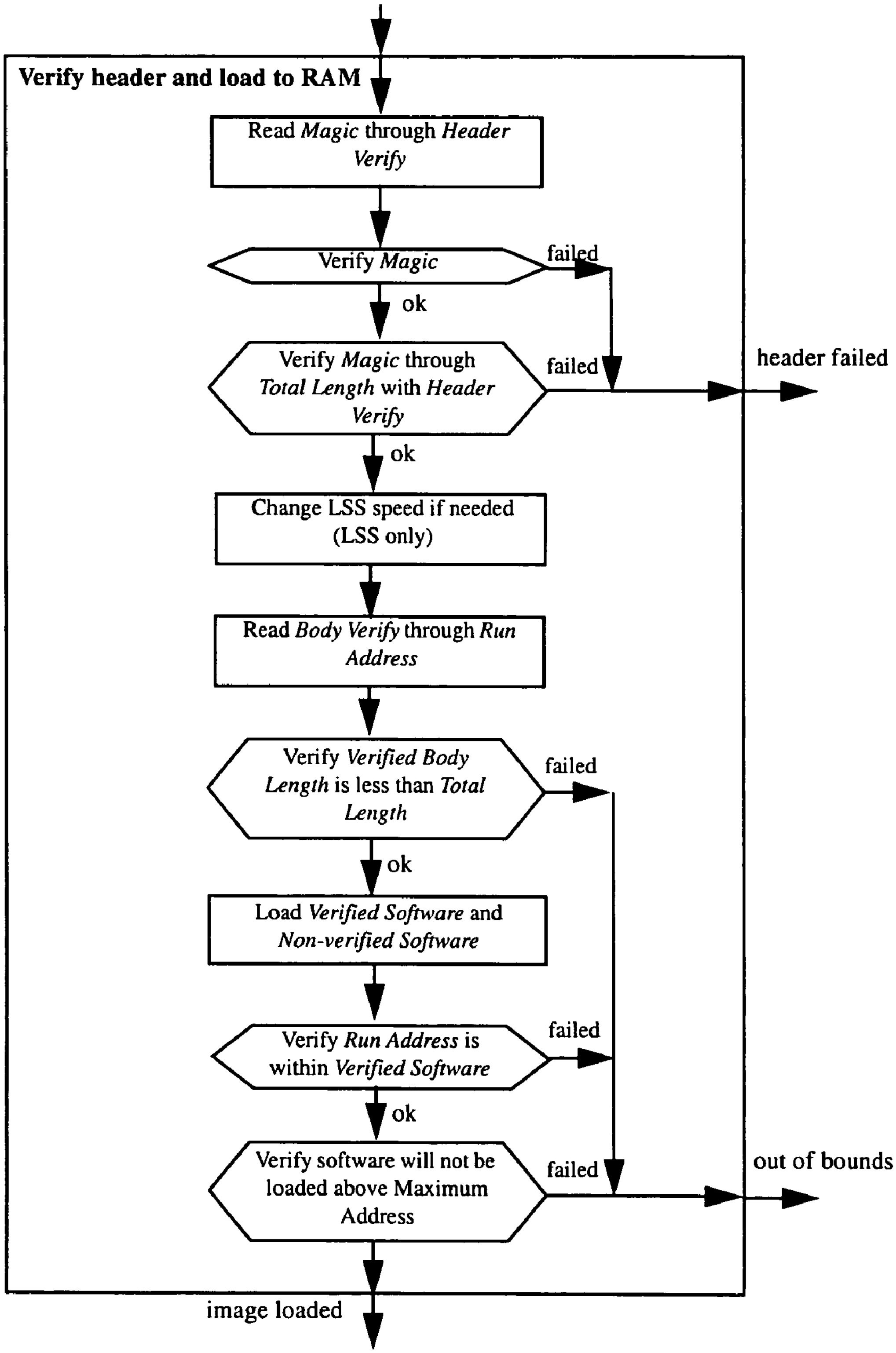
Figure 351:
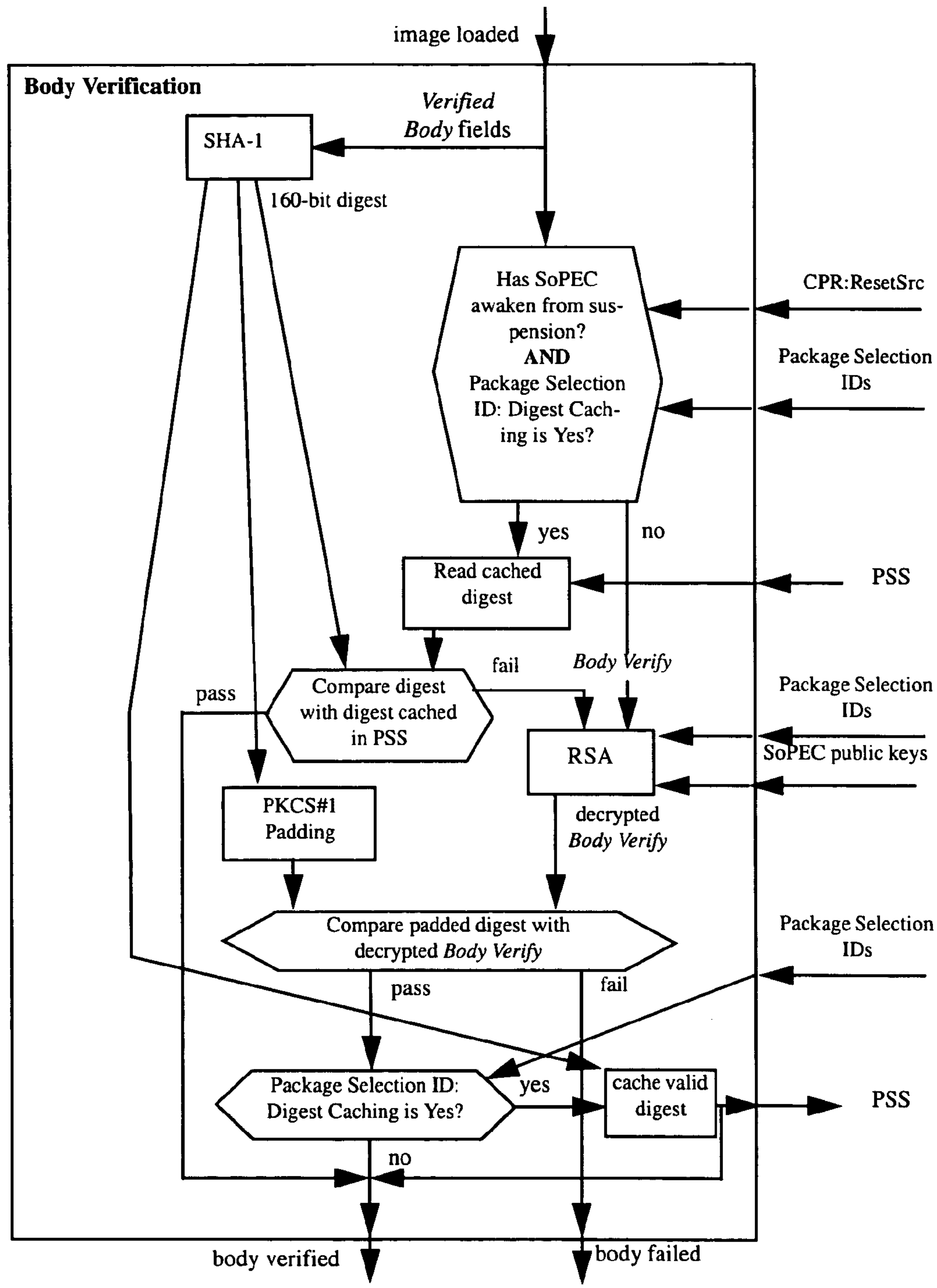
Figure 352:
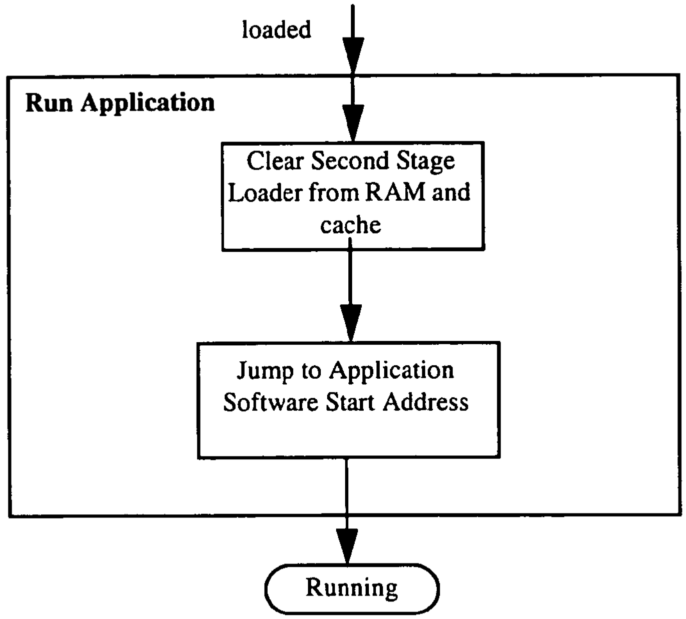

The Second Stage image format is described in FIG. 344 and Table 232.

TABLE 232

Second Stage Image Fields

| Field | Size bits (bytes) [32-bit words] | Description |
|---|---|---|
| Magic | 32 (4) [1] | Used to quickly identify this as a SoPEC Second Stage image. This field also identifies the version of the Second Stage image format itself, allowing scope for different formats. The values for this field are random numbers, with no additional meaning implied. The value is: 0x42189FDA |
| LSS Speed | 32 (4) [1] | Only valid when an image is stored in an LSS device. The value is used to program the SoPEC LssClockHighLowDuration while reading the remainder of this image. The Magic through Header Verify fields are initially read at 100 KHz. This enables the remainder of the image to be read at a different speed. If the value is 0, the speed will remain at 100 KHz. |
| Total Length | 32 (4) [1] | The total length in 32-bit words of the image following the Header Verify field - Body Verify through Non-verified Software fields inclusive. |
| Header Verify | 160 (20) [5] | Used to verify the header fields - Magic through Total Length fields. It is a SHA-1 of these fields. This allows the Magic, LSS Speed and Total Length fields to be verified before they are used to load the remainder of the image. |
| Body Verify | 2048 (256) [64] | Used to verify the verified body fields - Verified Body Length through Verified Software fields inclusive. This field is a 2048-bit RSA encrypted digital signature |
| Verified Body Length | 32 (4) [1] | The length in 32-bit words of the verified body fields - Verified Body Length through Verified Software fields inclusive. |
| Run Address | 32 (4) [1] | The address within the Verified Software to run from on completion of software load and verification. This address must always be within one of the Verified Software blocks when located in RAM to enforce the security model. If it is not, the boot ROM will not run this image. |
| Verified Software | variable | The software block that is verified and trusted by the boot ROM. The SOPEC will only run software that verifies correctly. The Verified Software may be made up of one or more Data Blocks. |
| Non-verified Software | variable | The optional software block. This software block is not verified by the boot ROM. This software block may be verified by the application software. The Non-verified Software may be made up of one or more Data Blocks. |
| Data Block Skip | 32 (4) [1] | The RAM addresses in 32-bit words to skip, from the current running RAM load address counter, before starting to load this Data Block. |
| Data Block Length | 32 (4) [1] | The length in 32-bit words of the data in this Data Block. The running RAM load address counter is incremented by this amount. |
| Data Block Data | variable | The data to load for this Data Block. |

5.3 Logic Flow

The logical flow of the Boot ROM is described in the following sections.

5.3.1 Overall Logic Flow 5.3.2 Initialisation

Notes:

Once the Watchdog is started, all software running after this must continue to periodically kick the Watchdog, or the SoPEC will be reset.

Hardware initialisation includes: placing the PEP in sleep mode; and enabling RAM in the DIU.

The First Stage Image is copied into RAM and run from there because it is too slow to run directly from ROM.

The First Stage Image contains the Second Stage Loader software.

The Second Stage Loader software sets up the Watchdog to have a timeout period for its own operation.

The Second Stage Loader software clears the rest of RAM including its own stack space. This is done to avoid the possibility of the new application software discovering protected information from software that was previously run. For example, if the supervisor stack from the previous software happens to be in user memory for the new software, the new software could access information that should not be disclosed.

The C++ runtime is initialised last, after RAM is cleared.

5.3.3 Load & Verify Second Stage Image

Notes:

The Second Stage Image is first loaded from an LSS device, if available there.

If a Second Stage Image is not found in any LSS device, the Boot ROM waits for a USB host to attach to the SoPEC and send a valid Second Stage Image.

5.3.3.1 Load from LSS

Notes:

LSS devices are searched for on 2 buses. The GPIO pins for these 2 LSS buses is yet to be defined.

The same LSS bus is always searched first and the second LSS bus is only accessed if a load image is not found on the first bus. This allows the GPIO pins for the second LSS bus to be used for other purposes, in applications where a second boot-strap LSS bus is not required.

3 types of LSS devices are searched for:

a) SBR4320 v1.0 with address 0101_100;

b) SBR4320 Serial Flash with address 1111_010; and c) EEPROM with address 1010_000.

The LSS devices are searched for in the order, a first, then b, then c. The search does not continue after the first valid load image is located.

At the start of an LSS device search, a SBR4320 Serial Flash Activate command addressed to the global id must be issued on an LSS bus. This initialises any SBR4320 Serial Flash devices that are on the bus.

The SBR4320 Serial Flash Activate command also serves as a first pass discovery method for SBR4320 Serial Flash devices, as any of these devices on the bus will acknowledge the Activate command.

As a method to avoid LSS bus errors, all LSS commands are issued, if needed, 3 times before considering a command has timed out or returned invalid data.

The speed an LSS device is read at can be configured in the LSS Speed field as described in Section 5.2.1.

If software is found in an LSS device, but the image body verification fails, it is considered a non-recoverable failure and the SoPEC will be reset.

The SoPEC LSS interface provides a 20 byte TxRx data buffer. The 20 byte buffer is organised as 5×32-bit registers. The SoPEC LSS transmits and receives bytes to and from its 32-bit buffer registers in least significant byte first order (little-endian) format. However, the SoPEC CPU is most significant byte first order (big-endian). This means the byte order of the Second Stage Image must be reversed. The reversal is done by the Boot ROM as the Second Stage Image is read from the LSS device.

5.3.3.2 Load from USB

Notes:

Loading is only done from the USB device interface. The USB host interface is not used. The USB host interface, including the multi-port PHY is not initialised by the Boot ROM.

The Boot ROM will not initialise the USB device interface, including the PHY, until it enters the Load from USB block. This allows the GPIO pins for the PHY to be used for other purposes in applications where USB is not required.

The Boot ROM will not advertise the SoPEC's presence on the USB until it enters this block. That is, the SoPEC will not be on the USB until it enters this block.

A USB host must enumerate and attach the SoPEC before loading from USB can commence.

The USB Host must send the load image in a number of separate USB transfers. This will enable the Boot ROM to load data directly to the final location within RAM using DMA.

The first USB transfer must contain the Magic through Run Address fields.

The remainder of the image must be sent in pairs of USB transfers. The first USB transfer in each pair must contain a Data Block Skip and Data Block Length, and the second must contain the corresponding Data Block Data. This enables the Data Block Skip and Data Block Length values in the first transfer of the pair, to be used to setup the DMA controller to read the Data Block Data in the second transfer, directly to its intended RAM location. This continues until the amount of Data Blocks indicated by the Total Length field are loaded.

Loading from USB guards against communication and USB host failures with a time-out timer.

If load verification fails, a load time-out occurs or a USB host detach is detected, the SoPEC is reset to cause the Boot ROM to start the load process from the beginning. The re-enumeration this also causes will allow the SoPEC and USB host to re-synchronise.

5.3.3.3 Verify Header and Load to RAM

Notes:

Information contained within the header is verified before the application software is loaded into RAM.

Run Address is verified to be within the Verified Software while the Verified Software is being loaded into RAM.

5.3.3.4 Body Verification

Notes:

The Body Verification block is the most complex block described by this specification. It has several inputs and outputs and different logic flow, dependent on external inputs.

The functions of the Body Verification block are controlled by the Package Selection IDs. See Section 5.4 for more details of the Package Selection IDs.

The verified body is verified with an RSA digital signature.

The digital signature is calculated on the area following the Body Verify field for the length specified by the Verified Body Length field, as described in Section 5.2.1.

The digital signature is an RSA encrypted, 2048-bit PKCS#1 padded, 160-bit SHA-1 digest.

The digital signature is decrypted using one of the Silverbrook SoPEC RSA public keys. The key that is used is selected by the Package Selection IDs, as described in Section 5.4.

Decrypting the digital signature takes more time than desired to meet the boot from SoPEC suspend mode in less than 1 second requirement. For some Package Selection IDs, resuming is sped up by caching a valid SHA-1 digest in the SoPEC's PSS before it suspends.

When the SoPEC resumes after suspension, for some Package Selection IDs the Boot ROM uses the value of digest cached in the PSS instead of decrypting it again, to reduce boot time. The Package Selection IDs that the digest is cached in the PSS for is described in Section 5.4

When verifying the digital signature, the calculated padded digest is compared against the decrypted digital signature. The loaded software is authentic and will only be run, if they are the same.

The RSA algorithm is more efficient if the RSA modulus has the most-significant bit set. All Silverbrook keys should therefore be chosen to have the most-significant bit set.

5.3.4 Run Application

Notes:

As described in Section 5.1, the Second Stage Loader is copied into RAM and run from there to load the Application Software. The RAM containing the Second Stage Loader itself, and stack and heap spaces it uses, must be cleared before jumping to the Application Software.

The CPU data and instruction caches must also be invalidated (cleared) before jumping to the Application Software.

To clear the instruction cache the Second Stage Loader will need to return to run from the ROM.

5.4 Package Selection IDs

From the Boot ROM's perspective, the SoPEC can be manufactured with 8 different package assignments. The Boot ROM behaviour is different for different package assignments. The package assignment is indicated to the Boot ROM by 3 GPIO pads, these are the Package Selection IDs.

Table 233 describes the package assignment for different Package Selection IDs.

TABLE 233

Package Selection ID Assignment

| Package Selection | | Digest | RSA Public | USB |
|---|---|---|---|---|
| ID | GPIO Pads | Caching | Key | Product ID |
| 0 | 000 | No | Key0 | ProductID0 |
| 1 | 001 | No | Key1 | ProductID1 |
| 2 | 010 | No | Key2 | ProductID2 |
| 3 | 011 | No | Key3 | ProductID3 |
| 4 | 100 | Yes | Key4 | ProductID4 |
| 5 | 101 | Yes | Key5 | ProductID5 |
| 6 | 110 | Yes | Key6 | ProductID6 |
| 7 | 111 | Yes | Key7 | ProductID7 |

5.5 Boot ROM Verification Checks

Table 234 summarizes the verification check carried out by the Boot ROM. In all cases, if a check verification fails, the current software image is not run. Refer to the given references for more details about each verification check.

TABLE 234

Boot ROM Verification Checks

| Verification Checks | References |
|---|---|
| Verify Magic field | Table 3, Section 5.3.3.3 |
| Verify Magic through Total Length fields with Header Verify field | Table 3, Section 5.3.3.3 |
| Verify Run Address is within Verified Software block | Table 3, Section 5.3.3.3 |
| Verify software is not loaded below Minimum Address | Table 2 |
| Verify no software loaded above Maximum Address | Table 2, Section 5.3.3.3 |
| Verify that the Verified Body Length field is less than the Total Length field. | Table 3, Section 5.3.3.3 |
| Verify the Verified Body fields against Body Verify fields | Table 3, Section 5.3.3.4 |

5.6 Operating Parameters Passed to Application Software

The Boot ROM makes a number of operating parameters available to the Application Software. These operating parameters are passed to the Application Software in CPU registers. The operating parameters passed are defined in Table 235.

TABLE 235

Operating Parameters Passed to Application Software

| Information Item | CPU Register | Description |
|---|---|---|
| Boot Source | | The bus and device that the Boot ROM loaded the application Software from.<br>Bits 7:0 indicates the bus:<br>0 = LSS bus 0<br>1 = LSS bus 1<br>2 = USB<br>Bits 15:8 indicates the device:<br>0 = LSS SBR4320 Serial Flash with address 0101_100<br>1 = LSS SBR4320 Serial Flash with address 1111_010 |

TABLE 235-continued

Operating Parameters Passed to Application Software

| Information Item | CPU Register | Description |
|---|---|---|
| | | 2 = LSS EEPROM with address 1010_000<br>255 = unknown |
| Non-verified Software Start Address | | The starting address of the Non-verified Software block in RAM. The application Software can use this address to verify and run the Non-verified Software. The Non-verified Software block is optional, if it is not present in the loaded image, 0 is passed. |
| Non-verified Software Length | | The length in 32-bit words of the Non-verified Software block in RAM. Note that this is the expanded length in RAM, and so may be longer than the length of the block in the original image. The application Software can use this when verifying the Non-verified Software. The Non-verified Software block is optional, if it is not present in the loaded image, 0 is passed. |

5.7 Boot ROM Memory Layout

Figure 353:
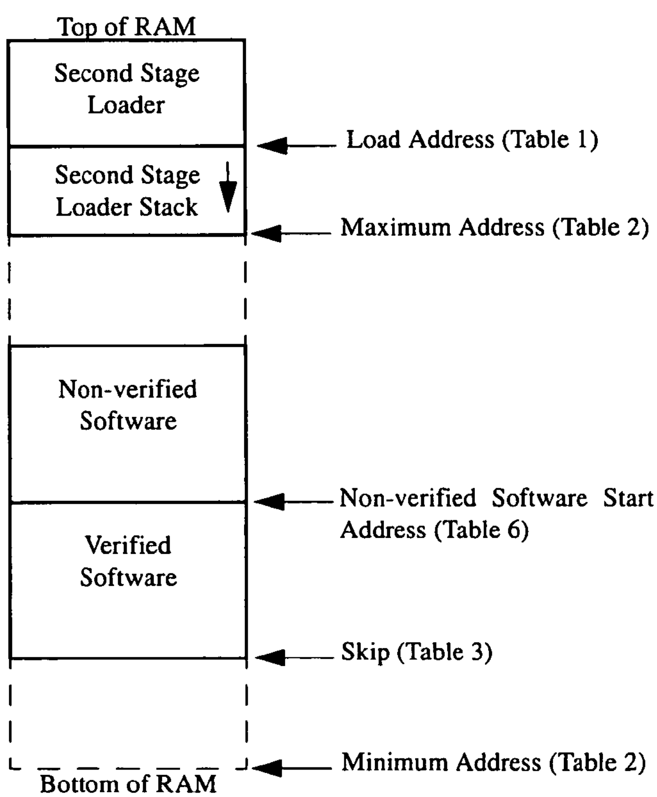

FIG. 353 shows the RAM usage/layout during the Second Stage Loading, noting address registers as defined in previous tables.

2 Single SoPEC System

SoPEC has hardware support for running many LSS buses (more than 50 if desired), including two LSS buses simultaneously at any given time.

Each SoPEC application must be at least compatible with a single LSS bus that is used during the boot procedure. This is because two specific pins are activated automatically as LSS bus 0 by SoPEC's boot ROM. Additionally, if application software is not found on LSS bus 0 as determined by those first two pins, another two pins (on the opposite side of the package) are then activated to be used as LSS bus 0.

When SoPEC powers up or is reset (for example due to a watchdog reset), the boot ROM attempts to load the application software. The boot ROM first resets all LSS devices attached to LSS bus 0, then attempts to load the software from a serial ROM attached to that bus. If none is found, the boot ROM tries a different pair of pins as LSS bus 0, and attempts to load the application software from a serial ROM attached to that bus. If the application software is still not found, the boot ROM attempts to load the software from SoPEC's USB device port.

Therefore, if the SoPEC application must be capable of operating standalone or must boot from an interface other than USB, the application PCB requires a serial flash to provide startup program code. This also provides a means of replacing faulty USB-boot code in the SoPEC ROM.

Figure 354:
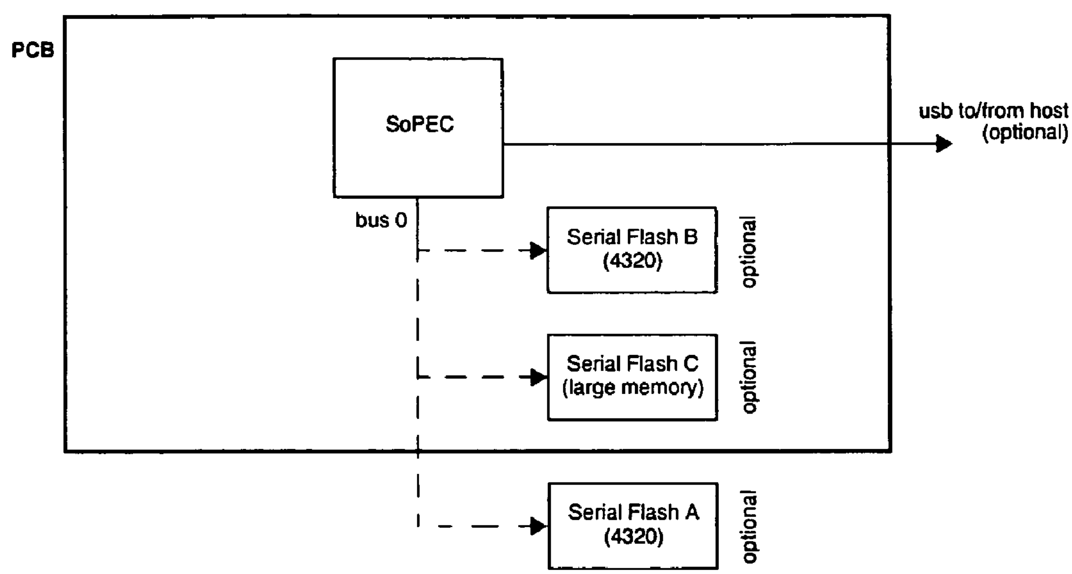

FIG. 354 shows the minimum set of LSS components in a single SoPEC system, regardless of application.

2.1 PCB 2.1.1 Serial Flash A, B and C

If the startup program code can be held within 7.5 KBytes, then the Serial Flash will be a 4320-based serial flash (Serial Flash B). Otherwise a more substantial flash memory (Serial Flash C) will be required. Alternatively, Serial Flash B may simply contain instructions on how to load data from some other kind of flash, e.g. connected to the MMI.

If Serial Flash C is accessed via a signalling means that is not known by the SoPEC boot ROM, then Serial Flash B will be required to load the flash access mechanism for booting from Serial Flash C.

On certain applications it may also be convenient to provide a connector on the PCB to allow the connection of a special Serial Flash A that contains special boot code for diagnostics and hardware debug purposes (or at least the program code to load the diagnostics program via some mechanism such as USB and thereby bypass Serial Flash B and/or C).

The setup as described implies that the SoPEC boot ROM looks for serial flash in a specific order, namely A, B, C. The search order of LSS addresses for flash devices is therefore fixed at:

TABLE 236

Search order for LSS devices by SoPEC boot ROM

| Search order | LSS address | Expected device at adr | Comments |
|---|---|---|---|
| 1 | 0101_100 | Serial Flash A | 4320 based serial flash. Requires changing LSS address from default 4320 serial flash address. |
| 2 | 1111_010 | Serial Flash B | 4320 based serial flash. Matches default address for 4320 serial flash. |
| 3 | 1010_000 | Serial Flash C | 3rd party (commercial), higher capacity serial flash. |

If no serial flash device is found at these addresses, the boot rom in SoPEC will attempt to boot from USB. Therefore the presence of any of these LSS devices is optional depending on the application. In the same way, if startup program code can be loaded from a serial flash on LSS bus 0, then the boot rom will not attempt to access the USB device port unless the startup program code (loaded from the serial flash) instructs SoPEC to do so.

3 Single SoPEC Printer

Figure 355:
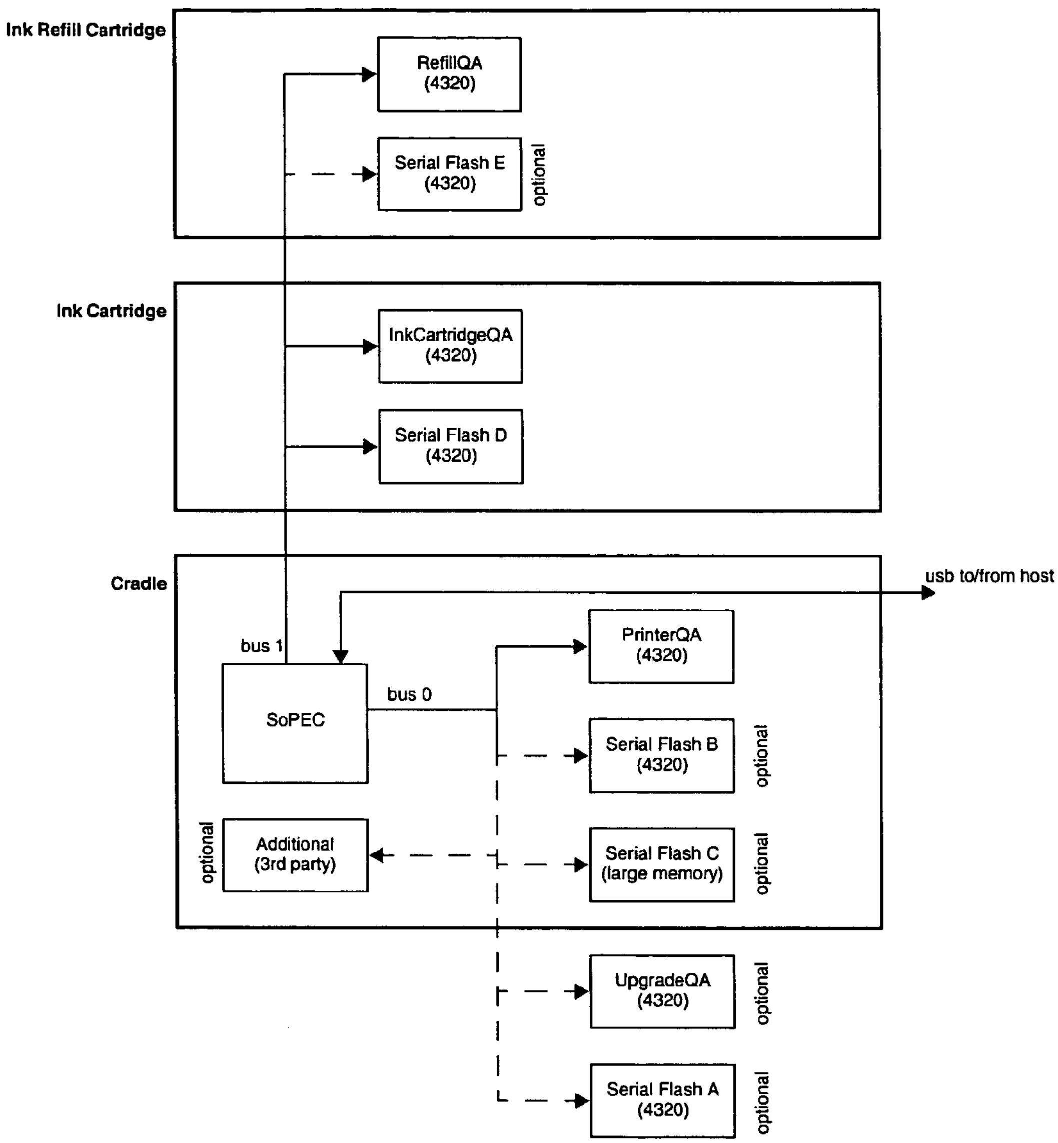

FIG. 355 shows the components in a single SoPEC printing system from an LSS perspective. The primary components are Cradle, Ink Cartridge, and Refill Cartridge, and each of these may contain several LSS devices.

3.1 Cradle 3.1.1 SoPEC

The SoPEC ASIC is the bus-master of two LSS buses: bus 0 and bus 1. By convention, bus 0 is used to connect to chips on the cradle or that plug directly into the cradle, and bus 1 is used to connect to ink-related components such as the ink cartridge and refill cartridge.

3.1.2 Serial Flash A, B and C

These are the serial flashes required for booting as described in Section 2.1.1.

In lowest-cost printing applications the printer will boot from USB, and therefore none of these flash memories will be present. In more expensive systems, various combinations of flash memories will be required, specifically for standalone operation or for ethernet connectivity etc.

3.1.3 PrinterQA

The PrinterQA is a 4320-based QA Chip Family application, and contains the operating parameters for the printer, including such information as:

- OEM
- Printer model #
- Printer features
- Manufacture information

Each PrinterQA is linked to a particular SoPEC in that the PrinterQA contains the secret SoPEC_id_key for that SoPEC (this key is based on the random number stored in the ECIDs within SoPEC. The SoPEC is therefore able to authenticate reads of information from the PrinterQA to determine that it is running the correct application software, and that the operating parameters cannot be subverted.

The PrinterQA also contains access keys to allow SoPEC to perform reads of ink levels from the InkCartridgeQA, RefillQA, and access any information in an attached UpgradeQA.

3.1.4 Additional

It is possible that additional 3rd party devices (compatible with the LSS) will be used in a single SoPEC printer system. The most likely devices are:

- commercial temperature sensor (if ambient temperature is required)
- GPIOs (if a single SoPEC does not provide sufficient GPIOs for the requirements of the printer)

3.1.5 UpgradeQA

Depending on OEM requirements, printers may support varying kinds of upgrades:

- internet based (e.g. update the printer speed over the net)
- dongle based (e.g. update the printer speed by attaching a dongle)

If the upgrade is permanent (e.g. it updates the speed parameter as stored in the Cradle's PrinterQA), the upgrade can be one of:

- internet-based
- PC-dongle-based via a 4320 QA Chip connected to USB attached to the PC
- USB-dongle-based via a 4320 QA Chip connected to USB attached to SoPEC's USB host port (e.g. plugged into the printer's Pictbridge connector if present).
- LSS-based via a 4320 QA Chip directly connected to the cradle.

If the upgrade is temporary in that the upgrade lasts only as long as the dongle is available then a dongle solution is most likely, and for reasons of customer perception, it is most likely to be directly plugged into the cradle, and hence require the LSS.

3.2 Ink Cartridge 3.2.1 InkCartridgeQA

The InkCartridgeQA is a 4320-based QA Chip, and contains the authenticated information required to keep the ink supply secure.

A single InkCartridgeQA will cater for an ink cartridge of up to 6-colors. The volume of ink and type of ink is kept for each color.

If space is available, the InkCartridgeQA can also contain additional non-secure data.

3.2.2 Serial Flash D

Any non-security-related information about the catridge will be kept in the Serial Flash D. The data is expected to be:

- Ink properties such as viscocity profile, nozzle pulse profile etc
- Dead nozzle map Since this information is expected to be less than 7.5 KBytes, a 4320-based serial flash will suffice.

The dead nozzle map may be updated during the lifetime of the printer.

3.3 Ink Refill Cartridge 3.3.1 RefillQA

The RefillQA is a 4320-based QA Chip, and contains the authenticated information required to keep the ink supply secure.

A single RefillQA will cater for a refill cartridge of up to 6-colors. The volume of ink and type of ink is kept for each color.

Depending on how much spare space is available within the RefillQA (this depends on the number of inks), the RefillQA can also contain additional non-secure data such as Refill manufacturing audit information.

3.3.2 Serial Flash E

This serial flash is only required if additional information must be kept in the refill cartridge. Additional information may include such things as:

- ink characteristics to be copied over to Serial Flash D to produce better prints e.g. due to refinements of profiles over time (the inks must be compatible of course).
- lists of compromised key ids so they can be invalidated in the InkCartridgeQA and hence allow rolling keys.

Note that information stored on Serial Flash E can be digitally signed if authenticated information is required.

3.4 Recommended LSS Addresses

Apart from the LSS addresses required by the SoPEC boot ROM (see Table 236), there is no strict requirement for any particular LSS addressing scheme. However, the default LSS addresses for the various devices have been chosen to give a Hamming distance of at least 3 for devices on the various LSS buses.

Assuming the setup in FIG. 355, the following addressing is recommended for LSS bus 0:

TABLE 237

Recommended LSS addresses for LSS bus 0

| LSS address | Expected device at adr | Comments |
|---|---|---|
| 0101_100 | Serial Flash A | 4320-based serial flash. Requires changing LSS address from default 4320 serial flash address [4]. |
| 1111_010 | Serial Flash B | 4320-based serial flash. Matches default address [4]. |
| 1010_000 | Serial Flash C | 3rd party (commercial), higher capacity serial flash. |
| 1111_101 | PrinterQA | 4320-based PrinterQA. Matches default address [3]. |
| 0000_010 | UpgradeQA (temporary) | 4320-based BaseQA. Matches default address [3]. Note that this could readily be available via USB rather than via LSS. |
| 0000_101 | UpgradeQA (permanent) | 4320-based Base+XferQA. Matches default address [3]. Note that this could readily be available via USB rather than via LSS. |
| 1001_xxx | Temp Sensor | If required in the printer cradle (for example to measure ambient temperature), a commercial temperature sensor will have addresses in this range. |
| 1100_xxx | GPIO | If the number of GPIOs in a single SoPEC is not sufficient for driving all of the required IOs, the printer cradle may have an LSS-based commercial GPIO device, with addresses in this range. |

Assuming the setup in FIG. 355, the following addressing is recommended for LSS bus 1:

TABLE 238

Recommended LSS addresses for LSS bus 1

| LSS address | Expected device at adr | Comments |
|---|---|---|
| 0000_010 | InkCartridgeQA | 4320-based BaseQA. Matches default address [3]. |
| 0000_101 | RefillQA | 4320-based Base+XferQA. Matches default address [3]. |
| 1111_010 | Serial Flash D | 4320-based serial flash. Matches default address [4]. |
| 0101_100 | Serial Flash E | 4320-based serial flash. Requires changing LSS address from default 4320 serial flash address [4]. Note that this can be done at the Refill factory as it will be the only device on the LSS bus. |

4. Two-SoPEC Printer

This discussion describes a two-SoPEC printer where both SoPECs are printing—i.e. ink information is required by both SoPECs.

4.1 Simplest Setup

Figure 356:
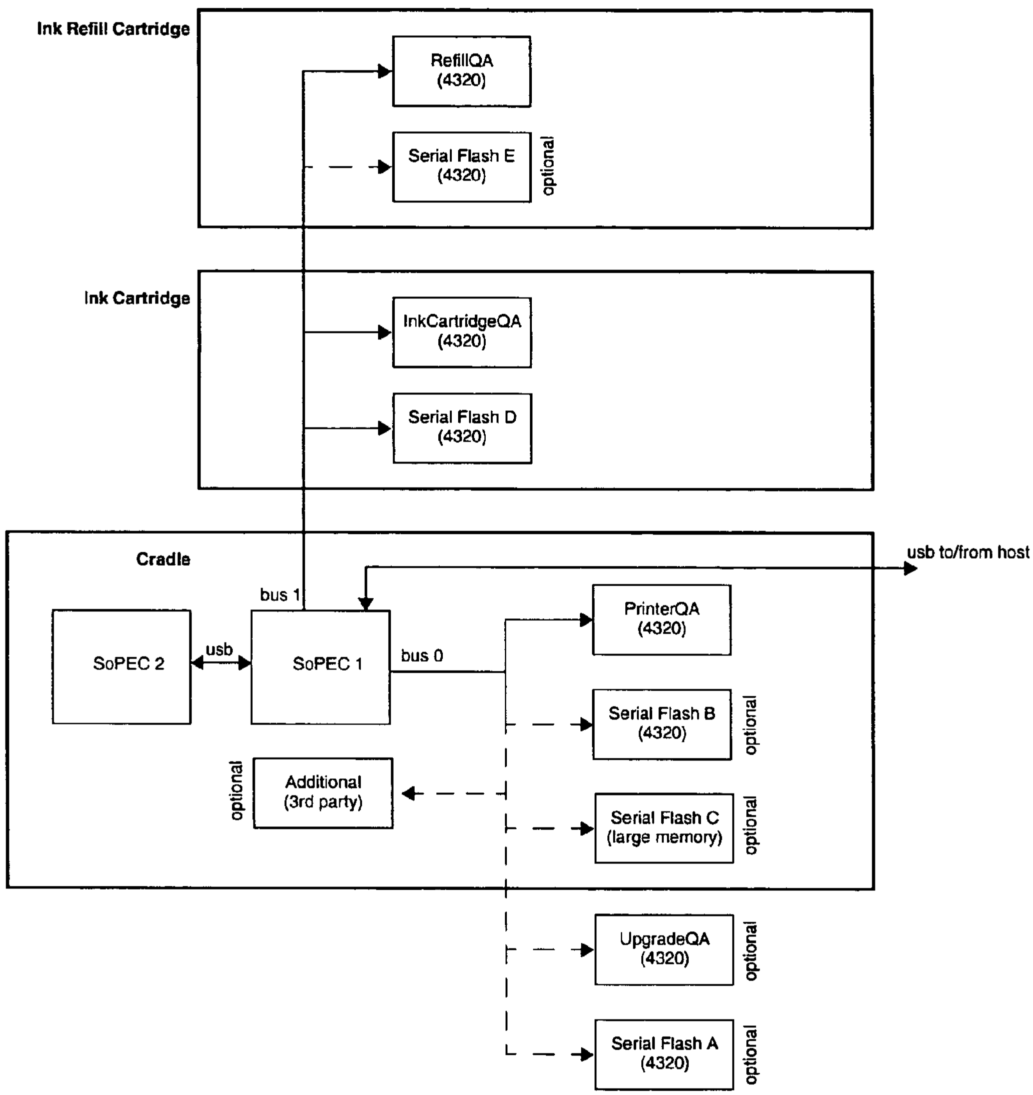

FIG. 356 shows the simplest setup.

In this system, SoPEC1 is the ISC (Inter-SoPEC-Communication) Master and SoPEC2 is an ISC slave. SoPEC1 can boot from Serial Flash A, B, C, or from USB as in the single SoPEC case. SoPEC2 can boot via USB, thus getting its boot code from SoPEC1.

Although the Additional block is shown in FIG. 356, additional LSS devices are unlikely to contain GPIOs as the printer system has a total of 128 GPIO pins due to there being 2 SoPECs (with GPIO 64 pins each). However a temperature sensor is just as likely as in the single SoPEC system.

In this system, SoPEC1 is the only SoPEC that talks on the LSS. SoPEC2 does not directly request any LSS services from SoPEC1. This means that SoPEC2 must transmit its ink usage to SoPEC1, and must request printer parameters from SoPEC1. Since USB is not intrinsically secure, a means of providing secure communications between the two SoPECs is required.

In this option, the PrinterQA contains the SoPEC_id keys for both SoPEC1 and SoPEC2. The PrinterQA also contains the following keys:

- printer_feature_access_key to enable SoPEC software to securely read printer features from PrinterQA or UpgradeQA. This key has no write permissions to the printer features.
- vc_access_key to enable SoPEC software to securely read virtual consumables such as ink volumes and details from InkCartridgeQA and RefillQA. This key has write permissions in the InkCartridge for preauthorisation of ink usage, and has decrement-only permissions on the consumables themselves, and read-only permissions on consumable attribute data.

The startup process involves transferring the printer_feature_access_key to all SoPECs so that it can be used as the InterSoPECKey i.e. a secure key for communication between SoPECs. The startup process is as follows:

SoPEC1 requests the PrinterQA to transport the printer_feature_access_key from the PrinterQA to SoPEC1 via SoPEC1_id key as the transport key.

SoPEC2 requests the InterSoPECKey from SoPEC1. Since SoPEC1 does not know SoPEC2_id_key, SoPEC1 cannot directly send printer_feature_access_key to SoPEC2. However SoPEC1 requests the PrinterQA to transport the printer_feature_access_key from the PrinterQA to SoPEC2 via SoPEC2_id_key as the transport key. Within SoPEC2, the received key is only known as the InterSoPECKey.

SoPEC1 and SoPEC2 can now communicate securely via the printer_feature_access_key.

In addition, SoPEC1 requests the PrinterQA to transport the vc_access_key from the PrinterQA to SoPEC1 via SoPEC1_id_key as the transport key.

During printing, only SoPEC1 communicates with the external QA Chips:

SoPEC1 performs all the LSS transactions with PrinterQA to obtain printer features.

SoPEC1 securely transmits printer feature information to SoPEC2 (e.g. print speed, motor limitations etc.) using InterSoPECKey.

SoPEC2 securely transmits ink usage information (from a print) to SoPEC1 using InterSoPECKey.

SoPEC1 combines the ink usage from SoPEC1 and SoPEC2.

SoPEC1 updates ink amounts in the InkCartridgeQA via the LSS (and vc_access_key)

If a single PrinterQA cannot hold the SoPEC_id_keys for both SoPEC1 and SoPEC2, a second PrinterQA can be added, connected directly to SoPEC1.

4.2 Recommended LSS Addresses

LSS Addressing would be as per Section 3.4 with the exception that GPIO devices are unlikely due to there being 2 SoPECs with 64 GPIO pins each.

4.3 Alternative Setup

Figure 357:
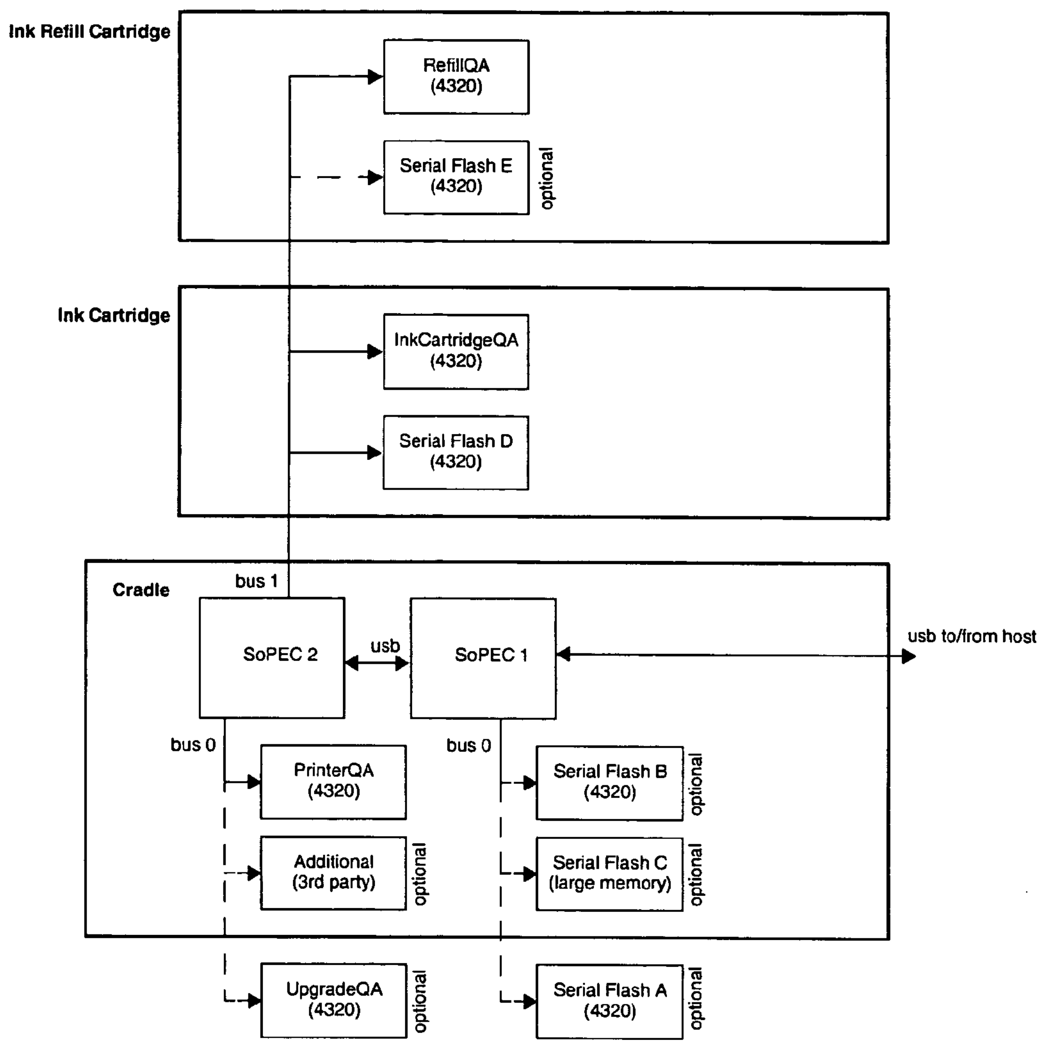

FIG. 357 shows an alternative setup to that described in Section 4.1.

The primary difference in setup between FIG. 357 and FIG. 356 is that SoPEC1 is the boot master (and can thus boot from Serial Flash A, B, C, or USB), while SoPEC2 is the LSS master for QA-related activities.

By creating two bus 0s, the effective Hamming distance between devices on each bus is increased, and can be further increased by reassigning ids if desired.

The same principles of secure access to the PrinterQA and ink-related QA Chips as described in Section 4.1 are required.

N-SoPEC Printer

The principles applied in Section 4 can be readily applied to n-SoPEC printing.

At startup, SoPEC1 obtains the access keys from PrinterQA, as well providing a service to the various SoPECs for them to obtain the InterSoPECKey. SoPEC1 performs this service by calling functions on PrinterQA. All SoPECs can now communicate securely via the InterSoPECKey.

The number of PrinterQAs required in a cradle is determined by the total number of keys that can be stored in each.

6 Multiple Ink Devices

In certain non-soho applications, it may be desirable to have multiple physical QA devices for ink supply. For example, if ink reservoirs are installed separately, it would be useful to have a single InkQA device for each ink reservoir. In such a setup it may also be possible that multiple ink refills are occurring simultaneously.

It is the responsibility of the system designer to allocate LSS buses and LSS ids to the various devices for the purposes of the specific system. This section gives comment on the two extreme setups for the purposes of illustration.

At one extreme, each ink device has its own LSS bus. In a similar setup, each InkQA and its corresponding RefillQA could have its own LSS bus. The ids for RefillQA and InkQAs could be arbitrarily chosen to ensure the Hamming distance between them was maximised. The programming of ids can readily be accomplished at the fill/refill factory.

At the other extreme, all InkQAs and RefillQAs are on the same bus. In this case, the following ids are recommended to give a Hamming distance of 3, especially if serial flash is also required on the same bus:

TABLE 239

Recommended LSS addresses when multiple ink devices share the same bus

| LSS address | Expected device at adr | Comments |
|---|---|---|
| 0000_010 | InkQA1 | 4320-based BaseQA. Matches default address [3]. |
| 0011_001 | InkQA2 | Requires changing LSS address from default BaseQA [3]. |
| 0011_110 | InkQA3 | Requires changing LSS address from default BaseQA [3]. |
| 0101_011 | InkQA4 | Requires changing LSS address from default BaseQA [3]. |
| 1100_001 | InkQA5 | Requires changing LSS address from default BaseQA [3]. |
| 1100_110 | InkQA6 | Requires changing LSS address from default BaseQA [3]. |
| 0000_101 | RefillQA1 | 4320-based Base+XferQA. Matches default address [3]. |
| 1010_011 | RefillQA2 | Requires changing LSS address from default Base+XferQA [3]. |
| 1010_110 | RefillQA3 | Requires changing LSS address from default Base+XferQA [3]. |
| 1001_000 | RefillQA4 | Requires changing LSS address from default Base+XferQA [3]. |
| 1001_111 | RefillQA5 | Requires changing LSS address from default Base+XferQA [3]. |
| 0110_000 | RefillQA6 | Requires changing LSS address from default Base+XferQA [3]. |

2 DIU Functionality and Timing 2.1 Description of Timeslot System 2.1.1 Basic Timeslot System The DIU uses a timeslot system to allocate access to the DRAM. 64 timeslots are provided though typically not all of these will be used. Each timeslot is allocated by the register programming to one of the non-CPU read or write requesters, giving this requester first priority access to the slot. If the programmed requester is not requesting, the timeslot is allocated to another requester by means of a priority scheme for writers and a two-level round-robin scheme for readers.

2.1.2 Special Case of Write Requesters

Write requesters may not be programmed to be in adjacent slots. This is a limitation imposed by the implementation. Write requesters will be acknowledged at least 6 cycles before their allocated timeslot to give time for transferring data before the timeslot arrives. This is known as 'write pre-arbitration'.

2.1.3 Reallocation of Unallocated Slots

In the case of a write slot not being required by its programmed requester, the slot is allocated in the priority order UHU->UDU->SFU->DWU->MMI->unused read allocation. The CDU writer cannot win any timeslot other than its own as it takes 9 cycles to complete its access.

An unused read slot is allocated via a two-level round-robin system, programmed by the ReadRoundRobinLevel register. A pointer moves in turn from the last winning read requester through all requesters in Level 1 and the first that is requesting is assigned the slot. If none are requesting in Level 1 then the process is repeated for Level 2. A special requester 'Refresh/CPU' is a participant in this round-robin, giving preference to the CPU over Refresh. An unused read slot will not be allocated to a non-CPU write requester.

2.1.4 Special Case of CPU Accesses

CPU write requests are posted internally in the DIU before being written to DRAM. A CPU request exists if a CPU write is waiting in the posted write buffer or a CPU read request is active. CPU accesses are given priority access to a 'pre-access' optional slot immediately preceding each main timeslot. If a CPU request exists (where writing takes priority over reading) the CPU request is serviced, taking 3 clock cycles, and the main timeslot is serviced immediately afterwards. The number of slots that can have such a pre-access is controlled by the CPUPreAccess-Timeslots and CPUTotalTimeslots registers. If the EnableCPURoundRobin register is set, the CPU is able to use main timeslots that the 'Refresh/CPU' participant wins through the round-robin reallocation scheme.

2.1.5 DRAM Refreshing

The DRAM requires the entire array to be refreshed every 3.2 ms. 5120 refresh accesses are required to complete the array. A single refresh access issued on average every 119 clock cycles (at 192 MHz) is sufficient. Refresh accesses can occur in main timeslots if the slot is allocated through the round-robin scheme and the always-active refresh request wins. A countdown timer forces a refresh to happen at least every 119 clock cycles by interrupting the timeslot rotation and adding an extra slot for refresh. This slot can also take a pre-access, meaning a forced refresh can delay the progress of the timeslot rotation by 6 clock cycles.

2.2 List of Cycle Times of Requesters and Requester Combinations

TABLE 240

Cycle times of requesters

| Access Type | Clock cycles taken |
|---|---|
| Non-CPU read access, not following a non-CPU read access | 3 cycles |
| Non-CPU write access excluding CDU write access | 3 cycles |
| CPU access, as timeslot or timeslot pre-access | 3 cycles |
| CDU write access | 9 cycles |
| Non-CPU read access, following a non-CPU read access | 4 cycles |
| DRAM refresh | 3 cycles |

2.3 Repeatability of Test Prints

To assist with the repeatability of test prints, functionality known as 'RotationSync' is included in the DIU. Clearing the RotationSync register will cause the timeslot rotation to halt at the end of the current rotation and allocate all DRAM accesses to the CPU or Refresh, with the priority CPU (W)->CPU(R)->Refresh. Setting the RotationSync register will cause the DIU to execute a short sequence of accesses known as the preamble, before recommencing the timeslot rotation from slot 0. When the RotationSync register is set, the next DRAM access will be a Refresh, and the diu_cpu_rdy signal to complete the register access will be delayed by 1-3 clock cycles so it will coincide with the start of this Refresh access.

3 Satisfying Bandwidth and Latency Requirements 3.1 Bits-Per-Cycle Analysis

A single SoPEC is required to produce data from the DNC at a rate of 1 bit/cycle. Many of the upstream blocks read or write data at approximately this rate or a multiple of this rate. In analysing bandwidth requirements it is convenient to construct the timeslot programming as a nominally 256-cycle rotation, such that 1 bit/cycle is equivalent to one 256-bit read or write per rotation, and one slot is allocated for each bit/cycle required.

3.2 Compensation for Latency

A non-CPU DIU requester faces a minimum gap between the acknowledgment by the DIU of a current request and the issuing of the next. This is due to the state machine to clock the 4 cycles of data, some cycles of latency of registering requests and the DRAM access time. For read requesters this is around 10 cycles in total (less for the LLU) and for writes around 9 cycles.

Most requesters are at least double-buffered internally. For example a one-slot-per-rotation read requester that consumes 256 bits of internal data in 256 cycles takes from the time a request is issued (for the empty buffer) to the time the block is out of data (and therefore stalled) 256 cycles. It takes 10 cycles of latency for the block to be able to use the data, so the request must be serviced in 256-10 cycles if a stall is to be avoided. If the rotation time was fixed at 256 cycles the block will (after startup) be re-requesting around 10 cycles after acknowledgment of the previous request, so will always be requesting in time to use its allocated slot and therefore take up all the bandwidth. The LBD operating at 1:1 compression is an example of this, as are each of the separate SFU request channels.

However the total time for a rotation is not fixed at 256 cycles. The time taken for a particular rotation depends on a number of factors, including

- the number of cpu pre-accesses that occur, and whether they are pre-accesses or main slots
- the number of 4-cycle accesses (consecutive non-CPU reads)
- the number of CDU(W) accesses
- the number of forced refreshes These factors can vary during operation, for example if a burst of CPU or USB activity occurs. This means that rotations can vary from well under 256 cycles to close to 256 cycles. This means that the alignment of the requests with the allocated slots is not guaranteed, and a requester can miss its slot by a clock cycle. In this case the servicing time or latency is the length of the whole rotation. To ensure that such a block cannot stall, the rotation is shortened by 10 cycles. For multiple-slot requesters, the latency analysis would suggest that this 10 cycles be subtracted for each access. In practice for each of these blocks it can be argued that this is not necessary.

3.3 Computation of CPU Access Ratios

The nominal timeslot rotation is 256 cycles. A 64-slot rotation with all 4-cycle accesses and no CPU pre-accesses will take 256 cycles. For a shorter rotation, CPU pre-accesses can use the unused bandwidth, taking each slot from 3 or 4 cycles to 6 cycles. The worst-case analysis that follows assumes all non-pre-accessed slots are 4 cycles. A pre-accessed slot takes 6 cycles total whether on a read or a write slot, so the 4-cycle assumption makes a difference only for the non-pre-accessed slots.

Say that the allocation gives C slots to CPU(W) accesses, and N slots overall.

Timeslot rotation is nominally 256 cycles.

Subtract L=10 cycles for latency allowance as described in the previous section. An increase in this value will speed up the rotation.

Subtract C*6 cycles as a CPU(W) access takes 6 cycles longer than other non-CPU write accesses.

Add R extra slots to N to allow for forced refresh accesses, which occur every 119 cycles, so up to 3 per rotation. These can be pre-accessed so are counted with the main slots in this calculation.

Each pre-accessed slot will take 2 cycles longer than the 4 cycles per slot allowed, making the total 6 cycles. Call the number of pre-accessed slots P.

Time allowed for rotation=256−L

Time taken by slots=C*6+(N+R)*4+P*2

256−L=C*6+(N+R)*4+P*2

P=(256−L−(C*6)−(N+R)*4)/2

Percentage of slots that can be pre-accessed=P(N+R).

In the average case where not all non-pre-accessed slots are 4 cycles, a slightly greater allocation of CPU pre-accesses is possible, but the guarantees of the rotation time will not necessarily hold.

In choosing the numerator and denominator for the pre-access ratio it is advisable to choose as low a denominator as possible to reduce clumping in the CPU requests relative to the main rotation. For example, a ratio of 4/12 will allow up to 12 CPU pre-accesses to 20 slots in the worst-case, whereas a ratio of 1/3 would allow only 8. Excessive clumping may increase the maximum servicing time of a requester, leading to stalling if the timing is tight.

3.4 Servicing of High Bandwidth Requesters

Most of the high bandwidth requesters in SoPEC have sufficient buffering to average out significant stalls, as long as the bandwidth is supplied over a the rotation. The DWU, LLU and CFU need many slots allocated but these do not need to be evenly distributed. For the DWU the slots must have a gap of at least 2 slots, and the CFU a gap of at least 3 slots to allow for the data to be transferred and the block to re-request. The LLU's state machine can re-request as soon as the first request is acknowledged so can be allocated every second slot.

The CDU read and write require 4 slots each in the contone scale factor (SF)=4 case, where 1.5 buffering is used to the CFU, such that the CDU must work in half the time the CFU does. Latency effects could mean that the CDU was not guaranteed unstalled service, however the fast processing rate of the CDU JPEG engine (8 bits/cycle) means that this is not a problem. The JPEG engine may process slower than this for very low rates of compression, so extra slots for the CDU or more allowance for latency may need to be made. An even distribution of CDU(R) and CDU(W) slots will minimise stalling.

3.5 Servicing of Very Low Bandwidth Requesters Via Round-Robin

Read requesters with a very low bandwidth requirement, for example the TFS and the HCU, can be allocated bandwidth indirectly. Many of the multiple-slot requesters will not use all of their allocation all the time as they are allocated slots for their peak requirements not average requirements. As described above, all unused read slots are reallocated through a two-level round robin scheme. Low-bandwidth requesters without their own slot such as the HCU and TFS should be put in the top level (Level 1). The PCU should also be in the top level as it requests infrequently but may require several accesses in a short period of time. The Refresh requester is always requesting so will lock out any requesters in the lower level if it is in Level 1. The DNC allocation of 3 slots may be replaced with a smaller allocation and a Level 1 round-robin entry if the clumping of DNC table entries is expected to be low.

3.6 Timeslot Register Programming Using Spreadsheet

A spreadsheet can be constructed to make the process of slot allocation easier. The main tasks of the spreadsheet are to count the allocated slots and to assist with allocating the slots such that the multi-slot requesters are well distributed.

In the same directory as this document the spreadsheet 'programming_macro.xls' can be found. This requires the Analysis Toolpak installed which is an option on the standard installation of Excel. The Analysis Toolpak has the HEX2DEC and DEC2HEX functions that are used to create hex register writes ready to cut and paste into a file.

To use, in column C, rows 20-38 enter the number of slots to allocate to each requester. In column J, from row 20 onwards, enter the name of a requester in each slot. These are tallied up in column E. Column K will display 'WRITE' if consecutive write slots are programmed. Columns V and W create a list register writes in hex. The area near slot A90 computes a worst-case CPU access ratio, as described in an earlier section of this document.

The remainder of the spreadsheet assists in creating evenly spread requesters by computing the deviation of the slot allocated from an even distribution of that requester. Column L estimates the usual cycle time of the rotation, taking into account the expected write slots and the CDU writes. The columns to the right of this compute approximately the evenness of the slot distribution for multi-slot requesters, showing a + value in cycles for a slot that is late and a − value in cycles for a slot that is early. Note that requesters such as the LLU and DWU do not require a perfect allocation and the slot spread information is provided as a guide not a rule. The early/late indications will update if the intervening slots change, for example if the location of the CDU(W) slots changes.

3.7 Application-Specific Bandwidth Requirements

The following blocks will have different requirements for each application.

3.7.1 CDU/CFU

The CDU outputs data in 8-line chunks. To reduce DRAM requirements a 12-line buffer can be used between the CDU and the CFU such that the CDU writes only half the time. In this case the CDU bandwidth requirements are twice the rate required for continuous operation. DRAM space may be traded for slot requirements by allocating a 16 or more line buffer.

TABLE 241

CDU(R) and CDU(W) slot allocations

| Contone Scale Factor | Bandwidth required for 1.5x (12 line) buffer (bits/cycle) | Slots allocated | Bandwidth required for 2x (16+ line) buffer (bits/cycle) | Slots allocated |
|---|---|---|---|---|
| 6 (267 ppi) | 1.8 | 2 | 0.9 | 1 |
| 5 (320 ppi) | 2.6 | 3 | 1.3 | 2 |
| 4 (400 ppi) | 4 | 4 | 2 | 2 |

TABLE 242

CFU slot allocations

| Contone Scale Factor | Bandwidth required (bits/cycle) | Slots allocated |
|---|---|---|
| 6 (267 ppi) | 5.4 | 6 |
| 5 (320 ppi) | 6.5 | 7 |
| 4 (400 ppi) | 8 | 8 |

3.7.2 USB

To run at USB 1.1 speeds (known as 'full-speed' in USB 2.0) one slot is more than sufficient for each of the USB readers and writers (UDU(R), UDU(W), UHU(R), UHU (W)). The readers may win accesses in the round-robin is sufficient slots are not allocated, but the writers should be allocated a slot as only unused write slots can pass to writers, and there may be none of these available.

To run at USB 2.0 speeds ('high-speed') with streaming, three slots per requester are needed. The bandwidth requirement of the USB 2.0 is about 2.5 bits/cycle (480 Mb/s divided by 192 MHz). Three slots is sufficient to guarantee sustained service as required for high-speed streaming.

3.7.3 LLU

The number of slots required depends on the shape of the printhead. This can vary from 8 to 13. The LLU has significant internal buffering so peak demands can be averaged, reducing the slot requirement to average bandwidth not peak bandwidth. The LLU can re-request in time to utilise every second slot, and the buffering will tolerate some unevenness in the spread of slots.

4 Example Allocations 4.1 Common SoPEC Slot Allocations

TABLE 243

Common Sopec slot allocations

| Requester | Slot allocation | Comments |
|---|---|---|
| DNC | 3 | May be reduced if dead-nozzle count <5%, or low clumping of dead-nozzles. |
| DWU | 6 | |
| HCU | 0 | Put in top level of round robin |
| LBD | 1 | Maximum for 1:1 compression |
| PCU | 1 | To ensure some bandwidth is available, but may be put in round-robin instead. |
| SFU(R) | 2 | |
| SFU(W) | 1 | |

TABLE 243-continued

Common Sopec slot allocations

| Requester | Slot allocation | Comments |
|---|---|---|
| TD | 1 | |
| TFS | 0 | Put in top level of round robin |

4.2 Description of Applications 4.2.1 SF=5, Single SoPEC, USB Full-Speed Device Only Slot allocations as in Section 4.1, and Table 244 below. All others allocated 0 slots.

TABLE 244

| Requester | Slot allocation | Comments |
|---|---|---|
| CDU(W) | 3 | SF = 5, 1.5x buffering. |
| CDU(R) | 3 | |
| CFU | 7 | |
| LLU | 8 | Using printhead that is well aligned with 256-bit words. |
| UDU(R) | 1 | Full-speed, not high-speed. |
| UDU(W) | 1 | |

Total slots: 38

In equation in earlier section, L=10, C=3, R=3, N=38.

$$P = (256 - L - (C^*6) - (N + R)^*4)/2$$
$$= 32$$

$$CPU \text{ percentage allocated} = P/(N + R)$$
$$= 32/41$$
$$= 78\%.$$

A sample programming is listed in Section 4.3.

4.2.2 SF=4, Single SoPEC, USB Full-Speed Device

Slot allocations as in Section 4.1, and table 245 below. All others allocated 0 slots.

TABLE 245

| Requester | Slot allocation | Comments |
|---|---|---|
| CDU(W) | 4 | SF = 4, 1.5x buffering. |
| CDU(R) | 4 | |
| CFU | 8 | |
| LLU | 12 | Using printhead that is not well aligned with 256-bit words. |
| UDU(R) | 1 | Full-speed, not high-speed. |
| UDU(W) | 1 | |

Total slots: 45

In equation in earlier section, L=10, C=4, R=3, N=45.

$$P = (256 - L - (C^*6) - (N + R)^*4)/2$$
$$= 15$$

-continued $$\begin{aligned} CPU \text{ percentage allocated} &= P/(N+R) \\ &= 15/48 \\ &= 31\%. \end{aligned}$$

A sample programming is listed in Section 4.3.

4.2.3 SF=5, Multiple SoPEC, USB High-Speed Device+ Host

Slot allocations as in Section 4.1 and Table 246 below. All others allocated 0 slots. This programming is for the SoPEC that is using all its USB capacity, for example by forwarding significant amounts of data to the other SoPECs in the system, and also dealing with a scanner or other input device, back to the host PC.

TABLE 246

| Requester | Slot allocation | Comments |
|---|---|---|
| CDU(W) | 3 | SF = 5, 1.5x buffering. |
| CDU(R) | 3 | |
| CFU | 7 | |
| LLU | 12 | Using printhead that is not well aligned with 256-bit words. |
| UDU(R) | 3 | High-speed device, streaming |
| UDU(W) | 3 | High-speed device, streaming |
| UHU(R) | 3 | High-speed host |
| UHU(W) | 3 | High-speed host |

Total slots: 52

In equation in earlier section, L=10, C=3, R=3, N=52.

$$\begin{aligned} P &= (256 - L - (C^*6) - (N+R)^*4)/2 \\ &= 4 \end{aligned}$$

$$\begin{aligned} CPU \text{ percentage allocated} &= P/(N+R) \\ &= 4/55 \\ &= 7.3\%. \end{aligned}$$

The CPU percentage is quite low, with only 4 CPU pre-accesses allowed for each approximately 246 cycle rotation. In practice the CPU will be able to claim many unused timeslots. Each of the UDU and UHU requesters is over-provided with bandwidth (2.5 bits/cycle required vs 3 bits/cycle allocated). In addition the CDU is active only half the time, though this is with a granularity of 8 print lines. To reduce the latency of CPU requests the Refresh/CPU round-robin participant could be placed in the top level of the round-robin. This will have the effect of locking out all participants in the lower level so only requesters that are allocated sufficient bandwidth via the slots should be there. The PCU, HCU and TFS must remain in the top level.

A sample programming is listed in Section 4.3.

4.3 Table 247 of Programmings

TABLE 247

| Slot number | Requester - from (4.2.1) | Requester - from (4.2.2) | Requester - from (4.2.3) |
|---|---|---|---|
| 0 | cdu(r) | cdu(r) | cdu(w) |
| 1 | dwu | llu | Cfu |
| 2 | dnc | cfu | Udu(r) |
| 3 | llu | cdu(w) | Dwu |
| 4 | cdu(w) | llu | cdu(r) |
| 5 | cfu | dwu | Llu |
| 6 | pcu | dnc | Udu(w) |
| 7 | dwu | llu | sfu(r) |
| 8 | llu | cfu | Llu |
| 9 | td | sfu(r) | Cfu |
| 10 | cfu | llu | Uhu(r) |
| 11 | llu | cdu(r) | Dwu |
| 12 | dwu | dwu | Llu |
| 13 | cdu(r) | cfu | Uhu(w) |
| 14 | dnc | cdu(w) | Dnc |
| 15 | llu | llu | sfu(w) |
| 16 | cfu | udu(r) | Cfu |
| 17 | cdu(w) | td | cdu(w) |
| 18 | sfu(r) | llu | Llu |
| 19 | dwu | cfu | Udu(r) |
| 20 | llu | dwu | Dwu |
| 21 | cfu | dnc | cdu(r) |
| 22 | sfu(w) | llu | Cfu |
| 23 | lbd | cdu(r) | Llu |
| 24 | llu | cfu | Udu(w) |
| 25 | dwu | llu | Lbd |
| 26 | cdu(r) | cdu(w) | Llu |
| 27 | cfu | pcu | Uhu(r) |
| 28 | dnc | dwu | Dwu |
| 29 | llu | llu | Cfu |
| 30 | cdu(w) | cfu | Uhu(w) |
| 31 | udu(r) | sfu(r) | Llu |
| 32 | dwu | llu | Dnc |
| 33 | cfu | dwu | sfu(r) |
| 34 | llu | cdu(r) | Llu |
| 35 | udu(w) | cfu | cdu(w) |
| 36 | sfu(r) | dnc | Udu(r) |
| 37 | cfu | cdu(w) | Dwu |
| 38 | | llu | Cfu |
| 39 | | lbd | cdu(r) |
| 40 | | dwu | Llu |
| 41 | | cfu | Udu(w) |
| 42 | | udu(w) | Pcu |
| 43 | | llu | Llu |
| 44 | | sfu(w) | Dwu |
| 45 | | | uhu(r) |
| 46 | | | Cfu |
| 47 | | | Llu |
| 48 | | | uhu(w) |
| 49 | | | Td |
| 50 | | | Dnc |
| 51 | | | Llu |

2 Background 2.1 SoPEC Structure

Figure 358:
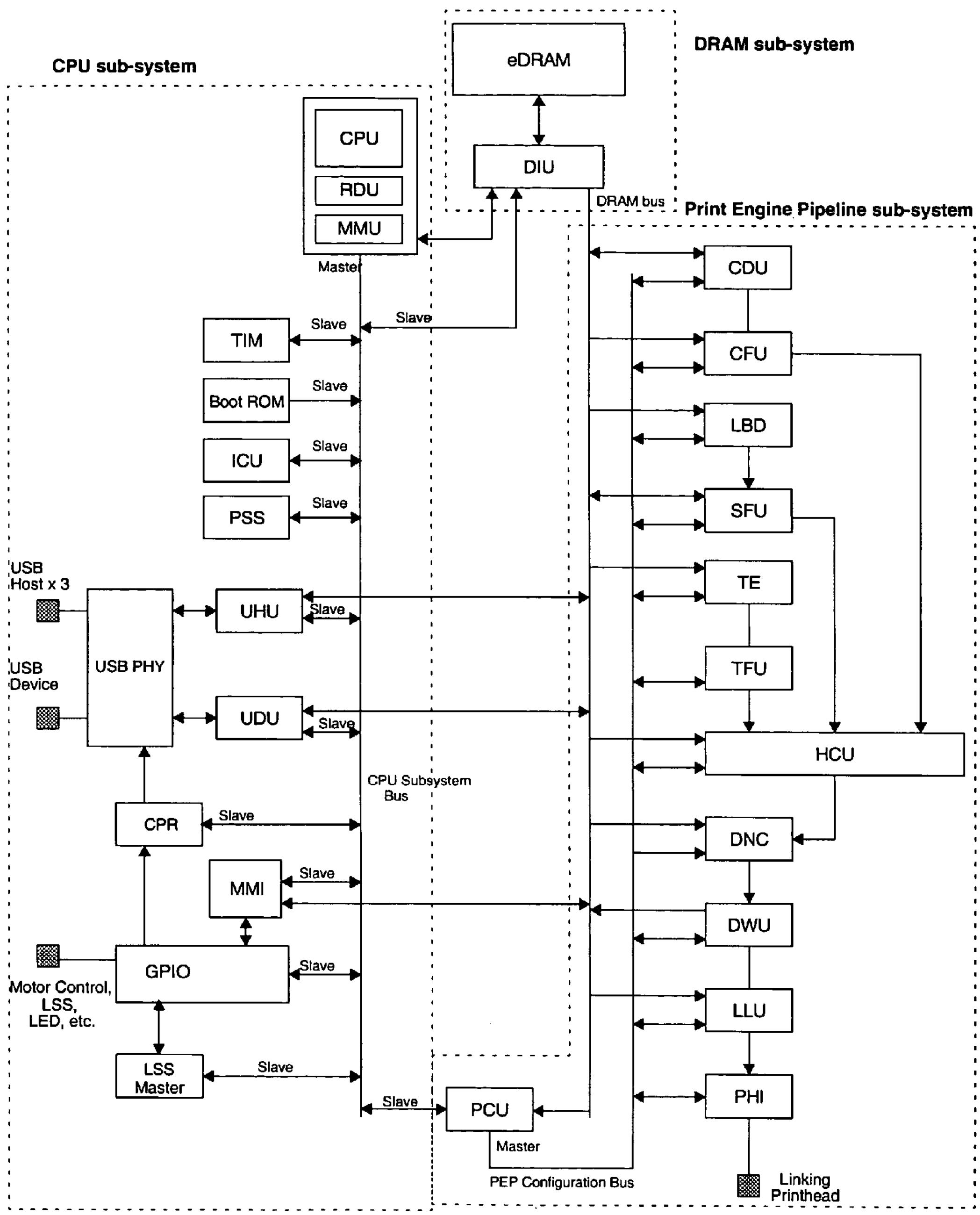

The SoPEC block diagram shown in FIG. 358 is replicated in SoPEC System Top Level partition, for reference in the following descriptions.

2.2 Basic Printing Operation from HOST PC

The most basic operation of SoPEC is to print a page from a host PC. With reference to SoPEC System Top Level partition, this is performed as follows:

a. The UDU receives the page data on the USB device interface, and writes it into memory (eDRAM).

b. The CPU reads the page header, and configures various modules in the Print Engine Pipeline (PEP) subsystem. The CPU then issues a "Go" command to the PEP units.

c. The PEP modules process the page description from memory, generating output to the printhead at the bottom of the pipeline.

During processing, the TE, LDB and CDU are at the top of the pipeline, fetching the tag, compressed bi-level and compressed contone planes respectively from the page description in memory. Data flow between and within modules is commonly implemented via buffers residing in memory, each buffer typically containing a small number of lines. Modules also access memory to fetch processing parameters such as dither matrices.

In this mode of operation, the CPU does not interact with the PEP modules during the generation of output data for the page.

In general printing can be started without the entire page being loaded in memory. Instead, successive bands of data are received over USB in parallel with the processing of earlier bands by the PEP pipeline.

2.3 External Data Interfaces

The UDU is the only interface that is required for PC printing as described in 2.2 Basic printing operation from Host PC. Data of any nature can also flow between SoPEC and external devices via the UHU (USB host interface) and MMI (Multiple Media interface).

All of these interfaces work in DMA mode, reading and writing data directly to/from memory buffers, where it can be accessed by the CPU, by the PEP units, and by the other interface units.

2.4 Software Management of Memory Buffers

As mentioned in 2.2 Basic printing operation from Host PC, data passed between various PEP modules travels via buffers in the memory. By default, the output buffer of one module is the input buffer of a later module in the pipeline, and the PEP modules handle the buffer management without CPU intervention.

However, the PEP modules can be configured to interact with the CPU, instead of each other, in the management of buffers. Each module's map of the location of its buffers in memory is independent. As noted in 2.3 External Data Interfaces, the SoPEC interface modules also communicate via memory buffers managed by the CPU. As a result, variations on the default PEP printing flow are possible, by configuring PEP modules, CPU and interface module buffers in different relationships. Modules can be set up independently or together to create an arbitrary pipeline structure.

Examples of Possible Buffer relationship describes some of the possible generic relationships between memory buffer.

2.5 Buffer Management Example: CDU/CFU

The CDU writes decompressed contone data to memory. The CFU reads this data and supplies it to the HCU. By default, the units are configured to use a common memory area as a buffer. The CDU tells the CFU whenever 8 lines of new data are available in the buffer, and the CFU tells the CDU when it has consumed those lines, so that the CDU can safely overwrite them. This is called "external" mode in the CDU and CFU.

The alternative mode, internal mode, disables the handshaking between the CDU and the CFU. Instead, the CDU's knowledge of the buffer space available to write contone data is updated by the CPU, by writing to a CDU internal register. The CPU reads a CDU register to see how much data the CDU has written out. Similarly, the CFU's knowledge of how much contone data is available for it to read is controlled by the CPU writing to a CFU register, and the CPU reads a CFU register to find out how much data has been consumed.

This decoupling of CDU writes from CFU reads allows the CPU to sit between the CDU and CFU during the generation of a page. This enables a number of variations on the normal PEP processing flow:

a. The CPU can perform an image processing step of some type on data in the common buffer between the CDU and CFU, delaying making the data available to the CFU until after the image processing step has been performed.

b. Similar to the CPU can perform an image processing step of some type on data in the co, but with completely separate buffers for CDU and CFU, i.e. the CPU reads data from the CDU write area in memory, processes it, and writes it into a completely separate CFU read area.

c. The CDU can be disabled entirely, and the decompressed contone data can be written into memory from some other source, for example via DMA from the MMI, UDU, UHU or a CPU process. The CPU tells the CFU about this data as it arrives, and the CFU reads the data and supplies it to the HCU.

d. The CDU can be used as a general purpose decompression unit, writing data to a memory buffer, which the CPU monitors and make available to, for example the MMI.

When the CDU-CFU interface is being managed by the CPU in this way, the remainder of the PEP pipeline continues to operate as for the standard page printing case. Each

TABLE 248

Examples of Possible Buffer relationships

| Buffer Relationships | Description |
|---|---|
| $InBuff_{PEPmoduleN} = OutBuff_{PEPmoduleM}$ | ModuleN's data comes directly from moduleM. Default operation, typically M = N+1 |
| $InBuff_{CPUprocX} = OutBuff_{PEPmoduleM}$<br>$InBuff_{PEPmoduleN} = OutBuff_{CPUprocX}$ | CPU process X modifies data between modules M and N. The CPU process's InBuff and OutBuff may occupy different memory areas, or use the same memory area (i.e. CPU process X running "in-line" between modules M and N) |
| $InBuff_{PEPmoduleN} = OutBuff_{InterfaceA}$ | ModuleN's data comes from a source external to SoPEC, effectively bypassing moduleM in the pipeline. |
| $InBuff_{PEPmoduleN} = OutBuff_{CPUprocY}$ | ModuleN's input data is generated directly by CPU process Y. |
| $InBuff_{InterfaceA} = OutBuff_{PEPmoduleN}$ | ModuleM's output is sent out of SoPEC to an external device, rather than to the printer |

module is enabled by its Go bit, manages its own memory buffers, and sees the same data on its interfaces as it would normally expect.

This example has described the CDU-CFU interaction. There is a similar set of options for other PEP modules. The SFU receives decompressed bi-level data from the LBD, writes it to memory, and then separately reads it back to pass to the HCU. The SFU write and read operations can be decoupled, allowing the CPU to intervene in a similar way to the CDU-CFU case. Similar the DWU and LLU can have their normally shared buffer decoupled.

3 Configurable Pipeline Usage Scenarios

The section contains examples illustrating how the configurability of the SoPEC memory buffer relationships can be used to implement various product functions using SoPEC.

3.1 Digital Camera Printing 3.1.1 Requirement

SoPEC can be used to print data directly from a digital camera, without the intervention of a host PC.

The digital camera interfaces to SoPEC via one of SoPEC's USB host ports, controlled by the UHU. SoPEC uploads the image to be printed from the camera to memory. This image would most likely be a JPEG compressed, RGB image of perhaps 5 Megapixels.

To print this image, SoPEC needs to decompress it, colour convert from RGB to CMYK, possibly perform other image processing operations such as colour balancing, then deliver to the printhead.

3.1.2 Basic Pipeline

Due to SoPEC's limited internal memory size, these steps in the printing operation need to be performed in a pipelined manner; the entire image may be too big to be stored in memory when decompressed, and possibly even when compressed.

The processing pipeline for this case has the following concurrent elements:

a. The UHU streaming compressed RGB data into memory buffer 1.
b. The CDU reading data from memory buffer 1, decompressing it, and writing it to memory buffer 2.
c. The CPU performing colour conversion and other image processing on memory buffer 2, and writing the uncompressed CMYK data to memory buffer 3.
d. The CFU reading data from memory buffer 3, and sending it to the HCU, and ultimately the printhead.

The CPU controls each of the memory buffers, via registers in the UHU, CDU and CFU. Each buffer need only contain a relatively small number of lines of data (10 to 100 lines). In the basic case, there is no bi-level or tag data, so the SFU, TE and TFU are suitably configured to provide null data to the HCU for those planes.

3.1.3 Variations

Some other variations on the above pipeline might be used in digital camera printing.

In order to print some text over a portion of the photo, the CPU could write a bit-mapped image into memory, then direct the SFU to read bi-level data from this memory area, to be composited with the contone data in the HCU.

If the image needs rotation, SoPEC can, for example, utilise an external memory device connected to the MMI interface. In this case, printing would have two stages, each with its own pipeline. In the first stage data would stream concurrently from UHU to eDRAM, from eDRAM through the CDU back to eDRAM, and from eDRAM to MMI and out to external memory. The second stage would stream data from external memory via the MMI to eDRAM (in rotated order), the CPU would perform its colour conversion, and the resulting data would be read by the CDU. Within each stage, the internal memory (eDRAM) buffers can again be quite small.

3.2 Photocopy Function

SoPEC supports the direct attachment of a scanner, usually on the MMI interface. To implement a photocopy function, data from the scanner needs to delivered to the printhead. This raw scanner data is likely to be uncompressed RGB pixels in raster order. A complete page of uncompressed data will not fit in SoPEC's memory, so again pipelined operation is required.

The basic operation in this case is a. The MMI streaming uncompressed RGB data into memory buffer 1.
b. The CPU performing colour conversion and other image processing on memory buffer 1, and writing the uncompressed CMYK data to memory buffer 2.
c. The CFU reading data from memory buffer 2, and sending it to the HCU, and ultimately the printhead.

As for the digital camera case, other pipeline configurations are available to support image rotation etc.

3.3 Alternative Decompression Algorithms

SoPEC implements hardware JPEG decompression for contone data, and hardware SMG4 decompression for bi-level data. In some application, it is possible that SoPEC will need to print data compressed using other algorithms, such as JPEG2000 (contone) or JBIG (bi-level). These applications would use decompression software running on the SoPEC CPU.

To print a JPEG200 image, SoPEC might use the following pipeline configuration a. The UDU or other interface streaming JPEG200 compressed data (RGB or CMYK) into memory buffer 1.
b. A CPU process reading data from memory buffer 1, decompressing it in software, and writing the results to memory buffer 2.
c. A second CPU process reading data from memory buffer 2, performing colour conversion and/or image processing, and writing results to memory buffer 3.
d. The CFU reading data from memory buffer 3, and sending it to the HCU, and ultimately the printhead.

The pipeline to print a JBIG image would be similar, except that buffer 3 would be read by the SFU.

3.4 Dot-For-Dot Printing

For some applications (particular system test) it is a requirement to have a host PC or embedded CPU software specify precisely the dots that should be printed by the printhead. This is known as dot-for-dot printing.

Dot for dot printing is achieved by having the CPU or the UDU write dot data into a memory buffer, in the format that would normally be generated by the DWU. There are two individual memory buffers for each colour to be printed. The LLU reads from the buffers at a rate defined by the printhead parameters. The CPU can read LLU registers to find out how much of the data has been used, and so control the writing of the data by itself or the UDU so that the buffers never overflow or underflow.

2 Printhead Misplacement Types 2.1 Printhead Construction

A linking printhead is constructed from linking printhead ICs, placed on a substrate containing ink supply holes. An A4 pagewidth printer used 11 linking printhead ICs. Each printhead is placed on the substrate with reference to positioning fidicuals on the substrate.

Figure 359:
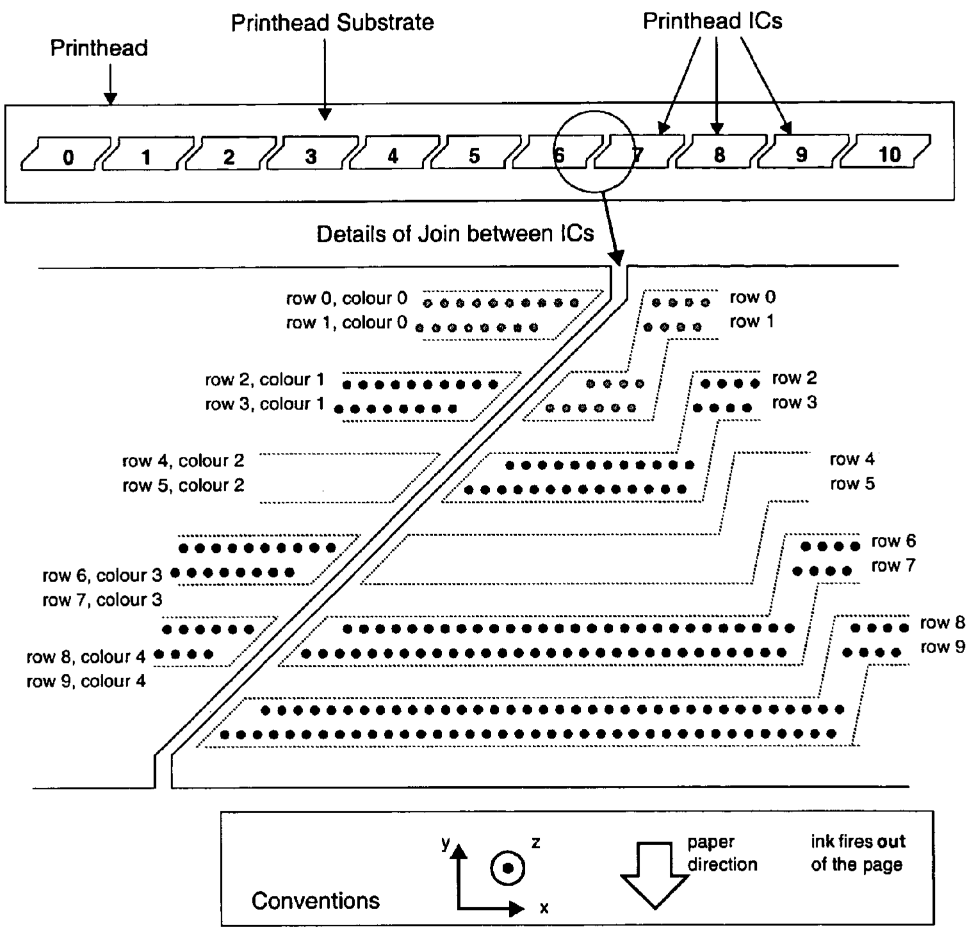

FIG. 359 shows the arrangement of the printhead ICs (also known as segments) on a printhead. The join between two ICs is shown in detail. The left-most nozzles on each row are dropped by 10 line-pitches, to allow continuous printing across the join. FIG. 359 also introduces some naming and co-ordinate conventions used throughout this document.

FIG. 359 shows the anticipated first generation linking printhead nozzle arrangements, with 10 nozzle rows supporting five colours. The SoPEC compensation mechanisms are general enough to cover other nozzle arrangements.

2.2 Misplacement Types

Printheads ICs may be misplaced relative to their ideal position. This misplacement may include any combination of:

x offset
y offset
yaw (rotation around z)
pitch (rotation around y)
roll (rotation around z)

In some cases, the best visual results are achieved by considering relative misplacement between adjacent ICs, rather than absolute misplacement from the substrate. There are some practical limits to misplacement, in that a gross misplacement will stop the ink from flowing through the substrate to the ink channels on the chip.

Correcting for misplacement obviously requires the misplacement to be measured. In general this may be achieved directly by inspection of the printhead after assembly, or indirectly by scanning or examining a printed test pattern.

3 Misplacement Compensation 3.1 X Offset

SoPEC can compensate for misplacement of linking chips in the X-direction, but only snapped to the nearest dot. That is, a misplacement error of less than 0.5 dot-pitches or 7.9375 microns is not compensated for, a misplacement more that 0.5 dot-pitches but less than 1.5 dot-pitches is treated as a misplacement of 1 dot-pitch, etc.

Uncompensated X misplacement can result in three effects:

printed dots shifted from their correct position for the entire misplaced segment
missing dots in the overlap region between segments.
duplicated dots in the overlap region between segments.

SoPEC can correct for each of these three effects.

3.1.1 Correction for Overall Position in X

In preparing line data to be printed, SoPEC buffers in memory the dot data for a number of lines of the image to be printed. Compensation for misplacement generally involves changing the pattern in which this dot data is passed to the printhead ICs.

SoPEC uses separate buffers for the even and odd dots of each colour on each line, since they are printed by different printhead rows. So SoPEC's view of a line at this stage is as (up to) 12 rows of dots, rather than (up to) 6 colours. Nominally, the even dots for a line are printed by the lower of the two rows for that colour on the printhead, and the odd dots are printed by the upper row (see FIG. 359). For the current linking printhead IC, there are 640 nozzles in row. Each row buffer for the full printhead would contain 640×1 dots per line to be printed, plus some padding if required.

In preparing the image, SoPEC can be programmed in the DWU module to precompensate for the fact that each row on the printhead IC is shifted left with respect to the row above. In this way the leftmost dot printed by each row for a colour is the same offset from the start of a row buffer. In fact the programming can support arbitrary shapes for the printhead IC.

SoPEC has independent registers in the LLU module for each segment that determine which dot of the prepared image is sent to the left-most nozzle of that segment. Up to 12 segments are supported. With no misplacement, SoPEC could be programmed to pass dots 0 to 639 in a row to segment 0, dots 640 to 1279 in a row to segment 1, etc.

If segment 1 was misplaced by 2 dot-pitches to the right, SoPEC could be adjusted to pass to dots 641 to 1280 of each row to segment 1 (remembering that each row of data consists entirely of either odd dots or even dots from a line, and that dot 1 on a row is printed two dot positions away from dot 0). This means the dots are printed in the correct position overall. This adjustment is based on the absolute placement of each printhead IC. Dot 640 is not printed at all, since there is no nozzle in that position on the printhead (see Section 3.1.2 for more detail on compensation for missing dots).

A misplacement of an odd number of dot-pitches is more problematic, because it means that the odd dots from the line now need to be printed by the lower row of a colour pair, and the even dots by the upper row of a colour pair on the printhead segment. Further, swapping the odd and even buffers interferes with the precompensation. This results in the position of the first dot to be sent to a segment being different for odd and even rows of the segment. SoPEC addresses this by having independent registers in the LLU to specify the first dot for the odd and even rows of each segment, i.e. 2×12 registers. A further register bit determines whether dot data for odd and even rows should be swapped on a segment by segment basis.

3.1.2 Correcting for Duplicate and Missing Dots

Figure 360:
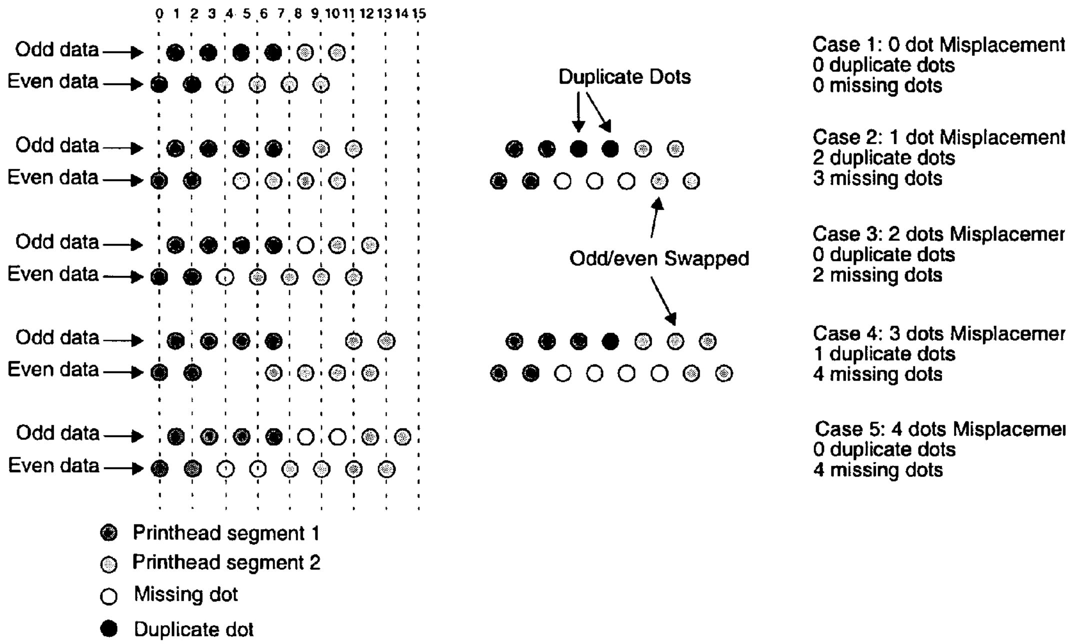

FIG. 360 shows the detailed alignment of dots at the join between two printhead ICs, for various cases of misplacement, for a single colour.

The effects at the join depend on the relative misplacement of the two segments. In the ideal case with no misplacement, the last 3 nozzles of upper row of the segment N interleave with the first three nozzles of the lower row of segment N+1, giving a single nozzle (and so a single printed dot) at each dot-pitch.

When segment N+1 is misplaced to the right relative to segment N (a positive relative offset in X), there are some dot positions without a nozzle, i.e. missing dots. For positive offsets of an odd number of dot-pitches, there may also be some dot positions with two nozzles, i.e. duplicated dots. Negative relative offsets in X of segment N+1 with respect to segment N are less likely, since they would usually result in a collision of the printhead ICs, however they are possible in combination with an offset in Y. A negative offset will always cause duplicated dots, and will cause missing dots in some cases. Note that the placement and tolerances can be deliberately skewed to the right in the manufacturing step to avoid negative offsets.

Where two nozzles occupy the same dot position, the corrections described in Section 3.1.1 will result in SoPEC reading the same dot data from the row buffer for both nozzles. To avoid printing this data twice SoPEC has two registers per segment in the LLU that specify a number (up to 3) of dots to suppress at the start of each row, one register applying to even dot rows, one to odd dot rows.

SoPEC compensates for missing dots by add the missing nozzle position to its dead nozzle map. This tells the dead nozzle compensation logic in the DNC module to distribute the data from that position into the surrounding nozzles, before preparing the row buffers to be printed.

3.2 Y Offset

SoPEC can compensate for misplacement of printhead ICs in the Y-direction, but only snapped to the nearest 0.1 of a line. Assuming a line-pitch of 15.875 microns, if an IC is misplaced in Y by 0 microns, SoPEC can print perfectly in Y. If an IC is misplaced by 1.5875 microns in Y, then we can print perfectly. If an IC is misplaced in Y by 3.175 microns, we can print perfectly. But if an IC is misplaced by 3 microns, this is recorded as a misplacement of 3.175 microns (snapping to the nearest 0.1 of a line), and resulting in a Y error of 0.175 microns (most likely an imperceptible error).

Uncompensated Y misplacement results in all the dots for the misplaced segment being printed in the wrong position on the page.

SoPEC's compensation for Y misplacement uses two mechanism, one to address whole line-pitch misplacement, and another to address fractional line-pitch misplacement. These mechanisms can be applied together, to compensate for arbitrary misplacements to the nearest 0.1 of a line.

3.2.1 Compensating for Whole Line-Pitch Misplacement

Section 3.1 described the buffers used to hold dot data to be printed for each row. These buffers contain dot data for multiple lines of the image to be printed. Due to the physical separation of nozzle rows on a printhead IC, at any time different rows are printing data from different lines of the image.

For a printhead on which all ICs are ideally placed, row 0 of each segment is printing data from the line N of the image, row 1 of each segment is printing data from row N−M of the image etc. where N is the separation of rows 0 and 1 on the printhead. Separate SoPEC registers in the LLU for each row specify the designed row separations on the printhead, so that SoPEC keeps track of the "current" image line being printed by each row.

If one segment is misplaced by one whole line-pitch, SoPEC can compensate by adjusting the line of the image being sent to each row of that segment. This is achieved by adding an extra offset on the row buffer address used for that segment, for each row buffer. This offset causes SoPEC to provide the dot data to each row of that segment from one line further ahead in the image than the dot data provided to the same row on the other segments. For example, when the correctly placed segments are printing line N of an image with row 0, line N−M of the image with row 1, etc, then the misplaced segment is printing line N+1 of the image with row 0, line N−M+1 of the image with row 1, etc.

SoPEC has one register per segment to specify this whole line-pitch offset. The offset can be multiple line-pitches, compensating for multiple lines of misplacement. Note that the offset can only be in the forward direction, corresponding to a negative Y offset. This means the initial setup of SoPEC must be based on the highest (most positive) Y-axis segment placement, and the offsets for other segments calculated from this baseline. Compensating for Y displacement requires extra lines of dot data buffering in SoPEC, equal to the maximum relative Y offset (in line-pitches) between any two segments on the printhead. For each misplaced segment, each line of misplacement requires approximately 640×10 or 6400 extra bits of memory.

3.2.2 Compensation for Fractional Line-Pitch Misplacement

Compensation for fractional line-pitch displacement of a segment is achieved by a combination of SoPEC and printhead IC fire logic.

Figure 361:
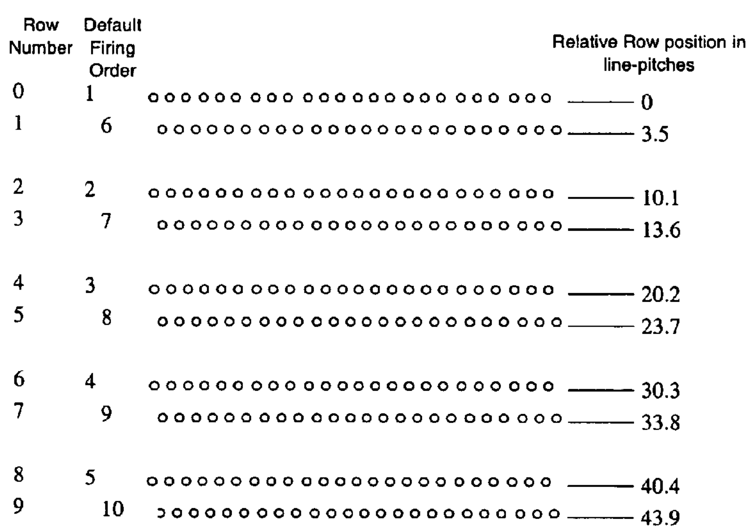

The nozzle rows in the printhead are positioned by design with vertical spacings in line-pitches that have a integer and fractional component. The fractional components are expressed relative to row zero, and are always some multiple of 0.1 of a line-pitch. The rows are fired sequentially in a given order, and the fractional component of the row spacing matches the distance the paper will move between one row firing and the next. FIG. 361 shows the row position and firing order on the current implementation of the printhead IC. Looking at the first two rows, the paper moves by 0.5 of a line-pitch between the row 0 (fired first) and row 1 (fired sixth). is supplied with dot data from a line 3 lines before the data supplied to row 0. This data ends up on the paper exactly 3 line-pitches apart, as required.

If one printhead IC is vertically misplaced by a non-integer number of line-pitches, row 0 of that segment no longer aligns to row 0 of other segments. However, to the nearest 0.1 of a line, there is one row on the misplaced segment that is an integer number of line-pitches away from row 0 of the ideally placed segments. If this row is fired at the same time as row 0 of the other segments, and it is supplied with dot data from the correct line, then its dots will line up with the dots from row 0 of the other segments, to within a 0.1 of a line-pitch. Subsequent rows on the misplaced printhead can then be fired in their usual order, wrapping back to row 0 after row 9. This firing order results in each row firing at the same time as the rows on the other printheads closest to an integer number of line-pitches away.

Figure 362:
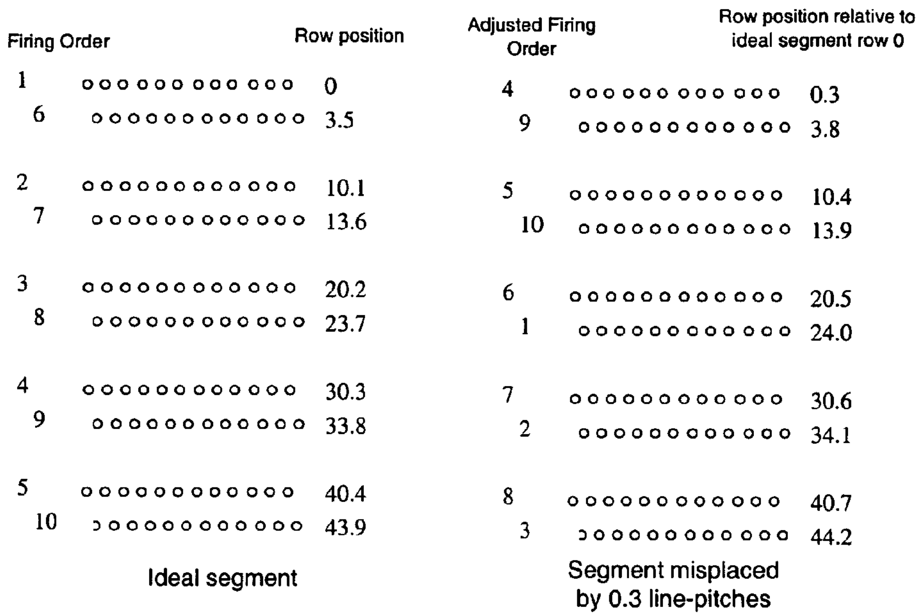

FIG. 362 shows an example, in which the misplaced segment is offset by 0.3 of a line-pitch. In this case, row 5 of the misplaced segment is exactly 24.0 line-pitches from row 0 of the ideal segment. Therefore row 5 is fired first on the misplaced segment, followed by row 7, 9, 0 etc. as shown. Each row is fired at the same time as the a row on the ideal segment that is an integer number of lines away. This selection of the start row of the firing sequence is controlled by a register in each printhead IC.

SoPEC's role in the compensation for fractional line-pitch misplacement is to supply the correct dot data for each row. Looking at FIG. 362, we can see that to print correct, row 5 on the misplaced printhead needs dot data from a line 24 lines earlier in the image than the data supplied to row 0. On the ideal printhead, row 5 needs dot data from a line 23 lines earlier in the image than the data supplied to row 0. In general, when a non-default start row is used for a segment, some rows for that segment need their data to be offset by one line, relative to the data they would receive for a default start row. SoPEC has a register in LLU for each row of each segment, that specifies whether to apply a one line offset when fetching data for that row of that segment.

3.3 Roll (Rotation Around X)

This kind of erroneous rotational displacement means that all the nozzles will end up pointing further up the page in Y or further down the page in Y. The effect is the same as a Y misplacement, except there is a different Y effect for each media thickness (since the amount of misplacement depends on the distance the ink has to travel).

In some cases, it may be that the media thickness makes no effective visual difference to the outcome, and this form of misplacement can simply be incorporated into the Y misplacement compensation. If the media thickness does make a difference which can be characterised, then the Y misplacement programming can be adjusted for each print, based on the media thickness.

It will be appreciated that correction for roll is particularly of interest where more than one printhead module is used to form a printhead, since it is the discontinuities between strips printed by adjacent modules that are most objectionable in this context.

3.4 Pitch (Rotation Around Y)

In this rotation, one end of the IC is further into the substrate than the other end. This means that the printing on the page will be dots further apart at the end that is further away from the media (i.e. less optical density), and dots will be closer together at the end that is closest to the media (more optical density) with a linear fade of the effect from one extreme to the other. Whether this produces any kind of visual artifact is unknown, but it is not compensated for in SoPEC.

3.5 Yaw (Rotation Around Z)

This kind of erroneous rotational displacement means that the nozzles at one end of a IC will print further down the page in Y than the other end of the IC. There may also be a slight increase in optical density depending on the rotation amount.

SoPEC can compensate for this by providing first order continuity, although not second order continuity in the preferred embodiment. First order continuity (in which the Y position of adjacent line ends is matched) is achieved using the Y offset compensation mechanism, but considering relative rather than absolute misplacement. Second order continuity (in which the slope of the lines in adjacent print modules is at least partially equalised) can be effected by applying a Y offset compensation on a per pixel basis. Whilst one skilled in the art will have little difficulty deriving the timing difference that enables such compensation, SoPEC does not compensate for it and so it is not described here in detail.

Figure 363:
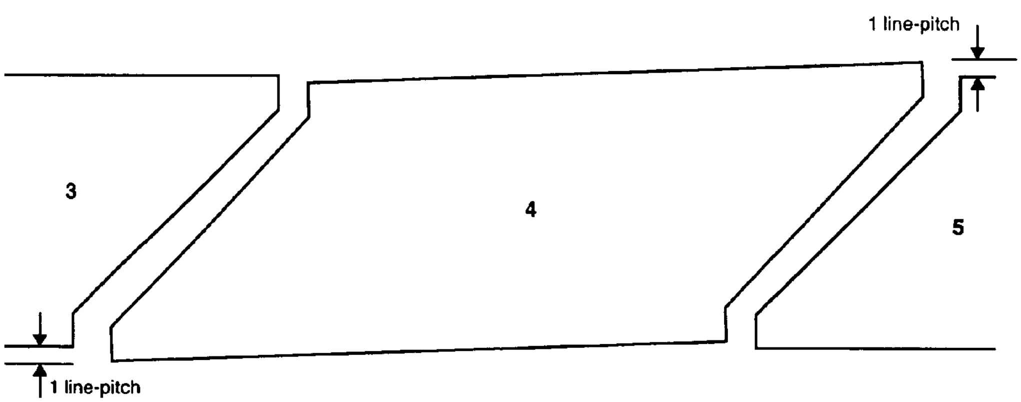

FIG. 363 shows an example where printhead IC number 4 is be placed with yaw, is shown in FIG. 363, while all other ICs on the printhead are perfectly placed. The effect of yaw is that the left end of segment 4 of the printhead has an apparent Y offset of −1 line-pitch relative to segment 3, while the right end of segment 4 has an apparent Y offset of 1 line-pitch relative to segment 5.

To provide first-order continuity in this example, the registers on SoPEC would be programmed such that segments 0 to 3 have a Y offset of 0, segment 4 has a Y offset of −1, and segments 5 and above have Y offset of −2. Note that the Y offsets accumulate in this example—even though segment 5 is perfect aligned to segment 3, they have different Y offsets programmed.

It will be appreciated that some compensation is better than none, and it is not necessary in all cases to perfectly correct for roll and/or yaw. Partial compensation may be adequate depending upon the particular application. As with roll, yaw correction is particularly applicable to multi-module printheads, but can also be applied in single module printheads.

2 Requirements 2.2 Number of Colors

The printhead will be designed for 5 colors. At present the intended use is:

cyan
magenta
yellow
black
infra-red

However the design methodology must be capable of targeting a number other than 5 should the actual number of colors change. If it does change, it would be to 6 (with fixative being added) or to 4 (with infra-red being dropped).

The printhead chip does not assume any particular ordering of the 5 colour channels.

2.3 Number of Nozzles

The printhead will contain 1280 nozzles of each color—640 nozzles on one row firing even dots, and 640 nozzles on another row firing odd dots. This means 11 linking printheads are required to assemble an A4/Letter printhead.

However the design methodology must be capable of targeting a number other than 1280 should the actual number of nozzles per color change. Any different length may need to be a multiple of 32 or 64 to allow for ink channel routing.

2.4 Nozzle Spacing

The printhead will target true 1600 dpi printing. This means ink drops must land on the page separated by a distance of 15.875 microns.

The 15.875 micron inter-dot distance coupled with mems requirements mean that the horizontal distance between two adjacent nozzles on a single row (e.g. firing even dots) will be 31.75 microns.

All 640 dots in an odd or even colour row are exactly aligned vertically. Rows are fired sequentially, so a complete row is fired in small fraction (nominally one tenth) of a line time, with individual nozzle firing distributed within this row time. As a result dots can end up on the paper with a vertical misplacement of up to one tenth of the dot pitch. This is considered acceptable.

Figure 364:
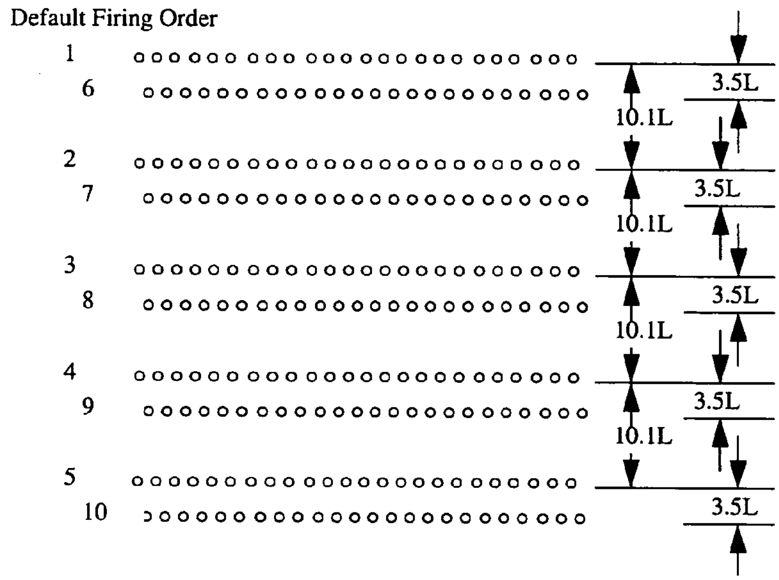

The vertical distance between rows is adjusted based on the row firing order. Firing can start with any row, and then follows a fixed rotation. FIG. 364 shows the default row firing order from 1 to 10, starting at the top even row. Rows are separated by an exact number of dot lines, plus a fraction of a dot line corresponding to the distance the paper will move between row firing times. This allows exact dot-on-dot printing for each colour. The starting row can be varied to correct for vertical misalignment between chips, to the nearest 0.1 pixels. SoPEC appropriate delays each row's data to allow for the spacing and firing order An additional constraint is that the odd and even rows for given colour must be placed close enough together to allow them to share an ink channel. This results in the vertical spacing shown in FIG. 364, where L represents one dot pitch.

2.5 Linking the Chips

Multiple identical printhead chips must be capable of being linked together to form an effectively horizontal assembled printhead.

Figure 365:
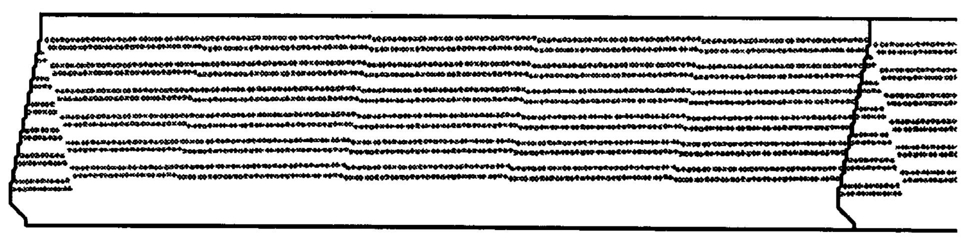
Figure 366:
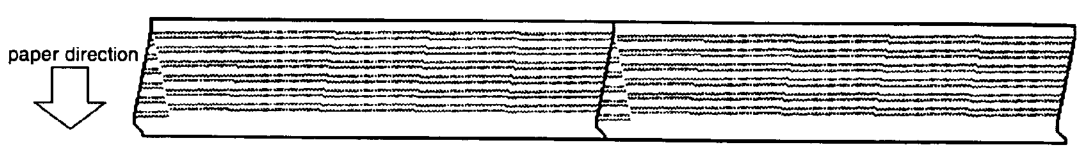

Although there are several possible internal arrangements, construction and assembly tolerance issues have made an internal arrangement of a dropped triangle (ie a set of rows) of nozzles within a series of rows of nozzles, as shown in FIG. 365. These printheads can be linked together as shown in FIG. 366.

Compensation for the triangle is preferably performed in the printhead, but if the storage requirements are too large, the triangle compensation can occur in SoPEC. However, if the compensation is performed in SoPEC, it is required in the present embodiment that there be an even number of nozzles on each side of the triangle.

It will be appreciated that the triangle disposed adjacent one end of the chip provides the minimum on-printhead storage requirements. However, where storage requirements are less critical, other shapes can be used. For example, the dropped rows can take the form of a trapezoid.

The join between adjacent heads has a 45° angle to the upper and lower chip edges. The joining edge will not be straight, but will have a sawtooth or similar profile. The nominal spacing between tiles is 10 microns (measured perpendicular to the edge). SoPEC can be used to compensate for both horizontal and vertical misalignments of the print heads, at some cost to memory and/or print quality.

Note also that paper movement is fixed for this particular design.

2.6 Print Rate

A print rate of 60 A4/Letter pages per minute is possible. The printhead will assume the following:

page length=297 mm (A4 is longest page length)

an inter-page gap of 60 mm or less (current best estimate is more like 15+/−5 mm This implies a line rate of 22,500 lines per second. Note that if the page gap is not to be considered in page rate calculations, then a 20 KHz line rate is sufficient.

Assuming the page gap is required, the printhead must be capable of receiving the data for an entire line during the line time. i.e. 5 colors×1280 dots×22,500 lines=144 MHz or better (173 MHz for 6 colours).

2.7 Pins

An overall requirement is to minimize the number of pins.

Pin count is driven primarily by the number of supply and ground pins for Vpos. There is a lower limit for this number based on average current and electromigration rules. There is also a significant routing area impact from using fewer supply pads.

In summary a 200 nJ ejection energy implies roughly 12.5 W average consumption for 100% ink coverage, or 2.5 W per chip from a 5V supply. This would mandate a minimum of 20 Vpos/Gnd pairs. However increasing this to around 40 pairs might save approximately 100 microns from the chip height, due to easier routing.

At this stage the print head is assuming 40 Vpos/Gnd pairs, plus 11 Vdd (3.3V) pins, plus 6 signal pins, for a total of 97 pins per chip.

2.8 Ink Supply Hole

At the CMOS level, the ink supply hole for each nozzle is defined by a metal seal ring in the shape of rectangle (with square corners), measuring 11 microns horizontally by 26 microns vertically. The centre of each ink supply hole is directly under the centre of the MEMs nozzle, i.e. the ink supply hole horizontal and vertical spacing is same as corresponding nozzle spacing.

2.9 ESD

The printhead will most likely be inserted into a print cartridge for user-insertion into the printer, similar to the way a laser-printer toner cartridge is inserted into a laser printer.

In a home/office environment, ESD discharges up to 15 kV may occur during handling. It is not feasible to provide protection against such discharges as part of the chip, so some kind of shielding will be needed during handling.

The printhead chip itself will target MIL-STD-883 class 1 (2 kV human body model), which is appropriate for assembly and test in a an ESD-controlled environment.

2.10 EMI

There is no specific requirement on EMI at this time, other than to minimize emissions where possible.

2.11 Hot Plug/Unplug

Cartridge (and hence printhead) removal may be required for replacement of the cartridge or because of a paper jam.

There is no requirement on the printhead to withstand a hot plug/unplug situation. This will be taken care of by the cradle and/or cartridge electromechanics. More thought is needed on exactly what supply & signal connection order is required.

2.13 Power Sequencing

The printhead does not have a particular requirement for sequencing of the 3.3V and 5V supplies. However there is a requirement to held reset asserted (low) as power is applied.

2.14 Power-On Reset

Will be supplied to the printhead. There is no requirement for Power-on-Reset circuitry inside the printhead.

2.15 Output Voltage Range

Any output pins (typically going to SoPEC) will drive at 3.3VDD+−5%.

2.16 Temperature Range

The print head CMOS will be verified for operation over a range of −10 C to 110 C.

2.17 Reliability and Lifetime

The print head CMOS will target a lifetime of at least 10 billion ejections per nozzle.

2.18 Miscellaneous Modes/Features

The print head will not contain any circuits for keep-wet, dead nozzle detection or temperature sensing. It does have a declog (“smoke”) mode.

2 Physical Overview

The SRM043 is a CMOS and MEMS integrated chip. The MEMS structures/nozzles can eject ink which has passed through the substrate of the CMOS via small etched holes.

The SRM043 has nozzles arranged to create a accurately placed 1600 dots per inch printout. The SRM043 has 5 colours, 1280 nozzles per colour.

The SRM043 is designed to link to a similar SRM043 with perfect alignment so the printed image has no artifacts across the join between the two chips.

SRM043 contains 10 rows of nozzles, arranged as upper and lower row pairs of 5 different inks. The paired rows share a common ink channel at the back of the die. The nozzles in one of the paired rows are horizontally spaced 2 dot pitches apart, and are offset relative to each other.

Figure 367:
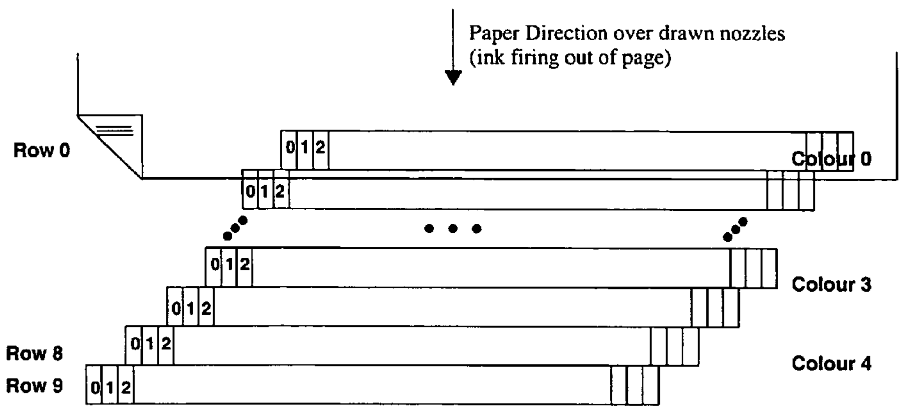
Figure 368:
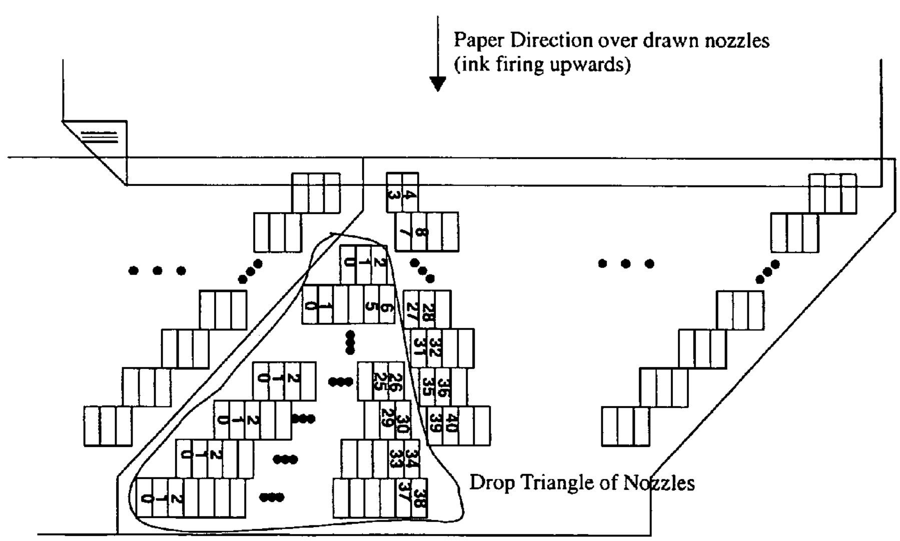
FIG. 368. Nozzle Offset at Linking Ends
Figure 369:
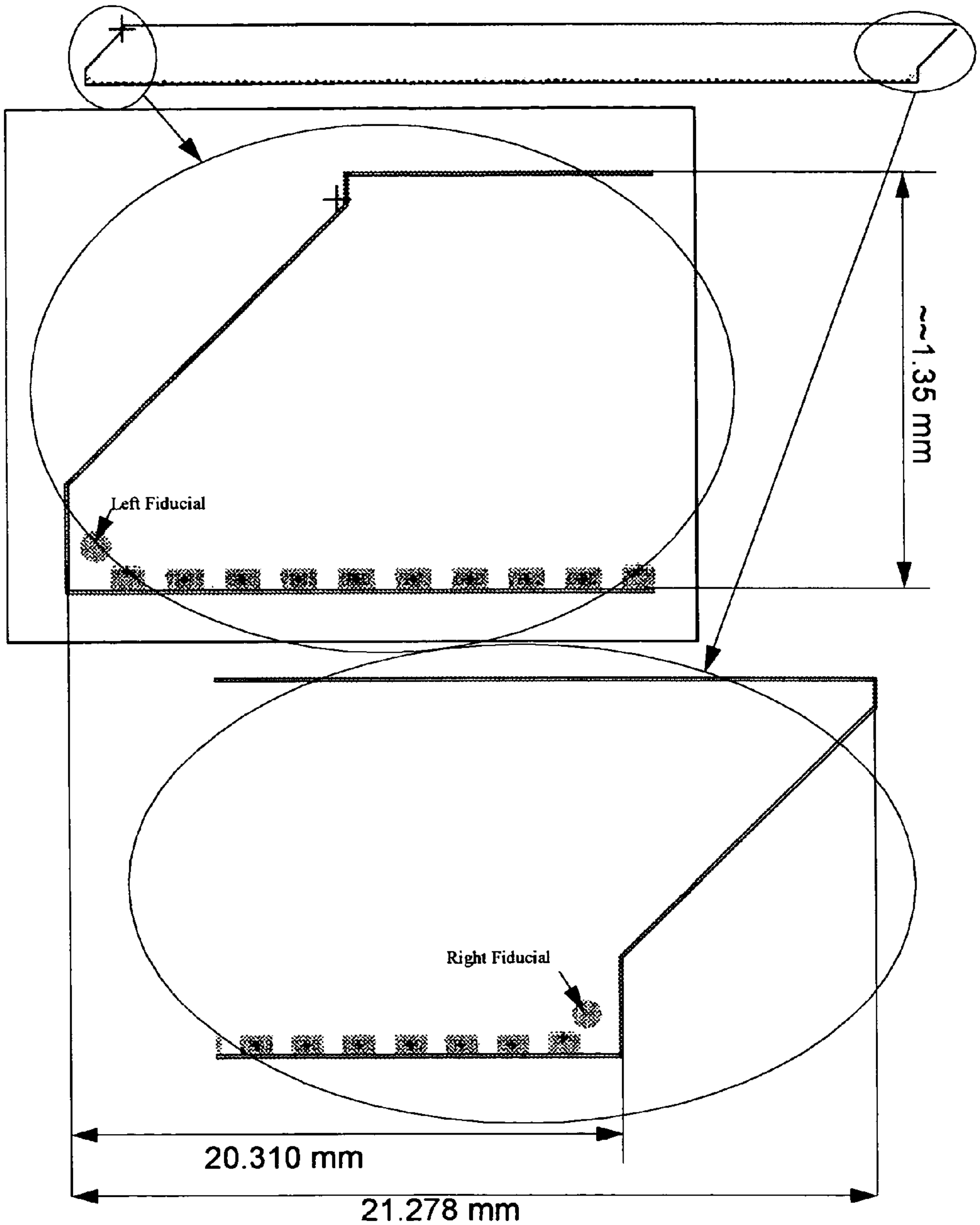
FIG. 369. Bonding Diagram
Figure 370:
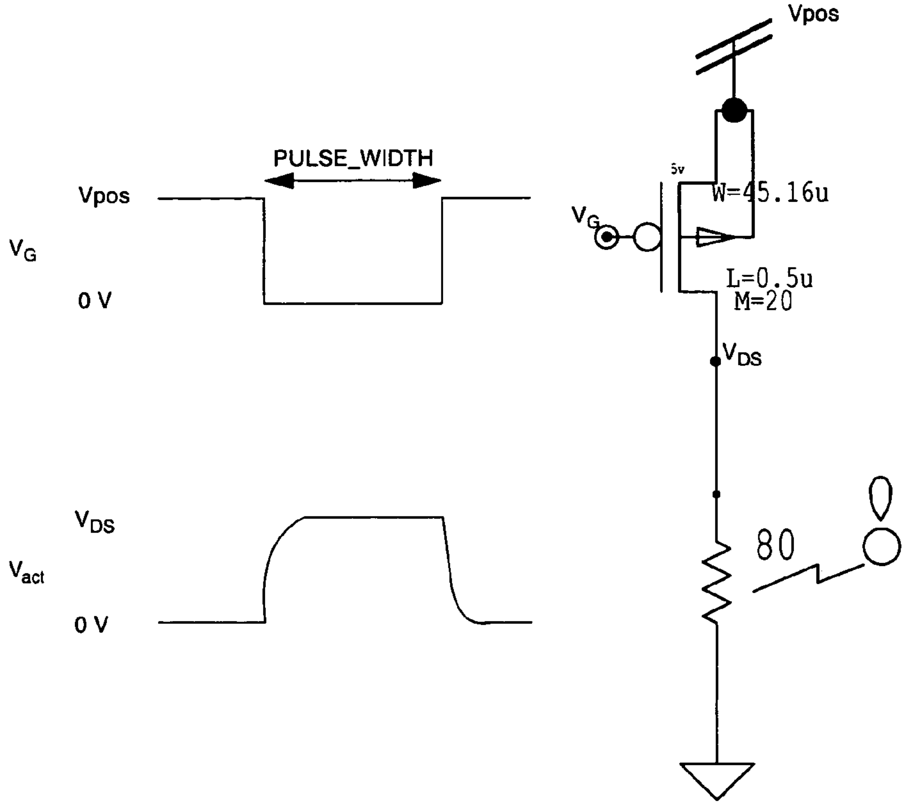
FIG. 370. MEMS Representation.
Figure 371:
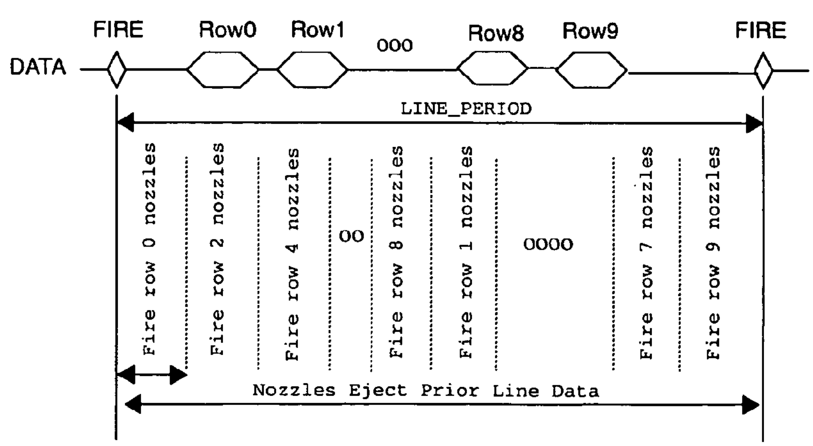
FIG. 371. Line Data Load and Firing, properly placed Printhead.

2.1 Colour Arrangement 1600 dpi has a dot pitch of DP=15.875 μm. The MEMS print nozzle unit cell is 2DP wide by 5DP high (31.75 μm×79.375 μm). To achieve 1600 dpi per colour, 2 horizontal rows of (1280/2) nozzles are placed with a horizontal offset of 5DP (2.5 cells). Vertical offset is 3.5DP between the two rows of the same colour and 10.1DP between rows of different colour. This slope continues between colours and results in a print area which is a trapezoid as shown in FIG. 367.

Within a row, the nozzles are perfectly aligned vertically.

2.2 Linking Nozzle Arrangement

For ink sealing reasons a large area of silicon beyond the end nozzles in each row is required on the base of the die, near where the chip links to the next chip. To do this the first 4*Row#+4−2*(Row#mod2) nozzles from each row are vertical shifted down DP.

Data for the nozzles in the triangle must be delayed by 10 line times to match the triangle vertical offset. The appropriate number of data bits at the start of each row are put into a FIFO. Data from the FIFO's output is used instead. The rest of the data for the row bypasses the FIFO.

3 Electrical Interface 3.1 Power Supply Pins

There are 2 power domains with a common ground.

TABLE 249

Power Pins

| Name | Voltage | Pins | Description | Current |
|---|---|---|---|---|
| Vpos | 0-5 V | 53 | Main MEMS supply | 4 A |
| Vdd | 3.3 V | 15 | Core CMOS supply | 300 mA |
| Gnd | 0 V | 53 | Return for above supplies | — |

3.2 Data Interface

SRM043 has a minimum number of signal pins to reduce cost.

3.3 Data Interface Operation

All operations (other than reset) of SRM043 are initiated sending a command to SRM043 on the Data signal. In fact, the only command symbol required is a WRITE; all functions are implemented as writes to registers. Registers are of variable width, including some zero width virtual registers. See Table 255 for a list of registers.

3.3.1 Write Command

The WRITE command consists of <writeSymbol><address><addressBar> and multiple <data> bytes. Some WRITE commands do not require any <data> bytes. The <address> (prior to 8B/10B encode) consists of the following bits 'PDDRRRRR'. P is the parity bit, set to give the byte an odd parity. 'DD' is 2-bit the device ID. And 'RRRRR' is a 5-bit register address. <addressBar> is a bit inversion of <address> to increase the probability of detecting a transmission error in the command.

3.3.2 Device Addressing

The address of the write command includes a 2 bit device address. 'DD' selects the device. b11 is a broadcast address, otherwise the address must match the device address programmed in the DEVICE_ID register. This allows several devices to be multi dropped.

3.3.3 8b:10b Encoding

All command and data are 8b/10b encoded. This version of the design does not use on-chip clock recovery. Instead the clock is supplied externally, and the many edges in the data stream are used to determine the best data eye sampling point.

When no commands or data are available an IDLE symbol is transmitted. An IDLE symbol can occur at any time to temporarily pause a command. They are ignored, the command will be executed as if they had never happened. Idles are required between commands to maintain the state of the scrambler also.

2 consecutive IDLE symbols contains a unique sequence of bits called a COMMA. This COMMA is used by the chip is align to 10 bit symbols boundaries for decode.

TABLE 250

Signal Pins

| Name | Direction | Pins | Description | Speed |
|---|---|---|---|---|
| Clk | Input | 2 LDVS Receivers with no termination. Labelled Clk_P & Clk_N | Clock to sample Data, and for internal processing. Clk_P is Clk, Clk_N is inverted Clk. It is expected that this signal may be multi-dropped, and the phase relationship is to Data is unimportant. | 288 MHz |
| Data | Input | 2 LDVS Receivers with no termination. Labelled Data_P & Data_N | Data is a 8b:10b encoded data stream. This stream contains data and commands symbols to the print head. It is expected that this signal may be multi-dropped, and the phase relationship is to Clk is unimportant. | 288 MHz |
| RstL | Input | 3.3 V CMOS Schmitt Input | Active low reset. Puts all control registers into a known state, and disables printing. Nozzle firing is disabled combinatorially. 3 consecutive clocked samples of reset are required to reset registers. | DC |
| Do | Output | 3.3 CMOS Tristate or open-drain Output | Do is a general purpose output, usually used to read register values back from the print head. Default state is high impedance. | 28.8 MHz |

Details of the encoding of commands and data is found in Section 5 on page 23.

3.4 DC Characteristics

TABLE 251

DC characteristics [2]

| Symbol | Parameter | Condition | Min. | Typ. | Max. | Unit |
|---|---|---|---|---|---|---|
| $T_j$ | Junction temperature | | −10 | | 110 | ° C. |
| $V_{DD5}$ | 5 V supply voltage | | 1.75 | 5 | 5.5 | V |
| $V_{DD3}$ | 3.3 V supply voltage | | 3.15 | 3.3 | 3.45 | V |
| $V_{tp}$ | Schmitt trigger low to high trip point | | 1.45 | 1.58 | 1.71 | V |
| $V_{tm}$ | Schmitt trigger high to low trip point | | 1.09 | 1.19 | 1.32 | V |
| $V_{oh}$ | Output high voltage | $I_{oh} = -4$ mA | $V_{DD3} - 0.4$ | | | V |
| $V_{ol}$ | Output low voltage | $I_{oh} = 4$ mA | | | 0.4 | V |
| $I_i$ | Input leakage current | @3.3 V or 0 V | | ±0.01 | ±1 | □A |
| $I_{oz}$ | Tristate output leakage current | @3.3 V or 0 V | | ±0.01 | ±1 | □A |
| $V_{esdh}$ | ESD protection voltage | HBM | 2 | 4 | | kV |
| $V_{eshc}$ | ESD protection voltage | CDM | | | | kV |
| $I_{latch}$ | Latchup protection current | | 100 | | | mA |

3.5 Power Needs

The power need for this chip are not clear until more is know about the final MEMS nozzle device.

Most power is consumed by the MEMS nozzle's actuators, basically a heater/resistor element. Presently 200 nJ of energy is require to eject ink, in the future this value should drop to 60 nJ.

Printing a 60 A4 pages a minute, a line rate of 22,400 lines per second is required. This allows for ~58 mm gap between pages (297 mm). The time to fire a single line of ink is $$\frac{1}{\left(22400\frac{\text{line}}{s}\right)} = 44.6\frac{us}{\text{line}}$$

Any colour is made of at most 2 drops of C, M, Y, or 1 of K. The 5th colour might be I (Infra-red) applied with a density of 0.12 (the defined density of the IR tags), or fixative, with a density of 1. This means the worst case average 3 drops of ink are used at any point on the page.

A worst case average of 3.0 ink drops per pixel gives a total energy of $$3\frac{\text{dot}}{\text{pixel}} \times 1280\frac{\text{pixel}}{\text{line}} \times 200\frac{nJ}{\text{dot}} = 770\frac{uJ}{\text{line}}$$

And a power level of $$P = \frac{E}{t} = \left(770\frac{uJ}{\text{line}}\right) \div \left(44.6\frac{us}{\text{line}}\right) = 17.2 \text{ Watts}$$

This does not account for energy lost in the heater drivers. If efficiency is 90%, the worst case Vpos power is 19.2 Watts or ~4 Amps. at 5 Volts.

The above analysis is for worst case average. Because the nozzles printing at any one time, apply ink to different pixels at the same time, the 3.0 ratio is not locally true, but could be 5. The actual peak current depends on the final MEMS and how long a pulse is needed to supply the 200 nJ.

3.6 Power Supply Sequencing

Because the MEMS are enabled with a PMOSFET driver from Vpos it is necessary to ensure that this driver is disabled at and after power up. This means that Vdd must be supplied with RstL asserted (0 Volts). At least 3 clk cycles must be applied before deasserting RstL.

3.7 Bonding Diagram

These dimensions are preliminary.

3.8 Fiducials

There are two 110 μm diameter circle fiducials, in exposed top level CMOS Metal placed 20.100 mm apart.

3.9 Pads

The bonding area of each pad is 120 μm wide and 72 μm high.

TABLE 252

Relative Pad Placement from Left Most Pad

| PAD | X □m | PAD | X um | PAD | X □m |
|---|---|---|---|---|---|
| | 0 | | 195 | | 390 |
| 4 VPOS | 585 | | 780 | | 975 |
| | 1170 | | 1365 | | 1560 |
| | 1755 | | 1950 | | 2145 |
| | 2340 | | 2535 | | 2730 |
| | 2925 | | 3120 | | 3315 |
| | 3510 | | 3705 | | 3900 |
| | 4095 | | 4290 | | 4485 |
| | 4680 | | 4875 | | 5070 |
| | 5265 | | 5460 | | 5655 |
| | 5850 | | 6045 | | 6240 |
| | 6435 | | 6630 | | 6825 |
| | 7020 | 38 clkP | 7215 | | 7410 |
| 40 VDD | 7605 | | 7800 | | 7995 |
| | 8190 | | 8385 | | 8580 |
| | 8775 | | 8970 | | 9165 |
| | 9360 | | 9555 | | 9750 |
| 52 VPOS | 9945 | | 10140 | | 10335 |
| | 10530 | | 10725 | | 10920 |
| | 11115 | | 11310 | 60 VDD | 11505 |
| | 11700 | | 11895 | | 12090 |

TABLE 252-continued

| Relative Pad Placement from Left Most Pad | | | | | |
|---|---|---|---|---|---|
| PAD | X □m | PAD | X um | PAD | X □m |
| | 12285 | | 12480 | | 12675 |
| | 12870 | | 13065 | | 13260 |
| | 13455 | | 13650 | | 13845 |
| 73 GND | 14040 | | 14235 | | 14430 |
| | 14625 | | 14820 | | 15015 |
| | 15210 | | 15405 | | 15600 |
| | 15795 | | 15990 | | 16185 |
| | 16380 | | 16575 | | 16770 |
| | 16965 | | 17160 | 90 GND | 17355 |
| | 17550 | | 17745 | | 17940 |
| | 18135 | | 18330 | | 18525 |
| | 18720 | | 18915 | | 19110 |
| | 19305 | | 19500 | | 19695 |
| | 19890 | | | | |

4 Functionality

SRM043 consists of a core of 10 rows of 640 MEMS constructed ink ejection nozzles. Around each of these nozzles is a CMOS unit cell.

The basic operation of the SRM043 is to receive dot data for all colours for a single line fire all nozzles according to that dot data To minimise peak power, nozzles are not all fired simultaneously, but are spread as evenly as possible over a line time. The firing sequence and nozzle placement are designed taking into account paper movement during a line, so that dots can be optimally placed on the page. Registers allow optimal placement to be achieved for a range of different MEMs firing pulse widths, printing speeds and inter-chip placement errors.

4.1 Unit Cell Operation

The MEMS device can be modelled as a resistor, that is heated by a pulse applied to the gate of a large PMOS FET.

The profile (firing) pulse has a programmable width which is unique to each ink colour. The magnitude of the pulse is fixed by the external Vpos supply less any voltage drop across the driver FET.

The unit cell contains a flip-flop forming a single stage of a shift register extending the length of each row. These shift registers, one per row, are filled using a register write command in the data stream. Each row may be individually addressed, or a row increment command can be used to step through the rows.

When a FIRE command is received in the data stream, the data in all the shift register flip-flops is transferred to a dot-latch in each of the unit cells, and a fire cycle is started to eject ink from every nozzle that has a 1 in its dot-latch.

The FIRE command will reset the row addressing to the last row. A DATA_NEXT command preceding the first row data will then fill the first row. While the firing/ejection is taking place, the data for the next line may be loaded into the row shift registers.

Due to the mechanism used to handle the falling triangle block of nozzles the following restrictions apply:

1. The rows must be loaded in the same order between FIRE commands. Any order may be used, but it must be the same each time.
2. Data must be provided for each row, sufficient to fill the triangle segment.

4.2 The Fire Cycle

4.2.1 Nozzle firing order

A fire cycle sequences through all of the nozzles on the chip, firing all of those with a 1 in their dot-latch. The sequence is one row at a time, each row taking 10% of the total fire cycle. Within a row, a programmable value called the column Span is used to control the firing. Each <span>'th nozzle in the row is fired simultaneously, then their immediate left neighbours, repeating <span> times until all nozzles in that row have fired. This is then repeated for each subsequent row, according the the row firing order described in the next section. Hence the maximum number of nozzles firing at any one time is 640 divided by <span>.

4.2.2 Row Firing Order and Dot Placement, Default Case

In the default case, row 0 of the chip is fired first, accoring to the span pattern. These nozzles will all fired in the first 10% of the line time. Next all nozzles in row 2 will fire in the same pattern, similarly then rows 4, 6 then 8. Immediately following, half way through the line time, row 1 will start firing, followed by rows 3, 5, 7 then 9.

Figure 372:
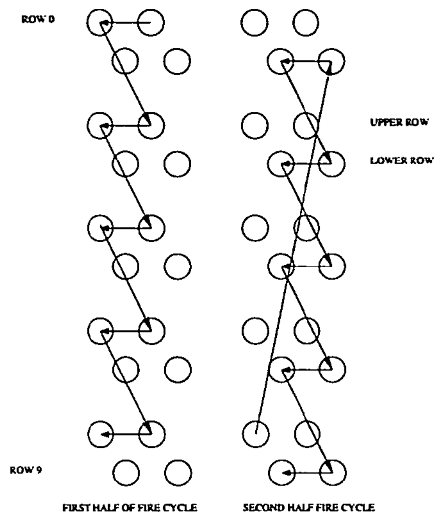
FIG. 372. Simple Fire order

FIG. 372 shows this for the case of Span=2.

The 1/10 line time together with the 10.1DP vertical colour pitch appear on paper as a 10DP line separation. The odd and even same-colour rows physically spaced 3.5DP apart vertically fired half a line time apart results on paper as a 3DP separation.

4.2.3 Dot Placement, General Case

A modification of the firing order shown in FIG. 372 can be used to assist in the event of vertical misalignment of the printhead when physically mounted into a cartridge. This is termed micro positioning in this document.

Figure 373:
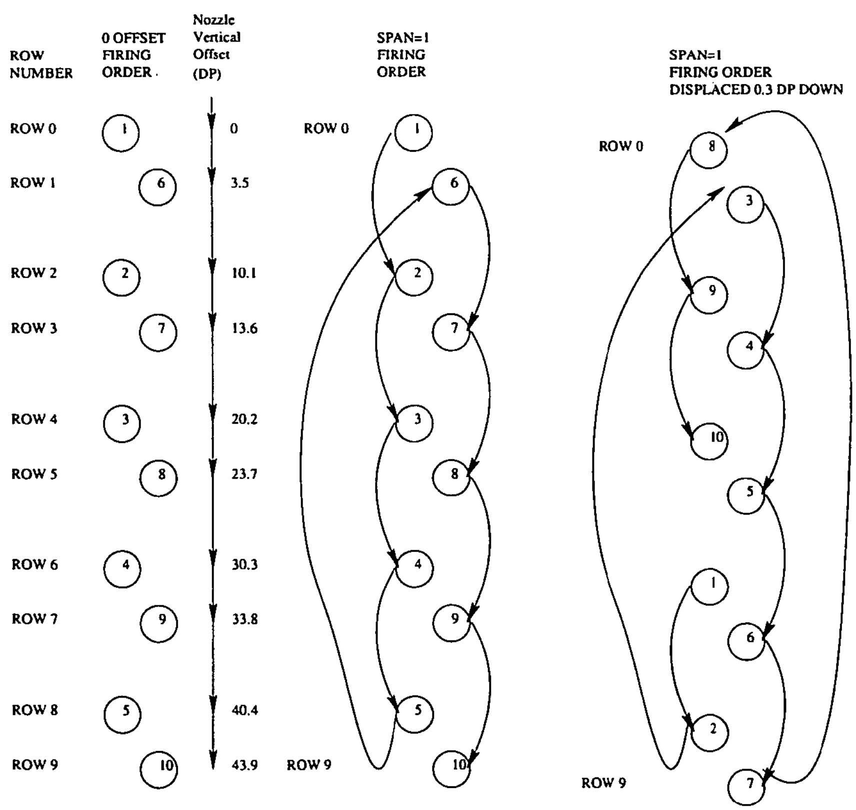
FIG. 373. Micro positioning
Figure 374:
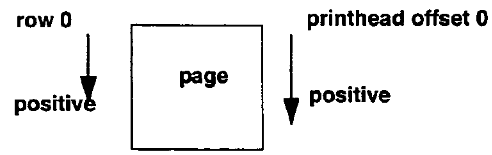
FIG. 374. Measurement convention
Figure 375:
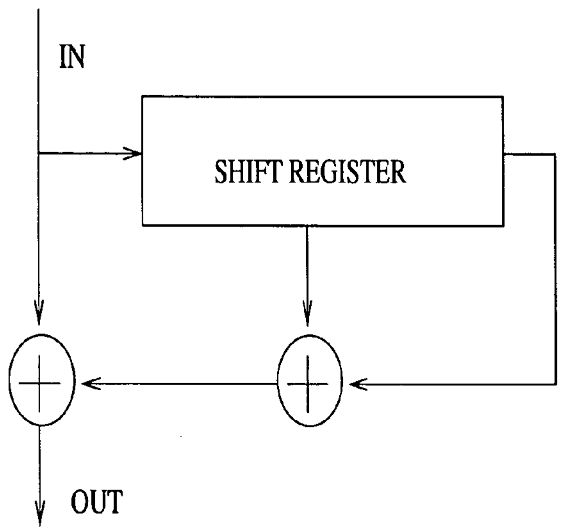
FIG. 375. Scrambler implementation

FIG. 373 shows in general how the fire pattern is modified to compensate for mounting misalignment of one printhead with respect to its linking partner. The base construction of the printhead separates the row pairs by slightly more than an integer times the dot Pitch to allow for distributing the fire pattern over the line period. This architecture can be exploited to allow micro positioning.

Consider for example the printhead on the right being placed 0.3 dots lower than the reference printhead to the left. The reference printhead if fired with the standard pattern.

Table 253 Worked Microposition Example, 0 Vertical Offset

TABLE 253

| nozzle | firing order | time delay | nozzle paper row | dot position | required row data |
|---|---|---|---|---|---|
| 0 | 0 | 0 | 0 | 0 | 0 |
| 2 | 1 | 0.1 | 10.1 | 10.1 | −10 |
| 4 | 2 | 0.2 | 20.2 | 20.2 | −20 |
| 6 | 3 | 0.3 | 30.3 | 30.3 | −30 |
| 8 | 4 | 0.4 | 40.4 | 40.4 | −40 |
| 1 | 5 | 0.5 | 3.5 | 3.5 | −3 |
| 3 | 6 | 0.6 | 13.6 | 13.6 | −13 |
| 5 | 7 | 0.7 | 23.7 | 23.7 | −23 |
| 7 | 8 | 0.8 | 33.8 | 33.8 | −33 |
| 9 | 9 | 0.9 | 43.9 | 43.9 | −43 |

Table 254 Worked Microposition Example, Offset 0.3 Down

TABLE 254

| nozzle | firing order | time delay | nozzle paper row | dot position | required row data |
|---|---|---|---|---|---|
| 0 | 7 | 0.7 | 0 | −0.3 | 1 |
| 2 | 8 | .8 | 10.1 | 9.8 | −9 |
| 4 | 9 | 0.9 | 20.2 | 19.9 | −19 |
| 6 | 0 | 0 | 30.3 | 30 | −30 |

TABLE 254-continued

| nozzle | firing order | time delay | nozzle paper row | dot position | required row data |
|---|---|---|---|---|---|
| 8 | 1 | 0.1 | 40.4 | 40.1 | −40 |
| 1 | 2 | 0.2 | 3.5 | 3.2 | −3 |
| 3 | 3 | 0.3 | 13.6 | 13.3 | −13 |
| 5 | 4 | 0.4 | 23.7 | 23.4 | −23 |
| 7 | 5 | 0.5 | 33.8 | 33.5 | −33 |
| 9 | 6 | 0.6 | 43.9 | 43.6 | −43 |

In table 253 and 254 the nozzle column shows the name of the nozzle the firing order column shows the order the nozzles should fire in the time delay shows the fraction of a dot pitch the paper has moved since the start of the fire cycle. It is the firing order divided by the number of rows.

the nozzle paper row is the vertical offset to the nozzle, from the printhead geometry the dot position shows where the nozzle lines up on the page, it is the nozzle paper row—printhead vertical offset.

the required row data column indicates what row data set should be loaded in the row shift register. It is the time delay—dot position, and should always be an integer.

This scheme can compensate for printhead placement errors to 1/10 dot pitch accuracy, for arbitrary printhead vertical misalignment.

The VPOSITION register holds the row number to fire first. The printhead performs sub-line placement, the correct line must be loaded by SoPEC.

4.3 Fire Timing Parameters 4.3.1 Profiles and Fireperiod

The width of the pulse that turns a heater on to eject an ink drop is called the profile. The profile is a function of the MEMs characteristics and the ink characteristics. Different profiles might be used for different colours.

Optimal dot placement requires each line to take 10% of the line time. to fire. So, while a row for a colour with a shorter profile could in theory be fired faster than a colour with a longer profile, this is not desirable for dot placement.

To address this, the fire command includes a parameter called the fireperiod. This is the time allocated to fire a single nozzle, irrespective of its profile. For best dot placement, the fireperiod should be chosen to be greater than the longest profile. If a profile is programmed to be longer than a fireperiod, then that nozzle pulse will be extended to match the profile. This extends the line time, it does not affect subsequent profiles. This will degrade dot placement accuracy on paper.

The fireperiod and profiles are measured in wclks. A wclk is a programmable number of 288 Mhz clock periods. The value written to fireperiod and profile registers should be one less than the desired delay in wclks. These registers are all 8 bits wide, so periods from 1 to 256 wclks can be achieved. The Wclk prescaler should be programmed such that the longest profile is between 128 and 255 wclks long. This gives best line time resolution.

4.3.2 Choosing Values for Span and Fireperiod

The ideal value for column span and fireperiod can be chosen based on the maximum profile and the linetime. The linetime is fixed by the desired printing speed, while the maximum profile depends on ink and MEMs characteristics as described previously.

To ensure than all nozzles are fired within a line time, the following relationship must be obeyed:

rows*columnspan*fireperiod<linetime

To reduce the peak Vpos current, the column span should be programmed to be the largest value that obeys the above relationship. This means making fireperiod as small as possible, consistent with the requirement that fireperiod be longer than the maximum profile, for optimal dot placement.

As an example, with a 1 uS maximum profile width, 10 rows, and 44 us desired row time a span of 4 yields 4*10*1'40 uS minimum time. A span of 5 would require 50 uS which is too long.

Having chosen the column span, the fireperiod should be adjusted upward from its minimum so that nozzle firing occupies all of the available linetime. In the above example, fireperiod would be be set to 44 us/(4*10)=1.1 uS. This will produce a 10% gap between individual profiles, but ensures that dots are accurately placed on the page. Using a fireperiod longer or shorter than the scaled line time will result in inaccurately placed ink dots.

4.3.3 Adjusting Fireperiod

The fireperiod to be used is updated as a parameter to every FIRE command. This is to allow for variation in the linetime, due to changes in paper speed. This is important because a correctly calculated fireperiod is essential for optimal dot placement.

4.3.4 Error Conditions

If a FIRE command is received before a fire cycle is complete, the error bit NO_EARLY_ERR is set and the next fire cycle is started immediately. The final column(s) of the previous cycle will not have been fully fired. This can only occur if the new FIRE command is given early than expected, based on the previous fireperiod.

4.3.5 Profile Pulse Limitation

The profile pulse can only be a rectangular pulse. The only controls available are pulse width and how often the nozzle is fired.

4.4 Nozzle Unclogging

A nozzle can be fired rapidly if required by making the column span 1. Control of the data in the whole array is essential to select which nozzle[s] are fired.

Using this technique, a nozzle can be fired for 1/10 of the line period. Data in the row shift registers must be used to control which nozzles are unclogged, and to manage chip peak currents.

It is possible to fire individual nozzles even more rapidly by reducing the profile periods on colours not being cleared, and using a short fireperiod.

```
<write SPAN >1
<write BYPASS__TDC> 1 # first 2 writes actual a single write to MAIN
<write PULSE__PROFILE> 1.2usec for all rows (if not already set)
for n=1 to X # repeat X times
  for row=0 to 11 # for each row
    <write ENABLE> (1<<row) # enable only this row
    for i=0 to 10 #
      <write ROW__ADDRESS> row
      <write DATA__RESUME>(1<<i),(1<<1),* # set every 11th bit in
      the row
                # (different offset each pass)
      for p=1 to 5# fire these nozzle 5 times separated by 50 usec
        <write FIRE>
        <write ROW__ADDRESS> N # if redundant fires are supported.
        wait 50 usec
```

-continued

```
        end
      end
    end
  end
```

For example, the above code will provide 5 profile pulses, 1.2 usec long, every 50 usec to every nozzle, X times at a rate of about 30 Hz.

4.5 Program Registers

The program registers generally require multiple bytes of data. and will not be stable until the write operation is complete. An incomplete write operation (not enough data) will leave the register with an unknown value.

Sensitive registers are write protected to make it more difficult for noise or transmission errors to affect them unintentionally. Writes to protected registers must be immediately preceded with a UNPROTECT command. Unprotected registers can be written at any time. Reads are not protected.

A fire cycle will be terminated early when registers controlling fire parameters are written. Hence these registers should preferably not be written while printing a page.

Readback of the core requires the user to suspend core write operations to the target row for the duration of the row read. There is no ability to directly read the TDC fifo. It may be indirectly read by writing data to the core with the TDC fifo enabled, then reading back the core row. The triangle sized segment at the start of the core row will contain TDC fifo data.

Reads are performed bit serially, using the read_address command to select a register, and the read_next command repeatedly to step through the register bits sequentially from bit 0. While reading, part or all of a register may be read prior to issuing the read_done command. Register bits which are currently undefined will read X.

The printhead is little-endian. Bit order is controlled by the 8B/10B encode on write, and is LSB first on read. Byte 0 is the least significant byte and is sent first. Registers are a varying number of bytes deep, ranging from 0 (unprotect) to 80 (any core row.)

TABLE 255

Register Table

| Address | Register Name Field Name | Readable | Writable | Protected | Suspend Fire | Reset state | Field | Description |
|---|---|---|---|---|---|---|---|---|
| 0 | ENABLE | y | y | y | y | 0 | 9:0 | Enable Profiles to row 'bit'. If BitN is '0' the profile signal for the rowN is disabled, and the nozzles in this row can not fire. The row can be written. |
| 1 | TEST | y | y | y | y | 0 | | Reserved test bits. Write 0. Do not use. |
| 2 | STATUS | y | y | n | n | | 31:0 | Entire Register |
| | NO_ERRORS | | | | | x | 0 | Low on any error |
| | NO_DISPARITY_ERR | | | | | x | 1 | Low on disparity error |
| | NO_DECODE_ERR | | | | | x | 2 | Low on 8b10b symbol error |
| | NO_ADDRESS_ERR | | | | | x | 3 | Low on bad write address pair |
| | NO_SLIP_ERR | | | | | x | 4 | Low on alignment slip error |
| | NO_UNDER_ERR | | | | | x | 5 | Low on less than 80 bytes per row |
| | NO_OVER_ERR | | | | | x | 6 | Low on more than 80 bytes per row |
| | NO_EARLY_ERR | | | | | x | 7 | Low on early fire command, last cycles not finished Once asserted by the event, each bit must be deasserted by writing 1 to the specific register bit |
| | DESIGN_ID | y | n | n | n | n | 15:8 | Design_ID: status[15:8] = 8'd43 |
| | CMOS_VER | y | n | n | n | 0x0c | 23:16 | CMOS Version = 0 |
| | MEMS_VER | y | n | n | n | 0x91 | 31:24 | MEMS Version = 0 |
| 3 | SPAN | y | y | y | y | 0x280 | [9:0] | Column span |
| 4 | VPOSITION | y | y | y | y | 0 | [3:0] | Compensate for vertical printhead misalignment, see see "Dot Placement, General case" on page 13. |
| 7 | DEVICE_ID | y | y | y | y | 0 | 1:0 | Head Addr: Address of head, forms bits [7:6] of addr of commands. "b00" is the default device id "b11" is the broadcast device id. |
| 15 | MAIN | y | y | y | y | | 5:0 | Entire Register |
| | Tristate | y | y | y | y | 0 | 0 | if 1, DO is tristate not open drain. |
| | WCLK | y | y | y | y | 001 | 3:1 | Create working clock, WCLK by dividing the main 288 MHz MHz clock, Clk by |

TABLE 255-continued

Register Table

| Address | Register Name Field Name | Readable | Writable | Protected | Suspend Fire | Reset state | Field | Description |
|---|---|---|---|---|---|---|---|---|
| | | | | | | | | (x+1)*2<br>000 = 144 MHz (<br>001 = 72 MHz (default)<br>010 = 48 MHz<br>011 = 36 MHz<br>100 = 28.8 MHz |
| | BYPASS_TDC | y | y | y | y | 0 | 4 | Bypass triangle delay compensator |
| | Powerdown | n | y | y | y | 0 | 6 | powers down the chip when asserted to a very low power state. Disables LVDS IO. Assert reset to exit powerdown. |
| | ld_n | y | n | n | y | 1 | 6 | reads state of internal ld_n fire signal |
| | done_n | y | n | n | y | 0 | 7 | reads the state of the internal done_n bit, showing whether a fire cycle is currently underway. |
| 16 | FIRE | y | y | n | n | 0 | 15:0 | Command to trigger the fire cycles. ROW_ADDRESS will be set to 9. A DATA_NEXT later will write to the first core row. |
| | FIRE_PERIOD | y | y | n | n | 0 | 15:0 | The data provided is the number of cycles of WCLK in a profile period.<br>The gap between fire commands must be at least 32 Profile periods.<br>Values between 2 and 0xffff are acceptable. |
| 23 | PULSE_PROFILE | | | y | y | | 50:0 | Entire Register |
| | $PG\_WIDTH_0$ | y | y | | | X | 7:0 | Profile width for colour 0 (row0, 1) |
| | $PG\_WIDTH_1$ | y | y | | | X | 15:8 | Profile width for colour 1 (row2, 3) |
| | $PG\_WIDTH_2$ | y | y | | | X | 23:16 | Profile width for colour 2 (row4, 5) |
| | $PG\_WIDTH_3$ | y | y | | | X | 31:24 | Profile width for colour 3 (row6, 7) |
| | $PG\_WIDTH_4$ | y | y | | | X | 39:32 | Profile width for colour 4 (row8, 9) |
| | profile[n]<br>fireclk | | | | | | | 10 individual row profiles<br>fireclk |
| | $PG\_DELAY_N$ | y | n | | | 0 | 49:40 | |
| | $PG\_WIDTH_N$ | y | n | | | 0 | 50 | |
| 24 | ROW_ADDRESS<br>ROW_BYTE_CNT | y | y | n | n | X | 3:0 | Current Row for data written to the core.<br>ROW_ADDRESS is incremented whenever register DATA_NEXT is accessed unless no data has been written to the core since ROW_ADDRESS was last changed.<br>ROW_ADDRESS will wrap from 9 to 0 when incremented, and will reset to 9. |
| 27 | DATA_RESUME | y | y | n | n | X | 639:0 | Nozzle data for ROW_ADDRESS. Data will not be written to the core once the row is full.<br>This is the address to use if the core is to be read. Note the TDC_FIFO may be in series for write, not for read. |
| 29 | DATA_NEXT | n | y | n | n | X | 639:0 | Nozzle data for ROW_ADDRESS. Pre-increment ROW_ADDRESS before the write if the current row is not empty. |

TABLE 255-continued

Register Table

| Address | Register Name Field Name | Readable | Writable | Protected | Suspend Fire | Reset state | Field | Description |
|---|---|---|---|---|---|---|---|---|
| | | | | | | | | This means two more DATA_NEXT writes will not change the current row address if no data is provided |
| 30 | UNPROTECT | — | — | n | n | — | — | A write to a protected register is enabled only if immediately preceeded by this command This command has no data.. |
| 25 | READ_ADDRESS | n | y | n | n | X | 4:0 | Output bit[0] of the register addressed by this register on Do. |
| 26 | READ_NEXT | — | — | n | n | — | — | Output the next bit of the register addressed by READ_ADDRESS on Do. This command has no data. |
| 28 | READ_DONE | — | — | n | n | — | — | Tristate Do. This command has no data. |

4.6 Initialisation

The printhead should be powered up with RstL low. This ensures that the printhead will not attempt to fire any nozzle due to the unknown state of power up. This will put registers into their default state (usually zero, see Table 255).

RstL may be released after 3 Clk cycles, and IDLE symbols should be send to the printhead.

During these IDLE symbols, the printhead will find the correct delay to correctly sample the Data. Once communication is established, functional registers can be programmed and status flags initialized.

For a multi-drop Data, RstL should be deasserted for one chip at a time, and that chip given a unique DEVICE_ID with a write to that register. The last chip may keep the default DEVICE_ID. After this step all chips can be addressed, either separately or by broadcast as desired.

A broadcast write may be used to set system parameters such as FIRE, PULSE_PROFILE, MAIN and ENABLE.

4.7 Core Data Addressing

Data is written to the core one row at a time. Data is written to the row indexed by ROW_ADDRESS, using the data symbols following a write to the DATA_RESUME or DATA_NEXT register. It is also possible to interrupt this data transfer phase with another (not row data) register write. Use DATA_RESUME to continue the data transfer after the interruption is completed.

Only the first 640 bits of data sent to the current row are used, further data is ignored.

4.7.1 Indirect Address Mode.

In this mode data to the core should be written with the DATA_NEXT command. DATA_RESUME is used if a complete transfer is interrupted. A FIRE command or RstL leaves the ROW_ADDRESS in the correct state for this method to work correctly A normal sequence per line for a single chip on Data:

```
<FIRE[11]><T0><T1>
<DATA_NEXT[00]><IDLE><IDLE><IDLE><DATA_NEXT[00]>
<D000><D001>< . . . ><D079>
```

-continued

```
<DATA_NEXT[00]><IDLE><IDLE><IDLE><DATA_NEXT[00]>
<D080><D081>< . . . ><D159>
. . .
<DATA_NEXT[00]><IDLE><IDLE><IDLE><DATA_NEXT[00]>
<D880><D881>< . . . ><D959>
<FIRE[11]><T0><T1>
```

There would be 12 DATA_NEXT calls per line (per chip). Notice above two DATA_NEXT commands were separated by 3 IDLE symbols, the first without data, this is not necessary, but can make the result less subject to transmission errors.

A normal sequence per line for two chip on Data if contents are interleaved one row of data at a time:

```
<FIRE[11]><T0><T1>
<DATA_NEXT[00]><D000><D001>< . . . ><D079>
<DATA_NEXT[01]><D000><D001>< . . . ><D079>
<DATA_NEXT[00]><D080><D081>< . . . ><D159>
<DATA_NEXT[01]><D080><D081>< . . . ><D159>
. . .
<DATA_NEXT[00]><D880><D881>< . . . ><D959>
<DATA_NEXT[01]><D880><D881>< . . . ><D959>
<FIRE[11]><T0><T1>
```

If contents are interleaved such that less than one full row of data is sent (80 bytes) before the command is interrupted by an unrelated command (such as changing the line timing) a DATA_RESUME write would be used to complete the row:

```
<DATA_NEXT[00]><D000><D001>< . . . ><D039>
<DATA_NEXT[01]><D000><D001>< . . . ><D039>
<DATA_RESUME[00]><D040><D041>< . . . ><D079>
<DATA_RESUME[01]><D040><D041>< . . . ><D079>
. . .
<DATA_NEXT[01]><D880><D881>< . . . <<D919>
<DATA_RESUME[00]><D920><D921>< . . . ><D959>
<DATA_RESUME[01]><D920><D921>< . . . ><D959>
<FIRE[11]>
```

DATA_RESUME could be broadcast if all other chips current rows are full. This will cause a NO_OVER_ERR in these other chips, as they believe they have received too much data. But as extra data is ignored, no print problems are encountered.

A normal sequence per line for a single chip on Data:

```
<FIRE[11]><T0><T1>
<DATA_NEXT[00]><D000><D001><. . . ><D079>
<DATA_NEXT[01]><D000><D001><. . . ><D039>
<inserted command from cpu>
<DATA_RESUME[11]><D040><D041><. . . ><D079>
. . .
```

This works because the chip [00] current row is full, but it will set its NO_OVER_ERR bit.

4.7.2 Direct Access

In this mode the ROW_ADDRESS is manually set and 80 bytes are provided with the DATA_RESUME write. If this method is used, rows can be filled in any order, but for correct print behaviour, this order must be the same for all lines on a page.

4.8 Register Reading

The registers are read by writing their address to the READ_ADDRESS. This will put the least significant bit of the addressed register is output on Do.

Reading an undefined or unreadable register, will result in an unknown value driven on Do.

A write to READ_NEXT will present the next bit of the current addressed register on Do. Advancing past the most significant bit of the current addressed register will result in an unknown value on Do.

A write to READ_DONE is required to finish the read and tristate Do. A read may be terminated before all bits are read. Other commands can be interleaved with READ_NEXT and READ_DONE commands.

Output timing of Do depends heavily on PCB and cabling. The device has a 4 mA output capability, and particularly when open drain mode is used rise time will be limited by board capacitance and externally sourced pullup current. In an application with a 2 mA pullup source and 100 pf stray capacitance, a maximum line bit rate of 150 ns or 6 MHz can be achieved. Hence the protocol allows the application to set the bit rate by issuing READ_NEXT commands. The command consists of 3 symbols at a 28.8 MHz symbol rate. There is also a fixed latency in the chip of 5 symbols or 150 nS.

4.8.1 Error Bits

The bit that is monitored by the read is unregistered. If it changes dynamically, Do will reflect the change. This is useful for monitoring any of the error bits of the STATUS register. Since bit 0 of this register, NO_ERRORS reflects all error conditions, this bit can be watched until an error condition occurs, then the read can be advanced until the source of the error is found. As Do is an open-drain output in normal operation, all devices can be selected simultaneously if desired for this.

Error bits are reset by a write with a 1 in the specific bit position to the STATUS register. An error bit cannot be written to 0.

5 Data Encoding 5.1 Scrambling

Data is scrambled. This may be of use in reduction of EMI from repeated symbols on Data, for example strings of whitespace on a printed page, or multiple idle characters.

A descrambler implementing the polynomial $1+x^{15}+x^{28}$ is provided. This is self synchronizing to the transmitter.

The descrambler has an effect on error multiplication in the event of bit errors. A single line bit error will be seen multiple times, once on the data bit applied, and once for each tap. The exact timing for the subsequent bit errors will also be constrained by the shift register taps, which come directly from the polynomial power terms chosen for the maximal-length PRBS used.

5.2 8B10B Code

An 8B/10B encoding scheme is used. This is chosen as a standardized way to combine data and signalling onto one high speed connection. It provides clock recovery, DC balance, data and command separation, symbol alignment, and some error checking.

We have essentially unidirectional signalling in this application, which precludes re-transmission in the event of error. Transmission errors are not particularly serious in the print data fields. Errors in commands can have consequences. The approach used here is to include extra error checking in commands, and ignore error-ed commands.

The standardized scheme (eg as in IEEE802.3) has been modified here to increase the Hamming distance between command symbols and data symbols.

5.2.1 Overview

The data link is always active. Either data or control characters may be sent. When no other character is available to send, an idle symbol shall be sent.

An 8 bit data character is split into a 5 bit and a 3 bit part. The 5 bit part is encoded to a 6 bit subblock. The 3 bit part is encoded to a 4 bit subblock. These are termed 5B/6B and 3B/4B encodings respectively.

The particular encoding chosen depends on whether a data or command is to be sent, and on the current running disparity.

5.2.2 Disparity

The encoding scheme is DC balanced. This implies overall the number of 1's sent matches the number of zeroes. The disparity of a subblock is the number of 1's minus the number of zeroes. As the 6B and 4B subblocks are both even, the disparity of the subblocks must be even.

After powering on or exiting a test mode, the transmitter shall assume the negative value for its initial running disparity. Upon transmission of any code-group, the transmitter shall calculate a new value for its running disparity based on the contents of the transmitted code-group.

After powering on or exiting a test mode, the receiver should assume a negative value for its initial running disparity. Upon the reception of any code-group, the receiver determines whether the code-group is valid or invalid and calculates a new value for its running disparity based on the contents of the received code-group.

The following rules for running disparity shall be used to calculate the new running disparity value for code-groups that have been transmitted (transmitters running disparity) and that have been received (receivers running disparity).

Running disparity for a code-group is calculated on the basis of sub-blocks, where the first six bits (abcdei) form one sub-block (six-bit sub-block) and the second four bits (fghj) form the other sub-block (four-bit sub-block).

Running disparity at the beginning of the six-bit sub-block is the running disparity at the end of the last code group. Running disparity at the beginning of the four-bit sub-block is the running disparity at the end of the six-bit sub-block.

Running disparity at the end of the code-group is the running disparity at the end of the four-bit sub-block. Running disparity for the sub-blocks is calculated as follows:

a) Running disparity at the end of any sub-block is positive if the sub-block contains more ones than zeros, except for the idle character. For idle the 10B symbol is counted as a single subblock.

b) Running disparity at the end of any sub-block is negative if the sub-block contains more zeros than ones, except for the idle character. For idle the 10B symbol is counted as a single subblock.

5.2.3 Character Codes

The bits in the 8 bit data character are labelled A, B, C, D, E, F, G, H where A is the least significant bit and H the most significant bit. (For row data, the least significant bit is the leftmost pixel on the line)

The bits ABCDE are encoded to the 10b space bits named abcdei using the 5B/6B map. The FGH bits are encoded using the 3B/4B map to the 10b space bits fghj. On Data bits are tramsmitted in order abcdeifghj. The a bit is transmitted first. A '1' on Data is encoded with the data_p pin more positive than the data_n pin.

Table 256 Used 5B6B Encoding

TABLE 256

| Name | ABCDE K | rd | abcdei | rd | abcdei | o-disp | note |
|---|---|---|---|---|---|---|---|
| D.0 | 00000 0 | + | 011000 | − | 100111 | ! | |
| K.0 | 00000 1 | + | 000000 | − | 111111 | ! | Idle |
| D.1 | 10000 0 | + | 100010 | − | 011101 | ! | |
| K.1 | 10000 1 | + | 110000 | − | 001111 | ! | Write |
| D.2 | 01000 0 | + | 010010 | − | 101101 | ! | |
| D.3 | 11000 0 | * | 110001 | | | | |
| D.4 | 00100 0 | + | 001010 | − | 110101 | ! | |
| D.5 | 10100 0 | * | 101001 | | | | |
| D.6 | 01100 0 | * | 011001 | | | | |
| D.7 | 11100 0 | + | 000111 | − | 111000 | | |
| D.8 | 00010 0 | + | 000110 | − | 111001 | ! | |
| D.9 | 10010 0 | * | 100101 | | | | |
| D.10 | 01010 0 | * | 010101 | | | | |
| D.11 | 11010 0 | * | 110100 | | | | |
| D.12 | 00110 0 | * | 001101 | | | | |
| D.13 | 10110 0 | * | 101100 | | | | |
| D.14 | 01110 0 | * | 011100 | | | | |
| D.15 | 11110 0 | + | 101000 | − | 010111 | ! | |
| D.16 | 00001 0 | + | 100100 | − | 011011 | ! | |
| D.17 | 10001 0 | * | 100011 | | | | |
| D.18 | 01001 0 | * | 010011 | | | | |
| D.19 | 11001 0 | * | 110010 | | | | |
| D.20 | 00101 0 | * | 001011 | | | | |

TABLE 256-continued

| Name | ABCDE K | rd | abcdei | rd | abcdei | o-disp | note |
|---|---|---|---|---|---|---|---|
| D.21 | 10101 0 | * | 101010 | | | | |
| D.22 | 01101 0 | * | 011010 | | | | |
| D.23 | 11101 0 | + | 000101 | − | 111010 | ! | |
| D.24 | 00011 0 | + | 001100 | − | 110011 | ! | |
| D.25 | 10011 0 | * | 100110 | | | | |
| D.26 | 01011 0 | * | 010110 | | | | |
| D.27 | 11011 0 | + | 001001 | − | 110110 | ! | |
| D.28 | 00111 0 | * | 001110 | | | | |
| D.29 | 10111 0 | + | 010001 | − | 101110 | ! | |
| D.30 | 01111 0 | + | 100001 | − | 011110 | ! | |
| D.31 | 11111 0 | + | 010100 | − | 101011 | ! | |

Table 257 Used 3B/4B Map

TABLE 257

| Name | FGH K | RD | fghj | RD | fghj | o-disp | note |
|---|---|---|---|---|---|---|---|
| D.x.0 | 000 0 | + | 0100 | − | 1011 | ! | |
| K.x.0 | 000 1 | + | 0000 | − | 1111 | | A = 0, I, new |
| K.x.0 | 000 1 | + | 1000 | − | 0111 | ! | A = 1, W, new |
| D.x.1 | 100 0 | * | 1001 | | | | |
| D.x.2 | 010 0 | * | 0101 | | | | |
| D.x.3 | 110 0 | + | 0011 | − | 1100 | | |
| D.x.4 | 001 0 | + | 0010 | − | 1101 | ! | |
| D.x.5 | 101 0 | * | 1010 | | | | |
| D.x.6 | 011 0 | * | 0110 | | | | |
| D.x.7 | 111 0 | + | 0001 | − | 1110 | ! | simplified |

5.2.4 Idle K.0.0 (00000 000)

With negative running disparity (RD), a single idle will look like 111111 0000 and makes the RD positive. A consecutive idle would then be 000000 1111.

5.2.5 Write K.1.0 (10000 000)

With negative running disparity (RD), a single write will look like 001111 1000 and leaves the RD negative. A write with positive RD is 110000 0111., which also does not change the RD.

5.2.6 Comma

A comma is a sequence of bits used to speed acquisition of symbol alignment. A comma can not occur anywhere in an error free data stream except in the position indicating correct symbol alignment.

In this design a comma consists of either of the 12 bit sequences 011111111110 or 100000000001. These sequences will only occur when 2 idle characters are sent consecutively.

5.2.7 Error flags

The error bits have the following meanings

TABLE 258

| Error bits | |
|---|---|
| Error Bit | Description |
| NO_ERRORS | Is asserted to 0 if any other error is asserted |
| NO_DISPARITY_ERR | A symbol has been received which violates the disparity rules. The most likely reason for this is a bit error on the line. |
| NO_DECODE_ERR | A symbol has been received that is not decodeable. This bit does not give complete coverage, 34 characters sneak through. |

TABLE 258-continued

| Error bits | |
|---|---|
| Error Bit | Description |
| NO_SLIP_ERR | The alignment state machine has lost character alignment. This can be due to a clock slip or very high bit error rates. Losing lock requires at least one comma seen at the wrong time., or disparity error, in each of 16 consecutive windows each 16 symbols in duration. |
| NO_ADDRESS_ERR | A write command has been received with a disparity error, or failed parity, or address characters that mismatch (after inversion of the second address character). The write was not performed. Errors in the data of the write do not create this error. |
| NO_UNDER_ERR | A row increment operation was performed with less than 80 data characters on one row, and more than zero (the increment does not happen if the row is empty) |
| NO_OVER_ERR | More than 80 data characters were received for one row. |

2 Block Diagram and Overview

Figure 376:
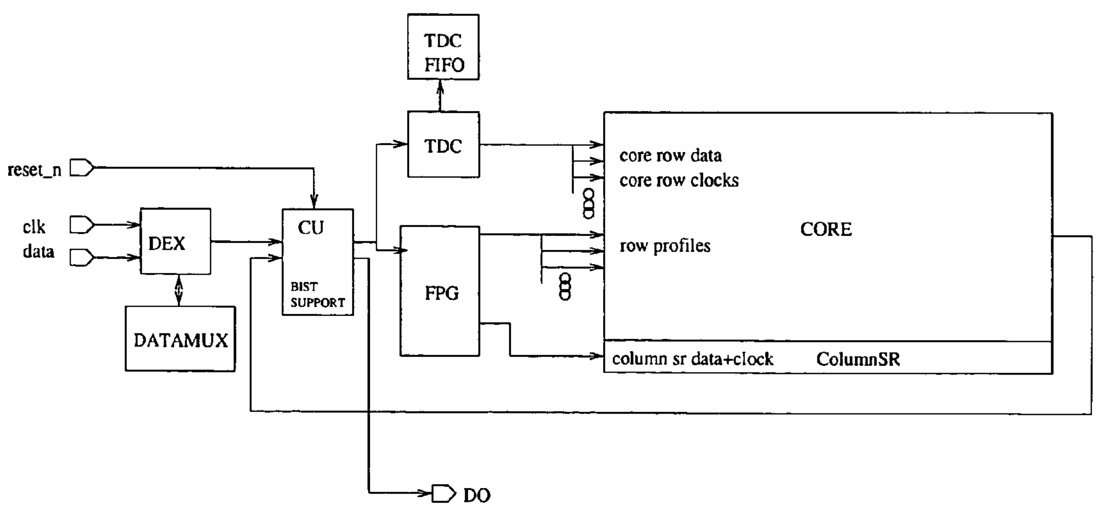
FIG. 376. Block Diagram
Figure 377:
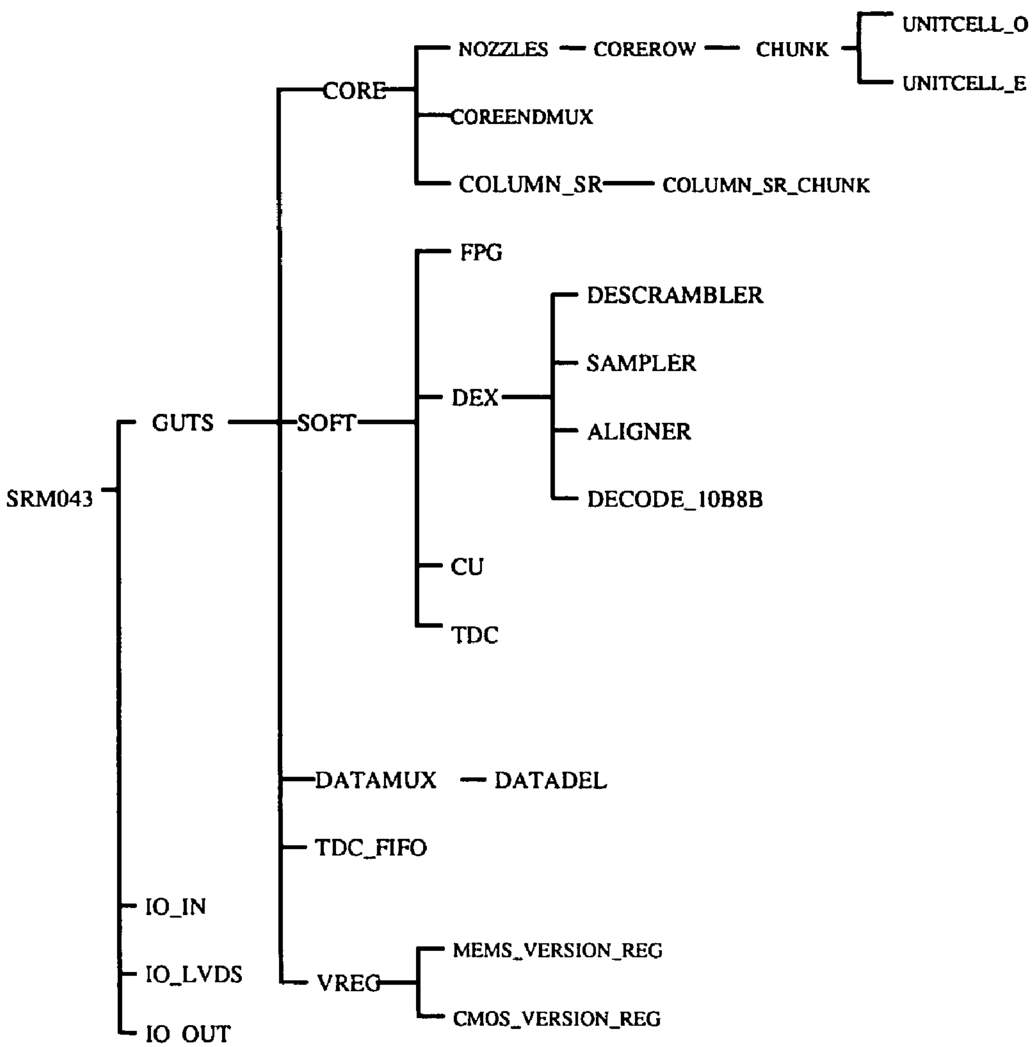
FIG. 377. Netlist hierarchy
Figure 378:
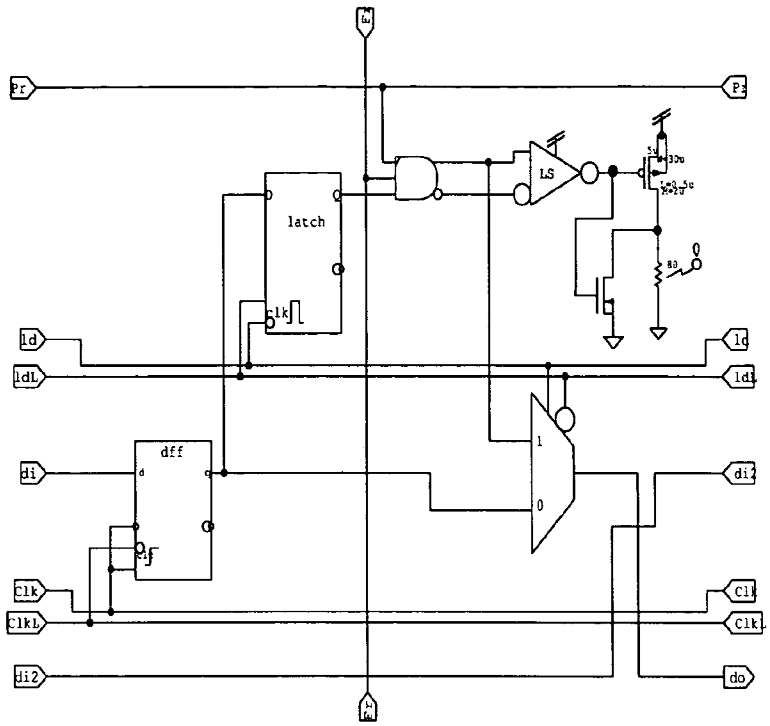
FIG. 378. Unit cell schematic

FIG. 376 shows the top levels of the block diagram and by extension the top wrapper netlist for the printhead.

The modules comprising the linking printhead CMOS are:

2.1 Core

The core contains an array of unit cells and the column shift register (columnSR).

The Unit Cell is the base structure of the printhead, consisting of one bit of the row data shift register, a latch to double buffer the data, the MEMS ink firing mechanism, a large transistor to drive the MEMS and some gates to enable that transistor at the correct time.

The column shift register is at the bottom of the core unit cell array. It is used to generate timing for unit cell firing, in conjunction with the fpg.

2.2 Triangle Delay Compensation

The TDC module handles the loading of data into row shift regsiters of the core.

The dropped triangle at the left hand end of the core prints 10 lines lower on the page than the bulk of each row. This implies data has to be delayed by 10 line times before ink ejection. To minimize overhead on the print controller, and to make the interface cleaner, that delay is provided on chip.

The TDC block connects to a fifo used to store the data to be delayed, and routes the first few nozzle data samples in a particular row with data through the fifo. All subsequent data is passed straight through to the row shift registers.

The TDC also serializes 8 bit wide data at the symbol rate of 28.8 MHz to 2 bit nibbles at a 144 MHz rate, routes that data to all row shift registers, and synchronously generates gated clocks for the addressed row shift register.

2.3 FPG

The Fire and Profile Generator controls the firing sequence of the nozzles on a row and column basis, and the width of the firing pulses applied to to each actuator.

It produces timed profile pulses for each row of the core. It also generates clock and data to drive the ColumnSR. The column enables from the ColumnSR, the row profile, and the data within the core are all and'ed together to fire the unit cell actuators and hence eject ink.

The FPG sequences the firing to produce accurate dot placement, compensating for printhead position and generates correct width profiles.

2.4 DEX

The Data EXtractor converts the input data stream into byte-wide command and data symbols to the CU. It interfaces with a full-custom Datamux to sample data presented to the chip at the optimum eye. This data is then descrambled, symbols are aligned and deserialized, and then decoded. Data and symbol type is passed to the CU.

2.5 CU

The Command Unit contains most of the control registers. It is responsible for implementing the command protocol, and routes control and data and clocks to the rest of the chip as appropriate. The CU also contains all BIST functionality.

The CU synchronizes reset_n for the rest of the chip. Reset is removed synchronously, but is applied to flip flops on the async clear pin. Fire enable is overridden with an asynchronous reset signal.

2.6 IO

The chip has high speed clock and data LVDS pads connected to the DEX module.

There is a Reset_n input and a modal tristate/open drain output managed by the CU.

There are also a number of ground pads, VDD pads and also VPOS pads for the unit cell.

The design should have no power sequencing requirements, but does require reset_n to be asserted at power on.

Lack of power sequencing requires that the ESD protection in the pads be to ground, there cannot be diodes between the VPOS and VDD rails.

Similarly the level translator in the unit cell must ensure that the PMOS switching transistor is off in the event VPOS is up before VDD.

2.7 Normal Operation

The normal operation of the linking printhead is 1. reset the head
2. program registers to control the firing sequence and parameters
3. load data for a single print line into (up to) 10 rows of the printhead
4. send a FIRE command, which latches the loaded data, and begins a fire cycle
5. while the fire cycle is in progress, load data for the next print line
6. if the page is not finished, goto 4.

Note the spacing of FIRE commands determines the printing speed (in lines/second). The printhead would normally be set up so that a fire cycle takes all of the time available between FIRE commands.

3 Netlist Hierarchy

The netlist hierarchy for the design is as follows

Table 259 Netlist Types

TABLE 259

| Netlist | Verilog Behav | Verilog RTL | Verilog Structural | Synthesized Verilog Gate | scan inserted verilog gate | Schematic | Spice | Transistor LVS |
|---|---|---|---|---|---|---|---|---|
| srm043 | | | srm043.v | | | | | |
| guts | | | guts.v | | | | | |
| core | | | core.v | | | | | |
| dex | | | dex.v | | | | | |
| sampler | | sampler.v | | sampler_gate.v | | | | |
| datamux | | | datamux.v | | | | | |
| datadel | datadel.v | | | | | | | datadel.spi |
| descrambler | | descrambler.v | | descrambler_gate.v | | | | |
| aligner | | aligner.v | | aligner_gate.v | | | | |
| decode_10b8b | | decode_10b8b.v | | decode_10b8b.gate.v | | | | |
| cu | | cu.v | | Cu_gate.v | cu_bist.v | | | |
| bist | | bist.v | | bist_gate.v | | | | |
| fpg | | fpg.v | | fpg_gate.v | | | | |
| cmos_version_reg | cmos_ver_reg.v | | | | | | | cmos_version_reg_spi |
| mems_version_reg | mems_version_reg.v | | | | | | | mems_version_reg.spi |
| tdc | | tdc.v | | tdc_gate.v | | | | |
| fifo | fifo.v | | | | | | | fifo.spi |
| io_out | io_out.v | | | | | | | io_out.spi |
| io_lvds | io_lvds.v | | | | | | | io_lvds.spi |
| io_in | io_in.v | | | | | | | io_in.spi |

Key

- Master
- hand equivalent required

4 Detailed Description of Modules 4.1 Unit Cell 4.1.1 Unit Cell IO

Table 260 Unit Cell IO

TABLE 260

| Signal | Direction | to/from | Description |
|---|---|---|---|
| Rclk | In | from: TDC | 144 MHz row clock |
| rclk_n | In | | inverted rclk |
| Di | in | from: previous stage | row shift register data. NB the shift registers are 2 bits wide, so these play leapfrog. |
| Do | out | to: next stage | to next+1 shift register di |
| ld_n | In | from: CU | load SR data to latch. |
| Ld | In | from: local buffer | complement of ld_n |
| Fr | In | from: ColumnSR | column fire enable aka fire |
| Pr | In | From fpg | row enable signal aka Profile |
| Actuator | out | to Ink | FET drain/actuator load |

4.1.2 Functionality

The unit cell consists of a flipflop forming a single bit of the row shift register, and a latch to store nozzle data for the duration of the following fire cycle. An AND gate ensures that the nozzle fires when nozzle data, row profile and column fire are all asserted. A level shifter translates from the 3.3V $V_{DD}$ core logic level to 5V $V_{POS}$ for the drive transistor. A large drive transistor switches current to the MEMS actuator or resistance.

The drive transistor is a PMOS device to reduce electrolysis in the MEMS resistance.

structural verilog netlist written to match. Spice shall be used on an extracted netlist to derive timing parameters for those verilog UDPs. This model shall be used for full timing verilog simulations of the device.

4.1.3 Unit Cell Combinations, the Chunk

Figure 379:
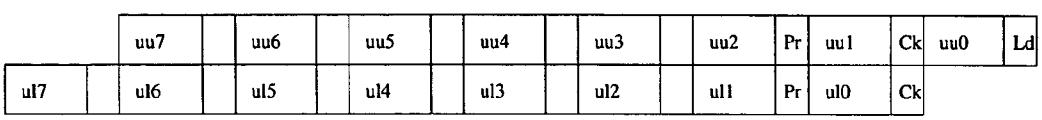
FIG. 379. Unit cell arrangement into chunks
Figure 380:
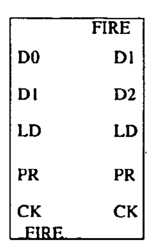
FIG. 380. Unit Cell Signals
Figure 381:
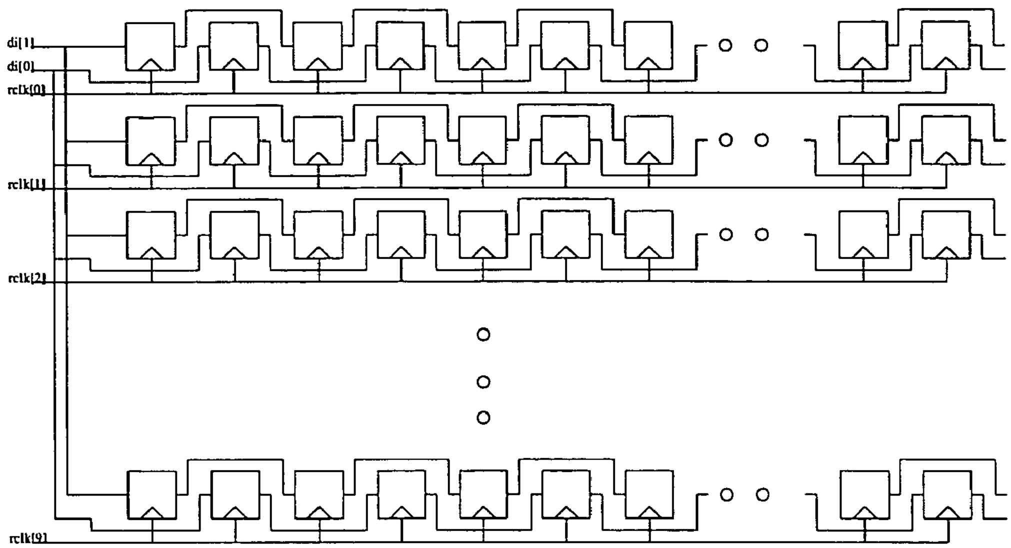
FIG. 381. Core data shift registers
Figure 382:
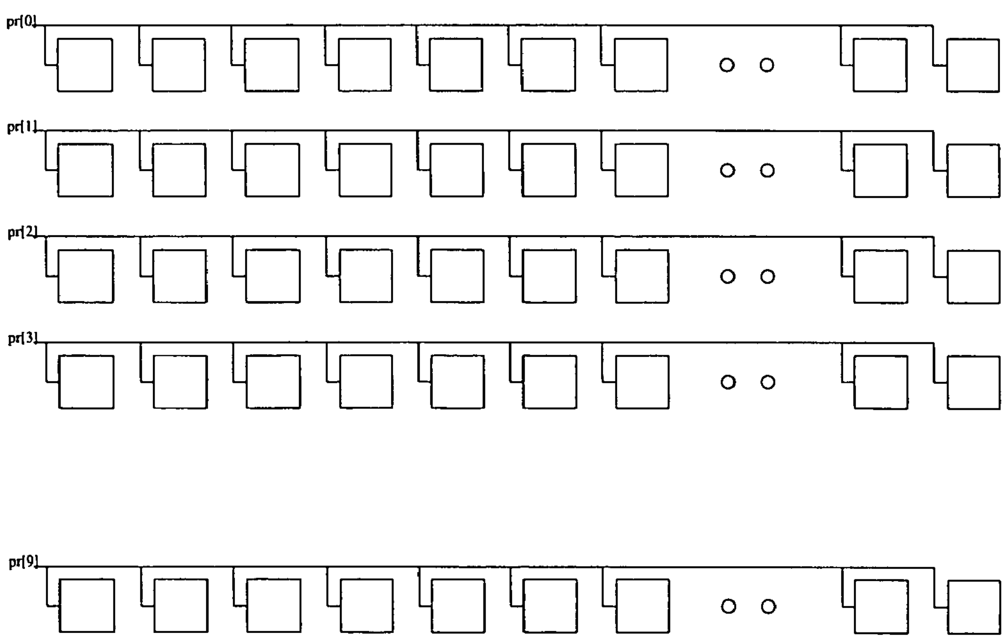
FIG. 382. Core Profile logical connection

FIG. 379 shows the physical arrangement of upper and lower unit cell logic into the chunk. The drive transistors are above and below the logic. This figure shows the buffers for Id, clk and pr repeating every 8 cells. ColumnSR outputs run vertically through this structure, meaning uu1 and u10 both access fr.

As we progress from right to left along the shift register, skew between the various signals can become an issue.

ColumnSR_clk should match profile delays, to a tolerance of one wclk along the length of the shift register.

This is 6 ns, or 75 ps per stage difference in insertion delay. Any clock->q delay from ColumnSR flip flops to the unitcell and gate also subtracts from this number (once).

We must ensure Id_n matches clk to 3 symbols, or 90 ns. This reflects a write command being 3 symbols long. Also, the delay from Id_n assertion to pr must be positive along the shift register. As Id_n is more heavily loaded than pr, a delay is required from Id_n assertion till the initial pr. This number depends on the core skew not yet extracted, but is expected to be of the order of 30 ns.

4.1.4 Timing+Latency

Propagation delay in the unit cell from (fire&profile&data) 1 nS+/−0.5 ns

No cycle delay on fire.

4.2 Core 4.2.1 Core IO

TABLE 261

CORE IO

| Name | Drn | From/to | Description |
|---|---|---|---|
| ld_n | in | from: cu | load signal, loads shiftreg data into latches. Level sensitive active low. Clocking rclk[n] with this signal asserted will load sr[n] with a test mode signal. |
| di[1:0] | in | from: tdc | 2 bits of row data. D0 is LSB |
| do[1:0] | out | to: cu | 2 bit row data shiftreg output from row selected by row[n]. Delayed 320 rclk[n]. Used for test mode/core data readbackl. |
| pr[9:0] | in | from: fpg | profile horizontal lines for row[n] |
| rclk[9:0] | in | from: tdc | shift register clocks for row[n]. di[ ] has setup of 1 ns prior to rising edge rclk[n] and hold of 1 ns. This clock is gated to enable shifting in a particular row, i.e. there is no separate shift enable signal. It runs at144 MHz rate. |
| Columnsr_clk | in | from: fpg | clock for top ColumnSR. positive edge. Don't align posedge columnsr_clk and posedge ld_n. |
| Columnsr_di | in | from: fpg | data input for columnSR. |
| row[3:0] | in | from: cu | This signal selects which row is output on the do[1:0] bus. row[0x0f] selects ColumnSR output on do[0] |

The multiplexer is used to enhance testability. It allows the latch (while transparent) and the and gate to be tested using the shift register as a scan chain without requiring additional scanmode wiring.

The unit cell is implemented as a full custom layout using Tanner Ledit.

Verilog User Defined Primitives (UDPs) will be written for each of the cells drawn schematically above and a 4.2.2 Functionality The core is an array of 640×10 unit cells. The unit cells physically butt together, logically signals flow through the abutted cells like this.

This cell is 5DP (dot pitch) high and 2DP wide.

The load (LD) signal, the row profile (PR), the shift register clock (CK) are used by the cell and are made available to the next cell horizontally. The column enable or fire signal (FR) is used by the cell and made available to the next cell vertically.

The unit cell is a single nozzle bit shift register, but the core is presented as a 2 bit wide shift register to manage shift rate. To achieve this, D1 is shown as a connection straight through the unit cell. D0 gets latched by the unit cell flipflop to become D2.

When 640 of these cells are connected horizontally, a shift register 320 bits long by 2 bits wide is formed. 10 of these are adjoined vertically with a 2.5 column horizontal offset for linking reasons.

It should be emphasized that this is an electrical view. Physically the data flows right-to-left, and lower rows are shifted to the left by 2.5 unit cells or 5D. All directions are with respect to a top view of the CMOS floorplan, with pads at bottom. Ink squirts up out of the page.

Core profiles are horizontally connected, with re buffering not shown. There are buffers which are used to maintain pulse shape along the 640 unit cells in a row. These are physically part of the unit cell, but electrically connected as part of the arraying process. These buffers buffer Id, pr and rclk every 8 unit cells horizontally. Id buffers are shared by upper and lower rows.

These buffered nets all flow in the same direction, right to left on chip. This is key to maintaining signal integrity in the array.

A nozzle fires when the latched row data, the respective fire and profile are all asserted.

Core inputs are on the right hand end. The first bits input exits on the left hand end.

The core hard macro also includes the ColumnSR, described below.

The dropped triangle is invisible to this interconnect logic.

4.2.3 Timing+Latency clk delay is 200-600 ps*640/8=16 ns-48 ns clk->Q of the last stage is 0.6-1.9 ns 4.3 ColumnSR 4.3.1 IO Table 262

TABLE 262

| Signal | Drn | From/To | Description |
|---|---|---|---|
| columnsr_clk | in | From: fpg | shift register clock |
| columnsr_di | in | From fpg | shift register data |
| columnsr_do | out | to: CU | test mode: shift register data out. |

4.3.2 Functionality

Figure 383:
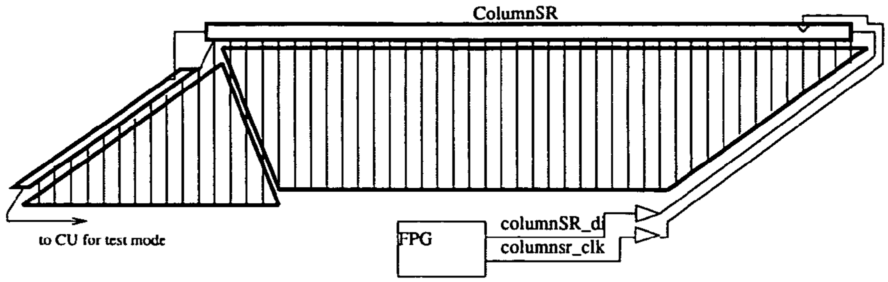
FIG. 383. Column SR Placement
Figure 384:
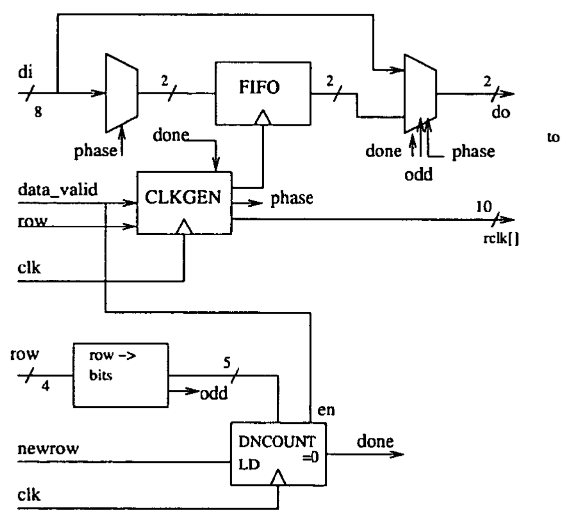
FIG. 384. TDC block diagram

The column shift register is shown schematically in FIG. 383. It provides column enable signal to the core. In use, it provides a programmable-N walking 1 (generated in the FPG) to fire the core in the desired order.

The ColumnSR consists of 661 flip flops. There are 634 flip flops across the top row of the core, and 5 extra flip flops per row pair allowing for the slope on the left hand side of the triangle.

ColumnSR_clk is distributed from right to left to match the clk delay in the core data paths. It is implemented as part of the ColumnSR at the top of the core. The same tools and flow as the unit cell shall be used.

This is a floorplan-style view of the core. Ink is firing out of the page. Paper moves top to bottom. Pads are at the bottom. Data goes in to the core at the right and shifts right to left. The ColumnSR shifts the same way. The core unit cells are offset 2.5 unit cells per row, but the column fire wires are vertical.

The column shift register is physically in two parts. The figure shows the physical distribution of the shift register and the associated fire wires. Note these are run through the gap where the triangle is dropped.

The leftmost flipflop in the ColumnSR generates F[0]. The leftmost flipflop in each shift register is bit[0] in the respective row. Table 263 shows the way the ColumnSR enable lines trace through the core.

TABLE 263

ColumnSR enables

| Row | ColumnSR signal connection to bit[N] |
|---|---|
| 0 | F[N+21] |
| 1 | F[N+20] |
| 2 | F[N+16] |
| 3 | F[N+15] |
| 4 | F[N+11] |
| 5 | F[N+10] |
| 6 | F[N+6] |
| 7 | F[N+5] |
| 8 | F[N+1] |
| 9 | F[N+0] |

4.3.3 Timing columnsr_clk is delayed 400 ps+/−200 ps each 8 unit cells.

4.4 TDL 4.4.1 TDC IO

Table 254 TDC IO

TABLE 264

| Signal | Drn | to/from | Description |
|---|---|---|---|
| di[7:0] | in | from: CU | 8 bit row data, at symbol (clk28) rate |
| data_valid | in | from: CU | enable for data, in clk28 domain |
| clk | in | from: IO | 288 MHz clock |
| phi9 | in | from: DEX | synchronizing clk signal |
| tdc_bypass | in | from: CU | disable triangle delay compensation |
| ld_n | in | from: CU | initiate fire cycle |

TABLE 264-continued

| Signal | Drn | to/from | Description |
|---|---|---|---|
| do[1;0] | out | to: core | output data to core row shift registers |
| rclk[9:0] | out | to: core | core shift register row clocks. 144 MHz gated clocks, no more than one running at a time. |
| row[3:0] | in | from: CU | core row to write to |
| newrow | in | from: CU | the core row has changed, recalculate. |
| fifo_di[1:0] | out | to: TDC_FIFO | first up delayed data |
| fifo_do[1:0] | in | from: TDC_fifo | delayed data from fifo |
| fifo_clk | out | to: TDC_fifo | fifo clock. 144 MHz gated clock, aligned to rclks |
| Single_rclk | in | from: CU | generates a single rclk event when asserted, used for core readback. |

4.4.2 Functionality

The TDC receives row data from the CU, partially serializes it, and writes it to the currently addressed printhead row. It also strips the required number of bits from the beginning of the row and stores them in the TDC_fifo, replacing them with bits shifted out of the TbC_fifo. This occurs transparently to the master SoPEC.

Figure 385:
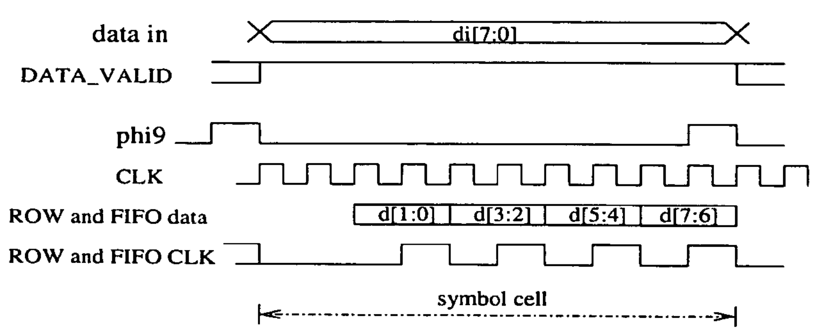
FIG. 385. TDC waveform
Figure 386:
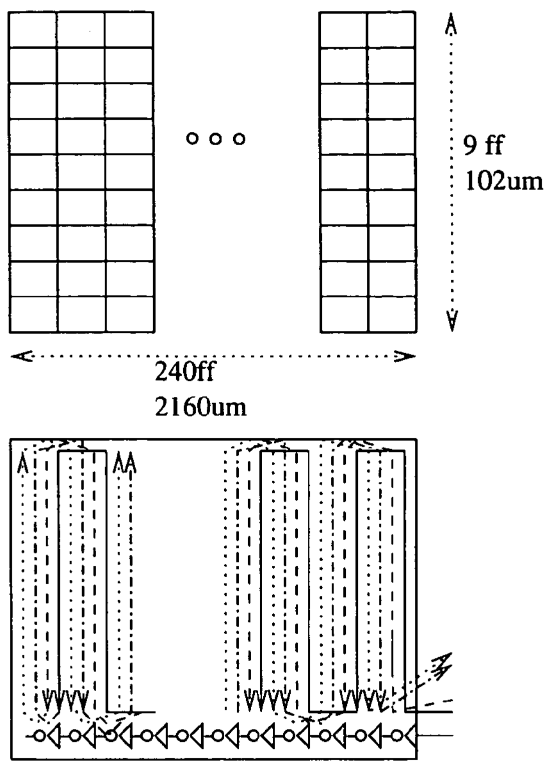
FIG. 386. TDC construction

The TDC generates a local symbol phase clock using phi9. This clock phase information, together with the data_valid level, is used to generate fifo and row clocks. These clocks are timed as shown in FIG. 385. The precise number of fifo clocks per row is shown in Table 266.

The CU indicates when the current addressed row changes. That row is mapped to get the number of bits to pass through the fifo, and also whether the number of fifo bits is odd. [The current FIFO is never odd, but this has not always been the case so the logic remains in the RTL] A counter is loaded with the total number of required clocks, and then allowed to count down. When it reaches terminal count, a done flag is set, This flag is used to indicate whether row data is delayed through the fifo, or passed directly to the core. There is a single done flag, so a row can only be addressed once per fire cycle.

If the number of bits to delay is odd, and the counter has reached terminal count, then one bit for the core is taken from the fifo and one bit from the current presented byte. The fifo bit used is always on fifo_do[0]. fifo_do[1] is discarded in this case.

A tdc_bypass bit always causes data to bypass the fifo, and pass directly to the core. This mode may be used for print test, for nozzle unclogging and potentially if SoPEC was to be used to compensate for the triangle delay.

This design allows the core to be randomly addressed if required. All lines on a page must be written in the same row order. Once a row has started writing, it must be completed. At least enough symbols to fill the TDC fifo fragment must be sent for every row for every line. If fewer than 80 but at least the number shown in Table 266 centre column are sent, the TDC will work correctly but under-run errors will be reported by CU.

Not withstanding the above, if the single_rclk input is asserted, then a rclk[ ] for the row currently pointed at will be generated. This rclk may be asserted in the next odd clk phase. This rclk is a single cycle of clk in width, and there is only one. There is no control over the two bits written to core in this mode.

4.5 TDC_FIFO 4.5.1 TDC FIFO IO

Table 265 TDC FIFO IO

TABLE 265

| Signal | Drn | to/from | Description |
|---|---|---|---|
| fifo_di[1:0] | in | from: tdc | Fifo data in |
| fifo_do[1:0] | out | to: tdc | Fifo data out |
| fifo_clk | in | from: tdc | fifo clock at 144 MHz. This clock is generated as a burst clock in the tdc module. |

4.5.2 TDC FIFO Functionality

To allow the printheads to abut seamlessly there is a section at the far left of the core where a triangular group of nozzles, some from each row, is shifted down. This increases the linear distance between consecutive nozzles in the same logical row across the join, allowing simpler ink sealing between the printhead and the ink distribution system. It will be appreciated that the size and shape of the dropped rows is arbitrary, but that making them triangular and minimal in size has the desirable impact of reducing the amount of memory required to hold the data in the dropped rows.

The number of nozzles in the dropped triangle differs for each row and is shown in Table 266. These nozzles will fire 10 fire cycles after the rest of the row, resulting in ink being aligned on paper with the main part of the row. To facilitate this the bits to be delayed are written to a fifo called tdc_fifo. This delays those bits by 10 rows.

As the core shift registers are intrinsically 2 bits wide, the fifo is made 2 bits also, and is clocked at the same rate as the row shift regsiters, 144 MHz. We have chosen to clock both fifo rows with a common clock for implementation reasons. This requires us to add a few extra locations to the fifo if the number of fifo location is odd for a particular row.

320 row clocks are generated to load a complete core row. The fifo is clocked for a variable number of clocks at the start of a row, as shown in Table 266.

TABLE 266

| Row | triangle rows Nozzles in drop triangle | FIFO clocks at start of row |
|---|---|---|
| 0 | 4 | 2 |
| 1 | 6 | 3 |
| 2 | 12 | 6 |
| 3 | 14 | 7 |
| 4 | 20 | 10 |
| 5 | 22 | 11 |
| 6 | 28 | 14 |
| 7 | 30 | 15 |
| 8 | 36 | 18 |
| 9 | 38 | 19 |
| Subtotal | 210 | |

The triangle is dropped 10 rows, so there are 2100 flip flops required in he TDC_fifo. This must be shaped as 2×1050.

4.5.3 TDC FIFO Implementation

The TDC_fifo is implemented as a hard macro to minimize area requirements.

A verilog netlist is written using instantiated custom-made flip flops. The flipflop used is the same as that used in the shift register. It is optimized for size, being around one third of a standard TSMC flipflop in size. It has limited drive and requires both clock and clock_bar to operate.

The design uses a repeating set of 8 columns, where data weaves up and down, one pair to the left and one pair to the right. These two columns are connected at the lower left to form a 2 bit wide shift register. Inputs and outputs are all at the lower right hand corner.

This implementation yields a synchronous IO referenced to a local clock, and also allows regular clock buffering along the die. Spice is used to verify setup and hold times are met everywhere.

The gated clock is chosen for power reasons. This clock is generated in the TDC using a 288 MHz clock. The TDC fifo can stream data at 144 MHz and has a delay of 1050 (for a 10 row printhead) clocks. The fifo is rising edge clock triggered.

4.5.4 Timing

The TDC fifo has a latency of 1050 clocks.

4.6 FPG 4.6.1 FPG IO

Table 267 fpg IO

TABLE 267

| Signal | Drn | To/From | Description |
|---|---|---|---|
| wclk | in | from: CU | clock |
| ld_n | in | from CU | assertion of this signal triggers firing |
| done | our | to CU | indicates that all nozzles have been fired. |
| columnsr_clk | out | to core | shift clock for the column shift registers |
| columnsr_di | out | to core | data for column shift register |
| fire_enable | in | from: CU | resets/disable the profile generators.synchronously |
| di[7:0] | in | from: CU | register write data bus |
| fpr_addr[2:0] | in | from: CU | register address bus |
| fpr_valid | in | from: CU | register write valid |
| do | out | to: CU | readback bit serial data from register addressed by readback register |
| pr[9:0] | out | to: core | row profiles |
| reseti_n | in | from: IO | deasserts pr[ ] outputs while low. |
| Reset_n | in | from: CU | reset at power on. Resets the enable register to 0. |

4.6.2 FPG Functionality

Figure 387:
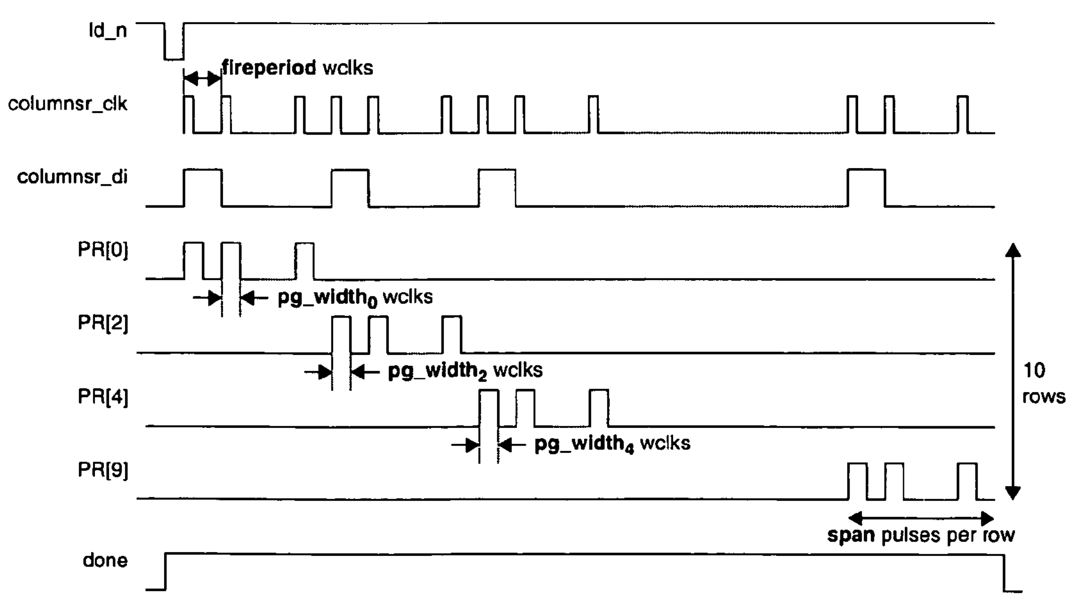
FIG. 387. FPG Outputs (vposition=0)
Figure 388:
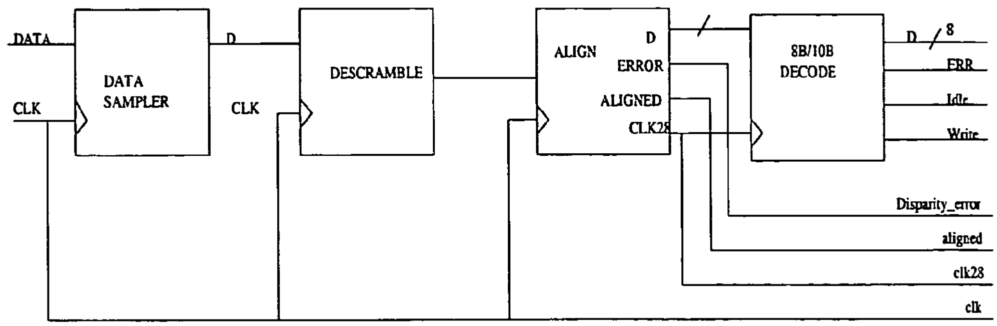
FIG. 388. DEX block diagram

The FPG controls the firing order and pulse widths of the nozzles to print a complete line of dots. FIG. 387 shows the sequence of outputs produced for each line.

FPG operation is triggered by the (active low) assertion of Id_n. The FPG start generating column_sr clocks, which are once wclk pulse wide, and with a period of FIREPERIOD. Within each columnsr_clk period, one of the 10 row PR (profile) signal is asserted, with a pulse width determined by PG_WIDTH for that row. At the start of each row, columnsr_di is set to 1 for one columnsr_clk period, the 0 for the next SPAN-1 column_srclks. This sends a walking one across the column shift register, with a PR assertion for each position of the 1 in the column shift register. After SPAN columnsr clks, all of the unit cells in a row have had exactly one PR pulse overlapped with a column fire enable, so all nozzles that should be fired have been fired for that row.

After finishing one row, the FPG moves onto the next row, in the order described in the databook. Once all 10 rows have been fired in this way, the FPG asserts done_n to the CU, and stops.

Fire_enable is a synchronous enable signal from the CU. It terminates the waveform generation when deasserted. This is used to ensure that no nozzles can be fired at dangerous time, for example while the PG_WIDTH registers are being updated. A new Id_n will restart the cycle from the beginning.

Reseti_n clamps the enables to 0 when asserted. Reset_n resets the enable register.

4.6.2.1 Register Access

The following registers lie within the FPG: ENABLE, FIRE_PERIOD, PULSE_PROFILE, VPOSITION, and SPAN.

Regsiters are written one byte at a time by the CU, by asserting fpr_valid, with a register address on fpr_addr, and data on di. For registers more than one byte wide, data on di is loaded into the most significant byte of the register, and the remaining register contents shifted right 8 bits.

Registers are read one bit at a time by the CU. The CU programms the FPG internal register READBACK, which specifies which bit of which register should appear on the do signal.

4.6.2.2 Counters

There is a 16 bit fire counter, which loads the current FIREPERIOD, or whenever the columnsr_clk output is asserted. This counter then decrements on wclk until it reaches a count of zero. This signal is named counter_tc. The columnsr_clk period from posedge to posedge is the number of wclk periods programmed into FIREPERIOD. This is valid for values between 2 and 0xffff inclusive. 0 and 1 wrap around to a large delay, and should not be used.

There is an 8 bit profile counter, loaded from the PG_WIDTH field of the appropriate row (from the PULSE_PROFILE register), whenever the columnsr_clk output is asserted. This counter also decrements on wclk until it reaches zero. While the profile counter is non-zero, one of the 10 PR outputs is asserted.

When both the fire and profile counters are zero, the columnsr_clk is pulsed, and the counters are reload. Note that if any PG_WIDTH register is programmed with a larger value than the FIREPERIOD, the time take to fire the complete row will be PG_WIDTH*SPAN, rather than FIREPERIOD*SPAN. This will generally lead to imperfect dot placement.

There is a 10-bit span counter, which is loaded from SPAN when Id_n is asserted. This counter decrements each time columnsr_clk is asserted. When this counter reaches zero, the FPG moves onto a new row, selecting a new PG_WIDTH register to load into profile counter, and asserting a new PR output. The span counter is then reloaded from SPAN, and the sequence repeats for the new row.

4.6.2.3 Loading ColumnSR

The FPG has to load the ColumnSR; On reset, or whenever the span register changes, the complete columnSR is preloaded with a 1000 . . . 01 pattern, where there are span-1 0's between every 1. Once it has been preloaded, for normal operation, the ColumnSR is returned to its initialized state each time a new row is started, by inserting a 1 with the first columnsr_clk, and a 0 with subsequent clocks for the row.

As well, in the event of a premature termination of the fire cycle due to a SoPEC miscalculation (i.e. a new fire command), the FPG must hold off fire, issuing a pattern and columnsr_clk at the maximum possible rate of 1010 at 144 MHz bit rate, 72 MHz effective rate, until the pattern in the columnSR is aligned for a new fire cycle to commence.

4.6.2.4 Row Order and VPOSITION

The default row firing order is 0, 2, 4, 6, 8, 1, 3, 5, 7. To support fire micro positioning, the state machine in the FPG can start at the row in the VPOSITION register and proceed for 10 rows from there. This does not affect the columnSR or pulse sequencing above.

4.7 DEX 4.7.1 DEX Functionality

The Data extractor consists of 4 submodules.

The sampler samples serial data presented to the chip at an optimum eye point. The descrambler module then optionally descrambles bit serial data. The aligner module locates 10 bit symbol boundaries and deserializes that data. The decode_10b8b module decodes that data to the original 8 bit value, or an idle or write symbol as appropriate.

The submodules will be described individually.

The DEX top level wrapper is written in structural verilog.

4.7.2 DEX IO

Table 268 DEX IO

TABLE 268

| Signal | direction | to/from | Description |
|---|---|---|---|
| clk | In | from: IO | 288 MHz input clock |
| reset_n | In | from: CU | async reset |
| clk28 | Out | To: CU | a symbol clock for CU |
| phi9 | Out | to: CU, TDC | true in the last clk period of the clk28 period. |
| datai | In | from: IO | 288 mhz serial data input. No phase relationship to clk is assumed, but is the same frequency. |
| scramble_en | In | From: CU | when high, enables the descrambler. |
| dout[7:0] | Out | To: CU | decoded output data - valid for legal 10b data symbols. |
| W | Out | To: CU | a write symbol has been received. |
| I | Out | To: CU | an idle symbol has been received. |
| disparity_error | Out | To: CU | a disparity error has been detected. |
| aligned | Out | To: CU | The aligner state machine is in alignment. |
| badchar | Out | To: CU | The current 10b symbol is definitely invalid. |

4.7.3 DEX Timing 4.7.3.1 Sampler

In the presence of no input jitter the sampler will work immediately reset is deasserted. The sampler takes 8 uS to update the sample point one tap. At worst with 0.5 UI input jitter and worst case initial phase, the sampler has to move ¼ UI or 5 ticks at nominal process to be stable. In fast process 7 ticks could be required. This takes 56 uS of elapsed time. Correct operation will start before this, depending on the jitter distribution function.

The sampler has a delay of 6.4+/−4 ns+1 clk cycle.

At nominal process and with datai aligned with clk, the sampler has a delay of 3 clk cycles.

4.7.3.2 Aligner

The aligner takes 4.9 uS to declare alignment on a data stream with no bit errors and available comma characters.

4.7.3.3 Data

Delay from end last bit of a character presented at datai to end symbol detection is 22 clk cycles. clk28 rising edge is coincident with changing data.

4.7.3.4 Disparity_Error

A disparity error will be presented in the same symbol cycle as the detected violating symbol. This may be later than the character with the bit error in some circumstances.

As an example of this condition, consider an initial negative running disparity. The next symbol has a 0 hit to 1 bit error in an otherwise 0 disparity symbol. This will not be detected as an error as it is a legal change. It will change the receiver RD to + however. The next non-zero disparity character will be sent as +2, which will cause a disparity error to be flagged.

4.7.4 DEX Open Issues

None.

4.7.5 Sampler 4.7.5.1 Sampler IO

Table 269 Sampler IO

TABLE 269

| Signal | Direction | to/from | Description |
|---|---|---|---|
| clk | in | from: IO | 288 MHz clock |
| datao | out | to: descrambler | 288 MHz sampled data |
| reset_n | in | from: CU | asynchronous reset |

TABLE 269-continued

| Signal | Direction | to/from | Description |
|---|---|---|---|
| dmux_d1 | in | from: datamux | tapped delay data |
| dmux_d2 | in | from datamux | tapped delay second data selector |
| muxsel1[5:0] | out | to: datamux | delay selection for dmux_d1 |
| muxsel2[5:0] | out | to: datamux | delay selector for dmux_d2 |
| tmmux[5:0] | out | to: datamux | test mode: delay line disable |
| datai | in | from: IO | test mode: scan in |
| sen | in | from: CU | test mode: Shift Enable |
| so | out | to: CU | test mode: scan output data |

4.7.5.2 Sampler Functionality

Figure 389:
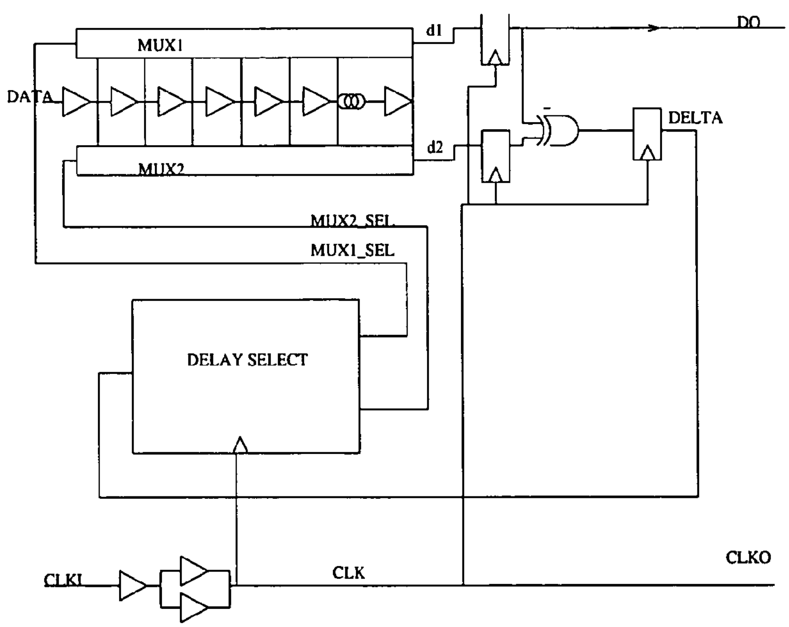
FIG. 389. Data sampler
Figure 390:
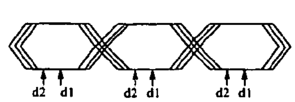
FIG. 390. Data Eye
Figure 391:
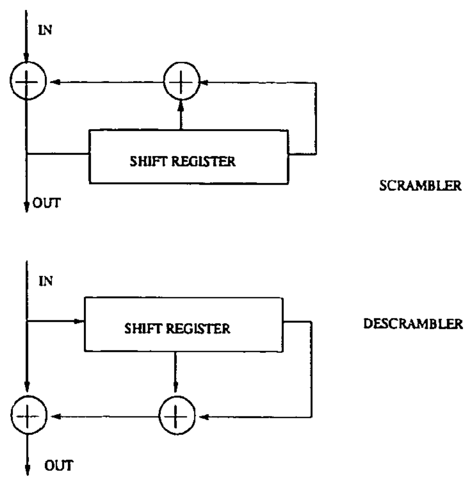
FIG. 391. scrambler/descrambler
Figure 392:
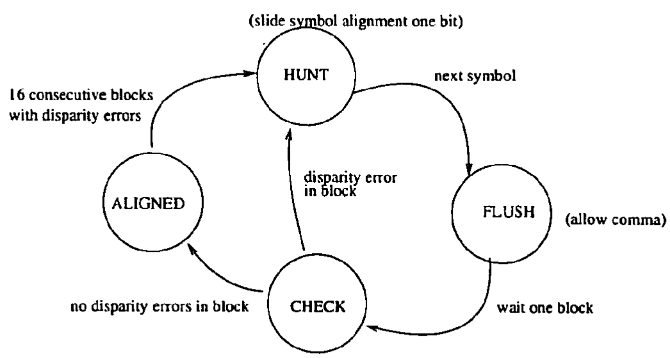
FIG. 392. Aligner state machine

The data sampler has the following functional block diagram, FIGS. 389 and 390, respectively, while the algorithm used is as follows.

7. set mux1 sel to midrange value
8. set mux2 sel=mux1 sel
9. decrement mux2 sel
10. check that DELTA=0 (see note 1). If DELTA=1 then the d1 sample point must be bad increment mux1 sel and mux2 sel, then repeat.
11. (look for leading edge of eye) decrement mux2 sel
12. if DELTA=0 and mux2 sel!=0, goto step 5
13. remember mux2low=mux2 sel
14. set mux2 sel=mux1 sel
15. (look for trailing edge of eye) increment mux2 sel
16. if DELTA=0 and mux2 sel!=max, goto step 9
17. set mux2high=mux2 sel
18. if $$mux1\ sel > \frac{mux2high - mux2low}{2}$$

then decrement mux1sel 19. else if $$mux1\ sel < \frac{mux2high - mux2low}{2}$$

then increment mux1sel 20. goto step 2

Notes:

1. Here DELTA=0 implies that the two sampled data points are the same. The 8B/10B code used has a maximum RLL of 10. This should be multiplied by a factor relating to the quantity of noise on the data edge. 32 is an initial estimate. This time could be cut short (for faster alignment) if DELTA ever gets non-zero, but this is not a particularly useful optimization as the scan is from centre out, where samples match.
2. The d1 selector should not get too close to the ends. It seems sufficient to limit its time excursions to between ⅛ and ⅞ of the delay line. If C1 gets outside that desired range, then it can be forcibly reset. If the lower limit is reached, it gets reset to the middle value. If the upper limit is reached, then just inside the lower limit due to step [1] above.
3. This design can handle an extremely slow clock, one with no edges in the delay line. In this case, the leading edge search and the trailing edge search both register at their limit values, and d1 hunts to the centre value, which is stable.
4. The design can handle a single edge in the buffer. This presumably would occur also in test at a slow clock rate. The delay selector will stabilize at a value midway between the edge and the further limit.

The sampler is written as synthesizeable RTL verilog. It uses a separate module datamux, which is a tapped delay line hard macro. Structurally the delay line is in a separate hierarchy tree to the sampler for layout flow reasons.

4.7.5.3 Sampler Test Modes

The sampler is principally tested using full scan. Coverage from functional vectors proved quite inadequate. The sampler also provides support for testing the datamux with a scannable register capable of disabling a specific tap in the datamux delay line.

4.7.6 Datamux 4.7.6.1 Datamux IO

Table 270 Datamux IO

TABLE 270

| Signal | Drn | to/from | Description |
|---|---|---|---|
| datai | in | from: sampler | serial data input |
| dmux_d1 | out | to: sampler | data out delayed by n*(200+/−100)ps, n is the value on muxsel1 |
| dmux_d2 | out | to: sampler | data out delayed by n*(200+/−100)ps, n is the value on muxsel2 |
| muxsel1[5:0] | in | from: sampler | delay selection for dmux_d1 |
| muxsel2[5:0] | in | from: sampler | delay selection for dmux_d2 |
| reset_n | in | from: CU | resets ripple counter. |
| tmmux | in | from: CU | test mode: enables tmmux delay line break logic. |
| tm | in | from: CU | test Mode: enable tmmux break logic |
| tmcen | in | from: CU | test mode: enable delay line oscillation mode. |
| Tco | out | to: CU | test mode: divide by 16 of delay line. |

4.7.6.2 Datamux Functionality

The Datamux is a dual output combinatorial tapped delay line.

The sampler is specified to operate with a 50% data eye. Having 4 steps within this should be sufficient to achieve this. 4 steps is required at slowest process—so likely to be the order of 8 steps in 50%—or 16 steps per cycle, or 32 steps total at fast process. (This assumes 2:1 spread from slow corner to fast corner, no required frequency range of operation, and no accuracy issues in getting the desired delay. Probably a further double would be of use in achieving this. Desired delay is then 430 ps at slow or 215 ps at fast corner, nominal around 330 ps. 200 ps was used for the simulation and 64 taps.

The datamux is written in structural verilog and uses a behavioural delay element DATADEL, with 200 ps delay.

WIthin the chip datadel is implemented as a regular hard macro to ensure all taps are monotonic and eliminate issues with random P+R delays. The delay element is radioed and spiced to ensure differences between rise time and fall time are less than 5% of a cycle at the most problematic process corner.

The two halves of the delay line must match to better than 50% of a tap difference.

Investigation shows that achieving good test coverage on the datamux is difficult. As a result there are two test related additions to the basic design shown in the top left of FIG. 389.

Firstly the delay element buffer is replaced with an and gate, and a 6:64 enable-able decoder is added. This allows scan based testing to selectively break the buffer tree and hence provide fault coverage of the mux tree addressing logic.

Secondly a programmable loop is introduced into the design, from the main data output via an inverter and mux back into the delayline data input. A ripple counter dividing by 16 is introduced and made accessible by the CU to the DO pin. This allows the tester to select the delay line tap and measure the resultant output frequency. By performing this step on different taps, the per-tap delay can be measured for design qualification purposes.

4.7.7 Descrambler 4.7.7.1 Descrambler IO

TABLE 271

| Signal | Direction | To/From | Description |
|---|---|---|---|
| Datai | in | From: sampler | input serial data |
| datao | out | to: aligner | output serial data |
| Clk | in | from: IO | bit clock |
| scramble_en | in | from: CU | enable descrambler |

Table 271 Descrambler IO 4.7.7.2 Descrambler Functionality

The printhead can spend significant periods accepting repeated idle symbols at end of line, when printing slowly, or between pages. It may also see a lot of consecutive whitespace on a text page. Under these conditions the EMI spectrum of the 8b 10b can become an issue. Scrambling the data is one way of spreading the spectrum, and hence reducing the amplitude of the peaks. Notice that this influences radiation from the data leads only. The clock line and the power buses are a separate issue. The external clock perhaps could be eliminated from a later version of the printhead incorporating clock recovery circuitry however.

The data flow to the printhead is essentially unidirectional, and training sequences are impractical. As such a self synchronizing scrambler/descrambler seems the appropriate solution. Such a stage can be implemented as follows:

The descrambler has an effect on error multiplication in the event of bit errors. Looking at the descrambler block diagram, a single line bit error will be seen multiple times, once on the data bit applied, and once for each tap. The exact timing for the subsequent bit errors will also be constrained by the shift register taps, which come straight from the polynomial powers chosen for the maximal-length PRBS used.

To ensure that a single line bit error remains constrained to a single bit error per symbol, tap spacing should be equal or greater to the number of bits in a symbol, or 10.

Choosing the polynomial $x^{28}+x^{15}+1$ requires slightly more area than might initially be considered desirable, but it eliminates error multiplication within a symbol. This does not then restrict the behaviour of the 8B10B code disparity.

The descrambler is coded in synthesizeable verilog RTL.

The descrambler is enabled by default, but can be disabled to assist in some test mode operations that require local looping.

4.7.8 Aligner 4.7.8.1 Aligner IO

Table 272 Aligner IO

TABLE 272

| Signal | Drn | To/From | Description |
|---|---|---|---|
| clk | in | from: IO | bit clock |
| reset_n | in | from: CU | synchronized reset |
| din | in | from: descrambler | input serial 10B data |
| phi9 | out | to: tdc, CU | true in the last clk phase of clk28 |
| clk28 | out | to: CU, decode_10b8b | symbol clock |
| outdata[9:0] | out | to: decode_8b10 | output aligned 10B parallel data |
| aligned | out | to: CU | does the decoder consider itself aligned? |
| disparity_error | out | to: CU | a disparity error is currently detected |
| Tm | in | from: CU | Test mode: - do not attempt to realign. Disable aligned. |

4.7.8.2 Aligner Functionality

The function of the aligner is to deserialize the incoming data and present it as parallel symbols to the following stage. It does this by monitoring for comma characters and also by checking running disparity.

The aligner guesses an initial alignment, and changes it if it sees sufficient errors. It can lock quickly in the presence of comma characters (one comma for any 2 adjacent idles) or more slowly based on disparity.

It also generates a symbol clock, clk28.

The alignment state machine proposed is designed to be tolerant to bit errors. When the comma character was 7 bits long simulation indicates there is a probability of around 2% that a bit error in a data symbol can cause a comma string. As comma is now 12 bits long this probability should now be of the order. 1% The alignment module must be resistant to such errors.

The algorithm chosen is as follows.

The aligner state machine has 4 states.

The Hunt state is used to explicitly change the alignment phase. In this state the aligner spends 11 clk cycles in a single symbol. The aligner spends 11 clk cycles in the Hunt state.

The Flush state is principally used for disparity based alignment. It is intended to allow prior running disparity errors to flush from the system before using running disparity to decide whether the currently chosen alignment is good. In the absence of comma characters, the system spends 15 symbol periods in the Flush state, then moves to Check.

Flush state is the only state where a comma character causes the aligner to realign. In Flush, receipt of a comma will immediately adjust the phase to correctly match the comma. A comma received while in Flush state which arrives with the correct phase will cause the aligner to advance to Check state at the next symbol time.

Check state monitors blocks of 16 symbols when aligning based on disparity. A counter monitors the number of un-disparity-errored blocks that are received. When the block counter reaches 6 or more, the state machine transitions to the Aligned state. Any disparity error causes the state machine to transition to Hunt state. A comma received with the correct phase while in the Check state advances the block count by 2. [There is a 1/16 chance that could cause a error free block increment to be missed.] A comma received with incorrect phase will cause an immediate transition to Hunt state.

The Aligned state also maintains a errored block (of 16 symbols) counter. If the count of errored blocks reaches 8 or more, the state machine goes to Hunt state. This errored block counter is incremented by receiving a block containing disparity error(s). It is decremented by receiving a block with no disparity error(s). It is incremented by 3 by any comma symbol received with bad phase alignment.

The aligned output is asserted only when in the aligned state.

The aligner is coded in synthesizeable verilog RTL.

4.7.10 DECODE_10B8B 4.7.10.1 Decode IO

Table 273 10B8B Decoder IO

TABLE 273

| Signal | Drn | to/from | Description |
|---|---|---|---|
| din[9:0] | in | from: aligner | input serial data |
| symbolclk | in | from: aligner | 28.8 mhz clock (clk28) |
| reset_n | in | from: CU | asynchronous reset, initializes running disparity |
| dout[7:0] | out | to: CU | decoded output data |
| W | out | to: CU | symbol was write |
| I | out | to: CU | symbol was idle |
| badchar | out | to: CU | illegal symbol received |

4.7.10.2 Decode Functionality

Figure 393:
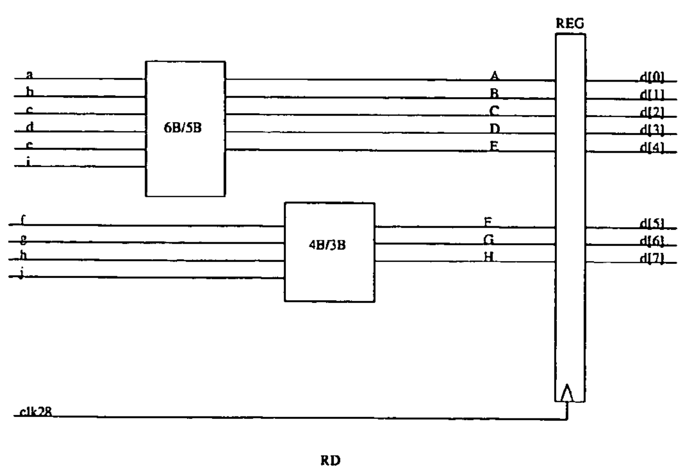
FIG. 393. Disparity decoder

The decoder is built out of two submodules, which decode the 6B and 4B parts of the word separately. The pipeline delay of this stage is a single symbol clock cycle. The stage implementation is shown in FIG. 393. The decoder is coded in synthesizeable verilog RTL.

4.8 CU 4.8.1 CU IO

Table 274 CU IO

TABLE 274

| Signal | Class | Drn | From/to | Description |
|---|---|---|---|---|
| clk | clk | In | from IO | clk is the 288 MHz clock input from IO |
| wclk | clk | out | to: fpg | wclk is usually a divided clock from clk. It runs forever, except that it is resynchronized, and tweaked during a write. Whatever the wclk divider is set to, wclk is held low for the first half of the last symbol of a write command, once the write is validated, then goes true for a single clk period in clkphase 5. It will then be asserted in clkphase0 of the following symbol, and then as per the divide ratio. There is no attempt to make wclk a 50% mark-space clock. |
| clk28 | clk | In | from: DEX | symbol clock |
| phi9 | clk | In | from: DEX | strobe used to synchronize clk to clk28 |
| cudata[7:0] | cmd | Out | to: tdc, fpg | This is a common data bus to some post-CU modules. It is usually just the dout bus passed through from DEX, delayed a symbol time to give CU time to generate the appropriate qualifying signals. In test modes this databus will be used for other things. For readback, the address is output via this register for fpg, but not core. |
| fpg_valid | cmd | Out | to: fpg | This qualifier for fpg_addr and cudata, is asserted for writes to registers in the FPG.. |
| fpg_addr[2:0] | cmd | Out | to: fpg | addresses various registers in fpg |
| data_valid | cmd | Out | to; TDC | This output is a qualifier for cudata. It will be asserted for bytes written that are not Write or Idle symbols. It will be asserted for symbols with disparity or bad decodes. There is no current attempt to remap the data byte in this case to something safer. It will no longer be asserted after the 80th write to the current row. |
| din[7:0] W I disparity_error | cmd | In | from: DEX | This is the bytewide databus out of DEX. It is validated somewhat by the |

TABLE 274-continued

| Signal | Class | Drn | From/to | Description |
|---|---|---|---|---|
| badchar, clk28 | | | | disparity__error and badchar outputs. Detection of Write and idle symbols also override dout. CU has a state machine that looks for W, A, Abar and initiates a write to the appropriate place on that event being correctly received. An idle symbol or symbols may be received at any time. This is considered normal. |
| ld__n | cmd | Out | To FPG | ld__n initiates a fire cycle. ld__n is asserted for one wclk after receiving a write command to the fire virtual register. It happens immediately (one symbol time) after the fire period is written. ld2__n was considered to be matched delay for ld__n for the ColumnSR fragment. But fire__period is being written immediately ahead of ld__n, so there are no issues with ld__n being early to the latter art of the ColumnSR Indeed skewing into columnsr__clk would be a bad thing. So ld2__n may as well be the same signal as ld__n |
| newrow | port | Out | to: TDC | This output is asserted after the row register is changed. It is used to restart the TDC triangle logic. It is not necessary to assert it after a fire, which resets the row register to maxcount, but as the row counter is set to maxcount also no bytes can be written through CU. |
| row[3:0] | port | Out | to: core, tdc | This is the output of the row register, which is contained in CU. It is used to select the core row for either write or read. This is a common bus from the same register, as reads and writes cannot be mixed to these shift registers. |
| scramble__en | port | Out | To: DEX | This signal enables the descrambler. This need for the control of this feature is unclear, so for now it is just nailed active. |
| tdc__bypass | port | Out | to: TDC | Disables the TDC fifo delay compensation. |
| aligned | rdb | In | From: DEX | This state signal from dex is peak detected in CU and returned as an error bit. Aligned ever going inactive is the error state. |
| do doen | rdb | Out | to IO | Together these two signals are the chip output. The chip may be in tristate or open-drain mode. tristate is only currently used in test mode, at all other times it is open-drain. In tristate mode, doen is asserted when read__active is true and the output data bit receives the data bit addressed by the current readaddress: bitaddress combination. Meaning it is multiplexed combinatorially from he various module readback signals, or from state within the CU. In open-drain mode, do is driven as per tristate-mode, and doen is asserted when do==0, and read__active is true. Read__active is only asserted between a read command and a read-done command. |
| done__n | rdb | In | From: fpg | This signal from fpg indicates whether the current fire period is complete. If another fire command comes along while this signal is still asserted, then the premature error bit will be asserted. |
| fpg__do | rdb | In | From fpg | This is the read a data from an FPG register. It is sent to do if an fpg register is selected for readback. The bit is selected via a adr__valid qualified write. For the current implementation readback is possible at any time. |
| core__do[1:0] | rdb | In | from: core | The 2 bit output of the core row shift registers. These have been multiplexed by row[3:0]. They get sent back to DO as |

TABLE 274-continued

| Signal | Class | Drn | From/to | Description |
|---|---|---|---|---|
| | | | | addressed by the appropriate selector address bits and the right read address. |
| single_rclk | rdb | Out | to: tdc | This signal generates a single row clk to the currently addressed row for core data readback. Generated every second read_next event. |
| fire_enable | reset | Out | to fpg | This signal is deasserted if a write to profiles is underway, or if profiles are not yet written. a profile write is considered to start when a write to profile address happens. It is considered terminated when a write to somewhere else happens. |
| reset_n | reset | Out | to: fpg, dex | asserted synchronously after reseti is asserted for 3 clks. reset for some internal logic, and all important ports. See Databook for details. reset_n to fpg only is also asserted when smoke mode is entered for a wclk cycle. |
| Reseti_n | reset | In | from: IO | reseti_n is the reset input from the io pad. It gets used to produce a combinatorial disable of fire (by fire_enable) and also a synchronized reset_n for the ports and other logic. The synchronized reset must be asserted for 3 clks to be active. Note clk is externally supplied. This is intended to stop a glitch on reseti_n changing internal state of the printhead, but still ensuring fire is disabled in the absence of a clk at initial power up. |

4.8.2 CU Functionality

The CU might stand for control unit. It holds all the poorly defined logic that had no clearly defined other functional home. Clutter is other possible name. Others may fit also.

CU maintains a modicum of internal state, for reads, and to inhibit fire when profiles (for example) are being written.

It also implements the address check functionality on commands from the host via the DEX, and requests other modules as appropriate to do something useful. As such it will be defined here principally by its IO.

CU also filters the reset input to remove where possible susceptibility to ground bounce or glitches. There is no guarantee at power up that a clock is present, so it is important to ensure that enabling the MEMS actuators is unconditionally disabled by reseti independent of internal state or clock presence. Resetting registers and the DEX can wait for clk to start.

4.8.3 CU Stateful Things

The signals in the IO list for the CU are divided into a number of categories. These are:

clk—signals related to clocks.

cmd—signals related to commands and data received from the host.

port bits residing in CU rdb—readback related signals, including status bits.

reset—signals related to reset.

A state machine tracks the input stream from SoPEC, with 4 states (idle, got_write, got_addr1 and data). These states, and their state transition inputs, are used by much of the remaining logic.

Cu maintains the core row address.

CU maintains the readback bit address, writing it to other modules as required. CU also maintains the readback register address and performs multiplexing of readback data.

CU implements the unprotection logic for important ports.

CU maintains the status flags, remembering past errors until told to restart.

CU has access to two read only 'registers', mems_version_reg and cmos_version_reg. These structures are just bytes, implemented in such a way that a change in any mask can be used to change the version number. They are via stacks from poly all the way up to M4, selecting the output bit to be either Vdd or gnd. They need to be hardmacs to prevent optimization away.

CU implements reset logic. An external reset must be present for 3 consecutive clk cycles to be effected. Reseti_n present will however combinatorially disable fire.

wclk is generated for FPG. This clock is nominally a divided clk (see Section 20 on page 44) however when an access to the module happens, wclk has a single edge in the module for sampling cudata. Wclk is also re synchronized following the access.

There is a single symbol delay on cudata always.

4.8.4 CU Command State Machine

Figure 394:
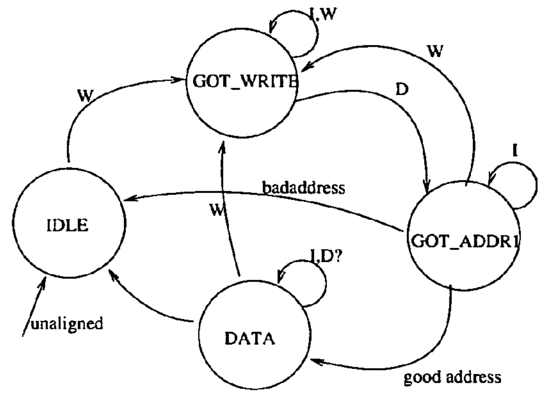
FIG. 394. CU command state machine

FIG. 394 shows the main transitions the CU command state machine can take.

Whenever the DEX is unaligned, the SM is forced idle. This is also important as the clk28 width can be unpredictable while idle.

The normal flow is:

On receipt of a write symbol, to got_write

- a data character with correct chip id and parity, to got_addr1. Anything wrong will the data character will result in a return to idle state.
- a second address byte (data character) constructed as required causes a transition to the data phase. Any error in this character transitions to idle. A write symbol aborts with a transition to got write.

The time the state machine spends in the data phase depends on the address. Addresses without data (eg unprotect) spend a single symbol period in the data state before returning to idle. A fire command stays in the data phase until 2 data symbols are received, then transitions to idle. All other states capable of writing data stay in the data phase until a write symbol comes along.

Figure 395:
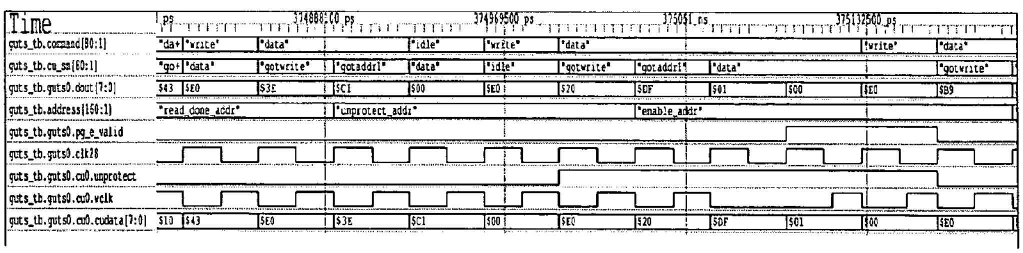
FIG. 395. Example transaction

FIG. 395 shows an example CU state machine transaction. The example shows the state of the command is the combined state of W, I and Din to CU. If data, the data is shown on the dout[7:0] bus.

cu_sm is the current_state of the CU state machine address is the symbolic content of the embedded port address pg_e_valid is the enable strobe to fpg, included as an example.

clk28 is the symbol clock, as a timing reference unprotect shows the internal flag cudata is the data out of CU to fpg (in this example). There is always a single cycle delay to cudata.

The example shows an unprotect transaction, then a single idle, then a write of 0x0001 to the enable register in fpg.

4.8.5 CU Fire Enable fire_enable is set by a write to the fire register. It is reset by a write to any of enable, test, device_id, main or pulse profile registers.

4.8.6 Row Bytes

The row byte counter is reset by a load or increment of the row address. It is jam loaded to the number of characters per row on a fire command, and is incremented on any data write to the core while it is not at its maximum count, which is the number of characters per row.

Note that a write to the core is the decode of any symbol which is neither write nor idle.

4.8.7 Row Counter

The row counter loads to the supplied value on a write to the row address register. It loads to the numerically largest row address on a fire command. It modulo increments on a data_next command as long as the current row character count is non-zero. If the Row counter is currently at the numerically largest row address the increment results in a wrap to zero.

4.8.8 fgcount

The fgcounter is used to generate a Id_n signal following a write to the fire address. This is a 2 bit counter. It is loaded with 3 early in a write to the fire period register. It is decremented each time a valid data character is written to the fire period register. When this register is at a count of 1—after 2 valid data characters are written, a Id_n cycle is generated and the cu state machine is returned to idle. This counter also decrements from 1 to 0 unconditionally, then remains at 0 until another fire command.

4.8.9 Reset

Reset is implemented as a three stage shift register, clocked by clk, shifting reset_n. reset_n is implemented synchronously whenever the last three registered reseti bits are all 0.

4.8.10 wclk wclk is programmed at rates shown in Table 279.

Wclk is synchronized by a write to FPG data registers as follows.

Figure 396:
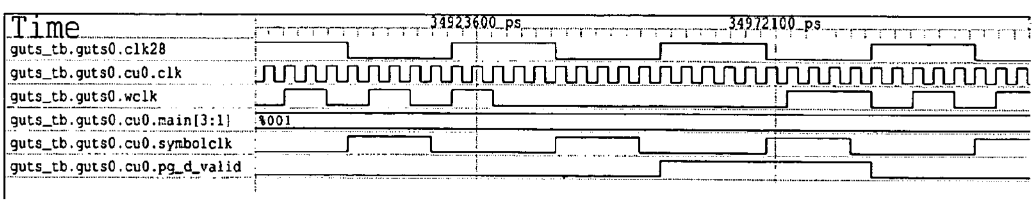
FIG. 396. clk phases
Figure 397:
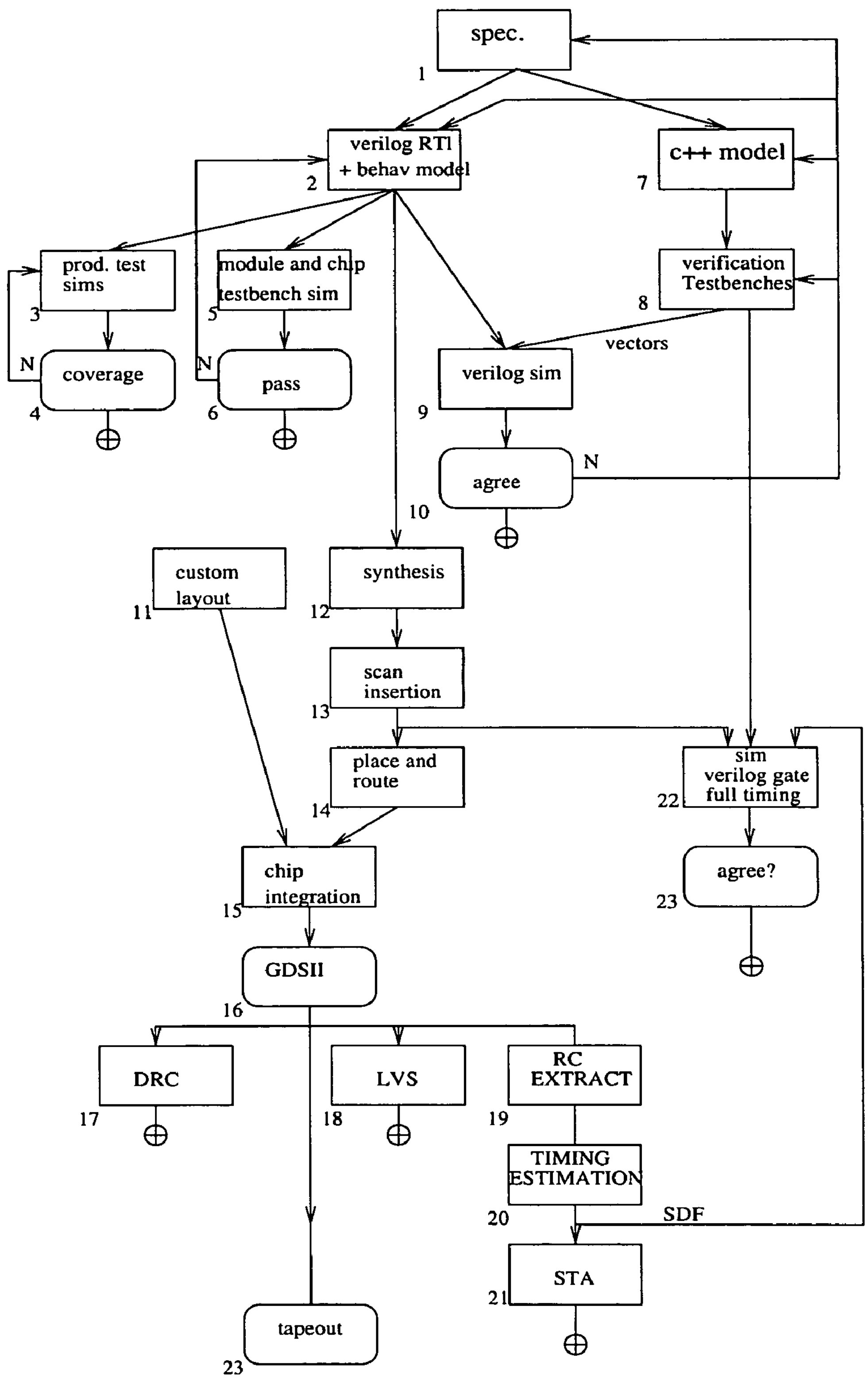
FIG. 397. Planned tool flow

The pg_d_valid strobe in FIG. 396 is placed to show wclk stopping synchronously in the symbol cycle prior to the strobe, being replaced with a mid-symbol edge for the strobe cycle then is restarted in the following symbol cycle.

4.8.11 Error Bits

All the following error bits register the error from the cycle following the error until deasserted by a write to the status register. This write requires no data symbol, just the 3 symbol header.

4.8.11.1 No Error

None of the following error bits are pending 4.8.11.2 Disparity Error

This bit indicates that a disparity error has been signalled by the DEX module.

4.8.11.3 Decode Error

The 10B8B decoder in the DEX has seen an invalid character.

4.8.11.4 Address Error

A write symbol or decode error or disparity error or parity occurred while the CU_state machine was in the got write state. Additionally while in the got_address1 state any of the preceding, or a chip_id mismatch, or an address mismatch occurred.

This error does not check that the address is a valid address for the chip.

This error does not check that the correct number of data characters are sent.

4.8.11.5 Slip Error

The aligned bit from the DEX has gone to 0.

4.8.11.6 Under Error

A data_next or write to the row_address register or fire has occurred with the row character counter at neither empty nor full condition.

4.8.11.7 Over Error

A write to the core row data was attempted with the row character counter at full.

4.8.11.8 Early Error

A fire command has been issued while the done_n bit from fpg indicates the fpg has not completed its cycle.

4.8.13 BIST

BIST module is part of CU.

Required functionality of this module includes

Implement scan by providing a counter for shift enable, and enable bits as required.

data multiplexing for scan outputs to tester 4.9 SOFT 4.9.1 SOFT IO

Table 275 Soft IO

TABLE 275

| Signal | Drn | to/from | Description |
|---|---|---|---|
| Clk | in | from: IO | 288 MHz clock |
| reseti_n | in | from: IO | async reset. |

TABLE 275-continued

| Signal | Drn | to/from | Description |
|---|---|---|---|
| cmos_ver[7:0] | in | from cmos | cmos version number |
| mems_ver[7:0] | in | from MEMS | MEMS version reg. |
| fifo_do[1:0] | in | from: TDC_FIFO | fifo data |
| core_do[1:0] | in | from Core | core readback data |
| dmux_d1 | in | from: datamux | Delayed data to sampler |
| dmux_d2 | in | from Datamux | Delayed data 2 to sampler |
| datamux_tco | in | from: datamux | datamux test clock |
| datai | in | from: IO | |
| do | out | to: IO | DO pin data |
| doen | out | to: IO | DO pin output enable |
| powerdown_n | out | to: IO | Disable LVDS IO |
| fifo_di[1:0] | out | to: TDC fifo | TDC fifo data |
| fifo_clk | out | to: TDC fifo | tdc fifo clock |
| ld_n | out | to: core | latch shiftreg data |
| tdc_do[1:0] | out | to: core | core data input |
| rclk[9:0] | out | to: core | core row shift clocks |
| columnsr_clk | out | to: core | Column SR shift clock |
| row[3:0] | out | to: core | core readback row select |
| pr[9:0] | out | to: core | core row profiles |
| muxsel1[5:0] | out | to: datamux | datamux delay selector 1 |
| muxsel2[5:0] | out | to: datamux | datamux delay selector 2 |
| tmmux[5:0] | out | to: datamux | datamux test mux |
| reset_n | out | to: datamux | datamux test clock divider reset |
| datamux_tmcen | out | to: datamux | enable datamux test clock |
| datamux_tm | out | to: datmux | enable datamux scan testmode |

4.9.2 SOFT Functionality

This module exists to wrap all synthesized modules together for digital P+R.

4.10 Guts 4.10.1 GUTS IO

Table 276 Guts IO

TABLE 276

| Signal | Drn | to/from | Description |
|---|---|---|---|
| Clk | in | to: DEX | 288 MHz clock |
| datai | in | to: DEX | 288 MHz data |
| Do | out | from CU | out data |
| doen | out | from CU | out data disable |
| powerdown_n | out | from CU | disables LVDS IO |

4.10.2 GUTS Functionality

The module guts exists solely to have a digital netlist without IO modules instantiated. This is used for verification purposes.

4.11 IOs 4.11.1 IOFunctionality

The linking printhead uses VSS, VDD, VPOS power pads, a digital input, a digital output and LVDS inputs.

The requirement for a VPOS supply pin means standard TSMC IO libraries are not sufficient. Also the standard IO cell height of 365 um results in a noticeable area penalty.

A custom IO library was purchased from Innochip to address these issues, together with the corresponding ESD requirements.

This library contains power and digital IO pads, but not the LVDS receiver. The input stage designed for Silverbrook by RAD Logic was added to a pair of ESD protected analog input pads to form the LVDS input pad.

We require the chip to operate with VDD but no VPOS for CMOS testing. This implies that the ESD test structures in the pads connect only to ground, not between rails.

5 Module Size

Table 277 Modules Size

TABLE 277

| Module | pins | ff | eqv gates | micron square | height um | width um | density | note |
|---|---|---|---|---|---|---|---|---|
| Unit cell | ~10 | | | | 79.375 | 31.75 | | |
| ColumnSR | 680 | | | | 8 | 20756 | | |
| Core | 34 | | | | 9680 | 20756 | | core is an odd shape |
| Tdc | 36 | 34 | 370 | 19,215 | | | | |
| Fifo | 5 | | | | 102 | 2160 | | |
| Fpg | 29 | 336 | 4,155 | 216,072 | | | | |
| Fpg | 17 | 46 | 523 | 27,195 | | | | |
| dex | 17 | 147 | 2,284 | 118,860 | | | | |
| sampler | 4 | 49 | 785 | 40,862 | | | | not including datamux |
| datamux | 15 | 0 | 383 | 19.915 | 37.5 | 627 | | |
| descrambler | 5 | 28 | 186 | 9,660 | | | | |
| aligner | 16 | 59 | 664 | 34,510 | | | | |
| decoder_10b8b | 23 | 11 | 266 | 13,860 | | | | |
| Cu | 53 | 78 | 1,114 | 57,960 | | | | |
| bist | | | | | | | | |
| guts | | | | | | | | |
| io_out | 2 | | | | 235 | 135 | | |
| lo_in | 1 | | | | 235 | 135 | | |
| lo_lvds | 1 | | | | | 135 | | |

6 Implementation Technologies 6.1 Process

The chip is fabricated with TSMC using a 0.35 micron 3V/5V process.

The chip is singulated by etching as an extension of the processing for the ink channels and connecting the nozzle front etch to the back etch.

MEMS structures are not covered in this document.

2 Temperature Sensing 2.1 Basic Printhead Structure and Operation

A Memjet printhead chip consists of an array of MEMs ejection devices (typically heaters), each with associated drive logic implemented in CMOS. Together the ejection device and the drive logic comprise a "unit cell". Global control logic accepts data for a line to be printed in the form of a stream of fire bits, one bit per device. The fire bits are shifted into the array via a shift register. When each unit cell has the correct fire data bit, the control logic initiates a firing sequence, in which each ejection device is fired if its corresponding fire bit is a 1, and not fired if its corresponding fire bit is a 0.

2.2 Temperature Effects

Ejection devices can suffer damage over time, due to latent manufacturing defects temporary environment conditions (such as depriming or temporary blockage)

permanent environment conditions (permanent blockage)

Generally the damage is associated with the device getting excessively hot.

As the devices rely on self-cooling to operate correctly, there is a vicious cycle: a hot device is likely to malfunction (e.g. to deprime, or fail to eject a drop when fired), and a malfunctioning device is likely to become hot. Also, a malfunctioning device can generate heat that flows to adjacent (good) devices, causing them to overheat and malfunction. Damaged or malfunctioning ejection devices (heaters) generally also exhibit a variation in the resistivity of the heater material.

Continued operation of a device at excess temperature can cause permanent damage, including permanent total failure.

Therefore it is useful to detect temperature, and/or conditions that may lead to excess temperature, and use this information to temporarily or permanently suppress the firing operation of a device or devices. Temporarily suppressing firing is intended to allow a device to cool, and/or another adverse condition such as depriming to clear, so that the device can subsequently resume correct firing. Permanently suppressing firing stops a damaged device from generating heat that affects adjacent devices.

2.3 Options for Sensing

The basis of the temperature (or other) detection is the variation of a measurable parameter with respect to a threshold. This provides a binary measurement result per sensor—a negative result indicates a safe condition for firing, a positive result indicates that the temperature has exceeded a first threshold which is a potentially dangerous condition for firing. The threshold can be made variable via the control logic, to allow calibration.

A direct thermal sensor would include a sensing device with a known temperature variation co-efficient; there are many well-known techniques in this area. Alternatively we can detect a change in the ejection device parameters (e.g. resistivity) directly, without it necessarily being attributable to temperature.

Temperature sensing is possible using either a MEMs sensing device as part of the MEMs heater structure, or a CMOS sensing device included in the drive logic adjacent to the MEMs heater.

Depending on requirements, a sensing device can be provided for every unit cell, or a sensing device per group (2, 4, 8 etc.) of cells. This depends on the size and complexity of the sensing device, the accuracy of the sensing device, and on the thermal characteristics of the printhead structure.

2.4 Using the Sensing Results

As mentioned, the sensing devices give a positive or negative result per cell or group of cells. There are a number of ways to use this data to suppress firing.

In the simplest case, firing is suppressed directly in the unit cell driving logic, based on the most recent sensing result for that cell, by overriding the firing data provided by external controller.

Alternatively, the sensing result can be passed out of the unit cell array to the control logic on the printhead chip, which can then suppress firing by modifying the firing data shifted into the cell for subsequent lines. One method of passing the results out of the array would be to load it each cell's sensing result into the existing shift register, and shift the sensor results out as new firing data is being shifted in. Alternatively a dedicated circuit can be used to pass the results out.

The control logic could use the raw sensing results alone to make the decision to suppress firing. Alternatively, it could combine these results with other data, for example:

allow a programmable override, i.e. ignore the sensor results, either for a region or the whole chip process groups of sensing results to make decisions on which cells should not be fired use and algorithm based on cumulative sensor results over time.

In addition to operations on the printhead, sensing results (raw or processed/summarised) can be fed back to SoPEC (or other high level device controlling the printhead), for example to update the dead nozzle map, or change printhead parameters.

One way of doing this is to use the shift register used to shift in the dot data. For example, the clock signal that causes the values in the shift register to be output to the buffer can also trigger the shift registers to load the thermal values relating to the various nozzles. These thermal values are shifter out of the shift register as new dot data is shifted in.

The thermal signals can be stored in memory and use to effect modifications to operation of one or more nozzles where thermal problems are identified. However, it is also possible to provide the output of the shift register to the input of an AND gate. The other input to the AND gate is the dot data to be clocked in. At any particular time, the dot data at the input to the AND gate corresponds with the thermal data for the nozzle for which the dot data is destined. In this way, the dot data is only loaded, and the nozzle enabled, if the thermal data indicates that there is no thermal problem with the nozzle. A second AND gate can be provided as a global enable/disable mechanism. The second AND gate accepts an enable signal and the output of the shift register as inputs, and outputs its result to the input of the first AND gate. In this embodiment, the other input to the AND gate is the current dot data.

Depending upon the implementation, the nozzle or nozzles can be reactivated once the temperature falls to or below the first threshold. However, it may also be desirable to allow some hysteresis by setting a second threshold lower than first and only enabling the nozzle or nozzles once the second threshold is reached.

Additional Alternative Embodiments

Printing Fewer than the Full Number of Channels Available on the Printhead

It is possible to use SoPEC to send dot data to a printhead that is using less than its full complement of rows. For example, it is possible that the fixative, IR and black channels will be omitted in a low end, low cost printer. Rather than design a new printhead having only three channels, it is possible to select which channels are active in a printhead with a larger number of channels (such as the presently preferred channel version). It may be desirable to use a printhead which has one or more defective nozzles in up to three rows as a printhead (or printhead module) in a three color printer.

It would be disadvantageous to have to load empty data into each empty channel, so it is preferable to allow one or more rows to be disabled in the printhead.

The printhead already has a register that allows each row to be individually enabled or disabled (register ENABLE at address 0). Currently all this does is suppress firing for a non-enabled row.

To avoid SoPEC needing to send blank data for the unused rows, the functionality of these bits is extended to:

1. skip over disabled rows when DATA_NEXT register is written;
2. force dummy bits into the TDC FIFO for a disabled rows, corresponding to the number of nozzles in the dropped triangle section for that row. These dummy bits are written immediately following the first row write to the fifo following a fire command.

Using this arrangement, it is possible to operate a 6 color printhead as a 1 to 6 color printhead, depending upon which mode is set. The mode can be set by the printer controller (SoPEC); once set, SoPEC need only send dot data for the active channels of the printhead.

1 Introduction

Manufacturers of systems that require consumables (such as laser printers that require toner cartridges) have addressed the problem of authenticating consumables with varying levels of success. Most have resorted to specialized packaging that involves a patent. However this does not stop home refill operations or clone manufacture in countries with weak industrial property protection. The prevention of copying is important to prevent poorly manufactured substitute consumables from damaging the base system. For example, poorly filtered ink may clog print nozzles in an ink jet printer, causing the consumer to blame the system manufacturer and not admit the use of non-authorized consumables.

In addition, some systems have operating parameters that may be governed by a license. For example, while a specific printer hardware setup might be capable of printing continuously, the license for use may only authorise a particular print rate. The printing system would ideally be able to access and update the operating parameters in a secure, authenticated way, knowing that the user could not subvert the license agreement.

Furthermore, legislation in certain countries requires consumables to be reusable. This slightly complicates matters in that refilling must be possible, but not via unauthorized home refill or clone refill means.

To address these authentication problems, this document defines the QA Chip Logical Interface, which provides authenticated manipulation of a system's operating and consumable parameters. The interface is described in terms of data structures and the functions that manipulate them, together with examples of use. While the descriptions and examples are targeted towards the printer application, they are equally applicable in other domains.

2 Scope

The document describes the QA Chip Logical Interface as follows:

- Data structures and their uses
- Functions, including inputs, outputs, signature formats, and a logical implementation sequence
- Typical functional sequences of printers and consumables, using the functions and data structures of the interface The QA Chip Logical Interface is a logical interface, and is therefore implementation independent. Although this document does not cover implementation details on particular platforms, expected implementations include:

- Software only
- Off-the-shelf cryptographic hardware
- ASICs, such as SBR4320 [2] and SOPEC [5] for physical insertion into printers and ink cartridges
- Smart cards 3 Nomenclature 3.1 Symbols The following symbolic nomenclature is used throughout this document:

TABLE 282

Summary of symbolic nomenclature

| Symbol | Description |
|---|---|
| F[X] | Function F, taking a single parameter X |
| F[X, Y] | Function F, taking two parameters, X and Y |
| X\|Y | X concatenated with Y |
| X ∧ Y | Bitwise X AND Y |
| X ∨ Y | Bitwise X OR Y (inclusive-OR) |
| X ⊕ Y | Bitwise X XOR Y (exclusive-OR) |
| ¬X | Bitwise NOT X (complement) |
| X ← Y | X is assigned the value Y |
| X ← {Y, Z} | The domain of assignment inputs to X is Y and Z |
| X = Y | X is equal to Y |
| X ≠ Y | X is not equal to Y |
| ⇓X | Decrement X by 1 (floor 0) |
| ⇑X | Increment X by 1 (modulo register length) |
| Erase X | Erase Flash memory register X |
| SetBits[X, Y] | Set the bits of the Flash memory register X based on Y |
| Z ← ShiftRight[X, Y] | Shift register X right one bit position, taking input bit from Y and placing the output bit in Z |
| a.b | Data field or member function 'b' in object a. |

3.2 Pseudocode 3.2.1 Asynchronous

The following pseudocode:

var=expression means the var signal or output is equal to the evaluation of the expression.

3.2.2 Synchronous

The following pseudocode:

var=expression means the var register is assigned the result of evaluating the expression during this cycle.

3.2.3 Expression

Expressions are defined using the nomenclature in Table 282 above. Therefore:

var=(a=b)

is interpreted as the var signal is 1 if a is equal to b, and 0 otherwise.

3.3 Terms 3.3.1 QA Device and System

An instance of a QA Chip Logical Interface (on any platform) is a QA Device.

QA Devices cannot talk directly to each other. A System is a logical entity which has one or more QA Devices connected logically (or physically) to it, and calls the functions on those QA Devices.

From the point of view of a QA Device receiving commands, System cannot inherently be trusted i.e. a given QA Device cannot tell if the System is trustworthy or not. System can, however, be constructed within a trustworthy environment (such as a SoPEC or within another physically secure computer system), and in these cases System can trust itself.

3.3.2 Signature

Digital signatures are used throughout the authentication protocols of the QA Chip Logical Interface. A signature is produced by passing data plus a secret key through a keyed hash function. The signature proves that the data was signed by someone who knew the secret key.

The signature function used throughout the QA Chip Logical Interface is HMAC-SHA1 [1].

3.3.3 Types of QA Devices 3.3.3.1 Trusted QA Device

When a System is constructed within a physically/logically secure environment, then System itself is trusted, and any software/hardware running within that secure environment is trusted. A Trusted QA Device is simply a QA Device that resides within the same secure environment that System also resides in, and can therefore be trusted by System. This means that it is not possible for an attacker to subvert the communication between the System and the Trusted QA Device, or to replace the functionality of a QA Device by some other functionality.

A Trusted QA Device enables a System to extend trust to external QA Devices.

An example of a Trusted QA Device is a body of software inside a digitally signed program.

3.3.3.2 External Untrusted QA Device

An External untrusted QA Device is a QA Device that resides external to the trusted environment of the system and is therefore untrusted. The purpose of the QA Chip Logical Interface is to allow the external untrusted QA Devices to become effectively trusted. This is accomplished when a Trusted QA Device shares a secret key with the external untrusted QA Device, or with a Translation QA Device (see below).

In a printing application, external untrusted QA Devices would typically be instances of SBR4320 implementations located in a consumable or the printer.

3.3.3.3 Translation QA Device

A Translation QA Device is used to translate signatures between QA Devices and extend effective trust when secret keys are not directly shared between QA Devices.

As an example, if a message is sent from QA Device A to QA Device C, but A and C don't share a secret key, then under normal circumstances C cannot trust the message because a signature generated by A cannot be verified by C. However if A and B share secret 1, and B and C share secret 2, and B is allowed to translate signatures for certain messages sent between secret 1 and secret 2, then B can be used as a Translation QA Device to allow those messages to be sent between A and C.

The principles of Translation between entities are described in [3], and are further elaborated in Section 6.7.6.2. Translation and hence Translation QA Devices are not currently supported by this version of the QA Logical Interface, although example support is decribed in Appendix C.

3.3.3.4 Consumable QA Device

A Consumable QA Device is an external untrusted QA Device located in a consumable. It typically contains details about the consumable, including how much of the consumable remains.

In a printing application the consumable QA Device is typically found in an ink cartridge and is referred to as an Ink QA Device, or simply Ink QA since ink is the most common consumable for printing applications. However, other consumables in printing applications include media and impression counts, so consumable QA Device is more generic.

3.3.3.5 Operating Parameter QA Device

An Operating Parameter QA Device is an external untrusted device located within the infrastructure of a product, and contains at least some of the operating parameters of the application. Unlike the Trusted QA Device, an Operating Parameter QA Device is in a physically/logically untrusted section of the overall hardware/software.

An example of an Operating Parameter QA Device in a SoPEC-based printer system is the PrinterQA Device (or simply PrinterQA), that contains the operating parameters of the printer. The PrinterQA contains OEM and printer model information that indirectly specifies the non-upgradeable operating parameters of the printer, and also contains the upgradeable operating parameters themselves.

3.3.3.6 Value Upgrader QA Device

A Value Upgrader QA Device contains the necessary functions to allow a system to write an initial value (e.g. an ink amount) into another QA Device, typically a consumable QA Device. It also allows a system to refill/replenish a value in a consumable QA Device after use.

Whenever a value upgrader QA Device increases the amount of value in another QA Device, the value in the value upgrader QA Device is correspondingly decreased. This means the value upgrader QA Device cannot create value—it can only pass on whatever value it itself has been issued with. Thus a value upgrader QA Device can itself be replenished or topped up by another value upgrader QA Device.

An example of a value upgrader is an Ink Refill QA Device, which is used to fill/refill ink amount in an Ink QA Device.

3.3.3.7 Parameter Upgrader QA Device

A Parameter Upgrader QA Device contains the necessary functions to allow a system to write an initial parameter value (e.g. a print speed) into another QA Device, e.g. an Operating Parameter QA Device. It also allows a system to change that parameter value at some later date.

A parameter upgrader QA Device is able to perform a fixed number of upgrades, and this number is effectively a consumable value. Thus the number of available upgrades decreases by 1 with each upgrade, and can be replenished by a value upgrader QA Device.

3.3.3.8 Key Replacement QA Device

Secret transport keys are inserted into QA Devices during instantiation (e.g. manufacture). These keys must be replaced by the final secret keys when the purpose of the QA Device is known. The Key Replacement QA Device implements all necessary functions for replacing keys in other QA Devices.

3.3.4 Authenticated Read

An Authenticated Read is a read of data from a non-trusted QA Device that also includes a check of the signature. When the System determines that the signature is correct for the returned data (e.g. by asking a Trusted QA Device to test the signature) then the System is able to determine that the data has not been tampered en route from the read, and was actually stored on the non-trusted QA Device.

3.3.5 Authenticated Write

An authenticated write is a write to the data storage area in a QA Device where the write request includes both the new data and a signature. The signature is based on a key that has write access permission to the region of data in the QA Device, and proves to the receiving QA Device that the writer has the authority to perform the write. For example, a Value Upgrader Refilling Device is able to authorize a system to perform an authenticated write to upgrade a Consumable QA Device (e.g. to increase the amount of ink in an Ink QA Device).

The QA Device that receives the write request checks that the signature matches the data (so that it hasn't been tampered with en route) and also that the signature is based on the correct authorization key.

An authenticated write can be followed by an authenticated read to ensure (from the system's point of view) that the write was successful.

3.3.6 Non-Authenticated Write

A non-authenticated write is a write to the data storage area in a QA Device where the write request includes only the new data (and no signature). This kind of write is used when the system wants to update areas of the QA Device that have no access-protection.

The QA Device verifies that the destination of the write request has access permissions that permit anyone to write to it. If access is permitted, the QA Device simply performs the write as requested.

A non-authenticated write can be followed by an authenticated read to ensure (from the system's point of view) that the write was successful.

3.3.7 Authorized Modification of Data

Authorized modification of data refers to modification of data via authenticated writes (see Section 3.3.5).

Structures

4 Overview

The primary purpose of a QA Device is to securely hold application-specific data. For example if the QA Device is a Consumable QA Device for a printing application it may store ink characteristics and the amount of ink remaining.

For secure manipulation of data:

Data must be clearly identified (includes typing of data).

Data must have clearly defined access criteria and permissions.

Data must be able to be transferred securely from one QA Device to another, through a potentially insecure environment.

In addition, each QA Device must be capable of storing multiple data elements, where each data element is capable of being manipulated in a different way to represent the intended use of that data element. For convenience, a data element is referred to as afield.

The following chapters describe the structures that are present in a QA Device to allow the secure manipulation of data.

Section 5 describes the identifier structure that allows unique identification of that QA Device by external systems, ensures that messages are received by the correct QA Device, and ensures that the same QA Device can be used across multiple transactions.

Section 6 describes the key-related structures that are used for digital signature generation and verification. These keys serve three basic functions:

For reading, where they are used to verify that the read data came from a valid QA Device and was not altered en route.

For writing, where they are used to authorise modification of data.

For transporting keys, where they are used in the process of encrypting and transporting new keys into a QA Device.

Section 7 describes the session-related structures that ensure time varying signatures, and hence protect against certain kinds of logical attacks on the keys.

Section 8 describes the field-related structures used in a QA Device, including how the permissions associated with each field are specified.

5 Identifier-Related Structures

Each QA Device requires an identifier that allows unique identification of that QA Device by external systems, ensures that messages are received by the correct QA Device, and ensures that the same device can be used across multiple transactions.

Strictly speaking, the identifier only needs to be unique within the context of a key, since QA Devices only accept messages that are appropriately signed. However it is more convenient to have the instance identifier completely unique, as is the case with this design.

In certain circumstances it is useful for a Trusted QA Device to assume the instance identifier of an external untrusted QA Device in order to build a local trusted form of the external QA Device. It is the responsibility of the System to ensure that the correct device is used for particular messages. As an example, a Trusted QA Device in a SoPEC-based printing system has the same instance identifier as the external (untrusted) Printer QA so that the System can access functionality in the Trusted QA instead of the external untrusted Printer QA.

The identifier functionality is provided by ChipId.

5.1 ChipId

ChipId is the unique 64-bit QA Device identifier. The ChipId is set when the QA Device is instantiated, and cannot be changed during the lifetime of the QA Device.

A 64-bit ChipId gives a maximum of 1844674 trillion unique QA Devices.

6 Key-Related Structures

Each QA Device contains a number of secret keys that are used for signature generation and verification. These keys serve three basic functions:

For reading, where they are used to verify that the read data came from the particular QA Device and was not altered en route.

For writing, where they are used to authorise modification of data.

For transporting keys, where they are used in the process of encrypting and transporting new keys into the QA Device.

All of these functions are achieved by signature generation; a key is used to generate a signature for subsequent transmission from the device, and to generate a signature to compare against a received signature. The transportation function is additionally achieved by encryption.

This section describes the key-related structures.

6.1 Numkeys, Keyslots, K, KeyId

The number of secret keys in a QA Device is given by NumKeys, and has a maximum value of 256, i.e. the number of keys for a particular implementation may be less than this. For convenience, we refer to a QA Device as having NumKeys keyslots, where each keyslot contains a single key. Thus the nth keyslot contains the nth key (where n has the range 0 to NumKeys-1). The keyslot concept is useful because a keyslot contains not only the bit-pattern of the secret key, but also additional information related to the secret key and its use within the QA Device. The term Keyslot[n].xxx is used to describe the element named xxx within Keyslot n.

Each key is referred to as K, and the subscripted form $K_n$ refers to the key in the nth keyslot. Thus $K_n$=Keyslot[n].K.

The length of each key is 160 bits. 160 bits was chosen because the output signature length from the signature generation function (HMAC-SHA1) is 160 bits, and a key longer than 160-bits does not add to the security of the function.

The security of the digital signatures relies upon keys being kept secret. To safeguard the security of each key, keys should be generated in a way that is not deterministic. Ideally the bit pattern representing a particular key should be a physically generated random number, gathered from a physically random phenomenon. Each key is initially programmed during QA Device instantiation.

For the convenience of the System, each key has a corresponding 18-bit KeyId which can be read to determine the identity or label of the key without revealing the value of the key itself. Since the relationship between keys and KeyIds is 1:1 (they are both stored in the same keyslot), a system can read all the KeyIds from a QA Device and know what key is stored in each of the keyslots. A KeyId of INVALID_KEYID (=0) is the only predefined id, and indicates that the key is invalid and should not be used, although the QA Device itself will not specifically prevent its use. From a system perspective, the bit pattern of a key is undefined when KeyId=INVALID_KEYID, and so cannot be guaranteed to match another key whose KeyId is also INVALID_KEYID. The bit pattern for such a key should be set to a random bit pattern for the physical security of any other keys present in the QA Device.

6.2 Common and Variant Signature Generation

To create a digital signature, the data to be signed (d) is passed together with a secret key (k) through a key dependent one-way hash function (SIG). i.e. signature=$SIG_k(d)$. The key dependent one-way hash function used throughout the QA Chip Logical Interface is HMAC-SHA1[1], although from a theoretical sense any key dependent one-way hash function could be used.

Signatures are only of use if they can be validated i.e. QA Device A produces a signature for data and QA Device B can check if the signature is valid for that particular data. This implies that A and B must share some secret information so that they can generate equivalent signatures.

Common key signature generation is when QA Device A and QA Device B share the exact same key i.e. key $K_A$=key $K_B$. Thus the signature for a message produced by A using $K_A$ can be equivalently produced by B using $K_B$. In other words $SIG_{KA}(d)=SIG_{KB}(d)$ because key $K_A$=key $K_B$.

Variant key signature generation is when QA Device B holds a base key, and QA Device A holds a variant of that key such that $K_A$=owf($K_B$,$U_A$) where owf is a one-way function based upon the base key ($K_B$) and a unique number in A ($U_A$). A one-way function is required to create $K_A$ from $K_B$ or it would be possible to derive $K_B$ if $K_A$ were exposed. Thus A can produce $SIG_{KA}$(message), but for B to produce an equivalent signature B must produce $K_A$ by being told $U_A$ from A and using B's base key $K_B$. $K_A$ is referred to as a variant key and $K_B$ is referred to as the base key. Therefore, B can produce equivalent signatures from many QA Devices, each of which has its own unique variant of $K_B$. Since ChipId is unique to a given QA Device, we conveniently use that as $U_A$.

Common key signature generation is used when A and B are effectively equally available[1] to an attacker. Variant key signature generation is used when B is not readily available to an attacker, and A is readily available to an attacker. If an attacker is able to determine $K_A$, they do not know $K_A$ for any other QA Device of class A, and they are not able to determine $K_B$.

[1]The term "equally available" is relative. It typically means that the ease of availability of both are the effectively the same, regardless of price (e.g. both A and B are commercially available and effectively equally easy to come by).

When two or more devices share $U_A$ (in our implementation, $U_A$ is ChipId), then their variant keys can be effectively treated as common keys for signatures passed between them, but as variant keys when passed to other devices.

The QA Device producing or testing a signature needs to know if it must use the common or variant means of signature generation. Likewise, when a key is stored in a QA Device, the status of the key (whether it is a base or variant key) must be stored in the keyslot along with the key for future reference.

Therefore each keyslot contains a 1-bit Variant flag to hold the status of the key in that keyslot:

Variant=0 means the key in the keyslot is a base/common key

Variant=1 means the key in the keyslot is a variant key

The QA Device itself doesn't directly use the Variant setting. Instead, the System reads the value of variant from the desired keyslots in the two QA Devices (one QA Device will produce the signature, the other will check the signature) and informs the signature generation function and signature checking functions whether or not to use base or variant signature generation for a particular operation.

6.2.1 Equivalent Signature Generation Between QA Devices

Figure 398:
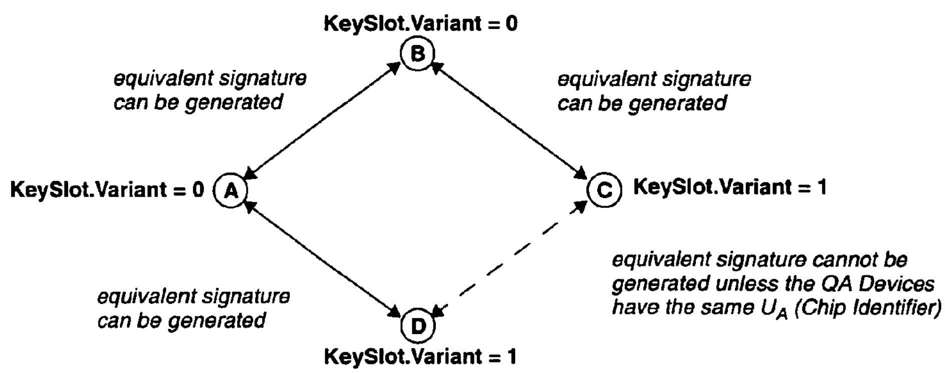
FIG. 398 Equivalent signature generation

Equivalent signature generation between 4 QA Devices A, B, C and D is shown in FIG. 398 assuming that each device has a single keyslot. KeySlot.KeyId of all four keys are the same i.e KeySlot[A].KeyId=KeySlot[B].KeyId=KeySlot[C]. KeyId=KeySlot[D].KeyId.

If KeySlot[A].Variant=0 and KeySlot[B].Variant=0, then a signature produced by A, can be equivalently produced by B because $K_A=K_B$.

If KeySlot[B].Variant=0 and KeySlot[C].Variant=1, then a signature produced by C, can be equivalently produced by B because $K_C=f(K_B, ChipId_C)$. Note that B must be told $ChipId_c$ for this to be possible.

If KeySlot[C].Variant=1 and KeySlot[D].Variant=1, then a signature produced by C, cannot be equivalently produced by D unless both QA Devices have the same $U_A$ (i.e. they must share the same Chip Identifier) While C and D will typically not share a ChipId, in certain circumstances the System can read a QA Device's Chip Identifier and install it into another QA Device. Then, using key transport mechanisms, the two QA Devices can come to share a common variant key, and can thence generate and check signatures with each other.

If KeySlot[D].Variant=1 and KeySlot[A].Variant=0, then a signature produced by D, can be equivalently produced by A because $K_D=f(K_A, ChipId_D)$.

6.3 KeyType, TransportOut, UseLocally

As described in Section 6.1, the keys in a QA Device are used for three broad purposes:

For reading, where they are used to verify that the read data came from the particular QA Device and was not altered en route.

For writing, where they are used to authorise modification of data.

For transporting keys, where they are used in the process of encrypting and transporting new keys into the QA Device.

While it is theoretically possible that a system could permit each key to be used to perform all of these tasks, in most cases it is a security risk to allow this.

If any key can be used to transport any other key out of a QA Device, then a compromise of a single key means a compromise of all keys. The reason is that the compromised key can be used by an attacker to transport all other keys out of a QA Device. Some QA Devices (such as Key Replacement QA Devices) are specifically required to transport keys, while others (such as those devices used in consumables) should not ever transport their keys out.

During manufacture it is not always possible to know the final intended application for a given QA Device. For example, one may end up at OEM1 while another is destined for OEM2. To decouple manufacture from installation of QA Devices, it is useful to place temporary batch keys into the QA Devices. Each of these keys should be replaceable by a different batch key or a final application key, but during their temporary existence these keys must not be capable of authenticating signatures writes of data. Thus they act as a transport key.

Likewise, in the Key Replacement QA Device, there is a need to differentiate between final use for a key in a QA Device, and storage of a key in one QA Device for subsequent injection into another. For example, a key may be a transport key when stored in QA Device A, and although we want to store that same key in a Key Replacement QA Device B for future injection into A, we do not want that key to be used to transport keys from B. Thus, if a key is not in its final intended keyslot, then it should have no abilities in that QA Device other than being transported out, and the intended use of the key (for example whether or not it will be a transport key when installed in its final destination) needs to be associated with that key.

From a security point of view there should be a time when a key in a given keyslot can be guaranteed to be in its final intended form i.e. it cannot be replaced later. If a key could be replaced at any time, attackers could potentially launch a denial of service attack by replacing keys with garbage, or could replace a key with one of their own choice. As an example, suppose keys k1 and k2 are both used to read value from a QA Device, write value to the QA Device, and to transport new keys into the QA Device. If either k1 or k2 is compromised, then the compromised key could be used to transport keys of choice to replace both keys and create value in the QA Device.

Therefore each keyslot contains 3×1-bit flags as follows:

KeyType: whether the key is a TransportKey (0) to be used for key transport and signing reads of key meta-information, or if it is a DataKey (1) to be used for signing data as well as key meta-information TransportOut: whether or not the key can be transported out from this QA Device UseLocally: whether or not the key is for use locally within this QA Device or not. For transport keys this means whether or not the transport key can be used to transport another key out from this QA Device.

Table 283 lists the interpretation of the different settings of these 3 bits. Note that CanBeReplaced is a derived boolean condition that is true only when KeyType, TransportOut and UseLocally are all 0.

TABLE 283

KeyType, TransportOut, UseLocally

| bits in keyslot | | | | |
|---|---|---|---|---|
| KeyType | Transport Out | Use Locally | Can Be Replaced[2] | Description |
| 0 | 0 | 0 | 1 | Transport key that is to be replaced. It cannot be transported out from this QA Device, and cannot be used locally to transport other keys from this QA Device. Sometimes referred to as an Unlocked Transport Key. Example: batch key |
| 0 | 0 | 1 | 0 | Transport key to be used in transporting other keys from this QA Device. The transport key cannot itself be transported out. Example: SoPEC_id_key in PrinterQA |
| 0 | 1 | 0 | 0 | Transport key that is to be transported into another QA Device and subsequently replaced in that QA Device. The key is not for use locally within this QA Device. Example: a batch key that is set to replace another batch key |
| 0 | 1 | 1 | 0 | Transport key that is used to transfer other keys out and can itself be transported out. |

TABLE 283-continued

KeyType, TransportOut, UseLocally

| bits in keyslot | | | | |
|---|---|---|---|---|
| KeyType | Transport Out | Use Locally | Can Be Replaced[2] | Description |
| | | | | Example: SoPEC__id__keys in a multi-SoPEC system to allow SoPEC ids to be used for secure comms (see Section 6.7.6.1). |
| 1 | 0 | 0 | 0 | Data key that cannot be used locally nor transported out. This is effectively an invalid key, and can be used when a device does not need to use all of the NumKeys keyslots. |
| 1 | 0 | 1 | 0 | Key for use in reading & writing data within this QA Device. It cannot be transported out. Example: consumable access key |
| 1 | 1 | 0 | 0 | Key for injection into another QA Device where it will be then used to read and write data in that QA Device. It cannot be used to read or write data within this QA Device. Example: consumable access key in a factory key replacement device. |
| 1 | 1 | 1 | 0 | Key in key replacement device that is to be inserted into another device for data manipulation and can also be used for authenticated reads and writes of data in this device and others. Example: consumable refill key in a factory key replacement device. |

[2]Note that this is a derived boolean condition that is true only when KeyType, TransportOut and UseLocally are all 0.

6.3.1 Examples

The following examples assume 3 bits xyz are interpreted as:

x=KeyType y=TransportOut z=UseLocally

A freshly manufactured QA Device A will most likely have the 3 bits for each keyslot set to 000 so that all the keys are replaceable.

To replace one of A's keys (k1) by another batch key (k2), key replacement QA Device B is required where B typically contains k1 with 3 bits set to 001, and k2 with 3 bits set to 010. After k2 has been transferred into A, the 3 bits within A will be now set to 000. Thus k2 cannot be used or replaced within B, but can be replaced within A.

To replace one of A's keys (k1) by a final use data key (k2), key replacement QA Device B is required where B typically contains K1 with 3 bits set to 001, and k2 with 3 bits set to 110. After k2 has been transferred into A, the 3 bits within A will be now set to 101. Thus k2 can be used within A but not B, and cannot be transported out of A.

6.4 Invalidation of Keyslots and Keys

6.4.1 Invalidation of Keyslots

Although there are KeyNum keyslots in a QA Device, not all keyslots may be required for a given application. For example, a QA Device may supply 256 keyslots, but only 2 keys may be required for a particular application. The remaining keyslots need to be invalidated so they cannot be used as a reference for signature checking or signature generation.

As described in Table 283 in Section 6.3, when QA Device A has a keyslot with KeyType, TransportOut, and UseLocally set to 000, then the key in that keyslot can be replaced.

To invalidate the keyslot in A where k1 is currently residing so that no further keys can ever be stored in that keyslot, key replacement QA Device B is required where B typically contains:

k1 with 3 bits set to 001 a base key k2 with 3 bits set to 10 and a KeyId of 0 (see Section 6.1)

After k2 has been transferred into A as a variant key, the 3 bits within A will be now set to 100. Thus k2 cannot be used within A, cannot be transported out of A, and cannot be replaced. Moreover, being a variant key in A, k2 will be different for each instance of A and will therefore be contribute to the entropy of A. Any system reading the KeyIds that are present in A will see that the keyslot contains a key whose keyId is 0 (and is therefore invalid) and whose 2-bits specify that the key cannot be used.

6.4.2 Invalidation of keys

Over the lifetime of a product, it may be desirable to retire a given key from use, either because of compromise or simply because it has been used for a specific length of time (and therefore to reduce the risk of compromise). Therefore the key in a keyslot needs to be invalidated by some means so that it cannot be used any more as a reference for signature checking or signature generation. From an audit-trail point of view, although a key has been retired from use, it is convenient to retain the key meta-information so that a System can know which keys have been retired.

In theory, a special command could be available in each QA Device to allow the caller to transform the KeyType, TransportOut, and UseLocally settings for a keyslot from some value to 100. The key in that slot would then be non-transportable non-usable, and therefore invalid. However it would not be possible to know the previous setting for the 3 bits once the key had become invalid.

It is therefore desirable to have a boolean in each keyslot that can be set to make a particular key invalid. If a key has been marked as invalid, then TransportOut and UseLocally are ignored and treated as 0, and the key cannot be replaced.

However, a single bit representation of this boolean over-complicates 4320-based [2] implementations of QA Devices in that it is not possible to set a single bit in shadowed mode on a 4320 device (to change a key from valid to invalid). Instead, the page containing the key would need to be erased and the key reconstructed, tasks which need to take place during initial key replacement during manufacture, but which should not need to take place after the keys are all finalised.

Therefore each keyslot contains a 4-bit boolean (which should be nybble-aligned within the keyslot data structure) referred to as Invalid, where 0000 represents a valid key in the keyslot, and non-zero represents an invalid key. A specific command (Invalidate Key) exists in the QA Logical Interface to allow a caller to invalidate a previously valid key.

If Invalid is set to a non-zero value, then the key is not used regardless of the settings for KeyType, TransportOut, and UseLocally.

6.5 KeyGroup and KeyGroupLocked

In general each QA Device contains a number of data elements (each element referred to as a field), each of which can be operated upon by one or more keys. In the general case of an arbitrary device containing keys and fields, it is useful to have a set of permissions for each key on each field. For example, key 1 may have read-only permissions on field 1, but read/write permissions on field 2 and read/decrement-only permissions on field 3.

Although it can cater for all possibilities, a general scheme has size and complexity difficulties when implemented on a device with low storage capacity. In addition, the complexity of such a scheme is increased, if the device has to operate correctly with power-failures e.g. an operation must not create a logical inconsistency if power is removed partway through the operation.

Since the actual number of keys that can be stored in a low storage capacity QA Device depends on the complexity of the program code and the size of the data structures, it is useful to minimise the functional complexity and minimise the size of the structures while not knowing the final number of keys.

In particular, the scheme must cope with multiple keys having the same permissions for a field to support the following situations:

each of the various users of the QA Device has access to a different key, such that different users can be individually included or excluded from access only a subset of keys are in use at any one time The concept that supports this requirement is the keygroup. A keygroup contains a number of keys, and each field has a set of permissions with respect to the keygroups. Thus keygroup 1 (containing some number of keys) may have read-only permissions on field 1, but read/write permissions on field 2 and read/decrement-only permissions on field 3.

In the limit case of 1 key per keygroup, with an arbitrary number of keygroups, the storage requirements for the permissions on each field would be the same as the general case without keygroups, but by limiting the number of keygroups, the storage requirements for the permissions on each field can be pre-known, constant, and is decoupled from the actual number of keys in the device.

The number of keygroups in a QA Device is 4. This allows for 2 different keygroups that can transfer value into the QA Device, and for 2 different keygroups that can transfer value out of a QA Device, where each of the 4 keygroups is independent of the others. Note that transport keys do not need to be allocated a keygroup since they cannot be used to authorise reads or writes of data.

Thus each keyslot contains a 2-bit KeyGroup identifier. The value of KeyGroup is relevant only when the KeyType=DataKey.

For security concerns it is important that a field not be created until all the keys for a keygroup have been created. Otherwise an attacker may be able to add a known new key to an existing keygroup and thereby subvert the value associated with the field.

However it is not possible to simply not allow the creation of fields until all of the keys have been created. It may be that two distinct phases of programming occur, with creation of keys and data based on each phase. For example a stamp franking system may contain value in the form of ink plus a dollar amount. The keys and fields relating to ink may be injected at one physical location, while the keys and fields relating to dollars may be injected at a separate location some time later.

It is therefore desirable to have a boolean indicator that indicates whether a particular keygroup is locked. Once a keygroup is locked, then no more keys can be added to that keygroup. The boolean indicator is accessible per keyslot rather than as a single indicator for each keygroup in order that someone reading the keyslot information can know:

whether they can add any more keys to a keygroup whether they can create fields with write-permissions for the keygroup When a key is replaced, the keygroup for that key can be locked at the same time. This will cause the QA Device to change the status of all keys with the same KeyGroup value from keygroup-unlocked to keygroup-locked, thereby preventing the addition of any more keys in the keygroup.

However, a single bit representation of this boolean over-complicates 4320-based [2] implementations of QA Devices in that it is not possible to set a single bit in shadowed mode on a 4320 device (to change a locked status from unlocked to locked). Instead, the page containing the key would need to be erased and the key reconstructed, and this would need to take place per key (where the KeyGroup matched).

Therefore each keyslot contains a 4-bit boolean (which should be nybble-aligned within the keyslot data structure) referred to as KeyGroupLocked, where 0000 represents that the keygroup to which the key in the keyslot belongs is unlocked (i.e. more keys can be added to the keygroup), and non-zero represents that the keygroup to which the key in the keyslot belongs is locked (i.e. more keys cannot be added to the keygroup).

It is finally worth noting that a Key Replacement QA Device (see Section 3.3.3.8) does not need to check whether or not there are fields on the target device with write permissions related to a particular keygroup. The reason is that the target QA Device only allows field creation related to a keygroup if the keygroup is locked. Therefore if there was such a field in the target device one of the following is true:

the target QA Device is a fake one created by an attacker. If so, and if the attacker does not know the original key, then the replaced key will be of no value. If the attacker does know the original key, then they can determine the replacement key (since the replacement key is encrypted using the original key for transport) without creating a fake QA, and can therefore generate fake value as desired.

the target QA Device has come under physical attack (it's a real QA Device). If an attacker can do this, it's easier to allow the key replacement first, and then create a fake field. This situation cannot ever be detected by the Key Replacement QA Device.

6.6 Summary of Key-Related Structures

A given QA Device has KeyNum keyslots. Each keyslot contains:

a 160-bit key referred to as K a 32-bit KeyDescriptor as per Table 284:

TABLE 284

Key Descriptor

| Bits | Bit-field Name | Description | Ref |
|---|---|---|---|
| 31 | Variant | 0 = The key is stored in base form<br>1 = The key is stored in variant form | Section 6.2 |
| 30 | KeyType | 0 = TransportKey (the key is used to transport other keys, and can be used to sign reads of key meta-information such as keydescriptors)<br>1 = DataKey (the key is used to sign data reads and writes, and can be used to sign reads of key meta-information) | Section 6.3 |
| 29-12 | KeyId | The public identifier for the secret key.<br>A user can refer to this to check which key is stored in the keyslot even though the bit pattern for the key is not known.<br>It is likely to match (or be some function of) the database index into the key server for all keys. | Section 6.1 |
| 11-8[3] | KeyGroup Locked | 0 = the keygroup the key belongs to is not locked (more keys can be added to the keygroup)<br>non-0 = the keygroup the key belongs to is locked (no more keys may be added to the keygroup)<br>(only applicable for KeyType = DataKey) | Section 6.5 |
| 7-4[4] | Invalid | 0 = The key in this keyslot is valid<br>non-0 = The key in this keyslot is invalid (cannot be used to generate or test signatures, cannot be replaced, and cannot be transported from this device) | Section 6.4.2 |
| 3 | TransportOut | 0 = The key cannot be transported from this device<br>1 = The key can be transported from this device | Section 6.3 |
| 2 | UseLocally | If KeyType = TransportKey:<br>0 = The key cannot be used to transport other keys from this device<br>1 = The key can be used to transport other keys from this device<br>If KeyType = DataKey:<br>0 = The key cannot be used to generate or test signatures<br>1 = The key can be used to generate and test signatures | Section 6.3 |
| 1-0 | KeyGroup | The keygroup (0-3) that the key belongs to for the purposes of data write permissions (only applicable for KeyType = DataKey) | Section 6.5 |

[3]Note that this bit-field must be nybble-aligned (see Section 6.5)
[4]Note that this bit-field must be nybble-aligned (see Section 6.4.2)

6.7 Examples of Use

This section describes example usage of different settings of KeyDescriptor information.

6.7.1 Base/Variant Usage 1

In this example system:

- value of some kind is stored in QA Device A. For example, A contains the operating speed of a printer.
- the value stored in A is injected during QA Device instantiation i.e. during manufacture. For this simple example we do not consider post-manufacture injection of value.
- the amount of value is checked before use by QA Device B i.e. B is used to check signatures produced by reads of data from A. For example, a system checks how fast it is allowed to print before it prints.

If a common key k1 is used to generate and check all signatures in this system (i.e. k1 is present in A and B), then an attacker can attempt to obtain k1 from A or B. Moreover, if the attacker manages to obtain k1, then all value is lost as the attacker can produce fake value in a fake A i.e. can generate print speeds with any amount of value.

If k1 is a variant key in B and a base key in A, then a compromise of k1 from B allows an attacker to produce fake signatures (and hence value) for reads from that specific instance of B (e.g. the user of that specific B can falsify any print speed). However the attacker cannot manufacture clone As based on the k1 variant; the attacker can only manufacture clone As with the k1 base (as stored in A), or would need to manufacture clone Bs. Since B does not contain the base k1, B is therefore not of strong use to an attacker since an attack on B provides free value only for that specific B, not for all systems. The cost and security of B can therefore be reduced compared to A.

If k1 is a variant key in A and a base key in B, then a compromise of k1 from A allows an attacker to produce fake signatures (and hence value) for reads from A, and hence the attacker can manufacture clone As (each with the same variant). Likewise, a compromise of k1 from B allows an attacker to create consumables with any chosen variant. Therefore the use of the variant key in A is to no advantage and does not lead to a relative difference in security between A and B.

6.7.2 Base/Variant Usage 2

In this example system:

- value of some kind is stored in QA Device A. For example, A is a consumable such as an ink cartridge

- the amount of value is checked before use by keys stored in QA Device B i.e. B is used to check signatures produced by reads of data from A. For example, a system checks how much ink remains in the cartridge before it prints a page.
- value is injected/replenished in A by QA Device C i.e. C produces signatures that are then applied to A in the form of an authorised write. For example, C is a refill cartridge that allows ink to be refilled into the ink cartridge.

If a single key k1 is used to generate and check all signatures in this system (i.e. it is used to authorise both reads and writes), then an attacker can attempt to obtain k1 from A, B, or C. Moreover, if the attacker manages to obtain k1, then all value is lost as the attacker can produce:

- fake value in a fake A i.e. fake consumables with any amount of value
- fake value in real A i.e. the attacker can produce signatures to increase the amount of consumable in any legitimate A
- fake value in a fake C i.e. fake refill devices
- fake value in real C i.e. the attacker can produce signatures to increase the amount of consumable in any legitimate C However it is more secure to have two keys such that k1 is used to generate and check signatures between A and B, where k1 has no permissions to increase value in A (i.e. k1 has read/decrement-only permissions to the value in A), and k2 is used to generate and check signatures between B and C where k2 does have ability to increase value in A (i.e. k2 has read/write permissions to the value in A).

Thus A needs to contain k1 and k2, B needs to contain k1 only, and C needs to contain k2 only. There are now some significant differences over the single key k1 setup, with the differences varying depending on whether common or variant signature generation is used:

- If k1 is a common key used to generate and check signatures between A and B, then a compromise of k1 means that an attacker can produce fake value in a fake A. But since k1 has no ability to increase value in A, the attacker cannot modify existing As for later use by others. i.e. an attacker can create value for himself by creating a clone device, but that clone device cannot transfer value to others. e.g. an attacker can get free ink with a clone A, but cannot update other user's valid As to increase the amount of ink (the attacker would need to replace each user's A with a clone A to get free ink). A compromise of k2 allows the attacker to create refill devices that update As. Therefore k2 is more valuable to an attacker than k1. As a result, the security requirements of B is theoretically less compared to that of A and C (since B does not contain k2). However this is still not a desirable situation.
- If k1 is a variant key in B and a base key in A, then if k1 is compromised from B, then as with the common key situation, a compromised k1 from B does not allow an attacker to increase the value in an arbitrary A. However, more importantly, a compromise of k1 from B allows an attacker to produce fake signatures (and hence value) for reads from that specific instance of B (e.g. the user of that specific B gets free ink). This means the attacker cannot manufacture clone As based on the k1 variant; the attacker can only manufacture clone As with the k1 base (as stored in A). Likewise, with k2, if the k2 variant is stored in A and the k2 base is stored in C, an attacker cannot generate fake refill devices if they obtain the k2 variant. Since B does not contain k2 and does not contain the base k1, B is therefore not of strong use to an attacker since an attack on B provides free value for that specific B, not for all systems. The cost and security of B can therefore be reduced compared to A. Depending on the value being protected, the same may be said for A compared to C.
- If k1 is a variant key in A and a base key in B, then a compromise of k1 from A allows an attacker to produce fake signatures (and hence value) for reads from A, and hence the attacker can manufacture clone As (each with the same variant) allowing refills through a chosen k2. Likewise, a compromise of k1 from B allows an attacker to create consumables with any chosen variant. In both cases the clone As won't work with real Cs, although the attacker can always increase the value at will, so this is not a concern. Therefore the use of the variant key in A is to no advantage and does not lead to a relative difference in security between A and B.

6.7.3 Multi-User Setup 1

In this example, n users have read permissions to a field in a series of QA Devices. Each of the users has a single key to authenticate reads from the QA Devices. Each QA Device contains the base key, and each user has a variant key.

Since each user has a variant key, and not the base key, a given user U1 cannot falsify reads for other users, and hence cannot attack the other users even if U1 knows the variant key. Of course if the base key is compromised, all communication for all users is compromised.

Note that in this example, each user only requires 1 key, and each QA Device only requires 1 key, yet the effect of multiple keys is obtained.

6.7.4 Multi-User Setup 2

In this example, n users have write access to a field in a QA Device. All keys in a given keygroup have read/write permissions to the field. The given Keygroup contains n keys, one per user. At commencement of the system, all users have write access to the field.

At some stage, a given user may compromise a key or circumstances may require the removal of that user from the system. The key in the QA Device corresponding to that user can be invalidated, and hence the user's access is removed without affecting any other user's access.

Likewise, a new user may need to be added, or a user may require a replacement key for a key that had been compromised. If additional keys have been pre-stored within the QA Device for future use, these additional keys have been unassigned and are unused. One of these additional keys can be given to the new user or to the user whose key has been compromised.

6.7.5 Rolling Keys

In an ideal world (for the owner of a secret key at least), a given secret key will remain secret forever. However it is prudent to minimise the loss that could occur should a key be compromised.

This is further complicated in a system where all of the components of a system are stored at the user site, potentially without direct connection to a central server that could appropriately update all components after a particular time period or if a compromise is known to have occurred.

The first level of loss reduction is by using variant keys as described in Section 6.7.2. Variant keys can also be applied to the principles described in Section 6.7.3 and Section 6.7.4 to create a system where keys can be retired from use after a particular time or if a compromise is known to have occurred.

To create rolling keys, two QA Devices A and B are required such that A and B are intended to work together via a conceptual key k. While a single key could be used for k, it is more secure to limit the lifetime of any particular key, and to have a plan in place to remove a key from use should it be compromised.

Rolling keys are where multiple keys are stored in at least one of A and B such that different keys can be used at different times during the life of A and B, different instances of A and B at differing manufacture times can be programmed with different keys yet still work together, and keys can be retired from use in A and/or B.

In the simplest example of the problem, suppose A is embedded in a printer system that works with ink cartridges containing B. If A contains a single key k for working with B, then k is required for all Bs as long as A is deployed. A compromise of k lasts for the lifetime of A.

A rolling key example system for this example is where A contains multiple keys $k_1, k_2 \ldots$ kn, each with a different KeyId, where each of these keys has the same permissions on datafields within A (typically they will all belong to the same keygroup in A). At initial manufacture, B contains a single key $k_1$ (that is also present in A). For a given time period $k_1$ can be used between A and B. At some later time (or if $k_1$ is compromised), Bs are manufactured only containing $k_2$, and new As are manufactured only containing $k_2$, $k_3 \ldots k_n, k_{n+1}$. At a later time, Bs are manufactured only containing $k_3$ and new As are manufactured only containing $k_3, k_4 \ldots k_n, k_{n+1}, k_{n+2}$ etc.

Note that if the keys shared by A and B are all common keys, then a compromise of keys from A will compromise all future value in Bs. However if A contains the variant key form and B contains a base form of each key, then compromise of keys in A does not permit an attacker to know future keys in B and the attacker can therefore not create clone Bs until a real B is released and the base key is obtained from B. This means that the more variant keys that can be injected into A the more changes in B can be coped with without any loss of security.

In the example above, note that if $k_1$ is compromised, an attacker can still manufacture clone Bs that will work on older As. It is therefore desirable to somehow invalidate $k_1$ on older As at some point to reduce the impact of clone Bs. However it is not usually the case that an immediate cut-off point can be introduced. For example, once Bs are being manufactured with $k_2$, existing Bs containing k1 may still be in use and are still valid. Just because $k_2$ is used with A doesn't mean that k1 should be invalidated in A immediately. Otherwise a valid user could not then use an older valid B in A after using a newer B in A. Likewise, new As typically need to be able to work with valid old Bs. Our example assumes that newer As won't work with older Bs.

Therefore if overlapping timing is required, then several valid keys in use at a time instead of having only a single valid key in use at a time. Once valid Bs are known to be out of circulation (e.g. due to an expiry date associated with a B) then a key can be officially retired from being included in the manufacture of new As, and can be invalidated in old As. The more keys that can be used, the finer-grained the resolution of timing for invalidating a particular key, and hence the greater the reduction in exposure.

For example, B may be an ink cartridge that has a use-by date of 12 months while A is a printer that must last for 5 years:

If A contains 5 keys, B is issued with a new key each year, and a new A is released each year, then $k_1$ will be in B during year1, $k_2$ will be in B during year2 etc. As produced in year 2 will need to contain $k_1$ since old Bs from the previous year are still valid. Only in year 3 can As be manufactured without $k_1$, and old As can have their $k_1$ invalidated. Clone Bs can therefore be manufactured by an attacker causing loss during year 1 and 2. After year 2, those clone Bs won't work on new As, but will continue to work on old As until $k_1$ has been invalidated on the old As.

If A contains 10 keys, B is issued with a new key every 6 months, and a new A is released every 6 months, then $k_1$ will be in B during the first 6 months, $k_2$ will be in B during the second six months etc. As produced in the second and third 6-months will need to contain $k_1$ since old Bs from the previous year are still valid. Only in the fourth 6-month can As be manufactured without $k_1$, and old As can have their $k_1$ invalidated. Clone Bs can therefore be manufactured by an attacker causing loss during year 1 and the first half of year 2. After this time, those clone Bs won't work on new As, but will continue to work on old As until $k_1$ has been invalidated on the old As. Thus the addition of keys in A and the changing of keys at a faster rate (every 6 months compared to every year) has reduced the exposure of a compromised key without increasing any risk due to exposure of keys in A.

Of course if A is used with B and a B-like entity called C, then A can have 1 set of rolling keys with B, and can have a different set of rolling keys with C. This requires 1 key in B, 1 key in C, and two sets of multiple keys in A.

The rolling key structure can be extended to work with value hierarchy. Suppose A uses value from B, and value in B is replenished by C, then A and B can have one set of rolling keys, and B and C can have a different set of rolling keys and each set of rolling keys can roll at different times and rates. In this example:

A contains multiple variants for use with B

B contains 1 base key for use with A, and multiple variants for use with C

C contains 1 base key for use with B

A compromise of key(s) in a A does not allow an attacker to manufacture clone Bs A compromise of key(s) in B does not allow an attacker to manufacture clone Cs A compromise of the keys in A allows free B resources on that particular A only—no other As are affected A compromise of the base key in B has a limited exposure of effect—free B resources are available to attackers for a limited time, and with each new release of A and C, the amount of exposure is reduced.

A compromise of the base key in C has a limited exposure of effect—free C resources are available to attackers for a limited time, and with each new release of B the amount of exposure is reduced.

In the general case, each of the keys in a set of rolling keys has exactly the same purpose as the others in the set, and is used in the same way in the same QA Devices, but at different times in a product's life span. Each of the keys has a different KeyId. Typically when a set of rolling keys is held in a QA Device, they all belong to the same keygroup.

When the variant/base form of rolling keys is used, at any given time, only one base key is injected during manufacture. This is the current manufactured instance of the rolling key. Several of the key instances can be used in manufacture, in their variant forms. One by one, the current manufactured instance of the rolling key is replaced by subsequent instances of the rolling key.

After a period, or after the discovery of a key compromise, a particular current manufactured instance of a key is replaced by the next instance in the rolling key set in all of the QA Devices where it is used.

A set of rolling keys has the following characteristics:

The number of instances in the set of rolling keys, N. The rolling key instances are from 0 to N-1.

The current manufactured instance of the rolling key. This is the rolling key instance which is currently being inserted into manufactured products, in base form. The current manufactured instance is rolled to the next instance when a suitable length of time has elapsed, or there is the discovery of a key compromise.

The first and last valid instances of the rolling key set. There is likely to be a number of valid key instances either side of the current manufactured instance at any given time.

Rolling key instances which are before the first valid instance are considered to be invalid, and they should be invalidated in any manufactured product in the field whenever they are found. The question is how to enforce the eradication process, especially if the QA Devices are not in direct contact with a central authority of some kind.

The QA Logical Interface allows a particular key in a keyslot to be invalidated (see Section 6.4.2). An external entity needs to know which keys are invalid (for example by knowing the invalid keys' KeyIds). Assuming that the entity can read the KeyIds present in a QA Device the entity can invalidate the appropriate keys in the QA Device. The entity could refuse to operate on a QA Device until the appropriate keys have been invalidated.

For example, suppose a printer system has an ink cartridge and a refill cartridge. The printer system uses rolling key set 1 to communicate with the ink cartridge, and the ink cartridge is refilled from the refill cartridge via rolling key set 2. Whenever a refill cartridge is attached to the system, the refill cartridge contains a specific field containing an invalid key list. The system software in the printer knows that this field contains an invalid key list, and refuses to transfer the ink value from the refill cartridge to the ink cartridge until it has invalidated the appropriate keys on the ink cartridge. Alternatively, every time the system software for the printer is delivered/updated to the printer (e.g. downloaded off the internet), it can contain a list of known invalid keys and can apply these to anything it is connected to, including ink cartridges and refill cartridges. Likewise, if value is injected into a QA Device over the internet, the value server can invalidate the appropriate keys on the QA Device before injection of value. Done correctly, the invalid keys will be deleted from use in all valid systems, thereby reducing the effect of a clone product.

The methods just discussed do not apply if a user exclusively uses fake QA Devices, and never comes into contact with valid QA Devices that have lists of invalid keys; However it is possible that a system can invalidate a key by itself after a particular amount of time, but this requires the system to know the current time, and the time period between invalidating keys. While this provides the feature required, it should not be possible under normal circumstances for a user to lie about the time or to accidentally have the time set to an incorrect one. For example, suppose a user accidentally sets a clock on their computer to the wrong year in the future, the printer attached to the computer should not suddenly invalidate all of the keys for the next 12 months. Likewise, if the user changes the clock back to the previous year, previously invalid keys should not suddenly become valid. This implies the system needs to know a Most Recent Validated Date i.e. a date/time that is completely trustworthy.

If system is in a trusted environment and has an appropriate time keeping mechanism, then MostRecentValidatedDate can be obtained locally. Otherwise the MostRecentValidatedDate can only be obtained when the system comes into contact with another trusted component. The trusted component could be software that runs on system, with a particular build date (and this date is therefore trusted), or a date stored on a QA Device (providing the date is read from the QA Device via keys and can only be set by a trusted source).

It is therefore convenient that at least one of the QA Devices in systems that support rolling keys should define at least two fields for the purposes of key invalidation: a field that contains the invalid key list (a list of invalid keyIds), and a field that contains a date that can contribute to a MostRecentValidatedDate. The Logical QA Interface currently supports a field type specifically for the former (see Appendix B), while the latter depends on the specifics of a particular application.

When allocating KeyIds in a system, it may be convenient to be able to tell if two keys are in the same set of rolling keys simply from based on their KeyIds (therefore independent of instantiation in a keygroup). One way of doing this is to compose the KeyId as 2 parts:

the RollingKeySetId, which would be unique for a given purpose within a QA Device infrastructure the RollingKeyInstance, which specifies the keys within the rolling key set So, for example, if the 18-bit KeyId could be composed of a 10-bit RollingKeySetId, and an 8-bit RollingKeyInstance. Thus each set of rolling keys would have 256 unique key values to be used in the sequence.

6.7.5.1 A Rolling Key Example

For example, in a printer application, the key "ink refill for OEM X" is a rolling key set with 10 instances, numbered 0 to 9. The current manufactured instance of the key is instance 6. The first and last valid instances are 3 and 9.

In this situation, the key instances 0 to 2 are invalid.

For this example, the guideline "product A will use a set of product Bs over its lifetime" has product A as an ink cartridge, and product B as an ink refill cartridge. So the manufacturing process places a set of variant keys in the ink cartridge QA Device, and a single base key in the ink refill cartridge QA Device.

Ink cartridge QA Devices are manufactured with the ink refill keys, in variant form, instances 3 to 9. Keys with instance 3 to 5 will be used with older ink refill cartridges; the key instance 6 will be used with ink refill cartridges currently being manufactured; and keys with instance 7 to 9 will be used with ink refill cartridges that are manufactured in the future (when ink refill cartridges are being made with those base keys in them).

Ink refill cartridge QA Devices are manufactured with a single base key, the ink refill key instance 6.

Both QA Devices are programmed with an invalid key list with entries for the ink refill key, instances 0 to 2.

When the ink refill key is rolled, ink refill cartridges start being manufactured with the ink refill key, instance 7. These refill cartridges still work with the older-ink cartridges, which have the ink refill key, instance 7, in variant form.

6.7.6 Communicating Securely Between a System and QA Devices

Suppose we have a configuration that consists of a system A that communicates with a QA Device B. For example, a printer system that communicates with an Operating Parameter QA Device (e.g. containing the print speed). The system reads the print speed before printing a page.

The only way that A and B can securely communicate is if A and B share a key.

If B has physical security since it is a QA Device, and A does not have such high security, then it is desirable to store the variant form of the key in A and the base form of the key in B. If the key is extracted from A (having less security than B), then at least other systems cannot be subverted with clone Bs.

However there is the question of injecting the variant key into A. If A can be programmed with a variant key after B has been attached (e.g. A contains non-volatile memory), then this is desirable. If A cannot be programmed after B has been attached (such as is the case with the SoPEC ASIC[5]) then A must be programmed with a random number and after attachment to A, the random number must be transported into B. This process is discussed in [4].

A can now create a Trusted QA Device and communicate with B using A's variant key.

However if A requires to communicate with additional components such as C and D which are not connected to A or B during initial manufacture, there is a requirement to allow the communication but additionally minimise loss due to key compromise, especially since A is known to be less secure than QA Devices B, C and D. Examples of C and D include a Consumable QA Device such as an ink cartridge, and a Parameter Upgrader QA Device such as a permanent speed-upgrade dongle.

If the base key that is used in B is also used in C and D, then A can communicate securely with C and D. The risk of loss from a key compromise is higher since C and D share the same key.

If A can hold many keys, i.e. can be programmed with many keys during manufacture, then A can be programmed with appropriate variant keys for C and D using the same scheme as described above for B.

However, if the cost of injecting multiple keys into A is high (for example SoPEC has very little non-volatile memory), then an alternative is required that only uses a single key stored in A. There are two approaches to secure communication in this case: communication via key transport, and communication via signature translation.

6.7.6.1 Communication Via Key Transport

In this communication method, each A has an associated QA Device B. A contains a key (or has the means of generating one) for communication with B. A and B share a common key $k_1$ that is a random number.

The k1 key is stored on B as a transport key that can be used to transport other keys out i.e. KeyType=TransportKey and UseLocally=1.

If B contains data for A to read and/or modify, then B also stores a B_access_key with data access to the fields of B. i.e. KeyType=DataKey and UseLocally=1. Note that B_access_key could also be a rolling key. B_access_key is also transportable out from B i.e. TransportOut=1.

Now A can request that B transport out the B_access_key to A using the k1 key. A can create a Trusted QA for testing signatures from A based on B_access_key, and can generate writes to B based on B_access_key.

Note that security is greatest when the B_access_key values are different for each B. Otherwise a compromise of B_access_key as obtained from an A could subvert value in additional Bs rather than the specific B attached to that A. Different keys could be simply different base keys, but is easily accomplished by storing B_access_key as a variant key within B, and exporting it as such to A, requiring A's Trusted QA to use common signature generation even though the key is a variant.

If all the communication from A was simply to B, then B_access_key would technically not be required. However we must also consider C and D and beyond:

- If C or D are considered to be logical extensions of B, then B_access_key can also be used to access data in C or D. In this case B_access_key should be stored as a base key in C or D, and always exported as a variant key from B (and is most easily stored as a variant key in B) to reduce risk if A's B_access_key is exposed.
- If C or D are not logical extensions of B, then C_access_key and D_access_key can stored in B and these keys can be exported as variant keys from B (and are most easily stored as variant keys in B) to reduce risk if either A's C_access_key or D_access_key is exposed.

In both cases, since C and D contain base keys, and A contains variant keys from B, A must have the same $U_A$ for variant generation as B i.e. A must have the same ChipId as B. (see Section 6.2). In one sense, A has become a trusted form (or extension) of B.

A can now generate Trusted QAs within its system based on the various access keys, and can communicate securely with B, C, and D.

Ideally B_access_key, C access_key, and D_access_key have no ability to increase value in any of the QA Devices. Therefore if any of these keys is obtained, an attacker can only generate value for the local system, and not on a wider scale. These keys are ideally variant keys in B and can additionally be rolling keys.

C requires the C_access_key to be stored within it in base form, and D requires the D_access_key to be stored within it in base form.

As an example of a printer system:

A is a SoPEC

B is a PrinterQA (Operating Parameter QA Device)

C is a Ink Cartridge QA (Consumable QA Device)

D is a speed-upgrader Dongle (Parameter Upgrader QA Device)

E is an ink refill QA (Value Upgrader QA Device)

After A has obtained a consumable_usage_key and operating_parameter_usage_key from B via A and B'shared random number key:

- consumable_usage_key can be used by A to read from C and E, and reduce value in C
- operating_parameter_usage_key can be used by A to read from B and D
- value transfers from E to C use keys shared between E and C, and do not use the consumable_usage_key 6.7.6.2 Communication Via Signature Translation In this communication method, each A has an associated QA Device B. A contains a key (or has the means of generating one) for communication with B. A and B share a common key $k_1$ that is a random number.

If B contains data for A to read and/or modify, then B must set k1 to have those permissions on the specific data fields in B. i.e. KeyType=DataKey and UseLocally=1. Key $k_1$ is not transportable out from B i.e. TransportOut=0.

Thus A can create a Trusted QA and communicate directly with B using $k_1$.

If A also wants to communicate with C, then A can use signature translation techniques [3] so long as:

A and B share a secret ($k_1$)

B and C share a secret ($k_2$)

B is permitted to translate signatures based on $k_2$ into signatures based on $k_1$ and/or vice versa for reads/writes If $k_2$ can only read value in C (i.e. it cannot increase value in C), then B can be used to translate signatures created by $k_2$ based on data read from C into signatures based on $k_1$.

Thus A can perform a read of data from C based on $k_2$, request that B translate the signature received from C into one based on $k_1$, and A can then verify the signature is correct since A also has $k_1$.

If $k_2$ has write permissions in C (e.g. it can decrease value stored in C), then B can be used to translate signatures created by $k_1$ for data writes from A into signatures based on $k_2$ for application to C.

To reduce the risk of loss due to key compromise, $k_2$ should be a variant key, and can also be a rolling key.

If D is required, the same principles apply: B can store $k_3$ for translation of communication with D. Ideally $k_3$ is a variant key, and can also be a rolling key.

However, if B contains more than two keys (treating a rolling key set as 1 key), for example if B contains $k_2$ and $k_3$ and additional keys such as $k_4$ or $k_5$ (e.g. for allowing non-A systems to increase the value stored in B) then B should not allow arbitrary translation between keys. Otherwise an attacker could translate write requests from a known key (e.g. they obtained $k_1$ from A) into writes to $k_4$ or $k_5$ etc.

In this case, B requires a map that specifies allowable translations. For example, the map could specify that signatures based on reads can be translated only from $k_2$ and $k_3$ into $k_1$, signatures based on writes can be translated only from $k_1$ into $k_2$ and $k_3$, and no other signature will be translated.

The translation map could be hard-coded into the QA Device (e.g. a particular implementation may allow only signatures based on data reads to be translated, and only from signatures based on keys in keygroups 1-3 to signatures based on keys in keygroup 0), or it could be an additional key related structure with appropriate functions to manipulate the map.

Each translation map can be implemented as a bitmap, where X specifies from, Y specifies to, a 1 in the bit position allows the translation, and a 0 in the bit position prohibits the translation. A number of bitmaps could be used, one bitmap for translation of signatures based on data reads, another bitmap for translation of signatures based on data writes etc.

The current QA Logical Interface does not currently support translation, and has no support for translation map representation.

6.7.7 Communication Between Multiple System Entities

Some application configurations consist of multiple entities, where the connection links between each entity are not inherently secure. A multi-SoPEC system is such a system.

To create secure communication between these entities, the principles applied in Section 6.7.6 can be applied between the entities.

6.7.7.1 Method 1: Key Transport

Each of n entities E1-En is injected with a corresponding random number $k_1$-$k_n$ (each $k_i$ is different for each entity), and a QA Device A is attached to E1. A contains all of the keys $k_1$-$k_n$ as transport keys, and one of the keys, $K_x$ (where $K_x$ is one of the keys $k_1$-$k_n$) has TransportOut set to 1, while the TransportOut setting for all other transport keys is 0.

The startup process involves transferring $K_x$ to all entities so that it can be used as the InterEntityKey i.e. a secure key for communication between the entities. The startup process is as follows:

E1 requests the A to transport the $K_x$ from the PrinterQA to E1 via $k_1$ as the transport key.

E2 requests the InterEntityKey from E1. Since E1 does not know $k_2$, E1 cannot directly send $K_x$ to SoPEC2. However E1 can requests A to transport $k_2$ from A to E2 via $k_2$ as the transport key. Within E2, the received key is only known as the InterEntityKey.

The same process is followed to transport $k_3$ into E3, $k_4$ into E4, and so on.

E1-En now all share $K_x$. The choice of $K_x$ is arbitrary—it could be $k_1$ for convenience. $K_x$ is a transport key. within each of the entities. One of the entities can now transport a data key for all to share (e.g. E1 may transport the bit-pattern used for $k_1$ to all the others as a data key), or simply each entity can create local Trusted QAs with $K_x$ as a data key. The result is equivalent—one of the keys can be used to communicate securely between the entities.

Alternatively, instead of transporting $K_x$ out of A, an additional DataKey KY can be stored in A and $k_1$-$k_n$ are simply used to transport $K_y$ from A into E1-En respectively (so that $k_1$-$k_n$ are all TransportOut=0 and $K_y$ has TransportOut=1). Given that each of the keys $k_1$-$k_n$ and $K_y$ are all equivalently available there is no particular advantage to this step other than the fact that Ky is transported as a DataKey by default.

If all the keys do not fit within a single QA Device, additional QA Devices may be required, as long as each QA Device stores at least $K_x$ or $K_y$ depending on the method used as above.

6.7.7.2 Method 2: Signature Translation

In this case, each of n entities E1-En is injected with a corresponding random number $k_1$-$k_n$ (each $k_i$ is different for each entity), and a QA Device A is attached to one of the entities E1. A contains all of the keys $k_1$-$k_n$ as data keys, and the TransportOut setting for all keys is 0.

A is simply used to translate between signatures based on any of the keys. In the simplest example of equally trusted entities, $k_1$-$k_n$ are all equally trusted, so no translation map is required for the translation function.

For Ei to read data from Ej, Ei performs an authenticated read from Ej requesting the signature to be based on $k_i$. Ei then requests A to translate the signature from being based on $k_j$ to be one based on $k_i$. Ei can then verify the signature and hence the data.

For Ei to write data to Ej, Ei generates a signature based on $k_i$, requests A to translate the signature from being based on $k_i$ to be one based on $k_j$. Ej can then verify the signature and hence the write request.

Although the Translate function is not currently supported in the QA Logical Interface, a specific implementation of the QA Logical Interface that included Translate for this purpose (i.e. this particular application) would be possible, especially for the simple case where a translation map is not required.

7 Session-Related Structures

Data that is valid only for the duration of a particular communication session is referred to as session data. Session data ensures that every signature is based on different data (sometimes referred to as a nonce) and this prevents replay attacks.

7.1 R

R is a 160-bit random number seed that is specified when a QA Device is instantiated and from that point on it is internally managed and updated by the QA Device. R is used to ensure that each signed item contains time varying information (not chosen by an attacker), and each QA Device's R is unrelated from one QA Device to the next.

This R is used in the generation and testing of signatures.

An attacker must not be able to deduce the values of R in present and future devices. Therefore, at device instantiation, R should be specified by a cryptographically strong random number, gathered from a physically random phenomenon (must not be deterministic).

7.2 Advancing R

In order that each signature is based on different data, the rules for updating R within a QA Device are as follows:

Reads of R do not advance R.

Every time a signature is produced with R, R is advanced to a new random number.

Every time a signature including R is tested and is found to be correct, R is advanced to a new random number.

7.3 $R_G$ and $R_C$

Each signature is based on 2 Rs:

$R_G$ is the generator's nonce. It comes from the QA Device that generated the signature. This is so the generator never signs anything without inserting some time varying component. This protects the generator from the checker, in case the checker is actually an attacker performing a chosen text attack.

$R_C$ is the checker's nonce. It comes from the QA Device checking the signature. This is so the checker can ensure that the generating QA Device isn't simply replaying an old signature i.e. the challenger is protecting itself against the challenged.

Every signature is generated over a base message appended with $R_G$ and $R_C$. Thus:

signature=signature_function(base_message|$R_G$|$R_C$)

The generator of a signature needs to be told the checker's $R_C$. Likewise, the checker of a signature needs to be told $R_G$.

8 Field-Related Structures

The primary purpose of a QA Device is to securely hold application-specific data. For example if the QA Device is a Consumable QA Device for a printing application it may store ink characteristics and the amount of ink remaining.

For secure manipulation of data:

Data must be clearly identified (includes typing of data).

Data must have clearly defined access criteria and permissions.

Data must be able to be transferred securely from one QA Device to another, through a potentially insecure environment.

In addition, each QA Device must be capable of storing multiple data elements, where each data element is capable of being manipulated in a different way to represent the intended use of that data element. For convenience, a data element is referred to as afield.

The QA Chip Logical Interface fields permit these activities.

The QA Device contains a number of kinds of data with differing access requirements. These data are stored in fields. For example:

Data that can be decremented by anyone, but only increased in an authorised fashion e.g. the amount of consumable-remaining in an ink cartridge.

Data that can only be decremented in an authorised fashion e.g. the number of times a Parameter Upgrader QA Device has upgraded another QA Device.

Data that is normally read-only, but can be written to (changed) in an authorised fashion e.g. the operating parameters of a printer.

Data that is always read-only and doesn't ever need to be changed e.g. ink attributes or the serial number of an ink cartridge or printer.

Data that is written by QACo/Silverbrook, and must not be changed by the OEM or end user e.g. a licence number containing the OEM's identification that must match the software in the printer.

Data that is written by the OEM and must not be changed by the end-user e.g. the machine number that filled the ink cartridge with ink (for problem tracking).

Fields are implemented using two storage areas in a QA Device, called the Read-Write Storage Array (RWS), and the Read-Only Storage Array (ROS).

8.1 Read-Only Storage Array (ROS)

The Read-Only Storage Array is storage that can be written to once only, and after that can only be read.

The Read-Only Storage Array contains all of the field descriptors, and the field values for the read-only fields. Each element of the array can only be written to once, to avoid the possibility of changing the type or access permissions of something after it has been defined.

A particular implementation of a QA Device will have a certain capacity for its Read-Only Storage Array. This value is returned as part of the response to the Get Info command.

At QA Device instantiation, there may be some read-only fields that are programmed into the Read-Only Storage Array. Apart from those fields, the Read-Only Storage Array is initialised to 0.

8.2 Read-Write Storage Array (RWS)

The Read-Write Storage Array is storage that is repeatedly readable and updateable.

The Read-Write Storage Array is used to store the values of writeable fields.

A particular implementation of a QA Device will have a certain capacity for its Read-Write Storage Array. This value is returned as part of the response to the Get Info command.

The Read-Write Storage Array is described in more detail in Section 29.8.2.

At QA Device instantiation, the whole of the Read-Write Storage Array is 0 and no writeable fields are defined.

8.3 Field Descriptors

Each field has a structure called a field descriptor, which defines the characteristics of the field. The field descriptors live in the Read-Only Storage Array.

The system uses the field descriptors to identify the type of data stored in a field so that it can perform operations using the correct data. For example, a printer system identifies which of a consumable's fields are ink fields (and which field is which ink) so that the ink usage can be correctly applied during printing.

Field descriptors are composed of 1, 2 or 3 32-bit words, and have a set of bit-fields which describe various characteristics of fields. The bit-fields are described in Table 325.

The following bit-fields are common to all fields:

Writeable: This is a boolean flag that controls whether the field is able to be repeatedly updated, or written once and subsequently is read-only.

Field Type: The field type defines what the field value represents. For example, the field type might be "cyan ink", in which case the field value is a measure of ink volume; it might be "printer licence", in which case the field value is a printer licence number, with an implied set of printer features, and so on. Table 329 in Appendix B lists the field types that are specifically required by the QA Chip Logical Interface and therefore apply across all applications.

Authenticated Write Key Group: This bit-field is the keygroup number of the keys which may authenticate writes to this field.

Transfer Mode: This bit-field controls the transfer operations which may be done to or from this field. The transfer modes are described in more detail in Table 325.

These bit-fields are present in some field descriptors, depending on the value of the Writeable and Transfer-Mode bit fields:

Written: This bit-field is only present in read-only fields. It is zero before the field has been assigned to, and subsequently non-zero.

Length: This bit-field is the number of 32-bit words in the field value. The field value can be any length from 1 to 16.

Only Decrements Allowed: This bit-field is a boolean value. If it is 1, assignments may only decrease the field value. Otherwise, assignments may increase or decrease the field value.

Non-Authenticated Decrements: This bit-field is a boolean value. If it is 1, then non-authenticated assignments may be made to this field, as long as they decrease the field value.

Decrement-Only Key Group Mask: This bit field is a bit-mask of keygroup numbers. If a bit is set, then keys in that keygroup may make assignments to this field, even if they are not in the Authenticated Write Key Group, as long as the assignment decreases the field value. This means that keys in more than one keygroup can authenticate assignments to a field: one keygroup for arbitrary updates, and the others for decrements only.

Transmit Delta Enable: This bit-field is a boolean value. If it is 1, then the value in the field can be the source of a Transfer Delta function.

Maximum Allowed: This bit-field sets a limit to the field value. Assignments to the field value which would leave the field value exceeding the limit implied by this field will fail. This bit-field is present to mitigate against the risk of unreasonable quantities of value being stored in this field.

Who I am and Who I Accept: These bit-fields define compatibility of fields, for the purpose of transfers. They allow groups of QA Devices to allow or disallow transfers.

Upgrading From Option and Upgrading To Option: These bit-fields define the upgrade option that to be assigned during a Transfer Assign command.

The field descriptors are created using the Create Fields command. Once field descriptors have been created, they cannot be changed or deleted, because they are in Read-Only Storage Array.

8.4 Field Values

Field values are secure non-volatile storage. The length of a field is the number of consecutive 32-bit words it occupies. This can be up to 16 words for non-transferrable fields, and up to 2 words for transferrable fields.

Writeable field values are stored in the Read-Write Storage Array, and can be repeatedly updated, subject to proper authentication.

Read-only field values are stored in the Read-Only Storage Array, and can be written to once. Thereafter they are read-only.

A field descriptor must be defined before the field value can be written. The Create Fields command initialises the field value to 0, except for the case of a decrement-only field, in which case the Create Fields command initialises it to all Is.

8.5 Examples of Fields 8.5.1 A Set of Fields in a QA Device

Suppose for example, we want to allocate some fields as follows:

field 0: manufacture date. (write once then read-only, 1 word)

field 1: volume of magenta ink (writeable, 2 words)

field 2: printer feature (writeable, 1 word)

field 3: quantity of licences (writeable, 1 word)

field 4: printer licence (write-once then read-only, 1 word)

Manufacture date occupies 2 words of ROS. The manufacture date field value occupies ROS[1] and is the time of manufacture, in seconds since midnight Jan. 1, 1970. The field descriptor occupies ROS[0], and specifies:

Read-only
TransferMode=0 (Other)
Type=manufacture date
Written=1
Size=1 word

Volume of magenta ink occupies 2 words of ROS and 2 words of RWS. The field value is ink measured in picolitres, and occupies RWS[0-1]. The field descriptor is 2 words long, occupies ROS[2-3], and specifies:

Writeable
TransferMode=quantity of consumables
Type=magenta ink
Size=2 words
Maximum allowed=a value which limits how much the value can be set to (e.g. 128 mL)

The second word of the field descriptor is the compatibility word, with the "who I am" and "who I accept" fields.

The printer feature occupies 2 words of ROS and 1 word of RWS. The field value is the printer feature value, and occupies RWS[2]. The field descriptor is 2 words long, occupies ROS[4-5], and specifies:

Writeable
TransferMode=Single property
Type=printer feature (e.g. number of pages per minutes)
Size=1 word The second word of the field descriptor is the compatibility word, with the "who I am" and "who I accept" fields.

The quantity of licences occupies 3 words of ROS and 1 word of RWS. The field value is the number of licences upgrades, and occupies RWS[3]. The field descriptor is 3 words long, occupies ROS[6-8], and specifies:

- Writeable
- TransferMode=Quantity of properties
- Type=the licence number (This implies a list of supported features, the options that the features may take, and a list of supported consumables.)
- Size=1 word
- Maximum allowed=a value which limits how much the value can be set to (e.g. 1024 licences)
- The second word of the field descriptor is the compatibility word, with the "who I am" and "who I accept" fields.
- The third word of the field descriptor is the "upgrade to option" and "upgrade from option" values. This allows a transfer to enforce that when a licence is being assigned, it was previously 0, and what it is assigned to.

The printer licence occupies 3 words of ROS. The field value is a licence number, and since it is only assignable once, it occupies ROS[1]. The field descriptor is 2 words long, occupies ROS[9-10], and specifies:

- Write-once then read-only
- TransferMode=Single property
- Type=the licence number (This implies a list of supported features, the options that the features may fake, and a list of supported consumables.)
- Size=1 word
- The second word of the field descriptor is the compatibility word, with the "who I am" and "who I accept" fields.

Figure 399:
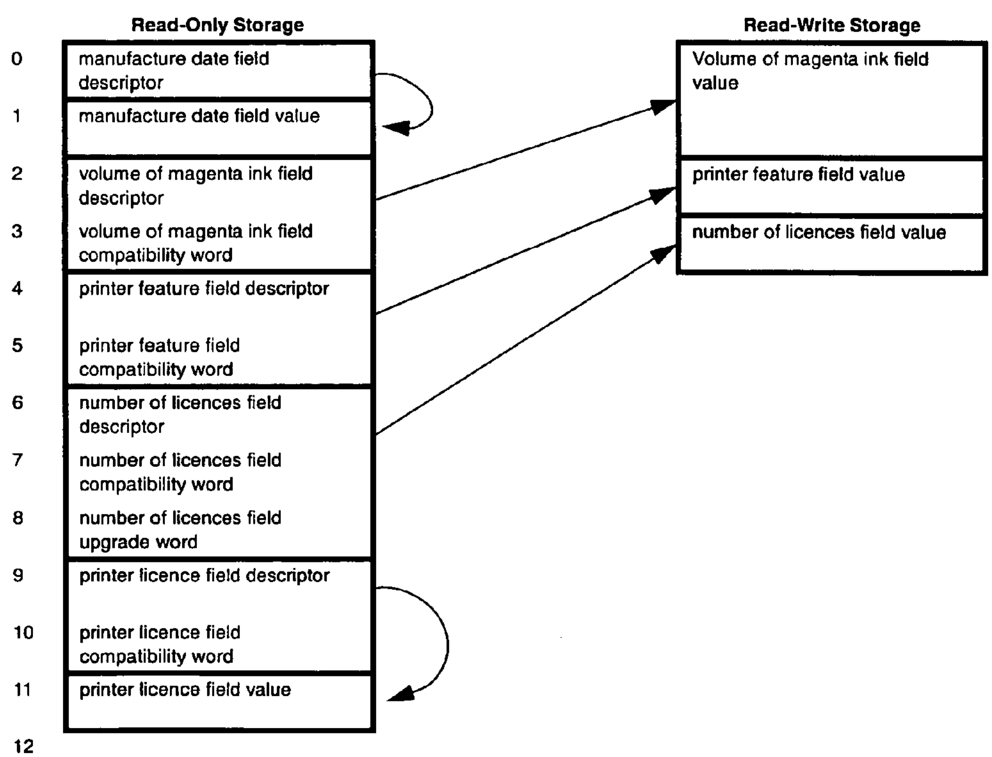
FIG. 399 An allocation of words in memory vectors

FIG. 399 contains a map of the memory vectors for this example configuration:

8.5.2 Example: Determining the Number of Fields

The following pseudocode illustrates a means of determining the number of fields:

```
integer field_descriptor_length(ROS_index)
        transfer_mode = ROS[ROS_index] & fd_transfer_mode_mask
        switch(transfer_mode)
          case tm_other:
            return 1
          case tm_single_property:
            return 2
          case tm_quantity_of_consumables:
            return 2
          case tm_quantity_of_properties:
            return 3
        end switch
end
integer field_value_length(ROS_index)
        transfer_mode = ROS[ROS_index] & fd_transfer_mode_mask
        switch(transfer_mode)
          case tm_other:
            return (ROS[ROS_index] & fd_length_mask_tm_other) + 1
          case tm_single_property:
            return 1
          case tm_quantity_of_consumables:
            return (ROS[ROS_index] & fd_length_mask_tm_quantity) + 1
          case tm_quantity_of_properties:
            return (ROS[ROS_index] & fd_length_mask_tm_quantity) + 1
        end switch
end
integer find_number_of_fields(ROS)
        ROS_index = 0
        limit = MAX_FIELDS # (implementation-dependent: 256 or 32
        for (field_num = 0; ROS_index < limit && ROS[ROS_index] != 0; field_num
++)
          fd_length = field_descriptor_length(ROS_index)
          fv_length = field_value_length(ROS_index)
          writeable = ROS[ROS_index] & fd_writeable_mask
          ROS_index += fd_length
          if !writeable
            ROS_index += fv_length
        end for
        return field_num
end
```

8.5.3 Locating a Field by its Number

The following pseudocode illustrates a means of determining where a field's descriptor and value are located, given a field number:

```
find__field__locations(field__num)
        ROS__index = 0
        RWS__index = 0
        limit = MAX__FIELDS # (implementation-dependent: 256 or 32)
        for (i = 0; i < field__num && ROS__index < limit && ROS[ROS__index] != 0; i
++)
          fd__length = field__descriptor__length(ROS__index)
          fv__length = field__value__length(ROS__index)
          writeable = ROS[ROS__index] & fd__writeable__mask
          ROS__index += fd__length
          if !writeable
            ROS__index += fv__length
          else
            RWS__index += fv__length
        end for
        // we return 6 things: the vector (which can be RWS or ROS) and the
        // vector index into that vector (which can be 0.. limit), for the
        // field descriptor and its value. We return −1s for the error case
        if (i == field__num)
          if writeable
            // read-only field descriptor, writeable field value
            return ROS, ROS__index, fd__length, RWS, RWS__index, fv__length
          else
            // read-only field descriptor, read-only field value
            return ROS, ROS__index, fd__length, ROS, ROS__index + fd__length,
fv__length
        else
          return (−1, −1, 0, −1, −1, 0)     // error − field number out of range
end
```

8.5.4 Permissions for an Ink Volume

This is an example of the field permissions which might be set up for an ink volume field:

It can have authenticated writes to an arbitrary value, when signed by a key in keygroup 2, It can be decremented in an unauthenticated write, (and this may be so that the process is quicker)

Table 285 defines the values of the field descriptor bitfields controlling permission for this example:

TABLE 285

Example Field Permissions for an Ink Volume

| Authenticated Write KeyGroup | Only Decrements Allowed | Non-authenticated Decrements | Decrement-only Keygroup Mask |
|---|---|---|---|
| 2 | N/A | 1 | 1111[5] |

[5]The decrement-only mask of keygroups is all 1s, because non-authenticated decrements are allowed Note that the bit field "Only Decrements Allowed" is not present for the case of ink volumes, which have a Transfer-Mode of "quantities of consumables".

8.5.5 Permissions for a Printer Feature

This is an example of the field permissions which might be set up for printer feature:

It can have authenticated writes to an arbitrary value, when signed by a key in keygroup 1, It cannot be decremented.

Table 286 defines the values of the field descriptor bitfields controlling permission for this example:

TABLE 286

Example Field Permissions for a Printer Feature

| Authenticated Write KeyGroup | Only Decrements Allowed | Non-authenticated Decrements | Decrement-only keygroup mask |
|---|---|---|---|
| 1 | N/A | N/A | N/A |

The bit fields "Only Decrements Allowed", "Non-authenticated Decrements" and "Decrement-only Keygroup Mask" are not present in this example, because the Transfer Mode is "single property".

8.5.6 Permissions for a Rollback Enable Counter

This is an example of the field permissions which might be set up for a rollback enable field:

It can have authenticated writes when signed by a key in keygroup 3,

It can only be decremented.

Table 287 defines the values of the field descriptor bitfields controlling permission for this example:

TABLE 287

Example Field Permissions for a Rollback Enable Counter

| Authenticated Write KeyGroup | Only Decrements Allowed | Non-authenticated Decrements | Decrement-only keygroup mask |
|---|---|---|---|
| 3 | 1 | 0 | 0000 |

This field is initialised to all Is when it is created, and from then on, can only be decremented.

Overview of QA Device Interface

9 The QA Device Protocol

This chapter describes the protocol for communicating with a QA Device. Although the implementation of a QA Device varies, with one implementation having different capabilities from another, the same interface applies to all.

QA Devices are passive: commands are issued to them by the System, which is an entity mediating the communications between the QA Devices.

There are up to three QA Devices that are relevant to each command:

The Commanded QA Device, i.e. the QA Device receiving the command. This QA Device checks any incoming signature (if present), performs the command, and generates the output parameters and any outgoing signature as required.

The Incoming Signature QA Device, that generated the incoming signature (if it is present). This is usually a QA Device that produces and signs the input for the command as its output, but it might be a Translation QA Device.

The Outgoing Signature QA Device, that checks the outgoing signature (if it is present). This is usually a QA Device that accepts as input the output of the command, but it might be a Translation QA Device.

The QA Device Protocol lists a set of commands that can be sent to a QA Device, and for each command, there is a set of valid responses. The protocol defines the features that are common to the commands.

9.1 General Command and Response Format

A command consists of a number of 32-bit words where the first byte of the first word contains a command byte, and subsequent words contain up to four of the following blocks of data:

An UnsignedInputParameterBlock. This is a set of input parameters with no accompanying signature.

An InputSignatureCheckingBlock. This is a block of data that tells the QA Device how to check if the SignedInputParameterBlock is correctly signed. It includes the signature, and information about how it was constructed.

A SignedInputParameterBlock. This is a set of input parameters. It is often a list of entities, or entity descriptors. The signature in the InputSignatureCheckingBlock is over this block and the generator's and checker's nonces. A SignedInputParameterBlock has a QA Device's ChipId as its first element. If the SignedInputParameterBlock is list of entities with the modify bit set, then the ChipId must be the identifier of the chip being addressed (this ensures that a signed block for one QA Device cannot be applied to another)

An OutputSignatureGenerationBlock. This is a block of data that tells the QA Device how to generate a signature on the outgoing data.

The response to a command consists of a number of 32-bit words, where the first byte of the first word contains a response byte, and subsequent words contain up to two of the following blocks of data:

An OutputParameterBlock. This is often a list of entities. It may or may not be signed. If it is signed, it has a QA Device's ChipId as its first element. If the OutputParameterBlock is list of entities with the modify bit clear, then the ChipId must be the identifier of the chip responding to the command.

An OutputSignatureCheckingBlock. This is present if the OutputParameterBlock is signed. The signature is generated according to the OutputSignatureGenerationBlock.

The arrangement of data within each 32-bit word is arranged in big-endian format. The assumption is that the System and the QA Device are processing the commands and responses in big-endian format.

All of the blocks in both command and response are length-tagged: the first 32-bit word contains a two-byte length that indicates the block length in 32-bit words, followed by the block data itself. The length is inclusive. Thus the length for a parameter block with no data content is 1, as shown in Table 288.

TABLE 288

Command or Response Block with no content

| Bits 31-24 | Bits 23-16 | Bits 15-8 | Bits 7-0 |
|---|---|---|---|
| block length in 32-bit words = 1 | | unused = 0 | unused = 0 |

9.2 The Purpose of ChipId in Signed Parameter Blocks

The QA Device identifier ChipId is present in all SignedInputParameterBlock and signed OutputParameterBlock entity lists. This ensures that a signature over the block of data uniquely identifies the QA Device that the list is for or came from. This prevents attacks where commands that are intended for one QA Device are redirected to another, or when responses from one QA Device are passed off as being from another.

If the list is an incoming modify-entity list or an outgoing read-entity list, then the list ChipId must be the ChipId of the Commanded QA Device. If it is not, then the command fails.

If the list is an incoming read-entity list or an outgoing modify-entity list, then the list ChipId is typically the ChipId of some other QA Device.

A signed outgoing list of entities being read from a QA Device has a signature over a block of data that includes that QA Device's ChipId. Thus ensures that the data cannot be mistaken for data from another QA Device.

Similarly, a signed incoming list of entities being written to a QA Device has a signature over a block of data that includes that QA Device's ChipId. This ensures that the data cannot be wrongly applied to any other QA Device.

In the operation of some commands, a Commanded QA Device accepts a signed Entity List as input, where the Entity List was generated by another QA Device A, and produces a signed Entity List as output where the output is suitable to be subsequently applied to A as an incoming Entity List. These commands include:

Get Key

Transfer Delta

Transfer Assign

Start Rollback 9.3 Unsigned I/O Parameter Blocks that are Entity Descriptor Lists The UnsignedInputParameterBlock of a command, and the OutputParameterBlock of a response, are frequently composed of an Entity Descriptor List. Table 289 describes the format of an unsigned Entity Descriptor List:

TABLE 289

| Unsigned Command or Response Block with an Entity Descriptor List | | | |
|---|---|---|---|
| Bits 31-24 | Bits 23-16 | Bits 15-8 | Bits 7-0 |
| block length in 32-bit words = 1 + [N+1]/2 | | Number of Entities = N | |
| Entity Descriptor 0 | | . . . | |
| Entity Descriptor N−1 | | Padding of sixteen 0s to round up to the next multiple of 32 bits, (if required) | |

The Entity Descriptors are described in more detail in Table 328.

9.4 Signed I/O Parameter Blocks that are Entity Descriptor Lists

The SignedInputParameterBlock of a command, and the signed OutputParameterBlock of a response, are frequently composed of an Entity Descriptor List. Table 290 describes the format of a signed Entity Descriptor List:

TABLE 290

| Signed Command or Response Block with an Entity Descriptor List | | | |
|---|---|---|---|
| Bits 31-24 | Bits 23-16 | Bits 15-8 | Bits 7-0 |
| block length in 32-bit words = 3 + [N+1]/2 | | Number of Entities = N | |
| Chip Identifier of Target QA Device (2 words) | | | |
| Entity Descriptor 0 | | . . . | |
| Entity Descriptor N−1 | | Padding of sixteen 0s to round up to the next multiple of 32 bits, (if required) | |

The Entity Descriptors are described in more detail in Table 328.

9.5 Unsigned I/O Parameter Blocks that are Entity Lists

The UnsignedInputParameterBlock of a command, and the OutputParameterBlock of a response, are frequently composed of an Entity List. Table 291 describes the format of an unsigned Entity List:

TABLE 291

| Unsigned Command or Response Block with an Entity List | | | |
|---|---|---|---|
| Bits 31-24 | Bits 23-16 | Bits 15-8 | Bits 7-0 |
| block length in 32-bit words = X | | Number of Entities = N | |
| Entity Descriptor 0 | | Padding of sixteen 0s | |
| Entity 0. This may be a field descriptor and/or its field value, or a key descriptor and/or its encrypted value. This is a variable number of words long. | | | |
| . . . | | | |
| Entity Descriptor N−1 | | Padding of sixteen 0s | |
| Entity N−1. This may be a field descriptor and/or its field value, or a key descriptor and/or its encrypted value. This is a variable number of words long. | | | |

The Entity Descriptors are described in more detail in Table 328.

9.6 Signed I/O Parameter Blocks that are Entity Lists

The SignedInputParameterBlock of a command, and the OutputParameterBlock of a response, are frequently composed of an Entity List. Table 292 describes the format of a signed Entity List:

TABLE 292

| Signed Command or Response Block with an Entity List | | | |
|---|---|---|---|
| Bits 31-24 | Bits 23-16 | Bits 15-8 | Bits 7-0 |
| block length in 32-bit words = X | | Number of Entities = N | |
| Chip Identifier of Target QA Device (2 words) | | | |
| Entity Descriptor 0 | | Padding of sixteen 0s | |
| Entity 0. This may be a field descriptor and/or its field value, or a key descriptor and/or its encrypted value. This is a variable number of words long. | | | |
| . . . | | | |
| Entity Descriptor N−1 | | Padding of sixteen 0s | |
| Entity N−1. This may be a field descriptor and/or its field value, or a key descriptor and/or its encrypted value. This is a variable number of words long. | | | |

The Entity Descriptors are described in more detail in Table 328.

9.7 InputSignatureCheckingBlocks

Table 293 describes the format of an InputSignature-CheckingBlock:

TABLE 293

| InputSignatureCheckingBlock | | | |
|---|---|---|---|
| Bits 31-24 | Bits 23-16 | Bits 15-8 | Bits 7-0 |
| block length in 32-bit words = 11 or 13 | | Key slot number for the key in the Commanded QA Device that should be used for checking the signature. | VKSGR (Variant Key Signature Generation Required). |
| Chip Identifier. This is present if VKSGR is 1, and absent if VKSGR is 0. It is the Chip Identifier of the Incoming Signature QA Device. (2 words) | | | |
| RG = Generator's Nonce. This is a nonce from the Incoming Signature QA Device. (5 words) | | | |
| Signature. This is Sign[Key, SignedInputParameterBlock\|$R_G$\|$R_C$]. (5 words) | | | |

VKSGR (Variant Key Signature Generation Required) is 0 if the stored key is to be used directly to check the incoming signature, and is 1 if the variant form of the stored key is to be used to check the incoming signature. VKSGR will be non-zero if the Commanded QA Device has a base key and the Incoming Signature QA Device has a variant key.

If the InputSignatureCheckingBlock is present in a command, it means that the SignedInputParameterBlock is present and has been signed, and the provided signature should match. If the signature doesn't match, then the command fails.

The key used to sign the block is the key in the chosen keyslot. The key is used directly if VKSGR is 0, and the variant form of the stored key is used if VKSGR is non-zero. The variant key is generated from the stored key and the provided ChipId using the method described above.

The signature is over the SignedInputParameterBlock and two nonces:

$R_G$, provided from the generator, $R_C$, provided by the checker i.e. the nonce of the Commanded QA Device.

The generation of a signature is performed using HMAC_SHA1 (see [1]). This operation must take constant time irrespective of the value of the key.

9.8 OutputSignatureGenerationBlocks

Table 294 describes the format of an OutputSignatureGenerationBlock:

TABLE 294

OutputSignatureGenerationBlock

| Bits 31-24 | Bits 23-16 | Bits 15-8 | Bits 7-1 | Bit 0 |
|---|---|---|---|---|
| block length in 32-bit words = 8 or 10 | | Key slot number for the key in the Commanded QA Device that should used for generating the signature. | unused = 0 | VKSGR (Variant Key Signature Generation Required). |
| Chip Identifier of Output Signature QA Device. This is present if VKSGR is 1; otherwise it is absent. It is the Chip Identifier of the Outgoing Signature QA Device. (2 words) | | | | |
| $R_C$ = Checker's nonce. This is the Outgoing Signature QA Device's nonce, used by the Commanded QA Device when generating the outgoing signature. The signature is Sign[K, OutputParameterBlock\|$R_G$\|$R_C$] (5 words) | | | | |

VKSGR (Variant Key Signature Generation Required) is 0 if the stored key is to be used directly to generate the outgoing signature, and is 1 if the variant form of the stored key is to be used to generate the outgoing signature. VKSGR will be non-zero if the Commanded QA Device has a base key and the Outgoing Signature QA Device has a variant key.

9.9 OutputSignatureCheckingBlock

Table 295 describes the format of an OutputSignatureCheckingBlock:

TABLE 295

OutputSignatureCheckingBlock

| Bits 31-24 | Bits 23-16 | Bits 15-8 | Bits 7-0 |
|---|---|---|---|
| block length in 32-bit words = 11 | | Unused = 0 | |
| $R_G$ = the generator's nonce, used by the Commanded QA Device when generating the outgoing signature. (5 words) | | | |
| Signature. This is Sign[K, OutputParameterBlock\|$R_G$\|$R_C$], generated using the selected key, optionally turned into a variant by the given Chip Id. (5 words) | | | |

A response has an OutputSignatureCheckingBlock if and only if the command had an OutputSignatureGenerationBlock.

If this block is present in a response, it means that the OutputParameterBlock is signed, and the provided signature must match. If the signature doesn't match, then the Outgoing Signature QA Device (the QA Device that checks the response) fails.

The key used to sign the block is the key that was selected in the OutputSignatureGenerationBlock.

The signature is over the OutputParameterBlock and two nonces:

$R_G$, provided by the generator i.e. the nonce of the QA Device sending the response, $R_C$, provided by the checker (provided in the OutputSignatureGenerationBlock).

The generation of a signature is performed using HMAC_SHA1 (see [1]). This operation must take constant time irrespective of the value of the key.

The OutputParameterBlock from some commands must be formatted in such a way that it can be used as the Input Parameter Block for a command on another QA Device. In this case, the System converts the OutputSignatureCheckingBlock from one command into the InputSignatureCheckingBlock for another command on another QA Device, and uses the signed OutputParameterBlock from one command as the SignedInputParameterBlock on the other QA Device.

Basic Functions

10 Definitions

This section defines command codes, return codes and constants referred to by functions and pseudocode.

10.1 The QA Device Command Set

Commands in the QA Device command set are distinguished by CommandByte.

Table 296 describes the CommandByte values:

TABLE 296

Values and Interpretation for CommandByte

| CommandByte | Value | Description |
|---|---|---|
| GET INFO | 1 | Get summary of information from the QA Device |
| GET CHALLENGE | 2 | Get a nonce from the QA Device. |
| LOCK KEY GROUPS | 3 | Lock a specified set of keygroups. This prevents any keys in the keygroups from being subsequently replaced. |
| LOCK FIELD CREATION | 4 | Lock all field creation in the QA Device. Locking field creation prevents any fields from subsequently being created. |
| READ | 5 | Read a group of key descriptors, field descriptors and/or field values from a QA Device. |

TABLE 296-continued

Values and Interpretation for CommandByte

| CommandByte | Value | Description |
|---|---|---|
| AUTHENTICATED READ | 6 | Read a group of key descriptors, field descriptors and/or field values from a QA Device. The results are accompanied by a signature to authenticate the results. |
| AUTHENTICATED READ WITH SIGNATURE ONLY | 7 | Specify a group of key descriptors, field descriptors and/or field values in a QA Device, and read the signature over that data. |
| WRITE | 8 | Write a group of field values to fields in the QA Device. |
| AUTHENTICATED WRITE | 9 | Write a group of field values to fields in the QA Device. The write command is authenticated by a signature over the list of field values. |
| CREATE FIELDS | 10 | Create a group of fields in a QA Device. |
| REPLACE KEY | 11 | Replace a key in a QA Device. |
| INVALIDATE KEY | 12 | Make a key in a QA Device invalid. |
| GETKEY | 13 | Get an encrypted key from a QA Device. |
| TEST | 14 | Request a QA Device to test the signature over an arbitrary block of data. |
| SIGN | 15 | Request a QA Device to create a signature over an arbitrary block of data. |
| TRANSFER DELTA | 16 | Request a QA Device to transfer some value from it to another QA Device where the value is correspondingly reduced in the Commanded QA Device). |
| TRANSFER ASSIGN | 17 | Request a QA Device to transfer an assignment of value to another QA Device.. |
| START ROLLBACK | 18 | Request a QA Device to begin rollback proceedings to ensure that a previously transferred value has not and can never be used. |
| ROLLBACK | 19 | Request a QA Device to undo a previously requested transfer of value to another QA Device. |

10.2 ResultFlag—The List of Responses to Commands

The ResultFlag is a byte that indicates the return status from a function. Callers can use the value of ResultFlag to determine whether a call to a function succeeded or failed, and if the call failed, the specific error condition.

Table 297 describes the ResultFlag values and the mnemonics used in the pseudocode

TABLE 297

ResultFlag value description

| Mnemonic | Value | Description |
|---|---|---|
| Pass | 0 | Function completed successfully. Function successfully completed requested task. |
| Fail | 1 | General failure. An error occurred during function processing. |
| QA NotPresent | 2 | QA Device is not contactable |
| Invalid Command | 3 | The QA Device does not support the command |
| Bad Signature | 4 | Signature mismatch. The input signature didn't match the generated signature. |
| Invalid Key | 5 | Invalid keyslot number. The keyslot specified is greater than the number of keyslots supported in the QA Device, or the key in the specified keyslot is invalid. |
| Invalid Key Type | 6 | The key in the requested keyslot is the wrong type for the particular operation. For example, a TransportKey was requested for a data-based signature, or a DataKey was requested for a key-based signature. |
| Key Number Out Of Range | 7 | A key was specified for a signature which had a key slot number out of range |
| Key Not Locked | 8 | A command was received, authenticated by an unlocked key. Unlocked keys may not be used to authenticate any operations, with the exception of the transport of keys, to authenticate and encrypt new key values. |
| Signature Generation Block Absent | 9 | A OutputSignatureGenerationBlock was not received in a command which requires an outgoing signature |
| Signature Generation Block Wrongly Present | 10 | A OutputSignatureGenerationBlock was received in a command which does not require an outgoing signature |

TABLE 297-continued

ResultFlag value description

| Mnemonic | Value | Description |
|---|---|---|
| Signature Block Absent | 11 | A InputSignatureCheckingBlock was not received in a command which requires an incoming signature |
| Signature Block Wrongly Present | 12 | A InputSignatureCheckingBlock was received in a command which does not require an incoming signature |
| Parameter Block Absent | 13 | An Input Parameter Block wasn't received in a command which requires that block, or an Output Parameter Block was not generated by a command which requires one. |
| Parameter Block Wrongly Present | 14 | An Input Parameter Block was received in a command which does not require that block, or an Output Parameter Block was generated in a command that does not require one. |
| Too Many Entities | 15 | The Input Parameter Block of the command has a list of more entities than the QA Device supports |
| Too Few Entities | 16 | An Entity List or an Entity Descriptor List was received in a command or sent in a response with no entities. |
| Illegal Field Number | 17 | Field Number incorrect. The field number specified in an entity descriptor does not exist. |
| Illegal Entity Descriptor Modify Bit | 18 | An entity descriptor in an input or output parameter block list was set wrongly: it was "modify" when it needed to be "read", or "read" when it needed to be "modify". |
| Wrong ChipId | 19 | The QA Device was given a command which had a SignedInputParameterBlock with modify-entities, or generated a signed OutputParameterBlock with read-entities, and the ChipId in the signed block was incorrect, i.e. not the ChipId of the QA Device. |
| Illegal Entity | 20 | An entity in an Input Parameter Block of a command was received that is not legal for that command. |
| No Shared Key | 21 | An operation was requested in a command to a QA Device which requires a key to be shared between it and another QA Device. If there is no shared key, this error is returned. |
| Invalid Write Permission | 22 | Permission not adequate to perform operation. For example, trying to perform a Write or WriteAuth with incorrect permissions. |
| Field Is Read Only | 23 | A Write or an Authenticated Write command was applied to a read-only field that had already been written once. |
| Only Decrements Allowed | 24 | A Write or an Authenticated Write command was applied to a decrement-only field, which was not a decrement. |
| Key Already Locked | 25 | Key already locked. A key cannot be replaced if it has already been locked. |
| Illegal Key Entity | 26 | An Entity Descriptor in an Entity List wrongly specified a key value or descriptor that is not a legal entity for that command. |
| Illegal Field Entity | 27 | An Entity Descriptor in an Entity List wrongly specified a field value or descriptor that is not a legal entity for that command. |
| Key Not Unlocked | 28 | A Replace Key command was received that was attempting to change a locked key. |
| Field Creation Not Allowed | 29 | Field creation was attempted in this QA Device, after it has been locked or there was an attempt to lock field creation after it had been already locked. |
| Field Storage Overflow | 30 | The QA Device is out of storage space for new fields. |
| Type Mismatch | 31 | Type of the data from which the amount is being transferred in the Upgrading QA Device, doesn't match the Type of data to which the amount in being transferred in the Device being upgraded. |
| Transfer Dest Field Invalid | 32 | A transfer was attempted on a field which is not capable of supporting a transfer. |
| Rollback Enable Field Invalid | 33 | The rollback enable field for the QA Device being transferred to is invalid. |
| No Transfer Source Field | 34 | There is no transfer source field available to do the transfer from. |
| Transfer Source Field Amount Insufficient | 35 | The transfer source field doesn't have the amount required for the transfer. |
| Invalid Operand | 36 | One of the command operands was invalid. |
| Field Over Maximum Allowed | 37 | A Write or an Authenticated Write command was applied to a field which would have made the field value exceed the limit implied by its "maximum allowed" bit field. |
| Transfer Fields Incompatible | 38 | The "who I am" and "who I accept" fields in the transfer source and transfer destination fields are not compatible. |
| Transfer Rolled Back | 39 | A transfer was attempted which failed. The transfer was successfully rolled back, so the source and transfer fields are unchanged. |
| No Matching Previous Transfer | 40 | A Rollback was attempted on a QA Device which had no record of having done a corresponding transfer (loss of |

TABLE 297-continued

| ResultFlag value description | | |
|---|---|---|
| Mnemonic | Value | Description |
| | | previous record may occur depending on the depth of the rollback cache |
| Key Not For Local Use | 41 | An operation was requested using a data key for which local use is not permitted. |

11 Common Functions

This section defines functions referred to by pseudocode.

11.1 General Command Functions

The general functions needed for every command are illustrated by pseudocode in the following sections. The general functions assume that each command has the following associated information:

- A boolean value to specify if an incoming signature is necessary,
- A boolean value to specify if an outgoing signature is necessary,
- A boolean value to specify if valid entity range checking is necessary,
- A boolean value to specify if an outgoing parameter block is necessary,
- Two bit fields, which are the incoming entity descriptor bit fields, and the outgoing entity descriptor bit fields. They specify what kinds of entity descriptors are legal for this command, for incoming and outgoing entity lists and entity descriptor lists,
- Two bitfields which are the incoming signature legal key types, and the outgoing signature legal key types. Each bitfield contains 2 bits, one for each KeyType. A command's signature must be signed with a key with a key type allowed for that command. Otherwise the command fails.
- The maximum number of entities which are legal for the command,
- The block format of the SignedInputParameterBlock, UnsignedInputParameterBlock and OutputParameterBlock. This can be: absent, unsigned list of entity descriptors, unsigned list of entities, unsigned other, signed list of entity descriptors, signed list of entities, signed other.

This associated information enables much of the checking of commands to be done in a command-independent way by a number of functions.

11.1.1 CheckIncomingSignature

This routine is called for all commands. It checks that the command has a SignedInputParameterBlock if it needs one, and if so, that the signature is correct. If either of these are wrong, the command fails.

CheckIncomingSignature

```
# We should have an InputSignatureCheckingBlock if and only if this
# command requires it. Fail if the block is wrongly present or wrongly absent.
# Otherwise, if the command needs no incoming signature, the command is OK so far.
if InputSignatureCheckingBlock is absent
        if need__incoming__signature[command]
           ResultFlag = InputSignatureCheckingBlockAbsent
           return FAIL
        else
           return PASS
else
        if !need__incoming__signature[command]
           ResultFlag = InputSignatureCheckingBlockWronglyPresent
           return FAIL
endif
# If they are asking us to check a signature with an invalid key, fail.
if InputSignatureCheckingBlock.key__slot > num__keys
        ResultFlag = InvalidKey
        return FAIL
if key__descriptor[InputSignatureCheckingBlock.key__slot].Invalid != 0
        ResultFlag = InvalidKey
        return FAIL
key__type = key__descriptor[InputSignatureCheckingBlock.key__slot].key__type
if (incoming__legal__key__types[command] & (1 << key__type)) == 0
        ResultFlag = WrongKeyType
        return FAIL
# if the incoming signature is based on a DataKey, then UseLocally must be 1
# and the keygroup for the key must be locked
if key__type == DataKey
        if key__descriptor[InputSignatureCheckingBlock.key__slot].use__locally == 0
           return KeyNotForLocalUse
        key__group = key__descriptor[InputSignatureCheckingBlock.key__slot].key__group
        for (i = 0; i < NumKeySlots; i ++)
           if (key__descriptor[i].KeyGroup == key__group) &
```

-continued

| CheckIncomingSignature |
| --- |

```
                (key__descriptor[i].KeyGroupLocked == 0)
                    return KeyGroupUnlocked
# Construct the key value. If the block was signed with a variant, we
# need to construct a variant from the stored (base) key.
key__value = keys[InputSignatureCheckingBlock.key__slot]
if InputSignatureCheckingBlock.VariantKeySignatureGenerationRequired
        key__value = HMAC__SHA1(InputSignatureCheckingBlock.chip__id, key__value)
endif
# Construct our signature
my__sig = Sign(key__value,
                    SignedInputParameterBlock | InputSignatureCheckingBlock.R_G |
local__R)
# If the incoming signature is not correct, we must fail the command
if my__sig != InputSignatureCheckingBlock.signature
        ResultFlag = BadSignature
        return FAIL
# We should advance our nonce. We also need to keep a temporary copy of what
# the nonce was before, so that commands which use the nonce for other
# purposes. (For example, Get Key uses it for encrypting key values.)
Note: we only advance the nonce if the signature was correct.
previous__R = local__R
Advance local__R
return PASS
```

11.1.2 GenerateOutgoingSignature

This routine should be called for all commands. It checks that the command has a OutputSignatureGenerationBlock if it needs one, and if so, generates the signature. If either of these are wrong, the command fails.

| GenerateOutgoingSignature |
| --- |

```
# We should have an OutputSignatureGenerationBlock if and only if this
# command requires it. Fail if the block is wrongly present or wrongly absent.
# Otherwise, if the command needs no outgoing signature, the command is OK
# so far.
if OutputSignatureGenerationBlock is absent
        if need__outgoing__signature[command]
            ResultFlag = OutputSignatureGenerationBlockAbsent, return FAIL
        else
            return PASS
else
        if !need__outgoing__signature[command]
            ResultFlag = OutputSignatureGenerationBlockPresent
            return FAIL
endif
# If they are asking us to generate a signature with an invalid key, fail.
if OutputSignatureGenerationBlock.key__slot > num__keys
        ResultFlag = InvalidKey
        return FAIL
if key__descriptor[OutputSignatureGenerationBlock.key__slot].Invalid != 0
        ResultFlag = InvalidKey
        return FAIL
key__type = key__descriptor[OutputSignatureGenerationBlock.key__slot].key__type
if (outgoing__legal__key__types[command] & (1 << key__type)) == 0
        ResultFlag = WrongKeyType
        return FAIL
# if the outgoing signature is based on a DataKey, then UseLocally must be 1
# and the keygroup for the key must be locked
if key__type == DataKey
        if key__descriptor[OutputSignatureGenerationBlock.key__slot].use__locally ==
0
            return KeyNotForLocalUse
        key__group =
key__descriptor[OutputSignatureGenerationBlock.key__slot].key__group
        for (i = 0; i < NumKeySlots; i ++)
            if (key__descriptor[i].KeyGroup == key__group) &
                (key__descriptor[i].KeyGroupLocked == 0)
                    return KeyGroupUnlocked
# Construct the key value. If the block was signed with a variant, we
```

-continued

GenerateOutgoingSignature

```
# need to construct the variant from our stored (base) key.
key_value = keys[OutputSignatureGenerationBlock.key_slot]
if OutputSignatureGenerationBlock.VariantKeySignatureGenerationRequired
        key_value = HMAC_SHA1(OutputSignatureGenerationBlock.chip_id, key_value)
endif
# Return the generator's nonce and the generated signature in the
# OutputSignatureCheckingBlock
OutputSignatureCheckingBlock.nonce = local_R
OutputSignatureCheckingBlock.signature =
        Sign(key_value,
          OutputParameterBlock | local_R | OutputSignatureGenerationBlock.R_C)
# We should advance our nonce.
Advance local_R
return PASS
```

11.1.3 CheckEntityList

This routine should be called for all commands which have an entity list or entity descriptor list in either an input or output parameter block. It does a series of checks on the entity descriptor list, and fails the command if there are any problems.

```
CheckEntityList(N, list, incoming_or_outgoing, descriptors_only)
# Fail if there are more entities than are legal for this command
if N > max_entities[command]
        ResultFlag = TooManyEntities
        return FAIL
if N == 0
        ResultFlag = TooFewEntities
        return FAIL
# We should set up the bit-masks for illegal bits and mandatory bits in the
# entity descriptors. These will differ between incoming and outgoing parameter
# blocks.
if incoming_or_outgoing == incoming
        entity_bit_fields = incoming_entity_descriptor_bits[command]
else
        entity_bit_fields = outgoing_entity_descriptor_bits[command]
endif
# Run through each entity descriptor in the list and check for errors: bits
# which are illegally set or clear, or entities which are out of range.
for i = 0 to N-1
        ed = list[i]
        if ed.is_key
          if ed.has_descriptor && !entity_bit_fields.allows_key_descriptor OR
            ed.has_value && !entity_bit_fields.allows_key_value
              ResultFlag = IllegalEntity
              return FAIL
        else
          if ed.has_descriptor && !entity_bit_fields.allows_field_descriptor OR
            ed.has_value && !entity_bit_fields.allows_field_value
              ResultFlag = IllegalEntity
              return FAIL
        if ed.is_modify && !entity_bit_fields.needs_modify OR
          !ed.is_modify && entity_bit_fields.needs_modify
          ResultFlag = IllegalEntity
          return FAIL
        if need_valid_entity_range_check[command]
          if (ed.is_key AND ed.number > num_keys)
            ResultFlag = InvalidKey
            return FAIL
          if (ed.is_field AND ed.number > num_fields)
            ResultFlag = InvalidField
            return FAIL
        if !descriptor_only
          skip over the entity values
end for
return PASS
```

11.1.4 ParseIncomingParameters

This routine should be called for all commands, at the start of command processing. This is the generic code which does all of the command processing, signature checking and initial error checking that is common to all commands.

ParseIncomingParameters

```
# By default, all commands pass until we detect that they fail
ResultFlag = PASS
# Read the command byte, and all of the incoming parameters. Which incoming
# parameter blocks should be present is implied by the command byte. How long
# these parameter block should be is given for each parameter block by the length
# tag in the block header. This means that the command input can be done entirely
# inside this generic code.
Accept command
if need_unsigned_input_parameters[command]
        Accept UnsignedInputParameterList
        if UnsignedInputParameterList is absent
           ResultFlag = UnsignedInputParameterListAbsent
           return FAIL
if need_incoming_signature[command]
        Accept SignedInputParameterList
        if SignedInputParameterList is absent
           ResultFlag = SignedInputParameterListAbsent
           return FAIL
        Accept InputSignatureCheckingBlock
        if InputSignatureCheckingBlock is absent
           ResultFlag = InputSignatureCheckingBlockAbsent
           return FAIL
if need_outgoing_signature[command]
        Accept OutputSignatureGenerationBlock
        if OutputSignatureGenerationBlock is absent
           ResultFlag = OutputSignatureGenerationBlockAbsent
           return FAIL
# We need to check the incoming signature.
call CheckIncomingSignature
# We need to check that the UnsignedInputParameterList is well-formed. This
# involves checking that the entity descriptor lists and entity lists are
# not illegal, as far as we can tell.
if need_unsigned_input_parameters[command]
        switch format_unsigned_input_parameters[command]
           case unsigned_entity_descriptor_list:
              # Check this entity descriptor list
              CheckEntityList(UnsignedInputParameterList.N,
                 UnsignedInputParameterList.list, incoming, TRUE)
           case unsigned_entity_list:
              # Check this entity list
              CheckEntityList(UnsignedInputParameterList.N,
                 UnsignedInputParameterList.list, incoming, FALSE)
           default:
              # Nothing to do here now - might be command-specific checks
        end switch
endif
if need_signed_input_parameters[command]
        # Signed input parameters need to have this QA Device's Chip Identifier
        # in them if they are modify-entity commands. This can be told from the
        # entity descriptor mandatory incoming bits.
        if (incoming_entity_descriptor_bits[command] & (1<<ED_MODIFY)) != 0
           SignedInputParameterList.chip_id != my_chip_id
           ResultFlag = BadChipId
           return
        switch format_signed_input_parameters[command]
           case signed_entity_descriptor_list:
              # Check this entity descriptor list
              CheckEntityList(SignedInputParameterList.N,
                 SignedInputParameterList.list, incoming, TRUE)
           case signed_entity_list:
              # Check this entity list
              CheckEntityList(SignedInputParameterList.N,
                 SignedInputParameterList.list, incoming, FALSE)
           default:
              # Nothing to do here now - might be command-specific checks
        end switch
endif
Return PASS
```

11.1.5 HandleOutgoingParameters

This routine should be called for all commands, at the end of command processing. This is the generic code which does all of the command processing, signature generation and final error checking that is common to all commands.

HandleOutgoingParameters

```
# Now we have to do the generic output parameter checking, and fail the command
# if there is anything wrong.
if generate_output_parameters[command]
        # Fail if we need an parameter list, and there is none
        if OutputParameterList is absent
          ResultFlag = OutputParameterListAbsent
        # Signed output parameters need to have this QA Device's Chip Identifier
        # in them if they are "read-entity" commands. This can be told from the
        # entity descriptor illegal outgoing bits.
        if (format_output_parameters[command] is in
[signed_entity_descriptor_list,
          signed_entity_list or signed_other]) and
          (entity_descriptor_outgoing_illegal_bits[command] & (1<<ED_MODIFY)) !=
0
          and SignedInputParameterList.chip_id != my_chip_id
          ResultFlag = BadChipId
          return
        switch format_output_parameters[command]
          case unsigned_entity_descriptor_list:
          case signed_entity_descriptor_list:
            # Check this entity descriptor list
            CheckEntityList(OutputParameterList.N,
              OutputParameterList.list, outgoing, TRUE)
          case unsigned_entity_list:
          case signed_entity_list:
            # Check this entity list
            CheckEntityList(OutputParameterList.N,
              OutputParameterList.list, outgoing, TRUE)
          default:
            # Nothing to do here now
        end switch
else
        # Fail if we need no parameter list, and there is one
        if OutputParameterList is present
          ResultFlag = OutputParameterListWronglyPresent
endif
# Now we should generate the outgoing signature over the OutputParameterBlock, if
# the command needs one
call GenerateOutgoingSignature
# Send the result flag, which tells the System how the command went
send ResultFlag
if ResultFlag == PASS
        # Send the output parameters and the output signature, if they are needed
        if send_output_parameters[command]
          send OutputParameterList
        if need_outgoing_signature[command]
          send OutgoingSignatureCheckingBlock
endif
return
```

12 Get Info

| | |
|---|---|
| Input: | None |
| Output: | ResultFlag, OutputParameterBlock = list of QA Device characteristics |
| Changes: | None |
| Availability: | All devices |

12.1 Function Description

Users of QA Devices must call the GetInfo function on each QA Device before calling any other functions on that device.

The GetInfo function tells the caller what kind of QA Device this is, what functions are available and what properties this QA Device has. The caller can use this information to correctly call functions with appropriately formatted parameters.

The first value returned, QA Device type, effectively identifies what kind of QA Device this is, and therefore what functions are available to callers. Source code control identifier tells the caller which software version the QA Device has. There must be a unique mapping of the source code control identifier to a body of source code, under source code control, in any released QA Device.

Additional information may be returned depending on the type of QA Device. The additional data fields of the output hold this additional information.

12.2 Output Parameters

Table 298 describes each of the output parameters.

TABLE 298

Description of output parameters for GetInfo function

| Parameter | #bytes | Description |
|---|---|---|
| ResultFlag | 1 | Indicates whether the function completed successfully or not. If it did not complete successfully, the reason for the failure is returned here. |
| QA Device type | 1 | This defines the function set that is available on this QA Device. |
| Source Code Control Identifier | 4 | This uniquely defines the source code for the QA Device, as controlled by a source code control system. |
| Key Replacement Allowed | 1 | Bit mask of keygroups which are not locked. Key replacement is allowed to add keys to those keysgroups. |
| Maximum number of keys | 1 | The number of keyslots the QA Device can support |
| Number of keys used | 1 | The number of keyslots the QA Device is currently using |
| Number of key groups | 1 | The number of keygroups that the QA Device is currently using |
| Field creation allowed | 1 | Non-zero if field creation is allowed |
| Number of fields | 1 | The number of fields which are present in the QA Device |
| Number of read-only words in device | 2 | The number of write-once then read-only (ROS) words that the QA Device supports |
| Number of read-only words used | 2 | The number of write-once then read-only (ROS) words that the QA Device is currently using |
| Number of writeable words in device | 2 | The number of writeable (RWS) words that the QA Device supports |
| Number of writeable words used | 2 | The number of writeable (RWS) words that the QA Device is currently using |
| ChipId | 8 | This QA Device's ChipId |
| VarDataLen | 1 | Length of bytes to follow. |
| VarData | (VarDataLen bytes) | This is additional application specific data, and is of length VarDataLen (i.e. may be 0). |

Table 299 shows the mapping of QA Device Type:

TABLE 299

QA Device Types

| QADevice Type\ | Description |
|---|---|
| 1 | Base QA Device |
| 2 | Value Upgrader QA Device |
| 3 | Parameter Upgrader QA Device |
| 4 | Key Replacement QA Device |
| 5 | Trusted QA Device |

Table 300 shows the mapping between the QA Device type and the available device functions on that QA Device

TABLE 300

Mapping between QA Device Type and available device functions

| QA Device Function | Supported on QA Device Types | Device description |
|---|---|---|
| Get Info | all | Base QA Device |
| Get Challenge | | |
| Lock Key Groups | | |
| Lock Field Creation | | |
| Authenticated Read | | |
| Authenticated Write | | |
| Non-authenticated Write | | |
| Create Fields | | |
| Replace Key | | |
| Invalidate Key | | |
| Transfer Delta | 2 | Value Upgrader QA Device |
| Start Rollback | | (e.g. Ink Refill QA Device) |
| Roll Back Amount | | |
| Transfer Amount | 3 | Parameter Upgrader QA Device |
| Start Rollback | | (e.g. Local Upgrader QA |
| Rollback Field | | Device) |
| GetKey | 4 | Key Replacement QA Device |
| Sign | 5 | Trusted Device |
| Test | | |

Table 301 shows the VarData components for Value Upgrader and Parameter Upgrader QA Devices.

TABLE 301

VarData for Value and Parameter Upgrader QA Devices

| VarData Components | Length in bytes | Description |
|---|---|---|
| DepthOfRollBackCache | 1 | The number of data sets that can be accommodated in the Xfer Entry cache of the device. |

12.3 Function Sequence

The GetInfo command is illustrated by the following pseudocode:

```
call ParseIncomingParameters
OutputParameterBlock =
        QA Device type
        source code control identifier
        Key Replacement Allowed
        Number of keys
        number of key groups
        field creation allowed
        number of fields
        number of read-only words in device
        number of read-only words used
        number of writeable words in device
        number of writeable words used
        ChipId
        VarDataLen ←1 # In case of an upgrade device
        DepthOfRollBackCache
call HandleOutgoingParameters
```

13 Get Challenge

| | |
|---|---|
| Input: | None |
| Output: | OutputParameterBlock = $R_L$ |
| Changes: | None |
| Availability: | All devices |

The Get Challenge command is used by the caller to obtain a session component (challenge) for use in subsequent signature generation.

If a caller calls the Get Challenge function multiple times, then the same output is returned each time. R (i.e. this QA Device's R) only advances to the next random number after a successful test of a signature or after producing a new signature. The same R can never be used to produce two signatures from the same QA Device.

This function is typically used by the System to get a nonce. This nonce is given to another QA Device, which creates a signature, based on some data, this nonce, and the other QA Device's nonce. The signature thus generated is checked by this QA Device.

The Get Challenge command is illustrated by the following pseudocode:

```
call ParseIncomingParameters
OutputParameterBlock = R
call HandleOutgoingParameters #
```

14 Lock Key Groups

| | |
|---|---|
| Input: | UnsignedInputParameterBlock = keygroup bit mask |
| Output: | ResultFlag |
| Changes: | Key Replacement Allowed, Key Descriptors |
| Availability: | All devices |

The Lock Key Groups command is used by the caller to tell the QA Device that keys may no longer be created in the selected keygroups. The locking of a keygroup does not affect the Invalidate Key command i.e. keys in locked keygroups can still be invalidated.

The Lock Key Groups command is illustrated by the following pseudocode:

```
call ParseIncomingParameters #
if FieldCreationAllowed == 0
        ResultFlag = FieldCreationNotAllowed
elseif KeyReplacementAllowed == 0
        ResultFlag = KeyReplacementNotAllowed
else
        KeyReplacementAllowed &= ~key_group_bit_mask
        for (i = 0; i < NumKeySlots; i ++)
          if (key_group_bit_mask &
          (1 << key_descriptor[i].key_group) != 0)
            key_descriptor[i].KeyGroupLocked = 1
call HandleOutgoingParameters #
```

15 Lock Field Creation

| | |
|---|---|
| Input: | None |
| Output: | ResultFlag |
| Changes: | Field Creation Allowed |
| Availability: | All devices |

The Lock Field Creation command is used by the caller to tell the QA Device that new fields may no longer be created. The fields that the QA Device already has are the only ones it may ever have.

After this command is executed, the QA Device accepts no more Replace Key commands on any keys, or Create Field commands on any fields. However, keys may still be subsequently invalidated with the Invalidate Key command.

The Lock Field Creation command is illustrated by the following pseudocode:

```
call ParseIncomingParameters #
# Once the fields are locked, the QA Device can accept no more
Replace Key
# commands, so we lock the keys.
lock_key_groups(0xF)
if FieldCreationAllowed == 0
        ResultFlag = FieldCreationNotAllowed
else
        FieldCreationAllowed = 0
call HandleOutgoingParameters #
```

16 The Read Commands

| | |
|---|---|
| Input: | Command = Read<br>UnsignedInputParameterBlock = list of entity descriptors |
| Output: | ResultFlag<br>OutputParameterBlock = list of entities |
| Changes: | None |
| Availability: | All devices |
| Input: | Command = Authenticated Read<br>UnsignedInputParameterBlock = list of entity descriptors<br>OutputSignatureGenerationBlock |
| Output: | ResultFlag<br>OutputParameterBlock = list of entities<br>OutputSignatureCheckingBlock |
| Changes: | R |

-continued

| | |
|---|---|
| Availability: | All devices |
| Input: | Command = Authenticated Read with Signature Only<br>UnsignedInputParameterBlock = list of entity descriptors<br>OutputSignatureGenerationBlock |
| Output: | ResultFlag<br>OutputSignatureCheckingBlock |
| Changes: | R |
| Availability: | All devices |

16.1 Function Description

The Authenticated Read command is used to read fields (values and/or descriptors), and key identifiers from a QA Device. The caller can specify which entities are read.

The Authenticated Read command returns both the data and signature, while the Authenticated Read With Signature Only returns just the signature. Since the return of data is based on the caller's input request, it prevents unnecessary information from being sent back to the caller. Callers typically request only the signature in order to confirm that locally cached values match the values on the QA Device.

The data read from an untrusted QA Device (A) using a Authenticated Read command is validated by a Trusted QA Device (B) using the Test command. The OutputSignatureCheckingBlock produced as output from the Authenticated Read command is input (along with correctly formatted data) to the Test command on a Trusted QA Device for validation of the signature and hence the data. For this to work, the QA Device and the Trusted QA must share keys. This is usually achieved by the Trusted QA getting copies of appropriate keys, via the Get Key command.

16.2 Input Parameters

The UnsignedInputParameterBlock is an Entity Descriptor List in the form given in Table 289. Table 302 describes the valid formats for the Read command entity descriptors:

TABLE 302

Authenticated Read Valid Entity Descriptors

| Operation | Field/Key | Entity Components | Unused | Entity Number |
|---|---|---|---|---|
| Bit 15<br>0 = read | Bit 14<br>0 = field | Bit 13-12<br>01 = descriptor,<br>10 = value,<br>11 = both descriptor and value | Bits 11-8<br>Unused = 0 | Bits 7-0<br>Field Number |
| | 1 = key | 01 = descriptor | | Key Slot Number |

16.3 Output Parameters

The Result Flag indicates whether the function completed successfully or not. If it did not complete successfully, the reason for the failure is returned here The OutputParameterBlock is an entity list in the form given in Table 292.

The entity descriptors in the list have the same form as the incoming entity descriptors.

16.4 Function Sequence

The Authenticated Read command is illustrated by the following pseudocode:

```
call ParseIncomingParameters #
# Build Output Results
for (i = 0; i < NumberOfEntities; i ++)
        entity__descriptor =
        UnsignedInputParameterBlock.EntityDescriptorList[i]
        OutputParameterBlock.EntityList[i].EntityDescriptor =
        entity__descriptor
        if (entity__descriptor.field__key == key)
          # Handle key descriptor
          OutputParameterBlock.EntityList[i].Entity.key__descriptor =
            key__descriptors[entity__descriptor.number]
        else
          fd__vector, fd__index, fd__length, fv__vector, fv__index,
            fv__length = find__field__locations(entity__descriptor.
            number)
          if (entity__descriptor.has__descriptor)
            # Handle field descriptor
            OutputParameterBlock.EntityList[i].Entity.
              field__descriptor = fields[entity__descriptor.
              number].descriptor
          if (entity__descriptor.has__value)
            # Handle field value
            OutputParameterBlock.EntityList[i].Entity.field__value =
              fields[entity__descriptor.number].value
          end if
        end if
end for
call HandleOutgoingParameters #
```

The same pseudocode works equally well for Read, Authenticated Read, and Authenticated Read with Signature Only. This is because the generic code in HandleOutgoingParameters manages whether the data, signature, or both data and signature are returned.

17 The Write Commands

| | |
|---|---|
| Input: | Command = Authenticated Write<br>InputSignatureCheckingBlock<br>SignedInputParameterBlock = list of entities |
| Output: | ResultFlag |
| Changes: | Field values, R |
| Availability: | All devices |
| Input: | Command = Non-Authenticated Write<br>UnsignedInputParameterBlock = list of entities |
| Output: | ResultFlag |
| Changes: | Field values |
| Availability: | All devices |

17.1 Function Description

The Authenticated and Non-Authenticated Write commands are used to update a number of field values in the QA Device. An Authenticated Write is carried out subject to the authenticated write access permissions of the fields as stored in the field descriptors. A Non-Authenticated Write can be done if all of the fields allow non-authenticated writes. In this Logical Interface, the only scope for non-authenticated writes is to fields with "Non-Authenticated Decrements" set to 1.

The Write commands either update all of the requested fields or none of them; the write only succeeds when all of the requested fields can be written to.

The Authenticated Write function requires the data to be accompanied by an appropriate signature based on a key only of type DataKey that has appropriate write permissions to the field, and the signature must also include the local R (i.e. nonce/challenge) as previously read from this QA Device via the Get Challenge function.

The appropriate signature can only be produced by knowing the key. This can be achieved by a call to an appropriate command on a QA Device that holds the key. This might be achieved by using a Trusted QA which knows the key. Also, the commands Transfer Delta, Transfer Assign, and Start RollBack produce as part of their output the parameters for an authenticated write to another QA Device. This enables non-secure hosts which have no knowledge of keys to mediate transfers from one QA Device to another.

17.2 Input Parameters

Table 303 describes the valid formats for the Write command entity descriptors:

TABLE 303

Authenticated and Non-Authenticated Write Valid Entity Descriptors

| Operation | Field/Key | Entity Components | Unused | Write/Add | Entity Number |
|---|---|---|---|---|---|
| Bit 15<br>1 = modify | Bit 14<br>0 = field | Bit 13-12<br>10 = value | Bits 11-9<br>Unused = 0 | Bit 8<br>0 = write value;<br>1 = add signed delta to value | Bits 7-0<br>Field Number |

17.3 Output Parameters

The Result Flag indicates whether the function completed successfully or not. If it did not complete successfully, the reason for the failure is returned here.

17.4 Function Sequence

The Authenticated Write command is illustrated by the following pseudocode:

```
call ParseIncomingParameters
# Record for the routine whether this is an authenticated write or not
authenticated = (command == Authenticated_Write) ? TRUE : FALSE
# Check input parameters. We want to check that every requested assignment
# is legal before we do any of them, so we do all of them, or none. So this first
# pass is just to check that everything is in order before we do any assignments.
for (i = 0; i < NumberOfEntities; i ++)
        field_num = InputListOfEntities.Descriptors[i].number
        fd = field_descriptors[field_num]
        current_value = field_values[field_num]
        new_value = (InputListOfEntities.Descriptors[i].write_add == write) ?
                InputListOfEntities.Values[i] :
                InputListOfEntities.Values[i] + current_value
        doing_decrement = (new_value < current_value) ? TRUE : FALSE
        # The write to this field is authenticated if this key is in the keygroup
        # that has write permission on this field. This is not the full story,
        # however, because non-authenticated writes are legal on some fields
        # (specifically, non-authenticated decrements).
        auth_write_ok = authenticated AND field_can_be_written_by_key(field_num,
Key))
        # Determining whether an assignment is legal depends on whether the field
        # is writeable or read-only, and on the field's transfer mode.
        if (fd.writeable == read_only)
          # If a field is write-once-then-read-only, and it has already been
          # written, then we can't write it again.
          if (fd.written != 0)
            return FieldIsReadOnly
          # If we don't have authenticated permission to do this, fail.
          if (!auth_write_ok)
            return PermissionDenied
        else # writeable
        switch fd.transfer_mode
          case tm_other:
            # If this is a only-decrements-allowed field, and the assignment
            # is not a decrement, then fail.
            if fd.only_decrement_allowed && !doing_decrement
              return OnlyDecrementAllowed
            # These are the ways that this assignment could be legal: (a) we
            # have authentication, (b) the field allows non-authenticated
            # decrements and the assignment is a decrement, or (c) the field
            # allows authenticated decrements, signed by a key in the
keygroup
            # we are using.
            if auth_write_ok
              # we're OK
            else if (doing_decrement AND fd.non_authenticated_decrement)
              # we're OK
```

-continued

```
                else if (doing__decrement AND authenticated AND
                    fd.decrement__only__key__group__mask & (1 <<
key__group(key)))))
                    # we're OK
                else
                    return PermissionDenied
            case tm__single__property:
                # This assignment is legal if we have authentication
                if (!auth__write__ok)
                    return PermissionDenied
            case tm__quantity__of__consumables:
                # These are the ways that this assignment could be legal: (a) we
                # have authentication, (b) the field allows non-authenticated
                # decrements and the assignment is a decrement, or (c) the field
                # allows authenticated decrements, signed by a key in the
keygroup
                # we are using.
                if auth__write__ok
                    # we're OK
                else if (doing__decrement AND fd.non__authenticated__decrement)
                    # we're OK
                else if (doing__decrement AND authenticated AND
                        fd.decrement__only__key__group__mask & (1 <<
key__group(key)))))
                    # we're OK
                else
                    return PermissionDenied
                # If the assignment will put the value of this field above its
                # legal limit, then fail the assignment
                if high__word(value__to__assign) > ((1 << (fd.maximum__allowed + 1)) –
1
                    return ValueOutOfRange
            case tm__quantity__of__properties:
                # This assignment is legal if we have authentication
                if (!auth__write__ok)
                    return PermissionDenied
                # If the assignment will put the value of this field above its
                    # legal limit, then fail the assignment
                    if high__word(value__to__assign) > ((1 << (fd.maximum__allowed + 1)) –
1
                        return ValueOutOfRange
            end switch
        end if
end for
# Do assignments. We know that all of the assignments are legal, so we should do
# them all, in an atomic operation if possible.
for (i = 0; i < NumberOfEntities; i ++)
        field__num = InputListOfEntities.Descriptors[i].number
        if (InputListOfEntities.Descriptors[i].write__add == write)
            field__values[field__num] = InputListOfEntities.Values[i]
        else
            field__values[field__num] += InputListOfEntities.Values[i]
        if (fd.writeable == read__only)
            fd.written = 1
        end if
end for
call HandleOutgoingParameters #
```

The same pseudocode will work equally well for Authenticated Write and Write. This is because (a) the generic code in ParseIncomingParameters manages whether the incoming data are signed, and that signature is checked, and (b) there are places in the algorithm where the fact that no authentication was provided is taken into account.

18 Create Fields

| | |
|---|---|
| Input: | Command Create Fields<br>InputSignatureCheckingBlock<br>SignedInputParameterBlock = list of field descriptor entities |
| Output: | ResultFlag |
| Changes: | Field descriptors, R |
| Availability: | All devices |

18.1 Function Description

The Create Fields command is used to securely create a number of field descriptors in the QA Device. Create Fields either creates all of the requested fields or none of them; the create only succeeds when all of the requested fields can be created.

The Create Fields function requires the data to be accompanied by an appropriate signature based on a locked key of type DataKey, and the signature must also include the local R (i.e. nonce/challenge) as previously read from this QA Device via the Get Challenge function.

The appropriate signature can only be produced by knowing the key. This can be achieved by a call to an appropriate command on a QA Device that holds a matching key.

The Create Fields command can only create the next unused field numbers. That is, if there are N fields in a QA Device, they are numbered 0 . . . N−1, and the next Create Fields command may only create consecutive fields starting at field number N.

The length of the field descriptors (1, 2 or 3) depends on the transfer mode. This is explained in more detail in Table 325.

When a field is created, there are checks to ensure that the requested field is legal:

The keygroup that is being used to authenticate the creation of the field, and all of the keys in that keygroup, must be locked.

The key being used to authenticate the creation must be of type DataKey.

If the transfer mode is "quantity of properties" or "quantities of consumables", then the field cannot be read-only, If the field allows non-authenticated decrements, then its authenticated decrement keygroup mask should be all 1s.

The unused fields in the field descriptors must be 0s.

When a field is created which only allows decrements, its field value is initialised to all 1s. Otherwise the field value is initialised to 0.

When a "write-once then read-only" field is created, the "written" byte is left as 0, so that the field value can be filled in later.

18.2 Input Parameters

Table 304 describes the valid formats for the Create Fields entity descriptors:

TABLE 304

Create Fields Valid Entity Descriptors

| Operation | Field/Key | Entity Components | Unused | Entity Number |
|---|---|---|---|---|
| Bit 15<br>1 = modify | Bit 14<br>0 = field | Bit 13-12<br>01 = descriptor | Bits 11-8<br>Unused = 0 | Bits 7-0<br>Field Number |

18.3 Output Parameters

The Result Flag indicates whether the function completed successfully or not. If it did not complete successfully, the reason for the failure is returned here.

18.4 Function Sequence

The Create Fields command is illustrated by the following pseudocode:

```
call ParseIncomingParameters
# Check input parameters
for (i = 0; i < NumberOfEntities; i ++)
        # We want to create fields in order: if there are N fields, numbered 0 to
        # N−1, the next field must be N.
        if (InputListOfEntities.Descriptors[i].number != NumFields + i)
          return InvalidField
        fd = InputListOfEntities.Entities[i][0]
        # There are some checks that we must do, depending on writeable and
        # transfer mode. In all cases, we should ensure that unused bits are set
to 0.
        if (fd.writeable == read_only)
          switch fd.transfer_mode
            case tm_other:
              # If this is a read-only field, we have to initialise "written"
to 0
              if fd.written != 0
                return BadArgument
            case tm_single_property:
              # If this is a read-only field, we have to initialise "written"
to 0.
              if fd.written != 0 || fd.ro_single_property_unused != 0
                return BadArgument
            default:
              # The other transfer modes are not legal for read-only fields
              return BadArgument
          end switch
        else # writeable
          # all keys in the keygroup for this new field must be locked
          for (i = 0; i < NumKeySlots; i ++)
            if (key_descriptor[i].KeyGroup == fd.authenticated_write_key_group)
&
              (key_descriptor[i].KeyGroupLocked == 0)
              return KeyGroupUnlocked
          switch fd.transfer_mode
            case tm_other:
              # If we allow non-authenticated decrements, we need the
              # decrement-only keygroup mask to be all 1s
              if fd.non_authenticated_decrement != 0 &&
                fd.decrement_only_key_group_mask != 0x0F
                  return BadArgument
              if fd.wr_other_unused != 0
```

-continued

```
                return BadArgument
            case tm__single__property:
                if fd.wr__single__property__unused != 0
                    return BadArgument
            case tm__quantity__of__consumables:
                # If we allow non-authenticated decrements, we need the
                # decrement-only key group mask to be all 1s
                if fd.non__authenticated__decrement != 0 &&
                    fd.decrement__only__key__group__mask != 0x0F
                    return BadArgument
            case tm__quantity__of__properties:
                if fd.wr__quantity__of__properties__unused != 0
                    return BadArgument
        end switch
    end if
end for
# We've checked all of the arguments, and they are fine. Now we should
# do assignments, atomically.
for (i = 0; i < NumberOfEntities; i ++)
    ROS__index = next__spare__word__in__ROS
    fd = InputListOfEntities.Entities[i][0]
    # This write should be careful with the "written" byte, if it is to flash
    ROS[next__spare__word__in__ROS++] = fd
    if fd.transfer__mode != tm__other
        ROS[next__spare__word__in__ROS++] = InputListOfEntities.Entities[i][1]
        if fd.transfer__mode == tm__quantity__of__properties
            ROS[next__spare__word__in__ROS++] = InputListOfEntities.Entities[i][2]
        endif
    endif
    length = field__value__length(ROS__index)
    if fd.writeable == read__only
        next__spare__word__in__ROS += length
    else
        if fd.transfer__mode == tm__other &&
            fd.only__decrements__allowed
            RWS[next__spare__word__in__RWS] = 0xffffffff
        endif
        next__spare__word__in__RWS += length
    endif
end for
call HandleOutgoingParameters
```

19 Replace Key

| | |
|---|---|
| Input: | Command = Replace Key<br>InputSignatureCheckingBlock<br>SignedInputParameterBlock = list of a single key entity |
| Output: | ResultFlag |
| Changes: | Key descriptor, Key value, R |
| Availability: | All devices |

19.1 Function Description

The Replace Key command is used to replace the contents of a single keyslot, which means replacing the key, and its associated key descriptor. The command only succeeds if the key in the keyslot has KeyType=0, TransportOut=0, UseLocally=0, and Invalid=0. The procedure for replacing a key requires knowledge of the value of the current key in the keyslot i.e. you can only replace a key if you know the current key.

Whenever the Replace Key function is called, the caller passes in a key descriptor with the new value for the new key in the keyslot. If the new key has any setting other than KeyType=0, TransportOut=0, UseLocally=0, then the keyslot is locked and no further key replacement is permitted for that keyslot.

The list of entities that are passed in are all keys: a 1-word key descriptor and a 5-word encrypted key value. The encryption is such that:

$$\text{Transmitted key}=K_{new}\ XOR\ \text{Sign}[K_{old},\ R_G|R_C]$$

The key descriptors are described in more detail in Table 284.

The keys in the QA Device are updated to the new version as long as the signature matches.

Note: the value of the checker's nonce ($R_C$) should be the value as it was at the start of the command. The QA Device will have advanced the nonce when it checked the signature on the incoming command, and so a temporary copy of the previous version of the nonce should be kept before the signature checking, so that it can be used to decrypt the incoming key.

The SignedInputParameterBlock and the InputSignatureCheckingBlock are derived from the output of the Get Key command.

19.2 Input Parameters

Table 305 describes the valid formats for the Replace Key command entity descriptors:

TABLE 305

Replace Key Valid Entity Descriptors

| Operation | Field/Key | Entity Components | Unused | Entity Number |
|---|---|---|---|---|
| Bit 15<br>1 = modify | Bit 14<br>1 = key | Bit 13-12<br>11 = descriptor and value | Bits 11-9<br>Unused = 0 | Bits 7-0<br>Key slot Number |

19.3 Output Parameters

The Result Flag indicates whether the function completed successfully or not. If it did not complete successfully, the reason for the failure is returned here.

19.4 Function Sequence

The Replace Key command is illustrated by the following pseudocode:

```
call ParseIncomingParameters
# Check input parameters
kd_desired = InputListOfEntities.Entities[0].descriptor
kd_current = keys[InputSignatureCheckingBlock.key].descriptor
# Check that the key is legal
if key_group_is_locked(kd_current.key_group)
        return KeyGroupLocked
if key_is_locked(kd_current.identifier)
        return KeyAlreadyLocked
# We have to construct the one-time pad that was used to encrypt this key
# value, with the old key signing the two nonces. Note: we use
# previous_R, because the checker's nonce has been
advanced since the incoming signature was checked.
one_time_pad = Sign(InputSignatureCheckingBlock.key,
                InputSignatureCheckingBlock.R_G | previous_R)
# Now we should do the assignments. These should be atomic.
keys[InputSignatureCheckingBlock.key].descriptor = kd_desired
keys[InputSignatureCheckingBlock.key].descriptor =
        one_time_pad XOR InputListOfEntities.Entities[i].value
call HandleOutgoingParameters
```

20 Invalidate Keys

| | |
|---|---|
| Input: | Command = Invalidate Keys<br>InputSignatureCheckingBlock<br>SignedInputParameterBlock = list of key entity descriptors |
| Output: | ResultFlag |
| Changes: | Key descriptors, R |
| Availability: | All devices |

20.1 Function Description

The Invalidate Keys command is used to invalidate the contents of a set of locked keyslots. This means that a bit is set in the key descriptor that indicates to the QA Device that the key cannot be used any more. A key can only be invalidated if the keyslot was already locked. Any valid key can sign this command.

The specified keys have the “invalid” bit-field set in their key descriptors. After being invalidated, the key is never used to sign any signatures in the QA Device.

The list of entity descriptors that are passed in are all for keys which are to be invalidated.

The invalidation of keys should either all succeed, or none should succeed.

20.2 Input Parameters

Table 306 describes the valid formats for the Invalidate Keys command entity descriptors:

TABLE 306

Invalidate Keys Valid Entity Descriptors

| Operation | Field/Key | Entity Components | Unused | Entity Number |
|---|---|---|---|---|
| Bit 15<br>1 = modify | Bit 14<br>1 = key | Bit 13-12<br>01 = descriptor | Bits 11-8<br>Unused = 0 | Bits 7-0<br>Key Slot Number |

TABLE 307

Get Key Command Valid Input Entity Descriptors

| Operation | Field/Key | Entity Components | Unused | Entity Number |
|---|---|---|---|---|
| Bit 15<br>0 = read | Bit 14<br>1 = key | Bit 13-12<br>01 = descriptor | Bits 11-8<br>Unused = 0 | Bits 7-0<br>Key Slot Number |

21.3 Output Parameters

The Result Flag indicates whether the function completed successfully or not. If it did not complete successfully, the reason for the failure is returned here The OutputParameterBlock is an entity list, with a single entity. The entity is a key descriptor and its associated encrypted key value. The OutputParameterBlock of a Get Key command is in the format required for the SignedInputParameterBlock of the Replace Key command.

Table 308 describes the valid formats for the Get Key commands output entity descriptor:

TABLE 308

Get Key Command Valid Output Entity Descriptors

| Operation | Field/Key | Entity Components | Unused | Entity Number |
|---|---|---|---|---|
| Bit 15<br>1 = modify | Bit 14<br>1 = key | Bit 13-12<br>11 = both descriptor and value | Bits 11-8<br>Unused = 0 | Bits 7-0<br>Key Slot Number |

24.1 Function Sequence

The Get Key command is illustrated by the following pseudocode:

```
call ParseIncomingParameters
# Check input parameters
kd_from = SignedInputListOfEntities[0].key_descriptor
kd_to = UnsignedInputListOfEntities[0].key_descriptor
key_slot_from = find_my_key_slot(kd_from.identifier)
key_slot_to = find_my_key_slot(kd_to.identifier)
# check that our "from" key is a transport key in our local QA Device
# the standard parsing has already checked the UseLocally & Invalid
settings
if key_descriptor[key_slot_from].KeyType != TransportKey
        return InvalidKeyType
# check that the destination thinks the key is a valid transport key and is
# of the correct type
if (kd_from.Invalid == 1)
        return InvalidKey
```

-continued

```
if (kd__from.KeyType != TransportKey)
        return InvalidKeyType
if (kd__from.UseLocally == 1)
        return InvalidKey
if (kd__from.TransportOut == 1)
        return InvalidKey
#Validate the output key. Ensure it can be transported out
if key__descriptor[key__slot__to].Invalid == 1
        return InvalidKey
if key__descriptor[key__slot__to].TransportOut == 0
        return KeyNotForExport
# Generate output parameters
SignedOutputListOfEntities[0].entity__descriptor =
        SignedInputListOfEntities[0].entity__descriptor |
          (1 << ED__MODIFY) | (1 << ED__VALUE)
SignedOutputListOfEntities[0].key__descriptor =
        SignedInputListOfEntities[0].key__descriptor
SignedOutputListOfEntities[0].key__value =
        Key[key__slot__to] XOR
          Sign[Key[key__slot__from], previous__R |
          OutputSignatureGen.R]
call HandleOutgoingParameters
```

22 Test

| | |
|---|---|
| Input: | Command = Test, InputSignatureCheckingBlock SignedInputParameterBlock = arbitrary block of data |
| Output: | ResultFlag |
| Changes: | R |
| Availability: | Trusted QA Devices |

22.1 Function Description

The Test command is used to validate signed data that has been read from an untrusted QA Device. The data is typically descriptors and values of fields and keys.

The Test function produces a local signature ($SIG_L$=Sign (SignedInputParameterBlock|$R_G$|$R_C$)) and compares it to the InputSignatureCheckingBlock signature. If the two signatures match the function returns 'Pass', and the caller knows that the data read can be trusted.

22.2 Input Parameters

The format of the SignedInputParameterBlock is arbitrary, but is typically an Entity List.

22.3 Output Parameters

The Result Flag indicates whether the function completed successfully or not. If it did not complete successfully, the reason for the failure is returned here 22.4 Function Sequence The Test command is illustrated by the following pseudocode:

```
call ParseIncomingParameters
call HandleOutgoingParameters
```

The signature testing is performed inside ParseIncomingParameters, and then the results of that test are returned in HandleOutgoingParameters, so there is no command-specific code for this command.

23 Sign

| | |
|---|---|
| Input: | Command = Sign UnsignedInputParameterBlock = arbitrary block of data OutputSignatureGenerationBlock |
| Output: | Result Flag, OutputSignatureCheckingBlock |
| Changes: | R |
| Availability: | Trusted QA Devices |

23.1 Function Description

The Sign function is used to generate a digital signature on an arbitrary block of data. The output of the Sign command can be used as the input for a command to another QA Device, for example, an Authenticated Write.

23.2 Input Parameters

The format of the UnsignedInputParameterBlock is arbitrary, but is typically an Entity List.

23.3 Output Parameters

The Result Flag indicates whether the function completed successfully or not. If it did not complete successfully, the reason for the failure is returned here 23.4 Function Sequence The Sign command is illustrated by the following pseudocode:

```
call ParseIncomingParameters
OutputParameterBlock = UnsignedInputParameterBlock
call HandleOutgoingParameters
```

Once the UnsignedInputParameterBlock is copied into the OutputParameterBlock, the common code in HandleOutgoingParameters ensures that the OutputParameterBlock is not returned while the signature over the OutputParameterBlock is returned.

Transfers: Consumable Re/Filling and Device Upgrading

24 Introduction to Transfers and Rollbacks 24.1 Purpose of Transfers and Rollbacks An Authenticated Transfer is the process where a store of value is securely transferred from one QA Device to another.

A Rollback is where a previous attempted transfer is annulled, when the transferring QA Device is given evidence that the transfer never succeeded, and can never succeed in the future.

When a transfer is taking place from one QA Device to another, the QA Device from which the value is being transferred is called the Source QA Device, and the QA Device to which the value is being transferred is called the Destination QA Device.

The stores of values can be either consumables, or properties.

In a printing application, consumables are things like picolitres of ink, millimetres of paper, page impressions etc. They are things that are consumed as the printing process is taking place.

In a printing application, properties are things like printer features, such as the right to print at a certain number of pages per second, or the right to interwork with a certain bit of equipment, such as a larger ink cartridge, (which may be cheaper to buy per litre of ink).

A property can also be a printer licence, which has an implied printer feature set. That is, if a printer has a licence, it has a certain feature set, and other non-selectable printer features have certain default values.

Properties are things which are not consumed as the printing takes place, but which can be assigned to a printer and which remain as attributes of that printer.

Fields in QA Devices have a transfer mode, which can be one of:

- Quantity of Consumables: the field represents a volume of consumables. It can be the destination of a transfer, and if it has TxDE enabled, then it can be the source of a transfer of consumables,
- Single Property: this field represents a single property of a printer, such as a printer feature or a licence. This field can be assigned to, as the destination of a transfer, but cannot be the source of a transfer. Once a property has been assigned, it becomes operative, and it cannot be transferred any more.
- Quantity of Properties: this field represents a quantity of properties, which are in transit to their final destination. It can be the destination of a transfer, and also the source of a transfer. A quantity of properties does not confer any property to the QA Device which has them: they are in transit to the place where they can be used as properties.
- Other: this field cannot have value transferred from or to it.

In general, the flow of virtual consumables is from QACo, via the OEM factories, to the consumable containers, such as ink cartridges in the home or office. The virtual consumables are created ex nihil in QACo, transferred without being created or destroyed to the home or office, and then consumed. When virtual consumables are assigned to a consumable container to be used in SOHO, it should be done in tandem with physically filling the container, so that the two are in agreement.

In general, the flow of properties is from QACo, via the OEM factories or OEM internet resellers, to printers and dongles, for use in the home and office. The properties are stored as quantities of properties until they get to their final destination, where they are assigned as single properties.

There are three general kinds of transfers, each with their corresponding rollbacks:

- The transfer of a quantity of consumables. This is where a volume of consumables is transferred from source to destination. The transfer source field is decreased by the transfer delta amount, and the transfer destination field is increased by the same amount. This is a transfer delta.
- The transfer of a quantity of properties. This is where a quantity of properties is transferred from source to destination. The transfer source field is decreased by the transfer delta amount, and the transfer destination field is increased by the same amount. This is also a transfer delta.
- The assignment of a single property. This is where a single property is transferred from source to destination. The transfer source field is decreased by 1, and the transfer destination field is assigned with the property value. This is also a transfer assignment.

24.2 Requirements for Transfers and Rollbacks

The transfer process has two basic requirements:

- The transfer can only be performed if the transfer request is valid. The validity of the transfer request must be completely checked by the Source QA Device before it produces the required output for the transfer. It must not be possible to apply the transfer output to the Destination QA Device if the Source QA Device has already been rolled back for that particular transfer.
- A process of rollback is available if the transfer was not received by the Destination QA Device. A rollback is performed only if the rollback request is valid. The validity of the rollback request must be completely checked by the Source QA Device, before it adjusts its value to a previous value before the transfer request was issued. It must not be possible to rollback an Source QA Device for a transfer which has already been applied to the Destination QA Device i.e the Source QA Device must only be rolled back for transfers that have actually failed. Similarly, it must not be possible to apply a transfer to the Destination QA Device after the rollback has been applied.

24.3 Basic Scheme of Transfers and Rollbacks

Figure 400:
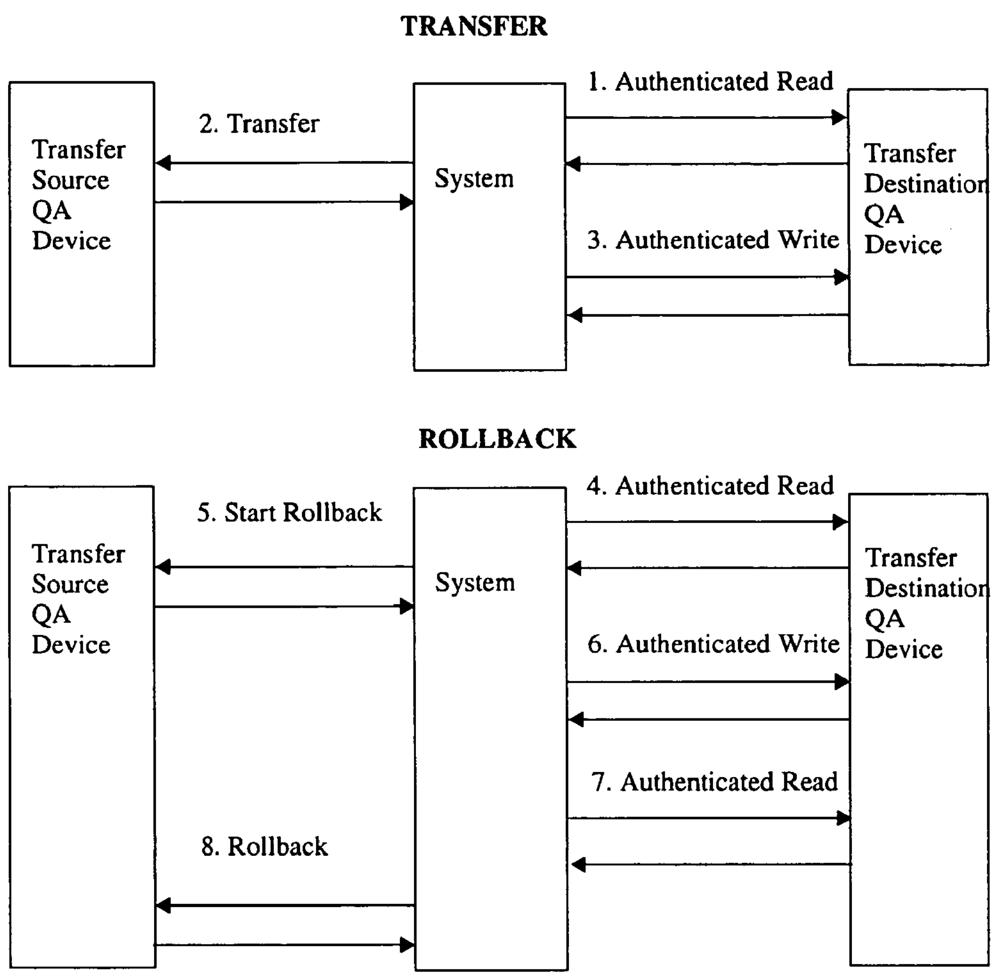
FIG. 400 Transfer and rollback process

The transfer and rollback process is shown in FIG. 400.

The steps shown in FIG. 400 for a transfer and rollback process are:

1. The System performs an Authenticated Read of fields and keys in the destination QA Device. The output from the read includes field data, field descriptors, and the key descriptor of the key being used to authenticate the transfer, and a signature. It is essential that the fields are read together. This ensures that the fields are correct, and have not been modified, or substituted from another device.
2. The System requests a Transfer from the Source QA Device with the amount that must be transferred, the field in the Source QA Device the amount must be transferred from, and the field in Destination QA Device the amount must be transferred to. The Transfer also includes the output from (1). The Source QA Device validates the Transfer based on the Authenticated Read output, checks that it has enough value for a successful transfer, and then produces the necessary transfer output. The transfer output typically consists of new field data for the field being refilled or upgraded, additional field data required to ensure the correctness of the transfer/rollback, along with a signature.
3. The System then applies the transfer output to the Destination QA Device, by calling an Authenticated Write function on it, passing in the transfer output from (2). The Write is either successful or not. If the Write is not successful, then the System may repeat calling the Write function using the same transfer output, which may be successful or not. If unsuccessful, the System initiates a Rollback of the transfer. The Rollback must be performed on the Source QA Device, so that it can adjust its value to a previous value before the current Transfer was initiated. It is not necessary to perform a rollback immediately after a failed Transfer. The Destination QA Device can still be used.
4. The System starts a Rollback by reading the fields and keys of the Destination QA Device.
5. The System makes a Start RollBack request to the Source QA Device with same input parameters as the Transfer, and the output from Read in (4). The Source QA Device validates the Start RollBack Request based on the Read output, and then produces the necessary Start Rollback output. The Start Rollback output consists only of additional field data along with a signature.
6. The System then applies the Start Rollback output to the Destination QA Device, by calling an Authenticated Write function on it, passing in the Start Rollback output. The Write is either successful or not. If the Write is not successful, then either (6), or (5) and (6) must be repeated.

7. The System then does an Authenticated Read of the fields of the Destination QA Device.
8. The System makes a RollBack request to the Source QA Device with same input parameters as the Transfer request, and the output from Read (7). The Source QA Device validates the RollBack request based on the Authenticated Read output, and then rolls back its field corresponding to the transfer.

24.4 Rollback Enable Fields

There are two fields in every QA Device which can be the destination of a transfer, called the rollback enable fields.

The rollback enable fields are called RollbackEnable1 and RollbackEnable2 with field types=TYPE_ROLLBACK_ENABLE_1 and TYPE_ROLLBACK_ENABLE_2 respectively (see Table 329). They each have a transfer mode of "other", which means that they are never the destination field of a transfer, that is, they never get value transferred to them. However, they take part in the authenticated writes which transfer value to other fields.

Both rollback enable fields are decrement-only fields, initialised to 0×FFFFFFFF when they are created, and they can only be decreased via authenticated writes.

When a transfer is requested, the authenticated read contains the field descriptors and field values for the rollback enable fields. The transfer source QA Device checks that they are present, and remembers their values.

The authenticated write for the transfer includes:

An assignment to the destination field being updated,

A decrement of −1 to RollbackEnable1, and

A decrement of −2 to RollbackEnable2.

If a rollback is requested, then the transfer source QA Device generates the arguments for an authenticated write to the transfer destination which include:

A decrement of −2 to RollbackEnable1, and

A decrement of −1 to RollbackEnable2.

This authenticated write only works if the transfer write had never been applied, (because otherwise the rollback write would be incrementing RollbackEnable2, which is not allowed; it is a decrement-only field.)

The pattern of "rollback enable value−1" and "rollback enable value−2" means that only one of the authenticated writes can be applied, not both. If the Transfer write has succeeded, then the Rollback write can never be applied, and if the Rollback write has succeeded, then the Transfer write can never be applied.

If the rollback write is successfully applied to the transfer destination, then another Authenticated Read is made to the rollback enable fields. This is presented as evidence to the transfer source QA Device, and if it can see that the rollback write has been successfully applied, it rolls back the transfer, and increments its source field.

24.5 Authorisation of Transfers

The basic authorisation for a transfer comes from a key that has authenticated ReadWrite permission (stored in field information as KeyNum) to the destination fields in the Destination QA Device. This key is referred to as the transfer key.

After validating the input transfer request, the Source QA Device decrements the amount to be transferred from its source field, and produces the arguments for an authenticated write, and a signature using the transfer key.

The signature produced by the Source QA Device is subsequently applied to the Destination QA Device. The Destination QA Device accepts the transfer amount only if the signature is valid. Note that the signature is only valid if it was produced using the transfer key which has write permission to the destination field being written.

The Source QA Device validates the transfer request by matching the Type of the data in the destination field of Destination QA Device to the Type of data in the source field of the Source QA Device. This ensures that equivalent data Types are transferred e.g. a quantity of type Network_OEM1_infrared ink is not transferred into a field of type Network_OEM1_cyan ink.

Each field which may be transferred from or to has a compatibility word in its field descriptor. The compatibility word consists of two 16-bit fields, called "who I am" and "who I accept". For the transfer to take place, each side must accept the other. That is expressed in this way: if (the source "who I am" bitwise-ANDed with the destination "who I accept" is non-zero) AND (the destination "who I am" bitwise-ANDed with the source "who I accept" is non-zero) are both non-zero, then the transfer can take place, otherwise it can't.

In addition, when a quantity of properties is being transferred, the source field's "upgrade to/from" word is used as follows:

If the assignment is a "transfer delta", then the "upgrade to/from" words in the source and destination fields must match, and The the transfer is a "transfer assignment", then the previous value of the property must have been the "upgrade from" value, and then the assignment is of the "upgrade to" value.

This is the complete list of checks that must be made by the transfer source QA Device, before a transfer is authorised.

The signature for the authenticated read matches

The keygroup for the incoming data is locked, and the key is valid, is of type DataKey, and has a UseLocally set to 1.

All of the incoming fields can be written or at least decremented by the incoming key.

The transfer source QA Device has the appropriate key for the transfer

The rollback enable fields are present

The rollback enable field descriptors are decrement-only, type rollback enable, transfer mode=other The rollback enable values are >=2

Source and destination field types match

Source and destination compatibility fields are compatible

If the transfer operation is "transfer delta", then

- i Destination volume+delta <=maximum allowed at destination
- ii Source volume>=delta
- iii The source and destination fields either both have or both do not have an "upgrade option from/to" value
- iv If the source field has an "upgrade option from/to" value, then it matches the destination field's value
- v The source and destination fields' transfer modes must be the same, and they must be either "quantity of consumables" or "quantity of properties"

If the transfer operation is "decrement and assign", then

- i The source field's transfer modes must be "quantity of properties", and the destination field's transfer mode must be "single property"
- ii Destination value="option from" value of the "upgrade option from/to" value If any of these tests fail, then the transfer cannot proceed.

24.6 The Authenticated Write to the Destination QA Device

The Authenticated Write arguments should have these values:

The RollbackEnable1 field should have an authenticated write of its previous value−1

The RollbackEnable2 field should have an authenticated write of its previous value−2

If the transfer operation is Transfer Delta, then:

Destination volume should be set to original volume+delta.

If the transfer operation is "decrement and assign", then

Destination value="option to" value of the "upgrade option from/to" value

The implied delta value is 1.

The arguments of the Authenticated Write should have the "write/add" bit in the entity descriptors set to "add", for the rollback enables, and the field value in the Transfer Delta case. It should be set to "write" for the field value in the Transfer Assign case. The use of the "add" option in the Authenticated Write eliminates a class of race conditions.

24.7 Changes to the State of the Source QA Device

The source field should have its value decremented by the delta value.

If rollback is supported, the transfer command save the following information in a Rollback Buffer:

The field number in the transfer source,

The field number in the transfer destination,

The keyslot number in the transfer source,

The keyslot number in the transfer destination,

The destination ChipId,

The destination rollback enable counters, values and descriptors,

The destination key descriptor

The delta (This is 1 or 2 words, and has the value 1 for the case of a "transfer assign".)

The Rollback Buffer is indexed by destination ChipId. This has the implication that there can only be one outstanding Transfer to roll back at a time, on a particular QA Device.

The Rollback buffer may vary in size, depending on the capabilities of the QA Device. An Internet Server QA Device may require thousands of Rollback Buffer entries, while a smaller QA Device might only have one.

24.8 Starting a Rollback

This command is only available on QA Devices with a transfer capability.

If there is no previous Transfer command recorded in the Rollback Buffer which matches the destination ChipId, then the Start Rollback command fails.

The transfer Source QA Device constructs the arguments for an authenticated write to the destination QA Device. The Authenticated Write arguments should have these values:

The RollbackEnable1 field should have an authenticated write of its previous value−2

The RollbackEnable2 field should have an authenticated write of its previous value−1

The arguments of the Authenticated Write should have the "write/add" bit in the entity descriptors set to "write", for the rollback enables.

The system should apply the authenticated write to the Destination QA Device. If it succeeds, then the Rollback can be requested.

24.9 Performing a Rollback

This command is only available on QA Devices with a Transfer capability.

If the signature on the data from the Authenticated Read does not match, the Rollback command fails.

If there is no previous Transfer command recorded in the Rollback Buffer which matches the destination ChipId, then the Rollback command fails.

The rollback enable field values in the Authenticated Read arguments should have these values:

The RollbackEnable1 field=its previous value−2

The RollbackEnable2 field=its previous value−1

If the rollback enable field values match, then the delta number is added to the transfer source field, and the Transfer arguments are removed from the Rollback Buffer.

25 Transfer Delta

| | |
|---|---|
| Input: | Command = Transfer Delta<br>UnsignedInputParameterBlock = transfer parameters<br>InputSignatureCheckingBlock<br>SignedInputParameterBlock = list of entities from an Authenticated Read<br>OutputSignatureGenerationBlock |
| Output: | Result Flag,<br>OutputParameterBlock = list of entities for an Authenticated Write<br>OutputSignatureCheckingBlock |
| Changes: | R, transfer source field,<br>Rollback Buffer |
| Availability | Transfer QA Device |

25.1 Function Description

The Transfer Delta function is to transfer value, the value being a quantity of consumables or a quantity of properties. This distinction (compared to a Transfer Assign) is above.

It produces as its output the data and signature for updating given fields in a destination QA Device with an Authenticated Write. The data and signature when applied to the appropriate device through the Authenticated Write function, updates the fields of the device.

The system calls the Transfer Delta function on the upgrade device with a certain Delta. This Delta is validated by the Transfer Delta function for various rules as described in Section 24.5, the function then produces the data and signature for the passing into the Authenticated Write function for the device being upgraded.

The Transfer Delta output consists of the new data for the field being upgraded, field data of the two rollback enable fields, and a signature using the transfer key.

The following data is saved in the transfer Source QA Device's Rollback Buffer:

The field number in the transfer source,

The field number in the transfer destination,

The key slot number in the transfer source,

The key slot number in the transfer destination,

The destination ChipId,

The destination rollback enable counters, values and descriptors,

The destination key descriptor.

The delta;

25.2 Input Parameters

Table 309 describes the format for the UnsignedInputParameterBlock of the Transfer Delta:

TABLE 309

UnsignedInputParameterBlock for Transfer Delta

| Bits 31-24 | Bits 23-16 | Bits 15-8 | Bits 7-0 |
|---|---|---|---|
| block length in 32-bit words = 3 or 4 | | Unused = 0 | Unused = 0 |
| Field number in the transfer source | Field number in the transfer destination | Key Slot Number for Signature in transfer destination | Delta Length in 32-bit words (1 or 2) |
| Delta - the amount we want to transfer (1 or 2 words) | | | |

The format of the SignedInputParameterBlock is the output of an Authenticated Read of the transfer destination QA Device. Its an entity list.

Table 310 describes the valid formats for the Transfer Delta command incoming entity descriptors:

TABLE 310

Transfer Delta Valid Input Entity Descriptors

| Operation | Field/Key | Entity Components | Unused | Entity Number |
|---|---|---|---|---|
| Bit 15 | Bit 14 | Bit 13-12 | Bits 11-8 | Bits 7-0 |
| 0 = read | 0 = field | 11 = both descriptor and value | Unused = 0 | Field Number |
| | 1 = key | 01 = descriptor | | Key Slot Number |

25.3 Output Parameters

The Result Flag indicates whether the function completed successfully or not. If it did not complete successfully, the reason for the failure is returned here.

The OutputParameterBlock is an entity list in the form given in Table 292. It must be in a format compatible with the inputs of Authenticated Write.

Table 311 describes the valid formats for the Transfer Delta command outgoing entity descriptors:

TABLE 311

Transfer Delta Valid Output Entity Descriptors

| Operation | Field/Key | Entity Components | Unused | Write/Add | Entity Number |
|---|---|---|---|---|---|
| Bit 15 | Bit 14 | Bit 13-12 | Bits 11-9 | Bit 8 | Bits 7-0 |
| 1 = modify | 0 = field | 10 = value | Unused = 0 | 1 = write value; 0 = add signed delta to value | Field Number |

25.4 Function Sequence

The Transfer Delta and Transfer Assign commands are illustrated by the following pseudocode:

```
call ParseIncomingParameters
i = index to first free RollbackBuffer element
p__rbb = &RollbackBuffer[i]
# Process the UnsignedInputParameterBlock. This is the fields we want to transfer,
# the key top authenticate it with, and the delta
dest__field__number = UnsignedInputParameterBlock.dest__field__number
source__field__number = UnsignedInputParameterBlock.source__field__number
dest__key__slot = UnsignedInputParameterBlock.dest__key__slot
source__key__slot = InputSignatureCheckingBlock.key__slot
if source__field__number > num__fields
        ResultFlag = InvalidField, goto away
if source__key__slot > num__keys
        ResultFlag = InvalidKey, goto away
if command == TransferDelta AND
        !fields[source__field__number].descriptor.tx__delta__enable
          ResultFlag = TxDeltaNotAllowed, goto away
if command == TransferDelta
        delta = UnsignedInputParameterBlock.delta
else if command == TransferAssign
        delta = 1
endif
if fields[source__field__number].value < delta
        ResultFlag = SourceUnderflow, goto away
# Process the SignedInputParameterBlock. This is the results of an authenticated
# read from the transfer destination QA Device. The read should be of the transfer
# key's descriptor, the rollback enable fields, (descriptor and value), and the
# transfer destination field, (descriptor and value).
```

-continued

```
chip__id = SignedInputParameterBlock.chip__id
got__field = FALSE
got__key = FALSE
got__RE1 = FALSE
got__RE2 = FALSE
for i = 0 to number__of__entities
          p__entity = &SignedInputParameterBlock.Entities[i]
          ed = p__entity->entity__descriptor
          if ed.is__key AND ed.number == dest__key__slot
            # If this entity in the list is the transfer key, then we have to check
            # that the key is a DataKey, in a locked group, can be used on the dest
            # and is valid
            got__key = TRUE
            kd__dest = p__entity->key__descriptor
            if kd__dest.key__keyType != DataKey OR
              !kd__dest.key__group__locked OR
              kd__dest.invalid OR
              !kd__dest.use__locally
                ResultFlag = InvalidKey, goto away
          else if ed.is__field
            # If this entity is a field, we have to ensure that the keygroup that
            # authenticates writes to it is the transfer key's keygroup
            fd = p__entity->entity.field__descriptor
            if fd.auth__write__key__group != transfer__key__group
              ResultFlag = InvalidField, goto away
            if fd.type == rollback__enable1 OR fd.type == rollback__enable2
              # If this field is one of the rollback enable fields, then we have
              # to ensure that the field has the right transfer mode, and is
              # decrement-only. We also must check that it has enough in its
              # value to sustain a transfer (including rollback)
              if fd.type == rollback__enable1
                got__RE1 = TRUE
              else
                got__RE2 = TRUE
              if fd is not transfer mode = other
                ResultFlag = SeqFieldInvalid, goto away
              if (fd.dec__only__keygroup__mask && (1 << kd__dest.key__group) == 0
                ResultFlag = SeqFieldInvalid, goto away
              if p__entity->entity.field__value < 2
                ResultFlag = SeqFieldInvalid, goto away
            else if ed.number == dest__field__number
              # If this field is the transfer destination field, then we must
check
              # that it is OK to transfer to. We must ensure that the types are
              # the same and compatibility fields (who I am and who I accept) are
              # compatible.
              got__field = TRUE
              source__fd = fields[source__field__num].descriptor
              if source__fd.type != fd.type
                ResultFlag = InvalidField, goto away
              if source__fd.who__I__am & fd.who__I__accept == 0 OR
                source__fd.who__I__accept & fd.who__I__am == 0
                  ResultFlag = NotCompatible, goto away
              if command == TransferDelta
                # If we are doing a Transfer__Delta, we need to ensure that the
                # destination field will not overflow, that source and
destination
                # transfer modes are the same, and that the "upgrade from" and
                # "upgrade to" fields are identical.
                if p__entity->entity.field__value + delta > MaxAllowed(fd)
                  ResultFlag = DestinationOverflow, goto away
                if source__fd.transfer__mode != fd.transfer__mode
                  ResultFlag = TransferModeIncompatible, goto away
                if source__fd.upgrade__from != fd.upgrade__from OR
                  source__fd.upgrade__to != fd.upgrade__to
                    ResultFlag = UpgradeFromToIncompatible, goto away
              else
                # If we are doing a Transfer__Assign, we need to ensure that the
value
                # we are upgrading from is correct, and that the transfer modes
are
                # compatible with this kind of transfer.
                if p__entity->entity.field__value != source__fd.upgrade__from
                  ResultFlag = UpgradeFromWrongValue, goto away
                if source__fd.transfer__mode != Quantity__of__properties OR
                  fd.transfer__mode != single__property
                    ResultFlag = TransferModeIncompatible, goto away
            else
              ResultFlag = InvalidField, goto away
```

-continued

```
            endif
        endif
# It is an error not to have all of the keys and fields needed for this transfer
if !got_field OR !got_key OR !got_RE1 OR !got_RE2
        ResultFlag = MissingField, goto away
source_key_slot, found = find_key_by_identifier(transfer_key)
if !found
        ResultFlag = InvalidKey, goto away
# At this point, we have done all of the testing, and so we can proceed with the
# transfer. We need to decrement the transfer source field.
field[source_field_number].value −= delta
# Create a Rollback Buffer entry for this transfer
p_rbb->source_field_number = source_field_number
p_rbb->dest_field_number = dest_field_number
p_rbb->source_key_slot = source_key_slot
p_rbb->dest_key_slot = dest_key_slot
p_rbb->dest_chip_id = dest_chip_id
p_rbb->dest_rollback_enable_1_descriptor = dest_rollback_enable_1_descriptor
p_rbb->dest_rollback_enable_1_value = dest_rollback_enable_1_value
p_rbb->dest_rollback_enable_2_descriptor = dest_rollback_enable_2_descriptor
p_rbb->dest_rollback_enable_2_value = dest_rollback_enable_2_value
p_rbb->dest_key_descriptor = dest_key_descriptor
p_rbb->delta = delta
p_rbb->valid = 1
# Generate the signed OutputParameterList, which will be used as the arguments for
# an Authenticated Write at the transfer destination.
OutputParameterBlock.EntityList[0].entity_descriptor =
            "modify field value add rollback_enable_1"
OutputParameterBlock.EntityList[0].value = −1
OutputParameterBlock.EntityList[1].entity_descriptor =
            "modify field value add rollback_enable_2"
OutputParameterBlock.EntityList[1].value = −2
if command == TransferDelta
        OutputParameterBlock.EntityList[2].entity_descriptor =
            "modify field value add destination_field_number"
        OutputParameterBlock.EntityList[2].value = Delta
else if command == TransferAssign
        OutputParameterBlock.EntityList[2].entity_descriptor =
            "modify field value write destination_field_number"
        OutputParameterBlock.EntityList[2].value =
            field[transfer_source_field_num].descriptor.upgrade_to
endif
away:
call HandleOutgoingParameters
```

26 Transfer Assign

| | |
|---|---|
| Input: | Command = Transfer Assign<br>UnsignedInputParameterBlock = transfer parameters<br>InputSignatureCheckingBlock<br>SignedInputParameterBlock = list of entities from an Authenticated Read<br>OutputSignatureGenerationBlock |
| Output: | Result Flag,<br>OutputParameterBlock = list of entities for an Authenticated Write<br>OutputSignatureCheckingBlock |
| Changes: | R, transfer source field, Rollback Buffer |
| Availability | Transfer QA Device |

26.1 Function Description

The Transfer Assign function produces data and signature for updating a given field in a destination QA Device. It is to transfer value, and assign a property. The distinction between Transfer Assign and Transfer Delta is described in more detail in Section 24.1.

It produces as its output the data and signature for updating a given field in a destination QA Device with an Authenticated Write. The data and signature when applied to the appropriate device through the Authenticated Write function, updates the field of the device.

The system calls the Transfer Assign function on the upgrade device, which must have a quantity of properties, and it asks for the assignment of a single property to the destination device.

This command format is very similar to Transfer Delta. This is the difference:

- The delta value has an implied value of 1, so delta is not included in the command format, because both sides know what it is. (The "delta length" is also not included.)

The system calls the Transfer Assign function on the upgrade device, and the request is validated for various rules as described in Section 24.5. The function then produces the data and signature for the passing into the Authenticated Write function for the device being upgraded.

The Transfer Assign output consists of the new data for the field being upgraded, field data of the two rollback enable fields, and a signature using the transfer key.

The following data is saved in the transfer source QA Device's Rollback Buffer:

The field number in the transfer source,

The field number in the transfer destination,

The key slot number in the transfer source,

The key slot number in the transfer destination,

The destination ChipId,

The destination rollback enable counters, values and descriptors,

The destination key descriptor.

The delta, which is 1.

26.2 Input Parameters

Table 312 describes the format for the UnsignedInputParameterBlock of the Transfer Assign:

TABLE 312

UnsignedInputParameterBlock for Transfer Assign

| Bits 31-24 | Bits 23-16 | Bits 15-8 | Bits 7-0 |
|---|---|---|---|
| block length in 32-bit words = 2 | | Unused = 0 | Unused = 0 |
| Field number in the transfer source | Field number in the transfer destination | Key Slot Number for Signature in transfer destination | Unused = 0 |

The format of the SignedInputParameterBlock is the output of an Authenticated Read of the transfer destination QA Device. Its an entity list.

Table 313 describes the valid formats for the Transfer Assign command incoming entity descriptors:

TABLE 313

Transfer Assign Valid Input Entity Descriptors

| Operation | Field/Key | Entity Components | Unused | Entity Number |
|---|---|---|---|---|
| Bit 15 | Bit 14 | Bit 13-12 | Bits 11-8 | Bits 7-0 |
| 0 = read | 0 = field | 11 = both descriptor and value | Unused = 0 | Field Number |
| | 1 = key | 01 = descriptor | | Key Slot Number |

26.3 Output Parameters

The Result Flag indicates whether the function completed successfully or not. If it did not complete successfully, the reason for the failure is returned here.

The OutputParameterBlock is an entity. It must be in a format compatible with the inputs of Authenticated Write.

Table 314 describes the valid formats for the Transfer Assign command outgoing entity descriptors:

TABLE 314

Transfer Assign Valid Output Entity Descriptors

| Operation | Field/Key | Entity Components | Unused | Write/Add | Entity Number |
|---|---|---|---|---|---|
| Bit 15 | Bit 14 | Bit 13-12 | Bits 11-9 | Bit 8 | Bits 7-0 |
| 1 = modify | 0 = field | 10 = value | Unused = 0 | 1 = write value; 0 = add signed delta to value | Field Number |

26.4 Transfer Assign Function Sequence

27 Start Rollback

| | |
|---|---|
| Input: | Command = Start Rollback<br>UnsignedInputParameterBlock = Start Rollback parameters<br>OutputSignatureGenerationBlock |
| Output: | Result Flag,<br>OutputParameterBlock = list of entities for an Authenticated Write<br>OutputSignatureCheckingBlock |
| Changes: | R |
| Availability | Transfer QA Device |

27.1 Function Description

The Start RollBack function is called if the System has determined that a transfer has failed, and must be rolled back. The input parameter is the ChipId of the transfer destination. If the Transfer Source QA Device's Rollback Buffer has a matching entry, then the transfer can be rolled back.

The Transfer Source QA Device generates as output the arguments for an Authenticated Write to the Transfer Destination QA Device. The write is to the rollback enable fields, and the arguments are designed such that either the transfer's write can work, or the rollback's write can work, but not both. This is as described in Section 24.8.

27.2 Input Parameters

Table 315 describes the format for the UnsignedInputParameterBlock of the Start Rollback:

TABLE 315

UnsignedInputParameterBlock for Start Rollback

| Bits 31-24 | Bits 23-16 | Bits 15-8 | Bits 7-0 |
|---|---|---|---|
| block length in 32-bit words = 3 | | Unused = 0 | Unused = 0 |
| Chip Identifier of the Transfer Destination QA Device (2 words) | | | |

27.3 Output Parameters

The Result Flag indicates whether the function completed successfully or not. If it did not complete successfully, the reason for the failure is returned here.

The OutputParameterBlock is an entity list in the form given in Table 292. It must be in a format compatible with the inputs of Authenticated write.

Table 316 describes the valid formats for the Start Rollback command outgoing entity descriptors:

TABLE 316

| Start Rollback Valid Output Entity Descriptors | | | | | |
|---|---|---|---|---|---|
| Operation | Field/Key | Entity Components | Unused | Write/Add | Entity Number |
| Bit 15 | Bit 14 | Bit 13-12 | Bits 11-9 | Bit 8 | Bits 7-0 |
| 1 = modify | 0 = field | 10 = value | Unused = 0 | 1 = write value | Field Number |

27.4 Function Sequence

The Start RollBack command is illustrated by the following pseudocode:

```
call ParseIncomingParameters
# Search through the Rollback Buffer for an entry matching this Chip
Identifier
found = FALSE
for i = 0 .. NumRollbackBufferEntries−1
        if RollbackBuffer[i].chip__id =
          UnsignedInputParameterBlock.ChipId AND
          RollbackBuffer[i].valid
        then
          found = TRUE
          p__rbb = &RollbackBuffer[i]
          break
        endif
end for
if !found
        ResultFlag = NoPendingTransfer
else
        # Generate the signed OutputParameterList, which will be
used as the arguments
        # for an Authenticated Write at the transfer destination.
        OutputParameterBlock.EntityList[0].entity__descriptor =
          "modify field value write rollback__enable__1"
        OutputParameterBlock.EntityList[0].value =
          p__rbb->rollback__enable__1 value − 2
        OutputParameterBlock.EntityList[1].entity__descriptor =
          "modify field value write rollback__enable__2"
        OutputParameterBlock.EntityList[1].value =
          p__rbb->rollback__enable__2 value − 1
endif
call HandleOutgoingParameters
```

28 Rollback

| | |
|---|---|
| Input: | Command = Rollback InputSignatureCheckingBlock SignedInputParameterBlock = list of rollback enable field entities |
| Output: | Result Flag, |
| Changes: | Transfer Source field |
| Availability | Transfer QA Device |

28.1 Function Description

The Rollback function finally adjusts the value of the transfer source field in the transfer source QA Device a previous value before the transfer request, if the QA Device being upgraded didn't receive the transfer message correctly (and hence was not upgraded).

The SignedInputParameterBlock has the results of an Authenticated Read of the rollback enable fields (field descriptors and field values) from the transfer destination QA Device. The SignedInputParameterBlock has the chip identifier of the transfer destination, (because it is the results of an authenticated read). If the Transfer Source QA Device's Rollback Buffer has a matching entry, then the transfer can be rolled back.

The upgrading QA Device checks that the QA Device being upgraded didn't actually receive the transfer message correctly, by comparing the rollback enable field values read from the Transfer Destination QA Device, with the values stored in the Rollback Buffer. The rollback enable values must imply that the results of the Start Rollback command have been successfully applied to the Transfer Destination QA Device. After all checks are fulfilled, the Transfer Source QA Device adjusts its transfer source field to the previous value.

28.2 Input Parameters

The format of the SignedInputParameterBlock is the output of an Authenticated Read of the transfer destination QA Device. It an entity list.

28.3 Output Parameters

The Result Flag indicates whether the function completed successfully or not. If it did not complete successfully, the reason for the failure is returned here.

28.4 Function Sequence

The Rollback command is illustrated by the following pseudocode:

```
call ParseIncomingParameters
# Search through the Rollback Buffer for an entry matching this Chip Identifier
found = FALSE
for i = 0 .. NumRollbackBufferEntries−1
        if RollbackBuffer[i].chip__id = SignedInputParameterBlock.ChipId AND
          RollbackBuffer[i].valid
        then
          found = TRUE
          p__rbb = &RollbackBuffer[i]
          break
        endif
end for
if !found
        ResultFlag = NoPendingTransfer
else
        # We have found a previous transfer which matched this Chip Identifier.
```

-continued

```
The
            # SignedInputParameterList has been provided as evidence that the previous
            # transfer has never happened. We check this with the values stored in the
            # Rollback Buffer. If in fact the transfer never did happen, then we
increment
            # the transfer source field back again, successfully rolling the transfer
back.
            if SignedInputParameterBlock.chip__id == p__rbb->chip__id AND
              SignedInputParameterBlock.EntityList[0].entity__descriptor ==
                "read field value p__rbb->rollback__enable__1" AND
              SignedInputParameterBlock.EntityList[0].value ==
                p__rbb->rollback__enable__1__value - 2 AND
              SignedInputParameterBlock.EntityList[1].entity__descriptor ==
                "read field value p__rbb->rollback__enable__2" AND
              SignedInputParameterBlock.EntityList[1].value ==
                p__rbb->rollback__enable__2__value - 1
            then
              field[p__rbb->source__field].value += p__rbb->Delta
              p__rbb->valid = 0 # invalidates Rollback Buffer element
            endif
endif
call HandleOutgoingParameters
```

Example Sequence of Operations

29 Concepts

The QA Chip Logical Interface devices do not initiate any activities themselves. Instead a system reads data and signature from various untrusted devices, and sends the data and signature to a trusted device for validation of signature, and then uses the data to perform operations required for storing and transferring value, upgrading, key replacement, and so on. The System therefore is responsible for performing the functional sequences required.

It formats all input parameters required for a particular function, then calls the function with the input parameters on the appropriate QA Chip Logical Interface instance, and then processes/stores the output parameters from the function appropriately.

29.1 Authenticated Read

Table 317 describes an example sequence for an Authenticated Read by the System, of some entities in QA Device A. The entities can be key descriptors, field descriptors, and/or field values. In this example, System has a Trusted QA Device, which shares a key with QA Device A:

TABLE 317

Example Sequence for an Authenticated Read

| Command Directed To | Command | Description |
|---|---|---|
| Trusted QA Device | Get Challenge | The System gets a nonce which can be used for including into the signature of the Authenticated Read. This is $R_C$. |
| QA Device A | Authenticated Read | The System asks QA Device A to return (a) the data: key descriptors, field values and/or field descriptors, (b) the generator's nonce, ($R_G$), and (c) the signature.<br>The signature is over the returned data, $R_G$, and $R_C$. |
| Trusted QA Device | Test | The System asks the Trusted QA to test the signature of the returned data. If the signature is correct, the System can trust the data. |

29.2 Authenticated Write

Table 318 describes an example sequence for an Authenticated Write by the System, of some entities in QA Device A. The entities can be field values. In this example, System has a Trusted QA Device, which shares a key with QA Device A:

TABLE 318

Example Sequence for an Authenticated Write

| Command Directed To | Command | Description |
|---|---|---|
| QA Device A | Get Challenge | The System gets a nonce which can be used for including into the signature of the Authenticated Write. This is $R_C$. |
| Trusted QA Device | Sign | The System asks the Trusted QA to generate a signature for the data which is to be sent to QA Device A. The generator's nonce ($R_G$) and the signature are returned. The signature is over the signed data, $R_G$, and $R_C$. |
| QA Device A | Authenticated Write | The System asks QA Device A to update some field values. QA Device A checks the signature. |

29.3 Transfer Delta

Table 319 describes an example sequence for a Transfer Delta by the System. The System mediates the transfer between the Transfer Source QA Device and the Transfer Destination QA Device:

TABLE 319

Example Sequence for a Transfer Delta

| Command Directed To | Command | Description |
|---|---|---|
| Transfer Source QA Device | Get Challenge | The System gets a nonce which can be used for including into the signature of the Authenticated Read. This is $R_C$. |
| Transfer Destination QA Device | Authenticated Read | The System asks the Transfer Destination QA to return the values of the transfer key's key descriptor, the rollback enable fields, value and descriptor, and the transfer destination field, value and descriptor, together with the signature.<br>The OutputSignatureCheckingBlock has a signature which uses $R_C$ from the Transfer Source QA Device, and the Transfer Destination's $R_G$. |
| Transfer Destination QA Device | Get Challenge | The System gets a nonce which can be used for including into the signature of the Authenticated Write. This is $R_{C2}$. |
| Transfer Source QA Device | Transfer Delta | The System asks the Transfer Source QA Device to do a transfer.<br>The SignedInputParameterBlock is the results from the Authenticated Read from the Transfer Destination QA Device.<br>The InputSignatureCheckingBlock is formed from the OutputSignatureCheckingBlock from the Authenticated Read.<br>The OutputSignatureGenerationBlock tells the Transfer Source QA Device to use $R_{C2}$ to generate the signature.<br>The Transfer Source QA Device generates a parameter list for an Authenticated Write to the Transfer Destination QA Device, and an OutputSignatureCheckingBlock based on $R_{C2}$, and its nonce, which is $R_{G2}$. |
| Transfer Destination QA Device | Authenticated Write | The System does an Authenticated Write to the Transfer Destination QA Device. The SignedInputParameterBlock is the Transfer's OutputParameterBlock, and the InputSignatureCheckingBlock is formed from the Transfer's OutputSignatureCheckingBlock. |

This assumes that there is an appropriate key with appropriate permissions which the Transfer Source QA Device and the Transfer Destination QA Device have in common.

Table 320 describes an example sequence for a Rollback after a failed Transfer from the Transfer Source QA Device to the Transfer Destination QA Device:

TABLE 320

Example Sequence for a Rollback

| Command Directed To | Command | Description |
|---|---|---|
| Transfer Source QA Device | Get Challenge | The System gets a nonce which can be used for including into the signature of the Authenticated Read. This is $R_C$. |
| Transfer Destination QA Device | Authenticated Read | The System asks the Transfer Destination QA to return the values of the rollback enable fields, value and descriptor, together with the signature. The OutputSignatureCheckingBlock has a signature which uses $R_C$ from the Transfer Source QA Device, and the Transfer Destination's $R_G$. |
| Transfer Destination QA Device | Get Challenge | The System gets a nonce which can be used for including into the signature of the Authenticated Write. This is $R_{C2}$. |
| Transfer Source QA Device | Start Rollback | The System asks the Transfer Source QA Device to start a rollback. The UnsignedInputParameterBlock is the Chip Identifier from the Transfer Destination QA Device. The OutputSignatureGenerationBlock tells the Transfer Source QA Device to use $R_{C2}$ to generate the signature. The Transfer Source QA Device generates a parameter list for an Authenticated Write to the Transfer Destination QA Device, and an OutputSignatureCheckingBlock based on $R_{C2}$, and its nonce, which is $R_{G2}$. |
| Transfer Destination QA Device | Authenticated Write | The System does an Authenticated Write to the Transfer Destination QA Device. If the Write succeeds, this ensures that the previously generated Transfer Authenticated Write can never succeed. The SignedInputParameterBlock is the Transfer's OutputParameterBlock, and the InputSignatureCheckingBlock is formed from the Transfer's OutputSignatureCheckingBlock. |
| Transfer Source QA Device | Get Challenge | The System gets a nonce which can be used for including into the signature of the Authenticated Read. This is $R_{C3}$. |
| Transfer Destination QA Device | Authenticated Read | The System asks the Transfer Destination QA to return the values of the rollback enable fields, value and descriptor, together with the signature. The OutputSignatureCheckingBlock has a signature which uses $R_{C3}$ from the Transfer Source QA Device, and the Transfer Destination's $R_{G3}$. |
| Transfer Source QA Device | Rollback | The System asks the Transfer Source QA Device to do a rollback. The SignedInputParameterBlock is the results from the Authenticated Read from the Transfer Destination QA Device. The InputSignatureCheckingBlock is formed from the OutputSignatureCheckingBlock from the Authenticated Read. |

29.4 Key Upgrade

Table 321 describes an example sequence for a Key Upgrade by the System. In this example, the System asks the Key Upgrade QA Device for an encrypted key value and descriptor, and then it updates the key in QA Device A:

TABLE 321

Example Sequence for a Key Upgrade

| Command Directed To | Command | Description |
|---|---|---|
| Key Upgrade QA Device | Get Challenge | The System gets a nonce which can be used for including into the signature of the Authenticated Read. This is $R_C$. |
| QA Device A | Authenticated | The System asks QA Device A to return a key descriptor, |

TABLE 321-continued

Example Sequence for a Key Upgrade

| Command Directed To | Command | Description |
|---|---|---|
| | Read | together with the signature. The OutputSignatureCheckingBlock has a signature which uses $R_C$ from the Key Upgrade QA Device, and QA Device A's $R_G$. |
| QA Device A | Get Challenge | The System gets a nonce which can be used for checking the Key Upgrade command's signature. This is $R_{C2}$. |
| Key Upgrade QA Device | Get Key | The System asks the Key Upgrade QA Device to return an encrypted key value and descriptor. The UnsignedInputParameterBlock is a key descriptor, which is the intended final key descriptor for the key in QA Device A. The InputSignatureCheckingBlock has a signature which is based on the Key Upgrade QA Device's $R_C$, and QA Device A's $R_G$. The SignedInputParameterBlock is the key descriptor which is currently in QA Device A. The OutputSignatureGenerationBlock specifies a signature based on the Checking QA Device's $R_{C2}$, and the Translate QA Device's next nonce, which is $R_{G2}$. The OutputParameterBlock is in a form suitable for the SignedInputParameterBlock for an Upgrade Key command. It has the intended final key descriptor, and the new encrypted key value. The encrypted key value is in the form: Encrypted Key = $Key_{NEW}$ XOR Sign[$Key_{OLD}$, $R_{G2}$\|$R_{C2}$] |
| QA Device A | Replace Key | The System asks QA Device A to upgrade its key to the new key descriptor and key value. The SignedInputParameterBlock is the OutputParameterBlock of the Get Key command. The InputSignatureCheckingBlock has a signature based on the Checking QA Device's $R_{C2}$, and the Translate QA Device's $R_{G2}$. Note: the $R_{C2}$ nonce has two functions in the Replace Key command: (a) its normal role, where it is used as the checker's nonce in the signed data; and (b) as part of the one-time pad which is used to encrypt the key value. When the signature over the incoming data is checked, the nonce is advanced. When the key decryption is taking place, the one-time pad must be calculated with the nonce as it was before it was advanced. This means that a temporary copy of the nonce needs to be made before the nonce is advanced, so that it can be used for the decryption. |

This assumes that there is an appropriate valid transport key that the Key Upgrade QA Device and QA Device A have in common. Thus KeyType=TransportKey on both devices, and on the Key Upgrade QA Device UseLocally for this key will be 1 while on QA Device A UseLocally will be 0 and TransportOut will also be 0.

Appendix A: Structures

This appendix summarises the structures used in the QA Logical Interface.

29.5 Identifier-Related Structures

Each QA Device contains a QA Device identifier as described in Table 322 and Section 5.

TABLE 322

Identifier-related structures

| Name | Represented by | Size | Description |
|---|---|---|---|
| Chip Identifier | ChipId | 64 bits | Identifier for this QA Device. It is generally unique, but in some circumstances, two QA Devices can be assigned the same Chip Identifier, so that both can authenticate messages via shared variant keys. |

29.6 Key-Related Structures

As described in Section 6, a given QA Device has KeyNum keyslots, each containing:

a 160-bit key referred to as K a 32-bit KeyDescriptor as per Table 323:

TABLE 323

Key Descriptor

| Bits | Bit-field Name | Description | Ref |
|---|---|---|---|
| 31 | Variant | 0 = The key is stored in base form<br>1 = The key is stored in variant form | Section 6.2 |
| 30 | KeyType | 0 = TransportKey (the key is used to transport other keys)<br>1 = DataKey (the key is used to sign data reads and writes)<br>(see Section 6.2) | Section 6.3 |
| 29-12 | KeyId | The public identifier for the secret key.<br>A user can refer to this to check which key is stored in the keyslot even though the bit pattern for the key is not known. It is likely to match (or be some function of) the database index into the key server for all keys. | Section 6.1 |
| 11-8[6] | KeyGroup Locked | 0 = the keygroup the key belongs to is not locked (more keys can be added to the keygroup)<br>non-0 = the keygroup the key belongs to is locked (no more keys may be added to the keygroup)<br>(only applicable for KeyType = DataKey) | Section 6.5 |
| 7-4[7] | Invalid | 0 = The key in this keyslot is valid<br>non-0 = The key in this keyslot is invalid (cannot be used to generate or test signatures, cannot be replaced, and cannot be transported from this device) | Section 6.4.2 |
| 3 | TransportOut | 0 = The key cannot be transported from this device<br>1 = The key can be transported from this device | Section 6.3 |
| 2 | UseLocally | If KeyType = TransportKey:<br>0 = The key cannot be used to transport other keys from this device<br>1 = The key can be used to transport other keys from this device<br>If KeyType = DataKey:<br>0 = The key cannot be used to generate or test signatures<br>1 = The key can be used to generate and test signatures | Section 6.3 |
| 1-0 | KeyGroup | The keygroup (0-3) that the key belongs to for the purposes of data write permissions (only applicable for KeyType = DataKey) | Section 6.5 |

[6]Note that this bit-field must be nybble-aligned (see Section 6.5)

[7]Note that this bit-field must be nybble-aligned (see Section 6.4.2)

29.7 Session-Related Structures

Each QA Device contains a session-varying number that is incorporated into each signature to ensure time varying signatures. The session-varying number is described briefly in Table 324 and in more detail in Section 7.

TABLE 324

Session-related structures

| Name | Represented by | Size | Description |
|---|---|---|---|
| Pseudo-random number | R | 160 bits | Current nonce used to ensure time varying messages. Changes after each successful authentication or signature generation. |

29.8 Field-Related Structures

29.8.1 Field Data Structures

For each field, there is a field descriptor, which may be 1, 2 or 3 words, depending on transfer mode. Table 325 and Table 326 define the bit-wise composition of a field descriptor:

TABLE 325

Field Descriptor Bit Fields

| Bit 31 | Bits 30-16 | Bits 15-4 | Bits 3-2 | Bits 1-0 | Compatibility Word | Upgrade From/To Word |
|---|---|---|---|---|---|---|
| Writeable<br>1 = writeable<br>0 = read-only | Type | Various | Authenticated Write KeyGroup | Transfer Mode | | |

TABLE 325-continued

Field Descriptor Bit Fields

| Bit 31 | Bits 30-16 | Bits 15-4 | Bits 3-2 | Bits 1-0 | Compatibility Word | Upgrade From/To Word |
|---|---|---|---|---|---|---|
| 0 | Constant non-transferable fields | Fields dependent on Writeable and Transfer Mode. These are described in Table 326 | This is the keygroup of the keys which may do authenticated writes of the field. All writes to a field need to be signed with a key in its designated group, (with the exception of when there are non-authenticated or authenticated decrements allowed.) (0-3) | 00 = Other | | |
| 1 | Updateable non-transferable fields | | | | | |
| 0 | Constant properties, such as licences (and features in read-only devices) | | | 01 = Single Property | Two 16-bit fields: "Who I am" and "Who I Accept" | |
| 1 | Updateable properties, such as features in updateable devices | | | | | |
| 0 | (Illegal) | | | 10 = Quantity of Consumables | | |
| 1 | Quantities of consumables, such as volumes of ink or sheets of paper | | | | | |
| 0 | (Illegal) | | | 11 = Quantity of Properties | | Two 16-bit fields: "Upgrading from option" and "Upgrading to option" |
| 1 | Quantities of properties, such as numbers of licences or printer features | | | | | |

Bits 4-15 of the field descriptor main word have different meanings, depending on the Writeable and TransferMode bit fields. Table 326 defines the bit-wise composition of the components of a field descriptor which depend on Writeable and TransferMode:

TABLE 326

Field Descriptor Bit Fields, dependent on Writeable and TransferMode

| Bit 31 Writeable[8] | Bit 15 | Bit 14 | Bit 13 | Bit 12 | Bit 11 | Bit 10 | Bit 9 | Bit 8 | Bit 7 | Bit 6 | Bit 5 | Bit 4 | Bits 0-1 Transfer Mode |
|---|---|---|---|---|---|---|---|---|---|---|---|---|---|
| 0 | | | Written | | | | | | Length | | | | 00 = Other |
| 1 | ODA | NAD | Decrement-only KeyGroup Mask | | | | Unused = 0 | | Length | | | | |
| 0 | | | Written | | | | | | Unused = 0 | | | | 01 = Single Property |
| 1 | | | | | | | Unused = 0 | | | | | | |
| 0 | | | | | | | Illegal | | | | | | 10 = Quantity of Consumables |
| 1 | TxDE | NAD | Decrement-only KeyGroup Mask | | | | Max Allowed | | | | | Length | |
| 0 | | | | | | | Illegal | | | | | | 11 = Quantity |

TABLE 326-continued

Field Descriptor Bit Fields, dependent on Writeable and TransferMode

| Bit 31 Writeable[8] | Bit 15 | Bit 14 | Bit 13 | Bit 12 | Bit 11 | Bit 10 | Bit 9 | Bit 8 | Bit 7 | Bit 6 | Bit 5 | Bit 4 | Bits 0-1 Transfer Mode |
|---|---|---|---|---|---|---|---|---|---|---|---|---|---|
| | TxDE | | Unused = 0 | | | | | Max Allowed | | | Length | | of Properties |

[8]0 = read-only, 1 = writeable

Notes:

ODA = "Only Decrement Allowed": When this bit is set, then all writes to a field must decrement it. When the field is created, its field value is initialised to all 1s. When the bit is 0, writes to it may either increase or decrease its field value, and the field value defaults to 0.

NAD = "Non-authenticated Decrements": When this bit is 1, non-authenticated writes are allowed to the field, as long as they decrease the field value. Other writes may increase the field value, as long as they are authenticated.

TxDE = "Transmit Delta Enable": the field is allowed to be the source of a transmit delta.

Decrement-only Keygroup Mask: This bit-field is a mask of keygroup numbers, which enables the ability to do authenticated decrements of the field value, signed with keys other than the keys in the Authenticated Write KeyGroup. What this does is establish a main keygroup that can do authenticated writes to an arbitrary value, and a set of other keygroups that can do authenticated writes, but only if those writes are decrements. (Obviously, this bit field is useless if non-authenticated decrements are allowed. In that case, it should be set to all 1s.)

The "who I am" and "who I accept" fields are used during a transfer in this way: each side in a transfer must be accepted by the other. So, the source "who I am" ANDed with the destination "who I accept" must be non-zero, and the destination "who I am" ANDed with the source "who I accept" must be non-zero.

The "Upgrading from option" and "Upgrading to option" values are used in this way during the transfer from a quantity of properties:

If the transfer is the assignment of a single property, (i.e. "transfer assign"), then the source checks that the property was previously equal to the "Upgrading from option", and then it sets it to the "Upgrading to option"

If the transfer is the bulk transfer of a group of property upgrades, (i.e. "transfer delta"), then the source QA Device checks that the "Upgrading from option" and "Upgrading to option" values are equal in the source and destination QA Devices.

The length fields have an implied 1 added to them. That is, a 4-bit length field can specify a field length of 1 to 16 words, and a 1-bit length field can specify a length of 1 to 2 words.

Single properties have an implied length of 1 word.

When "Write once then read-only" fields are created, the QA Device should leave the "written" flag at 0 until the field value is written.

If the "Non-Authenticated Decrement" field is set, then the "Decrement-only KeyGroup Mask" value must be If Maximum Allowed is N, then the high word of the field value must be less than or equal to ((1<<(N+1))−1)

29.8.2 Memory Vector Structures

TABLE 327

Memory Vector structures

| Group Description | Name | Represented by | Size | Description |
|---|---|---|---|---|
| Memory Vector Data Structures | Writeable Memory Vector | RWS | Implementation-dependent | This is a vector of memory words, which may be repeatedly updated by authenticated write commands. These are used for the value section of writeable fields. There may be 16x32-bit words in some smaller implementations, and up to 256x32-bit words in larger QA Devices. For more detail. |
| | Read-only Memory Vector | ROS | Implementation-dependent | This is a vector of memory words, which may be written to once, and thereafter can only be read from. These are used for field descriptors, and the value section of read-only fields. There may be 32x32-bit words in some smaller implementations, and up to 256x32-bit words in larger QA Devices |
| | Number of Writeable Memory Vector words | N(RWS) | Implementation-dependent | The number of writeable memory vector words |

TABLE 327-continued

Memory Vector structures

| Group Description | Name | Represented by | Size | Description |
|---|---|---|---|---|
| | Number of Read-only Memory Vector words | N(ROS) | Implementation-dependent | The number of read-only memory vector words |
| | Number of Read-only Memory Vector words | NU(ROS) | History dependent | The number of read-only memory vector words currently being used for fields |
| | Number of Used Writeable Memory Vector words | NU(RWS) | History dependent | The number of writeable memory vector words currently being used for fields |

29.9 Command-Related Data Structures

Entities are the values and descriptors of keys and fields in a QA Device.

Entities are always a multiple of 32 bits long. The lengths of various entities are:

Field descriptors are 1, 2 or 3 words long. The TransferMode determines the field descriptor's length.

Field values can be any length from 1 to 16 words. The field descriptor's length bit-field determines the field value's length.

Key descriptors are 1 word long,

Encrypted key values are 5 words long.

Note: an Authenticated Read command which returns the field values but not field descriptors needs to know how long the fields are, to be able to interpret the returned data correctly. This means that an initial Authenticated Read of a QA Device should read the field descriptors in tandem with the field values.

When a command does an operation on entities, the entity is described by an entity descriptor.

Table 328 defines the bit-wise composition of an entity descriptor:

In the Entity Descriptor, the command-dependent bits are used for:

The Authenticated Write and Non-authenticated Write commands, to specify whether each field assignment is a write or an addition.

The intent behind the operation type being part of every entity descriptor is that this means that those bits differ from one command to another. This limits the ability of attackers to use the results of authenticated accesses in unexpected ways. For instance, the results of an authenticated read can't be reused as the inputs for a replace key command, because the operation types differ, so the digital signatures are incorrect, and the attack won't succeed.

Appendix B: Field Types

Table 329 lists the field types that are specifically required by the QA Chip Logical Interface and therefore apply across all applications. Additional field types are application specific, and are defined in the relevant application documentation.

TABLE 328

Entity Descriptor Bit Definitions

| Operation Type | Field/Key | Entity Components | Command-dependent bits | Entity Number |
|---|---|---|---|---|
| Bit 15<br>0 = read entity,<br>1 = modify entity | Bit 14<br>0 = entity is a field,<br>1 = entity is a key | Bits 13-12<br>Specifies what components of the entity the operation is done to:<br>00 = illegal,<br>01 = entity descriptor,<br>10 = entity value,<br>11 = both entity descriptor and entity value | Bits 11-8<br>The meaning of these bits vary, depending on the command. If they are unused for a particular command, they are 0. | Bits 7-0<br>Field number or keyslot number |

TABLE 329

Predefined Field Types

| Value | Type | Description |
|---|---|---|
| 0x00 | TYPE_INVALID | The keyslot is unused (and does not contain a valid key). |
| 0x01 | TYPE_ROLLBACK_ENABLE_1 | Defines a sequence data field SEQ_1 in an Ink QA Device or in a Printer QA Device or in an upgrader QA Device. |
| 0x02 | TYPE_ROLLBACK_ENABLE_2 | Defines a sequence data fields SEQ_2 in an Ink QA Device or in a Printer QA Device or in an upgrader QA Device. |
| 0x03 | TYPE_INVALID_KEY_LIST | The value of this field is a list of key identifiers which are now to be considered invalid. |
| 0x04 and above | reserved | Reserved for application-specific use. |

Appendix C: Translate

Although the current QA Logical Interface does not currently support Translate, the most basic form of Translate is shown here. It is not currently expected that the QA Logical Interface will ever need to support Translate.

30 Translate

| | |
|---|---|
| Input: | Command = Translate, InputSignatureCheckingBlock SignedInputParameterBlock = arbitrary block of data OutputSignatureGenerationBlock |
| Output: | Result Flag, OutputSignatureCheckingBlock |
| Changes: | R |
| Availability: | Translation QA Devices |

30.1 Function Description

The Translate function is equivalent to a Test function followed by a Sign function on the same block of arbitrary data.

It is used for passing the signed output of a QA Device to the signed input of another QA Device, where the two QA Devices do not share any common keys. The signature translation is done by an intermediate QA Device which has a key in common with both of the other QA Devices. Multiple translate steps may be accomplished using consecutive QA Devices.

This version of Translate simply performs the requested translation, and does not use a translate permission map (as described in Section 6.7.6.2).

30.2 Input Parameters

The format of the SignedInputParameterBlock is arbitrary, but is typically an entity list.

30.3 Output Parameters

The Result Flag indicates whether the function completed successfully or not. If it did not complete successfully, the reason for the failure is returned here

30.4 Function Sequence

The Translate command is illustrated by the following pseudocode:

```
call ParseIncomingParameters
OutputParameterBlock = SignedInputParameterBlock
call HandleOutgoingParameters
```

The signature testing is done inside ParseIncomingParameters, and the command will fail if the signature is not correct. Then when the UnsignedInputParameterBlock is copied into the OutputParameterBlock, the common code in HandleOutgoingParameters ensures that the OutputParameterBlock is not returned, and the signature over it is returned.

30.5 Example Sequence Using Translate

Table 330 describes an example sequence for a Translate by a System. In this example, the results of an Authenticated Read from the Read QA Device are checked by the Checking QA Device, authenticated by a signature which is generated by the Read QA Device, translated by the Translate QA Device, and checked by the Checking QA Device:

TABLE 330

Example Sequence for a Translate

| Command Directed To | Command | Description |
|---|---|---|
| Translate QA Device | Get Challenge | The System gets a nonce which can be used for including into the signature of the Authenticated Read. This is $R_C$. |
| Read QA Device | Authenticated Read | The System asks the Read QA to return some values, which may include key descriptors, field values and descriptors, together with the signature.<br>The OutputSignatureCheckingBlock has a signature which uses $R_C$ from the Translate QA Device, and the Read QA Device's nonce, which is $R_G$. |

TABLE 330-continued

Example Sequence for a Translate

| Command Directed To | Command | Description |
|---|---|---|
| Checking QA Device | Get Challenge | The System gets a nonce which can be used for checking the translated signature. This is $R_{C2}$. |
| Translate QA Device | Translate | The System asks the Translate QA Device to translate the signature. The InputSignatureCheckingBlock has a signature which is based on the Translate QA Device's $R_C$, and the Read QA Device's $R_G$. The OutputSignatureGenerationBlock specifies a signature based on the Checking QA Device's $R_{C2}$, and the Translate QA Device's next nonce, which is $R_{G2}$. |
| Checking QA Device | Test | The System asks the Checking QA Device to check the signature of the results of the Authenticated Read. The SignedInputParameterBlock is the OutputParameterBlock of the Authenticated Read. The InputSignatureCheckingBlock has a signature based on the Checking QA Device's $R_{C2}$, and the Translate QA Device's $R_{G2}$. |

This assumes that there is a key shared between the Read QA Device and the Translate QA Device, and another key shared between the Translate QA Device and the Checking QA Device.

APPENDIX D: REFERENCES

[1] H. Krawczyk IBM, M. Bellare UCSD, R. Canetti IBM, RFC 2104, February 1997, http://www.ietf.org/rfc/rfc2104.txt

[2] Silverbrook Research, 4-3-1-2 QA Chip Technical Reference v5.02, 2004

[3] Silverbrook Research, 4-3-1-26 Authentication Protocols, v0.2, 2002

[4] Silverbrook Research, 4-4-1-3 SoPEC Security Overview, v1.1, 2004

[5] Silverbrook Research, 4-4-1-14 SoPEC Hardware Design, v4.0, 2004

1 Secret Key Stored in Non-Volatile memory

Introduction

1.1 Terminology

Non-volatile memory is memory that retains its state after power is removed. For example, flash memory is a form of non-volatile memory. The terms flash memory and non-volatile memory are used interchangeably in the detailed description.

In a flash memory, a bit can either be in its erased state or in its programmed state. These states are referred to as E and P. For a particular flash memory technology, E may be 0 or 1, and P is the inverse of E.

Depending on the flash technology, a FIB (Focused Ion Beam) can be used to change chosen bits of flash memory from E to P, or from P to E. Thus a FIB may be used to set a bit from an unknown state to a known state, where the known state depends on the flash memory technology.

An integrated circuit (IC or chip) may be manufactured with flash memory, and may contain an embedded processor for running application program code.

XOR is the bitwise exclusive-or function. The symbol e is used for XOR in equations.

A Key, referred to as K, is an integer (typically large) that is used to digitally sign messages or encrypt secrets. K is N bits long, and the bits of K are referred to as $K_0$ to $K_{N-1}$, or $K_i$, where i may run from 0 to N−1.

The Binary Inverse of a Key is referred to as ~K. The bits of ~K are referred to as $\sim K_i$, where i may run from 0 to N−1.

A Random Number used for the purposes of hiding the value of a key when stored in non-volatile memory is referred to as R. The bits of R are referred to as $R_i$, where i may run from 0 to N−1.

If a function of a key K is stored in non-volatile memory, it is referred to as X. The bits of X are referred to as $X_i$, where i may run from 0 to N−1.

1.2 Background

In embedded applications, it is often necessary to store a secret key in non-volatile memory such as flash on an integrated circuit (IC), in products that are widely distributed.

In certain applications, the same key is stored in multiple ICs, all available to an attacker. For example, the IC may be manufactured into a consumable and the consumable is sold to the mass market.

The problem is to ensure that the secret key remains secret, against a variety of attacks.

This document is concerned with FIB (Focussed Ion Beam) attacks on flash-based memory products. Typically a FIB attack involves changing a number of bits of flash memory from an unknown state (either E or P) into a known state (E or P). Based on the effect of the change, the attacker can deduce information about the state of the bits of the key.

After an attack, if the chip no longer works, it is disposed of. It is assumed that this is no impediment to the attacker, because the chips are widely distributed, and the attackers can use as many of them as they like.

Note that the FIB attack is a write-only attack—the attacker modifies flash memory and tests for changes of the chip behaviour.

Attacks that involve reading the contents of flash memory are much more difficult, given the current state of flash memory technology. However, if an attacker were able to read from the flash memory, then it would be straightforward to read the entire contents, then to disassemble the program and calculate what operations are being performed to obtain the key value. In short, all keys would be compromised if an attacker is capable of arbitrary reads of flash memory Note that this document is addressing direct attacks on the keys stored in flash memory. Indirect attacks are also possible. For example, an attacker may modify an instruction code in flash memory so that the contents of the accumulator are sent out an output port. Indirect attacks are not addressed in this document.

2 FIB Attacks Against Keys in Known Locations 2.1 Storing a Key in a Known Place in Flash Memory If a key K consisting of N bits is stored directly in non-volatile memory, and an attacker knows both N and the location of where K is stored within the non-volatile memory, then the attacker can use a simple FIB attack to obtain K.

For each bit i in K:

The attacker uses the FIB to set $K_i$ to P,

If the chip still works the attacker can deduce that the bit was originally P.

If the chip no longer works, then the attacker can deduce that the bit was originally E.

A series of FIB attacks allows the attacker to obtain the entire key. At most, an attacker requires N chips to obtain all N bits, but on average only N/2 chips are required.

If the attacker cannot set a bit to P, but can set it to E, then an equivalent attack is possible. i.e. For each bit i in K:

The attacker uses the FIB to set $K_i$ to E,

If the chip still works the attacker can deduce that the bit was originally E.

If the chip no longer works, then the attacker can deduce that the bit was originally P.

Thus storing a key directly in non-volatile memory is not secure, because it is easy for an attacker to use a FIB to retrieve the key.

2.2 Storing a Key XORed with a Random Number

Instead of storing K directly in flash, it is possible to store R and X, where R is a random number essentially different on each chip, and X is calculated as $X=K\oplus R$. Thus K can be reconstructed by the inverse operation i.e. $K=X\oplus R$.

In this case, a simple FIB attack as described in Section 2.1 will not work, even if the attacker knows where X and R are stored. This is because the bits of X are essentially random, and will differ from one chip to the next. If the attacker can deduce that a bit of X in one chip is a certain state, then this will not have any relation to what the corresponding bit of X is in any other chip.

Even so, an attacker can still extract the key. For each bit i in the key:

The attacker uses the FIB to set both $X_i$ and $R_i$ to P,

If the chip still works, the attacker knows that $X_i$ and $R_i$ were originally either both P or both E. Both of these cases imply that the key bit $K_i$ is 0.

If the chip no longer works, the attacker knows that exactly one of $X_i$ and $R_i$ was originally P and one was E. This implies that the key bit $K_i$ is 1.

If the chip no longer works, replace it with a new chip.

If the attacker cannot set a bit to P, but can set it to E, then an equivalent attack is possible.

A series of FIB attacks allows an attacker to obtain the entire key. For each bit, there is a 50% chance that the chip cannot be reused because it is damaged by the attacks (this is the case where $X_i$<>$R_i$). This means that on average it will take it will take an attacker 50%×N chips to obtain all N bits.

Therefore this method of storing a key is not considered secure, because it is easy for an attacker to use a FIB to retrieve the key.

2.3 Storing a Key and its Inverse

Instead of storing K directly in flash, it is possible to store K and its binary inverse ~K in flash such that for each chip, K is stored randomly in either of 2 locations and ~K is stored in the other of the 2 locations (the program that accesses the key also needs to know the placement). As a result, given a randomly selected chip, an attacker does not know whether the bit stored at a particular location belongs to K or ~K.

If the program in flash memory checks that the value read from the first location is the binary inverse of the value stored in the second location, before K is used, and the program fails if it is not, then an attacker cannot use the behaviour of the chip to determine whether a single bit attack hit a bit of K or ~K.

However the chip is subject to an attacker performing multiple-bit FIB attacks, assuming that the attacker knows the two locations where K and ~K are stored, but does not know which location contains K; and that the program in the chip checks that the values stored at the two locations are inverses of each other, and fails if they are not.

For each bit i>0 in the key:

The attacker chooses a positive integer T.

The attacker repeats the following experiment up to T times, on a series of chips:

a. The attacker uses the FIB to set bits 0 and i of the value stored at one of the 2 locations (the attacker doesn't know if the value is K or ~K) to P, b. If the chip still works, then the attacker can deduce that $K_0$ and $K_i$ have the same value: they are either both 1 or both 0. This is because the bits that were attacked must have both been originally P, and the FIB left them that way, and so the chip still worked. It is not clear whether the attacked bits were in K or ~K, and so the attacker can't deduce whether the key bits were 0 or 1, but the attacker has discovered that $K_0$ and $K_i$ are the same. If this result occurs, stop repeating the experiment.

c. If the chip no longer works, then the attacker can only deduce that either the bits in the key are different, (with a probability ⅔), or the bits in the key are the same but the attack hit the bits in the key or the inverse that were both E, (with a probability of ⅓). That is, the attacker can get no certain information from this result, but can get a probable result.

After T attempts, if there have been any results that indicate that $K_0$ and $K_i$ have the same value, then the attacker knows that the bits are the same. Otherwise, the attacker knows that there is a $(1/3)^T$ probability that the bits are the same. The probability that $K_0$ and $K_i$ are the same can be made arbitrarily close to 0 by increasing T until the attacker has an appropriate level of comfort that the bits are different.

If the attacker cannot set a bit to P, but can set it to E, then an equivalent attack is possible.

At the end of the experiments, the relation of $K_0$ to all of the other key bits $K_i$ (i=1 to N−1), is either known or almost certainly known. This means that the key value is almost certainly known to within two guesses: one where $K_0=0$, and the other where $K_0=1$. For each guess, the other key bits $K_i$ are implied by the known relations. The attacker can try both combinations, and at worst may need to try other combinations of keys based on the probabilities returned for each bit position during the experiment.

An attacker can use a series of FIB attacks to obtain the entire key. For each $K_i$, there is a 75% chance that the chip cannot be reused because it is damaged by the attacks: this is the case where the tested bits $K_0$ and $K_i$ were not both P.

On average, it will take 1.5 attempts to determine that $K_0$ and $K_i$ are identical, and T attempts to find that $K_0$ and $K_i$ are different. This means that on average it will take it will take an attacker 75%×(T+1.5)/2×(N−1) chips to obtain the relations between $K_0$ and the other N−1 bits.

Therefore this method of storing a key is not considered secure, because it is easy for an attacker to use a FIB to retrieve the key.

2.4 Storing a Key, its Inverse, and a Random Number

It is possible to store X, ~X and R in flash memory where R is a random number, K is the key, X=K⊕R, and ~X=~K⊕R.

X, ~X and R are stored in memory randomly with respect to each other, and the program that accesses the key also needs to know the placement. Thus, for a randomly selected chip it is not clear to an attacker whether a bit at a particular location belongs to X, ~X or R.

It is assumed that the attacker knows where X, ~X and R are stored, but does not know which one is stored in each of the 3 locations; and that the program in the chip checks that the stored value for X is indeed the binary inverse of the stored value for ~X, and fails if it is not.

An attacker cannot extract the key using the method described in Section 2.3 because that method will reveal whether $X_0$ is the same as $X_i$, (where X is one of X, ~X and R), for an individual chip, but this can give no information about the relationship of $K_0$ and $K_i$, because they are XORed with the random R that differs from chip to chip.

So a "pairs of bits" FIB attack cannot get the attacker any information about K.

However, K still susceptible to attack, by an attacker performing FIB attacks on pairs of bit pairs.

It is assumed that the chip is programmed with X, ~X and R, and they are in known locations, but it is not known by the attacker what order they are in; and that the program in the chip checks that stored value for X is indeed the binary inverse of the stored value for ~X, and fails if it is not.

For each bit i>0 in the key:

Choose a positive integer T.

Repeat this experiment up to T times, on a series of chips:

a. The attacker uses the FIB to set bits 0 and i of two of the entities (X, ~X or R), to P. The attacker does not know which of the entities were hit.

b. If the attacker hits bits in X and R, and all 4 of them were P, or if the attacker hits bits in ~X and R, and all 4 of them were P, then the program will always pass. In these events, the attacker can deduce that $K_0$ and $K_i$ are the same. The probability of this outcome is ⅙. If this result occurs, stop repeating the experiment.

c. If the attacker hits bits in X and R, and not all 4 of them were P, or if the attacker hits bits in ~X and R, and not all 4 of them were P, then the program will always fail. In this case the attacker can only deduce that either the bits in the key are different, or the bits in the key are the same but the attack hit the bits in the key or the inverse that were both E. That is, the attacker can get no certain information from this result, but can get a probable result. The probability of this outcome is ½. The probability of this outcome when $K_0$=$K_i$ is ⅙. The probability of this outcome when $K_0$<>$K_i$ is ⅓.

d. If the attacker hits bits in X and ~X, then the program will always fail, because the corresponding bits in X and ~X must be different (by definition). One bit from each bit pair must have been changed from P to E by the attack, and the program checks will fail. In this event, the attacker cannot find out any information about the bits of the key K. The probability of this outcome is ⅓. The probability of this outcome when $K_0$=$K_i$ is ⅙. The probability of this outcome when $K_0$<>$K_i$ is ⅙.

After T attempts, if there have been any results that indicate that $K_0$ and $K_i$ have the same value, then the attacker knows that the bits are the same. Otherwise, the attacker knows that there is a $(2/5)^T$ probability that the bits are the same. The probability that $K_0$ and $K_i$ are the same can be made arbitrarily close to 0 by increasing T. That is, the attacker can be almost certain that the bits are different.

If the attacker cannot set a bit to P, but can set it to E, then an equivalent attack is possible.

At the end of the experiments, the relation of $K_0$ to all of the other key bits $K_i$(i=1 to N−1), is either known or almost certainly known. This means that the key value is almost certainly known to within two guesses: one where $K_0$=0, and the other where $K_0$=1. For each guess, the other key bits $K_i$ will be implied by the known relations. The attacker can try both combinations, and at worst may need to try other combinations of keys based on the probabilities returned for each key position during the experiment.

Thus an attacker can use a series of FIB attacks to obtain the entire key.

Therefore this method of storing a key is not considered secure because it is not difficult for an attacker to use a FIB to retrieve the key.

3 Storing a Key in Non-Overlapping Arbitrary Places

The attacks described in Section 2 rely on the attacker having knowledge of where the key K and related key information are placed within flash memory.

If the program insertion re-links the program every time a chip is programmed, then the key and key-related information can be placed in an arbitrary random places in memory, on a per-chip basis. For any given chip, the attacker will not know where the key could be.

This will slow but not stop the attacker. It is still possible to launch statistical attacks to discover the key.

This section shows how any attack that can succeed against keys in known locations can be modified to succeed against keys that are placed in non-overlapping random locations, different for every programmed chip. The following assumptions are made:

That the places where the key information may be stored do not overlap with each other. That is, if a FIB attack hits a bit of key information, the attacker knows which bit of the key was hit, and That the attacker knows the possible locations of the key information, and their alignment, and That if a FIB attack leaves a chip reporting that the key was wrong, then it is more likely that this was because the key was corrupted, than because some part of the program code that manipulates the key was hit.

When an attacker attacks a bit in flash memory with a FIB attack to set its state to P there are a number of possibilities:

A bit can be hit that is already in the state P, and is therefore not changed. There is no change of behaviour of the chip. In some circumstances this can provide the attacker with some information.

A bit that is part of some key-related information can be hit, and the bit changes from state E to P. This will cause the program to fail, reporting an incorrect key value.

A bit that is not part of some key-related information can be hit, and the bit changes from state E to P. This may or may not cause the chip to fail for some other reason.

Thera are an equivalent set of possiblities if the attacker uses a FIB attack to set the state of a bit to E.

It is important to distinguish between the two kinds of failures: (a) failures where the program either reports an incorrect key value, or it is clear that the key value is incorrect, because it is unable to encrypt, and (b) other kinds of failures. If the program becomes unable to do key-related functions (encrypt, decrypt, digitally sign or check digital signatures, etc), but is otherwise functioning well, then the attacker can deduce that the most recent attack probably hit some key-related information.

If a program stops working, or comes up with some other unrelated error condition, then the most recent attack hit some part of the flash memory that was not key information, but was necessary for something else.

3.1 Storing a Key in a Non-Overlapping Arbitrary Place

In the situation where K is placed into a random location in flash memory for each chip, and that the possible locations for the key cannot overlap with each other, then an attacker can extract the key.

For each bit i in N−1:

Choose a positive integer T.

Repeat the following experiment T times, on a series of chips:

a. The attacker chooses the address A of a potential key.

b. The attacker uses the FIB to set the $A_i$ to P.

c. If the chip gets an error that implies that it has an incorrect key value, then probably K was actually at address A. In this case, the attacker records a hit, and records that $K_i$. is probably E.

d. Otherwise the attacker records a miss.

e. The attacker would do well to discard the chip, whether or not the chip failed. This is because there might be some silent damage to the chip, that could interact in unexpected ways with subsequent FIB attacks. It is safer to start each new experiment with a new chip.

After T attempts, the attacker has a record of how many hits $H_i$ were recorded for bit i in the key.

Since there are N key bits in flash memory, out of a total of M total bits of flash memory, the attacker can expect that a key bit was hit N out of M times. Sometimes this hit would have changed a bit from E to P, and other times it would leave the bit unchanged at P.

The attacker is now able to observe that for each bit i, the $H_i/T$ converge to two values: N/M and 0. If $H_i/T=N/M$, then $K_i$. is probably E, and if $H_i/T=0$, then $K_i$. is probably P.

To launch this attack, an attacker requires T×N chips. Note that for the experiments to be useful, T needs to be large enough to launch an attack on M.

If the attacker cannot set a bit to P, but can set it to E, then an equivalent attack is possible.

This method of storing a key is not considered secure, because it is difficult, though not impossible, for an attacker to use an FIB to retrieve the key.

3.2 Storing a Key and its Inverse in Non-Overlapping Arbitrary Places

In the situation where for each chip, K and ~K are each placed into a random location in flash memory such that the possible locations for storage do not overlap with each other, and that the program in the chip checks that the stored values at the two locations are inverses of one another and fails if it is not, then an attacker can extract the key.

For each bit i in N−1:

Choose a positive integer T.

Repeat this experiment T times, on a series of chips:

The attacker chooses an address A (hoping it will be the address of K or ~K).

The attacker uses the FIB to set bits $A_0$ and $A_i$ to P.

If the chip gets an error that implies that it has an incorrect key value, then probably either K or ~K was actually at address A. In this case, the attacker records a hit. The attacker can also deduce that bits $A_0$ and $A_i$ were not both P. This can mean one of 2 things:

a. $A_0$ and $A_i$ were different, and they were part of K or ~K. This implies that $K_0$<>$K_i$. This happens ⅔ of the time.

b. $A_0$ and $A_i$ were both E, and they were part of K or ~K. This implies that $K_0=K_i$. This happens ⅓ of the time.

Otherwise the attacker records a miss.

The attacker would do well to discard the chip, whether or not the chip failed. This is because there might be some silent damage to the chip, that could interact in unexpected ways with subsequent FIB attacks. It is safer to start each new experiment with a new chip.

After T attempts, there will be a record of how many hits $H_i$ were recorded for bit i in the key.

Since there are 2N bits in flash memory containing K and ~K, out of a total of M total bits of flash memory, the attacker can expect that key-related bits were hit 2N out of M times.

The attacker should observe that for each bit i, the $H_i/T$ converge to two values: N/M and N/2M. If $H_i/T=N/M$, then $K_i$ is probably $\sim K_0$, and if $H_i/T=N/2M$, then $K_i$. is probably $K_0$.

At the end of the experiments, the relation of $K_0$ to all of the other key bits $K_i$ (i=1 to N−1), is probably known. This means that the key value is probably known to within two guesses: one where $K_0=0$, and the other where $K_0=1$. For each guess, the other key bits $K_i$ will be implied by the known relations. The attacker should try both combinations.

To launch this attack, an attacker requires T×N chips. Note that for the experiments to be useful, T needs to be large enough to launch an attack on M.

If the attacker cannot set a bit to P, but can set it to E, then an equivalent attack is possible.

Therefore this method of storing a key is not considered secure, because although it is difficult, it is not impossible for an attacker to use a FIB to retrieve the key.

3.3 Conclusion: Storing a Key in Non-Overlapping Arbitrary Places in Flash Memory Storing a key in arbitrary non-overlapping places in flash memory will slow but not stop a determined attacker.

The same methods of attack that work for keys in known locations, work for keys in unknown locations. They are slower because they rely on statistics that are confounded with the failures that occur because of reasons other than corruption of keys.

A sufficient number of experiments allows the attacker to isolate the failures caused by differences in the value of the bits of keys from other failures.

4 Storing a Key in Arbitrary Places in Flash Memory

The attacks described in Section 2 and Section 3 rely on the attacker having knowledge of where the key K and related key information are placed within flash memory, or knowledge that the locations where the key information may be placed do not overlap each other.

It is possible to place the key and key-related information in random locations in memory on a per-chip (assuming the program that references the information knows where the information is stored). For a randomly selected chip, the attacker will not know exactly where the key is stored. This will slow but not stop the attacker. It is still possible to launch statistical attacks that discover the key.

This section shows that any attack that can succeed against keys in known locations can be modified to succeed against keys that are placed in random locations, different for every programmed chip. The following assumptions are made:

If a FIB attack leaves a chip reporting that the key was wrong, then it is more likely that this was because the key was corrupted, than because some part of the program code that manipulates the key was hit.

Some inside information is helpful for the attack.

For a given computer architecture and software design, the keys will be held in memory in units of a particular word size, and those words will be held in an array of words, aligned with the word size. So, for example, a particular key might be 512 bits long, and held in an array of 32-bit words, and the words are aligned in flash memory at 32-bit boundaries. Similarly, another system might have a key that is 160 bits long, held in an array of bytes, aligned on byte boundaries.

Additional useful information for the attacker is the minimum alignment in flash memory for the key, denoted by W.

If a key is N bits long, aligned with a word-size of W, and placed in flash memory starting at an arbitrary word address, then there will be N/W bits that are aliased together from the point of view of the attacker. This is called the aliased bit group. This is because an attack on bit x in flash could be a hit to $K_i$, $K_{i+W}$, $K_{i+2W}$, etc, depending on which word in memory the key started.

For example, if a particular key is 512 bits long, and is held in an array of 32-bit words, then there are 16 elements (512/32) in each aliased bit group. Similarly, if another system's key is 160 bits long, held in an array of bytes, then there are 20 elements (160/8) in each aliased bit group.

When an attacker discovers something about a particular chip's key by attacking a bit of flash memory, the attacker can generally only deduce some bulk characteristics of the aliased bit group, rather than individual bits of the key. For small enough aliased bit groups, however, this can dramatically reduce the search size necessary to compromise the key.

The boundary conditions of aliased bit groups allows an attacker to gather particular types of statistics:

If a flash memory stores key related information on arbitrary bit boundaries, then the word size is 1, and the aliased bit group size is the key size. In this situation, the attacker can only gather statistics about the key bits as a whole.

If a flash memory stores key related information in words with an alignment greater than or equal to the key size, then the aliased bit group size is 1. In this situation, each bit of flash memory can only be a unique bit of the key, and any key-related information the attacker finds about that bit of flash memory can be applied to exactly that key bit.

It is in the attacker's interest for the word size to be as large as possible, so that there is a minimum of aliasing of bits.

When an attacker attacks a bit in flash memory with a FIB attack, there are a number of possible outcomes:

A bit can be hit that is already in the state P, and is therefore not changed. There is no change of behaviour of the chip. In some circumstances this can provide the attacker with some information.

A bit that is part of some key-related information can be hit, and the bit changes from state E to P. This will cause the chip to become unable to use its key correctly, and the program will fail.

A bit that is not part of some key-related information can be hit, and the bit changes from state E to P. This may or may not cause the chip to fail for some other reason.

Thera are an equivalent set of possible outcomes if the attacker uses a FIB attack to set the state of a bit to E.

It is important to distinguish between the two kinds of failures: (a) failures where the program becomes unable to use its key, and (b) other kinds of failures. If the program becomes unable to do key-related functions (encrypt, decrypt, digitally sign or check digital signatures, etc), but is otherwise functioning well, then the attacker can deduce that the most recent attack hit some key-related information.

If a program stops working, or comes up with some other unrelated error condition, then the most recent attack hit some part of the flash memory that was not key information, but was necessary for something else.

4.1 Storing a Key in an Unknown Place in Flash Memory

If the key K is placed into a random location in flash memory for each chip, then an attacker can extract the key.

For each bit i in 0-W−1, where W=the word size:

Choose a positive integer T.

The attacker repeat the following experiment T times, on a series of chips:

The attacker chooses the address A of a word in flash memory.

The attacker uses the FIB to set the $A_i$ to P.

If the chip becomes unable to use the key K, then clearly the word at address A was in K. That is, $A_i=K_{i+jW}$, where $(i+jW)<N$. In this case, the attacker records a hit.

Otherwise the attacker records a miss.

The attacker would do well to discard the chip, whether or not the chip failed. This is because there might be some silent damage to the chip, that could interact in unexpected ways with subsequent FIB attacks. It is safer to start each new experiment with a new chip.

After T attempts, there will be a record of how many hits $H_i$ were recorded for bit i in the word size.

At the end of the experiment, the attacker has W fractions $H_i/T$, one for every bit in the flash memory's words.

Since there are N key bits in flash memory, out of a total of M total bits of flash memory, the attacker can expect that a key bit was hit N out of M times. Sometimes this hit would have changed a bit from E to P, and other times it would leave the bit unchanged at P.

If all of the bits in the key's aliased bit group were E, then the attacker should expect that $H_i/T=N/M$. That is, all of the bits of a particular word bit i that hit a key bit changed it from E to P.

If all of the bits in the key's aliased bit group were P, then the attacker should expect that $H_i/T=0$. That is, all of the bits of a particular word bit i that hit a key bit left it unchanged at P.

If there are k bits in the aliased bit group, then the attacker should be able to observe that $Bi=k(H_i/T)/(N/M)$ takes on k+1 values, from 0 to k, for each bit i in the flash memory words.

$B_i$ is the number of bits in the aliased bit group that are E in the key. $k-B_i$ is the number of bits in the aliased bit group that are P in the key. So the attacker knows to within a permutation what the key bit values are.

To launch this attack, an attacker requires T×W chips. Note that for the experiments to be useful, T needs to be large enough to launch an attack on M.

If the attacker cannot set a bit to P, but can set it to E, then an equivalent attack is possible.

Therefore this method of storing a key is not considered secure, because it is difficult, though not impossible, for an attacker to use a FIB to retrieve the key.

4.1.1 Some Examples

If a system being attacked has a 160-bit key, aligned on 32-bit boundaries, there are 32 aliased bit groups, each with 5 bits. For this example, the flash technology has E=1 and P=0. After the experiment, there will be 32 numbers $B_i$, for i=0 to 31, that take the values 0 to 5. The $B_i$s are the number of E bits in the set of key bits $K_i$, $K_{i+32}$, $K_{i+64}$, $K_{i+96}$ and $K_{i+128}$.

Table 331 shows the results of the attack:

TABLE 331

Results of an attack on a 160-bit key aligned on 32-bit boundaries

| Value of Bi | Values of $K_i$, $K_{i+32}$, $K_{i+64}$, $K_{i+96}$ and $K_{i+128}$ | Number of possible permutations | Number of further experiments the attacker will have to undertake to determine which bit is which |
|---|---|---|---|
| 0 | All of the $K_{i+32j}$ are 0 | 1 | No further experiment is necessary |
| 1 | One of the $K_{i+32j}$ are 1, and four are 0 | 5 | 4 |
| 2 | Two of the $K_{i+32j}$ are 1, and three are 0 | 10 | 9 |
| 3 | Three of the $K_{i+32j}$ are 1, and two are 0 | 10 | 9 |
| 4 | Four of the $K_{i+32j}$ are 1, and one is 0 | 5 | 4 |
| 5 | All of the $K_{i+32j}$ are 1 | 1 | No further experiment is necessary |

Now the worst case for the attacker is that there are 10 permutations of Is and 0s for the values of $K_i$, $K_{i+32}$, $K_{i+64}$, $K_{i+96}$ and $K_{i+128}$, for each of the word bits 0 to 31, and so the attacker will have to do another 9×32 experiments.

These final 288 tests are non-destructive; they just involve comparing the results of a chip's encryption or signature, using the key, with the results based on one of the possible keys discovered in the attack.

These 288 tests are more than 151 binary orders of magnitude fewer tests than would have been necessary, had an attack been lauched without that information. This is a dramatic improvement.

Similarly, if the system being attacked has a 512 bit key with a 1-bit word size—that is, the key is aligned on an arbitrary bit—then there will be a single aligned bit group with 512 elements. The results of the experiments will tell the attacker how many 1 and 0 bits are in the key. This may not be enough information usefully to compromise the key, but it still reduces the search space by many orders of magnitude.

Alternatively, a system with 160-bit keys that was constrained to put them on aligned 128-bit boundaries, would have 96 aligned bit groups with only 1 bit in them, and 32 aligned bit groups with 2 bits in them. The results of the experiments will tell the attacker the exact values of the 96 key bits that are alone in their aligned bit groups, and will let the attacker determine the other values after 32 non-destructive key tests. Clearly this system is much less secure than a chip with a similar sized key that was less aligned, because of the width of its word size.

4.2 Storing a Key and its Inverse in Unknown Places in Flash Memory

If K and ~K are each placed into one of two random locations in flash memory for each chip, and the program checks that the stored values in both locations are binary inverses of each other and fails if they are not, then an attacker can extract the key.

For each bit i in 1-W−1, where W=the word size:

Choose a positive integer T.

The attacker repeat the following experiment T times, on a series of chips:

- The attacker chooses the address A of a word in flash memory.
- The attacker uses the FIB to set bits $A_0$ and $A_i$ to P.
- If the chip becomes unable to use the key K, then clearly the word at address A was either in K or ~K. That is, $A_i=K_{i+jW}$, or $A_i=\sim K_{i+jW}$, where (i+jW)<N. In this case, the attacker records a hit. The attacker can also deduce that bits $A_0$ and $A_i$ were not both P. This can mean one of 2 things:
- $A_0$ and $A_i$ were different, and they were part of K or ~K. This implies that $K_{i+jW}$<>$K_{jW}$, for some j. This happens ⅔ of the time.
- $A_0$ and $A_i$ were both E, and they were part of K or ~K. This implies that $K_{i+jW}=K_{jW}$, for some j. This happens ⅓ of the time.
- Otherwise the attacker records a miss.
- The attacker would do well to discard the chip, whether or not the chip failed. This is because there might be some silent damage to the chip, that could interact in unexpected ways with subsequent FIB attacks. It is safer to start each new experiment with a new chip.

After T attempts, there will be a record of how many hits Hi were recorded for bit i in the word size.

At the end of the experiment, the attacker has W−1 fractions $H_i/T$, one for each bit 1-W−1 in the flash memory's words.

If an attack hits bits $K_{i+jW}$ and $K_{jW}$, for some j, and those key bits are different, this will always cause a failure. If those key bits are the same, this will cause a failure half the time, on average.

So the attacker should expect that $$H_i/T=(N/M)\times \mathrm{Sum}(j=0 \text{ to } k-1, (\text{if } (K_{i+jW}=K_{jW}) \text{ then } \tfrac{1}{2} \text{ else } 1))$$

where k is the number of elements in the aliased key group.

If we define $B_i=(H_i/T)/(N/M)$, for i=1 to W−1, then the attacker finds $B_i=(k-1)$ for the case where key bit $K_{i+jW}$<>$K_{jW}$, for j in 0 to k−1. The attacker finds $B_i=(k-1)/2$ for the case where key bit $K_{i+jW}=K_{jW}$, for j in 0 to k−1.

The attacker should try various combinations of $K_i$ that make these equalities true. This dramatically decreases the search space necessary to compromise the key.

If the attacker cannot set a bit to P, but can set it to E, then an equivalent attack is possible.

4.2.1 An Example

If a system being attacked has a 128-bit key, aligned on 64-bit boundaries, there are 64 aliased bit groups, each with 2 bits. For this example, the flash technology has E=1 and P=0. After the experiment, there will be 64 numbers $B_i$, for i=0 to 63, that take the values 1, 1½ or 2. The $B_i$s are the sum of two numbers, that are 1 or ½, depending on whether the key bits $K_{64j}$ and $K_{i+64j}$ are equal.

4.3 Conclusion: Storing a Key in Arbitrary Places in Flash Memory

Storing a key in arbitrary places in flash memory will slow but not stop a determined attacker.

The same methods of attack that work for keys in known locations work for keys in unknown locations. They are slower, because they rely on statistics that are confounded with the failures that occur because of reasons other than corruption of keys.

A sufficient number of experiments will allow the attacker to isolate the failures caused by differences in the value of the bits of keys, from other failures.

5 XORing with an Uncorrelated Random Number

When keys are stored in flash, the key bits can be guarded by an increasingly elaborate set of operations to confound attackers. Examples of such operations include the XORing of key bits with random numbers, the storing of inverted keys, the random positioning of keys in flash memory, and so on.

Based on previous discussion, it seems likely that this increasingly elaborate series of guards can be attacked by an increasingly elaborate series of FIB attacks. Note however, that the number of chip samples required by an attacker to make a success likely may be prohibitively large, and thus a previously discussed storage method may be appropriately secure.

The basic problem of the storing and checking of keys is that the bits of the key-related entities (~K, R, etc) can be directly correlated to the bits of the key.

Assuming a single key, a method of solving the problem is to guard the key bits using a value that has no correlation with the key bits as follows:

R and X are stored in the flash memory where R is a random number different for each chip, and X=K⊕owf (R), where owf( ) is a one-way function such as SHA1 (see [1]).

R and X may be stored at known addresses

For the program to use the key, it must calculate K=X⊕owf(R)

The one-way function should have the property that if there is any bit difference in the function input, there are on average differences in about half of the function output bits. SHA1 has this property.

5.1 FIB Attacks

If an attacker modifies even a single bit of R, it will affect multiple bits of the owf( ) output and thus multiple bits of the calculated K.

This property makes it impossible to make use of multiple bit attacks, such as those described in Section 2 because if bit 0 and bit i of R are modified, this will affect on average N/2 bits of K, that may or may not include bits 0 and i. The attacker cannot deduce any information about bits of K.

Similarly, if bit 0 and bit i of X are modified, the attacker is able to tell if $X_0$ and $X_i$ were both P in this particular chip, but this will give the attacker no information about key bits $K_i$, because the attacker will not know the whole of R, and hence the attacker doesn't know any bits of owf(R).

If the attacker is restricted to FIB attacks, it doesn't matter if R and X are stored in fixed known locations, because these FIB attacks cannot extract any information about K.

6 Multiple Keys 6.1 Methods of Storage of Multiple Keys

A chip may need to hold multiple keys in flash memory. For this discussion it is assumed that a chip holds NumKeys keys, named K[0]–K[NumKeys−1].

These keys can be held in a number of ways.

They can be stored as NumKey instances of any of the insecure key storage algorithms discussed above. These key storage methods are insecure for the storage of multiple keys for the same reasons that they are insecure for the storage of single keys.

If the keys are stored as processed keys using the method introduced in Section 5 then there is an issue of how many random numbers are required for same storage. The two basic cases are:

1. Processed keys are stored along with a single random number R as X[0]-X[NumKeys−1], where X[i]=K[i] ⊕owf(R)
2. Processed keys are stored along with a set of random numbers R[0]-R[NumKeys−1], in the form X[0]-X [NumKeys−1], where X[i]=K[i]⊕owf(R[i]).

Both storage techniques are immune to FIB attacks, as long as no keys have been compromised.

6.2 Using One Compromised Key to Compromise Another

If storage technique (1) is used, and an attacker knows one of the keys, then that knowledge can be used with a FIB attack to obtain the value of another keys and hence all keys. The attack assumes that the attacker knows:

the location of R and X[0]-X[NumKeys−1], where X[i] =K[i] ED owf(R).

the value of K[a], and wishes to discover the value of K[b].

For each bit i in the key K[b]:

The attacker uses the FIB to set $R_i$ and $X[a]_i$ to P,

If the chip still works when it uses K[a], a. The attacker knows that $R_i$ and $X[a]_i$ in this particular chip were originally P,
b. The attacker uses the FIB to set $X[b]_i$ to P,
c. If the chip still works when it uses K[b], then the attacker can deduce that $X[b]_i$ was originally P, in which case $K[b]_i$ is 0.
d. If the chip no longer works when it uses K[b], then the attacker can deduce that $X[b]_i$ was originally E, in which case $K[b]_i$ is 1.

If the chip no longer works, then a. repeat this procedure for $K[b]_i$ with a new chip.

If the attacker cannot set a bit to P, but can set it to E, then an equivalent attack is possible.

The attack relies on the fact that even if the attacker does not know the value of R, the same value owf(R) is used to guard all of the keys and there is known correlation between corresponding bits of each X.

Note that if the locations of R and X[0]-X[NumKeys−1], are randomised during program insertion, it will slow but not stop this kind of attack, for the reasons described in Section 4.

Therefore storage technique (2) is more secure, as it uses a set of different owf(R[i]) values to guard the keys. However storage technique (2) requires additional storage over storage technique (1).

6.3 Multiple Key Storage with a Single R

The problem with storage technique (1) is that there is a single value (owf(R)) used to guard the keys, and there is known correlation between corresponding bits of each stored form of key. i.e. XOR is a poor encryption function.

Storage technique (2) relies on storing a different R for each key so that the values used to protect each key are uncorrelated on a single chip, and are uncorrelated between chips. The problem with storage technique (2) is that additional storage is required—one R per key.

However, it is possible to use a single base-value such that the bit-pattern used to protect each K is different. i.e.: storage technique (3) is as follows:

3. Processed keys are stored with a single random number R in the form X[0]-X[NumKeys−1], where X[i]=K[i]⊕owf(R|i), where owf( ) is a one-way function such as SHA1.

For the program to use a key, it must calculate K[i]=X[i]⊕owf(R|i).

The keys may be stored at known addresses.

In general, technique (3) stores X[i] where X[i]=Encrypt (K[i]) using key Q. The Encrypt function is XOR, and Q is obtained by owf(R|i) where R is an effectively random number per chip. Normally XOR is not a strong encryption technique (as can be seen by the attack in Section 2.2), but it is strong when applied to an uncorrelated data, as is the case with this method. The technique used to generate Q is such that uncorrelated Qs are obtained to protect the keys, each Q is uncorrelated from the stored R, and both Rs and Qs are uncorrelated between chips. It isn't quite a pure one-time-pad, since the same stored R is used each time the key is decrypted, but it is a one-time-pad with respect to the fact that each Q is different on a single chip, and each R (and hence the Qs) is different between chips.

7 Conclusion

The technique described in Section 5 is adequate for single key storage, but if multiple keys are stored, then the technique described in Section 6.3 is more secure. The effect is that each key is protected by a different uncorrelated encryption key.

The method avoids the computational burden (in time, storage requirements and program space) of alternative strong encryption/decryption functions. The method is therefore applicable to devices that have limited resources or where computationally intensive encryption functions cannot be performed.

1 Generating Non-Deterministic Sequences

Introduction 1.1 Terminology

A nonce is a parameter that varies with time. A nonce can be a generated random number, a time stamp, and so on. Because a nonce changes with time, an entity can use it to manage its interactions with other entities.

A session is an interaction between two entities. A nonce can be used to identify components of the interaction with a particular session. A new nonce must be issued for each session.

A replay attack is an attack on a system which relies on replaying components of previous legitimate interactions.

2 Generation of Non-Deterministic Sequences 2.1 Nonces in Challenge-Response Systems Nonces are useful in challenge-response systems to protect against replay attacks.

A entity, referred to as a challenger, can issue a nonce for each new session, and then require that the nonce be incorporated into the encrypted response or be included with the message in the signature generated from the other party in the interaction. The incorporation of a challenger's nonce ensures that the other party in the interaction is not replaying components of a previous legitimate session, and authenticates that the message is indeed part of the session they claim to be part of.

However, if an attacker can predict future nonces, then they can potentially launch attacks on the security of the system. For example, an attacker may be able to determine the distance in nonce-sequence-space from the current nonce to a nonce that has particular properties or can be used in a man-in-the-middle attack.

Therefore security is enhanced by an attacker not being able to predict future nonces.

2.2 Existing Methods

To prevent these kinds of attacks, it is useful for the sequence of nonces to be hard to predict. However, it is often difficult to generate a sequence of unpredictable random numbers.

Generation of sequences is typically done in one of two ways:

- An entity can use a source of genuinely random numbers, such as a physical process which is non-deterministic.
- An entity can use a means of generating pseudo-random numbers which is computationally difficult to predict, such as the Blum Blum Shub pseudo-random sequence algorithm [1].

For certain entities, neither of these sources of random numbers may be feasible. For example, the entity may not have access to a non-deterministic physical phenomenon. Alternatively, the entity may not have the computational power required for complex calculations.

What is needed for small entities is a method of generating a sequence of random numbers which has the property that the next number in the sequence is computationally difficult to predict.

2.3 OWF Method of Random Sequence Generation

At a starting time, for example when the entity is programmed or manufactured, a random number called $x_0$ is injected into the entity. The random number acts as the initial seed for a sequence, and should be generated from a strong source of random numbers (e.g. a non-deterministic physically generated source).

When the entity publishes a nonce R, the value it publishes is a strong one-way function (owf) of the current value for x: i.e:

$$R=owf(x)$$

The strong one-way function owf( ) can be a strong one-way hash function, such as SHA-1 (see [2]), or a strong non-compressing one-way function.

Characteristics of a good one-way function for this purpose are that it:

- is easy to compute
- produces a sufficiently large dynamic range as output for the application
- is computationally infeasible to find an input which produces a pre-specified output (i.e. it is preimage resistant). This means an attacker can't determine $x_n$ from $R_n$.
- is computationally infeasible to find a second input which has the same output as any pre-specified input (i.e. it is 2nd-preimage resistant).
- produces a large variance in the output for minimally different inputs
- is collision resistant over the output bit range i.e. is computationally infeasible to find any two distinct inputs $x_1$ and $x_2$ which produce the same output The number of bits n in x needs to be sufficiently large with respect to the chosen one-way function. For example, n should be at least 160 when owf is SHA-1.

To advance to the next nonce, the seed is advanced by a simple means. For example, it may be incremented as an n-bit integer, or passed through an n-bit linear feedback shift register.

The entity publishes a sequence of nonces $R_0$, $R_1$, $R_2$, $R_3$, . . . based on a sequence of seeds $x_0$, $x_1$, $x_2$, $x_3$, . . .

Because the nonce is generated by a one-way function, the exported sequence, $R_0$, $R_1$, $R_2$, $R_3$, . . . etc., is not predictable (or deterministic) from an attacker's point of view. It is computationally difficult to predict the next number in the sequence.

The advantages of this approach are:

The calculation of the next seed, and the generation of a nonce from the seed are not computationally difficult.

A true non-deterministic number is only required once, during entity instantiation. This moves the cost and complexity of the difficult generation process out of the entity. There is no need for a source of random numbers from a non-deterministic physical process in the running system.

Note that the security of this sequence generation system relies on keeping the current value for x secret. If any of the x values is known, then all future values for x can be predicted and hence all future R values can be known.

Note that the random sequence produced from this is not a strong random sequence e.g. from the view of guaranteeing particular distribution probabilities. The behaviour is more akin to random permutations. Nonetheless, it is still useful for the purpose of generating a sequence for use as a nonce in such applications as a SoC-based [3] implementation of the QA Logical Interface [4].

It will be appreciated by those skilled in the art that the foregoing represents only a preferred embodiment of the present invention. Those skilled in the relevant field will immediately appreciate that the invention can be embodied in many other forms.

The invention claimed is:

1. A method of at least partially compensating for errors in ink dot placement by at least one of a plurality of nozzles due to erroneous rotational displacement of a printhead module relative to a carrier, the nozzles being disposed on the printhead module, the method comprising the steps of:

(a) determining the rotational displacement;

(b) determining at least one correction factor that at least partially compensates for the ink dot displacement; and (c) using the correction factor to alter the output of the ink dots to at least partially compensate for the rotational displacement, wherein the correction factor is at least partially based on a thickness of media being printed on.

2. A method according to claim 1, wherein step (c) includes altering a timing of a fire signal to at least one of the nozzles on the basis of the correction factor, thereby to effect the at least partial compensation.

3. A method according to claim 1, wherein the nozzles are disposed in a plurality of rows, and step (c) includes reallocating at least one of the ink dots from at least one original print line to at least one alternate print line, thereby to effect the at least partial compensation.

4. A method according to claim 3, wherein step (c) further includes the step of altering a timing of fire signals to at least one of the nozzles on the basis of the correction factor, thereby to effect the at least partial compensation.

5. A method according to claim 4, wherein the altered fire signals are supplied to both reallocated ink dots and non-reallocated ink dots.

6. A method according to claim 1, wherein the correction factor is stored in a memory associated with the printhead.

7. A method according to claim 6, wherein the memory is mounted with the printhead, the printhead being mounted on the print engine.

8. A method according to claim 1, wherein the rotational displacement is roll.

9. A method according to claim 1, wherein the rotational displacement is yaw.

10. A method according to claim 1, the printhead module being one of a plurality of printhead modules mounted on a carrier to form a printhead and the error in ink dot placement being an error relative to ink dots output by one or more of the other printhead modules.

11. A method according to claim 1, wherein the printer is a pagewidth printer.

12. A printer controller programmed and configured to implement the method of claim 1.

13. A method according to claim 1, the method including expelling ink from a printhead module including at least one row that comprises a plurality of adjacent sets of n adjacent nozzles, each of the nozzles being configured to expel ink in response to a fire signal, the method comprising providing, for each set of nozzles, a fire signal in accordance with the sequence: [nozzle position 1, nozzle position n, nozzle position 2, nozzle position (n−1), . . . , nozzle position x], wherein nozzle position x is at or adjacent the centre of the set of nozzles.

14. A method according to claim 1, the method including expelling ink from a printhead module including at least one row that comprises a plurality of sets of n adjacent nozzles, each of the nozzles being configured to expel ink in response to a fire signal, the method comprising the steps of:

(a) providing a fire signal to nozzles at a first and nth position in each set of nozzles;

(b) providing a fire signal to the next inward pair of nozzles in each set;

(c) in the event n is an even number, repeating step (b) until all of the nozzles in each set has been fired; and (d) in the event n is an odd number, repeating step (b) until all of the nozzles but a central nozzle in each set have been fired, and then firing the central nozzle.

15. A method according to claim 1, the method being performed in conjunction with a printer controller for supplying dot data to at least one printhead module and at least partially compensating for errors in ink dot placement by at least one of a plurality of nozzles on the printhead module due to erroneous rotational displacement of the printhead module relative to a carrier, the printer being configured to:

access a correction factor associated with the at least one printhead module;

determine an order in which at least some of the dot data is supplied to at least one of the at least one printhead modules, the order being determined at least partly on the basis of the correction factor, thereby to at least partially compensate for the rotational displacement; and supply the dot data to the printhead module.

16. A method according to claim 1, the method being performed in conjunction with a printer controller for controlling a printhead comprising at least one monolithic printhead module, the at least one printhead module having a plurality of rows of nozzles configured to extend, in use, across at least part of a printable pagewidth of the printhead, the nozzles in each row being grouped into at least first and second fire groups, the printhead module being configured to sequentially fire, for each row, the nozzles of each fire group, such that each nozzle in the sequence from each fire group is fired simultaneously with respective corresponding nozzles in the sequence in the other fire groups, wherein the nozzles are fired row by row such that the nozzles of each row are all fired before the nozzles of each subsequent row, wherein the printer controller is configured to provide one or more control signals that control the order of firing of the nozzles.

17. A method according to claim 1, the method being used in conjunction with a printer controller for supplying one or more control signals to a printhead module, the printhead module including at least one row that comprises a plurality of sets of n adjacent nozzles, each of the nozzles being configured to expel ink in response to a fire signal, such that:

(a) providing a fire signal to nozzles at a first and nth position in each set of nozzles;

(b) providing a fire signal to the next inward pair of nozzles in each set;

(c) in the event n is an even number, repeating step (b) until all of the nozzles in each set has been fired; and (d) in the event n is an odd number, repeating step (b) until all of the nozzles but a central nozzle in each set have been fired, and then firing the central nozzle.

18. A method according to claim 1, the method being used in conjunction with a printer controller for supplying one or more control signals to a printhead module, the printhead module including at least one row that comprises a plurality of adjacent sets of n adjacent nozzles, each of the nozzles being configured to expel ink in response to a fire signal, the method comprising providing, for each set of nozzles, a fire signal in accordance with the sequence: [nozzle position 1, nozzle position n, nozzle position 2, nozzle position (n−1), . . . , nozzle position x], wherein nozzle position x is at or adjacent the centre of the set of nozzles.

19. A method according to claim 1, the method being performed in conjunction with a printhead module including at least one row that comprises a plurality of sets of n adjacent nozzles, each of the nozzles being configured to expel ink in response to a fire signal, such that, for each set of nozzles, a fire signal is provided in accordance with the sequence: [nozzle position 1, nozzle position n, nozzle position 2, nozzle position (n−1), . . . , nozzle position x], wherein nozzle position x is at or adjacent the centre of the set of nozzles.

20. A method according to claim 1, the method being performed in conjunction with a printhead module including at least one row that comprises a plurality of adjacent sets of n adjacent nozzles, each of the nozzles being configured to expel the ink in response to a fire signal, the printhead being configured to output ink from nozzles at a first and nth position in each set of nozzles, and then each next inward pair of nozzles in each set, until:

in the event n is an even number, all of the nozzles in each set has been fired; and in the event n is an odd number, all of the nozzles but a central nozzle in each set have been fired, and then to fire the central nozzle.

21. A method according to claim 1, the method being performed in conjunction with a printhead module having a plurality of rows of nozzles configured to extend, in use, across at least part of a printable pagewidth, the nozzles in each row being grouped into at least first and second fire groups, the printhead module being configured to sequentially fire, for each row, the nozzles of each fire group, such that each nozzle in the sequence from each fire group is fired simultaneously with respective corresponding nozzles in the sequence in the other fire groups, wherein the nozzles are fired row by row such that the nozzles of each row are all fired before the nozzles of each subsequent row.

* * * * *